US011593295B2

(12) United States Patent
Fleming, Jr. et al.

(10) Patent No.: US 11,593,295 B2
(45) **Date of Patent: *Feb. 28, 2023**

(54) APPARATUSES, METHODS, AND SYSTEMS FOR OPERATIONS IN A CONFIGURABLE SPATIAL ACCELERATOR

(71) Applicant: Intel Corporation, Santa Clara, CA (US)

(72) Inventors: Kermin E. Fleming, Jr., Hudson, MA (US); Simon C. Steely, Jr., Hudson, NH (US); Kent D. Glossop, Nashua, NH (US); Mitchell Diamond, Shrewsbury, MA (US); Benjamin Keen, Marlborough, MA (US); Dennis Bradford, Portland, OR (US); Fabrizio Petrini, Menlo Park, CA (US); Barry Tannenbaum, Nashua, NH (US); Yongzhi Zhang, Wayland, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/550,875

(22) Filed: Dec. 14, 2021

(65) Prior Publication Data

US 2022/0107911 A1 Apr. 7, 2022

Related U.S. Application Data

(63) Continuation of application No. 16/024,854, filed on Jun. 30, 2018, now Pat. No. 11,200,186.

(51) Int. Cl.

| | |
|---|---|
| ***G06F 13/40*** | (2006.01) |
| ***G06F 9/30*** | (2018.01) |
| ***G06F 15/78*** | (2006.01) |

(52) U.S. Cl.
CPC ...... *G06F 13/4027* (2013.01); *G06F 9/30145* (2013.01); *G06F 15/7867* (2013.01)

(58) Field of Classification Search
CPC ............. G06F 15/7867; G06F 15/7825; G06F 12/0813

(Continued)

(56) References Cited

U.S. PATENT DOCUMENTS

| | | | | |
|---|---|---|---|---|
| 672,177 A | | 4/1901 | Metcalf | |
| 4,314,349 A | * | 2/1982 | Batcher | G01C 5/005 714/10 |

(Continued)

FOREIGN PATENT DOCUMENTS

| | | |
|---|---|---|
| CN | 101174200 A | 5/2008 |
| CN | 102103479 A | 6/2011 |

(Continued)

OTHER PUBLICATIONS

Abandonment from U.S. Appl. No. 15/640,544, dated Mar. 20, 2018, 2 pages.

(Continued)

*Primary Examiner* — Titus Wong
(74) *Attorney, Agent, or Firm* — Nicholson De Vos Webster & Elliott LLP

(57) ABSTRACT

Systems, methods, and apparatuses relating to operations in a configurable spatial accelerator are described. In one embodiment, a configurable spatial accelerator includes a first processing element that includes a configuration register within the first processing element to store a configuration value that causes the first processing element to perform an operation according to the configuration value, a plurality of input queues, an input controller to control enqueue and dequeue of values into the plurality of input queues according to the configuration value, a plurality of output queues, (Continued)

and an output controller to control enqueue and dequeue of values into the plurality of output queues according to the configuration value.

24 Claims, 366 Drawing Sheets

(58) Field of Classification Search
USPC .......................................................... 710/306
See application file for complete search history.

(56) References Cited

U.S. PATENT DOCUMENTS 4,965,716 A 10/1990 Sweeney
5,093,920 A 3/1992 Agrawal et al.
5,141,747 A 8/1992 Scholz
5,239,634 A * 8/1993 Buch .................. G06F 13/1642 711/E12.013
5,241,635 A 8/1993 Papadopoulos et al.
5,314,503 A 5/1994 Bobrove et al.
5,393,454 A 2/1995 Mondin et al.
5,393,536 A 2/1995 Brandt et al.
5,410,722 A 4/1995 Cornaby
5,465,368 A 11/1995 Davidson et al.
5,502,661 A 3/1996 Glunz
5,560,032 A 9/1996 Nguyen et al.
5,574,944 A 11/1996 Stager
5,581,767 A 12/1996 Katsuki et al.
5,604,120 A 2/1997 Yano et al.
5,625,630 A 4/1997 Abramovici et al.
5,655,096 A 8/1997 Branigin
5,689,719 A 11/1997 Miura et al.
5,725,364 A 3/1998 Mirazita
5,787,029 A 7/1998 de Angel
5,790,821 A 8/1998 Pflum
5,805,827 A 9/1998 Chau et al.
5,925,099 A 7/1999 Futral et al.
5,930,484 A 7/1999 Tran et al.
5,933,429 A 8/1999 Bubenik et al.
5,948,081 A 9/1999 Foster
6,020,139 A 2/2000 Schwartz et al.
6,088,780 A 7/2000 Yamada et al.
6,141,747 A 10/2000 Witt
6,205,533 B1 3/2001 Margolus
6,247,064 B1 6/2001 Alferness et al.
6,314,503 B1 11/2001 D'Errico et al.
6,393,454 B1 5/2002 Chu
6,393,536 B1 5/2002 Hughes et al.
6,460,131 B1 10/2002 Trimberger
6,507,947 B1 1/2003 Schreiber et al.
6,515,333 B1 2/2003 Riccobene
6,553,448 B1 4/2003 Mannion
6,553,482 B1 4/2003 Witt
6,604,120 B1 8/2003 De Angel
6,615,333 B1 9/2003 Hoogerbrugge et al.
6,640,267 B1 10/2003 Raza
6,721,774 B1 4/2004 Lee et al.
6,725,364 B1 4/2004 Crabill
6,728,945 B1 4/2004 Wang
6,886,085 B1 4/2005 Shuf et al.
6,947,416 B1 9/2005 Nee et al.
7,000,072 B1 2/2006 Aisaka et al.
7,058,785 B1 6/2006 Ochotta
7,181,578 B1 2/2007 Guha et al.
7,200,137 B2 4/2007 Dorr et al.
7,203,936 B2 4/2007 Gillies et al.
7,257,665 B2 8/2007 Niell et al.
7,290,096 B2 10/2007 Jeter et al.
7,308,514 B1 * 12/2007 Hewitt ................ G06F 13/4027 710/66
7,379,067 B2 5/2008 Deering et al.
7,380,108 B1 5/2008 Uht et al.
7,486,678 B1 2/2009 Devanagondi et al.
7,509,484 B1 3/2009 Golla et al.
7,546,331 B2 6/2009 Islam
7,630,324 B2 12/2009 Li et al.
7,647,435 B2 1/2010 Check et al.
7,660,911 B2 2/2010 McDaniel
7,724,740 B1 5/2010 Wang et al.
7,817,652 B1 10/2010 Macadam et al.
7,911,960 B1 3/2011 Aydemir et al.
7,936,753 B1 5/2011 Colloff et al.
7,987,479 B1 7/2011 Day
8,001,510 B1 8/2011 Miller et al.
8,010,766 B2 8/2011 Bhattacharjee et al.
8,051,227 B1 11/2011 Gewirtz et al.
8,055,880 B2 11/2011 Fujisawa et al.
8,115,659 B2 2/2012 Hurley et al.
8,156,284 B2 4/2012 Vorbach et al.
8,160,975 B2 4/2012 Tang et al.
8,225,073 B2 7/2012 Master et al.
8,332,597 B1 12/2012 Bennett
8,356,162 B2 1/2013 Muff et al.
8,495,341 B2 7/2013 Busaba et al.
8,561,194 B2 10/2013 Lee
8,578,117 B2 11/2013 Burda et al.
8,619,800 B1 12/2013 Finney et al.
8,806,248 B2 8/2014 Allarey et al.
8,812,820 B2 8/2014 Vorbach et al.
8,924,596 B1 12/2014 Beeson et al.
8,935,515 B2 1/2015 Colavin et al.
8,966,457 B2 2/2015 Ebcioglu et al.
8,990,452 B2 3/2015 Branson et al.
8,996,906 B1 3/2015 Townley et al.
9,009,712 B2 4/2015 Schmit et al.
9,026,705 B2 5/2015 Feehrer et al.
9,026,769 B1 5/2015 Jamil et al.
9,052,890 B2 6/2015 Phillips et al.
9,104,474 B2 8/2015 Kaul et al.
9,110,846 B2 8/2015 Buchheit et al.
9,135,051 B2 9/2015 Chaplik et al.
9,135,057 B2 9/2015 Branson et al.
9,170,846 B2 10/2015 Delling et al.
9,213,571 B2 12/2015 Ristovski et al.
9,268,528 B2 2/2016 Tannenbaum et al.
9,268,704 B2 2/2016 Fleischer et al.
9,285,860 B2 3/2016 Hofmann
9,429,983 B1 8/2016 Chall et al.
9,473,144 B1 10/2016 Thiagarajan et al.
9,520,876 B1 12/2016 Chadwick et al.
9,594,521 B2 3/2017 Blagodurov et al.
9,658,676 B1 5/2017 Witek et al.
9,696,928 B2 7/2017 Cain et al.
9,753,658 B2 9/2017 Beeson et al.
9,760,291 B2 9/2017 Beale et al.
9,762,563 B2 9/2017 Davis et al.
9,847,783 B1 12/2017 Teh et al.
9,886,072 B1 2/2018 Venkataraman
9,923,905 B2 3/2018 Amiri et al.
9,946,718 B2 4/2018 Bowman et al.
10,108,417 B2 10/2018 Krishna et al.
10,187,467 B2 1/2019 Nagai
10,331,583 B2 6/2019 Ahsan et al.
10,467,183 B2 11/2019 Fleming et al.
2001/0001325 A1 5/2001 Fujimoto et al.
2002/0026493 A1 2/2002 Scardamalia et al.
2002/0090751 A1 7/2002 Srigg et al.
2002/0103943 A1 8/2002 Lo et al.
2002/0178285 A1 11/2002 Donaldson et al.
2002/0184291 A1 12/2002 Hogenauer
2003/0023830 A1 1/2003 Hogenauer
2003/0028750 A1 2/2003 Hogenauer
2003/0120802 A1 6/2003 Kohno
2003/0126233 A1 7/2003 Bryers et al.
2003/0163649 A1 8/2003 Kapur et al.
2003/0177320 A1 9/2003 Sah et al.
2003/0212726 A1 11/2003 Luick
2003/0225814 A1 12/2003 Saito et al.
2003/0233643 A1 12/2003 Thompson et al.
2004/0001458 A1 1/2004 Dorenbosch et al.
2004/0017807 A1 * 1/2004 Dorr ..................... H04L 49/254 709/209
2004/0017820 A1 1/2004 Garinger et al.
2004/0022094 A1 2/2004 Radhakrishnan et al.

(56) References Cited

U.S. PATENT DOCUMENTS

2004/0022107 A1 2/2004 Zaidi et al.
2004/0030859 A1 2/2004 Doerr et al.
2004/0044877 A1 3/2004 Myers
2004/0054818 A1 3/2004 Kirsch
2004/0103230 A1* 5/2004 Emerson ............ G06F 15/8007 710/110
2004/0124877 A1 7/2004 Parkes
2004/0128401 A1 7/2004 Fallon et al.
2004/0230849 A1 11/2004 Dhong et al.
2004/0263524 A1 12/2004 Lippincott
2005/0025120 A1 2/2005 O'Toole et al.
2005/0076187 A1 4/2005 Claydon
2005/0108776 A1 5/2005 Carver et al.
2005/0134308 A1 6/2005 Okada et al.
2005/0138323 A1 6/2005 Snyder
2005/0166038 A1 7/2005 Wang et al.
2005/0172103 A1 8/2005 Inuo et al.
2005/0223131 A1 10/2005 Goekjian et al.
2006/0026359 A1 2/2006 Ross et al.
2006/0041872 A1 2/2006 Poznanovic et al.
2006/0101237 A1 5/2006 Mohl et al.
2006/0130030 A1 6/2006 Kwiat et al.
2006/0179255 A1 8/2006 Yamazaki
2006/0179429 A1 8/2006 Eggers et al.
2006/0200647 A1 9/2006 Cohen
2006/0221931 A1 10/2006 Apostol et al.
2006/0236008 A1 10/2006 Asano et al.
2007/0011436 A1 1/2007 Bittner, Jr.
2007/0033369 A1 2/2007 Kasama et al.
2007/0074014 A1 3/2007 Musoll et al.
2007/0079036 A1 4/2007 Mukherjee
2007/0118332 A1 5/2007 Meyers et al.
2007/0143546 A1 6/2007 Narad
2007/0180315 A1 8/2007 Aizawa
2007/0203967 A1 8/2007 Dockser
2007/0204137 A1 8/2007 Tran
2007/0226458 A1 9/2007 Stuttard et al.
2007/0256038 A1 11/2007 Manohar
2007/0266223 A1 11/2007 Nguyen
2007/0276976 A1 11/2007 Gower et al.
2007/0299980 A1 12/2007 Amini et al.
2008/0005392 A1 1/2008 Amini et al.
2008/0072113 A1 3/2008 Tsang et al.
2008/0082794 A1 4/2008 Yu et al.
2008/0133889 A1 6/2008 Glew
2008/0133895 A1 6/2008 Sivtsov et al.
2008/0155135 A1 6/2008 Garg et al.
2008/0184255 A1 7/2008 Watanabe et al.
2008/0218203 A1 9/2008 Arriens et al.
2008/0263330 A1 10/2008 May et al.
2008/0270689 A1 10/2008 Gotoh
2008/0307258 A1 12/2008 Challenger et al.
2009/0013329 A1 1/2009 May et al.
2009/0037697 A1 2/2009 Ramani et al.
2009/0055624 A1* 2/2009 Kirsch ............. G06F 15/17337 712/E9.003
2009/0063665 A1 3/2009 Bagepalli et al.
2009/0113169 A1 4/2009 Yang et al.
2009/0119456 A1 5/2009 Park et al.
2009/0133023 A1 5/2009 Li et al.
2009/0144522 A1 6/2009 Vorbach et al.
2009/0175444 A1 7/2009 Douglis et al.
2009/0182993 A1 7/2009 Fant
2009/0222252 A1 9/2009 Chen et al.
2009/0228682 A1 9/2009 Mejdrich et al.
2009/0300324 A1 12/2009 Inuo
2009/0300325 A1 12/2009 Paver et al.
2009/0300388 A1 12/2009 Mantor et al.
2009/0309884 A1 12/2009 Lippincott et al.
2009/0328048 A1 12/2009 Khan et al.
2010/0017761 A1 1/2010 Higuchi et al.
2010/0115168 A1 5/2010 Bekooij
2010/0180105 A1 7/2010 Asnaashari
2010/0191911 A1* 7/2010 Heddes .................. G06F 15/16 711/E12.091
2010/0217915 A1 8/2010 O'Connor et al.
2010/0228885 A1 9/2010 McDaniel
2010/0228925 A1 9/2010 Doerr et al.
2010/0235416 A1 9/2010 Oliver
2010/0254262 A1 10/2010 Kantawala et al.
2010/0262721 A1 10/2010 Asnaashari et al.
2010/0302946 A1 12/2010 Yang et al.
2011/0004742 A1 1/2011 Hassan
2011/0008300 A1 1/2011 Wouters et al.
2011/0040822 A1 2/2011 Eichenberger et al.
2011/0083000 A1 4/2011 Rhoades et al.
2011/0099295 A1 4/2011 Wegener
2011/0107337 A1 5/2011 Cambonie
2011/0133825 A1 6/2011 Jones et al.
2011/0202747 A1 8/2011 Busaba et al.
2011/0216861 A1 9/2011 Melzer et al.
2011/0292708 A1 12/2011 Kang et al.
2011/0302358 A1 12/2011 Yu et al.
2011/0314238 A1 12/2011 Finkler et al.
2011/0320724 A1 12/2011 Mejdrich et al.
2012/0017066 A1 1/2012 Vorbach et al.
2012/0054255 A1 3/2012 Buxbaum et al.
2012/0066483 A1 3/2012 Boury et al.
2012/0079168 A1 3/2012 Chou et al.
2012/0089812 A1 4/2012 Smith
2012/0124117 A1 5/2012 Yu et al.
2012/0126850 A1 5/2012 Wasson et al.
2012/0126851 A1 5/2012 Kelem et al.
2012/0128107 A1 5/2012 Oren
2012/0131288 A1 5/2012 Box et al.
2012/0144126 A1 6/2012 Nimmala et al.
2012/0174118 A1 7/2012 Watanabe et al.
2012/0239853 A1 9/2012 Moshayedi
2012/0260239 A1 10/2012 Martinez et al.
2012/0278543 A1 11/2012 Yu et al.
2012/0278587 A1 11/2012 Caufield et al.
2012/0303932 A1 11/2012 Farabet et al.
2012/0303933 A1 11/2012 Manet et al.
2012/0317388 A1 12/2012 Driever et al.
2012/0324180 A1 12/2012 Asnaashari et al.
2012/0330701 A1 12/2012 Hyder et al.
2013/0021058 A1 1/2013 Huang et al.
2013/0024875 A1 1/2013 Wang et al.
2013/0036287 A1 2/2013 Chu et al.
2013/0067138 A1 3/2013 Schuette et al.
2013/0067203 A1 3/2013 Chung et al.
2013/0070588 A1 3/2013 Steele et al.
2013/0080652 A1 3/2013 Cradick et al.
2013/0080993 A1 3/2013 Stravers et al.
2013/0081042 A1 3/2013 Branson et al.
2013/0125127 A1 5/2013 Mital et al.
2013/0145203 A1 6/2013 Fawcett
2013/0147515 A1 6/2013 Wasson et al.
2013/0151919 A1 6/2013 Huynh
2013/0160028 A1 6/2013 Black
2013/0166879 A1 6/2013 Sun et al.
2013/0315211 A1 11/2013 Balan et al.
2014/0013083 A1 1/2014 Jha
2014/0032860 A1 1/2014 Yamada et al.
2014/0052955 A1 2/2014 Moll et al.
2014/0095891 A1 4/2014 Wolrich et al.
2014/0098890 A1 4/2014 Sermadevi et al.
2014/0115300 A1 4/2014 Bodine
2014/0143564 A1 5/2014 Tannenbaum et al.
2014/0188968 A1 7/2014 Kaul et al.
2014/0215189 A1 7/2014 Airaud et al.
2014/0281409 A1 9/2014 Abdallah et al.
2014/0351551 A1 11/2014 Doerr et al.
2014/0380024 A1 12/2014 Spadini et al.
2015/0007182 A1 1/2015 Rossbach et al.
2015/0026434 A1 1/2015 Basant et al.
2015/0033001 A1 1/2015 Ivanov
2015/0067305 A1 3/2015 Olson et al.
2015/0067368 A1 3/2015 Henry et al.
2015/0082011 A1 3/2015 Mellinger et al.
2015/0082075 A1 3/2015 Denman et al.
2015/0089162 A1 3/2015 Ahsan et al.
2015/0089186 A1 3/2015 Kim et al.
2015/0100757 A1 4/2015 Burger et al.

(56) References Cited

U.S. PATENT DOCUMENTS

| | | | |
|---|---|---|---|
| 2015/0106596 | A1 | 4/2015 | Morbach et al. |
| 2015/0113184 | A1 | 4/2015 | Stanford-Jason et al. |
| 2015/0188847 | A1 | 7/2015 | Chopra et al. |
| 2015/0199173 | A1 | 7/2015 | Lutz et al. |
| 2015/0220345 | A1 | 8/2015 | Corbal et al. |
| 2015/0261528 | A1 | 9/2015 | Ho et al. |
| 2015/0268963 | A1 | 9/2015 | Etsion et al. |
| 2015/0278097 | A1 | 10/2015 | Kelm et al. |
| 2015/0317134 | A1 | 11/2015 | Kim et al. |
| 2015/0378731 | A1 | 12/2015 | Lai et al. |
| 2015/0379670 | A1 | 12/2015 | Koker et al. |
| 2016/0077568 | A1 | 3/2016 | Kandula et al. |
| 2016/0098279 | A1 | 4/2016 | Glew |
| 2016/0098420 | A1 | 4/2016 | Dickie et al. |
| 2016/0239265 | A1 | 8/2016 | Duong et al. |
| 2016/0364364 | A1* | 12/2016 | Fleischer ............ G06F 13/4282 |
| 2016/0381431 | A1 | 12/2016 | Patterson et al. |
| 2017/0013495 | A1 | 1/2017 | Chae et al. |
| 2017/0031866 | A1 | 2/2017 | Nowatzki et al. |
| 2017/0062075 | A1 | 3/2017 | Barber et al. |
| 2017/0083313 | A1 | 3/2017 | Sankaralingam et al. |
| 2017/0092371 | A1 | 3/2017 | Harari |
| 2017/0116154 | A1 | 4/2017 | Palmer et al. |
| 2017/0163543 | A1 | 6/2017 | Wang et al. |
| 2017/0185655 | A1 | 6/2017 | Jahankhani et al. |
| 2017/0242700 | A1 | 8/2017 | Hughes et al. |
| 2017/0255414 | A1 | 9/2017 | Gerhart et al. |
| 2017/0262383 | A1 | 9/2017 | Lee et al. |
| 2017/0286169 | A1 | 10/2017 | Ravindran et al. |
| 2017/0293766 | A1 | 10/2017 | Schnjakin et al. |
| 2017/0295149 | A1 | 10/2017 | Lu et al. |
| 2017/0315815 | A1 | 11/2017 | Smith et al. |
| 2017/0315978 | A1 | 11/2017 | Boucher et al. |
| 2017/0325124 | A1 | 11/2017 | Mitra et al. |
| 2017/0371836 | A1 | 12/2017 | Langhammer |
| 2018/0081806 | A1 | 3/2018 | Kothinti et al. |
| 2018/0081834 | A1 | 3/2018 | Wang et al. |
| 2018/0088647 | A1 | 3/2018 | Suryanarayanan et al. |
| 2018/0095728 | A1 | 4/2018 | Hasenplaugh et al. |
| 2018/0101502 | A1 | 4/2018 | Nassif et al. |
| 2018/0113797 | A1 | 4/2018 | Breslow et al. |
| 2018/0188983 | A1 | 7/2018 | Fleming et al. |
| 2018/0188997 | A1 | 7/2018 | Fleming et al. |
| 2018/0189063 | A1 | 7/2018 | Fleming et al. |
| 2018/0189231 | A1 | 7/2018 | Fleming et al. |
| 2018/0189239 | A1 | 7/2018 | Nurvitadhi et al. |
| 2018/0189675 | A1 | 7/2018 | Nurvitadhi et al. |
| 2018/0210730 | A1 | 7/2018 | Sankaralingam et al. |
| 2018/0218767 | A1 | 8/2018 | Wolff |
| 2018/0225403 | A1 | 8/2018 | Nicol et al. |
| 2018/0248994 | A1 | 8/2018 | Lee et al. |
| 2018/0285385 | A1 | 10/2018 | West et al. |
| 2018/0293162 | A1 | 10/2018 | Tsai et al. |
| 2018/0300181 | A1 | 10/2018 | Hetzel et al. |
| 2018/0316760 | A1 | 11/2018 | Chernin et al. |
| 2018/0332342 | A1 | 11/2018 | Wu et al. |
| 2018/0365181 | A1 | 12/2018 | Cottam et al. |
| 2018/0373509 | A1 | 12/2018 | Zhang et al. |
| 2019/0004878 | A1 | 1/2019 | Adler et al. |
| 2019/0004945 | A1 | 1/2019 | Fleming et al. |
| 2019/0004955 | A1 | 1/2019 | Adler et al. |
| 2019/0004994 | A1 | 1/2019 | Fleming et al. |
| 2019/0005161 | A1 | 1/2019 | Fleming et al. |
| 2019/0007332 | A1 | 1/2019 | Fleming et al. |
| 2019/0018815 | A1 | 1/2019 | Fleming et al. |
| 2019/0026237 | A1 | 1/2019 | Bannon et al. |
| 2019/0042217 | A1 | 2/2019 | Glossop et al. |
| 2019/0042218 | A1 | 2/2019 | Zhang |
| 2019/0042513 | A1 | 2/2019 | Fleming et al. |
| 2019/0089354 | A1 | 3/2019 | Venugopal et al. |
| 2019/0095369 | A1 | 3/2019 | Fleming et al. |
| 2019/0095383 | A1 | 3/2019 | Fleming et al. |
| 2019/0101952 | A1 | 4/2019 | Diamond et al. |
| 2019/0102179 | A1 | 4/2019 | Fleming et al. |
| 2019/0102338 | A1 | 4/2019 | Tang et al. |
| 2019/0129720 | A1 | 5/2019 | Ivanov |
| 2019/0205263 | A1 | 7/2019 | Fleming et al. |
| 2019/0205269 | A1 | 7/2019 | Fleming et al. |
| 2019/0205284 | A1 | 7/2019 | Fleming et al. |
| 2019/0258919 | A1 | 8/2019 | Lie et al. |
| 2019/0286987 | A1 | 9/2019 | Lie et al. |
| 2019/0303153 | A1 | 10/2019 | Halpern et al. |
| 2019/0303168 | A1 | 10/2019 | Fleming et al. |
| 2019/0303263 | A1 | 10/2019 | Fleming et al. |
| 2019/0303297 | A1 | 10/2019 | Fleming et al. |
| 2019/0303312 | A1 | 10/2019 | Ahsan et al. |
| 2019/0377688 | A1 | 12/2019 | Basu et al. |

FOREIGN PATENT DOCUMENTS

| | | | |
|---|---|---|---|
| CN | 102203752 | A | 9/2011 |
| CN | 102349049 | A | 2/2012 |
| CN | 103765400 | A | 4/2014 |
| CN | 104468302 | A | 3/2015 |
| CN | 104539430 | A | 4/2015 |
| CN | 104641346 | A | 5/2015 |
| CN | 104778028 | A | 7/2015 |
| CN | 104937539 | A | 9/2015 |
| DE | 102018005181 | A1 | 1/2019 |
| EP | 0410777 | A2 | 1/1991 |
| EP | 2317446 | A1 | 5/2011 |
| EP | 2660716 | A1 | 11/2013 |
| EP | 2854026 | A1 | 4/2015 |
| EP | 3005139 | A1 | 4/2016 |
| RU | 2374684 | C1 | 11/2009 |
| WO | 89/01203 | A1 | 2/1989 |
| WO | 2003/100602 | A2 | 12/2003 |
| WO | 2007/031696 | A1 | 3/2007 |
| WO | 2012/138957 | A1 | 10/2012 |
| WO | 2014/035449 | A1 | 3/2014 |
| WO | 2014/193878 | A1 | 12/2014 |
| WO | 2015/044696 | A2 | 4/2015 |
| WO | 2015/196343 | A1 | 12/2015 |

OTHER PUBLICATIONS

Advisory Action from U.S. Appl. No. 14/037,468, dated Aug. 11, 2017, 3 pages.

Amdahl, Gene M., "Validity of the Single Processor Approach to Achieving Large Scale Computing Capabilities", AFIPS Spring Joint Computer Conference, 1967, pp. 1-4.

Applicant Initiated Interview Summary, U.S. Appl. No. 15/721,816, dated Mar. 10, 2020, 3 pages.

Arvind., et al., "Executing a Program on the MIT Tagged-Token Dataflow Architecture", Mar. 1990, IEEE Transactions on Computers, vol. 39 (3), pp. 300-318.

Asanovic K, et al., "The Landscape of Parallel Computing Research: A View from Berkeley," Dec. 18, 2006, Electrical Engineering and Computer Sciences University of California at Berkeley, Technical Report No. UCB/EECS-2006-183, http://www.eecs.berkeley.edu/Pubs/TechRpts/2006/EECS-2006-183.html, 56 pages.

Ball T., "What's in a Region? or Computing Control Dependence Regions in Near-Linear Time for Reducible Control Flow," Dec. 1993, ACM Letters on Programming Languages and Systems, 2(1-4):1-16, 24 pages.

Benchmarking DNN Processors, Nov. 2016, 2 pages.

Bluespec, "Bluespec System Verilog Reference Guide," Jun. 16, 2010, Bluespec, Inc, 453 pages.

Bohm I., "Configurable Flow Accelerators," Mar. 3, 2016, XP055475839. retrieved from http://groups.inf.ed.ac.uk/pasta/rareas_cfa.html on Oct. 25, 2018, 3 pages.

Brodman et al., "Writing Scalable SIMD Programs with ISPC", Proceedings of the 2014 Workshop on Programming models for SIMD/Vector Processing, Feb. 2014, pp. 25-32.

Budiu et al., "Spatial Computation", ASPLOS'04, Oct. 7-13, 2004, pp. 1-13.

Burger D., et al., "Scaling to the End of Silicon with EDGE Architectures," Jul. 12, 2004, vol. 37 (7), pp. 44-55.

Burkowski, F. J., "Instruction Set Design Issues Relating to a Static Dataflow Computer", ACM Sigarch Computer Architecture News, vol. 10, No. 3, Apr. 1982, pp. 101-111.

(56) References Cited

OTHER PUBLICATIONS

Canis A., et al., "LegUp: An Open-Source High-Level Synthesis Tool for FPGA-Based Processor/Accelerator Systems," ACM Transactions on Embedded Computing Systems, vol. 1(1), Article 1, Jul. 2012, 25 pages.
Carloni L. P., et al., "The Theory of Latency Insensitive Design," Sep. 2001, IEEE Transactions on Computer-Aided Design of Integrated Circuits and Systems, vol. 20 (9), 18 pages.
Chandy K. M., et al., "Parallel Program Design: A Foundation," Addison-Wesley Publishing Company, Aug. 1988, 552 pages.
Chen Y., et al., "Eyeriss v2: A Flexible and High-Performance Accelerator for Emerging Deep Neural Networks," Jul. 2018, 14 pages.
Chen Y., et al., "Eyeriss: A Spacial Architecture for Energy-Efficient Dataflow for Convolutional Neural Networks," Jun. 2016, 53 pages.
Chen Y., et al., "Eyeriss: An Energy-Efficient Reconfigurable Accelerator For Deep Convolutional Neural Networks," IEEE International Solid-State Circuits Conference, ISSCC 2016, Digest of Technical Papers, retrieved from eyeriss-isscc2016, spreadsheet, http://eyeriss.mit.edu/benchmarking.html, 2016, 7 pages.
Chen Y., et al., "Eyeriss: An Energy-Efficient Reconfigurable Accelerator for Deep Convolutional Neural Networks," IEEE Journal of Solid State Circuits (JSSC), ISSCC Special Issue, Jan. 2017, vol. 52 (1), pp. 127-138.
Chen Y., et al., "Understanding the Limitations of Existing Energy-Efficient Design Approaches for Deep Neural Networks", Feb. 2018, 3 pages.
Chen Y., et al., "Using Dataflow to Optimize Energy Efficiency of Deep Neural Network Accelerators," IEEE Micro's Top Picks from the Computer Architecture Conferences, May/Jun. 2017, pp. 12-21.
Clark et al., "Application-Specific Processing on a General-Purpose Core Via Transparent Instruction Set Customization", Proceedings of the37th International Symposium on Microarchitecture (Micro-37 2004), IEEE, 2004, 11 pages.
Clark et al., "VEAL: Virtualized Execution Accelerator for Loops", International Symposium on Computer Architecture, 2008, 12 pages.
Compton K., et al., "Reconfigurable Computing: A Survey of Systems and Software," ACM Computing Surveys, Jun. 2002, vol. 34 (2), pp. 171-210.
Cong J., et al., "Supporting Address Translation for Accelerator-Centric Architectures," Feb. 2017, IEEE International Symposium on High Performance Computer Architecture (HPCA), 12 pages.
Coral Collaboration: Oak Ridge, Argonne, Livermore, Benchmark codes, downloaded from https://asc.llnl.gov/CORAL-benchmarks/ on Nov. 16, 2018, 6 pages.
Corrected Notice of Allowability, U.S. Appl. No. 16/024,802, dated Nov. 5, 2020, 7 pages.
Corrected Notice of Allowability, U.S. Appl. No. 16/024,802, dated Oct. 1, 2020, 2 pages.
Corrected Notice of Allowability, U.S. Appl. No. 16/024,849, dated Oct. 19, 2020, 5 pages.
Corrected Notice of Allowability, U.S. Appl. No. 16/236,423, dated May 7, 2020, 2 pages.
Corrected Notice of Allowance from U.S. Appl. No. 14/037,468, dated Apr. 1, 2019, 10 pages.
Corrected Notice of Allowance from U.S. Appl. No. 14/037,468, dated May 29, 2019, 12 pages.
Corrected Notice of Allowance from U.S. Appl. No. 15/396,395, dated Jun. 7, 2019, 8 pages.
Corrected Notice of Allowance from U.S. Appl. No. 15/640,534, dated Apr. 26, 2019, 21 pages.
Corrected Notice of Allowance from U.S. Appl. No. 15/640,534, dated Jul. 2, 2019, 12 pages.
Corrected Notice of Allowance from U.S. Appl. No. 15/640,535, dated Feb. 13, 2019, 7 pages.
Corrected Notice of Allowance from U.S. Appl. No. 15/721,802, dated Dec. 18, 2018, 8 pages.
Corrected Notice of Allowance from U.S. Appl. No. 15/721,802, dated Jun. 12, 2019, 11 pages.
Corrected Notice of Allowance from U.S. Appl. No. 15/855,964, dated Jun. 25, 2019, 7 pages.
Dagum et al., "OpenMP: An Industry Standard API for Shared-Memory Programming", IEEE Computational Science and Engineering, Jan.-Mar. 1998, vol. 5, No. 1, pp. 46-55.
Dally W.J., et al., "Principles and Practices of Interconnection Networks," Morgan Kaufmann, 2003, 584 pages.
Davidson A., "The Intel(Registered) HyperFlex(Trademark) FPGA Architecture meets the Performance Requirements of Next-Generation Systems," White Paper, A New FPGA Architecture and Leading-Edge FinFET Process Technology Promise to Meet Next-Generation System Requirements, 6 pages.
Dennis et al., "A Preliminary Architecture for a Basic Data-Flow Processor", Proceedings of the 2nd annual symposium on Computer architecture, Jan. 1975, pp. 126-132.
Dijkstra E.W., "Guarded Commands, Nondeterminacy and Formal Derivation of Programs," Aug. 1975, Communications of the ACM, vol. 18 (8), pp. 453-457.
Eisenhardt S., et al., "Optimizing Partial Reconfiguration of Multi-Context Architectures," Dec. 2008, 2008 International Conference on Reconfigurable Computing and FPGAs, 6 pages.
Emer J., et al., "Asim: A Performance Model Framework", Feb. 2002, Computer, vol. 35 (2), pp. 68-76.
Emer J., et al., "Hardware Architectures for Deep Neural Networks at CICS/MTL Tutorial", Mar. 27, 2017, 258 pages.
Emer J., et al., "Hardware Architectures for Deep Neural Networks at ISCA Tutorial", Jun. 24, 2017, 290 pages.
Intel, "Intel(Registered) 64 and IA-32 Architectures Software Developer Manuals," Oct. 12, 2016, Updated—May 18, 2018, 19 pages.
Intel, "Intel(Registered) oneAPI Programming Guide", Jun. 28, 2021, 86 pages.
Intention to Grant, EP App. No. 20157809.3, dated Jun. 21, 2021, 7 pages.
International Preliminary Report on Patentability for Application No. PCT/RU2011/001049, dated Jul. 10, 2014, 6 pages.
International Preliminary Reporton Patentability, PCT App. No. PCT/US2017/050663, dated Apr. 11, 2019, 11 pages.
International Preliminary Reporton Patentability, PCT App. No. PCT/US2017/055849, dated Apr. 25, 2019, 6 pages.
International Preliminary Reporton Patentability, PCT App. No. PCT/US2019/019965, dated Oct. 15, 2020, 6 pages.
International Preliminary Reporton Patentability, PCT App. No. PCT/US2019/020243, dated Oct. 15, 2020, 7 pages.
International Preliminary Reporton Patentability, PCT App. No. PCT/US2019/020270, dated Oct. 15, 2020, 7 pages.
International Preliminary Reporton Patentability, PCT App. No. PCT/US2019/020287, dated Oct. 15, 2020, 6 pages.
International Preliminary Reporton Patentability, PCT App. No. PCT/US2019/034358, dated Jan. 14, 2021, 6 pages.
International Preliminary Report on Patentability, PCT App. No. PCT/US2019/034400, dated Jan. 14, 2021, 8 pages.
International Preliminary Report on Patentability, PCT App. No. PCT/US2019/034433, dated Jan. 14, 2021, 7 pages.
International Preliminary Report on Patentability, PCT App. No. PCT/US2019/034441, dated Jan. 14, 2021, 7 pages.
International Search Report and Written Opinion for Application No. PCT/RU2011/001049, dated Sep. 20, 2012, 6 pages.
International Search Report and Written Opinion for Application No. PCT/US2019/019965, dated Jun. 13, 2019, 9 pages.
International Search Report and Written Opinion for Application No. PCT/US2019/020243, dated Jun. 19, 2019, 11 pages.
International Search Report and Written Opinion for Application No. PCT/US2019/020270, dated Jun. 14, 2019, 11 pages.
International Search Report and Written Opinion for Application No. PCT/US2019/020287, dated Jun. 12, 2019, 9 pages.
International Search Report and Written Opinion, PCT App. No. PCT/US2017/050663, dated Dec. 28, 2017, 12 pages.
International Search Report and Written Opinion, PCT App. No. PCT/US2017/055849, dated Dec. 26, 2017, 8 pages.
International Search Report and Written Opinion, PCT App. No. PCT/US2019/034358, dated Sep. 18, 2019, 10 pages.
International Search Report and Written Opinion, PCT App. No. PCT/US2019/034400, dated Sep. 19, 2019, 11 pages.

(56) References Cited

OTHER PUBLICATIONS

International Search Report and Written Opinion, PCT App. No. PCT/US2019/034433, dated Sep. 20, 2019, 10 pages.
International Search Report and Written Opinion, PCT App. No. PCT/US2019/034441, dated Sep. 23, 2019, 10 pages.
Kalte H., et al., "Context Saving and Restoring for Multitasking in Reconfigurable Systems", International Conference on Field Programmable Logic and Applications, Aug. 2005, pp. 223-228.
Kim et al., "Energy-Efficient and High Performance CGRA-based Multi-Core Architecture," Journal of Semiconductor Technology and Science, vol. 14 (3), Jun. 2014, 16 pages.
King M., et al., "Automatic Generation of Hardware/Software Interfaces", Proceedings of the 17th International Conference on Architectural Support for Programming Languages and Operating Systems, ASPLOS'12, Mar. 2012, 12 pages.
Knuth D. E., et al., "Fast Pattern Matching In Strings," Jun. 1977, SIAM Journal of Computing, vol. 6(2), pp. 323-350.
Kumar et al., "Needle: Leveraging Program Analysis to Analyze and Extract Accelerators from Whole Programs", IEEE International Symposium on High Performance Computer Architecture (HPCA), IEEE, 2017, 12 pages.
Lee T., et al., "Hardware Context-Switch Methodology for Dynamically Partially Reconfigurable Systems," Journal of Information Science and Engineering, vol. 26, Jul. 2010, pp. 1289-1305.
Lengauer et al., "A Fast Algorithm for Finding Dominators in a Flowgraph", ACM Transactions on Programming Languages and Systems, vol. 1, No. 1, Jul. 1979, pp. 121-141.
Lewis D., et al., "The Stratix™ 10 Highly Pipelined FPGA Architecture," FPGA'16, ACM, Feb. 21-23, 2016, pp. 159-168.
Lis., etal., "Case Study: Computing Black-Scholes with Intel® Advanced Vector Extensions," Sep. 6, 2012, 20 pages.
Marquardt A., et al., "Speed and Area Trade-OFFS in Cluster-Based FPGA Architectures," Feb. 2000, IEEE Transactions on Very Large Scale Integration (VLSI) Systems, vol. 8 (1), 10 pages.
Matsen F.A., et al., "The CMU warp processor," In Supercomputers: Algorithms, Architectures, and Scientific Computation, 1986, pp. 235-247.
Mccalpin J.D., "Memory Bandwidth and Machine Balance in Current High Performance Computers," IEEE Computer Society Technical Committee on Computer Architecture (TCCA) Newsletter, Dec. 1995, 7 pages.
Mccalpin J.D., "Stream: Sustainable memory bandwidth in high performance computers," 2016, 4 pages.
Mei B. et al., "ADRES: An Architecture with Tightly Coupled VLIW Processor and Coarse-Grained Reconfigurable Matrix", 2003, In Proceedings of International Conference on Field-Programmable Logic and Applications, 10 pages.
Merrill D., et al., "Revisiting sorting for GPGPU stream architectures," In Proceedings of the 19th International Conference on Parallel Architectures and Compilation Techniques (PACT'10), Feb. 2010, 17 pages.
Mirsky E., at al., "Matrix: A Reconfigurable Computing Architecture with Configurable Instruction Distribution and Deployable Resources," 1996, In Proceedings of the IEEE Symposium on FPGAs for Custom Computing Machines, pp. 157-166.
Natalie E. J., et al., "On-Chip Networks," Synthesis Lectures on Computer Architecture, Morgan and Claypool Publishers, 2009, 148 pages.
Non-Final Office Action from U.S. Appl. No. 13/994,582, dated Feb. 7, 2018, 12 pages.
Non-Final Office Action from U.S. Appl. No. 13/994,582, dated Mar. 23, 2017, 9 pages.
Non-Final Office Action from U.S. Appl. No. 14/037,468, dated Aug. 27, 2015, 10 pages.
Non-Final Office Action from U.S. Appl. No. 14/037,468, dated Dec. 2, 2016, 16 pages.
Non-Final Office Action from U.S. Appl. No. 14/037,468, dated Oct. 19, 2017, 19 pages.
Non-Final Office Action from U.S. Appl. No. 15/283,295, dated Apr. 30, 2018, 18 pages.
Non-Final Office Action from U.S. Appl. No. 15/396,038, dated Oct. 5, 2018, 38 pages.
Non-Final Office Action from U.S. Appl. No. 15/396,049, dated Jun. 15, 2018, 33 pages.
Examination Report, DE App. No. 102018005172.3, dated Feb. 2, 2022, 20 pages (Original Document Only).
Notice of Allowance, U.S. Appl. No. 15/944,546, dated Mar. 28, 2022, 4 pages.
Notice of Allowance from U.S. Appl. No. 15/640,540, dated Jul. 1, 2019, 36 pages.
Notice of Allowance from U.S. Appl. No. 15/640,540, dated Mar. 14, 2019, 39 pages.
Notice of Allowance from U.S. Appl. No. 15/640,543, dated Jul. 29, 2019, 43 pages.
Notice of Allowance from U.S. Appl. No. 15/719,281, dated Jan. 24, 2019, 36 pages.
Notice of Allowance from U.S. Appl. No. 15/719,285, dated Jul. 23, 2019, 26 pages.
Notice of Allowance from U.S. Appl. No. 15/721,802, dated Jul. 31, 2018, 6 pages.
Notice of Allowance from U.S. Appl. No. 15/721,802, dated Mar. 18, 2019, 23 pages.
Notice of Allowance from U.S. Appl. No. 15/721,802, dated Nov. 30, 2018, 30 pages.
Notice of Allowance from U.S. Appl. No. 15/721,809, dated Jun. 6, 2019, 32 pages.
Notice of Allowance from U.S. Appl. No. 15/855,964, dated Apr. 24, 2019, 15 pages.
Notice of Allowance from U.S. Appl. No. 15/859,454, dated Jun. 7, 2019, 55 pages.
Notice of Allowance from U.S. Appl. No. 15/859,454, dated Sep. 12, 2019, 8 pages.
Notice of Allowance from U.S. Appl. No. 15/859,466, dated May 17, 2019, 56 pages.
Notice of Allowance from U.S. Appl. No. 15/944,761, dated Sep. 12, 2019, 75 pages.
Notice of Allowance from U.S. Appl. No. 16/024,801, dated Jun. 5, 2019, 64 pages.
Notice of Allowance, U.S. Appl. No. 16/458,032, dated Nov. 25, 2020, 9 pages.
Notice of Allowance, U.S. Appl. No. 15/396,038, dated Dec. 10, 2019, 2 pages.
Notice of Allowance, U.S. Appl. No. 15/396,038, dated Jan. 23, 2020, 2 pages.
Notice of Allowance, U.S. Appl. No. 15/396,038, dated Oct. 2, 2019, 9 pages.
Notice of Allowance, U.S. Appl. No. 15/396,049, dated Oct. 16, 2019, 2 pages.
Notice of Allowance, U.S. Appl. No. 15/396,395, dated Aug. 7, 2019, 12 pages.
Notice of Allowance, U.S. Appl. No. 15/396,402, dated Jan. 8, 2020, 2 pages.
Notice of Allowance, U.S. Appl. No. 15/396,402, dated Sep. 16, 2019, 15 pages.
Notice of Allowance, U.S. Appl. No. 15/640,535, dated Aug. 21, 2019, 13 pages.
Notice of Allowance, U.S. Appl. No. 15/640,538, dated Sep. 20, 2019 2 pages.
Notice of Allowance, U.S. Appl. No. 15/640,538, dated Sep. 5, 2019, 8 pages.
Notice of Allowance, U.S. Appl. No. 15/640,541, dated Aug. 13, 2019, 19 pages.
Notice of Allowance, U.S. Appl. No. 15/719,281, dated Apr. 21, 2020, 5 pages.
Notice of Allowance, U.S. Appl. No. 15/719,281, dated Apr. 26, 2021, 5 pages.
Notice of Allowance, U.S. Appl. No. 15/721,809, dated Sep. 5, 2019, 8 pages.
Notice of Allowance, U.S. Appl. No. 15/721,816, dated Nov. 19, 2020, 9 pages.
Notice of Allowance, U.S. Appl. No. 15/859,473, dated Sep. 24, 2019, 6 pages.

(56) References Cited

OTHER PUBLICATIONS

Notice of Allowance, U.S. Appl. No. 15/941,888, dated Dec. 18, 2020.
Notice of Allowance, U.S. Appl. No. 15/941,888, dated Sep. 8, 2020, 9 pages.
Notice of Allowance, U.S. Appl. No. 15/943,608, dated Oct. 16, 2020, 8 pages.
Notice of Allowance, U.S. Appl. No. 15/944,546, dated Dec. 21, 2021, 8 pages.
Notice of Allowance, U.S. Appl. No. 15/944,546, dated Mar. 2, 2022, 4 pages.
Notice of Allowance, U.S. Appl. No. 15/944,761, dated Jan. 8, 2020, 2 pages.
Notice of Allowance, U.S. Appl. No. 15/944,761, dated Nov. 1, 2019, 2 pages.
Notice of Allowance, U.S. Appl. No. 16/024,801, dated Sep. 12, 2019, 10 pages.
Notice of Allowance, U.S. Appl. No. 16/024,802, dated Aug. 28, 2020, 11 pages.
Notice of Allowance, U.S. Appl. No. 16/024,802, dated Dec. 9, 2020, 6 pages.
Notice of Allowance, U.S. Appl. No. 16/024,849, dated Jul. 7, 2020, 8 pages.
Notice of Allowance, U.S. Appl. No. 16/024,854, dated Aug. 6, 2021, 11 pages.
Notice of Allowance, U.S. Appl. No. 16/221,379, dated Oct. 28, 2020, 7 pages.
Notice of Allowance, U.S. Appl. No. 16/236,423, dated Feb. 6, 2020, 8 pages.
Notice of Allowance, U.S. Appl. No. 16/370,915, dated Jun. 11, 2020, 12 pages.
Notice of Allowance, U.S. Appl. No. 16/370,928, dated Apr. 24, 2020, 9 pages.
Notice of Allowance, U.S. Appl. No. 16/370,928, dated Aug. 11, 2020, 9 pages.
Notice of Allowance, U.S. Appl. No. 16/370,928, dated Jan. 11, 2021, 2 pages.
Non-Final Office Action from U.S. Appl. No. 15/396,395, dated Jul. 20, 2018, 18 pages.
Non-Final Office Action from U.S. Appl. No. 15/396,402, dated Nov. 1, 2018, 22 pages.
Non-Final Office Action from U.S. Appl. No. 15/640,533, dated Apr. 19, 2018, 8 pages.
Non-Final Office Action from U.S. Appl. No. 15/640,534, dated Apr. 26, 2018, 8 pages.
Non-Final Office Action from U.S. Appl. No. 15/640,535, dated May 15, 2018, 13 pages.
Non-Final Office Action from U.S. Appl. No. 15/640,540, dated Oct. 26, 2018, 8 pages.
Non-Final Office Action from U.S. Appl. No. 15/640,541, dated Apr. 12, 2019, 61 pages.
Non-Final Office Action from U.S. Appl. No. 15/640,542, dated Apr. 2, 2019, 59 pages.
Non-Final Office Action from U.S. Appl. No. 15/640,543, dated Jan. 2, 2019, 46 pages.
Non-Final Office Action from U.S. Appl. No. 15/719,285, dated Feb. 25, 2019, 47 pages.
Non-Final Office Action from U.S. Appl. No. 15/721,809, dated Jun. 14, 2018, 12 pages.
Non-Final Office Action from U.S. Appl. No. 15/855,964, dated Dec. 13, 2018, 13 pages.
Non-Final Office Action from U.S. Appl. No. 15/859,473, dated Oct. 15, 2018, 10 pages.
Non-Final Office Action, U.S. Appl. No. 15/640,542, dated Mar. 4, 2020, 26 pages.
Non-Final Office Action, U.S. Appl. No. 15/721,802, dated Mar. 8, 2018, 8 pages.
Non-Final Office Action, U.S. Appl. No. 15/721,816, dated Dec. 5, 2019, 20 pages.
Non-Final Office Action, U.S. Appl. No. 15/943,608, dated Mar. 12, 2020, 8 pages.
Non-Final Office Action, U.S. Appl. No. 15/944,546, dated Nov. 25, 2019, 22 pages.
Non-Final Office Action, U.S. Appl. No. 16/024,849, dated Nov. 29, 2019, 10 pages.
Non-Final Office Action, U.S. Appl. No. 16/024,854, dated Feb. 19, 2021, 11 pages.
Non-Final Office Action, U.S. Appl. No. 16/024,854, dated Jan. 13, 2020, 10 pages.
Non-Final Office Action, U.S. Appl. No. 16/221,379, dated Mar. 31, 2020, 9 pages.
Non-Final Office Action, U.S. Appl. No. 16/236,423, dated Aug. 21, 2019, 75 pages.
Non-Final Office Action, U.S. Appl. No. 16/443,717, dated Sep. 30, 2019, 8 pages.
Non-Final Office Action, U.S. Appl. No. 16/458,032, dated Jul. 24, 2020, 9 pages.
Notice of Allowability, U.S. Appl. No. 15/943,608, dated Nov. 24, 2020, 6 pages.
Notice of Allowability, U.S. Appl. No. 16/443,717, dated Nov. 5, 2020, 2 pages.
Notice of Allowability, U.S. Appl. No. 16/458,020, dated Nov. 12, 2020, 10 pages.
Notice of Allowance from U.S. Appl. No. 13/994,582, dated Aug. 7, 2018, 8 pages.
Notice of Allowance from U.S. Appl. No. 14/037,468, dated Aug. 28, 2018, 9 pages.
Notice of Allowance from U.S. Appl. No. 14/037,468, dated Mar. 7, 2019, 51 pages.
Notice of Allowance from U.S. Appl. No. 15/283,295, dated Apr. 10, 2019, 49 pages.
Notice of Allowance from U.S. Appl. No. 15/283,295, dated Jan. 3, 2019, 7 pages.
Notice of Allowance from U.S. Appl. No. 15/396,049, dated Jul. 2, 2019, 70 pages.
Notice of Allowance from U.S. Appl. No. 15/396,395, dated Dec. 28, 2018, 36 pages.
Notice of Allowance from U.S. Appl. No. 15/396,395, dated May 15, 2019, 23 pages.
Notice of Allowance from U.S. Appl. No. 15/640,533, dated Feb. 14, 2019, 43 pages.
Notice of Allowance from U.S. Appl. No. 15/640,533, dated May 22, 2019, 19 pages.
Notice of Allowance from U.S. Appl. No. 15/640,533, dated Oct. 10, 2018, 8 pages.
Notice of Allowance from U.S. Appl. No. 15/640,533, dated Sep. 12, 2019, 16 pages.
Notice of Allowance from U.S. Appl. No. 15/640,534, dated Apr. 2, 2019, 9 pages.
Notice of Allowance from U.S. Appl. No. 15/640,534, dated Jan. 4, 2019, 37 pages.
Notice of Allowance from U.S. Appl. No. 15/640,534, dated May 31, 2019, 9 pages.
Notice of Allowance from U.S. Appl. No. 15/640,534, dated Sep. 12, 2018, 7 pages.
Notice of Allowance from U.S. Appl. No. 15/640,535, dated Feb. 6, 2019, 38 pages.
Notice of Allowance from U.S. Appl. No. 15/640,535, dated Jun. 21, 2019, 8 pages.
Notice of Allowance from U.S. Appl. No. 15/640,535, dated May 24, 2019, 19 pages.
Notice of Allowance from U.S. Appl. No. 15/640,535, dated Oct. 9, 2018, 7 pages.
Notice of Allowance from U.S. Appl. No. 15/640,538, dated Jul. 3, 2019, 76 pages.
Notice of Allowance from U.S. Appl. No. 15/640,538, dated Oct. 17, 2018, 10 pages.
Notice of Allowance, U.S. Appl. No. 16/443,717, dated Jul. 8, 2020, 7 pages.

(56) References Cited

OTHER PUBLICATIONS

Nowatzki et al., "Exploring the Potential of Heterogeneous Von Neumann/Dataflow Execution Models", 42nd Annual International Symposium on Computer Architecture (ISCA), Jun. 13-17, 2015, 13 pages.
Nvidia, "CUDA C++ Programming Guide", Design Guide, PG-02829-001_v11.2, Jun. 2021, 375 pages.
Office Action, DE App. No. 102018005181.2, dated Jan. 31, 2022, 19 pages (Original Document Only).
Office Action, EP App. No. 17857177.4, dated May 11, 2021, 07 pages.
Panesar G., et al., "Deterministic Parallel Processing," International Journal of Parallel Programming, Aug. 2006, vol. 34 (4), pp. 323-341.
Parashar A., et al., "Efficient Spatial Processing Element Control via Triggered Instructions," IEEE Micro, vol. 34 (3), Mar. 10, 2014, pp. 120-137.
Parashar et al., "Leap: A Virtual Platform Architecture for FPGAs," Intel Corporation, 6 pages, 2010.
Pellauer M., et al., "Efficient Control and Communication Paradigms for Coarse-Grained Spatial Architectures," Sep. 2015, ACM Transactions on Computer Systems, vol. 33 (3), Article 10, 32 pages.
Pellauer M., et al., "Soft Connections: Addressing the Hardware-Design Modularity Problem," 2009, In Proceedings of the 46th ACM/IEEE Design Automation Conference (DAC'09), pp. 276-281.
Raaijmakers S., "Run-Time Partial Reconfiguration on the Virtex-11 Pro," 2007, 69 pages.
Requirement for Restriction/Election, U.S. Appl. No. 16/024,802, dated Mar. 19, 2020, 8 pages.
Schauser et al., "Compiler-Controlled Multithreading for Lenient Parallel Languages", Aug. 1991, pp. 1-21.
Schmit H., et al., "PipeRench: A Virtualized Programmable Datapath in 0.18 Micron Technology," 2002, IEEE 2002 Custom Integrated Circuits Conference, pp. 63-66.
Seznec et al., "A Case for (partially) TAgged GEometric History Length Branch Prediction", Computer Science, J. Instr. Level Parallelism, 2006, pp. 1-23.
Sharifian et al., "Chainsaw: Von-Neumann Accelerators to Leverage Fused Instruction Chains", 49th Annual IEEE/ACM International Symposium on Microarchitecture (MICRO), 2016, 14 pages.
Shin T., et al., "Minimizing Buffer Requirements for Throughput Constrained Parallel Execution of Synchronous Dataflow Graph," ASPDAC '11 Proceedings of the 16th Asia and South Pacific Design Automation Conference , Jan. 2011, 6 pages.
Smith A., et al., "Compiling for EDGE Architectures," Appears in the Proceedings of the 4th International Symposium Jn code Generation and Optimization, 2006, 11 pages.
Smith A., et al., "Dataflow Predication," 2006, In Proceedings of the 39th Annual IEEE/ACM International Symposium on Microarchitecture, 12 pages.
Srinath et al., "Architectural Specialization for Inter-Iteration Loop Dependence Patterns", 47th Annual IEEE/ACM International Symposium on Microarchitecture, (MICRO-47), Dec. 2014, 13 pages.
Suleiman A., et al., "Towards Closing the Energy Gap Between HOG and CNN Features for Embedded Vision," IEEE International Symposium of Circuits and Systems (ISCAS), May 2017, 4 pages.
Supplemental Notice of Allowability, U.S. Appl. No. 15/721,816, dated Feb. 17, 2021, 2 pages.
Supplemental Notice of Allowability, U.S. Appl. No. 16/370,915, dated Sep. 23, 2020, 4 pages.
Supplementary European Search Report and Search Opinion, EP App. No. 19776406.1, dated Nov. 26, 2021, 10 pages.
Swanson et al., "WaveScalar", Appears in the 36th International Symposium on Microarchitecture, (MICRO-36 2003), Dec. 3, 2003, pp. 1-12.
Swanson S., et al., "The WaveScalar Architecture," May 2007, ACM Transactions on Computer Systems, vol. 25 (2), Article No. 4, 35 pages.
Sze V. et al., "Efficient Processing of Deep Neural Networks: A Tutorial and Survey," arxiv.org, Cornell University Library, Mar. 27, 2017, pp. 1-31.
Sze V., "Designing Efficient Deep Learning Systems," in Mountain View, CA, Mar. 27-28, 2019, retrieved from https://professional.mit.edu/programs/short-programs/designing-efficienl-deep-learning-systems-OC on Feb. 14, 2019, 2 pages.
Sze V., et al., "Efficient Processing of Deep Neural Networks: A Tutorial and Survey," Proceedings of the IEEE, Dec. 2017, vol. 105 (12), pp. 2295-2329.
Sze V., et al., "Hardware for Machine Learning: Challenges and Opportunities,"IEEE Custom Integrated Circuits Conference (CICC), Oct. 2017, 9 pages.
Taylor M.B., et al., "The Raw Microprocessor: A Computational Fabric for Sollware Circuits and General-Purpose Programs," 2002, IEEE Micro, vol. 22 (2), pp. 25-35.
The LLVM Compiler Infrastructure, retrieved from http://www.llvm.org/, on May 1, 2018, maintained by the llvm-admin team, 4 pages.
Truong D.N., et al., "A 167-Processor Computational Platform in 65 nm CMOS," IEEE Journal of Solid-State Circuits, Apr. 2009, vol. 44 (4), pp. 1130-1144.
Tutorial at Micro-50, The 50th Annual IEEE/ACM International Symposium on Microarchitecture, Oct. 14-18, 2017, retrieved from https://www.microarch.org/micro50/ on Feb. 14, 2019, 3 pages.
Tutorial on Hardware Architectures for Deep Neural Networks at ISCA 2017, The 44th International Symposium on Computer Architecture, Jun. 24-28, 2017, retrieved from http://isca17.ece.utoronto.ca/doku.php on Feb. 14, 2019, 2 pages.
Van De Geijn R.A., et al., "SUMMA: Scalable Universal Matrix Multiplication Algorithm," 1997, 19 pages.
Veen, Arthur H., "Dataflow Machine Architecture", ACM Computing Surveys, vol. 18, No. 4, Dec. 1986, pp. 365-396.
Vijayaraghavan M., et al., "Bounded Dataflow Networks and Latency-Insensitive Circuits," In Proceedings of the 7th IEEE/ACM International Conference on Formal Methods and Models for Codesign (Memocode'09), Jul. 13-15, 2009, pp. 171-180.
Wall, David W., "Limits of Instruction-Level Parallelism", ACM SIGOPS Operating Systems Review, vol. 25, Apr. 1991 pp. 176-188.
Wikipedia, "TRIPS Architecture," retrieved from https://en.wikipedia.org/wiki/TRIPS_architecture on Oct. 14, 2018, 4 pages.
Wikipedia, The Free Encyclopedia, "Priority encoder," https://en.wikipedia.org/w/index.php?Title=Priority_encoder&oldid=746908667, revised Oct. 30, 2016, 2 pages.
Wikipedia, The Free Encyclopedia, "Truth table," Logical Implication Table, https://enwikipedia.org/wiki/Truth_table#Logical_implication, revised Nov. 18, 2016, 9 pages.
Williston, Roving Reporter, Intel® Embedded Alliance, "Roving Reporter: FPGA + Intel® Atom TM = Configurable Processor," Dec. 2010, 5 pages.
Yang T., et al., "A Method to Estimate the Energy Consumption of Deep Neural Networks," Asilomar Conference on Signals, Systems and Computers, Oct. 2017, 5 pages.
Yang T., et al., "Deep Neural Network Energy Estimation Tool", IEEE Conference on Computer Vision and Pattern Recognition CVPR 2017, Jul. 21-26, 2017, retrieved from https://energyestimation.mit.edu/ on Feb. 21, 2019, 4 pages.
Yang T., et al., "Designing Energy-Efficient Convolutional Neural Networks using Energy-Aware Pruning," IEEE CVPR, Mar. 2017, 6 pages.
Yang T., et al., "NetAdapt: Platform-Aware Neural Network Adaptation for Mobile Applications," European Conference on Computer Vision (ECCV), Version 1, Apr. 9, 2018, 16 pages.
Yang T., et al., "NetAdapt: Platform-Aware Neural Network Adaptation for Mobile Applications," European Conference on Computer Vision (ECCV), Version 2, Sep. 28, 2018, 16 pages.
Ye Z.A., et al., "Chimaera: A High-Performance Architecture with a Tightly-Coupled Reconfigurable Functional Unit," Proceedings of the 27th International Symposium on Computer Architecture (ISCA'00), 2000, 11 pages.

(56) References Cited

OTHER PUBLICATIONS

Yu Z., et al., "An Asynchronous Array of Simple Processors for DSP Applications," IEEE International Solid-State Circuits Conference, ISSCC'06, Feb. 8, 2006, 10 pages.
Emer J., et al., "Hardware Architectures for Deep Neural Networks at MICR0-49 Tutorial," Oct. 16, 2016, 300 pages.
Emer J., et al., "Tutorial on Hardware Architectures for Deep Neural Networks", Nov. 2016, 8 pages.
Emer J.S., et al., "A Characterization of Processor Performance in the VAX-11/780," In Proceedings of the 11th Annual International Symposium on Computer Architecture, Jun. 1984, vol. 12 (3), pp. 274-283.
European Search Report and Search Opinion, EP App. No 19781074.0, dated Dec. 13, 2021, 8 pages.
European Search Report and Search Opinion, EP App. No 19781298.5, dated Dec. 13, 2021, 11 pages.
European Search Report and Search Opinion, EP App. No 20157807.7, dated Aug. 25, 2020, 6 pages.
European Search Report and Search Opinion, EP App. No. 20157809.3, dated Sep. 17, 2020, 7 pages.
European Search Report and Search Opinion, EP App. No. 20163890.5, dated Nov. 25, 2020, 10 pages.
European Search Report and Search Opinion, EP App. No. 20164075.2, dated Sep. 14, 2020, 6 pages.
Ex Parte Quayle Action, U.S. Appl. No. 15/944,546, dated Jul. 12, 2021, 12 pages.
Examiner initialed interview summary, U.S. Appl. No. 16/024,802, dated Mar. 19, 2020, 1 page.
Extended European Search Report and Search Opinion, EP App. No. 17857177.4, dated Mar. 30, 2020, 7 pages.
Extended European Search Report for Application No. 17207172.2, dated Oct. 1, 2018, 14 pages.
Extended European Search Report for Application No. 17210484.6, dated May 29, 2018, 8 pages.
Final Office Action from U.S. Appl. No. 13/994,582, dated Oct. 3, 2017, 11 pages.
Final Office Action from U.S. Appl. No. 14/037,468, dated Jun. 1, 2017, 18 pages.
Final Office Action from U.S. Appl. No. 14/037,468, dated Jun. 15, 2018, 7 pages.
Final Office Action from U.S. Appl. No. 14/037,468, dated May 16, 2016, 24 pages.
Final Office Action from U.S. Appl. No. 14/037,468, dated Oct. 5, 2016, 17 pages.
Final Office Action from U.S. Appl. No. 15/396,038, dated Mar. 11, 2019, 36 pages.
Final Office Action from U.S. Appl. No. 15/396,049, dated Dec. 27, 2018, 38 pages.
Final Office Action from U.S. Appl. No. 15/396,402, dated May 17, 2019, 85 pages.
Final Office Action from U.S. Appl. No. 15/721,809, dated Dec. 26, 2018, 46 pages.
Final Office Action from U.S. Appl. No. 15/859,473, dated Feb. 26, 2019, 13 pages.
Final Office Action, U.S. Appl. No. 15/640,542, dated Aug. 7, 2019, 46 pages.
Final Office Action, U.S. Appl. No. 15/640,542, dated Aug. 24, 2020, 31 pages.
Final Office Action, U.S. Appl. No. 15/721,816, dated Jun. 12, 2020, 15 pages.
Final Office Action, U.S. Appl. No. 15/944,546, dated May 1, 2020, 17 pages.
Final Office Action, U.S. Appl. No. 16/024,849, dated Apr. 8, 2020, 9 pages.
Final Office Action, U.S. Appl. No. 16/024,854, dated Jul. 22, 2020, 11 pages.
Final Office Action, U.S. Appl. No. 16/443,717, dated Apr. 15, 2020, 4 pages.
Fleming et al., U.S. Patent App. titled "Memory Ordering in Acceleration Hardware," 81 pages, filed Dec. 30, 2016., U.S. Appl. No. 15/396,038.
Fleming et al., U.S. Patent App. titled "Runtime Address Disambiguation in Acceleration Hardware," filed Dec. 30, 2016, 97 pages., U.S. Appl. No. 15/396,049.
Fleming K., et al., "Configurable Spatial Accelerator: An Accelerator For High-performance Computing," Dec. 2, 2016, 19 pages.
Fleming K., et al., "Leveraging Latency-Insensitivity to Ease Multiple FPGA Design", In Proceedings of the ACM/SIGDA International Symposium on Field Programmable Gate Arrays, FPGA'12, Feb. 22-24, 2012, pp. 175-184.
Fleming K.E., et al., "Leveraging Latency-Insensitive Channels to Achieve Scalable Reconfigurable Computation," Feb. 2013, 197 pages.
Full Day Tutorial Held at MICRO-49, Oct. 15-19, 2016, retrieved from https://www.microarch.org/micro49/ on Feb. 14, 2019, 2 pages.
Gao, Guang R., "Maximum Pipelining Linear Recurrence on Static Data Flow Computers", International Journal of Parallel Programming, vol. 15, No. 2, 1986, pp. 127-149.
Govindaraju et al., "Dynamically Specialized Datapaths for Energy Efficient Computing", 17th IEEE International Symposium on High Performance Computer Architecture, 2011, 12 pages.
Govindaraju et al.,"DySER: Unifying Functionality and Parallelism Specialization for Energy-Efficient Computing," Published by the IEEE Computer Society, Sep./Oct. 2012, pp. 38-51.
Gupta et al., "Bundled Execution of Recurring Traces for Energy-Efficient General Purpose Processing", Micro 44, Dec. 3-7, 2011, 12 pages.
Gurd et al., "The Manchester Prototype Dataflow Computer", Communications of the ACM, vol. 28 No. 1, Jan. 1985, pp. 34-52.
Han S., et al., "Deep Compression: Compressing Deep Neural Networks with Pruning, Trained Quantization and Huffman Coding," ICLR, Feb. 2016, 14 pages.
Hans., et al., "EIE: Efficient Inference Engine on Compressed Deep Neural Network," ISCA, May 2016, 12 pages.
Hauser J. R. et al., "Garp: a MIPS processor with a Reconfigurable Coprocessor", Proceedings of the 5th Annual IEEE Symposium on Field-Programmable Custom Computing Machines, 1997, 10 pages.
Hoogerbrugge J., et al., "Transport-Triggering vs. Operation-Triggering", 1994, In Compiler Construction, Lecture Notes in Computer Science, vol. 786, Springer, pp. 435-449.
Hsin Y., "Building Energy-Efficient Accelerators for Deep Learning," at Deep Learning Summit Boston, May 2016, retrieved from https://www.re-work.co/events/deep-learning-boston-2016 on Feb. 14, 2019, 10 pages.
Hsin Y., "Deep Learning & Artificial Intelligence," at GPU Technology Conference, Mar. 26-29, 2018, retrieved from http://www.gputechconf.com/resources/poster-gallery/2016/deep-learning-artificial-intelligence on Feb. 14, 2019, 4 pages.
Ibrahim Eng., Walaa Abd El Aziz, "Binary Floating Point Fused Multiply Add Unit", Faculty Of Engineering, Cairo University Giza, Egypt, 2012, 100 Pages.
Intel(Registered) Architecture, "Instruction Set Extensions and Future Features Programming Reference," 319433-034, May 2018, 145 pages.
Intention to grant, EP App. No. 20164075.2, dated May 23, 2022, 7 pages.
Office Action, EP App. No. 20157807.7, dated Apr. 22, 2022, 3 pages.
Office Action, EP App. No. 20163890.5, dated May 11, 2022, 7 pages.
Zaidi, Ali Mustafa, "Accelerating control-flow intensive code in spatial hardware", University of Cambridge, Technical Report, No. 870, May 31, 2015, pp. 1-170.
Chun-Jiang et al., "Formal Description of Design Space of SIMD Instruction Sets", Computer Science, vol. 40, No. 6, Jun. 2013, pp. 32-36 (English Abstract Submitted).
Examination Report, DE App. No 102018005181.2, dated Nov. 22, 2022, 5 pages of Original Document Only.
Office Action, EP App. No. 20164075.2, dated Sep. 30, 2022, 5 pages.

(56) References Cited

OTHER PUBLICATIONS

Office Action, EP App. No. 20164075.2, dated Dec. 5, 2022, 5 pages.
First Office Action, CN App. No. 201780053811.X, dated Oct. 8, 2022, 29 pages (18 pages of English Translation and 11 pages of Original Document).
Office Action, CN App. No. 201810001530.6, dated Oct. 14, 2022, 10 pages of Original Document Only.
Office Action, CN App. No. 201810002672.4, dated Sep. 27, 2022, 15 pages of Original Document Only.
European Communication pursuant to Article 94(3) EPC, EP App. No. 19781074.0, dated Jul. 18, 2022, 5 pages.
Office Action, DE App. No. 102018005181.2, dated Aug. 14, 2022, 4 pages of Original Document Only.

* cited by examiner

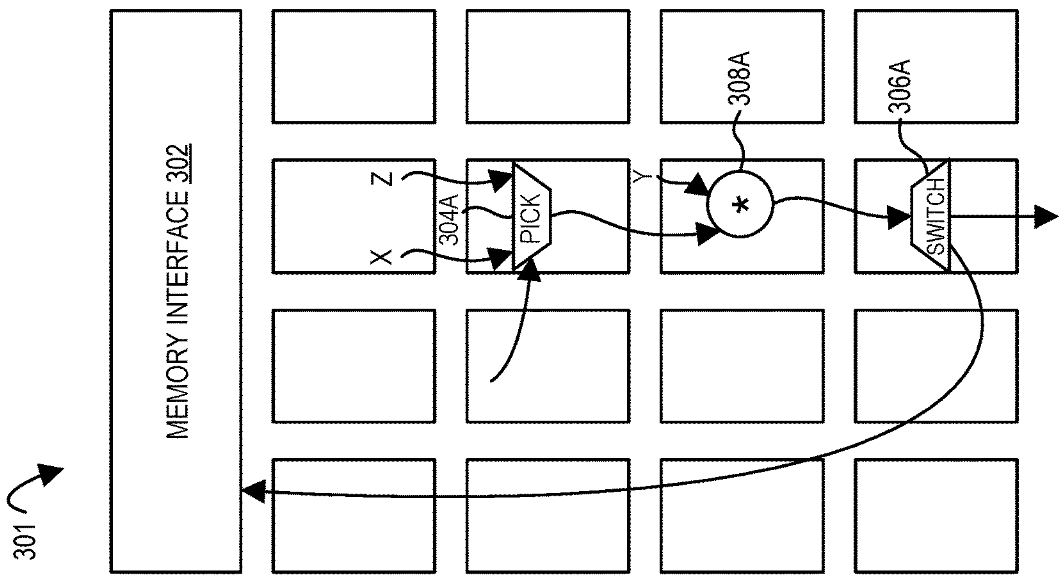
CONFIGURED CSA
FIG. 3C
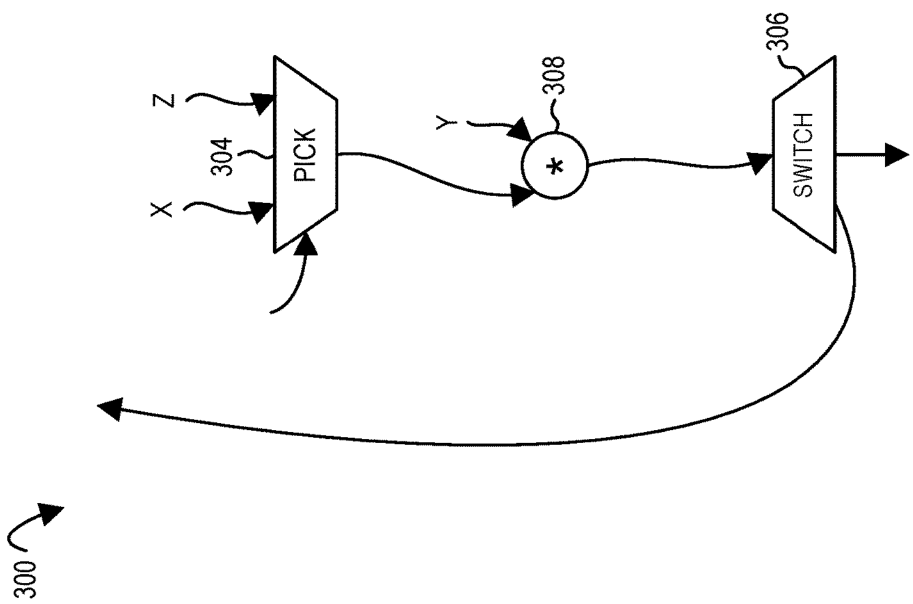
DATAFLOW GRAPH
FIG. 3B
```
void func (int x,y) {
   x = x * y;
   return x;
}
```
PROGRAM SOURCE
FIG. 3A

500

```
void memcpy(void *A, void *B, int N) {
    for(int index = 0; index < N; index++) {
        a[index] = b[index]
    }
}
```

```
Header: Determiner
if(CondDeq && NotEmpty) {
  if(Head + 1 > capacity) {
     Head <= 0;
  } else {
     Head <= Head + 1
  }
}
```

3800

```
Tail: Determiner
if(Ready && Valid) {
  if(Tail + 1 > capacity) {
     Tail <= 0;
  } else {
     Tail <= Tail + 1
  }
}
```

3900

Count: Determiner

Count <= Count + (Ready && Valid)* - (CondDeq && NotEmpty)*

*Assumes conversion of boolean value true to integer 1 and false to integer 0

FIG. 39

Enqueue = Valid && Ready 4000

FIG. 40

Not Full (Ready) = Count < CAPACITY 4100

FIG. 41

Not Empty = Count > 0 4200

FIG. 42

Valid = Count > 0 4300

```
Header: Determiner
if(Ready && Valid) {
  if(Head + 1 > capacity) {
    Head <= 0;
  } else {
    Head <= Head + 1
  }
}
```

4800

```
Tail: Determiner
if(NotFull && CondEnq) {
  if(Tail + 1 > capacity) {
    Tail <= 0;
  } else {
    Tail <= Tail + 1
  }
}
```

Count: Determiner 4900
Count <= Count + (NotFull && CondEnq)* - (Ready && Valid)*
*Assumes conversion of boolean value true to integer 1 and false to integer 0

FIG. 49

Enqueue = Valid && Ready 5000

FIG. 50

NotFull (Ready) = Count < CAPACITY 5100

FIG. 51

NotEmpty = Count > 0 5200

FIG. 52

Valid = Count > 0 5300

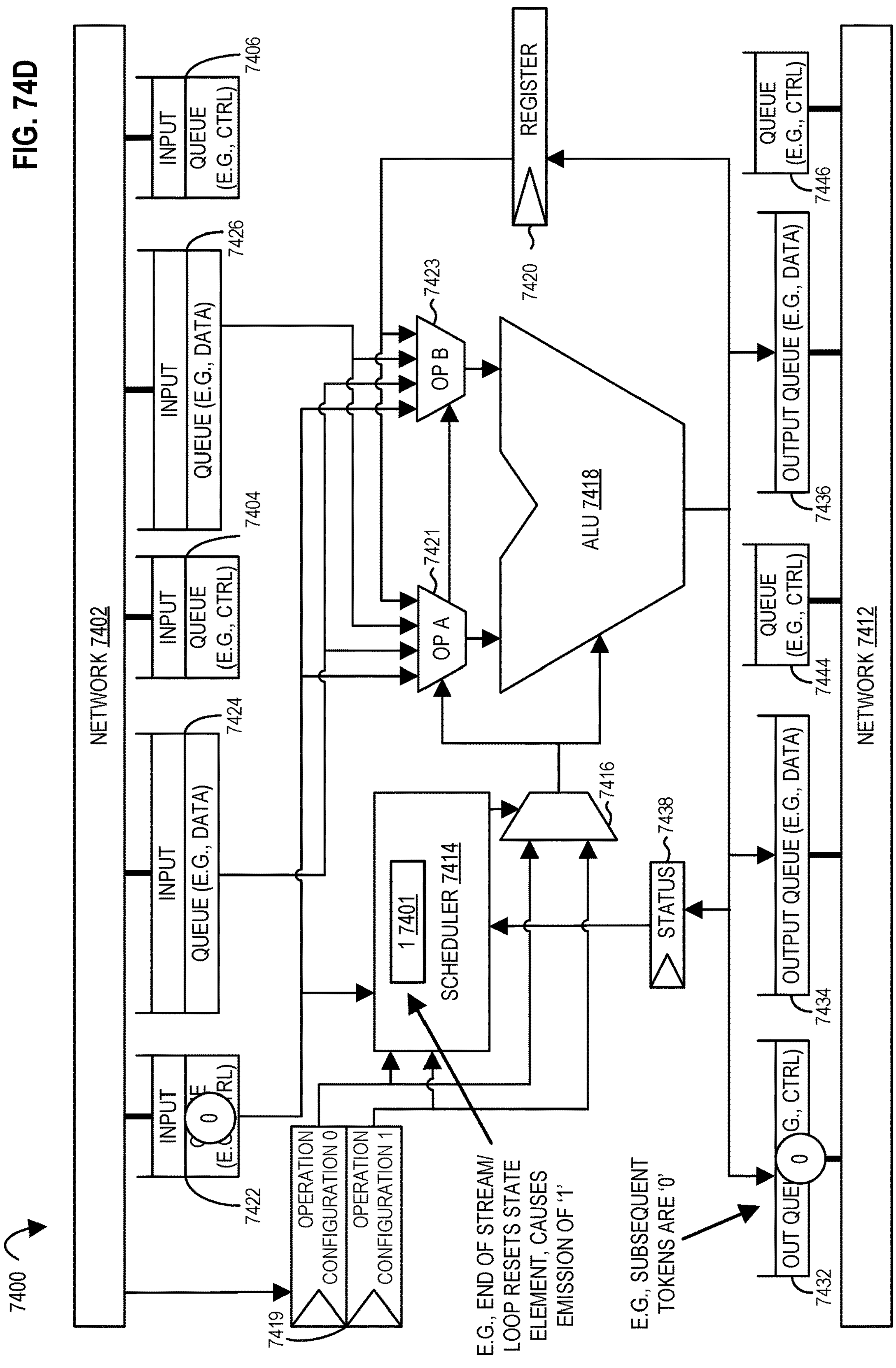
FIG. 74D
7400
NETWORK 7402
INPUT QUEUE (E.G., CTRL)
7406
INPUT QUEUE (E.G., DATA)
7426
INPUT QUEUE (E.G., CTRL)
7404
INPUT QUEUE (E.G., DATA)
7424
INPUT QUEUE (E.G., CTRL)
0
7422
OPERATION CONFIGURATION 0
OPERATION CONFIGURATION 1
7419
REGISTER
7420
OP B
7423
OP A
7421
ALU 7418
SCHEDULER 7414
1 7401
7416
STATUS
7438
E.G., END OF STREAM/ LOOP RESETS STATE ELEMENT, CAUSES EMISSION OF '1'
E.G., SUBSEQUENT TOKENS ARE '0'
QUEUE (E.G., CTRL)
7446
OUTPUT QUEUE (E.G., DATA)
7436
QUEUE (E.G., CTRL)
7444
OUTPUT QUEUE (E.G., DATA)
7434
OUT QUEUE (E.G., CTRL)
7432
NETWORK 7412

7500

7700
E.G., 1 BIT SIGNALS
E.G., COUNT
NETWORK 7702
INPUT QUEUE (E.G., CTRL)
7717
7721
7722
7704
INPUT QUEUE (E.G., DATA)
7724
7726
OPERATION CONFIGURATION 0
OPERATION CONFIGURATION 1
7719
SCHEDULER 7714
7716
STATUS
7738
OP A
OP B
7723
ALU 7718
2 7701
REGISTER
7720
OUT QUEUE (E.G., CTRL)
7732
OUTPUT QUEUE (E.G., DATA)
7734
7736
QUEUE (E.G., CTRL)
7744
7746
NETWORK 7712
E.G., OUTPUT

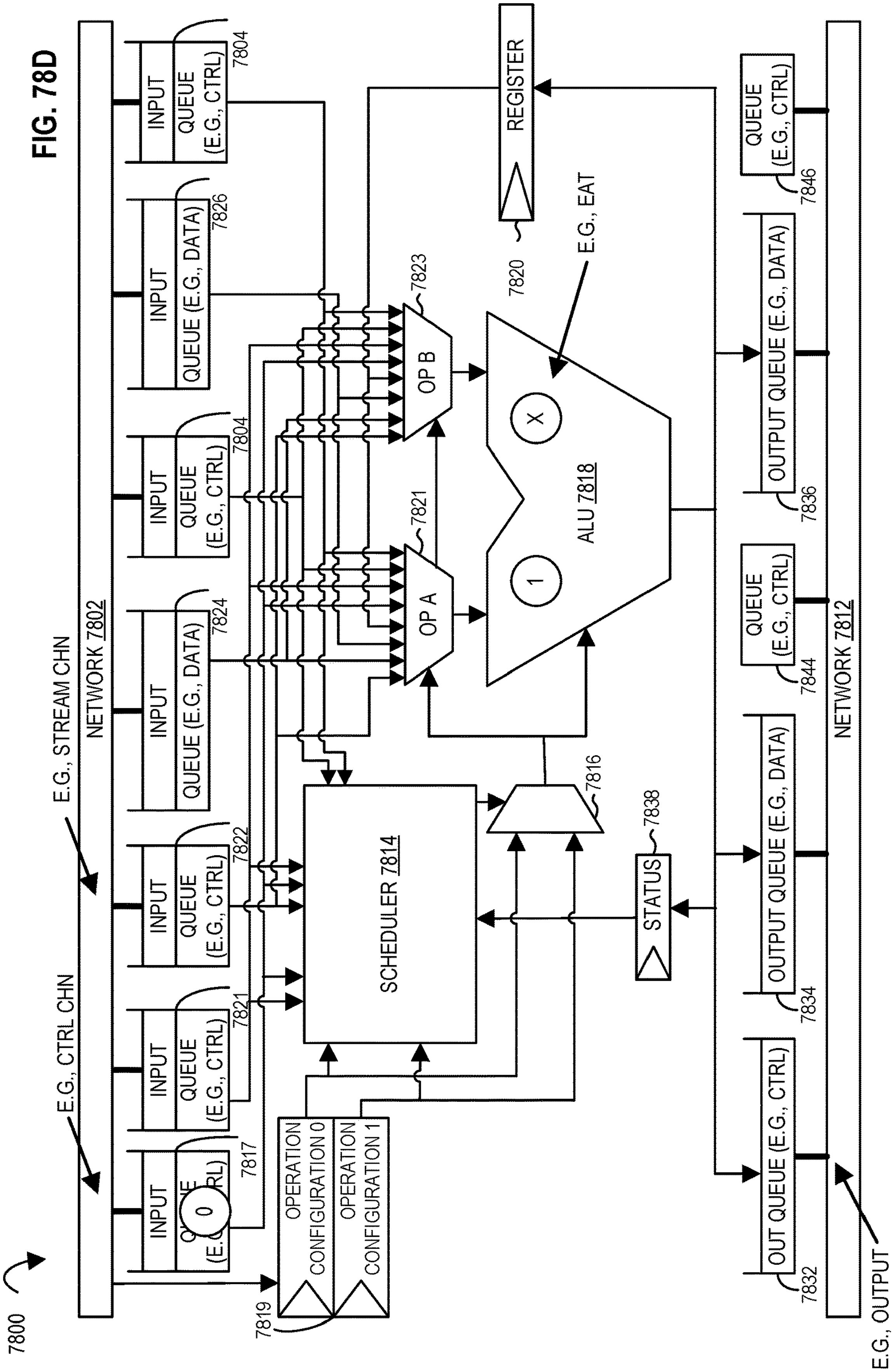

FIG. 78D
7800
E.G., CTRL CHN
E.G., STREAM CHN
NETWORK 7802
INPUT QUEUE (E.G., CTRL)
7817
0
INPUT QUEUE (E.G., CTRL)
7821
INPUT QUEUE (E.G., CTRL)
7822
INPUT QUEUE (E.G., DATA)
7824
INPUT QUEUE (E.G., CTRL)
7804
INPUT QUEUE (E.G., DATA)
7826
INPUT QUEUE (E.G., CTRL)
7804
OPERATION CONFIGURATION 0
OPERATION CONFIGURATION 1
7819
SCHEDULER 7814
7816
OP A
7821
OP B
7823
ALU 7818
1
X
E.G., EAT
7820
REGISTER
STATUS
7838
OUT QUEUE (E.G., CTRL)
7832
OUTPUT QUEUE (E.G., DATA)
7834
QUEUE (E.G., CTRL)
7844
OUTPUT QUEUE (E.G., DATA)
7836
QUEUE (E.G., CTRL)
7846
NETWORK 7812
E.G., OUTPUT

7900
E.G., STREAM
NETWORK 7902
INPUT QUEUE (E.G., CTRL)
7917
7921
7922
7904
INPUT QUEUE (E.G., DATA)
7924
7926
OPERATION CONFIGURATION 0
OPERATION CONFIGURATION 1
7919
SCHEDULER 7914
7916
OP A
OP B
7921
7923
REGISTER
7920
E.G., REPL. BITS/LEN
E.G., MATCH PATTERN?
MATCHED COUNT
E.G., PAT. BITS/ LEN
EMIT STATE
110
3
001
3
0
0
7901
7903
7905
7907
ALU 7918
STATUS
7938
OUT QUEUE (E.G., CTRL)
7932
OUTPUT QUEUE (E.G., DATA)
7934
7936
QUEUE (E.G., CTRL)
7944
7946
NETWORK 7912
E.G., OUTPUT

8000
E.G., STREAM
1
0
1
NETWORK 8002
INPUT
QUEUE (E.G., CTRL)
8004
INPUT
QUEUE (E.G., DATA)
8026
INPUT
QUEUE (E.G., CTRL)
8004
INPUT
QUEUE (E.G., DATA)
8024
INPUT
QUEUE (E.G., CTRL)
8022
INPUT
QUEUE (E.G., CTRL)
8021
QUEUE (E.G., CTRL)
8017
OPERATION CONFIGURATION 0
OPERATION CONFIGURATION 1
8019
SCHEDULER 8014
OP A
8021
OP B
8023
REGISTER
8020
E.G., COUNT/MATCH
ALU 8018
8001
8003
E.G., INITPOS
8016
STATUS
8038
QUEUE (E.G., CTRL)
8046
OUTPUT QUEUE (E.G., DATA)
8036
QUEUE (E.G., CTRL)
8044
OUTPUT QUEUE (E.G., DATA)
8034
OUT QUEUE (E.G., CTRL)
8032
NETWORK 8012

8000
E.G., STREAM
NETWORK 8002
INPUT QUEUE (E.G., CTRL)
INPUT QUEUE (E.G., DATA)
8004
8026
8024
8022
8021
8017
8019
OPERATION CONFIGURATION 0
OPERATION CONFIGURATION 1
SCHEDULER 8014
8016
STATUS
8038
OP A
OP B
8021
8023
ALU 8018
8001
8003
E.G., INITPOS
E.G., MATCH?
E.G., COUNT/MATCH
REGISTER
8020
OUTPUT QUEUE (E.G., DATA)
QUEUE (E.G., CTRL)
OUT QUE
G., CTRL)
8032
8034
8036
8044
8046
NETWORK 8012

```
outQ.deq = Ready && !outQ.notEmpty &&
(!DEQ_DONE||OpComplete)
```

FIG. 84

```
DEQ_DONE <= (DEQ_DONE && !OpComplete)|| (Ready
&& !outQ.notEmpty && (!DEQ_DONE || OpComplete))
```

FIG. 85

```
Valid =!outQ.notEmpty
validOrDeq =!outQ.notEmpty || DEQ_DONE
```

FIG. 86

```
Ready = (inQ.notFull)
```

FIG. 87

```
opWillComplete = ((&MC[i] && cfg) || (!cfg && Valid)) && inQ.notFull
```

FIG. 88

```
NotEmpty ToPE = inQ.notEmpty
```

FIG. 89

```
MC[i] =((valid[SwitchDecode[i]] && OpComplete) ||
(validOrDeq [SwitchDecode[i]] &&
!OpComplete)))
```

FIG. 90

```
EnqAlready[i] <= cfg && ((valid[SwitchDecode[i]] &&
Ready ) || (EnqAlready[i] && !OpComplete))
```

FIG. 91

```
InQ[i].enq =  (Ready && valid[switchDecode[i]]) &&  (!cfg ||
(!EnqAlready[i] || OpComplete))
```

FIG. 92

```
OpComplete = &EnqAlready
```

```
Tail: Determiner

if(opWillComplete) {

  if(Tail + 1 > capacity) {

      Tail <= 0;

  } else {

      Tail <= Tail + 1

  }

}
```

Count: Determiner
Count <= Count + (opWillComplete)* - (CondDeq && NotEmpty)*
*Assumes conversion of boolean value true to integer 1 and false to integer 0

10100
E.G., INNER LOOP ITER
E.G., OUTER LOOP ITER
NETWORK 10102
INPUT QUEUE (E.G., CTRL)
10122
INPUT QUEUE (E.G., DATA)
10124
0
1
10104
INPUT QUEUE (E.G., DATA)
10126
0
1
10106
OPERATION CONFIGURATION 0
OPERATION CONFIGURATION 1
10119
SCHEDULER 10114
10116
OP A
10121
OP B
10123
ALU 10118
REGISTER
10120
STATUS
10138
OUT QUEUE (E.G., CTRL)
10132
OUTPUT QUEUE (E.G., DATA)
10134
QUEUE (E.G., CTRL)
10144
OUTPUT QUEUE (E.G., DATA)
10136
QUEUE (E.G., CTRL)
10146
NETWORK 10112

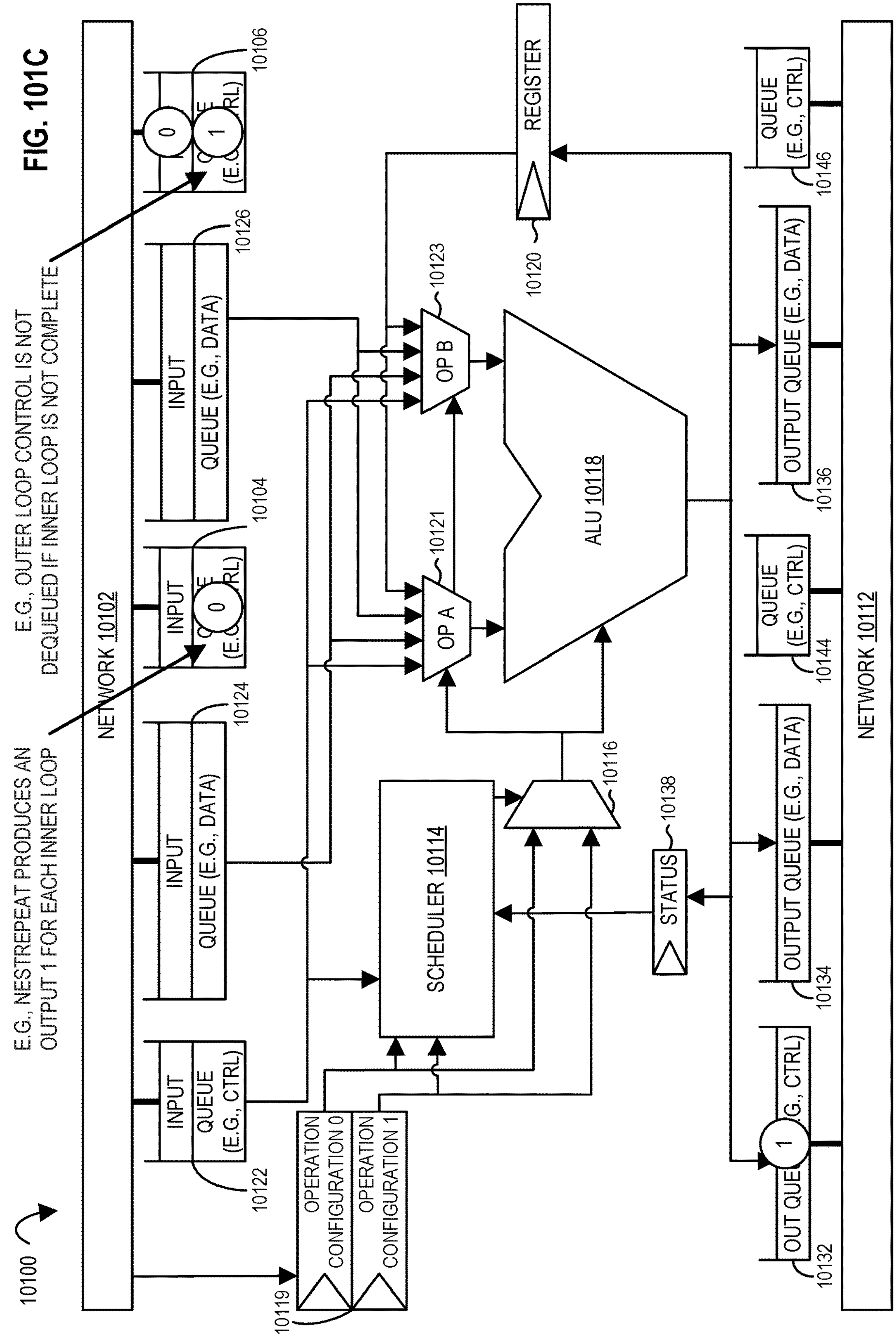
FIG. 101C
10100
E.G., NESTREPEAT PRODUCES AN OUTPUT 1 FOR EACH INNER LOOP
E.G., OUTER LOOP CONTROL IS NOT DEQUEUED IF INNER LOOP IS NOT COMPLETE
NETWORK 10102
INPUT QUEUE (E.G., CTRL)
10122
INPUT QUEUE (E.G., DATA)
10124
INPUT QUEUE (E.G., CTRL)
10104
INPUT QUEUE (E.G., DATA)
10126
QUEUE (E.G., CTRL)
10106
0
1
OPERATION CONFIGURATION 0
OPERATION CONFIGURATION 1
10119
SCHEDULER 10114
10116
OP A
10121
OP B
10123
ALU 10118
REGISTER
10120
STATUS
10138
OUT QUEUE (E.G., CTRL)
10132
OUTPUT QUEUE (E.G., DATA)
10134
QUEUE (E.G., CTRL)
10144
OUTPUT QUEUE (E.G., DATA)
10136
QUEUE (E.G., CTRL)
10146
NETWORK 10112

10500
E.G., INPUT
E.G., CTRL
NETWORK 10502
INPUT QUEUE (E.G., CTRL)
10504
QUEUE DATA)
10526
10524
10522
10521
10517
OPERATION CONFIGURATION 0
OPERATION CONFIGURATION 1
10519
E.G., CONFIG(8 BIT)
SCHEDULER 10514
10516
10521
10523
OP A
OP B
ALU 10518
REGISTER
10520
STATUS
10538
E.G., OUTPUT
QUEUE (E.G., CTRL)
10546
OUTPUT QUEUE (E.G., DATA)
10536
10544
10534
OUT QUEUE (E.G., CTRL)
10532
NETWORK 10512

| FIELD | BITS(0-n) | DEFINITION |
|---|---|---|
| VALID | 1 | IS THE BUFFER VALID OR NOT |
| TYPE | 1 | 0 = NARROW; 1 = 1 WIDE |
| MODE | 3 | DEFINES WHAT MODE THE BUFFER IS IN |
| DEPTH | 5 | DEPTH OF THE BUFFER |
| OFFSET | 4 | OFFSET FOR THE BUFFER (MUST MATCH BUFFER DEPTH) |
| REP_MODE | 1 | IF FIFO IS INITIALIZED WITH A PATTERN, AND THIS IS SET, IT WILL CONTINUE TO PRODUCE THE VALUES LOOPING THROUGH THE FIFO |
| INIT | 1 | 1==YES 0==NO (LOAD THE BUFFER WITH AN INITIAL SET OF DATA) |
| INPUTDATASELECTS | NUM BITS TO SUPPORT N BUFFERS | BINDS BUFFER TO DATA |
| INPUTWRADDRSELECTS | NUM BITS TO SUPPORT N BUFFERS | BINDS BUFFER TO WRITE ADDRESS INPUT |
| INPUTRDADDRSELECTS | NUM BITS TO SUPPORT N BUFFERS | BINDS BUFFER TO READ ADDRESS INPUT |
| OUTPUTSELECTS | NUM BITS TO SUPPORT N BUFFERS | BINDS OUTPUT TO BUFFER |

FIG. 110

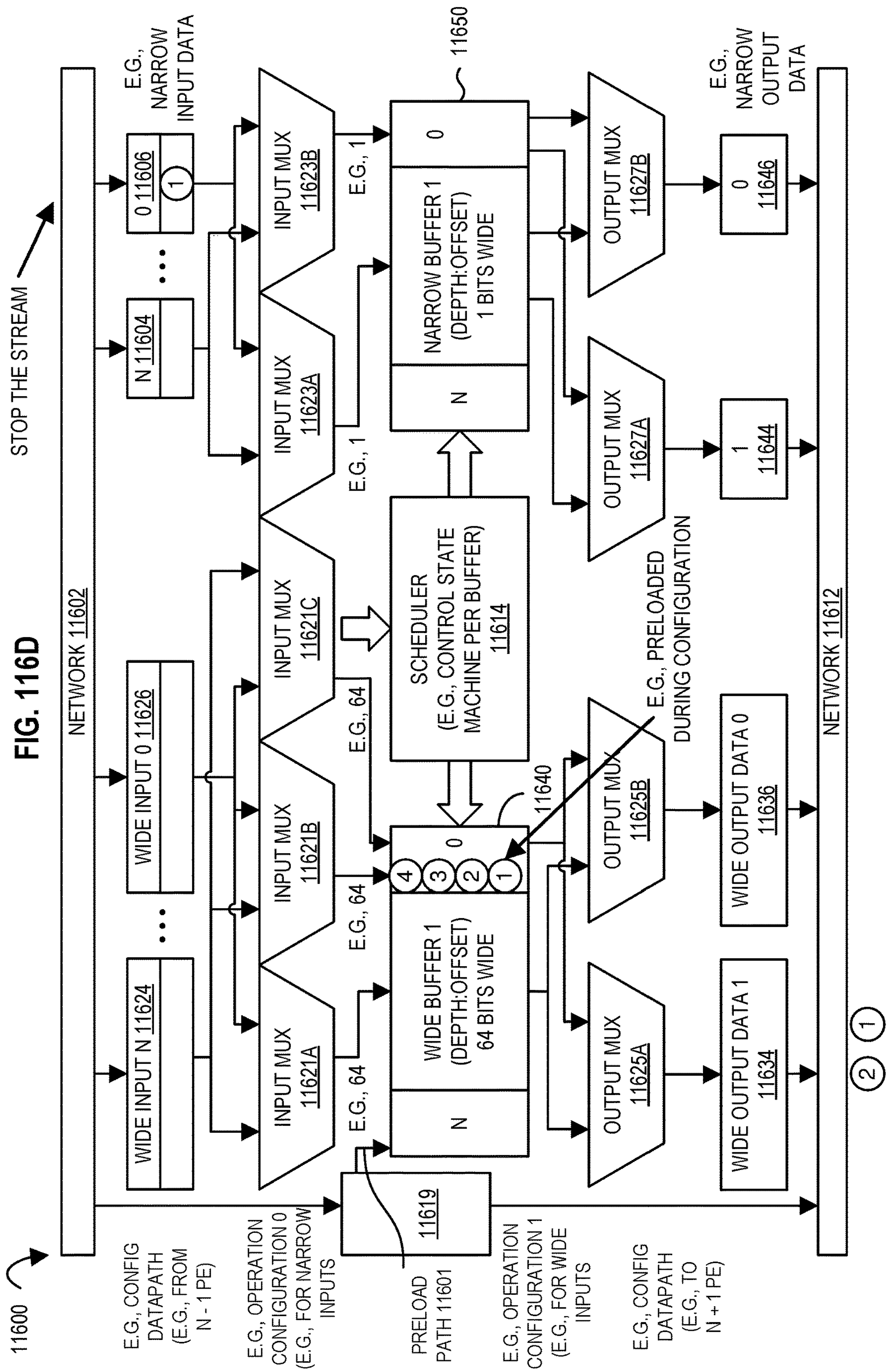
FIG. 116D
11600
STOP THE STREAM
NETWORK 11602
E.G., NARROW INPUT DATA
0 11606
1
N 11604
WIDE INPUT 0 11626
WIDE INPUT N 11624
INPUT MUX 11623B
INPUT MUX 11623A
INPUT MUX 11621C
INPUT MUX 11621B
INPUT MUX 11621A
E.G., 1
E.G., 1
E.G., 64
E.G., 64
E.G., 64
11650
0
NARROW BUFFER 1 (DEPTH:OFFSET) 1 BITS WIDE
N
SCHEDULER (E.G., CONTROL STATE MACHINE PER BUFFER) 11614
11640
0
4
3
2
1
WIDE BUFFER 1 (DEPTH:OFFSET) 64 BITS WIDE
N
OUTPUT MUX 11627B
OUTPUT MUX 11627A
OUTPUT MUX 11625B
OUTPUT MUX 11625A
E.G., PRELOADED DURING CONFIGURATION
E.G., NARROW OUTPUT DATA
0 11646
1 11644
WIDE OUTPUT DATA 0 11636
WIDE OUTPUT DATA 1 11634
NETWORK 11612
1
2
11619
E.G., CONFIG DATAPATH (E.G., FROM N - 1 PE)
E.G., OPERATION CONFIGURATION 0 (E.G., FOR NARROW INPUTS
PRELOAD PATH 11601
E.G., OPERATION CONFIGURATION 1 (E.G., FOR WIDE INPUTS
E.G., CONFIG DATAPATH (E.G., TO N + 1 PE)

11700

11700

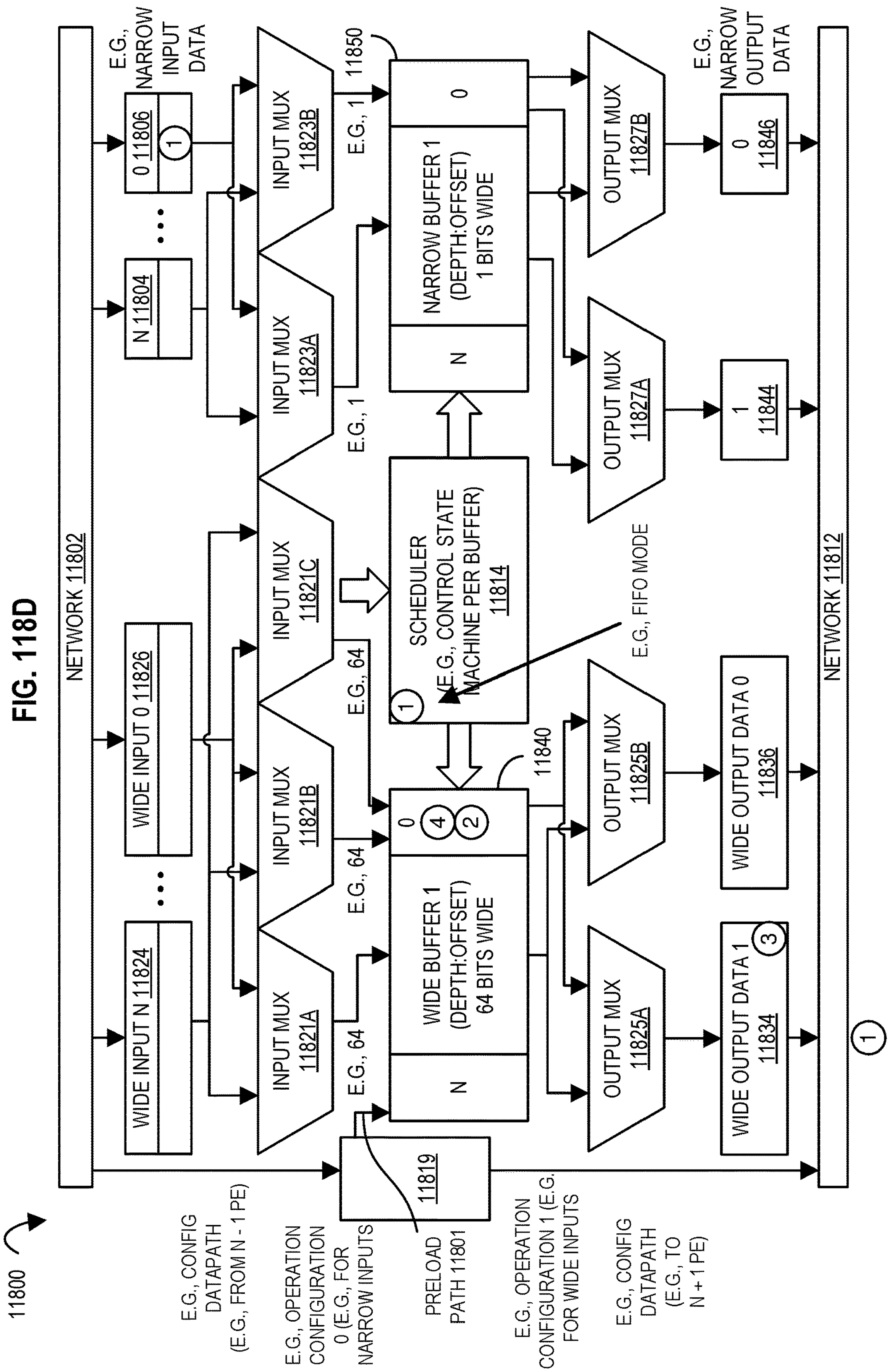
FIG. 118D
11800
NETWORK 11802
E.G., NARROW INPUT DATA
0 11806
N 11804
WIDE INPUT 0 11826
WIDE INPUT N 11824
INPUT MUX 11823B
INPUT MUX 11823A
INPUT MUX 11821C
INPUT MUX 11821B
INPUT MUX 11821A
E.G., 1
E.G., 64
11850
0
NARROW BUFFER 1 (DEPTH:OFFSET) 1 BITS WIDE
N
SCHEDULER (E.G., CONTROL STATE MACHINE PER BUFFER) 11814
E.G., FIFO MODE
11840
WIDE BUFFER 1 (DEPTH:OFFSET) 64 BITS WIDE
OUTPUT MUX 11827B
OUTPUT MUX 11827A
OUTPUT MUX 11825B
OUTPUT MUX 11825A
E.G., NARROW OUTPUT DATA
0 11846
1 11844
WIDE OUTPUT DATA 0 11836
WIDE OUTPUT DATA 1 11834
NETWORK 11812
11819
E.G., CONFIG DATAPATH (E.G., FROM N - 1 PE)
E.G., OPERATION CONFIGURATION 0 (E.G., FOR NARROW INPUTS
PRELOAD PATH 11801
E.G., OPERATION CONFIGURATION 1 (E.G. FOR WIDE INPUTS
E.G., CONFIG DATAPATH (E.G., TO N + 1 PE)

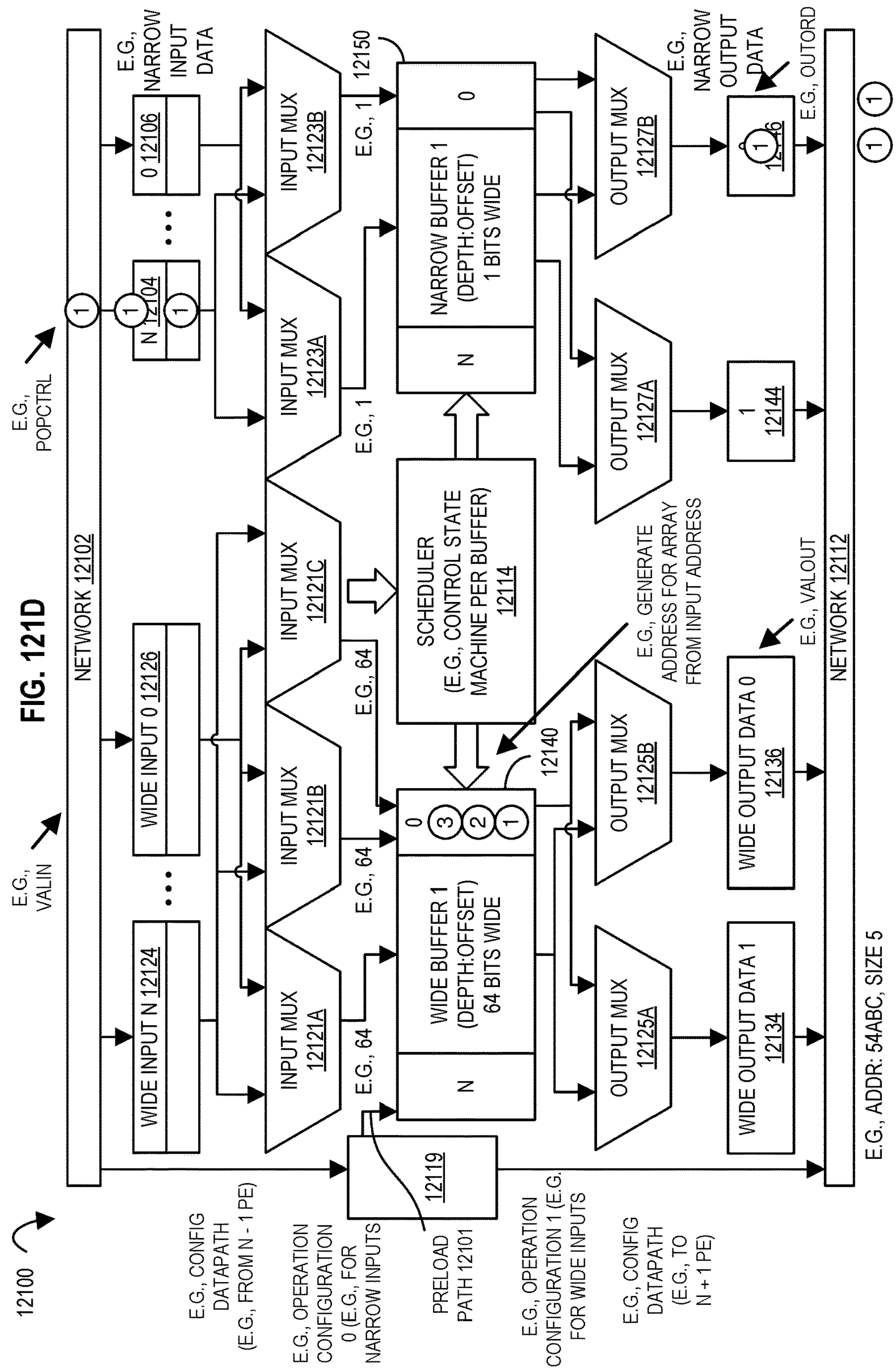
FIG. 121D
12100
NETWORK 12102
E.G., VALIN
E.G., POPCTRL
WIDE INPUT N 12124
WIDE INPUT 0 12126
N 12104
0 12106
E.G., NARROW INPUT DATA
INPUT MUX 12121A
INPUT MUX 12121B
INPUT MUX 12121C
INPUT MUX 12123A
INPUT MUX 12123B
E.G., 64
E.G., 64
E.G., 64
E.G., 1
E.G., 1
12150
WIDE BUFFER 1 (DEPTH:OFFSET) 64 BITS WIDE
N
0
SCHEDULER (E.G., CONTROL STATE MACHINE PER BUFFER) 12114
NARROW BUFFER 1 (DEPTH:OFFSET) 1 BITS WIDE
N
0
12140
E.G., GENERATE ADDRESS FOR ARRAY FROM INPUT ADDRESS
OUTPUT MUX 12125A
OUTPUT MUX 12125B
OUTPUT MUX 12127A
OUTPUT MUX 12127B
E.G., NARROW OUTPUT DATA
WIDE OUTPUT DATA 1 12134
WIDE OUTPUT DATA 0 12136
1 12144
12146
E.G., VALOUT
E.G., OUTORD
NETWORK 12112
E.G., ADDR: 54ABC, SIZE 5
12119
E.G., CONFIG DATAPATH (E.G., FROM N - 1 PE)
E.G., OPERATION CONFIGURATION 0 (E.G., FOR NARROW INPUTS
PRELOAD PATH 12101
E.G., OPERATION CONFIGURATION 1 (E.G. FOR WIDE INPUTS
E.G., CONFIG DATAPATH (E.G., TO N + 1 PE)

12200

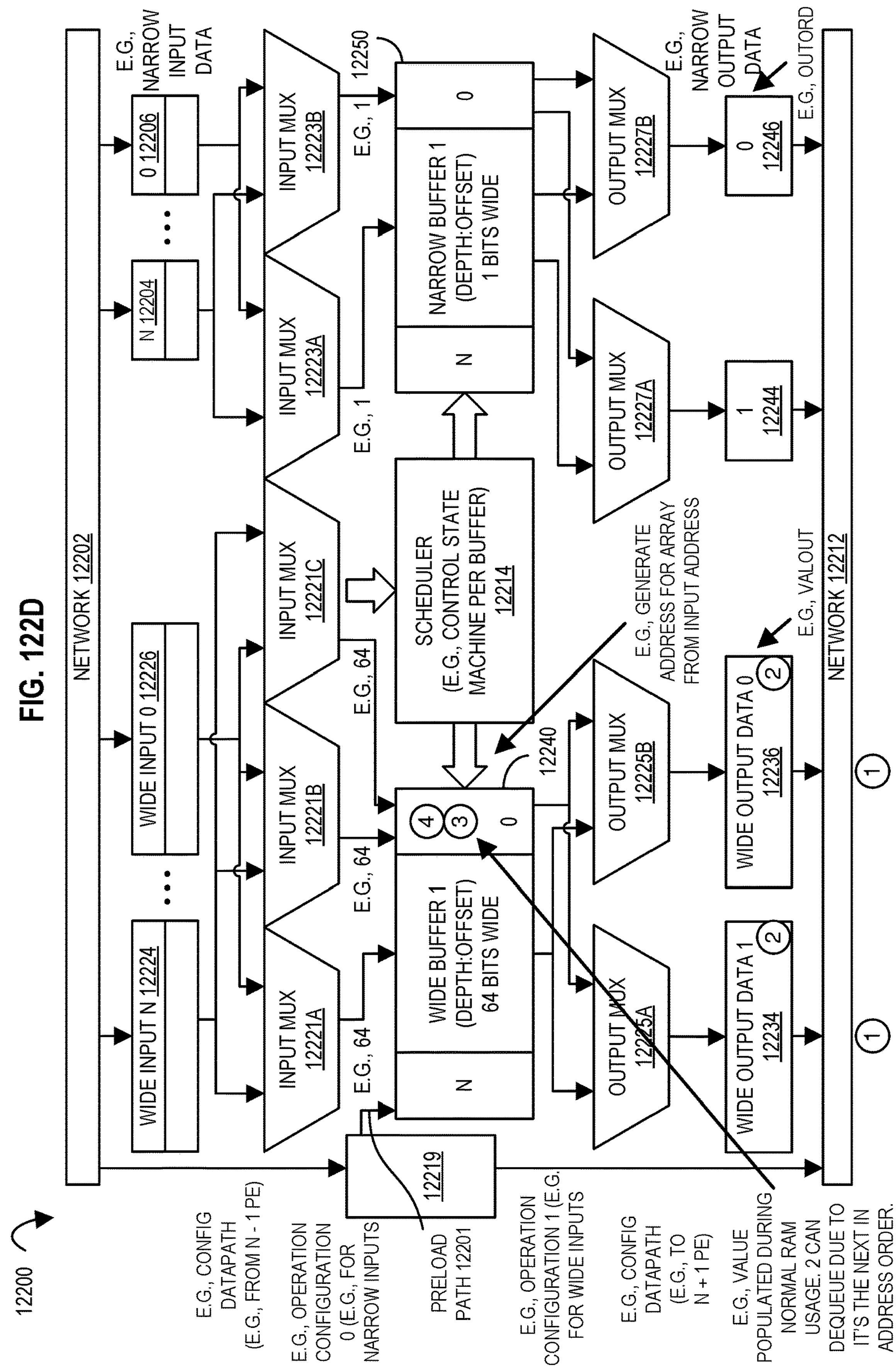
FIG. 122D
12200
NETWORK 12202
E.G., NARROW INPUT DATA
0 12206
N 12204
WIDE INPUT 0 12226
WIDE INPUT N 12224
INPUT MUX 12223B
INPUT MUX 12223A
INPUT MUX 12221C
INPUT MUX 12221B
INPUT MUX 12221A
12250
E.G., 1
E.G., 64
NARROW BUFFER 1 (DEPTH:OFFSET) 1 BITS WIDE
0
N
SCHEDULER (E.G., CONTROL STATE MACHINE PER BUFFER) 12214
WIDE BUFFER 1 (DEPTH:OFFSET) 64 BITS WIDE
12240
12219
OUTPUT MUX 12227B
OUTPUT MUX 12227A
OUTPUT MUX 12225B
OUTPUT MUX 12225A
E.G., NARROW OUTPUT DATA
E.G., OUTORD
0 12246
1 12244
E.G., GENERATE ADDRESS FOR ARRAY FROM INPUT ADDRESS
E.G., VALOUT
WIDE OUTPUT DATA 0 12236
WIDE OUTPUT DATA 1 12234
NETWORK 12212
E.G., CONFIG DATAPATH (E.G., FROM N - 1 PE)
E.G., OPERATION CONFIGURATION 0 (E.G., FOR NARROW INPUTS
PRELOAD PATH 12201
E.G., OPERATION CONFIGURATION 1 (E.G. FOR WIDE INPUTS
E.G., CONFIG DATAPATH (E.G., TO N + 1 PE)
E.G., VALUE POPULATED DURING NORMAL RAM USAGE. 2 CAN DEQUEUE DUE TO IT'S THE NEXT IN ADDRESS ORDER.

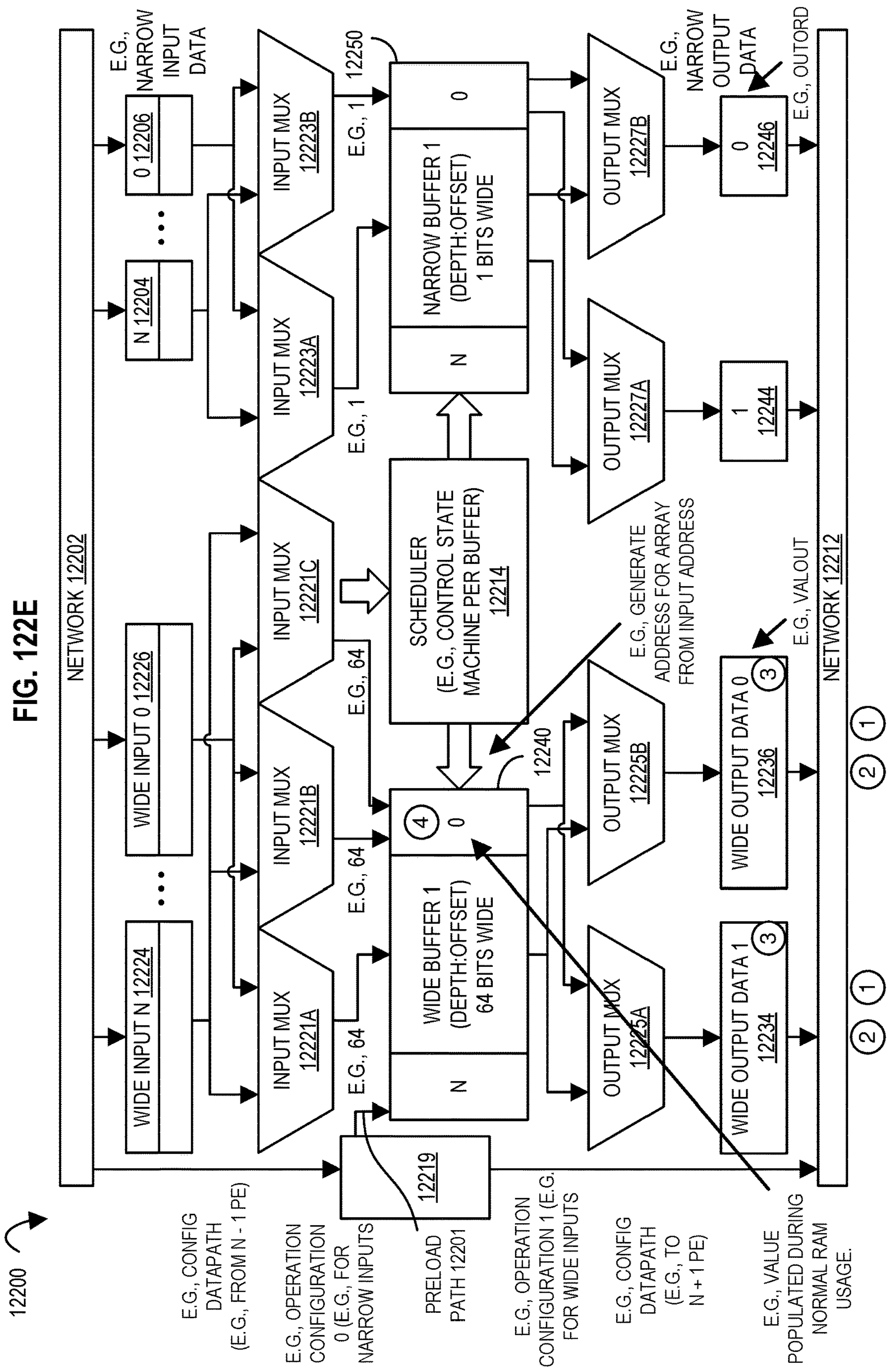
FIG. 122E
12200
NETWORK 12202
WIDE INPUT N 12224
WIDE INPUT 0 12226
N 12204
0 12206
E.G., NARROW INPUT DATA
INPUT MUX 12221A
INPUT MUX 12221B
INPUT MUX 12221C
INPUT MUX 12223A
INPUT MUX 12223B
E.G., 64
E.G., 64
E.G., 64
E.G., 1
E.G., 1
12250
WIDE BUFFER 1 (DEPTH:OFFSET) 64 BITS WIDE
N
0
4
12240
SCHEDULER (E.G., CONTROL STATE MACHINE PER BUFFER) 12214
NARROW BUFFER 1 (DEPTH:OFFSET) 1 BITS WIDE
N
0
OUTPUT MUX 12225A
OUTPUT MUX 12225B
OUTPUT MUX 12227A
OUTPUT MUX 12227B
E.G., GENERATE ADDRESS FOR ARRAY FROM INPUT ADDRESS
WIDE OUTPUT DATA 1 12234
3
WIDE OUTPUT DATA 0 12236
3
1 12244
0 12246
E.G., NARROW OUTPUT DATA
E.G., OUTORD
E.G., VALOUT
2
1
2
1
NETWORK 12212
12219
E.G., CONFIG DATAPATH (E.G., FROM N - 1 PE)
E.G., OPERATION CONFIGURATION 0 (E.G., FOR NARROW INPUTS
PRELOAD PATH 12201
E.G., OPERATION CONFIGURATION 1 (E.G. FOR WIDE INPUTS
E.G., CONFIG DATAPATH (E.G., TO N + 1 PE)
E.G., VALUE POPULATED DURING NORMAL RAM USAGE.

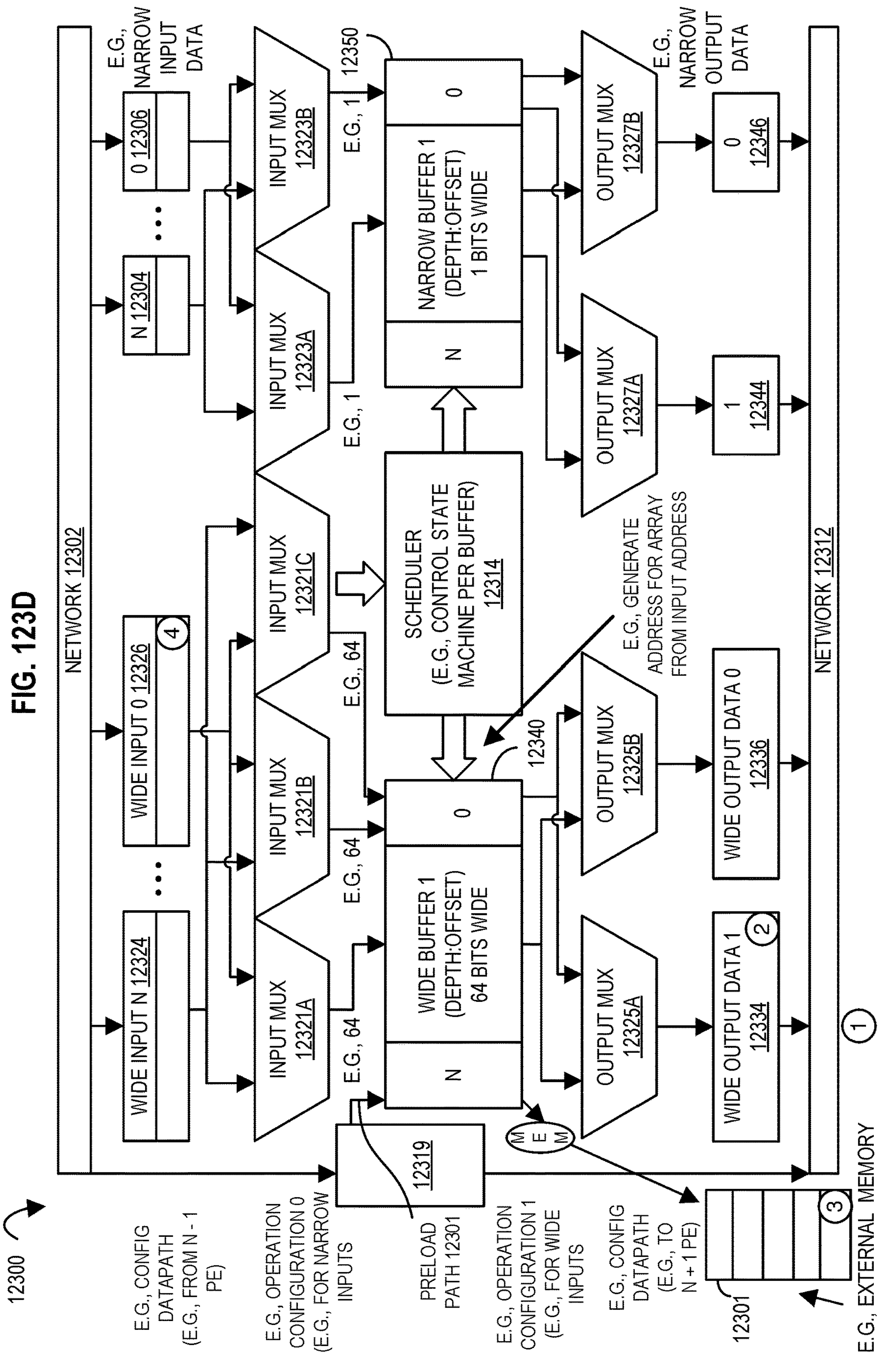
FIG. 123D
12300
NETWORK 12302
WIDE INPUT N 12324
WIDE INPUT 0 12326
N 12304
0 12306
E.G., NARROW INPUT DATA
INPUT MUX 12321A
INPUT MUX 12321B
INPUT MUX 12321C
INPUT MUX 12323A
INPUT MUX 12323B
E.G., 64
E.G., 1
12350
12340
WIDE BUFFER 1 (DEPTH:OFFSET) 64 BITS WIDE
NARROW BUFFER 1 (DEPTH:OFFSET) 1 BITS WIDE
SCHEDULER (E.G., CONTROL STATE MACHINE PER BUFFER) 12314
E.G., GENERATE ADDRESS FOR ARRAY FROM INPUT ADDRESS
OUTPUT MUX 12325A
OUTPUT MUX 12325B
OUTPUT MUX 12327A
OUTPUT MUX 12327B
WIDE OUTPUT DATA 1 12334
WIDE OUTPUT DATA 0 12336
1 12344
0 12346
E.G., NARROW OUTPUT DATA
NETWORK 12312
12319
MEM
E.G., CONFIG DATAPATH (E.G., FROM N - 1 PE)
E.G., OPERATION CONFIGURATION 0 (E.G., FOR NARROW INPUTS
PRELOAD PATH 12301
E.G., OPERATION CONFIGURATION 1 (E.G., FOR WIDE INPUTS
E.G., CONFIG DATAPATH (E.G., TO N + 1 PE)
12301
E.G., EXTERNAL MEMORY

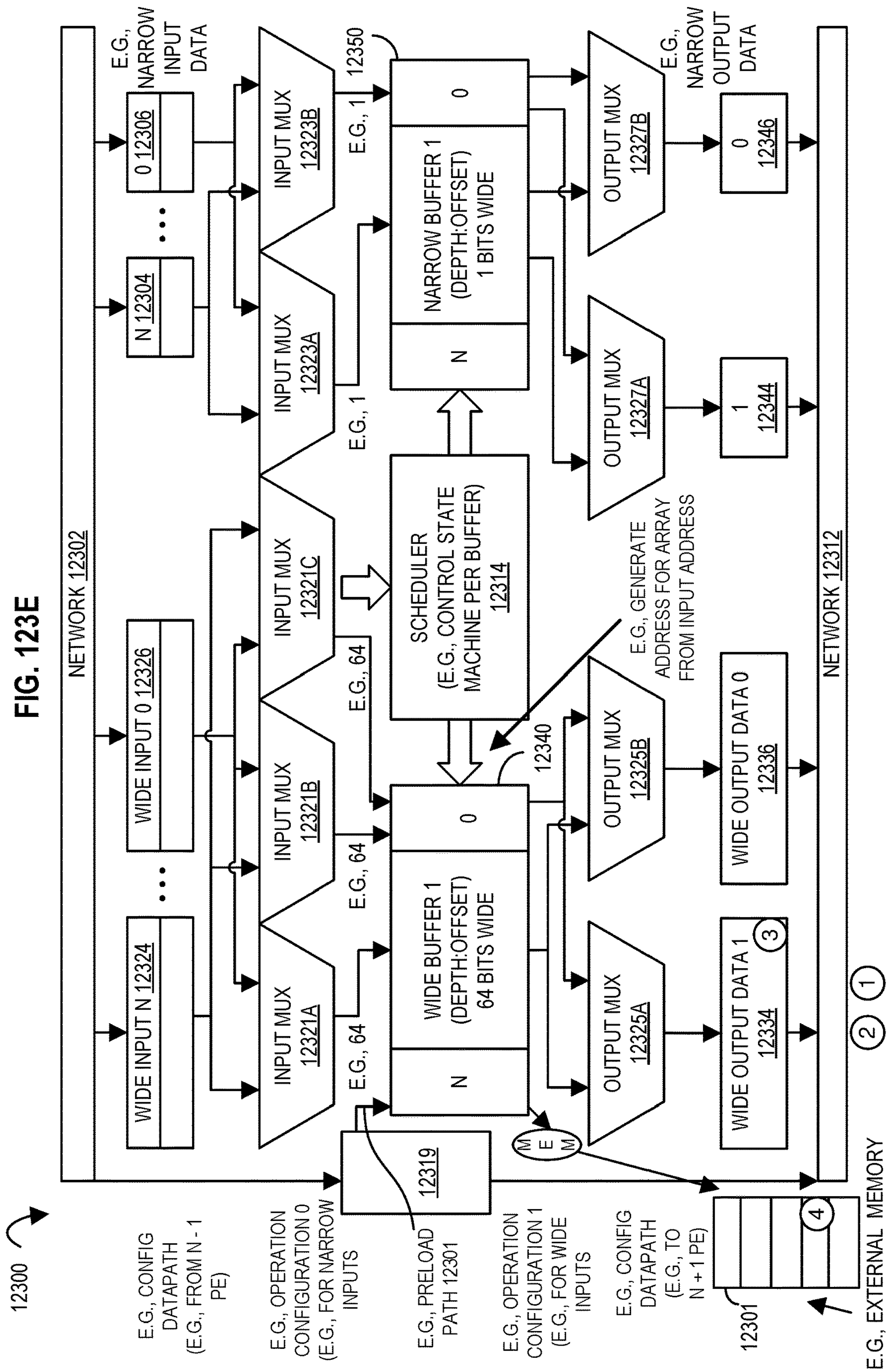
FIG. 123E
12300
NETWORK 12302
WIDE INPUT N 12324
WIDE INPUT 0 12326
N 12304
0 12306
E.G., NARROW INPUT DATA
INPUT MUX 12321A
INPUT MUX 12321B
INPUT MUX 12321C
INPUT MUX 12323A
INPUT MUX 12323B
E.G., 64
E.G., 64
E.G., 64
E.G., 1
E.G., 1
12350
WIDE BUFFER 1 (DEPTH:OFFSET) 64 BITS WIDE
N
0
12340
SCHEDULER (E.G., CONTROL STATE MACHINE PER BUFFER) 12314
NARROW BUFFER 1 (DEPTH:OFFSET) 1 BITS WIDE
N
0
E.G., GENERATE ADDRESS FOR ARRAY FROM INPUT ADDRESS
OUTPUT MUX 12325A
OUTPUT MUX 12325B
OUTPUT MUX 12327A
OUTPUT MUX 12327B
WIDE OUTPUT DATA 1 12334
WIDE OUTPUT DATA 0 12336
1 12344
0 12346
E.G., NARROW OUTPUT DATA
NETWORK 12312
1
2
3
4
12319
MEM
E.G., CONFIG DATAPATH (E.G., FROM N - 1 PE)
E.G., OPERATION CONFIGURATION 0 (E.G., FOR NARROW INPUTS
E.G., PRELOAD PATH 12301
E.G., OPERATION CONFIGURATION 1 (E.G., FOR WIDE INPUTS
E.G., CONFIG DATAPATH (E.G., TO N + 1 PE)
12301
E.G., EXTERNAL MEMORY

```
ld32 Rdata, Raddr
ld32 Rdata2, Raddr2
mul32 Rv0, Rdata, 17
mul32 Rv1, Rdata2, Rdata2
add32 Rres, Rv0, Rv1
st32 Raddr, Rres
ld32 Rdata3, Raddr3
```

SEQUENTIAL ASSEMBLY 13202

FIG. 132A

```
.lic .i32 data; .lic .i64 addr;
.lic .i32 data2; .lic .i64 addr2;
.lic .i32 data3; .lic .i64 addr3;
.lic .i32 v0; .lic .i32 v1; .lic .i32 res
ld32 data, addr
ld32 data2, addr2
mul32 v0, data, 17
mul32 v1, data2, data2
add32 res, v0, v1
st32 addr, res, done, %ign
ld32 data3, addr3, %ign, done
```

DATAFLOW ASSEMBLY 13204

FIG. 132B

DATAFLOW GRAPH 13206

```
if (i < n)
    y = x + a;
else
    y = i + x;
```

C SOURCE CODE 13302

FIG. 133A

```
.lic .i1 test
cmplts32 test, i, n
switch32 %ign, aT, test, a
switch32 iF, %ign, test, i
switch32 xF, xT, test, x
add32 yT, xT, aT      # True path
add32 yF, iF, xF      # False path
pick32 y, test, yF, yT
add32 z, y, 1
```

DATAFLOW ASSEMBLY 13304

FIG. 133B

DATAFLOW GRAPH
13306

```
int i = 0;
int sum = 0;
do {
    sum = sum + i;
    i = i + 1;
} while (i < n);
return sum;
```

C SOURCE CODE 13402

FIG. 134A

```
# Loop control channels.
.lic .i1 picker
.lic .i1 switcher

# Offset values in picker with an initial 0.
.curr picker; .value 0; .avail 0

# Generate value of i for each loop iteration
pick32 top_i, picker, init_i, loopback_i
add32 bottom_i, top_i, 1
switch32 %ign, loopback_i, switcher, bottom_i

# Repeat value of n for each execution of the loop.
pick32 loop_n, picker, init_n, loopback_n
switch32 %ign, loopback_n, switcher, loop_n

# Comparison at the bottom of the loop.
cmplts32 switcher, bottom_i, loop_n
mov1 picker, switcher

# Add up the sum around the loop iteration.
pick32 top_sum, picker, init_sum, loopback_sum
add32 bottom_sum, top_sum, top_i
switch32 out_sum, loopback_sum, switcher, bottom_sum
```

DATAFLOW ASSEMBLY 13404

FIG. 134B

DATAFLOW GRAPH 13406

15800

| | INPUT QUEUE ID | OUTPUT QUEUE ID | DEPENDENCY QUEUE ID | MEMOP |
|---|---|---|---|---|
| LOGICAL | CHANNEL 0 5810 | COMPL. CHAN. 1 5820 | DEPLN: CHANNEL B0 DEPOUT: COUNTER C0 5830 | LOAD 5840 |
| BINARY (PROVISIONAL) | 001 | 010 | 1000/0001 | 00 |

FIG. 158

APPARATUSES, METHODS, AND SYSTEMS FOR OPERATIONS IN A CONFIGURABLE SPATIAL ACCELERATOR

CROSS-REFERENCE TO RELATED APPLICATIONS

The present application is a continuation application of U.S. patent application Ser. No. 16/024,854 filed Jun. 30, 2018, now U.S. Pat. No. 11,200,186, which is incorporated herein by reference.

STATEMENT REGARDING FEDERALLY SPONSORED RESEARCH AND DEVELOPMENT

This invention was made with Government support under contract number H98230-13-D-0124 awarded by the Department of Defense. The Government has certain rights in this invention.

TECHNICAL FIELD

The disclosure relates generally to electronics, and, more specifically, an embodiment of the disclosure relates to circuitry to control unstructured data flow in a configurable spatial accelerator.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 3A illustrates a program source according to embodiments of the disclosure.

FIG. 3B illustrates a dataflow graph for the program source of FIG. 3A according to embodiments of the disclosure.

FIG. 3C illustrates an accelerator with a plurality of processing elements configured to execute the dataflow graph of FIG. 3B according to embodiments of the disclosure.

FIG. 5 illustrates a program source according to embodiments of the disclosure.

FIG. 39 illustrates a count determiner state machine according to embodiments of the disclosure.

FIG. 40 illustrates an enqueue determiner state machine according to embodiments of the disclosure.

FIG. 41 illustrates a Not Full determiner state machine according to embodiments of the disclosure.

FIG. 42 illustrates a Not Empty determiner state machine according to embodiments of the disclosure.

FIG. 43 illustrates a valid determiner state machine according to embodiments of the disclosure.

FIG. 49 illustrates a count determiner state machine according to embodiments of the disclosure.

FIG. 50 illustrates an enqueue determiner state machine according to embodiments of the disclosure.

FIG. 51 illustrates a Not Full determiner state machine according to embodiments of the disclosure.

FIG. 52 illustrates a Not Empty determiner state machine according to embodiments of the disclosure.

FIG. 53 illustrates a valid determiner state machine according to embodiments of the disclosure.

FIGS. 74A-74E illustrate a processing element performing a Last operation according to embodiments of the disclosure.

FIGS. 78A-78E illustrate a processing element performing an OnEnd operation according to embodiments of the disclosure.

FIGS. 84-86 indicate the state machines for the output controller of a transmitter PE for a NetPack operation according to embodiments of the disclosure.

FIGS. 87-93 indicate the state machines for an input controller of a receiver PE for a NetPack operation according to embodiments of the disclosure.

FIG. 94 illustrates a tail determiner state machine according to embodiments of the disclosure.

FIG. 95 illustrates a count determiner state machine 9500 according to embodiments of the disclosure.

FIGS. 101A-101G illustrate a processing element performing a Nestrepeat operation according to embodiments of the disclosure.

FIG. 110 illustrates example definitions for the control bit fields of FIG. 109 according to embodiments of the disclosure.

FIGS. 116A-116G illustrate a buffer box element performing a controlled repeat operation while in Repeat-controlled mode according to embodiments of the disclosure.

FIGS. 118A-118G illustrate a buffer box element performing a streaming unload operation while in Streaming-unload RAM mode according to embodiments of the disclosure

FIG. 120 illustrates an accelerator tile embodiment of a CSA according to embodiments of the disclosure.

FIGS. 121A-121H illustrate a buffer box element performing a storage operation while in stack mode according to embodiments of the disclosure.

FIGS. 122A-122G illustrate a buffer box element performing a storage operation while in completion buffer mode according to embodiments of the disclosure.

FIGS. 123A-123G illustrate a buffer box element performing a storage operation while in overflow buffer mode according to embodiments of the disclosure.

FIG. 124 illustrates a plurality of request address file (RAF) circuits (e.g., RAF circuit) coupled between an accelerator tile and a plurality of cache banks (1)-(6) according to embodiments of the disclosure.

FIGS. 125A-125D illustrate a buffer box element performing a fast clearing operation while fast clearing mode is enabled according to embodiments of the disclosure.

FIG. 126 illustrates a processing element (PE) that includes fountain functionality according to embodiments of the disclosure.

FIG. 127 illustrates a processing element (PE) that includes fountain functionality from a shifter circuit according to embodiments of the disclosure.

FIG. 128 illustrates fountain functionality for a sequencer dataflow operator implementation on processing elements according to embodiments of the disclosure.

FIG. 129 illustrates a flow diagram according to embodiments of the disclosure.

FIG. 130 illustrates a compilation toolchain for an accelerator according to embodiments of the disclosure.

FIG. 131 illustrates a compiler for an accelerator according to embodiments of the disclosure.

FIG. 132A illustrates sequential assembly code according to embodiments of the disclosure.

FIG. 132B illustrates dataflow assembly code for the sequential assembly code of FIG. 132A according to embodiments of the disclosure.

Figure 132C:
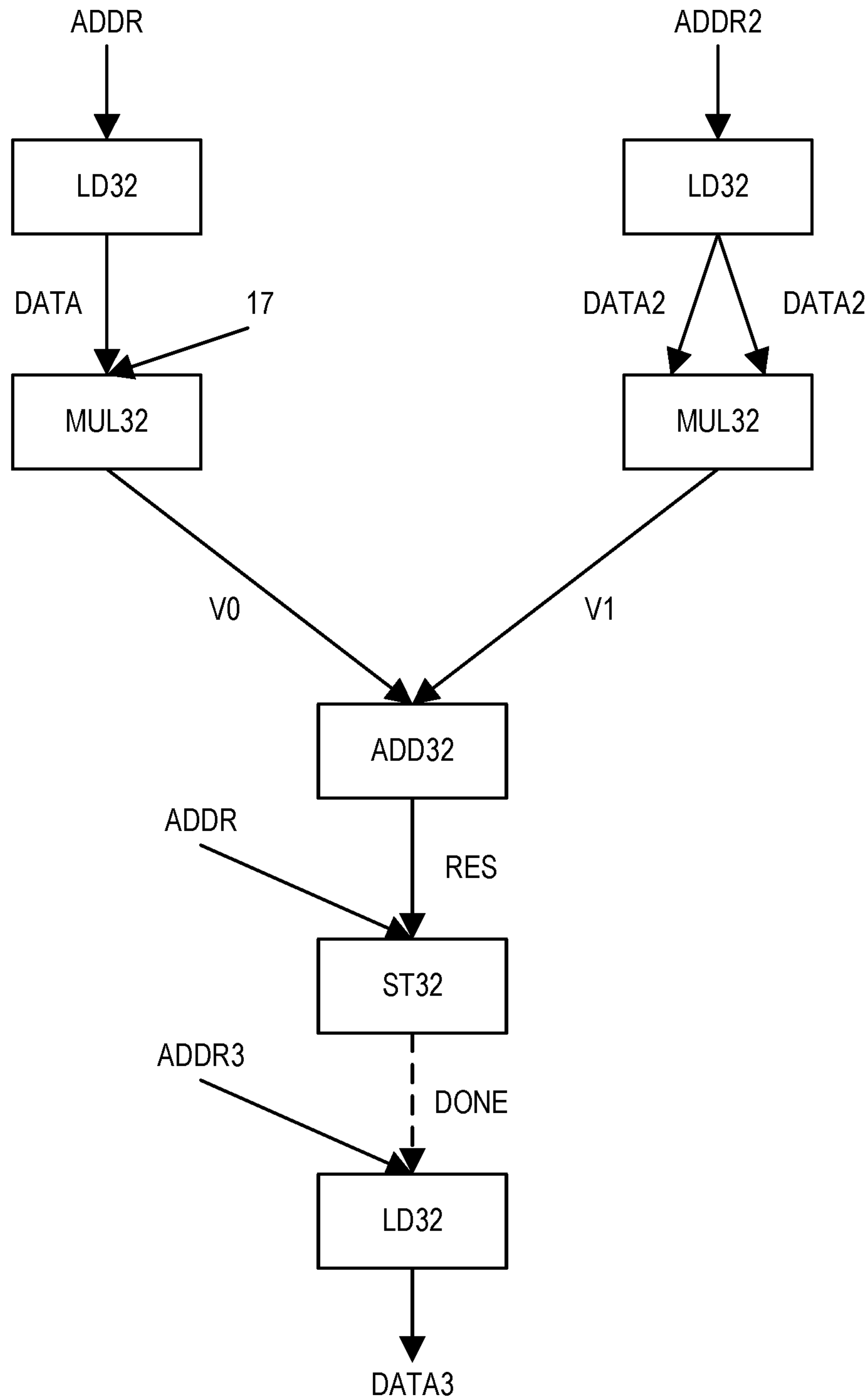

FIG. 132C illustrates a dataflow graph for the dataflow assembly code of FIG. 132B for an accelerator according to embodiments of the disclosure.

FIG. 133A illustrates C source code according to embodiments of the disclosure.

FIG. 133B illustrates dataflow assembly code for the C source code of FIG. 133A according to embodiments of the disclosure.

Figure 133C:
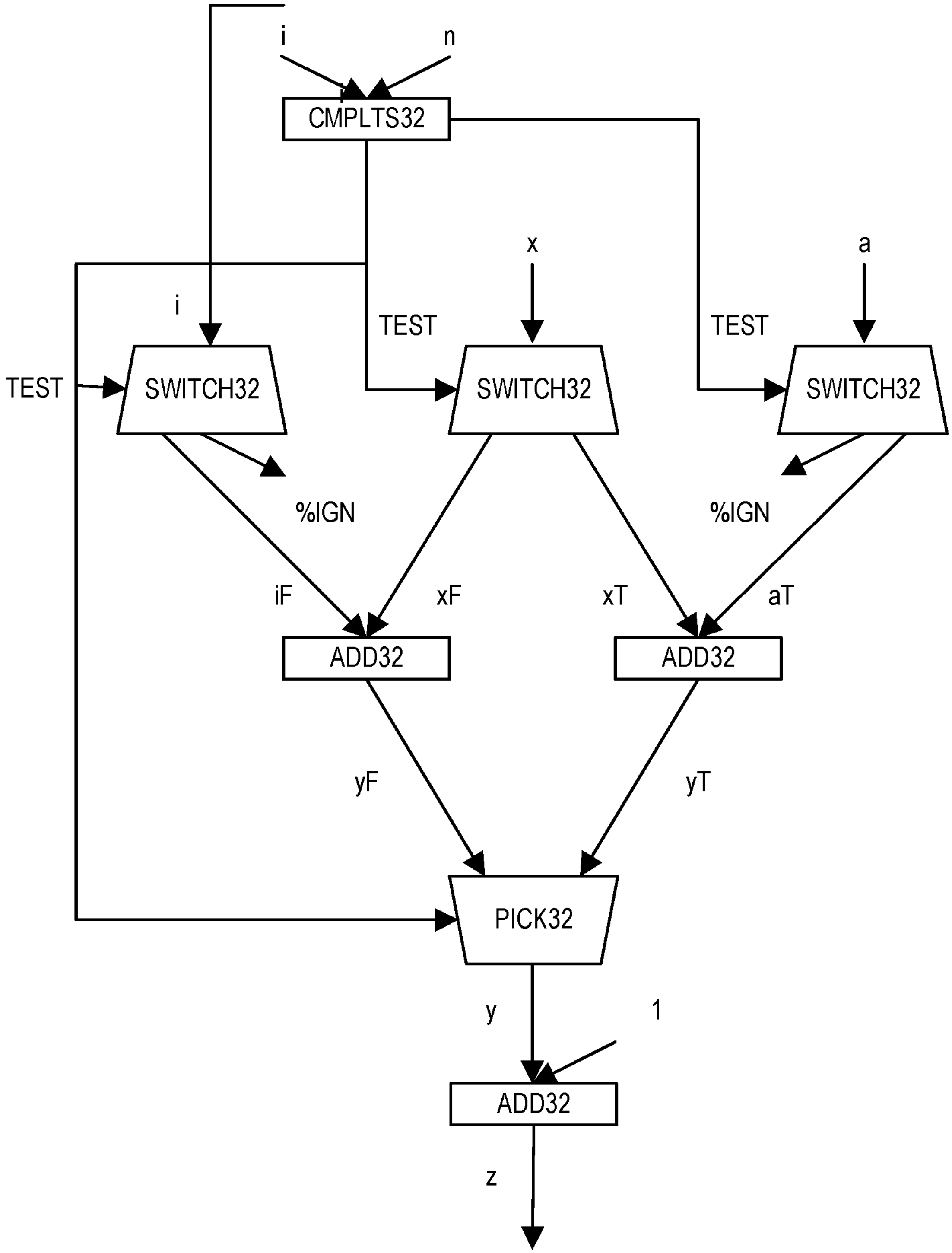

FIG. 133C illustrates a dataflow graph for the dataflow assembly code of FIG. 133B for an accelerator according to embodiments of the disclosure.

FIG. 134A illustrates C source code according to embodiments of the disclosure.

FIG. 134B illustrates dataflow assembly code for the C source code of FIG. 134A according to embodiments of the disclosure.

Figure 134C:
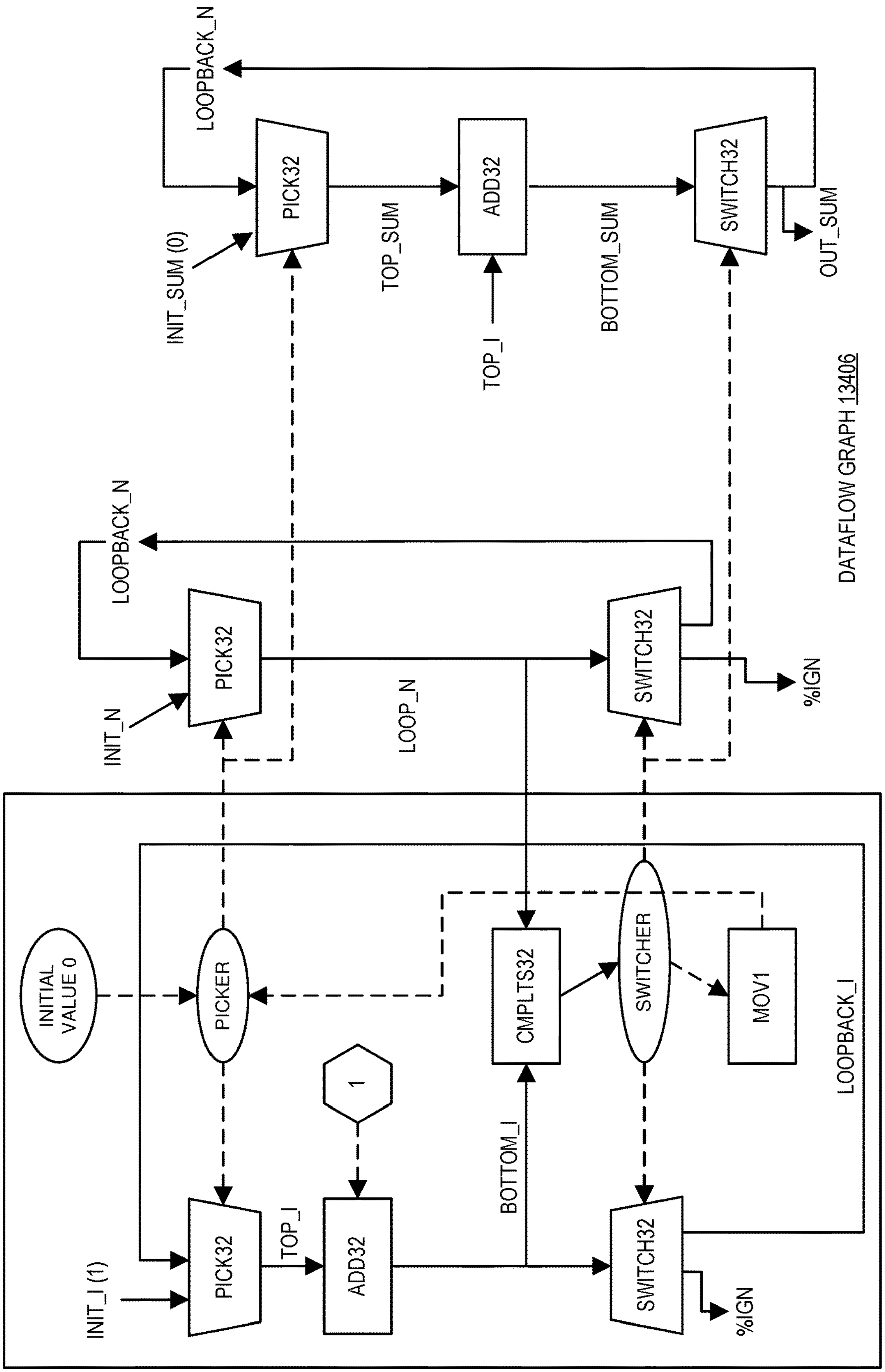

FIG. 134C illustrates a dataflow graph for the dataflow assembly code of FIG. 134B for an accelerator according to embodiments of the disclosure.

Figure 135A:
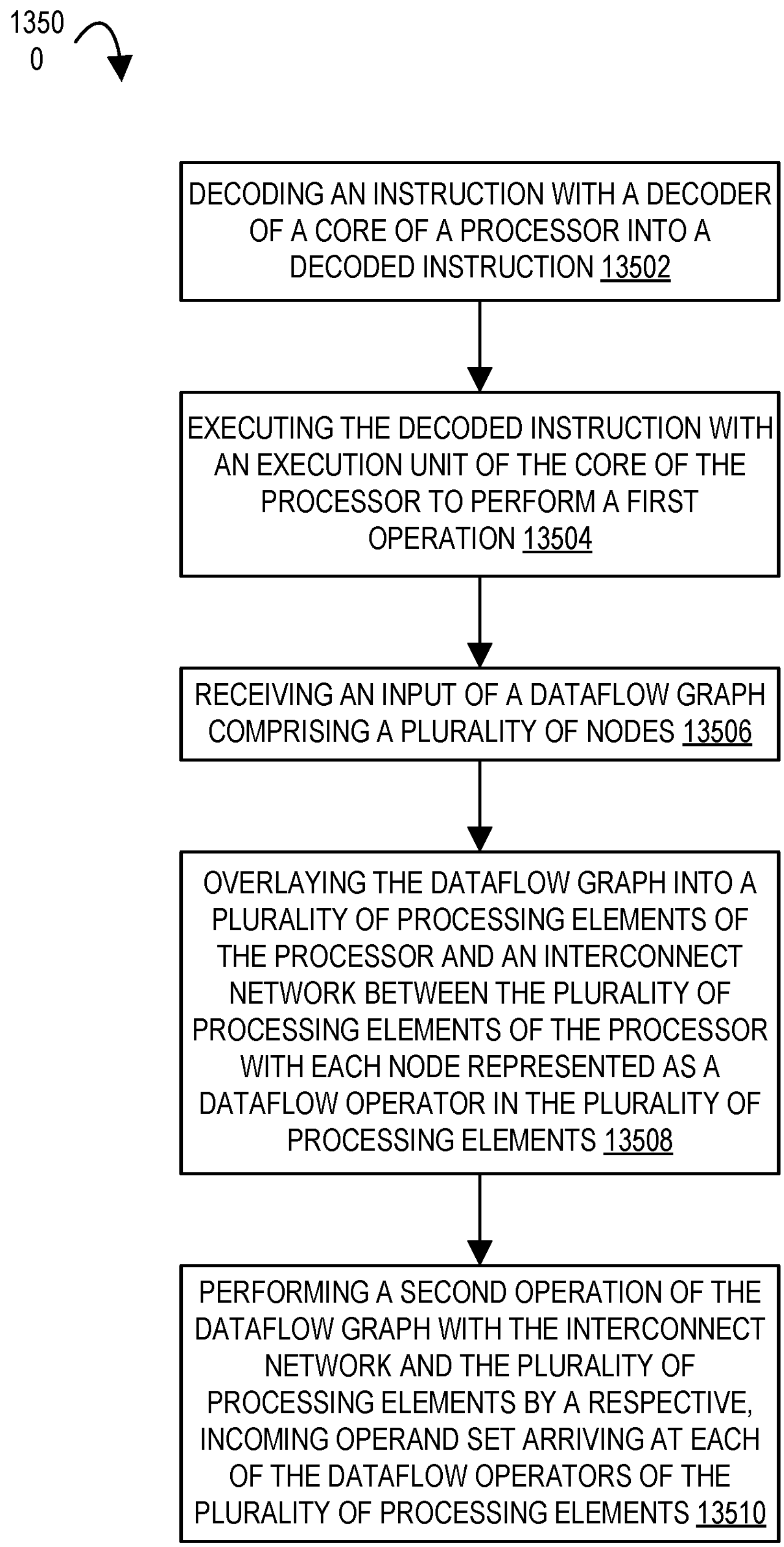

FIG. 135A illustrates a flow diagram according to embodiments of the disclosure.

Figure 135B:
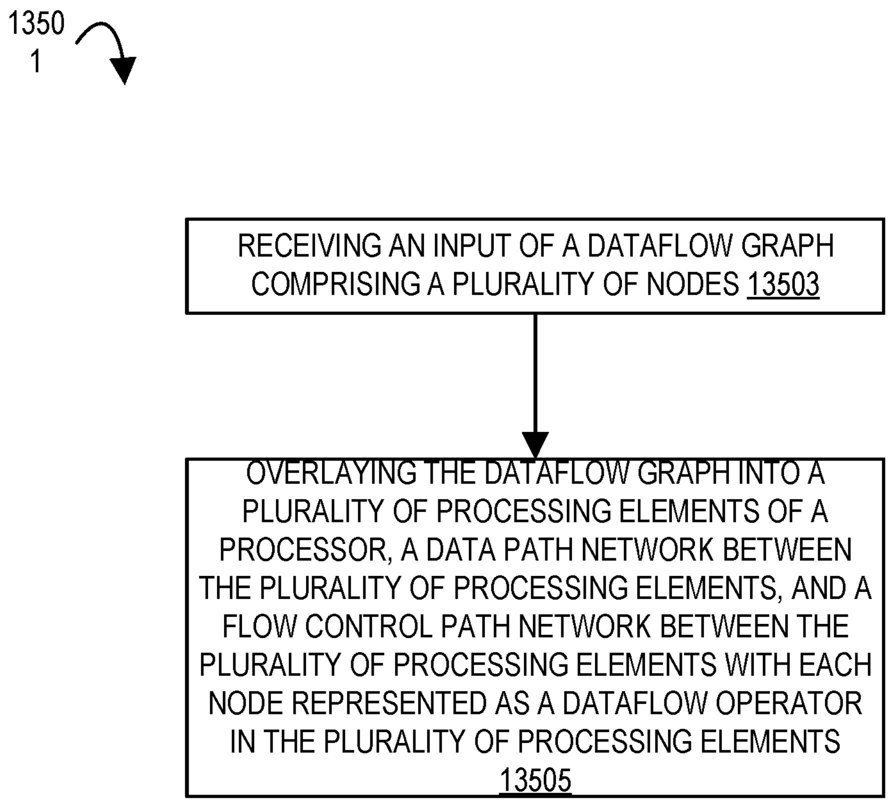

FIG. 135B illustrates a flow diagram according to embodiments of the disclosure.

Figure 136:
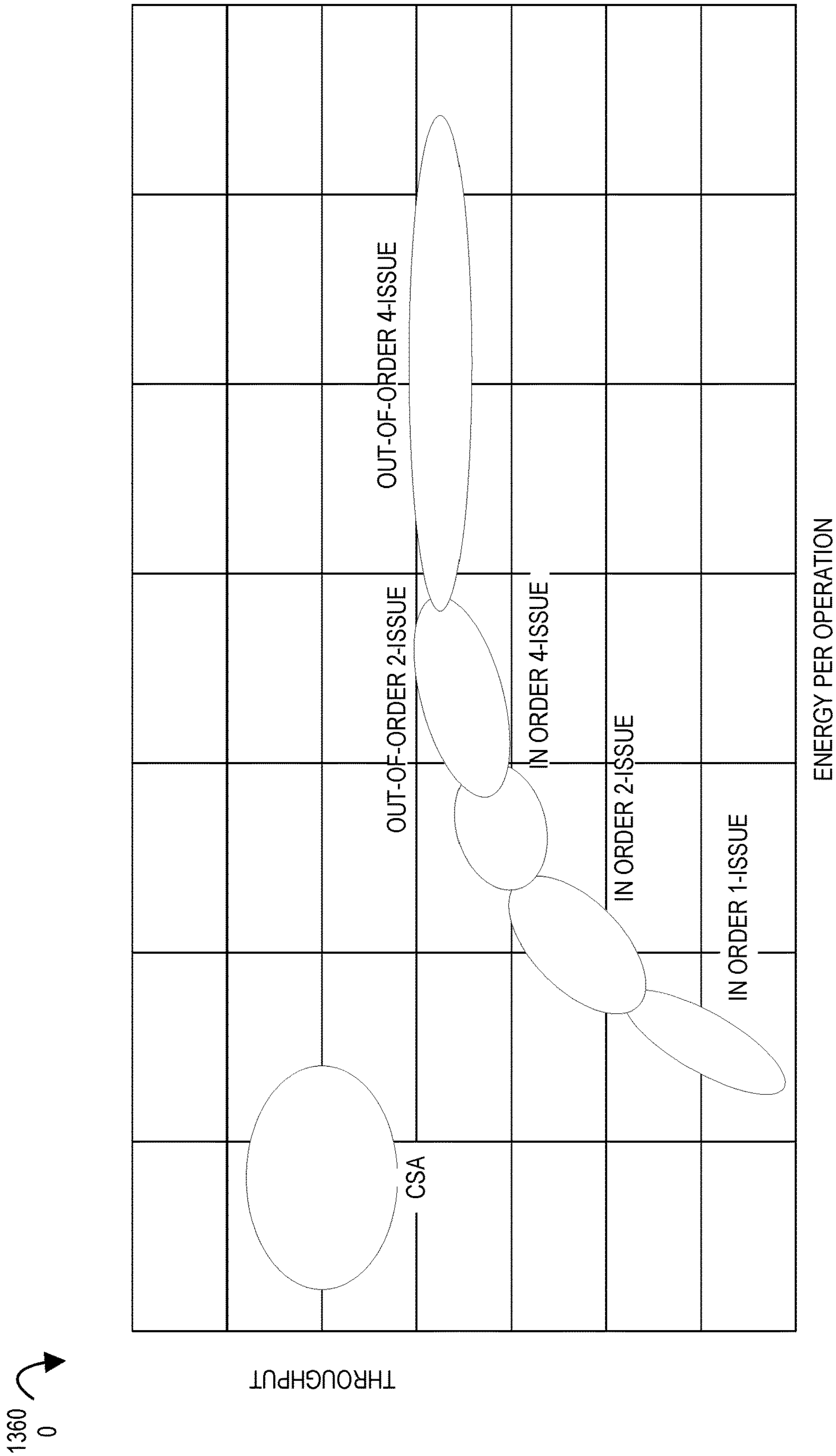

FIG. 136 illustrates a throughput versus energy per operation graph according to embodiments of the disclosure.

Figure 137:
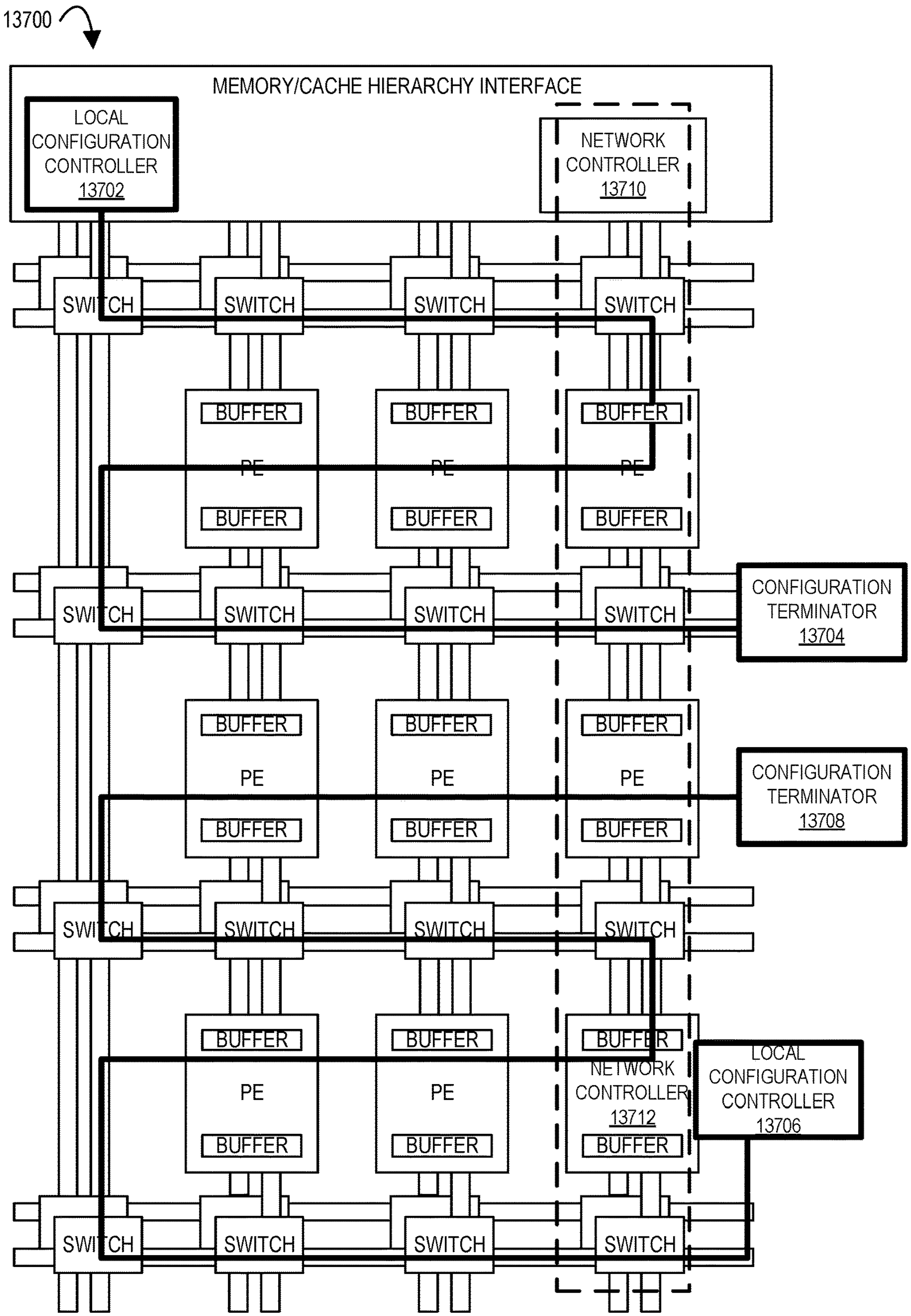

FIG. 137 illustrates an accelerator tile comprising an array of processing elements and a local configuration controller according to embodiments of the disclosure.

Figure 138A:
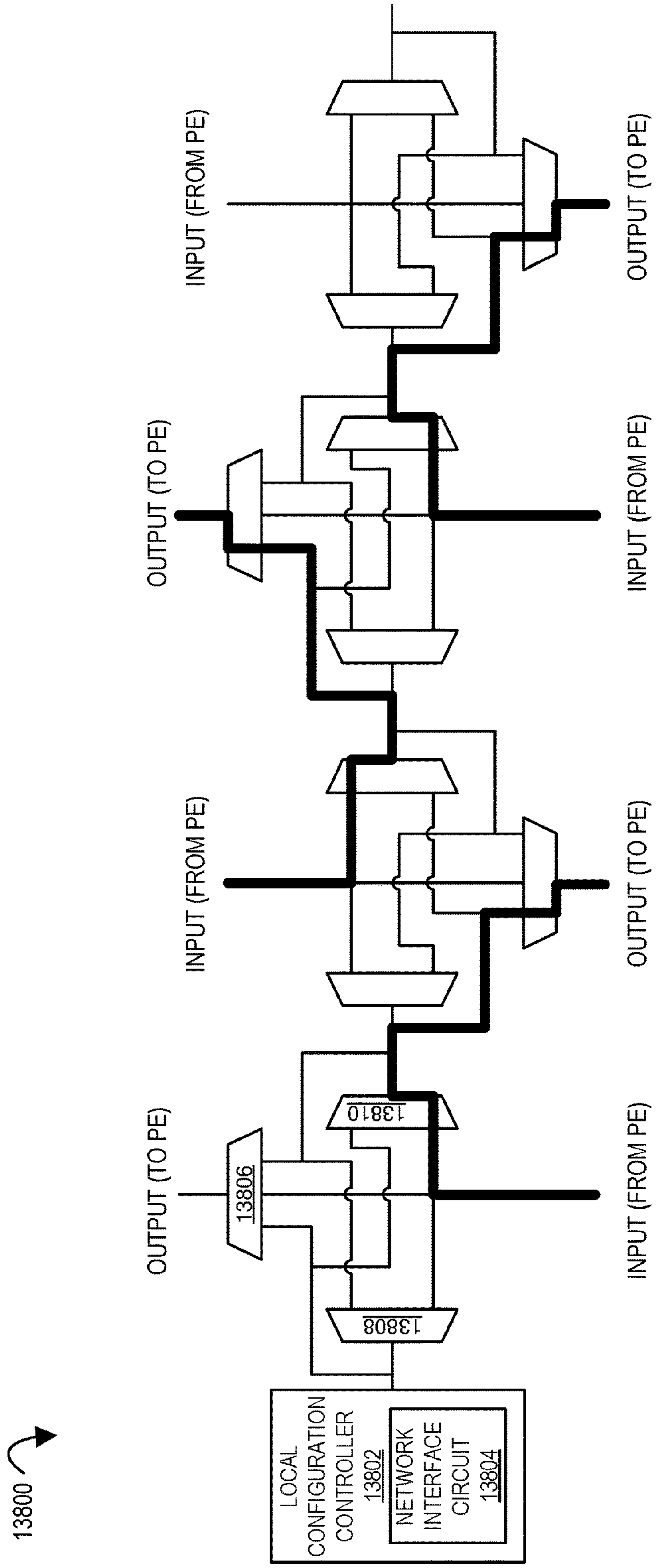
Figure 138B:
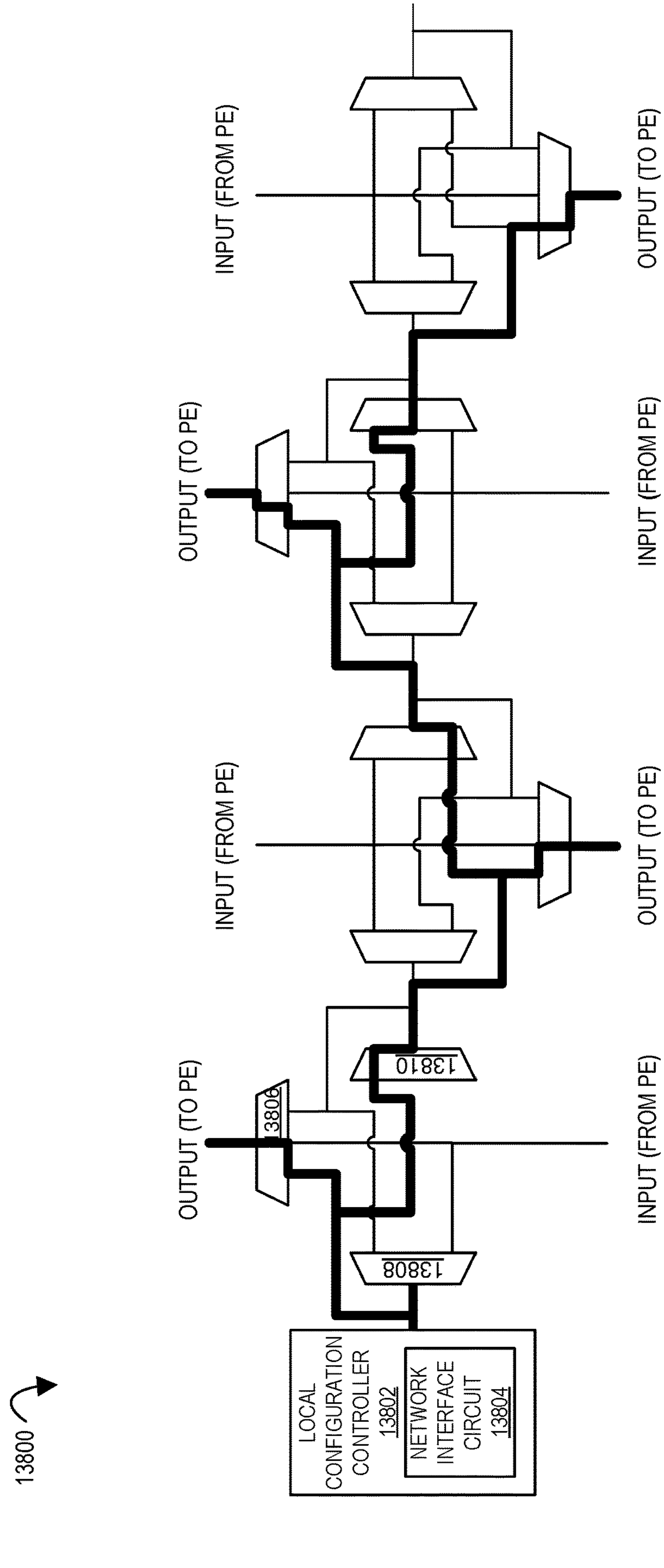
Figure 138C:
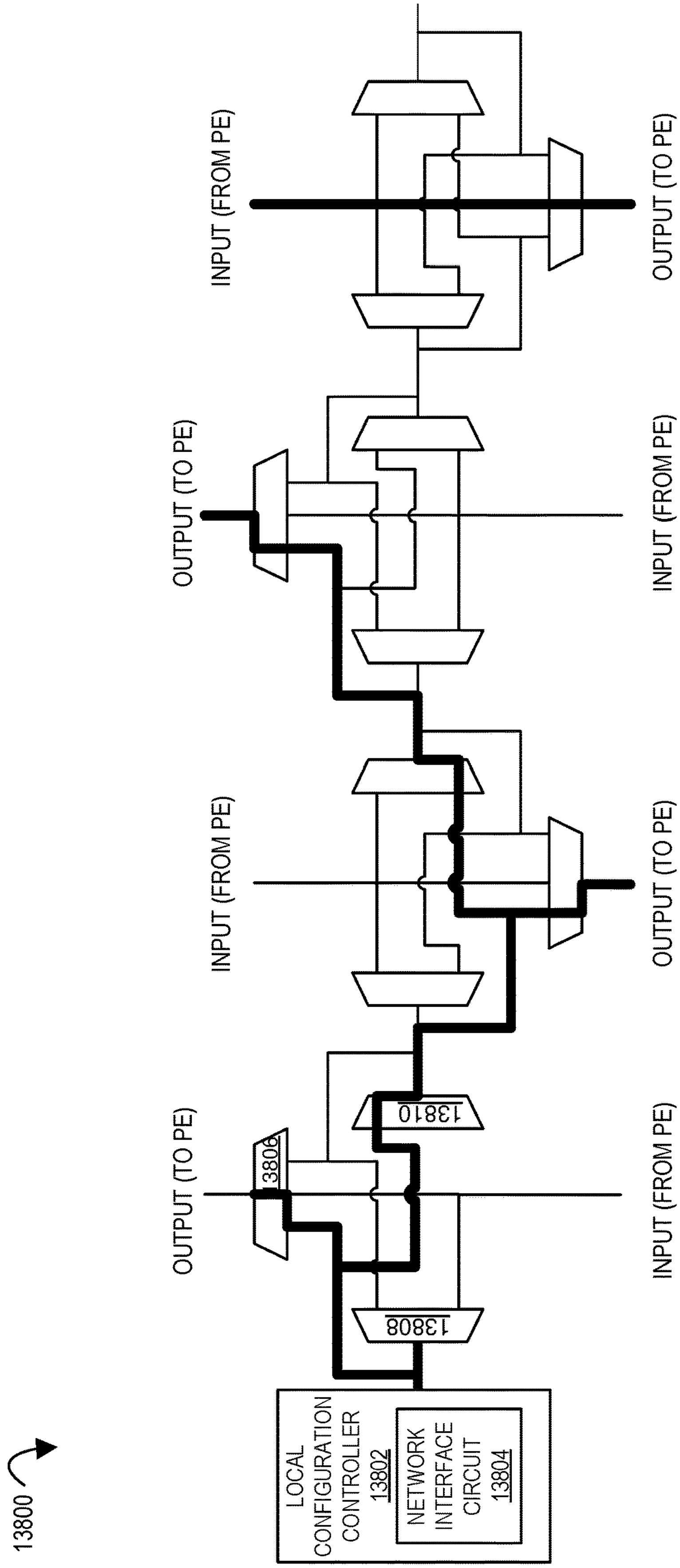

FIGS. 138A-138C illustrate a local configuration controller configuring a data path network according to embodiments of the disclosure.

Figure 139:
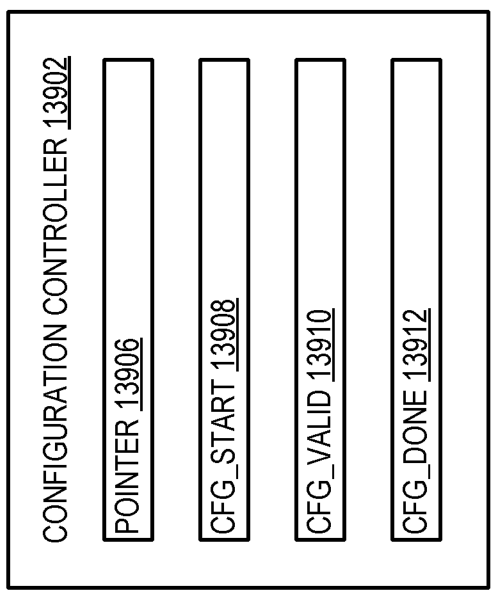

FIG. 139 illustrates a configuration controller according to embodiments of the disclosure.

Figure 140:
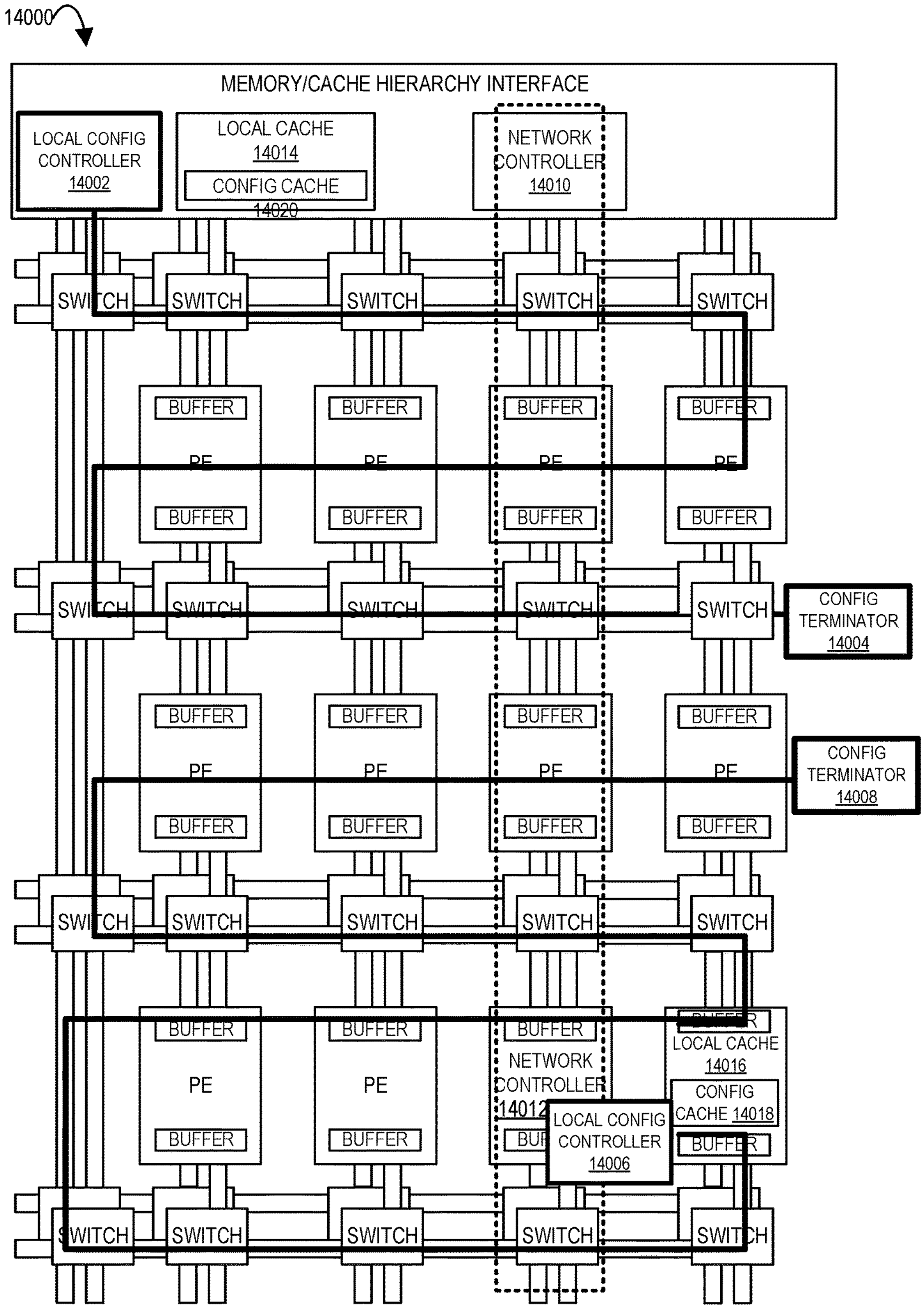

FIG. 140 illustrates an accelerator tile comprising an array of processing elements, a configuration cache, and a local configuration controller according to embodiments of the disclosure.

Figure 141:
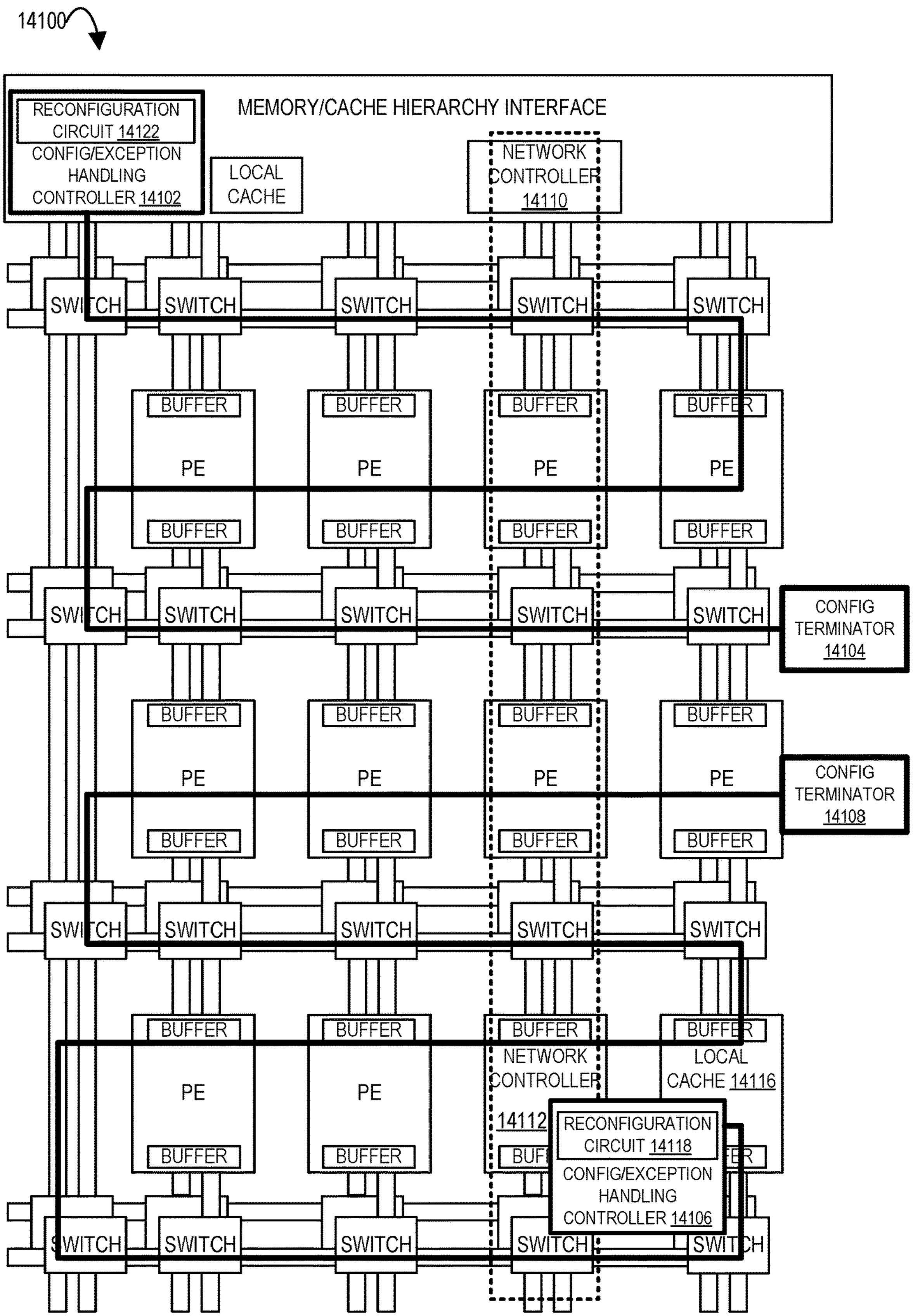

FIG. 141 illustrates an accelerator tile comprising an array of processing elements and a configuration and exception handling controller with a reconfiguration circuit according to embodiments of the disclosure.

Figure 142:
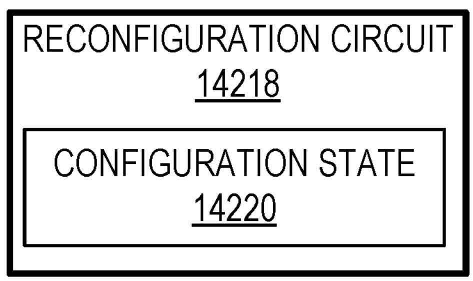

FIG. 142 illustrates a reconfiguration circuit according to embodiments of the disclosure.

Figure 143:
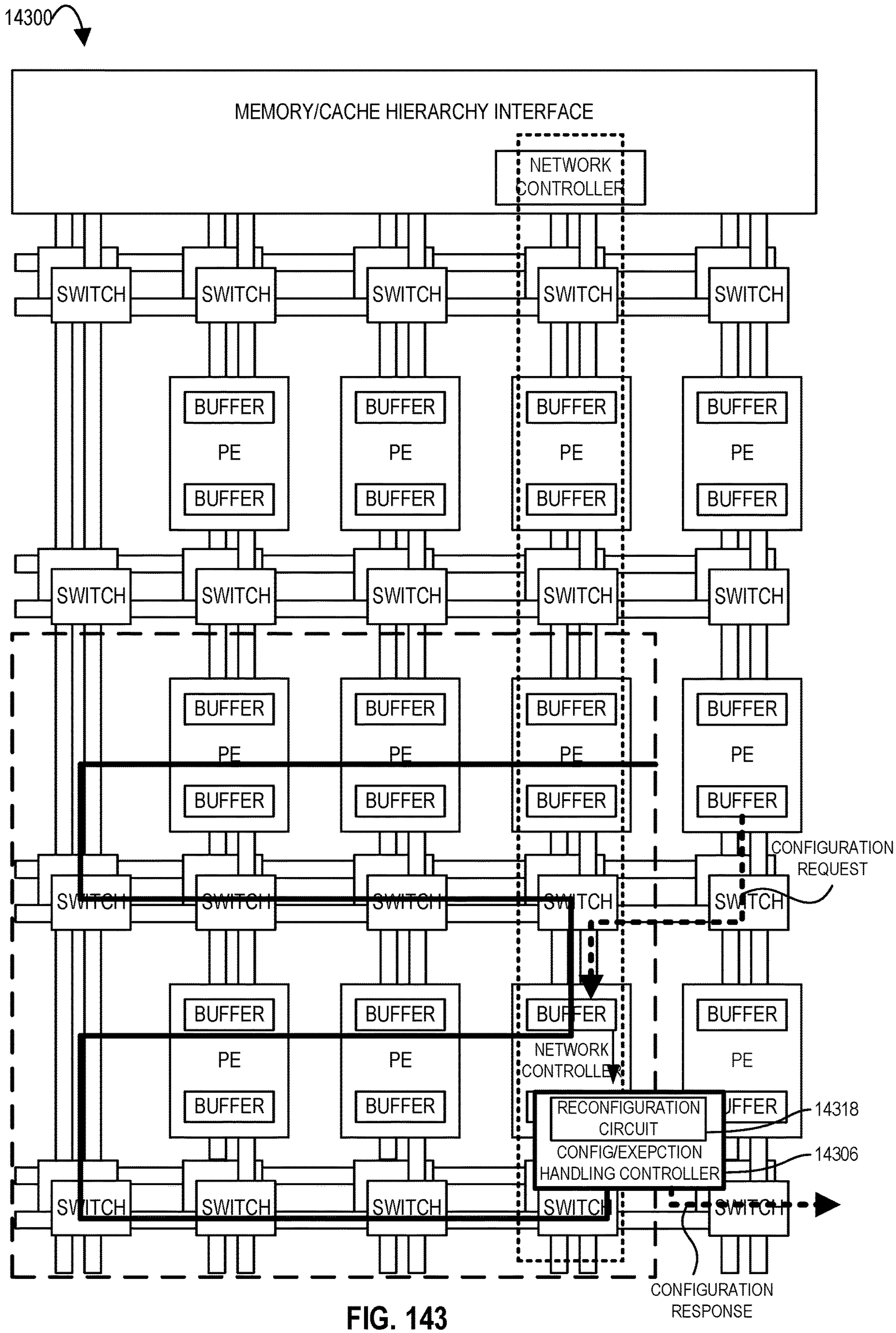

FIG. 143 illustrates an accelerator tile comprising an array of processing elements and a configuration and exception handling controller with a reconfiguration circuit according to embodiments of the disclosure.

Figure 144:
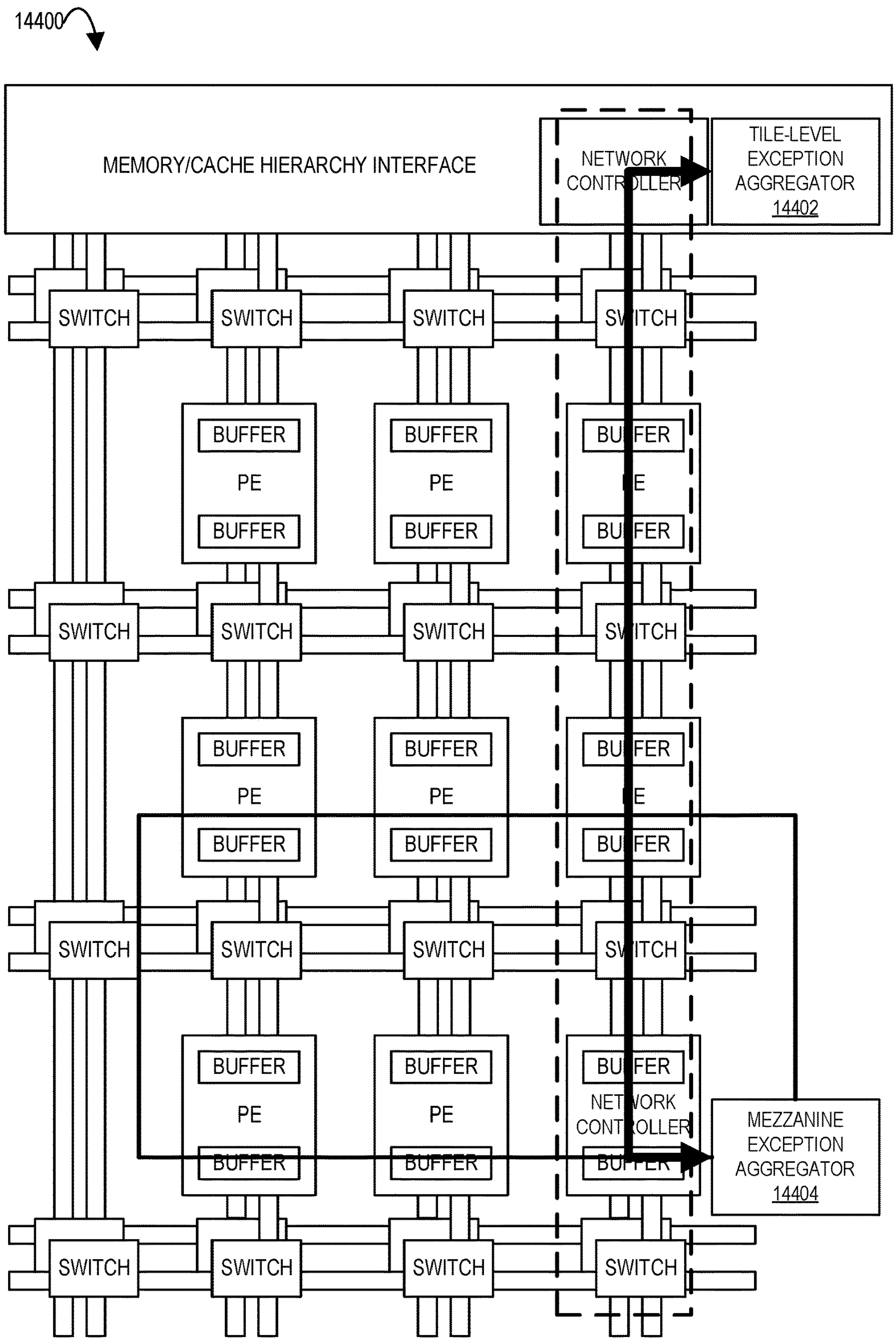

FIG. 144 illustrates an accelerator tile comprising an array of processing elements and a mezzanine exception aggregator coupled to a tile-level exception aggregator according to embodiments of the disclosure.

Figure 145:
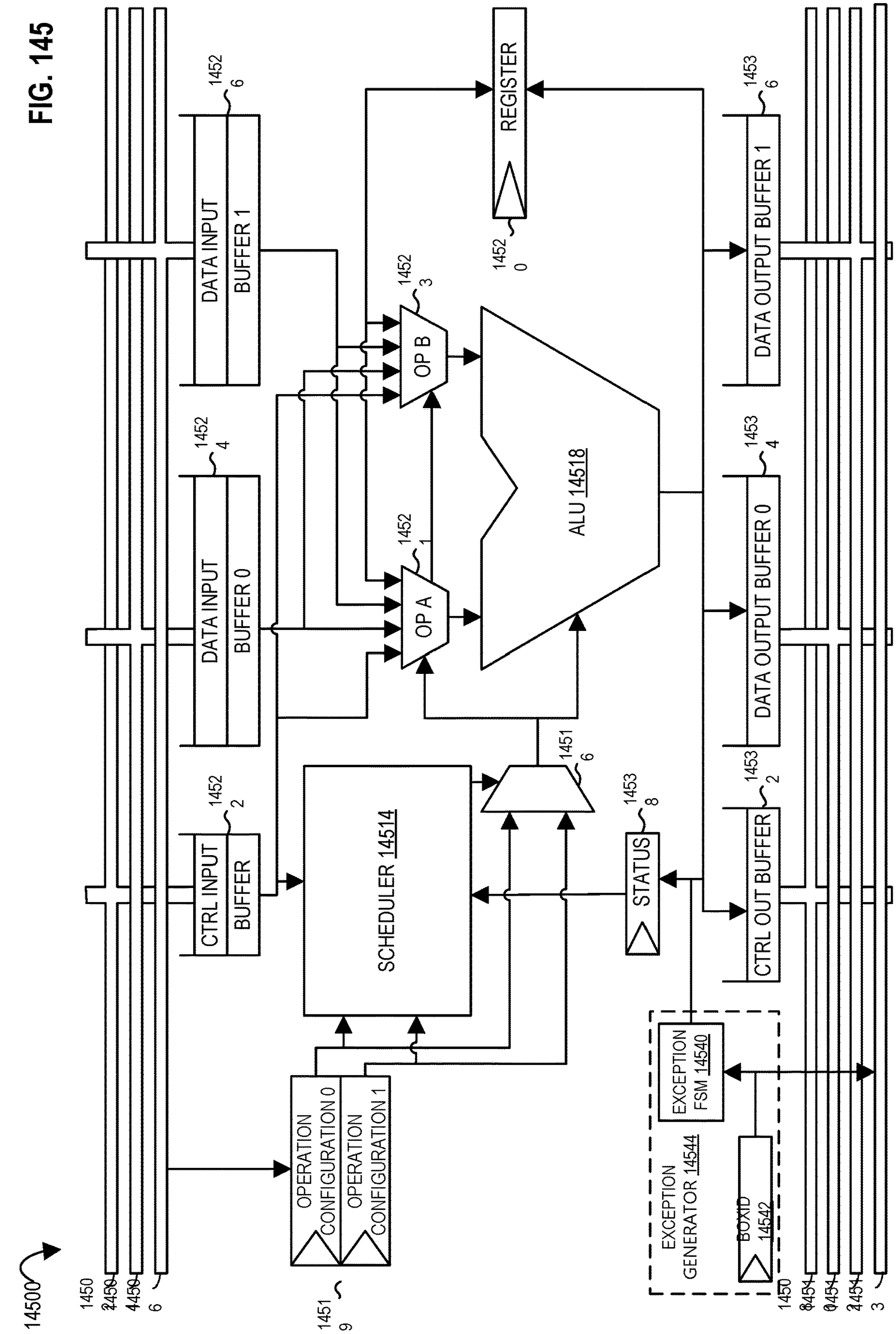

FIG. 145 illustrates a processing element with an exception generator according to embodiments of the disclosure.

Figure 146:
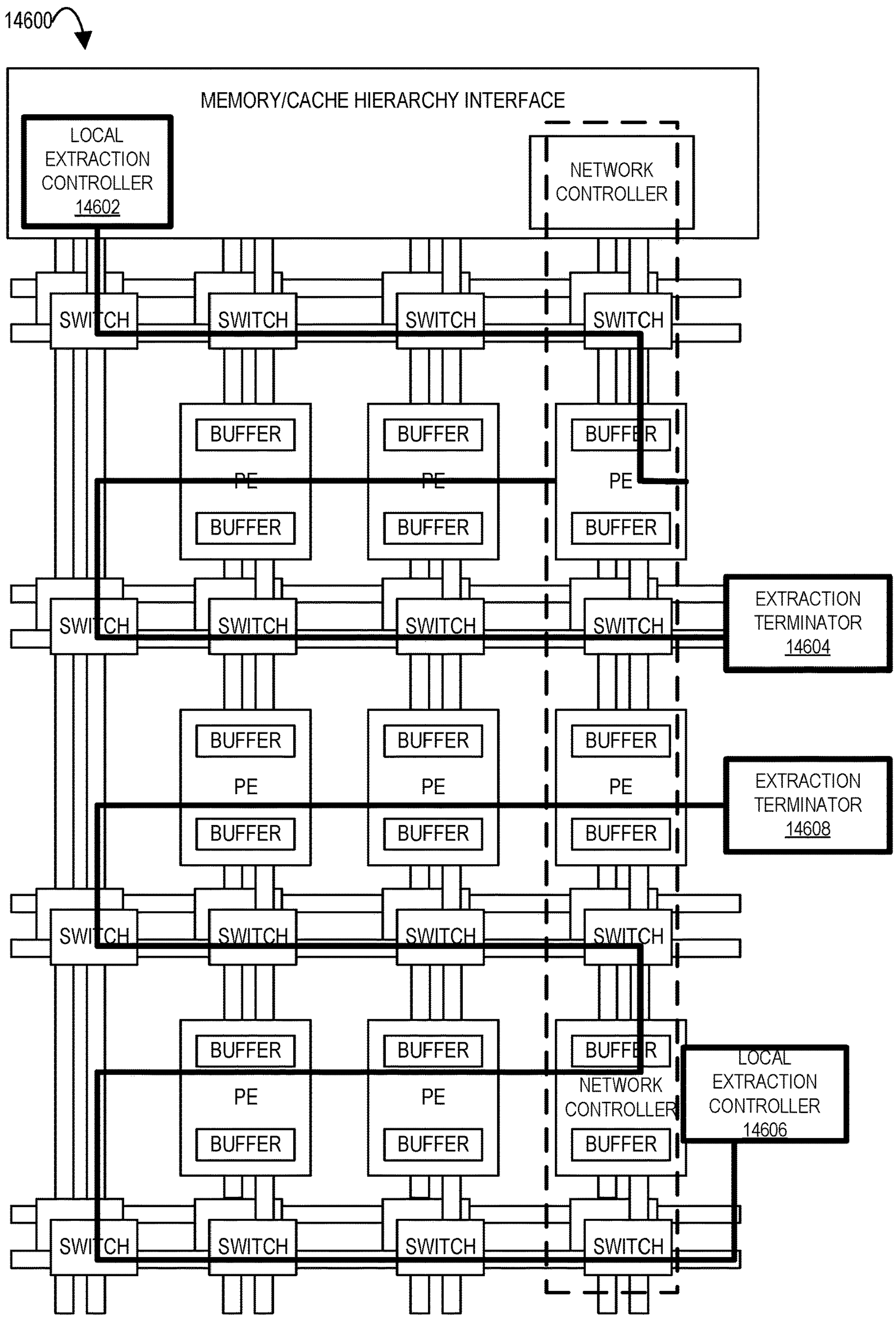

FIG. 146 illustrates an accelerator tile comprising an array of processing elements and a local extraction controller according to embodiments of the disclosure.

Figure 147A:
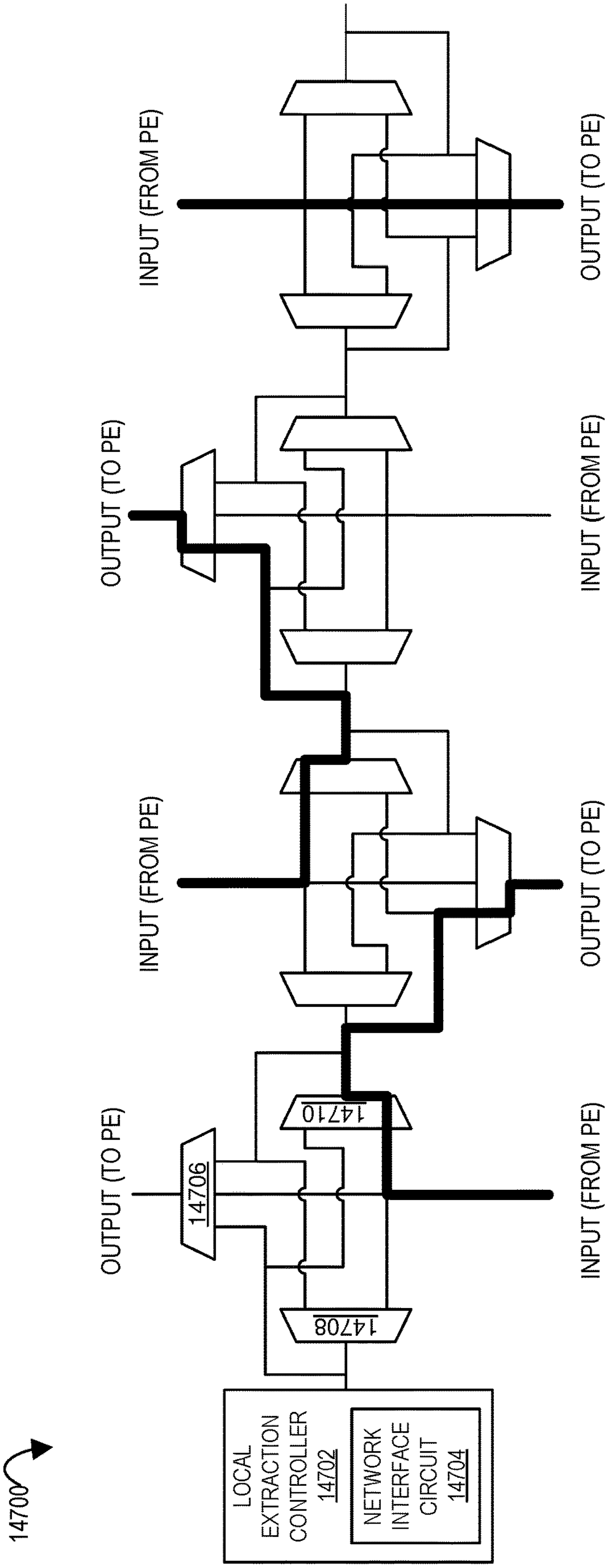
Figure 147B:
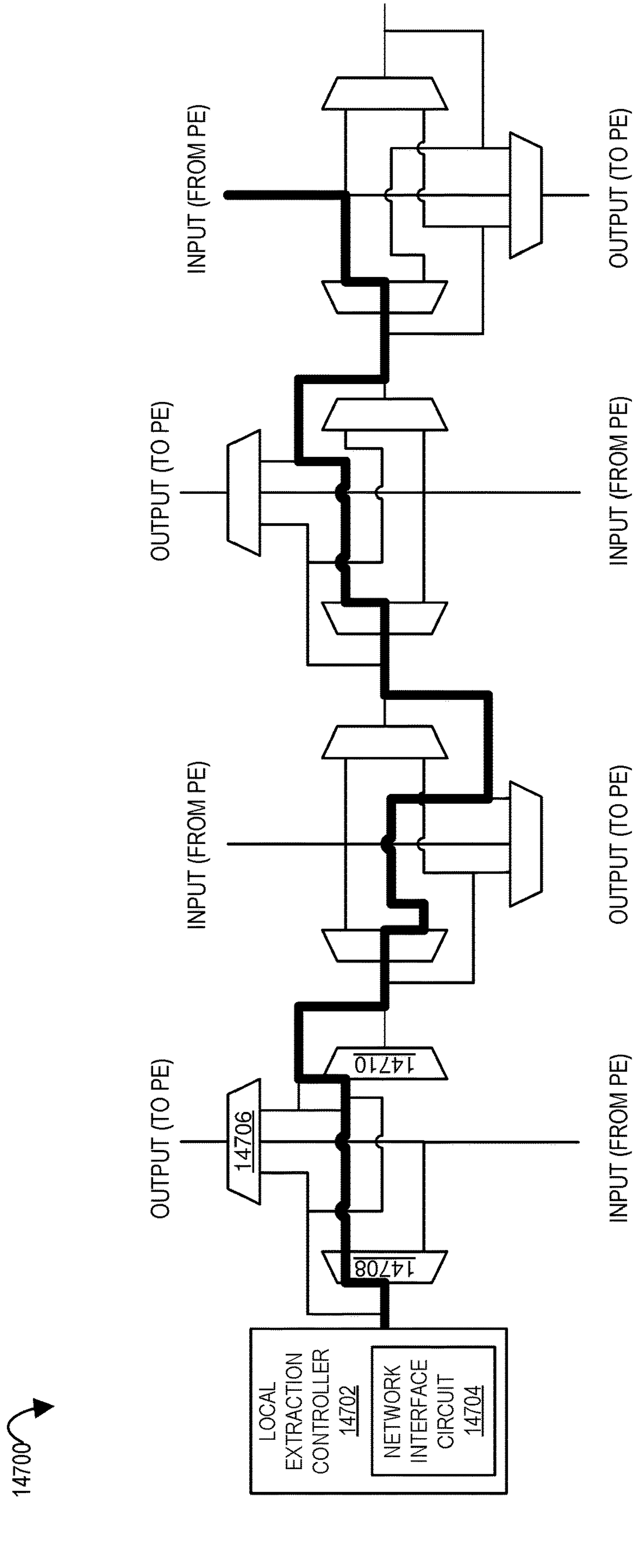
Figure 147C:
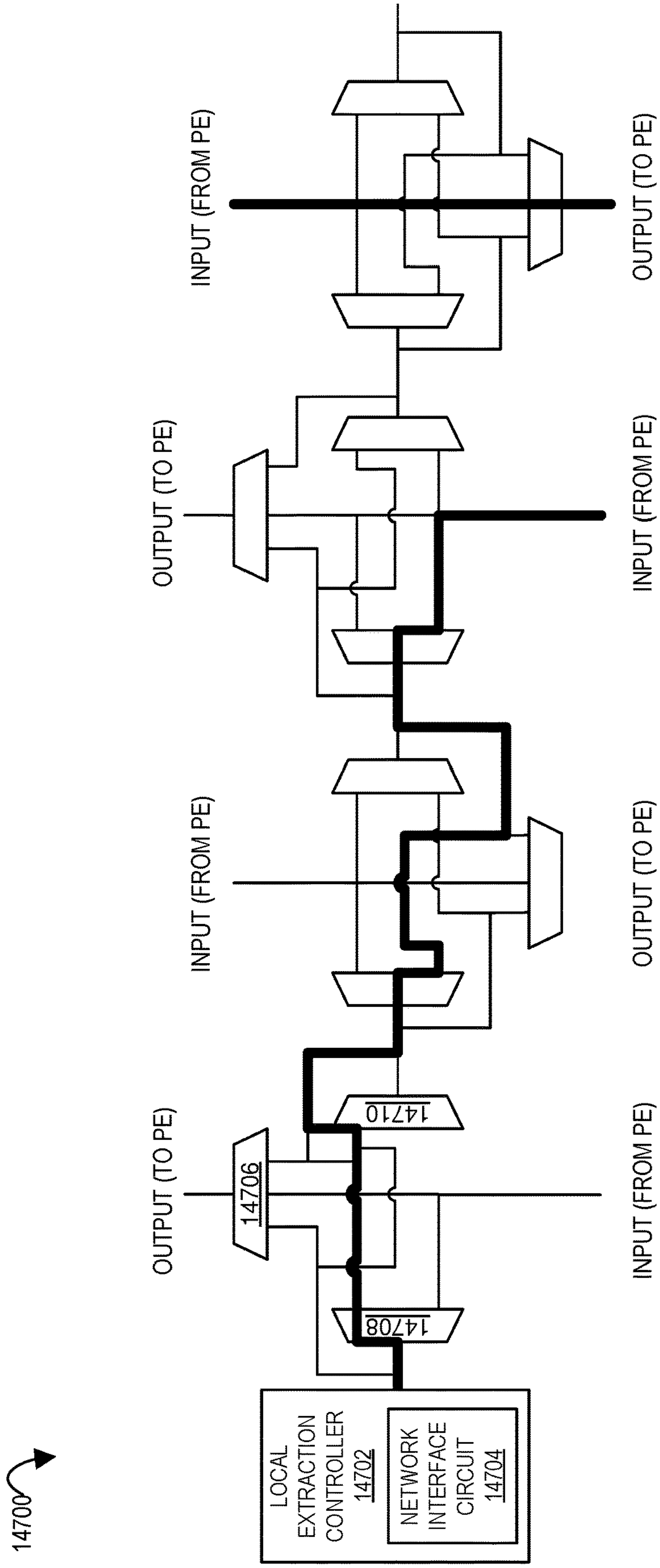

FIGS. 147A-147C illustrate a local extraction controller configuring a data path network according to embodiments of the disclosure.

Figure 148:
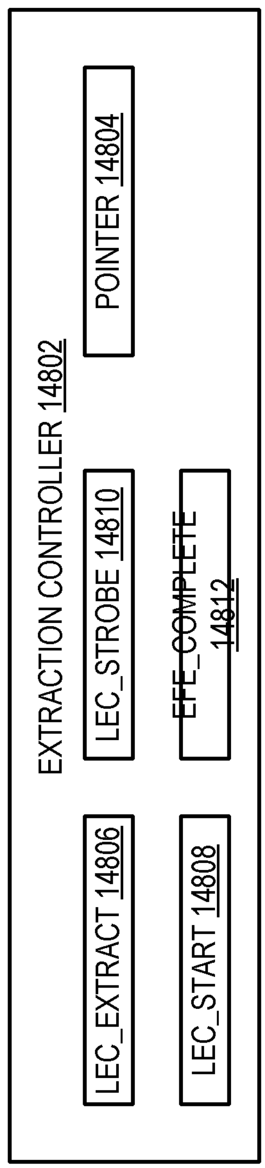

FIG. 148 illustrates an extraction controller according to embodiments of the disclosure.

Figure 149:
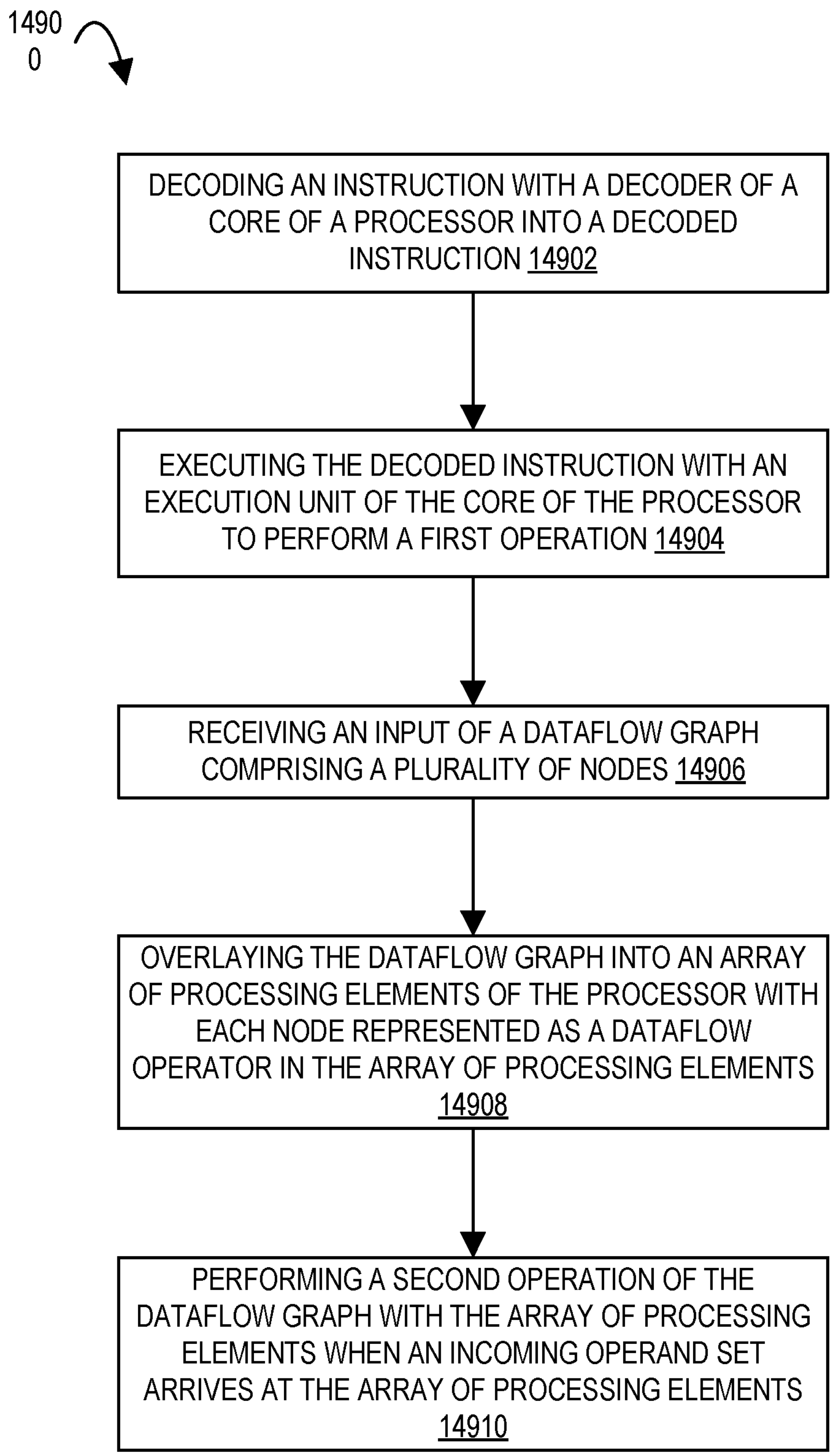

FIG. 149 illustrates a flow diagram according to embodiments of the disclosure.

Figure 150:
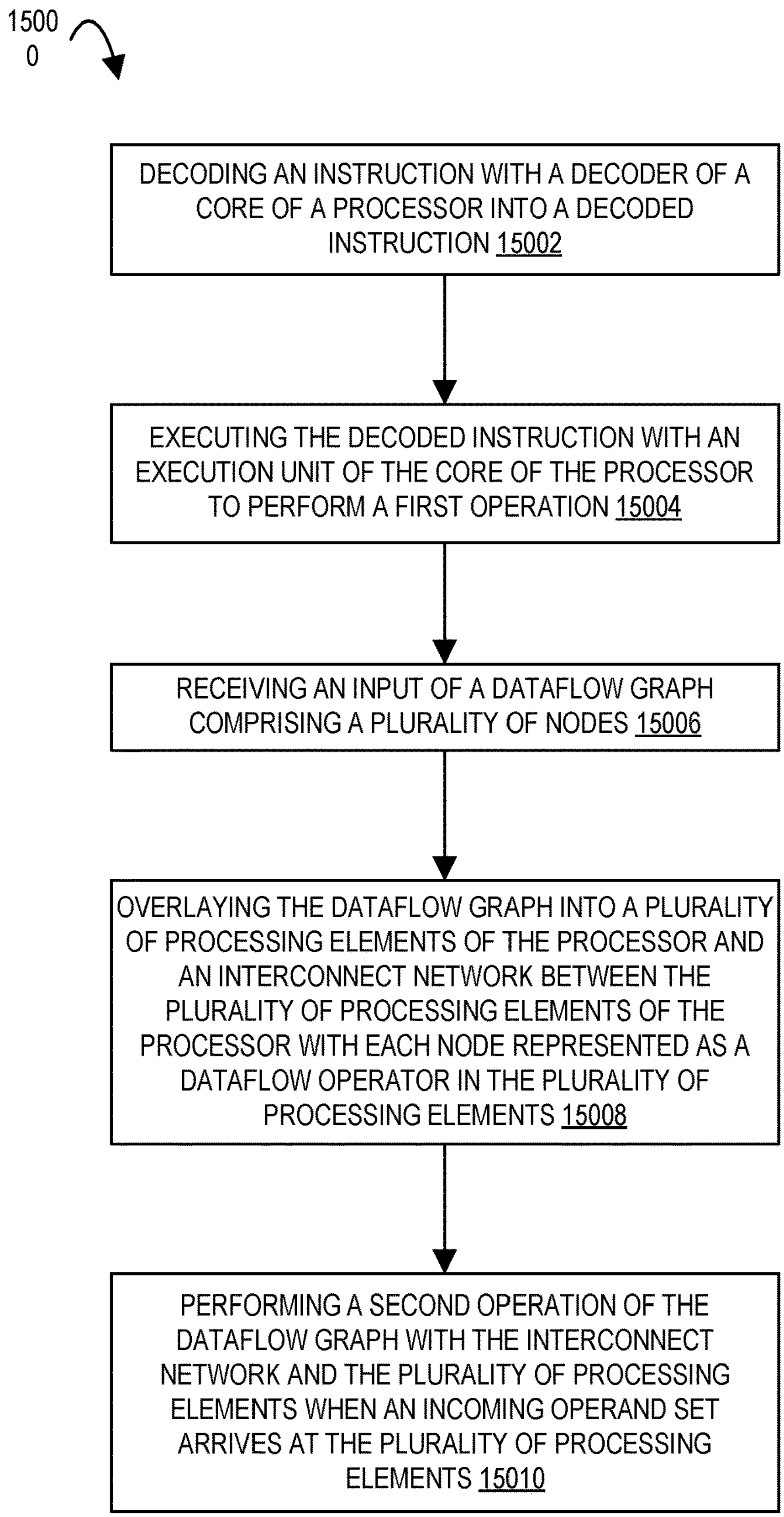

FIG. 150 illustrates a flow diagram according to embodiments of the disclosure.

Figure 151A:
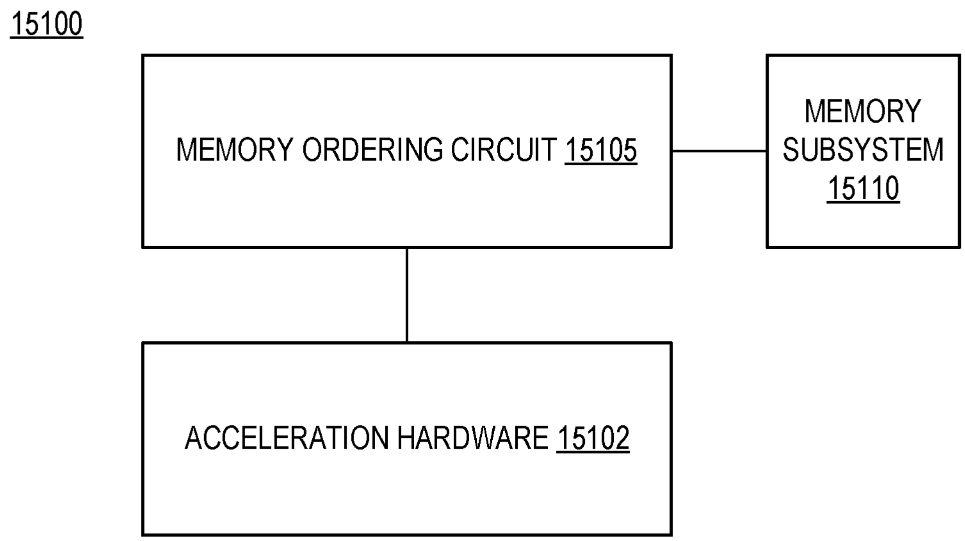

FIG. 151A is a block diagram of a system that employs a memory ordering circuit interposed between a memory subsystem and acceleration hardware according to embodiments of the disclosure.

Figure 151B:
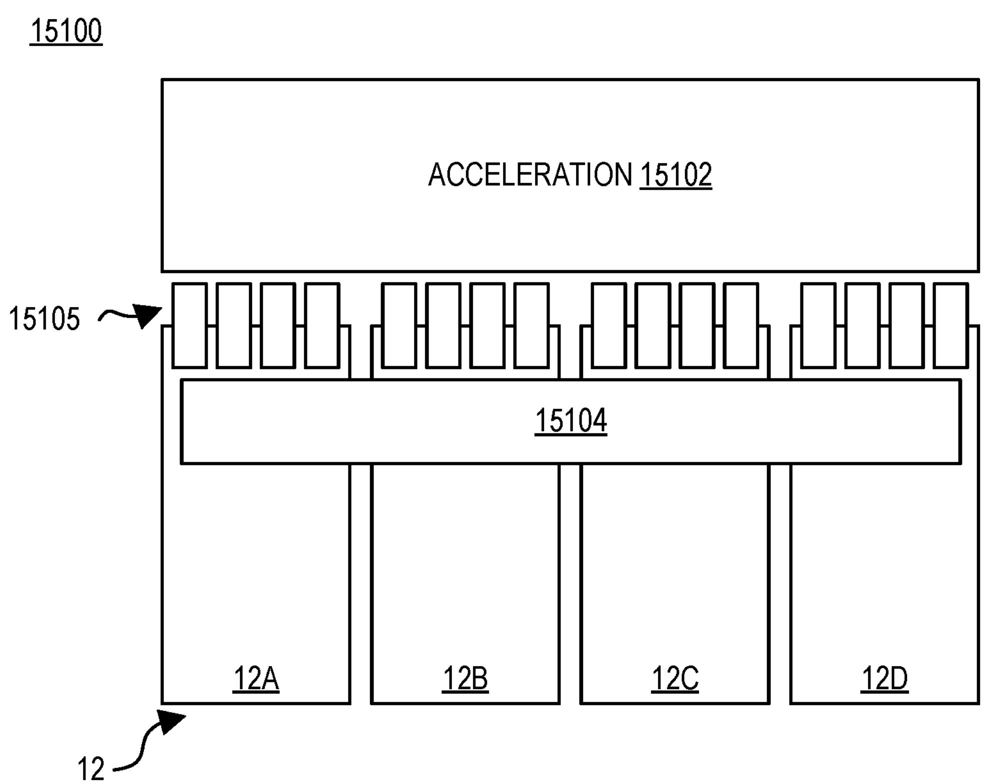

FIG. 151B is a block diagram of the system of FIG. 151A, but which employs multiple memory ordering circuits according to embodiments of the disclosure.

Figure 152:
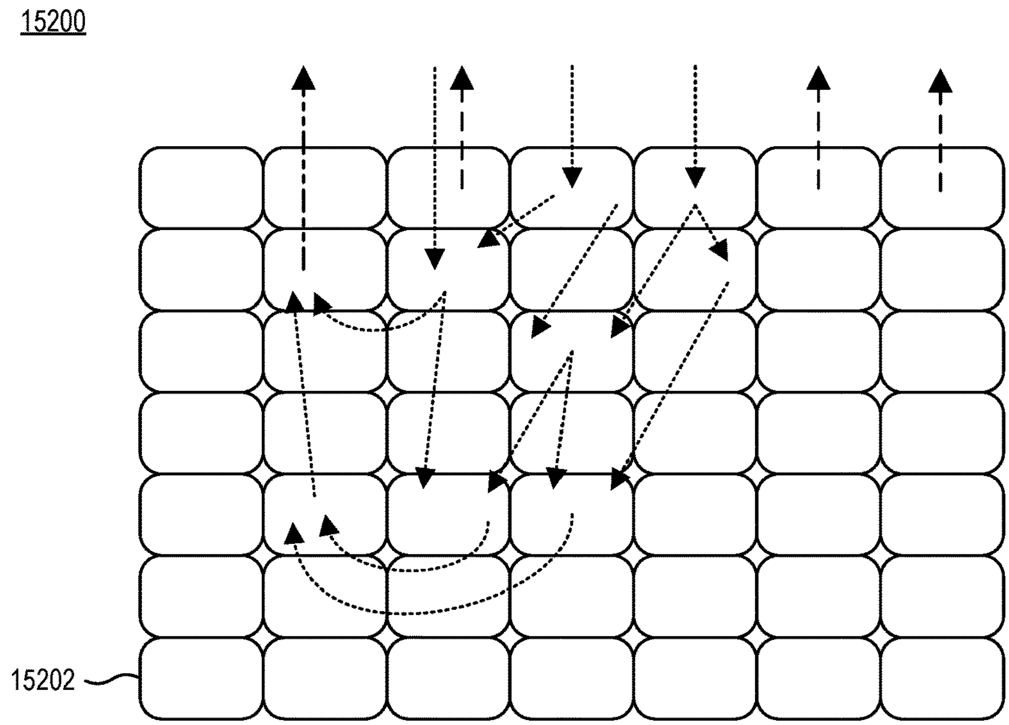

FIG. 152 is a block diagram illustrating general functioning of memory operations into and out of acceleration hardware according to embodiments of the disclosure.

Figure 153:
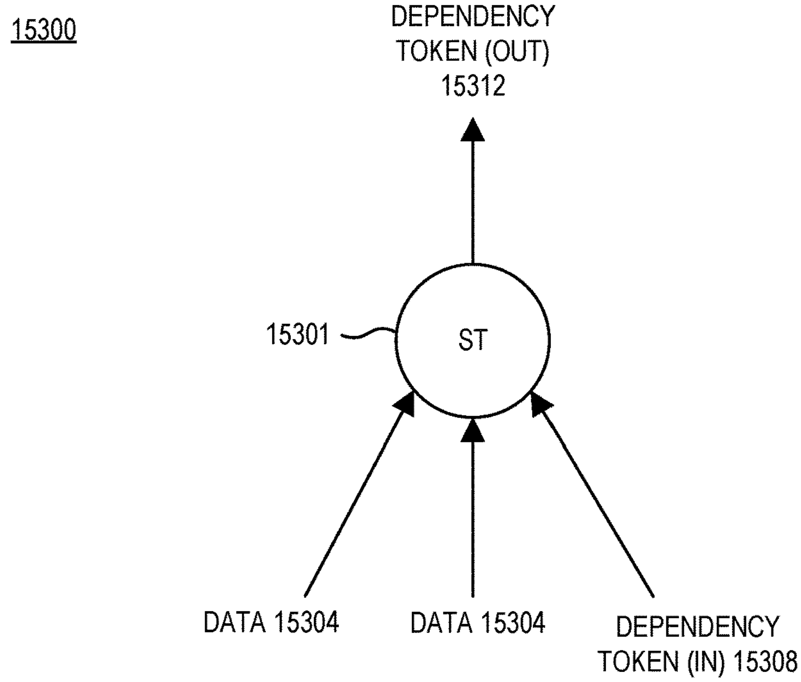

FIG. 153 is a block diagram illustrating a spatial dependency flow for a store operation according to embodiments of the disclosure.

Figure 154:
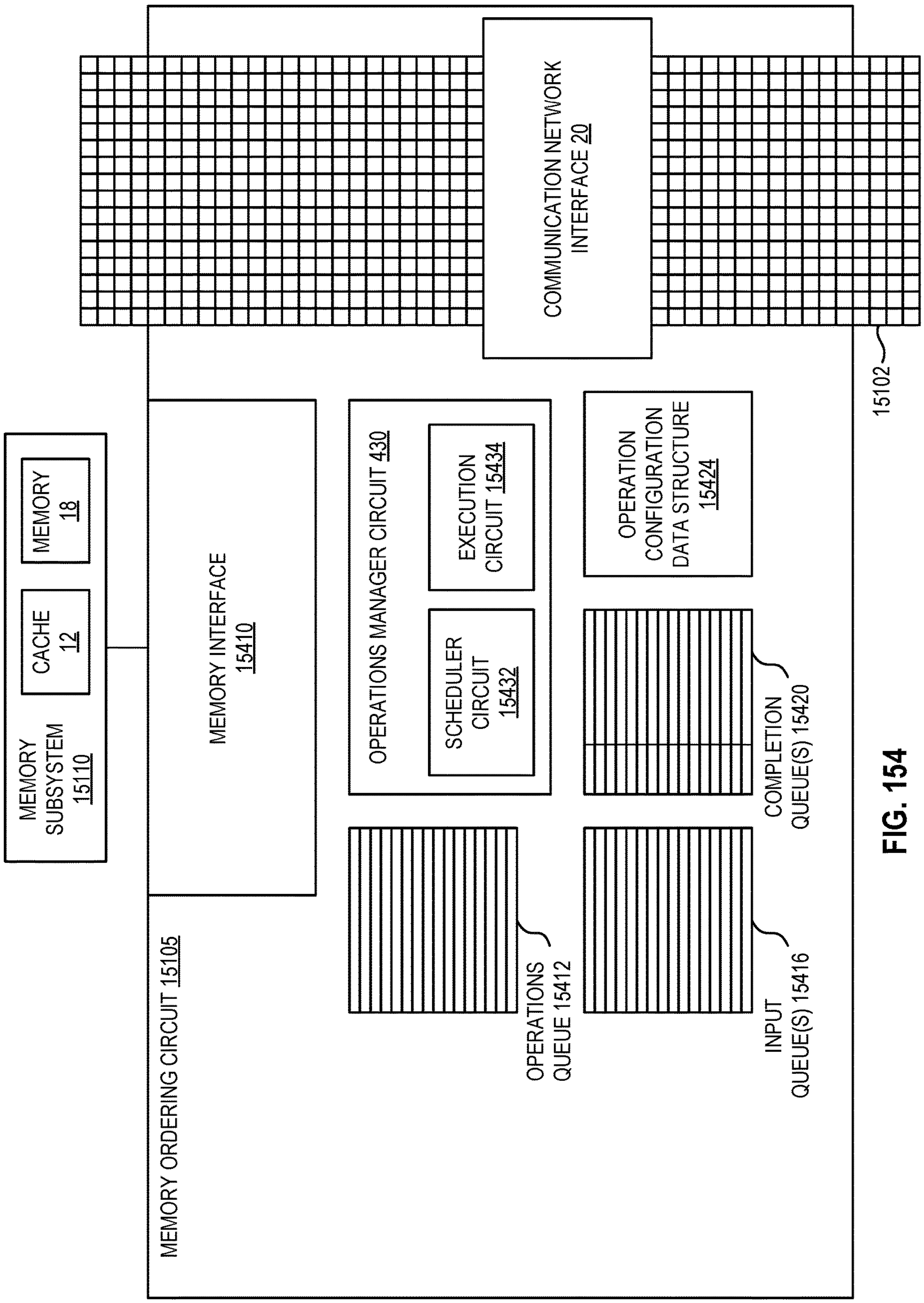

FIG. 154 is a detailed block diagram of the memory ordering circuit of FIG. 151 according to embodiments of the disclosure.

Figure 155:
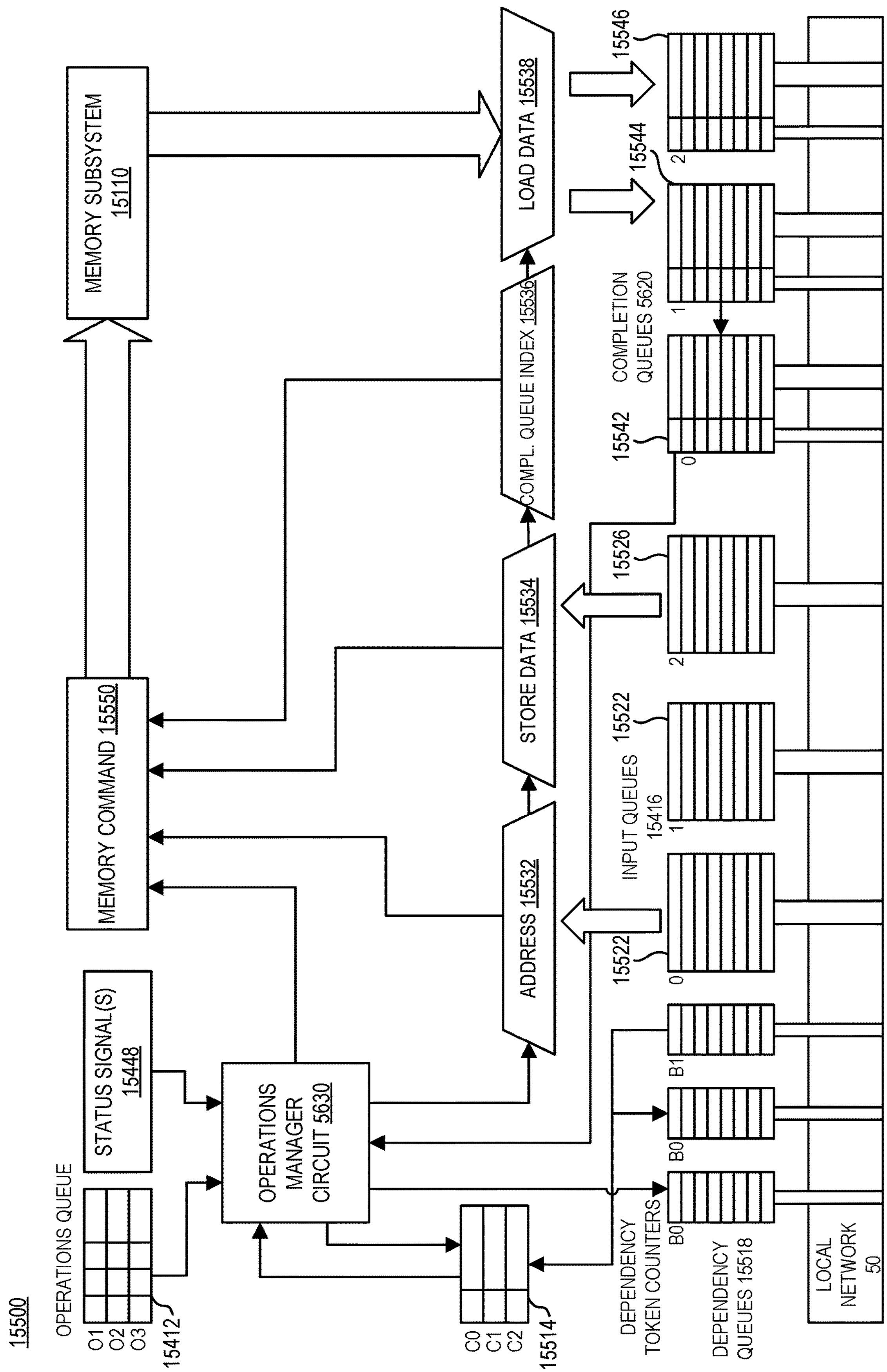

FIG. 155 is a flow diagram of a microarchitecture of the memory ordering circuit of FIG. 151 according to embodiments of the disclosure.

Figure 156:
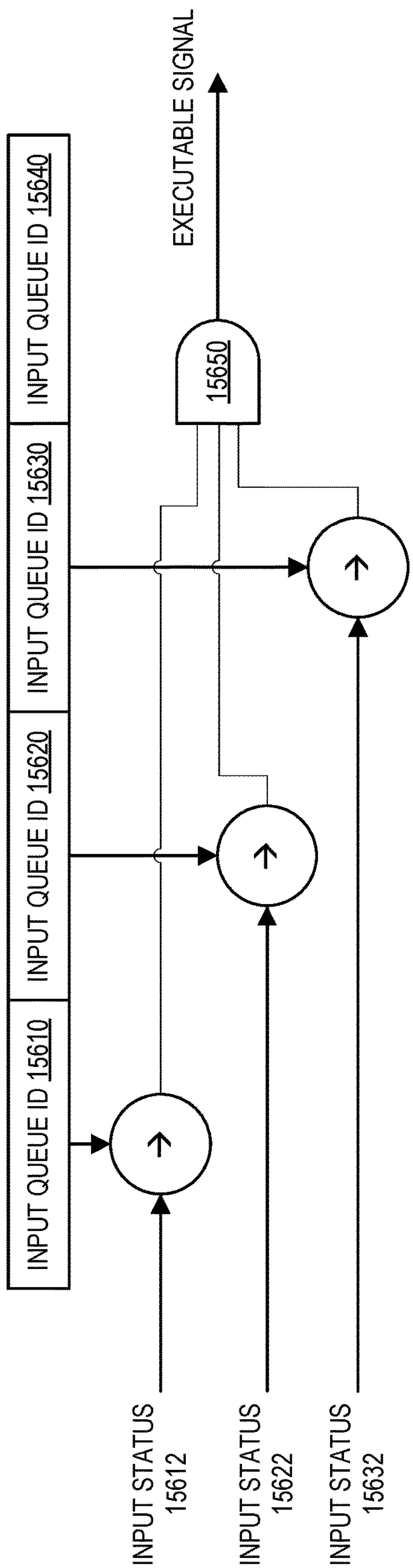

FIG. 156 is a block diagram of an executable determiner circuit according to embodiments of the disclosure.

Figure 157:
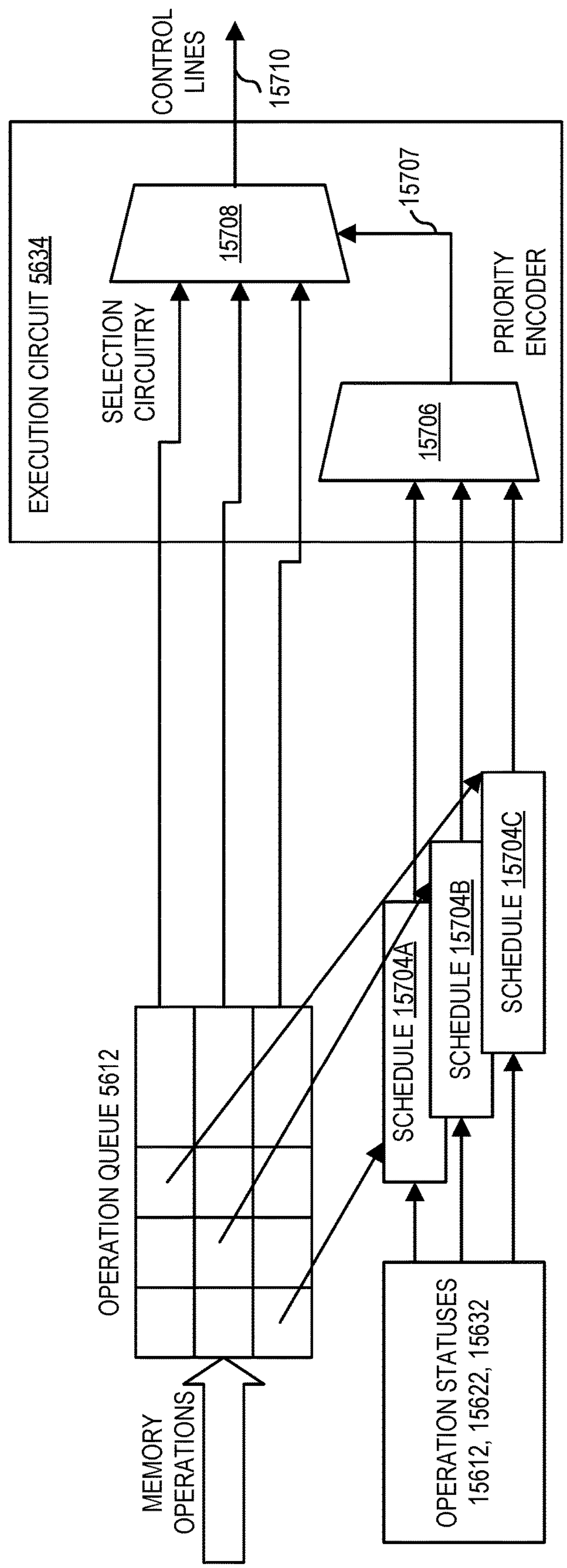

FIG. 157 is a block diagram of a priority encoder according to embodiments of the disclosure.

FIG. 158 is a block diagram of an exemplary load operation, both logical and in binary according to embodiments of the disclosure.

Figure 159A:
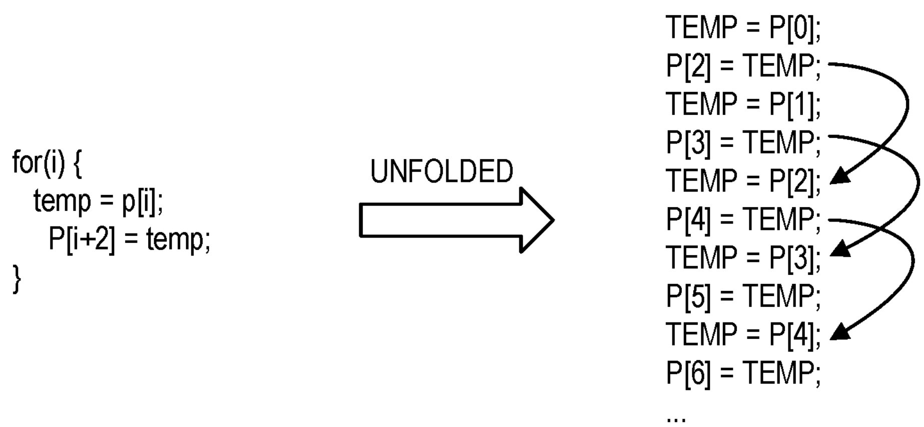

FIG. 159A is flow diagram illustrating logical execution of an example code according to embodiments of the disclosure.

Figure 159B:
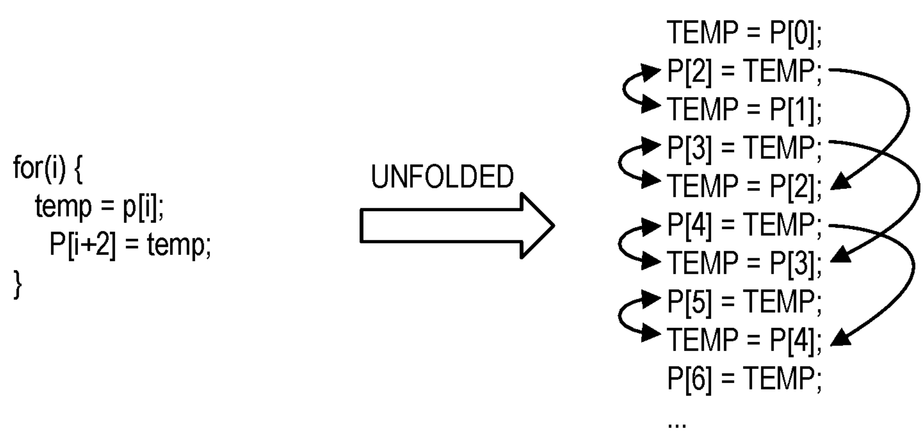

FIG. 159B is the flow diagram of FIG. 159A, illustrating memory-level parallelism in an unfolded version of the example code according to embodiments of the disclosure.

Figure 160A:
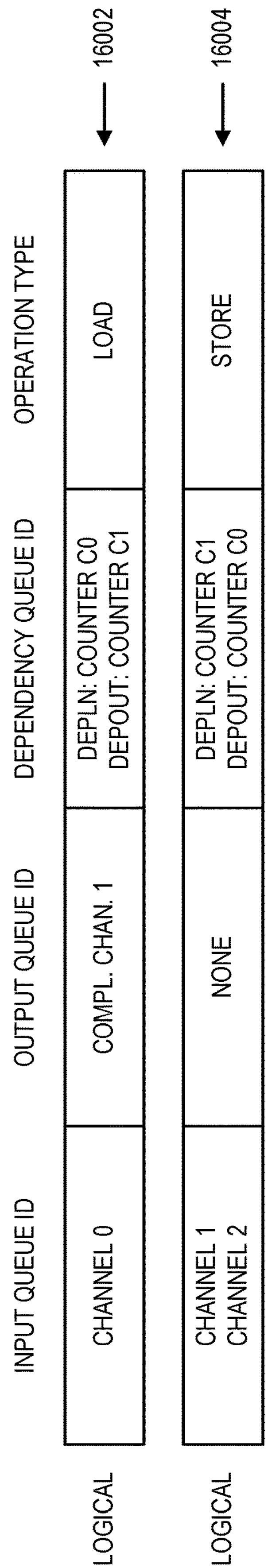

FIG. 160A is a block diagram of exemplary memory arguments for a load operation and for a store operation according to embodiments of the disclosure.

Figure 160B:
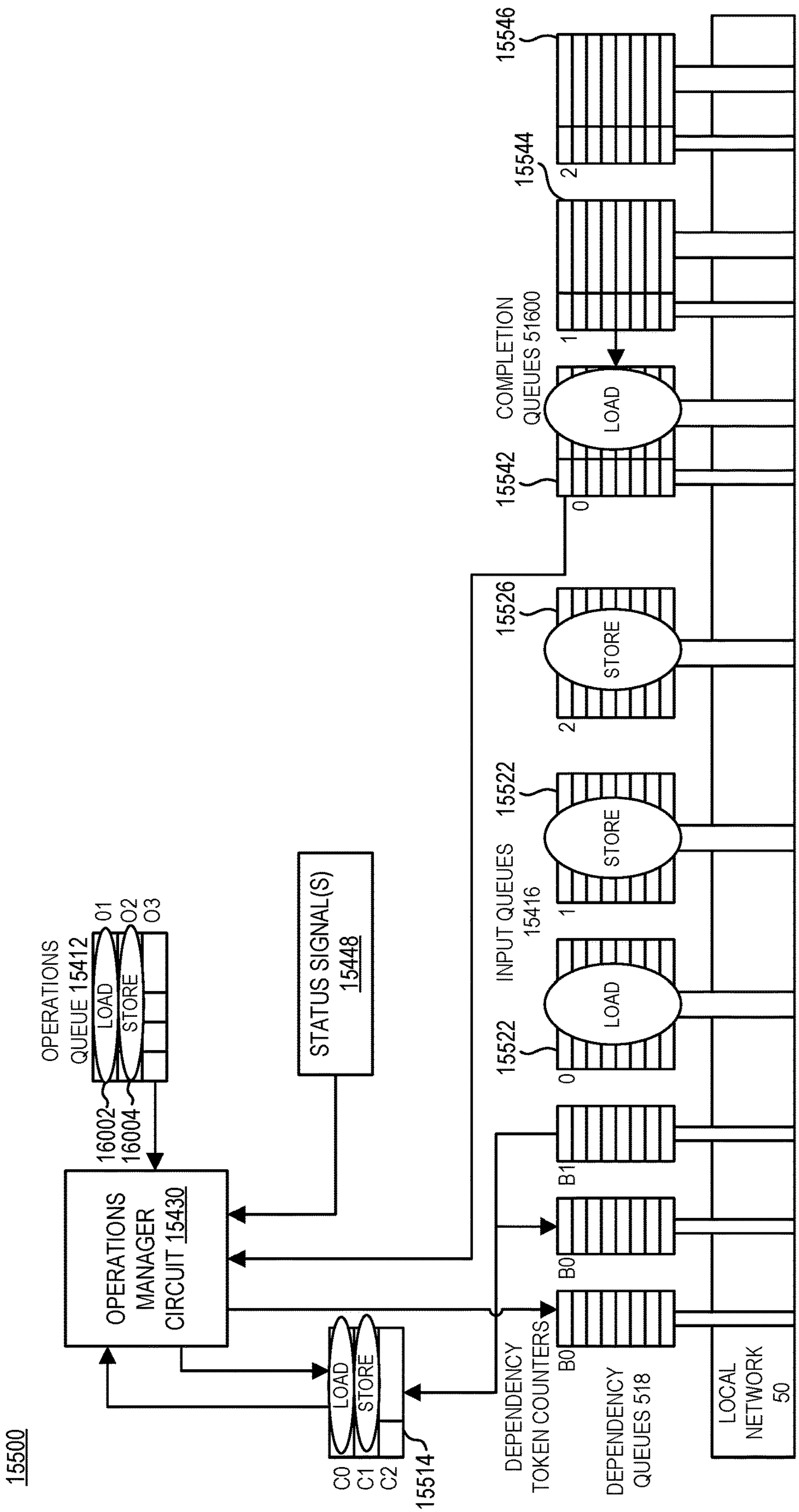

FIG. 160B is a block diagram illustrating flow of load operations and the store operations, such as those of FIG. 160A, through the microarchitecture of the memory ordering circuit of FIG. 155 according to embodiments of the disclosure.

Figure 161A:
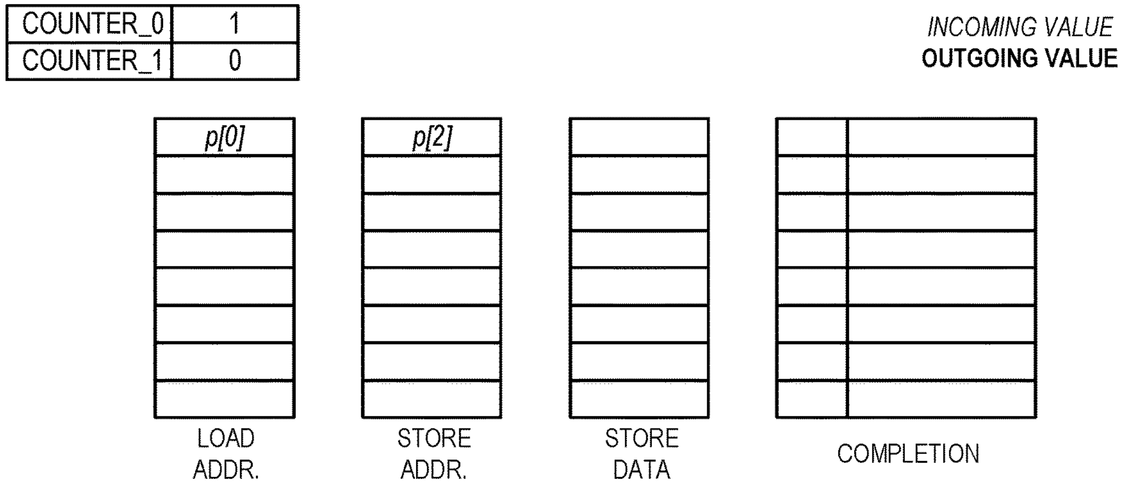
Figure 161B:
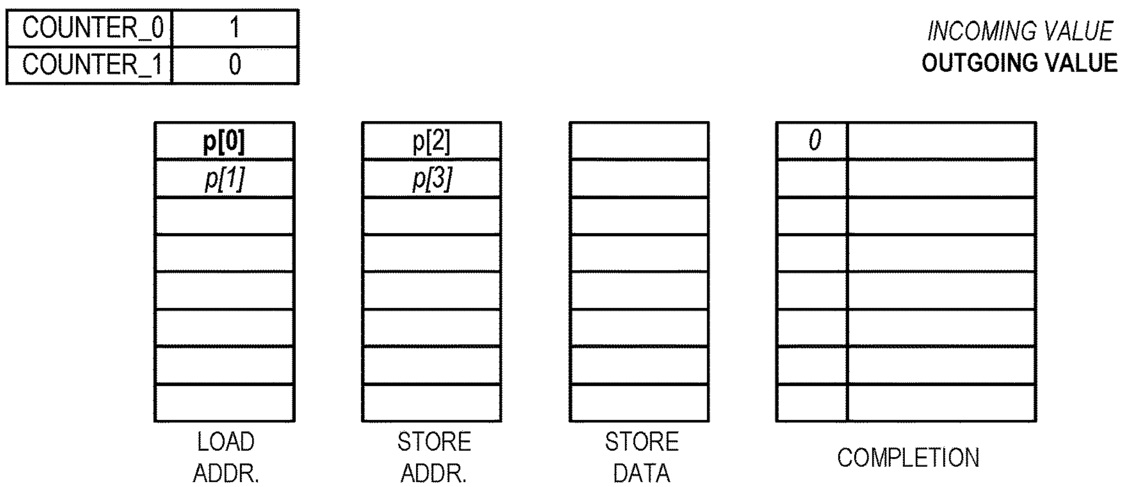

FIGS. 161A, 161B, 161C, 161D, 161E, 161F, 161G, and 161H are block diagrams illustrating functional flow of load operations and store operations for an exemplary program through queues of the microarchitecture of FIG. 161B according to embodiments of the disclosure.

Figure 162:
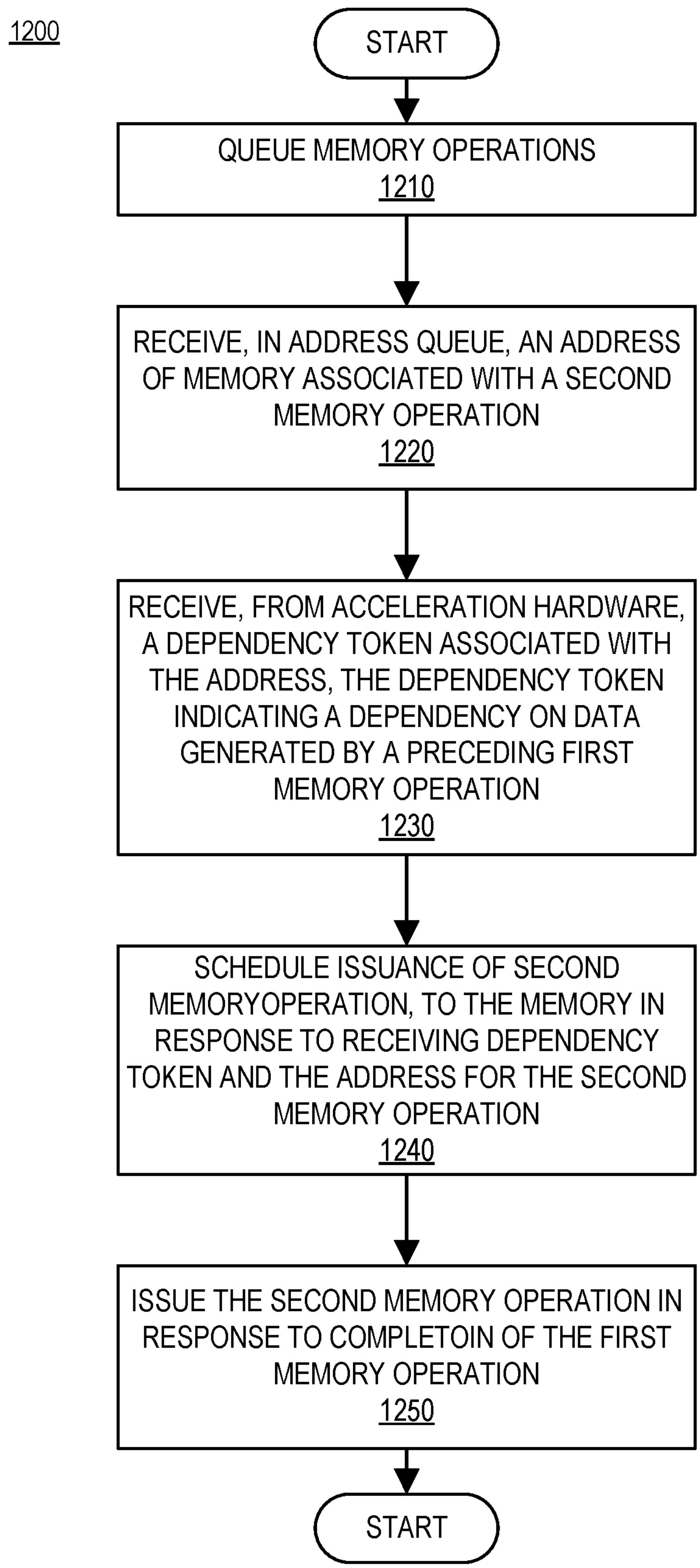

FIG. 162 is a flow chart of a method for ordering memory operations between an acceleration hardware and an out-of-order memory subsystem according to embodiments of the disclosure.

Figure 163A:
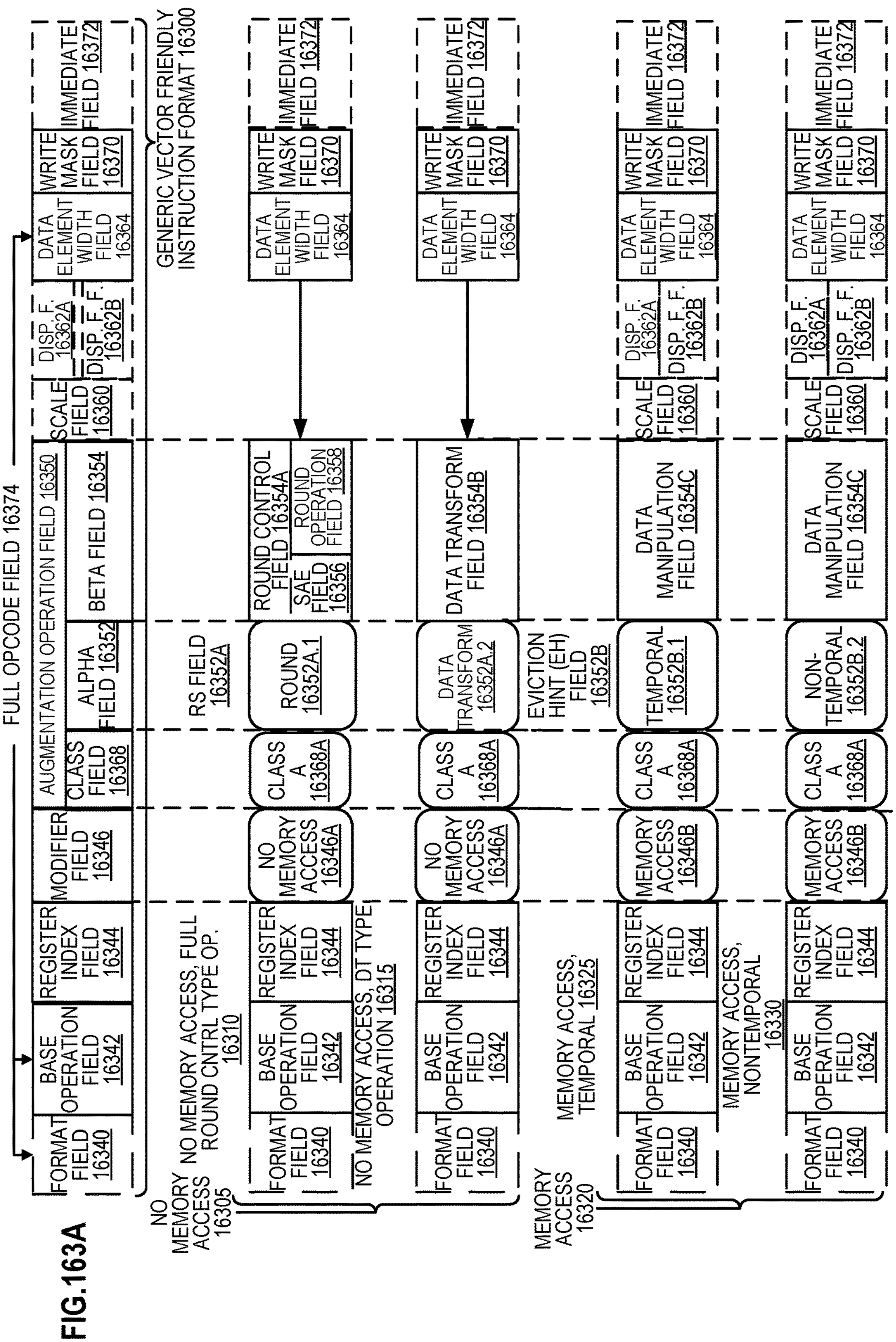

FIG. 163A is a block diagram illustrating a generic vector friendly instruction format and class A instruction templates thereof according to embodiments of the disclosure.

Figure 163B:
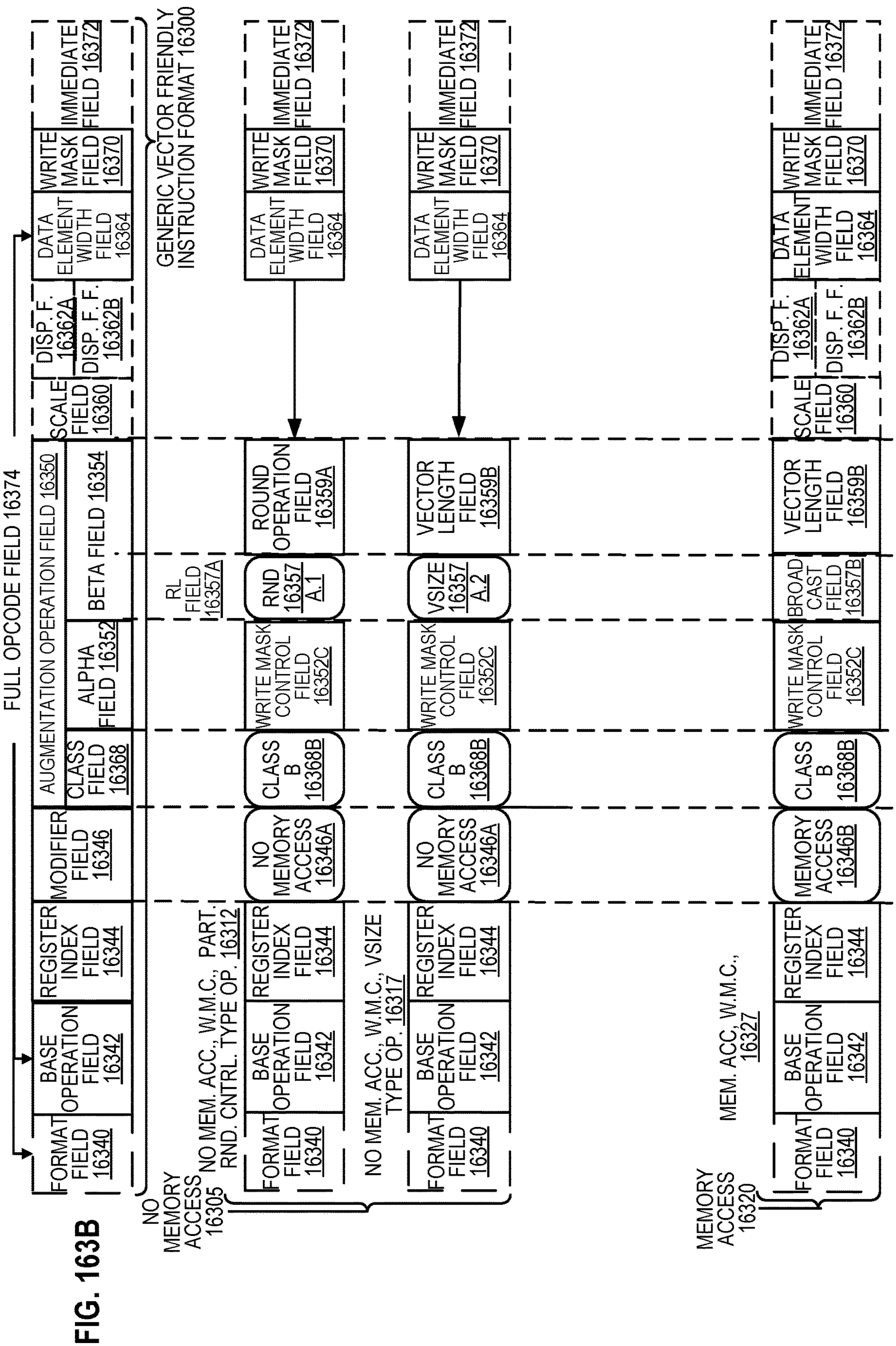

FIG. 163B is a block diagram illustrating the generic vector friendly instruction format and class B instruction templates thereof according to embodiments of the disclosure.

Figures 164A, 164B, 164C:
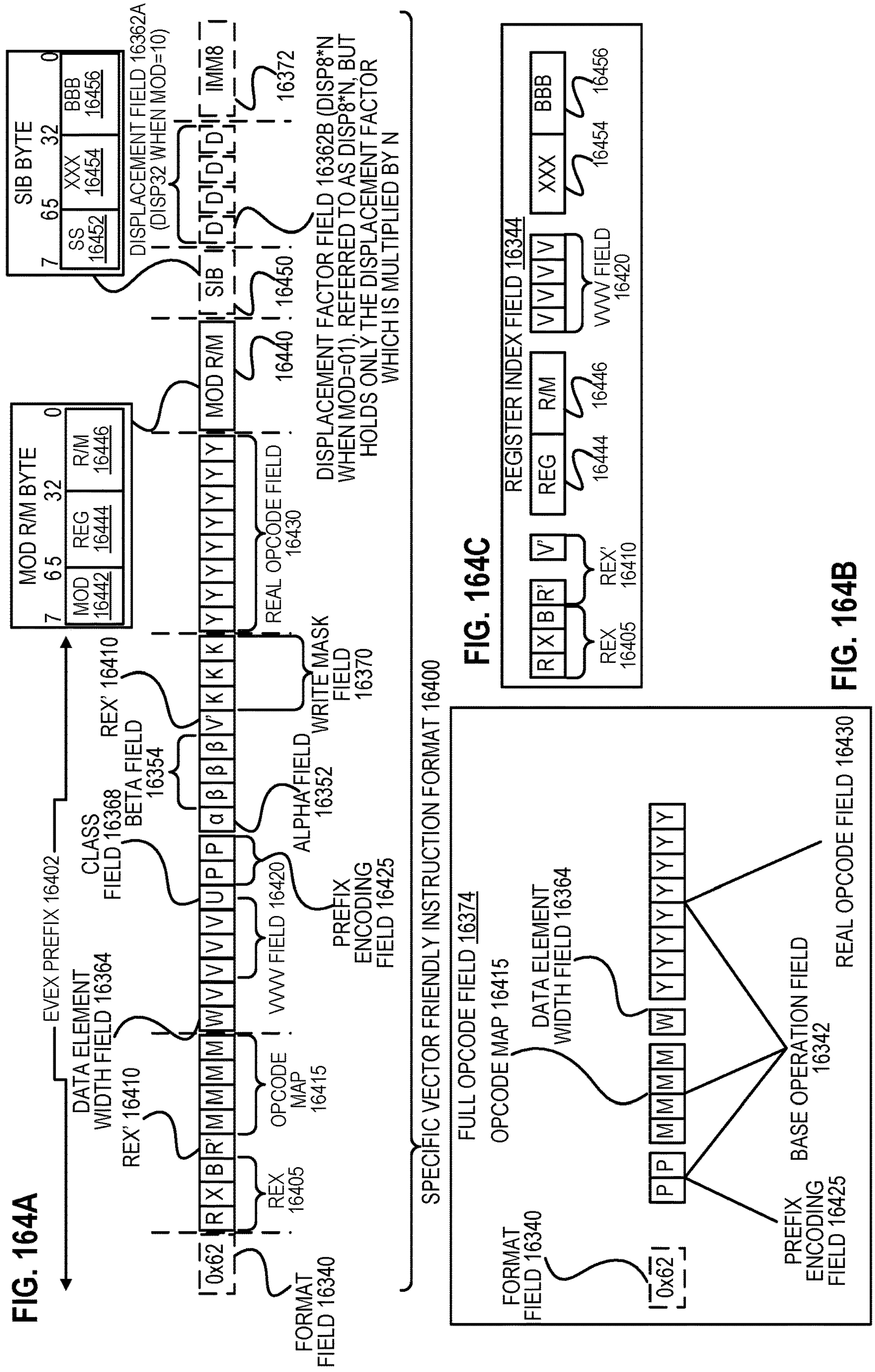

FIG. 164A is a block diagram illustrating fields for the generic vector friendly instruction formats in FIGS. 163A and 163B according to embodiments of the disclosure.

FIG. 164B is a block diagram illustrating the fields of the specific vector friendly instruction format in FIG. 164A that make up a full opcode field according to one embodiment of the disclosure.

FIG. 164C is a block diagram illustrating the fields of the specific vector friendly instruction format in FIG. 164A that make up a register index field according to one embodiment of the disclosure.

Figure 164D:
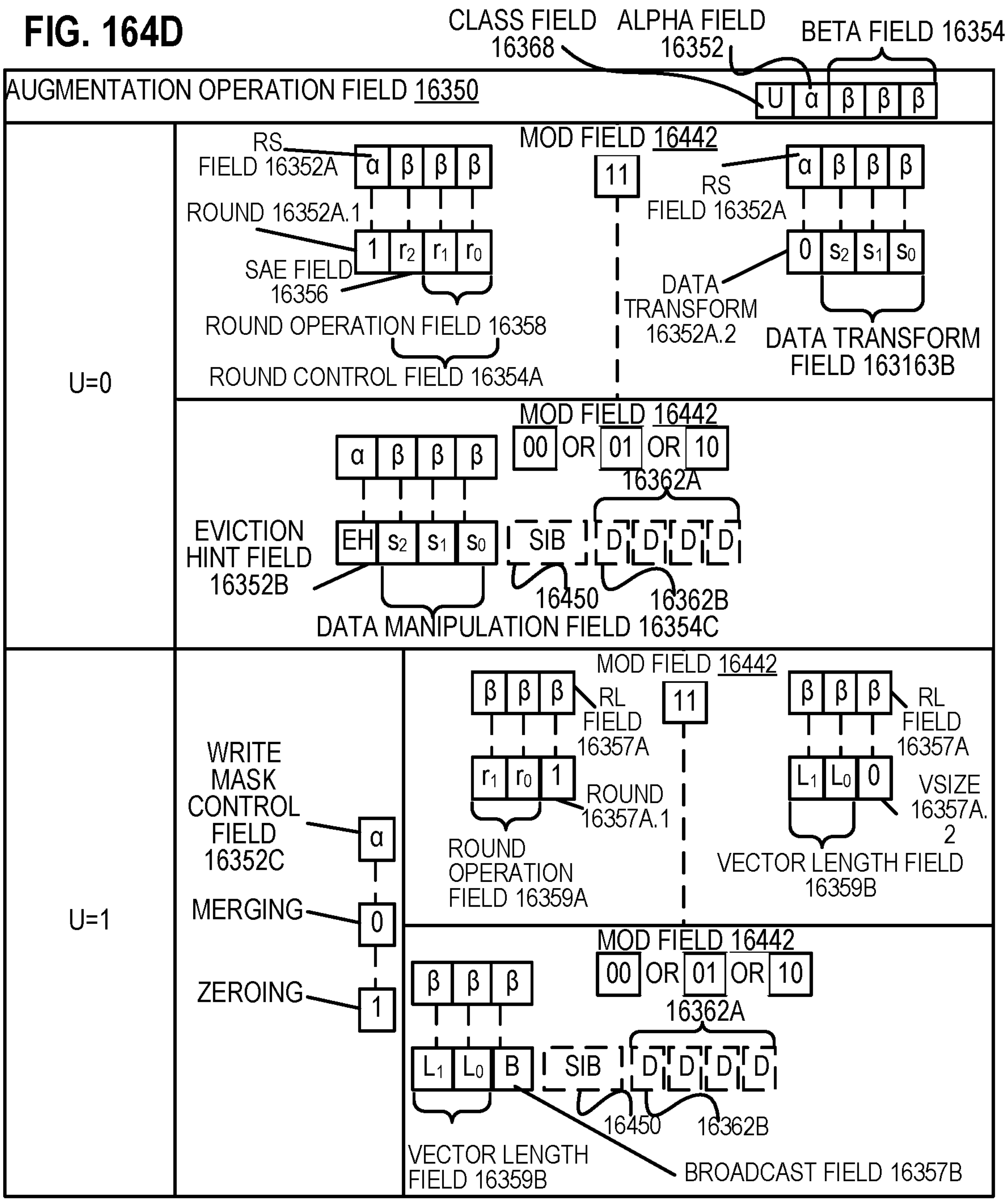

FIG. 164D is a block diagram illustrating the fields of the specific vector friendly instruction format in FIG. 164A that make up the augmentation operation field 16350 according to one embodiment of the disclosure.

Figure 165:
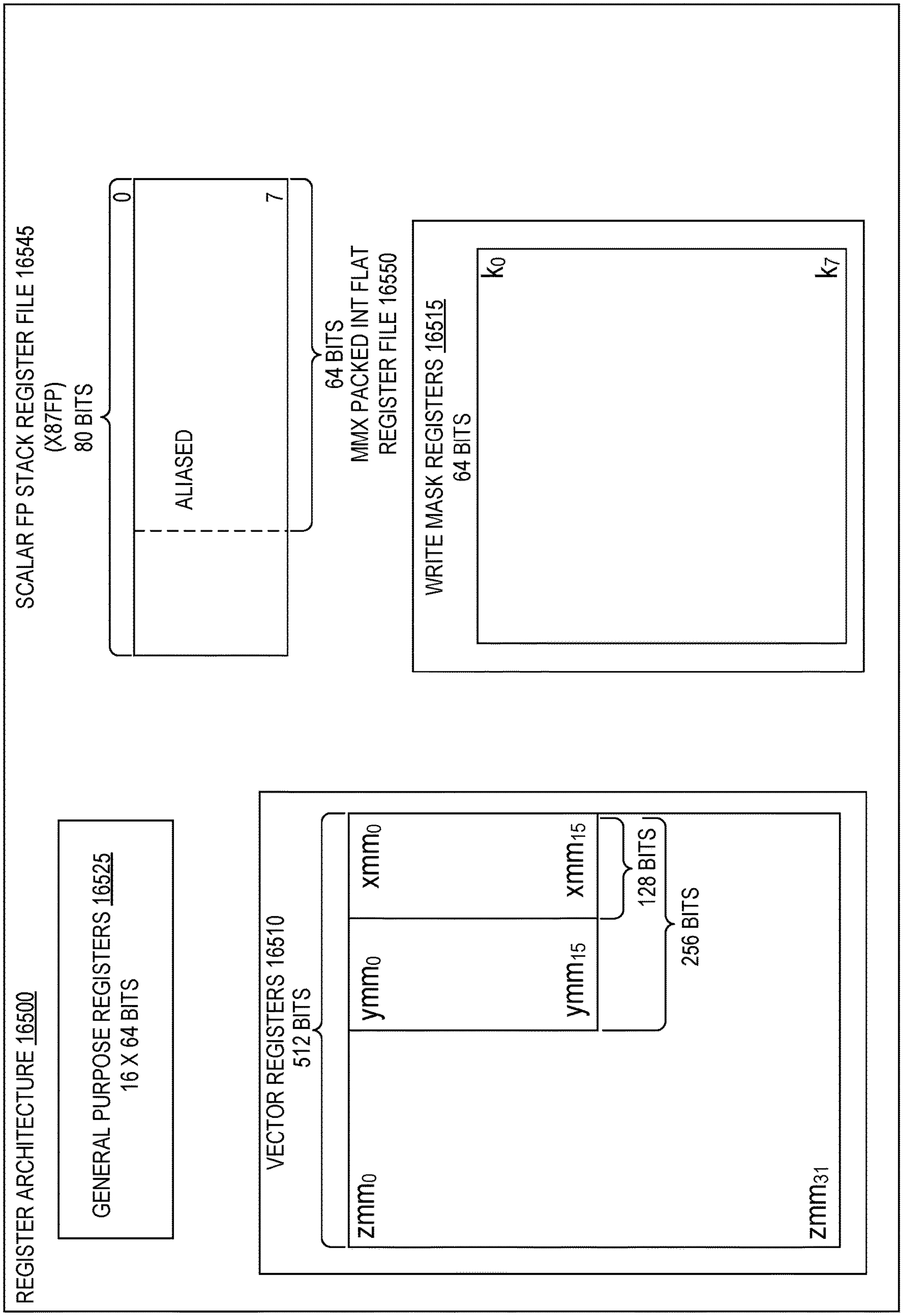
Figures 166A, 166B:
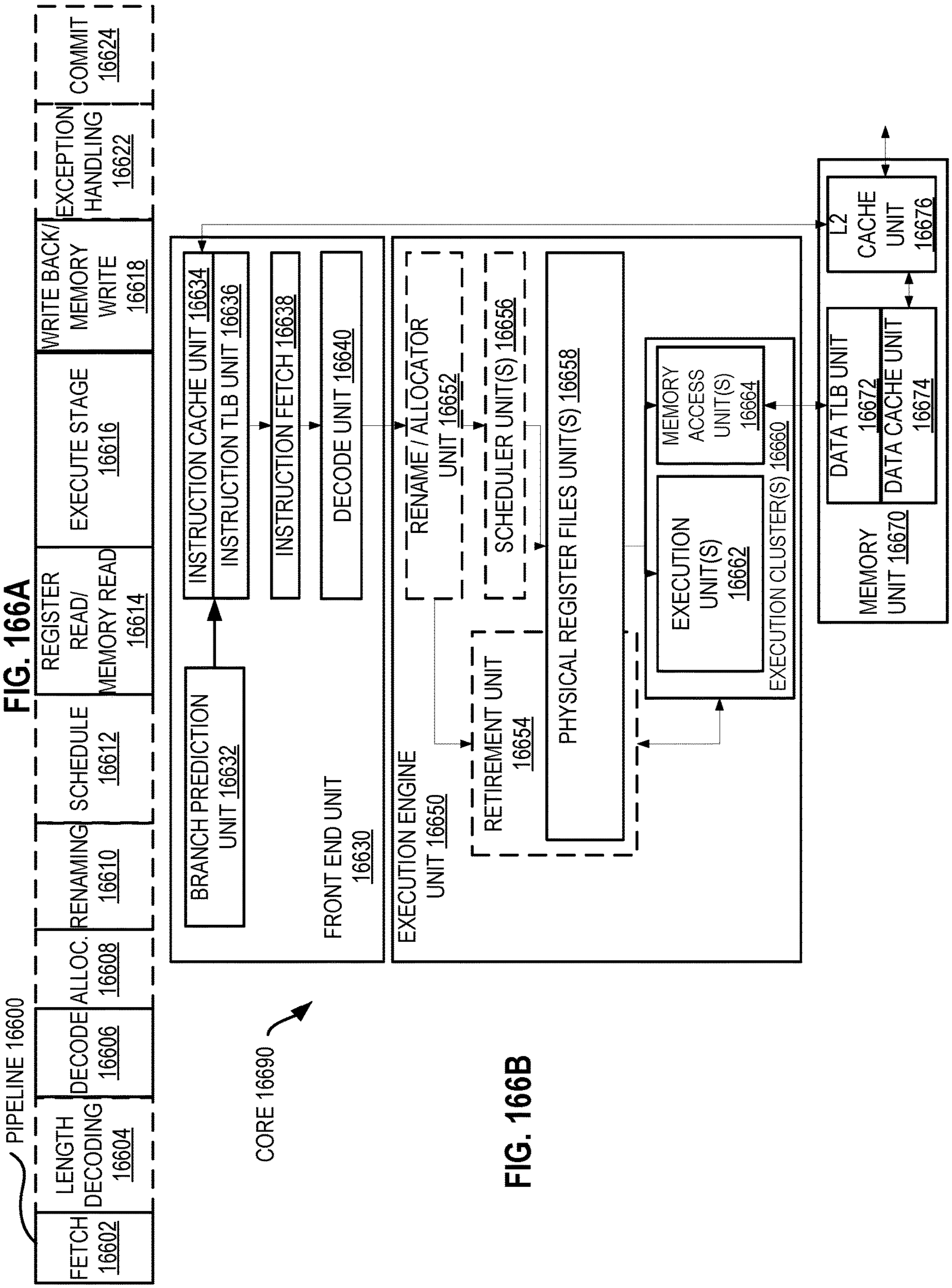

FIG. 165 is a block diagram of a register architecture according to one embodiment of the disclosure FIG. 166A is a block diagram illustrating both an exemplary in-order pipeline and an exemplary register renaming, out-of-order issue/execution pipeline according to embodiments of the disclosure.

FIG. 166B is a block diagram illustrating both an exemplary embodiment of an in-order architecture core and an exemplary register renaming, out-of-order issue/execution architecture core to be included in a processor according to embodiments of the disclosure.

Figure 167A:
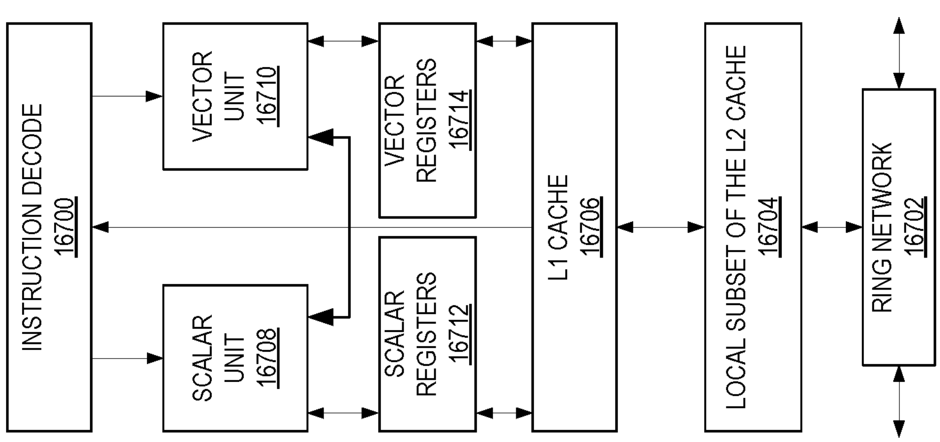

FIG. 167A is a block diagram of a single processor core, along with its connection to the on-die interconnect network and with its local subset of the Level 2 (L2) cache, according to embodiments of the disclosure.

Figure 167B:
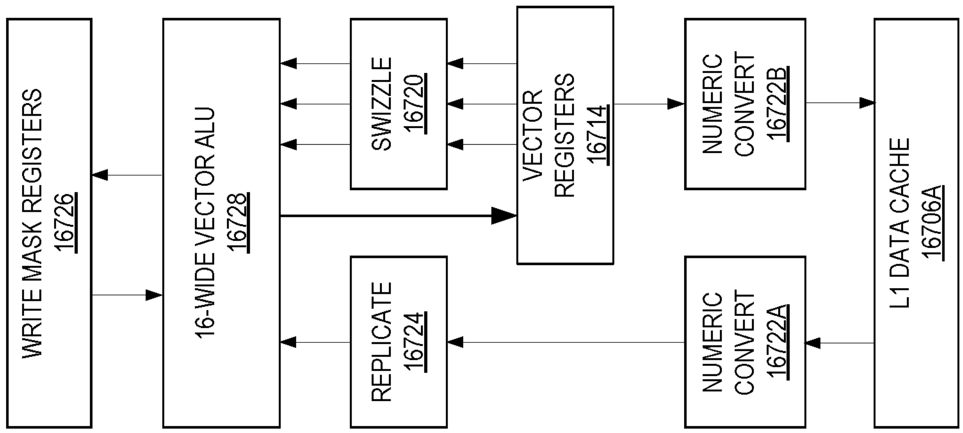

FIG. 167B is an expanded view of part of the processor core in FIG. 167A according to embodiments of the disclosure.

Figure 168:
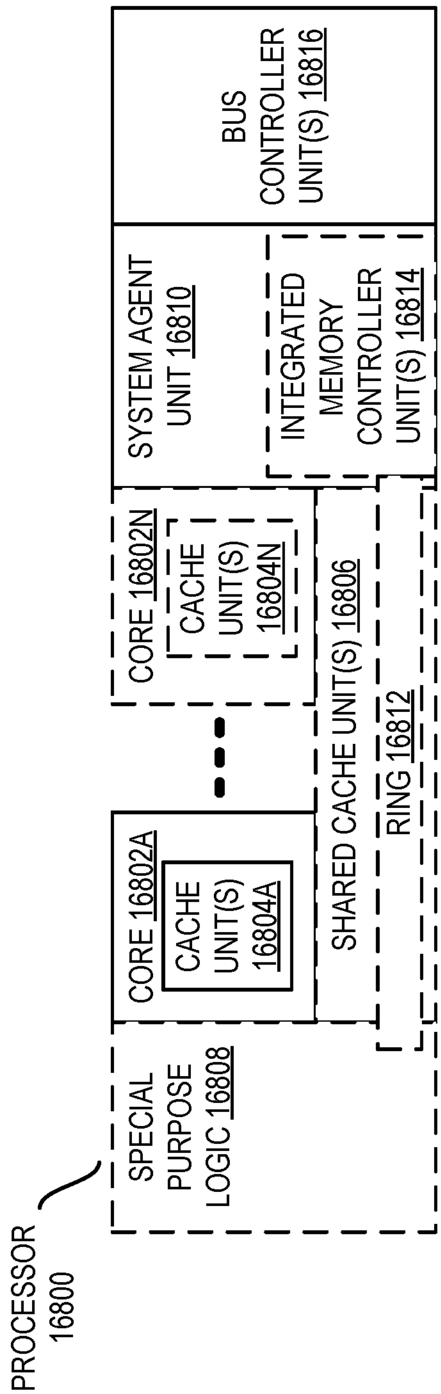

FIG. 168 is a block diagram of a processor that may have more than one core, may have an integrated memory controller, and may have integrated graphics according to embodiments of the disclosure.

Figure 169:
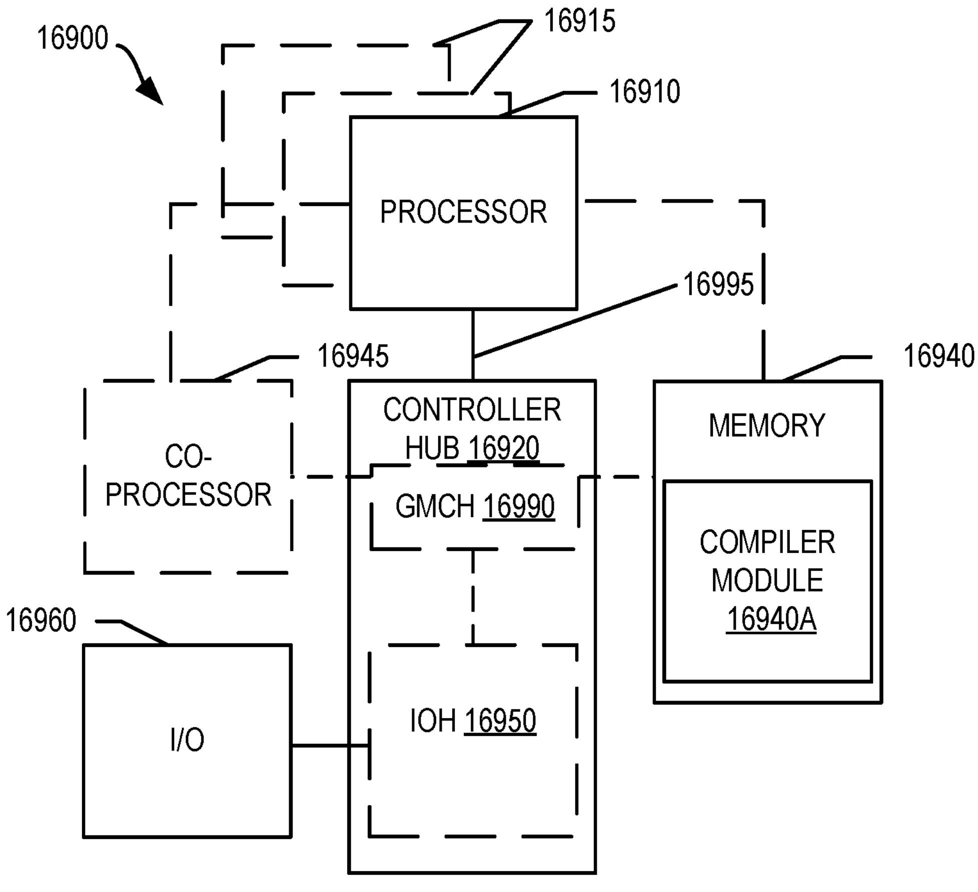

FIG. 169 is a block diagram of a system in accordance with one embodiment of the present disclosure.

Figure 170:
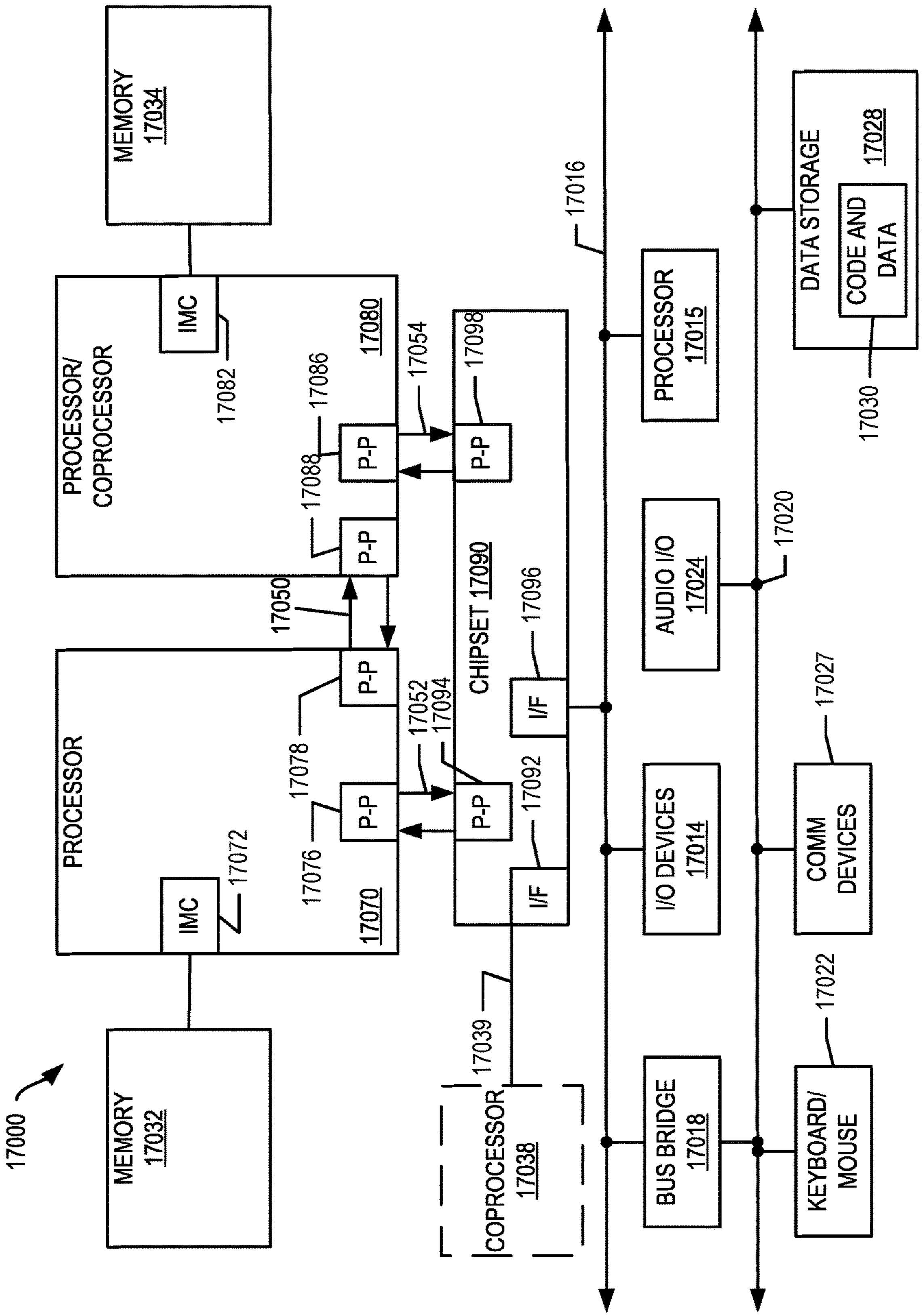

FIG. 170 is a block diagram of a more specific exemplary system in accordance with an embodiment of the present disclosure.

Figure 171:
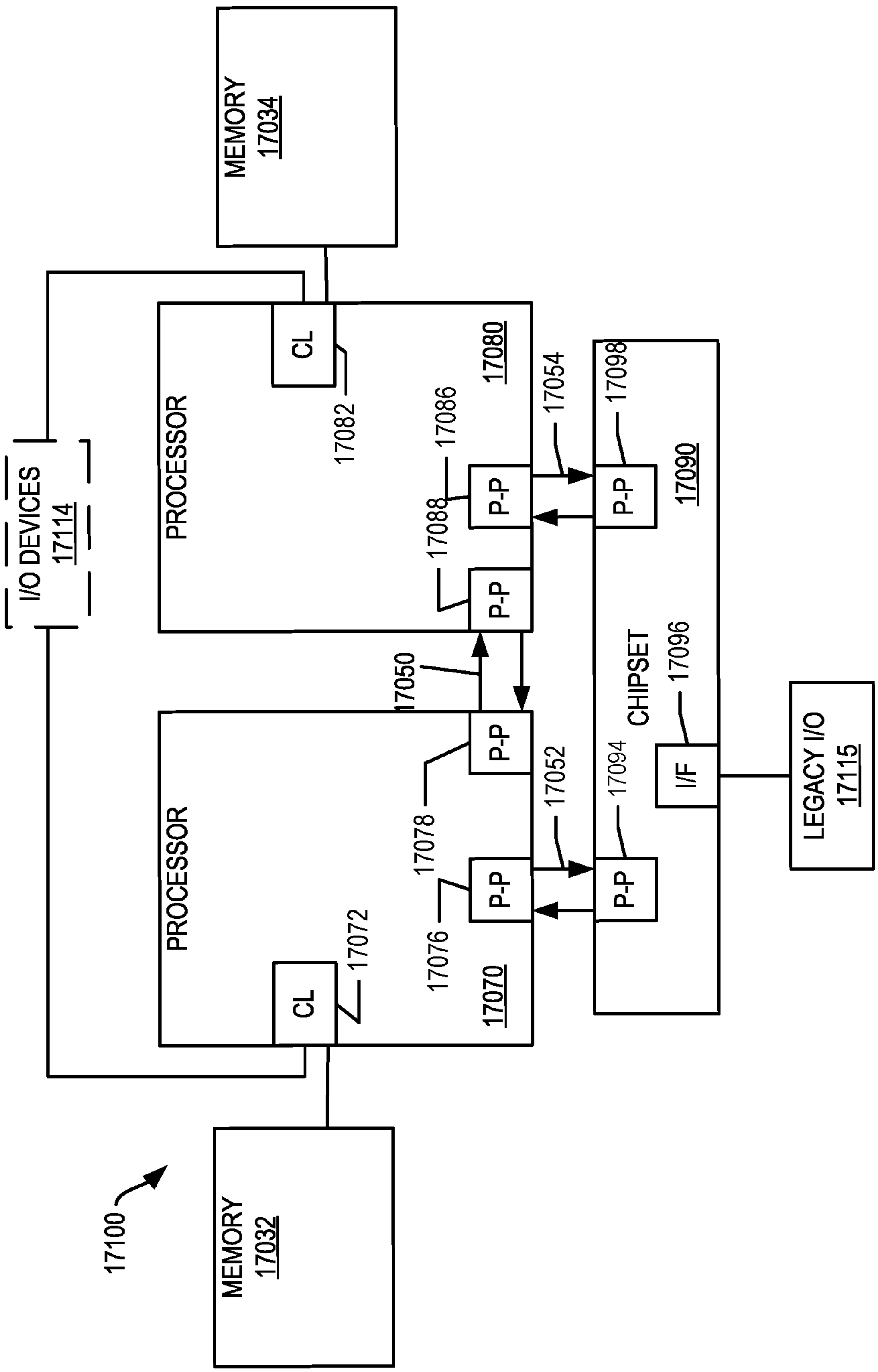

FIG. 171, shown is a block diagram of a second more specific exemplary system in accordance with an embodiment of the present disclosure.

Figure 172:
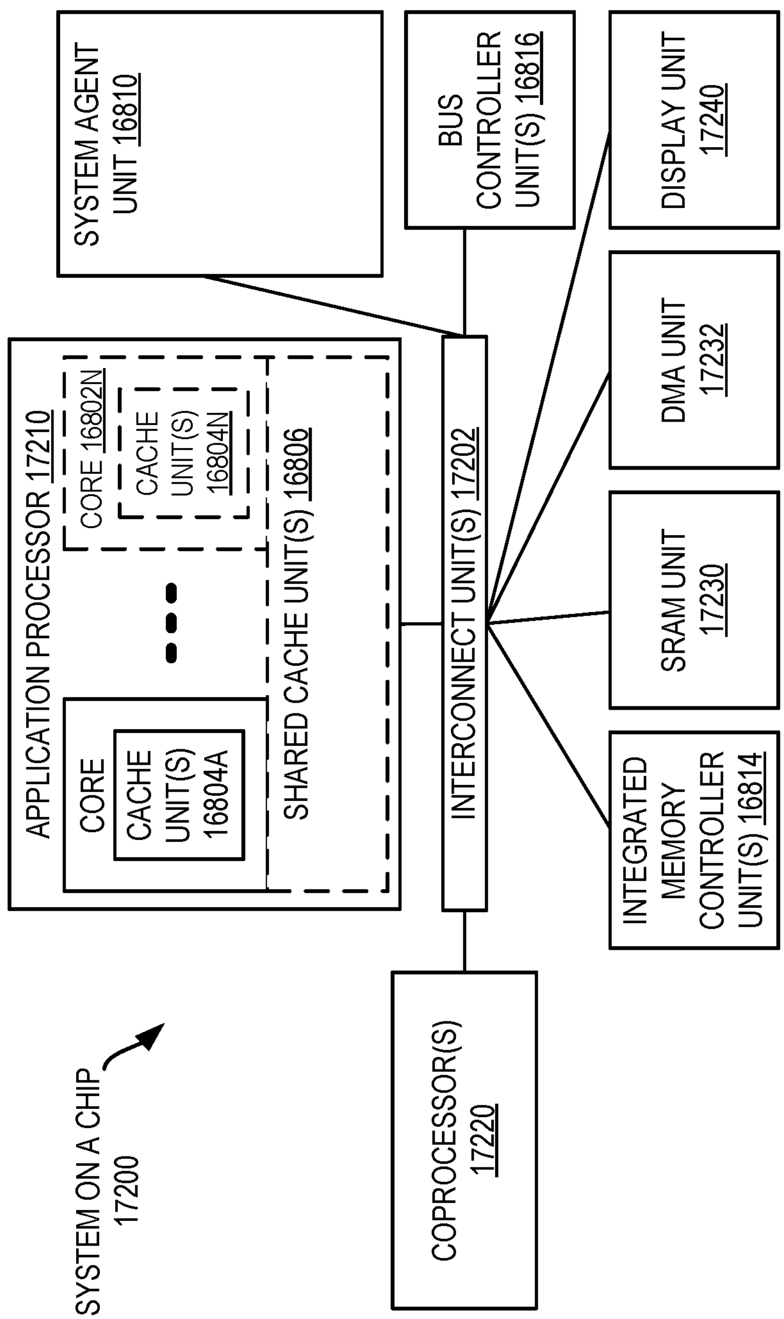

FIG. 172, shown is a block diagram of a system on a chip (SoC) in accordance with an embodiment of the present disclosure.

Figure 173:
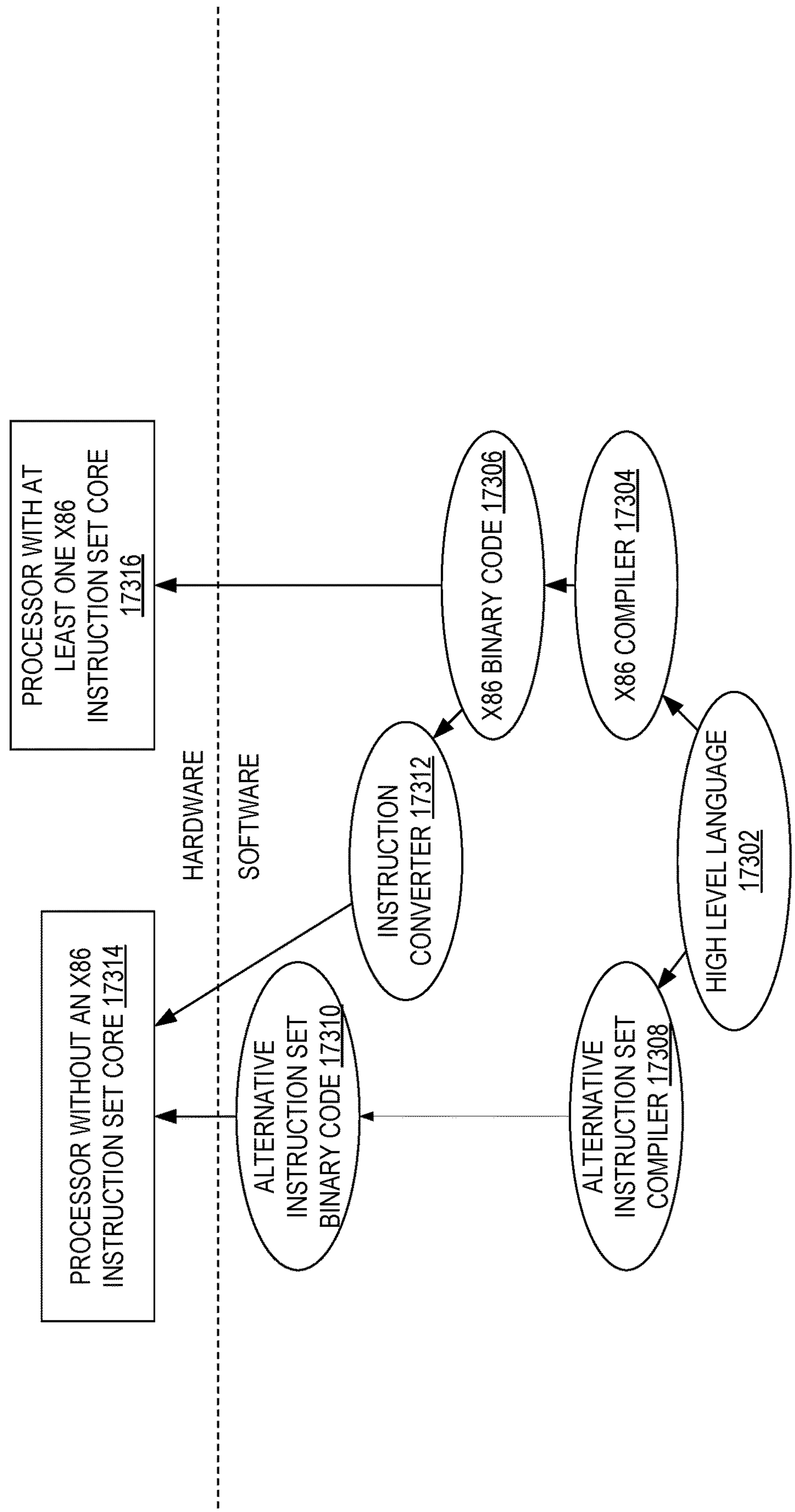

FIG. 173 is a block diagram contrasting the use of a software instruction converter to convert binary instructions in a source instruction set to binary instructions in a target instruction set according to embodiments of the disclosure.

DETAILED DESCRIPTION

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. One non-limiting example of an operation is a blend operation to input a plurality of vectors elements and output a vector with a blended plurality of elements. In certain embodiments, multiple operations are accomplished with the execution of a single instruction.

Exascale performance, e.g., as defined by the Department of Energy, may require system-level floating point performance to exceed 10^18 floating point operations per second (exaFLOPs) or more within a given (e.g., 20 MW) power budget. Certain embodiments herein are directed to a spatial array of processing elements (e.g., a configurable spatial accelerator (CSA)) that targets high performance computing (HPC), for example, of a processor. Certain embodiments herein of a spatial array of processing elements (e.g., a CSA) target the direct execution of a dataflow graph to yield a computationally dense yet energy-efficient spatial microarchitecture which far exceeds conventional roadmap architectures. Certain embodiments herein overlay (e.g., high-radix) dataflow operations on a communications network, e.g., in addition to the communications network's routing of data between the processing elements, memory, etc. and/or the communications network performing other communications (e.g., not data processing) operations. Certain embodiments herein are directed to a communications network (e.g., a packet switched network) of a (e.g., coupled to) spatial array of processing elements (e.g., a CSA) to perform certain dataflow operations, e.g., in addition to the communications network routing data between the processing elements, memory, etc. or the communications network performing other communications operations. Certain embodiments herein are directed to network dataflow endpoint circuits that (e.g., each) perform (e.g., a portion or all) a dataflow operation or operations, for example, a pick or switch dataflow operation, e.g., of a dataflow graph. Certain embodiments herein include augmented network endpoints (e.g., network dataflow endpoint circuits) to support the control for (e.g., a plurality of or a subset of) dataflow operation(s), e.g., utilizing the network endpoints to perform a (e.g., dataflow) operation instead of a processing element (e.g., core) or arithmetic-logic unit (e.g. to perform arithmetic and logic operations) performing that (e.g., dataflow) operation. In one embodiment, a network dataflow endpoint circuit is separate from a spatial array (e.g. an interconnect or fabric thereof) and/or processing elements.

Below also includes a description of the architectural philosophy of embodiments of a spatial array of processing elements (e.g., a CSA) and certain features thereof. As with any revolutionary architecture, programmability may be a risk. To mitigate this issue, embodiments of the CSA architecture have been co-designed with a compilation tool chain, which is also discussed below.

INTRODUCTION

Figure 1:
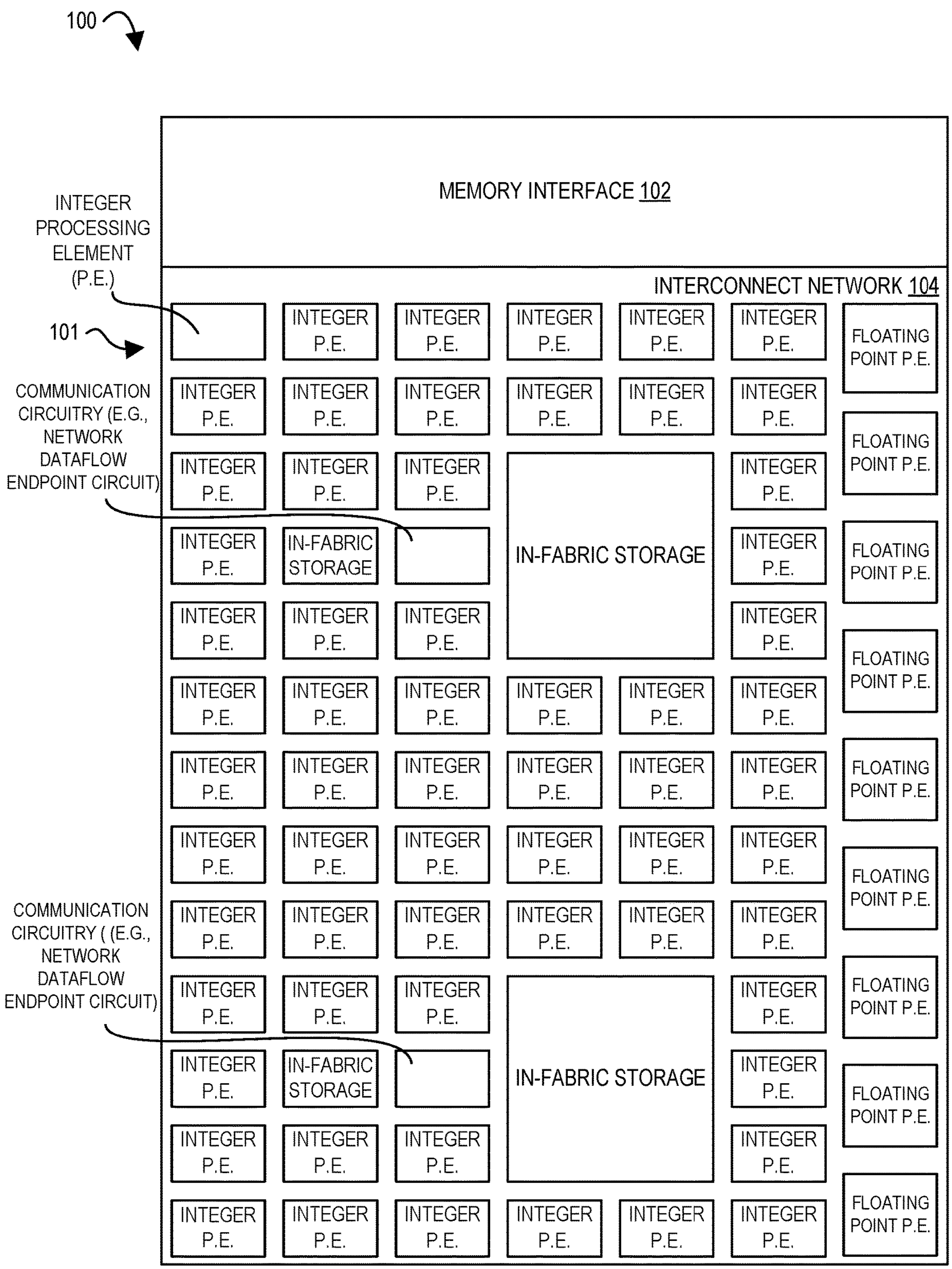
FIG. 1 illustrates an accelerator tile according to embodiments of the disclosure.

Exascale computing goals may require enormous system-level floating point performance (e.g., 1 ExaFLOPs) within an aggressive power budget (e.g., 20 MW). However, simultaneously improving the performance and energy efficiency of program execution with classical von Neumann architectures has become difficult: out-of-order scheduling, simultaneous multi-threading, complex register files, and other structures provide performance, but at high energy cost. Certain embodiments herein achieve performance and energy requirements simultaneously. Exascale computing power-performance targets may demand both high throughput and low energy consumption per operation. Certain embodiments herein provide this by providing for large numbers of low-complexity, energy-efficient processing (e.g., computational) elements which largely eliminate the control overheads of previous processor designs. Guided by this observation, certain embodiments herein include a spatial array of processing elements, for example, a configurable spatial accelerator (CSA), e.g., comprising an array of processing elements (PEs) connected by a set of light-weight, back-pressured (e.g., communication) networks. One example of a CSA tile is depicted in FIG. 1. Certain embodiments of processing (e.g., compute) elements are dataflow operators, e.g., multiple of a dataflow operator that only processes input data when both (i) the input data has arrived at the dataflow operator and (ii) there is space available for storing the output data, e.g., otherwise no processing is occurring. Certain embodiments (e.g., of an accelerator or CSA) do not utilize a triggered instruction.

FIG. 1 illustrates an accelerator tile 100 embodiment of a spatial array of processing elements according to embodiments of the disclosure. Accelerator tile 100 may be a portion of a larger tile. Accelerator tile 100 executes a dataflow graph or graphs. A dataflow graph may generally refer to an explicitly parallel program description which arises in the compilation of sequential codes. Certain embodiments herein (e.g., CSAs) allow dataflow graphs to be directly configured onto the CSA array, for example, rather than being transformed into sequential instruction streams. Certain embodiments herein allow a first (e.g., type of) dataflow operation to be performed by one or more processing elements (PEs) of the spatial array and, additionally or alternatively, a second (e.g., different, type of) dataflow operation to be performed by one or more of the network communication circuits (e.g., endpoints) of the spatial array.

The derivation of a dataflow graph from a sequential compilation flow allows embodiments of a CSA to support familiar programming models and to directly (e.g., without using a table of work) execute existing high performance computing (HPC) code. CSA processing elements (PEs) may be energy efficient. In FIG. 1, memory interface 102 may couple to a memory (e.g., memory 202 in FIG. 2) to allow accelerator tile 100 to access (e.g., load and/store) data to the (e.g., off die) memory. Depicted accelerator tile 100 is a heterogeneous array comprised of several kinds of PEs coupled together via an interconnect network 104. Accelerator tile 100 may include one or more of integer arithmetic PEs, floating point arithmetic PEs, communication circuitry (e.g., network dataflow endpoint circuits), and in-fabric storage, e.g., as part of spatial array of processing elements 101. Dataflow graphs (e.g., compiled dataflow graphs) may be overlaid on the accelerator tile 100 for execution. In one embodiment, for a particular dataflow graph, each PE handles only one or two (e.g., dataflow) operations of the graph. The array of PEs may be heterogeneous, e.g., such that no PE supports the full CSA dataflow architecture and/or one or more PEs are programmed (e.g., customized) to perform only a few, but highly efficient operations. Certain embodiments herein thus yield a processor or accelerator having an array of processing elements that is computationally dense compared to roadmap architectures and yet achieves approximately an order-of-magnitude gain in energy efficiency and performance relative to existing HPC offerings.

Certain embodiments herein provide for performance increases from parallel execution within a (e.g., dense) spatial array of processing elements (e.g., CSA) where each PE and/or network dataflow endpoint circuit utilized may perform its operations simultaneously, e.g., if input data is available. Efficiency increases may result from the efficiency of each PE and/or network dataflow endpoint circuit, e.g., where each PE's operation (e.g., behavior) is fixed once per configuration (e.g., mapping) step and execution occurs on local data arrival at the PE, e.g., without considering other fabric activity, and/or where each network dataflow endpoint circuit's operation (e.g., behavior) is variable (e.g., not fixed) when configured (e.g., mapped). In certain embodiments, a PE and/or network dataflow endpoint circuit is (e.g., each a single) dataflow operator, for example, a dataflow operator that only operates on input data when both (i) the input data has arrived at the dataflow operator and (ii) there is space available for storing the output data, e.g., otherwise no operation is occurring.

Certain embodiments herein include a spatial array of processing elements as an energy-efficient and high-performance way of accelerating user applications. In one embodiment, applications are mapped in an extremely parallel manner. For example, inner loops may be unrolled multiple times to improve parallelism. This approach may provide high performance, e.g., when the occupancy (e.g., use) of the unrolled code is high. However, if there are less used code paths in the loop body unrolled (for example, an exceptional code path like floating point de-normalized mode) then (e.g., fabric area of) the spatial array of processing elements may be wasted and throughput consequently lost.

One embodiment herein to reduce pressure on (e.g., fabric area of) the spatial array of processing elements (e.g., in the case of underutilized code segments) is time multiplexing. In this mode, a single instance of the less used (e.g., colder) code may be shared among several loop bodies, for example, analogous to a function call in a shared library. In one embodiment, spatial arrays (e.g., of processing elements) support the direct implementation of multiplexed codes. However, e.g., when multiplexing or demultiplexing in a spatial array involves choosing among many and distant targets (e.g., sharers), a direct implementation using dataflow operators (e.g., using the processing elements) may be inefficient in terms of latency, throughput, implementation area, and/or energy. Certain embodiments herein describe hardware mechanisms (e.g., network circuitry) supporting (e.g., high-radix) multiplexing or demultiplexing. Certain embodiments herein (e.g., of network dataflow endpoint circuits) permit the aggregation of many targets (e.g., sharers) with little hardware overhead or performance impact. Certain embodiments herein allow for compiling of (e.g., legacy) sequential codes to parallel architectures in a spatial array.

In one embodiment, a plurality of network dataflow endpoint circuits combine as a single dataflow operator, for example, as discussed in reference to FIG. 13 below. As non-limiting examples, certain (for example, high (e.g., 4-6) radix) dataflow operators are listed below.

An embodiment of a "Pick" dataflow operator is to select data (e.g., a token) from a plurality of input channels and provide that data as its (e.g., single) output according to control data. Control data for a Pick may include an input selector value. In one embodiment, the selected input channel is to have its data (e.g., token) removed (e.g., discarded), for example, to complete the performance of that dataflow operation (or its portion of a dataflow operation). In one embodiment, additionally, those non-selected input channels are also to have their data (e.g., token) removed (e.g., discarded), for example, to complete the performance of that dataflow operation (or its portion of a dataflow operation).

An embodiment of a "PickSingleLeg" dataflow operator is to select data (e.g., a token) from a plurality of input channels and provide that data as its (e.g., single) output according to control data, but in certain embodiments, the non-selected input channels are ignored, e.g., those non-selected input channels are not to have their data (e.g., token) removed (e.g., discarded), for example, to complete the performance of that dataflow operation (or its portion of a dataflow operation). Control data for a PickSingleLeg may include an input selector value. In one embodiment, the selected input channel is also to have its data (e.g., token) removed (e.g., discarded), for example, to complete the performance of that dataflow operation (or its portion of a dataflow operation).

An embodiment of a "PickAny" dataflow operator is to select the first available (e.g., to the circuit performing the operation) data (e.g., a token) from a plurality of input channels and provide that data as its (e.g., single) output. In one embodiment, PickSingleLeg is also to output the index (e.g., indicating which of the plurality of input channels) had its data selected. In one embodiment, the selected input channel is to have its data (e.g., token) removed (e.g., discarded), for example, to complete the performance of that dataflow operation (or its portion of a dataflow operation). In certain embodiments, the non-selected input channels (e.g., with or without input data) are ignored, e.g., those non-selected input channels are not to have their data (e.g., token) removed (e.g., discarded), for example, to complete the performance of that dataflow operation (or its portion of a dataflow operation). Control data for a PickAny may include a value corresponding to the PickAny, e.g., without an input selector value.

An embodiment of a "Switch" dataflow operator is to steer (e.g., single) input data (e.g., a token) so as to provide that input data to one or a plurality of (e.g., less than all) outputs according to control data. Control data for a Switch may include an output(s) selector value or values. In one embodiment, the input data (e.g., from an input channel) is to have its data (e.g., token) removed (e.g., discarded), for example, to complete the performance of that dataflow operation (or its portion of a dataflow operation).

An embodiment of a "SwitchAny" dataflow operator is to steer (e.g., single) input data (e.g., a token) so as to provide that input data to one or a plurality of (e.g., less than all) outputs that may receive that data, e.g., according to control data. In one embodiment, SwitchAny may provide the input data to any coupled output channel that has availability (e.g., available storage space) in its ingress buffer, e.g., network ingress buffer in FIG. 14. Control data for a SwitchAny may include a value corresponding to the SwitchAny, e.g., without an output(s) selector value or values. In one embodiment, the input data (e.g., from an input channel) is to have its data (e.g., token) removed (e.g., discarded), for example, to complete the performance of that dataflow operation (or its portion of a dataflow operation). In one embodiment, SwitchAny is also to output the index (e.g., indicating which of the plurality of output channels) that it provided (e.g., sent) the input data to. SwitchAny may be utilized to manage replicated sub-graphs in a spatial array, for example, an unrolled loop.

Certain embodiments herein thus provide paradigm-shifting levels of performance and tremendous improvements in energy efficiency across a broad class of existing single-stream and parallel programs, e.g., all while preserving familiar HPC programming models. Certain embodiments herein may target HPC such that floating point energy efficiency is extremely important. Certain embodiments herein not only deliver compelling improvements in performance and reductions in energy, they also deliver these gains to existing HPC programs written in mainstream HPC languages and for mainstream HPC frameworks. Certain embodiments of the architecture herein (e.g., with compilation in mind) provide several extensions in direct support of the control-dataflow internal representations generated by modern compilers. Certain embodiments herein are direct to a CSA dataflow compiler, e.g., which can accept C, C++, and Fortran programming languages, to target a CSA architecture.

Figure 2:
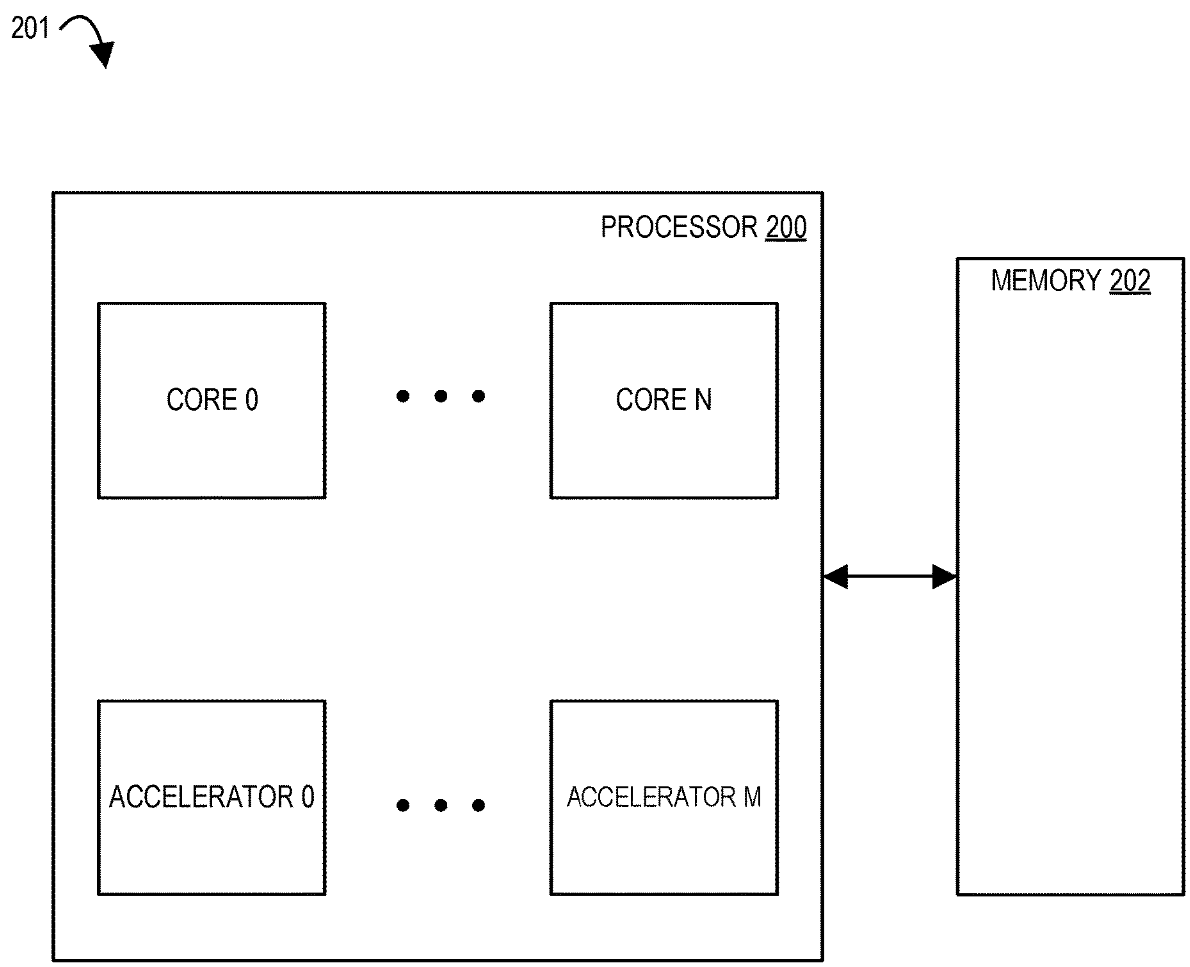
FIG. 2 illustrates a hardware processor coupled to a memory according to embodiments of the disclosure.

FIG. 2 illustrates a hardware processor 200 coupled to (e.g., connected to) a memory 202 according to embodiments of the disclosure. In one embodiment, hardware processor 200 and memory 202 are a computing system 201. In certain embodiments, one or more of accelerators is a CSA according to this disclosure. In certain embodiments, one or more of the cores in a processor are those cores disclosed herein. Hardware processor 200 (e.g., each core thereof) may include a hardware decoder (e.g., decode unit) and a hardware execution unit. Hardware processor 200 may include registers. Note that the figures herein may not depict all data communication couplings (e.g., connections). One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein. Depicted hardware processor 200 includes a plurality of cores (O to N, where N may be 1 or more) and hardware accelerators (O to M, where M may be 1 or more) according to embodiments of the disclosure. Hardware processor 200 (e.g., accelerator(s) and/or core(s) thereof) may be coupled to memory 202 (e.g., data storage device). Hardware decoder (e.g., of core) may receive an (e.g., single) instruction (e.g., macro-instruction) and decode the instruction, e.g., into micro-instructions and/or micro-operations. Hardware execution unit (e.g., of core) may execute the decoded instruction (e.g., macro-instruction) to perform an operation or operations.

Section 1 below discloses embodiments of CSA architecture. In particular, novel embodiments of integrating memory within the dataflow execution model are disclosed. Section 2 delves into the microarchitectural details of embodiments of a CSA. In one embodiment, the main goal of a CSA is to support compiler produced programs. Section 3 discusses example operations of an Operation Set Architecture (OSA) for CSA. Section 4 below examines embodiments of a CSA compilation tool chain. The advantages of embodiments of a CSA are compared to other architectures in the execution of compiled codes in Section 5. Finally the performance of embodiments of a CSA microarchitecture is discussed in Section 6, further CSA details are discussed in Section 7, and a summary is provided in Section 8.

1. CSA Architecture

The goal of certain embodiments of a CSA is to rapidly and efficiently execute programs, e.g., programs produced by compilers. Certain embodiments of the CSA architecture provide programming abstractions that support the needs of compiler technologies and programming paradigms. Embodiments of the CSA execute dataflow graphs, e.g., a program manifestation that closely resembles the compiler's own internal representation (IR) of compiled programs. In this model, a program is represented as a dataflow graph comprised of nodes (e.g., vertices) drawn from a set of architecturally-defined dataflow operators (e.g., that encompass both computation and control operations) and edges which represent the transfer of data between dataflow operators. Execution may proceed by injecting dataflow tokens (e.g., that are or represent data values) into the dataflow graph. Tokens may flow between and be transformed at each node (e.g., vertex), for example, forming a complete computation. A sample dataflow graph and its derivation from high-level source code is shown in FIGS. 3A-3C, and FIG. 5 shows an example of the execution of a dataflow graph.

Embodiments of the CSA are configured for dataflow graph execution by providing exactly those dataflow-graph-execution supports required by compilers. In one embodiment, the CSA is an accelerator (e.g., an accelerator in FIG. 2) and it does not seek to provide some of the necessary but infrequently used mechanisms available on general purpose processing cores (e.g., a core in FIG. 2), such as system calls. Therefore, in this embodiment, the CSA can execute many codes, but not all codes. In exchange, the CSA gains significant performance and energy advantages. To enable the acceleration of code written in commonly used sequential languages, embodiments herein also introduce several novel architectural features to assist the compiler. One particular novelty is CSA's treatment of memory, a subject which has been ignored or poorly addressed previously. Embodiments of the CSA are also unique in the use of dataflow operators, e.g., as opposed to lookup tables (LUTs), as their fundamental architectural interface.

Turning to embodiments of the CSA, dataflow operators are discussed next.

1.1 Dataflow Operators

The key architectural interface of embodiments of the accelerator (e.g., CSA) is the dataflow operator, e.g., as a direct representation of a node in a dataflow graph. From an operational perspective, dataflow operators behave in a streaming or data-driven fashion. Dataflow operators may execute as soon as their incoming operands become available. CSA dataflow execution may depend (e.g., only) on highly localized status, for example, resulting in a highly scalable architecture with a distributed, asynchronous execution model. Dataflow operators may include arithmetic dataflow operators, for example, one or more of floating point addition and multiplication, integer addition, subtraction, and multiplication, various forms of comparison, logical operators, and shift. However, embodiments of the CSA may also include a rich set of control operators which assist in the management of dataflow tokens in the program graph. Examples of these include a "pick" operator, e.g., which multiplexes two or more logical input channels into a single output channel, and a "switch" operator, e.g., which operates as a channel demultiplexor (e.g., outputting a single channel from two or more logical input channels). These operators may enable a compiler to implement control paradigms such as conditional expressions. Certain embodiments of a CSA may include a limited dataflow operator set (e.g., to relatively small number of operations) to yield dense and energy efficient PE microarchitectures. Certain embodiments may include dataflow operators for complex operations that are common in HPC code. The CSA dataflow operator architecture is highly amenable to deployment-specific extensions. For example, more complex mathematical dataflow operators, e.g., trigonometry functions, may be included in certain embodiments to accelerate certain mathematics-intensive HPC workloads. Similarly, a neural-network tuned extension may include dataflow operators for vectorized, low precision arithmetic.

FIG. 3A illustrates a program source according to embodiments of the disclosure. Program source code includes a multiplication function (func). FIG. 3B illustrates a dataflow graph 300 for the program source of FIG. 3A according to embodiments of the disclosure. Dataflow graph 300 includes a pick node 304, switch node 306, and multiplication node 308. A buffer may optionally be included along one or more of the communication paths. Depicted dataflow graph 300 may perform an operation of selecting input X with pick node 304, multiplying X by Y (e.g., multiplication node 308), and then outputting the result from the left output of the switch node 306.

FIG. 3C illustrates an accelerator (e.g., CSA) with a plurality of processing elements 301 configured to execute the dataflow graph of FIG. 3B according to embodiments of the disclosure. More particularly, the dataflow graph 300 is overlaid into the array of processing elements 301 (e.g., and the (e.g., interconnect) network(s) therebetween), for example, such that each node of the dataflow graph 300 is represented as a dataflow operator in the array of processing elements 301. For example, certain dataflow operations may be achieved with a processing element and/or certain dataflow operations may be achieved with a communications network (e.g., a network dataflow endpoint circuit thereof). For example, a Pick, PickSingleLeg, PickAny, Switch, and/or SwitchAny operation may be achieved with one or more components of a communications network (e.g., a network dataflow endpoint circuit thereof), e.g., in contrast to a processing element.

In one embodiment, one or more of the processing elements in the array of processing elements 301 is to access memory through memory interface 302. In one embodiment, pick node 304 of dataflow graph 300 thus corresponds (e.g., is represented by) to pick operator 304A, switch node 306 of dataflow graph 300 thus corresponds (e.g., is represented by) to switch operator 306A, and multiplier node 308 of dataflow graph 300 thus corresponds (e.g., is represented by) to multiplier operator 308A. Another processing element and/or a flow control path network may provide the control values (e.g., control tokens) to the pick operator 304A and switch operator 306A to perform the operation in FIG. 3A. In one embodiment, array of processing elements 301 is configured to execute the dataflow graph 300 of FIG. 3B before execution begins. In one embodiment, compiler performs the conversion from FIG. 3A-3B. In one embodiment, the input of the dataflow graph nodes into the array of processing elements logically embeds the dataflow graph into the array of processing elements, e.g., as discussed further below, such that the input/output paths are configured to produce the desired result.

1.2 Latency Insensitive Channels

Communications arcs are the second major component of the dataflow graph. Certain embodiments of a CSA describes these arcs as latency insensitive channels, for example, in-order, back-pressured (e.g., not producing or sending output until there is a place to store the output), point-to-point communications channels. As with dataflow operators, latency insensitive channels are fundamentally asynchronous, giving the freedom to compose many types of networks to implement the channels of a particular graph. Latency insensitive channels may have arbitrarily long latencies and still faithfully implement the CSA architecture. However, in certain embodiments there is strong incentive in terms of performance and energy to make latencies as small as possible. Section 2.2 herein discloses a network microarchitecture in which dataflow graph channels are implemented in a pipelined fashion with no more than one cycle of latency. Embodiments of latency-insensitive channels provide a critical abstraction layer which may be leveraged with the CSA architecture to provide a number of runtime services to the applications programmer. For example, a CSA may leverage latency-insensitive channels in the implementation of the CSA configuration (the loading of a program onto the CSA array).

Figure 4:
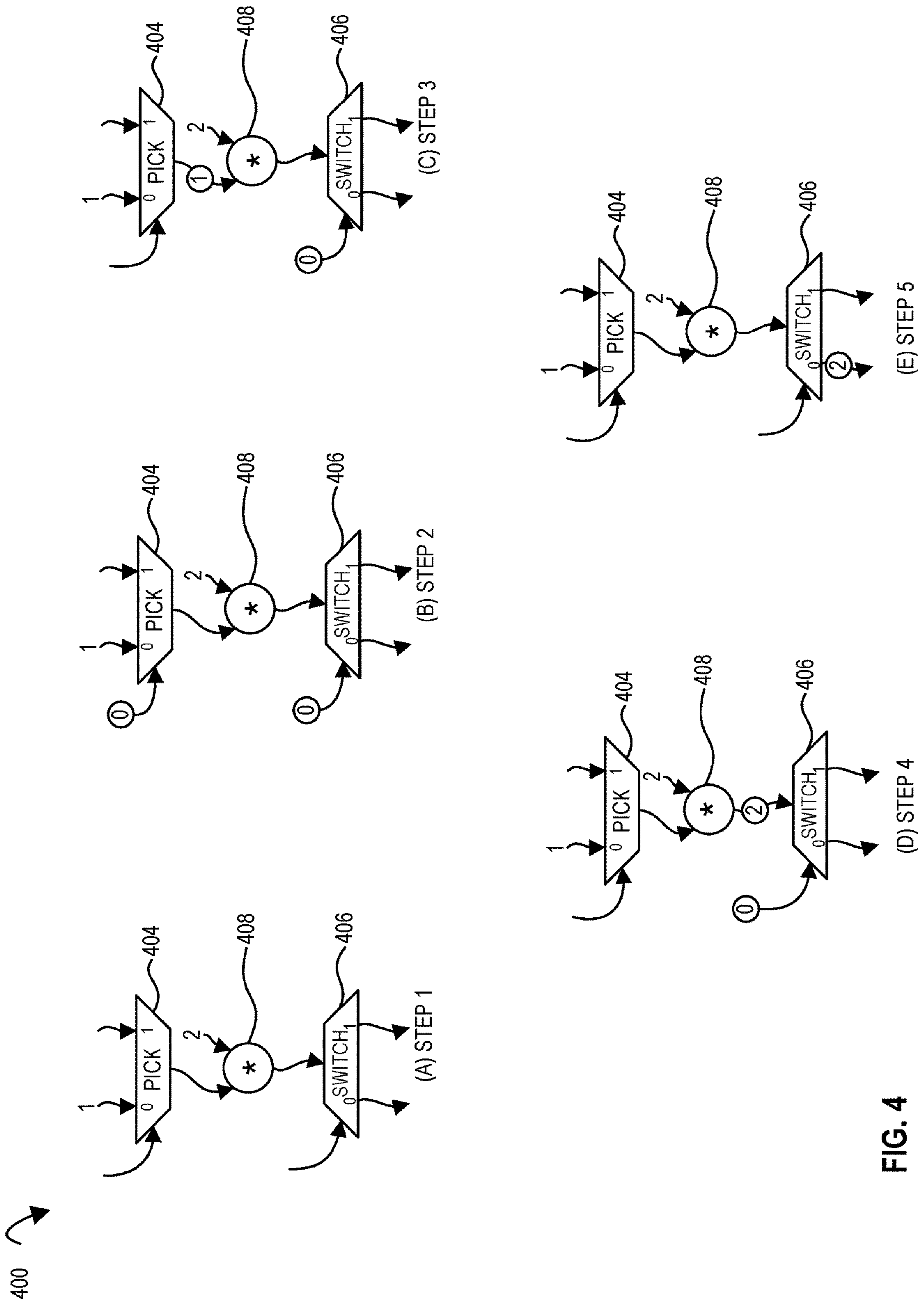
FIG. 4 illustrates an example execution of a dataflow graph according to embodiments of the disclosure.

FIG. 4 illustrates an example execution of a dataflow graph 400 according to embodiments of the disclosure. At step 1, input values (e.g., 1 for X in FIG. 3B and 2 for Y in FIG. 3B) may be loaded in dataflow graph 400 to perform a 1*2 multiplication operation. One or more of the data input values may be static (e.g., constant) in the operation (e.g., 1 for X and 2 for Y in reference to FIG. 3B) or updated during the operation. At step 2, a processing element (e.g., on a flow control path network) or other circuit outputs a zero to control input (e.g., multiplexer control signal) of pick node 404 (e.g., to source a one from port "0" to its output) and outputs a zero to control input (e.g., multiplexer control signal) of switch node 406 (e.g., to provide its input out of port "0" to a destination (e.g., a downstream processing element). At step 3, the data value of 1 is output from pick node 404 (e.g., and consumes its control signal "0" at the pick node 404) to multiplier node 408 to be multiplied with the data value of 2 at step 4. At step 4, the output of multiplier node 408 arrives at switch node 406, e.g., which causes switch node 406 to consume a control signal "0" to output the value of 2 from port "0" of switch node 406 at step 5. The operation is then complete. A CSA may thus be programmed accordingly such that a corresponding dataflow operator for each node performs the operations in FIG. 4. Although execution is serialized in this example, in principle all dataflow operations may execute in parallel. Steps are used in FIG. 4 to differentiate dataflow execution from any physical microarchitectural manifestation. In one embodiment a downstream processing element is to send a signal (or not send a ready signal) (for example, on a flow control path network) to the switch 406 to stall the output from the switch 406, e.g., until the downstream processing element is ready (e.g., has storage room) for the output.

1.3 Memory

Dataflow architectures generally focus on communication and data manipulation with less attention paid to state. However, enabling real software, especially programs written in legacy sequential languages, requires significant attention to interfacing with memory. Certain embodiments of a CSA use architectural memory operations as their primary interface to (e.g., large) stateful storage. From the perspective of the dataflow graph, memory operations are similar to other dataflow operations, except that they have the side effect of updating a shared store. In particular, memory operations of certain embodiments herein have the same semantics as every other dataflow operator, for example, they "execute" when their operands, e.g., an address, are available and, after some latency, a response is produced. Certain embodiments herein explicitly decouple the operand input and result output such that memory operators are naturally pipelined and have the potential to produce many simultaneous outstanding requests, e.g., making them exceptionally well suited to the latency and bandwidth characteristics of a memory subsystem. Embodiments of a CSA provide basic memory operations such as load, which takes an address channel and populates a response channel with the values corresponding to the addresses, and a store. Embodiments of a CSA may also provide more advanced operations such as in-memory atomics and consistency operators. These operations may have similar semantics to their von Neumann counterparts. Embodiments of a CSA may accelerate existing programs described using sequential languages such as C and Fortran. A consequence of supporting these language models is addressing program memory order, e.g., the serial ordering of memory operations typically prescribed by these languages.

FIG. 5 illustrates a program source (e.g., C code) 500 according to embodiments of the disclosure. According to the memory semantics of the C programming language, memory copy (memcpy) should be serialized. However, memcpy may be parallelized with an embodiment of the CSA if arrays A and B are known to be disjoint. FIG. 5 further illustrates the problem of program order. In general, compilers cannot prove that array A is different from array B, e.g., either for the same value of index or different values of index across loop bodies. This is known as pointer or memory aliasing. Since compilers are to generate statically correct code, they are usually forced to serialize memory accesses. Typically, compilers targeting sequential von Neumann architectures use instruction ordering as a natural means of enforcing program order. However, embodiments of the CSA have no notion of instruction or instruction-based program ordering as defined by a program counter. In certain embodiments, incoming dependency tokens, e.g., which contain no architecturally visible information, are like all other dataflow tokens and memory operations may not execute until they have received a dependency token. In certain embodiments, memory operations produce an outgoing dependency token once their operation is visible to all logically subsequent, dependent memory operations. In certain embodiments, dependency tokens are similar to other dataflow tokens in a dataflow graph. For example, since memory operations occur in conditional contexts, dependency tokens may also be manipulated using control operators described in Section 1.1, e.g., like any other tokens. Dependency tokens may have the effect of serializing memory accesses, e.g., providing the compiler a means of architecturally defining the order of memory accesses.

1.4 Runtime Services

A primary architectural considerations of embodiments of the CSA involve the actual execution of user-level programs, but it may also be desirable to provide several support mechanisms which underpin this execution. Chief among these are configuration (in which a dataflow graph is loaded into the CSA), extraction (in which the state of an executing graph is moved to memory), and exceptions (in which mathematical, soft, and other types of errors in the fabric are detected and handled, possibly by an external entity). Section 2. below discusses the properties of a latency-insensitive dataflow architecture of an embodiment of a CSA to yield efficient, largely pipelined implementations of these functions. Conceptually, configuration may load the state of a dataflow graph into the interconnect (and/or communications network (e.g., a network dataflow endpoint circuit thereof)) and processing elements (e.g., fabric), e.g., generally from memory. During this step, all structures in the CSA may be loaded with a new dataflow graph and any dataflow tokens live in that graph, for example, as a consequence of a context switch. The latency-insensitive semantics of a CSA may permit a distributed, asynchronous initialization of the fabric, e.g., as soon as PEs are configured, they may begin execution immediately. Unconfigured PEs may backpressure their channels until they are configured, e.g., preventing communications between configured and unconfigured elements. The CSA configuration may be partitioned into privileged and user-level state. Such a two-level partitioning may enable primary configuration of the fabric to occur without invoking the operating system. During one embodiment of extraction, a logical view of the dataflow graph is captured and committed into memory, e.g., including all live control and dataflow tokens and state in the graph.

Extraction may also play a role in providing reliability guarantees through the creation of fabric checkpoints. Exceptions in a CSA may generally be caused by the same events that cause exceptions in processors, such as illegal operator arguments or reliability, availability, and serviceability (RAS) events. In certain embodiments, exceptions are detected at the level of dataflow operators, for example, checking argument values or through modular arithmetic schemes. Upon detecting an exception, a dataflow operator (e.g., circuit) may halt and emit an exception message, e.g., which contains both an operation identifier and some details of the nature of the problem that has occurred. In one embodiment, the dataflow operator will remain halted until it has been reconfigured. The exception message may then be communicated to an associated processor (e.g., core) for service, e.g., which may include extracting the graph for software analysis.

1.5 Tile-Level Architecture

Figure 6:
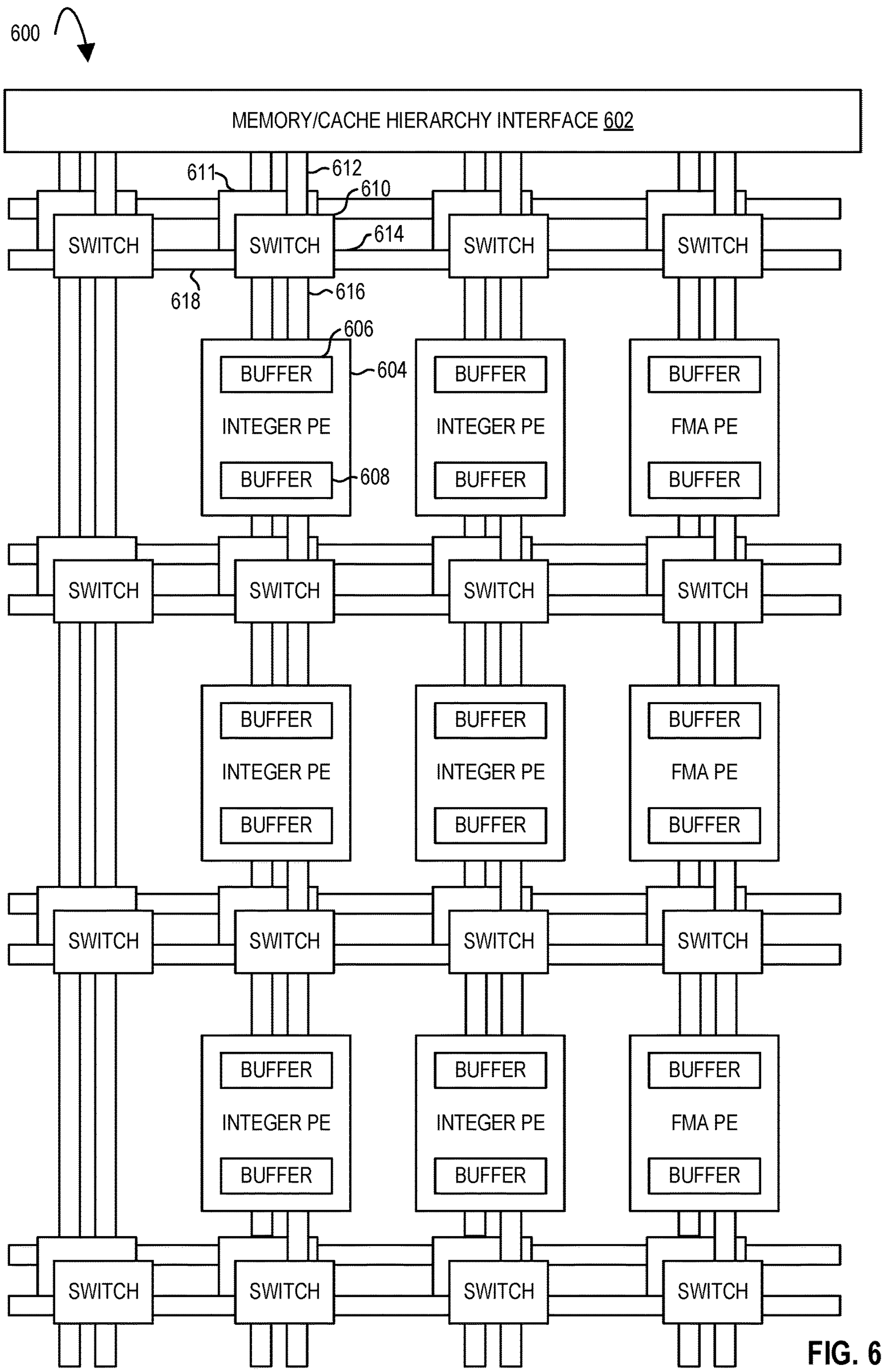
FIG. 6 illustrates an accelerator tile comprising an array of processing elements according to embodiments of the disclosure.
Figure 8:
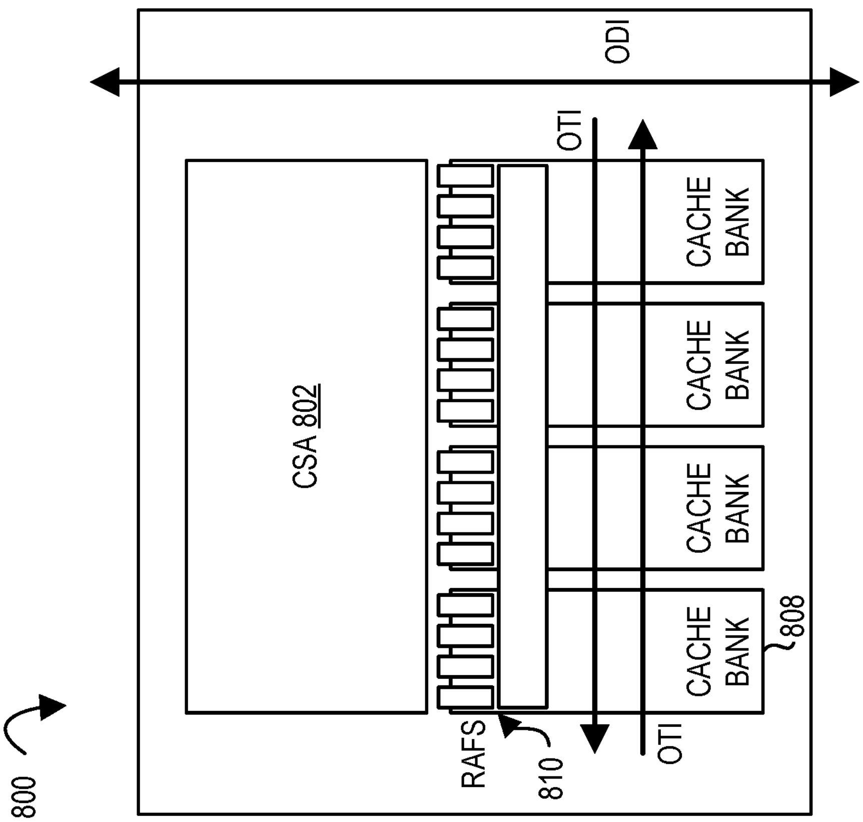
FIG. 8 illustrates a hardware processor tile comprising an accelerator according to embodiments of the disclosure.

Embodiments of the CSA computer architectures (e.g., targeting HPC and datacenter uses) are tiled. FIGS. 6 and 8 show tile-level deployments of a CSA. FIG. 8 shows a full-tile implementation of a CSA, e.g., which may be an accelerator of a processor with a core. A main advantage of this architecture is may be reduced design risk, e.g., such that the CSA and core are completely decoupled in manufacturing. In addition to allowing better component reuse, this may allow the design of components like the CSA Cache to consider only the CSA, e.g., rather than needing to incorporate the stricter latency requirements of the core. Finally, separate tiles may allow for the integration of CSA with small or large cores. One embodiment of the CSA captures most vector-parallel workloads such that most vector-style workloads run directly on the CSA, but in certain embodiments vector-style operations in the core may be included, e.g., to support legacy binaries.

2. Microarchitecture

In one embodiment, the goal of the CSA microarchitecture is to provide a high quality implementation of each dataflow operator specified by the CSA architecture. Embodiments of the CSA microarchitecture provide that each processing element (and/or communications network (e.g., a network dataflow endpoint circuit thereof)) of the microarchitecture corresponds to approximately one node (e.g., entity) in the architectural dataflow graph. In one embodiment, a node in the dataflow graph is distributed in multiple network dataflow endpoint circuits. In certain embodiments, this results in microarchitectural elements that are not only compact, resulting in a dense computation array, but also energy efficient, for example, where processing elements (PEs) are both simple and largely unmultiplexed, e.g., executing a single dataflow operator for a configuration (e.g., programming) of the CSA. To further reduce energy and implementation area, a CSA may include a configurable, heterogeneous fabric style in which each PE thereof implements only a subset of dataflow operators (e.g., with a separate subset of dataflow operators implemented with network dataflow endpoint circuit(s)). Peripheral and support subsystems, such as the CSA cache, may be provisioned to support the distributed parallelism incumbent in the main CSA processing fabric itself. Implementation of CSA microarchitectures may utilize dataflow and latency-insensitive communications abstractions present in the architecture. In certain embodiments, there is (e.g., substantially) a one-to-one correspondence between nodes in the compiler generated graph and the dataflow operators (e.g., dataflow operator compute elements) in a CSA.

Below is a discussion of an example CSA, followed by a more detailed discussion of the microarchitecture. Certain embodiments herein provide a CSA that allows for easy compilation, e.g., in contrast to an existing FPGA compilers that handle a small subset of a programming language (e.g., C or C++) and require many hours to compile even small programs.

Certain embodiments of a CSA architecture admits of heterogeneous coarse-grained operations, like double precision floating point. Programs may be expressed in fewer coarse grained operations, e.g., such that the disclosed compiler runs faster than traditional spatial compilers. Certain embodiments include a fabric with new processing elements to support sequential concepts like program ordered memory accesses. Certain embodiments implement hardware to support coarse-grained dataflow-style communication channels. This communication model is abstract, and very close to the control-dataflow representation used by the compiler. Certain embodiments herein include a network implementation that supports single-cycle latency communications, e.g., utilizing (e.g., small) PEs which support single control-dataflow operations. In certain embodiments, not only does this improve energy efficiency and performance, it simplifies compilation because the compiler makes a one-to-one mapping between high-level dataflow constructs and the fabric. Certain embodiments herein thus simplify the task of compiling existing (e.g., C, C++, or Fortran) programs to a CSA (e.g., fabric).

Energy efficiency may be a first order concern in modern computer systems. Certain embodiments herein provide a new schema of energy-efficient spatial architectures. In certain embodiments, these architectures form a fabric with a unique composition of a heterogeneous mix of small, energy-efficient, data-flow oriented processing elements (PEs) (and/or a packet switched communications network (e.g., a network dataflow endpoint circuit thereof)) with a lightweight circuit switched communications network (e.g., interconnect), e.g., with hardened support for flow control. Due to the energy advantages of each, the combination of these components may form a spatial accelerator (e.g., as part of a computer) suitable for executing compiler-generated parallel programs in an extremely energy efficient manner. Since this fabric is heterogeneous, certain embodiments may be customized for different application domains by introducing new domain-specific PEs. For example, a fabric for high-performance computing might include some customization for double-precision, fused multiply-add, while a fabric targeting deep neural networks might include low-precision floating point operations.

An embodiment of a spatial architecture schema, e.g., as exemplified in FIG. 6, is the composition of light-weight processing elements (PE) connected by an inter-PE network. Generally, PEs may comprise dataflow operators, e.g., where once (e.g., all) input operands arrive at the dataflow operator, some operation (e.g., micro-operation or set of micro-operations) is executed, and the results are forwarded to downstream operators. Control, scheduling, and data storage may therefore be distributed amongst the PEs, e.g., removing the overhead of the centralized structures that dominate classical processors.

Programs may be converted to dataflow graphs that are mapped onto the architecture by configuring PEs and the network to express the control-dataflow graph of the program. Communication channels may be flow-controlled and fully back-pressured, e.g., such that PEs will stall if either source communication channels have no data or destination communication channels are full. In one embodiment, at runtime, data flow through the PEs and channels that have been configured to implement the operation (e.g., an accelerated algorithm). For example, data may be streamed in from memory, through the fabric, and then back out to memory.

Embodiments of such an architecture may achieve remarkable performance efficiency relative to traditional multicore processors: compute (e.g., in the form of PEs) may be simpler, more energy efficient, and more plentiful than in larger cores, and communications may be direct and mostly short-haul, e.g., as opposed to occurring over a wide, full-chip network as in typical multicore processors. Moreover, because embodiments of the architecture are extremely parallel, a number of powerful circuit and device level optimizations are possible without seriously impacting throughput, e.g., low leakage devices and low operating voltage. These lower-level optimizations may enable even greater performance advantages relative to traditional cores. The combination of efficiency at the architectural, circuit, and device levels yields of these embodiments are compelling. Embodiments of this architecture may enable larger active areas as transistor density continues to increase.

Embodiments herein offer a unique combination of dataflow support and circuit switching to enable the fabric to be smaller, more energy-efficient, and provide higher aggregate performance as compared to previous architectures. FPGAs are generally tuned towards fine-grained bit manipulation, whereas embodiments herein are tuned toward the double-precision floating point operations found in HPC applications. Certain embodiments herein may include a FPGA in addition to a CSA according to this disclosure.

Certain embodiments herein combine a light-weight network with energy efficient dataflow processing elements (and/or communications network (e.g., a network dataflow endpoint circuit thereof)) to form a high-throughput, low-latency, energy-efficient HPC fabric. This low-latency network may enable the building of processing elements (and/or communications network (e.g., a network dataflow endpoint circuit thereof)) with fewer functionalities, for example, only one or two operations and perhaps one architecturally visible register, since it is efficient to gang multiple PEs together to form a complete program.

Relative to a processor core, CSA embodiments herein may provide for more computational density and energy efficiency. For example, when PEs are very small (e.g., compared to a core), the CSA may perform many more operations and have much more computational parallelism than a core, e.g., perhaps as many as 16 times the number of FMAs as a vector processing unit (VPU). To utilize all of these computational elements, the energy per operation is very low in certain embodiments.

The energy advantages our embodiments of this dataflow architecture are many. Parallelism is explicit in dataflow graphs and embodiments of the CSA architecture spend no or minimal energy to extract it, e.g., unlike out-of-order processors which must re-discover parallelism each time an operation is executed. Since each PE is responsible for a single operation in one embodiment, the register files and ports counts may be small, e.g., often only one, and therefore use less energy than their counterparts in core. Certain CSAs include many PEs, each of which holds live program values, giving the aggregate effect of a huge register file in a traditional architecture, which dramatically reduces memory accesses. In embodiments where the memory is multi-ported and distributed, a CSA may sustain many more outstanding memory requests and utilize more bandwidth than a core. These advantages may combine to yield an energy level per watt that is only a small percentage over the cost of the bare arithmetic circuitry. For example, in the case of an integer multiply, a CSA may consume no more than 25% more energy than the underlying multiplication circuit. Relative to one embodiment of a core, an integer operation in that CSA fabric consumes less than 1/30th of the energy per integer operation.

From a programming perspective, the application-specific malleability of embodiments of the CSA architecture yields significant advantages over a vector processing unit (VPU). In traditional, inflexible architectures, the number of functional units, like floating divide or the various transcendental mathematical functions, must be chosen at design time based on some expected use case. In embodiments of the CSA architecture, such functions may be configured (e.g., by a user and not a manufacturer) into the fabric based on the requirement of each application. Application throughput may thereby be further increased. Simultaneously, the compute density of embodiments of the CSA improves by avoiding hardening such functions, and instead provision more instances of primitive functions like floating multiplication. These advantages may be significant in HPC workloads, some of which spend 75% of floating execution time in transcendental functions.

Certain embodiments of the CSA represents a significant advance as a dataflow-oriented spatial architectures, e.g., the PEs of this disclosure may be smaller, but also more energy-efficient. These improvements may directly result from the combination of dataflow-oriented PEs with a lightweight, circuit switched interconnect, for example, which has single-cycle latency, e.g., in contrast to a packet switched network (e.g., with, at a minimum, a 300% higher latency). Certain embodiments of PEs support 32-bit or 64-bit operation. Certain embodiments herein permit the introduction of new application-specific PEs, for example, for machine learning or security, and not merely a homogeneous combination. Certain embodiments herein combine lightweight dataflow-oriented processing elements with a lightweight, low-latency network to form an energy efficient computational fabric.

In order for certain spatial architectures to be successful, programmers are to configure them with relatively little effort, e.g., while obtaining significant power and performance superiority over sequential cores. Certain embodiments herein provide for a CSA (e.g., spatial fabric) that is easily programmed (e.g., by a compiler), power efficient, and highly parallel. Certain embodiments herein provide for a (e.g., interconnect) network that achieves these three goals. From a programmability perspective, certain embodiments of the network provide flow controlled channels, e.g., which correspond to the control-dataflow graph (CDFG) model of execution used in compilers. Certain network embodiments utilize dedicated, circuit switched links, such that program performance is easier to reason about, both by a human and a compiler, because performance is predictable. Certain network embodiments offer both high bandwidth and low latency. Certain network embodiments (e.g., static, circuit switching) provides a latency of 0 to 1 cycle (e.g., depending on the transmission distance.) Certain network embodiments provide for a high bandwidth by laying out several networks in parallel, e.g., and in low-level metals. Certain network embodiments communicate in low-level metals and over short distances, and thus are very power efficient.

Certain embodiments of networks include architectural support for flow control. For example, in spatial accelerators composed of small processing elements (PEs), communications latency and bandwidth may be critical to overall program performance. Certain embodiments herein provide for a light-weight, circuit switched network which facilitates communication between PEs in spatial processing arrays, such as the spatial array shown in FIG. 6, and the micro-architectural control features necessary to support this network. Certain embodiments of a network enable the construction of point-to-point, flow controlled communications channels which support the communications of the dataflow oriented processing elements (PEs). In addition to point-to-point communications, certain networks herein also support multicast communications. Communications channels may be formed by statically configuring the network to from virtual circuits between PEs. Circuit switching techniques herein may decrease communications latency and commensurately minimize network buffering, e.g., resulting in both high performance and high energy efficiency. In certain embodiments of a network, inter-PE latency may be as low as a zero cycles, meaning that the downstream PE may operate on data in the cycle after it is produced. To obtain even higher bandwidth, and to admit more programs, multiple networks may be laid out in parallel, e.g., as shown in FIG. 6.

Spatial architectures, such as the one shown in FIG. 6, may be the composition of lightweight processing elements connected by an inter-PE network (and/or communications network (e.g., a network dataflow endpoint circuit thereof)). Programs, viewed as dataflow graphs, may be mapped onto the architecture by configuring PEs and the network. Generally, PEs may be configured as dataflow operators, and once (e.g., all) input operands arrive at the PE, some operation may then occur, and the result are forwarded to the desired downstream PEs. PEs may communicate over dedicated virtual circuits which are formed by statically configuring a circuit switched communications network. These virtual circuits may be flow controlled and fully back-pressured, e.g., such that PEs will stall if either the source has no data or the destination is full. At runtime, data may flow through the PEs implementing the mapped algorithm. For example, data may be streamed in from memory, through the fabric, and then back out to memory. Embodiments of this architecture may achieve remarkable performance efficiency relative to traditional multicore processors: for example, where compute, in the form of PEs, is simpler and more numerous than larger cores and communication are direct, e.g., as opposed to an extension of the memory system.

FIG. 6 illustrates an accelerator tile 600 comprising an array of processing elements (PEs) according to embodiments of the disclosure. The interconnect network is depicted as circuit switched, statically configured communications channels. For example, a set of channels coupled together by a switch (e.g., switch 610 in a first network and switch 611 in a second network). The first network and second network may be separate or coupled together. For example, switch 610 may couple one or more of the four data paths (612, 614, 616, 618) together, e.g., as configured to perform an operation according to a dataflow graph. In one embodiment, the number of data paths is any plurality. Processing element (e.g., processing element 604) may be as disclosed herein, for example, as in FIG. 9. Accelerator tile 600 includes a memory/cache hierarchy interface 602, e.g., to interface the accelerator tile 600 with a memory and/or cache. A data path (e.g., 618) may extend to another tile or terminate, e.g., at the edge of a tile. A processing element may include an input buffer (e.g., buffer 606) and an output buffer (e.g., buffer 608).

Figure 9:
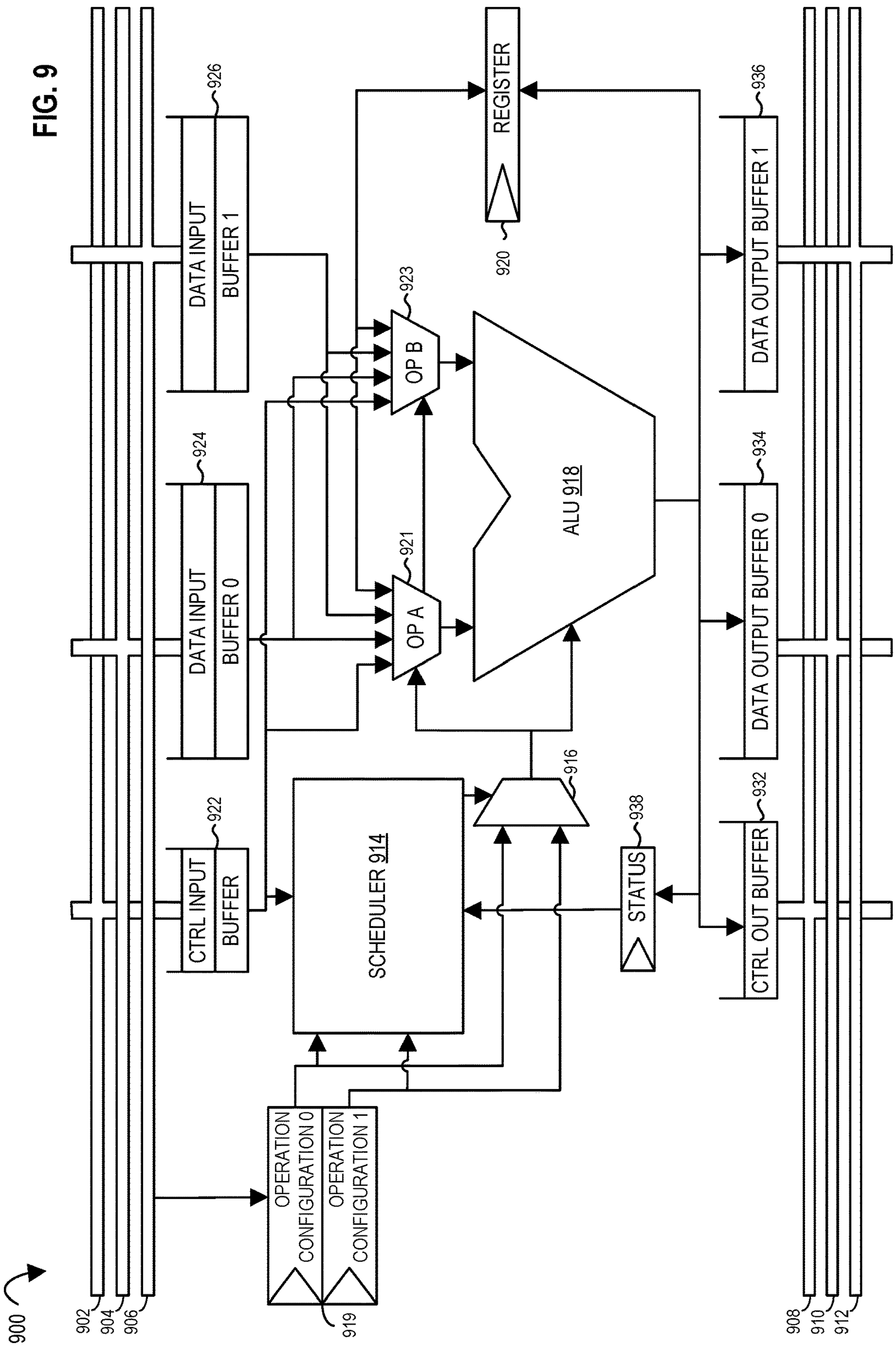
FIG. 9 illustrates a processing element according to embodiments of the disclosure.

Operations may be executed based on the availability of their inputs and the status of the PE. A PE may obtain operands from input channels and write results to output channels, although internal register state may also be used. Certain embodiments herein include a configurable dataflow-friendly PE. FIG. 9 shows a detailed block diagram of one such PE: the integer PE. This PE consists of several I/O buffers, an ALU, a storage register, some operation registers, and a scheduler. Each cycle, the scheduler may select an operation for execution based on the availability of the input and output buffers and the status of the PE. The result of the operation may then be written to either an output buffer or to a (e.g., local to the PE) register. Data written to an output buffer may be transported to a downstream PE for further processing. This style of PE may be extremely energy efficient, for example, rather than reading data from a complex, multi-ported register file, a PE reads the data from a register. Similarly, operations may be stored directly in a register, rather than in a virtualized operation cache.

Operation registers may be set during a special configuration step. During this step, auxiliary control wires and state, in addition to the inter-PE network, may be used to stream in configuration across the several PEs comprising the fabric. As result of parallelism, certain embodiments of such a network may provide for rapid reconfiguration, e.g., a tile sized fabric may be configured in less than about 10 microseconds.

FIG. 9 represents one example configuration of a processing element, e.g., in which all architectural elements are minimally sized. In other embodiments, each of the components of a processing element is independently scaled to produce new PEs. For example, to handle more complicated programs, a larger number of operations that are executable by a PE may be introduced. A second dimension of configurability is in the function of the PE arithmetic logic unit (ALU). In FIG. 9, an integer PE is depicted which may support addition, subtraction, and various logic operations. Other kinds of PEs may be created by substituting different kinds of functional units into the PE. An integer multiplication PE, for example, might have no registers, a single operation, and a single output buffer. Certain embodiments of a PE decompose a fused multiply add (FMA) into separate, but tightly coupled floating multiply and floating add units to improve support for multiply-add-heavy workloads. PEs are discussed further below.

Figure 7A:
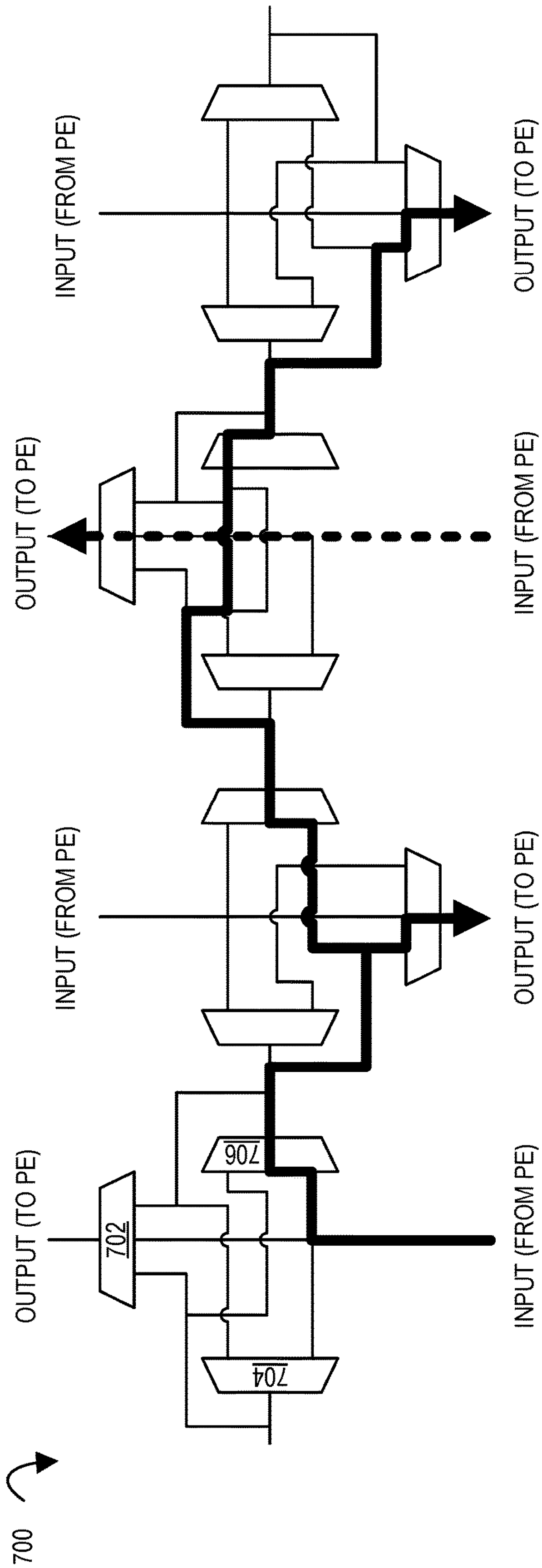
FIG. 7A illustrates a configurable data path network according to embodiments of the disclosure.
Figure 7B:
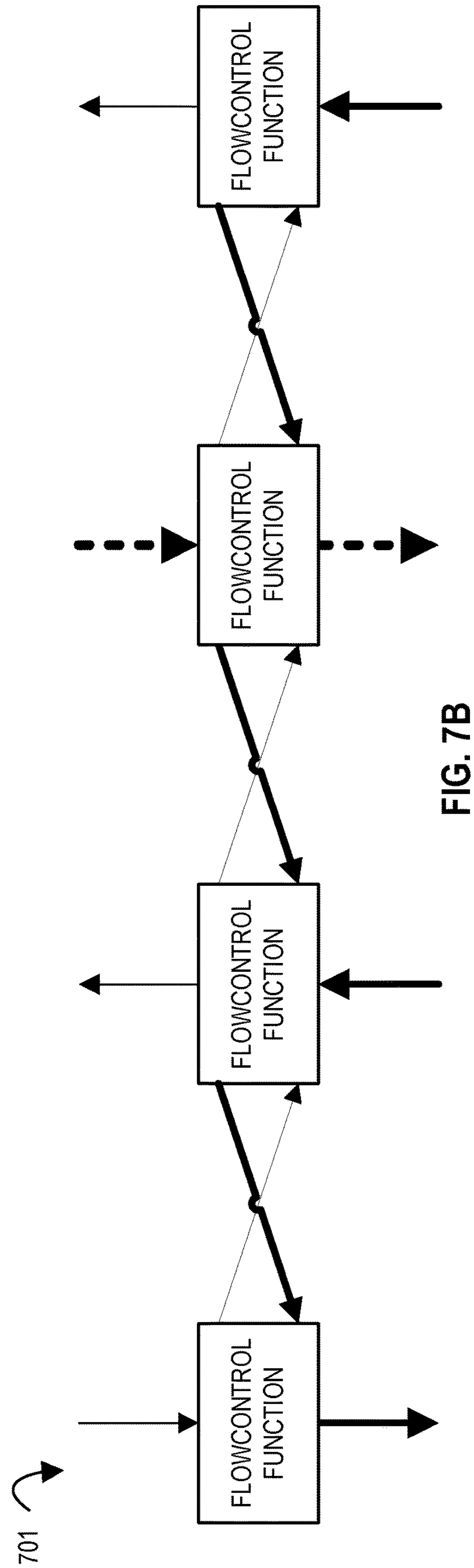
FIG. 7B illustrates a configurable flow control path network according to embodiments of the disclosure.

FIG. 7A illustrates a configurable data path network 700 (e.g., of network one or network two discussed in reference to FIG. 6) according to embodiments of the disclosure. Network 700 includes a plurality of multiplexers (e.g., multiplexers 702, 704, 706) that may be configured (e.g., via their respective control signals) to connect one or more data paths (e.g., from PEs) together. FIG. 7B illustrates a configurable flow control path network 701 (e.g., network one or network two discussed in reference to FIG. 6) according to embodiments of the disclosure. A network may be a light-weight PE-to-PE network. Certain embodiments of a network may be thought of as a set of composable primitives for the construction of distributed, point-to-point data channels. FIG. 7A shows a network that has two channels enabled, the bold black line and the dotted black line. The bold black line channel is multicast, e.g., a single input is sent to two outputs. Note that channels may cross at some points within a single network, even though dedicated circuit switched paths are formed between channel endpoints. Furthermore, this crossing may not introduce a structural hazard between the two channels, so that each operates independently and at full bandwidth.

Implementing distributed data channels may include two paths, illustrated in FIGS. 7A-7B. The forward, or data path, carries data from a producer to a consumer. Multiplexors may be configured to steer data and valid bits from the producer to the consumer, e.g., as in FIG. 7A. In the case of multicast, the data will be steered to multiple consumer endpoints. The second portion of this embodiment of a network is the flow control or backpressure path, which flows in reverse of the forward data path, e.g., as in FIG. 7B. Consumer endpoints may assert when they are ready to accept new data. These signals may then be steered back to the producer using configurable logical conjunctions, labelled as (e.g., backflow) flowcontrol function in FIG. 7B. In one embodiment, each flowcontrol function circuit may be a plurality of switches (e.g., muxes), for example, similar to FIG. 7A. The flow control path may handle returning control data from consumer to producer. Conjunctions may enable multicast, e.g., where each consumer is ready to receive data before the producer assumes that it has been received. In one embodiment, a PE is a PE that has a dataflow operator as its architectural interface. Additionally or alternatively, in one embodiment a PE may be any kind of PE (e.g., in the fabric), for example, but not limited to, a PE that has an operation pointer, triggered operation, or state machine based architectural interface.

The network may be statically configured, e.g., in addition to PEs being statically configured. During the configuration step, configuration bits may be set at each network component. These bits control, for example, the multiplexer selections and flow control functions. A network may comprise a plurality of networks, e.g., a data path network and a flow control path network. A network or plurality of networks may utilize paths of different widths (e.g., a first width, and a narrower or wider width). In one embodiment, a data path network has a wider (e.g., bit transport) width than the width of a flow control path network. In one embodiment, each of a first network and a second network includes their own data path network and flow control path network, e.g., data path network A and flow control path network A and wider data path network B and flow control path network B.

Certain embodiments of a network are bufferless, and data is to move between producer and consumer in a single cycle. Certain embodiments of a network are also boundless, that is, the network spans the entire fabric. In one embodiment, one PE is to communicate with any other PE in a single cycle. In one embodiment, to improve routing bandwidth, several networks may be laid out in parallel between rows of PEs.

Relative to FPGAs, certain embodiments of networks herein have three advantages: area, frequency, and program expression. Certain embodiments of networks herein operate at a coarse grain, e.g., which reduces the number configuration bits, and thereby the area of the network. Certain embodiments of networks also obtain area reduction by implementing flow control logic directly in circuitry (e.g., silicon). Certain embodiments of hardened network implementations also enjoys a frequency advantage over FPGA. Because of an area and frequency advantage, a power advantage may exist where a lower voltage is used at throughput parity. Finally, certain embodiments of networks provide better high-level semantics than FPGA wires, especially with respect to variable timing, and thus those certain embodiments are more easily targeted by compilers. Certain embodiments of networks herein may be thought of as a set of composable primitives for the construction of distributed, point-to-point data channels.

In certain embodiments, a multicast source may not assert its data valid unless it receives a ready signal from each sink. Therefore, an extra conjunction and control bit may be utilized in the multicast case.

Like certain PEs, the network may be statically configured. During this step, configuration bits are set at each network component. These bits control, for example, the multiplexer selection and flow control function. The forward path of our network requires some bits to swing its muxes. In the example shown in FIG. 7A, four bits per hop are required: the east and west muxes utilize one bit each, while the southbound multiplexer utilize two bits. In this embodiment, four bits may be utilized for the data path, but 7 bits may be utilized for the flow control function (e.g., in the flow control path network). Other embodiments may utilize more bits, for example, if a CSA further utilizes a north-south direction. The flow control function may utilize a control bit for each direction from which flow control can come. This may enables the setting of the sensitivity of the flow control function statically. The table 1 below summarizes the Boolean algebraic implementation of the flow control function for the network in FIG. 7B, with configuration bits capitalized. In this example, seven bits are utilized.

TABLE 1

| Flow Implementation | |
|---|---|
| readyToEast | (EAST_WEST_SENSITIVE + readyFromWest)* (EAST_SOUTH_SENSITIVE + readyFromSouth) |
| readyToWest | (WEST_EAST_SENSITIVE + readyFromEast)* (WEST_SOUTH_SENSITIVE + readyFromSouth) |
| readyToNorth | (NORTH_WEST_SENSITIVE + readyFromWest)* (NORTH_EAST_SENSITIVE + readyFromEast)* (NORTH_SOUTH_SENSITIVE + readyFromSouth) |

For the third flow control box from the left in FIG. 7B, EAST_WEST_SENSITIVE and NORTH_SOUTH_SENSITIVE are depicted as set to implement the flow control for the bold line and dotted line channels, respectively.

FIG. 8 illustrates a hardware processor tile 800 comprising an accelerator 802 according to embodiments of the disclosure. Accelerator 802 may be a CSA according to this disclosure. Tile 800 includes a plurality of cache banks (e.g., cache bank 808). Request address file (RAF) circuits 810 may be included, e.g., as discussed below in Section 2.2. ODI may refer to an On Die Interconnect, e.g., an interconnect stretching across an entire die connecting up all the tiles. OTI may refer to an On Tile Interconnect, for example, stretching across a tile, e.g., connecting cache banks on the tile together.

2.1 Processing Elements

In certain embodiments, a CSA includes an array of heterogeneous PEs, in which the fabric is composed of several types of PEs each of which implement only a subset of the dataflow operators. By way of example, FIG. 9 shows a provisional implementation of a PE capable of implementing a broad set of the integer and control operations. Other PEs, including those supporting floating point addition, floating point multiplication, buffering, and certain control operations may have a similar implementation style, e.g., with the appropriate (dataflow operator) circuitry substituted for the ALU. PEs (e.g., dataflow operators) of a CSA may be configured (e.g., programmed) before the beginning of execution to implement a particular dataflow operation from among the set that the PE supports. A configuration may include one or two control words which specify an opcode controlling the ALU, steer the various multiplexors within the PE, and actuate dataflow into and out of the PE channels. Dataflow operators may be implemented by microcoding these configurations bits. The depicted integer PE 900 in FIG. 9 is organized as a single-stage logical pipeline flowing from top to bottom. Data enters PE 900 from one of set of local networks, where it is registered in an input buffer for subsequent operation. Each PE may support a number of wide, data-oriented and narrow, control-oriented channels. The number of provisioned channels may vary based on PE functionality, but one embodiment of an integer-oriented PE has 2 wide and 1-2 narrow input and output channels. Although the integer PE is implemented as a single-cycle pipeline, other pipelining choices may be utilized. For example, multiplication PEs may have multiple pipeline stages.

PE execution may proceed in a dataflow style. Based on the configuration microcode, the scheduler may examine the status of the PE ingress and egress buffers, and, when all the inputs for the configured operation have arrived and the egress buffer of the operation is available, orchestrates the actual execution of the operation by a dataflow operator (e.g., on the ALU). The resulting value may be placed in the configured egress buffer. Transfers between the egress buffer of one PE and the ingress buffer of another PE may occur asynchronously as buffering becomes available. In certain embodiments, PEs are provisioned such that at least one dataflow operation completes per cycle. Section 2 discussed dataflow operator encompassing primitive operations, such as add, xor, or pick. Certain embodiments may provide advantages in energy, area, performance, and latency. In one embodiment, with an extension to a PE control path, more fused combinations may be enabled. In one embodiment, the width of the processing elements is 64 bits, e.g., for the heavy utilization of double-precision floating point computation in HPC and to support 64-bit memory addressing.

2.2 Communications Networks

Embodiments of the CSA microarchitecture provide a hierarchy of networks which together provide an implementation of the architectural abstraction of latency-insensitive channels across multiple communications scales. The lowest level of CSA communications hierarchy may be the local network. The local network may be statically circuit switched, e.g., using configuration registers to swing multiplexor(s) in the local network data-path to form fixed electrical paths between communicating PEs. In one embodiment, the configuration of the local network is set once per dataflow graph, e.g., at the same time as the PE configuration. In one embodiment, static, circuit switching optimizes for energy, e.g., where a large majority (perhaps greater than 95%) of CSA communications traffic will cross the local network. A program may include terms which are used in multiple expressions. To optimize for this case, embodiments herein provide for hardware support for multicast within the local network. Several local networks may be ganged together to form routing channels, e.g., which are interspersed (as a grid) between rows and columns of PEs. As an optimization, several local networks may be included to carry control tokens. In comparison to a FPGA interconnect, a CSA local network may be routed at the granularity of the data-path, and another difference may be a CSA's treatment of control. One embodiment of a CSA local network is explicitly flow controlled (e.g., back-pressured). For example, for each forward data-path and multiplexor set, a CSA is to provide a backward-flowing flow control path that is physically paired with the forward data-path. The combination of the two microarchitectural paths may provide a low-latency, low-energy, low-area, point-to-point implementation of the latency-insensitive channel abstraction. In one embodiment, a CSA's flow control lines are not visible to the user program, but they may be manipulated by the architecture in service of the user program. For example, the exception handling mechanisms described in Section 1.2 may be achieved by pulling flow control lines to a "not present" state upon the detection of an exceptional condition. This action may not only gracefully stalls those parts of the pipeline which are involved in the offending computation, but may also preserve the machine state leading up the exception, e.g., for diagnostic analysis. The second network layer, e.g., the mezzanine network, may be a shared, packet switched network. Mezzanine network may include a plurality of distributed network controllers, network dataflow endpoint circuits. The mezzanine network (e.g., the network schematically indicated by the dotted box in FIG. 137) may provide more general, long range communications, e.g., at the cost of latency, bandwidth, and energy. In some programs, most communications may occur on the local network, and thus mezzanine network provisioning will be considerably reduced in comparison, for example, each PE may connects to multiple local networks, but the CSA will provision only one mezzanine endpoint per logical neighborhood of PEs. Since the mezzanine is effectively a shared network, each mezzanine network may carry multiple logically independent channels, e.g., and be provisioned with multiple virtual channels. In one embodiment, the main function of the mezzanine network is to provide wide-range communications in-between PEs and between PEs and memory. In addition to this capability, the mezzanine may also include network dataflow endpoint circuit(s), for example, to perform certain dataflow operations. In addition to this capability, the mezzanine may also operate as a runtime support network, e.g., by which various services may access the complete fabric in a user-program-transparent manner. In this capacity, the mezzanine endpoint may function as a controller for its local neighborhood, for example, during CSA configuration. To form channels spanning a CSA tile, three subchannels and two local network channels (which carry traffic to and from a single channel in the mezzanine network) may be utilized. In one embodiment, one mezzanine channel is utilized, e.g., one mezzanine and two local=3 total network hops.

The composability of channels across network layers may be extended to higher level network layers at the inter-tile, inter-die, and fabric granularities.

FIG. 9 illustrates a processing element 900 according to embodiments of the disclosure. In one embodiment, operation configuration register 919 is loaded during configuration (e.g., mapping) and specifies the particular operation (or operations) this processing (e.g., compute) element is to perform. Register 920 activity may be controlled by that operation (an output of multiplexer 916, e.g., controlled by the scheduler 914). Scheduler 914 may schedule an operation or operations of processing element 900, for example, when input data and control input arrives. Control input buffer 922 is connected to local network 902 (e.g., and local network 902 may include a data path network as in FIG. 7A and a flow control path network as in FIG. 7B) and is loaded with a value when it arrives (e.g., the network has a data bit(s) and valid bit(s)). Control output buffer 932, data output buffer 934, and/or data output buffer 936 may receive an output of processing element 900, e.g., as controlled by the operation (an output of multiplexer 916). Status register 938 may be loaded whenever the ALU 918 executes (also controlled by output of multiplexer 916). Data in control input buffer 922 and control output buffer 932 may be a single bit. Multiplexer 921 (e.g., operand A) and multiplexer 923 (e.g., operand B) may source inputs.

For example, suppose the operation of this processing (e.g., compute) element is (or includes) what is called call a pick in FIG. 3B. The processing element 900 then is to select data from either data input buffer 924 or data input buffer 926, e.g., to go to data output buffer 934 (e.g., default) or data output buffer 936. The control bit in 922 may thus indicate a 0 if selecting from data input buffer 924 or a 1 if selecting from data input buffer 926.

For example, suppose the operation of this processing (e.g., compute) element is (or includes) what is called call a switch in FIG. 3B. The processing element 900 is to output data to data output buffer 934 or data output buffer 936, e.g., from data input buffer 924 (e.g., default) or data input buffer 926. The control bit in 922 may thus indicate a 0 if outputting to data output buffer 934 or a 1 if outputting to data output buffer 936.

Multiple networks (e.g., interconnects) may be connected to a processing element, e.g., (input) networks 902, 904, 906 and (output) networks 908, 910, 912. The connections may be switches, e.g., as discussed in reference to FIGS. 7A and 7B. In one embodiment, each network includes two subnetworks (or two channels on the network), e.g., one for the data path network in FIG. 7A and one for the flow control (e.g., backpressure) path network in FIG. 7B. As one example, local network 902 (e.g., set up as a control interconnect) is depicted as being switched (e.g., connected) to control input buffer 922. In this embodiment, a data path (e.g., network as in FIG. 7A) may carry the control input value (e.g., bit or bits) (e.g., a control token) and the flow control path (e.g., network) may carry the backpressure signal (e.g., backpressure or no-backpressure token) from control input buffer 922, e.g., to indicate to the upstream producer (e.g., PE) that a new control input value is not to be loaded into (e.g., sent to) control input buffer 922 until the backpressure signal indicates there is room in the control input buffer 922 for the new control input value (e.g., from a control output buffer of the upstream producer). In one embodiment, the new control input value may not enter control input buffer 922 until both (i) the upstream producer receives the "space available" backpressure signal from "control input" buffer 922 and (ii) the new control input value is sent from the upstream producer, e.g., and this may stall the processing element 900 until that happens (and space in the target, output buffer(s) is available).

Data input buffer 924 and data input buffer 926 may perform similarly, e.g., local network 904 (e.g., set up as a data (as opposed to control) interconnect) is depicted as being switched (e.g., connected) to data input buffer 924. In this embodiment, a data path (e.g., network as in FIG. 7A) may carry the data input value (e.g., bit or bits) (e.g., a dataflow token) and the flow control path (e.g., network) may carry the backpressure signal (e.g., backpressure or no-backpressure token) from data input buffer 924, e.g., to indicate to the upstream producer (e.g., PE) that a new data input value is not to be loaded into (e.g., sent to) data input buffer 924 until the backpressure signal indicates there is room in the data input buffer 924 for the new data input value (e.g., from a data output buffer of the upstream producer). In one embodiment, the new data input value may not enter data input buffer 924 until both (i) the upstream producer receives the "space available" backpressure signal from "data input" buffer 924 and (ii) the new data input value is sent from the upstream producer, e.g., and this may stall the processing element 900 until that happens (and space in the target, output buffer(s) is available). A control output value and/or data output value may be stalled in their respective output buffers (e.g., 932, 934, 936) until a backpressure signal indicates there is available space in the input buffer for the downstream processing element(s).

A processing element 900 may be stalled from execution until its operands (e.g., a control input value and its corresponding data input value or values) are received and/or until there is room in the output buffer(s) of the processing element 900 for the data that is to be produced by the execution of the operation on those operands.

2.3 Memory Interface

Figure 10:
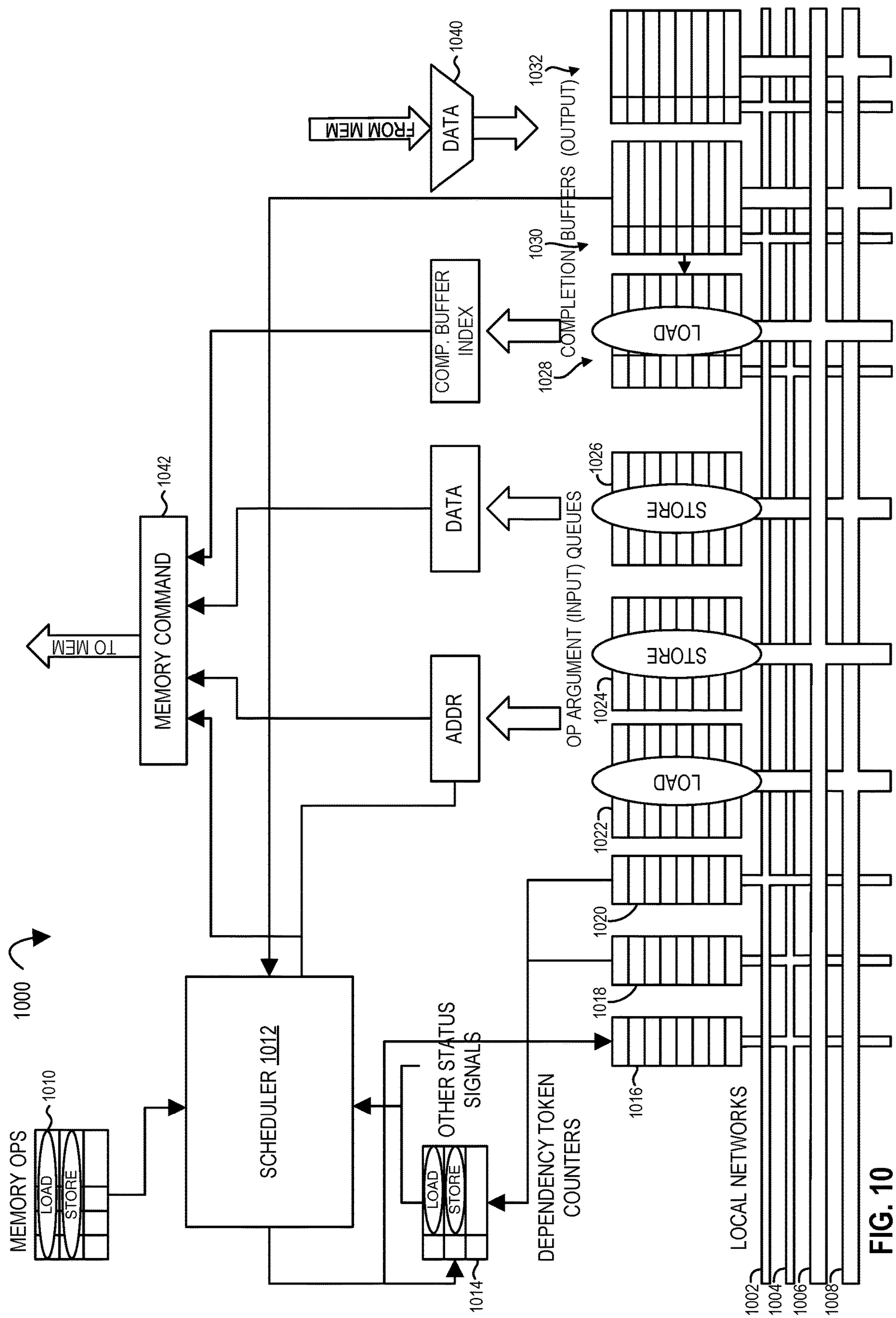
FIG. 10 illustrates a request address file (RAF) circuit according to embodiments of the disclosure.

The request address file (RAF) circuit, a simplified version of which is shown in FIG. 10, may be responsible for executing memory operations and serves as an intermediary between the CSA fabric and the memory hierarchy. As such, the main microarchitectural task of the RAF may be to rationalize the out-of-order memory subsystem with the in-order semantics of CSA fabric. In this capacity, the RAF circuit may be provisioned with completion buffers, e.g., queue-like structures that re-order memory responses and return them to the fabric in the request order. The second major functionality of the RAF circuit may be to provide support in the form of address translation and a page walker. Incoming virtual addresses may be translated to physical addresses using a channel-associative translation lookaside buffer (TLB). To provide ample memory bandwidth, each CSA tile may include multiple RAF circuits. Like the various PEs of the fabric, the RAF circuits may operate in a dataflow-style by checking for the availability of input arguments and output buffering, if required, before selecting a memory operation to execute. Unlike some PEs, however, the RAF circuit is multiplexed among several co-located memory operations. A multiplexed RAF circuit may be used to minimize the area overhead of its various subcomponents, e.g., to share the Accelerator Cache Interface (ACI) network (described in more detail in Section 2.4), shared virtual memory (SVM) support hardware, mezzanine network interface, and other hardware management facilities. However, there are some program characteristics that may also motivate this choice. In one embodiment, a (e.g., valid) dataflow graph is to poll memory in a shared virtual memory system. Memory-latency-bound programs, like graph traversals, may utilize many separate memory operations to saturate memory bandwidth due to memory-dependent control flow. Although each RAF may be multiplexed, a CSA may include multiple (e.g., between 8 and 32) RAFs at a tile granularity to ensure adequate cache bandwidth. RAFs may communicate with the rest of the fabric via both the local network and the mezzanine network. Where RAFs are multiplexed, each RAF may be provisioned with several ports into the local network. These ports may serve as a minimum-latency, highly-deterministic path to memory for use by latency-sensitive or high-bandwidth memory operations. In addition, a RAF may be provisioned with a mezzanine network endpoint, e.g., which provides memory access to runtime services and distant user-level memory accessory.

FIG. 10 illustrates a request address file (RAF) circuit 1000 according to embodiments of the disclosure. In one embodiment, at configuration time, the memory load and store operations that were in a dataflow graph are specified in registers 1010. The arcs to those memory operations in the dataflow graphs may then be connected to the input queues 1022, 1024, and 1026. The arcs from those memory operations are thus to leave completion buffers 1028, 1030, or 1032. Dependency tokens (which may be single bits) arrive into queues 1018 and 1020. Dependency tokens are to leave from queue 1016. Dependency token counter 1014 may be a compact representation of a queue and track a number of dependency tokens used for any given input queue. If the dependency token counters 1014 saturate, no additional dependency tokens may be generated for new memory operations. Accordingly, a memory ordering circuit (e.g., a RAF in FIG. 11) may stall scheduling new memory operations until the dependency token counters 1014 becomes unsaturated.

As an example for a load, an address arrives into queue 1022 which the scheduler 1012 matches up with a load in 1010. A completion buffer slot for this load is assigned in the order the address arrived. Assuming this particular load in the graph has no dependencies specified, the address and completion buffer slot are sent off to the memory system by the scheduler (e.g., via memory command 1042). When the result returns to multiplexer 1040 (shown schematically), it is stored into the completion buffer slot it specifies (e.g., as it carried the target slot all along though the memory system). The completion buffer sends results back into local network (e.g., local network 1002, 1004, 1006, or 1008) in the order the addresses arrived.

Stores may be similar except both address and data have to arrive before any operation is sent off to the memory system.

2.4 Cache

Figure 11:
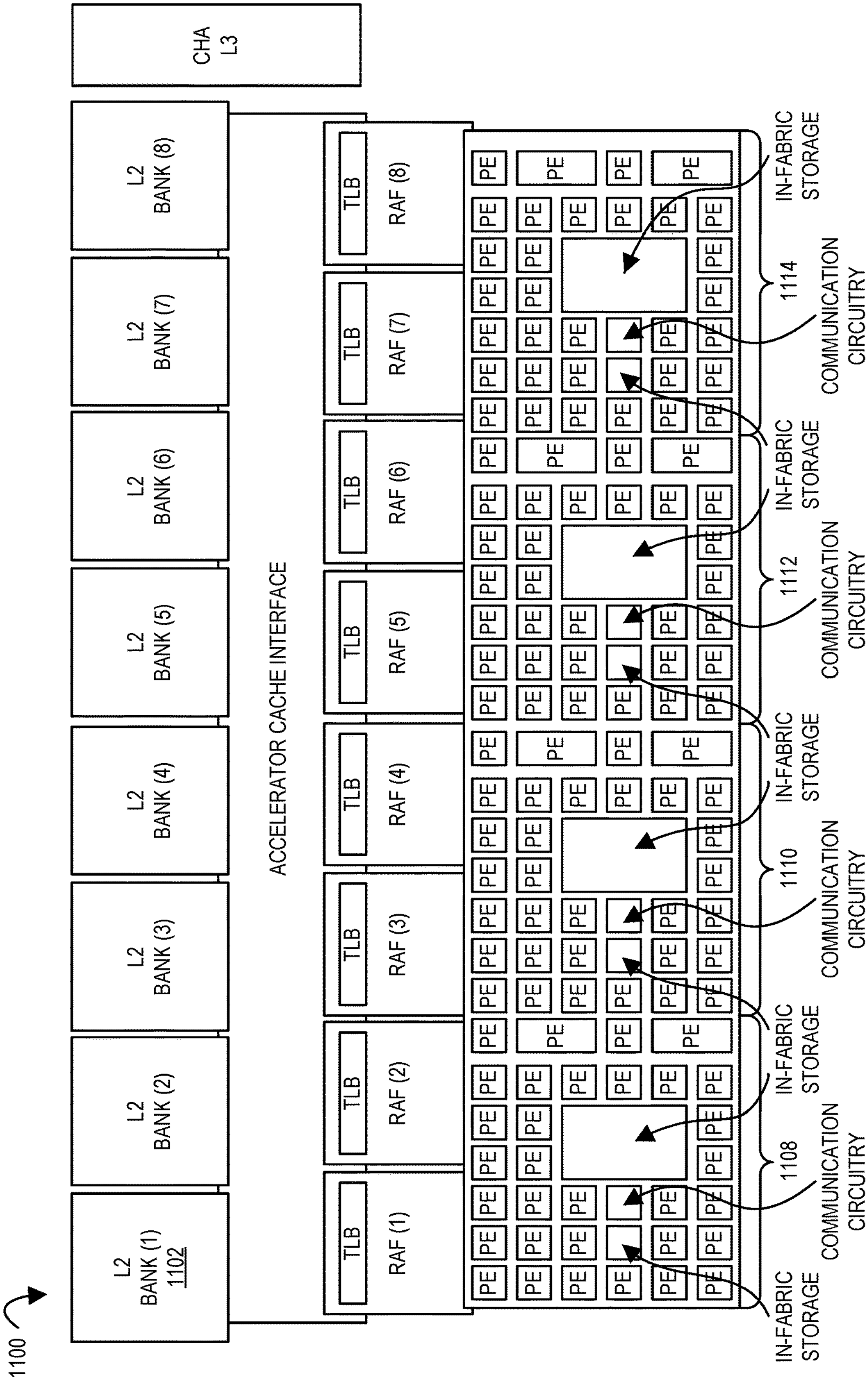
FIG. 11 illustrates a plurality of request address file (RAF) circuits coupled between a plurality of accelerator tiles and a plurality of cache banks according to embodiments of the disclosure.

Dataflow graphs may be capable of generating a profusion of (e.g., word granularity) requests in parallel. Thus, certain embodiments of the CSA provide a cache subsystem with sufficient bandwidth to service the CSA. A heavily banked cache microarchitecture, e.g., as shown in FIG. 11 may be utilized. FIG. 11 illustrates a circuit 1100 with a plurality of request address file (RAF) circuits (e.g., RAF circuit (1)) coupled between a plurality of accelerator tiles (1108, 1110, 1112, 1114) and a plurality of cache banks (e.g., cache bank 1102) according to embodiments of the disclosure. In one embodiment, the number of RAFs and cache banks may be in a ratio of either 1:1 or 1:2. Cache banks may contain full cache lines (e.g., as opposed to sharding by word), with each line having exactly one home in the cache. Cache lines may be mapped to cache banks via a pseudo-random function. The CSA may adopt the shared virtual memory (SVM) model to integrate with other tiled architectures. Certain embodiments include an Accelerator Cache Interface (ACI) network connecting the RAFs to the cache banks. This network may carry address and data between the RAFs and the cache. The topology of the ACI may be a cascaded crossbar, e.g., as a compromise between latency and implementation complexity.

2.5 Network Resources, e.g., Circuitry, to Perform (e.g., Dataflow) Operations

In certain embodiments, processing elements (PEs) communicate using dedicated virtual circuits which are formed by statically configuring a (e.g., circuit switched) communications network. These virtual circuits may be flow controlled and fully back-pressured, e.g., such that a PE will stall if either the source has no data or its destination is full. At runtime, data may flow through the PEs implementing the mapped dataflow graph (e.g., mapped algorithm). For example, data may be streamed in from memory, through the (e.g., fabric area of a) spatial array of processing elements, and then back out to memory.

Such an architecture may achieve remarkable performance efficiency relative to traditional multicore processors: compute, e.g., in the form of PEs, may be simpler and more numerous than cores and communications may be direct, e.g., as opposed to an extension of the memory system. However, the (e.g., fabric area of) spatial array of processing elements may be tuned for the implementation of compiler-generated expression trees, which may feature little multiplexing or demultiplexing. Certain embodiments herein extend (for example, via network resources, such as, but not limited to, network dataflow endpoint circuits) the architecture to support (e.g., high-radix) multiplexing and/or demultiplexing, for example, especially in the context of function calls.

Spatial arrays, such as the spatial array of processing elements 101 in FIG. 1, may use (e.g., packet switched) networks for communications. Certain embodiments herein provide circuitry to overlay high-radix dataflow operations on these networks for communications. For example, certain embodiments herein utilize the existing network for communications (e.g., interconnect network 104 described in reference to FIG. 1) to provide data routing capabilities between processing elements and other components of the spatial array, but also augment the network (e.g., network endpoints) to support the performance and/or control of some (e.g., less than all) of dataflow operations (e.g., without utilizing the processing elements to perform those dataflow operations). In one embodiment, (e.g., high radix) dataflow operations are supported with special hardware structures (e.g. network dataflow endpoint circuits) within a spatial array, for example, without consuming processing resources or degrading performance (e.g., of the processing elements).

In one embodiment, a circuit switched network between two points (e.g., between a producer and consumer of data) includes a dedicated communication line between those two points, for example, with (e.g., physical) switches between the two points set to create a (e.g., exclusive) physical circuit between the two points. In one embodiment, a circuit switched network between two points is set up at the beginning of use of the connection between the two points and maintained throughout the use of the connection. In another embodiment, a packet switched network includes a shared communication line (e.g., channel) between two (e.g., or more) points, for example, where packets from different connections share that communication line (for example, routed according to data of each packet, e.g., in the header of a packet including a header and a payload). An example of a packet switched network is discussed below, e.g., in reference to a mezzanine network.

Figure 12:
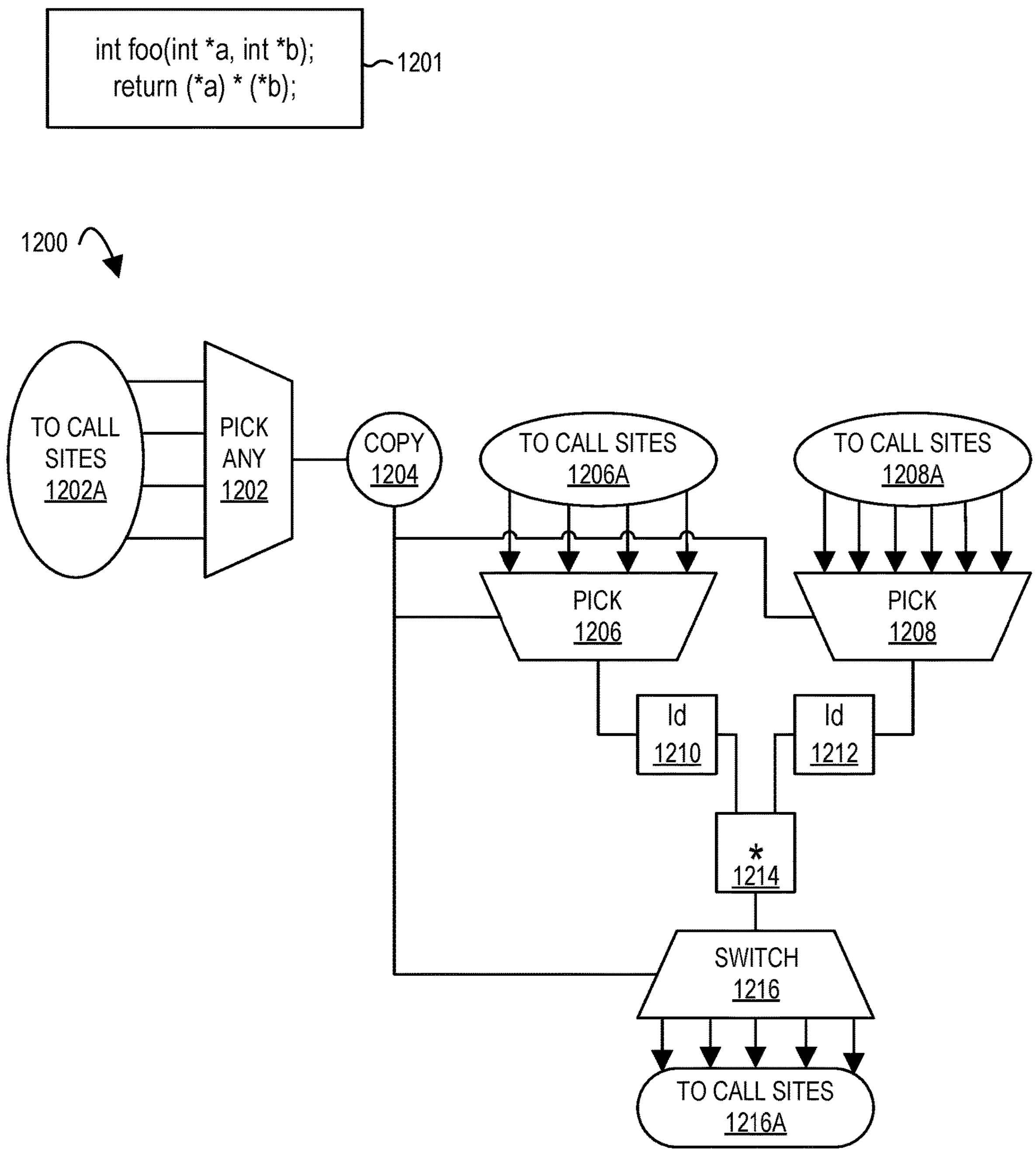
FIG. 12 illustrates a data flow graph of a pseudocode function call according to embodiments of the disclosure.

FIG. 12 illustrates a data flow graph 1200 of a pseudocode function call 1201 according to embodiments of the disclosure. Function call 1201 is to load two input data operands (e.g., indicated by pointers *a and *b, respectively), and multiply them together, and return the resultant data. This or other functions may be performed multiple times (e.g., in a dataflow graph). The dataflow graph in FIG. 12 illustrates a PickAny dataflow operator 1202 to perform the operation of selecting a control data (e.g., an index) (for example, from call sites 1202A) and copying with copy dataflow operator 1204 that control data (e.g., index) to each of the first Pick dataflow operator 1206, second Pick dataflow operator 1206, and Switch dataflow operator 1216. In one embodiment, an index (e.g., from the PickAny thus inputs and outputs data to the same index position, e.g., of [0, 1 . . . M], where M is an integer. First Pick dataflow operator 1206 may then pull one input data element of a plurality of input data elements 1206A according to the control data, and use the one input data element as (*a) to then load the input data value stored at *a with load dataflow operator 1210. Second Pick dataflow operator 1208 may then pull one input data element of a plurality of input data elements 1208A according to the control data, and use the one input data element as (*b) to then load the input data value stored at *b with load dataflow operator 1212. Those two input data values may then be multiplied by multiplication dataflow operator 1214 (e.g., as a part of a processing element). The resultant data of the multiplication may then be routed (e.g., to a downstream processing element or other component) by Switch dataflow operator 1216, e.g., to call sites 1216A, for example, according to the control data (e.g., index) to Switch dataflow operator 1216.

FIG. 12 is an example of a function call where the number of dataflow operators used to manage the steering of data (e.g., tokens) may be significant, for example, to steer the data to and/or from call sites. In one example, one or more of PickAny dataflow operator 1202, first Pick dataflow operator 1206, second Pick dataflow operator 1206, and Switch dataflow operator 1216 may be utilized to route (e.g., steer) data, for example, when there are multiple (e.g., many) call sites. In an embodiment where a (e.g., main) goal of introducing a multiplexed and/or demultiplexed function call is to reduce the implementation area of a particular dataflow graph, certain embodiments herein (e.g., of microarchitecture) reduce the area overhead of such multiplexed and/or demultiplexed (e.g., portions) of dataflow graphs.

Figure 13:
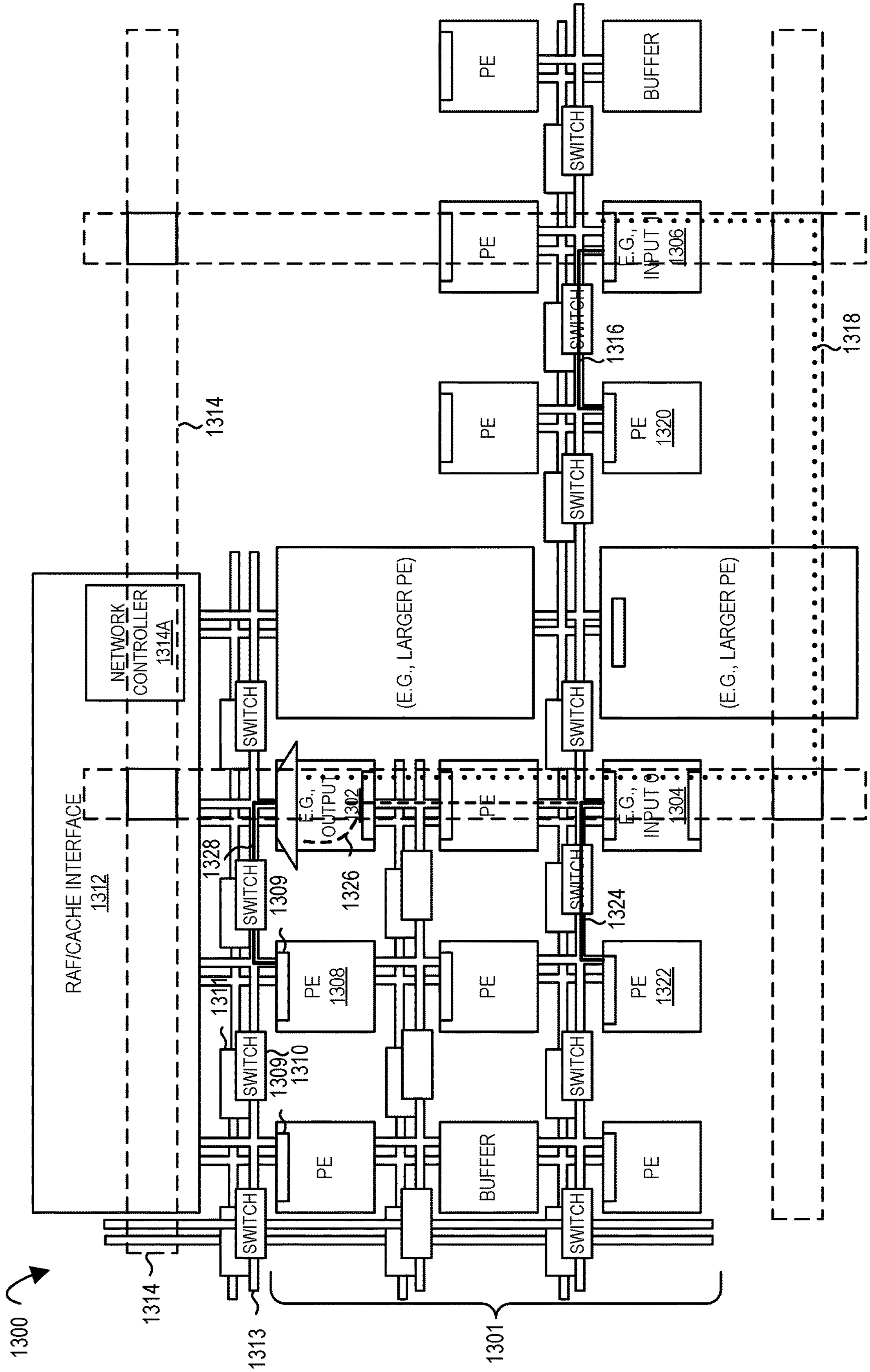
FIG. 13 illustrates a spatial array of processing elements with a plurality of network dataflow endpoint circuits according to embodiments of the disclosure.

FIG. 13 illustrates a spatial array 1301 of processing elements (PEs) with a plurality of network dataflow endpoint circuits (1302, 1304, 1306) according to embodiments of the disclosure. Spatial array 1301 of processing elements may include a communications (e.g., interconnect) network in between components, for example, as discussed herein. In one embodiment, communications network is one or more (e.g., channels of a) packet switched communications network. In one embodiment, communications network is one or more circuit switched, statically configured communications channels. For example, a set of channels coupled together by a switch (e.g., switch 1310 in a first network and switch 1311 in a second network). The first network and second network may be separate or coupled together. For example, switch 1310 may couple one or more of a plurality (e.g., four) data paths therein together, e.g., as configured to perform an operation according to a dataflow graph. In one embodiment, the number of data paths is any plurality. Processing element (e.g., processing element 1308) may be as disclosed herein, for example, as in FIG. 9. Accelerator tile 1300 includes a memory/cache hierarchy interface 1312, e.g., to interface the accelerator tile 1300 with a memory and/or cache. A data path may extend to another tile or terminate, e.g., at the edge of a tile. A processing element may include an input buffer (e.g., buffer 1309) and an output buffer.

Operations may be executed based on the availability of their inputs and the status of the PE. A PE may obtain operands from input channels and write results to output channels, although internal register state may also be used. Certain embodiments herein include a configurable dataflow-friendly PE. FIG. 9 shows a detailed block diagram of one such PE: the integer PE. This PE consists of several I/O buffers, an ALU, a storage register, some operation registers, and a scheduler. Each cycle, the scheduler may select an operation for execution based on the availability of the input and output buffers and the status of the PE. The result of the operation may then be written to either an output buffer or to a (e.g., local to the PE) register. Data written to an output buffer may be transported to a downstream PE for further processing. This style of PE may be extremely energy efficient, for example, rather than reading data from a complex, multi-ported register file, a PE reads the data from a register. Similarly, operations may be stored directly in a register, rather than in a virtualized operation cache.

Operation registers may be set during a special configuration step. During this step, auxiliary control wires and state, in addition to the inter-PE network, may be used to stream in configuration across the several PEs comprising the fabric. As result of parallelism, certain embodiments of such a network may provide for rapid reconfiguration, e.g., a tile sized fabric may be configured in less than about 10 microseconds.

Further, depicted accelerator tile 1300 includes packet switched communications network 1314, for example, as part of a mezzanine network, e.g., as described below. Certain embodiments herein allow for (e.g., a distributed) dataflow operations (e.g., operations that only route data) to be performed on (e.g., within) the communications network (e.g., and not in the processing element(s)). As an example, a distributed Pick dataflow operation of a dataflow graph is depicted in FIG. 13. Particularly, distributed pick is implemented using three separate configurations on three separate network (e.g., global) endpoints (e.g., network dataflow endpoint circuits (1302, 1304, 1306)). Dataflow operations may be distributed, e.g., with several endpoints to be configured in a coordinated manner. For example, a compilation tool may understand the need for coordination. Endpoints (e.g., network dataflow endpoint circuits) may be shared among several distributed operations, for example, a dataflow operation (e.g., pick) endpoint may be collated with several sends related to the dataflow operation (e.g., pick). A distributed dataflow operation (e.g., pick) may generate the same result the same as a non-distributed dataflow operation (e.g., pick). In certain embodiments, a difference between distributed and non-distributed dataflow operations is that in the distributed dataflow operations have their data (e.g., data to be routed, but which may not include control data) over a packet switched communications network, e.g., with associated flow control and distributed coordination. Although different sized processing elements (PE) are shown, in one embodiment, each processing element is of the same size (e.g., silicon area). In one embodiment, a buffer box element to buffer data may also be included, e.g., separate from a processing element.

As one example, a pick dataflow operation may have a plurality of inputs and steer (e.g., route) one of them as an output, e.g., as in FIG. 12. Instead of utilizing a processing element to perform the pick dataflow operation, it may be achieved with one or more of network communication resources (e.g., network dataflow endpoint circuits). Additionally or alternatively, the network dataflow endpoint circuits may route data between processing elements, e.g., for the processing elements to perform processing operations on the data. Embodiments herein may thus utilize to the communications network to perform (e.g., steering) dataflow operations. Additionally or alternatively, the network dataflow endpoint circuits may perform as a mezzanine network discussed below.

In the depicted embodiment, packet switched communications network 1314 may handle certain (e.g., configuration) communications, for example, to program the processing elements and/or circuit switched network (e.g., network 1313, which may include switches). In one embodiment, a circuit switched network is configured (e.g., programmed) to perform one or more operations (e.g., dataflow operations of a dataflow graph).

Packet switched communications network 1314 includes a plurality of endpoints (e.g., network dataflow endpoint circuits (1302, 1304, 1306). In one embodiment, each endpoint includes an address or other indicator value to allow data to be routed to and/or from that endpoint, e.g., according to (e.g., a header of) a data packet.

Additionally or alternatively to performing one or more of the above, packet switched communications network 1314 may perform dataflow operations. Network dataflow endpoint circuits (1302, 1304, 1306) may be configured (e.g., programmed) to perform a (e.g., distributed pick) operation of a dataflow graph. Programming of components (e.g., a circuit) are described herein. An embodiment of configuring a network dataflow endpoint circuit (e.g., an operation configuration register thereof) is discussed in reference to FIG. 14.

As an example of a distributed pick dataflow operation, network dataflow endpoint circuits (1302, 1304, 1306) in FIG. 13 may be configured (e.g., programmed) to perform a distributed pick operation of a dataflow graph. An embodiment of configuring a network dataflow endpoint circuit (e.g., an operation configuration register thereof) is discussed in reference to FIG. 14. Additionally or alternatively to configuring remote endpoint circuits, local endpoint circuits may also be configured according to this disclosure.

Network dataflow endpoint circuit 1302 may be configured to receive input data from a plurality of sources (e.g., network dataflow endpoint circuit 1304 and network dataflow endpoint circuit 1306), and to output resultant data, e.g., as in FIG. 12), for example, according to control data. Network dataflow endpoint circuit 1304 may be configured to provide (e.g., send) input data to network dataflow endpoint circuit 1302, e.g., on receipt of the input data from processing element 1322. This may be referred to as Input 0 in FIG. 13. In one embodiment, circuit switched network is configured (e.g., programmed) to provide a dedicated communication line between processing element 1322 and network dataflow endpoint circuit 1304 along path 1324. Network dataflow endpoint circuit 1306 may be configured to provide (e.g., send) input data to network dataflow endpoint circuit 1302, e.g., on receipt of the input data from processing element 1320. This may be referred to as Input 1 in FIG. 13. In one embodiment, circuit switched network is configured (e.g., programmed) to provide a dedicated communication line between processing element 1320 and network dataflow endpoint circuit 1306 along path 1316.

When network dataflow endpoint circuit 1304 is to transmit input data to network dataflow endpoint circuit 1302 (e.g., when network dataflow endpoint circuit 1302 has available storage room for the data and/or network dataflow endpoint circuit 1304 has its input data), network dataflow endpoint circuit 1304 may generate a packet (e.g., including the input data and a header to steer that data to network dataflow endpoint circuit 1302 on the packet switched communications network 1314 (e.g., as a stop on that (e.g., ring) network 1314). This is illustrated schematically with dashed line 1326 in FIG. 13. Although the example shown in FIG. 13 utilizes two sources (e.g., two inputs) a single or any plurality (e.g., greater than two) of sources (e.g., inputs) may be utilized.

When network dataflow endpoint circuit 1306 is to transmit input data to network dataflow endpoint circuit 1302 (e.g., when network dataflow endpoint circuit 1302 has available storage room for the data and/or network dataflow endpoint circuit 1306 has its input data), network dataflow endpoint circuit 1304 may generate a packet (e.g., including the input data and a header to steer that data to network dataflow endpoint circuit 1302 on the packet switched communications network 1314 (e.g., as a stop on that (e.g., ring) network 1314). This is illustrated schematically with dashed line 1318 in FIG. 13. Though a mesh network is shown, other network topologies may be used.

Network dataflow endpoint circuit 1302 (e.g., on receipt of the Input 0 from network dataflow endpoint circuit 1304, Input 1 from network dataflow endpoint circuit 1306, and/or control data) may then perform the programmed dataflow operation (e.g., a Pick operation in this example). The network dataflow endpoint circuit 1302 may then output the according resultant data from the operation, e.g., to processing element 1308 in FIG. 13. In one embodiment, circuit switched network is configured (e.g., programmed) to provide a dedicated communication line between processing element 1308 (e.g., a buffer thereof) and network dataflow endpoint circuit 1302 along path 1328. A further example of a distributed Pick operation is discussed below in reference to FIG. 26-28.

In one embodiment, the control data to perform an operation (e.g., pick operation) comes from other components of the spatial array, e.g., a processing element or through network. An example of this is discussed below in reference to FIG. 14. Note that Pick operator is shown schematically in endpoint 1302, and may not be a multiplexer circuit, for example, see the discussion below of network dataflow endpoint circuit 1400 in FIG. 14.

In certain embodiments, a dataflow graph may have certain operations performed by a processing element and certain operations performed by a communication network (e.g., network dataflow endpoint circuit or circuits).

Figure 14:
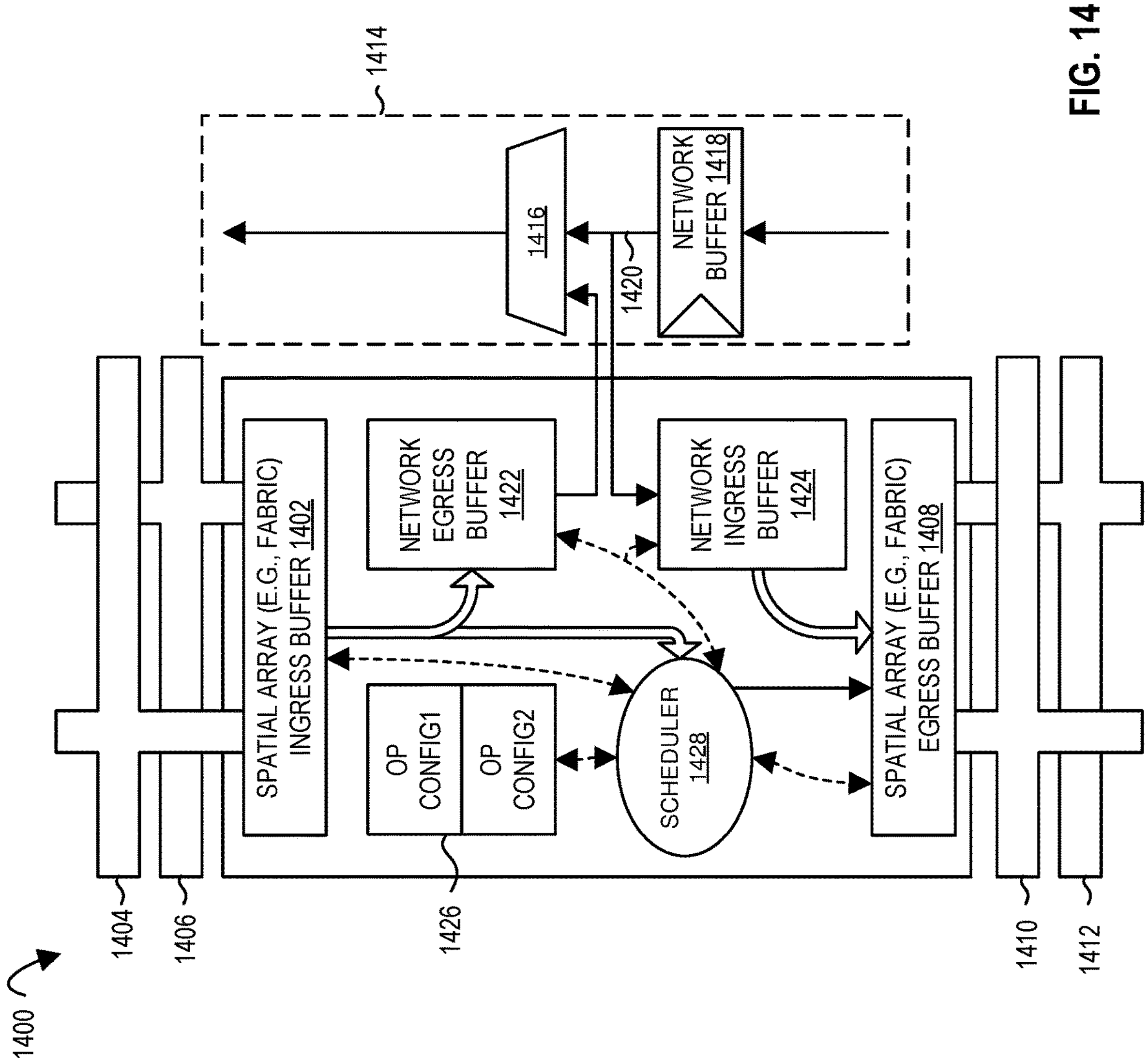
FIG. 14 illustrates a network dataflow endpoint circuit according to embodiments of the disclosure.

FIG. 14 illustrates a network dataflow endpoint circuit 1400 according to embodiments of the disclosure. Although multiple components are illustrated in network dataflow endpoint circuit 1400, one or more instances of each component may be utilized in a single network dataflow endpoint circuit. An embodiment of a network dataflow endpoint circuit may include any (e.g., not all) of the components in FIG. 14.

FIG. 14 depicts the microarchitecture of a (e.g., mezzanine) network interface showing embodiments of main data (solid line) and control data (dotted) paths. This microarchitecture provides a configuration storage and scheduler to enable (e.g., high-radix) dataflow operators. Certain embodiments herein include data paths to the scheduler to enable leg selection and description. FIG. 14 shows a high-level microarchitecture of a network (e.g., mezzanine) endpoint (e.g., stop), which may be a member of a ring network for context. To support (e.g., high-radix) dataflow operations, the configuration of the endpoint (e.g., operation configuration storage 1426) to include configurations that examine multiple network (e.g., virtual) channels (e.g., as opposed to single virtual channels in a baseline implementation). Certain embodiments of network dataflow endpoint circuit 1400 include data paths from ingress and to egress to control the selection of (e.g., pick and switch types of operations), and/or to describe the choice made by the scheduler in the case of PickAny dataflow operators or SwitchAny dataflow operators. Flow control and backpressure behavior may be utilized in each communication channel, e.g., in a (e.g., packet switched communications) network and (e.g., circuit switched) network (e.g., fabric of a spatial array of processing elements).

As one description of an embodiment of the microarchitecture, a pick dataflow operator may function to pick one output of resultant data from a plurality of inputs of input data, e.g., based on control data. A network dataflow endpoint circuit 1400 may be configured to consider one of the spatial array ingress buffer(s) 1402 of the circuit 1400 (e.g., data from the fabric being control data) as selecting among multiple input data elements stored in network ingress buffer(s) 1424 of the circuit 1400 to steer the resultant data to the spatial array egress buffer 1408 of the circuit 1400. Thus, the network ingress buffer(s) 1424 may be thought of as inputs to a virtual mux, the spatial array ingress buffer 1402 as the multiplexer select, and the spatial array egress buffer 1408 as the multiplexer output. In one embodiment, when a (e.g., control data) value is detected and/or arrives in the spatial array ingress buffer 1402, the scheduler 1428 (e.g., as programmed by an operation configuration in storage 1426) is sensitized to examine the corresponding network ingress channel. When data is available in that channel, it is removed from the network ingress buffer 1424 and moved to the spatial array egress buffer 1408. The control bits of both ingresses and egress may then be updated to reflect the transfer of data. This may result in control flow tokens or credits being propagated in the associated network. In certain embodiments, all inputs (e.g., control or data) may arise locally or over the network.

Initially, it may seem that the use of packet switched networks to implement the (e.g., high-radix staging) operators of multiplexed and/or demultiplexed codes hampers performance. For example, in one embodiment, a packet-switched network is generally shared and the caller and callee dataflow graphs may be distant from one another. Recall, however, that in certain embodiments, the intention of supporting multiplexing and/or demultiplexing is to reduce the area consumed by infrequent code paths within a dataflow operator (e.g., by the spatial array). Thus, certain embodiments herein reduce area and avoid the consumption of more expensive fabric resources, for example, like PEs, e.g., without (substantially) affecting the area and efficiency of individual PEs to supporting those (e.g., infrequent) operations.

Turning now to further detail of FIG. 14, depicted network dataflow endpoint circuit 1400 includes a spatial array (e.g., fabric) ingress buffer 1402, for example, to input data (e.g., control data) from a (e.g., circuit switched) network. As noted above, although a single spatial array (e.g., fabric) ingress buffer 1402 is depicted, a plurality of spatial array (e.g., fabric) ingress buffers may be in a network dataflow endpoint circuit. In one embodiment, spatial array (e.g., fabric) ingress buffer 1402 is to receive data (e.g., control data) from a communications network of a spatial array (e.g., a spatial array of processing elements), for example, from one or more of network 1404 and network 1406. In one embodiment, network 1404 is part of network 1313 in FIG. 13.

Depicted network dataflow endpoint circuit 1400 includes a spatial array (e.g., fabric) egress buffer 1408, for example, to output data (e.g., control data) to a (e.g., circuit switched) network. As noted above, although a single spatial array (e.g., fabric) egress buffer 1408 is depicted, a plurality of spatial array (e.g., fabric) egress buffers may be in a network dataflow endpoint circuit. In one embodiment, spatial array (e.g., fabric) egress buffer 1408 is to send (e.g., transmit) data (e.g., control data) onto a communications network of a spatial array (e.g., a spatial array of processing elements), for example, onto one or more of network 1410 and network 1412. In one embodiment, network 1410 is part of network 1313 in FIG. 13.

Additionally or alternatively, network dataflow endpoint circuit 1400 may be coupled to another network 1414, e.g., a packet switched network. Another network 1414, e.g., a packet switched network, may be used to transmit (e.g., send or receive) (e.g., input and/or resultant) data to processing elements or other components of a spatial array and/or to transmit one or more of input data or resultant data. In one embodiment, network 1414 is part of the packet switched communications network 1314 in FIG. 13, e.g., a time multiplexed network.

Network buffer 1418 (e.g., register(s)) may be a stop on (e.g., ring) network 1414, for example, to receive data from network 1414.

Depicted network dataflow endpoint circuit 1400 includes a network egress buffer 1422, for example, to output data (e.g., resultant data) to a (e.g., packet switched) network. As noted above, although a single network egress buffer 1422 is depicted, a plurality of network egress buffers may be in a network dataflow endpoint circuit. In one embodiment, network egress buffer 1422 is to send (e.g., transmit) data (e.g., resultant data) onto a communications network of a spatial array (e.g., a spatial array of processing elements), for example, onto network 1414. In one embodiment, network 1414 is part of packet switched network 1314 in FIG. 13. In certain embodiments, network egress buffer 1422 is to output data (e.g., from spatial array ingress buffer 1402) to (e.g., packet switched) network 1414, for example, to be routed (e.g., steered) to other components (e.g., other network dataflow endpoint circuit(s)).

Depicted network dataflow endpoint circuit 1400 includes a network ingress buffer 1422, for example, to input data (e.g., inputted data) from a (e.g., packet switched) network. As noted above, although a single network ingress buffer 1424 is depicted, a plurality of network ingress buffers may be in a network dataflow endpoint circuit. In one embodiment, network ingress buffer 1424 is to receive (e.g., transmit) data (e.g., input data) from a communications network of a spatial array (e.g., a spatial array of processing elements), for example, from network 1414. In one embodiment, network 1414 is part of packet switched network 1314 in FIG. 13. In certain embodiments, network ingress buffer 1424 is to input data (e.g., from spatial array ingress buffer 1402) from (e.g., packet switched) network 1414, for example, to be routed (e.g., steered) there (e.g., into spatial array egress buffer 1408) from other components (e.g., other network dataflow endpoint circuit(s)).

In one embodiment, the data format (e.g., of the data on network 1414) includes a packet having data and a header (e.g., with the destination of that data). In one embodiment, the data format (e.g., of the data on network 1404 and/or 1406) includes only the data (e.g., not a packet having data and a header (e.g., with the destination of that data)). Network dataflow endpoint circuit 1400 may add (e.g., data output from circuit 1400) or remove (e.g., data input into circuit 1400) a header (or other data) to or from a packet. Coupling 1420 (e.g., wire) may send data received from network 1414 (e.g., from network buffer 1418) to network ingress buffer 1424 and/or multiplexer 1416. Multiplexer 1416 may (e.g., via a control signal from the scheduler 1428) output data from network buffer 1418 or from network egress buffer 1422. In one embodiment, one or more of multiplexer 1416 or network buffer 1418 are separate components from network dataflow endpoint circuit 1400. A buffer may include a plurality of (e.g., discrete) entries, for example, a plurality of registers.

In one embodiment, operation configuration storage 1426 (e.g., register or registers) is loaded during configuration (e.g., mapping) and specifies the particular operation (or operations) this network dataflow endpoint circuit 1400 (e.g., not a processing element of a spatial array) is to perform (e.g., data steering operations in contrast to logic and/or arithmetic operations). Buffer(s) (e.g., 1402, 1408, 1422, and/or 1424) activity may be controlled by that operation (e.g., controlled by the scheduler 1428). Scheduler 1428 may schedule an operation or operations of network dataflow endpoint circuit 1400, for example, when (e.g., all) input (e.g., payload) data and/or control data arrives. Dotted lines to and from scheduler 1428 indicate paths that may be utilized for control data, e.g., to and/or from scheduler 1428. Scheduler may also control multiplexer 1416, e.g., to steer data to and/or from network dataflow endpoint circuit 1400 and network 1414.

In reference to the distributed pick operation in FIG. 13 above, network dataflow endpoint circuit 1302 may be configured (e.g., as an operation in its operation configuration register 1426 as in FIG. 14) to receive (e.g., in (two storage locations in) its network ingress buffer 1424 as in FIG. 14) input data from each of network dataflow endpoint circuit 1304 and network dataflow endpoint circuit 1306, and to output resultant data (e.g., from its spatial array egress buffer 1408 as in FIG. 14), for example, according to control data (e.g., in its spatial array ingress buffer 1402 as in FIG. 14). Network dataflow endpoint circuit 1304 may be configured (e.g., as an operation in its operation configuration register 1426 as in FIG. 14) to provide (e.g., send via circuit 1304's network egress buffer 1422 as in FIG. 14) input data to network dataflow endpoint circuit 1302, e.g., on receipt (e.g., in circuit 1304's spatial array ingress buffer 1402 as in FIG. 14) of the input data from processing element 1322. This may be referred to as Input 0 in FIG. 13. In one embodiment, circuit switched network is configured (e.g., programmed) to provide a dedicated communication line between processing element 1322 and network dataflow endpoint circuit 1304 along path 1324. Network dataflow endpoint circuit 1304 may include (e.g., add) a header packet with the received data (e.g., in its network egress buffer 1422 as in FIG. 14) to steer the packet (e.g., input data) to network dataflow endpoint circuit 1302. Network dataflow endpoint circuit 1306 may be configured (e.g., as an operation in its operation configuration register 1426 as in FIG. 14) to provide (e.g., send via circuit 1306's network egress buffer 1422 as in FIG. 14) input data to network dataflow endpoint circuit 1302, e.g., on receipt (e.g., in circuit 1306's spatial array ingress buffer 1402 as in FIG. 14) of the input data from processing element 1320. This may be referred to as Input 1 in FIG. 13. In one embodiment, circuit switched network is configured (e.g., programmed) to provide a dedicated communication line between processing element 1320 and network dataflow endpoint circuit 1306 along path 1316. Network dataflow endpoint circuit 1306 may include (e.g., add) a header packet with the received data (e.g., in its network egress buffer 1422 as in FIG. 14) to steer the packet (e.g., input data) to network dataflow endpoint circuit 1302.

When network dataflow endpoint circuit 1304 is to transmit input data to network dataflow endpoint circuit 1302 (e.g., when network dataflow endpoint circuit 1302 has available storage room for the data and/or network dataflow endpoint circuit 1304 has its input data), network dataflow endpoint circuit 1304 may generate a packet (e.g., including the input data and a header to steer that data to network dataflow endpoint circuit 1302 on the packet switched communications network 1314 (e.g., as a stop on that (e.g., ring) network). This is illustrated schematically with dashed line 1326 in FIG. 13. Network 1314 is shown schematically with multiple dotted boxes in FIG. 13. Network 1314 may include a network controller 1314A, e.g., to manage the ingress and/or egress of data on network 1314A.

When network dataflow endpoint circuit 1306 is to transmit input data to network dataflow endpoint circuit 1302 (e.g., when network dataflow endpoint circuit 1302 has available storage room for the data and/or network dataflow endpoint circuit 1306 has its input data), network dataflow endpoint circuit 1304 may generate a packet (e.g., including the input data and a header to steer that data to network dataflow endpoint circuit 1302 on the packet switched communications network 1314 (e.g., as a stop on that (e.g., ring) network). This is illustrated schematically with dashed line 1318 in FIG. 13.

Network dataflow endpoint circuit 1302 (e.g., on receipt of the Input 0 from network dataflow endpoint circuit 1304 in circuit 1302's network ingress buffer(s), Input 1 from network dataflow endpoint circuit 1306 in circuit 1302's network ingress buffer(s), and/or control data from processing element 1308 in circuit 1302's spatial array ingress buffer) may then perform the programmed dataflow operation (e.g., a Pick operation in this example). The network dataflow endpoint circuit 1302 may then output the according resultant data from the operation, e.g., to processing element 1308 in FIG. 13. In one embodiment, circuit switched network is configured (e.g., programmed) to provide a dedicated communication line between processing element 1308 (e.g., a buffer thereof) and network dataflow endpoint circuit 1302 along path 1328. A further example of a distributed Pick operation is discussed below in reference to FIG. 26-28. Buffers in FIG. 13 may be the small, unlabeled boxes in each PE.

Figure 15:
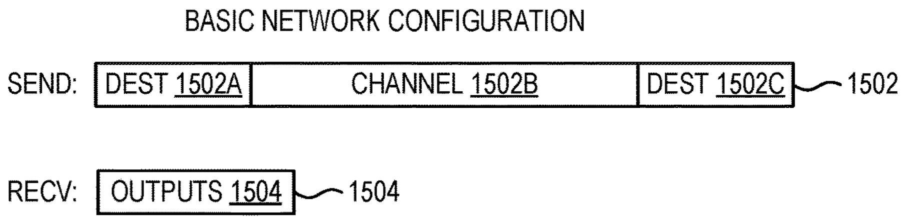
FIG. 15 illustrates data formats for a send operation and a receive operation according to embodiments of the disclosure.

FIGS. 15-8 below include example data formats, but other data formats may be utilized. One or more fields may be included in a data format (e.g., in a packet). Data format may be used by network dataflow endpoint circuits, e.g., to transmit (e.g., send and/or receive) data between a first component (e.g., between a first network dataflow endpoint circuit and a second network dataflow endpoint circuit, component of a spatial array, etc.).

FIG. 15 illustrates data formats for a send operation 1502 and a receive operation 1504 according to embodiments of the disclosure. In one embodiment, send operation 1502 and receive operation 1504 are data formats of data transmitted on a packed switched communication network. Depicted send operation 1502 data format includes a destination field 1502A (e.g., indicating which component in a network the data is to be sent to), a channel field 1502B (e.g. indicating which channel on the network the data is to be sent on), and an input field 1502C (e.g., the payload or input data that is to be sent). Depicted receive operation 1504 includes an output field, e.g., which may also include a destination field (not depicted). These data formats may be used (e.g., for packet(s)) to handle moving data in and out of components. These configurations may be separable and/or happen in parallel. These configurations may use separate resources. The term channel may generally refer to the communication resources (e.g., in management hardware) associated with the request. Association of configuration and queue management hardware may be explicit.

Figure 16:
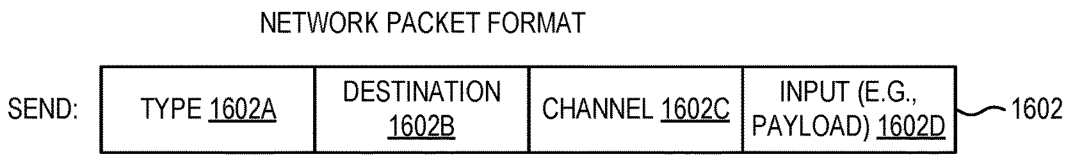
FIG. 16 illustrates another data format for a send operation according to embodiments of the disclosure.

FIG. 16 illustrates another data format for a send operation 1602 according to embodiments of the disclosure. In one embodiment, send operation 1602 is a data format of data transmitted on a packed switched communication network. Depicted send operation 1602 data format includes a type field (e.g., used to annotate special control packets, such as, but not limited to, configuration, extraction, or exception packets), destination field 1602B (e.g., indicating which component in a network the data is to be sent to), a channel field 1602C (e.g. indicating which channel on the network the data is to be sent on), and an input field 1602D (e.g., the payload or input data that is to be sent).

Figure 17:
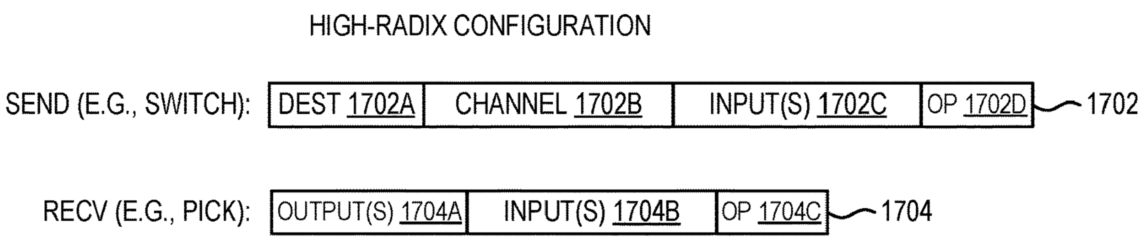
FIG. 17 illustrates to configure a circuit element (e.g., network dataflow endpoint circuit) data formats to configure a circuit element (e.g., network dataflow endpoint circuit) for a send (e.g., switch) operation and a receive (e.g., pick) operation according to embodiments of the disclosure.

FIG. 17 illustrates configuration data formats to configure a circuit element (e.g., network dataflow endpoint circuit) for a send (e.g., switch) operation 1702 and a receive (e.g., pick) operation 1704 according to embodiments of the disclosure. In one embodiment, send operation 1702 and receive operation 1704 are configuration data formats for data to be transmitted on a packed switched communication network, for example, between network dataflow endpoint circuits. Depicted send operation configuration data format 1702 includes a destination field 1702A (e.g., indicating which component(s) in a network the (input) data is to be sent to), a channel field 1702B (e.g. indicating which channel on the network the (input) data is to be sent on), an input field 1702C (for example, an identifier of the component(s) that is to send the input data, e.g., the set of inputs in the (e.g., fabric ingress) buffer that this element is sensitive to), and an operation field 1702D (e.g., indicating which of a plurality of operations are to be performed). In one embodiment, the (e.g., outbound) operation is one of a Switch or SwitchAny dataflow operation, e.g., corresponding to a (e.g., same) dataflow operator of a dataflow graph.

Depicted receive operation configuration data format 1704 includes an output field 1704A (e.g., indicating which component(s) in a network the (resultant) data is to be sent to), an input field 1704B (e.g., an identifier of the component(s) that is to send the input data), and an operation field 1704C (e.g., indicating which of a plurality of operations are to be performed). In one embodiment, the (e.g., inbound) operation is one of a Pick, PickSingleLeg, PickAny, or Merge dataflow operation, e.g., corresponding to a (e.g., same) dataflow operator of a dataflow graph. In one embodiment, a merge dataflow operation is a pick that requires and dequeues all operands (e.g., with the egress endpoint receiving control).

A configuration data format utilized herein may include one or more of the fields described herein, e.g., in any order.

Figure 18:
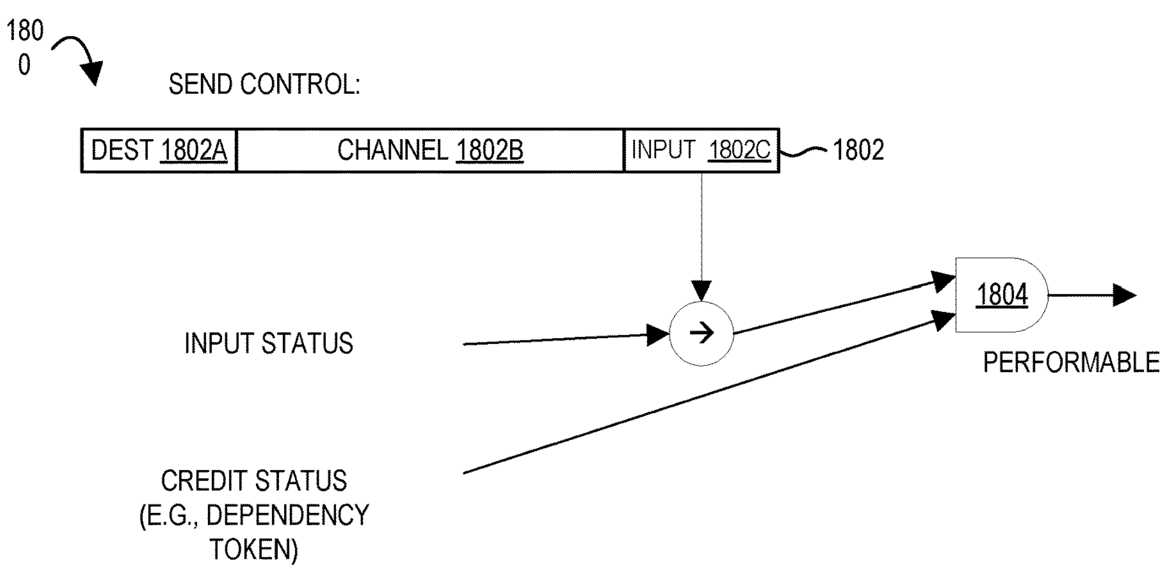
FIG. 18 illustrates a configuration data format to configure a circuit element (e.g., network dataflow endpoint circuit) for a send operation with its input, output, and control data annotated on a circuit according to embodiments of the disclosure.

FIG. 18 illustrates a configuration data format 1802 to configure a circuit element (e.g., network dataflow endpoint circuit) for a send operation with its input, output, and control data annotated on a circuit 1800 according to embodiments of the disclosure. Depicted send operation configuration data format 1802 includes a destination field 1802A (e.g., indicating which component in a network the data is to be sent to), a channel field 1802B (e.g. indicating which channel on the (packet switched) network the data is to be sent on), and an input field 1502C (e.g., an identifier of the component(s) that is to send the input data). In one embodiment, circuit 1800 (e.g., network dataflow endpoint circuit) is to receive packet of data in the data format of send operation configuration data format 1802, for example, with the destination indicating which circuit of a plurality of circuits the resultant is to be sent to, the channel indicating which channel of the (packet switched) network the data is to be sent on, and the input being which circuit of a plurality of circuits the input data is to be received from. The AND gate 1804 is to allow the operation to be performed when both the input data is available and the credit status is a yes (for example, the dependency token indicates) indicating there is room for the output data to be stored, e.g., in a buffer of the destination. In certain embodiments, each operation is annotated with its requirements (e.g., inputs, outputs, and control) and if all requirements are met, the configuration is 'performable' by the circuit (e.g., network dataflow endpoint circuit).

Figure 19:
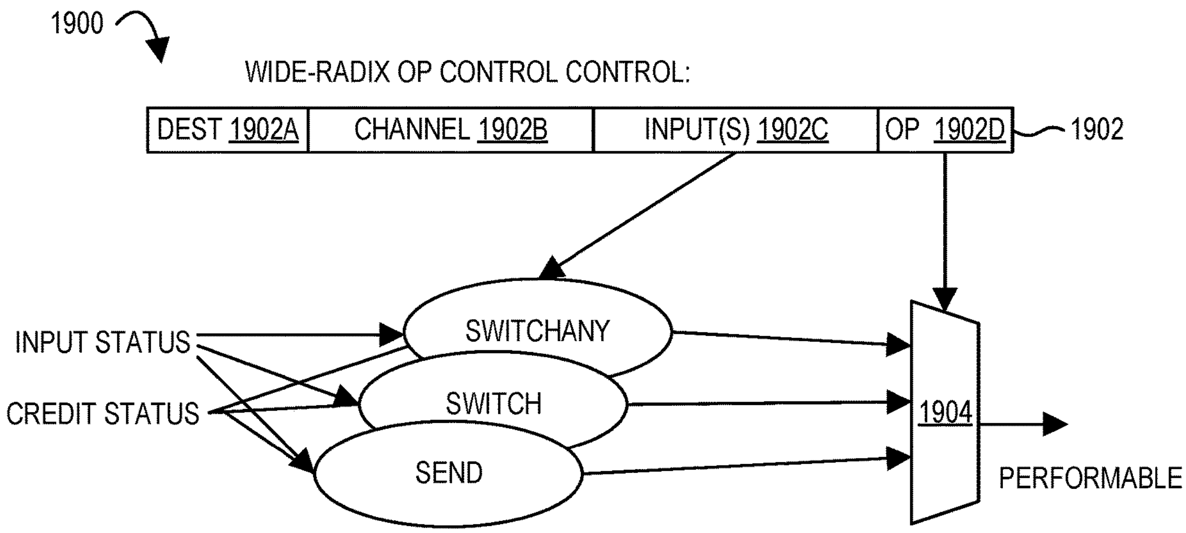
FIG. 19 illustrates a configuration data format to configure a circuit element (e.g., network dataflow endpoint circuit) for a selected operation with its input, output, and control data annotated on a circuit according to embodiments of the disclosure.

FIG. 19 illustrates a configuration data format 1902 to configure a circuit element (e.g., network dataflow endpoint circuit) for a selected (e.g., send) operation with its input, output, and control data annotated on a circuit 1900 according to embodiments of the disclosure. Depicted (e.g., send) operation configuration data format 1902 includes a destination field 1902A (e.g., indicating which component(s) in a network the (input) data is to be sent to), a channel field 1902B (e.g. indicating which channel on the network the (input) data is to be sent on), an input field 1902C (e.g., an identifier of the component(s) that is to send the input data), and an operation field 1902D (e.g., indicating which of a plurality of operations are to be performed and/or the source of the control data for that operation). In one embodiment, the (e.g., outbound) operation is one of a send, Switch, or SwitchAny dataflow operation, e.g., corresponding to a (e.g., same) dataflow operator of a dataflow graph.

In one embodiment, circuit 1900 (e.g., network dataflow endpoint circuit) is to receive packet of data in the data format of (e.g., send) operation configuration data format 1902, for example, with the input being the source(s) of the payload (e.g., input data) and the operation field indicating which operation is to be performed (e.g., shown schematically as Switch or SwitchAny). Depicted multiplexer 1904 may select the operation to be performed from a plurality of available operations, e.g., based on the value in operation field 1902D. In one embodiment, circuit 1900 is to perform that operation when both the input data is available and the credit status is a yes (for example, the dependency token indicates) indicating there is room for the output data to be stored, e.g., in a buffer of the destination.

In one embodiment, the send operation does not utilize control beyond checking its input(s) are available for sending. This may enable switch to perform the operation without credit on all legs. In one embodiment, the Switch and/or SwitchAny operation includes a multiplexer controlled by the value stored in the operation field 1902D to select the correct queue management circuitry.

Figure 20:
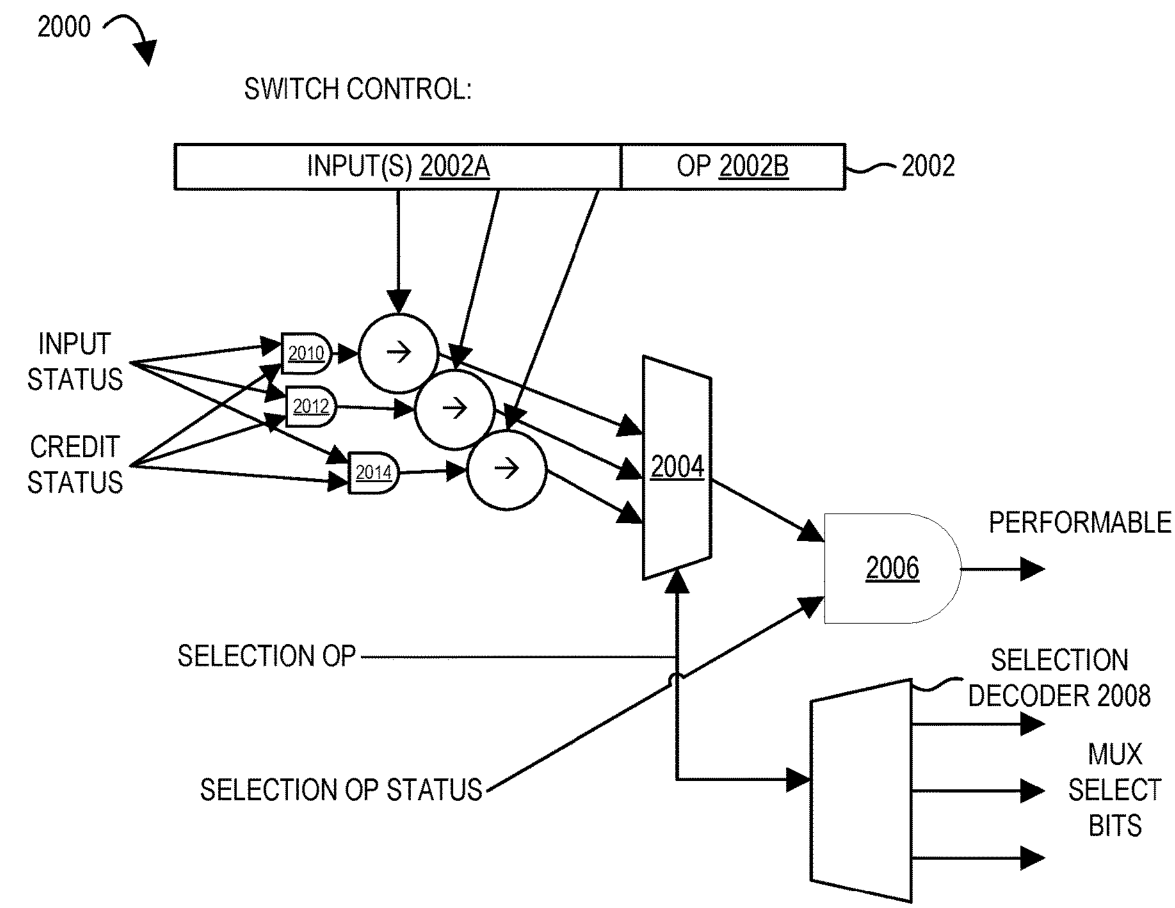
FIG. 20 illustrates a configuration data format to configure a circuit element (e.g., network dataflow endpoint circuit) for a Switch operation with its input, output, and control data annotated on a circuit according to embodiments of the disclosure.
Figure 21:
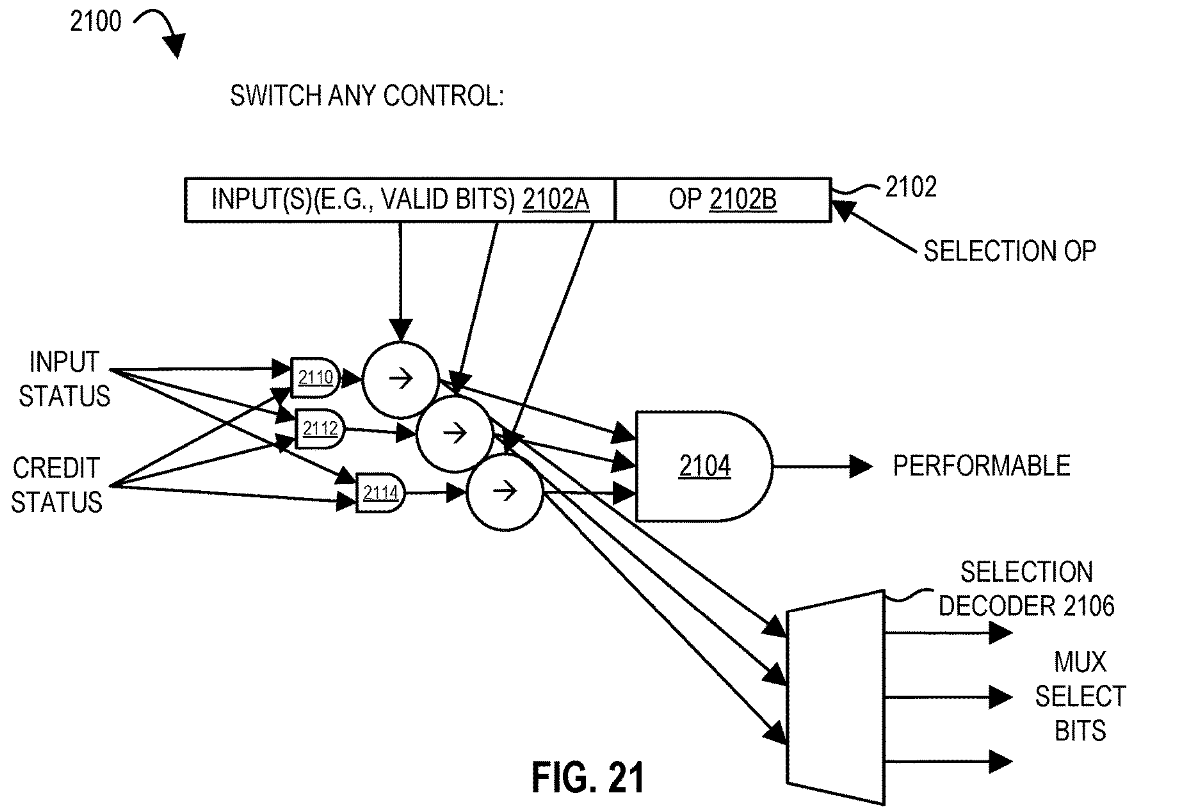
FIG. 21 illustrates a configuration data format to configure a circuit element (e.g., network dataflow endpoint circuit) for a SwitchAny operation with its input, output, and control data annotated on a circuit according to embodiments of the disclosure.

Value stored in operation field 1902D may select among control options, e.g., with different control (e.g., logic) circuitry for each operation, for example, as in FIGS. 20-23. In some embodiments, credit (e.g., credit on a network) status is another input (e.g., as depicted in FIGS. 20-21 here).

FIG. 20 illustrates a configuration data format to configure a circuit element (e.g., network dataflow endpoint circuit) for a Switch operation configuration data format 2002 with its input, output, and control data annotated on a circuit 2000 according to embodiments of the disclosure. In one embodiment, the (e.g., outbound) operation value stored in the operation field 1902D is for a Switch operation, e.g., corresponding to a Switch dataflow operator of a dataflow graph. In one embodiment, circuit 2000 (e.g., network dataflow endpoint circuit) is to receive a packet of data in the data format of Switch operation 2002, for example, with the input in input field 2002A being what component(s) are to be sent the data and the operation field 2002B indicating which operation is to be performed (e.g., shown schematically as Switch). Depicted circuit 2000 may select the operation to be executed from a plurality of available operations based on the operation field 2002B. In one embodiment, circuit 1900 is to perform that operation when both the input data (for example, according to the input status, e.g., there is room for the data in the destination(s)) is available and the credit status (e.g., selection operation (OP) status) is a yes (for example, the network credit indicates that there is availability on the network to send that data to the destination(s)). For example, multiplexers 2010, 2012, 2014 may be used with a respective input status and credit status for each input (e.g., where the output data is to be sent to in the switch operation), e.g., to prevent an input from showing as available until both the input status (e.g., room for data in the destination) and the credit status (e.g., there is room on the network to get to the destination) are true (e.g., yes). In one embodiment, input status is an indication there is or is not room for the (output) data to be stored, e.g., in a buffer of the destination. In certain embodiments, AND gate 2006 is to allow the operation to be performed when both the input data is available (e.g., as output from multiplexer 2004) and the selection operation (e.g., control data) status is a yes, for example, indicating the selection operation (e.g., which of a plurality of outputs an input is to be sent to, see, e.g., FIG. 12). In certain embodiments, the performance of the operation with the control data (e.g., selection op) is to cause input data from one of the inputs to be output on one or more (e.g., a plurality of) outputs (e.g., as indicated by the control data), e.g., according to the multiplexer selection bits from multiplexer 2008. In one embodiment, selection op chooses which leg of the switch output will be used and/or selection decoder creates multiplexer selection bits.

FIG. 21 illustrates a configuration data format to configure a circuit element (e.g., network dataflow endpoint circuit) for a SwitchAny operation configuration data format 2102 with its input, output, and control data annotated on a circuit 2100 according to embodiments of the disclosure. In one embodiment, the (e.g., outbound) operation value stored in the operation field 1902D is for a SwitchAny operation, e.g., corresponding to a SwitchAny dataflow operator of a dataflow graph. In one embodiment, circuit 2100 (e.g., network dataflow endpoint circuit) is to receive a packet of data in the data format of SwitchAny operation configuration data format 2102, for example, with the input in input field 2102A being what component(s) are to be sent the data and the operation field 2102B indicating which operation is to be performed (e.g., shown schematically as SwitchAny) and/or the source of the control data for that operation. In one embodiment, circuit 1900 is to perform that operation when any of the input data (for example, according to the input status, e.g., there is room for the data in the destination(s)) is available and the credit status is a yes (for example, the network credit indicates that there is availability on the network to send that data to the destination(s)). For example, multiplexers 2110, 2112, 2114 may be used with a respective input status and credit status for each input (e.g., where the output data is to be sent to in the SwitchAny operation), e.g., to prevent an input from showing as available until both the input status (e.g., room for data in the destination) and the credit status (e.g., there is room on the network to get to the destination) are true (e.g., yes). In one embodiment, input status is an indication there is room or is not room for the (output) data to be stored, e.g., in a buffer of the destination. In certain embodiments, OR gate 2104 is to allow the operation to be performed when any one of the outputs are available. In certain embodiments, the performance of the operation is to cause the first available input data from one of the inputs to be output on one or more (e.g., a plurality of) outputs, e.g., according to the multiplexer selection bits from multiplexer 2106. In one embodiment, SwitchAny occurs as soon as any output credit is available (e.g., as opposed to a Switch that utilizes a selection op). Multiplexer select bits may be used to steer an input to an (e.g., network) egress buffer of a network dataflow endpoint circuit.

Figure 22:
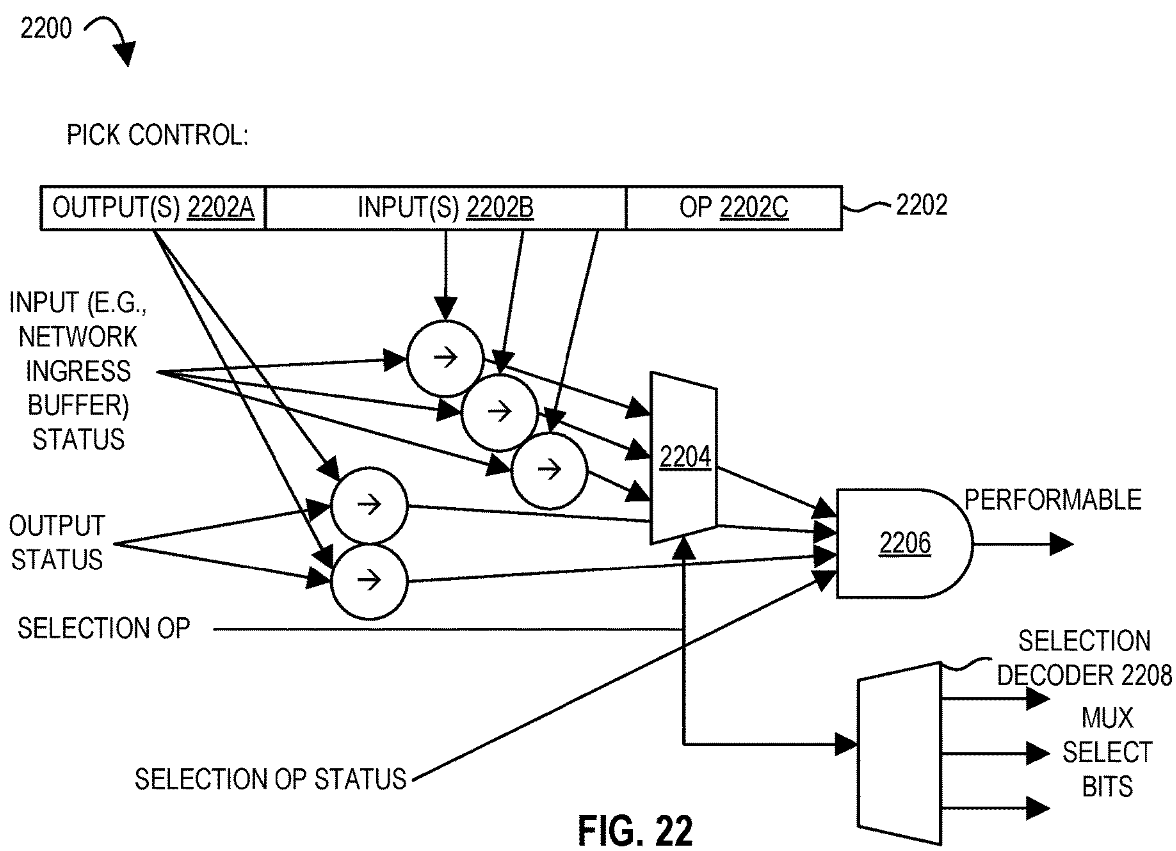
FIG. 22 illustrates a configuration data format to configure a circuit element (e.g., network dataflow endpoint circuit) for a Pick operation with its input, output, and control data annotated on a circuit according to embodiments of the disclosure.

FIG. 22 illustrates a configuration data format to configure a circuit element (e.g., network dataflow endpoint circuit) for a Pick operation configuration data format 2202 with its input, output, and control data annotated on a circuit 2200 according to embodiments of the disclosure. In one embodiment, the (e.g., inbound) operation value stored in the operation field 2202C is for a Pick operation, e.g., corresponding to a Pick dataflow operator of a dataflow graph. In one embodiment, circuit 2200 (e.g., network dataflow endpoint circuit) is to receive a packet of data in the data format of Pick operation configuration data format 2202, for example, with the data in input field 2202B being what component(s) are to send the input data, the data in output field 2202A being what component(s) are to be sent the input data, and the operation field 2202C indicating which operation is to be performed (e.g., shown schematically as Pick) and/or the source of the control data for that operation. Depicted circuit 2200 may select the operation to be executed from a plurality of available operations based on the operation field 2202C. In one embodiment, circuit 2200 is to perform that operation when both the input data (for example, according to the input (e.g., network ingress buffer) status, e.g., all the input data has arrived) is available, the credit status (e.g., output status) is a yes (for example, the spatial array egress buffer) indicating there is room for the output data to be stored, e.g., in a buffer of the destination(s), and the selection operation (e.g., control data) status is a yes. In certain embodiments, AND gate 2206 is to allow the operation to be performed when both the input data is available (e.g., as output from multiplexer 2204), an output space is available, and the selection operation (e.g., control data) status is a yes, for example, indicating the selection operation (e.g., which of a plurality of outputs an input is to be sent to, see, e.g., FIG. 12). In certain embodiments, the performance of the operation with the control data (e.g., selection op) is to cause input data from one of a plurality of inputs (e.g., indicated by the control data) to be output on one or more (e.g., a plurality of) outputs, e.g., according to the multiplexer selection bits from multiplexer 2208. In one embodiment, selection op chooses which leg of the pick will be used and/or selection decoder creates multiplexer selection bits.

Figure 23:
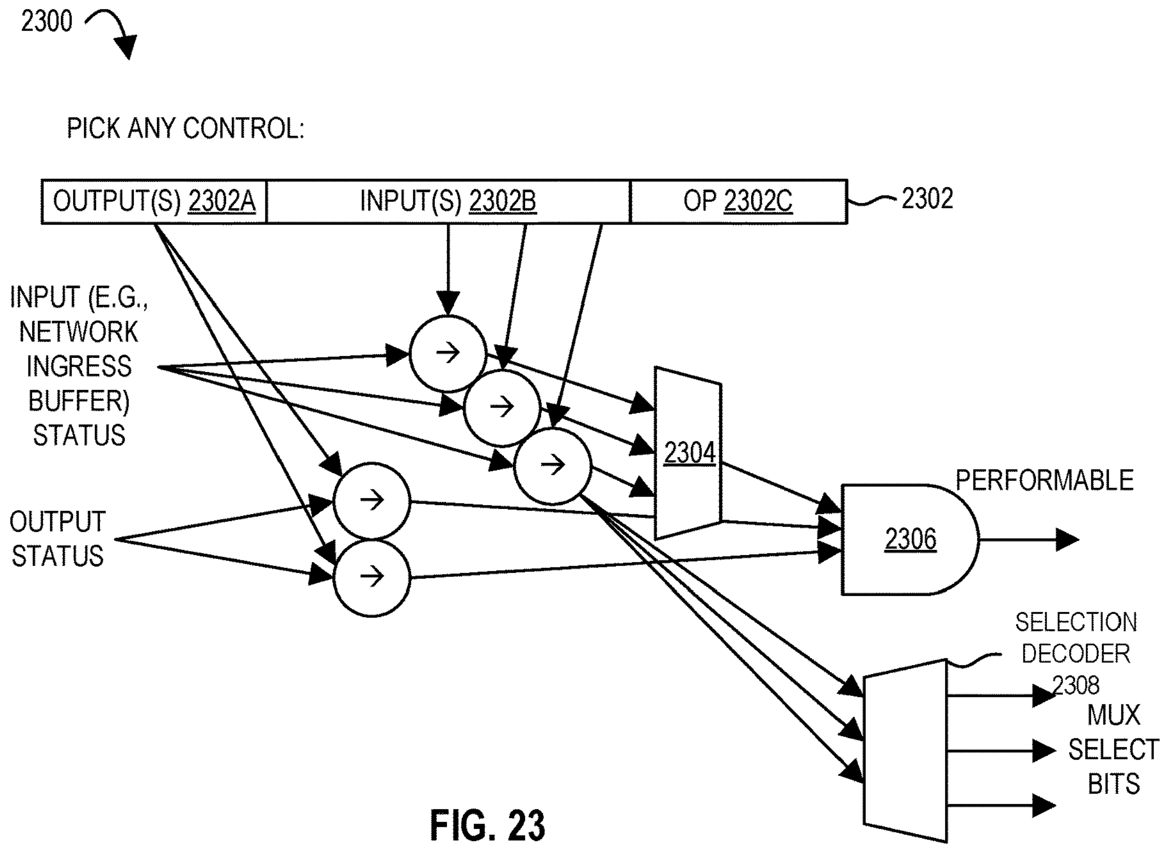
FIG. 23 illustrates a configuration data format to configure a circuit element (e.g., network dataflow endpoint circuit) for a PickAny operation with its input, output, and control data annotated on a circuit according to embodiments of the disclosure.

FIG. 23 illustrates a configuration data format to configure a circuit element (e.g., network dataflow endpoint circuit) for a PickAny operation 2302 with its input, output, and control data annotated on a circuit 2300 according to embodiments of the disclosure. In one embodiment, the (e.g., inbound) operation value stored in the operation field 2302C is for a PickAny operation, e.g., corresponding to a PickAny dataflow operator of a dataflow graph. In one embodiment, circuit 2300 (e.g., network dataflow endpoint circuit) is to receive a packet of data in the data format of PickAny operation configuration data format 2302, for example, with the data in input field 2302B being what component(s) are to send the input data, the data in output field 2302A being what component(s) are to be sent the input data, and the operation field 2302C indicating which operation is to be performed (e.g., shown schematically as PickAny). Depicted circuit 2300 may select the operation to be executed from a plurality of available operations based on the operation field 2302C. In one embodiment, circuit 2300 is to perform that operation when any (e.g., a first arriving of) the input data (for example, according to the input (e.g., network ingress buffer) status, e.g., any of the input data has arrived) is available and the credit status (e.g., output status) is a yes (for example, the spatial array egress buffer indicates) indicating there is room for the output data to be stored, e.g., in a buffer of the destination(s). In certain embodiments, AND gate 2306 is to allow the operation to be performed when any of the input data is available (e.g., as output from multiplexer 2304) and an output space is available. In certain embodiments, the performance of the operation is to cause the (e.g., first arriving) input data from one of a plurality of inputs to be output on one or more (e.g., a plurality of) outputs, e.g., according to the multiplexer selection bits from multiplexer 2308.

In one embodiment, PickAny executes on the presence of any data and/or selection decoder creates multiplexer selection bits.

Figure 24:
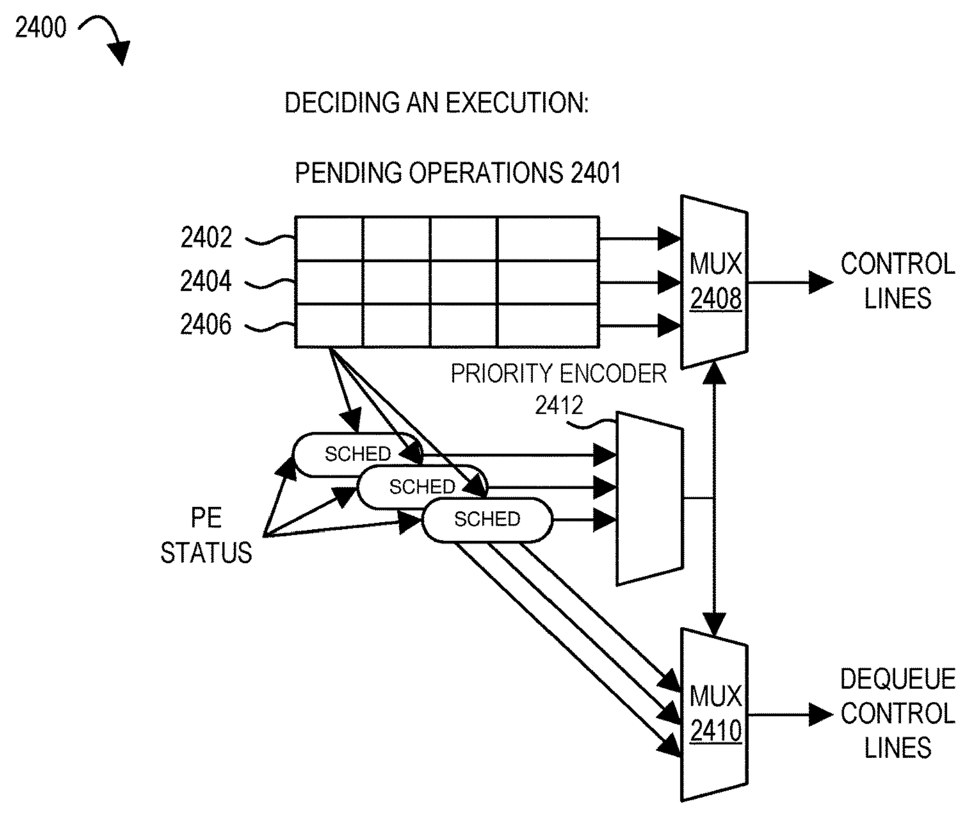
FIG. 24 illustrates selection of an operation by a network dataflow endpoint circuit for performance according to embodiments of the disclosure.

FIG. 24 illustrates selection of an operation (2402, 2404, 2406) by a network dataflow endpoint circuit 2400 for performance according to embodiments of the disclosure. Pending operations storage 2401 (e.g., in scheduler 1428 in FIG. 14) may store one or more dataflow operations, e.g., according to the format(s) discussed herein. Scheduler (for example, based on a fixed priority or the oldest of the operations, e.g., that have all of their operands) may schedule an operation for performance. For example, scheduler may select operation 2402, and according to a value stored in operation field, send the corresponding control signals from multiplexer 2408 and/or multiplexer 2410. As an example, several operations may be simultaneously executable in a single network dataflow endpoint circuit. Assuming all data is there, the "performable" signal (e.g., as shown in FIGS. 18-23) may be input as a signal into multiplexer 2412. Multiplexer 2412 may send as an output control signals for a selected operation (e.g., one of operation 2402, 2404, and 2406) that cause multiplexer 2408 to configure the connections in a network dataflow endpoint circuit to perform the selected operation (e.g., to source from or send data to buffer(s)). Multiplexer 2412 may send as an output control signals for a selected operation (e.g., one of operation 2402, 2404, and 2406) that cause multiplexer 2410 to configure the connections in a network dataflow endpoint circuit to remove data from the queue(s), e.g., consumed data. As an example, see the discussion herein about having data (e.g., token) removed. The "PE status" in FIG. 24 may be the control data coming from a PE, for example, the empty indicator and full indicators of the queues (e.g., backpressure signals and/or network credit). In one embodiment, the PE status may include the empty or full bits for all the buffers and/or datapaths, e.g., in FIG. 14 herein. FIG. 24 illustrates generalized scheduling for embodiments herein, e.g., with specialized scheduling for embodiments discussed in reference to FIGS. 20-23.

In one embodiment, (e.g., as with scheduling) the choice of dequeue is determined by the operation and its dynamic behavior, e.g., to dequeue the operation after performance. In one embodiment, a circuit is to use the operand selection bits to dequeue data (e.g., input, output and/or control data).

Figure 25:
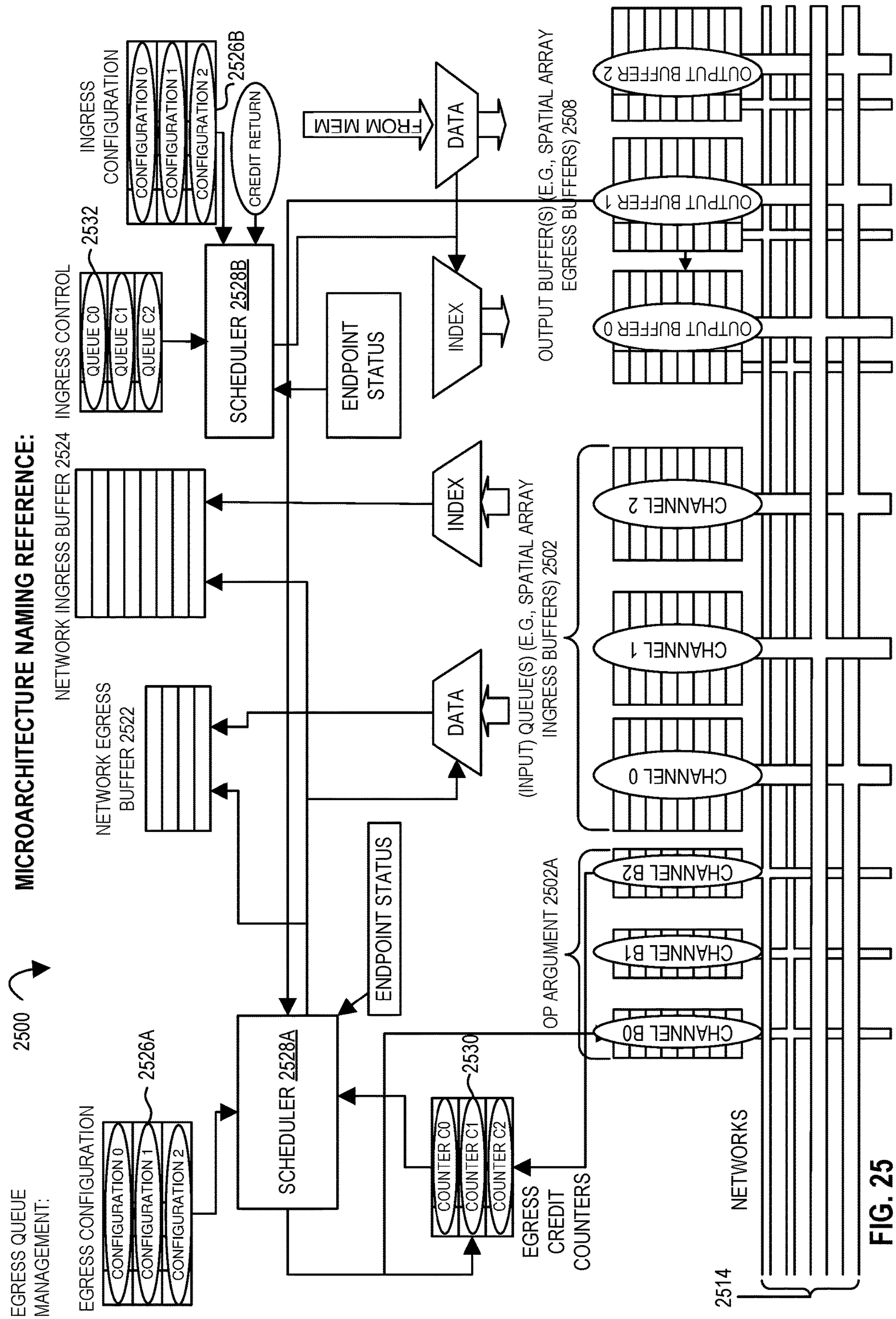
FIG. 25 illustrates a network dataflow endpoint circuit according to embodiments of the disclosure.

FIG. 25 illustrates a network dataflow endpoint circuit 2500 according to embodiments of the disclosure. In comparison to FIG. 14, network dataflow endpoint circuit 2500 has split the configuration and control into two separate schedulers. In one embodiment, egress scheduler 2528A is to schedule an operation on data that is to enter (e.g., from a circuit switched communication network coupled to) the dataflow endpoint circuit 2500 (e.g., at argument queue 2502, for example, spatial array ingress buffer 1402 as in FIG. 14) and output (e.g., from a packet switched communication network coupled to) the dataflow endpoint circuit 2500 (e.g., at network egress buffer 2522, for example, network egress buffer 1422 as in FIG. 14). In one embodiment, ingress scheduler 2528B is to schedule an operation on data that is to enter (e.g., from a packet switched communication network coupled to) the dataflow endpoint circuit 2500 (e.g., at network ingress buffer 2524, for example, network ingress buffer 2424 as in FIG. 14) and output (e.g., from a circuit switched communication network coupled to) the dataflow endpoint circuit 2500 (e.g., at output buffer 2508, for example, spatial array egress buffer 2408 as in FIG. 14). Scheduler 2528A and/or scheduler 2528B may include as an input the (e.g., operating) status of circuit 2500, e.g., fullness level of inputs (e.g., buffers 2502A, 2502), fullness level of outputs (e.g., buffers 2508), values (e.g., value in 2502A), etc. Scheduler 2528B may include a credit return circuit, for example, to denote that credit is returned to sender, e.g., after receipt in network ingress buffer 2524 of circuit 2500.

Figure 26:
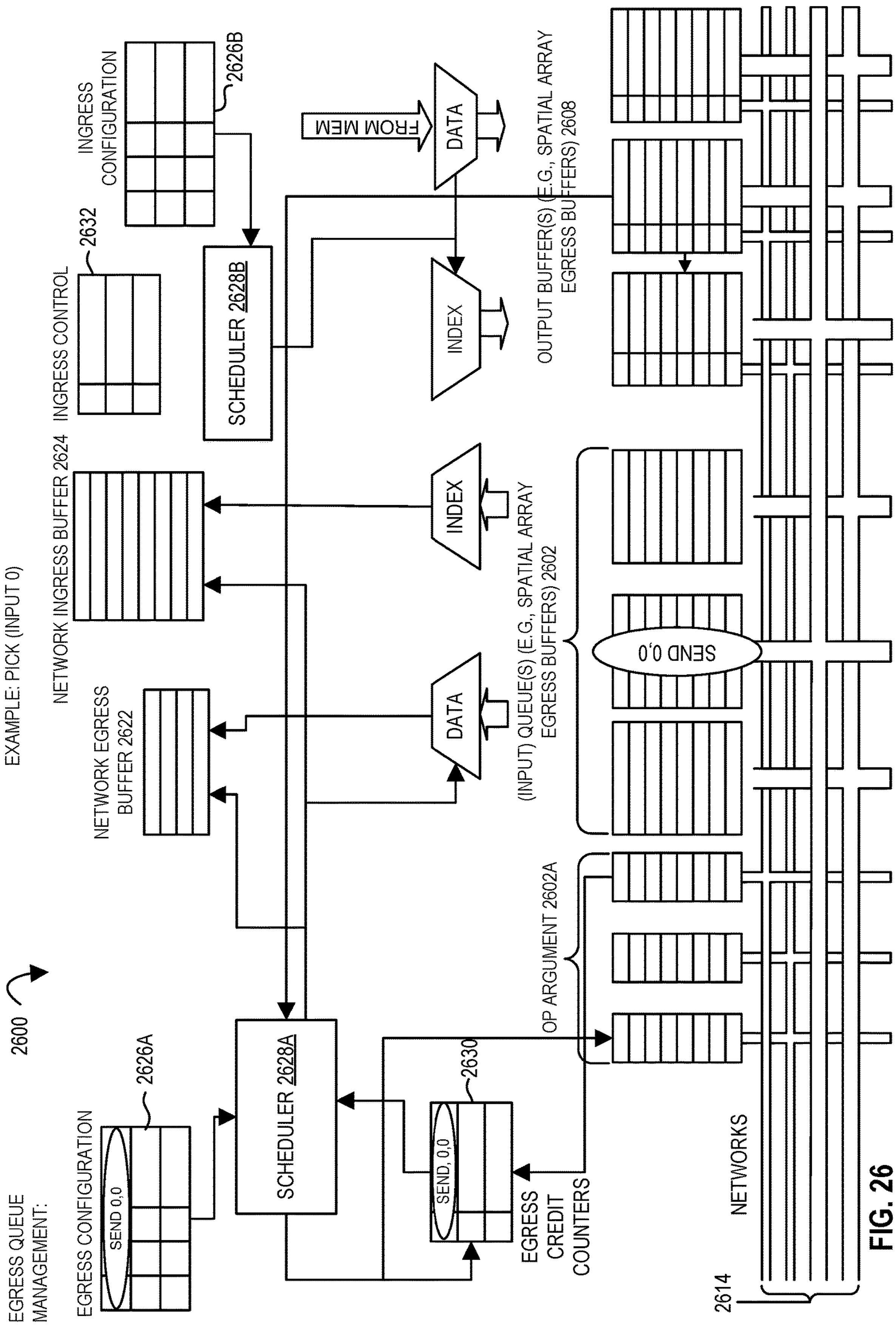
FIG. 26 illustrates a network dataflow endpoint circuit receiving input zero (0) while performing a pick operation according to embodiments of the disclosure.
Figure 27:
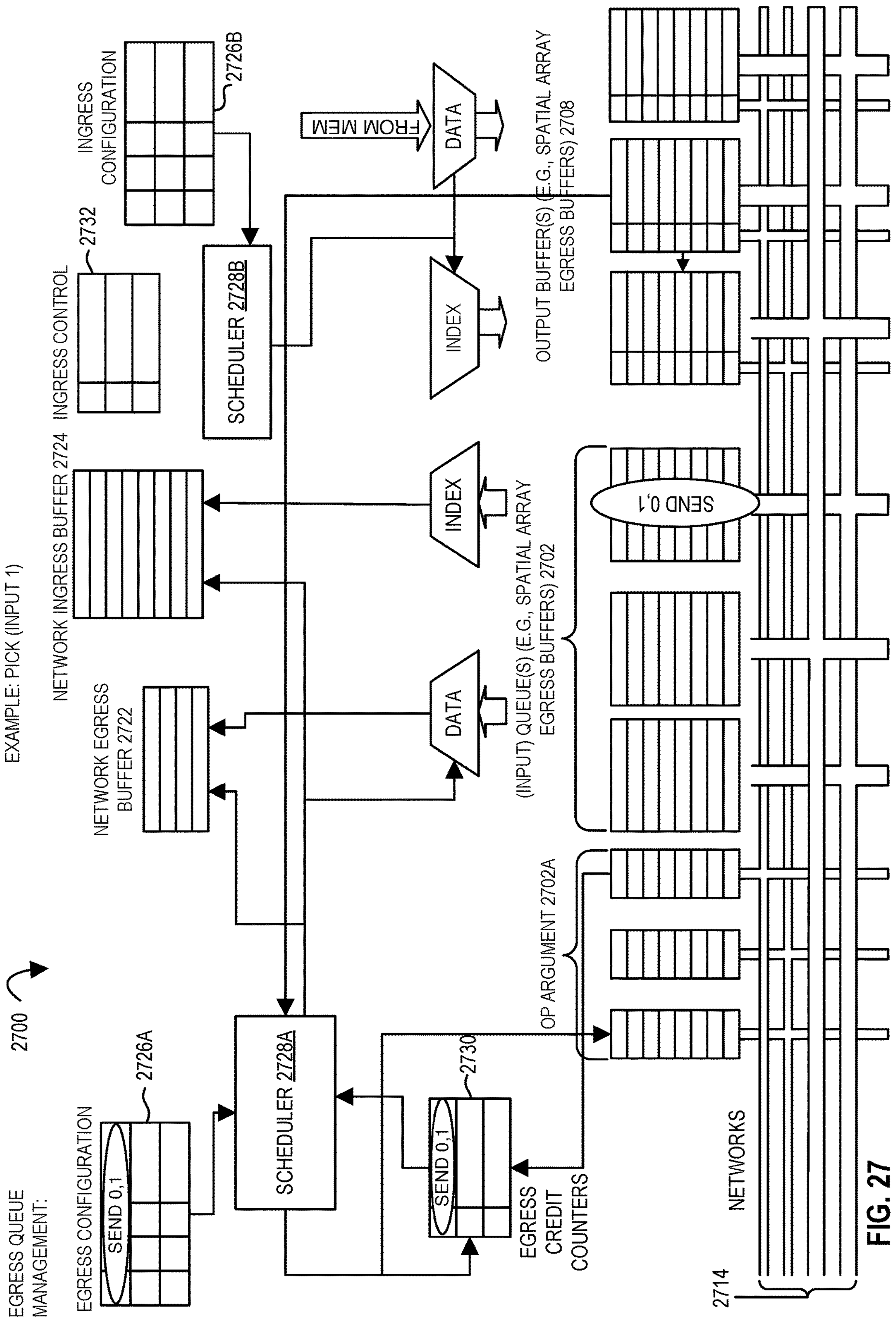
FIG. 27 illustrates a network dataflow endpoint circuit receiving input one (1) while performing a pick operation according to embodiments of the disclosure.
Figure 28:
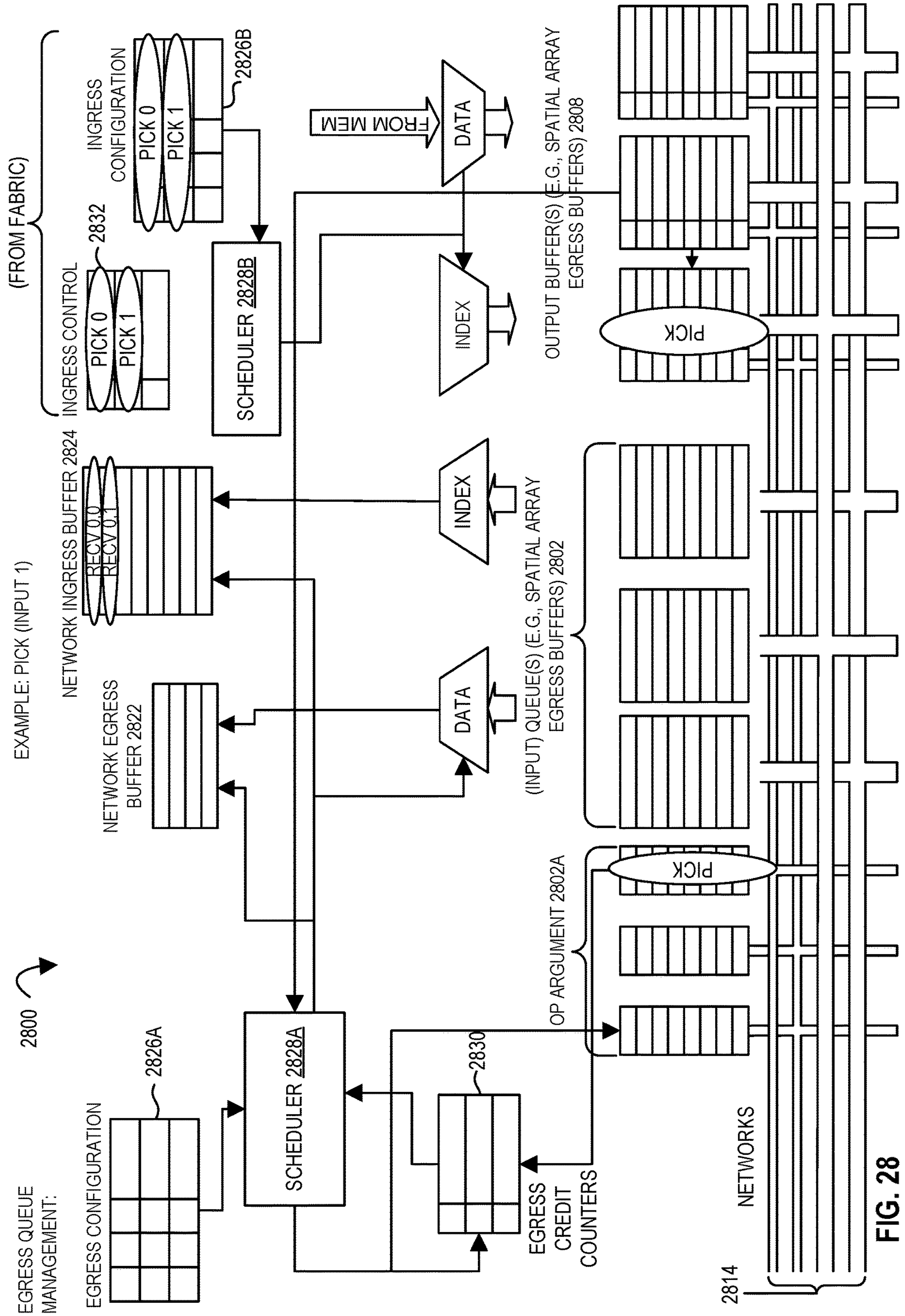
FIG. 28 illustrates a network dataflow endpoint circuit outputting the selected input while performing a pick operation according to embodiments of the disclosure.

Network 2514 may be a circuit switched network, e.g., as discussed herein. Additionally or alternatively, a packet switched network (e.g., as discussed herein) may also be utilized, for example, coupled to network egress buffer 2522, network ingress buffer 2524, or other components herein. Argument queue 2502 may include a control buffer 2502A, for example, to indicate when a respective input queue (e.g., buffer) includes a (new) item of data, e.g., as a single bit. Turning now to FIGS. 26-28, in one embodiment, these cumulatively show the configurations to create a distributed pick.

FIG. 26 illustrates a network dataflow endpoint circuit 2600 receiving input zero (0) while performing a pick operation according to embodiments of the disclosure, for example, as discussed above in reference to FIG. 13. In one embodiment, egress configuration 2626A is loaded (e.g., during a configuration step) with a portion of a pick operation that is to send data to a different network dataflow endpoint circuit (e.g., circuit 2800 in FIG. 28). In one embodiment, egress scheduler 2628A is to monitor the argument queue 2602 (e.g., data queue) for input data (e.g., from a processing element). According to an embodiment of the depicted data format, the "send" (e.g., a binary value therefor) indicates data is to be sent according to fields X, Y, with X being the value indicating a particular target network dataflow endpoint circuit (e.g., 0 being network dataflow endpoint circuit 2800 in FIG. 28) and Y being the value indicating which network ingress buffer (e.g., buffer 2824) location the value is to be stored. In one embodiment, Y is the value indicating a particular channel of a multiple channel (e.g., packet switched) network (e.g., 0 being channel 0 and/or buffer element 0 of network dataflow endpoint circuit 2800 in FIG. 28). When the input data arrives, it is then to be sent (e.g., from network egress buffer 2622) by network dataflow endpoint circuit 2600 to a different network dataflow endpoint circuit (e.g., network dataflow endpoint circuit 2800 in FIG. 28).

FIG. 27 illustrates a network dataflow endpoint circuit 2700 receiving input one (1) while performing a pick operation according to embodiments of the disclosure, for example, as discussed above in reference to FIG. 13. In one embodiment, egress configuration 2726A is loaded (e.g., during a configuration step) with a portion of a pick operation that is to send data to a different network dataflow endpoint circuit (e.g., circuit 2800 in FIG. 28). In one embodiment, egress scheduler 2728A is to monitor the argument queue 2720 (e.g., data queue 2702B) for input data (e.g., from a processing element). According to an embodiment of the depicted data format, the "send" (e.g., a binary value therefor) indicates data is to be sent according to fields X, Y, with X being the value indicating a particular target network dataflow endpoint circuit (e.g., 0 being network dataflow endpoint circuit 2800 in FIG. 28) and Y being the value indicating which network ingress buffer (e.g., buffer 2824) location the value is to be stored. In one embodiment, Y is the value indicating a particular channel of a multiple channel (e.g., packet switched) network (e.g., 1 being channel 1 and/or buffer element 1 of network dataflow endpoint circuit 2800 in FIG. 28). When the input data arrives, it is then to be sent (e.g., from network egress buffer 2622) by network dataflow endpoint circuit 2700 to a different network dataflow endpoint circuit (e.g., network dataflow endpoint circuit 2800 in FIG. 28).

FIG. 28 illustrates a network dataflow endpoint circuit 2800 outputting the selected input while performing a pick operation according to embodiments of the disclosure, for example, as discussed above in reference to FIG. 13. In one embodiment, other network dataflow endpoint circuits (e.g., circuit 2600 and circuit 2700) are to send their input data to network ingress buffer 2824 of circuit 2800. In one embodiment, ingress configuration 2826B is loaded (e.g., during a configuration step) with a portion of a pick operation that is to pick the data sent to network dataflow endpoint circuit 2800, e.g., according to a control value. In one embodiment, control value is to be received in ingress control 2832 (e.g., buffer). In one embodiment, ingress scheduler 2728A is to monitor the receipt of the control value and the input values (e.g., in network ingress buffer 2824). For example, if the control value says pick from buffer element A (e.g., 0 or 1 in this example) (e.g., from channel A) of network ingress buffer 2824, the value stored in that buffer element A is then output as a resultant of the operation by circuit 2800, for example, into an output buffer 2808, e.g., when output buffer has storage space (e.g., as indicated by a backpressure signal). In one embodiment, circuit 2800's output data is sent out when the egress buffer has a token (e.g., input data and control data) and the receiver asserts that it has buffer (e.g., indicating storage is available, although other assignments of resources are possible, this example is simply illustrative).

Figure 29:
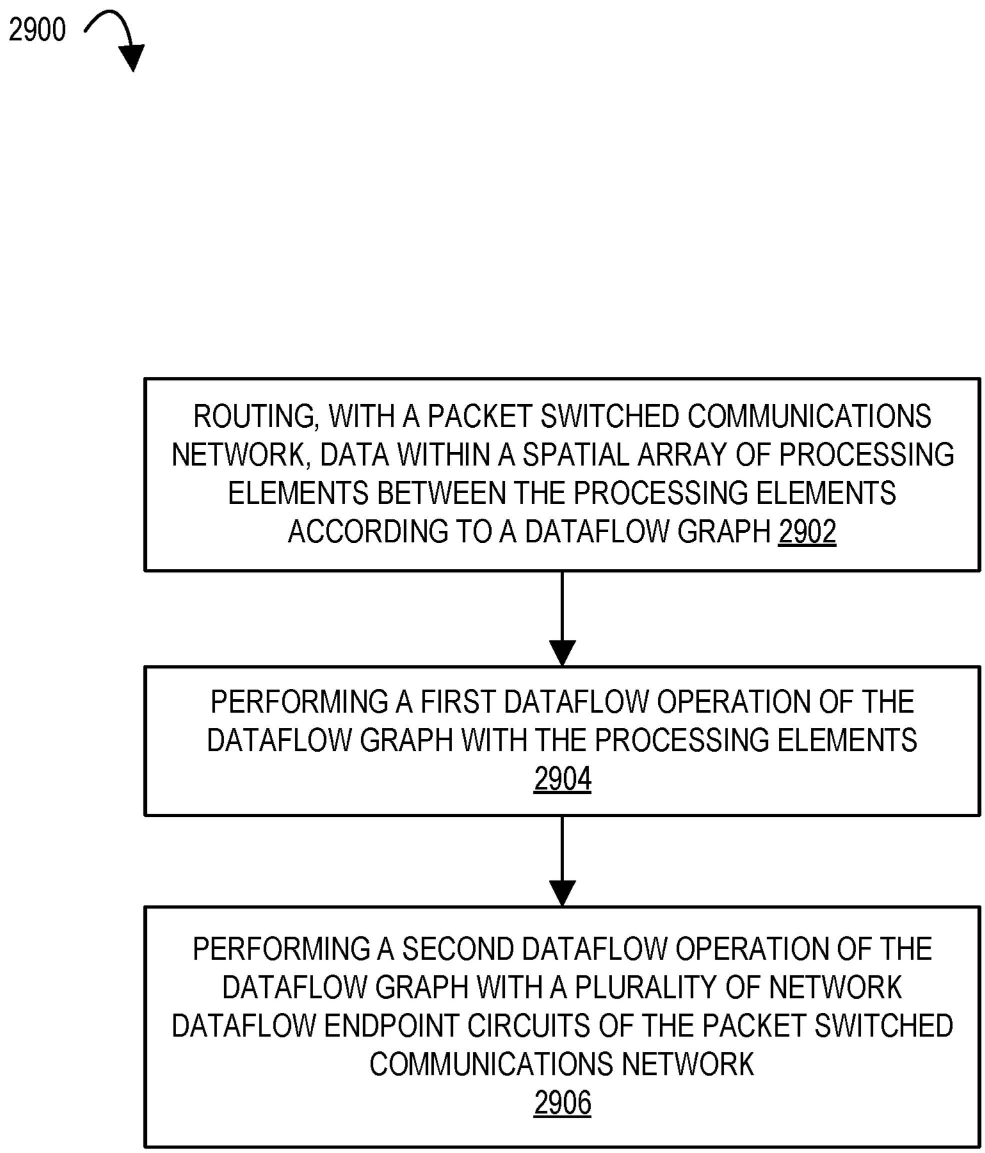
FIG. 29 illustrates a flow diagram according to embodiments of the disclosure.

FIG. 29 illustrates a flow diagram 2900 according to embodiments of the disclosure. Depicted flow 2900 includes providing a spatial array of processing elements 2902; routing, with a packet switched communications network, data within the spatial array between processing elements according to a dataflow graph 2904; performing a first dataflow operation of the dataflow graph with the processing elements 2906; and performing a second dataflow operation of the dataflow graph with a plurality of network dataflow endpoint circuits of the packet switched communications network 2908.

Referring again to FIG. 8, accelerator (e.g., CSA) 802 may perform (e.g., or request performance of) an access (e.g., a load and/or store) of data to one or more of plurality of cache banks (e.g., cache bank 808). A memory interface circuit (e.g., request address file (RAF) circuit(s)) may be included, e.g., as discussed herein, to provide access between memory (e.g., cache banks) and the accelerator 802. Referring again to FIG. 11, a requesting circuit (e.g., a processing element) may perform (e.g., or request performance of) an access (e.g., a load and/or store) of data to one or more of plurality of cache banks (e.g., cache bank 1102). A memory interface circuit (e.g., request address file (RAF) circuit(s)) may be included, e.g., as discussed herein, to provide access between memory (e.g., one or more banks of the cache memory) and the accelerator (e.g., one or more of accelerator tiles (1108, 1110, 1112, 1114)). Referring again to FIGS. 13 and/or 14, a requesting circuit (e.g., a processing element) may perform (e.g., or request performance of) an access (e.g., a load and/or store) of data to one or more of a plurality of cache banks. A memory interface circuit (for example, request address file (RAF) circuit(s), e.g., RAF/cache interface 1312) may be included, e.g., as discussed herein, to provide access between memory (e.g., one or more banks of the cache memory) and the accelerator (e.g., one or more of the processing elements and/or network dataflow endpoint circuits (e.g., circuits 1302, 1304, 1306)).

In certain embodiments, an accelerator (e.g., a PE thereof) couples to a RAF circuit or a plurality of RAF circuits through (i) a circuit switched network (for example, as discussed herein, e.g., in reference to FIGS. 6-11) or (ii) through a packet switched network (for example, as discussed herein, e.g., in reference to FIGS. 12-29) In certain embodiments, the request data received for a memory (e.g., cache) access request is received by a request address file circuit or circuits, e.g., of a configurable spatial accelerator. Certain embodiments of spatial architectures are an energy-efficient and high-performance way of accelerating user applications. One of the ways that a spatial accelerator(s) may achieve energy efficiency is through spatial distribution, e.g., rather than energy-hungry, centralized structures present in cores, spatial architectures may generally use small, disaggregated structures (e.g., which are both simpler and more energy efficient). For example, the circuit (e.g., spatial array) of FIG. 11 may spread its load and store operations across several RAFs.

2.6 Floating Point Support

Figure 30:
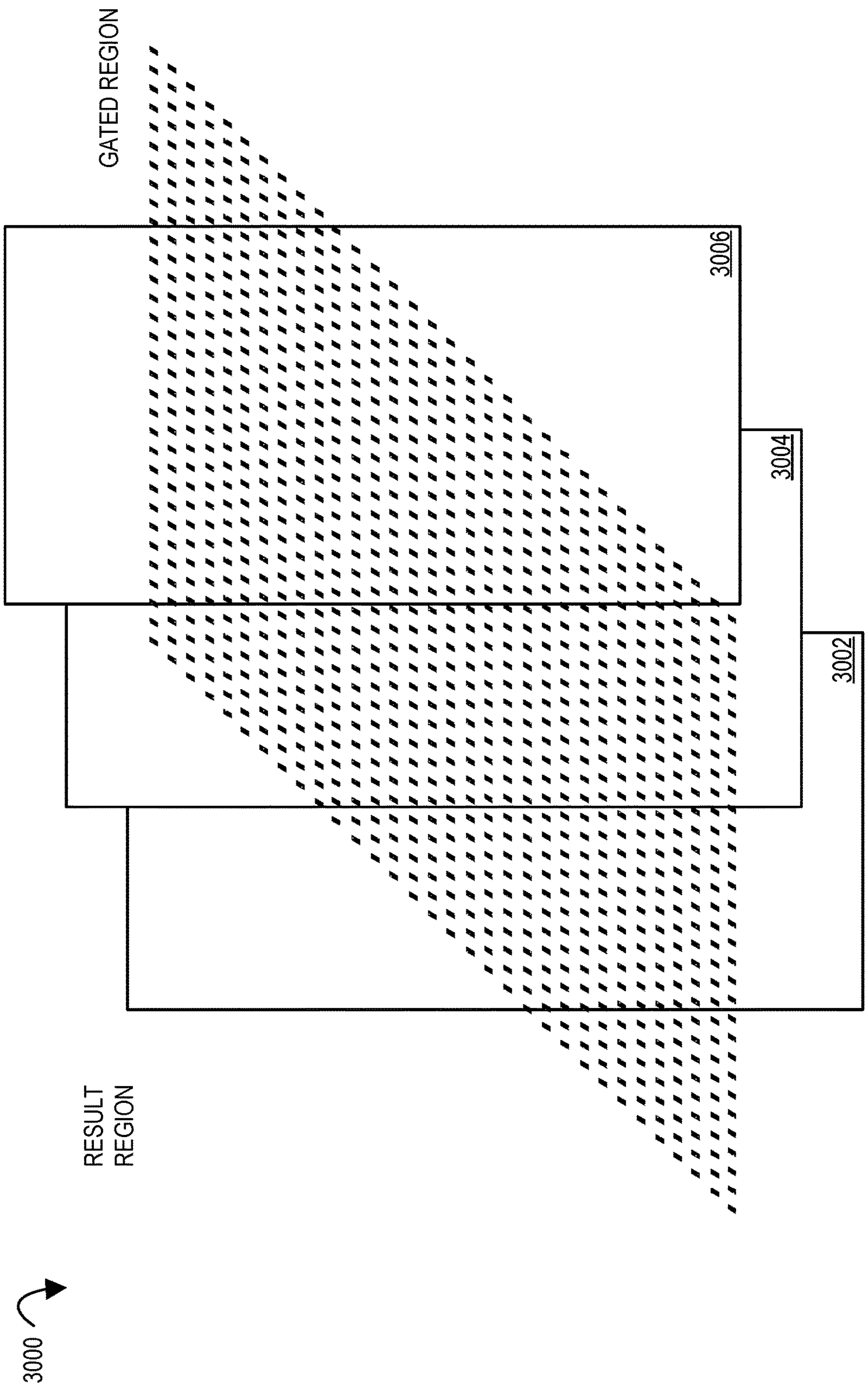
FIG. 30 illustrates a floating point multiplier partitioned into three regions (the result region, three potential carry regions, and the gated region) according to embodiments of the disclosure.

Certain HPC applications are characterized by their need for significant floating point bandwidth. To meet this need, embodiments of a CSA may be provisioned with multiple (e.g., between 128 and 256 each) of floating add and multiplication PEs, e.g., depending on tile configuration. A CSA may provide a few other extended precision modes, e.g., to simplify math library implementation. CSA floating point PEs may support both single and double precision, but lower precision PEs may support machine learning workloads. A CSA may provide an order of magnitude more floating point performance than a processor core. In one embodiment, in addition to increasing floating point bandwidth, in order to power all of the floating point units, the energy consumed in floating point operations is reduced. For example, to reduce energy, a CSA may selectively gate the low-order bits of the floating point multiplier array. In examining the behavior of floating point arithmetic, the low order bits of the multiplication array may often not influence the final, rounded product. FIG. 30 illustrates a floating point multiplier 3000 partitioned into three regions (the result region, three potential carry regions (3002, 3004, 3006), and the gated region) according to embodiments of the disclosure. In certain embodiments, the carry region is likely to influence the result region and the gated region is unlikely to influence the result region. Considering a gated region of g bits, the maximum carry may be:

$$
\begin{aligned}
carry_g &\le \frac{1}{2^g}\sum_{1}^{g} i2^{i-1} \\
&\le \sum_{1}^{g}\frac{i}{2^g} - \sum_{1}^{g}\frac{1}{2^g} + 1 \\
&\le g - 1
\end{aligned}
$$

Given this maximum carry, if the result of the carry region is less than $2^c$-g, where the carry region is c bits wide, then the gated region may be ignored since it does not influence the result region. Increasing g means that it is more likely the gated region will be needed, while increasing c means that, under random assumption, the gated region will be unused and may be disabled to avoid energy consumption. In embodiments of a CSA floating multiplication PE, a two stage pipelined approach is utilized in which first the carry region is determined and then the gated region is determined if it is found to influence the result. If more information about the context of the multiplication is known, a CSA more aggressively tune the size of the gated region. In FMA, the multiplication result may be added to an accumulator, which is often much larger than either of the multiplicands. In this case, the addend exponent may be observed in advance of multiplication and the CSDA may adjust the gated region accordingly. One embodiment of the CSA includes a scheme in which a context value, which bounds the minimum result of a computation, is provided to related multipliers, in order to select minimum energy gating configurations.

2.7 Runtime Services

Figure 31:
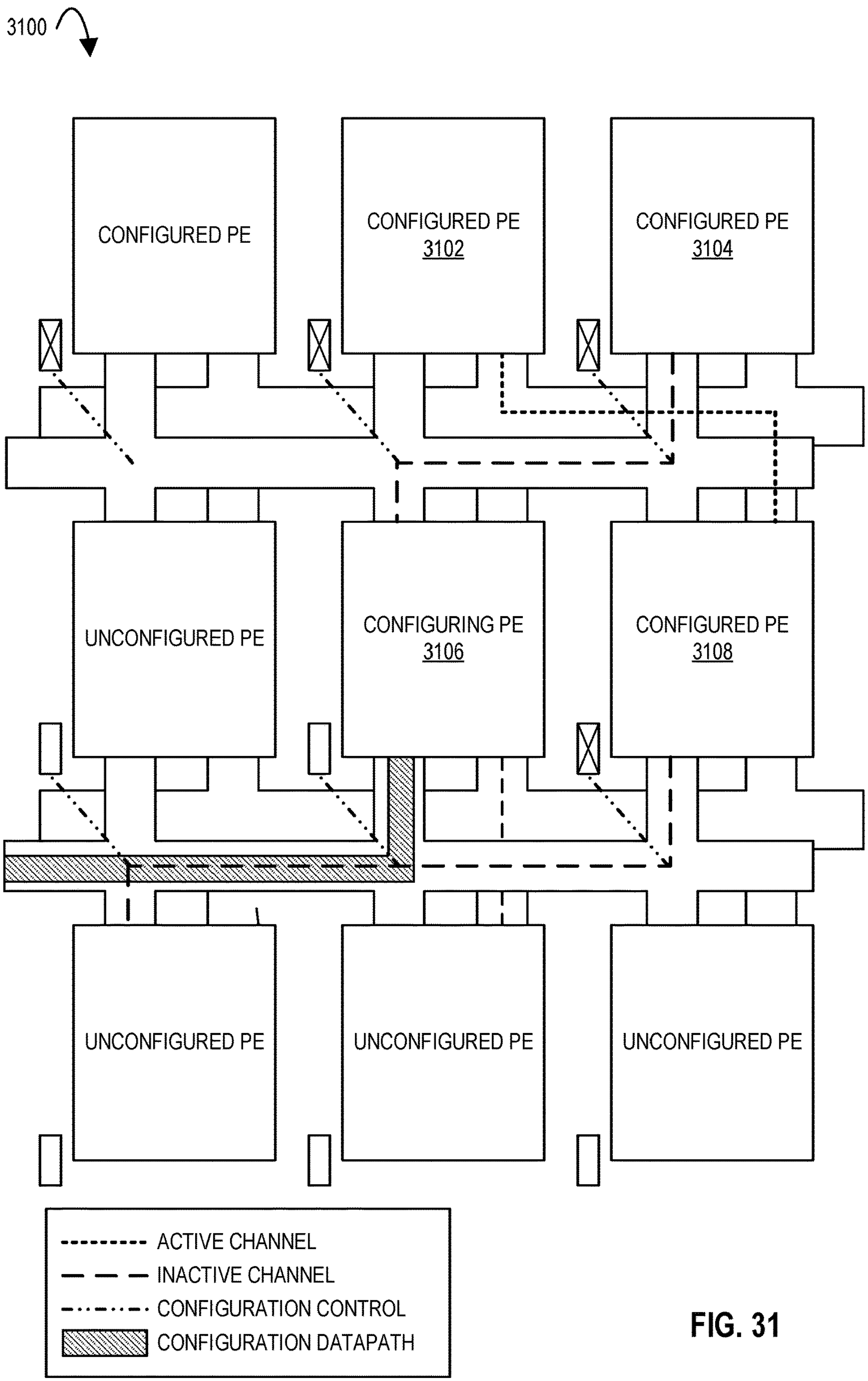
FIG. 31 illustrates an in-flight configuration of an accelerator with a plurality of processing elements according to embodiments of the disclosure.

In certain embodiments, a CSA includes a heterogeneous and distributed fabric, and consequently, runtime service implementations are to accommodate several kinds of PEs in a parallel and distributed fashion. Although runtime services in a CSA may be critical, they may be infrequent relative to user-level computation. Certain implementations, therefore, focus on overlaying services on hardware resources. To meet these goals, CSA runtime services may be cast as a hierarchy, e.g., with each layer corresponding to a CSA network. At the tile level, a single external-facing controller may accepts or sends service commands to an associated core with the CSA tile. A tile-level controller may serve to coordinate regional controllers at the RAFs, e.g., using the ACI network. In turn, regional controllers may coordinate local controllers at certain mezzanine network stops (e.g., network dataflow endpoint circuits). At the lowest level, service specific micro-protocols may execute over the local network, e.g., during a special mode controlled through the mezzanine controllers. The micro-protocols may permit each PE (e.g., PE class by type) to interact with the runtime service according to its own needs. Parallelism is thus implicit in this hierarchical organization, and operations at the lowest levels may occur simultaneously. This parallelism may enables the configuration of a CSA tile in between hundreds of nanoseconds to a few microseconds, e.g., depending on the configuration size and its location in the memory hierarchy. Embodiments of the CSA thus leverage properties of dataflow graphs to improve implementation of each runtime service. One key observation is that runtime services may need only to preserve a legal logical view of the dataflow graph, e.g., a state that can be produced through some ordering of dataflow operator executions. Services may generally not need to guarantee a temporal view of the dataflow graph, e.g., the state of a dataflow graph in a CSA at a specific point in time. This may permit the CSA to conduct most runtime services in a distributed, pipelined, and parallel fashion, e.g., provided that the service is orchestrated to preserve the logical view of the dataflow graph. The local configuration micro-protocol may be a packet-based protocol overlaid on the local network. Configuration targets may be organized into a configuration chain, e.g., which is fixed in the microarchitecture. Fabric (e.g., PE) targets may be configured one at a time, e.g., using a single extra register per target to achieve distributed coordination. To start configuration, a controller may drive an out-of-band signal which places all fabric targets in its neighborhood into an unconfigured, paused state and swings multiplexors in the local network to a pre-defined conformation. As the fabric (e.g., PE) targets are configured, that is they completely receive their configuration packet, they may set their configuration microprotocol registers, notifying the immediately succeeding target (e.g., PE) that it may proceed to configure using the subsequent packet. There is no limitation to the size of a configuration packet, and packets may have dynamically variable length. For example, PEs configuring constant operands may have a configuration packet that is lengthened to include the constant field (e.g., X and Y in FIGS. 3B-3C). FIG. 31 illustrates an in-flight configuration of an accelerator 3100 with a plurality of processing elements (e.g., PEs 3102, 3104, 3106, 3108) according to embodiments of the disclosure. Once configured, PEs may execute subject to dataflow constraints. However, channels involving unconfigured PEs may be disabled by the microarchitecture, e.g., preventing any undefined operations from occurring. These properties allow embodiments of a CSA to initialize and execute in a distributed fashion with no centralized control whatsoever. From an unconfigured state, configuration may occur completely in parallel, e.g., in perhaps as few as 200 nanoseconds. However, due to the distributed initialization of embodiments of a CSA, PEs may become active, for example sending requests to memory, well before the entire fabric is configured. Extraction may proceed in much the same way as configuration. The local network may be conformed to extract data from one target at a time, and state bits used to achieve distributed coordination. A CSA may orchestrate extraction to be non-destructive, that is, at the completion of extraction each extractable target has returned to its starting state. In this implementation, all state in the target may be circulated to an egress register tied to the local network in a scan-like fashion. Although in-place extraction may be achieved by introducing new paths at the register-transfer level (RTL), or using existing lines to provide the same functionalities with lower overhead. Like configuration, hierarchical extraction is achieved in parallel.

Figure 32:
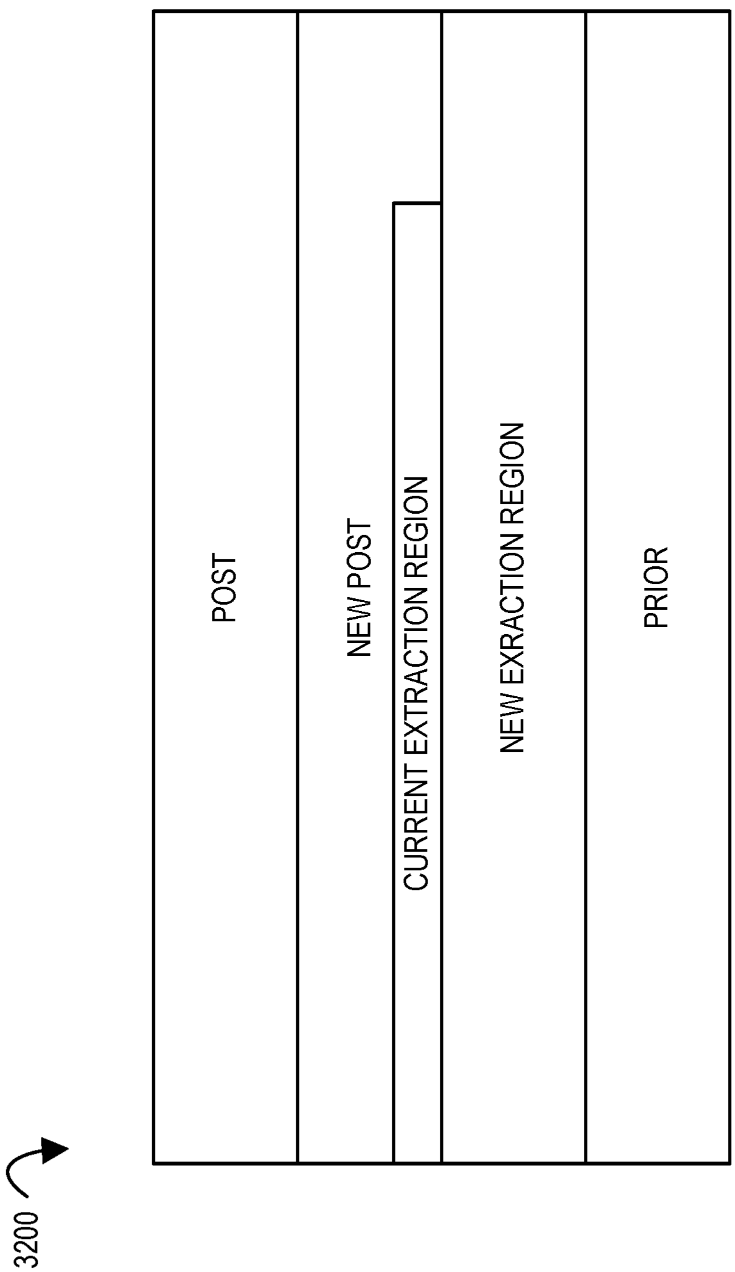
FIG. 32 illustrates a snapshot of an in-flight, pipelined extraction according to embodiments of the disclosure.

FIG. 32 illustrates a snapshot 3200 of an in-flight, pipelined extraction according to embodiments of the disclosure. In some use cases of extraction, such as checkpointing, latency may not be a concern so long as fabric throughput is maintained. In these cases, extraction may be orchestrated in a pipelined fashion. This arrangement, shown in FIG. 32, permits most of the fabric to continue executing, while a narrow region is disabled for extraction. Configuration and extraction may be coordinated and composed to achieve a pipelined context switch. Exceptions may differ qualitatively from configuration and extraction in that, rather than occurring at a specified time, they arise anywhere in the fabric at any point during runtime. Thus, in one embodiment, the exception micro-protocol may not be overlaid on the local network, which is occupied by the user program at runtime, and utilizes its own network. However, by nature, exceptions are rare and insensitive to latency and bandwidth. Thus certain embodiments of CSA utilize a packet switched network to carry exceptions to the local mezzanine stop, e.g., where they are forwarded up the service hierarchy (e.g., as in FIG. 144). Packets in the local exception network may be extremely small. In many cases, a PE identification (ID) of only two to eight bits suffices as a complete packet, e.g., since the CSA may create a unique exception identifier as the packet traverses the exception service hierarchy. Such a scheme may be desirable because it also reduces the area overhead of producing exceptions at each PE.

3. Operation Set Architecture (OSA) Examples

The following section includes example operations of an operation set architecture (OSA) for a configurable spatial accelerator (CSA). A CSA may be programmed to perform one or more of the operations of the OSA, e.g., in contrast to an instruction that is decoded and the decoded instruction is executed. In certain embodiments, a CSA is a fabric comprised of various (e.g., small) processing elements connected by a configurable, statically circuit switched interconnection network. In certain embodiments, processing elements are configured to execute the dataflow operators present in a (e.g., control) dataflow graph, for example, with each processing element implementing approximately one dataflow operator. In certain embodiments, configuration occurs as a stage prior to execution and occurs only once for the life of the graph. As discussed above, dataflow operators may execute independently, e.g., whenever data is available locally at the processing element. Thus, parallelism may be achieved by the simultaneous execution of processing elements. For many forms of parallelism, high degrees of concurrent execution are achieved. As a purpose-built accelerator, a CSA may utilize a processor core (e.g., as discussed herein) to execute non-parallel or otherwise un-accelerable portions of programs.

The following includes a short description of certain concepts and terminology in section 3.1, some of which are described in more detail in other sections herein. Section 3 then discusses an example processing element with control lines in section 3.2, example communications (e.g., via a circuit switched network) in section 3.3, configuration of a CSA (e.g., configuration of the PEs and a circuit switched network) in section 3.4, an example operation format in section 3.5, and example operations in section 3.6.

3.1 Concepts and Terminology

An operation (e.g., which has input and output operands) may be configured on to some hardware component (e.g., a PE) at configuration time. Particularly, the hardware components (e.g., PEs) may be configured (e.g., programmed) as a dataflow operator (e.g., as a representation of a node in a dataflow graph) through the use of one of more of the operations of the OSA discussed herein. Operands may be sourced from and/or to latency insensitive channels (LICs), registers, or literal values. In certain embodiments, operations are initially triggered (e.g., able to start execution) by the availability of all required input operands and availability of a location for output. Operations may execute to produce an output directly when triggered, or may execute for an extended period generating multiple outputs, such as a sequence or stream. Operations that trigger and issue once without internal preserved state may be referred to as stateless operations. Operations that may perform extended processing, e.g., related to streams, may be referred to as stateful operations. Operations may be classified in several broad categories, such as integer logical and arithmetic, floating point arithmetic, comparisons, conversions, memory reference, fan-in/fan-out for dataflow (e.g., merge, copy, or switch), ordering, sequence generation, etc. Unlike other architectures, a stateful operation in a CSA may trigger and run for an extended duration. For example, a sequence generation operation might trigger on receiving the bounds of the sequence to generate, and it will be executing over an extended period as it sends out successive values in the sequence.

A latency insensitive channel (LIC) may refer to a point to point connection between operations (e.g., PEs) with exactly one head enqueuing values and one tail dequeuing them, e.g., first-in-first-out (FIFO) queues. In one embodiment, one or more LICs are formed between a single transmitting PE and a plurality of receiving PEs (e.g., multicast send). In one embodiment, one or more LICs are formed between a plurality of transmitting PE and a single receiving PE (e.g., multicast receive). In certain embodiments, ordering is preserved for values flowing through a LIC from the producer to the consumer. LICs may be characterized by a bit width, and a depth, e.g., the number of values that can be held. Note that in embodiments of an assembler, LICs are declared with a type. In one embodiment, only the bit size of the type matters for operating semantics. The operations for a latency insensitive channel may be: 1) check for empty (e.g., before reading), 2) check for full (e.g., before writing), 3) write a value at the tail (e.g., "put"), 4) read a value at the head, 5) remove the head (e.g., where 4 and 5 may be combined as a "get" operation).

A signal (e.g., a value of that signal) may refer to a LIC with no data width (e.g., the nil type—0 bits), for example, as only a presence signal, in which case only the fact that something has happened is conveyed.

A register may store state local to a unit that may be used to hold values. Registers are not a required part of hardware components (e.g., PEs), but may be available on some programmable hardware components. In certain embodiments, registers on one hardware component (e.g., PE) cannot be directly accessed by any other hardware components (e.g., PEs).

A CSA instance may include a network of processing elements (PEs), e.g., along with hardware to access memory. A hardware component (e.g., unit) may perform some set of operations of the OSA that are enabled by configuring them onto the component. Components (e.g., PEs) may be configured with one or more operations, e.g. to perform a variety of integer operations, and a particular instance of that component type may have multiple operations (e.g., add64 c1,c2,c3 and and64 c0,c1,1) loaded on it for a particular program, though certain embodiments may include only configuring a single operation per component (e.g., PE). Examples of kinds of hardware components (e.g., PEs) include ALU, floating multiply add, integer multiply, conversions, sequence generators, access, scratchpad, etc. Components may vary from having very little state (e.g. just operation descriptions for configuring) to small counts of latches combined with logic circuitry, to scratchpad components that are primarily storage, to (e.g., relatively complex) components for memory access. Some components may have multiple operations up to a small fixed limit (e.g., about 16), while others may only allow a single instance of an operation to be performed. Note that the exact concept of how large a CSA is flexible in certain embodiments, e.g., when loading a graph on aggregated CSA instances.

A (e.g., CSA) program may be a collection of operations and channels definitions that are configured (e.g., loaded) onto the hardware components (e.g., units) and network (e.g., interconnect) of a CSA instance. One CSA model expects that once configuration is complete, the program may be executed one or more times without reconfiguration, e.g., provided the CSA resources used for the program is loaded are not needed for another program between. In certain embodiments, routing of LICs is a property of configuration, e.g., and the configuration of the hardware (e.g., PE's and network) is not changed during the execution of a program. In certain embodiments, a CSA holds multiple programs at the same time, for example, and a given program may have multiple entry points (e.g. a CSA may hold code for several loop nests that are executed in a larger context to avoid repeated configuration steps).

Configuring may generally refer to when the program is loaded onto hardware, e.g. configuring a program onto the CSA, or configuring individual operations onto hardware components (e.g., PEs) during that load. In certain embodiments, configuring and transferring control to a CSA (e.g., from a processor core) has a reasonable configuration cost (e.g., dozens to hundreds of cycles to configure, not thousands or more), and the invocation of a CSA routine is relatively fast.

A sequence may generally refer to a sequence of values. The successive values in a given LIC may form a sequence.

A stream may generally refer to a set of channels including a stream control channel, e.g., as a single bit LIC, and one or more data channels. The values in the stream channel may be logical 1s until there is no more data, at which point there is a logical 0 to signal the end of the stream. E.g. a stream of the values 1-5 in a {control, data} formatted pair may look like {1,1}, {1,2}, {1,3}, {1,4}, {1,5}, {0} (note that no data value is included in the last data set {0} as the (first position) logical zero therein signals it is the end of the stream).

A CSA may utilize multiple data types. The types may be used in declaration of storage (e.g., including LICs, registers and static storage) and show up in the name of operations (e.g. add64, fmaf32, cvts64f32). In certain embodiments of an assembler, standalone type names are prefixed with a period (e.g., .lic .i64 achannel to declare a 64 bit LIC.)

In certain embodiments for storage, like LICs, only the bit size is semantically relevant to operations and the other properties are not (e.g., i32, s32, u32 and f32 are semantically equivalent for a LIC definition though they may affect the readability of output in a simulator dump).

In the example operations section, the s, u, or f types may be used for clarity of how the operation treats the bits in the operation, but not imply that hardware is doing sign extension beyond what is specified in the operation, or any type of implicit data conversion. Table 2 below indicates example types that may be used (e.g., in assembly).

TABLE 2

Example Data Types

| Type used in assembler | Bit size | Description |
|---|---|---|
| i0 (also called nil) | 0 | No data (used for signals that convey when something happens, but have no payload) |
| i1 (also called bit) | 1 | Single bit value |
| i8, i16, i32, i64 | 8, 16, 32, 64 | n bits of data, signedness not relevant |
| s8, s16, s32, s64 | 8, 16, 32, 64 | Signed integer with only n bits of data |
| u8, u16, u32, u64 | 8, 16, 32, 64 | Unsigned integer with only n bits of data |
| f16, f32, f64 | 16, 32, 64 | Floating point |
| a64 | 64 | An address |

Operations (e.g., CSA operations) may be the data values (e.g., including multiple fields) that are provided (e.g., as a plurality of set bits) to a hardware component (e.g., a PE) to program the PE to perform the desired operation (e.g., the PE performing that programmed operation when the input data arrives and there is storage available for the output data). A processing element may be any of the processing elements (or component or components thereof) discussed herein. The following discusses an embodiment of a processing element along with its example control lines.

3.2 Example Processing Element with Control Lines

In certain embodiments, the core architectural interface of the CSA is the dataflow operator, e.g., as a direct representation of a node in a dataflow graph. From an operational perspective, dataflow operators may behave in a streaming or data-driven fashion. Dataflow operators execute as soon as their incoming operands become available and there is space available to store the output (resultant) operand or operands. In certain embodiments, CSA dataflow execution depends only on highly localized status, e.g., resulting in a highly scalable architecture with a distributed, asynchronous execution model.

In certain embodiments, a CSA fabric architecture takes the position that each processing element of the microarchitecture corresponds to approximately one entity in the architectural dataflow graph. In certain embodiments, this results in processing elements that are not only compact, resulting in a dense computation array, but also energy efficient. To further reduce energy and implementation area, certain embodiments use a flexible, heterogeneous fabric style in which each PE implements only a (proper) subset of dataflow operators. For example, with floating point operations and integer operations mapped to separate processing element types, but both types support dataflow control operations discussed herein. In one embodiment, a CSA includes a dozen types of PEs, although the precise mix and allocation may vary in other embodiments.

In one embodiment, processing elements are organized as pipelines and support the injection of one pipelined dataflow operator per cycle. Processing elements may have a single-cycle latency. However, other pipelining choices may be used for other (e.g., more complicated) operations. For example, floating point operations may use multiple pipeline stages.

As discussed herein, in certain embodiments CSA PEs are configured (for example, as discussed in section 3.4 below, e.g., according to the operations discussed in section 3.6) before the beginning of graph execution to implement a particular dataflow operation from among the set that they support. A configuration value (e.g., stored in the configuration register of a PE) may consist of one or two control words (e.g., 32 or 64 bits) which specify an opcode controlling the operation circuitry (e.g., ALU), steer the various multiplexors within the PE, and actuate dataflow into and out of the PE channels. Dataflow operators may thus be implemented by micro coding these configurations bits. Once configured, in certain embodiments the PE operation is fixed for the life of the graph, e.g., although microcode may provide some (e.g., limited) flexibility to support dynamically controller operations.

To handle some of the more complex dataflow operators like floating-point fused-multiply add (FMA) and a loop-control sequencer operator, multiple PEs may be used rather than to provision a more complex single PE. In these cases, additional function-specific communications paths may be added between the combinable PEs. In the case of an embodiment of a sequencer (e.g., to implement loop control), combinational paths are established between (e.g., adjacent) PEs to carry control information related to the loop. Such PE combinations may maintain fully pipelined behavior while preserving the utility of a basic PE embodiment, e.g., in the case that the combined behavior is not used for a particular program graph.

Processing elements may implement a common interface, e.g., including the local network interfaces described herein. In addition to ports into the local network, a (e.g., every) processing element may implement a full complement of runtime services, e.g., including the micro-protocols associated with configuration, extraction, and exception. In certain embodiments, a common processing element perimeter enables the full parameterization of a particular hardware instance of a CSA with respect to processing element count, composition, and function, e.g., and the same properties make CSA processing element architecture highly amenable to deployment-specific extension. For example, CSA may include PEs tuned for the low-precision arithmetic machine learning applications.

Figure 33:
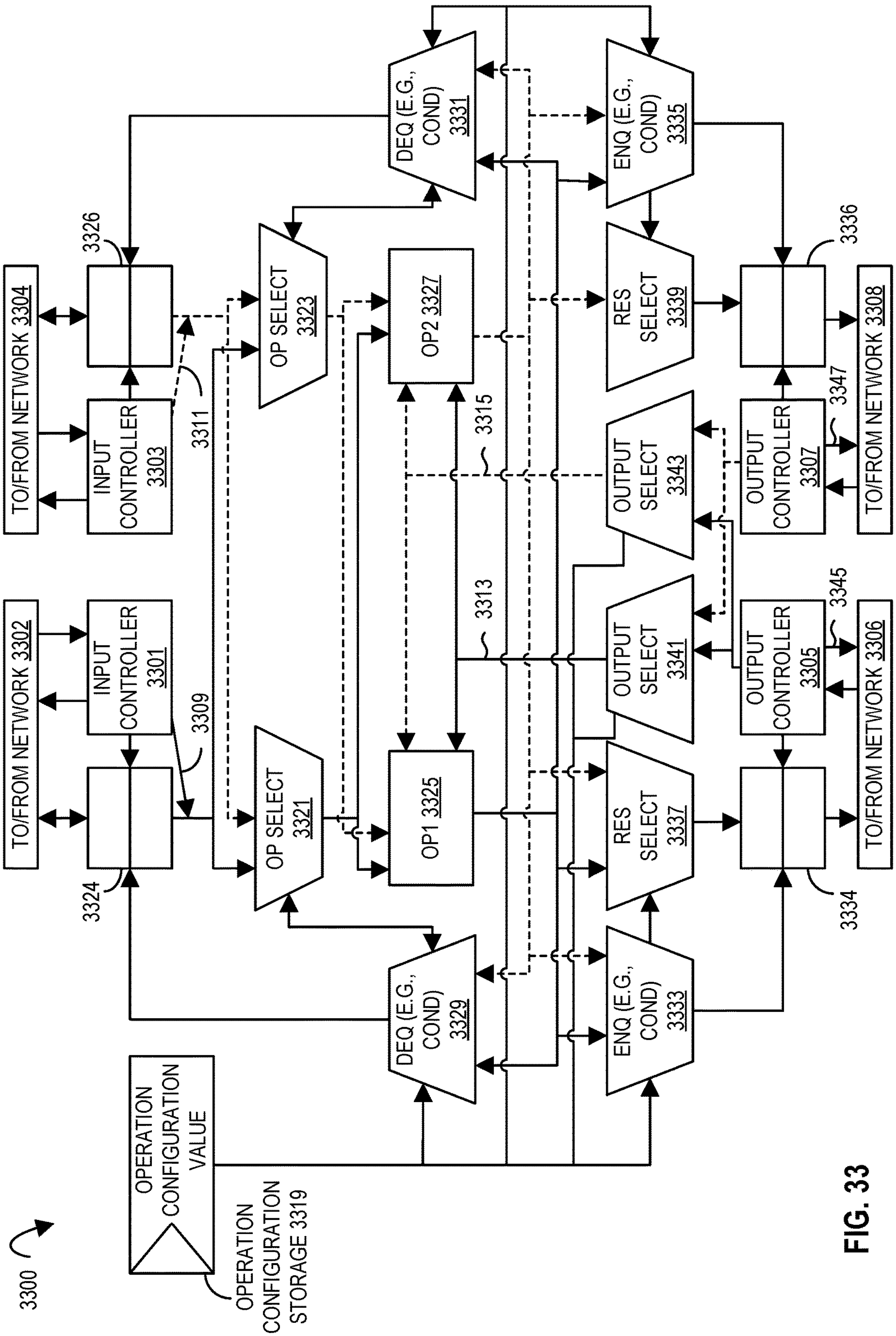
FIG. 33 illustrates data paths and control paths of a processing element according to embodiments of the disclosure.

In certain embodiments, a significant source of area and energy reduction is the customization of the dataflow operations supported by each type of processing element. In one embodiment, a proper subset (e.g., most) processing elements support only a few operations (e.g., one, two, three, or four operation types), for example, an implementation choice where a floating point PE only supports one of floating point multiply or floating point add, but not both. FIG. 33 depicts a processing element (PE) 3300 that supports (e.g., only) two operations, although the below discussion is equally applicable for a PE that supports a single operation or more than two operations. In one embodiment, processing element 3300 supports two operations, and the configuration value being set selects a single operation for performance, e.g., to perform one or multiple instances of a single operation type for that configuration.

FIG. 33 illustrates data paths and control paths of a processing element 3300 according to embodiments of the disclosure. A processing element may include one or more of the components discussed herein, e.g., as discussed in reference to FIG. 9. Processing element 3300 includes operation configuration storage 3319 (e.g., register) to store an operation configuration value that causes the PE to perform the selected operation when its requirements are met, e.g., when the incoming operands become available (e.g., from input storage 3324 and/or input storage 3326) and when there is space available to store the output (resultant) operand or operands (e.g., in output storage 3334 and/or output storage 3336). In certain embodiments, operation configuration value (e.g., corresponding to the mapping of a dataflow graph to that PE(s)) is loaded (e.g., stored) in operation configuration storage 3319 as described herein, e.g., in section 3.4 below.

Operation configuration value may be a (e.g., unique) value, for example, according to the format discussed in section 3.5 below, e.g., for the operations discussed in section 3.6 below. In certain embodiments, operation configuration value includes a plurality of bits that cause processing element 3300 to perform a desired (e.g., preselected) operation, for example, performing the desired (e.g., preselected) operation when the incoming operands become available (e.g., in input storage 3324 and/or input storage 3326) and when there is space available to store the output (resultant) operand or operands (e.g., in output storage 3334 and/or output storage 3336). The depicted processing element 3300 includes two sets of operation circuitry 3325 and 3327, for example, to each perform a different operation. In certain embodiments, a PE includes status (e.g., state) storage, for example, within operation circuitry or a status register. Status storage may be modified during the operation in the the course of execution. Status storage may be shared among several operations. See, for example, the status register 938 in FIG. 9, the state stored in scheduler in FIGS. 64A-64F, or the state stored in the scheduler in FIGS. 66A-66G.

Depicted processing element 3300 includes an operation configuration storage 3319 (e.g., register(s)) to store an operation configuration value. In one embodiment, all of or a proper subset of a (e.g., single) operation configuration value is sent from the operation configuration storage 3319 (e.g., register(s)) to the multiplexers (e.g., multiplexer 3321 and multiplexer 3323) and/or demultiplexers (e.g., demultiplexer 3341 and demultiplexer 3343) of the processing element 3300 to steer the data according to the configuration.

Processing element 3300 includes a first input storage 3324 (e.g., input queue or buffer) coupled to (e.g., circuit switched) network 3302 and a second input storage 3326 (e.g., input queue or buffer) coupled to (e.g., circuit switched) network 3304. Network 3302 and network 3304 may be the same network (e.g., different circuit switched paths of the same network). Although two input storages are depicted, a single input storage or more than two input storages (e.g., any integer or proper subset of integers) may be utilized (e.g., with their own respective input controllers). Operation configuration value may be sent via the same network that the input storage 3324 and/or input storage 3326 are coupled to.

Depicted processing element 3300 includes input controller 3301, input controller 3303, output controller 3305, and output controller 3307 (e.g., together forming a scheduler for processing element 3300). Embodiments of input controllers are discussed in reference to FIGS. 34-43. Embodiments of output controllers are discussed in reference to FIGS. 44-53. In certain embodiments, operation circuitry (e.g., operation circuitry 3325 or operation circuitry 3327 in FIG. 33) includes a coupling to a scheduler to perform certain actions, e.g., to activate certain logic circuitry in the operations circuitry based on control provided from the scheduler.

In FIG. 33, the operation configuration value (e.g., set according to the operation that is to be performed) or a subset of less than all of the operation configuration value causes the processing element 3300 to perform the programmed operation, for example, when the incoming operands become available (e.g., from input storage 3324 and/or input storage 3326) and when there is space available to store the output (resultant) operand or operands (e.g., in output storage 3334 and/or output storage 3336). In the depicted embodiment, the input controller 3301 and/or input controller 3303 are to cause a supplying of the input operand(s) and the output controller 3305 and/or output controller 3307 are to cause a storing of the resultant of the operation on the input operand(s). In one embodiment, a plurality of input controllers are combined into a single input controller. In one embodiment, a plurality of output controllers are combined into a single output controller.

In certain embodiments, the input data (e.g., dataflow token or tokens) is sent to input storage 3324 and/or input storage 3326 by networks 3302 or networks 3302. In one embodiment, input data is stalled until there is available storage (e.g., in the targeted storage input storage 3324 or input storage 3326) in the storage that is to be utilized for that input data. In the depicted embodiment, operation configuration value (or a portion thereof) is sent to the multiplexers (e.g., multiplexer 3321 and multiplexer 3323) and/or demultiplexers (e.g., demultiplexer 3341 and demultiplexer 3343) of the processing element 3300 as control value(s) to steer the data according to the configuration. In certain embodiments, input operand selection switches 3321 and 3323 (e.g., multiplexers) allow data (e.g., dataflow tokens) from input storage 3324 and input storage 3326 as inputs to either of operation circuitry 3325 or operation circuitry 3327. In certain embodiments, result (e.g., output operand) selection switches 3337 and 3339 (e.g., multiplexers) allow data from either of operation circuitry 3325 or operation circuitry 3327 into output storage 3334 and/or output storage 3336. Storage may be a queue (e.g., FIFO queue). In certain embodiments, an operation takes one input operand (e.g., from either of input storage 3324 and input storage 3326) and produce two resultants (e.g., stored in output storage 3334 and output storage 3336). In certain embodiments, an operation takes two or more input operands (for example, one from each input storage queue, e.g., one from each of input storage 3324 and input storage 3326) and produces a single (or plurality of) resultant (for example, stored in output storage, e.g., output storage 3334 and/or output storage 3336).

In certain embodiments, processing element 3300 is stalled from execution until there is input data (e.g., dataflow token or tokens) in input storage and there is storage space for the resultant data available in the output storage (e.g., as indicated by a backpressure value sent that indicates the output storage is not full). In the depicted embodiment, the input storage (queue) status value from path 3309 indicates (e.g., by asserting a "not empty" indication value or an "empty" indication value) when input storage 3324 contains (e.g., new) input data (e.g., dataflow token or tokens) and the input storage (queue) status value from path 3311 indicates (e.g., by asserting a "not empty" indication value or an "empty" indication value) when input storage 3326 contains (e.g., new) input data (e.g., dataflow token or tokens). In one embodiment, the input storage (queue) status value from path 3309 for input storage 3324 and the input storage (queue) status value from path 3311 for input storage 3326 is steered to the operation circuitry 3325 and/or operation circuitry 3327 (e.g., along with the input data from the input storage(s) that is to be operated on) by multiplexer 3321 and multiplexer 3323.

In the depicted embodiment, the output storage (queue) status value from path 3313 indicates (e.g., by asserting a "not full" indication value or a "full" indication value) when output storage 3334 has available storage for (e.g., new) output data (e.g., as indicated by a backpressure token or tokens) and the output storage (queue) status value from path 3315 indicates (e.g., by asserting a "not full" indication value or a "full" indication value) when output storage 3336 has available storage for (e.g., new) output data (e.g., as indicated by a backpressure token or tokens). In the depicted embodiment, operation configuration value (or a portion thereof) is sent to both multiplexer 3341 and multiplexer 3343 to source the output storage (queue) status value(s) from the output controllers 3305 and/or 3307. In certain embodiments, operation configuration value includes a bit or bits to cause a first output storage status value to be asserted, where the first output storage status value indicates the output storage (queue) is not full or a second, different output storage status value to be asserted, where the second output storage status value indicates the output storage (queue) is full. The first output storage status value (e.g., "not full") or second output storage status value (e.g., "full") may be output from output controller 3305 and/or output controller 3307, e.g., as discussed below. In one embodiment, a first output storage status value (e.g., "not full") is sent to the operation circuitry 3325 and/or operation circuitry 3327 to cause the operation circuitry 3325 and/or operation circuitry 3327, respectively, to perform the programmed operation when an input value is available in input storage (queue) and a second output storage status value (e.g., "full") is sent to the operation circuitry 3325 and/or operation circuitry 3327 to cause the operation circuitry 3325 and/or operation circuitry 3327, respectively, to not perform the programmed operation even when an input value is available in input storage (queue).

In the depicted embodiment, dequeue (e.g., conditional dequeue) multiplexers 3329 and 3331 are included to cause a dequeue (e.g., removal) of a value (e.g., token) from a respective input storage (queue), e.g., based on operation completion by operation circuitry 3325 and/or operation circuitry 3327. The operation configuration value includes a bit or bits to cause the dequeue (e.g., conditional dequeue) multiplexers 3329 and 3331 to dequeue (e.g., remove) a value (e.g., token) from a respective input storage (queue). In the depicted embodiment, enqueue (e.g., conditional enqueue) multiplexers 3333 and 3335 are included to cause an enqueue (e.g., insertion) of a value (e.g., token) into a respective output storage (queue), e.g., based on operation completion by operation circuitry 3325 and/or operation circuitry 3327. The operation configuration value includes a bit or bits to cause the enqueue (e.g., conditional enqueue) multiplexers 3333 and 3335 to enqueue (e.g., insert) a value (e.g., token) into a respective output storage (queue).

Certain operations herein allow the manipulation of the control values sent to these queues, e.g., based on local values computed and/or stored in the PE.

In one embodiment, the dequeue multiplexers 3329 and 3331 are conditional dequeue multiplexers 3329 and 3331 that, when a programmed operation is performed, the consumption (e.g., dequeuing) of the input value from the input storage (queue) is conditionally performed. In one embodiment, the enqueue multiplexers 3333 and 3335 are conditional enqueue multiplexers 3333 and 3335 that, when a programmed operation is performed, the storing (e.g., enqueuing) of the output value for the programmed operation into the output storage (queue) is conditionally performed.

For example, as discussed herein, certain operations may make dequeuing (e.g., consumption) decisions for an input storage (queue) conditionally (e.g., based on token values) and/or enqueuing (e.g., output) decisions for an output storage (queue) conditionally (e.g., based on token values). An example of a conditional enqueue operation is a PredMerge operation that conditionally writes its outputs, so conditional enqueue multiplexer(s) will be swung, e.g., to store or not store the predmerge result into the appropriate output queue. An example of a conditional dequeue operation is a PredProp operation that conditionally reads its inputs, so conditional dequeue multiplexer(s) will be swung, e.g., to store or not store the predprop result into the appropriate input queue.

In certain embodiments, control input value (e.g., bit or bits) (e.g., a control token) is input into a respective, input storage (e.g., queue), for example, into a control input buffer as discussed herein (e.g., control input buffer 922 in FIG. 9). In one embodiment, control input value is used to make dequeuing (e.g., consumption) decisions for an input storage (queue) conditionally based on the control input value and/or enqueuing (e.g., output) decisions for an output storage (queue) conditionally based on the control input value. In certain embodiments, control output value (e.g., bit or bits) (e.g., a control token) is output into a respective, output storage (e.g., queue), for example, into a control output buffer as discussed herein (e.g., control output buffer 932 in FIG. 9).

Input Controllers

Figure 34:
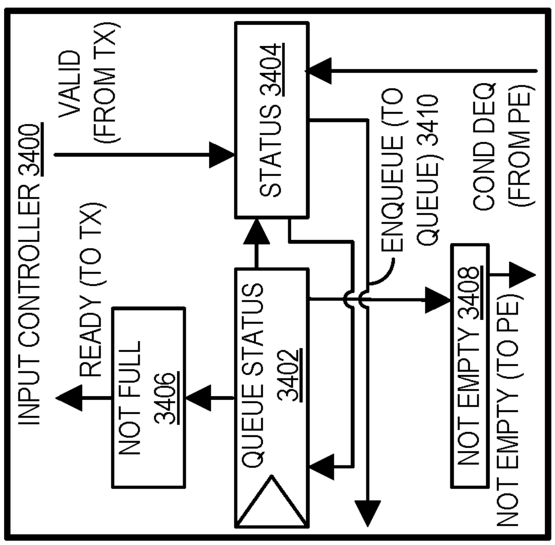
FIG. 34 illustrates input controller circuitry of input controller and/or input controller of processing element in FIG. 33 according to embodiments of the disclosure.

FIG. 34 illustrates input controller circuitry 3400 of input controller 3301 and/or input controller 3303 of processing element 3300 in FIG. 33 according to embodiments of the disclosure. In one embodiment, each input queue (e.g., buffer) includes its own instance of input controller circuitry 3400, for example, 2, 3, 4, 5, 6, 7, 8, or more (e.g., any integer) of instances of input controller circuitry 3400. Depicted input controller circuitry 3400 includes a queue status register 3402 to store a value representing the current status of that queue (e.g., the queue status register 3402 storing any combination of a head value (e.g., pointer) that represents the head (beginning) of the data stored in the queue, a tail value (e.g., pointer) that represents the tail (ending) of the data stored in the queue, and a count value that represents the number of (e.g., valid) values stored in the queue). For example, a count value may be an integer (e.g., two) where the queue is storing the number of values indicated by the integer (e.g., storing two values in the queue). The capacity of data (e.g., storage slots for data, e.g., for data elements) in a queue may be preselected (e.g., during programming), for example, depending on the total bit capacity of the queue and the number of bits in each element. Queue status register 3402 may be updated with the initial values, e.g., during configuration time.

Depicted input controller circuitry 3400 includes a Status determiner 3404, a Not Full determiner 3406, and a Not Empty determiner 3408. A determiner may be implemented in software or hardware. A hardware determiner may be a circuit implementation, for example, a logic circuit programmed to produce an output based on the inputs into the state machine(s) discussed below. Depicted (e.g., new) Status determiner 3404 includes a port coupled to queue status register 3402 to read and/or write to input queue status register 3402.

Depicted Status determiner 3404 includes a first input to receive a Valid value (e.g., a value indicating valid) from a transmitting component (e.g., an upstream PE) that indicates if (e.g., when) there is data (valid data) to be sent to the PE that includes input controller circuitry 3400. The Valid value may be referred to as a dataflow token. Depicted Status determiner 3404 includes a second input to receive a value or values from queue status register 3402 that represents that current status of the input queue that input controller circuitry 3400 is controlling. Optionally, Status determiner 3404 includes a third input to receive a value (from within the PE that includes input controller circuitry 3400) that indicates if (when) there is a conditional dequeue, e.g., from operation circuitry 3325 and/or operation circuitry 3327 in FIG. 33.

As discussed further below, the depicted Status determiner 3404 includes a first output to send a value on path 3410 that will cause input data (transmitted to the input queue that input controller circuitry 3400 is controlling) to be enqueued into the input queue or not enqueued into the input queue. Depicted Status determiner 3404 includes a second output to send an updated value to be stored in queue status register 3402, e.g., where the updated value represents the updated status (e.g., head value, tail value, count value, or any combination thereof) of the input queue that input controller circuitry 3400 is controlling.

Input controller circuitry 3400 includes a Not Full determiner 3406 that determines a Not Full (e.g., Ready) value and outputs the Not Full value to a transmitting component (e.g., an upstream PE) to indicate if (e.g., when) there is storage space available for input data in the input queue being controlled by input controller circuitry 3400. The Not Full (e.g., Ready) value may be referred to as a backpressure token, e.g., a backpressure token from a receiving PE sent to a transmitting PE.

Input controller circuitry 3400 includes a Not Empty determiner 3408 that determines an input storage (queue) status value and outputs (e.g., on path 3309 or path 3311 in FIG. 33) the input storage (queue) status value that indicates (e.g., by asserting a "not empty" indication value or an "empty" indication value) when the input queue being controlled contains (e.g., new) input data (e.g., dataflow token or tokens). In certain embodiments, the input storage (queue) status value (e.g., being a value that indicates the input queue is not empty) is one of the two control values (with the other being that storage for the resultant is not full) that is to stall a PE (e.g., operation circuitry 3325 and/or operation circuitry 3327 in FIG. 33) until both of the control values indicate the PE may proceed to perform its programmed operation (e.g., with a Not Empty value for the input queue(s) that provide the inputs to the PE and a Not Full value for the output queue(s) that are to store the resultant(s) for the PE operation). An example of determining the Not Full value for an output queue is discussed below in reference to FIG. 44. In certain embodiments, input controller circuitry includes any one or more of the inputs and any one or more of the outputs discussed herein.

For example, assume that the operation that is to be performed is to source data from both input storage 3324 and input storage 3326 in FIG. 33. Two instances of input controller circuitry 3400 may be included to cause a respective input value to be enqueued into input storage 3324 and input storage 3326 in FIG. 33. In this example, each input controller circuitry instance may send a Not Empty value within the PE containing input storage 3324 and input storage 3326 (e.g., to operation circuitry) to cause the PE to operate on the input values (e.g., when the storage for the resultant is also not full).

Figure 35:
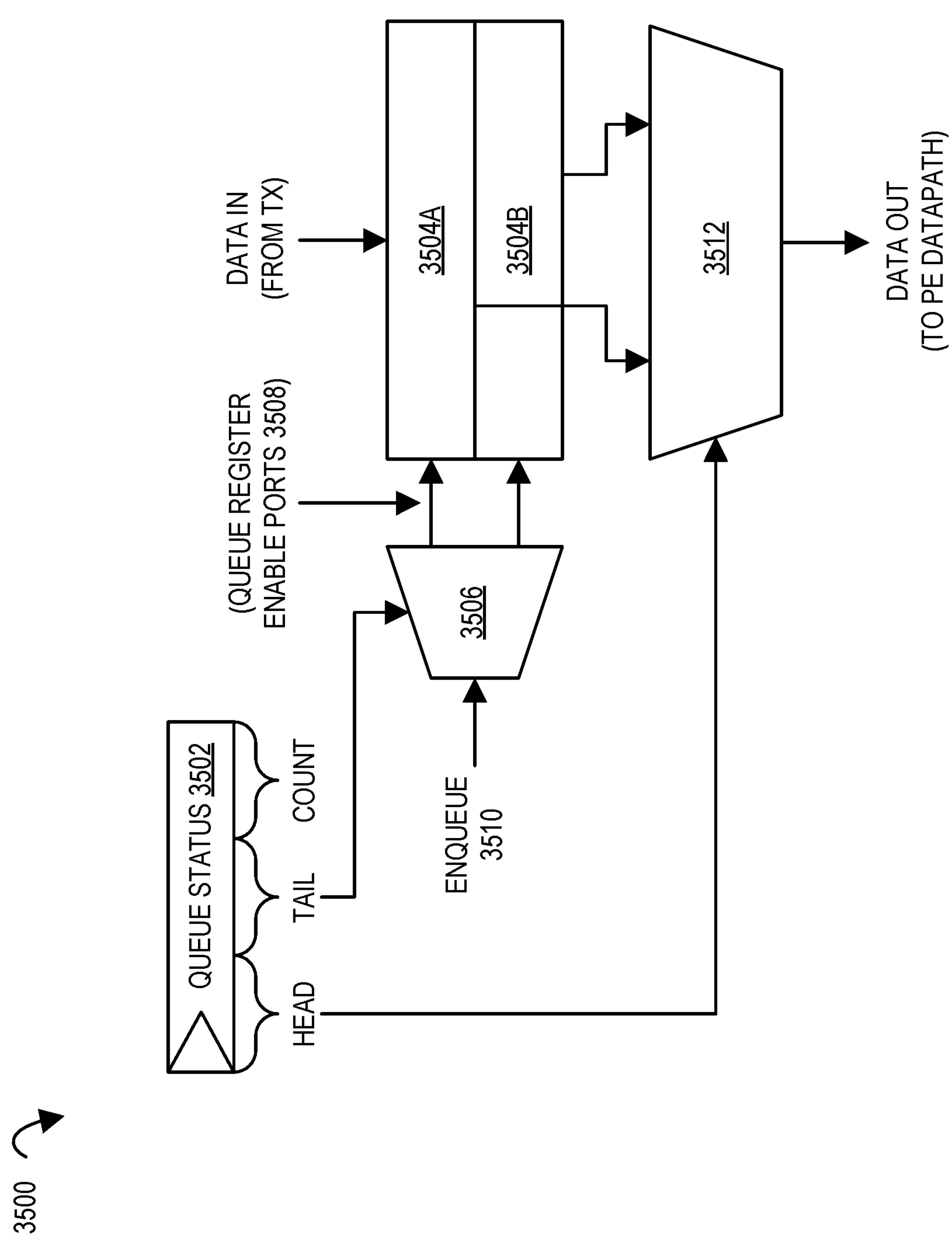
FIG. 35 illustrates enqueue circuitry of input controller and/or input controller in FIG. 34 according to embodiments of the disclosure.

FIG. 35 illustrates enqueue circuitry 3500 of input controller 3301 and/or input controller 3303 in FIG. 34 according to embodiments of the disclosure. Depicted enqueue circuitry 3500 includes a queue status register 3502 to store a value representing the current status of the input queue 3504. Input queue 3504 may be any input queue, e.g., input storage 3324 or input storage 3326 in FIG. 33. Enqueue circuitry 3500 includes a multiplexer 3506 coupled to queue register enable ports 3508. Enqueue input 3510 is to receive a value indicating to enqueue (e.g., store) an input value into input queue 3504 or not. In one embodiment, enqueue input 3510 is coupled to path 3410 of an input controller that causes input data (e.g., transmitted to the input queue 3504 that input controller circuitry 3400 is controlling) to be enqueued into. In the depicted embodiment, the tail value from queue status register 3502 is used as the control value to control whether the input data is stored in the first slot 3504A or the second slot 3504B of input queue 3504. In one embodiment, input queue 3504 includes three or more slots, e.g., with that same number of queue register enable ports as the number of slots. Enqueue circuitry 3500 includes a multiplexer 3512 coupled to input queue 3504 that causes data from a particular location (e.g., slot) of the input queue 3504 to be output into a processing element. In the depicted embodiment, the head value from queue status register 3502 is used as the control value to control whether the output data is sourced from the first slot 3504A or the second slot 3504B of input queue 3504. In one embodiment, input queue 3504 includes three or more slots, e.g., with that same number of input ports of multiplexer 3512 as the number of slots. A Data In value may be the input data (e.g., payload) for an input storage, for example, in contrast to a Valid value which may (e.g., only) indicate (e.g., by a single bit) that input data is being sent or ready to be sent but does not include the input data itself. Data Out value may be sent to multiplexer 3321 and/or multiplexer 3323 in FIG. 33.

Queue status register 3502 may store any combination of a head value (e.g., pointer) that represents the head (beginning) of the data stored in the queue, a tail value (e.g., pointer) that represents the tail (ending) of the data stored in the queue, and a count value that represents the number of (e.g., valid) values stored in the queue). For example, a count value may be an integer (e.g., two) where the queue is storing the number of values indicated by the integer (e.g., storing two values in the queue). The capacity of data (e.g., storage slots for data, e.g., for data elements) in a queue may be preselected (e.g., during programming), for example, depending on the total bit capacity of the queue and the number of bits in each element. Queue status register 3502 may be updated with the initial values, e.g., during configuration time. Queue status register 3502 may be updated as discussed in reference to FIG. 34.

Figures 36, 37, 38:
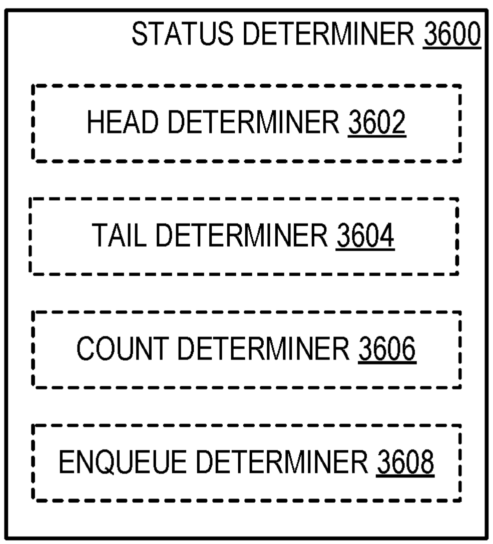
FIG. 36 illustrates a status determiner of input controller and/or input controller in FIG. 33 according to embodiments of the disclosure.
FIG. 37 illustrates a head determiner state machine according to embodiments of the disclosure.
FIG. 38 illustrates a tail determiner state machine according to embodiments of the disclosure.

FIG. 36 illustrates a status determiner 3600 of input controller 3301 and/or input controller 3303 in FIG. 33 according to embodiments of the disclosure. Status determiner 3600 may be used as status determiner 3404 in FIG. 34. Depicted status determiner 3600 includes a head determiner 3602, a tail determiner 3604, a count determiner 3606, and an enqueue determiner 3608. A status determiner may include one or more (e.g., any combination) of a head determiner 3602, a tail determiner 3604, a count determiner 3606, or an enqueue determiner 3608. In certain embodiments, head determiner 3602 provides a head value that that represents the current head (e.g., starting) position of input data stored in an input queue, tail determiner 3604 provides a tail value (e.g., pointer) that represents the current tail (e.g., ending) position of the input data stored in that input queue, count determiner 3606 provides a count value that represents the number of (e.g., valid) values stored in the input queue, and enqueue determiner provides an enqueue value that indicates whether to enqueue (e.g., store) input data (e.g., an input value) into the input queue or not.

FIG. 37 illustrates a head determiner state machine 3700 according to embodiments of the disclosure. In certain embodiments, head determiner 3602 in FIG. 36 operates according to state machine 3700. In one embodiment, head determiner 3602 in FIG. 36 includes logic circuitry that is programmed to perform according to state machine 3700. State machine 3700 includes inputs for an input queue of the input queue's: current head value (e.g., from queue status register 3402 in FIG. 34 or queue status register 3502 in FIG. 35), capacity (e.g., a fixed number), conditional dequeue value (e.g., output from conditional dequeue multiplexers 3329 and 3331 in FIG. 33), and not empty value (e.g., from Not Empty determiner 3408 in FIG. 34). State machine 3700 outputs an updated head value based on those inputs. The && symbol indicates a logical AND operation. The <= symbol indicates assignment of a new value, e.g., head <=0 assigns the value of zero as the updated head value. In FIG. 35, an (e.g., updated) head value is used as a control input to multiplexer 3512 to select a head value from the input queue 3504.

FIG. 38 illustrates a tail determiner state machine 3800 according to embodiments of the disclosure. In certain embodiments, tail determiner 3604 in FIG. 36 operates according to state machine 3800. In one embodiment, tail determiner 3604 in FIG. 36 includes logic circuitry that is programmed to perform according to state machine 3800. State machine 3800 includes inputs for an input queue of the input queue's: current tail value (e.g., from queue status register 3402 in FIG. 34 or queue status register 3502 in FIG. 35), capacity (e.g., a fixed number), ready value (e.g., output from Not Full determiner 3406 in FIG. 34), and valid value (for example, from a transmitting component (e.g., an upstream PE) as discussed in reference to FIG. 34 or FIG. 43). State machine 3800 outputs an updated tail value based on those inputs. The && symbol indicates a logical AND operation. The <= symbol indicates assignment of a new value, e.g., tail <=tail+1 assigns the value of the previous tail value plus one as the updated tail value. In FIG. 35, an (e.g., updated) tail value is used as a control input to multiplexer 3506 to help select a tail slot of the input queue 3504 to store new input data into.

FIG. 39 illustrates a count determiner state machine 3900 according to embodiments of the disclosure. In certain embodiments, count determiner 3606 in FIG. 36 operates according to state machine 3900. In one embodiment, count determiner 3606 in FIG. 36 includes logic circuitry that is programmed to perform according to state machine 3900. State machine 3900 includes inputs for an input queue of the input queue's: current count value (e.g., from queue status register 3402 in FIG. 34 or queue status register 3502 in FIG. 35), ready value (e.g., output from Not Full determiner 3406 in FIG. 34), valid value (for example, from a transmitting component (e.g., an upstream PE) as discussed in reference to FIG. 34 or FIG. 43), conditional dequeue value (e.g., output from conditional dequeue multiplexers 3329 and 3331 in FIG. 33), and not empty value (e.g., from Not Empty determiner 3408 in FIG. 34). State machine 3900 outputs an updated count value based on those inputs. The && symbol indicates a logical AND operation. The + symbol indicates an addition operation. The – symbol indicates a subtraction operation. The <= symbol indicates assignment of a new value, e.g., to the count field of queue status register 3402 in FIG. 34 or queue status register 3502 in FIG. 35. Note that the asterisk symbol indicates the conversion of a Boolean value of true to an integer 1 and a Boolean value of false to an integer 0.

FIG. 40 illustrates an enqueue determiner state machine 4000 according to embodiments of the disclosure. In certain embodiments, enqueue determiner 3608 in FIG. 36 operates according to state machine 4000. In one embodiment, enqueue determiner 3608 in FIG. 36 includes logic circuitry that is programmed to perform according to state machine 4000. State machine 4000 includes inputs for an input queue of the input queue's: ready value (e.g., output from Not Full determiner 3406 in FIG. 34), and valid value (for example, from a transmitting component (e.g., an upstream PE) as discussed in reference to FIG. 34 or FIG. 43). State machine 4000 outputs an updated enqueue value based on those inputs. The && symbol indicates a logical AND operation. The =symbol indicates assignment of a new value. In FIG. 35, an (e.g., updated) enqueue value is used as an input on path 3510 to multiplexer 3506 to cause the tail slot of the input queue 3504 to store new input data therein.

FIG. 41 illustrates a Not Full determiner state machine 4100 according to embodiments of the disclosure. In certain embodiments, Not Full determiner 3406 in FIG. 34 operates according to state machine 4100. In one embodiment, Not Full determiner 3406 in FIG. 34 includes logic circuitry that is programmed to perform according to state machine 4100. State machine 4100 includes inputs for an input queue of the input queue's count value (e.g., from queue status register 3402 in FIG. 34 or queue status register 3502 in FIG. 35) and capacity (e.g., a fixed number indicating the total capacity of the input queue). The <symbol indicates a less than operation, such that a ready value (e.g., a Boolean one) indicating the input queue is not full is asserted as long as the current count of the input queue is less than the input queue's capacity. In FIG. 34, an (e.g., updated) Ready (e.g., Not Full) value is sent to a transmitting component (e.g., an upstream PE) to indicate if (e.g., when) there is storage space available for additional input data in the input queue.

FIG. 42 illustrates a Not Empty determiner state machine 4200 according to embodiments of the disclosure. In certain embodiments, Not Empty determiner 3408 in FIG. 34 operates according to state machine 4200. In one embodiment, Not Empty determiner 3408 in FIG. 34 includes logic circuitry that is programmed to perform according to state machine 4200. State machine 4200 includes an input for an input queue of the input queue's count value (e.g., from queue status register 3402 in FIG. 34 or queue status register 3502 in FIG. 35). The <symbol indicates a less than operation, such that a Not Empty value (e.g., a Boolean one) indicating the input queue is not empty is asserted as long as the current count of the input queue is greater than zero (or whatever number indicates an empty input queue). In FIG. 34, an (e.g., updated) Not Empty value is to cause the PE (e.g., the PE that includes the input queue) to operate on the input value(s), for example, when the storage for the resultant of that operation is also not full.

FIG. 43 illustrates a valid determiner state machine 4300 according to embodiments of the disclosure. In certain embodiments, Not Empty determiner 4408 in FIG. 44 operates according to state machine 4300. In one embodiment, Not Empty determiner 4408 in FIG. 44 includes logic circuitry that is programmed to perform according to state machine 4300. State machine 4400 includes an input for an output queue of the output queue's count value (e.g., from queue status register 4402 in FIG. 44 or queue status register 4502 in FIG. 45). The <symbol indicates a less than operation, such that a Not Empty value (e.g., a Boolean one) indicating the output queue is not empty is asserted as long as the current count of the output queue is greater than zero (or whatever number indicates an empty output queue). In FIG. 34, an (e.g., updated) valid value is sent from a transmitting (e.g., upstream) PE to the receiving PE (e.g., the receiving PE that includes the input queue being controlled by input controller 3400 in FIG. 34), e.g., and that valid value is used as the valid value in state machines 3800, 3900, and/or 4000.

Output Controllers

Figure 44:
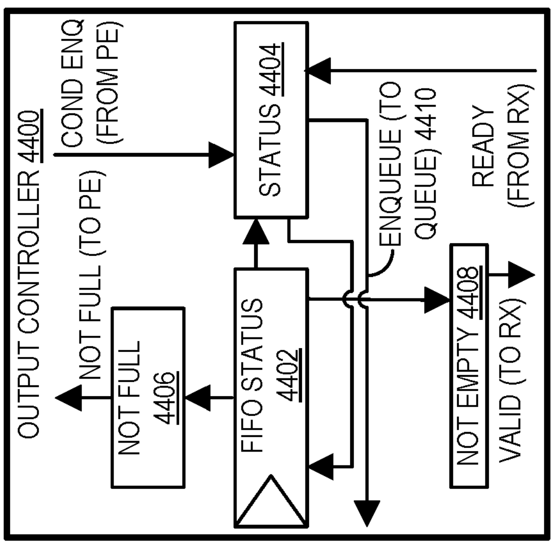
FIG. 44 illustrates output controller circuitry of output controller and/or output controller of processing element in FIG. 33 according to embodiments of the disclosure.

FIG. 44 illustrates output controller circuitry 4400 of output controller 3305 and/or output controller 3307 of processing element 3300 in FIG. 33 according to embodiments of the disclosure. In one embodiment, each output queue (e.g., buffer) includes its own instance of output controller circuitry 4400, for example, 2, 3, 4, 5, 6, 7, 8, or more (e.g., any integer) of instances of output controller circuitry 4400. Depicted output controller circuitry 4400 includes a queue status register 4402 to store a value representing the current status of that queue (e.g., the queue status register 4402 storing any combination of a head value (e.g., pointer) that represents the head (beginning) of the data stored in the queue, a tail value (e.g., pointer) that represents the tail (ending) of the data stored in the queue, and a count value that represents the number of (e.g., valid) values stored in the queue). For example, a count value may be an integer (e.g., two) where the queue is storing the number of values indicated by the integer (e.g., storing two values in the queue). The capacity of data (e.g., storage slots for data, e.g., for data elements) in a queue may be preselected (e.g., during programming), for example, depending on the total bit capacity of the queue and the number of bits in each element. Queue status register 4402 may be updated with the initial values, e.g., during configuration time. Count value may be set at zero during initialization.

Depicted output controller circuitry 4400 includes a Status determiner 4404, a Not Full determiner 4406, and a Not Empty determiner 4408. A determiner may be implemented in software or hardware. A hardware determiner may be a circuit implementation, for example, a logic circuit programmed to produce an output based on the inputs into the state machine(s) discussed below. Depicted (e.g., new) Status determiner 4404 includes a port coupled to queue status register 4402 to read and/or write to output queue status register 4402.

Depicted Status determiner 4404 includes a first input to receive a Ready value from a receiving component (e.g., a downstream PE) that indicates if (e.g., when) there is space (e.g., in an input queue thereof) for new data to be sent to the PE. In certain embodiments, the Ready value from the receiving component is sent by an input controller that includes input controller circuitry 3400 in FIG. 34. The Ready value may be referred to as a backpressure token, e.g., a backpressure token from a receiving PE sent to a transmitting PE. Depicted Status determiner 4404 includes a second input to receive a value or values from queue status register 4402 that represents that current status of the output queue that output controller circuitry 4400 is controlling. Optionally, Status determiner 4404 includes a third input to receive a value (from within the PE that includes output controller circuitry 3400) that indicates if (when) there is a conditional enqueue, e.g., from operation circuitry 3325 and/or operation circuitry 3327 in FIG. 33.

As discussed further below, the depicted Status determiner 4404 includes a first output to send a value on path 4410 that will cause output data (sent to the output queue that output controller circuitry 4400 is controlling) to be enqueued into the output queue or not enqueued into the output queue. Depicted Status determiner 4404 includes a second output to send an updated value to be stored in queue status register 4402, e.g., where the updated value represents the updated status (e.g., head value, tail value, count value, or any combination thereof) of the output queue that output controller circuitry 4400 is controlling.

Output controller circuitry 4400 includes a Not Full determiner 4406 that determines a Not Full (e.g., Ready) value and outputs the Not Full value, e.g., within the PE that includes output controller circuitry 4400, to indicate if (e.g., when) there is storage space available for output data in the output queue being controlled by output controller circuitry 4400. In one embodiment, for an output queue of a PE, a Not Full value that indicates there is no storage space available in that output queue is to cause a stall of execution of the PE (e.g., stall execution that is to cause a resultant to be stored into the storage space) until storage space is available (e.g., and when there is available data in the input queue(s) being sourced from in that PE).

Output controller circuitry 4400 includes a Not Empty determiner 4408 that determines an output storage (queue) status value and outputs (e.g., on path 3345 or path 3347 in FIG. 33) an output storage (queue) status value that indicates (e.g., by asserting a "not empty" indication value or an "empty" indication value) when the output queue being controlled contains (e.g., new) output data (e.g., dataflow token or tokens), for example, so that output data may be sent to the receiving PE. In certain embodiments, the output storage (queue) status value (e.g., being a value that indicates the output queue of the sending PE is not empty) is one of the two control values (with the other being that input storage of the receiving PE coupled to the output storage is not full) that is to stall transmittal of that data from the sending PE to the receiving PE until both of the control values indicate the components (e.g., PEs) may proceed to transmit that (e.g., payload) data (e.g., with a Ready value for the input queue(s) that is to receive data from the transmitting PE and a Valid value for the output queue(s) in the receiving PE that is to store the data). An example of determining the Ready value for an input queue is discussed above in reference to FIG. 34. In certain embodiments, output controller circuitry includes any one or more of the inputs and any one or more of the outputs discussed herein.

For example, assume that the operation that is to be performed is to send (e.g., sink) data into both output storage 3334 and output storage 3336 in FIG. 33. Two instances of output controller circuitry 4400 may be included to cause a respective output value(s) to be enqueued into output storage 3334 and output storage 3336 in FIG. 33. In this example, each output controller circuitry instance may send a Not Full value within the PE containing output storage 3334 and output storage 3336 (e.g., to operation circuitry) to cause the PE to operate on its input values (e.g., when the input storage to source the operation input(s) is also not empty).

Figure 45:
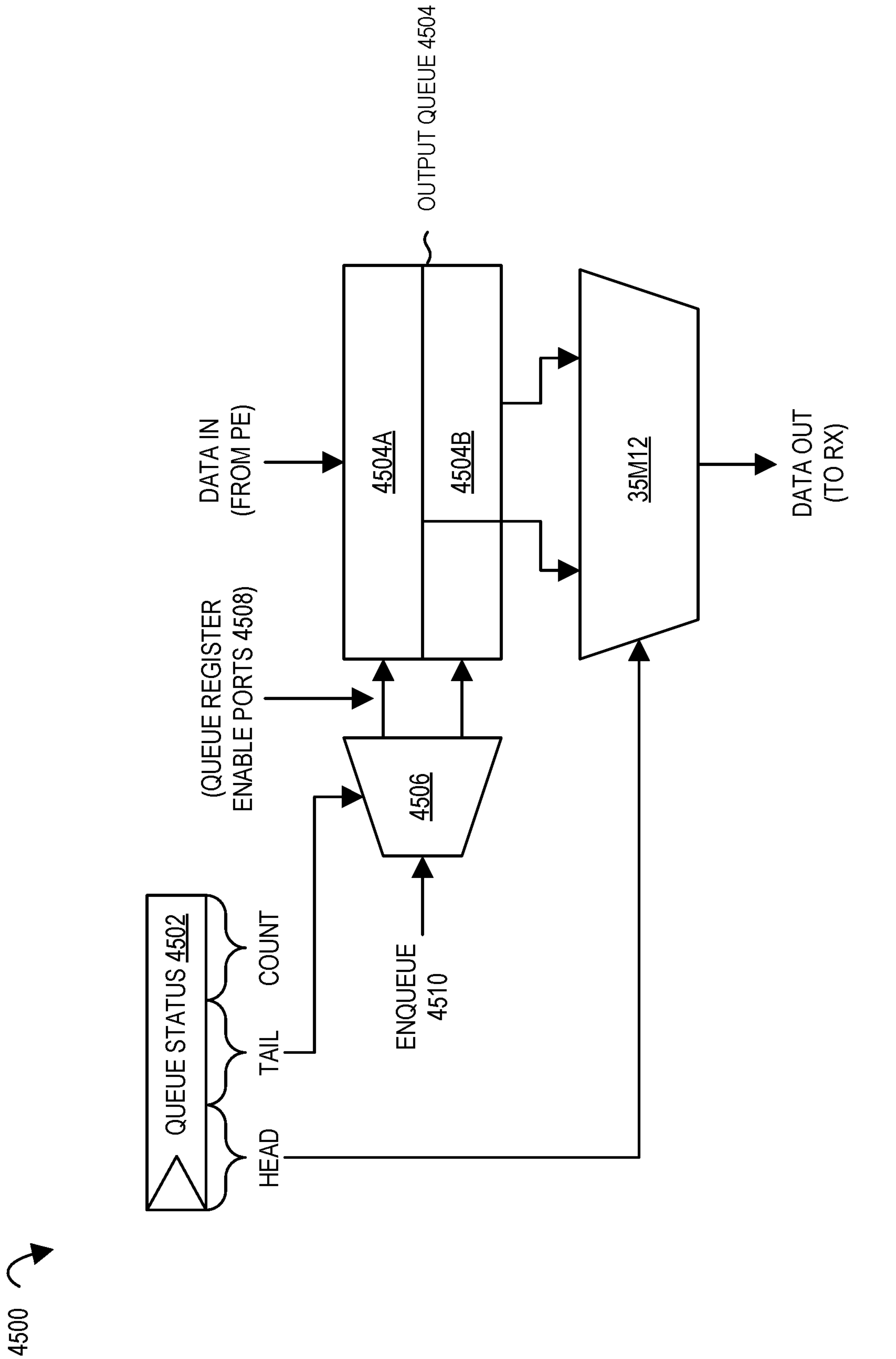
FIG. 45 illustrates enqueue circuitry of output controller and/or output controller in FIG. 34 according to embodiments of the disclosure.

FIG. 45 illustrates enqueue circuitry 4500 of output controller 3305 and/or output controller 3307 in FIG. 34 according to embodiments of the disclosure. Depicted enqueue circuitry 4500 includes a queue status register 4502 to store a value representing the current status of the output queue 4504. Output queue 4504 may be any output queue, e.g., output storage 3334 or output storage 3336 in FIG. 33. Enqueue circuitry 4500 includes a multiplexer 4506 coupled to queue register enable ports 4508. Enqueue input 4510 is to receive a value indicating to enqueue (e.g., store) an output value into output queue 4504 or not. In one embodiment, enqueue input 4510 is coupled to path 4410 of an output controller that causes output data (e.g., transmitted to the output queue 4504 that output controller circuitry 4500 is controlling) to be enqueued into. In the depicted embodiment, the tail value from queue status register 4502 is used as the control value to control whether the output data is stored in the first slot 4504A or the second slot 4504B of output queue 4504. In one embodiment, output queue 4504 includes three or more slots, e.g., with that same number of queue register enable ports as the number of slots. Enqueue circuitry 4500 includes a multiplexer 4512 coupled to output queue 4504 that causes data from a particular location (e.g., slot) of the output queue 4504 to be output to a network (e.g., to a downstream processing element). In the depicted embodiment, the head value from queue status register 4502 is used as the control value to control whether the output data is sourced from the first slot 4504A or the second slot 4504B of output queue 4504. In one embodiment, output queue 4504 includes three or more slots, e.g., with that same number of output ports of multiplexer 4512 as the number of slots. A Data In value may be the output data (e.g., payload) for an output storage, for example, in contrast to a Valid value which may (e.g., only) indicate (e.g., by a single bit) that output data is being sent or ready to be sent but does not include the output data itself. Data Out value may be sent to multiplexer 3321 and/or multiplexer 3323 in FIG. 33.

Queue status register 4502 may store any combination of a head value (e.g., pointer) that represents the head (beginning) of the data stored in the queue, a tail value (e.g., pointer) that represents the tail (ending) of the data stored in the queue, and a count value that represents the number of (e.g., valid) values stored in the queue). For example, a count value may be an integer (e.g., two) where the queue is storing the number of values indicated by the integer (e.g., storing two values in the queue). The capacity of data (e.g., storage slots for data, e.g., for data elements) in a queue may be preselected (e.g., during programming), for example, depending on the total bit capacity of the queue and the number of bits in each element. Queue status register 4502 may be updated with the initial values, e.g., during configuration time. Queue status register 4502 may be updated as discussed in reference to FIG. 44.

Figures 46, 47, 48:
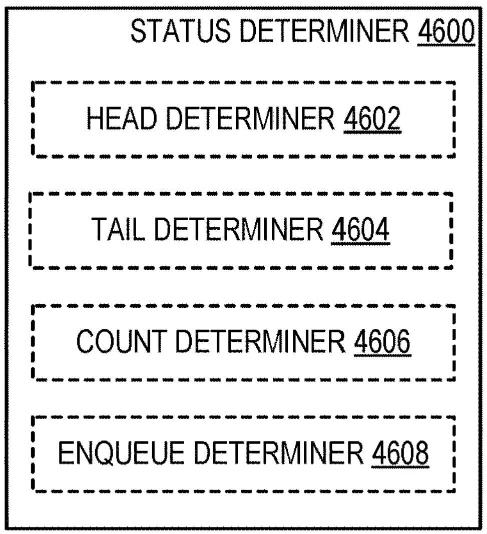
FIG. 46 illustrates a status determiner of output controller and/or output controller in FIG. 33 according to embodiments of the disclosure.
FIG. 47 illustrates a head determiner state machine according to embodiments of the disclosure.
FIG. 48 illustrates a tail determiner state machine according to embodiments of the disclosure.

FIG. 46 illustrates a status determiner 4600 of output controller 3305 and/or output controller 3307 in FIG. 33 according to embodiments of the disclosure. Status determiner 4600 may be used as status determiner 4404 in FIG. 44. Depicted status determiner 4600 includes a head determiner 4602, a tail determiner 4604, a count determiner 4606, and an enqueue determiner 4608. A status determiner may include one or more (e.g., any combination) of a head determiner 4602, a tail determiner 4604, a count determiner 4606, or an enqueue determiner 4608. In certain embodiments, head determiner 4602 provides a head value that that represents the current head (e.g., starting) position of output data stored in an output queue, tail determiner 4604 provides a tail value (e.g., pointer) that represents the current tail (e.g., ending) position of the output data stored in that output queue, count determiner 4606 provides a count value that represents the number of (e.g., valid) values stored in the output queue, and enqueue determiner provides an enqueue value that indicates whether to enqueue (e.g., store) output data (e.g., an output value) into the output queue or not.

FIG. 47 illustrates a head determiner state machine 4700 according to embodiments of the disclosure. In certain embodiments, head determiner 4602 in FIG. 46 operates according to state machine 4700. In one embodiment, head determiner 4602 in FIG. 46 includes logic circuitry that is programmed to perform according to state machine 4700. State machine 4700 includes inputs for an output queue of: a current head value (e.g., from queue status register 4402 in FIG. 44 or queue status register 4502 in FIG. 45), capacity (e.g., a fixed number), ready value (e.g., output from a Not Full determiner 3406 in FIG. 34 from a receiving component (e.g., a downstream PE) for its input queue), and valid value (for example, from a Not Empty determiner of the PE as discussed in reference to FIG. 44 or FIG. 52). State machine 4700 outputs an updated head value based on those inputs. The && symbol indicates a logical AND operation. The <= symbol indicates assignment of a new value, e.g., head <=0 assigns the value of zero as the updated head value. In FIG. 45, an (e.g., updated) head value is used as a control input to multiplexer 4512 to select a head value from the output queue 4504.

FIG. 48 illustrates a tail determiner state machine 4800 according to embodiments of the disclosure. In certain embodiments, tail determiner 4604 in FIG. 46 operates according to state machine 4800. In one embodiment, tail determiner 4604 in FIG. 46 includes logic circuitry that is programmed to perform according to state machine 4800. State machine 4800 includes inputs for an output queue of: a current tail value (e.g., from queue status register 4402 in FIG. 44 or queue status register 4502 in FIG. 45), capacity (e.g., a fixed number), a Not Full value (e.g., from a Not Full determiner of the PE as discussed in reference to FIG. 44 or FIG. 51), and a Conditional Enqueue value (e.g., output from conditional enqueue multiplexers 3333 and 3335 in FIG. 33). State machine 4800 outputs an updated tail value based on those inputs. The && symbol indicates a logical AND operation. The <= symbol indicates assignment of a new value, e.g., tail <=tail+1 assigns the value of the previous tail value plus one as the updated tail value. In FIG. 45, an (e.g., updated) tail value is used as a control input to multiplexer 4506 to help select a tail slot of the output queue 4504 to store new output data into.

FIG. 49 illustrates a count determiner state machine 4900 according to embodiments of the disclosure. In certain embodiments, count determiner 4606 in FIG. 46 operates according to state machine 4900. In one embodiment, count determiner 4606 in FIG. 46 includes logic circuitry that is programmed to perform according to state machine 4900. State machine 4900 includes inputs for an output queue of: current count value (e.g., from queue status register 4402 in FIG. 44 or queue status register 4502 in FIG. 45), ready value (e.g., output from a Not Full determiner 3406 in FIG. 34 from a receiving component (e.g., a downstream PE) for its input queue), valid value (for example, from a Not Empty determiner of the PE as discussed in reference to FIG. 44 or FIG. 52), Conditional Enqueue value (e.g., output from conditional enqueue multiplexers 3333 and 3335 in FIG. 33), and Not Full value (e.g., from a Not Full determiner of the PE as discussed in reference to FIG. 44 or FIG. 51). State machine 4900 outputs an updated count value based on those inputs. The && symbol indicates a logical AND operation. The + symbol indicates an addition operation. The – symbol indicates a subtraction operation. The <= symbol indicates assignment of a new value, e.g., to the count field of queue status register 4402 in FIG. 44 or queue status register 4502 in FIG. 45. Note that the asterisk symbol indicates the conversion of a Boolean value of true to an integer 1 and a Boolean value of false to an integer 0.

FIG. 50 illustrates an enqueue determiner state machine 5000 according to embodiments of the disclosure. In certain embodiments, enqueue determiner 4608 in FIG. 46 operates according to state machine 5000. In one embodiment, enqueue determiner 4608 in FIG. 46 includes logic circuitry that is programmed to perform according to state machine 5000. State machine 5000 includes inputs for an output queue of: ready value (e.g., output from a Not Full determiner 3406 in FIG. 34 from a receiving component (e.g., a downstream PE) for its input queue), and valid value (for example, from a Not Empty determiner of the PE as discussed in reference to FIG. 44 or FIG. 52). State machine 5000 outputs an updated enqueue value based on those inputs. The && symbol indicates a logical AND operation. The =symbol indicates assignment of a new value. In FIG. 45, an (e.g., updated) enqueue value is used as an input on path 4510 to multiplexer 4506 to cause the tail slot of the output queue 4504 to store new output data therein.

FIG. 51 illustrates a Not Full determiner state machine 5100 according to embodiments of the disclosure. In certain embodiments, Not Full determiner 4406 in FIG. 34 operates according to state machine 5100. In one embodiment, Not Full determiner 4406 in FIG. 44 includes logic circuitry that is programmed to perform according to state machine 5100. State machine 5100 includes inputs for an output queue of the output queue's count value (e.g., from queue status register 4402 in FIG. 44 or queue status register 4502 in FIG. 45) and capacity (e.g., a fixed number indicating the total capacity of the output queue). The <symbol indicates a less than operation, such that a ready value (e.g., a Boolean one) indicating the output queue is not full is asserted as long as the current count of the output queue is less than the output queue's capacity. In FIG. 44, a (e.g., updated) Not Full value is produced and used within the PE to indicate if (e.g., when) there is storage space available for additional output data in the output queue.

FIG. 52 illustrates a Not Empty determiner state machine 5200 according to embodiments of the disclosure. In certain embodiments, Not Empty determiner 3408 in FIG. 34 operates according to state machine 5200. In one embodiment, Not Empty determiner 3408 in FIG. 34 includes logic circuitry that is programmed to perform according to state machine 5200. State machine 5200 includes an input for an input queue of the input queue's count value (e.g., from queue status register 3402 in FIG. 34 or queue status register 3502 in FIG. 35). The <symbol indicates a less than operation, such that a Not Empty value (e.g., a Boolean one) indicating the input queue is not empty is asserted as long as the current count of the input queue is greater than zero (or whatever number indicates an empty input queue). In FIG. 34, an (e.g., updated) Not Empty value is to cause the PE (e.g., the PE that includes the input queue) to operate on the input value(s), for example, when the storage for the resultant of that operation is also not full.

FIG. 53 illustrates a valid determiner state machine 5300 according to embodiments of the disclosure. In certain embodiments, Not Empty determiner 4408 in FIG. 44 operates according to state machine 5300. In one embodiment, Not Empty determiner 4408 in FIG. 44 includes logic circuitry that is programmed to perform according to state machine 5300. State machine 4400 includes an input for an output queue of the output queue's count value (e.g., from queue status register 4402 in FIG. 44 or queue status register 4502 in FIG. 45). The <symbol indicates a less than operation, such that a Not Empty value (e.g., a Boolean one) indicating the output queue is not empty is asserted as long as the current count of the output queue is greater than zero (or whatever number indicates an empty output queue). In FIG. 44, an (e.g., updated) valid value is sent from a transmitting (e.g., upstream) PE to the receiving PE (e.g., sent by the transmitting PE that includes the output queue being controlled by output controller 3400 in FIG. 34), e.g., and that valid value is used as the valid value in state machines 4700, 4900, and/or 5000.

In certain embodiments, a state machine includes a plurality of single bit width input values (e.g., 0s or 1s), and produces a single output value that has a single bit width (e.g., a 0 or a 1).

In certain embodiments, a first LIC channel may be formed between an output of a first PE to an input of a second PE, and a second LIC channel may be formed between an output of the second PE and an input of a third PE. As an example, a ready value may be sent on a first path of a LIC channel by a receiving PE to a transmitting PE and a valid value may be sent on a second path of the LIC channel by the transmitting PE to the receiving PE. As an example, see FIGS. 34 and 44. Additionally, a LIC channel in certain embodiments may include a third path for transmittal of the (e.g., payload) data, e.g., transmitted after the ready value and valid value are asserted.

3.3 Example Communications (e.g., Circuit Switched Network)

In certain embodiments, multiple PEs are coupled together by a network to send data, e.g., data that includes ready values, valid values, and the payload data itself. As discussed herein, a dataflow graph is mapped directly to a CSA that includes multiple PEs coupled together by a circuit switched network in certain embodiments. In certain embodiments, the lowest level of the CSA communications hierarchy is the local network. In one embodiment, the local network is statically circuit switched, using configuration registers to swing multiplexor in the local network datapath, forming fixed electrical paths between communicating PEs. In one embodiment, the configuration of the local network is set once per dataflow graph at the same time as the PEs configuration. In one embodiment, a static, circuit switched network optimizes for energy, for example, where a large majority (e.g., greater than about 95%) of CSA communications traffic will cross the local network. As certain dataflow graphs include terms which are used in multiple expressions, certain embodiments herein include hardware support for multicast within the local network.

In certain embodiments, several local networks are ganged together to form routing channels which are interspersed between rows and columns of PEs. In one embodiment, several one-bit local networks are also included to carry control tokens. In contrast to a FPGA, embodiments of the CSA local network are routed at the granularity of the data path and the CSA architecture includes a novel treatment of control. In certain embodiments, the CSA local network is explicitly flow controlled (e.g., back pressured), that is, for each forward data path (e.g., and multiplexor) set, the CSA provides a backward-flowing flow control path that is physically paired with the forward data path. The combination of the two micro architectural paths provides a low-latency, low-energy, low-area, point-to-point implementation of the latency-insensitive channel abstraction in certain embodiments. In addition to point-to-point communications, certain embodiments of a CSA local network also support multicast, in which a single source sends a value to a plurality of downstream PEs. This functionality may be an extension of the point-to-point control logic combined with a multicast configuration state as discussed herein.

In certain embodiments, the CSA flow control lines are not visible to the user program, but they are manipulated by the architecture in service of the user program. For example, exception handling mechanisms may be achieved by pulling flow control lines to a "not present" state upon the detection of an exceptional condition. In one embodiment, this action not only gracefully stalls those parts of the pipeline which are involved in the offending computation, but also preserves the machine state leading up the exception for diagnostic analysis.

To enable a broad set of compiler-generated codes, certain embodiments of the CSA architecture support many control expressions. As a result, CSA dataflow graphs may often include a substantial number of Boolean values (e.g., a single bit zero for false and a single bit one for true), for example, the results of conditional or loop expressions. To decrease the overhead of these data flows, certain embodiments of the CSA provide a number of one-bit networks, e.g., in addition to the wider (number of bits) networks used to carry (e.g., arithmetic) multiple bit data types.

In certain embodiments, a CSA includes a second network layer (e.g., referred to as the mezzanine network) that is a shared, packet-switched network. In certain embodiments, the mezzanine provides more general, long range communications at the cost of latency, bandwidth, and energy. In well-routed programs, in certain embodiments, most communications will occur on the local network and the mezzanine network provisioning will be considerably reduced in comparison, e.g., where each PE connects to multiple local networks, but is provisioned with only one mezzanine endpoint per logical grouping (e.g., "neighborhood") of PEs. Since the mezzanine is effectively a shared network, in certain embodiments each mezzanine network carries multiple logically independent channels, e.g., it is provisioned with multiple virtual channels. In certain embodiments, the main function of the mezzanine network is to provide long-range communications between PEs and between PEs and memory. The mezzanine may operate as a runtime support network, e.g., by which various services can access the complete fabric in a user-program-transparent manner. In this capacity, the mezzanine endpoint may function as a controller for its local neighborhood, for example, during CSA configuration.

Figure 54:
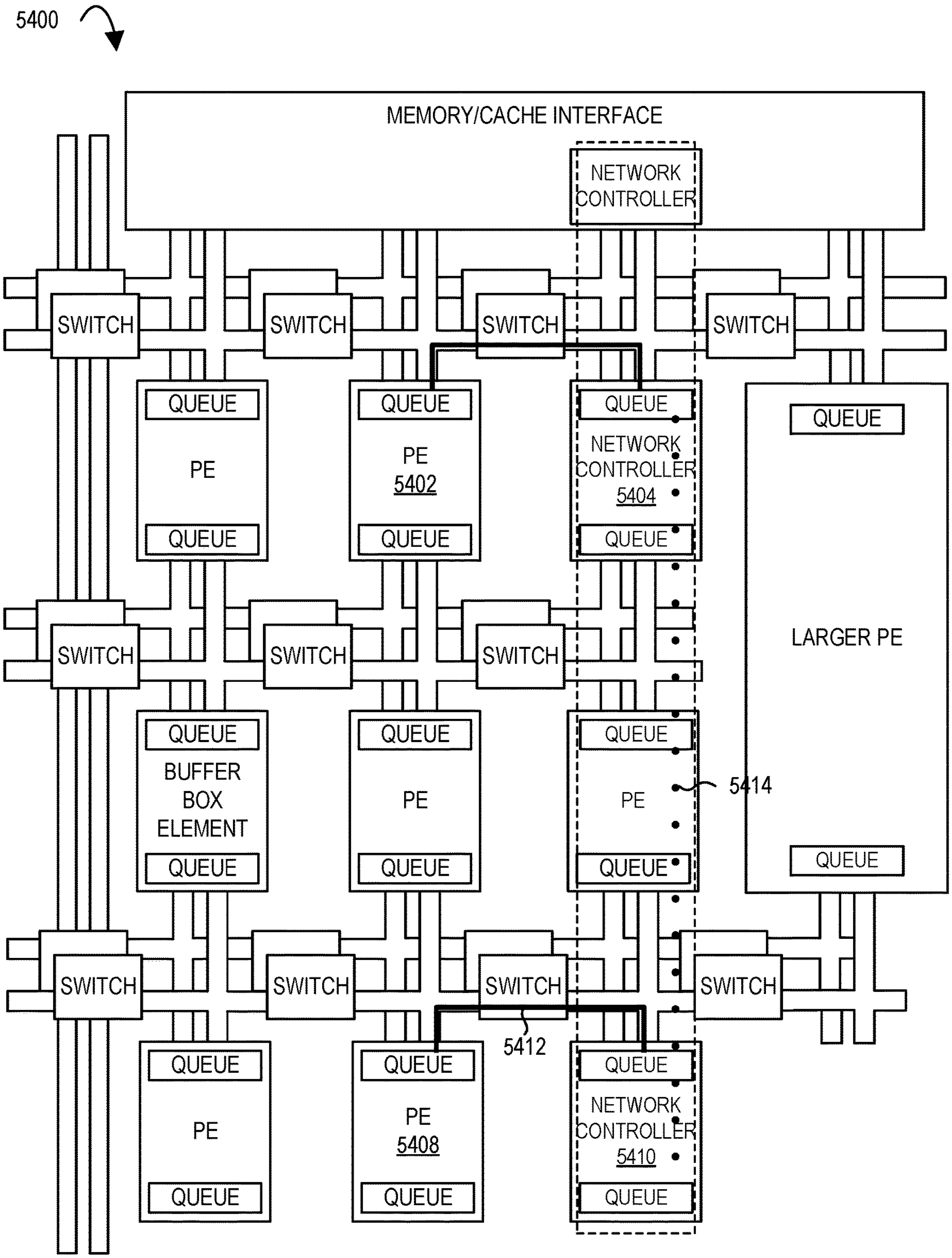
FIG. 54 illustrates two local network channels which carry traffic to and from a single channel in the mezzanine network according to embodiments of the disclosure.

To form channels spanning a CSA tile, as in the example shown in FIG. 54, multiple (e.g., three in FIG. 54) individual hardware channels are utilized in certain embodiments. FIG. 54 illustrates two local network channels 5406 and 5412 which carry traffic to and from a single channel 5414 in the mezzanine network according to embodiments of the disclosure. In one embodiment, first PE 5402 transmits data to and/or from first network controller 5404 on local network channel 5406, second PE 5408 transmits data to and/or from second network controller 5410 on local network channel 5412, and first network controller 5404 transmits data to and/or from second network controller 5410 on mezzanine network channel 5414.

In certain embodiments, the routing of data between components (e.g., PEs) is enabled by setting switches (e.g., multiplexers and/or demultiplexers) and/or logic gate circuits of a circuit switched network (e.g., a local network) to achieve a desired configuration, e.g., a configuration according to a dataflow graph.

Figure 55:
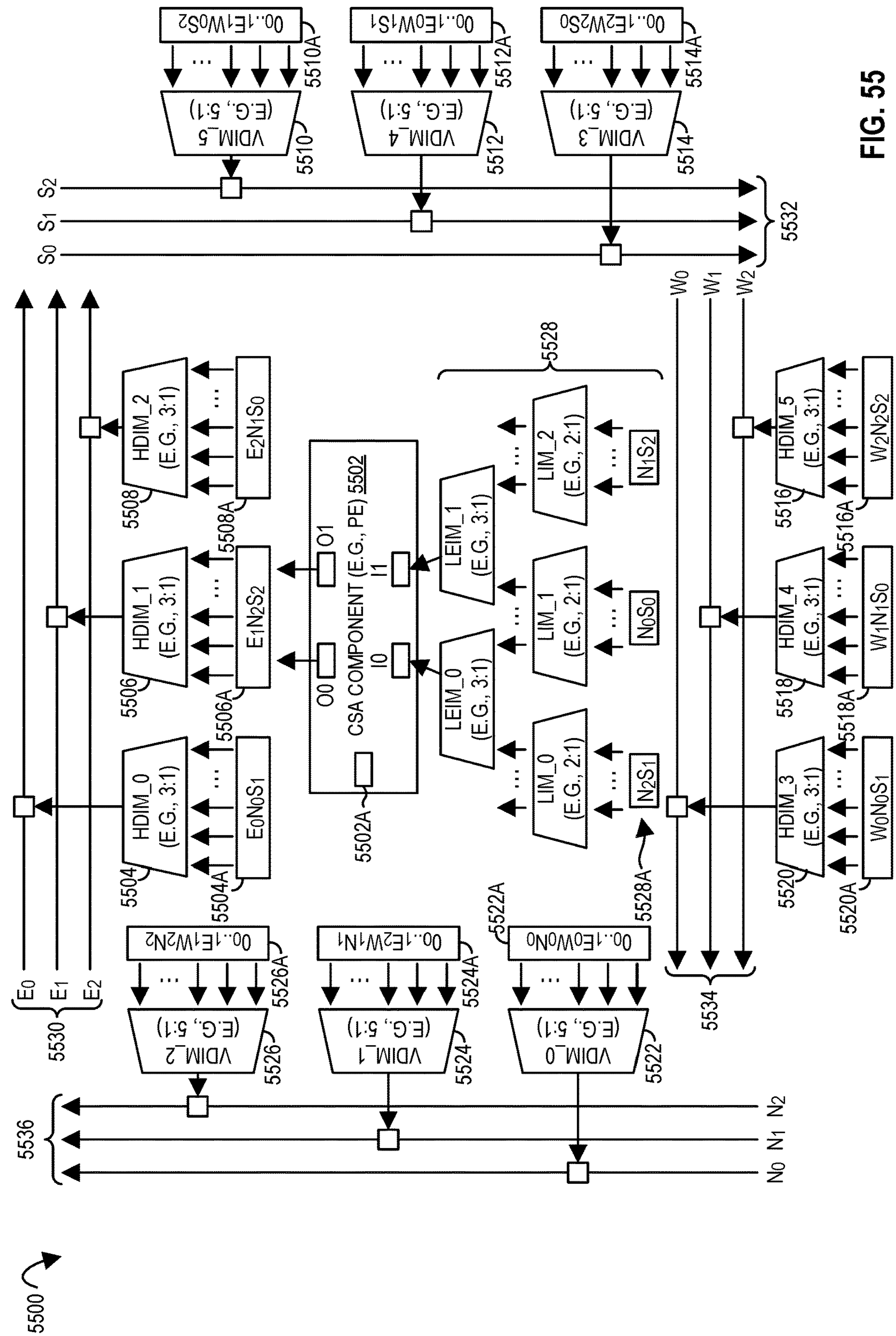
FIG. 55 illustrates a circuit switched network according to embodiments of the disclosure.

FIG. 55 illustrates a circuit switched network 5500 according to embodiments of the disclosure. Circuit switched network 5500 is coupled to a CSA component (e.g., a processing element (PE)) 5502, and may likewise couple to other CSA component(s) (e.g., PEs), for example, over one or more channels that are created from switches (e.g., multiplexers) 5504-5528. This may include horizontal (H) switches and/or vertical (V) switches. Depicted switches may be switches in FIG. 6. Switches may include one or more registers 5504A-5528A to store the control values (e.g., configuration bits) to control the selection of input(s) and/or output(s) of the switch to allow values to pass from an input(s) to an output(s). In one embodiment, the switches are selectively coupled to one or more of networks 5530 (e.g., sending data to the right (east (E))), 5532 (e.g., sending data downwardly (south (S))), 5534 (e.g., sending data to the left (west (W))), and/or 5536 (e.g., sending data upwardly (north (N))). Networks 5530, 5532, 5534, and/or 5536 may be coupled to another instance of the components (or a subset of the components) in FIG. 55, for example, to create flow controlled communications channels (e.g., paths) which support communications between components (e.g., PEs) of a configurable spatial accelerator (e.g., a CSA as discussed herein). In one embodiment, a network (e.g., networks 5530, 5532, 5534, and/or 5536 or a separate network) receive a control value (e.g., configuration bits) from a source (e.g., a core) and cause that control value (e.g., configuration bits) to be stored in registers 5504A-5528A to cause the corresponding switches 5504-5528 to form the desired channels (e.g., according to a dataflow graph). Processing element 5502 may also include control register(s) 5502A, for example, as operation configuration register 919 in FIG. 9. Switches and other components may thus be set in certain embodiments to create data path or data paths between processing elements and/or backpressure paths for those data paths, e.g., as discussed herein. In one embodiment, the values (e.g., configuration bits) in these (control) registers 5504A-5528A are depicted with variables names that refer to the mux selection for the inputs, for example, with the values having a number which refers to the port number, and a letter which refers to the direction or PE output the data is coming from, e.g., where E1 in 5506A refers to port number 1 coming from the east side of the network.

The network(s) may be statically configured, e.g., in addition to PEs being statically configured during configuration for a dataflow graph. During the configuration step, configuration bits may be set at each network component. These bits may control, for example, the multiplexer selections to control the flow of a dataflow token (e.g., on a data path network) and its corresponding backpressure token (e.g., on a flow control path network). A network may comprise a plurality of networks, e.g., a data path network and a flow control path network. A network or plurality of networks may utilize paths of different widths (e.g., a first width, and a narrower or wider second width). In one embodiment, a data path network has a wider (e.g., bit transport) width than the width of a flow control path network. In one embodiment, each of a first network and a second network includes their own data paths and flow control paths, e.g., data path A and flow control path A and wider data path B and flow control path B. For example, a data path and flow control path for a single output buffer of a producer PE that couples to a plurality of input buffers of consumer PEs. In one embodiment, to improve routing bandwidth, several networks are laid out in parallel between rows of PEs. Like certain PEs, the network may be statically configured. During this step, configuration bits may be set at each network component. These bits control, for example, the data path (e.g., multiplexer created data path) and/or flow control path (e.g., multiplexer created flow control path). The forward (e.g., data) path may utilize control bits to swing its switches and/or logic gates.

Figure 56:
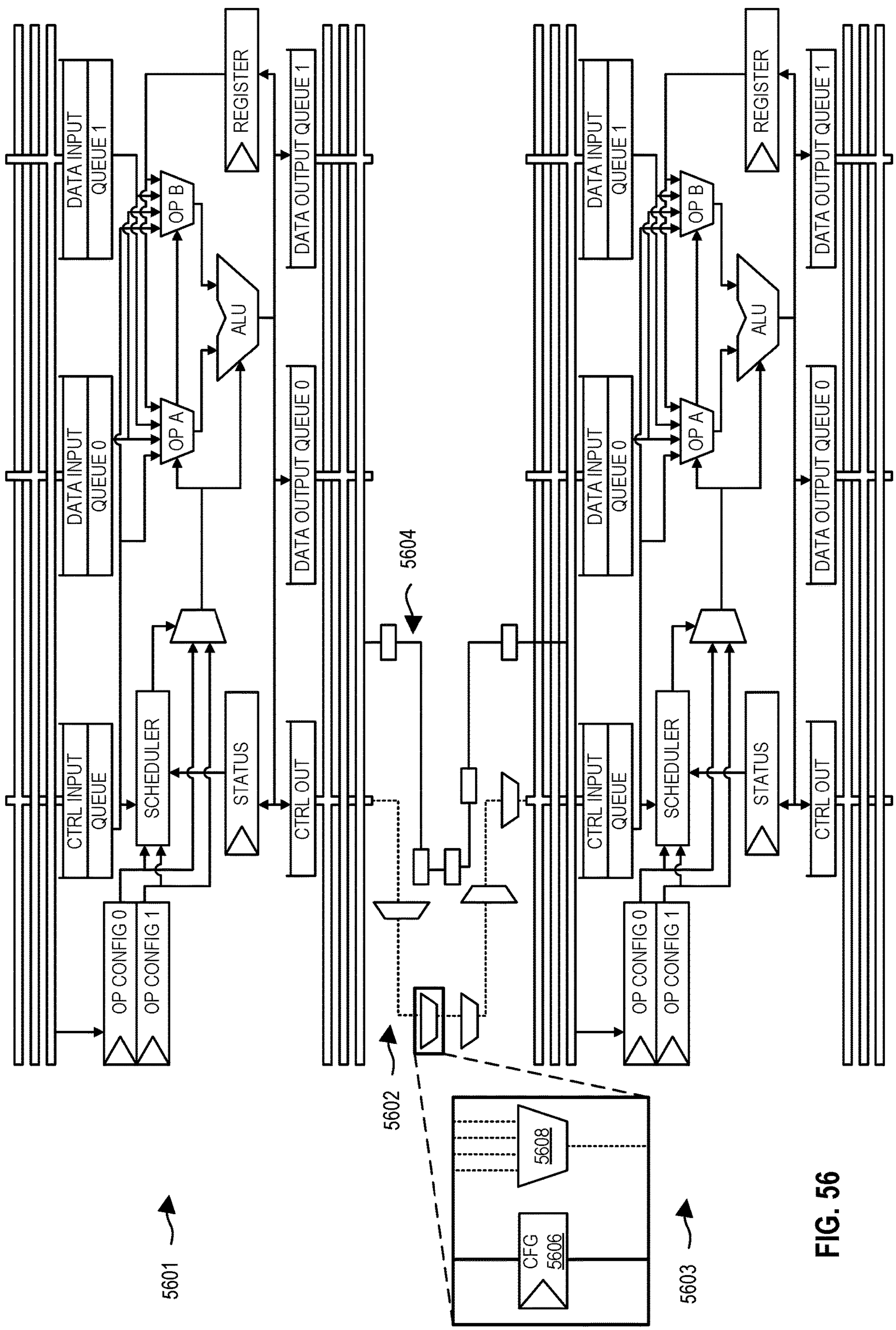
FIG. 56 illustrates a zoomed in view of a data path formed by setting a configuration value (e.g., bits) in a configuration storage (e.g., register) of a circuit switched network between a first processing element and a second processing element according to embodiments of the disclosure.

FIG. 56 illustrates a zoomed in view of a data path 5602 formed by setting a configuration value (e.g., bits) in a configuration storage (e.g., register) 5606 of a circuit switched network between a first processing element 5601 and a second processing element 5603 according to embodiments of the disclosure. Flow control (e.g., backpressure) path 5604 may be flow control (e.g., backpressure) path 5704 in FIG. 57. Depicted data path 5602 is formed by setting configuration value (e.g., bits) in configuration storage (e.g., register) 5606 to provide a control value to one or more switches (e.g., multiplexers). In certain embodiments, a data path includes inputs from various source PEs and/or switches. In certain embodiments, the configuration value is determined (e.g., by a compiler) and set at configuration time (e.g., before run time). In one embodiment, the configuration value selects the inputs (e.g., for a multiplexer) to source data from to the output. In one embodiment, a switch has multiple inputs and a single output that is selected by the configuration value, e.g., where a data path (e.g., for the data payload itself) and a valid path (e.g., for the valid value to indicate the data payload is valid to be transmitted). In certain embodiments, values from the non-selected path(s) are ignored.

In the zoomed in portion, multiplexer 5608 is provided with a configuration value from configuration storage (e.g., register) 5606 to cause the multiplexer 5608 to source data from one of more inputs (e.g., with those inputs being coupled to respective PEs or other CSA components). In one embodiment, an (e.g., each) input to multiplexer 5608 includes both (i) multiple bits of (e.g., payload) data as well as (ii) a (e.g., one bit) valid value, e.g., as discussed herein. In certain embodiments, the configuration value is stored into configuration storage locations (e.g., registers) to cause a transmitting PE or PEs to send data to receiving PE or PEs, e.g., according to a dataflow graph. Example configuration of a CSA is discussed further in Section 3.4 below.

Figure 57:
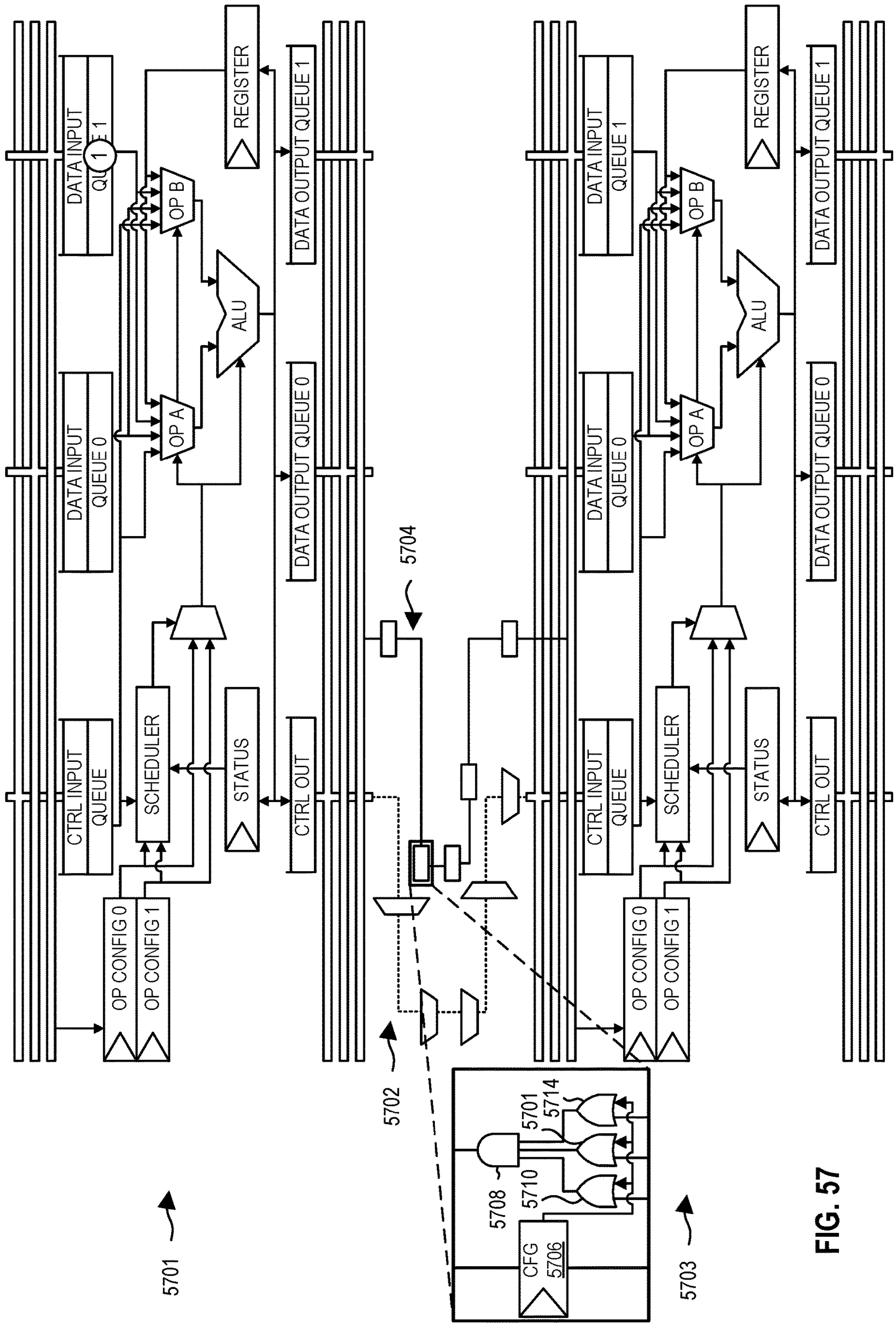
FIG. 57 illustrates a zoomed in view of a flow control (e.g., backpressure) path formed by setting a configuration value (e.g., bits) in a configuration storage (e.g., register) of a circuit switched network between a first processing element and a second processing element according to embodiments of the disclosure.

FIG. 57 illustrates a zoomed in view of a flow control (e.g., backpressure) path 5704 formed by setting a configuration value (e.g., bits) in a configuration storage (e.g., register) of a circuit switched network between a first processing element 5701 and a second processing element 5703 according to embodiments of the disclosure. Data path 5702 may be data path 5602 in FIG. 56. Depicted flow control (e.g., backpressure) path 5704 is formed by setting configuration value (e.g., bits) in configuration storage (e.g., register) 5706 to provide a control value to one or more switches (e.g., multiplexers) and/or logic gate circuits. In certain embodiments, a flow control (e.g., backpressure) path includes (e.g., backpressure) inputs from various source PEs and/or other flow control functions. In certain embodiments, the configuration value is determined (e.g., by a compiler) and set at configuration time (e.g., before run time). In one embodiment, the configuration value selects the inputs and/or outputs of logic gate circuits to combine into a (e.g., single) flow control output. In one embodiment, a flow control (e.g., backpressure) path has multiple inputs, logic gates (e.g., AND gate, OR gate, NAND gate, NOR gate, etc.) and a single output that is selected by the configuration value, e.g., wherein a certain (e.g., logical zero or one) flow control (e.g., backpressure) value indicates a receiving PE (e.g., at least one of a plurality of receiving PEs) does not have storage and thus is not ready to receive (e.g., payload) data that is to be transmitted. In certain embodiments, values from the non-selected path(s) are ignored.

In the zoomed in portion, OR logic gate 5710, OR logic gate 5712, and OR logic gate 5714 each include a first input coupled to configuration storage (e.g., register) 5706 to receive a configuration value (for example, where setting a logical one on that input effectively ignores the particular backpressure signal and a logical zero on that input cause the monitoring of that particular backpressure signal), and a second input coupled to a respective, receiving PE to provide a backpressure value that indicates when that receiving PE is not ready to receive a new data value (e.g., when a queue of that receiving PE is full). In the depicted embodiment, the output from each OR logic gate 5710, OR logic gate 5712, and OR logic gate 5714 is provided as a respective input to AND logic gate 5708 such that AND logic gate 5708 is to output a logical zero unless all of OR logic gate 5710, OR logic gate 5712, and OR logic gate 5714 are outputting a logical one, and AND logic gate 5708 will then output a logical one (e.g., to indicate that each of the monitored PEs are ready to receive a new data value). In one embodiment, an (e.g., each) input to OR logic gate 5710, OR logic gate 5712, and OR logic gate 5714 is a single bit. In certain embodiments, the configuration value is stored into configuration storage locations (e.g., registers) to cause a transmitting PE or PEs to send flow control (e.g., backpressure) data to transmitting PE or PEs, e.g., according to a dataflow graph. In one multicast embodiment, a (e.g., single) flow control (e.g., backpressure) value indicates that at least one of a plurality of receiving PEs does not have storage and thus is not ready to receive (e.g., payload) data that is to be transmitted, e.g., by ANDing the outputs from OR logic gate 5710, OR logic gate 5712, and OR logic gate 5714. Example configuration of a CSA is discussed further in Section 3.4 below.

3.4 Configuration of a CSA (e.g., PEs and Circuit Switched Network)

In certain embodiments, a CSA (e.g., PEs and a circuit switched network) is configured by setting one or more configuration values in one or more configuration storage locations (e.g., registers). For example, a (e.g., local) circuit switched network may be configured to provide path(s) to send and/or receive data between PEs (or between a PE and another CSA component(s)). In one embodiment, a compiler is to generate the configuration values (e.g., for PEs, for circuit switched networks, and/or for other CSA components) that overlay a dataflow graph to the dataflow architecture of a CSA. In certain embodiments, a (e.g., each) PE is a dataflow operator that is a direct representation of a node (e.g., or two nodes) in a dataflow graph. In certain embodiments, the circuit switched networks are configured with configuration values generated by a compiler to minimize the distance of paths between PEs that are transmitting data to receiving PEs. In certain embodiments, the circuit switched networks are configured with configuration values generated by a compiler to minimize the area utilized by a dataflow graph, e.g., by PEs that are transmitting data to receiving PEs according to that dataflow graph. In certain embodiments, the circuit switched networks are configured with configuration values generated by a compiler to minimize the data transfer latency between PEs that are transmitting data to receiving PEs. A circuit switched network may be a local network. A local network may further communicate via a packet switched network.

Section 7.1 discloses examples of how to configure a CSA (e.g., the PEs and the circuit switched network(s)). Embodiments of a CSA (e.g., fabric) may differ from traditional cores in that embodiments of a CSA use a configuration step in which the PEs and the (e.g., circuit switched) network are loaded with program configuration in advance of program execution.

In one embodiment, the CSA configuration protocol is for the PEs and the local, circuit switched network. In certain embodiments, a request for CSA configuration (e.g., the configuration code) arrives from a host (e.g., core of a processor that is coupled to the CSA). In one embodiment, the configuration (e.g., configuration values) are sent into the PEs and circuit switched network by configuration controllers, e.g., as discussed below. In certain embodiments, these controllers stream in graph configuration information and execute the local configuration protocol across their domains. Local configuration controllers may operate in parallel, e.g., decreasing the latency of the configuration operation.

The core of one embodiment of CSA configuration is the distributed protocol driven by the local configuration controller. In one embodiment, initially, configuration state (e.g., configuration values) resides in memory, and the local configuration controller receives a virtual pointer which points to a memory region containing the CSA dataflow graph. The PEs and network resources in the local neighborhood of the local configuration controller are put into an un-configured state in one embodiment. In certain embodiments of this state, all control signals associated with the local network in the local neighborhood are deactivated, effectively halting all communications within the local neighborhood and between the local neighborhood and other adjacent PEs. The local configuration controller then streams new configuration in to the PEs, initializing one at a time in a distributed fashion in one embodiment. As discussed further below, FIG. 31 shows a partially configured local neighborhood, in which some PEs have been configured and other PEs await configuration. As the PEs are configured they may begin computation. In certain embodiments, communications require that both endpoint PEs and any intervening local network resources have been configured, e.g., and any un-configured fabric elements will de-assert their flow control signals, inhibiting communications. In certain embodiments, CSA programs begin execution before the fabric is completely configured, e.g., where the portion of the graph that remains un-configured is still driving its communications signals low to prevent an incorrect communication. As the un-configured frontier contracts, more of the graph begins executing in this embodiment.

In certain embodiments, the CSA program graph loaded at configuration time consists of both configuration values and data, either constants to be loaded in to the fabric or the prior execution state of a fabric, for example, as a result of an extraction operation described herein. In certain embodiments, CSA program state resides within the virtual memory space of the process associated with the CSA and may be resident within the CSA memory hierarchy or within die-level memory hierarchy. The performance of the configuration mechanism may be strongly influenced by the locality of the graph configuration.

3.5 Example Operation Format

The term "CSA program" may generally refer to a collection of operations and communication channels definitions that are configured (e.g., loaded) onto the components (e.g., PEs) and network (e.g., circuit switched network) of a CSA hardware instance. In one embodiment, once configuration is complete, the CSA program (e.g., representing a dataflow graph) is executed a plurality of times without reconfiguration, e.g., provided the CSA resources used for the program is loaded are not needed for another program between. In certain embodiments, the routing of communications (e.g., via setting up LICs) is a property of configuration and not changed during the execution of a program.

As discussed herein, in certain embodiments, a dataflow graph is overlaid on a CSA so that the CSA performs operations of the dataflow graph. The operations may include a format as discussed below. Data type(s) used in operations may be as discussed in reference to Table 2 herein.

In one embodiment, code may be written (e.g., by a programmer) that includes one or more of the operations discussed herein, e.g., according to the following format(s). In another embodiment, code is written in a first software language (e.g., C or C++ code), and then converted by an assembler into assembly code. In one embodiment, the assembly code includes operations written in the operation format(s) discussed herein. In certain embodiments, the operations correspond to configuration values (e.g., for PEs, for circuit switched networks, and/or for other CSA components) that overlay the dataflow graph on the dataflow architecture of a CSA. In one embodiment, the assembly code for a (e.g., proper subset of a) dataflow graph is further modified by a place and route tool that assigns an (e.g., each) operation to a particular hardware instance (e.g., a PE) of the CSA hardware.

Operands

In certain embodiments, there are 3 basic types of entities that may be (e.g., input and/or output) operands to a CSA operation: (i) latency insensitive channels (LICs), (ii) registers, and (iii) literal values. In one embodiment, the size of literals is the size of the operand supported on PEs or other dataflow units, e.g. a 64 bit (64b) operand having a full 64b literal.

The format (e.g., signatures) of operations in the descriptions that follow use the following form: [{name}.] {operand type} {uld}.{data type} [={default value}]. The first part is an optional operand name (e.g., "res." for a resultant or "ctlseq." for a control sequence). Next is the operand type, where characters C (Channel), R (Register) or L (Literal) specify what operand types are valid. If there is a d suffix, the operand is an output that is defined, while a u suffix means it is an input that is used. Next is a data type, which reflects the usage in the operation.

For example, res.CRd.s32 means that the operand is called res, it can either a channel (C) or register (R), it is defined (d) by the operation (e.g., it is an output), and uses 32 bits of input, which it treats inside the operation as being signed. Note that this does not mean that input channels smaller than 32 bits are sign extended, although sign extension may be optionally included.

Operands may have default values, denoted by ={default value}, allowing various trailing operands to be omitted in assembly code. This is shown for a given operand description by an=with a default value. Value can be: (i) a numeric value, which is that value (e.g. op2.CRLu.i1=1 means a default value of 1), (ii) the letter I means % ign—ignored/reads as 0, (iii) the letter N means % na—never available, either as input or output (e.g., % na in a field means that field is not utilized for that operation), (iv) the letter R means rounding mode literal ROUND NEAREST, and (v) the letter T means memory level literal MEMLEVEL+T0 (e.g., closest cache).

In the opcode description semantics, semicolons imply sequencing. If an operand appears by itself, the operation waits for the value to be available. e.g. for memrefs: op2; write(op0,op1); op3=0 means that the operation waits for op2 to be available, performs its access, and then defines op3. The following modifiers can appear for operands: non-consuming use (specified via a "*" prefix in the assembly code). This applies to any storage with empty/full semantics (e.g., LICs, and/or registers), and specifies that the operand is to be reused in the future.

Operation Naming Notes

In one embodiment, integer operations that do not care about signed-ness (e.g. and, add, cmpeq) are named based on the number of bits processed in the operation, and the corresponding output size (e.g. and32, add32). For cases where signed vs. unsigned matter, sN or uN specifies the signed (s) or unsigned (u) integer type (e.g. divu32, cmplts8). Floating point (f) data types are fN (e.g. f32/f64) (e.g. addf32). In certain embodiments, composite operations are named for the order of processing (e.g. fused multiply add=>fma, sll+add=>sladd). In certain embodiments, conversions (cvt) are named cvt{dsttype} {srctype} (e.g., "convert to xxx from yyy", and the output size is the first type size).

Operand Ordering and Style

When there is a selector among operands (e.g. pick*, switch*), in certain embodiments, 0 is used for the $1^{st}$, 1 for the $2^{nd}$, etc. A selector may include 2 or 3 operands and a single bit of control, but there is a possibility of higher radix picks/switches (e.g., those with more or many more than two inputs or two outputs.

In certain embodiments, output operands precede input operands. In one embodiment, an exception is the memory ordering operands for memory references have both the output and input following the main operands. For memory references in this embodiment, the operands are ordered as if they were move operations that take more general operands, e.g., ld {target}, {memaddr} while store is st {memaddr}, {source}.) Further, in certain embodiments, displacement or index operands follow the base address operand, e.g., ldNx {target},{addr}, {index} vs. stNx {addr},{index},{source}. Note that (e.g., many) operations may allow defaulting of later operands.

Mixed Operation/Operand Size Semantics

In certain embodiments, a first rule is that a CSA operation's defined semantics require size consistency between operands and LICs, e.g., and use an explicit size conversion when a size change was involved. In one embodiment, if an input value (e.g. from an LIC) has a smaller number of bits than the corresponding input operand, it is automatically zero-extended to the width required, e.g., a comparison generates a single bit output, and using that as the input to an and64 operation will cause it to be zero-extended up through bit 63. Likewise, in certain embodiments, if an output value is a smaller number of bits than the consuming LIC, it is zero-extended, e.g., an add32 operation writing a 64b output only produces non-zero values in the low order 32 bits.

In certain embodiments, a second rule is that if an output value is larger than an output channel, the value is truncated to that many bits, e.g., it functions like a store to memory. For example, .lic .i32 c1; add64 c1 . . . ; add64, c1 would cause the 64b result from the first add to be truncated to 32b before being presented as the input to the second add.

In certain embodiments, a third rule is that the generated output is the size specified on the operation, e.g., an "add32" add operation generates 32b, and a "ld8" load operation generates 8 bits. In certain embodiments, CSA hardware detects when a smaller operation could be used because a smaller number of output bits are required, e.g., if an and32 is used to generate a 1 bit channel, only 1 bit is to be generated. Note that the first rule and the second rule mean that the bits semantics of a LIC matches a store x ("stx") followed by a load x ("ldx"), where x is the bit size of the LIC. However, note that an arbitrary store/load would not provide ordering in certain embodiments, e.g., that would require memory with full/empty semantics.

Toolchain Modification of Code

In certain embodiments, optimization of hardware assignment happens in the compiler. However, in those embodiments, some decisions may be made after the assembly representation of the dataflow graph. Some examples of transformations are described below.

Expansion/Fission

Some single operations may be expanded to a sequence of two or more operations, for example, large (e.g., greater than 64 bit input operands) integer multiply, integer and floating point division, math functions such as square root, displacement and indexing for memory references, some variations of streaming memory references, etc. Implementations may also have operations inserted for handling of cases like mismatched sizes. For example, some implementations may not allow different sizes of network connections to operands, so performing an add using the result of a comparison may involve an operation to change networks.

Fusion

In certain embodiments, there are a number of cases where dataflow operations, particularly including pick, switch and repeat, are implemented in the underlying hardware without requiring use of an entire PE, for example, a switch as an output operand, a repeat as an input operand, and a pick as an input operand.

The CSA operations may each include a (e.g., unique for each operation type) configuration value, that when loaded into a PE or other CSA component (e.g., registers that control a circuit switched network), causes the PE or other CSA component to perform the desired CSA operation. As a non-limiting example, an add operation may include the format of:

add {8-64} res.Ld.iN, opl.LCu.iN, op2L.Cu.iN such that the resultant (res) is equal to the first operand (op1) added to the second operand (op2). In reference to FIG. 33, in one embodiment, the configuration value corresponding to that add operation is loaded into operation configuration storage 3319 to set the control values in that PE 3300 to cause the PE to produce a resultant (e.g., in output queue 3334 or output queue 3336) equal to the first operand (e.g., from input queue 3324 sourcing from a first channel) added to the second operand (e.g., from input queue 3326 sourcing from a second channel). The channels may be formed by setting corresponding configuration values into storage (e.g., registers) of a circuit switched network, e.g., the circuit switched network as in FIG. 55. In one embodiment, the first operand is sourced from a first upstream PE (e.g., on a first LIC) and the second operand is sourced from a second upstream PE (e.g., on a second LIC).

3.6 Example CSA Operations

The following are examples of CSA operations. Hardware (e.g., a CSA) may perform one or more of the following operations, e.g., via a processing element. CSA operations may include arithmetic and/or logical operations, e.g., with one or a plurality of (e.g., 0 to 3) inputs and one or a plurality of (e.g., 0 to 1) outputs. In contrast to other architectures, the operands in certain embodiments of CSA are channels, registers, or literals. CSA operations may also include families of operations related to dataflow, sequence processing, reductions, etc. In certain embodiments, conversion operations are provided between floating types, and between a first size (e.g., 32b) and a second size (e.g., 64b) signed or unsigned integer and/or floating point types of data. In one embodiment, (e.g., most) integer operations are provided in 8, 16, 32, and 64b widths, and single bit (e.g., control data) as well. Note that although certain buffers are discussed as being used to provide input values and to stored output values, those buffers are merely examples and the particular buffer or buffers used for an operation may be selected (e.g., via setting the configuration value accordingly).

In certain embodiments, each (e.g., single) operation is performed by a single PE configured via a configuration value being set, e.g., in a register of that PE, to a value corresponding to that operation. In certain embodiments, a CSA (e.g., a PE thereof) does not change its function each clock cycle. In certain embodiments, a CSA (e.g., a PE thereof) does not receive bits of instruction from a centralized memory (e.g., an element instruction stream memory) during execution. In certain embodiments, a CSA (e.g., a PE thereof) does not change its function based upon bits of instruction received from a centralized memory (e.g., an element instruction stream memory) during execution. In certain embodiments, a CSA (e.g., a PE thereof) does not receive programming (e.g., configuration values) each execution cycle. In certain embodiments, a CSA does not utilize algorithms stored in a centralized memory and access them before each operation. In certain embodiments, a CSA (e.g., a PE thereof) executes (e.g., only) when input data is available and storage for a resultant(s) is available, e.g., in certain embodiments a CSA does not execute based only on a clock cycling (e.g., for a predetermined number of cycles). In certain embodiments, a CSA (e.g., a PE thereof) stores state information locally (for example, in queues and/or registers of the CSA element (e.g., PE)), and not in a centralized repository of state memory.

The following discusses examples of certain CSA operations, including certain streaming operations, Boolean control operations, dataflow operations, storage (buffer) operations, and fountain operations, and then includes a table of other CSA operations. The following operations are discussed in reference to a PE having one or more (e.g., all) of the components of PE 5800 in FIG. 58. In other embodiments, a PE may be any PE discussed herein.

Note that in certain PEs herein, a configuration register includes storage for multiple operation configuration values. In any of these embodiments, a PE may only include storage for a single operation configuration value, for example, with the operation configuration value controlling which operation circuitry is used. See, for example, FIG. 33.

Figure 58:
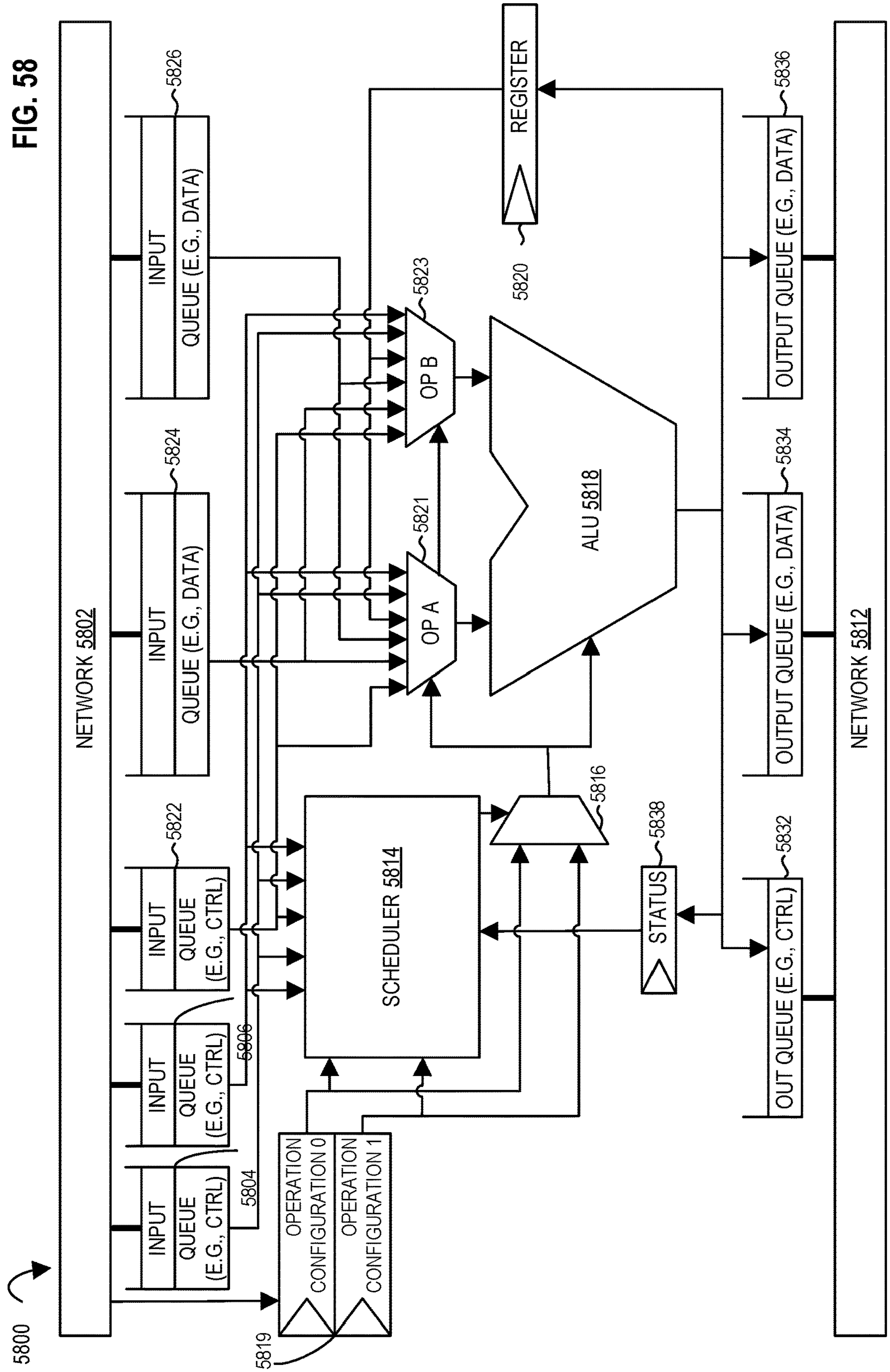
FIG. 58 illustrates a processing element according to embodiments of the disclosure.

FIG. 58 illustrates a processing element 5800 according to embodiments of the disclosure. In one embodiment, operation configuration register 5819 is loaded during configuration (e.g., mapping) and specifies the particular operation (or operations) this processing (e.g., compute) element is to perform, e.g., any of the operations discussed herein. In the depicted embodiment, register 5820 activity is controlled by that operation (an output of multiplexer 5816, e.g., controlled by the scheduler 5814). In the depicted embodiment, scheduler 5814 schedules an operation or operations of processing element 5800 for execution, e.g., when input data and control input arrives. See, for example, the discussion of FIGS. 33-57.

Input (e.g., control) queues 5804, 5806, and 5822 are coupled to local network(s) 5802 (e.g., and local network 5802 may include a data path network as in FIG. 7A and a flow control path network as in FIG. 7B) and is loaded with a value when it arrives (e.g., the network has a data bit(s) and valid bit(s)). Any of control output queue 5832, data output queue 5834, and/or data output queue 5836 receive an output of processing element 5800 in certain embodiments, e.g., as controlled by the configured operation (as an output of multiplexer 5816). Although three narrower bit width (e.g., a single bit or two bits in width) input queues 5804, 5806, and 5822, two wider bit width (e.g., 32 bits or 64 bits in width) input queues, a single narrower bit width (e.g., a single bit or two bits in width) output queue 5832, and two wider bit width (e.g., 32 bits or 64 bits in width) output queues 5834, 5836 are depicted, any number of narrower bit width queues and/or any number of wider bit width queues may be used. For example, a PE may include a plurality of narrower output queues. Any queue may have multiple slots, for example, in certain embodiments, an (e.g., each) output queue includes multiple slots.

In certain embodiments, status register 5838 is loaded whenever the ALU (or other operations circuitry) 5818 executes (also controlled by output of multiplexer 5816). In one embodiment, data in control input queues 5804, 5806, 5822, and/or control output queue 5832 is a single bit. In the depicted embodiment, multiplexer 5821 (e.g., operand A) and multiplexer 5823 (e.g., operand B) sources inputs, e.g., according to the configuration value.

For example, suppose the operation of this processing (e.g., compute) element is (or includes) what is called call a pick in FIG. 3B. The processing element 5800 then is to select data from either data input queue 5824 or data input queue 5826, e.g., to go to data output queue 5834 (e.g., default) or data output queue 5836. The control bit in 5822 may thus indicate a 0 if selecting from data input queue 5824 or a 1 if selecting from data input queue 5826 or vice-versa.

For example, suppose the operation of this processing (e.g., compute) element is (or includes) what is called call a switch in FIG. 3B. The processing element 5800 is to output data to data output queue 5834 or data output queue 5836, e.g., from data input queue 5824 (e.g., default) or data input queue 5826. The control bit in 5822 may thus indicate a 0 if outputting to data output queue 5834 or a 1 if outputting to data output queue 5836, or vice-versa.

In certain embodiments, multiple networks (e.g., LICs thereof) are connected to a processing element, e.g., (input) network(s) 5802 and (output) network(s) 5812. The connections may be switches, e.g., as discussed in reference to FIGS. 7A and 7B. In one embodiment, each network includes two sub-networks (or two channels on the network), e.g., one for the data path network in FIG. 7A and one for the flow control (e.g., backpressure) path network in FIG. 7B. As one example, local network 5802 (e.g., set up as a control interconnect) is switched (e.g., connected) to control input queue 5822. In this embodiment, a data path (e.g., network as in FIG. 7A) carries the control input value (e.g., bit or bits) (e.g., a control token) and the flow control path (e.g., network) carries the backpressure value (e.g., backpressure or no-backpressure token) from control input queue 5822, e.g., to indicate to the upstream producer (e.g., PE) that a new control input value is not to be loaded into (e.g., sent to) control input queue 5822 until the backpressure value indicates there is room in the control input queue 5822 for the new control input value (e.g., from a control output queue of the upstream producer). In one embodiment, the new control input value may not enter control input queue 5822 until both (i) the upstream producer receives the "space available" backpressure value from "control input" queue 5822 and (ii) the new control input value is sent from the upstream producer, e.g., and this may stall the execution of the processing element 5800 until that happens (and until space in the target, output queue(s) of PE 3.A600 is available).

Note that certain operations of this disclosure include a combination of inputs (e.g., from queues of a PE performing the operation), but in certain embodiments, a PE only stalls when certain proper subset of the inputs is available instead of requiring all of the inputs be available. The proper subset of inputs determining the stall may be chosen based on the combination of the value of particular inputs to the operation, the value of status storage associated with the operation, and the PE configuration. In one embodiment, a pick operation that is to pick data from a first input queue or a second input queue is not to stall when the second input queue is empty if the pick operation is currently picking from the first input queue that includes at least one value.

Note that certain operations of this disclosure include a combination of outputs (e.g., from queues of a PE performing the operation), but in certain embodiments, a PE only stalls when certain proper subset of the outputs are not full (e.g. available to accept new data) instead of requiring all of the outputs. The proper subset of outputs determining the stall may be chosen based on the combination of the value of particular inputs to the operation, the value of status storage associated with the operation, and the PE configuration. In one embodiment, a switch operation that is to steer data from a first input queue to a first output queue or a second output queue is not to stall when the second output queue is full (e.g. not available to accept new data) if the switch operation is currently steering (e.g., sourcing) from the first input queue to the first output queue and the first output queue is not full (e.g. available to accept new data).

Data input queue 5824 and data input queue 5826 may perform similarly, e.g., local network 5802 (e.g., set up as a data (as opposed to control) interconnect) being switched (e.g., connected) to data input queue 5824. In this embodiment, a data path (e.g., network as in FIG. 7A) may carry the data input value (e.g., bit or bits) (e.g., a dataflow token) and the flow control path (e.g., network) may carry the backpressure value (e.g., backpressure or no-backpressure token) from data input queue 5824, e.g., to indicate to the upstream producer (e.g., PE) that a new data input value is not to be loaded into (e.g., sent to) data input queue 5824 until the backpressure value indicates there is room in the data input queue 5824 for the new data input value (e.g., from a data output queue of the upstream producer). In one embodiment, the new data input value may not enter data input queue 5824 until both (i) the upstream producer receives the "space available" backpressure value from "data input" queue 5824 and (ii) the new data input value is sent from the upstream producer, e.g., and this may stall the processing element 5800 until that happens (and space in the target, output queue(s) is available). A control output value and/or data output value may be stalled in their respective output queues (e.g., 5832, 5834, 5836) until a backpressure value indicates there is available space in the input queue for the downstream processing element(s).

A processing element 5800 may be stalled from execution until its operands (e.g., a control input value and its corresponding data input value or values) are received and/or until there is room in the output queue(s) of the processing element 5800 for the data that is to be produced by the execution of the operation on those operands.

Streaming Operations

In certain embodiments, dataflow architectures operate on scalar values. However, in some cases, it may be more efficient to process streams of data (e.g., aggregations of dataflow tokens). This allows natural management of irregular data and complex control, for example, when sorting lists or performing sparse matrix arithmetic. The section below describes several dataflow operations (e.g., and their dataflow operators in embodiments of a CSA) which facilitate the manipulation of streams. In one embodiment, Stream Compare ("stcmp") allows the comparison of two streams of values (e.g., data values). This operation permits the merging of partially ordered lists, e.g., in merge sort and also in sparse matrix multiplication (e.g., where it is used to calculate the unions and intersections of sparse matrix rows and columns). Stream Pick ("stpick") and Stream Switch ("stswitch") allow for the steering of stream-based data. Is Null ("snull") assists in controlling stream operations by checking the length of a stream object. In one embodiment, one or more (e.g., all) of these operations are sufficient to implement a large number of streaming algorithms.

Figure 59:
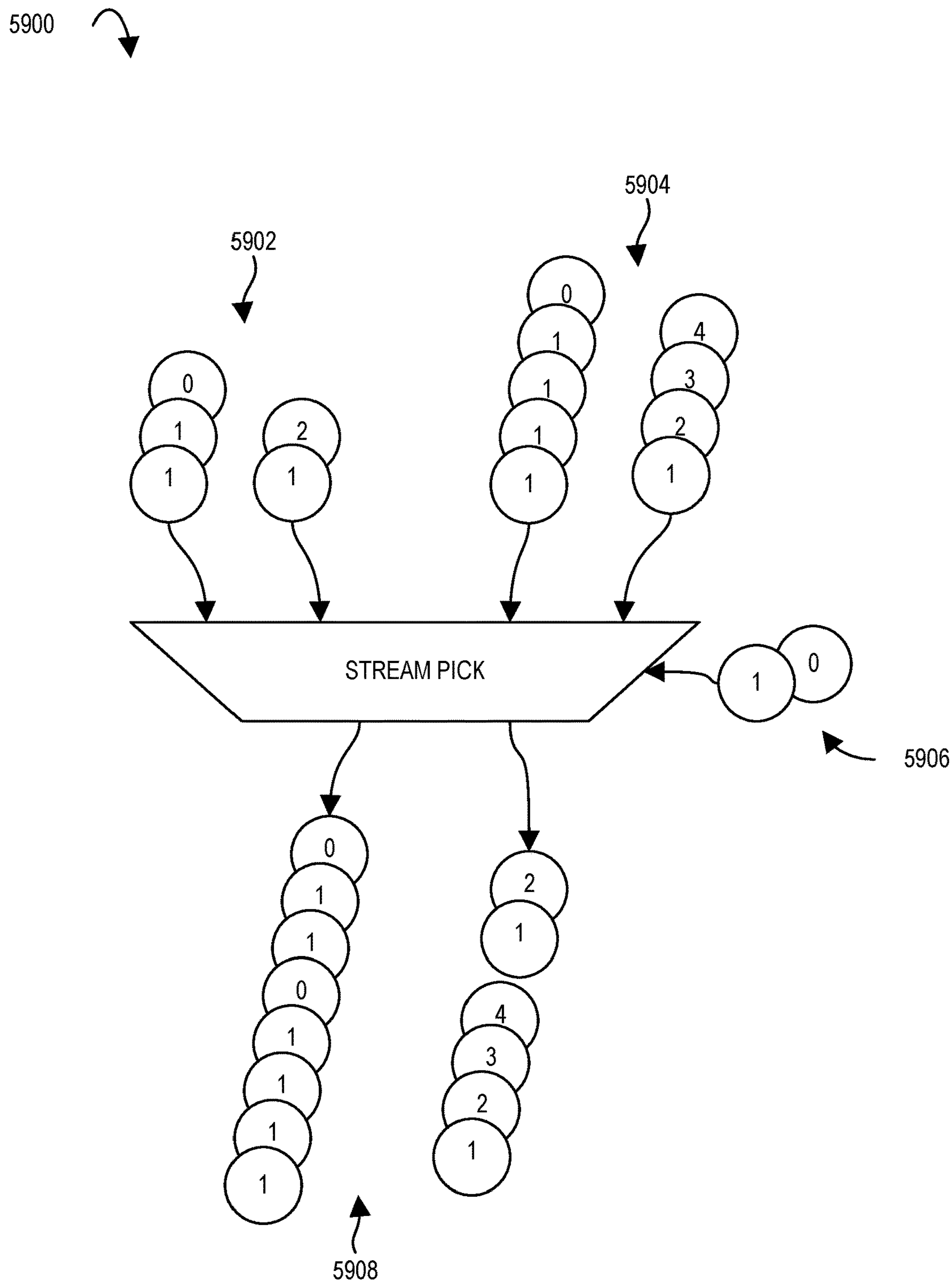
FIG. 59 illustrates a flow view of a stream pick operation according to embodiments of the disclosure.

In certain embodiments, streaming operations transform input streams into other, output stream(s). FIG. 59 illustrates a flow view of a stream pick operation 5900 according to embodiments of the disclosure. The circled data indicates payload data and control bits. In one embodiment, the control bits are logical ones (e.g., or zeroes in another embodiment) until reaching the end of a stream, and the control bit there is a logical zero (e.g., or a one in another embodiment). In the depicted embodiment, each of first input stream of data 5902 and second input stream of data 5904 includes a first portion (e.g., on the left in this figure) of control bits and a second portion (e.g., on the right in this figure) of payload data. In this figure, the numbers in the circles for the payload data are an example of what instance of payload data (e.g., a first instance includes a circled one, a second instance includes a circled two, etc.). In this figure, the numbers in the circles for the control bits indicate a one for each item in a single stream and a zero for the end (e.g., termination) of that stream. In one embodiment, there is no associated payload data with a control bit at the end of stream, e.g., as depicted in FIG. 59.

Further, control data 5906 may be used to select which of the two input streams is to be output from the stream pick operation 5900, for example, a first value (e.g., zero) of control data 5906 to cause the stream pick operation 5900 to output the (e.g., entire) first input stream of data 5902, and a second value (e.g., a one) of control data 5906 to cause the stream pick operation 5900 to output the (e.g., entire) second input stream of data 5904. In the depicted embodiment, the first value received for control data 5906 is a one, which is to cause the stream pick operation 5900 to output 5908 the entire stream from second input stream of data 5904, and the second value received for control data 5906 is a zero, which is to then (e.g., after the completion of outputting the entire second input stream 5904) cause the stream pick operation 5900 to output 5908 the entire stream of the first input stream of data 5902. Like scalar dataflow operators, certain embodiments of stream operations (e.g., operators) execute when all operands are available, but operate on entire streams (e.g., the entire stream need not be available at the commencement of the streaming operation). In one embodiment, stream operations accept multiple streams and, optionally, additional control tokens which indicate an action to be taken on an entire stream. The following discusses examples of stream operations, e.g., where a PE is configured to perform a stream operation when its configuration value is set accordingly.

Figure 60:
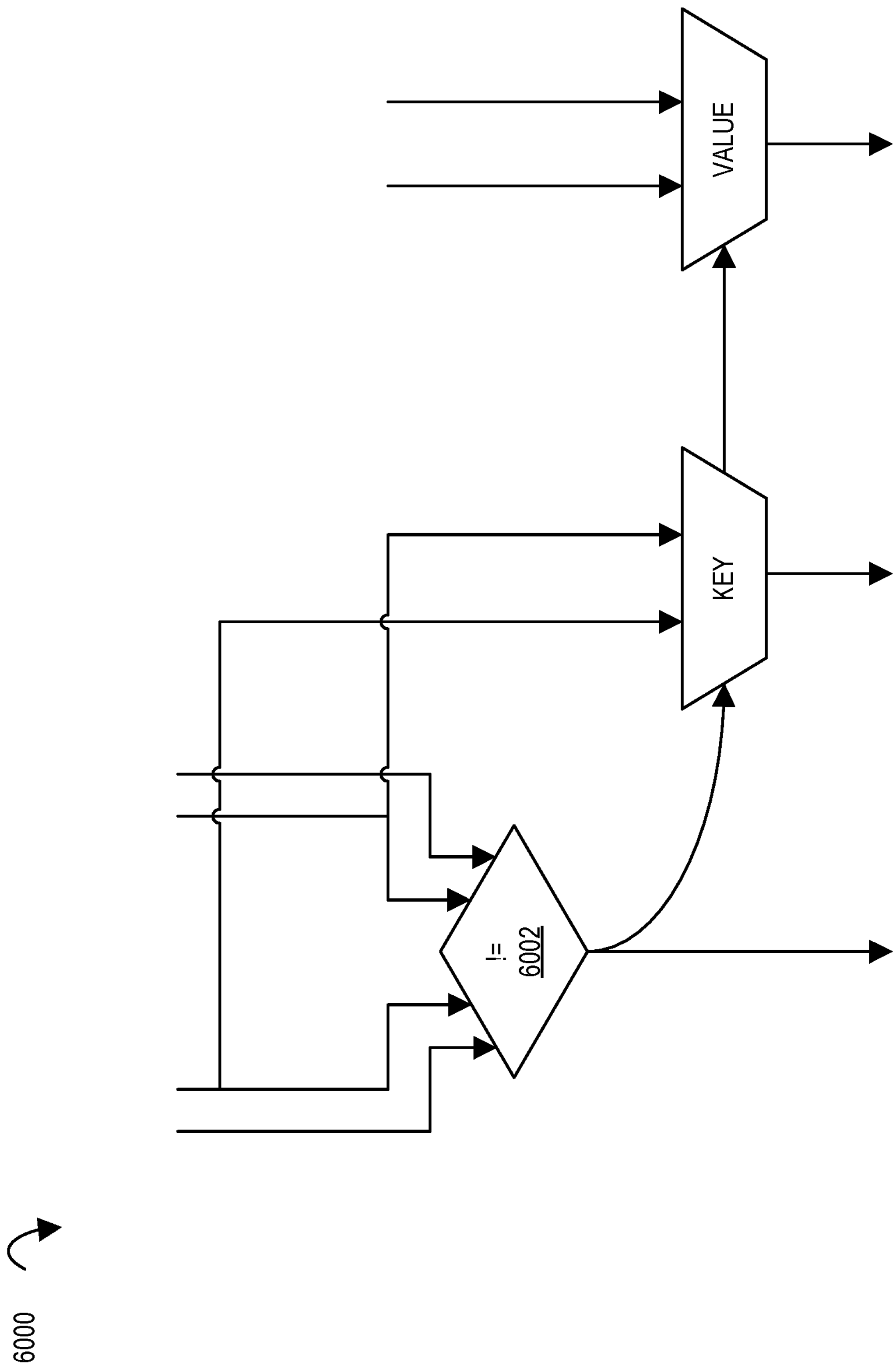
FIG. 60 illustrates use of streaming compare operator in a dataflow graph of a merge sort according to embodiments of the disclosure.

FIG. 60 illustrates use of streaming compare operator 6002 in a dataflow graph of a merge sort according to embodiments of the disclosure. In one embodiment, this subgraph is repeated to form a sort tree to implement a merge sort. Because the merged lists may not have uniform size, and because the arrangement of the lists into sorted order may occur in any order, it is useful to have an operator that captures this dynamic control behavior. Thus, including a stream compare operation (e.g., in a CSA operation set) allows since multiple control paths are required.

Stream Compare

In one embodiment, a CSA architecture includes a configuration value that, when stored into the configuration storage (e.g., register), causes the CSA (e.g., a PE thereof) to perform a Stream Compare operation according to the following (e.g., semantics and/or description).

```
Operation: scmprelT cmpres.CRd.i1, valres.CRd.T, ctlseqres.CRd.i1,
               ctlseqa.CRLu.i1, vala.CRLu.T,
               ctlseqb.CRLu.i1, valb.CRLu.T,
               order.Lu.i1=0, signal.Lu.i1=0 // order/signal are FP
compares only where rel is an integer or floating point comparison relational other
than equal/not equal, and T is either an integer comparison type, like s32, or a
floating point type
NOTE: order and signal operands are ONLY present for floating point comparisons in
one embodiment.
Semantics:
// If both values available, and the relational is true, or only a is available
if ( (ctlseqa.peek && ((ctlseqb.peek && vala.peek cmpxxx valb.peek) ||
!ctlseqb.peek) ) {
    cmpres = 1
    valres = vala.get
    ctlseqres = 1
    ctlseqa.deq
} else if (ctlseqb.peek) {              // If b is available (either comparison failed or a not
available)
    cmpres = 0
    valres = valb.get
    ctlseqres = 1
    ctlseqb.deq
```

-continued

```
} else {                        // both sequences exhausted - done. No outputs
    ctlseqres = 0
    ctlseqa.deq
    ctlseqb.deq
}
```

Description: Stream comparisons deal with two input sequences of values, and provide a stream control out and comparison values. When combined with a pick, this results in the construction of a new stream which is ordered with respect to rel. The result is formed by looking at the head value of each stream (e.g., in a first slot of a queue), and sending forward the one that matches the comparison result. If one stream is exhausted, the other stream is sent forward until it is done. This operation may be used for merging sequences. Example: Consider scmplts of:

```
    Stream a (seq bit, val) { {1,3}, {1,6}, {1,7}, {0} }
    Stream b (seq bit, val) { {1,2}, {1,7}, {0} }
    Result stream: {ctlseqres, cmpres, valres} – different order than in operation
        {1,0,2}                 // 3<2 is false
        {1,1,3}                 // 3<7 is true
        {1,1,6}                 // 6<7 is true
        {1,0,7}                 // 7<7 is false
        {1,1,7}                 // a still has value, but b does not
        {0}
```

Example stream comparison opcodes are:

| | |
|---|---|
| scmplts8 scmplts16 scmplts32 scmplts64 scmpltu8 scmpltu16 scmpltu32 scmpltu64 scmpltf32 scmpltf64 | cmpres = opA less than (<) opB; |
| scmples8 scmples16 scmples32 scmples64 scmpleu8 scmpleu16 scmpleu32 scmpleu64 scmplef32 scmplef64 | cmpres = opA less than or equal to (< =) opB; |
| scmpgts8 scmpgts16 scmpgts32 scmpgts64 scmpgtu8 scmpgtu16 scmpgtu32 scmpgtu64 scmpgtf32 scmpgtf64 | cmpres = opA greater than (>) opB; |
| scmpges8 scmpges16 scmpges32 scmpges64 scmpgeu8 scmpgeu16 scmpgeu32 scmpgeu64 scmpgef32 scmpgef64 | cmpres = opA greater than or equal to (> =) opB; |

Figure 61A:
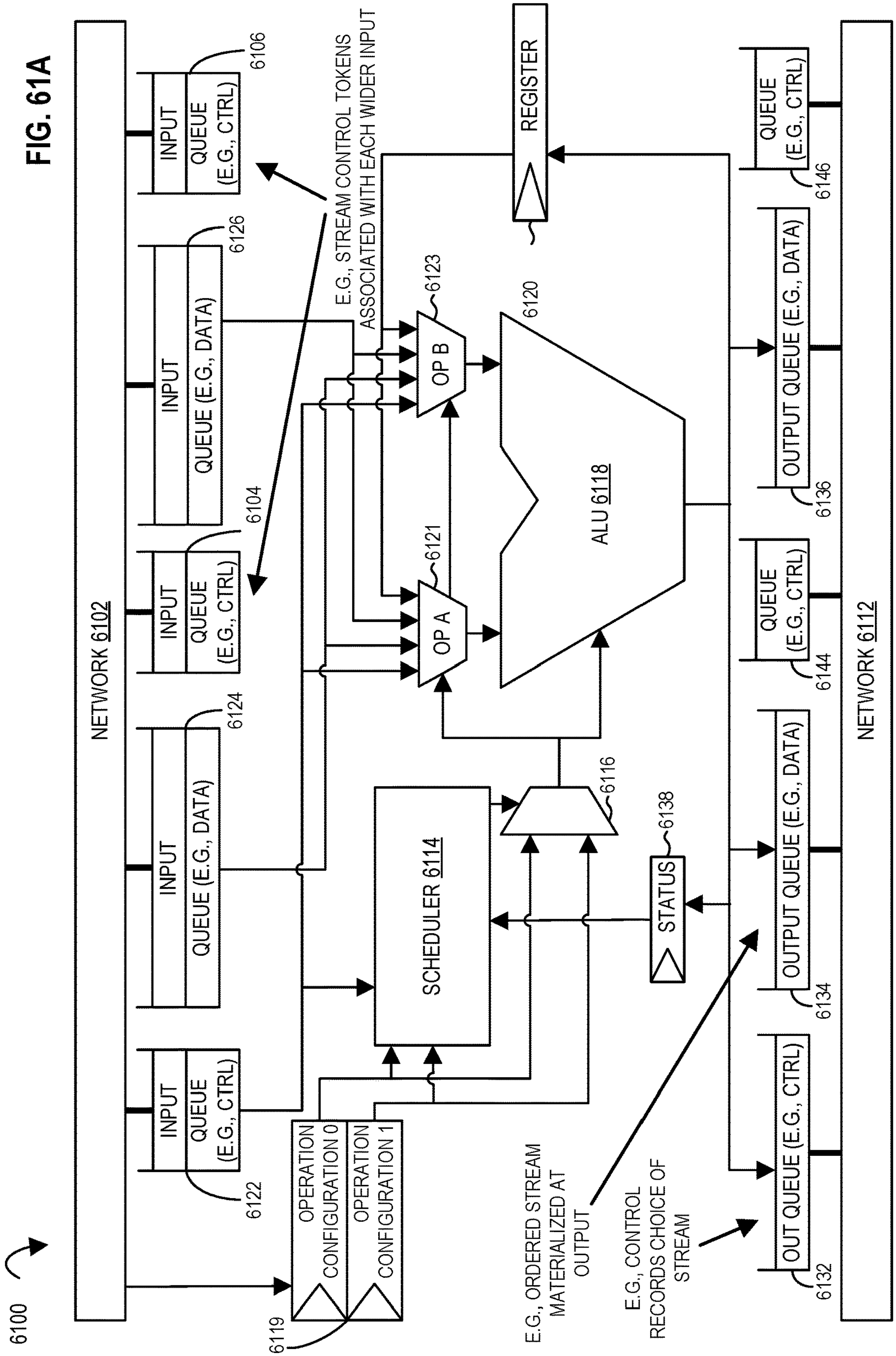
FIGS. 61A-61F illustrate a processing element performing a Stream Compare operation according to embodiments of the disclosure.
Figure 61B:
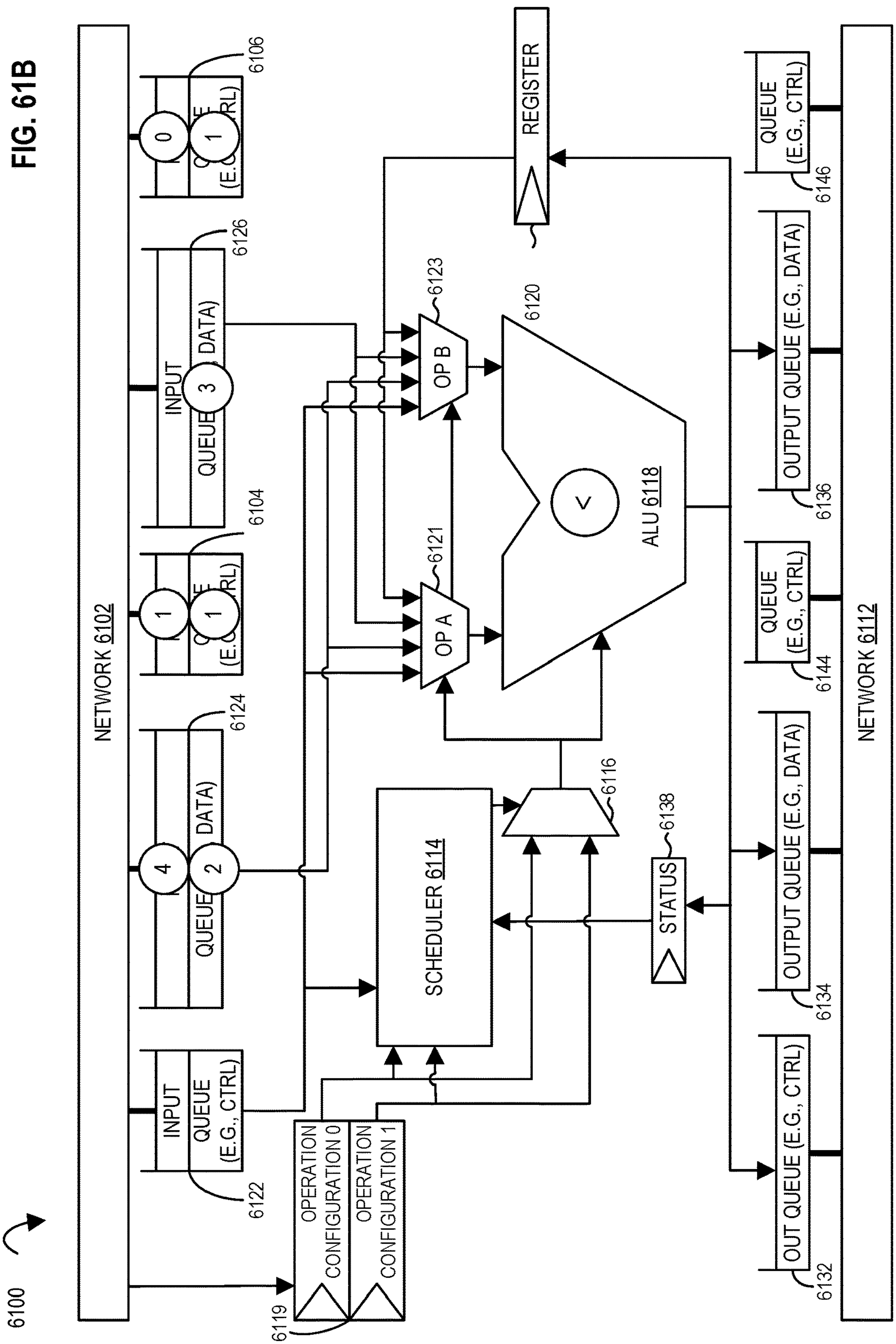

FIGS. 61A-61F illustrate a processing element 6100 performing a Stream Compare operation according to embodiments of the disclosure. In the depicted embodiment, an operation configuration value for a stream compare operation is stored (e.g., during a programming time period) into operation configuration register 6119. As one example, input queue (e.g., having a single bit width) 6104 is provided to receive a stream control value (e.g., token) for input queue 6124 (for example, having a multiple bit width, e.g., 8, 16, 32, or 64 as shown above in the example stream comparison opcodes) and input queue (e.g., having a single bit width) 6106 is provided to receive a stream control value (e.g., token) for input queue 6126 (for example, having a multiple bit width, e.g., 8, 16, 32, or 64 as shown above in the example stream comparison opcodes). In FIG. 61B, the programmed stream compare is to, when an element (e.g., the next element in the A queue) of stream A is less than an element (e.g., the next element in the B queue) of stream B (e.g., scmplt in the above discussion), output the data from stream A, otherwise, the data from stream B is output, e.g., along with a control value indicating a first value for stream A data and a second, different value for stream B data. In FIGS. 61B-61F, the numbers in the circles for the control bits in queues 6104 and 6106 indicate a one for each item in a single stream and a zero for the end (e.g., termination) of that stream.

In FIG. 61B, a data value of (e.g., integer) two is in a first slot of input queue 6124 along with a Boolean one in a first slot of the associated (e.g., control) input queue 6104 to indicate that data value is a valid value of the stream (e.g., stream A), and a data value of (e.g., integer) four is in a second slot of input queue 6124 along with a Boolean one in a second slot of the associated (e.g., control) input queue 6104 to indicate that data value is a valid value of the stream.

In FIG. 61B, a data value of (e.g., integer) three is in a first slot of input queue 6126 along with a Boolean one in a first slot of the associated (e.g., control) input queue 6106 to indicate that data value is a valid value of the stream (e.g., stream B), and no data value is stored in a second slot of input queue 6126, but a Boolean zero is stored in a second slot of the associated (e.g., control) input queue 6104 to indicate that data value three in the first slot of input queue 6126 is the end of that stream.

The input data that is queued may be sent from another component of a CSA, e.g., from a plurality of other PEs as discussed herein.

In certain embodiments, the data is read from the first slot of a queue, and when consumed (e.g., removed), any data from other slots of the queue are advanced such that data from the second slot is moved into the first slot, etc.

Figure 61C:
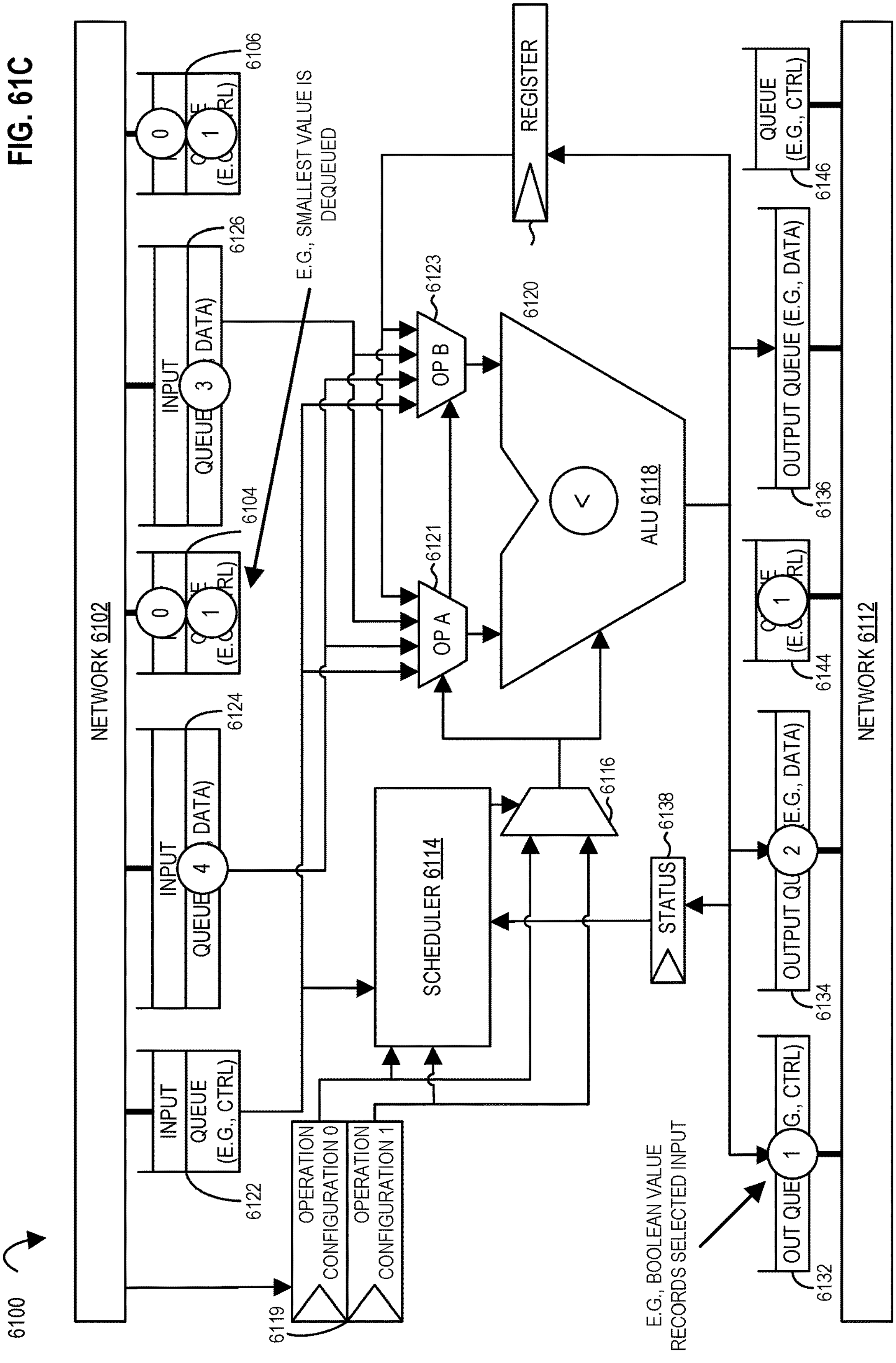

In FIG. 61C, data value of (e.g., integer) two in the first slot of input queue 6124 has been compared against the data value of (e.g., integer) three in the first slot of input queue 6126, and as the comparison is a "less than" in this example, the ALU 6118 performs the "less than" comparison. Here, two is less than three, so the data value of (e.g., integer) two in the first slot of input queue 6124 is sent to output queue 6134 (and/or queue 6136 in another embodiment) and dequeued (e.g., deleted) from the first slot of input queue 6124, a control value of one is sent to the associated control queue 6144 to indicate this is a valid value of a stream and dequeued (e.g., deleted) from the first slot of (e.g., control) input queue 6104. Optionally, output queue 6132 may also be loaded with a value that records which of the streams that data item is associated with. In the depicted embodiment, the data value of two is from input queue 6124 (e.g., stream A), so a first value (e.g., Boolean one) is stored into output queue 6132. As data value of (e.g., integer) two in the first slot of input queue 6124 is dequeued (e.g., deleted) from the first slot of input queue 6124, the data value of (e.g., integer) four is moved into the first slot from the second slot of input queue 6124 along with the Boolean one moved into the first slot from the second slot of the associated (e.g., control) input queue 6104 to indicate that data value is a valid value of the stream. In FIG. 61C a Boolean zero is then sent (e.g., from an upstream PE that is generating the stream) into the second slot of the associated (e.g., control) input queue 6104 to indicate that data value 4 is the end of the stream. The data value from the output queue (e.g., 6134) and the associated control data from the control queues (e.g., 6132 and/or 6144) may be consumed from the output queues, e.g., by a downstream PE or PEs.

Figure 61D:
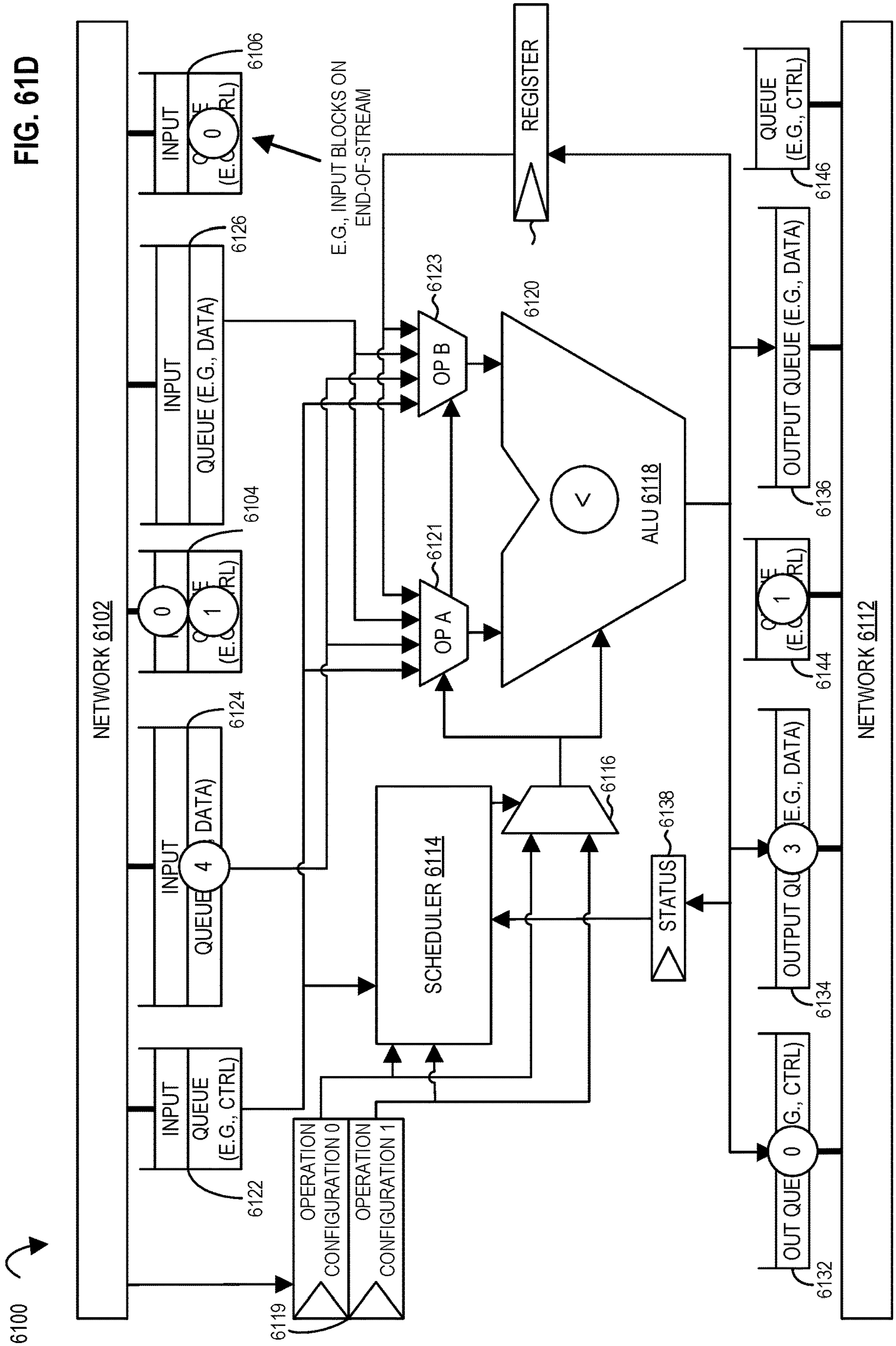

In FIG. 61D, data value of (e.g., integer) four in the first slot of input queue 6124 has been compared against the data value of (e.g., integer) three in the first slot of input queue 6126, and as the comparison is a "less than" in this example, the ALU 6118 performs the "less than" comparison. Here, four is not less than three, so the data value of (e.g., integer) three in the first slot of input queue 6126 is sent to output queue 6134 (and/or queue 6136 in another embodiment) and dequeued (e.g., deleted) from the first slot of input queue 6126, a control value of one is sent to the associated control queue 6144 to indicate this is a valid value of the stream and dequeued (e.g., deleted) from the first slot of (e.g., control) input queue 6106. Optionally, output queue 6132 may also be loaded with a value that records which of the streams that data item is associated with. In the depicted embodiment, the data value of three is from input queue 6126 (e.g., stream B), so a different, second value (e.g., Boolean zero) is stored into output queue 6132. As data value of (e.g., integer) three in the first slot of input queue 6126 is dequeued (e.g., deleted) from the first slot of input queue 6126, no additional data value is pending so nothing is moved into the first slot from the second slot of input queue 6126 into the first slot, but the Boolean zero is moved into the first slot from the second slot of the associated (e.g., control) input queue 6106 to indicate that data value three is the end of that input stream (e.g., stream B). The data value from the output queue (e.g., 6134) and the associated control data from the control queues (e.g., 6132 and/or 6144) may be consumed from the output queues, e.g., by a downstream PE or PEs.

Figure 61E:
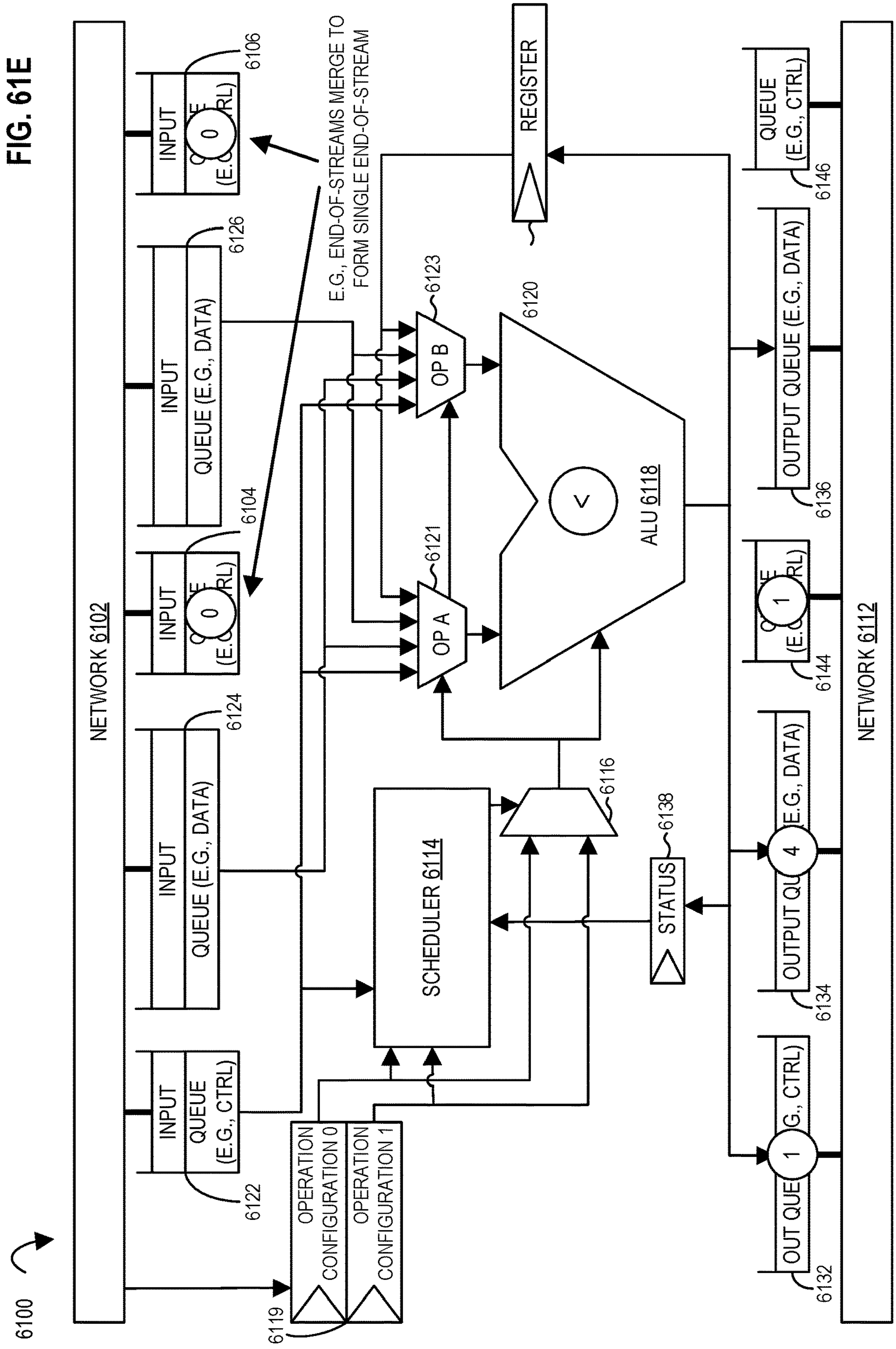

In FIG. 61E, a Boolean zero is in the first slot of (e.g., control) input queue 6106 and a data value of (e.g., integer) four in the first slot of input queue 6124. Here, there are not elements of two different streams to compare, so the data value of (e.g., integer) four in the first slot of input queue 6124 is sent to output queue 6134 (and/or queue 6136 in another embodiment) and dequeued (e.g., deleted) from the first slot of input queue 6124, a control value of one is sent to the associated control queue 6144 to indicate this is a valid value of the stream and dequeued (e.g., deleted) from the first slot of (e.g., control) input queue 6104. Optionally, output queue 6132 may also be loaded with a value that records which of the streams that data item is associated with. In the depicted embodiment, the data value of four is from input queue 6124 (e.g., stream A), so a first value (e.g., Boolean one) is stored into output queue 6132. As data value of (e.g., integer) four in the first slot of input queue 6124 is dequeued (e.g., deleted) from the first slot of input queue 6124, no additional data value is pending so nothing is moved into the first slot from the second slot of input queue 6124 into the first slot, but the Boolean zero is moved into the first slot from the second slot of the associated (e.g., control) input queue 6104 to indicate that data value four is the end of that input stream (e.g., stream A). The data value from the output queue (e.g., 6134) and the associated control data from the control queues (e.g., 6132 and/or 6144) may be consumed from the output queues, e.g., by a downstream PE or PEs.

Figure 61F:
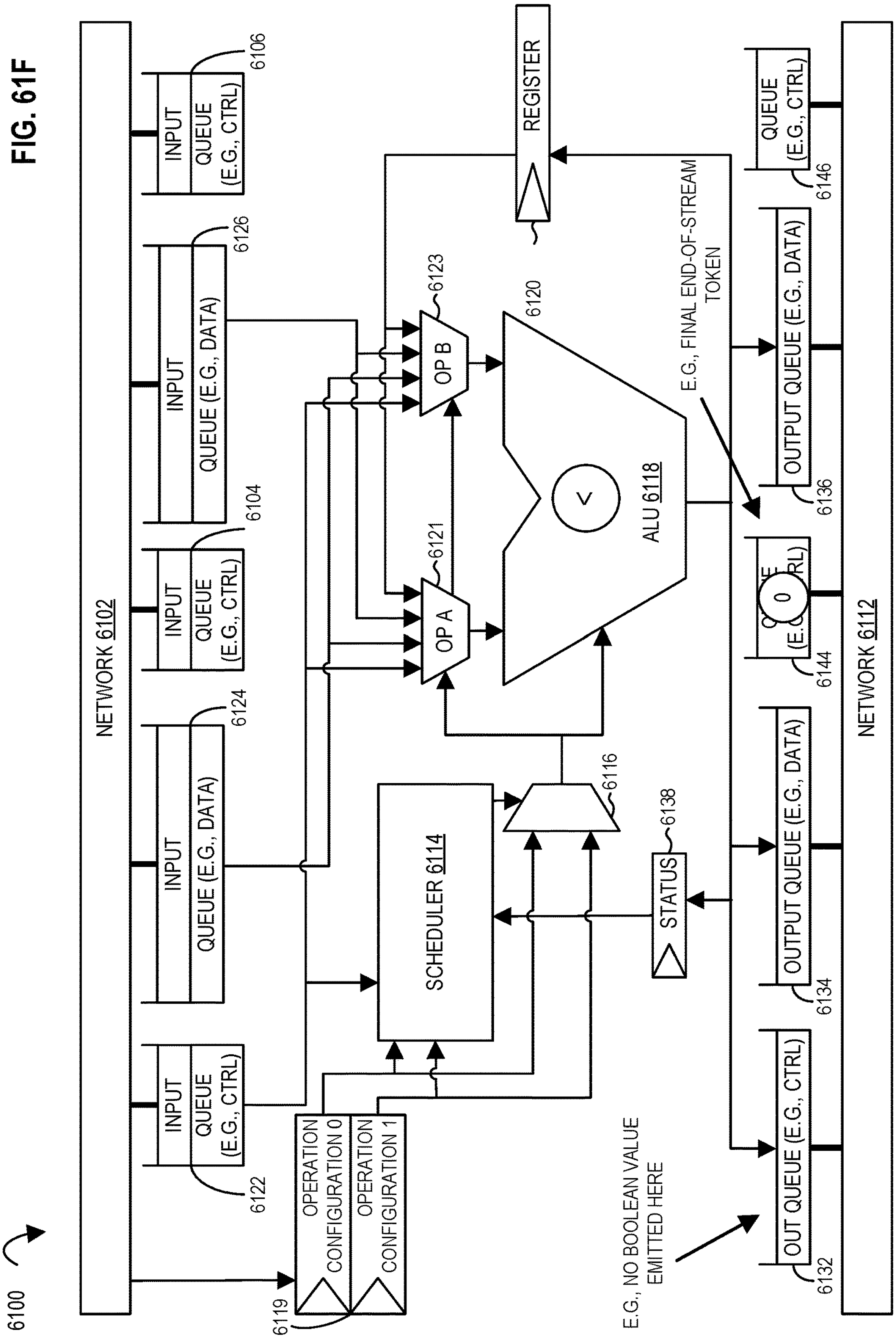

In FIG. 61F, a Boolean zero is in the first slot of (e.g., control) input queue 6104 to indicate the end of the first stream (e.g., stream A) and a Boolean zero is in the first slot of (e.g., control) input queue 6106 to indicate the end of the first stream (e.g., stream B). As both input streams have been consumed and formed into a combined new stream (e.g., stream C), a final end-of-stream value (e.g., token) (e.g., Boolean zero) is output into control queue 6144 to indicate this is the end of the new stream (e.g., stream C), and the Boolean zero in the first slot of (e.g., control) input queue 6104 and the a Boolean zero in the first slot of (e.g., control) input queue 6106 are dequeued (e.g., deleted). As the stream is ended, no Boolean value (e.g., one or zero) is stored into output queue 6132.

In certain embodiments, PE 6100 is stalled from performing the comparison operation until there is both (i) space available in the output queues that are to be used for storing resultant data, and (ii) input data for each stream (e.g., control data of a Boolean one and the associated payload data for a stream, or control data of a Boolean zero for the end of a stream).

In certain embodiments, PE 6100 removes input data (e.g., tokens) subject to a conditional comparison, e.g., where stream compare allows merging of ordered streams. In one embodiment, PE 6100 emits optional Boolean control (e.g., to queue 6132) to be used as control values for other PEs.

In the depicted embodiment, PE 6100 includes the components of PE 5800 from FIG. 58, for example, with the components ending with the same two numbers having the same functionality. In one embodiment, scheduler 6114 schedules an operation or operations of processing element 6100 for execution according to the configuration value, e.g., and when input data and control input arrives. See, for example, the discussion of FIGS. 33-57.

Strewn Pick

In one embodiment, a CSA architecture includes a configuration value that, when stored into the configuration storage (e.g., register), causes the CSA (e.g., a PE thereof) to perform a Stream Pick operation according to the following (e.g., semantics and/or description).

```
Operation: stpick{8-64} ctlres.CRd.i1, valres.CRd.iN, idx.CRLu.i1,
                    ctlseqa.CRLu.i1, vala.CRLu.iN, ctlseqb.CRLu.i1, valb.CRLu.iN
Semantics:
// steer a complete stream from the input index indicated to the output.
if ( idx ) ) {
    if ( ctlseqb.peek ) {
            valres = valb.deq
            ctlres = ctlseqb.deq
        } else {
```

-continued

```
                ctlres = ctlseqb.deq
                idx.deq
            }
} else {
        if ( ctlseqa.peek ) {
                valres = vala.deq
                ctlres = ctlseqa.deq
        } else {
                ctlres = ctlseqa.deq
                idx.deq
        }
}
Description: Stream pick allows for the selection of whole streams of data as governed by the
index selection bit
Consider stpick of:
        Stream a (seq bit, val)                 { {1,3}, {1,6}, {1,7}, {0} }
        Stream b (seq bit, val)                 { {1,2}, {1,7}, {0} }
        Idx                                     {0,1}
        Result stream:              {1,3}                       // a
                                    {1,6}                       // a
                                    {1,7}                       // a
                                    {0}                         // a
                                    {1,2}                       // b
                                    {1,7}                       // b
                                    {0}                         // b
```

Figure 62A:
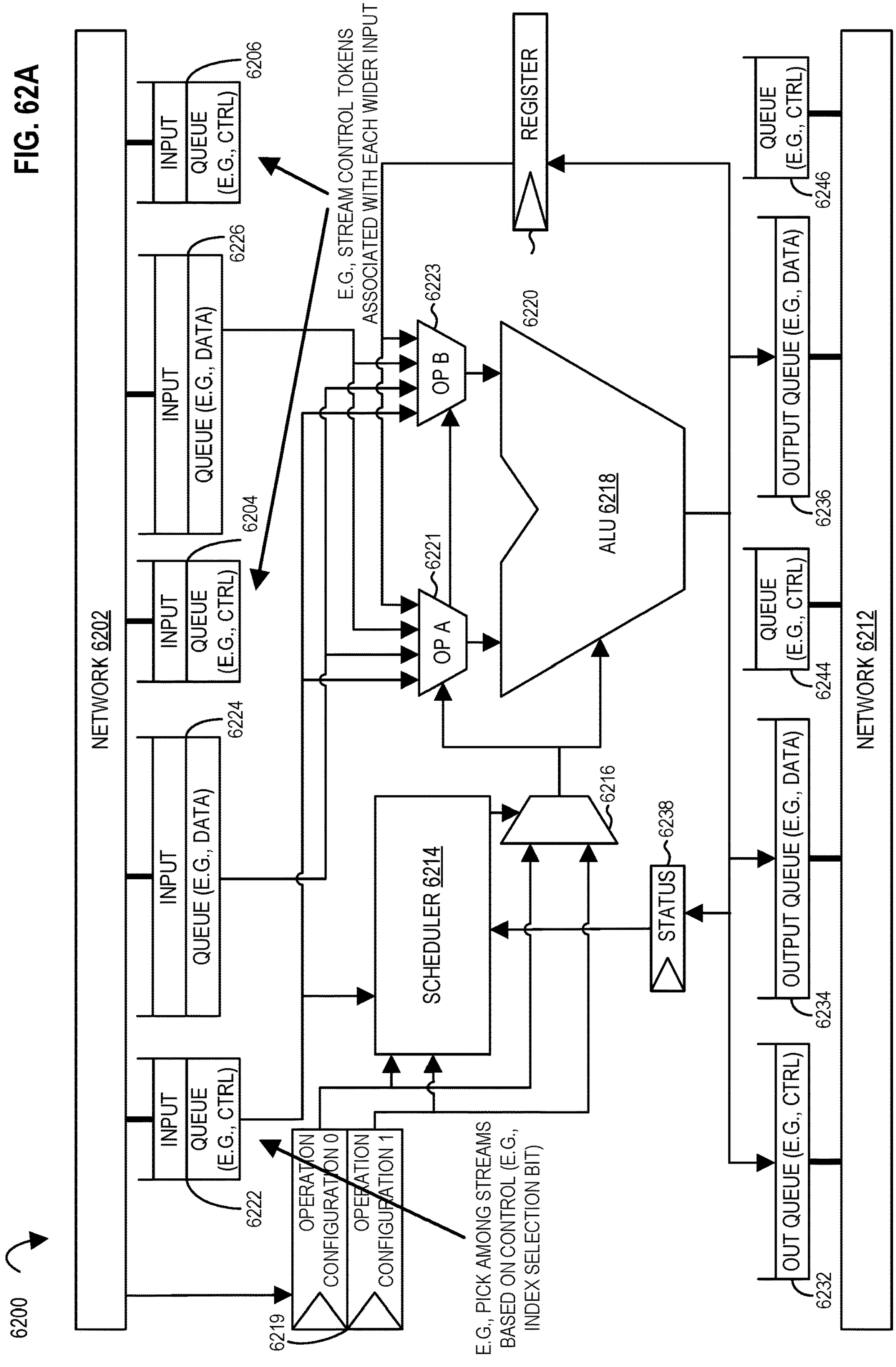
FIGS. 62A-62G illustrate a processing element performing a Stream Pick operation according to embodiments of the disclosure.
Figure 62B:
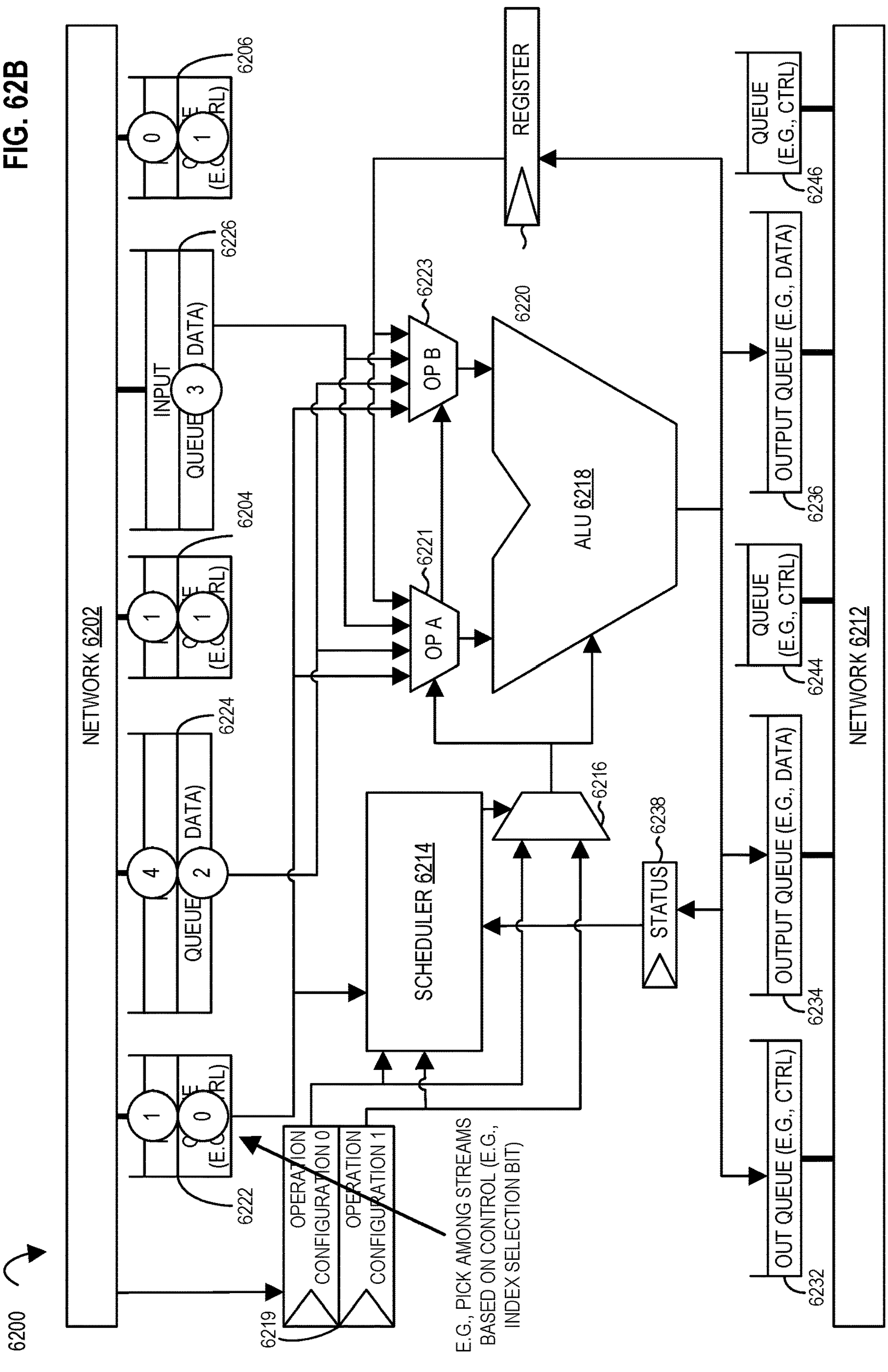

FIGS. 62A-62G illustrate a processing element 6200 performing a Stream Pick operation according to embodiments of the disclosure. In the depicted embodiment, an operation configuration value for a stream pick operation is stored (e.g., during a programming time period) into operation configuration register 6219. As one example, input queue (e.g., having a single bit width) 6204 is provided to receive a stream control value (e.g., token) for input queue 6224 (for example, having a multiple bit width, e.g., 8, 16, 32, or 64 as shown above in the example stream comparison opcodes) and input queue (e.g., having a single bit width) 6206 is provided to receive a stream control value (e.g., token) for input queue 6226 (for example, having a multiple bit width, e.g., 8, 16, 32, or 64 as shown above in the example stream comparison opcodes). In FIG. 62B, the programmed stream pick is to, select an element (e.g., the next element in the A queue) of stream A when a pick control value (e.g., an index selection bit) is a first value (e.g., Boolean zero) and select an element (e.g., the next element in the B queue) of stream B when the pick control value (e.g., the index selection bit) is a second, different value (e.g., Boolean one), e.g., stpick in the above discussion. In FIGS. 62B-62G, the numbers in the circles for the control bits in queues 6204 and 6206 indicate a one for each item in a single stream and a zero for the end (e.g., termination) of that stream.

In FIG. 62B, a data value of (e.g., integer) two is in a first slot of input queue 6224 along with a Boolean one in a first slot of the associated (e.g., control) input queue 6204 to indicate that data value is a valid value of the stream (e.g., stream A), and a data value of (e.g., integer) four is in a second slot of input queue 6224 along with a Boolean one in a second slot of the associated (e.g., control) input queue 6204 to indicate that data value is a valid value of the stream.

In FIG. 62B, a data value of (e.g., integer) three is in a first slot of input queue 6226 along with a Boolean one in a first slot of the associated (e.g., control) input queue 6206 to indicate that data value is a valid value of the stream (e.g., stream B), and no data value is stored in a second slot of input queue 6226, but a Boolean zero is stored in a second slot of the associated (e.g., control) input queue 6204 to indicate that data value three in the first slot of input queue 6226 is the end of that stream.

The input data that is queued may be sent from another component of a CSA, e.g., from a plurality of other PEs as discussed herein.

In certain embodiments, the data is read from the first slot of a queue, and when consumed (e.g., removed), any data from other slots of the queue are advanced such that data from the second slot is moved into the first slot, etc.

In FIG. 62B, a pick control value (e.g., selection control bit) has also been provided (e.g., from an upstream PE) and (i) when the pick control value is a first value (e.g., Boolean zero), PE 6200 is to source the stream (e.g., stream A) from input queue 6224 to an output queue (e.g., output queue 6234), and send the control values for that stream to the associated control queue 6244 and dequeue (e.g., delete) the stream (e.g., stream A) from input queue 6224 and its control values from (e.g., control) input queue 6204, and (ii) when the pick control value is a second, different value (e.g., Boolean one), PE 6200 is to source the stream (e.g., stream B) from input queue 6226 to the output queue (e.g., output queue 6234), and send the control values for that stream to the associated control queue 6244 and dequeue (e.g., delete) the stream (e.g., stream B) from input queue 6226 and its control values from (e.g., control) input queue 6206.

Figure 62C:
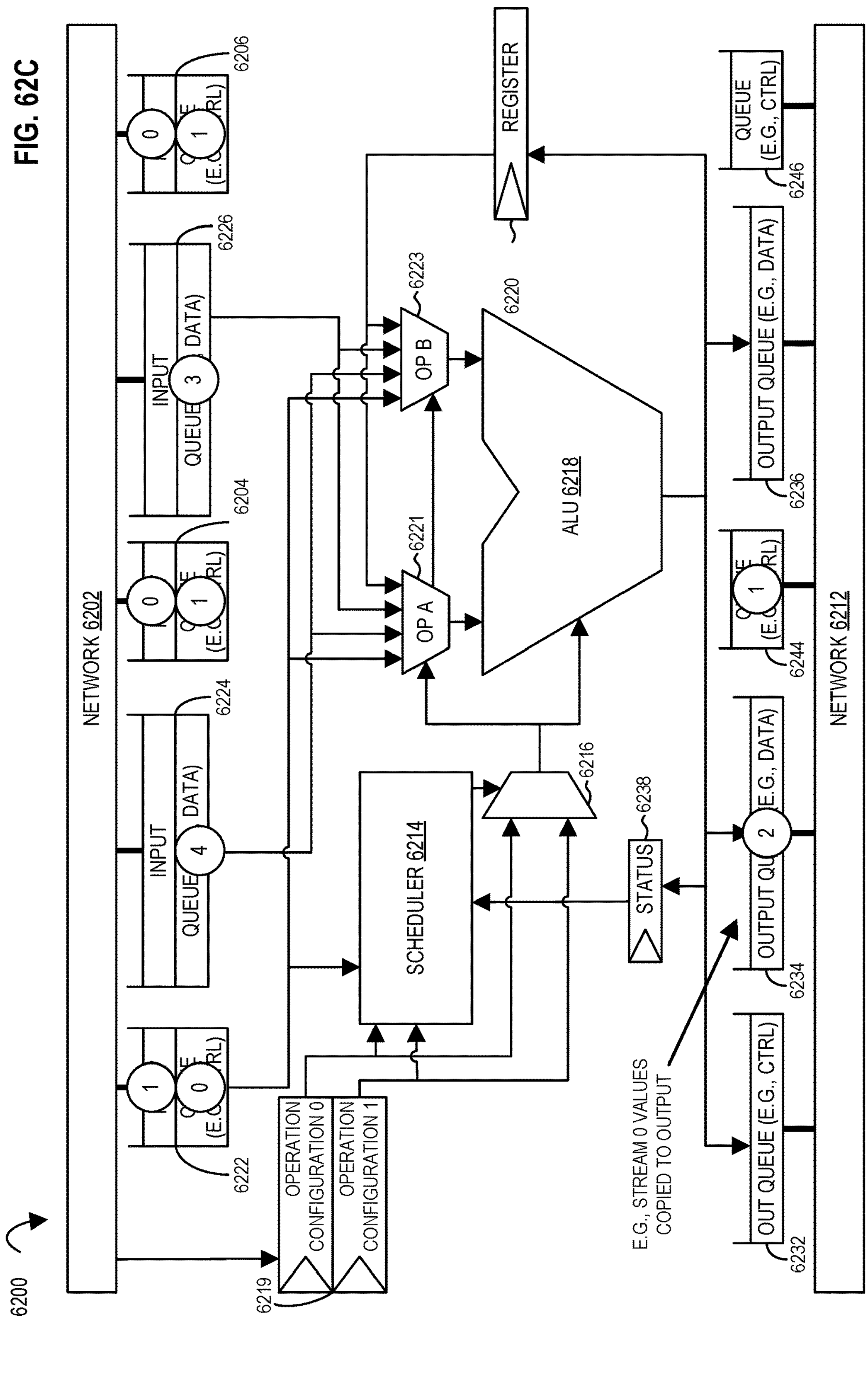

In FIG. 62C, a first pick control value (e.g., selection control bit) having a first value (e.g., Boolean zero) is stored in the first slot of (e.g., pick control) input queue 6222, and a second pick control value (e.g., selection control bit) having a second, different value (e.g., Boolean one) is stored in the second slot of (e.g., control) input queue 6222.

Figure 62D:
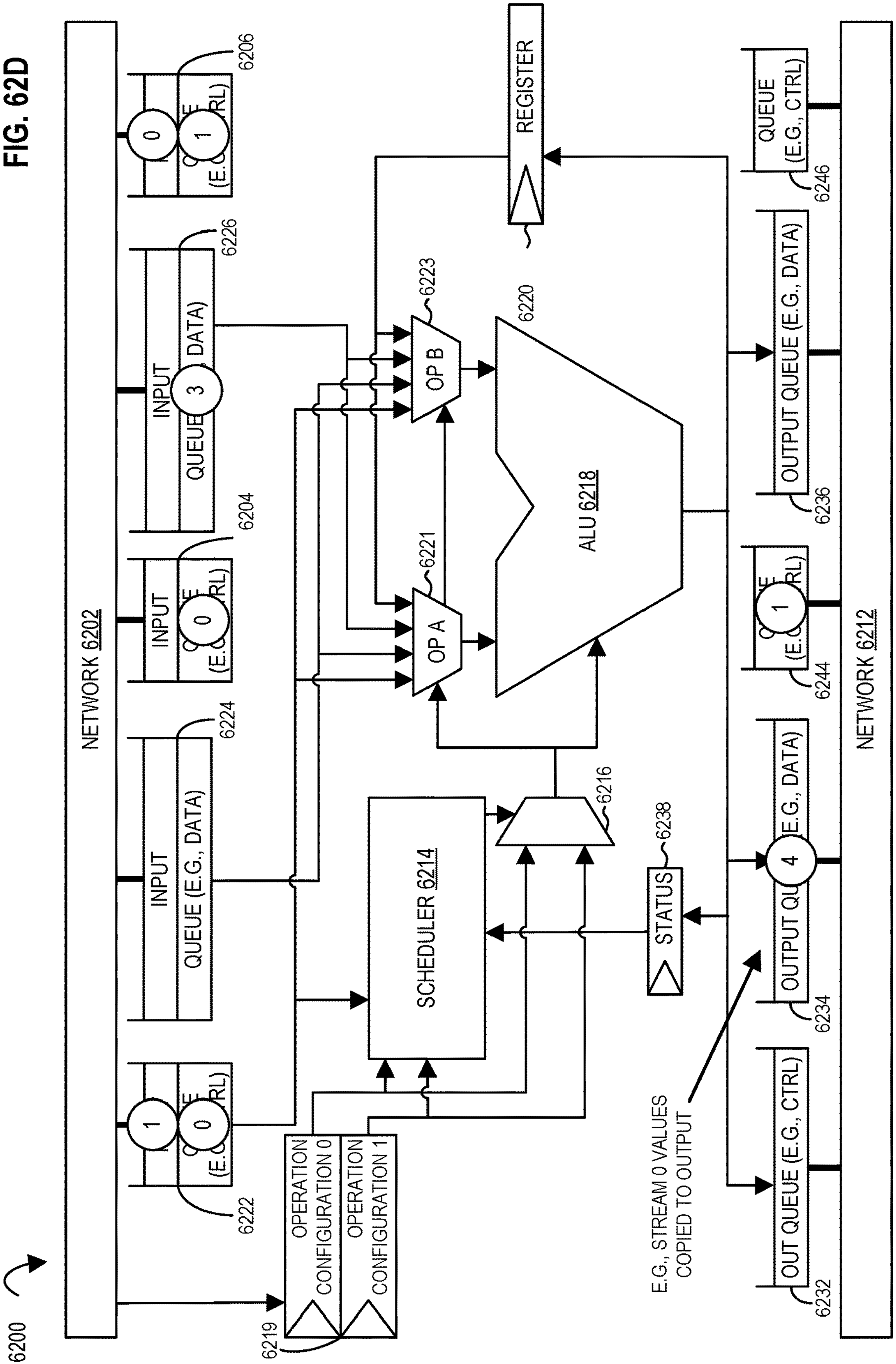

In FIGS. 62B-62D, the pick control value (e.g., selection control bit) in (e.g., pick control) input queue 6222 is a first value (Boolean zero), so PE 6200 (e.g., ALU 6218) is to source the stream (e.g., stream A) from input queue 6224 to an output queue (e.g., output queue 6234), and send the control values for that stream to the associated control queue 6244 and dequeue (e.g., delete) the stream (e.g., stream A) from input queue 6224 and its control values from (e.g., control) input queue 6204.

In FIG. 62C, because the pick control value (e.g., selection control bit) in (e.g., pick control) input queue 6222 is a first value (Boolean zero), the data value of (e.g., integer) two in the first slot of input queue 6224 is sent to output queue 6234 (and/or queue 6236 in another embodiment) and dequeued (e.g., deleted) from the first slot of input queue 6224, a control value of one is sent to the associated control queue 6244 to indicate this is a valid value of a stream and dequeued (e.g., deleted) from the first slot of (e.g., control) input queue 6204. As data value of (e.g., integer) two in the first slot of input queue 6224 is dequeued (e.g., deleted) from the first slot of input queue 6224, the data value of (e.g., integer) four is moved into the first slot from the second slot of input queue 6224 along with the Boolean one moved into the first slot from the second slot of the associated (e.g., control) input queue 6204 to indicate that data value is a valid value of the stream. In FIG. 62C a Boolean zero is then sent (e.g., from an upstream PE that is generating the stream) into the second slot of the associated (e.g., control) input queue 6204 to indicate that data value 4 is the end of the stream. The data value from the output queue (e.g., 6234) and the associated control data from the control queue (e.g., 6244) may be consumed from the output queues, e.g., by a downstream PE or PEs.

In FIG. 62D, the Boolean one in the first slot of the associated (e.g., control) input queue 6204 indicates there are remaining data value or values for that stream (e.g., stream A). Thus, the data value of (e.g., integer) four in the first slot of input queue 6224 is sent to output queue 6234 (and/or queue 6236 in another embodiment) and dequeued (e.g., deleted) from the first slot of input queue 6224, and a control value of one is sent to the associated control queue 6244 to indicate this is a valid value of the stream, the control value is dequeued (e.g., deleted) from the first slot of (e.g., control) input queue 6204, and the Boolean zero is moved into the first slot from the second slot of the associated (e.g., control) input queue 6204 to indicate there are no more data values in that stream.

Figure 62E:
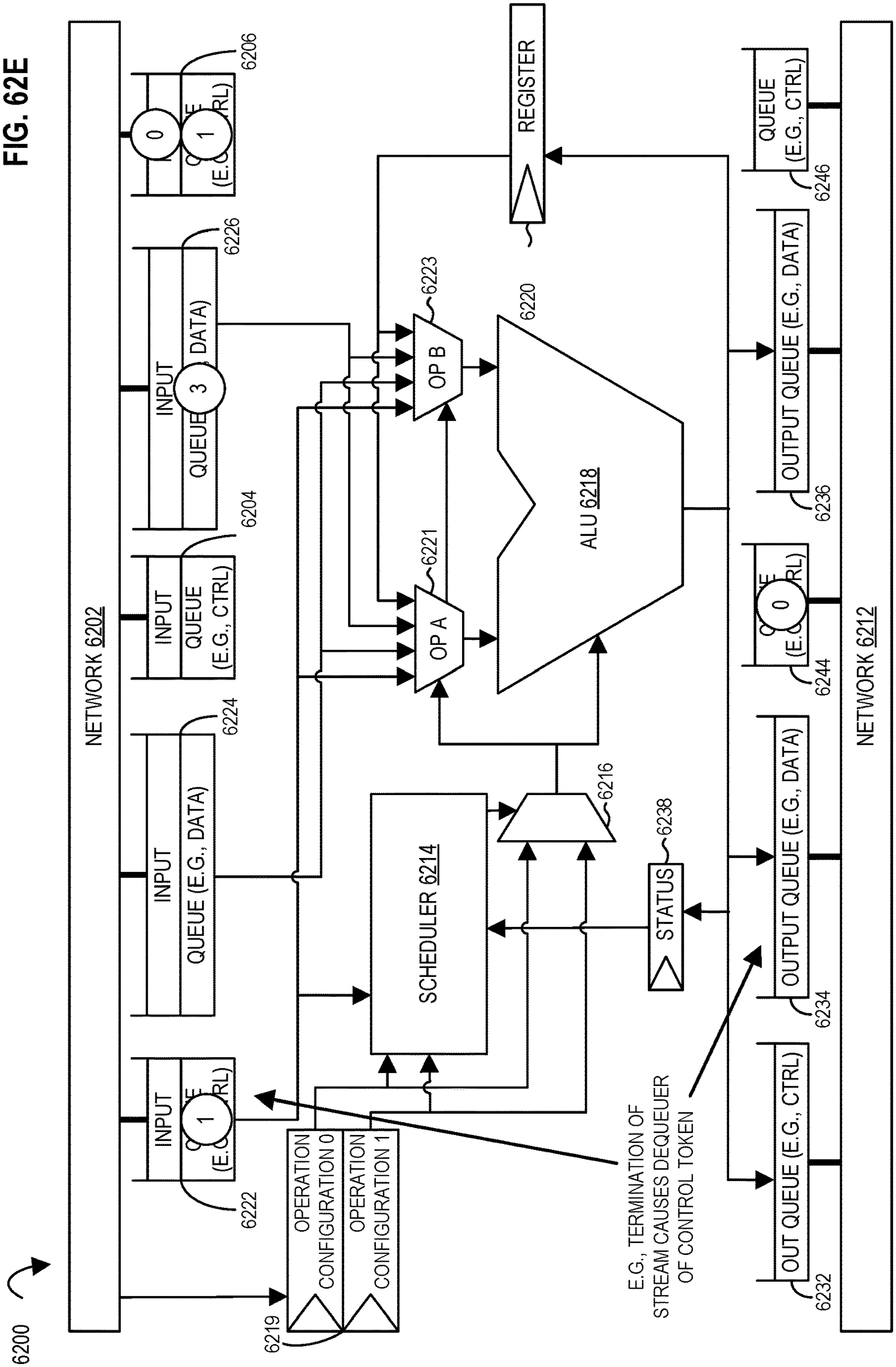

In FIG. 62E, the stream pick operation for stream A from input queue 6224 has been completed by sending that stream (e.g., on an element by element basis) to output queue 6234, so the PE 6200 is to then send a final end-of-stream value (e.g., token) (e.g., Boolean zero) as output into control queue 6244 to indicate this is the end of the picked stream (e.g., stream A), the (Boolean zero) stream control value in the first slot of (e.g., control) input queue 6204 is dequeued (e.g., deleted), the (Boolean zero) pick control value (e.g., selection control bit) in (e.g., pick control) input queue 6222 is dequeued, and the next (Boolean one) pick control value (e.g., selection control bit) is moved from the second slot into the first slot of (e.g., pick control) input queue 6222.

Figure 62F:
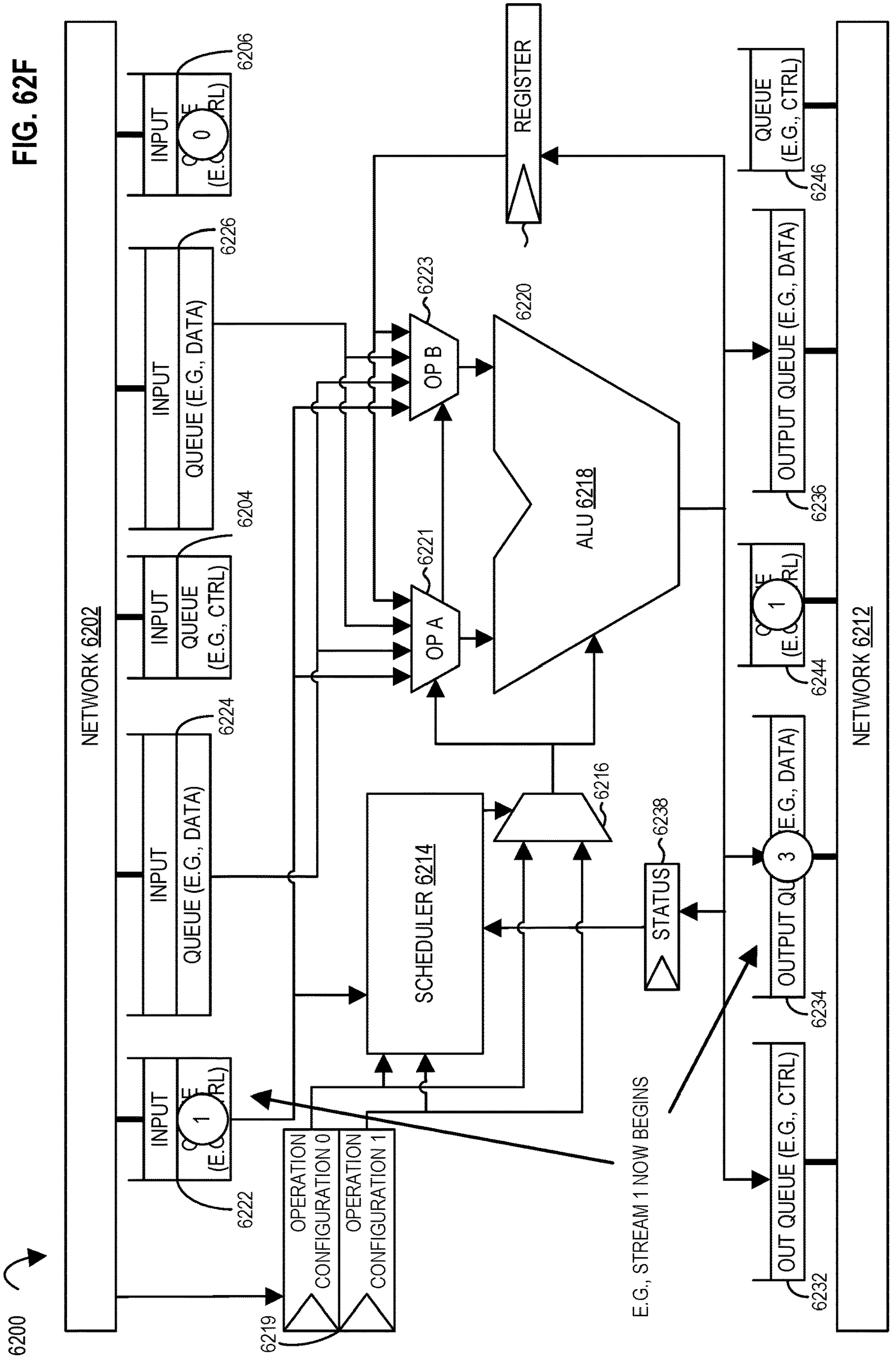

In FIG. 62F, because the pick control value (e.g., selection control bit) in (e.g., pick control) input queue 6222 is a second, different value (Boolean one), the data value of (e.g., integer) three in the first slot of input queue 6226 is sent to output queue 6234 (and/or queue 6236 in another embodiment) and dequeued (e.g., deleted) from the first slot of input queue 6226, a control value of one is sent to the associated control queue 6244 to indicate this is a valid value of a stream and dequeued (e.g., deleted) from the first slot of (e.g., control) input queue 6206. As data value of (e.g., integer) three in the first slot of input queue 6226 is dequeued (e.g., deleted) from the first slot of input queue 6226, there is no more data in the input queue 6226, but the Boolean zero is moved into the first slot from the second slot of the associated (e.g., control) input queue 6206 to indicate that data value three is the end of that input stream (e.g., stream B). The data value from the output queue (e.g., 6234) and the associated control data from the control queue (e.g., 6244) may be consumed from the output queues, e.g., by a downstream PE or PEs.

Figure 62G:
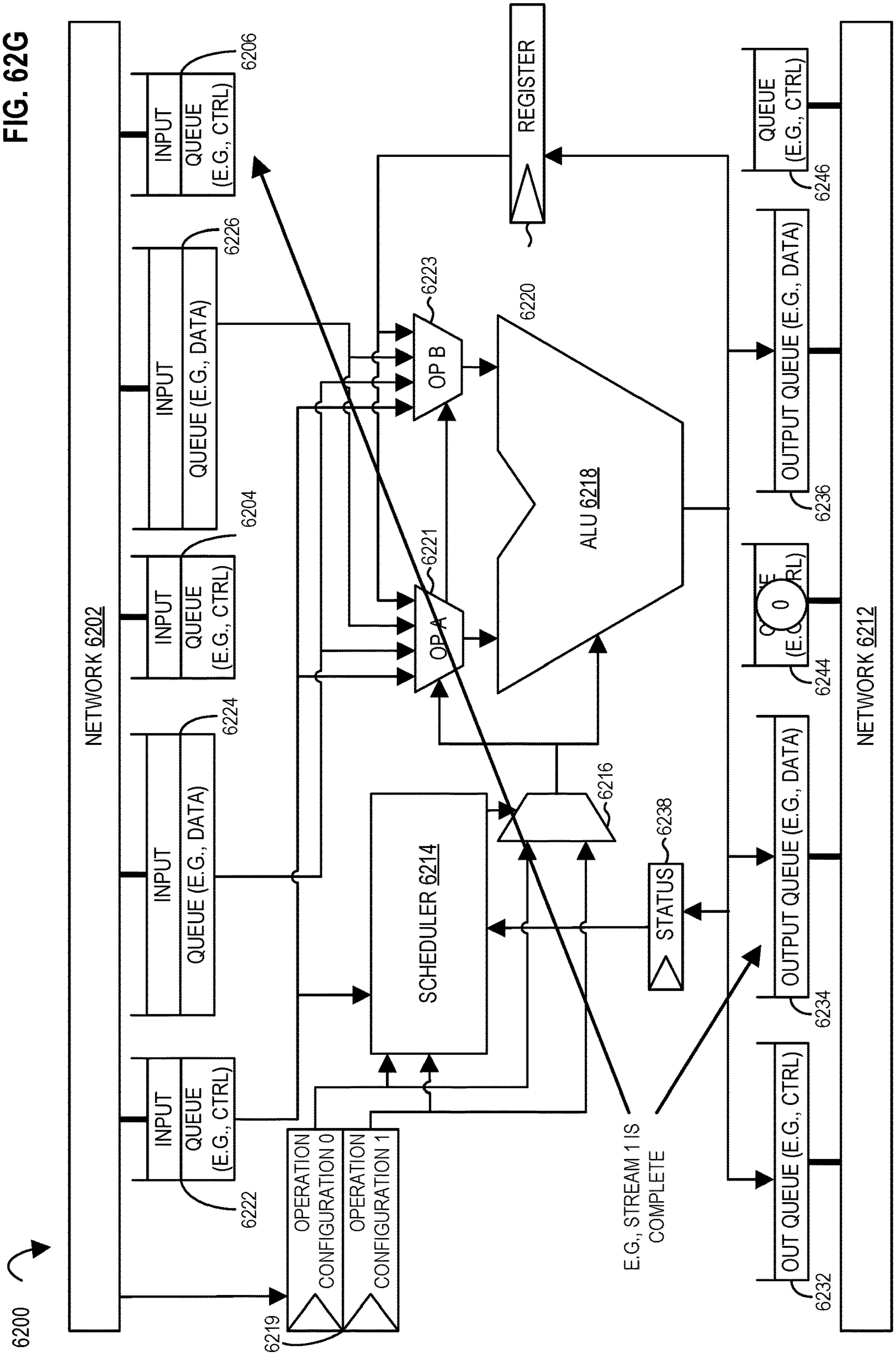

In FIG. 62G, the stream pick operation for stream B from input queue 6226 has been completed by sending that stream (e.g., on an element by element basis) to output queue 6234, so the PE 6200 is to then send a final end-of-stream value (e.g., token) (e.g., Boolean zero) as output into control queue 6244 to indicate this is the end of the picked stream (e.g., stream B), the (Boolean zero) stream control value in the first slot of (e.g., control) input queue 6206 is dequeued (e.g., deleted), the (Boolean one) pick control value (e.g., selection control bit) in (e.g., pick control) input queue 6222 is dequeued, and there are no further pick control values in (e.g., pick control) input queue 6222, e.g., the PE may stop operating at that time.

In certain embodiments, PE 6200 is stalled from performing the pick operation until there is both (i) space available in the output queues that are to be used for storing resultant data, and (ii) pick control value (e.g., selection control bit) and input data for the picked stream.

In certain embodiments, PE 6200 selects a single stream from a pair of streams and copies the entire, single stream to the output using a predicate (e.g., a selection control value) to control the selection.

In the depicted embodiment, PE 6200 includes the components of PE 5800 from FIG. 58, for example, with the components ending with the same two numbers having the same functionality. In one embodiment, scheduler 6214 schedules an operation or operations of processing element 6200 for execution according to the configuration value, e.g., and when input data and control input arrives. See, for example, the discussion of FIGS. 33-57.

Stream Switch

In one embodiment, a CSA architecture includes a configuration value that, when stored into the configuration storage (e.g., register), causes the CSA (e.g., a PE thereof) to perform a Stream Switch operation according to the following (e.g., semantics and/or description).

```
Operation: stswitch{8-64} ctlresa.CRd.i1, valresa.CRd.iN, ctlresb.CRd.i1,
valresb.CRd.iN,
                                        idx.CRLu.i1, ctlseq.CRLu.i1, val.CRLu.iN
Semantics:
// steer a complete stream from the input to the output indicated by the index.
if ( idx ) ) {
    if ( ctlseq.peek ) {
            valresb = val.deq
            ctlresb = ctlseq.deq
        } else {
            ctlresb = ctlseq.deq
            idx.deq
        }
```

-continued

```
} else {
        if ( ctlseq.peek ) {
              valresa = val.deq
              ctlresa = ctlseq.deq
        } else {
              ctlresa = ctlseq.deq
              idx.deq
        }
}
Description: Stream switch allows for the steering of whole streams of data as governed by
the index selection bit
Consider stswitch of:
        Stream (seq bit, val)              { {1,3}, {1,6}, {1,7}, {0}, {1,2}, {1,7}, {0} }
        Idx                                      {0,1}
        Result stream:           {1,3}           // a
                                 {1,6}           // a
                                 {1,7}           // a
                                 {0}             // a
                                                             {1,2}          // b
                                                             {1,7}          // b
                                                             {0}            // b
```

Figure 63A:
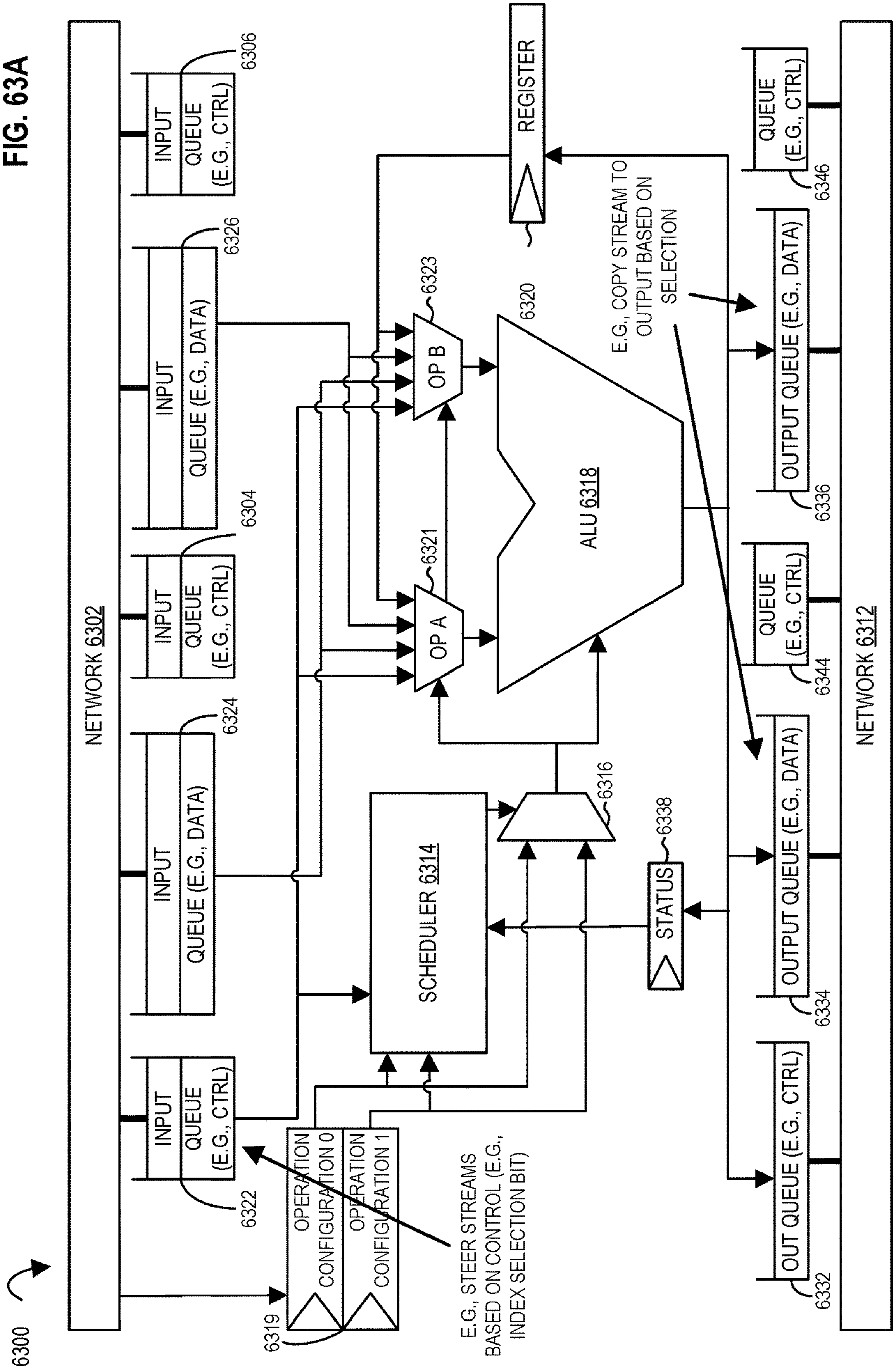
FIGS. 63A-63G illustrate a processing element performing a Stream Switch operation according to embodiments of the disclosure.
Figure 63B:
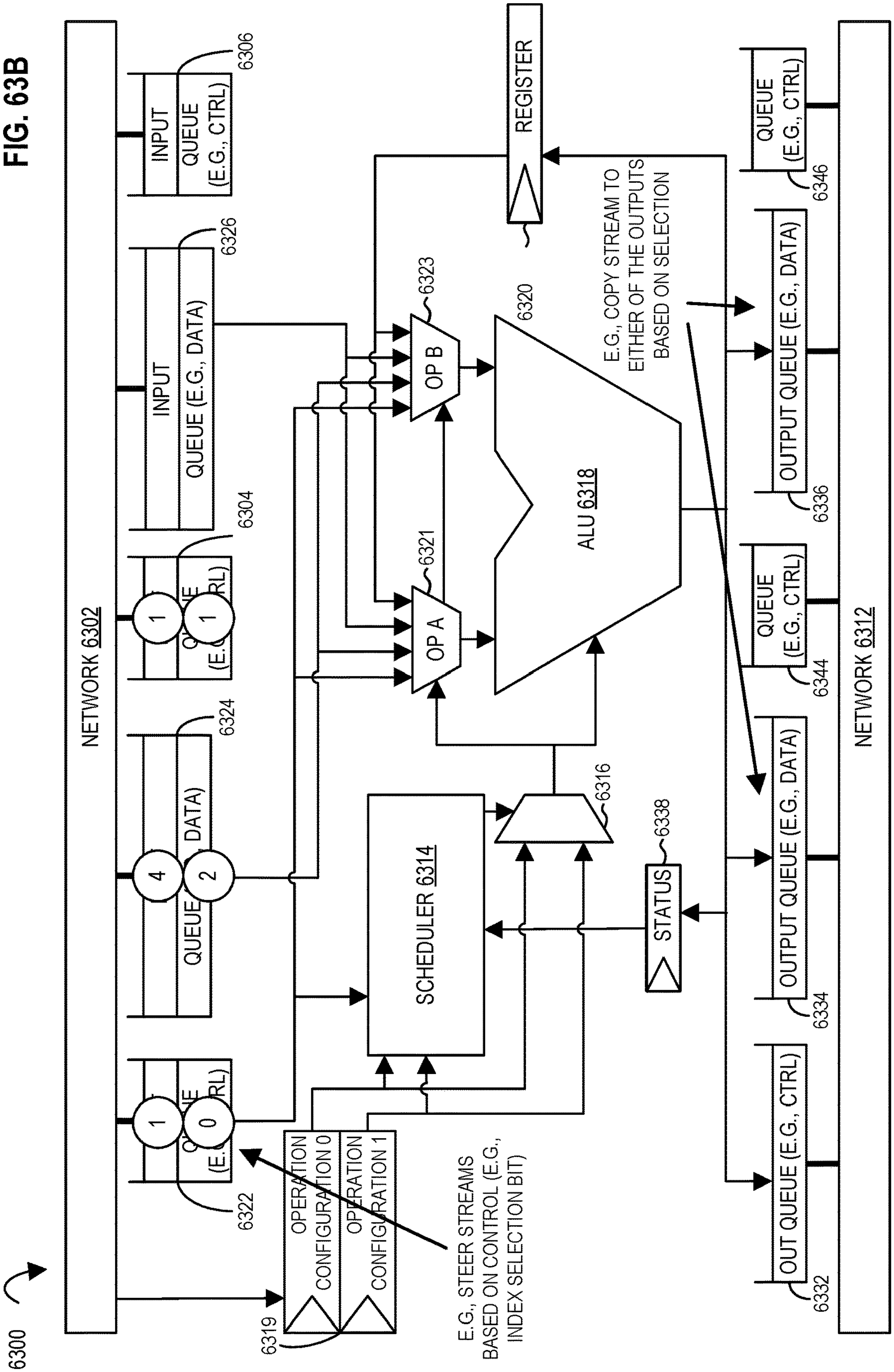

FIGS. 63A-63G illustrate a processing element 6300 performing a Stream Switch operation according to embodiments of the disclosure. In the depicted embodiment, an operation configuration value for a stream switch operation is stored (e.g., during a programming time period) into operation configuration register 6319. As one example, input queue (e.g., having a single bit width) 6304 is provided to receive a stream control value (e.g., token) for one of (i) input queue 6324 (for example, having a multiple bit width, e.g., 8, 16, 32, or 64 as shown above in the example stream comparison opcodes) or (ii) input queue (e.g., having a single bit width) 6306 is provided to receive a stream control value (e.g., token) for input queue 6326 (for example, having a multiple bit width, e.g., 8, 16, 32, or 64 as shown above in the example stream comparison opcodes). In FIG. 63B, the programmed stream switch is to, output an element (e.g., the next element in the single input queue) of stream A to a first output queue (e.g., output queue 6334) when a switch control value (e.g., an index selection bit) is a first value (e.g., Boolean zero) and output the element (e.g., the next element in the single input queue) to a second, different output queue (e.g., output queue 6336) when the switch control value (e.g., the index selection bit) is a second, different value (e.g., Boolean one), e.g., stswitch in the above discussion. In FIGS. 63B-63G, the numbers in the circles for the control bits in queue 6304 indicates a one for each item in a single stream followed by a zero to indicate the end (e.g., termination) of that stream.

In FIG. 63B, a data value of (e.g., integer) two is in a first slot of input queue 6324 along with a Boolean one in a first slot of the associated (e.g., control) input queue 6304 to indicate that data value is a valid value of the stream (e.g., stream A), and a data value of (e.g., integer) four is in a second slot of input queue 6324 along with a Boolean one in a second slot of the associated (e.g., control) input queue 6304 to indicate that data value is a valid value of the stream.

The input data that is queued may be sent from another component of a CSA, e.g., from a plurality of other PEs as discussed herein.

In certain embodiments, the data is read from the first slot of a queue, and when consumed (e.g., removed), any data from other slots of the queue are advanced such that data from the second slot is moved into the first slot, etc.

In FIG. 63B, a switch control value (e.g., selection control bit) has also been provided (e.g., from an upstream PE) and (i) when the switch control value is a first value (e.g., Boolean zero), PE 6300 is to send the stream (e.g., stream A) from input queue 6324 to a first output queue (e.g., output queue 6334), and send the control values for that stream to the associated control queue 6344 and dequeue (e.g., delete) the stream (e.g., stream A) from input queue 6324 and its control values from (e.g., control) input queue 6304, and (ii) when the switch control value is a second, different value (e.g., Boolean one), PE 6300 is to send the stream (e.g., stream A) from input queue 6324 to a second output queue (e.g., output queue 6336), and send the control values for that stream to the associated control queue 6346 and dequeue (e.g., delete) the stream (e.g., stream A) from input queue 6324 and its control values from (e.g., control) input queue 6304.

Figure 63C:
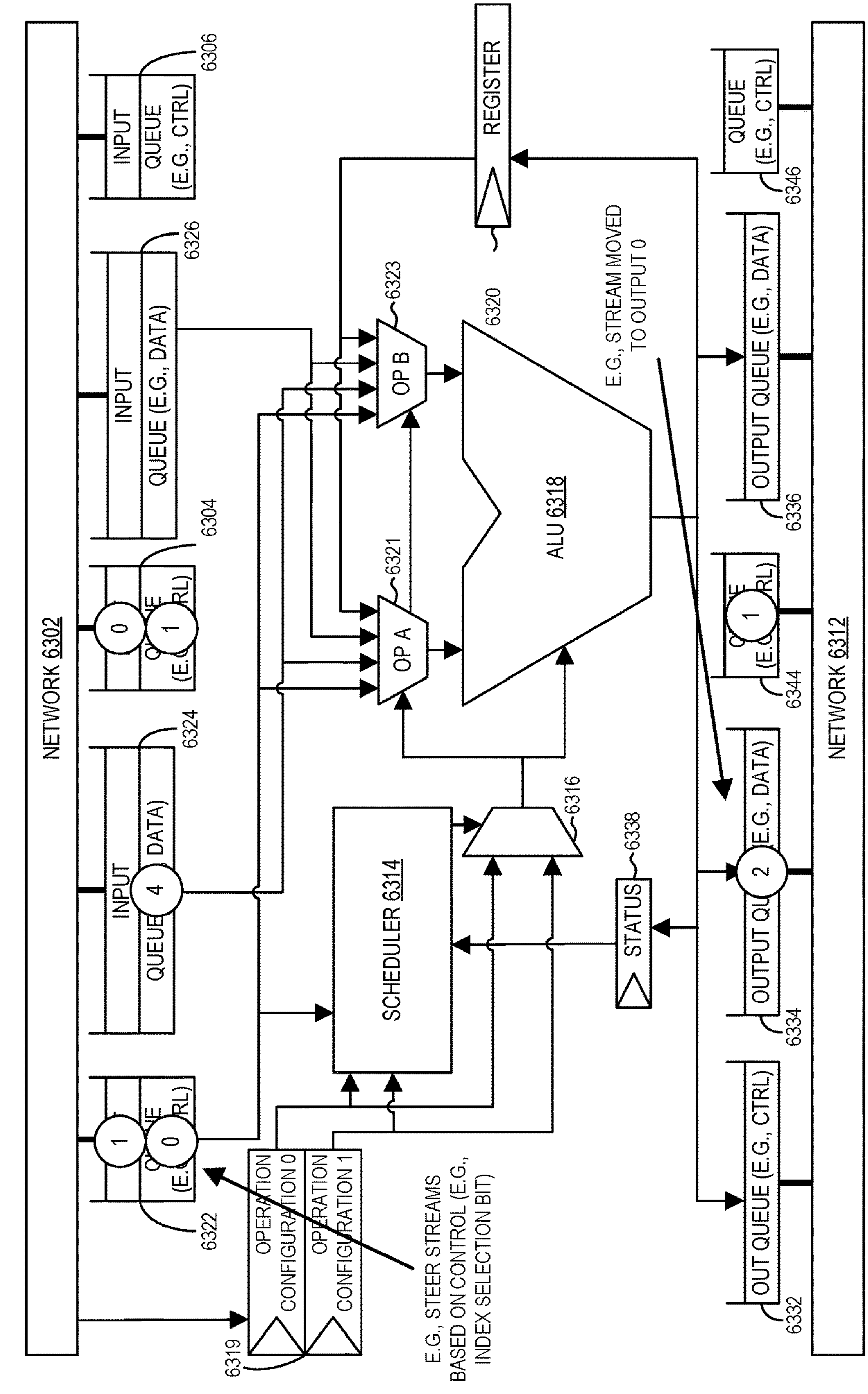

In FIG. 63C, a first switch control value (e.g., selection control bit) having a first value (e.g., Boolean zero) is stored in the first slot of (e.g., switch control) input queue 6322, and a second switch control value (e.g., selection control bit) having a second, different value (e.g., Boolean one) is stored in the second slot of (e.g., control) input queue 6322.

Figure 63D:
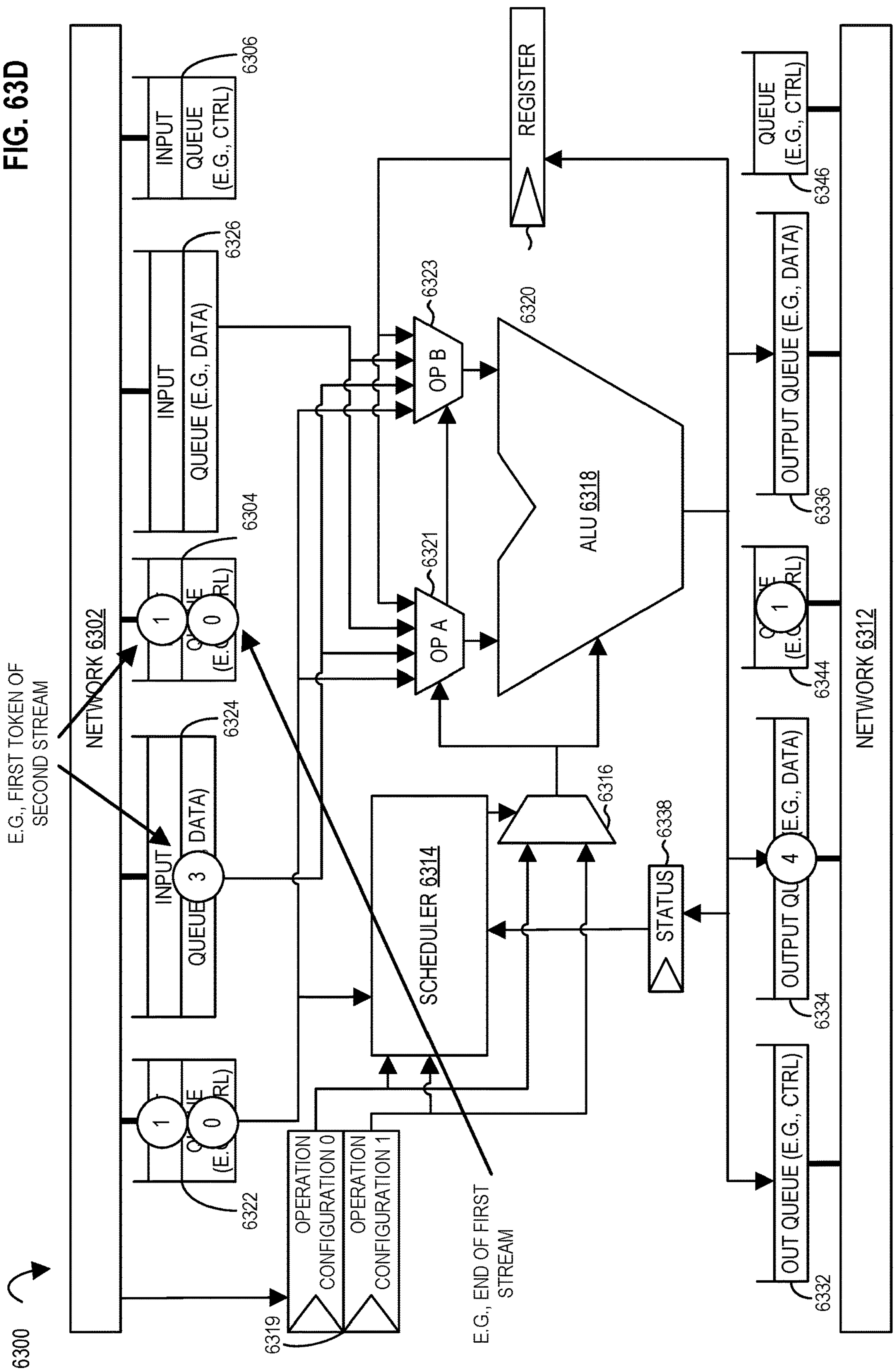

In FIGS. 63C-63D, the switch control value (e.g., selection control bit) in (e.g., switch control) input queue 6322 is a first value (Boolean zero), so PE 6300 (e.g., ALU 6318) is to source the stream (e.g., stream A) from input queue 6324 to a first output queue (e.g., output queue 6334), and send the control values for that stream to the associated control queue 6344 and dequeue (e.g., delete) the stream (e.g., stream A) from input queue 6324 and its control values from (e.g., control) input queue 6304.

In FIG. 63C, because the switch control value (e.g., selection control bit) in (e.g., switch control) input queue 6322 is a first value (Boolean zero), the data value of (e.g., integer) two in the first slot of input queue 6324 is sent to first output queue 6334 and dequeued (e.g., deleted) from the first slot of input queue 6324, a control value of one is sent to the associated control queue 6344 for the first output queue 6334 to indicate this is a valid value of a stream and dequeued (e.g., deleted) from the first slot of (e.g., control) input queue 6304. As data value of (e.g., integer) two in the first slot of input queue 6324 is dequeued (e.g., deleted) from the first slot of input queue 6324, the data value of (e.g., integer) four is moved into the first slot from the second slot of input queue 6324 along with the Boolean one moved into the first slot from the second slot of the associated (e.g., control) input queue 6304 to indicate that data value is a valid value of the stream. In FIG. 63C a Boolean zero is then sent (e.g., from an upstream PE that is generating the stream) into the second slot of the associated (e.g., control) input queue 6304 to indicate that data value 4 is the end of the stream. The data value from the output queue 6334 and the associated control data from the control queue 6344 may be consumed from the output queues, e.g., by a downstream PE or PEs.

In FIG. 63D, the data value of (e.g., integer) four from the first slot of input queue 6324 has been sent to output queue 6334 and dequeued (e.g., deleted) from the first slot of input queue 6324, and a control value of one has been sent to the associated control queue 6344 to indicate this is a valid value of the stream, the control value of one is dequeued (e.g., deleted) from the first slot of (e.g., control) input queue 6304, and the Boolean zero is moved into the first slot from the second slot of the associated (e.g., control) input queue 6304 to indicate there are no more data values in that stream.

In FIG. 63D, a data value of (e.g., integer) three from a second stream is received in the first slot of input queue 6124 along with a Boolean one in the second slot of the associated (e.g., control) input queue 6104 to indicate that data value of three is a valid value of the second stream (e.g., stream B), and no data value is stored in a second slot of input queue 6124 yet.

Figure 63E:
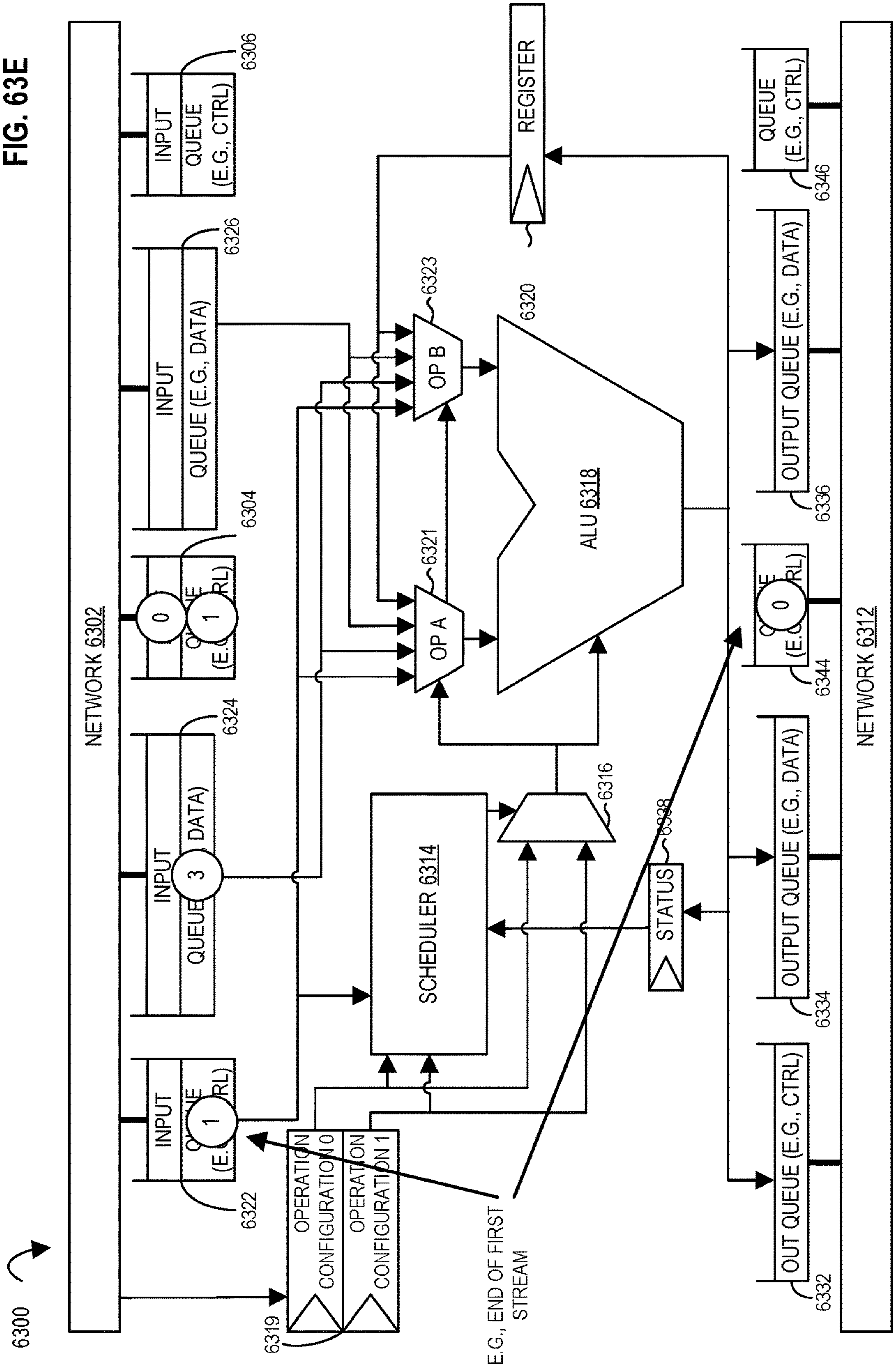

In FIG. 63E, the stream switch operation for stream A from input queue 6324 has been completed by sending that stream (e.g., on an element by element basis) to first output queue 6334, so the PE 6300 is to then send a final end-of-stream value (e.g., token) (e.g., Boolean zero) as output into control queue 6344 to indicate this is the end of the switched stream (e.g., stream A), the (Boolean zero) stream control value in the first slot of (e.g., control) input queue 6304 is dequeued (e.g., deleted), the (Boolean zero) switch control value (e.g., selection control bit) in (e.g., switch control) input queue 6322 is dequeued, and the next (Boolean one) switch control value (e.g., selection control bit) is moved from the second slot into the first slot of (e.g., switch control) input queue 6322.

Figure 63F:
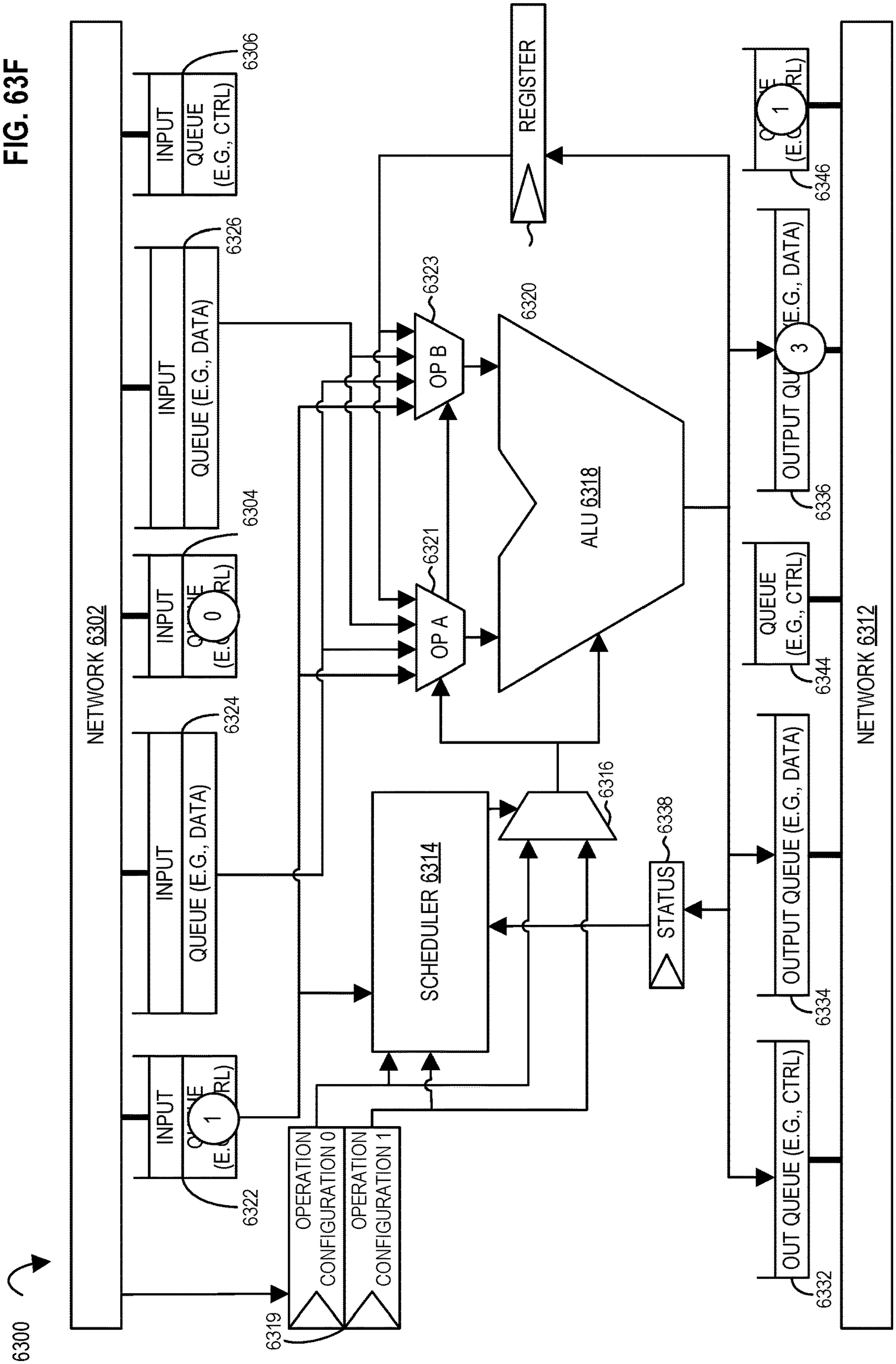

In FIG. 63F, because the switch control value (e.g., selection control bit) in (e.g., switch control) input queue 6322 is a second, different value (Boolean one), the data value of (e.g., integer) three in the first slot of input queue 6324 is sent to output queue 6336 and dequeued (e.g., deleted) from the first slot of input queue 6324, a control value of one is sent to the associated control queue 6346 to indicate this is a valid value of a stream and dequeued (e.g., deleted) from the first slot of (e.g., control) input queue 6304. As data value of (e.g., integer) three in the first slot of input queue 6324 is dequeued (e.g., deleted) from the first slot of input queue 6324, there is no more data in the input queue 6324, but the Boolean zero is moved into the first slot from the second slot of the associated (e.g., control) input queue 6304 to indicate that data value three is the end of that input stream (e.g., stream B). The data value from the output queue 6336 and the associated control data from the control queue 6344 may be consumed from the output queues, e.g., by a downstream PE or PEs.

Figure 63G:
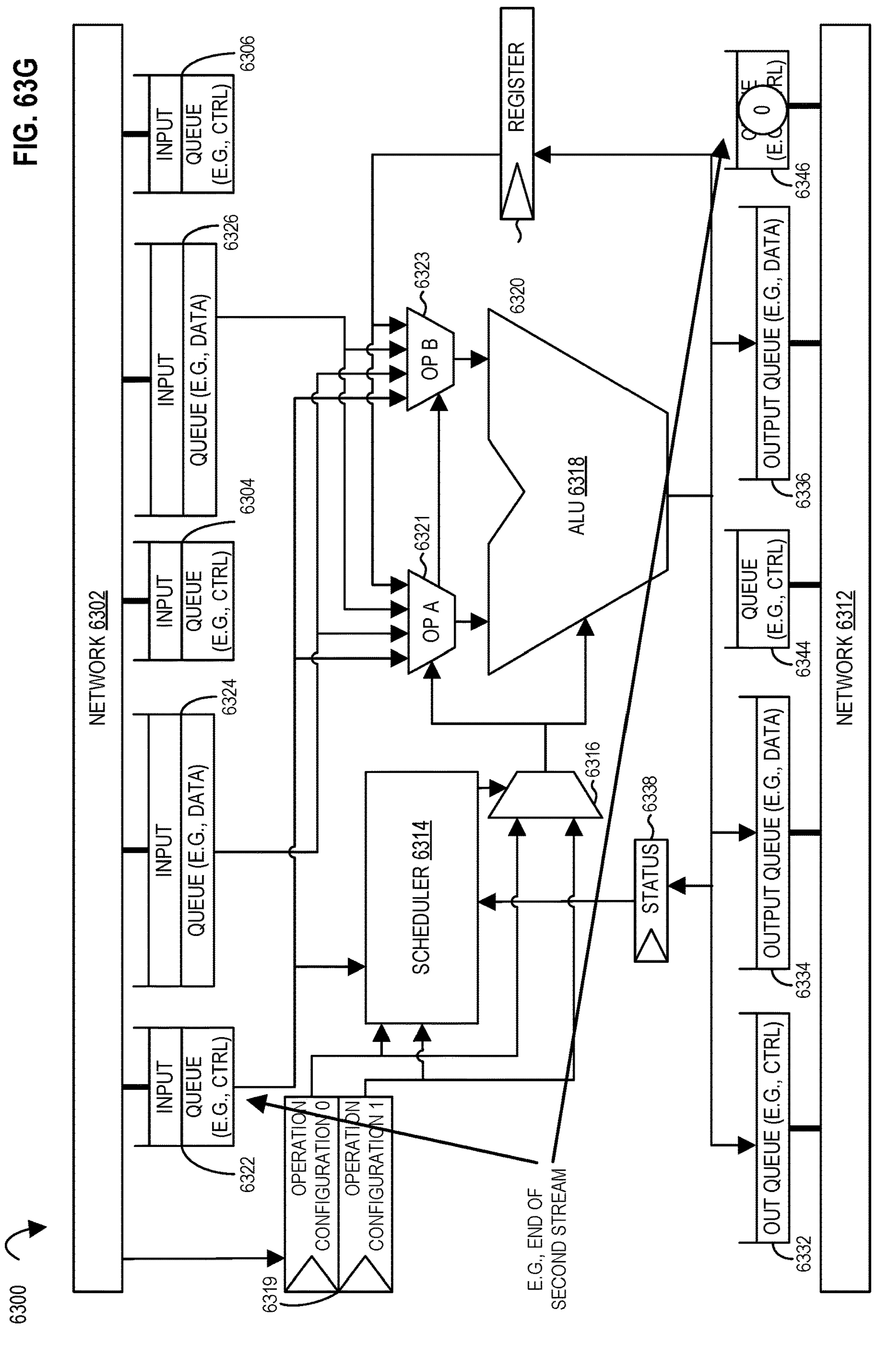

In FIG. 63G, the stream switch operation for stream B from input queue 6324 has been completed by sending that stream (e.g., on an element by element basis) to output queue 6336, so the PE 6300 is to then send a final end-of-stream value (e.g., token) (e.g., Boolean zero) as output into control queue 6346 to indicate this is the end of the switched stream (e.g., stream B), the (Boolean zero) stream control value in the first slot of (e.g., control) input queue 6304 is dequeued (e.g., deleted), the (Boolean one) switch control value (e.g., selection control bit) in (e.g., switch control) input queue 6322 is dequeued, and there are no further switch control values in (e.g., switch control) input queue 6322, e.g., the PE may stop operating at that time.

In certain embodiments, PE 6300 is stalled from performing the switch operation until there is both (i) space available in the output queue that is to be used for storing resultant data, and (ii) the switch control value (e.g., selection control bit) and input data for the switched stream.

In certain embodiments, PE 6300 steers a single stream to one of a plurality of outputs by using a predicate (e.g., a selection control value) to control the selection.

In the depicted embodiment, PE 6300 includes the components of PE 5800 from FIG. 58, for example, with the components ending with the same two numbers having the same functionality. In one embodiment, scheduler 6314 schedules an operation or operations of processing element 6300 for execution according to the configuration value, e.g., and when input data and control input arrives. See, for example, the discussion of FIGS. 33-57.

Is Null

In one embodiment, a CSA architecture includes a configuration value that, when stored into the configuration storage (e.g., register), causes the CSA (e.g., a PE thereof) to perform an Is Null (snull) operation according to the following (e.g., semantics and/or description).

```
Operation: snull res.CRd.i1, ctlseq.CRLu.i1
Semantics:
// determine if current stream has zero length.
// Uses a state bit: "first" initialized to 1
//
// Note that the result is set when the first element of the
// control sequence is read
i1_t value = ctlseq.get
if (first)
    res = ! value
first = ! value
Description: Stream null outputs a
Consider snullof:
    Stream (seq bit) { 1, 1, 1, 0, 0, 1, 1, 0 }
Reflecting a series of stream of length 3, length 0 and length 2.
    Result: {0,1,0}
```

FIGS. 64A-64F illustrate a processing element 6400 performing an IsNull operation according to embodiments of the disclosure. In the depicted embodiment, an operation configuration value for an IsNull operation is stored (e.g., during a programming time period) into operation configuration register 6419. PE 6400 includes state storage 6401 (e.g., a single bit register) to track whether an IsNull value (e.g., token) was submitted for a stream, for example, to track whether a (Boolean) control value of zero indicating a stream includes data values (e.g., is not null) or a (Boolean) control value of one indicating a stream includes no data values (e.g., is null) has been emitted. In one embodiment, the IsNull operation causes PE 6400 to produce a Boolean value (e.g., zero) internally in state storage 6401 when the stream has a length greater than zero (e.g., the stream is not "null") to keep track of whether a false token (e.g., indicating "is not null") has been emitted already for that particular stream of data, e.g., according to the "snull" operation in the above discussion.

In FIGS. 64B-64F, the numbers in the circles for the bits in (e.g., control) input queue 6422 indicate a one for each item in a single stream followed by a zero to indicate the end (e.g., termination) of that stream (e.g., but the associated data values themselves may be stored in a different input queue of the PE), and the numbers in the circles for the bits in (e.g., control) output queue 6432 indicate a (Boolean) control value of zero when a stream includes data values (e.g., is not null) and a (Boolean) control value of one when a stream includes no data values (e.g., is null).

Figure 64A:
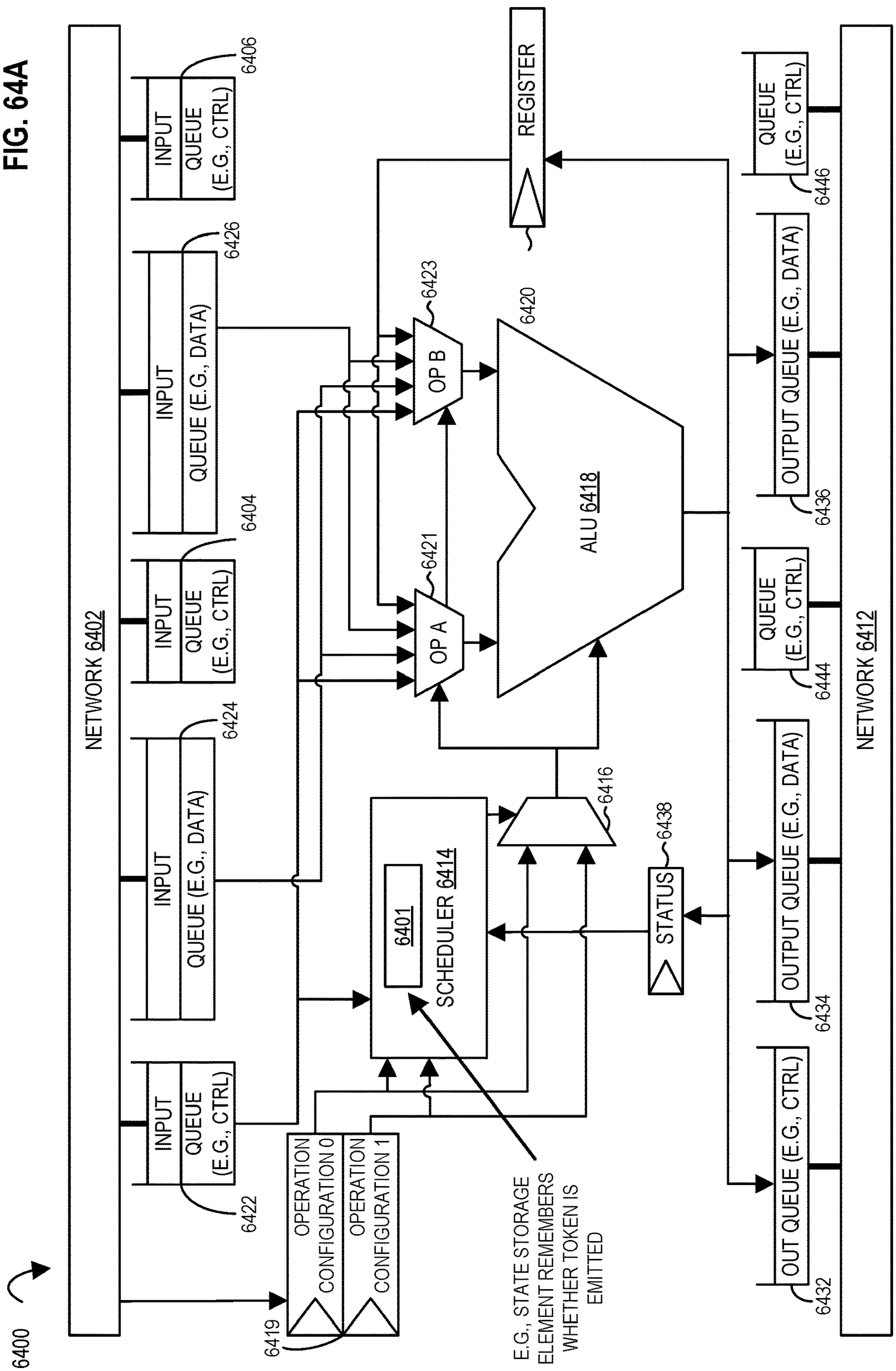
FIGS. 64A-64F illustrate a processing element performing an IsNull operation according to embodiments of the disclosure.
Figure 64B:
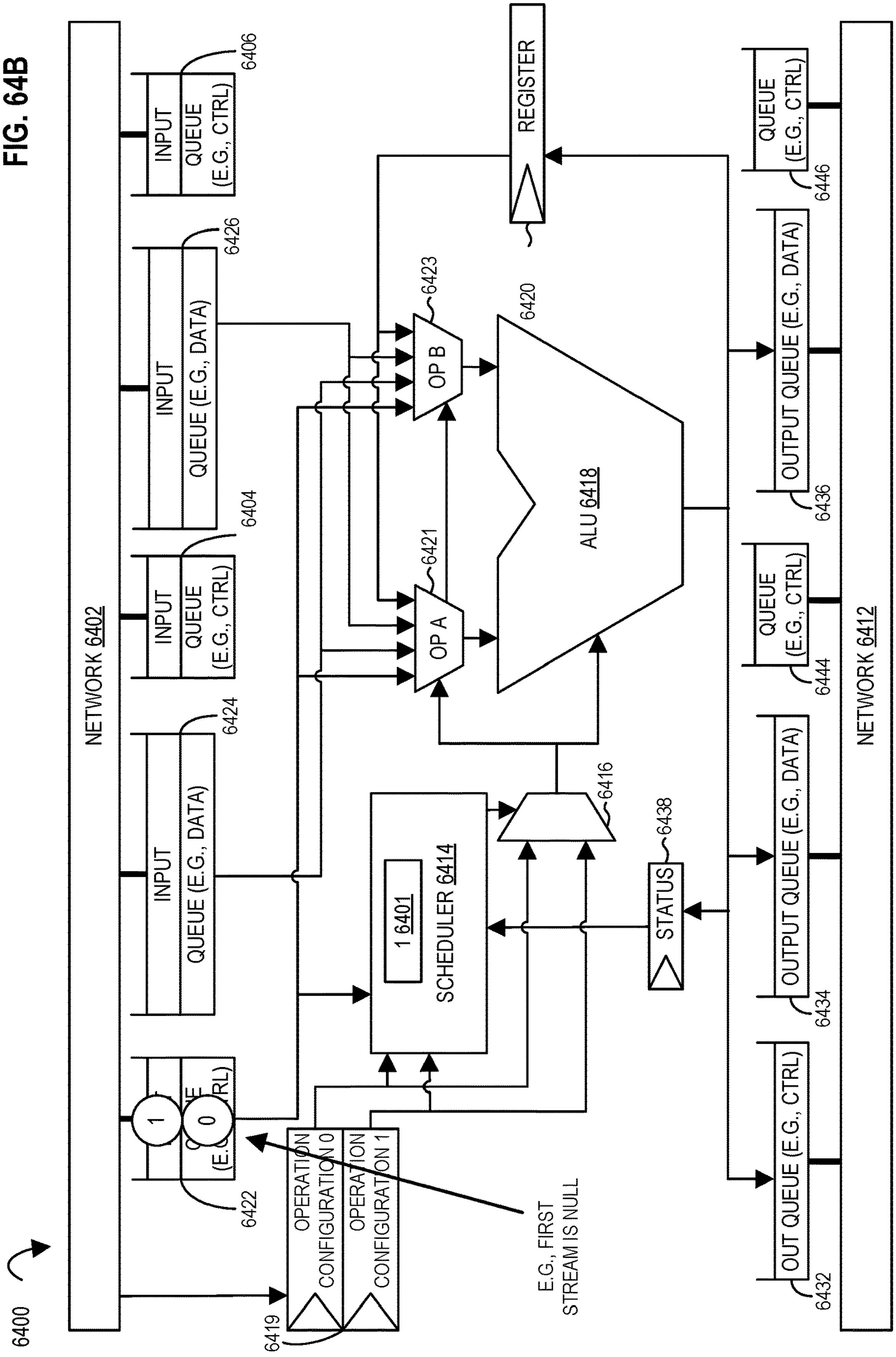

In FIG. 64B, a control value of zero is in a first slot of input queue 6422 to indicate a first stream with no data values (e.g., a null first stream), and a control value of one is in the second slot of (e.g., control) input queue 6422 to indicate a beginning of a valid value of a second stream. The input data that is queued may be sent from another component of a CSA, e.g., from a plurality of other PEs as discussed herein. In certain embodiments, the data is read from the first slot of a queue, and when consumed (e.g., removed), any data from other slots of the queue are advanced such that data from the second slot is moved into the first slot, etc. In the depicted embodiment, the state bit in state storage 6401 was initialized to one previously and remains set at one as a control stream value of one has not been encountered yet.

Figure 64C:
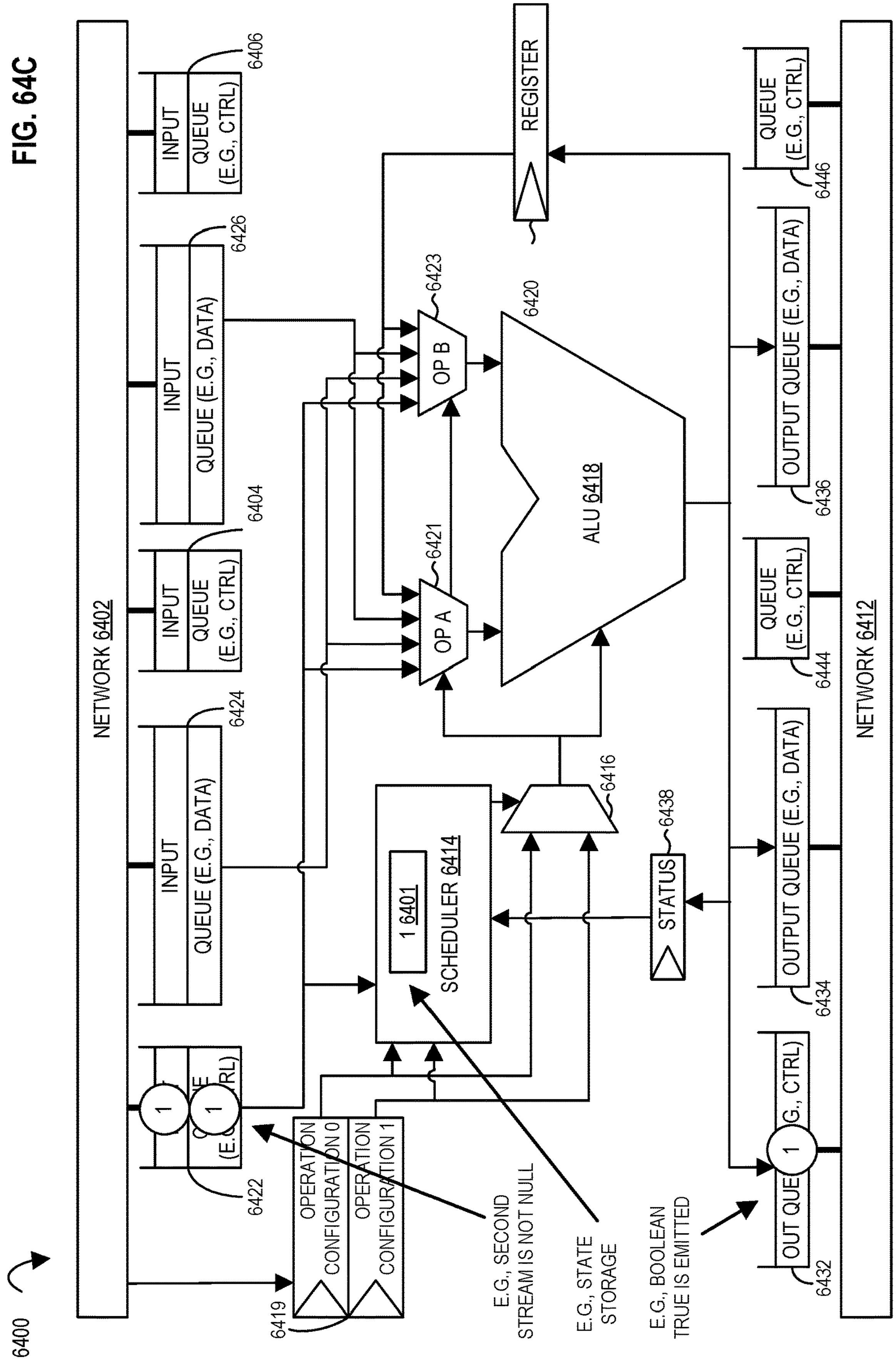

In FIG. 64C, because the first stream has no data values (e.g., a null first stream), a (Boolean) control value of one is stored into output queue 6432 to indicate that the first stream includes no data values (e.g., is null). The state bit in state storage 6401 remains set at one as a control stream value of one has not been encountered yet. The control value of zero is cleared from the first slot of input queue 6422, the control value of one is moved into the first slot from the second slot of (e.g., control) input queue 6422 for a first valid value of the second stream, and a second control value of one is stored in the second slot of (e.g., control) input queue 6422 to indicate a second valid value of the second stream. The (e.g., control) value from the output queue 6432 and the associated data values from the data output queues may be consumed from the output queues, e.g., by a downstream PE or PEs.

Figure 64D:
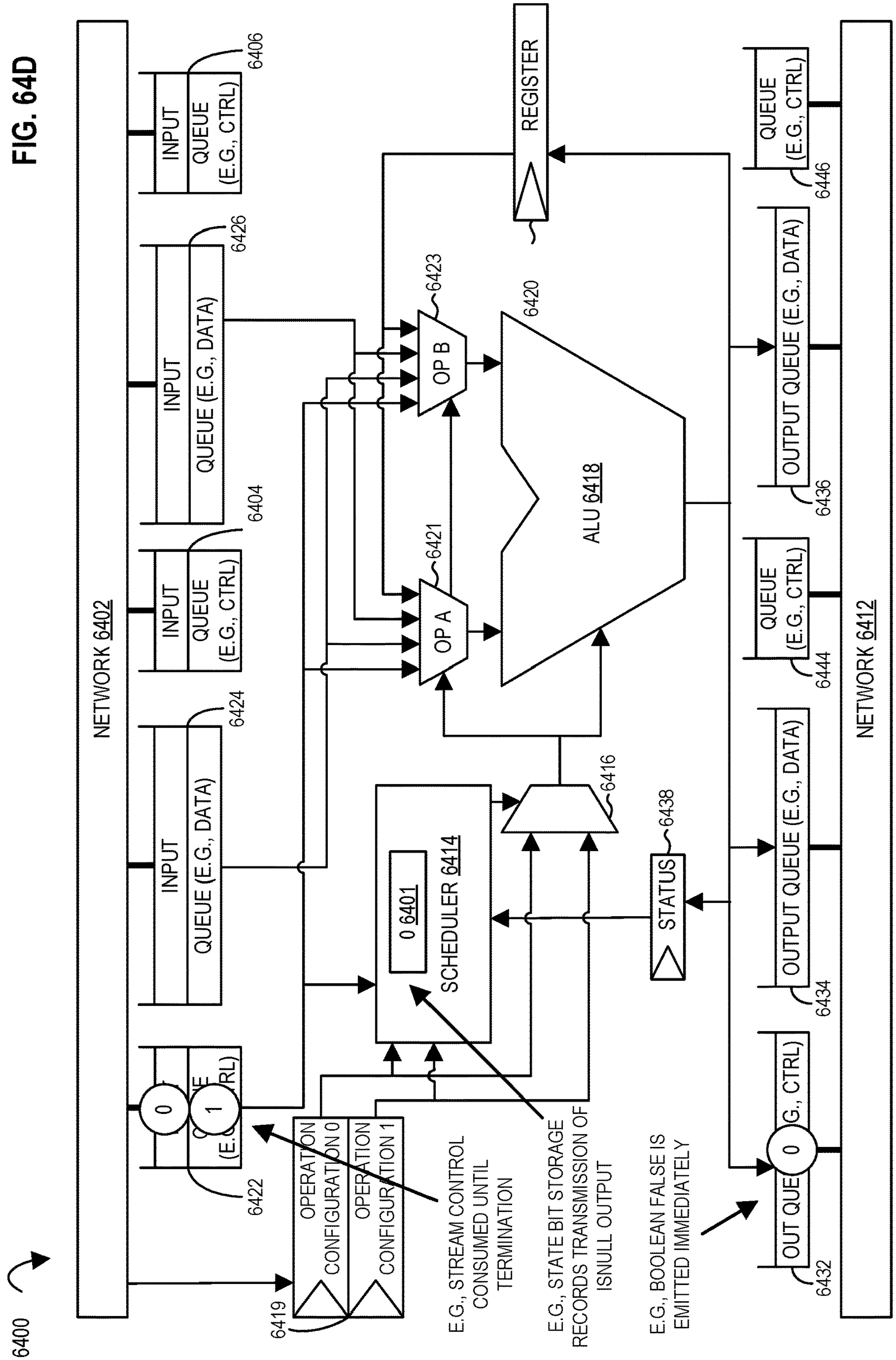

In FIG. 64D, because the second stream has data values (e.g., is not null), a (Boolean) control value of zero is stored into output queue 6432 to indicate that the first stream includes data values (e.g., is not null). The state bit in state storage 6401 is set to zero to indicate that a control stream value of one has been encountered (e.g., to indicate that a control value of zero was stored into output queue 6432 to indicate a non-null stream has been encountered). The control value of one is cleared from the first slot of input queue 6422, the control value of one is moved into the first slot from the second slot of (e.g., control) input queue 6422 for the second valid value of the second stream, and a control value of zero is stored in the second slot of (e.g., control) input queue 6422 to indicate the end of the valid values of the second stream.

Figure 64E:
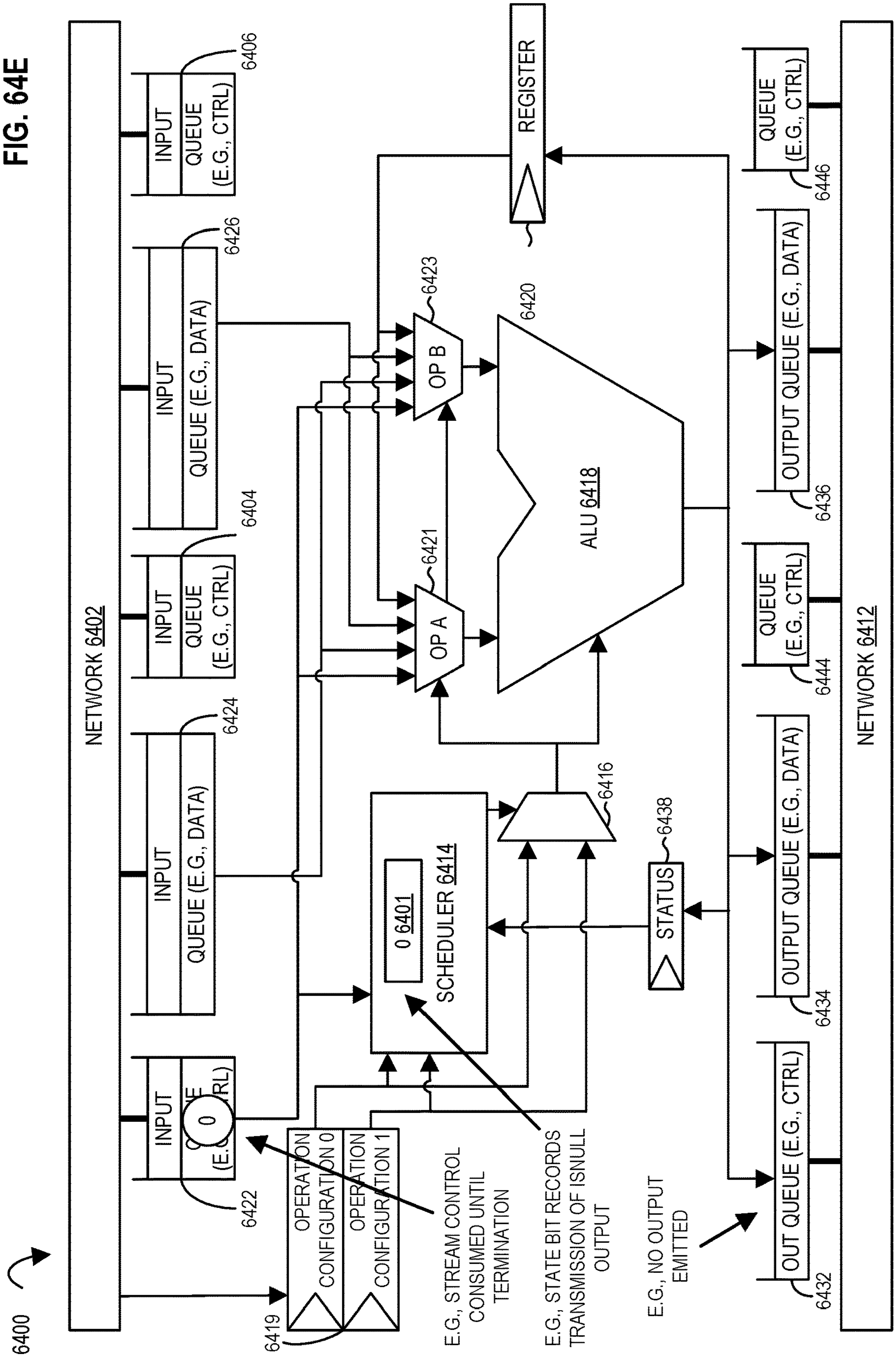

In FIG. 64E, because the second stream has data values (e.g., is not null), a (Boolean) control value of zero was stored into output queue 6432 to indicate that the first stream includes data values (e.g., is null), but because the state bit in state storage 6401 is set to zero to indicate that a control stream value of one has been encountered (e.g., to indicate that a control value of zero was stored into output queue 6432 to indicate a non-null stream has been encountered), no additional (Boolean) control values of zero are stored into output queue 6432 for the second stream. The control value of one is cleared from the first slot of input queue 6422 for the second stream, and the control value of zero is moved into the first slot from the second slot of (e.g., control) input queue 6422 for the end of the valid values of the second stream.

Figure 64F:
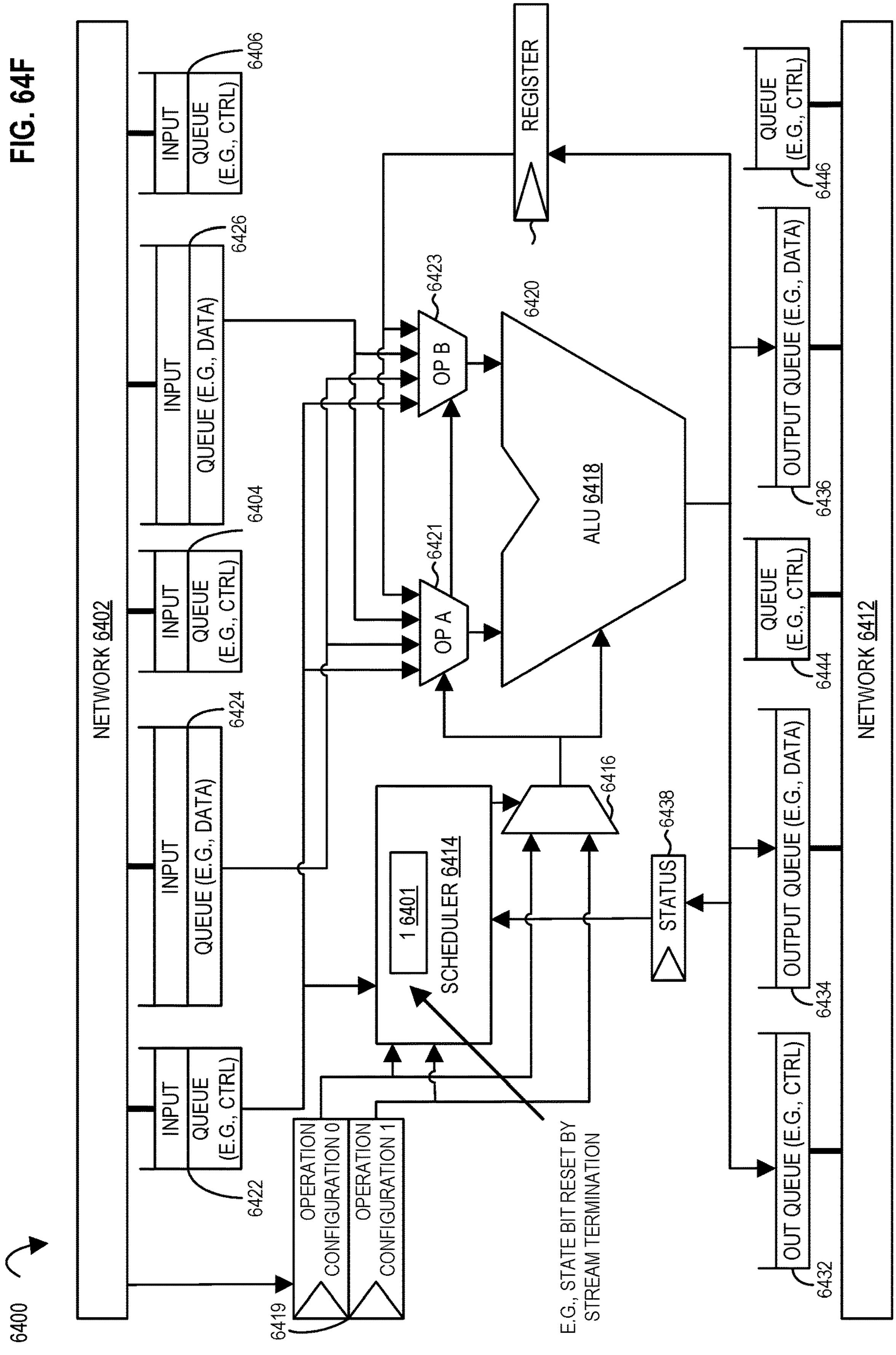

In FIG. 64F, the control value of zero is cleared (e.g., deleted) from the first slot of input queue 6422 for the second stream (e.g., the processing of the second stream by the PE has terminated), and the state bit in state storage 6401 is set to one to re-initialize the state bit.

In certain embodiments, PE 6400 is stalled from performing the IsNull operation until there is both (i) space available in the output queue that is to be used for storing resultant data, and (ii) an input control value in input queue 6422.

In the depicted embodiment, PE 6400 includes the components of PE 5800 from FIG. 58, for example, with the components ending with the same two numbers having the same functionality. In one embodiment, scheduler 6414 schedules an operation or operations of processing element 6400 for execution according to the configuration value, e.g., and when input data and control input arrives. See, for example, the discussion of FIGS. 33-57.

Stream Split

In one embodiment, a CSA architecture includes a configuration value that, when stored into the configuration storage (e.g., register), causes the CSA (e.g., a PE thereof) to perform a Stream Split operation according to the following (e.g., semantics and/or description).

```
Operation: stsplit{0-64} valresa.CRd.iN, cltresa.CRd.i1, valresb.CRd.iN,
ctlresb.CRd.i1, pred.CRLu.i1, ctlseq.CRLu.i1, val.CRLu.iN
            Where T is any type.
Semantics:
// while pred, steer stream to output A. When pred terminates, steer any
// subsequent values to output B. If input stream terminates before the
// predicate stream, the predicate stream is drained before commencing new
// operations. This operation is stateful, with inputDone and predDone .
init:
inputDone = 0
predDone = 0
if (!inputDone) {
    ctlseq.deq
    if(ctlseq) {
        val.deq
        if(!predDone) {
            pred.deq
            // send to output a
            if(pred) {
                valresa = val
                ctlresa = 1
            }
            // close output a, start sending to output b
            else {
```

-continued

```
                predDone = 1
                ctlresa = 0
                valresb = val
                ctlresb = 1
            }
        }
        // continue sending to b.
        else {
            valresb = val
            ctlresb = 1
        }
    }
    // input stream is done. Need to clean up. This is done without
    // a dead cycle.
    else {
        ctlresb = 0
        if(!predDone) {
            ctlresa = 0
            // eliminate dead cycle
            pred.deq
            if(!pred) {
                inputDone = 0
            }
        }
        // predicates also done, prepare for next input
        else {
            inputDone = 0
        }
    }
}
// If input is done, drain pred
else if(!predDone) {
    pred.deq
    if(!pred) {
     inputDone = 0
    }
}
Description: Stream split partitions a stream into two portions, governed by a predicate
stream.
Conisder stsplit of:
        Stream (seq bit, val)          { {1,3}, {1,6}, {1,7}, {0}, {1,2}, {1,7}, {0} }
        Pred                                 {1,0,1,0}
        Result stream:           {1,3}         // a
                                 {0}           // a         {1,6}        // b
                                                            {1,7}        // b
                                                            {0}          // b
                                 {1,2}         // a
                                 {0}           // a         {1,7}        // b
                                                            {0}          // b
```

Figure 65A:
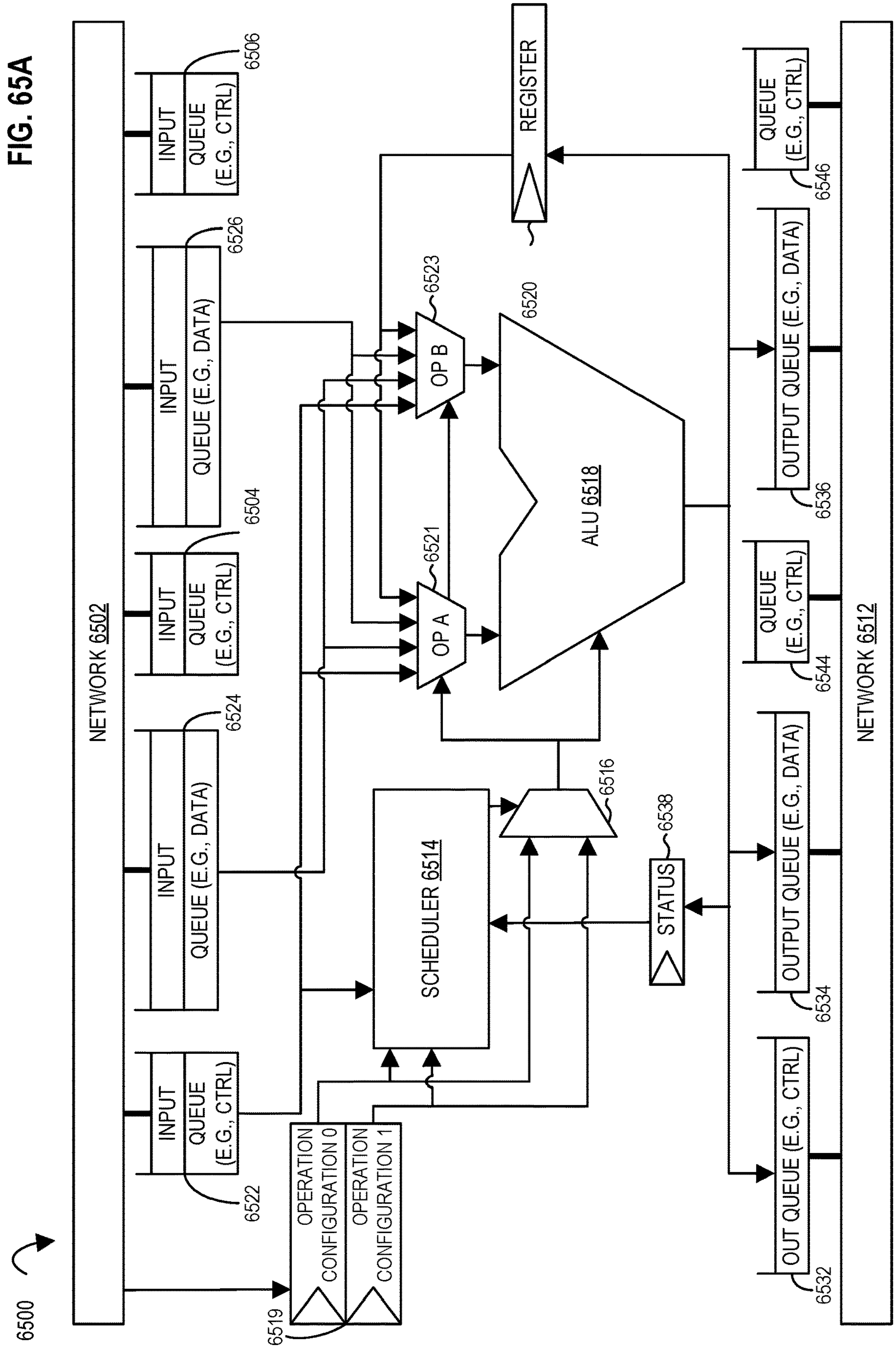
FIGS. 65A-65G illustrate a processing element performing a Stream Split operation according to embodiments of the disclosure.
Figure 65B:
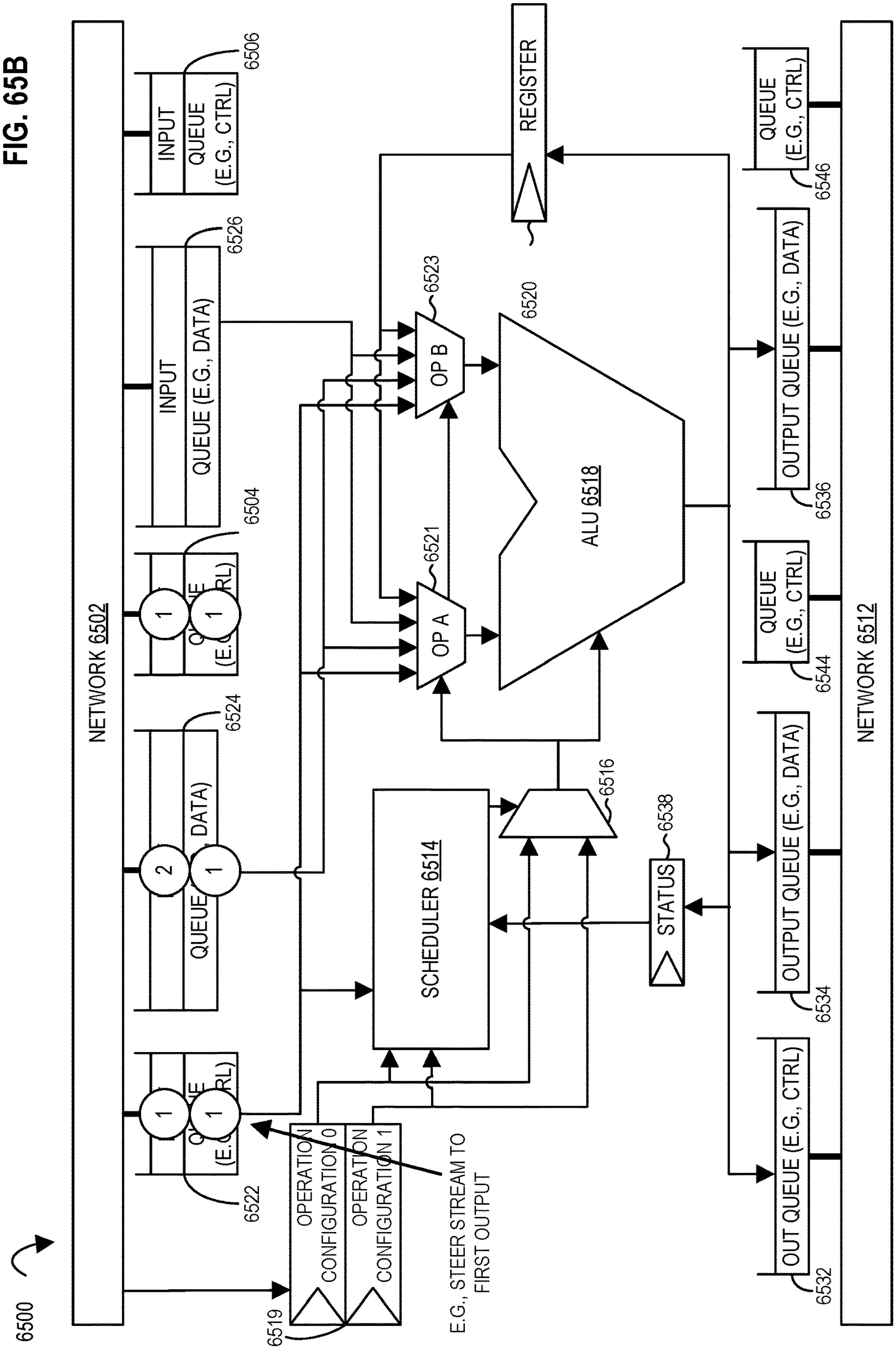

FIGS. 65A-65G illustrate a processing element 6500 performing a Stream Split operation according to embodiments of the disclosure. In the depicted embodiment, an operation configuration value for a stream split operation is stored (e.g., during a programming time period) into operation configuration register 6519. As one example, input queue (e.g., having a single bit width) 6504 is provided to receive a stream control value (e.g., token) for one of (i) input queue 6524 (for example, having a multiple bit width, e.g., 8, 16, 32, or 64 as shown above in the example stream comparison opcodes) or (ii) input queue (e.g., having a single bit width) 6506 is provided to receive a stream control value (e.g., token) for input queue 6526 (for example, having a multiple bit width, e.g., 8, 16, 32, or 64 as shown above in the example stream comparison opcodes). In FIG. 65B, the programmed stream split is to, output an element (e.g., the next element in the single input queue) of stream A to a first output queue (e.g., output queue 6534) when a split control value (e.g., predicate stream) is a first value (e.g., Boolean zero) and output the element (e.g., the next element in the single input queue) to a second, different output queue (e.g., output queue 6536) when the split control value (e.g., predicate stream) is a second, different value (e.g., Boolean one), e.g., stsplit in the above discussion. In FIGS. 65B-65G, the numbers in the circles for the split control bits in input queue 6522 are for a predicate stream, e.g., one or more of a first value (e.g., a one) followed by a zero to indicate the end (e.g., termination) of that predicate stream. In certain embodiments, PE 6500 is to send the elements of a first stream into a first output until the predicate stream terminates (e.g., as indicated by a Boolean zero in input queue 6522), and then the remaining elements of the second stream are sent to a second output until the first stream is terminated (e.g., by a Boolean zero in stream control input queue 6504). In FIGS. 65B-65G, the numbers in the circles for the control bits in queue 6504 indicates a one for each item in a single stream followed by a zero to indicate the end (e.g., termination) of that stream.

In FIGS. 65B-65G, a split control value (e.g., split control bit) has also been provided (e.g., from an upstream PE) and (i) while the split control value is a first value (e.g., Boolean one), PE 6500 is to send the stream (e.g., stream A) from input queue 6524 to a first output queue (e.g., output queue 6534), and send the control values for that stream to the associated control queue 6544 and dequeue (e.g., delete) the stream (e.g., stream A) from input queue 6524 and its control values from (e.g., control) input queue 6504, and (ii) when the split control value changes to a second, different value (e.g., Boolean zero), PE 6500 is to send the rest of the stream (e.g., stream A) from input queue 6524 to a second output queue (e.g., output queue 6536), and send the control values for that stream to the associated control queue 6546 and dequeue (e.g., delete) the stream (e.g., stream A) from input queue 6524 and its control values from (e.g., control) input queue 6504.

In FIG. 65B, a data value of (e.g., integer) one is in a first slot of input queue 6524 along with a Boolean one in a first slot of the associated (e.g., control) input queue 6504 to indicate that data value is a valid value of the stream (e.g., stream A), and a data value of (e.g., integer) two is in a second slot of input queue 6524 along with a Boolean one in a second slot of the associated (e.g., control) input queue 6504 to indicate that data value is a valid value of the stream.

The input data that is queued may be sent from another component of a CSA, e.g., from a plurality of other PEs as discussed herein.

In certain embodiments, the data is read from the first slot of a queue, and when consumed (e.g., removed), any data from other slots of the queue are advanced such that data from the second slot is moved into the first slot, etc.

In FIG. 65B, a split control value of Boolean one is stored in a first slot of the (e.g., split control) input queue 6522 for a predicate stream to steer a first element of the first stream to a first output queue 6534, and a split control value of Boolean one is in a second slot of the associated input queue 6522 for the predicate stream to steer a second element of the first stream to the first output queue 6534.

Figure 65C:
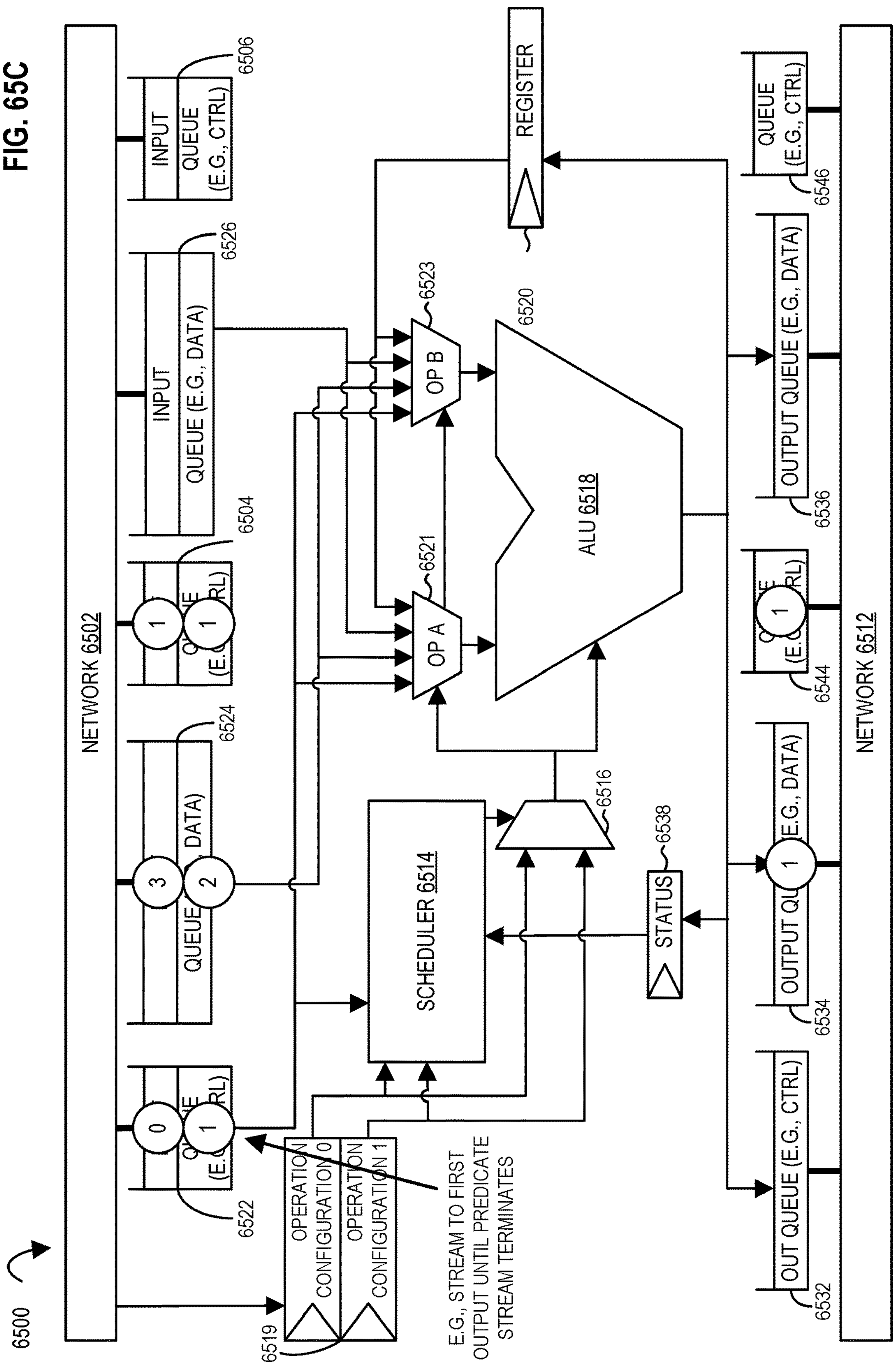

In FIG. 65C, because the first split control value (e.g., selection control bit) stored in the first slot of (e.g., split control) input queue 6522 had a first value (e.g., Boolean one), the data value of (e.g., integer) one from the first slot of input queue 6524 has been sent to output queue 6534 and dequeued (e.g., deleted) from the first slot of input queue 6524, and a control value of one has been sent to the associated control queue 6544 to indicate this is a valid value of the stream and the control value of one is dequeued (e.g., deleted) from the first slot of (e.g., control) input queue 6504, the data value of (e.g., integer) two is moved into the first slot from the second slot of input queue 6524 along with the associated Boolean one moved into the first slot from the second slot of the associated (e.g., control) input queue 6504 to indicate that data value is a valid value of the stream. A data value of (e.g., integer) three is stored in the second slot of input queue 6524 along with a Boolean one in the second slot of the associated (e.g., control) input queue 6504 to indicate that data value is a valid value of the stream.

In FIG. 65C, the first split control value (e.g., selection control bit) has been dequeued from the first slot of (e.g., split control) input queue 6522, the second split control value (e.g., selection control bit) has been moved into the first slot from the second slot of (e.g., split control) input queue 6522, and a third split control value of Boolean zero is stored in the second slot of the associated input queue 6522 to indicate an end of the predicate stream.

The data value from the output queue 6534 and the associated control data from the control queue 6544 may be consumed from the output queues, e.g., by a downstream PE or PEs.

Figure 65D:
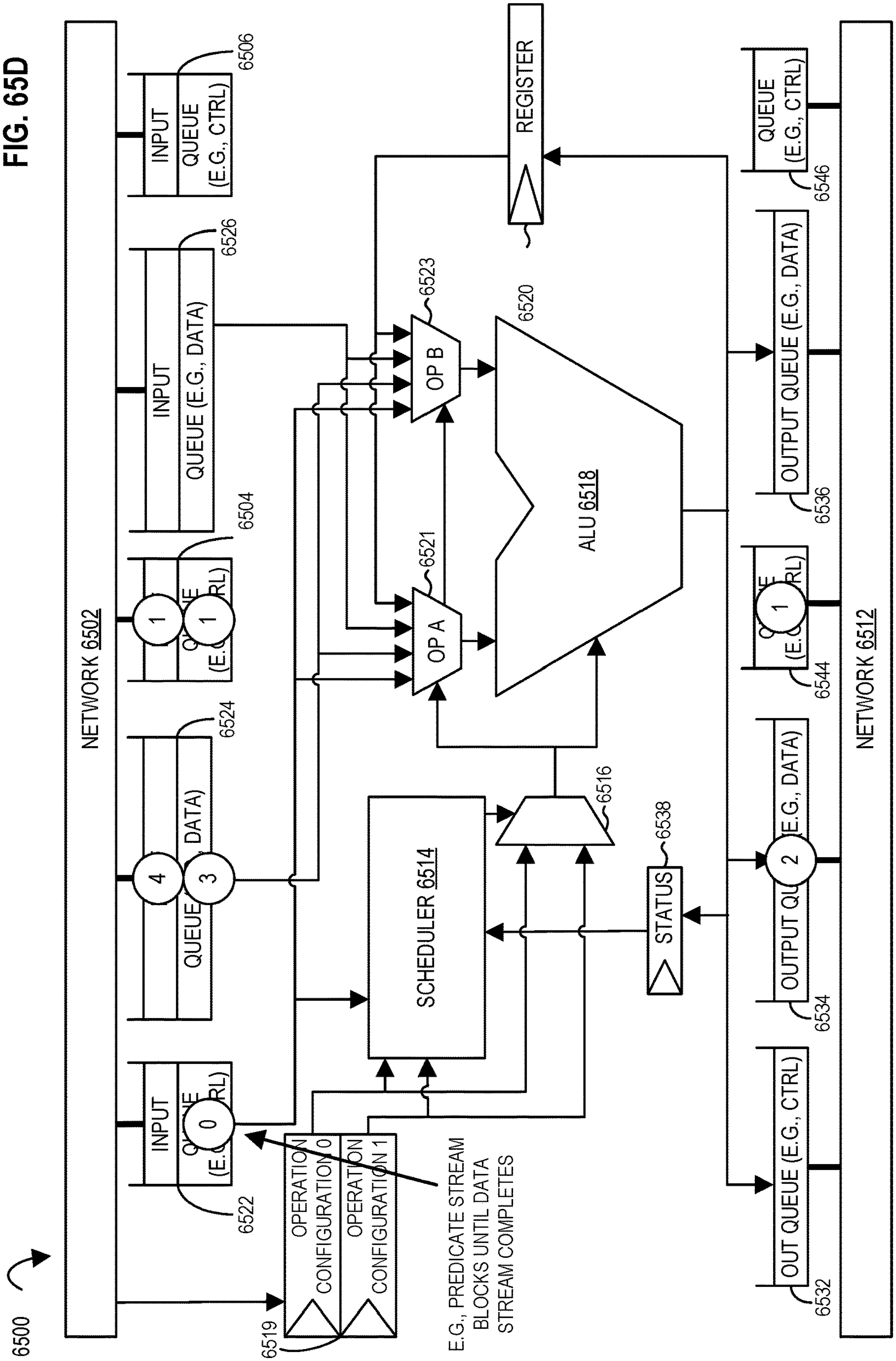

In FIG. 65D, because the second split control value (e.g., selection control bit) stored in the first slot of (e.g., split control) input queue 6522 had a first value (e.g., Boolean one), the data value of (e.g., integer) two from the first slot of input queue 6524 has been sent to output queue 6534 and dequeued (e.g., deleted) from the first slot of input queue 6524, and a control value of one has been sent to the associated control queue 6544 to indicate this is a valid value of the stream and the control value of one is dequeued (e.g., deleted) from the first slot of (e.g., control) input queue 6504, the data value of (e.g., integer) three is moved into the first slot from the second slot of input queue 6524 along with the associated Boolean one moved into the first slot from the second slot of the associated (e.g., control) input queue 6504 to indicate that data value is a valid value of the stream. A data value of (e.g., integer) four is stored in the second slot of input queue 6524 along with a Boolean one in the second slot of the associated (e.g., control) input queue 6504 to indicate that data value is a valid value of the stream.

Figure 65E:
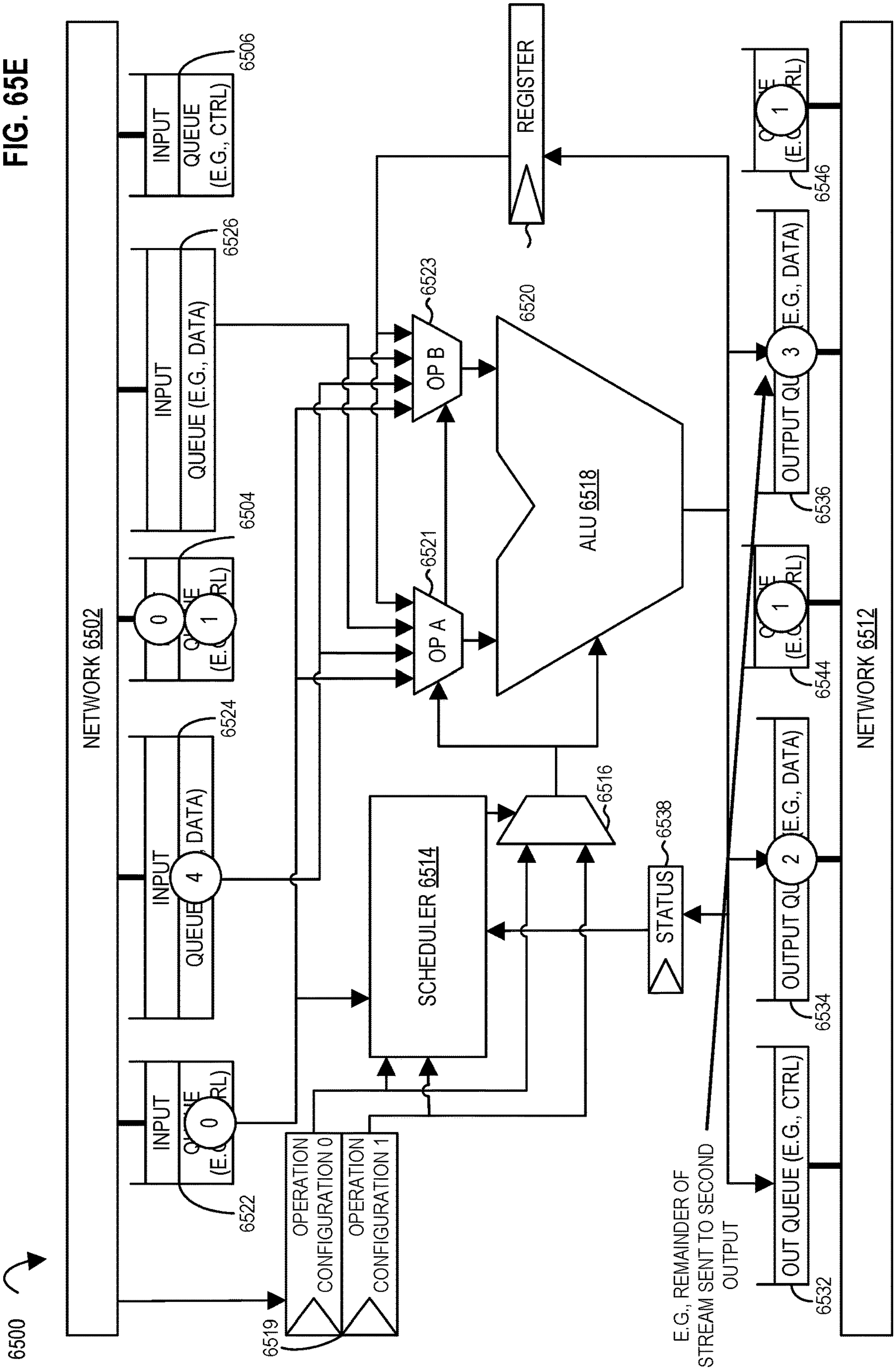

In FIG. 65E, the third split control value (e.g., selection control bit) of Boolean zero in the first slot of (e.g., split control) input queue 6522 indicates the end of the predicate stream, and thus the remaining elements of the first stream are to be moved into the second output queue 6536. In one embodiment, the third split control value (e.g., selection control bit) of Boolean zero remains in the first slot of (e.g., split control) input queue 6522 until the data stream is fully output into the output queues. In another embodiment, the third split control value (e.g., selection control bit) of Boolean zero in the first slot of (e.g., split control) input queue 6522 is cleared but the state is tracked in the PE (e.g., in the scheduler 6519), for example, as discussed below.

In FIG. 65E, because the third split control value (e.g., selection control bit) stored in the first slot of (e.g., split control) input queue 6522 has a second value (e.g., Boolean zero), the data value of (e.g., integer) three from the first slot of input queue 6524 has been sent to output queue 6536 and dequeued (e.g., deleted) from the first slot of input queue 6524, and a control value of one has been sent to the associated control queue 6546 to indicate this is a valid value of the stream and the control value of one is dequeued (e.g., deleted) from the first slot of (e.g., control) input queue 6504, the data value of (e.g., integer) four is moved into the first slot from the second slot of input queue 6524 along with the associated Boolean one moved into the first slot from the second slot of the associated (e.g., control) input queue 6504 to indicate that data value is a valid value of the stream. A control value of Boolean zero is stored in the second slot of the associated (e.g., control) input queue 6504 to indicate that data value of integer four is the last valid value of the stream. The data value from the output queue 6534 and the associated control data from the control queue 6544 may be consumed from the output queues, e.g., by a downstream PE or PEs. The data value from the output queue 6536 and the associated control data from the control queue 6546 may be consumed from the output queues, e.g., by a downstream PE or PEs.

Figure 65F:
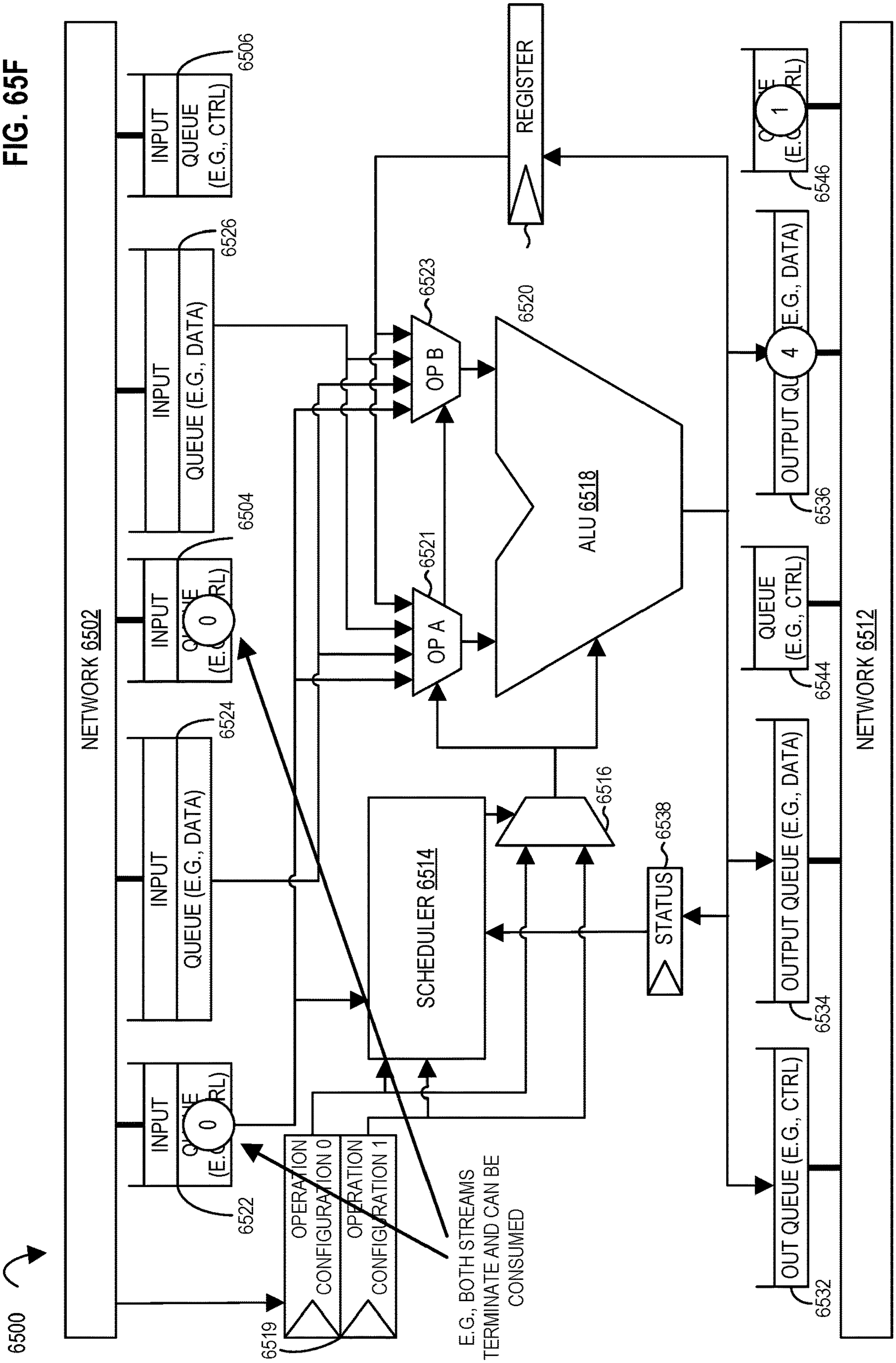

In FIG. 65F, because the third split control value (e.g., selection control bit) stored in the first slot of (e.g., split control) input queue 6522 has a second value (e.g., Boolean zero), the data value of (e.g., integer) four from the first slot of input queue 6524 has been sent to output queue 6536 and dequeued (e.g., deleted) from the first slot of input queue 6524, and a control value of one has been sent to the associated control queue 6546 to indicate this is a valid value of the stream and the control value of one is dequeued (e.g., deleted) from the first slot of (e.g., control) input queue 6504. The control value of Boolean zero is moved into the first slot from the second slot of the associated (e.g., control) input queue 6504 to indicate that data value of integer four was the last valid value of the stream. In the depicted embodiment, as the third split control value (e.g., selection control bit) stored in the first slot of (e.g., split control) input queue 6522 has a value of Boolean zero to indicate the end of the predicate stream and the first slot of (e.g., control) input queue 6504 has a control value of zero to indicate the end of the data stream, both streams are terminated and thus the first slot of (e.g., split control) input queue 6522 and the first slot of (e.g., control) input queue 6504 are ready to be cleared. The data value from the output queue 6536 and the associated control data from the control queue 6546 may be consumed from the output queues, e.g., by a downstream PE or PEs.

Figure 65G:
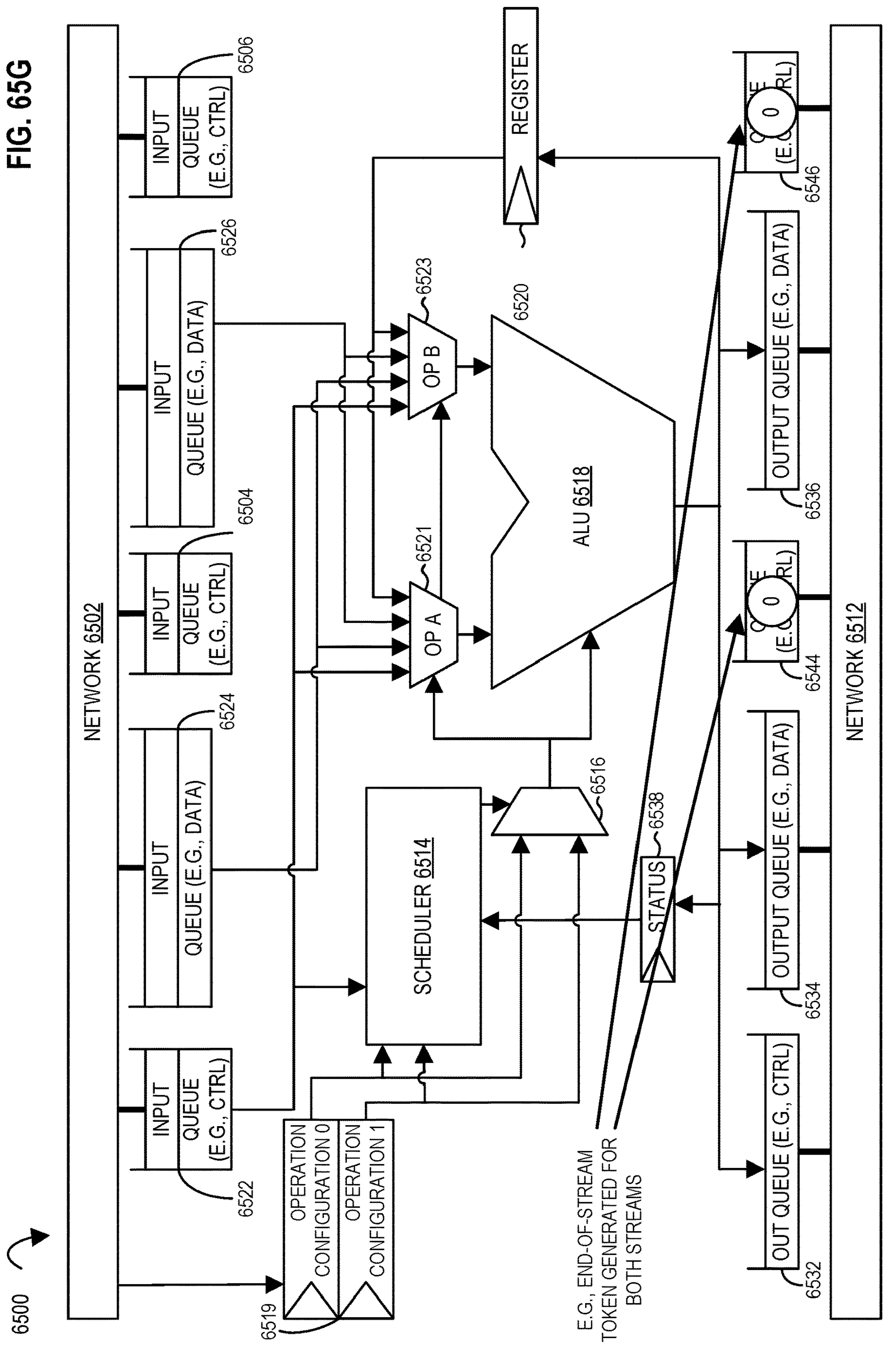

In FIG. 65G, the first slot of (e.g., split control) input queue 6522 and the first slot of (e.g., control) input queue 6504 cleared, a control value of zero has been sent to the associated control queue 6544 to indicate the end of the stream in output queue 6534, and a control value of zero has been sent to the associated control queue 6546 to indicate the end of the stream in output queue 6536.

In certain embodiments, PE 6500 is stalled from performing the split operation until there is both (i) space available in the output queue that is to be used for storing resultant data, and (ii) the split control value (e.g., selection control bit) and input data for the split stream.

In certain embodiments, PE 6500 steers a single stream to one of a plurality of outputs by using a predicate (e.g., a split control value) (and optionally, a count) to control the selection, for example, moving the first two elements of an input stream to a first output and the remainder of the input stream to a second output. In certain embodiments, the data stream is shorter than the predicate stream and the extra predicates are discarded.

In the depicted embodiment, PE 6500 includes the components of PE 5800 from FIG. 58, for example, with the components ending with the same two numbers having the same functionality. In one embodiment, scheduler 6514 schedules an operation or operations of processing element 6500 for execution according to the configuration value, e.g., and when input data and control input arrives. See, for example, the discussion of FIGS. 33-57.

In one embodiment, a PE performing a stream split operation is to send outputs (e.g., tokens) (e.g., store data into the PEs output queues) only at termination of both predicate and input stream. In another embodiment, e.g., to avoid stalling while waiting for these values, state storage is added to track when a stream termination value (e.g., Boolean zero) has been sent. In one embodiment, only one of a predicate stream and a data stream terminate first, so a PE utilized a single bit of state storage, although a plurality of bits of state storage may be used.

FIGS. 66A-66G illustrate a processing element 6600 performing a Stream Split operation according to embodiments of the disclosure. In the depicted embodiment, an operation configuration value for a stream split operation is stored (e.g., during a programming time period) into operation configuration register 6619. In one embodiment, the Stream Split operation causes PE 6400 to produce Boolean values (e.g., zero or one) internally in state storage 3.6605 to track whether end of stream output values have been sent for first output queue 6634 (e.g., sent to control output queue 6644) and/or in state storage 6605 to track whether end of stream output values have been sent for second output queue 6636 (e.g., sent to control output queue 6646).

Figure 66A:
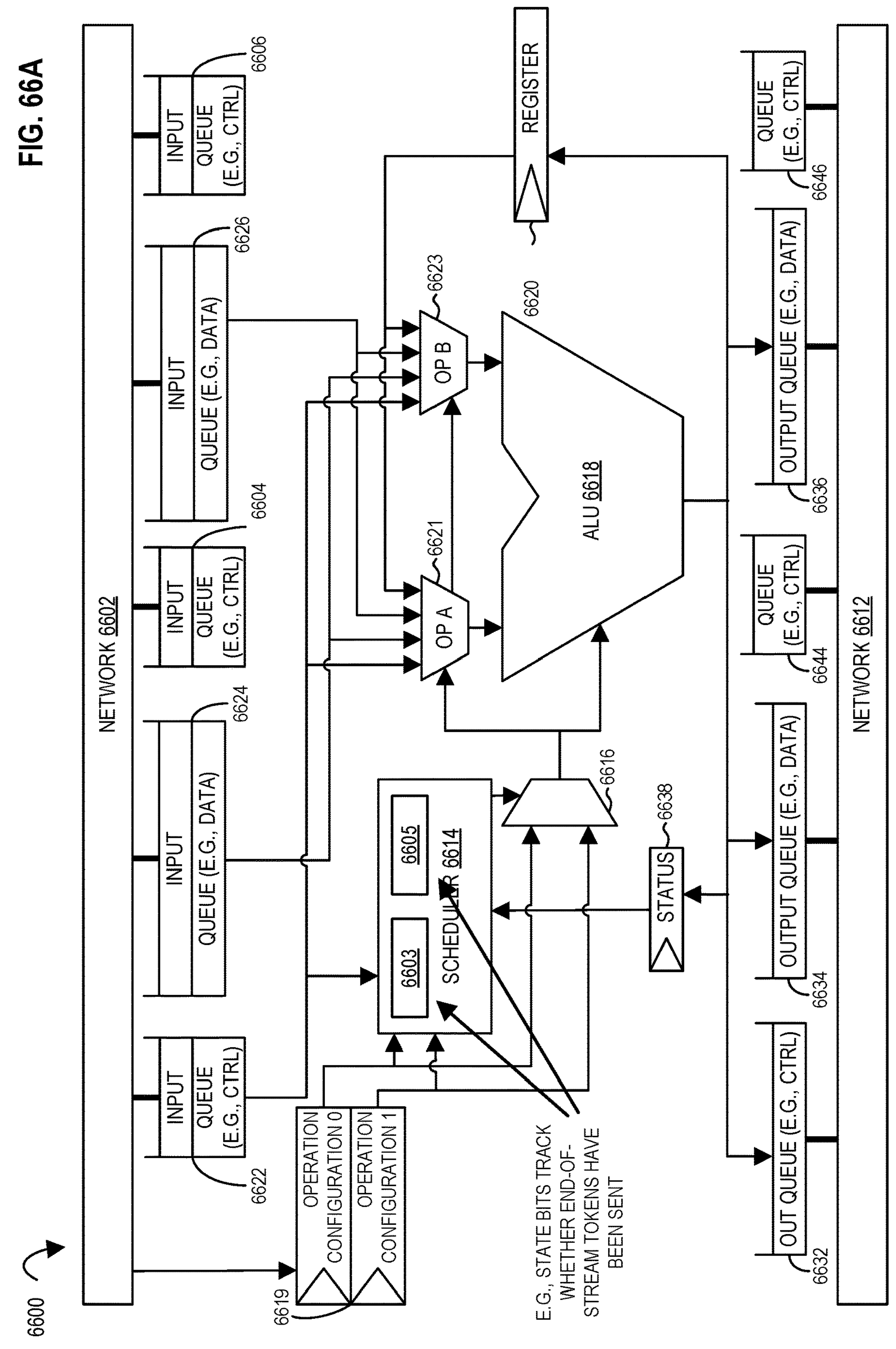
FIGS. 66A-66G illustrate a processing element performing a Stream Split operation according to embodiments of the disclosure.
Figure 66B:
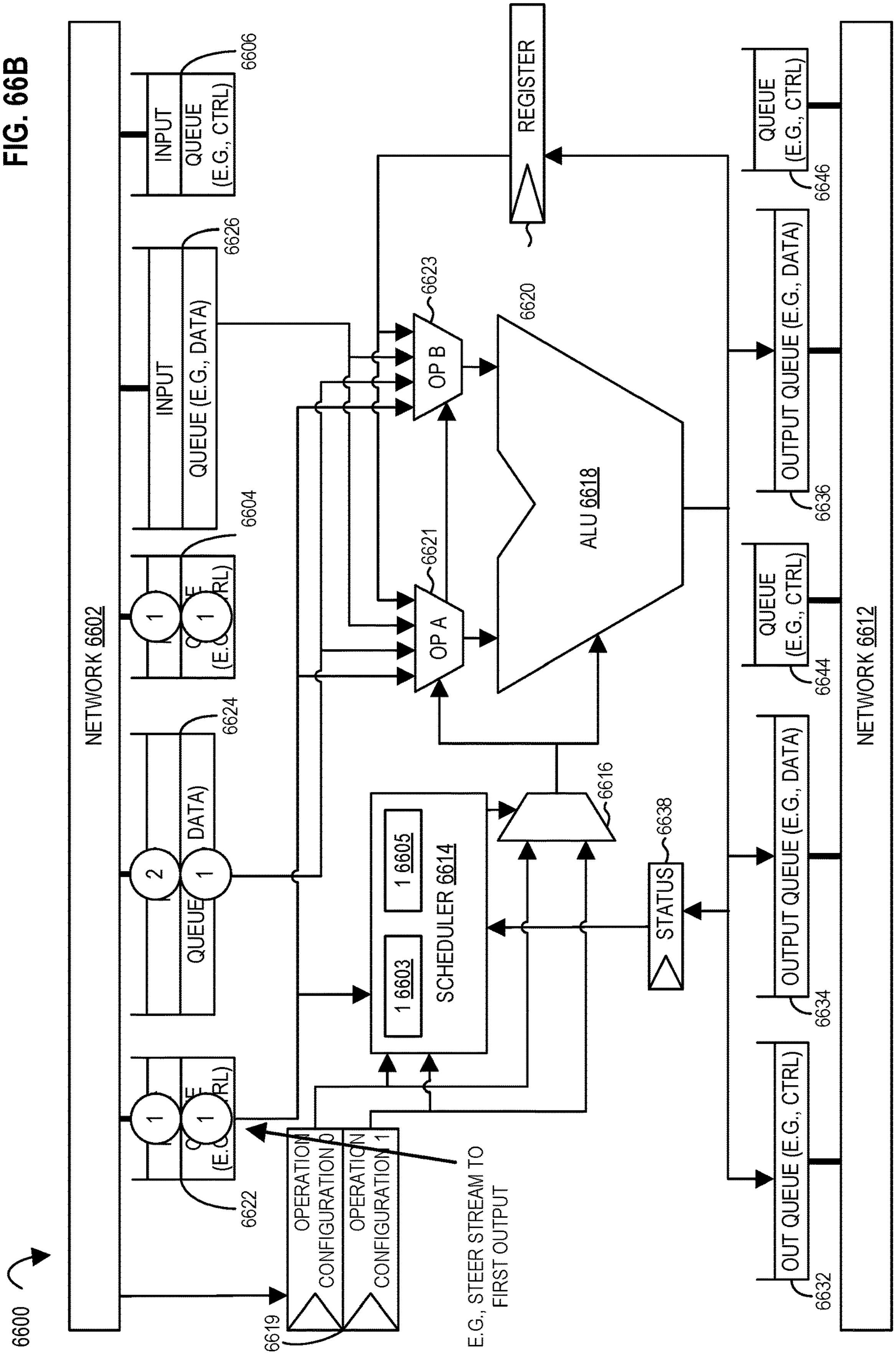

As one example, input queue (e.g., having a single bit width) 6604 is provided to receive a stream control value (e.g., token) for one of (i) input queue 6624 (for example, having a multiple bit width, e.g., 8, 16, 32, or 64 as shown above in the example stream comparison opcodes) or (ii) input queue (e.g., having a single bit width) 6606 is provided to receive a stream control value (e.g., token) for input queue 6626 (for example, having a multiple bit width, e.g., 8, 16, 32, or 64 as shown above in the example stream comparison opcodes). In FIG. 66B, the programmed stream split is to, output an element (e.g., the next element in the single input queue) of stream A to a first output queue (e.g., output queue 6634) when a split control value (e.g., predicate stream) is a first value (e.g., Boolean zero) and output the element (e.g., the next element in the single input queue) to a second, different output queue (e.g., output queue 6636) when the split control value (e.g., predicate stream) is a second, different value (e.g., Boolean one), e.g., stsplit in the above discussion. In FIGS. 66B-66G, the numbers in the circles for the split control bits in input queue 6622 are for a predicate stream, e.g., one or more of a first value (e.g., a one) followed by a zero to indicate the end (e.g., termination) of that predicate stream. In certain embodiments, PE 6600 is to send the elements of a first stream into a first output until the predicate stream terminates (e.g., as indicated by a Boolean zero in input queue 6622), and then the remaining elements of the second stream are sent to a second output until the first stream is terminated (e.g., by a Boolean zero in stream control input queue 6604). In FIGS. 66B-66G, the numbers in the circles for the control bits in queue 6604 indicates a one for each item in a single stream followed by a zero to indicate the end (e.g., termination) of that stream.

In FIGS. 66B-66G, a split control value (e.g., split control bit) has also been provided (e.g., from an upstream PE) and (i) while the split control value is a first value (e.g., Boolean one), PE 6600 is to send the stream (e.g., stream A) from input queue 6624 to a first output queue (e.g., output queue 6634), and send the control values for that stream to the associated control queue 6644 and dequeue (e.g., delete) the stream (e.g., stream A) from input queue 6624 and its control values from (e.g., control) input queue 6604, and (ii) when the split control value changes to a second, different value (e.g., Boolean zero), PE 6600 is to send the rest of the stream (e.g., stream A) from input queue 6624 to a second output queue (e.g., output queue 6636), and send the control values for that stream to the associated control queue 6646 and dequeue (e.g., delete) the stream (e.g., stream A) from input queue 6624 and its control values from (e.g., control) input queue 6604.

In FIG. 66B, a data value of (e.g., integer) one is in a first slot of input queue 6624 along with a Boolean one in a first slot of the associated (e.g., control) input queue 6604 to indicate that data value is a valid value of the stream (e.g., stream A), and a data value of (e.g., integer) two is in a second slot of input queue 6624 along with a Boolean one in a second slot of the associated (e.g., control) input queue 6604 to indicate that data value is a valid value of the stream.

The input data that is queued may be sent from another component of a CSA, e.g., from a plurality of other PEs as discussed herein.

In certain embodiments, the data is read from the first slot of a queue, and when consumed (e.g., removed), any data from other slots of the queue are advanced such that data from the second slot is moved into the first slot, etc.

In FIG. 66B, a split control value of Boolean one is stored in a first slot of the (e.g., split control) input queue 6622 for a predicate stream to steer a first element of the first stream to a first output queue 6634, and a split control value of Boolean one is in a second slot of the associated input queue 6622 for the predicate stream to steer a second element of the first stream to the first output queue 6634.

Figure 66C:
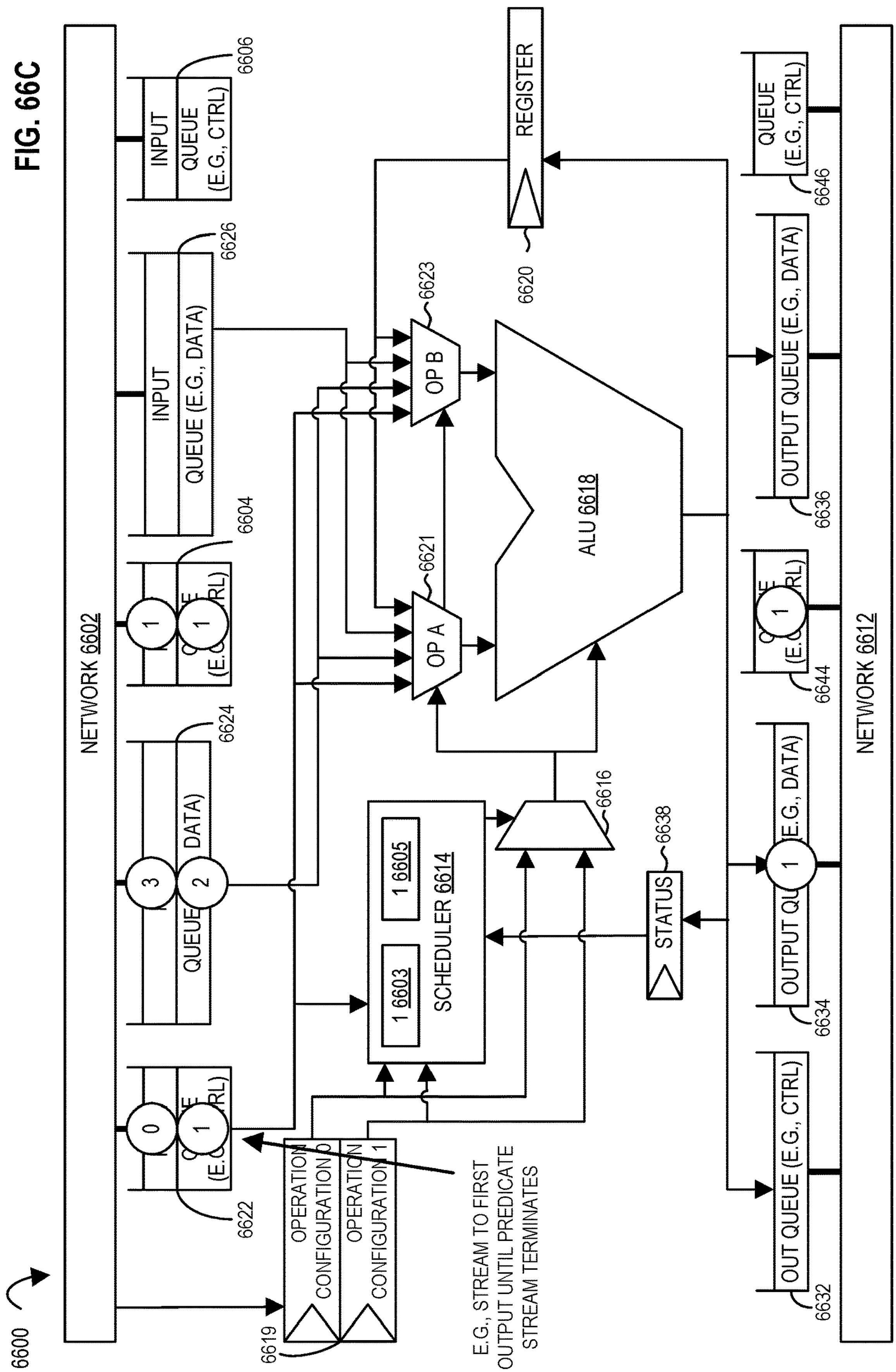

In FIG. 66C, because the first split control value (e.g., selection control bit) stored in the first slot of (e.g., split control) input queue 6622 had a first value (e.g., Boolean one), the data value of (e.g., integer) one from the first slot of input queue 6624 has been sent to output queue 6634 and dequeued (e.g., deleted) from the first slot of input queue 6624, and a control value of one has been sent to the associated control queue 6644 to indicate this is a valid value of the stream and the control value of one is dequeued (e.g., deleted) from the first slot of (e.g., control) input queue 6604, the data value of (e.g., integer) two is moved into the first slot from the second slot of input queue 6624 along with the associated Boolean one moved into the first slot from the second slot of the associated (e.g., control) input queue 6604 to indicate that data value is a valid value of the stream. A data value of (e.g., integer) three is stored in the second slot of input queue 6624 along with a Boolean one in the second slot of the associated (e.g., control) input queue 6604 to indicate that data value is a valid value of the stream.

In FIG. 66C, the first split control value (e.g., selection control bit) has been dequeued from the first slot of (e.g., split control) input queue 6622, the second split control value (e.g., selection control bit) has been moved into the first slot from the second slot of (e.g., split control) input queue 6622, and a third split control value of Boolean zero is stored in the second slot of the associated input queue 6622 to indicate an end of the predicate stream.

The data value from the output queue 6634 and the associated control data from the control queue 6644 may be consumed from the output queues, e.g., by a downstream PE or PEs.

Figure 66D:
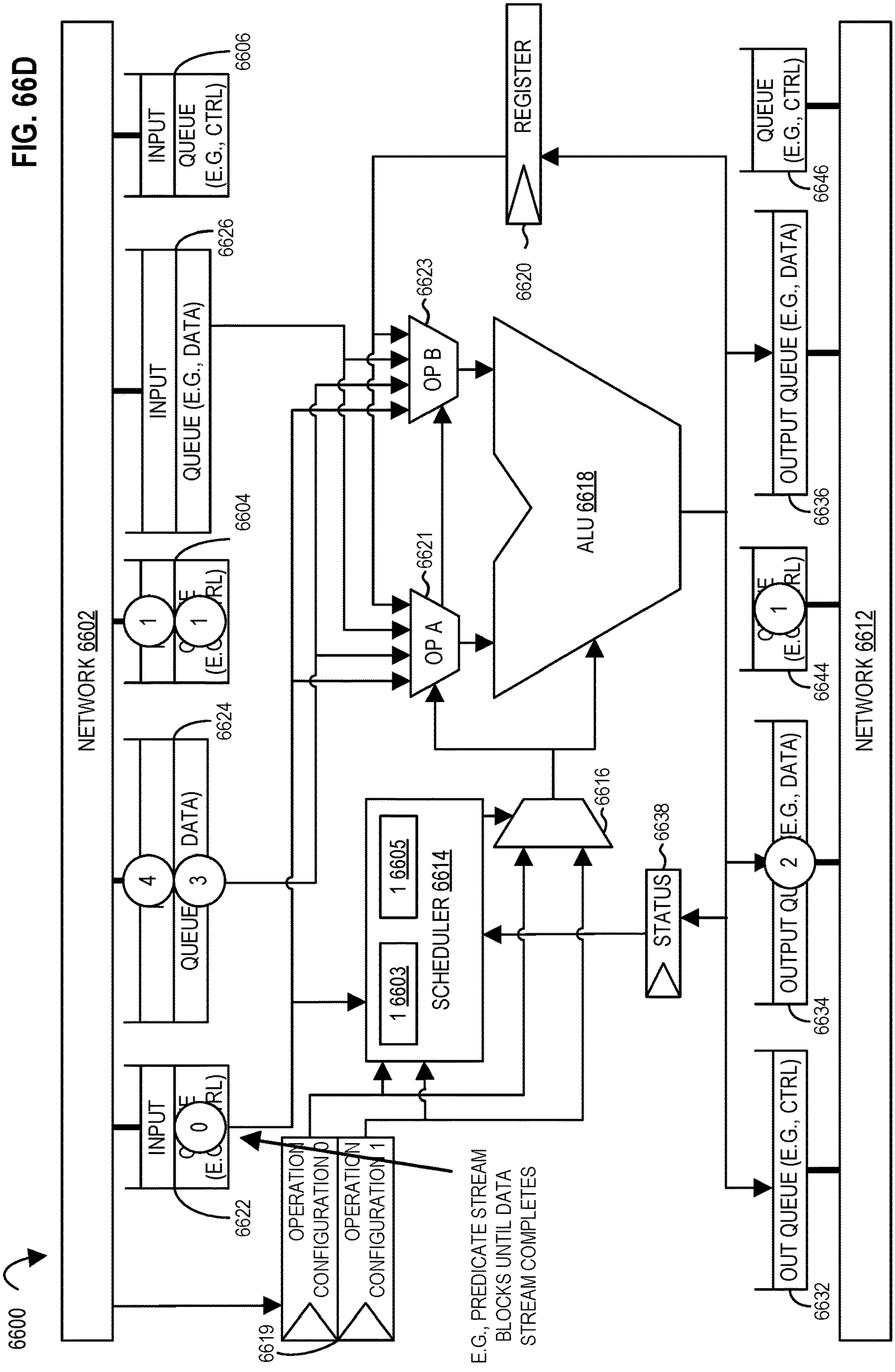

In FIG. 66D, because the second split control value (e.g., selection control bit) stored in the first slot of (e.g., split control) input queue 6622 had a first value (e.g., Boolean one), the data value of (e.g., integer) two from the first slot of input queue 6624 has been sent to output queue 6634 and dequeued (e.g., deleted) from the first slot of input queue 6624, and a control value of one has been sent to the associated control queue 6644 to indicate this is a valid value of the stream and the control value of one is dequeued (e.g., deleted) from the first slot of (e.g., control) input queue 6604, the data value of (e.g., integer) three is moved into the first slot from the second slot of input queue 6624 along with the associated Boolean one moved into the first slot from the second slot of the associated (e.g., control) input queue 6604 to indicate that data value is a valid value of the stream. A data value of (e.g., integer) four is stored in the second slot of input queue 6624 along with a Boolean one in the second slot of the associated (e.g., control) input queue 6604 to indicate that data value is a valid value of the stream.

Figure 66E:
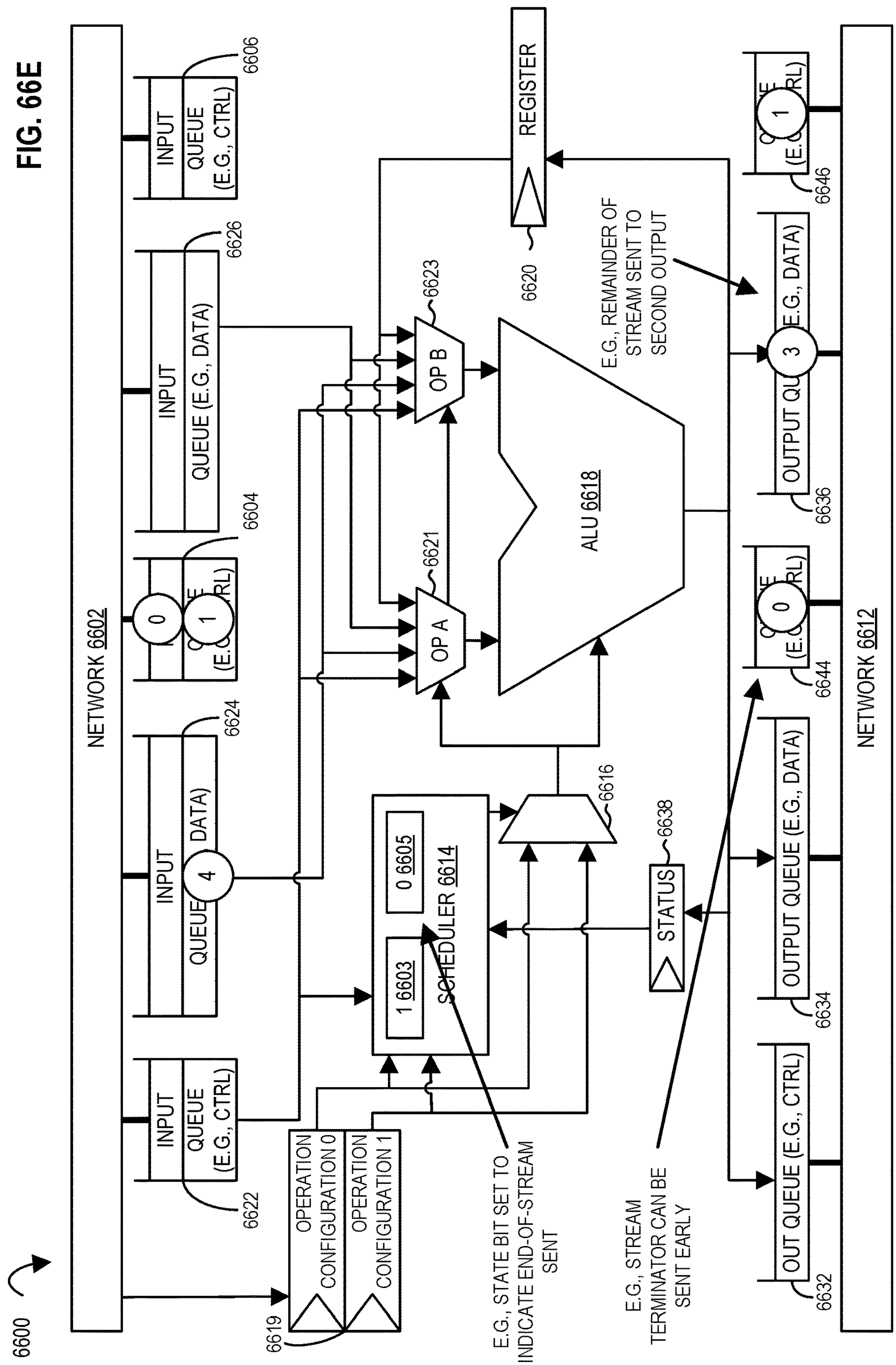

In FIG. 66E, the third split control value (e.g., selection control bit) of Boolean zero in the first slot of (e.g., split control) input queue 6622 indicates the end of the predicate stream, and thus the remaining elements of the first stream are to be moved into the second output queue 6636. In one embodiment, the third split control value (e.g., selection control bit) of Boolean zero remains in the first slot of (e.g., split control) input queue 6622 until the data stream is fully output into the output queues. In another embodiment, the third split control value (e.g., selection control bit) of Boolean zero in the first slot of (e.g., split control) input queue 6622 is cleared but the state is tracked in the PE (e.g., in the scheduler 6619), for example, as discussed below.

In FIG. 66E, because the third split control value (e.g., selection control bit) stored in the first slot of (e.g., split control) input queue 6622 had a second value (e.g., Boolean zero), the data value of (e.g., integer) three from the first slot of input queue 6624 has been sent to output queue 6636 and dequeued (e.g., deleted) from the first slot of input queue 6624, and a control value of one has been sent to the associated control queue 6646 to indicate this is a valid value of the stream and the control value of one is dequeued (e.g., deleted) from the first slot of (e.g., control) input queue 6604, the data value of (e.g., integer) four is moved into the first slot from the second slot of input queue 6624 along with the associated Boolean one moved into the first slot from the second slot of the associated (e.g., control) input queue 6604 to indicate that data value is a valid value of the stream. A control value of Boolean zero is stored in the second slot of the associated (e.g., control) input queue 6604 to indicate that data value of integer four is the last valid value of the stream. The data value from the output queue 6634 and the associated control data from the control queue 6644 may be consumed from the output queues, e.g., by a downstream PE or PEs. The data value from the output queue 6636 and the associated control data from the control queue 6646 may be consumed from the output queues, e.g., by a downstream PE or PEs.

In the depicted embodiment, the Stream Split operation causes PE 6400 to produce a Boolean value (e.g., zero) internally in state storage 3.6605 to track that the end of predicate stream has been encountered (e.g., the zero in the first slot of (e.g., split control) input queue 6622) and a stream termination value (e.g., zero) for first output queue 6634 has been sent (e.g., stored) to control output queue 6644. In this embodiment, the zero in the first slot of (e.g., split control) input queue 6622 is cleared. In certain embodiments, the state storage is set to a Boolean one before each new operation is performed.

Figure 66F:
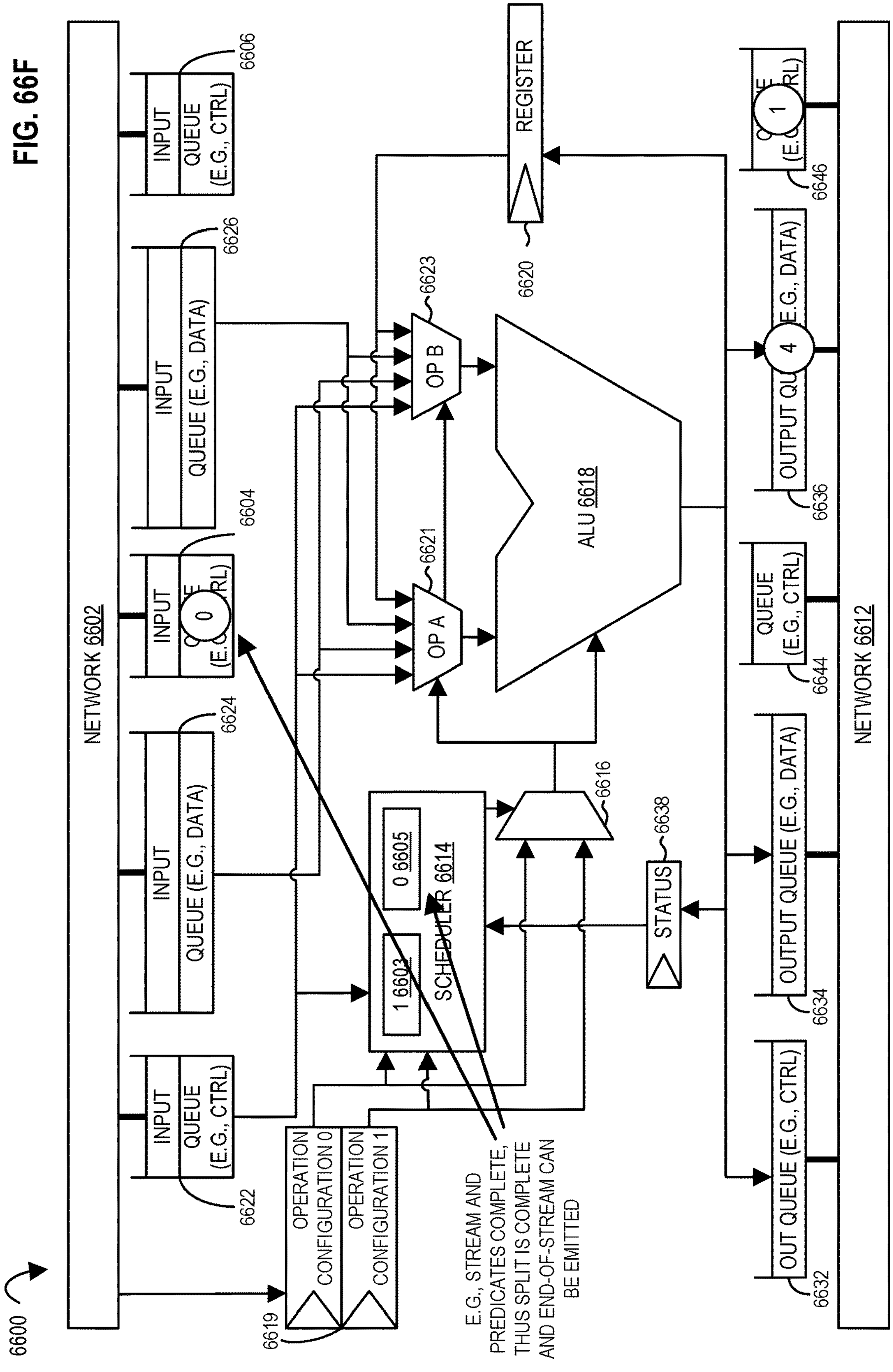

In FIG. 66F, because the third split control value (e.g., selection control bit) stored in the first slot of (e.g., split control) input queue 6622 had a second value (e.g., Boolean zero) (for example, as indicated by the Boolean value of zero stored internally in state storage 3.6605), the data value of (e.g., integer) four from the first slot of input queue 6624 has been sent to output queue 6636 and dequeued (e.g., deleted) from the first slot of input queue 6624, and a control value of one has been sent to the associated control queue 6646 to indicate this is a valid value of the stream and the control value of one is dequeued (e.g., deleted) from the first slot of (e.g., control) input queue 6604. The control value of Boolean zero is moved into the first slot from the second slot of the associated (e.g., control) input queue 6604 to indicate that data value of integer four was the last valid value of the stream. In the depicted embodiment, as the third split control value (e.g., selection control bit) stored in the first slot of (e.g., split control) input queue 6622 has a value of Boolean zero to indicate the end of the predicate stream and the first slot of (e.g., control) input queue 6604 has a control value of zero to indicate the end of the data stream, both streams are terminated and thus the first slot of (e.g., split control) input queue 6622 and the first slot of (e.g., control) input queue 6604 are ready to be cleared. The data value from the output queue 6636 and the associated control data from the control queue 6646 may be consumed from the output queues, e.g., by a downstream PE or PEs.

Figure 66G:
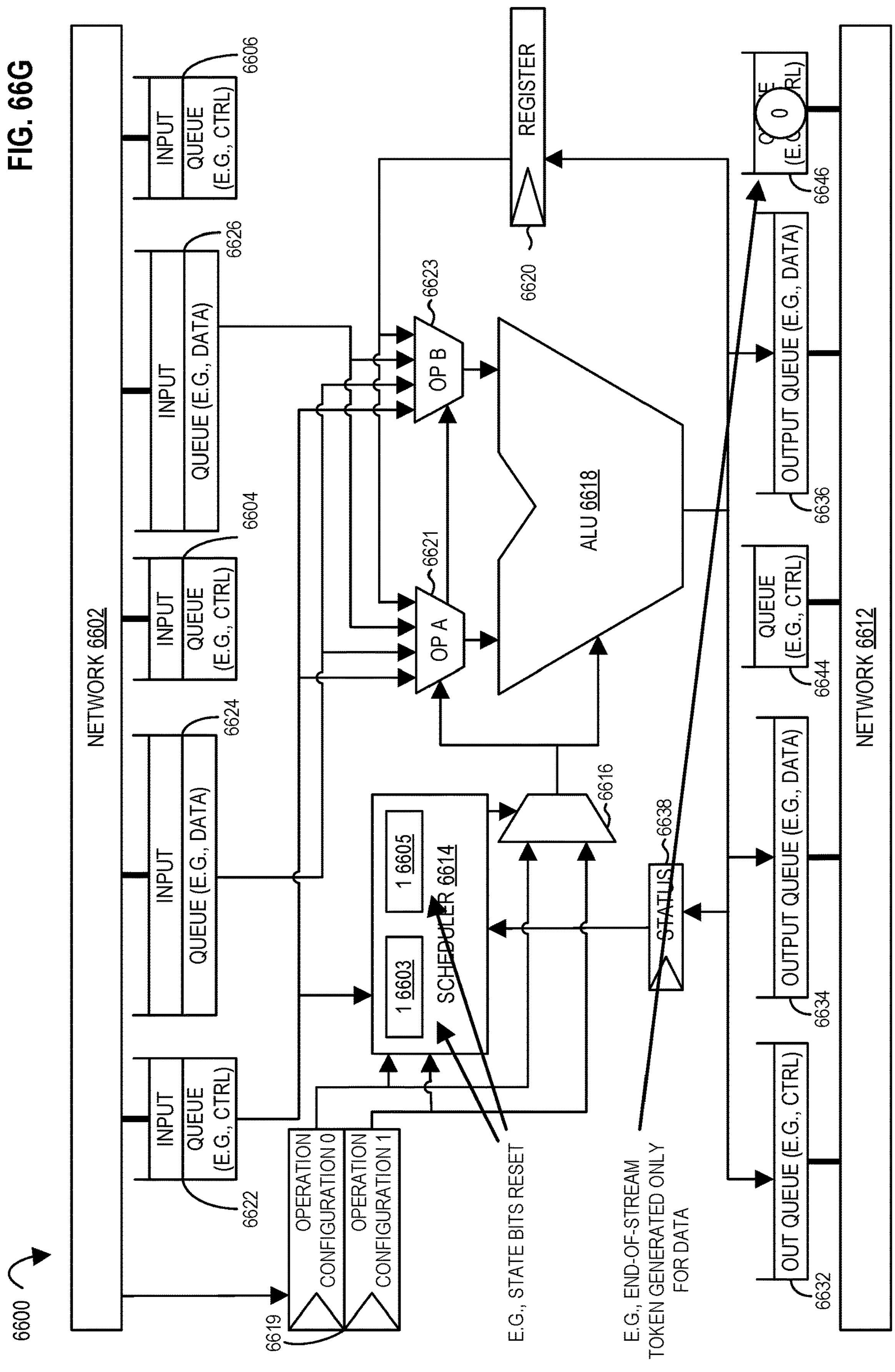

In FIG. 66G, the first slot of (e.g., control) input queue 6604 is cleared, and a control value of zero has been sent to the associated control queue 6646 to indicate the end of the stream in output queue 6636. As both end-of-stream values (e.g., tokens) have been sent to (e.g., stored in) the control queue 6644 for output queue 6634 and the control queue 6646 for output queue 6636, the values in state storage 3.6605 (and state storage 6603 if used) are reset (e.g., to a Boolean one in the depicted embodiment).

In certain embodiments, PE 6600 is stalled from performing the split operation until there is both (i) space available in the output queue that is to be used for storing resultant data, and (ii) the split control value (e.g., selection control bit) and input data for the split stream.

In certain embodiments, PE 6600 steers a single stream to one of a plurality of outputs by using a predicate (e.g., a split control value) (and optionally, a count) to control the selection, for example, moving the first two elements of an input stream to a first output and the remainder of the input stream to a second output. In certain embodiments, the data stream is shorter than the predicate stream and the extra predicates are discarded.

In the depicted embodiment, PE 6600 includes the components of PE 5800 from FIG. 58, for example, with the components ending with the same two numbers having the same functionality. In one embodiment, scheduler 6614 schedules an operation or operations of processing element 6600 for execution according to the configuration value, e.g., and when input data and control input arrives. See, for example, the discussion of FIGS. 33-57.

Stream Combine (SCMB)

In one embodiment, a CSA architecture includes a configuration value that, when stored into the configuration storage (e.g., register), causes the CSA (e.g., a PE thereof) to perform a Stream Combine (SCMB) operation according to the following (e.g., semantics and/or description).

```
Operation: scmbrelT Ldeq.CRd.i1, Rdeq.CRd.i1,
                ctlseqa.CRLu.i1, vala.CRLu.T,
                ctlseqb.CRLu.i1, valb.CRLu.T,
                order.Lu.i1=0, signal.Lu.i1=0
// order and signal parameters only used on FP data.
where rel is an integer or floating point comparison relational other than
equal/not equal, and T is either an integer comparison type, like s32, or a
floating point type
NOTE: order and signal operands are ONLY present for floating point comparisons
Semantics:
// if both values available, and they are equal
if ( (ctlseqa.peek && ctlseqb.peek) && (vala.peek eql valb.peek)) {
    Ldeq = 1
    Rdeq = 1
    ctlseqa.deq; vala.deq
    ctlseqb.deq; valb.deq
// If both values available, and the relational is true, or only a is available
} else if ( (ctlseqa.peek && ((ctlseqb.peek && vala.peek cmpxxx valb.peek) ||
!ctlseqb.peek) } {
        Ldeq = 1
        Rdeq = 0
        ctlseqa.deq; vala.deq
} else if (ctlseqb.peek) {              // If b is available (either comp. failed or a not
available)
        Ldeq = 0
        Rdeq = 1
        ctlseqb.deq; valb.deq
} else {                                // both sequences exhausted - done. No outputs
        Ldeq = 0
        Rdeq = 0
        ctlseqa.deq
        ctlseqb.deq
}
```

Description: Canonical Stream key combinations deal with two input sequences of keys, and provide two signals indicating left or right dequeue, or equal or end-of-stream. When combined with one of the new inter and union operators the iter for the new combined stream can be created.

Some dataflow implementations may choose to provision fewer four narrow outputs from a single operator. In this case, scmb may be provisioned to select a subset of its outputs. The scmb operator can be replicated across several PEs to achieve its original behavior.

Description: Canonical Stream key combinations deal with two input sequences of keys, and provide two signals indicating left or right dequeue, or equal or end-of-stream. When combined with one of the new inter and union operators the iter for the new combined stream can be created.

Some dataflow implementations may choose to provision fewer four narrow outputs from a single operator. In this case, scmb may be provisioned to select a subset of its outputs. The scmb operator can be replicated across several PEs to achieve its original behaviour.

FIGS. 67A-67E illustrate a processing element 6700 performing a Stream Combine operation according to embodiments of the disclosure. In the depicted embodiment, an operation configuration value for a stream combine operation is stored (e.g., during a programming time period) into operation configuration register 6719. As one example, input queue (e.g., having a single bit width) 6704 is provided to receive a stream control value (e.g., token) for input queue 6724 (for example, having a multiple bit width, e.g., 8, 16, 32, or 64) and input queue (e.g., having a single bit width) 6706 is provided to receive a stream control value (e.g., token) for input queue 6726 (for example, having a multiple bit width, e.g., 8, 16, 32, or 64). In FIG. 67A-E, the programmed stream combine is to, when an element (e.g., the next element in the A queue) of stream A is equal to an element (e.g., the next element in the B queue) of stream B (e.g., scmb in the above discussion), output a stream equal value (e.g., a Boolean one) into (e.g., control) output queue 6732, and otherwise output a stream not equal value (e.g., a Boolean zero) into (e.g., control) output queue 6732, (for example, scmbrelT in the above discussion), e.g., and for both, also output a control value of one to the associated control output queue 6744 for input queue 6724 when there was a valid value of the stream and dequeue (e.g., delete)

values from the first slot of (e.g., control) input queue 6704 and input queue 6724 and output a control value of one to the associated control output queue 6746 for input queue 6726 when there was a valid value of the stream and dequeue (e.g., delete) values from the first slot of (e.g., control) input queue 6706 and input queue 6726. In the depicted embodiments, the data values from input queue 6724 and input queue 6726 are dequeued but not sent to output queues 6734 or 6736.

In FIGS. 67B-67E, the numbers in the circles for the control bits in queues 6704 and 6706 indicate a one for each item in a single stream and a zero for the end (e.g., termination) of that stream, and the numbers in input queue 6724 and input queue 6726 are data values (e.g., payload data).

Figure 67A:
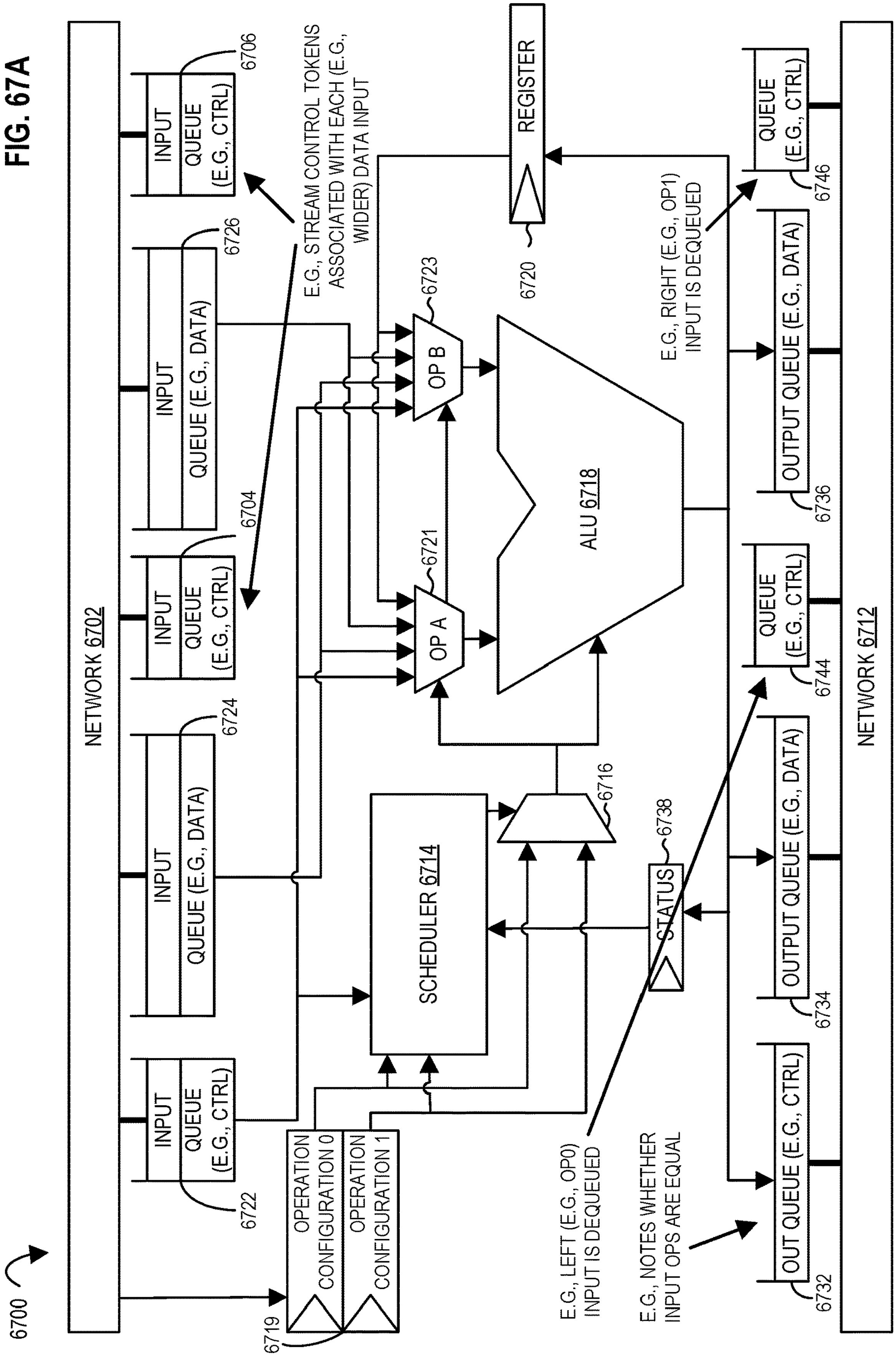
FIGS. 67A-67E illustrate a processing element performing a Stream Combine operation according to embodiments of the disclosure.
Figure 67B:
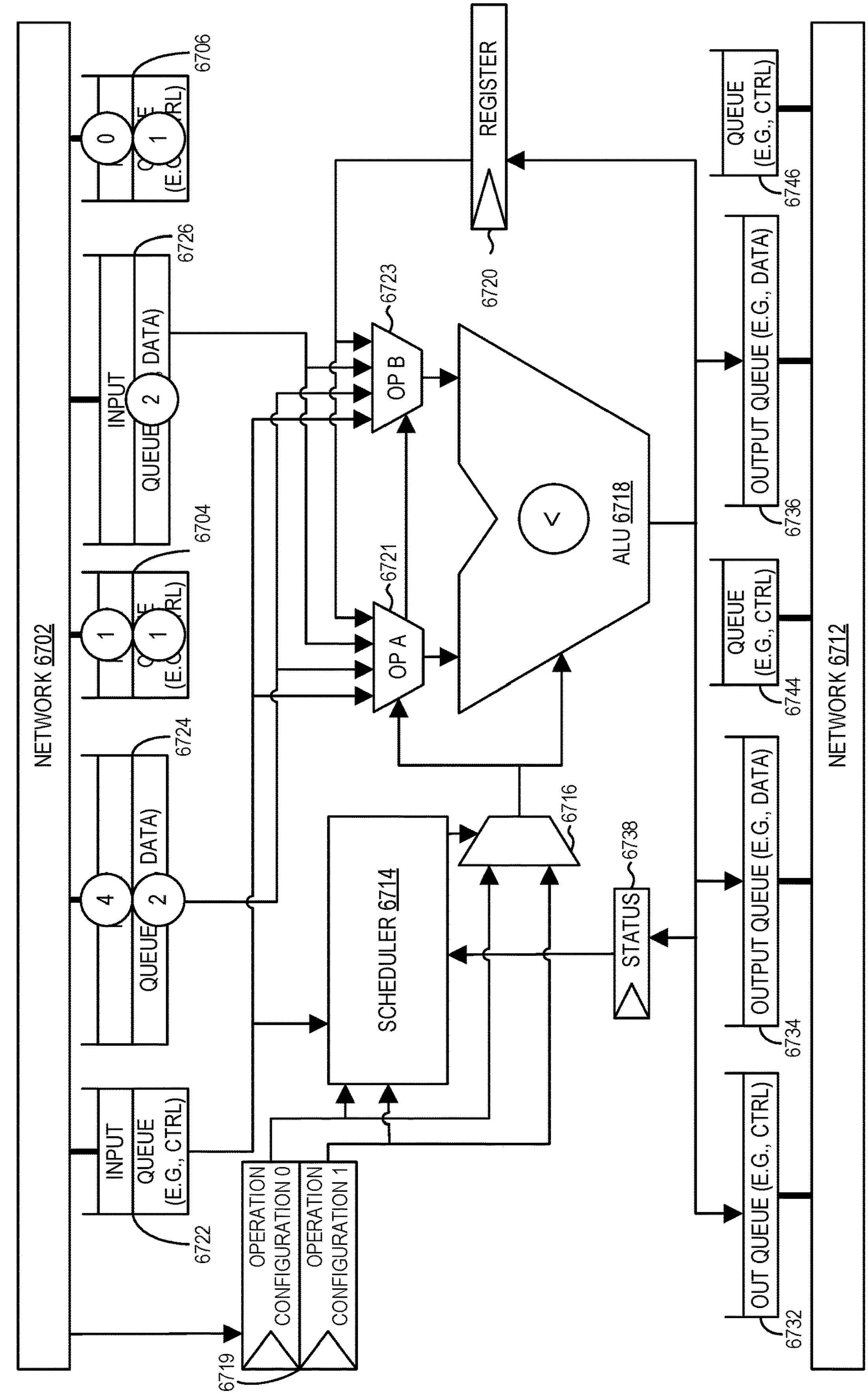

In FIG. 67B, a data value of (e.g., integer) two is in a first slot of input queue 6724 along with a Boolean one in a first slot of the associated (e.g., control) input queue 6704 to indicate that data value is a valid value of the stream (e.g., stream A), and a data value of (e.g., integer) four is in a second slot of input queue 6724 along with a Boolean one in a second slot of the associated (e.g., control) input queue 6704 to indicate that data value is a valid value of the stream.

In FIG. 67B, a data value of (e.g., integer) two is in a first slot of input queue 6726 along with a Boolean one in a first slot of the associated (e.g., control) input queue 6706 to indicate that data value is a valid value of the stream (e.g., stream B), and no data value is stored in a second slot of input queue 6726, but a Boolean zero is stored in a second slot of the associated (e.g., control) input queue 6704 to indicate that data value two in the first slot of input queue 6726 is the end of that stream.

The input data that is queued may be sent from another component of a CSA, e.g., from a plurality of other PEs as discussed herein.

In certain embodiments, the data is read from the first slot of a queue, and when consumed (e.g., removed), any data from other slots of the queue are advanced such that data from the second slot is moved into the first slot, etc.

Figure 67C:
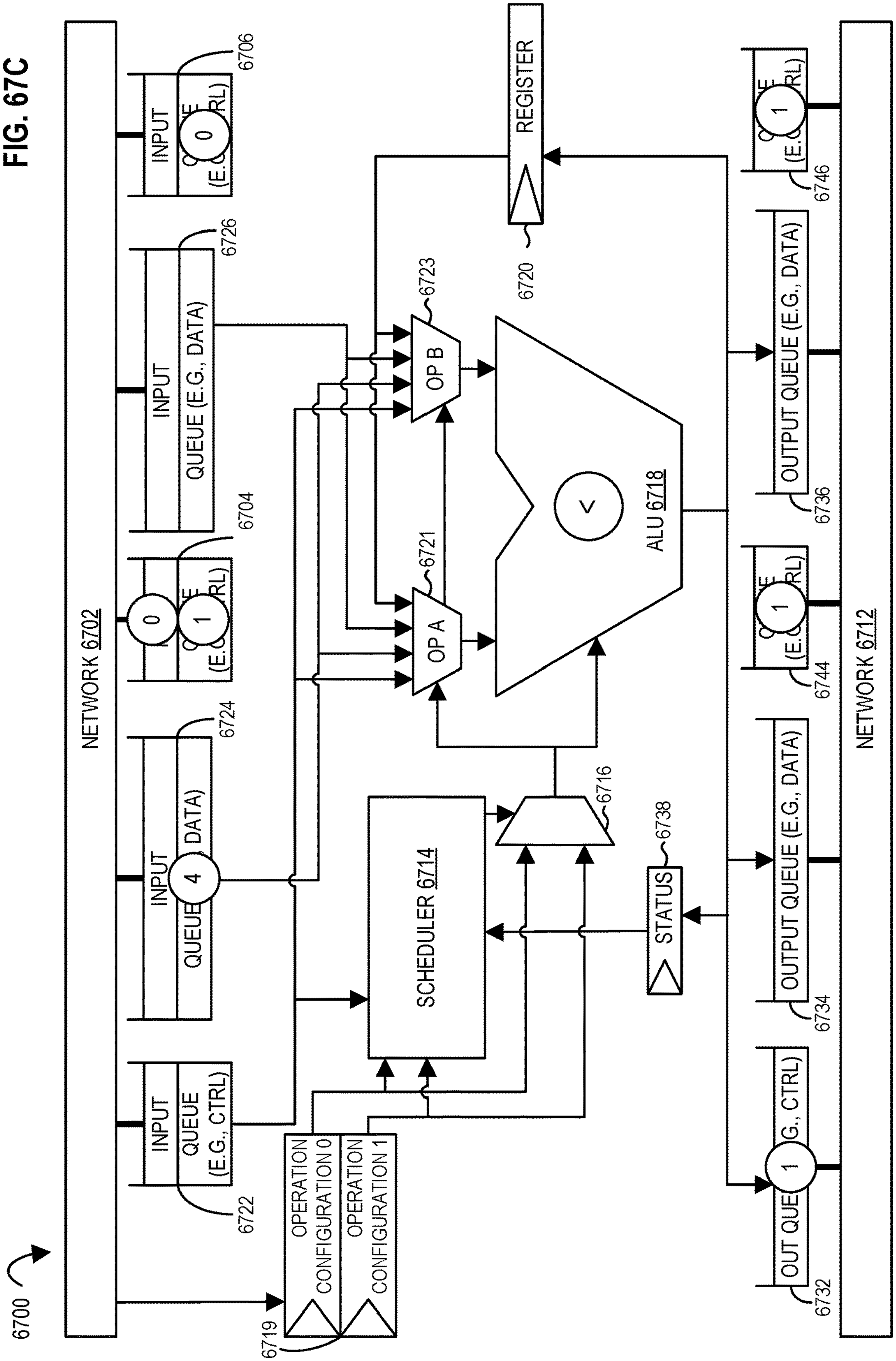

In FIG. 67C, data value of (e.g., integer) two in the first slot of input queue 6724 has been compared against the data value of (e.g., integer) two in the first slot of input queue 6726 by the ALU 6718 performing an "equal to" comparison. Here, because two is equal to two, a stream equal value (e.g., a Boolean one) is output into (e.g., control) output queue 6732. Additionally, in the depicted embodiment, the data value of (e.g., integer) two in the first slot of input queue 6724 is dequeued (e.g., and not sent to output queue 6734) and a control value of one is sent to the associated control queue 6744 to indicate this is a valid value of a stream and dequeued (e.g., deleted) from the first slot of (e.g., control) input queue 6704, and the data value of (e.g., integer) two in the first slot of input queue 6726 is dequeued (e.g., and not sent to output queue 6736) and a control value of one is sent to the associated control queue 6746 to indicate this is a valid value of a stream and dequeued (e.g., deleted) from the first slot of (e.g., control) input queue 6706.

As the data value of (e.g., integer) two in the first slot of input queue 6726 is dequeued (e.g., deleted) from the first slot of input queue 6726 and no data value is stored in a second slot of input queue 6726, then no data value is stored into the first slot of input queue 6726 but a Boolean zero is moved into the first slot from the second slot of the associated (e.g., control) input queue 6706 to indicate that data value two in the first slot of input queue 6726 is the end of that stream.

As the data value of (e.g., integer) two in the first slot of input queue 6724 is dequeued (e.g., deleted) from the first slot of input queue 6724, the data value of (e.g., integer) four is moved into the first slot from the second slot of input queue 6724 along with the Boolean one moved into the first slot from the second slot of the associated (e.g., control) input queue 6704 to indicate that data value is a valid value of the stream. In FIG. 67C a Boolean zero is then sent (e.g., from an upstream PE that is generating the stream) into the second slot of the associated (e.g., control) input queue 6704 to indicate that data value four is the end of the stream.

The stream equal (or not equal) value from the (e.g., control) output queue 6732 and the control data from the control queues (e.g., 6744 and/or 6746) may be consumed from the output queues, e.g., by a downstream PE or PEs.

Figure 67D:
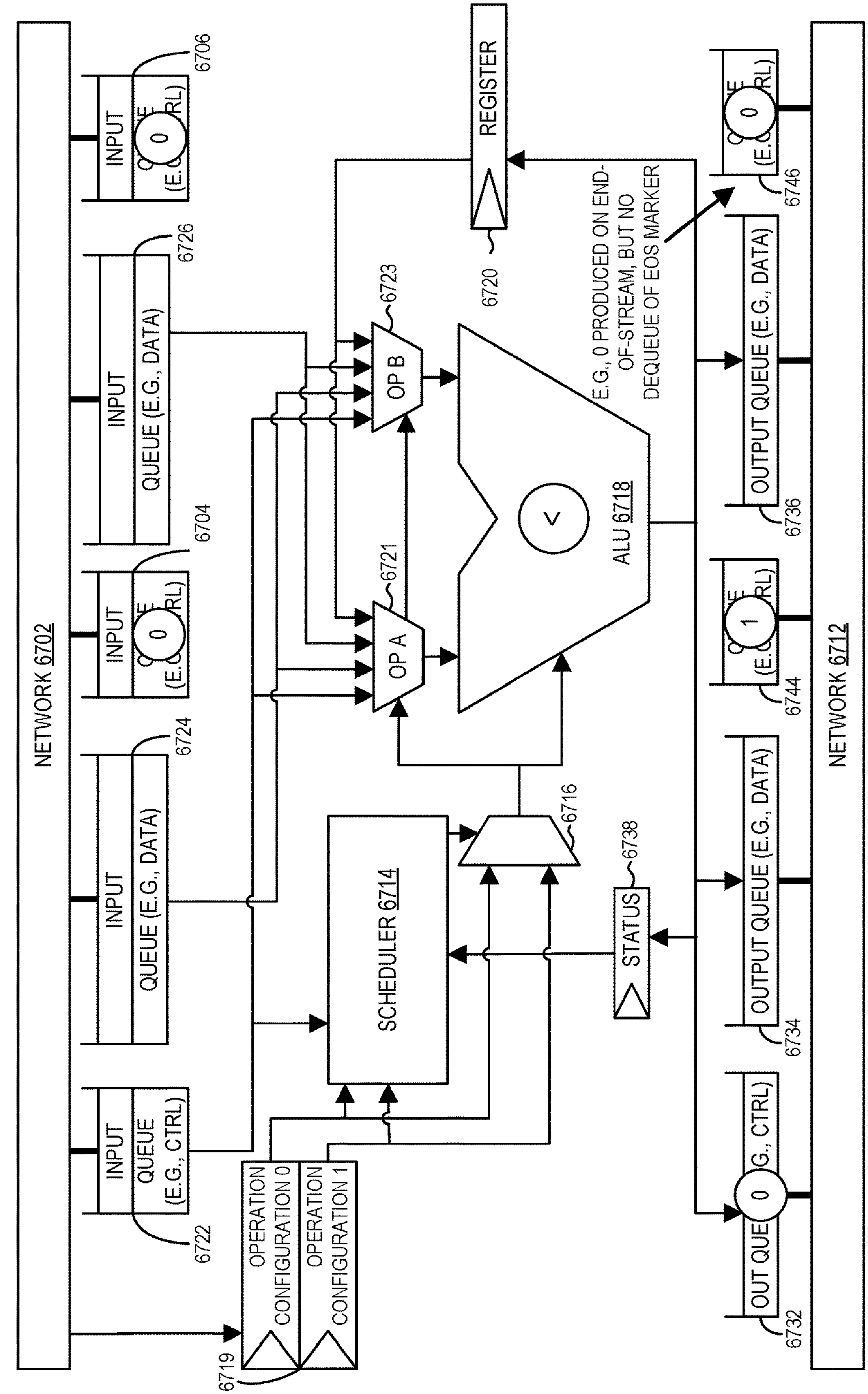

In FIG. 67D, data value of (e.g., integer) four in the first slot of input queue 6724 has been compared against the "no data" in the first slot of input queue 6726. As there is no data in input queue 6726, the two data values are not equal, so a stream not equal value (e.g., a Boolean zero) is output into (e.g., control) output queue 6732. Additionally, in the depicted embodiment, the data value of (e.g., integer) four in the first slot of input queue 6724 is dequeued (e.g., and not sent to output queue 6734) and a control value of one is sent to the associated control queue 6744 to indicate this is a valid value of a stream and dequeued (e.g., deleted) from the first slot of (e.g., control) input queue 6704, and because there is no data in input queue 6726, a control value of zero is sent to the associated control queue 6746 to indicate there is not a valid value of that stream and the control value of zero is not dequeued (e.g., not deleted) from the first slot of (e.g., control) input queue 6706.

As the data value of (e.g., integer) four in the first slot of input queue 6724 is dequeued (e.g., deleted) from the first slot of input queue 6724 and no data value is stored in a second slot of input queue 6724, then no data value is stored into the first slot of input queue 6724 but a Boolean zero is moved into the first slot from the second slot of the associated (e.g., control) input queue 6704 to indicate that data value four from the first slot of input queue 6724 was the end of that stream.

The stream not equal (or equal) value from the (e.g., control) output queue 6732 and the control data from the control queues (e.g., 6744 and/or 6746) may be consumed from the output queues, e.g., by a downstream PE or PEs.

Figure 67E:
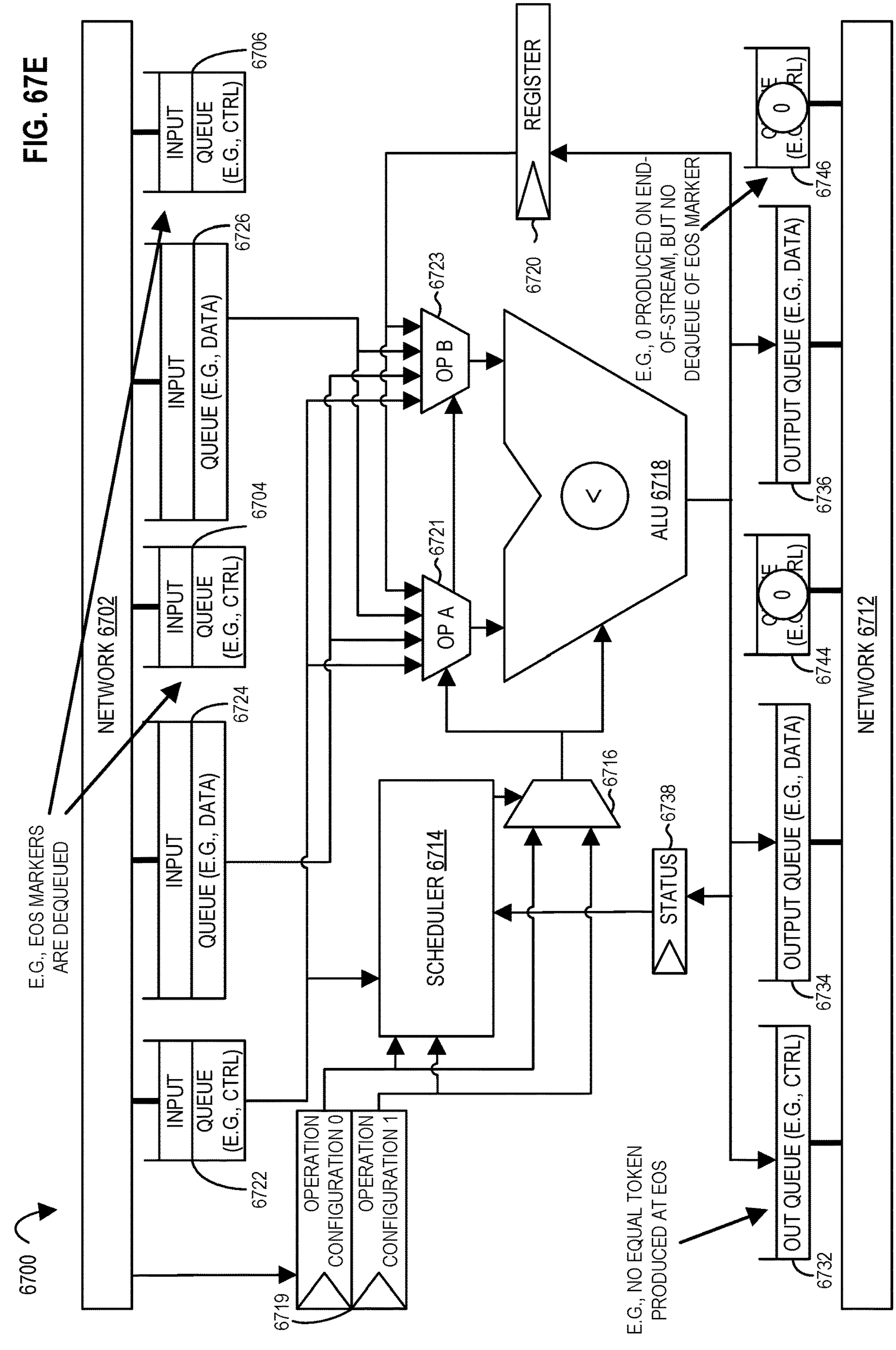

In FIG. 67E, the control input queue 6704 and control input queue 6706 both included a Boolean zero to indicate the end of each stream, respectively. Here, there are not elements of two different streams to compare, so there is neither a "streams are equal" value nor a "streams are not equal" value stored into the (e.g., control) output queue 6732, but a Boolean zero is sent to queue 6744 and dequeued from the first slot of (e.g., control) input queue 6704 to indicate the end of the first stream in input queue 6724, and a Boolean zero is sent to input queue 6746 and dequeued from the first slot of (e.g., control) input queue 6706 to indicate the end of the first stream in input queue 6726.

In certain embodiments, PE 6700 is stalled from performing the stream combine operation until there is both (i) space available in the output queues that are to be used for storing resultant data, and (ii) input data for each stream (e.g., control data of a Boolean one and the associated payload data for a stream, or control data of a Boolean zero for the end of a stream).

In certain embodiments, PE 6700 prepares "streams are equal" value or "streams are not equal" value and/or control values for combination of streams (e.g., by the Union operation or Inter operation discussed next). In one embodiment, both the first slot of (e.g., control) output queue 6744 and the first slot of (e.g., control) output queue 6746 storing a zero indicates the end of both streams (e.g., the end of the stream combine operation).

In the depicted embodiment, PE 6700 includes the components of PE 5800 from FIG. 58, for example, with the components ending with the same two numbers having the same functionality. In one embodiment, scheduler 6714 schedules an operation or operations of processing element 6700 for execution according to the configuration value, e.g., and when input data and control input arrives. See, for example, the discussion of FIGS. 33-57.

Union

In one embodiment, a CSA architecture includes a configuration value that, when stored into the configuration storage (e.g., register), causes the CSA (e.g., a PE thereof) to perform a Union operation according to the following (e.g., semantics and/or description).

```
Operation: unionopT ctlseqres.CRd.i1, res.CRLd.T, Ldeq.CRd.i1, vala.CRLu.T,
Rdeq.CRd.i1, valb.CRLu.T
Semantics:
Vala, valb, and res may be omitted, in which case only a control output is
produced.
Output is true when a value results in the output stream (union of the two
streams) and false when the union stream is ended.
ctlseqreq = Ldeq | Rdeq;
Ldeq.deq
Rdeq.deq
if(Ldeq && Rdeq) {
    res = op(vala, valb)
    vala.deq
    valb.deq
}
else if(Ldeq)
{
        vala.deq
        res = vala
} else if(Rdeq) {
        valb.deq
        res = valb
}
Description:
Computes a union of two input streams, based on scmb. Union is achieved through
applying an operation to the input values when a common value is detected in the two
streams. Example combination operations include add and chooseValA (e.g., no
combination), but any binary operation is possible.
```

FIGS. 68A-68E illustrate a processing element 6800 performing a Union operation according to embodiments of the disclosure. In the depicted embodiment, an operation configuration value for a union operation is stored (e.g., during a programming time period) into operation configuration register 6819. As one example, input queue (e.g., having a single bit width) 6804 is provided to receive (e.g., Boolean) stream combine (SCMB) values (e.g., from output queue 6744 in PE 6700) produced for a first stream by a stream combine (SCMB) operation performed on the first stream and the second stream, and input queue (e.g., having a single bit width) 6806 is provided to receive the Boolean values (e.g., from output queue 6746 in PE 6700) produced for the second stream by the stream combine (SCMB) operation performed on the first stream and the second stream (for example, unionopT in the above discussion). Thus, note that the input queues 6804 and 6806 are storing SCMB values here instead of stream control values.

In the depicted embodiment, input queue (e.g., having a single bit width) 6804 is provided to receive stream combine (SCMB) values (e.g., tokens) for input queue 6824 (for example, having a multiple bit width, e.g., 8, 16, 32, or 64) and input queue (e.g., having a single bit width) 6806 is provided to receive stream combine (SCMB) values (e.g., tokens) for input queue 6826 (for example, having a multiple bit width, e.g., 8, 16, 32, or 64). In FIG. 68A-E, the programmed union is to, add an element (e.g., the next element in the A queue) of stream A to an element (e.g., the next element in the B queue) of stream B (e.g., union in the above discussion), and output a singly stream of those resultant values until both streams A and B are operated on, e.g., and also output a control value to the associated control output queue (e.g., 6844) for the data output queue (e.g., 6834) when there was a valid value of either of the streams.

In FIGS. 68B-68E, the numbers in the circles in input queues 6804 and 6806 indicate stream combine (SCMB) values in input queue 6804 from output queue 6744 in PE 6700 produced for a first stream by a stream combine (SCMB) operation performed on the first stream and the second stream, and in input queue 6806 from output queue 6746 in PE 6700 produced for the second stream by the stream combine (SCMB) operation performed on the first stream and the second stream, and the numbers in input queue 6824 and input queue 6826 are data values (e.g., payload data) for the first stream and the second stream, respectively.

Figure 68A:
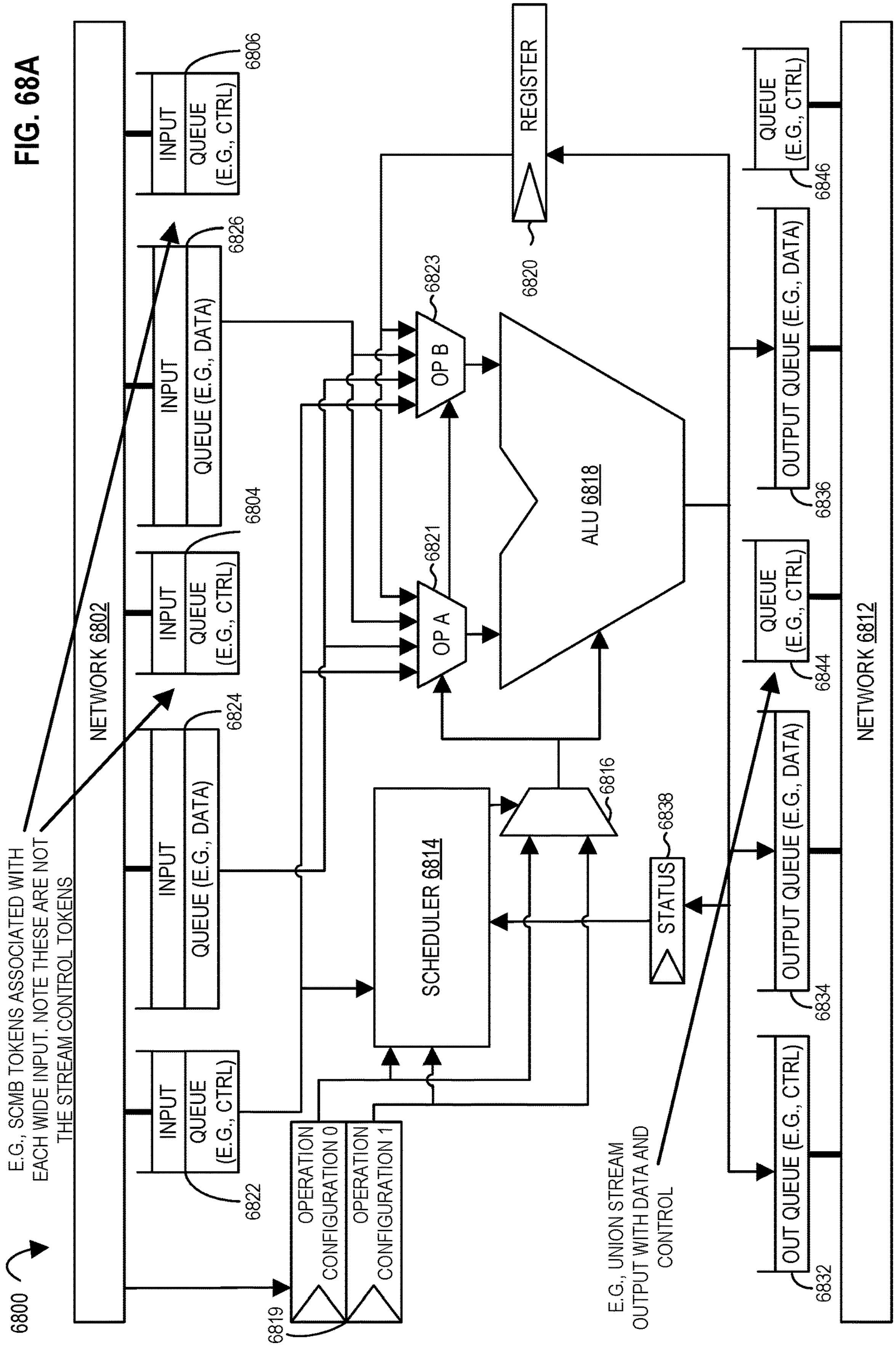
FIGS. 68A-68E illustrate a processing element performing a Union operation according to embodiments of the disclosure.
Figure 68B:
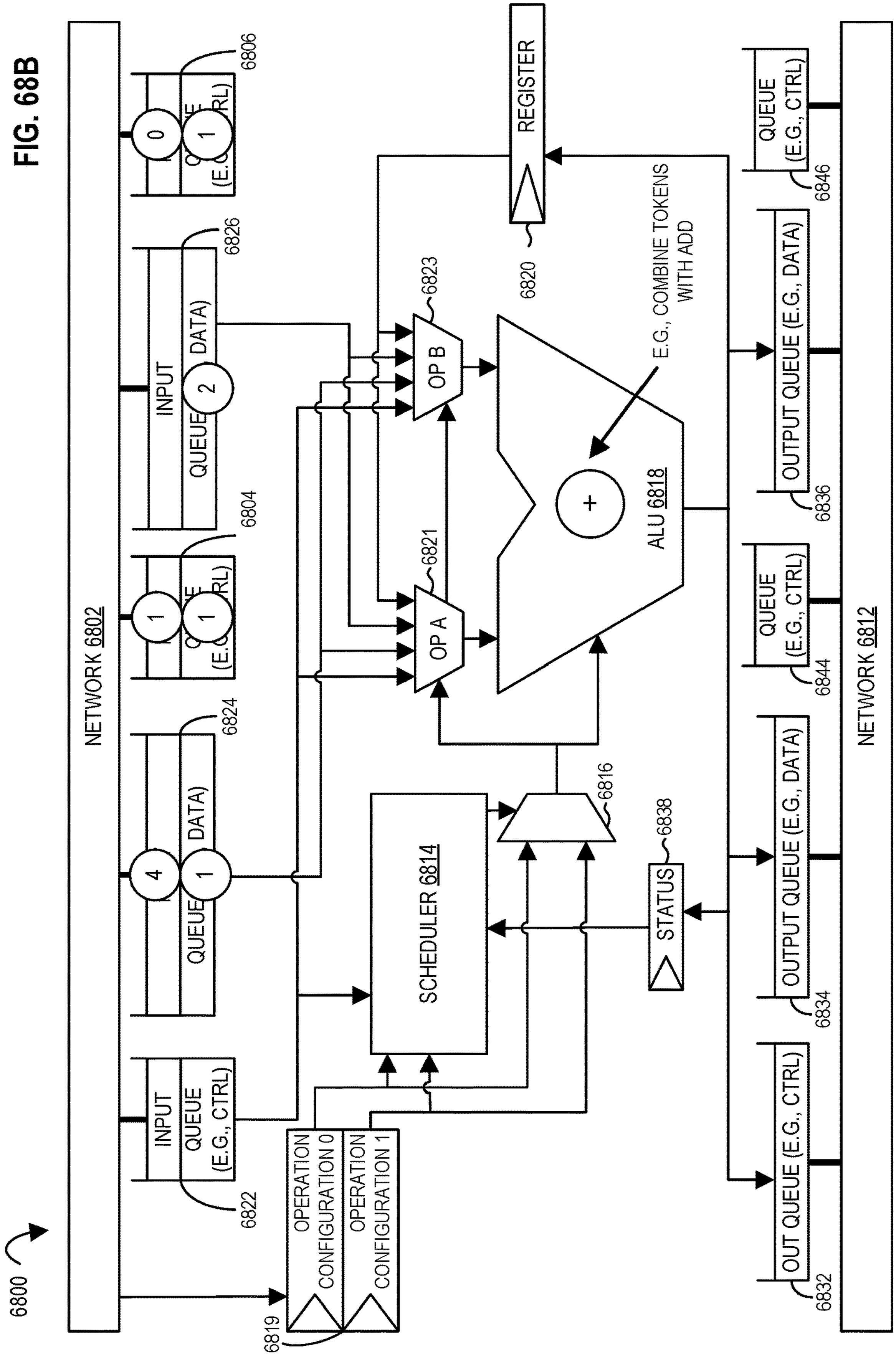

In FIG. 68B, a data value of (e.g., integer) one is in a first slot of input queue 6824 along with a Boolean one stream combine (SCMB) value in a first slot of the associated input queue 6804, and a data value of (e.g., integer) four is in a second slot of input queue 6824 along with a Boolean one stream combine (SCMB) value in a second slot of the associated input queue 6804.

In FIG. 68B, a data value of (e.g., integer) two is in a first slot of input queue 6826 along with a Boolean one stream combine (SCMB) value in a first slot of the associated (e.g., control) input queue 6806, and no data value is stored in a second slot of input queue 6826, but a Boolean zero stream combine (SCMB) value is stored in a second slot of the associated input queue 6804.

The input data that is queued may be sent from another component of a CSA, e.g., from a plurality of other PEs as discussed herein.

In certain embodiments, the data is read from the first slot of a queue, and when consumed (e.g., removed), any data from other slots of the queue are advanced such that data from the second slot is moved into the first slot, etc.

Figure 68C:
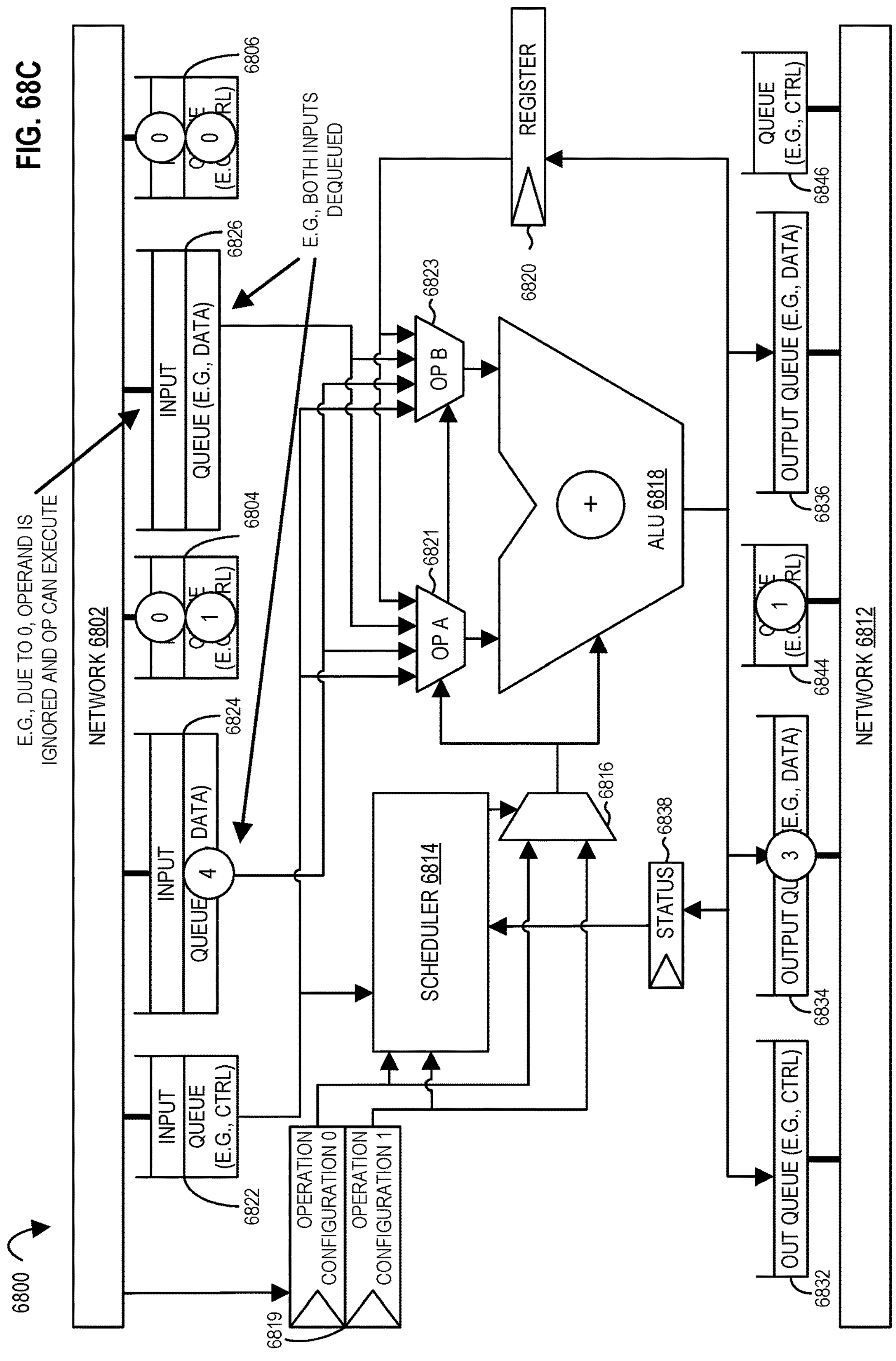

In FIG. 68C, data value of (e.g., integer) one in the first slot of input queue 6824 has been added to the data value of (e.g., integer) two in the first slot of input queue 6826 by the ALU 6818 performing an addition operation, and a resultant data value of three from the addition is stored into the output queue 6834 and a control value (e.g., a Boolean one) is sent to the associated control queue 6844 to indicate this is a valid value of the new stream formed by the Union operation. In the depicted embodiment, the data value of (e.g., integer) one in the first slot of input queue 6824 is dequeued and the associated stream combine (SCMB) value of one is dequeued (e.g., deleted) from the first slot of input queue 6804, the data value of (e.g., integer) four is moved into the first slot from the second slot of input queue 6824 and the associated stream combine (SCMB) value of one is moved from the second slot into the first slot of input queue 6804, and a Boolean zero stream combine (SCMB) value is stored into the second slot of input queue 6804 and no data value is stored into the second slot of input queue 6824. Additionally, in the depicted embodiment, the data value of (e.g., integer) two in the first slot of input queue 6826 is dequeued and the associated stream combine (SCMB) value of one is dequeued (e.g., deleted) from the first slot of input queue 6806, no data value is moved into the first slot from the second slot of input queue 6826 and the associated stream combine (SCMB) value of zero is moved from the second slot into the first slot of input queue 6804, and a Boolean zero stream combine (SCMB) value is stored into the second slot of input queue 6806 and no data value is stored into the second slot of input queue 6826.

The control value from the (e.g., control) output queue 6844 and the data value from output queue 6834 may be consumed from the output queues, e.g., by a downstream PE or PEs.

Figure 68D:
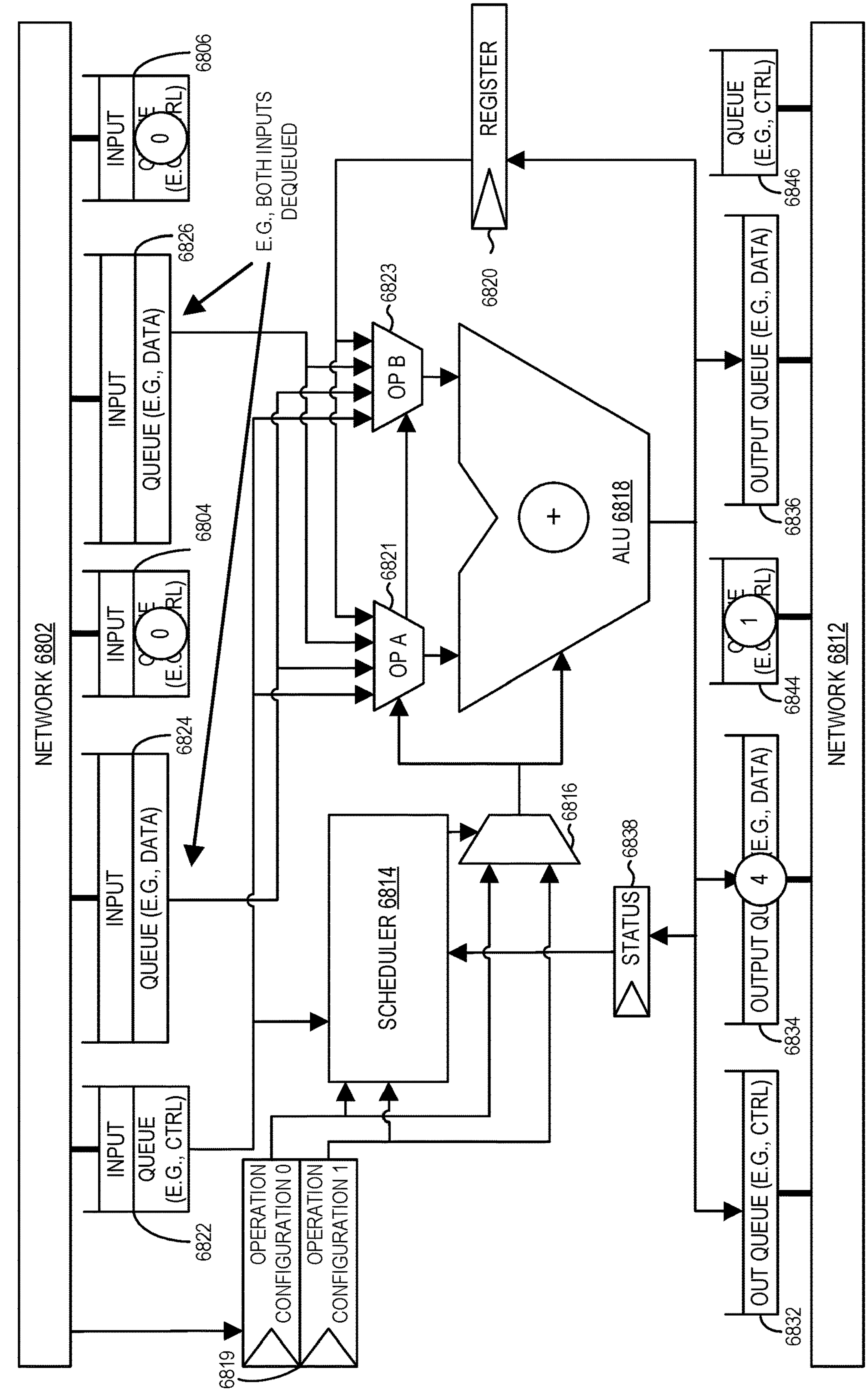

In FIG. 68D, a data value of (e.g., integer) four was in the first slot of input queue 6824 but no data value was the first slot of input queue 6826, so the ALU 6818 produces a resultant data value of four (e.g., 4+0) from the addition and that is stored into the output queue 6834 and a control value (e.g., a Boolean one) is sent to the associated control queue 6844 to indicate this is a valid value of the new stream formed by the Union operation. In the depicted embodiment, the data value of (e.g., integer) four in the first slot of input queue 6824 is dequeued and the associated stream combine (SCMB) value of one is dequeued (e.g., deleted) from the first slot of input queue 6804, the stream combine (SCMB) value of zero is moved from the second slot into the first slot of input queue 6804, and the stream combine (SCMB) value of zero is moved from the second slot into the first slot of input queue 6806.

Figure 68E:
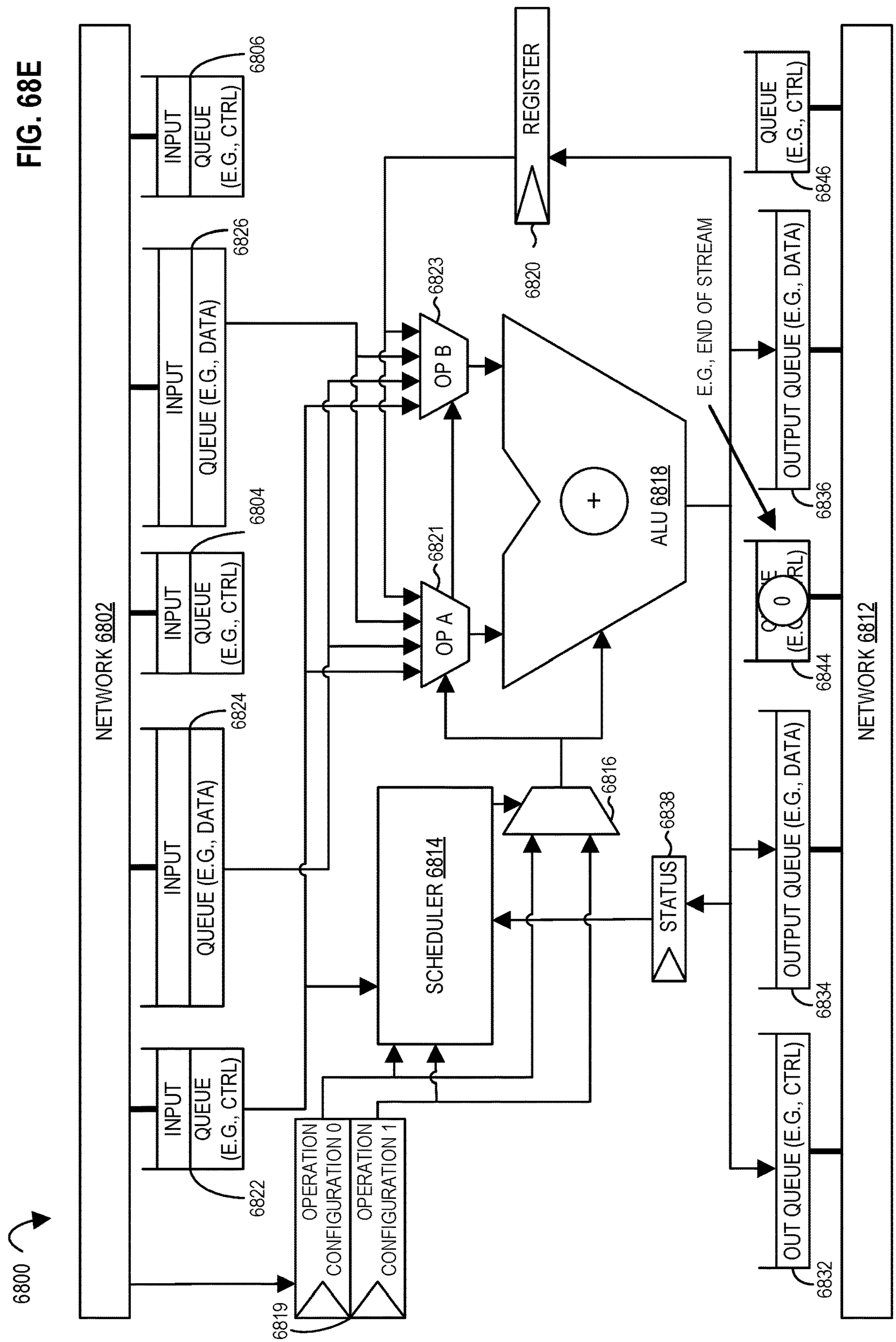

In FIG. 68E, the input queue 6804 and input queue 6806 both included a Boolean zero stream combine (SCMB) value to indicate the end of both streams. Here, a control value (e.g., a Boolean zero) is sent to the associated control queue 6844 to indicate the end of the new stream formed by the Union operation, and the stream combine (SCMB) value of zero is dequeued (e.g., deleted) from the first slot of input queue 6804 for the first stream and the stream combine (SCMB) value of zero is dequeued (e.g., deleted) from the first slot of input queue 6806 for the second stream.

In certain embodiments, PE 6800 is stalled from performing the union operation until there is both (i) space available in the output queues that are to be used for storing resultant data, and (ii) input data for each stream (e.g., stream combine (SCMB) value of a Boolean one and the associated payload data for a stream, or stream combine (SCMB) value of a Boolean zero).

In certain embodiments, PE 6800 determines the union of two streams using SCMB generated control data and using the data values of the streams.

In the depicted embodiment, PE 6800 includes the components of PE 5800 from FIG. 58, for example, with the components ending with the same two numbers having the same functionality. In one embodiment, scheduler 6814 schedules an operation or operations of processing element 6800 for execution according to the configuration value, for example, and when input data and control (e.g., SCMB) input arrives. See, for example, the discussion of FIGS. 33-57.

Inter

In one embodiment, a CSA architecture includes a configuration value that, when stored into the configuration storage (e.g., register), causes the CSA (e.g., a PE thereof) to perform an Inter operation according to the following (e.g., semantics and/or description).

```
Operation: interopT ctlseqres.CRd.i1, res.CRLd.T, Ldeq.CRd.i1,
vala.CRLu.T, Rdeq.CRd.i1, valb.CRLu.T
Semantics:
Vala, valb, and res may be omitted, in which case only a control output is produced.
Output is true when a value results in the output stream (intersection of the two streams)
and false when the intersection stream is ended.
If (Ldeq && Rdeq) {
    ctlseqres = 1
    Ldeq.deq
    Rdeq.deq
    res = op(vala,valb)
    vala.deq
    valb.deq
} else if (!Ldeq && !Rdeq {
    Ctlseqres = 0
    Ldeq.deq
    Rdeq.deq
} else if (Ldeq) {
    Ldeq.deq
    vala.deq
```

-continued

```
} else {
    Rdeq.deq
    valb.deq
}
Description:
Output is true when a value results in the output stream (e.g., intersection of the two
streams) and false when the intersection stream is ended.
Computes an intersection of two input streams, based on scmb. Intersection is achieved
through applying an operation to the input values when a common value is detected in
the
two streams. Example combination operations include add and chooseValA (e.g., no
combination), but any binary operation is possible.
```

FIGS. 69A-69E illustrate a processing element 6900 performing an Intersection (Inter) operation according to embodiments of the disclosure. In the depicted embodiment, an operation configuration value for an inter operation is stored (e.g., during a programming time period) into operation configuration register 6919. As one example, input queue (e.g., having a single bit width) 6904 is provided to receive (e.g., Boolean) stream combine (SCMB) values (e.g., from output queue 6744 in PE 6700) produced for a first stream by a stream combine (SCMB) operation performed on the first stream and the second stream, and input queue (e.g., having a single bit width) 6906 is provided to receive the Boolean values (e.g., from output queue 6746 in PE 6700) produced for the second stream by the stream combine (SCMB) operation performed on the first stream and the second stream (for example, interopT in the above discussion). Thus, note that the input queues 6904 and 6906 are storing SCMB values here instead of stream control values.

In the depicted embodiment, input queue (e.g., having a single bit width) 6904 is provided to receive stream combine (SCMB) values (e.g., tokens) for input queue 6924 (for example, having a multiple bit width, e.g., 8, 16, 32, or 64) and input queue (e.g., having a single bit width) 6906 is provided to receive stream combine (SCMB) values (e.g., tokens) for input queue 6926 (for example, having a multiple bit width, e.g., 8, 16, 32, or 64). In FIG. 69A-E, the programmed inter is to, add an element (e.g., the next element in the A queue) of stream A to an element (e.g., the next element in the B queue) of stream B (e.g., inter in the above discussion), and output a singly stream of those resultant values until both streams A and B are operated on, e.g., and also output a control value to the associated control output queue (e.g., 6944) for the data output queue (e.g., 6934) when an operated value is created from both input streams (e.g., for an intersection, only output when both scmb control values are one, and do not output when only one of the scmb control values is a one). Although an add operation is discussed, other operations (e.g., as indicated by a field in the operation (opT)) may be performed on the stream elements (e.g., subtraction, multiplication, division, etc.)

In FIGS. 69B-69E, the numbers in the circles in input queues 6904 and 6906 indicate stream combine (SCMB) values in input queue 6904 from output queue 6744 in PE 6700 produced for a first stream by a stream combine (SCMB) operation performed on the first stream and the second stream, and in input queue 6906 from output queue 6746 in PE 6700 produced for the second stream by the stream combine (SCMB) operation performed on the first stream and the second stream, and the numbers in input queue 6924 and input queue 6926 are data values (e.g., payload data) for the first stream and the second stream, respectively.

Figure 69A:
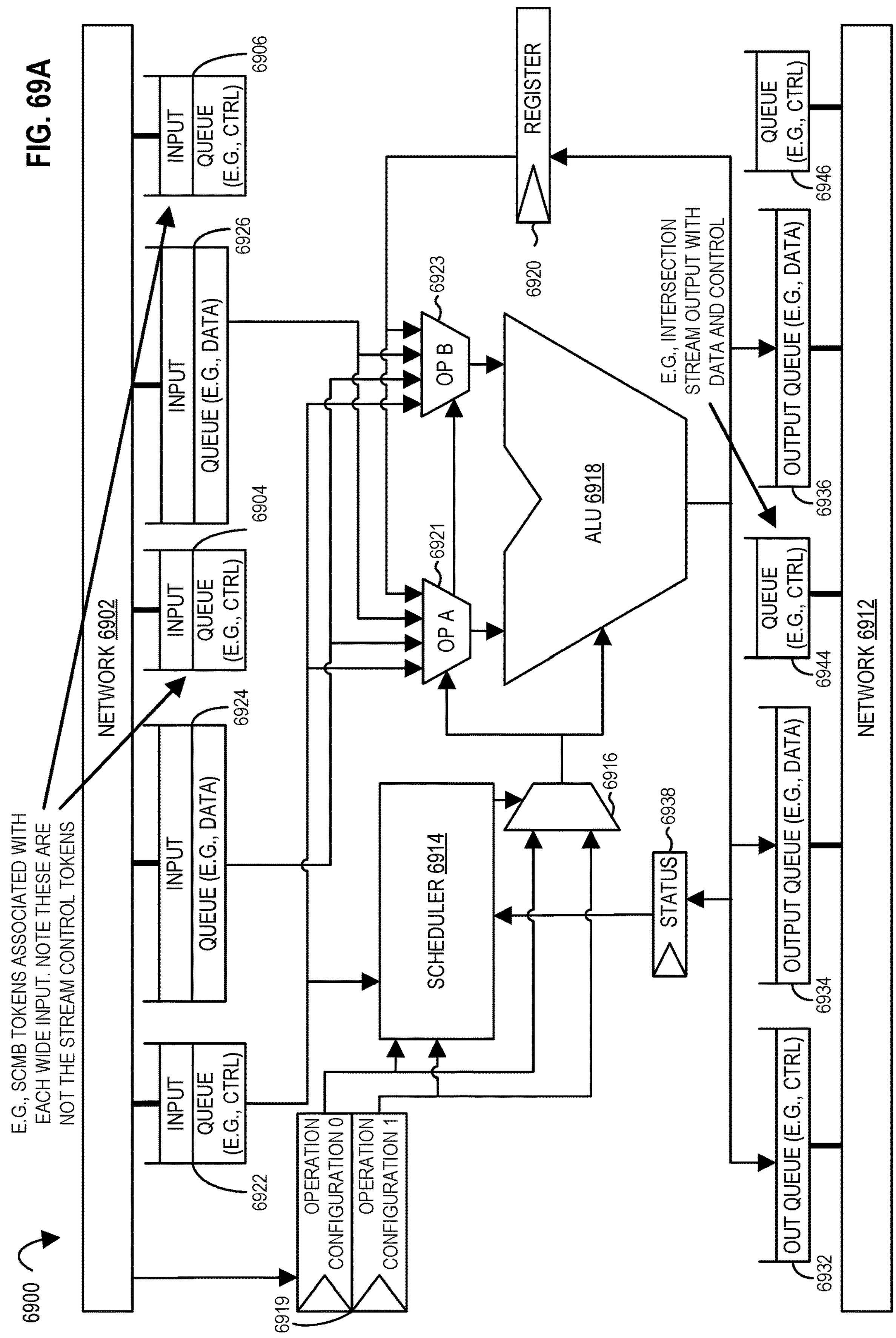
FIGS. 69A-69E illustrate a processing element 6900 performing an Intersection (Inter) operation according to embodiments of the disclosure.
Figure 69B:
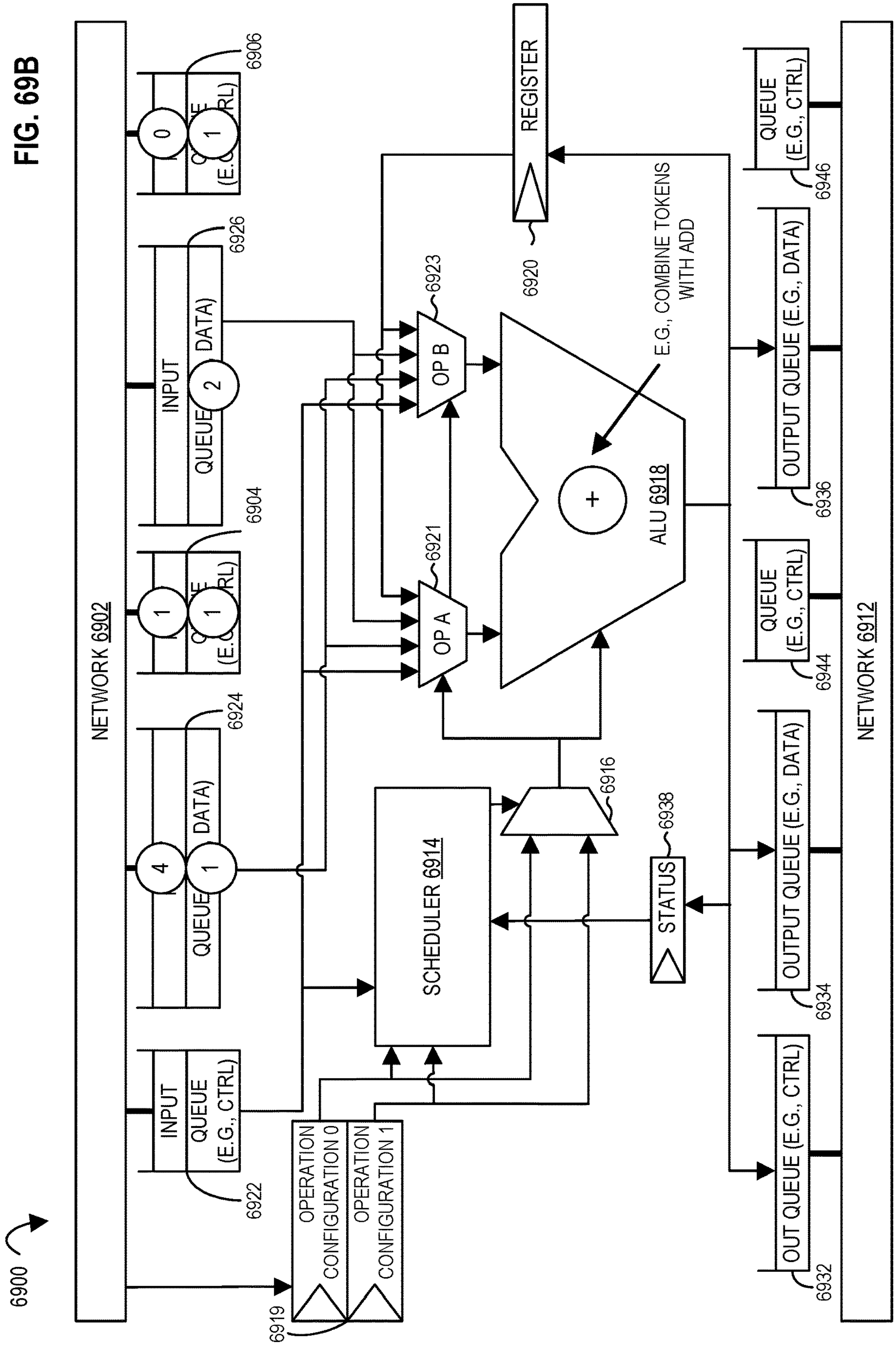

In FIG. 69B, a data value of (e.g., integer) one is in a first slot of input queue 6924 along with a Boolean one stream combine (SCMB) value in a first slot of the associated input queue 6904, and a data value of (e.g., integer) four is in a second slot of input queue 6924 along with a Boolean one stream combine (SCMB) value in a second slot of the associated input queue 6904.

In FIG. 69B, a data value of (e.g., integer) two is in a first slot of input queue 6926 along with a Boolean one stream combine (SCMB) value in a first slot of the associated (e.g., control) input queue 6906, and no data value is stored in a second slot of input queue 6926, but a Boolean zero stream combine (SCMB) value is stored in a second slot of the associated input queue 6904.

The input data that is queued may be sent from another component of a CSA, e.g., from a plurality of other PEs as discussed herein.

In certain embodiments, the data is read from the first slot of a queue, and when consumed (e.g., removed), any data from other slots of the queue are advanced such that data from the second slot is moved into the first slot, etc.

Figure 69C:
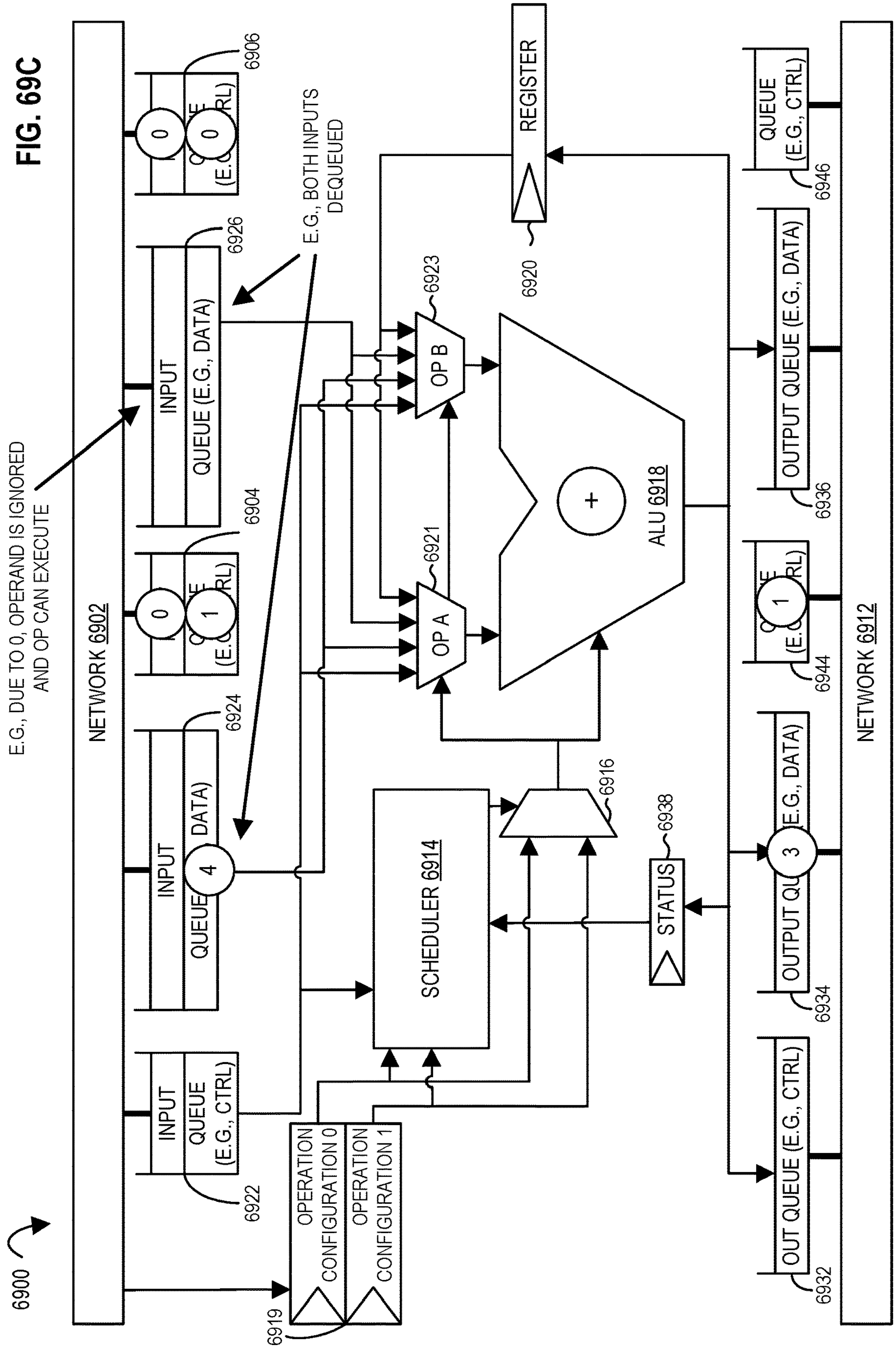

In FIG. 69C, data value of (e.g., integer) one in the first slot of input queue 6924 has been added to the data value of (e.g., integer) two in the first slot of input queue 6926 by the ALU 6918 performing an addition operation, and a resultant data value of three from the addition is stored into the output queue 6934 and a control value (e.g., a Boolean one) is sent to the associated control queue 6944 to indicate this is a valid value of the new stream formed by the Inter operation. In the depicted embodiment, the data value of (e.g., integer) one in the first slot of input queue 6924 is dequeued and the associated stream combine (SCMB) value of one is dequeued (e.g., deleted) from the first slot of input queue 6904, the data value of (e.g., integer) four is moved into the first slot from the second slot of input queue 6924 and the associated stream combine (SCMB) value of one is moved from the second slot into the first slot of input queue 6904, and a Boolean zero stream combine (SCMB) value is stored into the second slot of input queue 6904 and no data value is stored into the second slot of input queue 6924. Additionally, in the depicted embodiment, the data value of (e.g., integer) two in the first slot of input queue 6926 is dequeued and the associated stream combine (SCMB) value of one is dequeued (e.g., deleted) from the first slot of input queue 6906, no data value is moved into the first slot from the second slot of input queue 6926 and the associated stream combine (SCMB) value of zero is moved from the second slot into the first slot of input queue 6904, and a Boolean zero stream combine (SCMB) value is stored into the second slot of input queue 6906 and no data value is stored into the second slot of input queue 6926.

The control value from the (e.g., control) output queue 6944 and the data value from output queue 6934 may be consumed from the output queues, e.g., by a downstream PE or PEs.

Figure 69D:
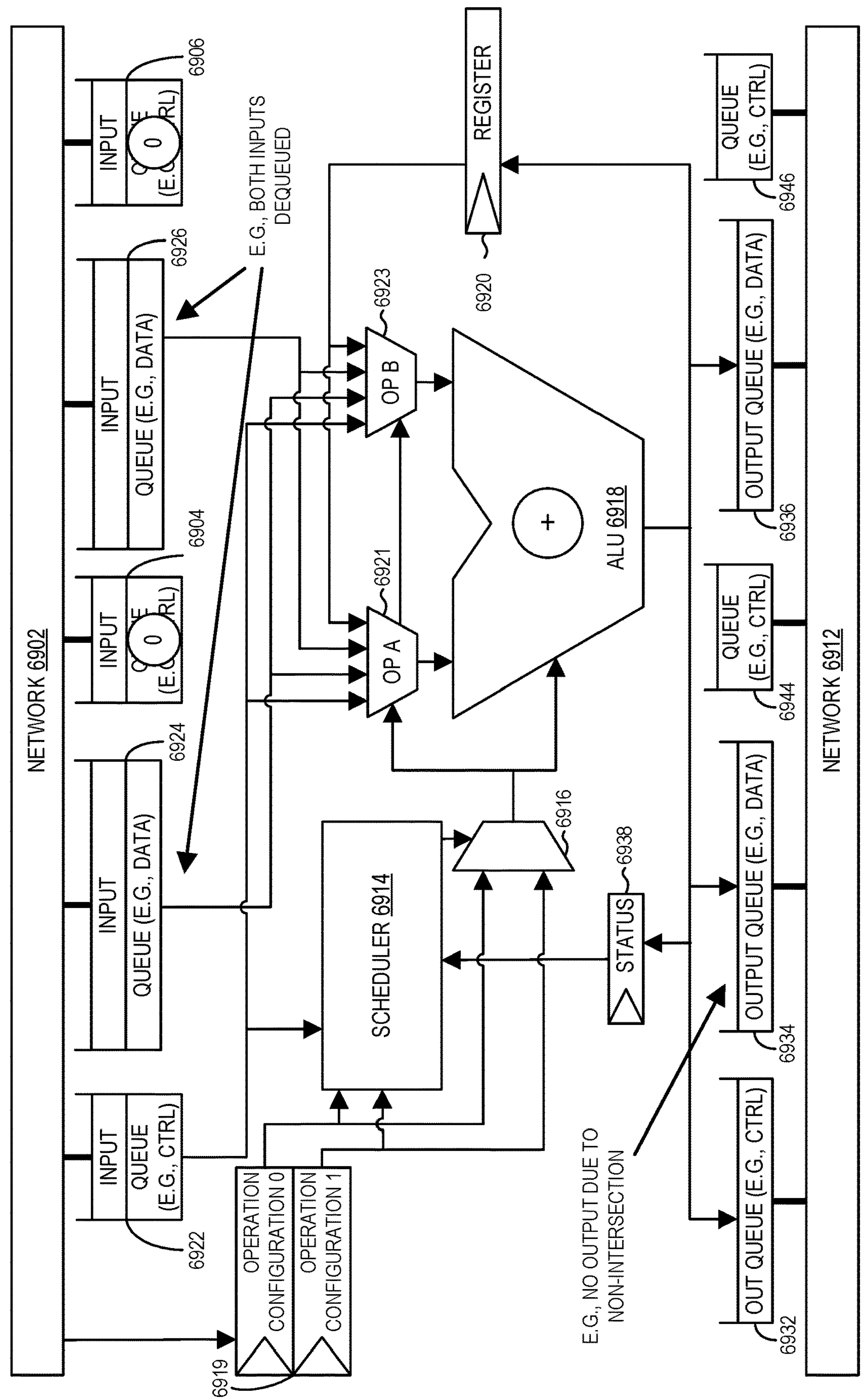

In FIG. 69D, a data value of (e.g., integer) four was in the first slot of input queue 6924 but no data value was the first slot of input queue 6926, so the ALU 6918 here does not produce a resultant data value, e.g., in contrast to the Union operation discussed above. Thus, having no data value in either of the streams indicates there is no intersection, and the PE is to output no data value into the output queue 6934 and no control value (e.g., a Boolean one or zero) is sent to the associated control queue 6944. Additionally, the data value of (e.g., integer) four in the first slot of input queue 6924 is dequeued and the associated stream combine (SCMB) value of one is dequeued (e.g., deleted) from the first slot of input queue 6904, the stream combine (SCMB) value of zero is moved from the second slot into the first slot of input queue 6904, the stream combine (SCMB) value of zero is dequeued from the the first slot of input queue 6906, and the stream combine (SCMB) value of zero is moved from the second slot into the first slot of input queue 6906.

Figure 69E:
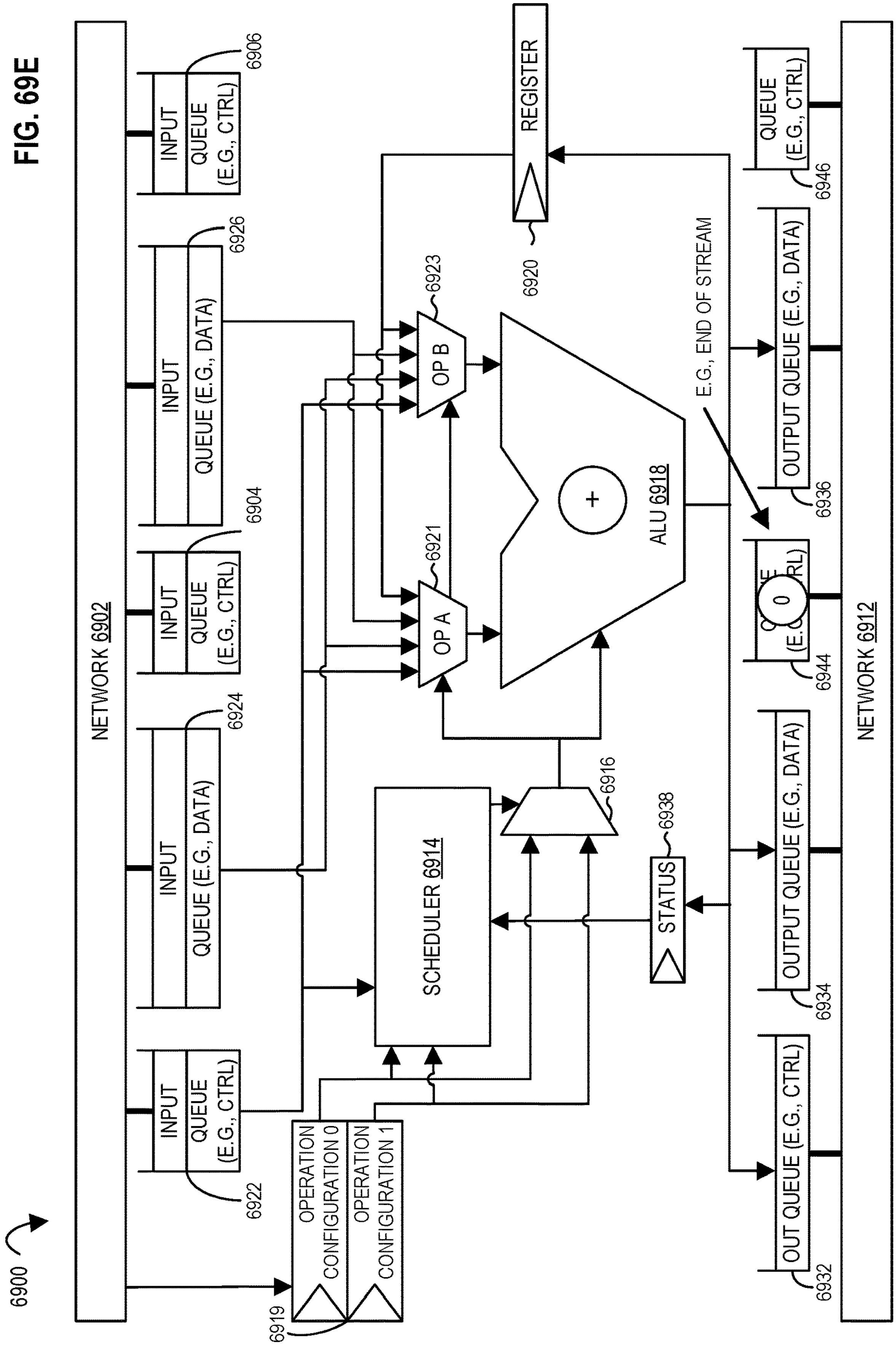

In FIG. 69E, the input queue 6904 and input queue 6906 both included a Boolean zero stream combine (SCMB) value to indicate the end of both streams. Here, a control value (e.g., a Boolean zero) is sent to the associated control queue 6944 to indicate the end of the new stream formed by the Inter operation, and the stream combine (SCMB) value of zero is dequeued (e.g., deleted) from the first slot of input queue 6904 for the first stream and the stream combine (SCMB) value of zero is dequeued (e.g., deleted) from the first slot of input queue 6906 for the second stream.

In certain embodiments, PE 6900 is stalled from performing the inter operation until there is both (i) space available in the output queues that are to be used for storing resultant data, and (ii) input data for each stream (e.g., stream combine (SCMB) value of a Boolean one and the associated payload data for a stream, or stream combine (SCMB) value of a Boolean zero).

In certain embodiments, PE 6900 determines the inter of two streams using SCMB generated control data and using the data values of the streams.

In the depicted embodiment, PE 6900 includes the components of PE 5800 from FIG. 58, for example, with the components ending with the same two numbers having the same functionality. In one embodiment, scheduler 6914 schedules an operation or operations of processing element 6900 for execution according to the configuration value, for example, and when input data and control (e.g., SCMB) input arrives. See, for example, the discussion of FIGS. 33-57.

Boolean Control Operations

As noted herein, one type of data is the data value (e.g., payload) and another type of data is control values. In certain embodiments, data values are transmitted on LICs (e.g., between PEs). Additionally, in certain embodiments, control values are transmitted on LICs (e.g., between PEs). The following discusses a plurality of Boolean control operations that may utilize control values.

NetAll0

In one embodiment, a CSA architecture includes a configuration value that, when stored into the configuration storage (e.g., register), causes the CSA (e.g., a PE thereof) to perform a NetAll0 operation according to the following (e.g., semantics and/or description).

| |
|---|
| Operation: netall (0} och.Cd,i0, ich0.CRLu.i0, ich1.CRLu.i0, ..., ichN-1.CRLu.i0 |
| Semantics: och = 0; ich0.deq. ich1.deq; ... ichN.deq; |
| Description: When all input operands are available, they are dequeued and a single output token is produced. |

In certain embodiments, NetAll0 ensures that a value is sent from each of a plurality of transmitting PEs to a single receiving PE. In one embodiment, the receiving PE outputs a control value (e.g., a one) when all corresponding values (e.g., both instances labeled 0s, 1s, or 2s, respectively) are collected in the transmitting PEs. The use of matched labels (e.g., a pair of 0s) is for explanation only, e.g., matching values (e.g., an integer zero and an integer zero) are not required during actual execution, only the presence of some value.

Figure 70A:
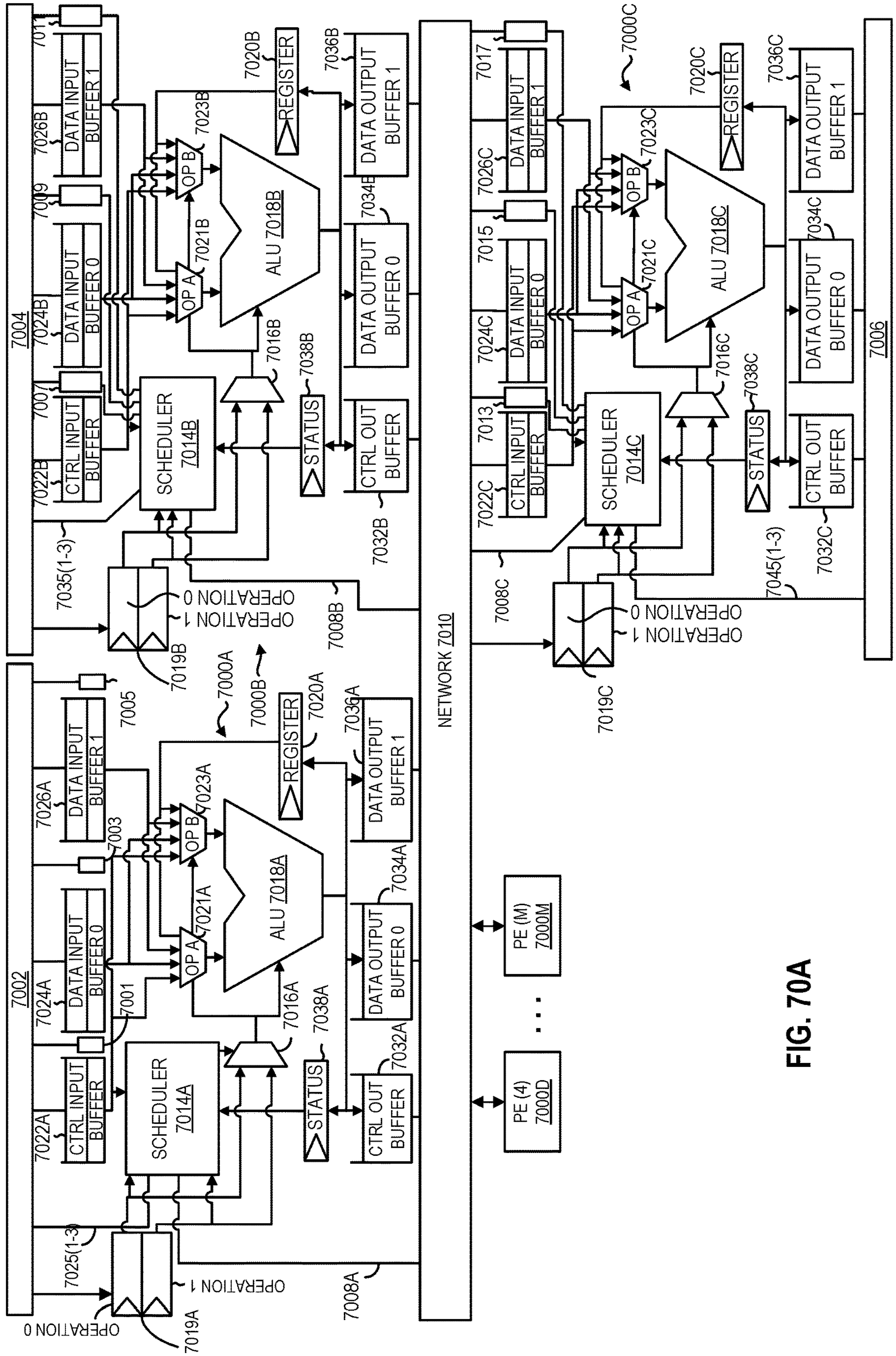
FIG. 70A illustrates a first processing element (PE) and a second processing element (PE) coupled to a third processing element (PE) by a network according to embodiments of the disclosure.

FIG. 70A illustrates a first processing element (PE) 7000A and a second processing element (PE) 7000B coupled to a third processing element (PE) 7000C by a network 7010 according to embodiments of the disclosure. In one embodiment, network 7010 is a circuit switched network, e.g., configured to send a value from first PE 7000A and second PE 7000B to third PE 7000C.

In one embodiment, a circuit switched network 7010 includes (i) a data path to send data from first PE 7000A to third PE 7000C and a data path from second PE 7000B to third PE 7000C, and (ii) a flow control path to send control values that controls (or is used to control) the sending of that data from first PE 7000A and second PE 7000B to third PE 7000C. Data path may send a data (e.g., valid) value when data is in an output queue (e.g., buffer) (e.g., when data is in control output buffer 7032A, first data output buffer 7034A, or second data output queue (e.g., buffer) 7036A of first PE 7000A and when data is in control output buffer 7032B, first data output buffer 7034B, or second data output queue (e.g., buffer) 7036B of second PE 7000B). In one embodiment, each output buffer includes its own data path, e.g., for its own data value from producer PE to consumer PE. Components in PE are examples, for example, a PE may include only a single (e.g., data) input buffer and/or a single (e.g., data) output buffer. Flow control path may send control data that controls (or is used to control) the sending of corresponding data from first PE 7000A and second PE 7000B to third PE 7000C. Flow control data may include a backpressure value from each consumer PE (or aggregated from all consumer PEs, e.g., with an AND logic gate). Flow control data may include a backpressure value, for example, indicating a buffer of the third PE 7000C that is to receive an input value is full. Flow control may include a value that indicates a netall0 operation has completed at third PE 7000C in a prior cycle.

Turning to the depicted PEs, processing elements 7000A-C include operation configuration registers 7019A-C that may be loaded during configuration (e.g., mapping) and specify the particular operation or operations (for example, to indicate whether to enable NetAll0 mode or not. In one embodiment, the operation configuration registers 7019A of the transmitting PE 7000A, 7019B of the transmitting PE 7000B, and 7019C of the receiving PE 7000C are loaded with the operation configuration values for NetAll0. It should be understood that operation configuration registers 7019A of the transmitting PE 7000A, 7019B of the transmitting PE 7000B, and 7019C of the receiving PE 7000C may be loaded with other configuration values, in addition to those associated with NetAll0, that may enable PEs 7000A, 7000B, and 7000C to execute other operations concurrently with NetAll0.

Multiple networks (e.g., interconnects) may be connected to a processing element, e.g., networks 7002, 7004, 7006, and 7010. The connections may be switches, e.g., as discussed in reference to FIGS. 10A and 10B. In one embodiment, PEs and a circuit switched network 7010 are configured (e.g., control settings are selected) such that circuit switched network 7010 provides the paths for NetAll0. In some embodiments, paths in the circuit switch network are shared among several transmitter PEs (e.g. 7000A and 7000B) when affecting the NetAll0 operation.

Figure 70B:
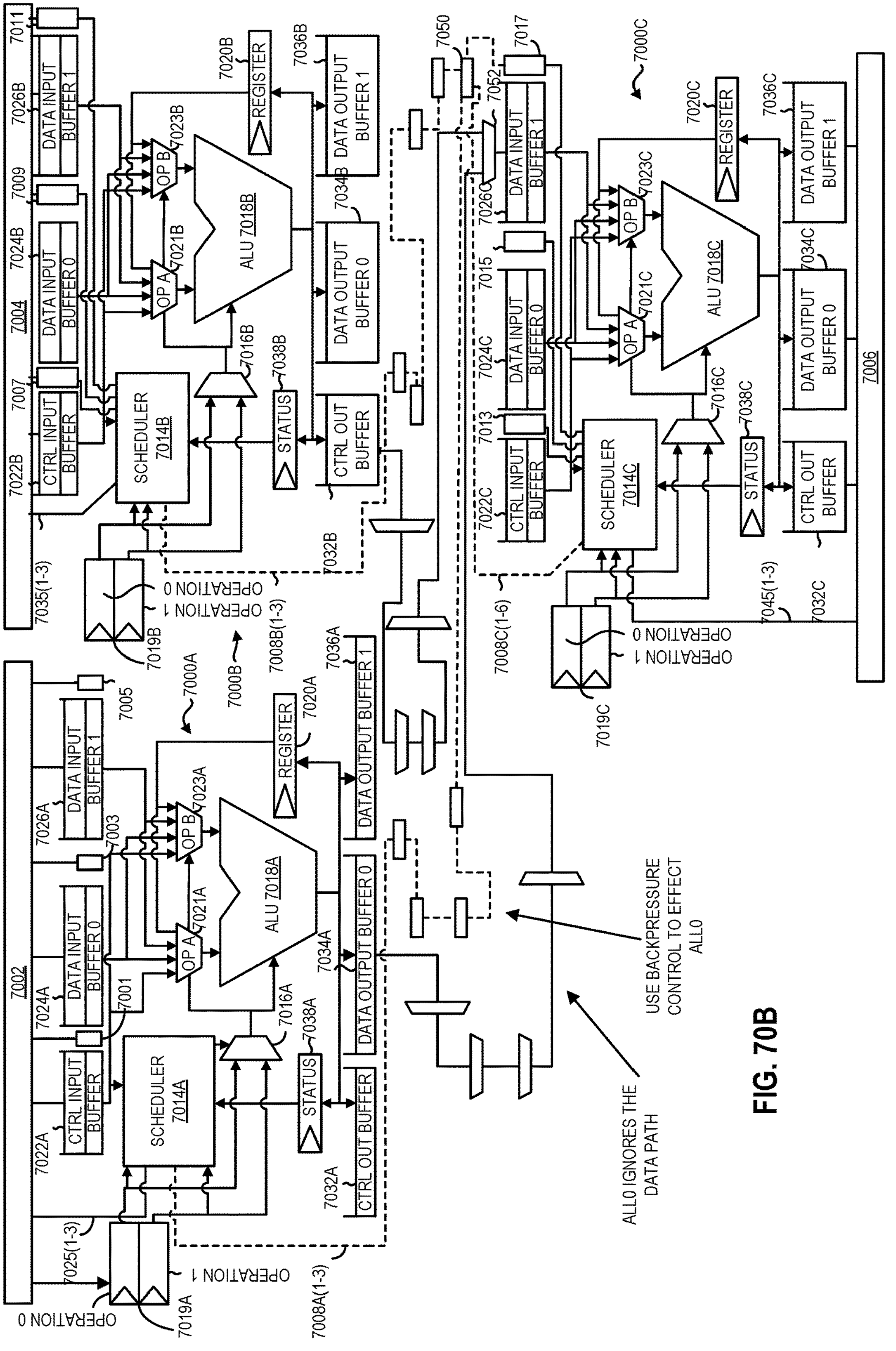
FIG. 70B illustrates a first processing element (PE) and a second processing element (PE) coupled to a third processing element (PE) by a network according to embodiments of the disclosure.

FIG. 70B illustrates a first processing element (PE) 7000A and a second processing element (PE) 7000B coupled to a third processing element (PE) 7000C by a network 7010 according to embodiments of the disclosure. Depicted network 7010 includes a dataflow path and a flow control (e.g., backpressure) path, e.g., with logic gate 7052 sending a backpressure value from third processing element (PE) 7000C to both first processing element (PE) 7000A and second processing element (PE) 7000B. In certain embodiments, a NetAll0 operation causes third processing element (PE) 7000C to ignore the values from the data path (e.g., valid, etc.), and instead used the flow control (e.g., backpressure) path to affect the NetAll0 operation.

Figure 70C:
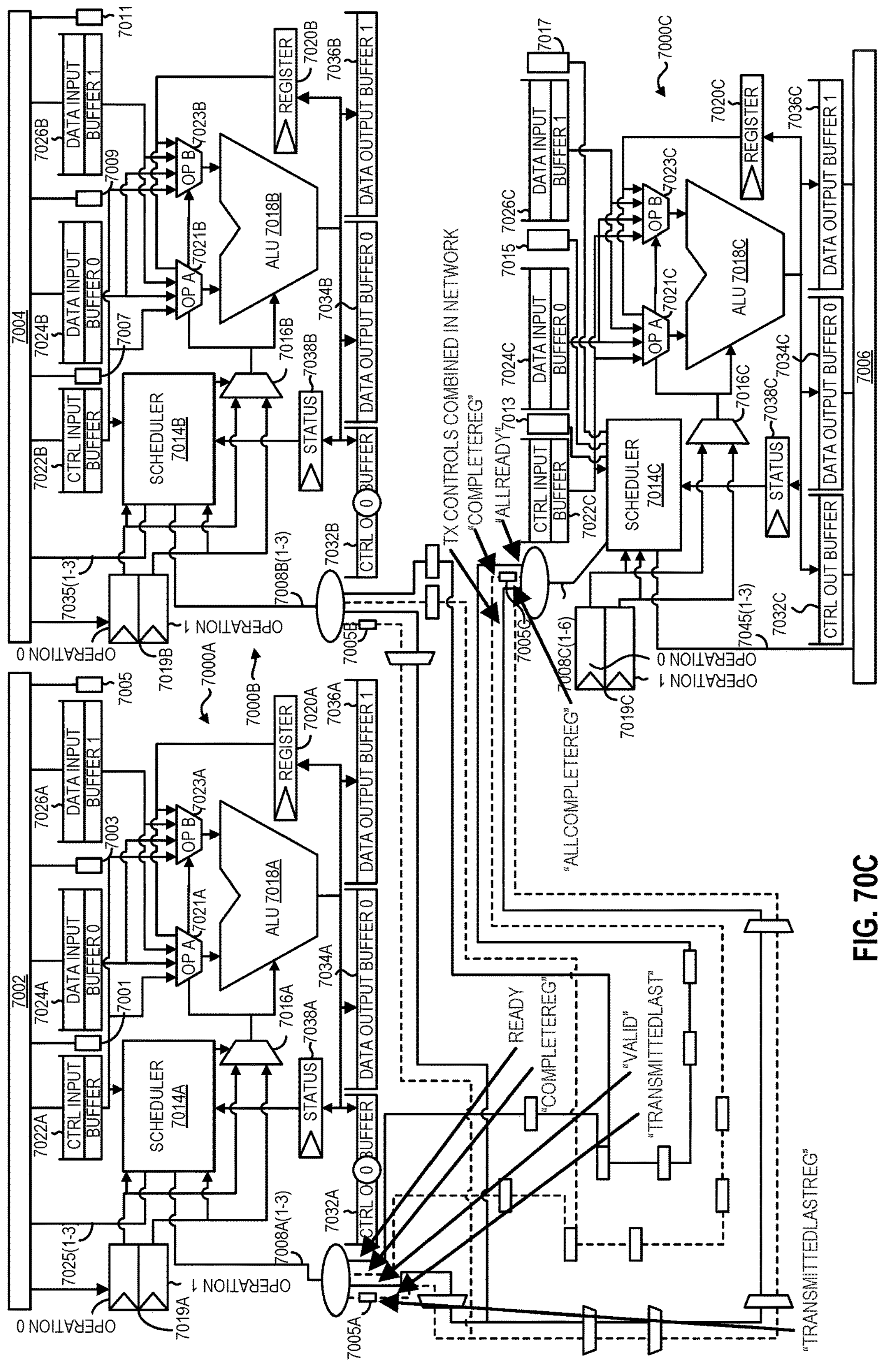
FIG. 70C illustrates a first processing element (PE) and a second processing element (PE) coupled to a third processing element (PE) by a network according to embodiments of the disclosure.

FIG. 70C illustrates a first processing element (PE) 7000A and a second processing element (PE) 7000B coupled to a third processing element (PE) 7000C by a network 7010 according to embodiments of the disclosure. Depicted network 7010 includes multiple lines going to each scheduler (e.g., via scheduler ports 7008A, 7008B, and 7008C into the network 7010). A scheduler port may include one or more (e.g., separate) wires to the network, and thus, the ports of the other PEs.

First processing element (PE) 7000A includes storage (e.g., a register) 7005A to store a transmitted last value (transmitted last, indicating that this transmitter 7000A has already sent a value for this NetAll0 execution), second processing element (PE) 7000B includes storage (e.g., a register) 7005B to store a transmitted last value (transmitted last, indicating that this transmitter 7000B has already sent a value for this NetAll0 execution), and third processing element (PE) 7000C includes storage (e.g., a register) 7005C to store a value (AllCompleteReg) that when set to a first value, causes the receiving PE to read the transmittedLast line and that when set to a second value, cause the receiving PE to read the valid line and not the transmittedLast line.

FIG. 70D-H illustrate first processing element (PE) 7000A and second processing element (PE) 7000B coupled to a third processing element (PE) 7000C by a network 7010 and performing NetAll0 operations according to embodiments of the disclosure. Although two transmitter PEs (e.g. 7000A and 7000B) are shown, it should be understood that any number of transmitter PEs may participate in a NetAll0 operation.

The following discussion sometimes refers to a cycle or cycles. It should be understood that the steps (e.g., instances in time) outlined herein may occur as a sequence of timesteps independent of the oscillation of a particular cycle value in certain embodiments.

Figure 70D:
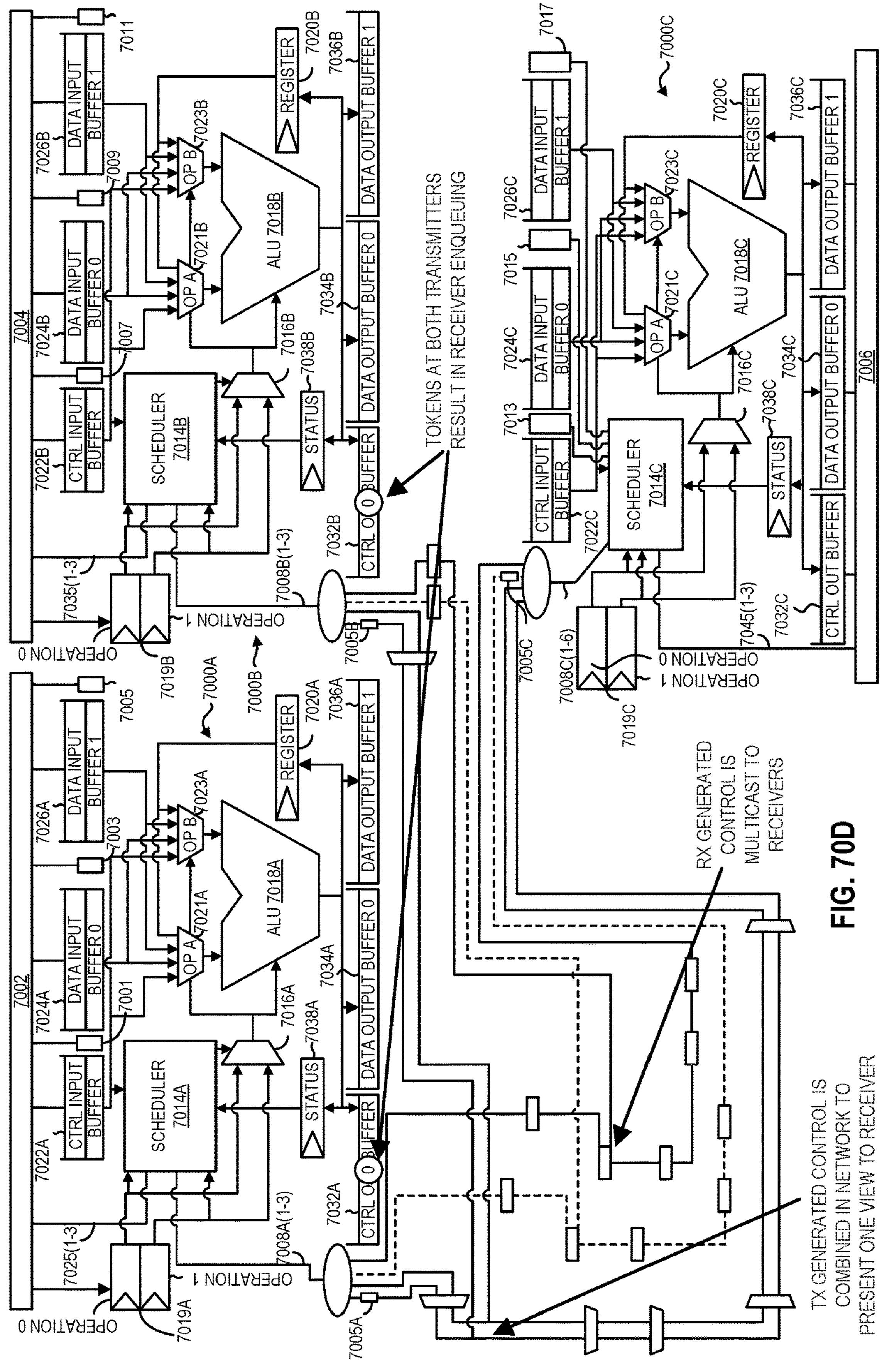
FIGS. 70D-H illustrate first processing element (PE) and second processing element (PE) coupled to a third processing element (PE) by a network and performing NetAll0 operations according to embodiments of the disclosure.

In FIG. 70D, first processing element (PE) 7000A and second processing element (PE) 7000B each include a value (e.g., indicated by the circled 0) in their output buffers, and a valid indication is sent from both of the first processing element (PE) 7000A and second processing element (PE) 7000B to the third processing element (PE) 7000C, and so third processing element (PE) 7000C emits a value (e.g., control value) labeled circle 0 into its input buffer 7022C to indicate the value was received in the output queues of both first processing element (PE) 7000A and second processing element (PE) 7000B. This enqueuing represents the completion of a NetAll0 operation. Since 7005C is not set, the third processing element (PE) 7000C examines the transmittedLast line in determining to enqueue a value into its input buffer 7022C.

Figure 70E:
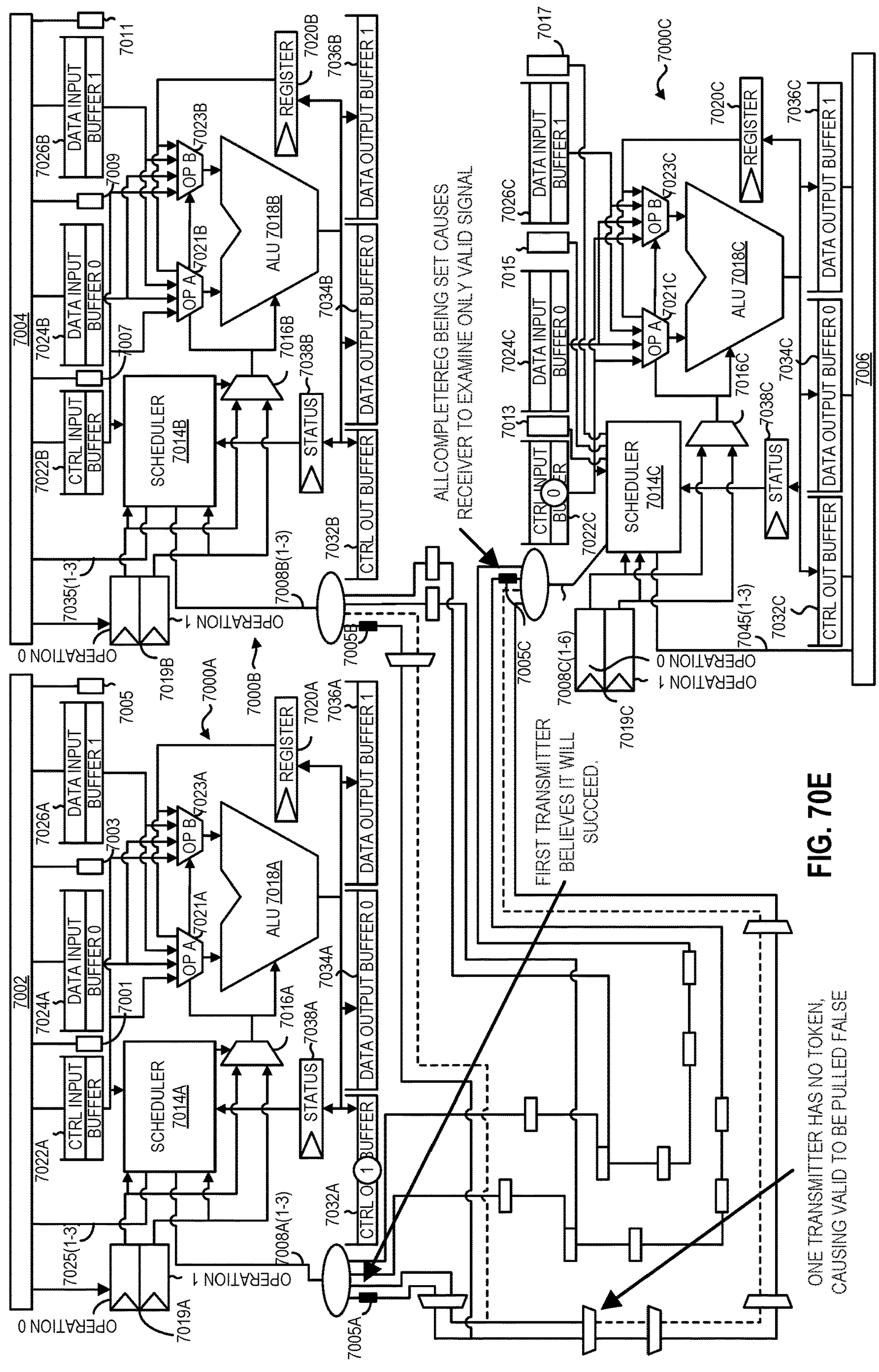

In FIG. 70E, first processing element (PE) 7000A includes a value (e.g., indicated by the circled 1) in its output buffer, but second processing element (PE) 7000B does not have a value stored in its output buffer, and storage (e.g., a register) 7005A is set to true to indicate that the value (circled 0) in the output buffer of first processing element (PE) 7000A was dequeued (e.g., in the previous cycle) and storage (e.g., a register) 7005A is set to true to indicate that the value (circled 0) in the output buffer of second processing element (PE) 7000B was dequeued (e.g., in the previous cycle). 7005C is set, indicating that a NetAll0 operation completed in the previous cycle, the third processing element (PE) 7000C examines the valid line in determining to enqueue a value into its input buffer 7022C. This line contains a value indicating that at least one of the transmitters is not valid and therefore no enqueue will occur in this cycle.

Figure 70F:
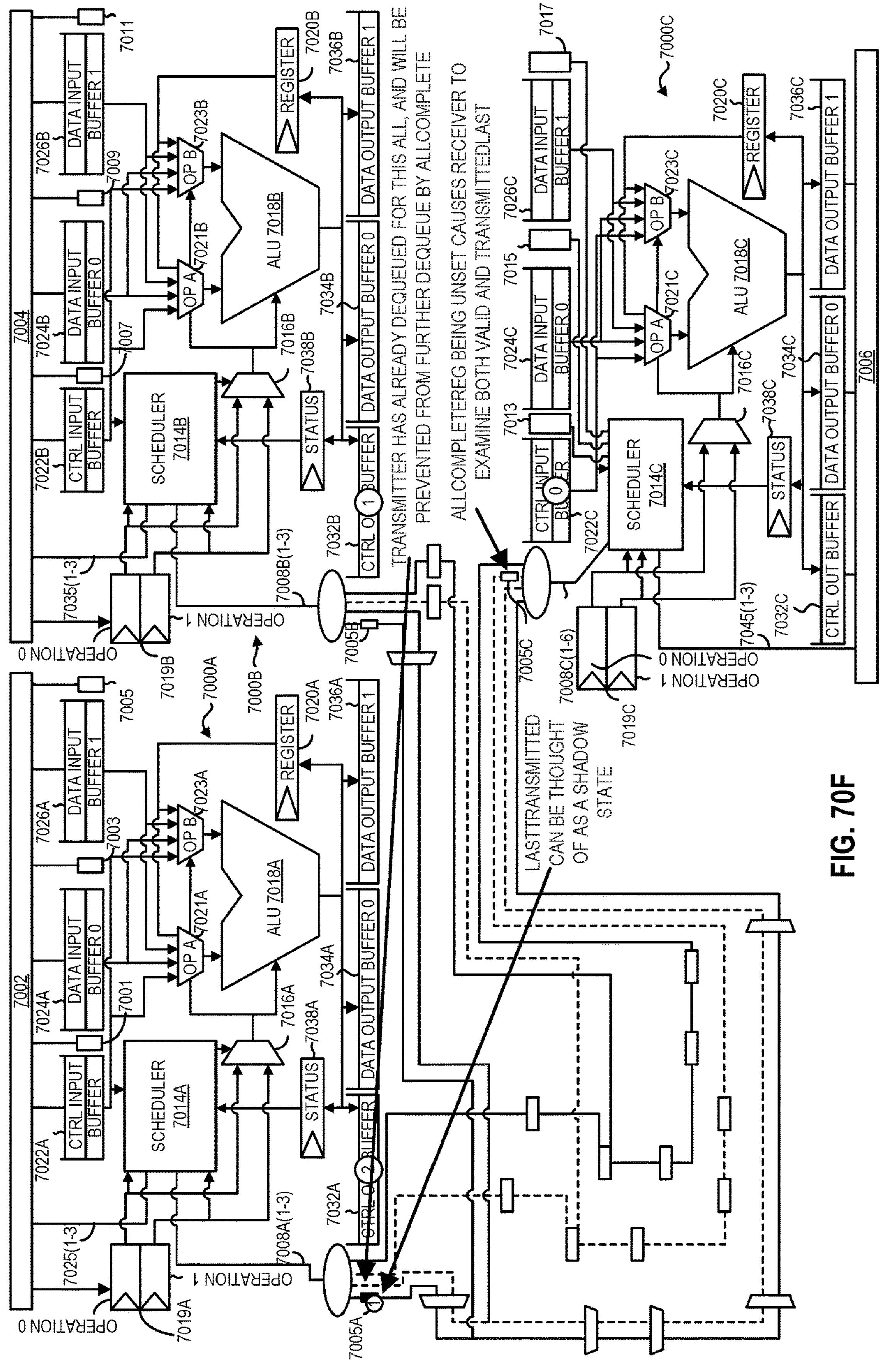

In FIG. 70F, first processing element (PE) 7000A has dequeued value (e.g., indicated by the circled 1) from its output buffer, and set storage (e.g., a register) 7005A to true to indicate that the value (circled 1) in the output buffer of first processing element (PE) 7000A was dequeued (e.g., in the previous cycle), but in the prior cycle the second processing element (PE) 7000B did not have a value stored in its output buffer, so its storage (e.g., a register) 7005B is set to false to indicate that the value (circled 1) has not been received in (e.g., and dequeued from) output buffer of second processing element (PE) 7000B in the prior cycle. In FIG. 70F, the value (circled 1) has been stored in the output buffer of second processing element (PE) 7000B and the value (circled 2) has been stored in the output buffer of first processing element (PE) 7000A. The allCompleteReg value is set to false in the storage (e.g., a register) 7005C of the third processing element (PE) 7000C, because a NetAll0 operation did not complete in the previous cycle, so PE 7000C is to examine the transmittedLast line. The transmittedLast line has a value indicating that all transmitters have data available in the present cycle (e.g. 7000A dequeued in a previous cycle and 7000B is valid in this cycle), and therefore a NetAll0 will complete in this cycle.

Figure 70G:
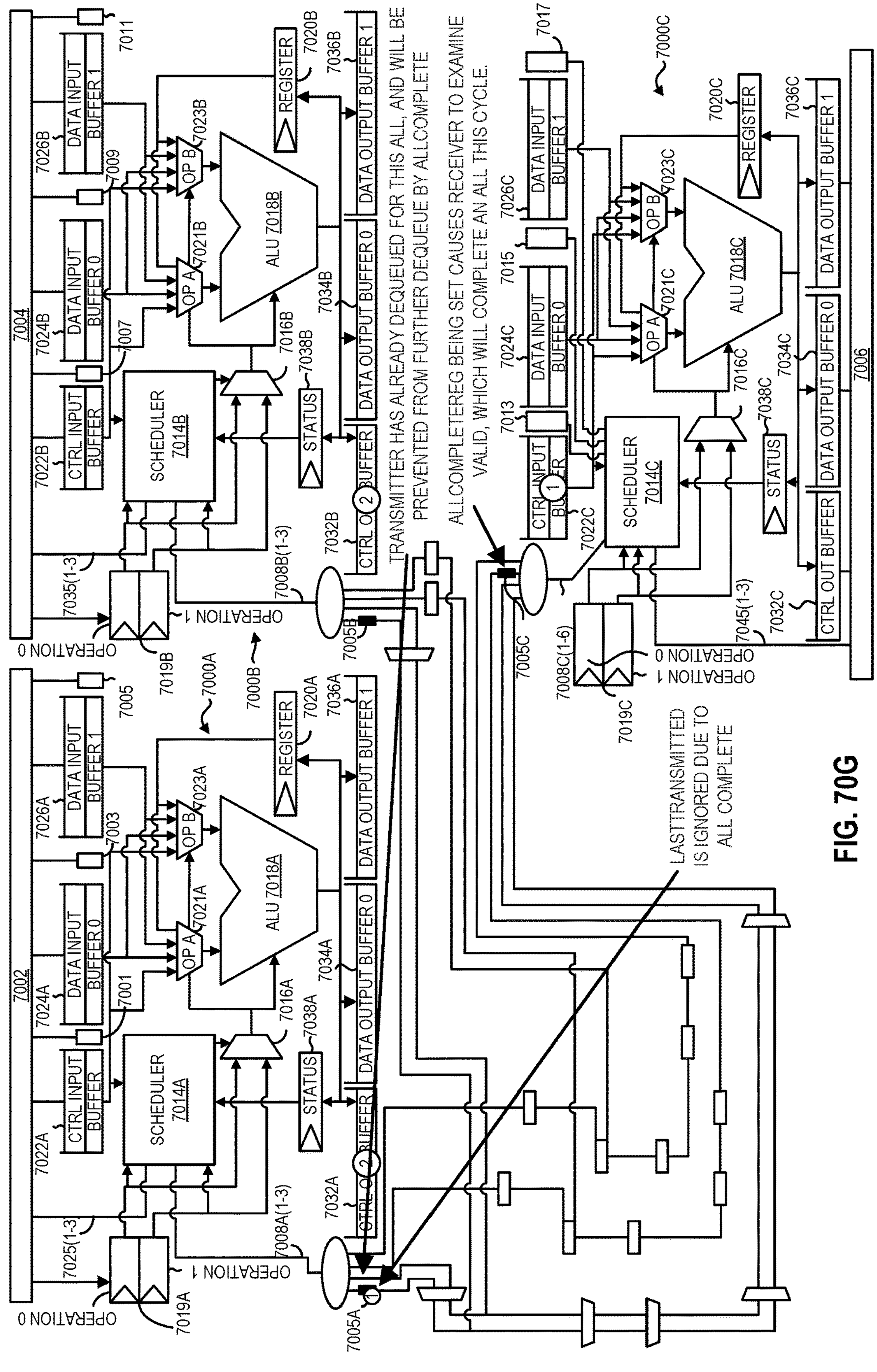

In FIG. 70G, second processing element (PE) 7000B has dequeued value (e.g., indicated by the circled 1) from its output buffer, and set storage (e.g., a register) 7005B to true to indicate that the value (circled 1) in the output buffer of second processing element (PE) 7000B was dequeued (e.g., in the previous cycle), and as that means that both circled 1 value have been received by PE 7000A and PE 7000B, the third processing element (PE) 7000C emits a value (e.g., control value) labeled circle 1 into its input buffer 7022C to indicate the value was received in the output queues of both first processing element (PE) 7000A and second processing element (PE) 7000B. In FIG. 70G, the value (circled 2) has been stored in the output buffer of second processing element (PE) 7000B and the value (circled 2) remains stored in the output buffer of first processing element (PE) 7000A (e.g., it was prevented from being dequeued by the value of allComplete and the value of the storage state 7005B). 7005C is set, indicating that a NetAll0 operation completed in the previous cycle, the third processing element (PE) 7000C examines the valid line in determining to enqueue a value into its input buffer 7022C. The valid line has a value indicating that all transmitters have data available in the present cycle (e.g. 7000A is valid in this cycle and 7000B is valid in this cycle), and therefore a NetAll0 will complete in this cycle.

Figure 70H:
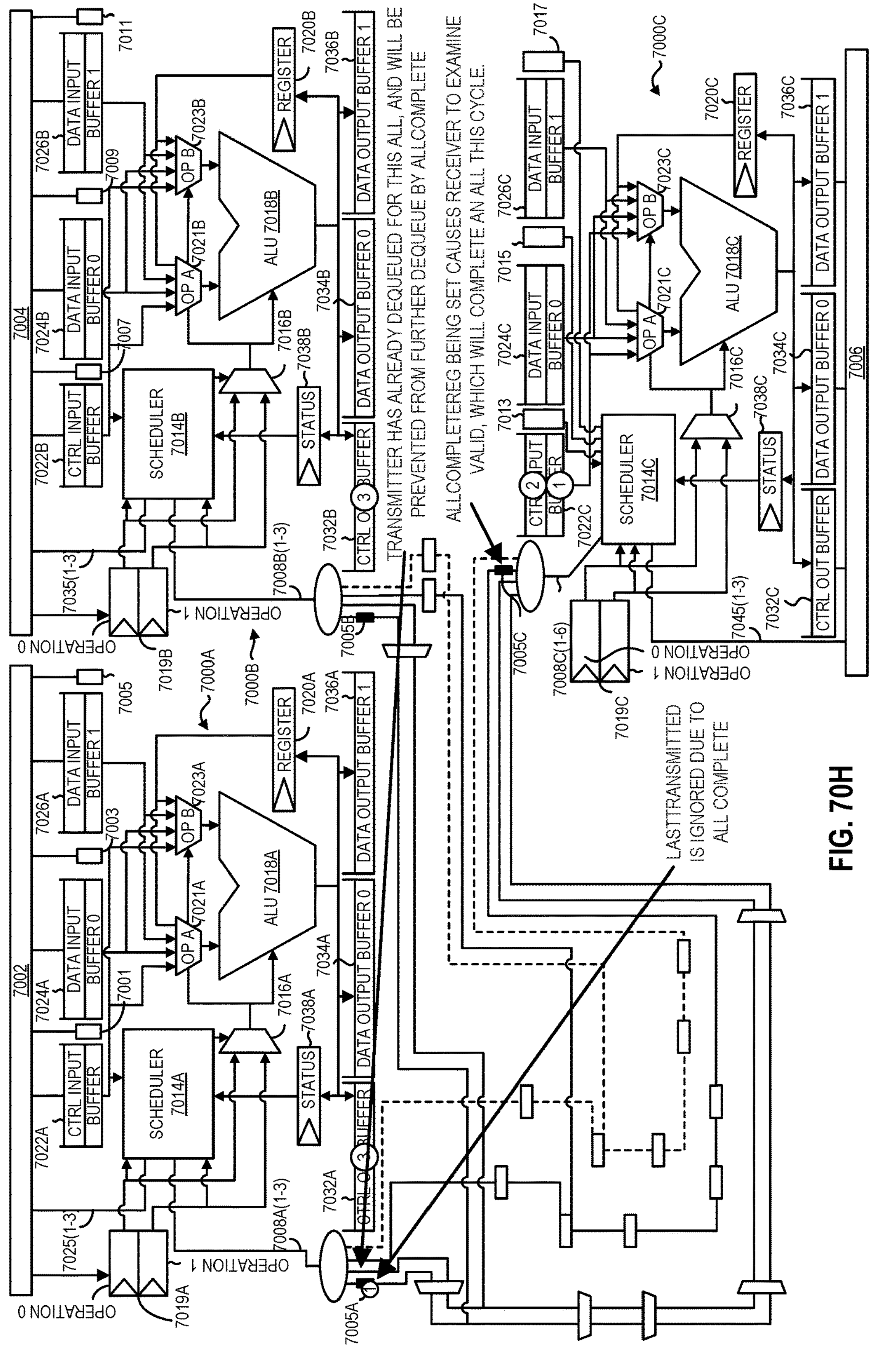

In FIG. 70H, the third processing element (PE) 7000C still stores values (e.g., control value) labeled circle 1 and circle 2 in its output buffer 7032C, so both first processing element (PE) 7000A and second processing element (PE) 7000B are stalled from sending values.

In certain embodiments, the control indications (e.g., from input and/or output controllers of scheduler) are used to indicate presence of zero-bit all0 tokens and leverages control programmability to do this In certain embodiments, a NetAll0 operation reduces a set of 0-bit inputs to a single output, for example, to aggregate counting values coming from memory operations (e.g., one NetAll0 operation occurring per store operation). In certain memory-heavy dataflow graphs, the use of the NetAll operation accounts for about 8% of the total operations. In certain embodiments, a plurality of transmitting PEs send an indication to a receiver PE that they have data, and these indications are combined in the network by NetAll0 to form a single value representative of the indications from the plurality of transmitting PEs.

In certain embodiments, no modifications are required to the PE-to-PE network because control is fanned out and fanned in using programmable state machines, the control can be steered to or from any number of transmitters (transmitter PEs) to a receiver (receiver PE) by correctly configuring the network. In one embodiment where all transmitters must send a value simultaneously, the control fan-in network into the receiver will allow the receiver to accept data only when all transmitters are sending, and all transmitters will be dequeued by the control signals sent by the receiver. In some embodiments, a receiver will assert that it has room to receive tokens (a "ready" signal), and transmitters will observe this and dequeue their tokens. Unfortunately it may be the case that not all transmitters were ready to send. To correct this, NetAll0 may utilize the following mechanisms, e.g., as a configuration extension at the receiver and/or transmitter as explained in reference to FIG. 70D-H.

An example combinational implementation is for the receiver to use uses the incoming valid indication to decide if it will send an indication to its buffer (e.g., queue) to accept new values (e.g., tokens). In certain embodiments, if valid is driven, the receiver may set its ready signal to ensure that transmitters are only dequeued once all transmitters are signaling values. To limit combinational path scope, simultaneous multicast at a transmitter is disallowed i certain embodiments.

An example multiple (e.g., two) cycle implementation uses a bit at the receiver to track whether all transmitters attempted to send a value in this cycle, and the receiver ready indication is driven from a register representing whether the NetAll0 operation will complete in the present cycle. In certain embodiments, this eliminates the combinational loop described above.

An example protocol for obtaining distributed agreement is a modification of the existing four-wire protocol, e.g., as shown in FIG. 70C. In one embodiment, transmitters modify their "first"/"success" indication to indicate whether they attempted to send data in the prior cycle. In one embodiment, a receiver modifies its "speculative" signal to reflect whether all transmitters were "valid" in the prior cycle. In the example state machines below, "success" is renamed as "transmittedLast" (e.g. 7005A, 7005B) and "speculative" as "allComplete" (e.g. 7005C). The "Deq" value indicates that a PE output (e.g. 7032B) is to remove a token when transitioning to the next cycle. The "valid" value indicates whether a transmitter PE (e.g. 7000A, 7000B) has available data in this cycle. The "transmittedLast" value indicates whether a transmitter PE (e.g. 7000A, 7000B) has previously dequeued data during this NetAll0 execution or if it has data to dequeue in this cycle. The "transmittedLastReg" stores a value indicating whether a transmitter PE (e.g. 7000A, 7000B) has previously dequeued data during this NetAll0 execution. The "transmittedLastReg" is set to a value when data is dequeued from the transmitter indicating that the transmitter has previously dequeued data during this NetAll0 execution and set to a different value when allComplete has a value indicating that a NetAll0 has completed and no dequeue occurs in the same cycle. The "Enq" value indicates that a PE input (e.g. 7022C) is to insert a token when transitioning to the next cycle. "ready" indicates whether a receiver PE (e.g. 7000C) has available storage to receive a new token in this cycle. The "allCompleteReg" is a storage set to a value when data is enqueued in the receiver, indicating that the receiver has completed this NetAll0 execution and set to a different value when an enqueuer has not occurred in the previous cycle. The "allComplete" value indicates that a receiver has completed a NetAll execution in the previous cycle.

Transmitter (e.g. 7000A, 7000B):

Deq=(output.notEmpty && transmitter.ready && (!transmittedLastReg||allComplete))

valid=output.notEmpty transmittedLast=transmittedLastReg||output.notEmpty transmittedLastReg<=deq||(transmittedLastReg && !allComplete)

Receiver (e.g. 7000C):

Enq: input.notFull && ((!allCompleteReg && transmittedLast)||(allCompleteReg && valid))

allCompleteReg<=input.notFull && ((!allCompleteReg && (transmittedLast))||(allCompleteReg&& valid))

ready:input.notFull allComplete: allCompleteReg

This implementation allows the NetAll0 to slip in case not all transmitters are ready to send in a single cycle. However, if all transmitters and the receiver are ready in every cycle, full throughput it maintained. In certain embodiments, configuration bits are used to select this mode, which adjusts the control from the normal multicast to the all reduction (NetAll0).

Because the behavior of the protocol is modified in this case, transmitters participating in the NetAll0 do not simultaneously participate in a multicast in certain embodiments. Land In one embodiment, a CSA architecture includes a configuration value that, when stored into the configuration storage (e.g., register), causes the CSA (e.g., a PE thereof)

to perform a logical AND (land) operation according to the following (e.g., semantics and/or description).

Operation: 1and1 res.CRd.i1, op1.CRLu.i1, op2.CRLu.i1=1, op3.CRLu.i1=1, op4. CRLu.il=1
Semantics: res = opl && op2 && op3 && op4
Description: Logical AND of successive operands. Unlike normal and, this short circuits consumption of operations as soon as a false value is encountered. e.g. if op1 is false, there is no read of op2, op3, or op4. In the assembler, unused operands default to 1.

FIGS. 71A-71E illustrate a processing element 7100 performing a logical AND (land) operation according to embodiments of the disclosure. In the depicted embodiment, an operation configuration value for a land operation is stored (e.g., during a programming time period) into operation configuration register 7119. In one embodiment, the land operation causes PE 7100 to output a zero (e.g., Boolean value) to an output queue when either of a (e.g., first slot of a) plurality of input queues include a zero (e.g., Boolean value) therein, e.g., according to the "land1" operation in the above discussion.

In FIGS. 71B-71E, the numbers in the circles for the bits in (e.g., control) input queue 7104 and (e.g., control) input queue 7106 indicate a value (e.g., Boolean one or zero). The value may be a control value or a data value. In another embodiment, any plurality of the PE's input buffers (e.g., 7104, 7106, 7122, 7124, or 7126) source the input data for the land operation, and the resultant output is sent to any one (or more) of the PE's output buffers (e.g., 7132, 7134, 7136, 7144, or 7146), e.g., according to the configuration value.

Figure 71A:
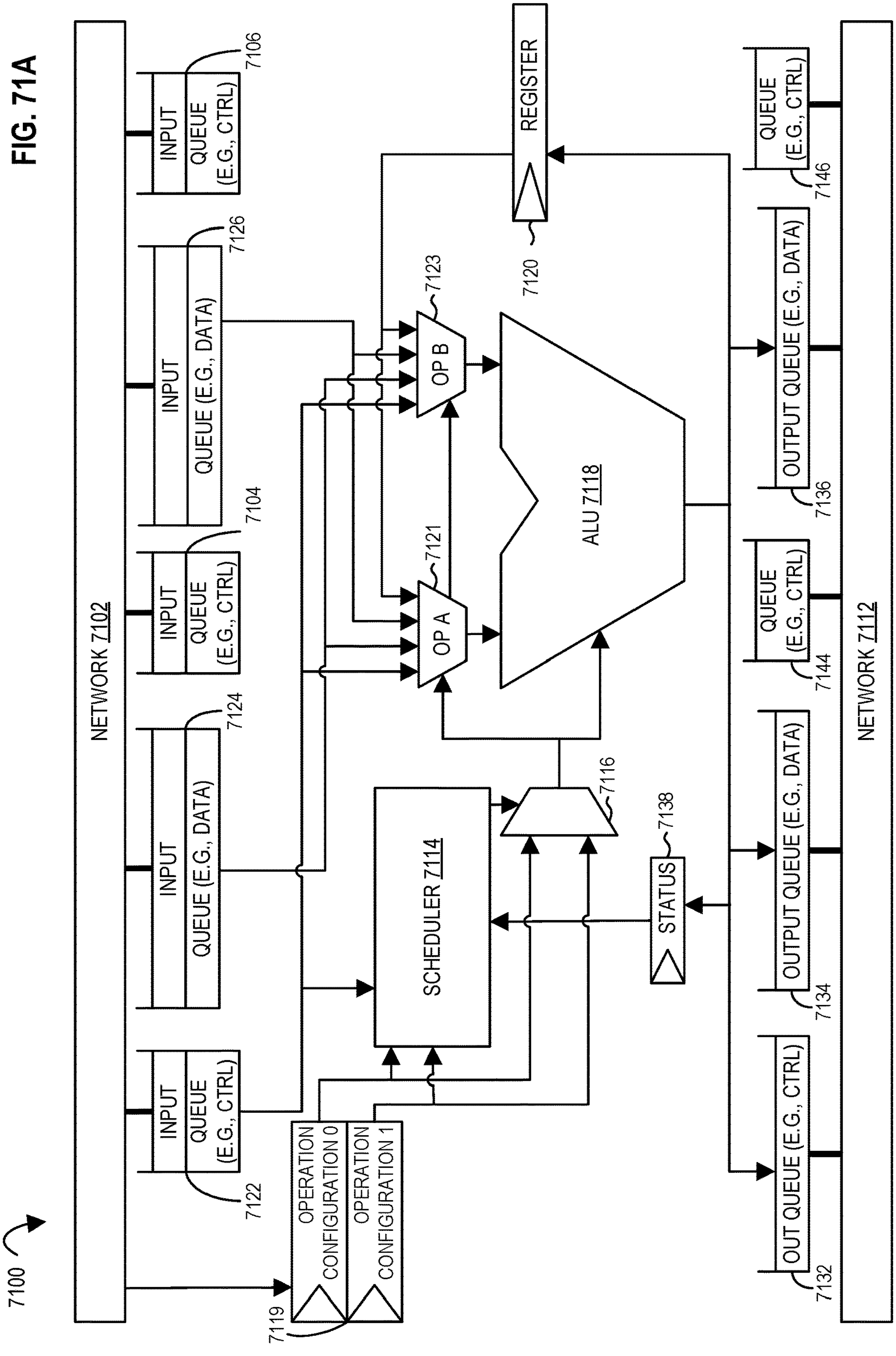
FIGS. 71A-71E illustrate a processing element performing a logical AND (land) operation according to embodiments of the disclosure.
Figure 71B:
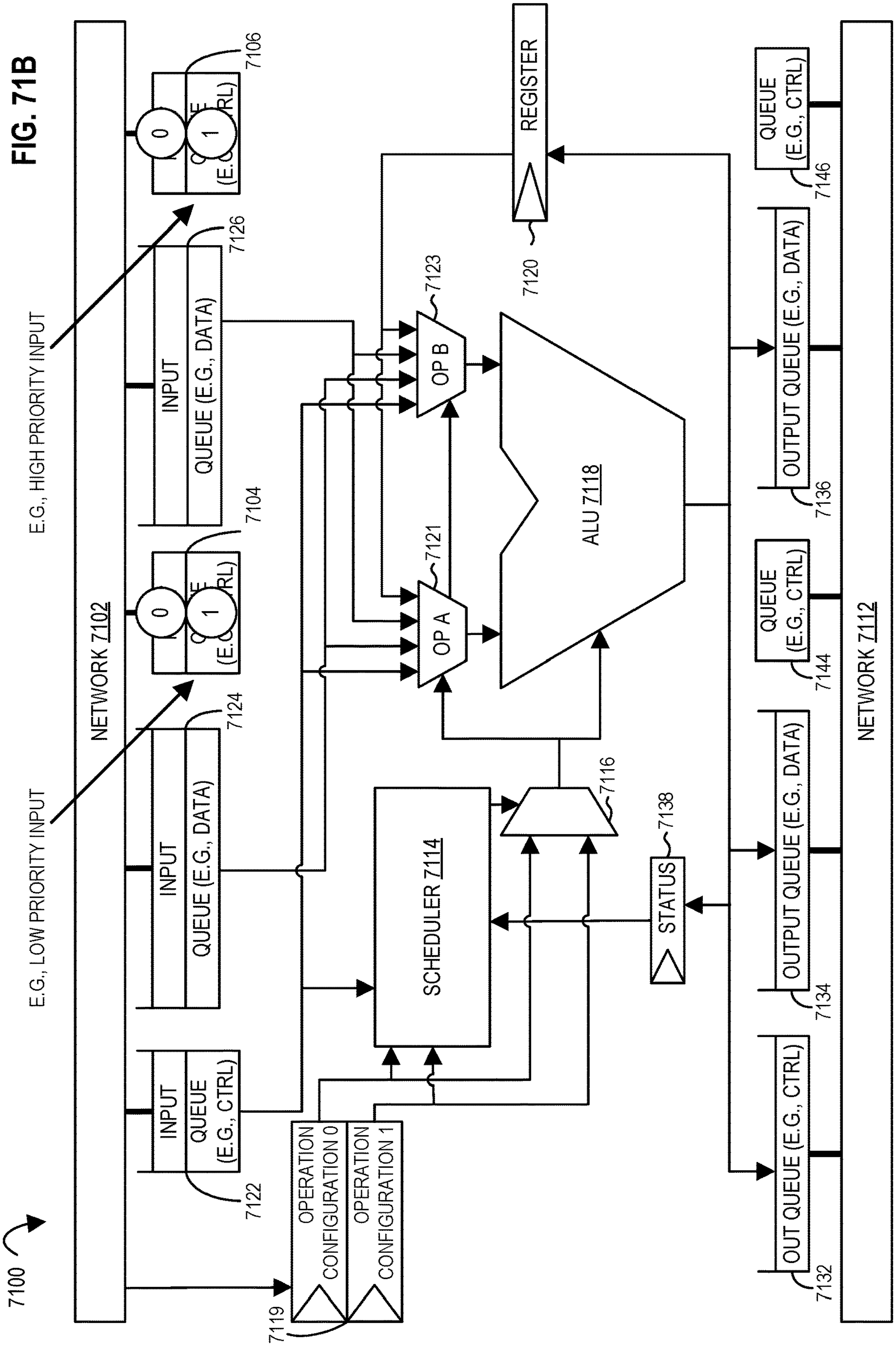

In FIG. 71B, a (e.g., control) value of one is in a first slot of input queue 7104, a (e.g., control) value of zero is in the second slot of input queue 7104, a (e.g., control) value of one is in a first slot of input queue 7106, a (e.g., control) value of zero is in the second slot of input queue 7106. In the depicted embodiment, input queue 7104 is considered to be the lower priority input and input queue 7106 is considered to be the higher priority input, as discussed further below.

Figure 71C:
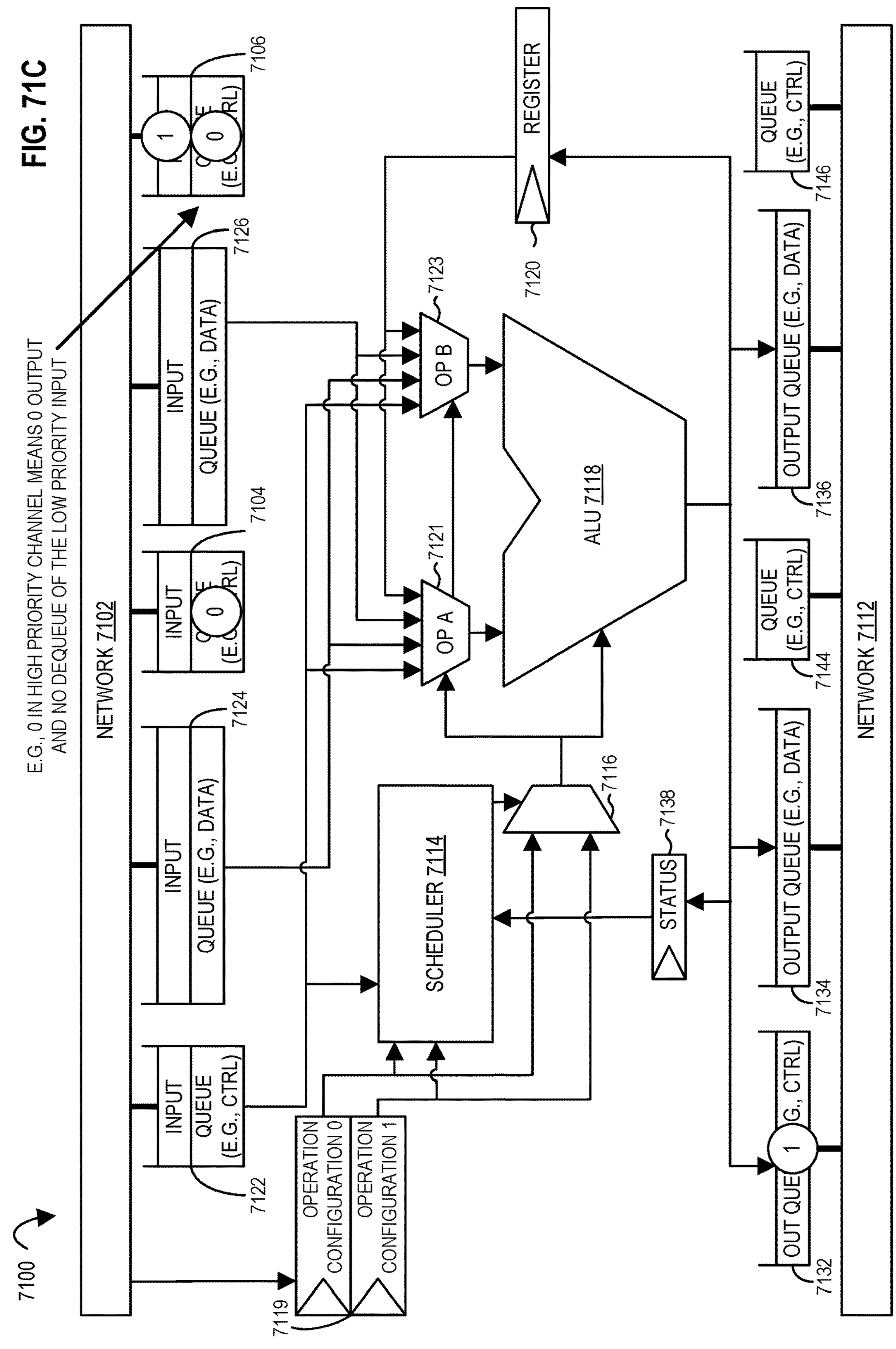

In FIG. 71C, because the value of one was in a first slot of input queue 7104 and the value of one was in a first slot of input queue 7106, PE 7100 (e.g., ALU 7118) outputs a one (e.g., Boolean one) (e.g., one ANDed with one produces a one) to output queue 7132. Additionally, in the depicted embodiment, the value of one is dequeued from the first slot of input queue 7104, the value of zero is moved (e.g., physically or logically) from the second slot into the first slot of input queue 7104, the value of one is dequeued from the first slot of input queue 7106, the value of zero is moved from the second slot into the first slot of input queue 7106, and a value of zero is stored (e.g., as sent from an upstream PE) into the second slot of input queue 7106. The value from the output queue 7132 may be consumed, e.g., by a downstream PE or PEs.

Note that certain embodiments herein discuss moving a value between slots (e.g., from a first slot to a second slot). In one embodiment, the value physically moves from one slot to another in a same queue. In another embodiment, the physical storage slot that is used is the same slot, but it is a logical (not physical) move of data. For example, the head/tail pointer in FIG. 35 is manipulated to point to the current slot to be used (e.g., to be loaded from or stored to) and/or the head/tail pointer in FIG. 45 is manipulated to point to the current slot to be used (e.g., to be loaded from or stored to)

Figure 71D:
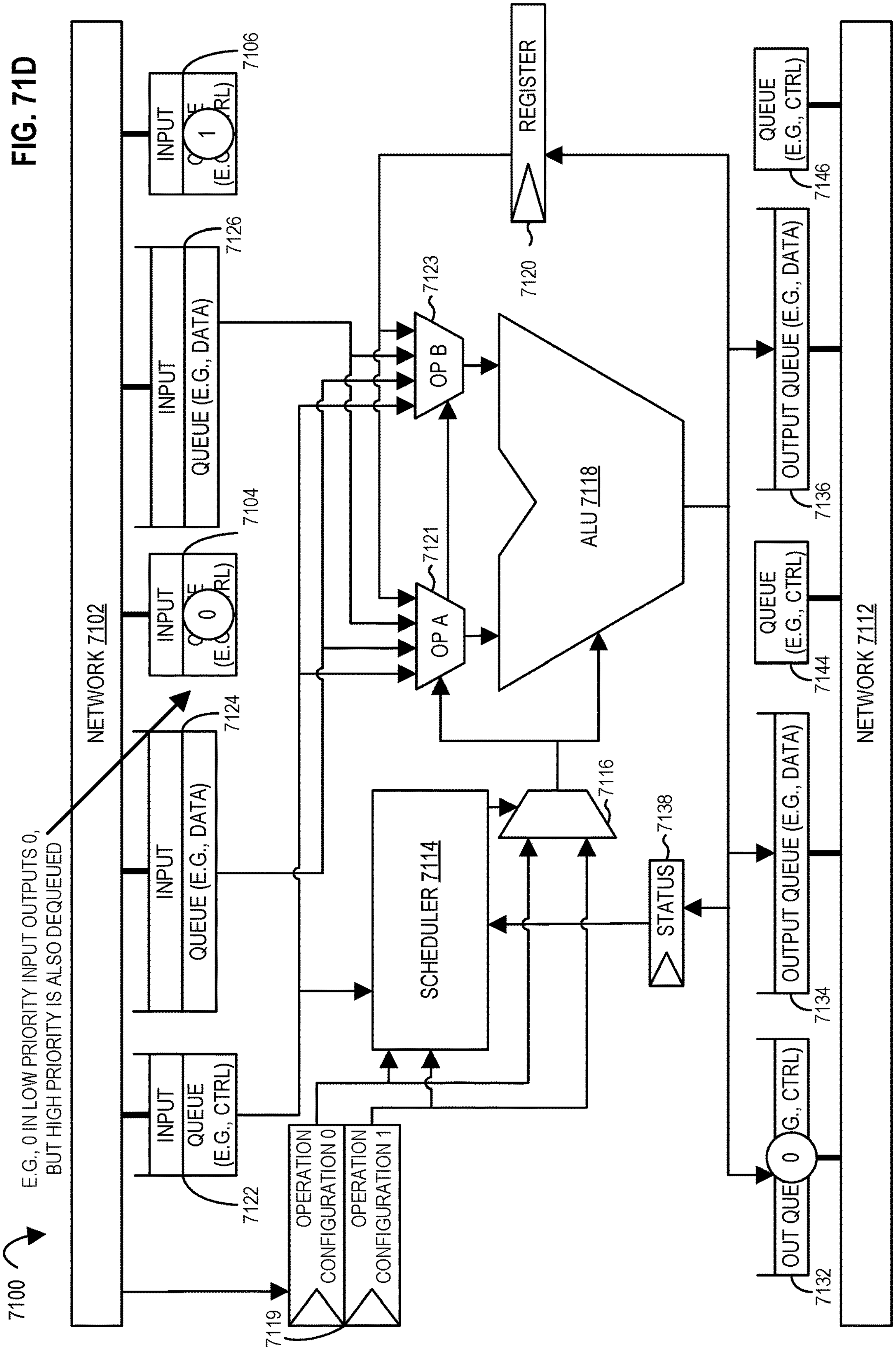

In FIG. 71D, a zero was in the first slot of the lower priority input queue 7104 and a zero was in the first slot of the higher priority input queue 7106, so PE 7100 (e.g., ALU 7118) outputs a zero (e.g., Boolean zero) (e.g., zero ANDed with zero produces a zero) to output queue 7132, the zero in the first slot of the higher priority input queue 7106 is dequeued (e.g., deleted), the one is moved from the second slot into the first slot of the higher priority input queue 7106, and the zero in the first slot of the lower priority input queue 7104 is not dequeued (e.g., not deleted). The value from the output queue 7132 may be consumed, e.g., by a downstream PE or PEs.

Figure 71E:
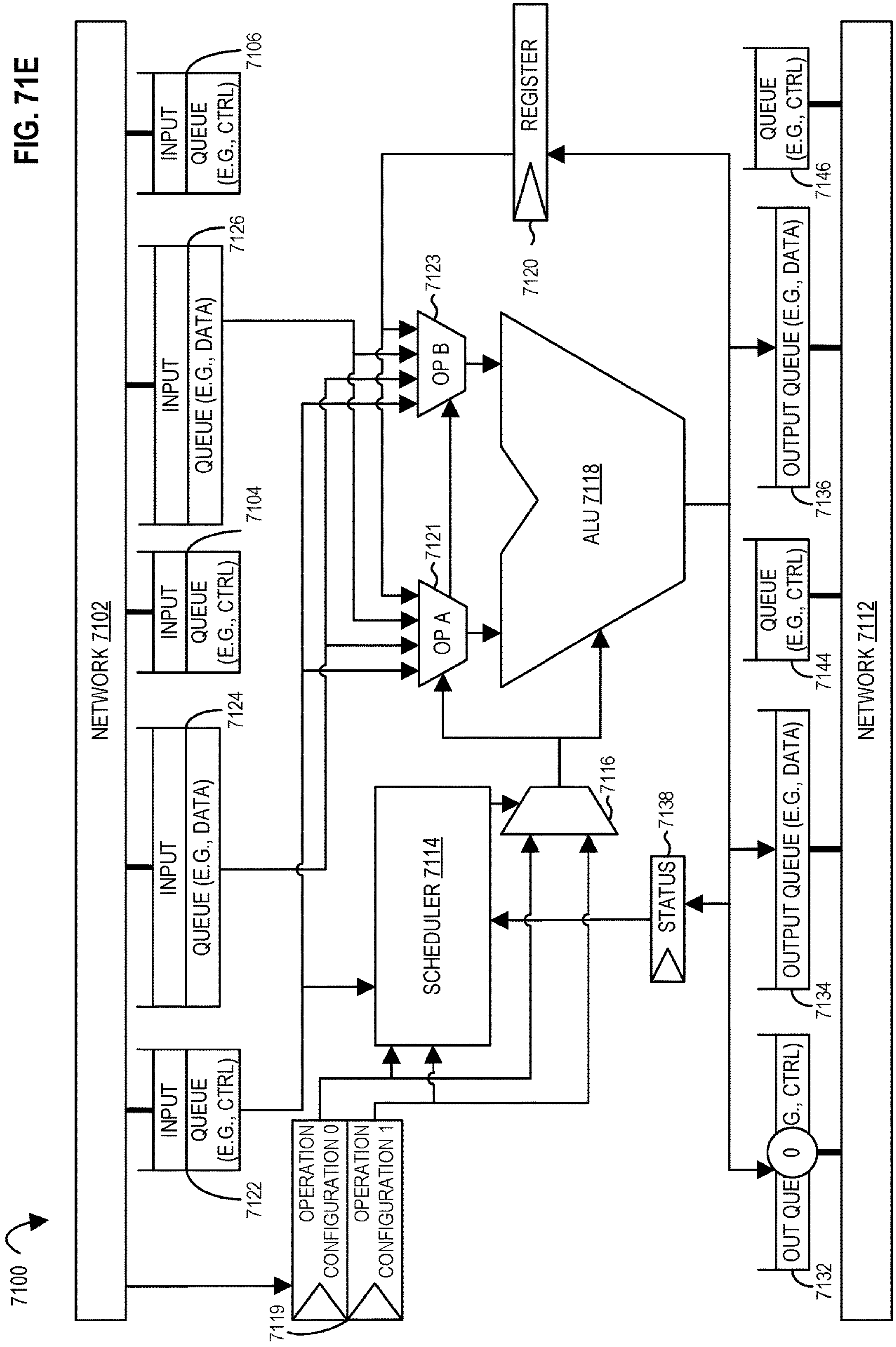

In FIG. 71E, a zero remained in the first slot of the lower priority input queue 7104 and a one was in the first slot of the higher priority input queue 7106, so PE 7100 (e.g., ALU 7118) outputs a zero (e.g., Boolean zero) (e.g., zero ANDed with one produces a zero) to output queue 7132, the one in the first slot of the higher priority input queue 7106 is dequeued (e.g., deleted), and the zero in the first slot of the lower priority input queue 7104 is dequeued (e.g., deleted). The value from the output queue 7132 may be consumed, e.g., by a downstream PE or PEs.

In certain embodiments, land is the logical AND of successive operands, e.g., where a zero is to stop the land from examining successive operands and instead immediately output a zero. This may be used for nested combinational statements.

In certain embodiments, PE 7100 is stalled from performing the land operation until there is both (i) space available in the output queue that is to be used for storing resultant data, and (ii) an input value in each of the source input queues (e.g., but absence of a value in the low priority input queue will not block the execution of the operation if that value is not needed).

In the depicted embodiment, PE 7100 includes the components of PE 5800 from FIG. 58, for example, with the components ending with the same two numbers having the same functionality. In one embodiment, scheduler 7114 schedules an operation or operations of processing element 7100 for execution according to the configuration value, e.g., and when input data and control input arrives. See, for example, the discussion of FIGS. 33-57.

Lor

In one embodiment, a CSA architecture includes a configuration value that, when stored into the configuration storage (e.g., register), causes the CSA (e.g., a PE thereof) to perform a logical OR (Lor) operation according to the following (e.g., semantics and/or description).

Operation: 1or1 res.CRd.i1, op1.CRLu.i1, op2.CRLu.i1=0, op3.CRLu.i1=0, op4.CRLu.i1=0
Semantics: res = op1 || op2 || op3 || op4
Description: Logical OR of successive operands. Unlike normal or, this short circuits -continued consumption of operations as soon as a true value is encountered. e.g. if op1 is true, there is no read of op2-op4. In the assembler, unused operands default to 0.

FIGS. 72A-72E illustrate a processing element 7200 performing a logical OR (lor) operation according to embodiments of the disclosure. In the depicted embodiment, an operation configuration value for a lor operation is stored (e.g., during a programming time period) into operation configuration register 7219. In one embodiment, the lor operation causes PE 7200 to output a one (e.g., Boolean value) to an output queue when either of a (e.g., first slot of a) plurality of input queues include a one (e.g., Boolean value) therein, e.g., according to the "lor1" operation in the above discussion.

In FIGS. 72B-72E, the numbers in the circles for the bits in (e.g., control) input queue 7204 and (e.g., control) input queue 7206 indicate a value (e.g., Boolean one or zero). The value may be a control value or a data value. In another embodiment, any plurality of the PE's input buffers (e.g., 7204, 7206, 7222, 7224, or 7226) source the input data for the lor operation, and the resultant output is sent to any one (or more) of the PE's output buffers (e.g., 7232, 7234, 7236, 7244, or 7246), e.g., according to the configuration value.

Figure 72A:
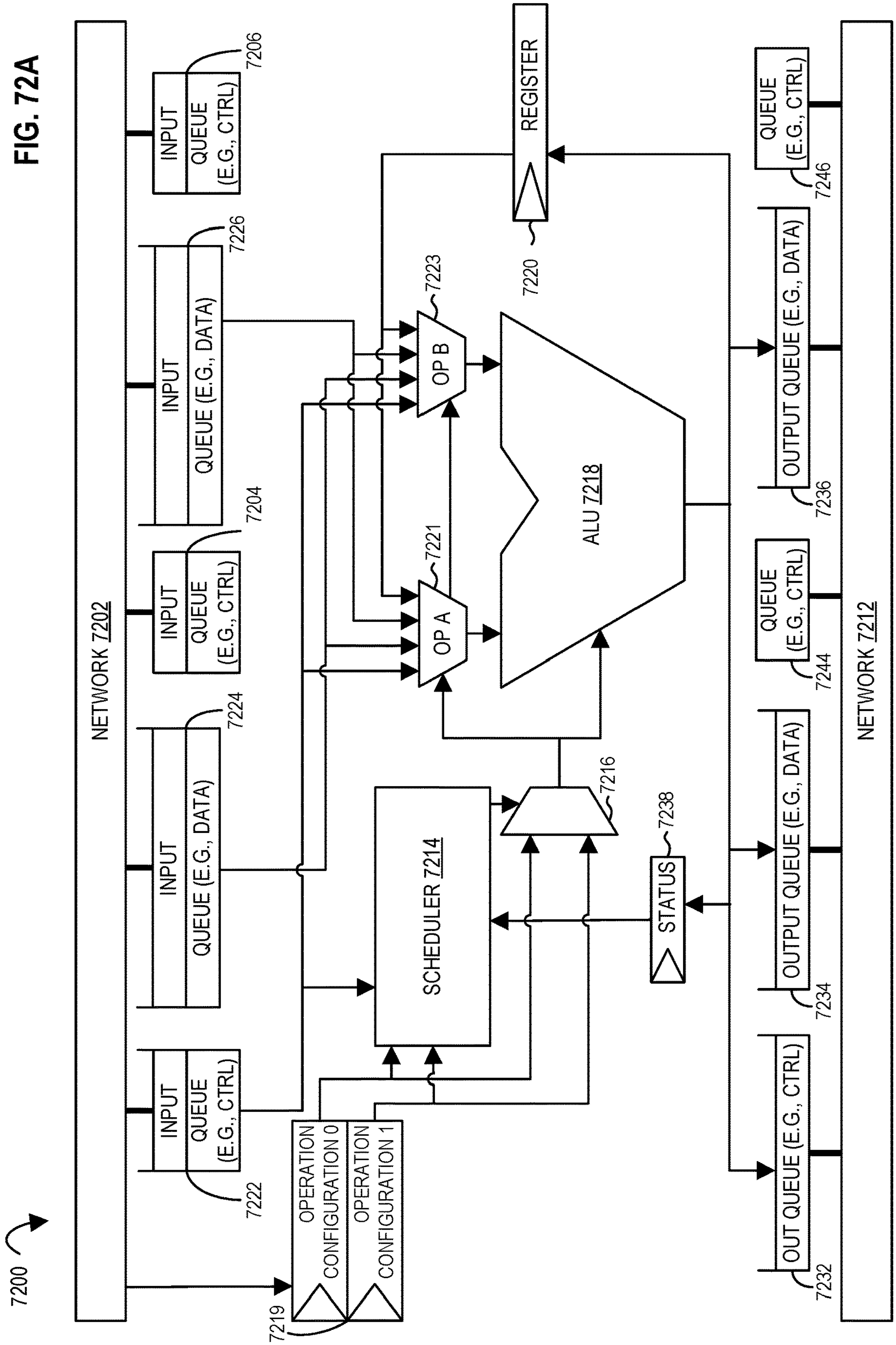
FIGS. 72A-72E illustrate a processing element performing a logical OR (lor) operation according to embodiments of the disclosure.
Figure 72B:
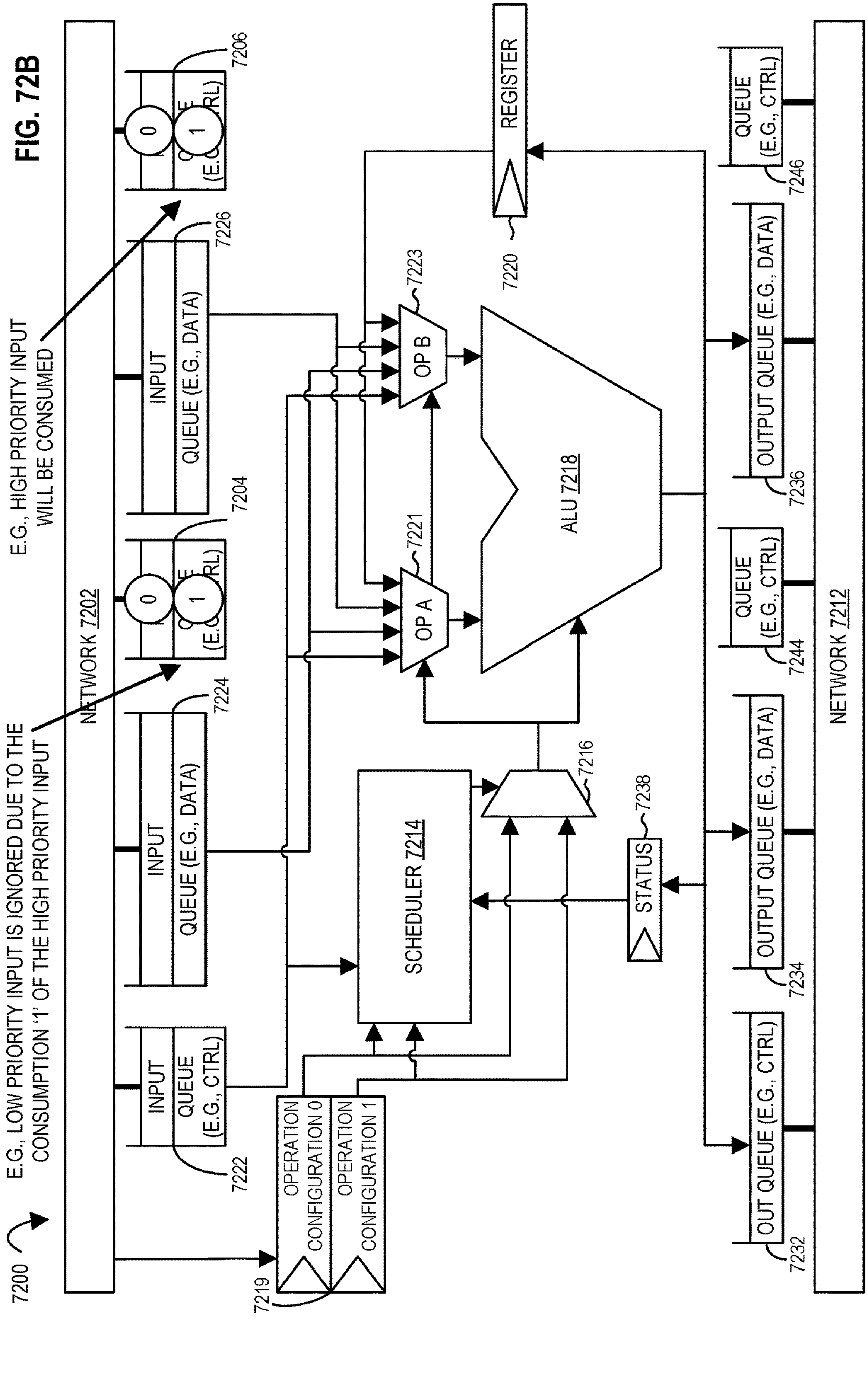

In FIG. 72B, a (e.g., control) value of one is in a first slot of input queue 7204, a (e.g., control) value of zero is in the second slot of input queue 7204, a (e.g., control) value of one is in a first slot of input queue 7206, a (e.g., control) value of zero is in the second slot of input queue 7206. In the depicted embodiment, input queue 7204 is considered to be the lower priority input and input queue 7206 is considered to be the higher priority input, as discussed further below.

Figure 72C:
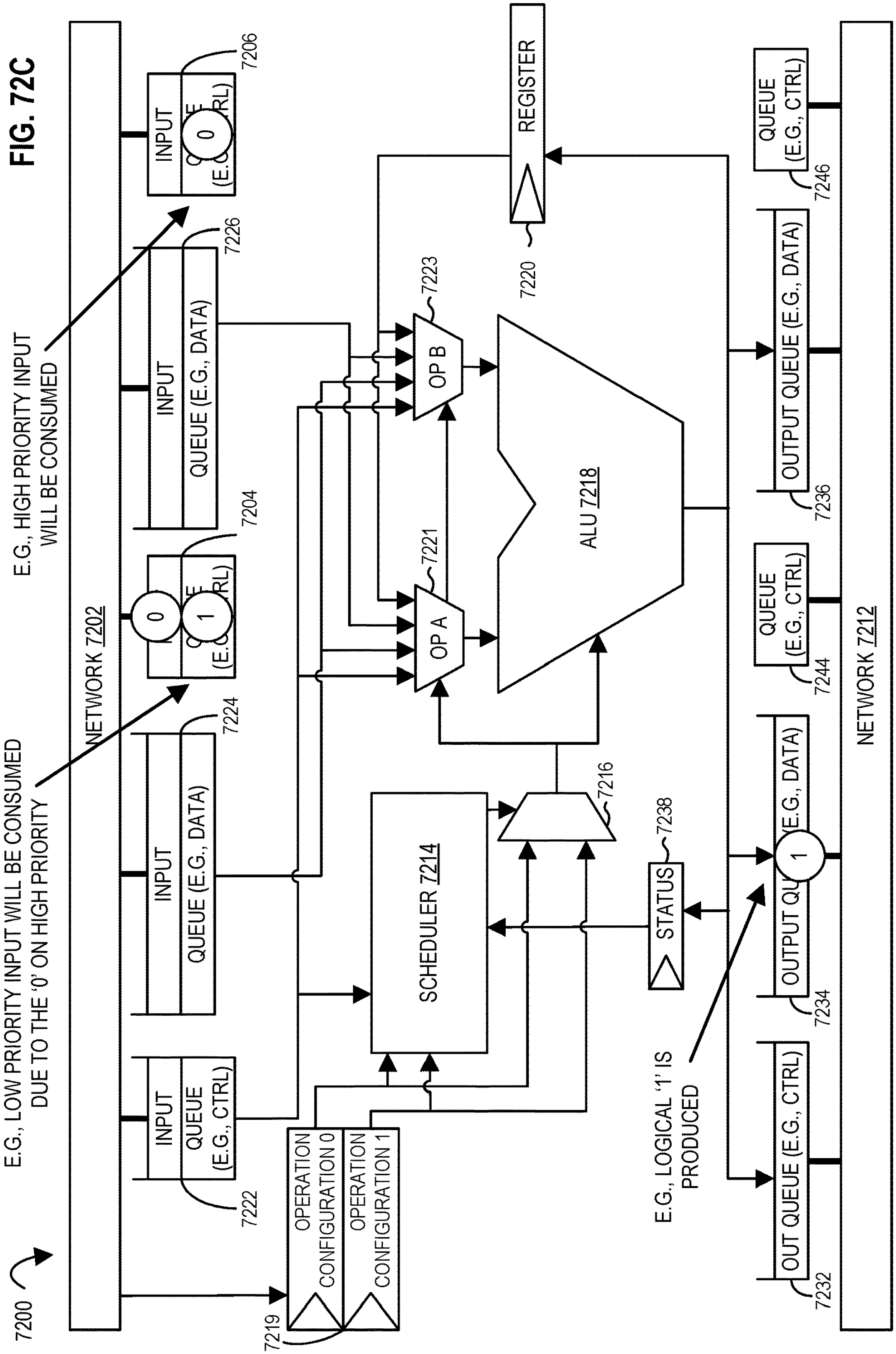

In FIG. 72C, because the value of one was in a first slot of (e.g., higher priority) input queue 7204 and the value of one was in a first slot of (e.g., lower priority) input queue 7206, PE 7200 (e.g., ALU 7218) outputs a one (e.g., Boolean one) (e.g., one ORed with anything produces a one) to output queue 7234. In one embodiment, a value of one in the first slot of a higher priority queue means that the value from the lower priority queue is ignored because a one ORed with anything produces a one.

Additionally, in the depicted embodiment, the value of one is dequeued from the first slot of input queue 7206, the value of zero is moved from the second slot into the first slot of input queue 7206, the value of one is not dequeued from the first slot of input queue 7204, and the value of zero is not moved from the second slot into the first slot of input queue 7204. The value from the output queue 7234 may be consumed, e.g., by a downstream PE or PEs.

Figure 72D:
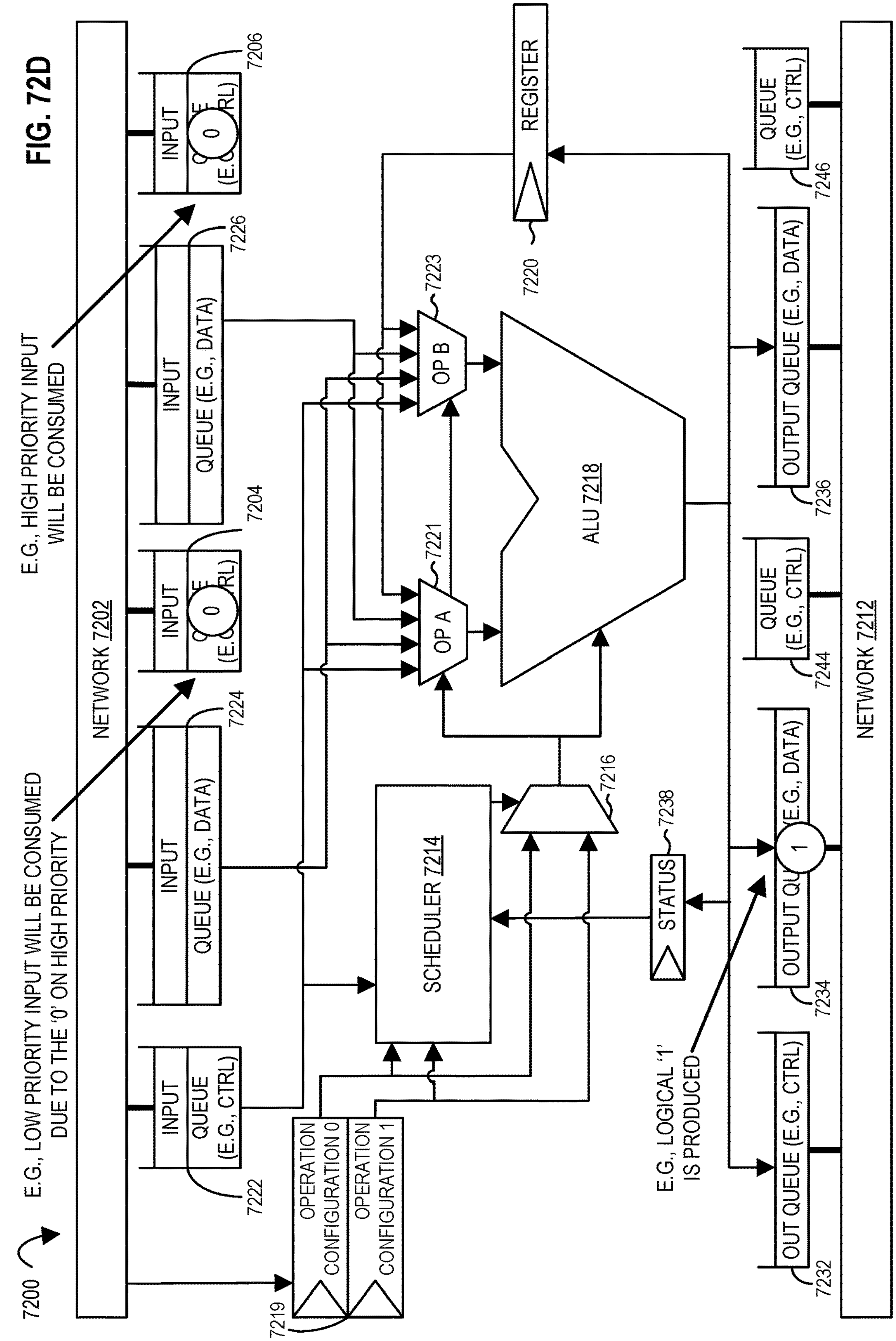

In FIG. 72D, a zero was in the first slot of the higher priority input queue 7206 and a one was in the first slot of the lower priority input queue 7204, so PE 7200 (e.g., ALU 7218) outputs a one (e.g., Boolean zero) (e.g., zero ORed with one produces a one) to output queue 7234, the zero in the first slot of the higher priority input queue 7206 is dequeued (e.g., deleted), the one in the first slot of the lower priority input queue 7204 is dequeued (e.g., deleted), another zero is stored in the first slot of the higher priority input queue 7206, and the zero is moved from the second slot into the first slot of the lower priority input queue 7204. The value from the output queue 7234 may be consumed, e.g., by a downstream PE or PEs.

Figure 72E:
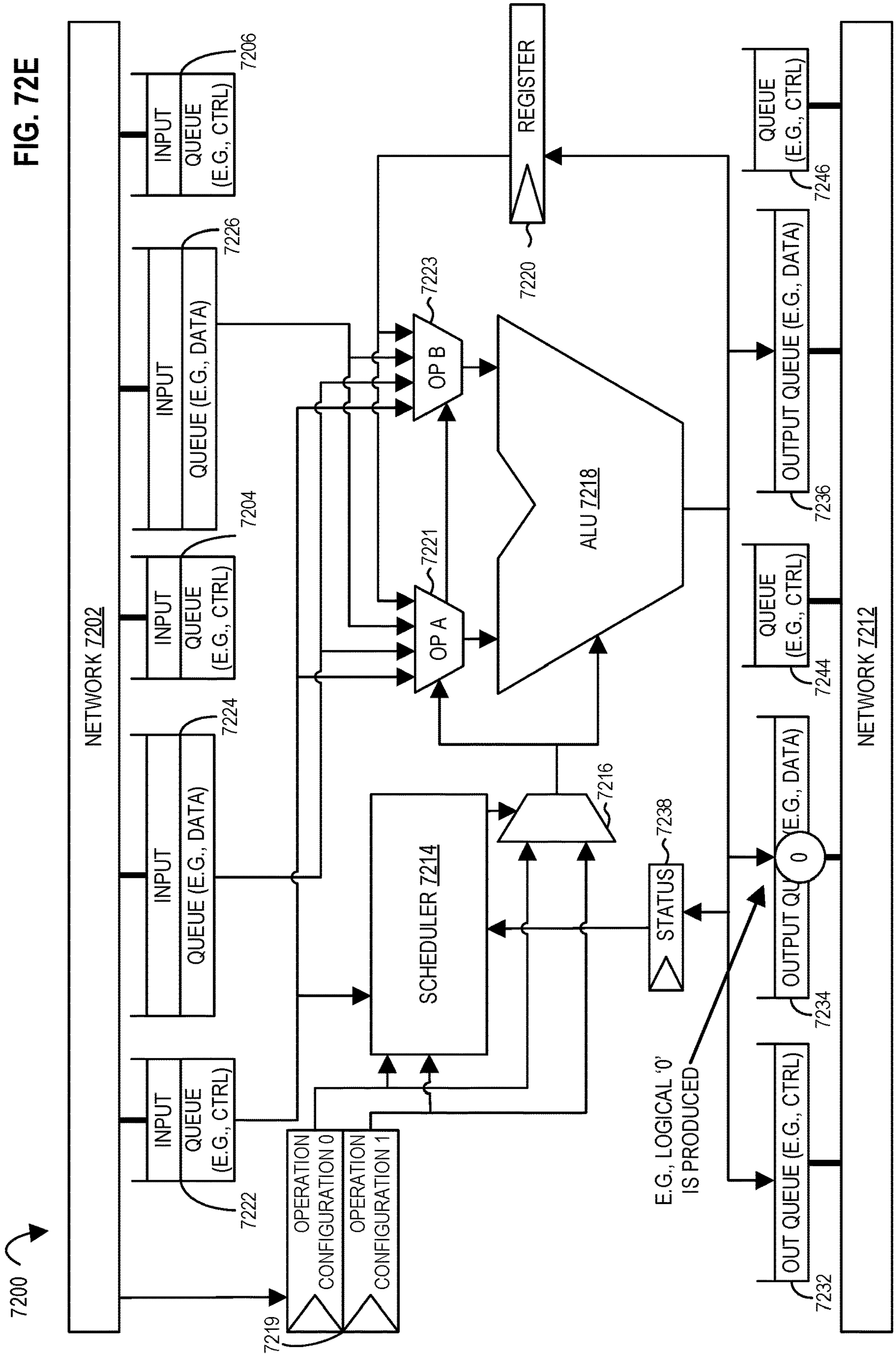

In FIG. 72E, a zero was in the first slot of the lower priority input queue 7204 and a zero remained in the first slot of the higher priority input queue 7206, so PE 7200 (e.g., ALU 7218) outputs a zero (e.g., Boolean zero) (e.g., zero ORed with zero produces a zero) to output queue 7234, the zero in the first slot of the higher priority input queue 7206 is dequeued (e.g., deleted), and the zero in the first slot of the lower priority input queue 7204 is dequeued (e.g., deleted). The value from the output queue 7234 may be consumed, e.g., by a downstream PE or PEs.

In certain embodiments, lor is the logical OR of successive operands, e.g., where a one is to stop the lor from examining successive operands and instead immediately output a one. This may be used for nested combinational statements.

In certain embodiments, PE 7200 is stalled from performing the lor operation until there is both (i) space available in the output queue that is to be used for storing resultant data, and (ii) an input value in each of the source input queues if the value contained by each input queue is a logical false value or a subset of source input queues defined by the priority order of lor with precedence greater than the first queue containing a logical true value, including the queue containing the logical true value. That is, the absence of a value in a low priority queue will not stall execution if that value is not needed.

In the depicted embodiment, PE 7200 includes the components of PE 5800 from FIG. 58, for example, with the components ending with the same two numbers having the same functionality. In one embodiment, scheduler 7214 schedules an operation or operations of processing element 7200 for execution according to the configuration value, e.g., and when input data and control input arrives. See, for example, the discussion of FIGS. 33-57.

First

In one embodiment, a CSA architecture includes a configuration value that, when stored into the configuration storage (e.g., register), causes the CSA (e.g., a PE thereof) to perform a First operation according to the following (e.g., semantics and/or description).

```
Operation: first out.Cd.i1, seqctl.Cu.i1
Semantics:
    static i1 prevseqctl = 0;            // static storage op, initialized at
config time
    if (seqctl == 1) {                   // if inside a sequence, generate a result
        out = (prevseqctl == 0);         // if prev ctl value was end of seq, then 1,
else 0
    }
    prevseqctl = seqctl                  // update saved state
```

-continued

Description: out is 1 when the first value in a sequence is detected on seqctl, and 0 for all other members of a sequence. No value is generated corresponding to the end of the sequence marker.

FIGS. 73A-73E illustrate a processing element 7300 performing a First operation according to embodiments of the disclosure. In the depicted embodiment, an operation configuration value for a First operation is stored (e.g., during a programming time period) into operation configuration register 7319. PE 7300 includes state storage 7301 (e.g., a single bit register) to track whether a first element of a (e.g., predicate) stream has been encountered. In one embodiment, the First operation causes PE 7300 to produce a Boolean value (e.g., zero) internally in state storage 7301 when the first element of a stream has been encountered to keep track of that stream, e.g., according to the "first" operation in the above discussion.

In FIGS. 73B-73E, the numbers in the circles for the bits in (e.g., control) input queue 7322 indicate a one for each item in a single stream followed by a zero to indicate the end (e.g., termination) of that stream (e.g., but the associated data values themselves may be stored in a different input queue of the PE), and the numbers in the circles for the bits in (e.g., control) output queue 7332 indicate a (Boolean) control value of one for a beginning of a stream and a (Boolean) control value of zero for the remaining elements of that stream.

Figure 73A:
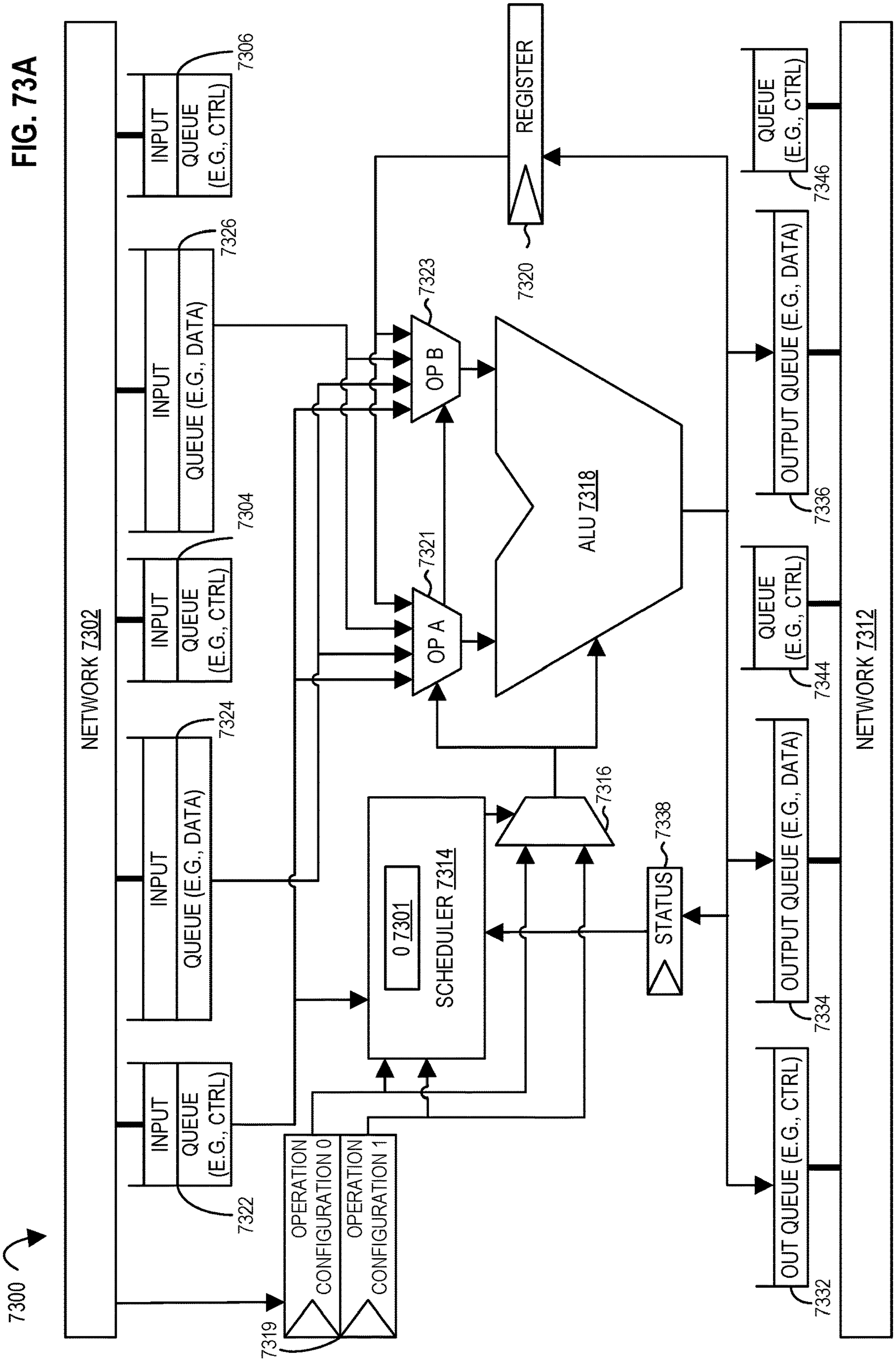
FIGS. 73A-73E illustrate a processing element performing a First operation according to embodiments of the disclosure.

In FIG. 73A, the state bit in state storage 7301 is initialized to zero.

Figure 73B:
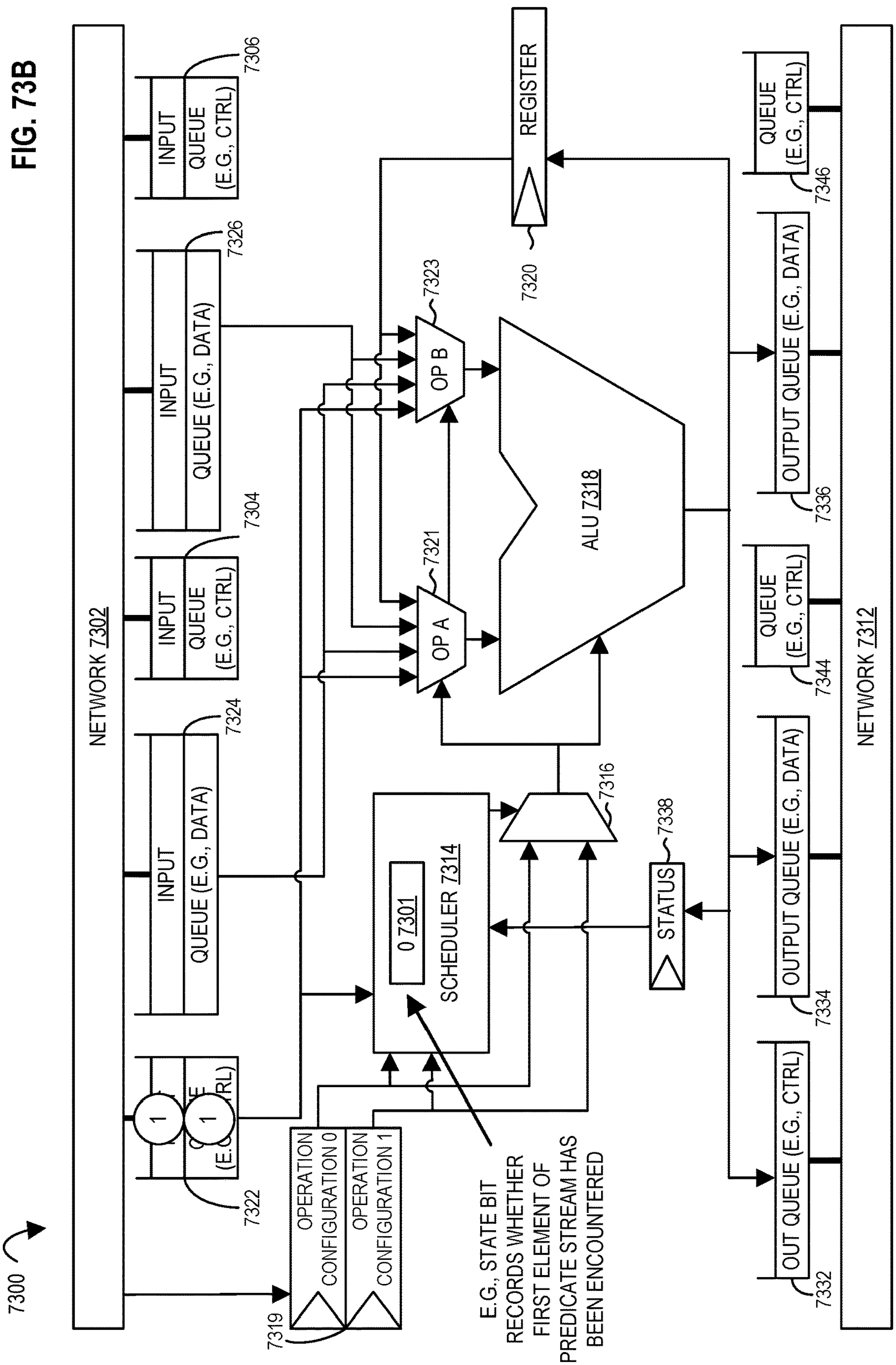

In FIG. 73B, a control value of one is in a first slot of input queue 7322 to indicate a first element of a stream, and a control value of one is in the second slot of (e.g., control) input queue 7322 to indicate a second element of the stream. The input data that is queued may be sent from another component of a CSA, e.g., from a plurality of other PEs as discussed herein. In certain embodiments, the data is read from the first slot of a queue, and when consumed (e.g., removed), any data from other slots of the queue are logically advanced such that data from the second slot is moved into the first slot, etc. In the depicted embodiment, the state bit in state storage 7301 was initialized to zero previously and is to be changed to a one after a first element of the stream has been encountered (e.g., consumed from the input queue).

Figure 73C:
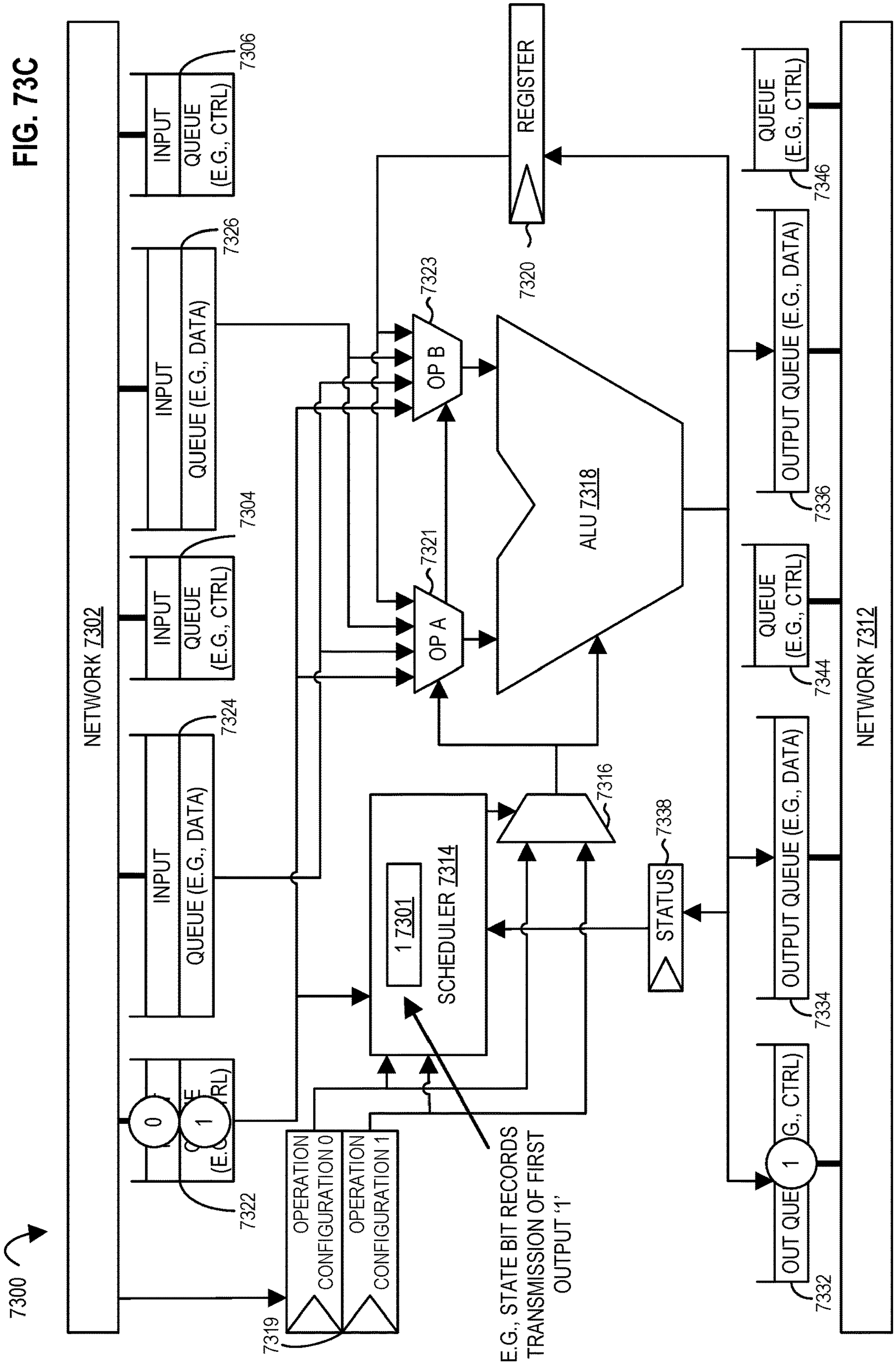

In FIG. 73C, the (Boolean) control value of one in the first slot of (e.g., control) input queue 7322 in FIG. 73B indicated the first element of the stream has been encountered, and the PE 7300 is to store a (Boolean) control value of one into output queue 7332 to indicate the beginning of the first stream. In FIG. 73C, the state bit in state storage 7301 is modified from a first value (e.g., Boolean zero) to a second value (e.g., Boolean one) to indicate the first element of a (e.g., predicate) stream has been encountered (e.g., and that the control value of one has been stored accordingly into output queue 7332). The control value of one is cleared from the first slot of input queue 7322, the control value of one is moved into the first slot from the second slot of (e.g., control) input queue 7322 for the second valid value of the stream, and a third control value of zero is stored in the second slot of (e.g., control) input queue 7322 to indicate an end of the stream. In another embodiment, a last element of a stream may include a zero for a control value to indicate that the current element is the last element of the stream. The (e.g., control) value from the output queue 7332 may be consumed from the output queue, e.g., by a downstream PE or PEs.

Figure 73D:
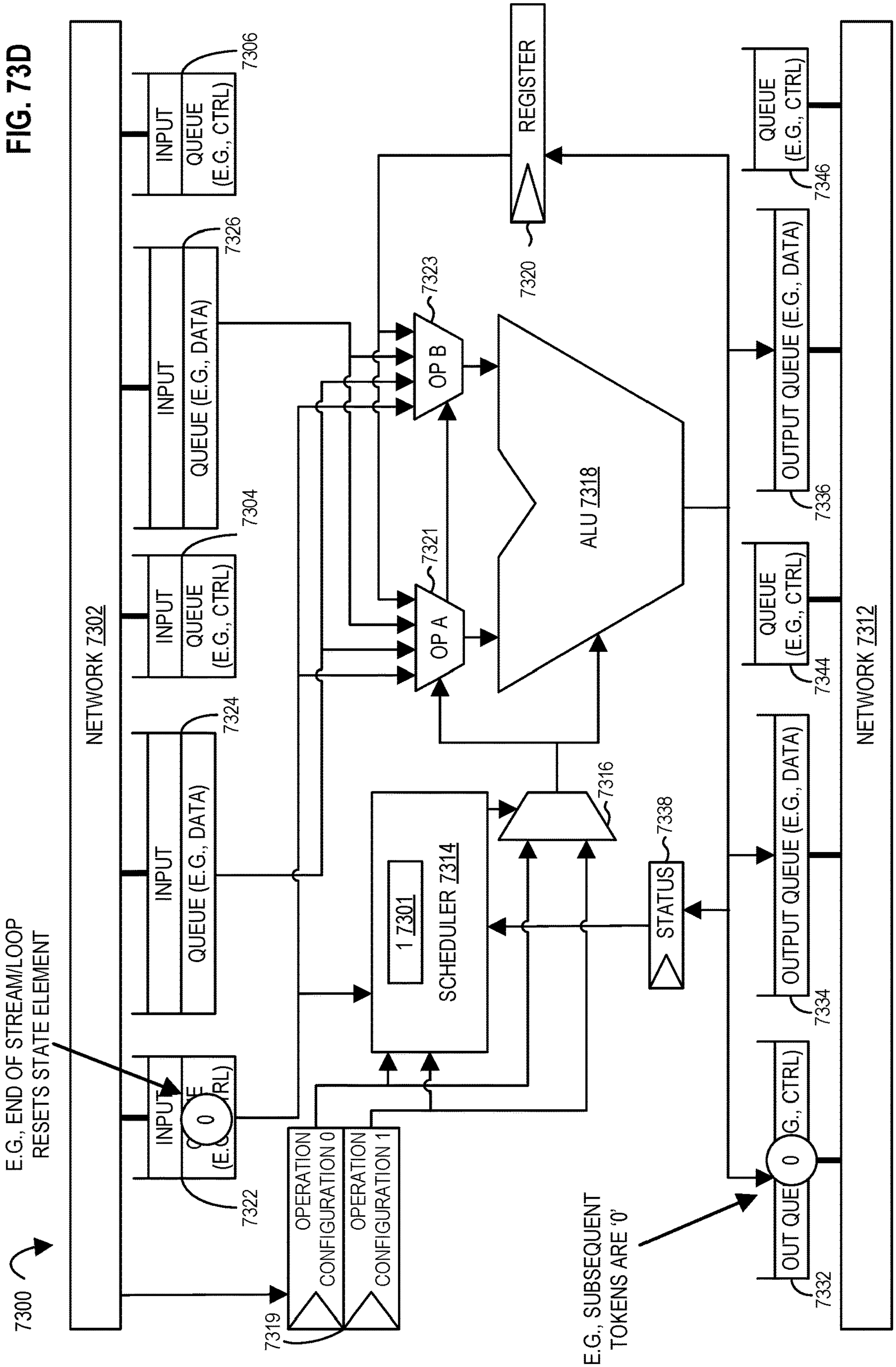

In FIG. 73D, the (Boolean) control value of zero in slot one of the (e.g., control) input queue 7322 indicates the last element of the stream, and the PE 7300 stores a (Boolean) control value of zero into output queue 7332. The state bit in state storage 7301 remains as the second value (e.g., Boolean one) to indicate another element of the (e.g., predicate) stream has been encountered (e.g., and that the control value of zero has been stored accordingly into output queue 7332). The (e.g., control) value from the output queue 7332 may be consumed from the output queue, e.g., by a downstream PE or PEs.

Figure 73E:
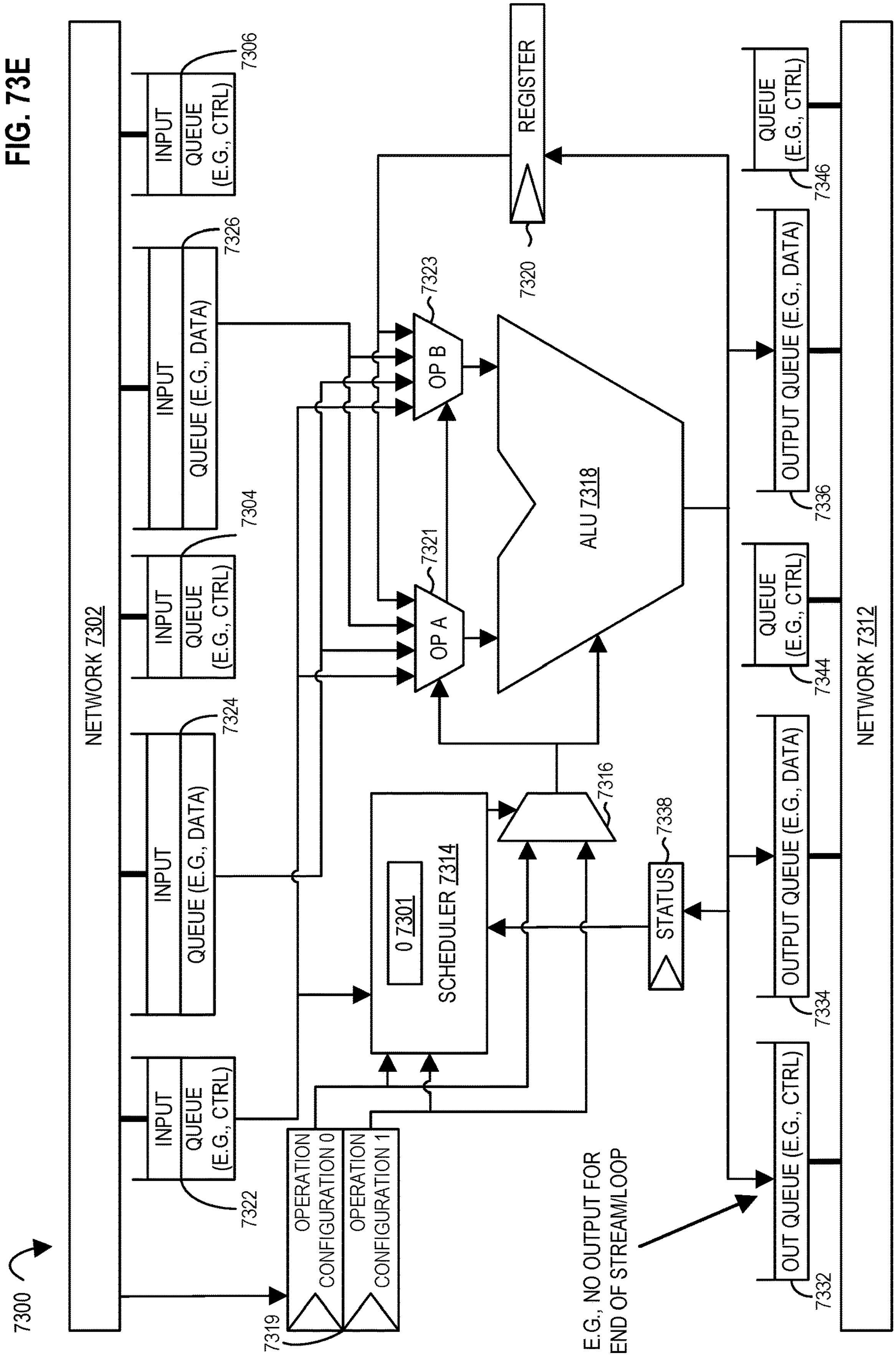

In FIG. 73E, the control value of zero is cleared (e.g., deleted) from the first slot of input queue 7322 for the stream (e.g., the processing of the stream by the PE has terminated), the state bit in state storage 7301 is set to zero to re-initialize the state bit, and no output is stored into output queue 7332.

In certain embodiments, PE 7300 is to first convert a stream of "k" number of ones, followed by a single zero marking the end of the stream to a k length sequence in which the first value is one and the remaining k−1 values are zero (e.g., corresponding to the first output of a sequencer operator).

In certain embodiments, PE 7300 is stalled from performing the First operation until there is both (i) space available in the output queue that is to be used for storing resultant data (e.g. if the operation is producing output data), and (ii) an input control value in input queue 7322.

In the depicted embodiment, PE 7300 includes the components of PE 5800 from FIG. 58, for example, with the components ending with the same two numbers having the same functionality. In one embodiment, scheduler 7314 schedules an operation or operations of processing element 7300 for execution according to the configuration value, e.g., and when input data and control input arrives. See, for example, the discussion of FIGS. 33-57.

Last

In one embodiment, a CSA architecture includes a configuration value that, when stored into the configuration storage (e.g., register), causes the CSA (e.g., a PE thereof) to perform a Last operation according to the following (e.g., semantics and/or description).

```
Operation: last out.Cd.i1, seqctl.Cu.i1
Semantics:
     static i1 prevseqctl = 0;              // static storage inside cp, initialized at
config time
     if (prevseqctl == 1) {                 // if previous was inside a sequence,
generate a result
```

-continued

```
        out = (seqctl == 0);            // if ctl value is end of seq, then 1, else
0
    }
    prevseqctl = seqctl                 // update saved state
Description: out is 1 when the last value in a sequence is detected on seqctl, and 0 for all
other members of a sequence. No value is generated corresponding to the end of sequence
marker. Note that this is staggered relative to the first operator - it generates a value one
behind, since it needs to see the terminator to determine last-ness.
```

FIGS. 74A-74E illustrate a processing element 7400 performing a Last operation according to embodiments of the disclosure. In the depicted embodiment, an operation configuration value for a Last operation is stored (e.g., during a programming time period) into operation configuration register 7419. PE 7400 includes state storage 7401 (e.g., a single bit register) to track whether a last element of a (e.g., predicate) stream has been encountered. In one embodiment, the Last operation causes PE 7400 to produce a Boolean value (e.g., zero) internally in state storage 7401 when the first element of a stream has been encountered to keep track of that stream, e.g., according to the "last" operation in the above discussion.

Figure 74A:
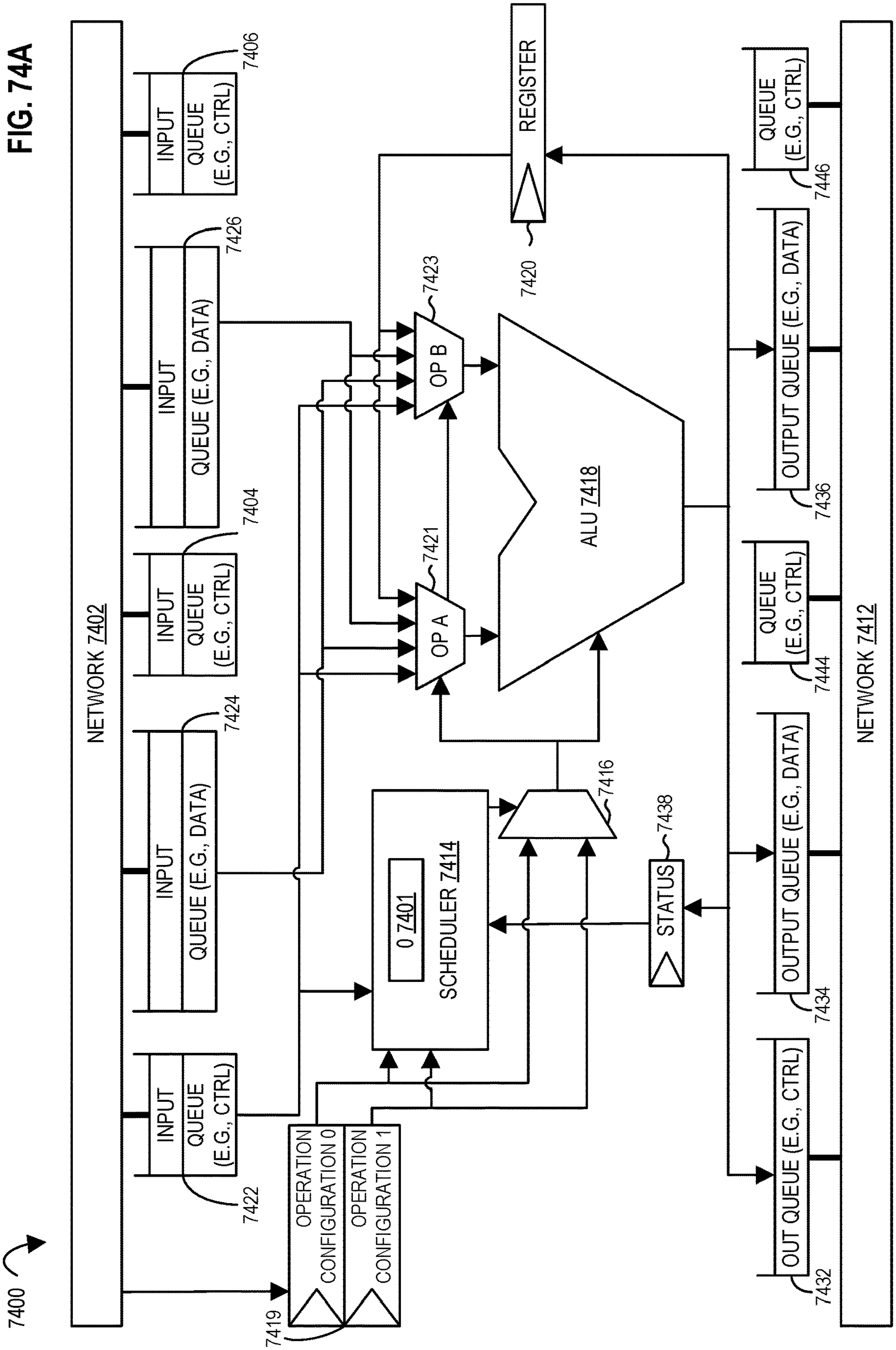

In FIG. 74A, the state bit in state storage 7401 is initialized to zero.

In FIGS. 74B-74E, the numbers in the circles for the bits in (e.g., control) input queue 7422 indicate a one for each item in a single stream followed by a zero to indicate the end (e.g., termination) of that stream (e.g., but the associated data values themselves may be stored in a different input queue of the PE), and the numbers in the circles for the bits in (e.g., control) output queue 7432 indicate a (Boolean) control value of one for the end (last element) of a stream and a (Boolean) control value of zero for the remaining elements of that stream.

Figure 74B:
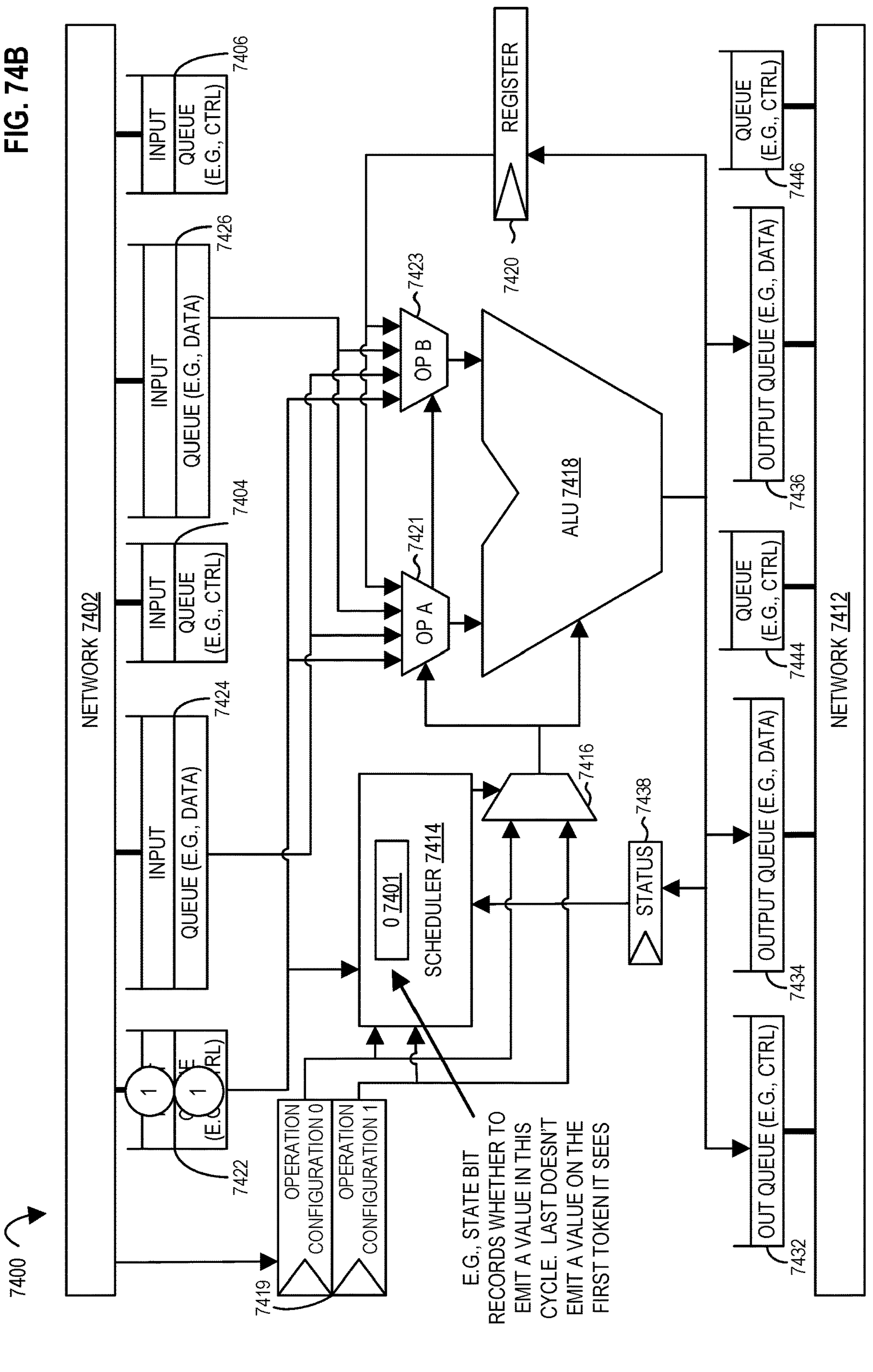

In FIG. 74B, a control value of one is in a first slot of input queue 7422 to indicate a first element of a stream, and a control value of one is in the second slot of (e.g., control) input queue 7422 to indicate a second element of the stream. The input data that is queued may be sent from another component of a CSA, e.g., from a plurality of other PEs as discussed herein. In certain embodiments, the data is read from the first slot of a queue, and when consumed (e.g., removed), any data from other slots of the queue are advanced such that data from the second slot is moved into the first slot, etc. In the depicted embodiment, the state bit in state storage 7401 was initialized to zero previously and is to be changed to a one after the first element of the stream has been encountered (e.g., consumed from the input queue).

Figure 74C:
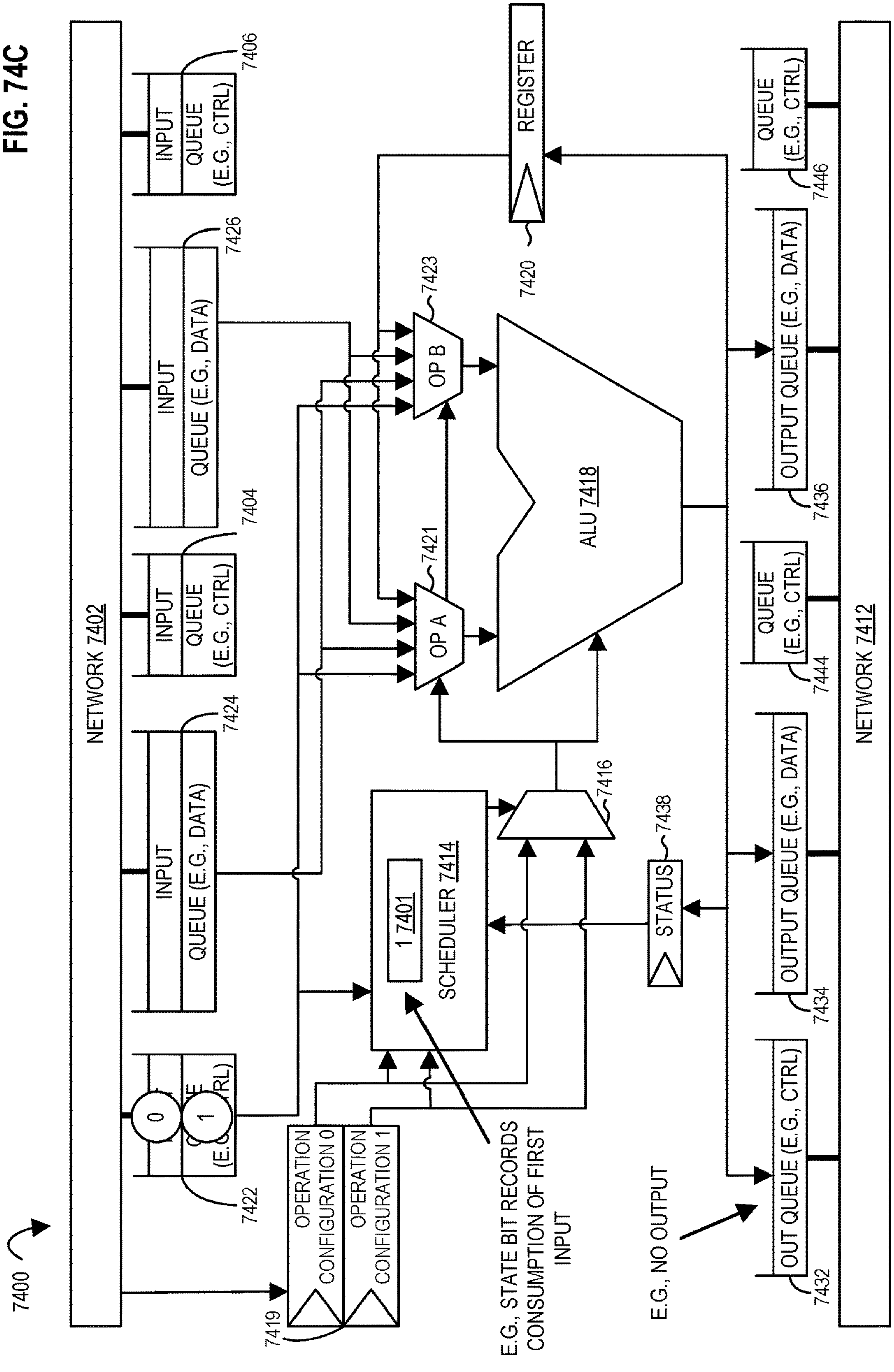

In FIG. 74C, the (Boolean) control value of one in the first slot of (e.g., control) input queue 7422 in FIG. 74B indicated the first element of the stream has been encountered, and the PE 7400 is to not store a (Boolean) control value into output queue 7432. In FIG. 74C, the state bit in state storage 7401 is modified from a first value (e.g., Boolean zero) to a second value (e.g., Boolean one) to indicate the first element of a (e.g., predicate) stream has been encountered. The control value of one is cleared from the first slot of input queue 7422, the control value of one is moved into the first slot from the second slot of (e.g., control) input queue 7422 for the second valid value of the stream, and a third control value of zero is stored in the second slot of (e.g., control) input queue 7422 to indicate an end of the stream. A stream may have any number of elements (e.g., or any subset of numbers of elements). In another embodiment, a last element of a stream may include a zero for a control value to indicate that the current element is the last element of the stream.

In FIG. 74D, the (Boolean) control value of zero in slot one of the (e.g., control) input queue 7422 indicates the last element of the stream, and the PE 7400 stores a (Boolean) control value of zero into output queue 7432. The state bit in state storage 7401 remains as the second value (e.g., Boolean one) to indicate another element of the (e.g., predicate) stream has been encountered (e.g., and that the control value of zero has been stored accordingly into output queue 7432). The (e.g., control) value from the output queue 7432 may be consumed from the output queue, e.g., by a downstream PE or PEs.

Figure 74E:
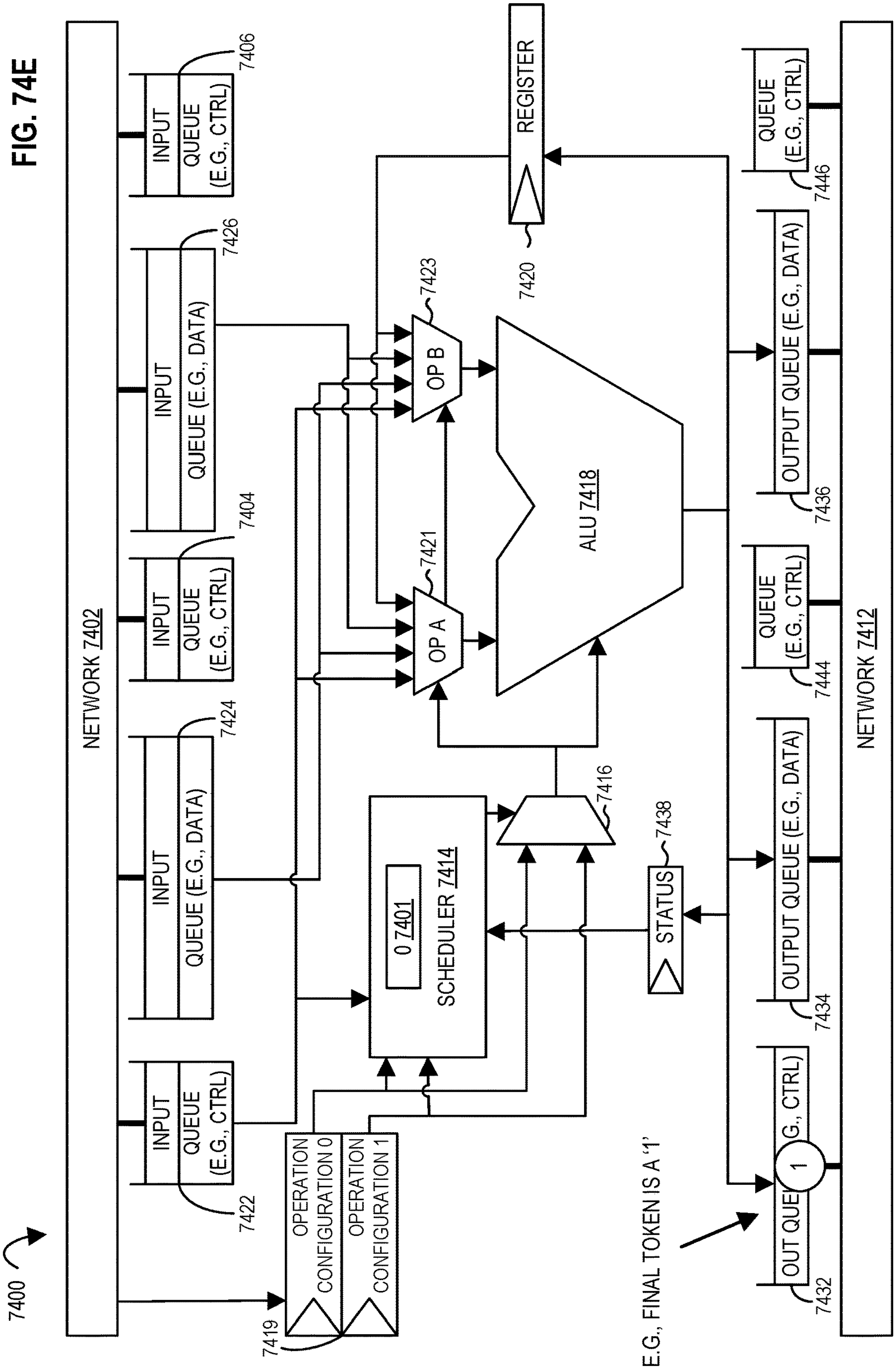

In FIG. 74E, the control value of zero is cleared (e.g., deleted) from the first slot of input queue 7422 for the stream (e.g., the processing of the stream by the PE has terminated), the state bit in state storage 7401 is set to zero to re-initialize the state bit, and (Boolean) control value of one is stored into output queue 7432 to indicate the last value of the stream has been encountered.

In certain embodiments, PE 7400 is to first convert a stream of "k" number of ones, followed by a single zero marking the end of the stream to a k length sequence in which the last value is one and the remaining k−1 values are zero (e.g., corresponding to the last output of a sequencer operator).

In certain embodiments, PE 7400 is stalled from performing the Last operation until there is both (i) space available in the output queue that is to be used for storing resultant data, and (ii) an input control value in input queue 7422.

In the depicted embodiment, PE 7400 includes the components of PE 5800 from FIG. 58, for example, with the components ending with the same two numbers having the same functionality. In one embodiment, scheduler 7414 schedules an operation or operations of processing element 7400 for execution according to the configuration value, e.g., and when input data and control input arrives. See, for example, the discussion of FIGS. 33-57.

Countbuffer0 (cntbuffer0)

In one embodiment, a CSA architecture includes a configuration value that, when stored into the configuration storage (e.g., register), causes the CSA (e.g., a PE thereof) to perform a Countbuffer0 (cntbuffer0) operation according to the following (e.g., semantics and/or description).

```
Operation: cntbuffer0 outseq.CRd.i0, inseq.CRd.i0
Semantics:
Output is sent entries as long as prior input entries have arrived. If input
entries arrive and output is flow-controlled then input entries are counted
with
state inside the operation.
if (inseq.peek && outseq.room {
    outseq = inseq
    inseq.deq
} else if (inseq.peek && outseq.full) {
```

-continued

```
        counter++;
        inseq.deq
} else if (outseq.room && counter > 0) {
        counter−−;
        outseq = 0;
}
}
Description:
```

FIGS. 75A-75F illustrate a processing element 7500 performing a CountBuffer0 (cntbuffer0) operation according to embodiments of the disclosure. In the depicted embodiment, an operation configuration value for a CountBuffer0 (cntbuffer0) operation is stored (e.g., during a programming time period) into operation configuration register 7519. PE 7500 includes register 7520 (e.g., multiple bit register) to track the number of zero elements that have been encountered, e.g., even when the output queue is full. In one embodiment, the CountBuffer0 (cntbuffer0) operation causes register 7520 of PE 7500 to keep a count of the number of zero values that have been received but not yet written to the output queue, for example, to allow the input zero values to be dequeued (e.g., to avoid a stall of the PE), e.g., according to the "cntbuffer0" operation in the above discussion.

In FIGS. 75B-75E, the numbers in the circles for the bits in (e.g., control) input queue 7522 are (e.g., data or control) values, and the number in the register 7520 is the counter value to keep the count of the number of zero values that have been received (for example, but that have not been sent to the output queue yet, e.g., because the output queue is full (back pressured)).

Figure 75A:
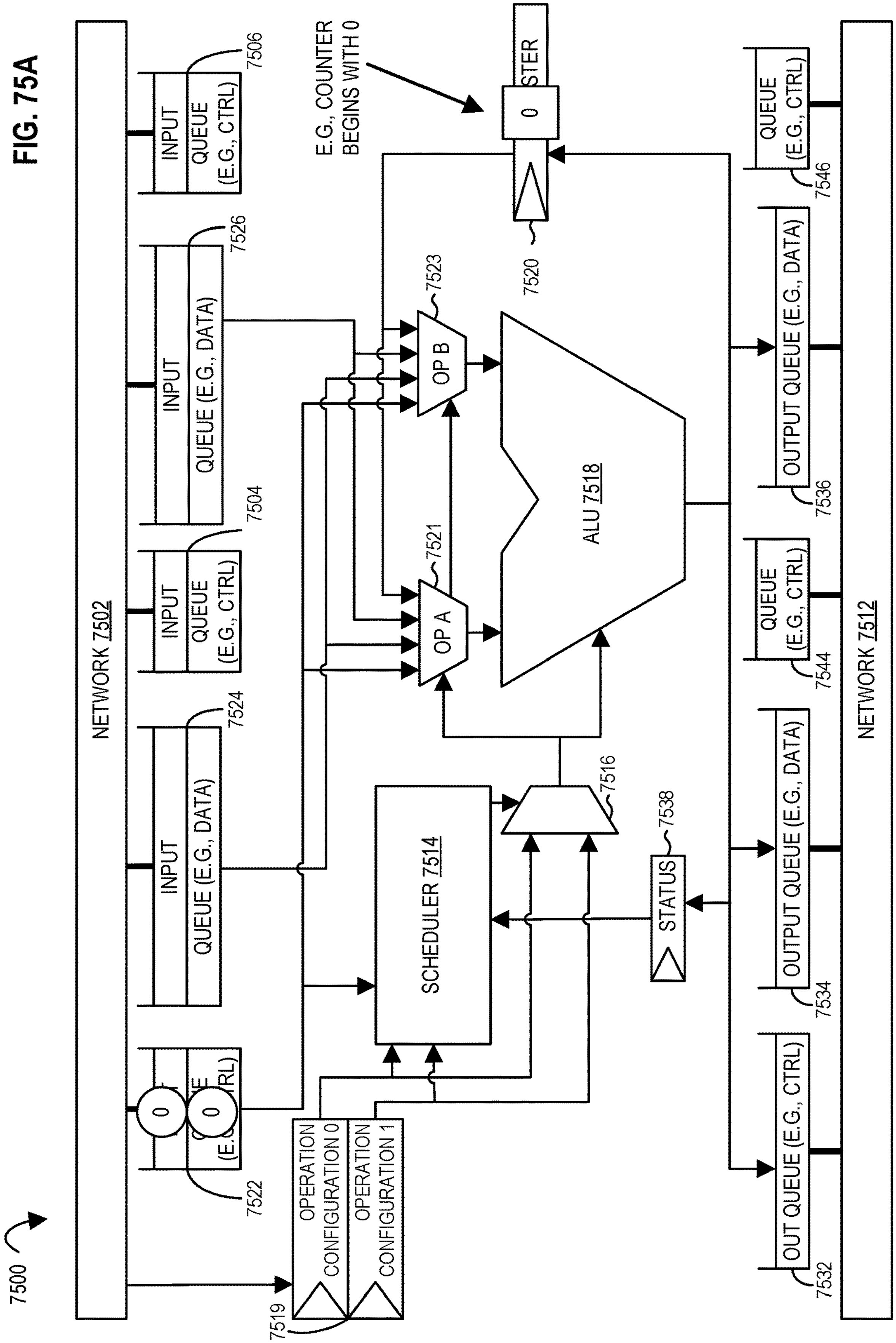
FIGS. 75A-75F illustrate a processing element performing a CountBuffer0 (cntbuffer0) operation according to embodiments of the disclosure.
Figure 75B:
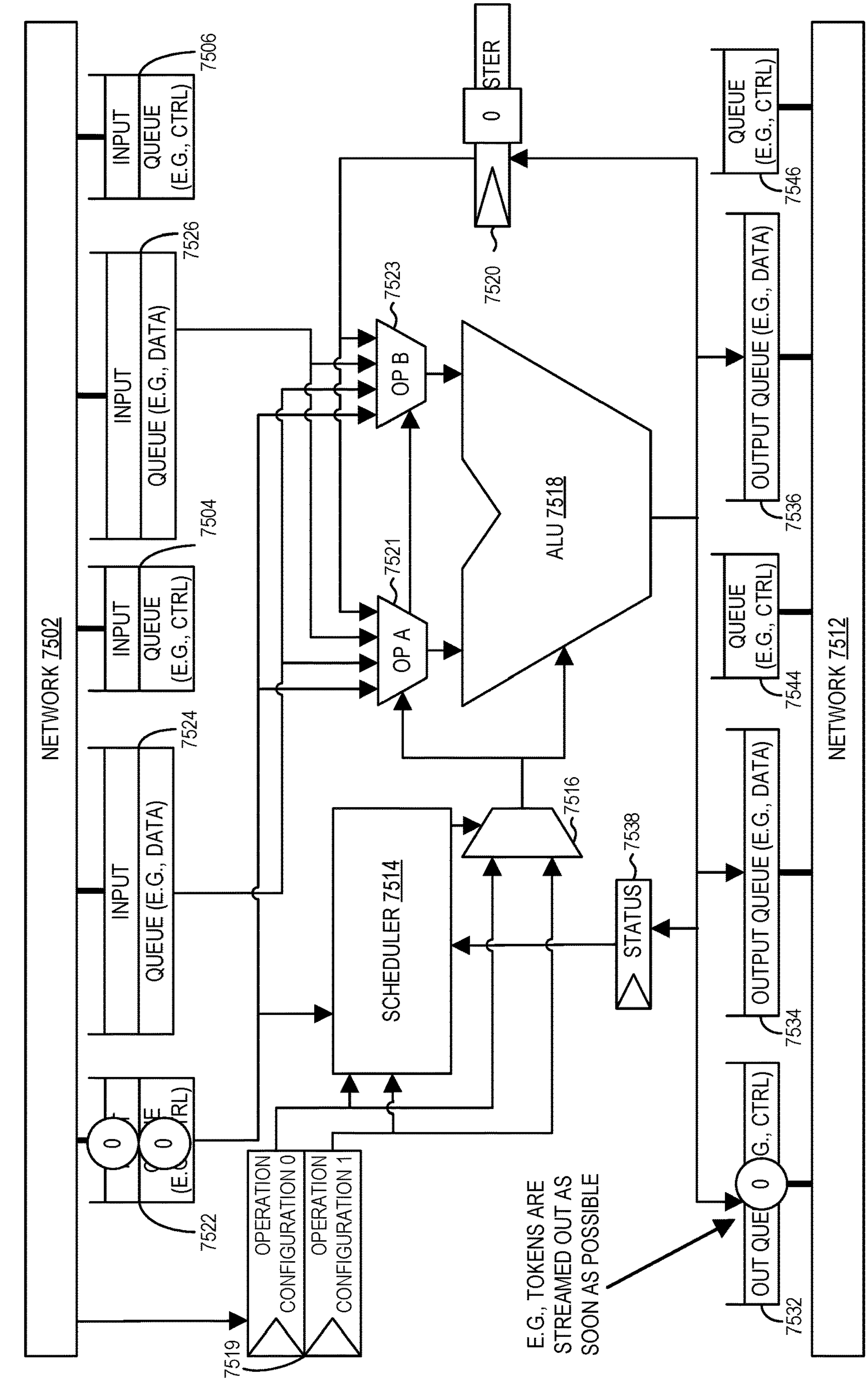

In FIG. 75B, a value of zero is in a first slot of input queue 7522, a value of zero is in the second slot of input queue 7522, and a previously received value of zero is stored (e.g., written) to output queue 7532. The input data that is queued may be sent from another component of a CSA, e.g., from one or a plurality of other PEs as discussed herein. In certain embodiments, the data is read from the first slot of a queue, and when consumed (e.g., removed), any data from other slots of the queue are advanced such that data from the second slot is moved into the first slot, etc. In the depicted embodiment, the count value in register 7520 was initialized to zero previously.

Figure 75C:
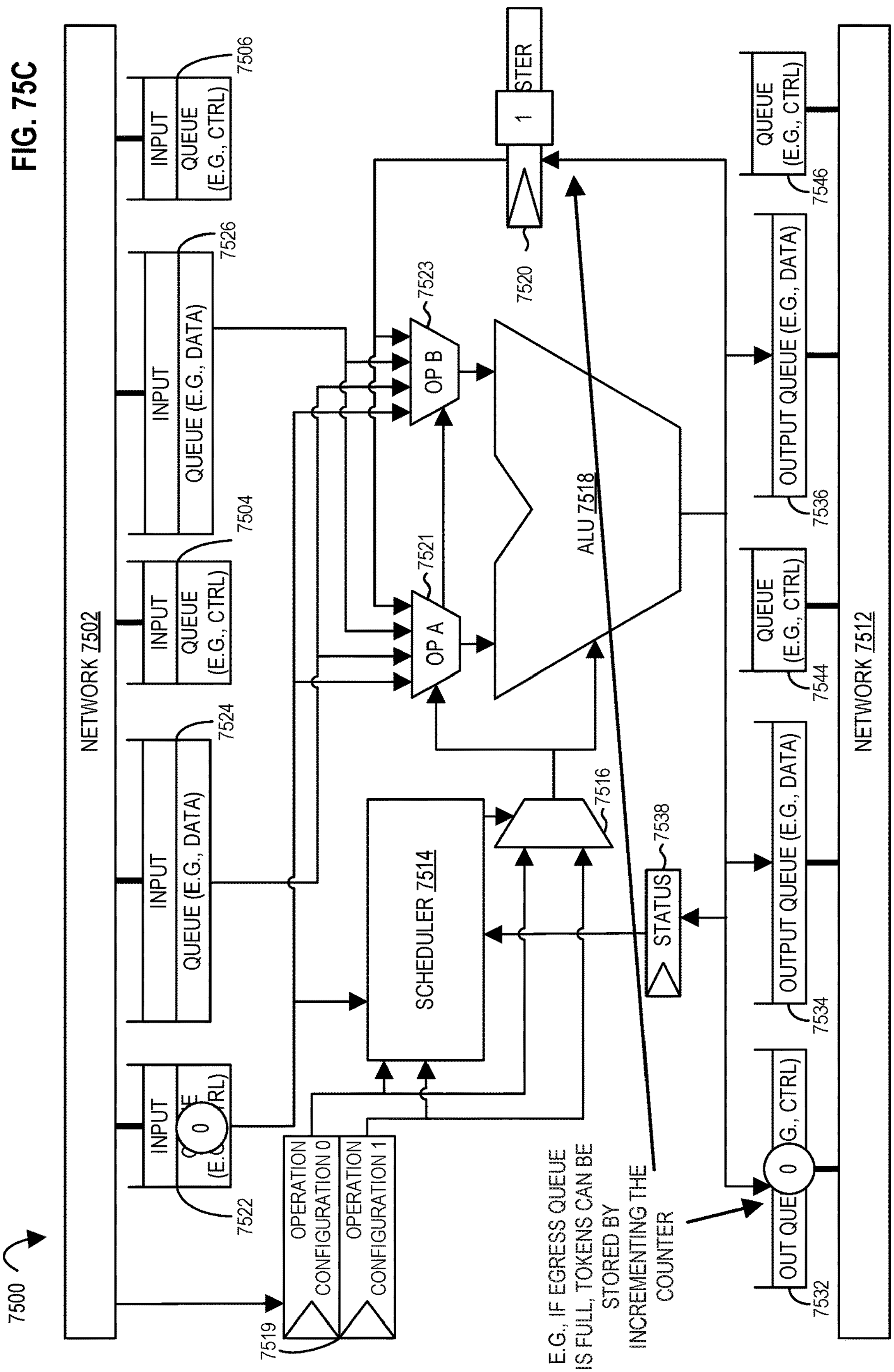

In FIG. 75C, the zero value in the output queue 7532 has not been consumed, e.g., by a downstream PE or PEs, and thus in this period (e.g., cycle), PE 7500 is to increment the count value in register 7520 by one (e.g., the count value becomes one), and that value of zero is cleared from the first slot of input queue 7522, and the next value of zero is moved into the first slot from the second slot of (e.g., control) input queue 7522.

Figure 75D:
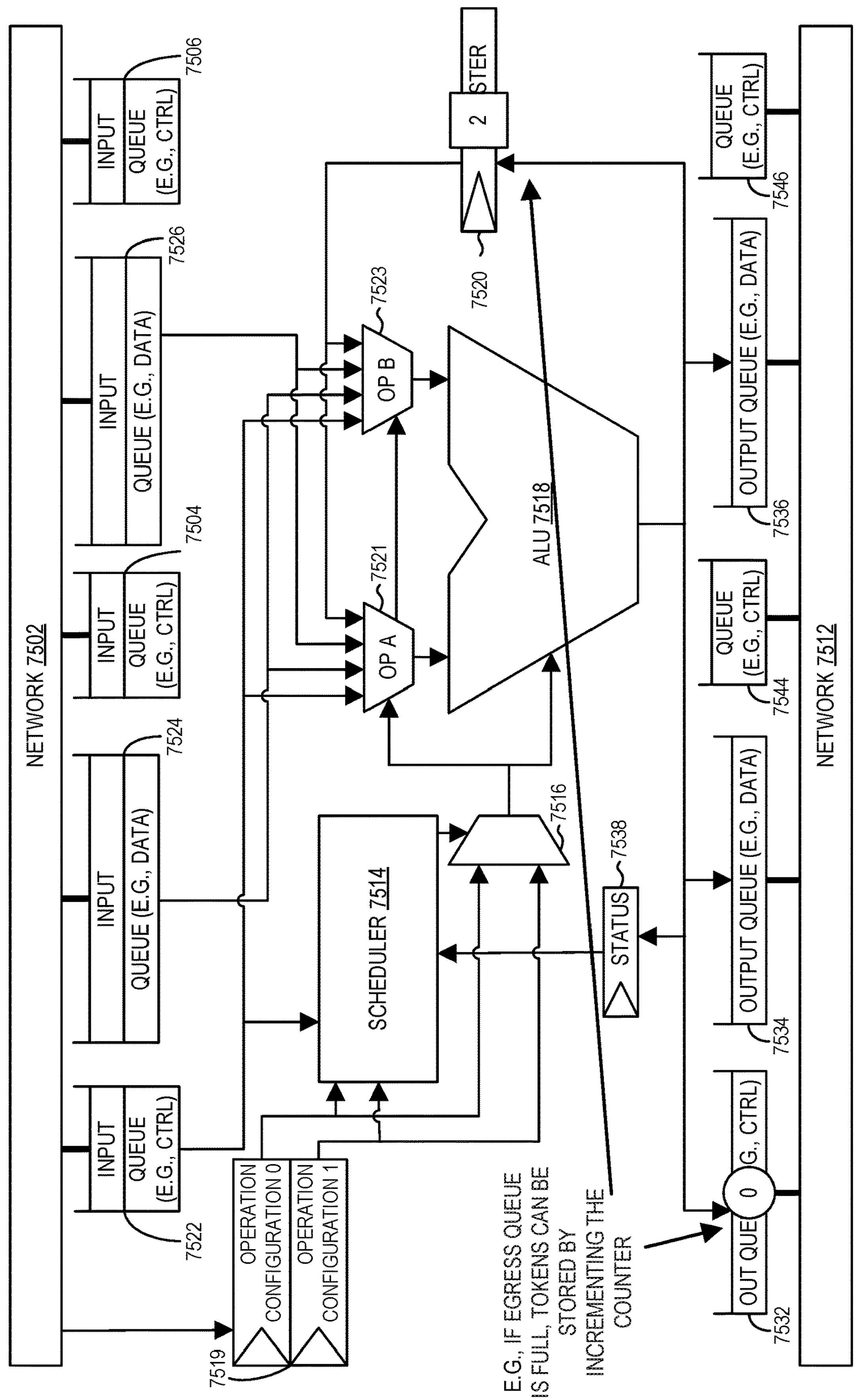

In FIG. 75D, the zero value in the output queue 7532 still has not been consumed, e.g., by a downstream PE or PEs, and thus in this period (e.g., cycle), PE 7500 is to again increment the count value in register 7520 by one (e.g., the count value becomes two), and that value of zero is cleared from the first slot of input queue 7522.

Figure 75E:
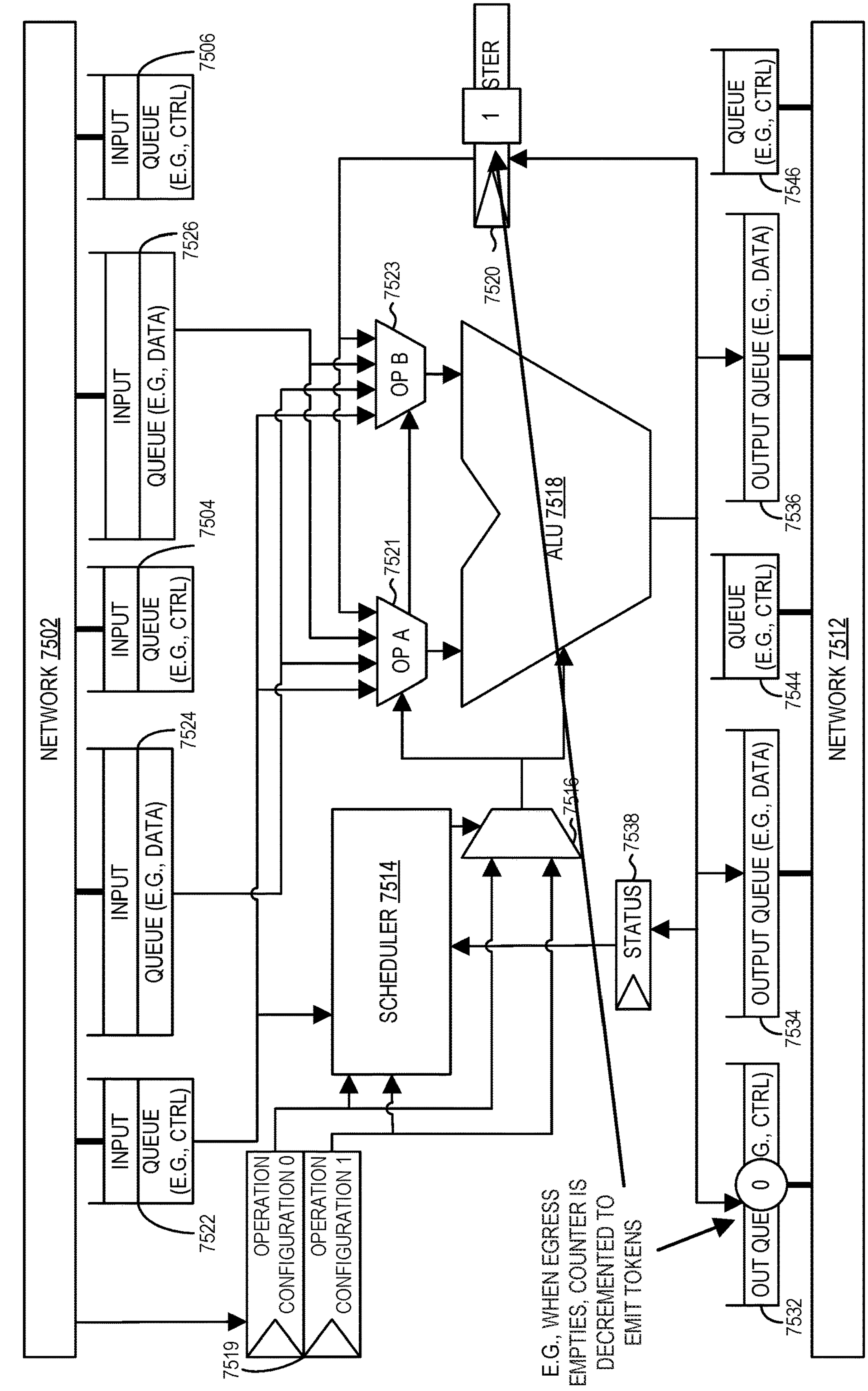

In FIG. 75E, a zero value in the output queue 7532 has been consumed, e.g., by a downstream PE or PEs, and thus in this period (e.g., cycle), PE 7500 is to decrement the count value in register 7520 by one (e.g., the count value becomes one) and store a corresponding zero value into the empty slot in the output queue 7532.

Figure 75F:
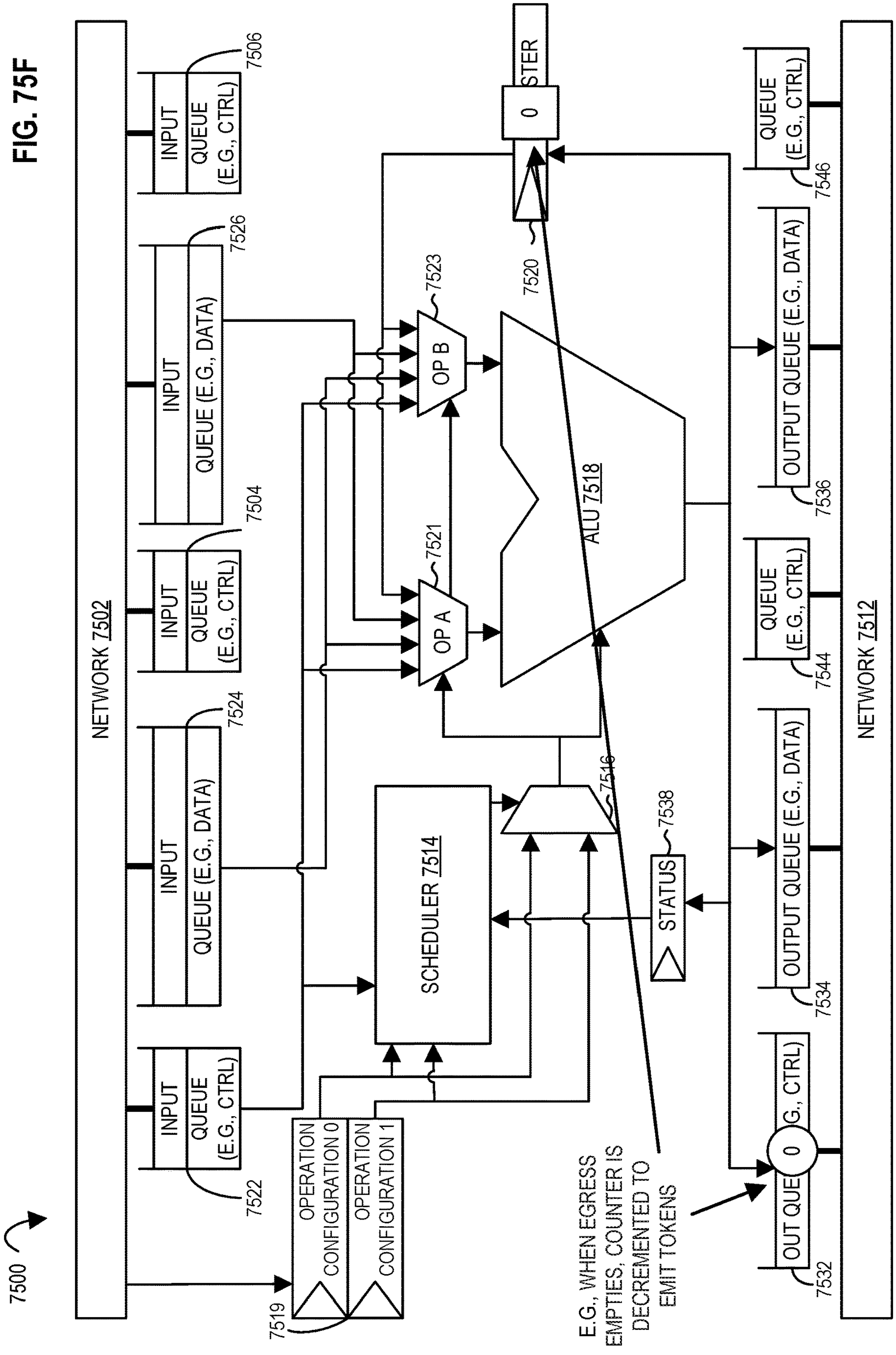

In FIG. 75F, a zero value in the output queue 7532 has been consumed, e.g., by a downstream PE or PEs, and thus in this period (e.g., cycle), PE 7500 is to decrement the count value in register 7520 by one (e.g., the count value becomes zero) and store a corresponding zero value into the empty slot in the output queue 7532.

In certain embodiments, PE 7500 is to implement a storage structure for zero-bit data values by maintaining a counter tracked in a PE register (e.g., to enable a large number of tokens to be stored).

In certain embodiments, PE 7500 is not stalled from performing the Countbuffer0 operation because space is not available in the output queue that is to be used for storing resultant data (e.g., assuming the counter value has space available for the counter value).

In the depicted embodiment, PE 7500 includes the components of PE 5800 from FIG. 58, for example, with the components ending with the same two numbers having the same functionality. In one embodiment, scheduler 7514 schedules an operation or operations of processing element 7500 for execution according to the configuration value, e.g., and when input data and control input arrives. See, for example, the discussion of FIGS. 33-57.

Countbuffer1 (cntbuffer1)

In one embodiment, a CSA architecture includes a configuration value that, when stored into the configuration storage (e.g., register), causes the CSA (e.g., a PE thereof) to perform a Countbuffer1 (cntbuffer1) operation according to the following (e.g., semantics and/or description).

```
Operation: cntbuffer1 outseq.CRd.i1, inseq.CRd.i1
Semantics:
Output is set a one value as long as the input is a one or the counter is
greater than zero. A zero is only output if the counter is empty and the
input
is a zero.
If (inseq.peek && outseq.room) {
        outseq = inseq
        inseq.deq
} else if (inseq.peek && outseq.full) {
        counter++
        inseq.deq
} else if (outseq.room && (counter > 0 )) {
        counter−
        outseq = 1
} else if (!inseq.peek && (counter == 0) && outseq.room) {
        outseq = inseq
        inseq.deq
}
Description:
```

FIGS. 76A-76F illustrate a processing element 7600 performing a CountBuffer1 (cntbuffer1) operation according to embodiments of the disclosure. In the depicted embodiment, an operation configuration value for a CountBuffer1 (cntbuffer1) operation is stored (e.g., during a programming time period) into operation configuration register 7619. PE 7600 includes register 7620 (e.g., multiple bit register) to track the number of one elements (e.g., value of 1) that have been encountered, e.g., even when the output queue is full. In one embodiment, the CountBuffer1 (cntbuffer1) operation causes register 7620 of PE 7600 to keep a count of the number of one values that have been received but not yet written to the output queue, for example, to allow the input one values to be dequeued (e.g., to avoid a stall of the PE), e.g., according to the "cntbuffer1" operation in the above discussion.

In FIGS. 76B-76E, the numbers in the circles for the bits in (e.g., control) input queue 7622 are (e.g., data or control) values, and the number in the register 7620 is the counter value to keep the count of the number of one values that have been received (for example, but that have not been sent to the output queue yet, e.g., because the output queue is full (back pressured)).

Figure 76A:
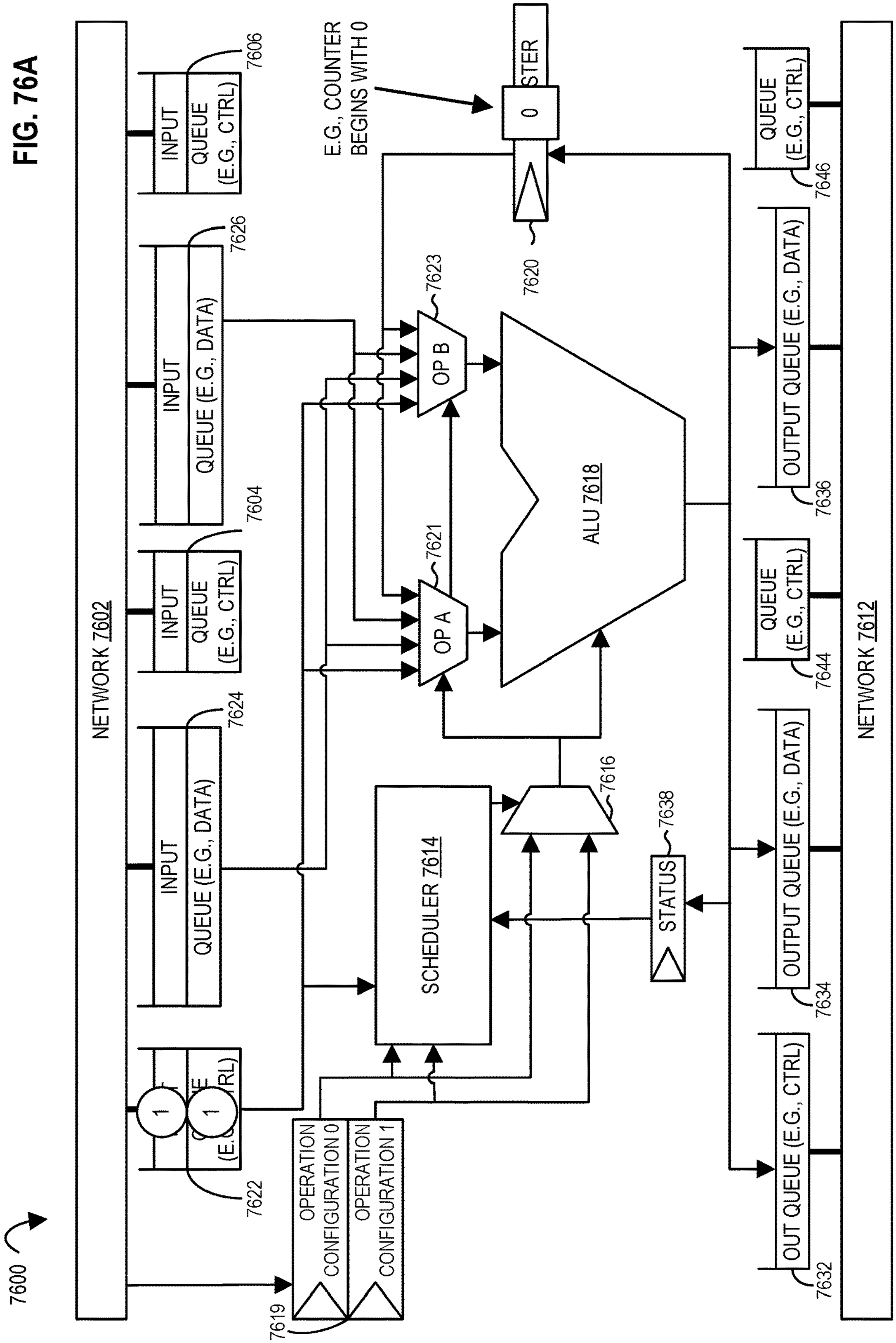
FIGS. 76A-76F illustrate a processing element performing a CountBuffer1 (cntbuffer1) operation according to embodiments of the disclosure.

In FIG. 76A, a value of one is in a first slot of input queue 7622, a value of one is in the second slot of input queue 7622, and a count value in the register 7620 has been set (e.g., reset) to zero. The input data that is queued may be sent from another component of a CSA, e.g., from one or a plurality of other PEs as discussed herein. In certain embodiments, the data is read from the first slot of a queue, and when consumed (e.g., removed), any data from other slots of the queue are advanced such that data from the second slot is moved into the first slot, etc. Note that there is space (e.g., a slot) available in output queue 7632.

Figure 76B:
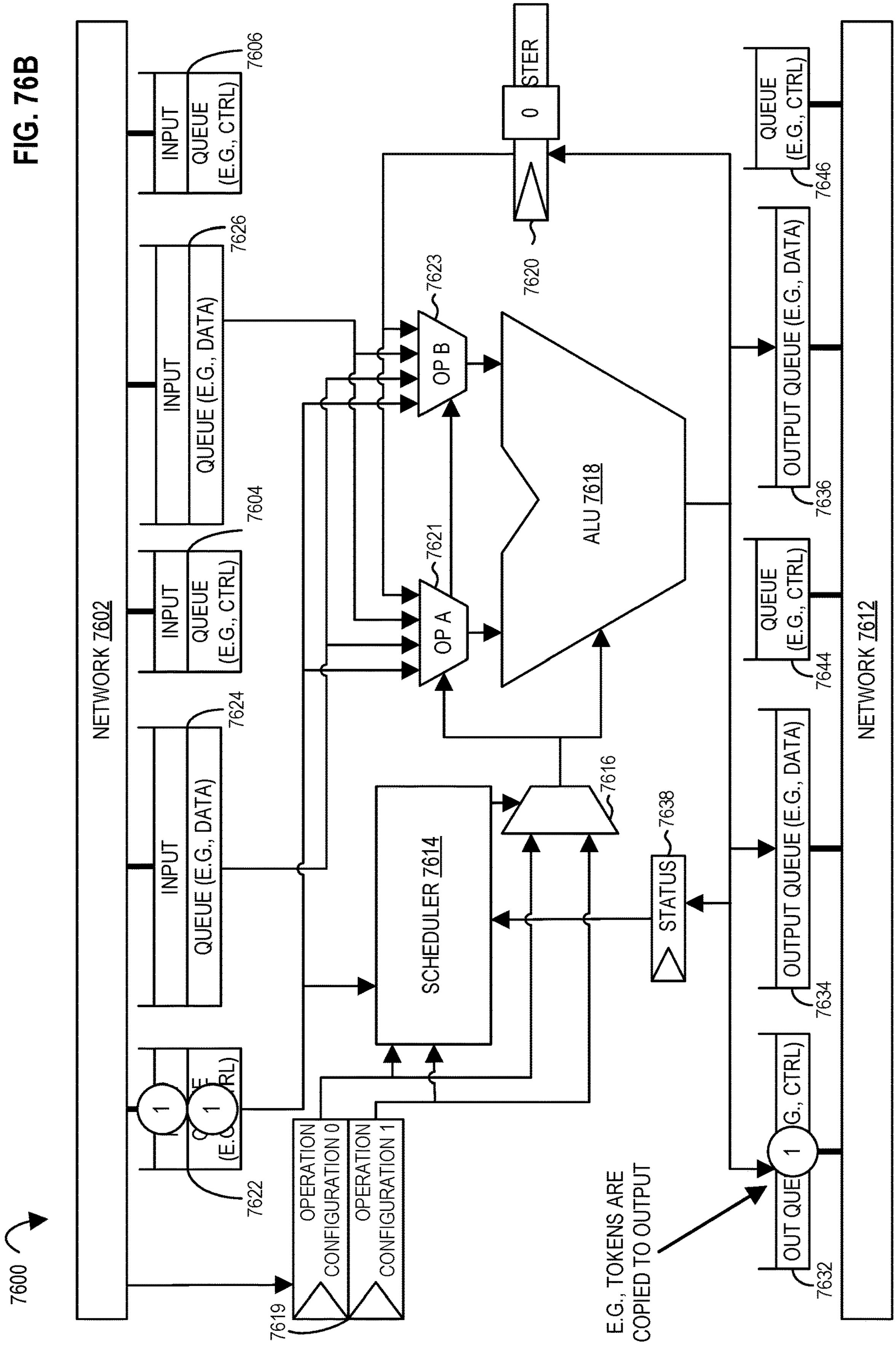

In FIG. 76B, a value of one has been output into the output queue 7632, the value of one has been dequeued from the first slot of input queue 7622, a value of one has been moved into the first slot from the second slot of input queue 7622, and another value of one has been input into the second slot of input queue 7622. As there was output space available for the one, the counter value in the register 7620 remains at zero. The input data that is queued may be sent by (e.g., received from) another component of a CSA, e.g., from one or a plurality of other PEs as discussed herein.

Figure 76C:
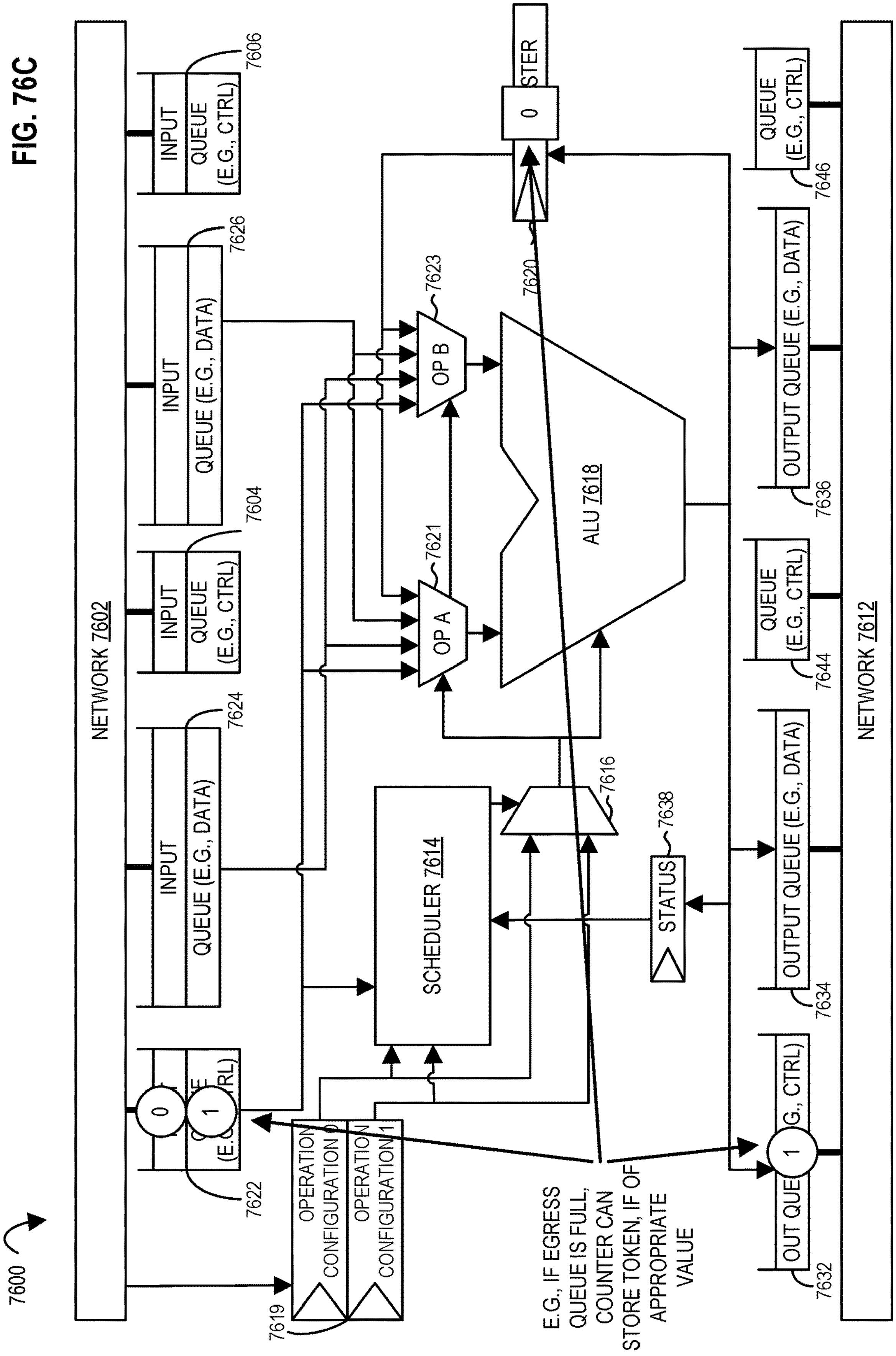

In FIG. 76C, a one value in the output queue 7632 has been consumed, e.g., by a downstream PE or PEs, and thus in this period (e.g., cycle), PE 7600 is to clear the value of one from the first slot of input queue 7622, the next value of one is moved into the first slot from the second slot of (e.g., control) input queue 7622, and a value of zero has been input into the second slot of input queue 7622 (e.g., from another component of a CSA, e.g., from one or a plurality of other PEs as discussed herein).

Figure 76D:
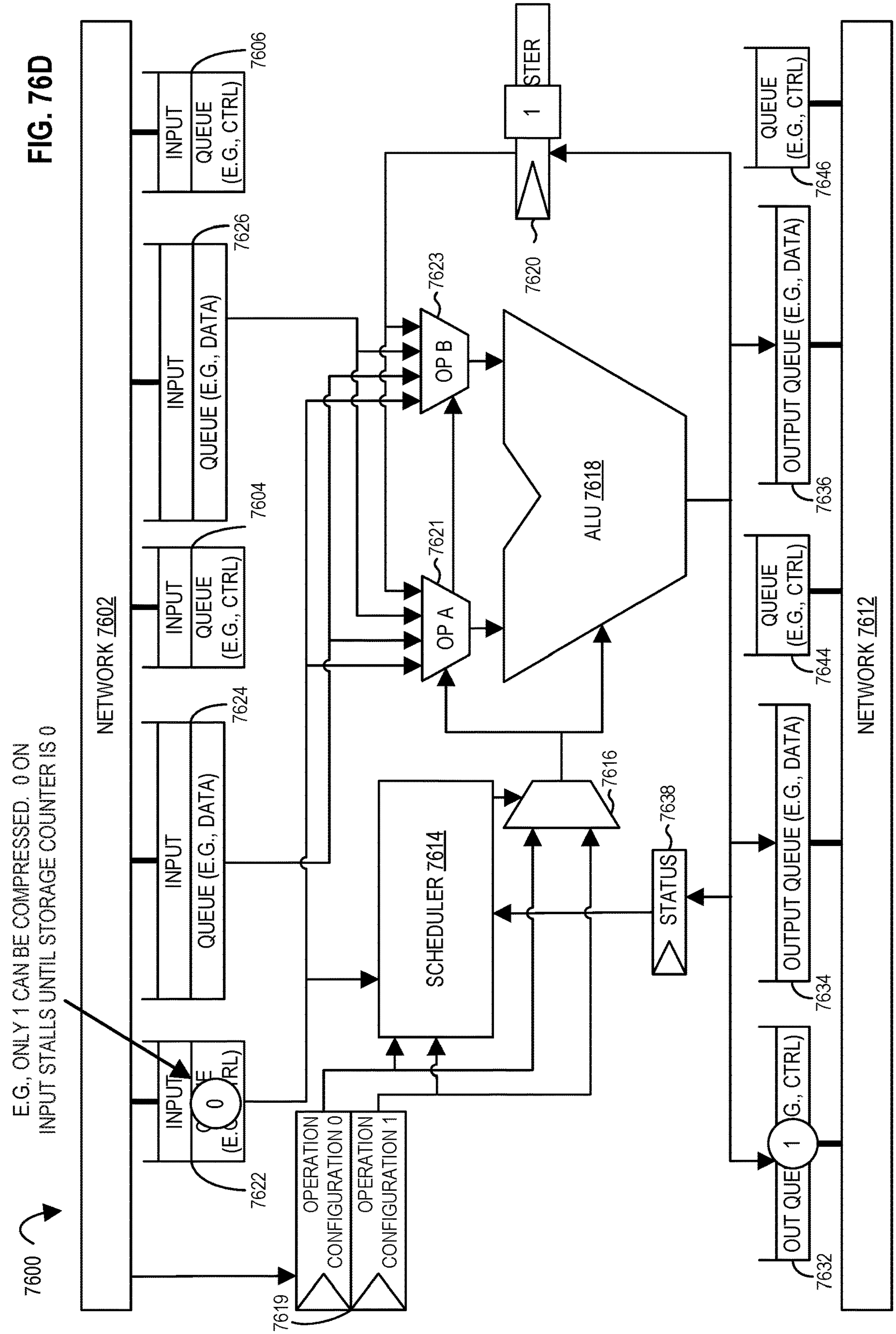

In FIG. 76D, the one value in the output queue 7632 has not been consumed, e.g., by a downstream PE or PEs, and thus in this period (e.g., cycle), PE 7600 is to increment the count value in register 7620 by one (e.g., the count value becomes one), and that value of one is cleared from the first slot of input queue 7622, and the value of zero is moved into the first slot from the second slot of (e.g., control) input queue 7622.

Figure 76E:
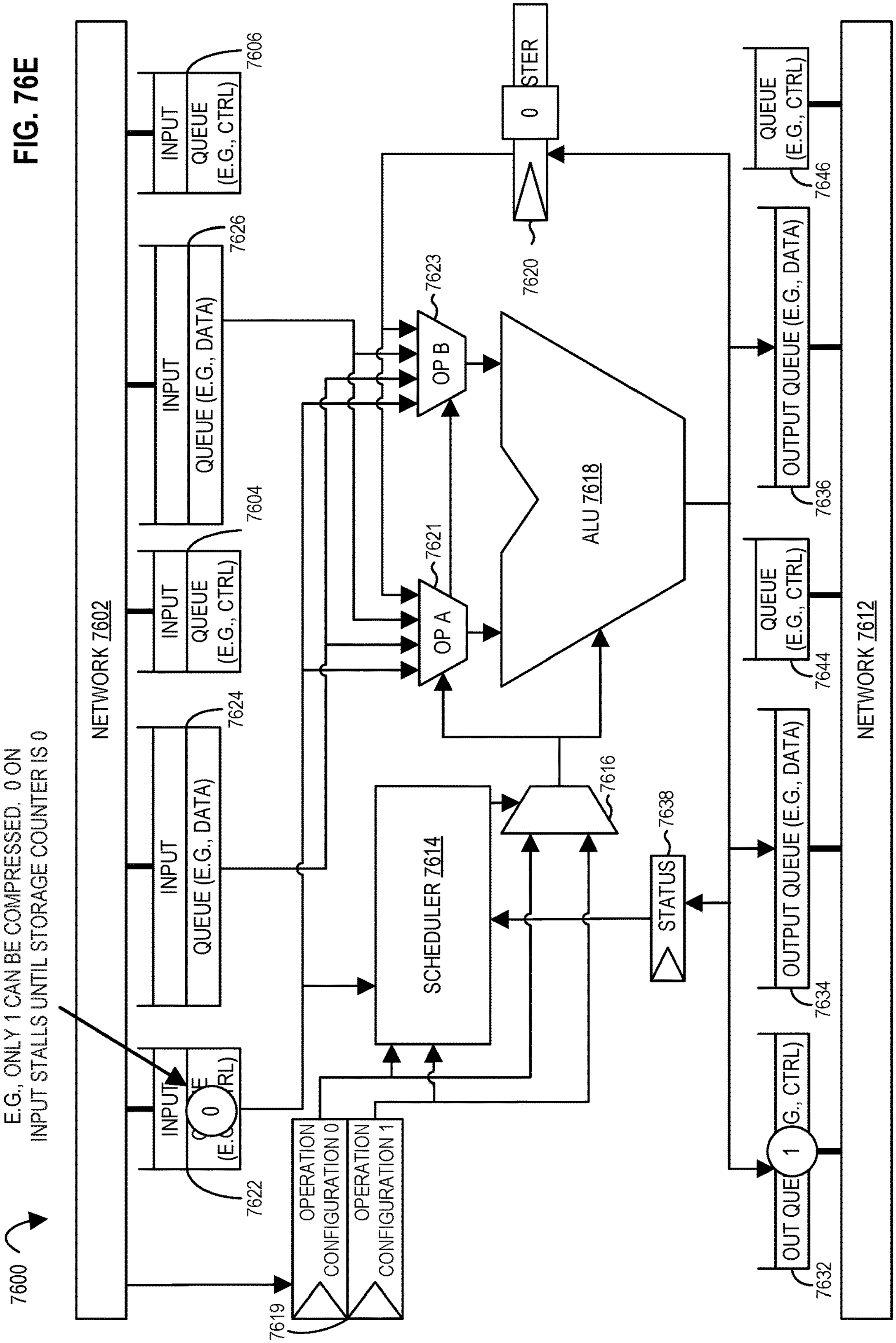

In FIG. 76E, a one value in the output queue 7632 has been consumed, e.g., by a downstream PE or PEs, and thus in this period (e.g., cycle), PE 7600 is to decrement the count value in register 7620 by one (e.g., the count value becomes zero) and store a corresponding one value into the empty slot in the output queue 7632.

Figure 76F:
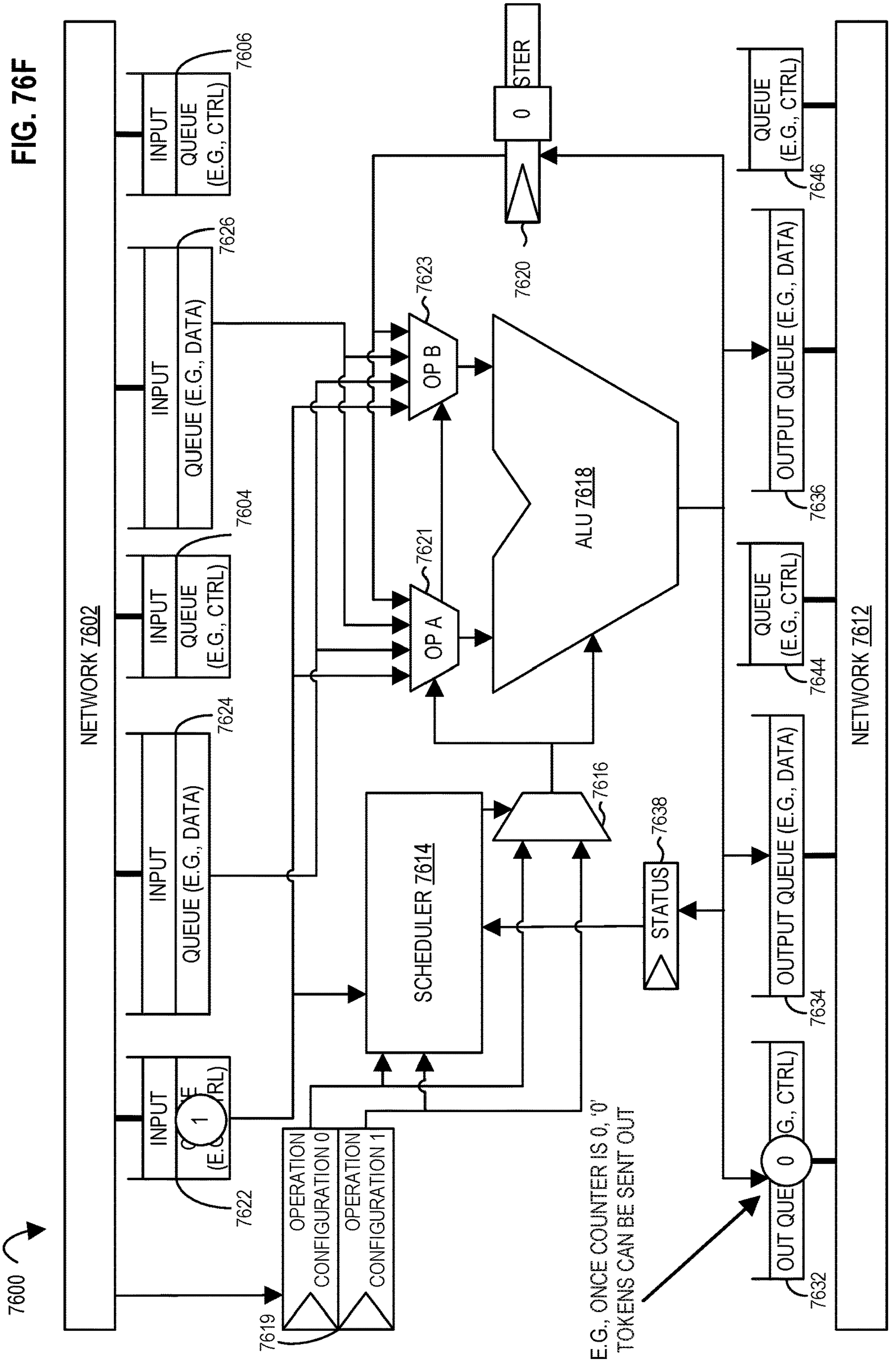

In FIG. 76F, a one value in the output queue 7632 has been consumed, e.g., by a downstream PE or PEs, and thus in this period (e.g., cycle), because the counter in register 7620 being zero indicates that no further one values are to be output, the PE 7600 is to dequeue the zero value from the first slot of input queue 7622, and store the zero value into the empty slot in the output queue 7632.

In certain embodiments, PE 7600 is to implement a storage structure for one-bit data values by maintaining a counter tracked in a PE register (e.g., to enable a large number of a "same value" tokens to be stored).

In certain embodiments, PE 7600 is not stalled from performing the Countbuffer1 operation because space is not available in the output queue that is to be used for storing resultant data (e.g., assuming the counter value has space available for the counter value).

In the depicted embodiment, PE 7600 includes the components of PE 5800 from FIG. 58, for example, with the components ending with the same two numbers having the same functionality. In one embodiment, scheduler 7614 schedules an operation or operations of processing element 7600 for execution according to the configuration value, e.g., and when input data and control input arrives. See, for example, the discussion of FIGS. 33-57.

OnCount0

In one embodiment, a CSA architecture includes a configuration value that, when stored into the configuration storage (e.g., register), causes the CSA (e.g., a PE thereof) to perform an OnCount0 operation according to the following (e.g., semantics and/or description).

---

Operation: oncount0 sig.CRd.i0, count.CRLu.i64,
  i0.CRLu.i0, i1.CRLu.i0=N, i2.CRLu.i0=N, i3.CRLu.i0=N
Description: This operation is triggered when presented with a count, then counts signals on any of the i input channels until the count is satisfied, then sig is asserted. Note that there is no assertion about the distribution of counts across i*—the incoming signals could be relatively evenly balanced, or highly biased. A sample use would be in a worker model to determine when all work items are done. (An alternative approach when exactly one count is expected from each path would to use be all0, where each worker asserts when they are done with all work.) The assembler defaults unused operands to %na so the operation can be straightforwardly be used with fewer operands.

---

FIGS. 77A-77F illustrate a processing element 7700 performing a OnCount0 operation according to embodiments of the disclosure. In the depicted embodiment, an operation configuration value for a OnCount0 operation is stored (e.g., during a programming time period) into operation configuration register 7719. As one example, input queue or queues (e.g., having a single bit width) 7717, 7721, 7722, 7704, or 7706) is provided to receive a value (e.g., a control value). Additionally, an (e.g., wider) input queue or queues 7724 or 7726 (for example, having a multiple bit width, e.g., 8, 16, 32, or 64) is provided to receive a value (e.g., a target counter value).

In FIGS. 77B-77F, the numbers in the circles for the bits in (e.g., control) input queue 7721 and 7722 are the instance numbers, and not the (e.g., data or control) values themselves (for example, circle zero is the value from a zero point chosen in time), the number in storage 7701 is the current counter value, the circled number inside the ALU 7718 is the target counter value received from an input queue, and the circled number in the output buffer 7732 is a value itself (e.g., a Boolean zero or one that indicates when the current count value has reached the target counter value).

Figure 77A:
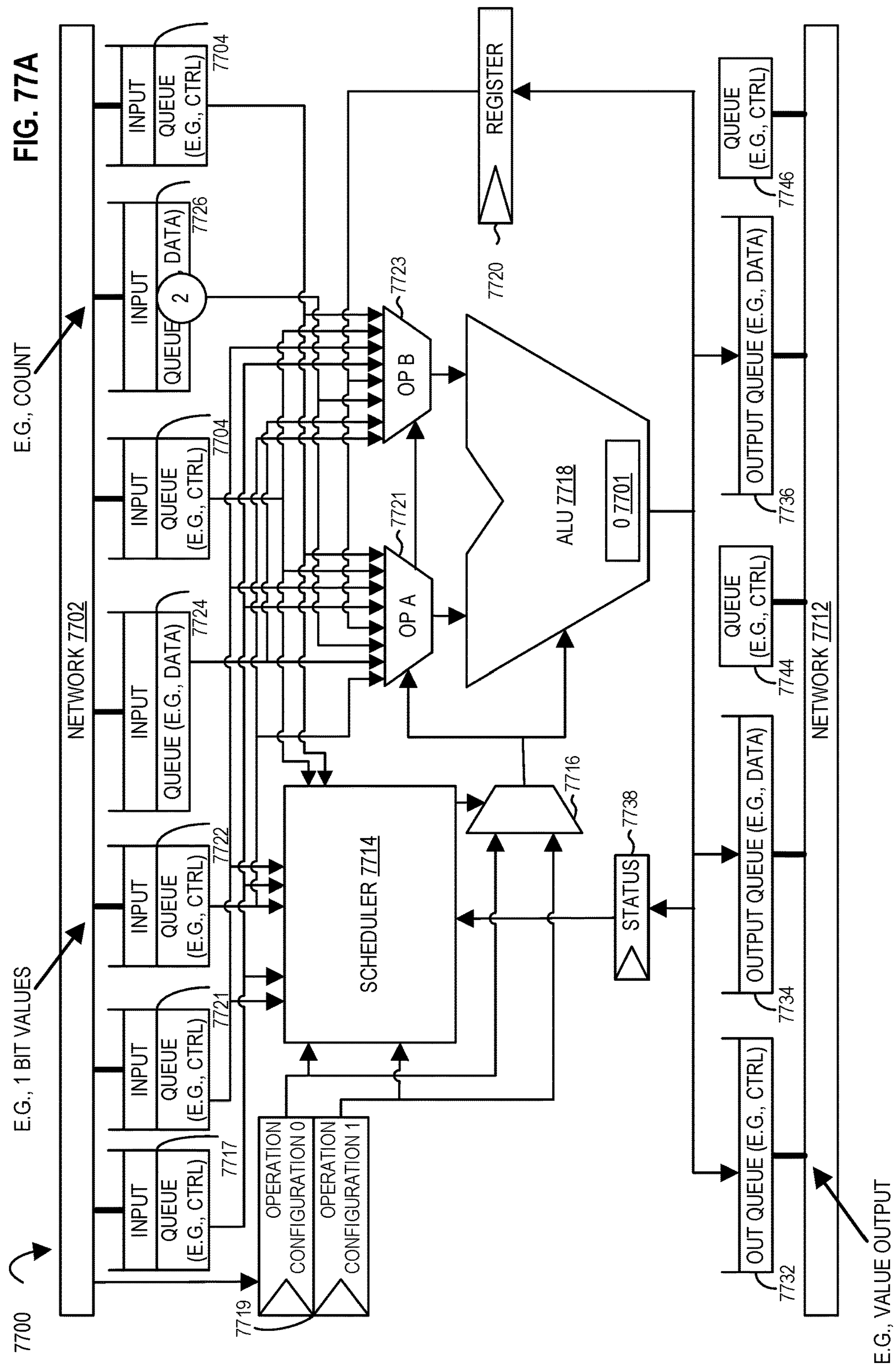
FIGS. 77A-77F illustrate a processing element performing a OnCount0 operation according to embodiments of the disclosure.

In FIG. 77A, the programmed OnCount0 has received a target counter value of two in input queue 7726 indicating the number of (e.g., control) values that are to be received in one or more of the other input queues before the PE is to output a value (e.g., a control value) to its output buffer, e.g., according to the "OnCount0" operation in the above discussion. In the depicted embodiment, ALU 7718 includes storage 7701 for a counter value, and it has been set (e.g., reset) to a value of zero, and storage for the target counter value.

Figure 77B:
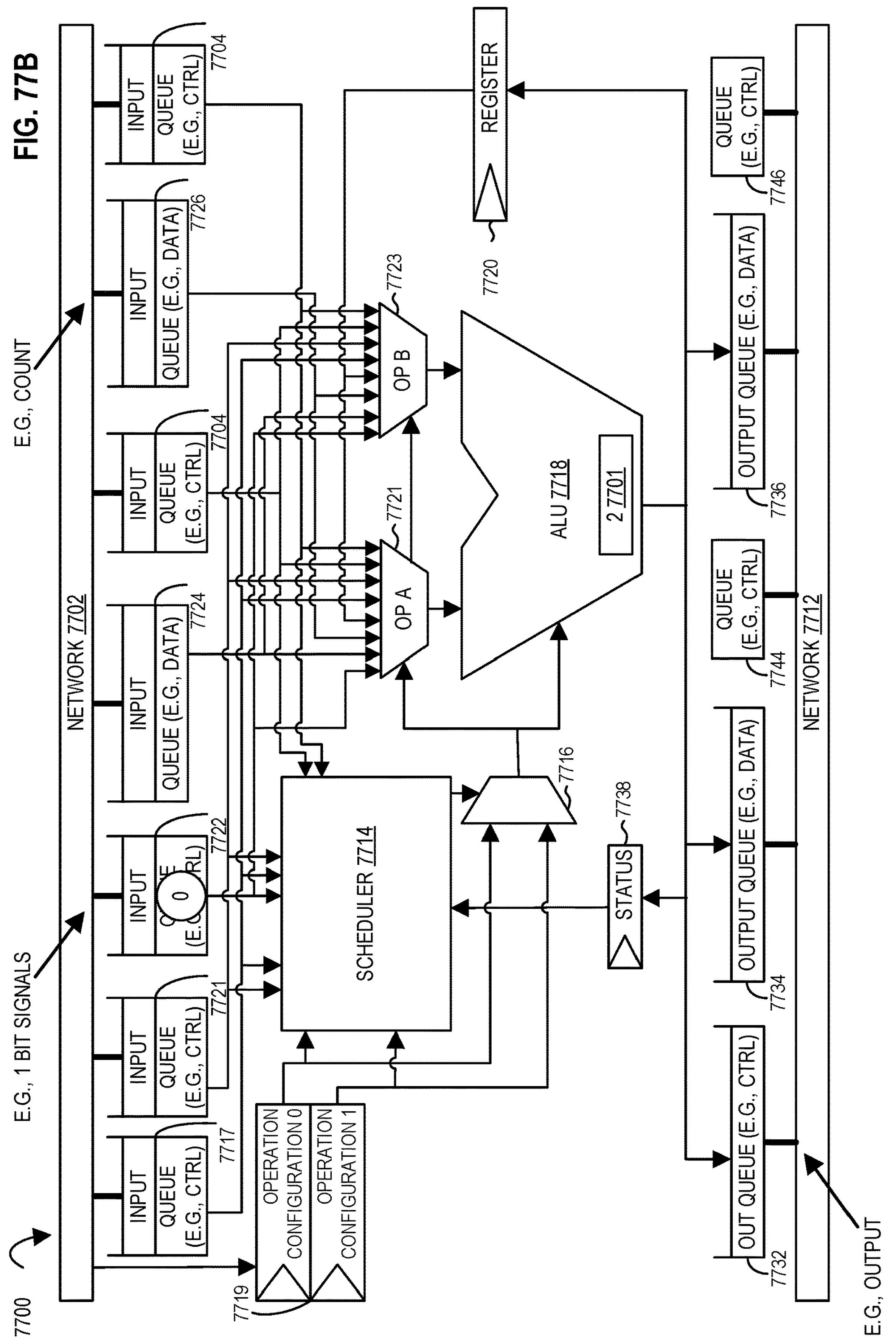

In FIG. 77B, a first control value (e.g., which may have a value of one or zero) has been received in input queue 7722, and optionally, the target counter value is dequeued from input queue 7726 and stored into ALU 7718. The input data that is queued may be sent from another component of a CSA, e.g., from a plurality of other PEs as discussed herein. In certain embodiments, the data is read from the first slot of a queue, and when consumed (e.g., removed), any data from other slots of the queue are advanced such that data from the second slot is moved into the first slot, etc. In FIG. 77B, the current counter value in storage 7701 has been set to a two.

Figure 77C:
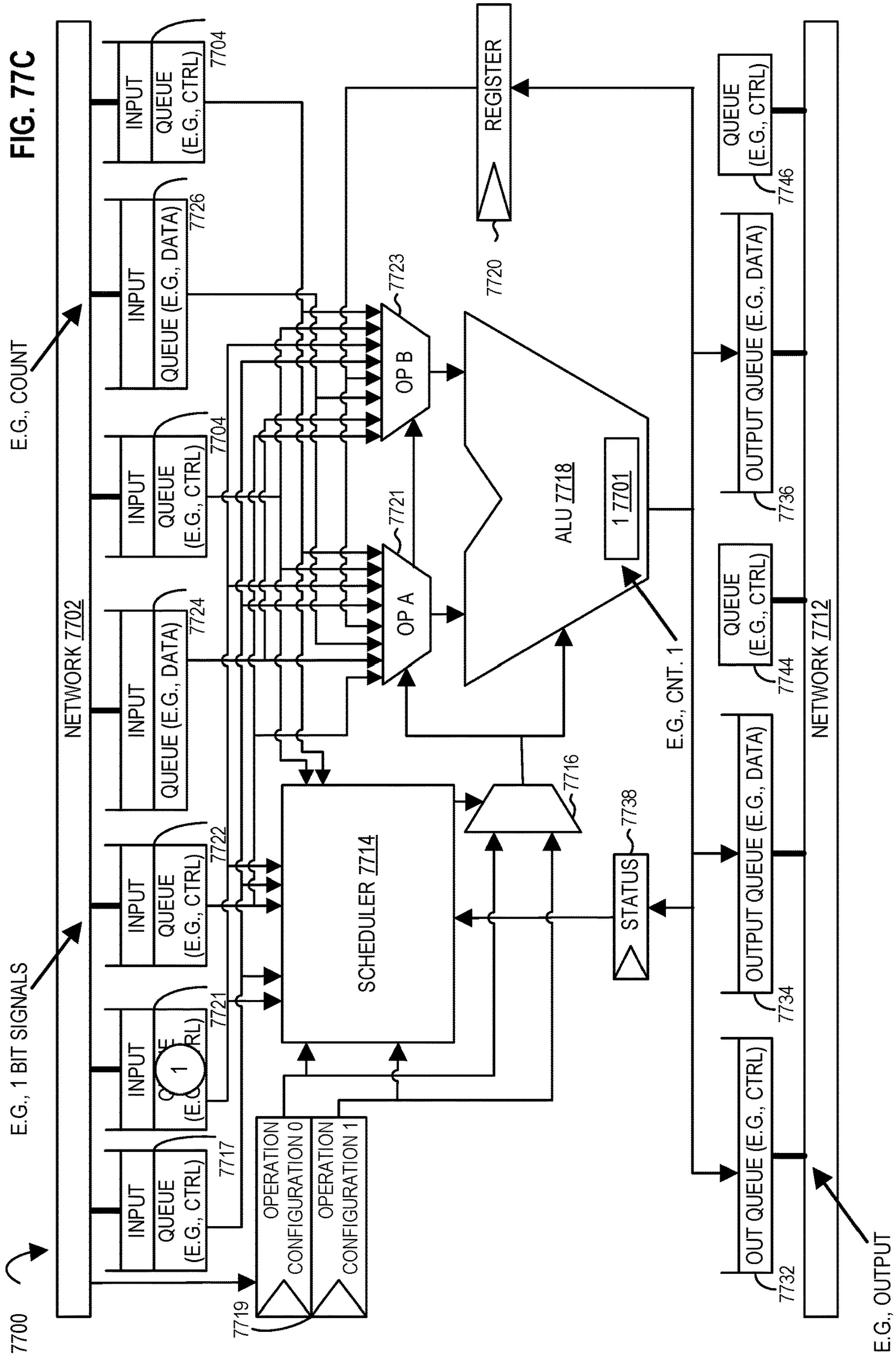

In FIG. 77C, the first control value (e.g., which may have a value of one or zero) has been dequeued from input queue 7722, the current counter value in storage 7701 has been decremented by one (e.g., to a value of one) by ALU 7718, and a second control value (e.g., which may have a value of one or zero) has been received in input queue 7721. The input data that is queued may be sent from another component of a CSA, e.g., from a plurality of other PEs as discussed herein. In certain embodiments, the data is read from the first slot of a queue, and when consumed (e.g., removed), any data from other slots of the queue are advanced such that data from the second slot is moved into the first slot, etc. No output is sent to output buffer 7732 because the current counter value is not equal to the target counter value.

Figure 77D:
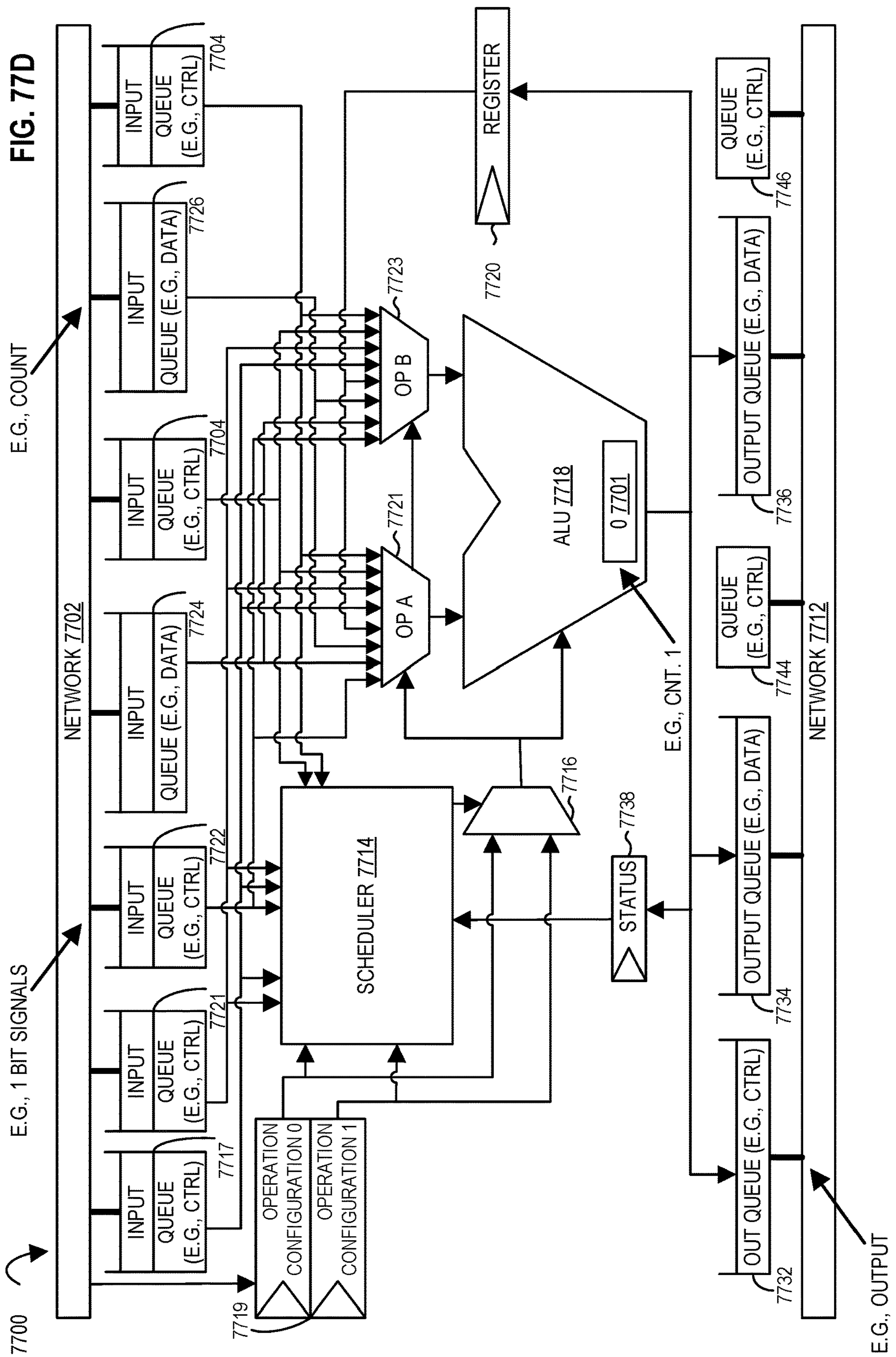

In FIG. 77D, the second control value (e.g., which may have a value of one or zero) has been dequeued from input queue 7721, and the current counter value in storage 7701 has been decremented by one (e.g., to a value of zero) by ALU 7718.

Figure 77E:
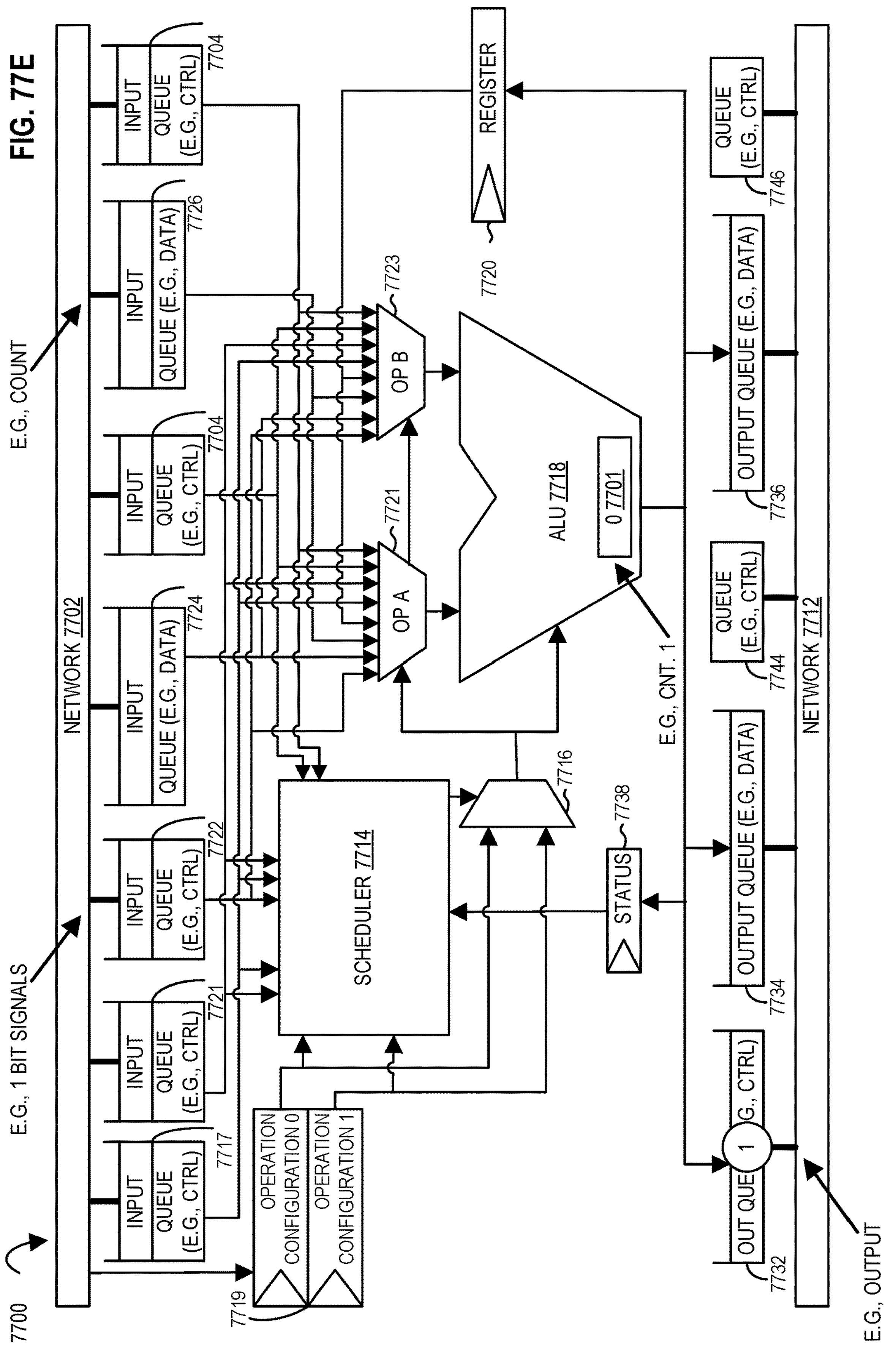

In FIG. 77E, output (e.g., of a Boolean one for true) is sent to output buffer 7732 because the current counter value of two is equal to the target counter value of two indicating that the OnCount0 operation is complete.

Figure 77F:
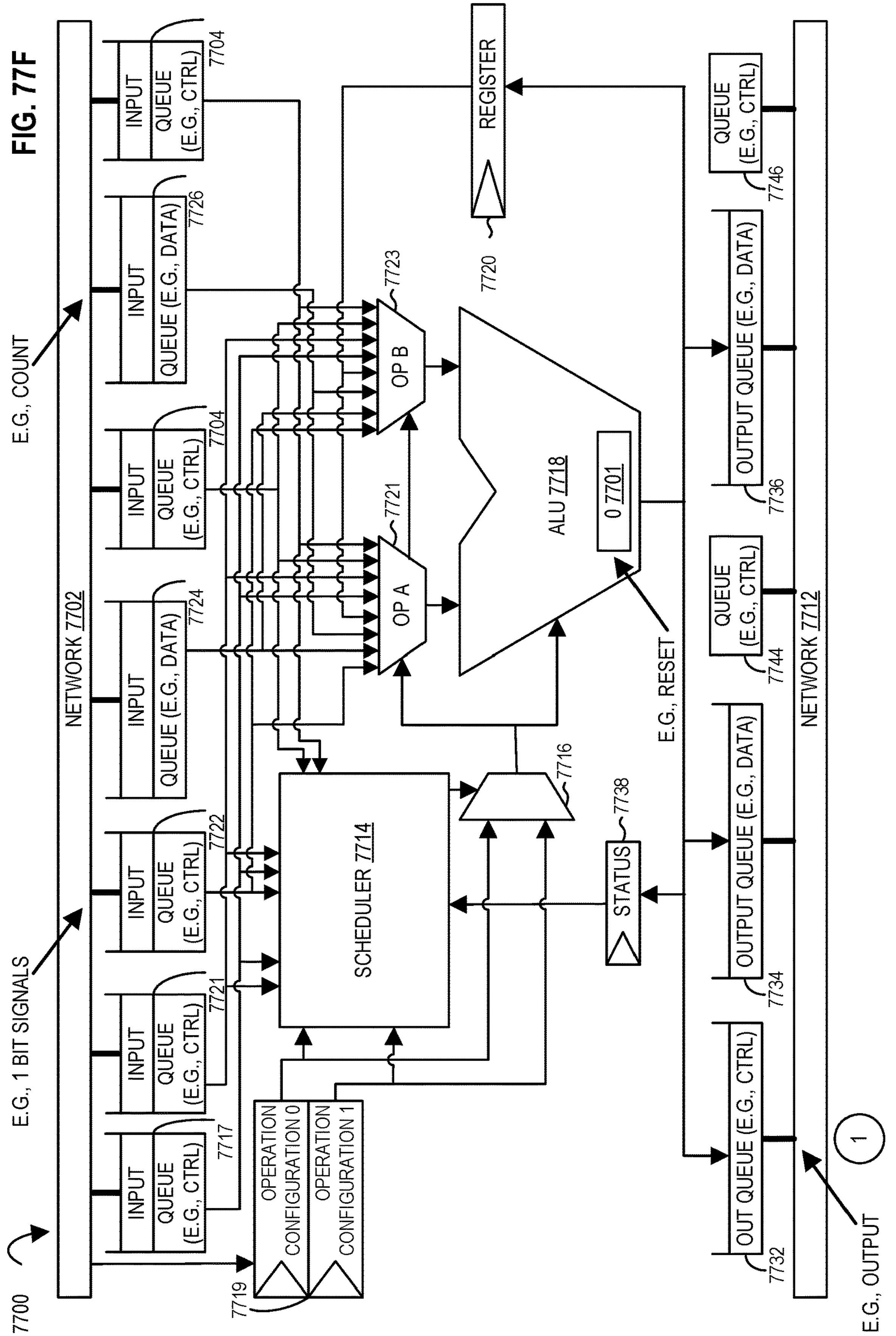

In FIG. 77F, because the output (e.g., of a Boolean one for true) was sent to output buffer 7732, the current counter value is reset to zero.

In certain embodiments, PE 7700 is stalled from performing the OnCount0 operation until there is space available in the output queue that is to be used for storing resultant data.

In the depicted embodiment, PE 7700 includes the components of PE 5800 from FIG. 58, for example, with the components ending with the same two numbers having the same functionality. In one embodiment, scheduler 7714 schedules an operation or operations of processing element 7700 for execution according to the configuration value, e.g., and when input data and control input arrives. See, for example, the discussion of FIGS. 33-57.

OnEnd

In one embodiment, a CSA architecture includes a configuration value that, when stored into the configuration storage (e.g., register), causes the CSA (e.g., a PE thereof) to perform an OnEnd operation according to the following (e.g., semantics and/or description).

```
Operation: onend dst.CRd.i0, ctlstm.CRLu.i1, sigstm.CRLu.i0
Description: Generate output to dst on end of sequence. Specifically, the operation takes in
control stream (ctlstm) values. Each time it is true, it is matched to a signal stream (sigstm)
value. When ctlstm transitions to false, the sequence is done. A typical usage pattern is to
process memory ordering outputs from loop iterations. e.g.
     seqlts64 addr, seqctl,...          // generate address sequence
     ...
     st64 addr, val, stdone, ...        // store issues for each iteration
     ...
     onend loopdone, seqctl, stdone          // match store done w/loop ctl until end of
seq
                                             // loopdone is not set until the last store is
far
                                             // enough advanced that later memops would be
OK
```

FIGS. 78A-78E illustrate a processing element 7800 performing an OnEnd operation according to embodiments of the disclosure. In the depicted embodiment, an operation configuration value for an OnEnd operation is stored (e.g., during a programming time period) into operation configuration register 7819. As one example, input queue (e.g., having a single bit width) 7819 is provided to receive a first stream of control values (e.g., stream control values) and another input queue (e.g., 7822 in the depicted embodiment) is to receive a second stream of data values corresponding to the first stream. The value of the first stream may be any value, as indicated by the circled letter X in these figures. Note that each X may be a different value or they may be the same values. In one embodiment, elements of the first stream are received in one of input queues (e.g., having a single bit width) 7817, 7821, 7822, 7804, or 7806 and elements of the second stream are received in one of input queues 7824 or 7826.

Figure 78A:
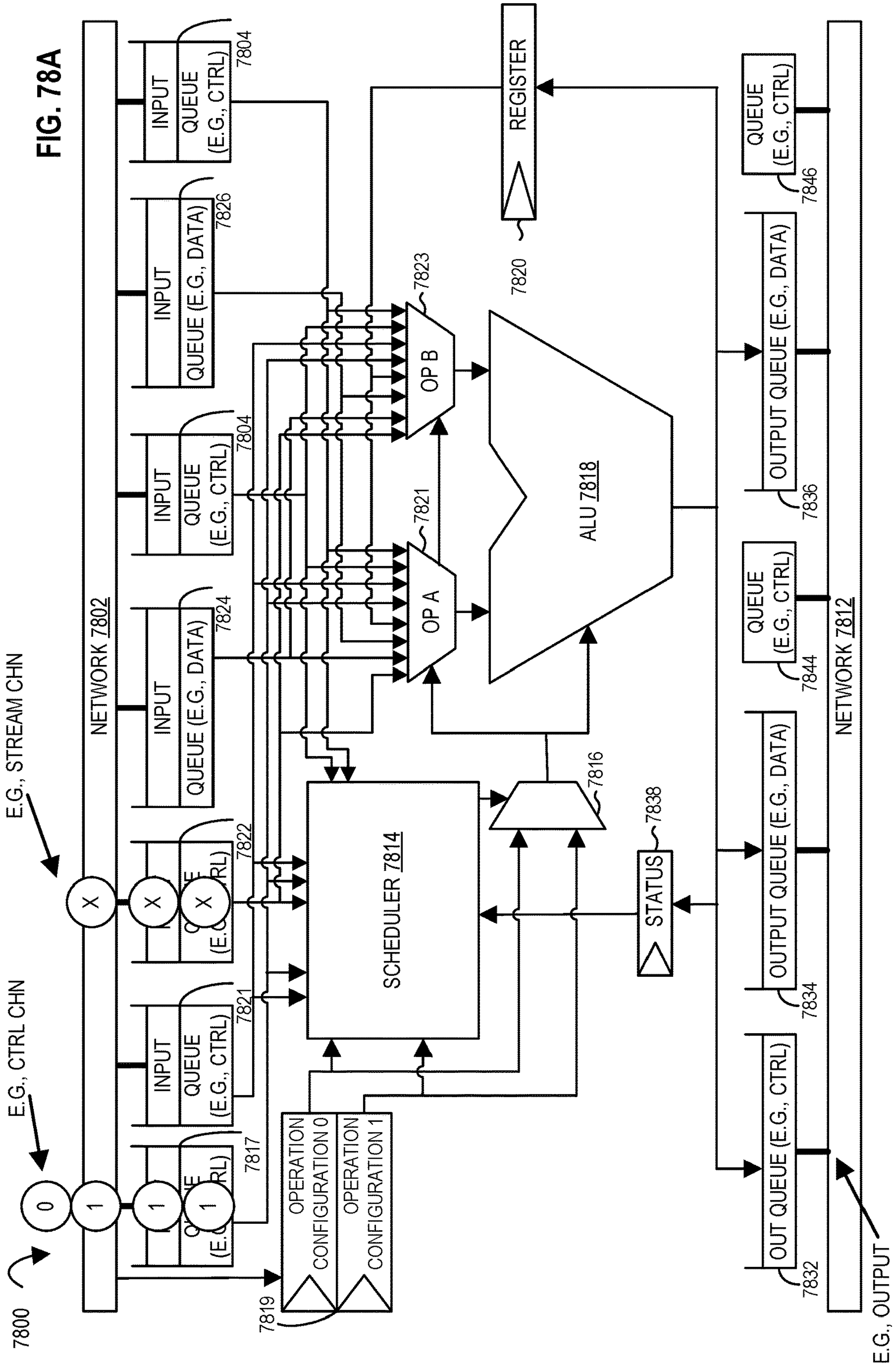

In FIGS. 78A-78E, the programmed OnEnd is to, (i) output a control value (e.g., Boolean one) into an output queue when an element of the first stream in a first input queue is a zero value and dequeue the zero value element of the first stream and the corresponding data value from the second input queue, and (ii) not output a control value (e.g., Boolean one) into an output queue and also dequeue (e.g., delete) an element of the first stream in a first input queue and dequeue (e.g., delete) the corresponding data value from the second input queue when the element of the first stream is a non-zero value (e.g., a Boolean one), e.g., according to the "OnEnd" operation in the above In FIG. 78A, a value of one is in a first slot of input queue 7817, a value of one is in a second slot of input queue 7817, a value of X is in the first slot of input queue 7822, and a value of X is in the second slot of input queue 7822

Figure 78B:
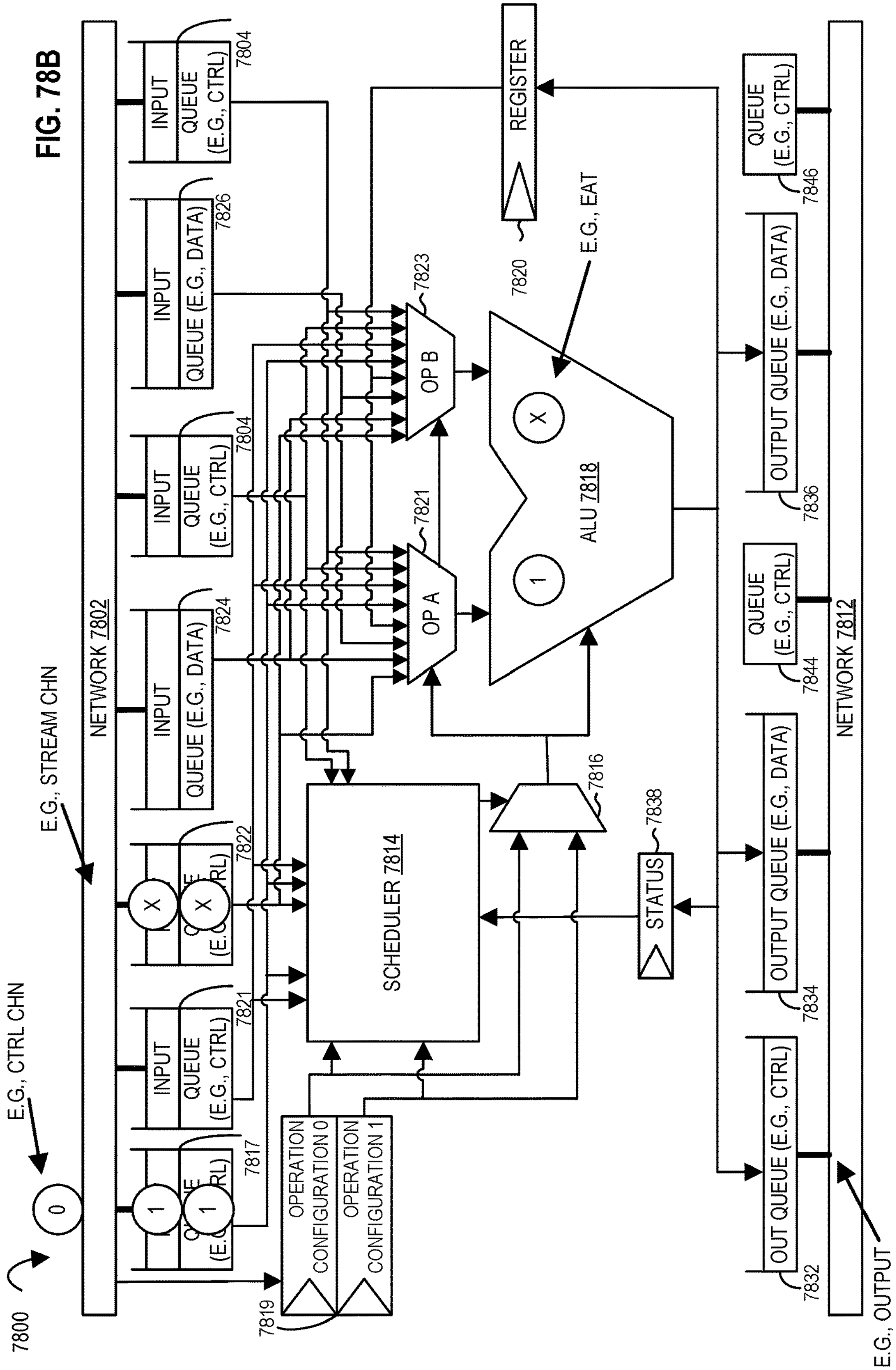

In FIG. 78B, because the control value in the first slot of input queue 7819 is one, the control value of one is dequeued from the first slot of input queue 7817, the data value of X is dequeued from the first slot of input queue 7822, the value of one is moved from the second slot to the first slot of input queue 7817, the value of X is moved from the second slot to the first slot of input queue 7822, another value of one is stored in the second slot of input queue 7817, another value of X is stored in the second slot of input queue 7822, and there is no output sent to output queue 7832.

Figure 78C:
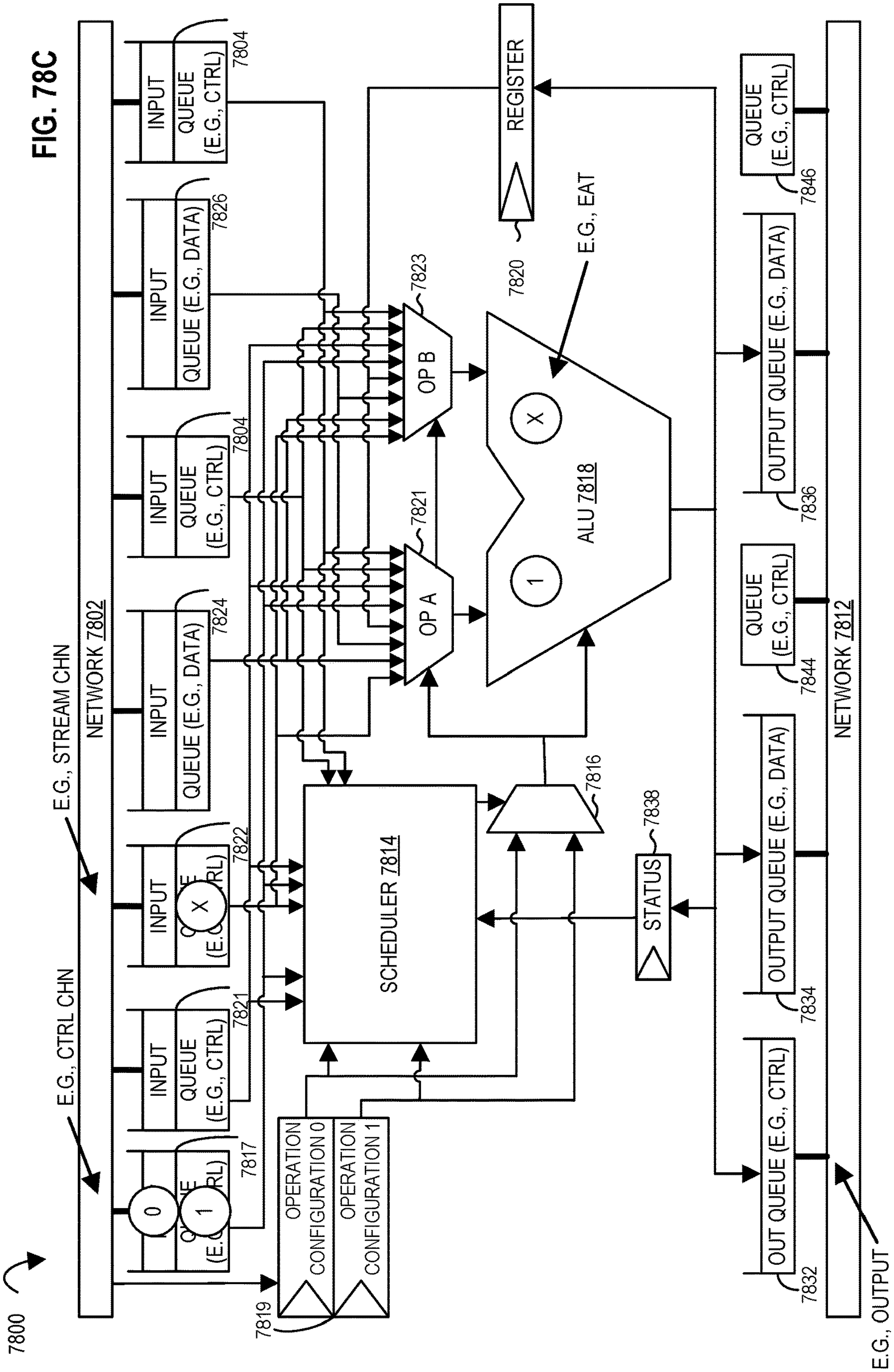

In FIG. 78C, because the control value in the first slot of input queue 7819 is one, the control value of one is dequeued from the first slot of input queue 7817, the data value of X is dequeued from the first slot of input queue 7822, the value of one is moved from the second slot to the first slot of input queue 7817, the value of X is moved from the second slot to the first slot of input queue 7822, a value of zero is stored in the second slot of input queue 7817, and there is no output sent to output queue 7832.

7800 for execution according to the configuration value, e.g., and when input data and control input arrives. See, for example, the discussion of FIGS. 33-57.

Replace1

In one embodiment, a CSA architecture includes a configuration value that, when stored into the configuration storage (e.g., register), causes the CSA (e.g., a PE thereof) to perform a Replace 1 operation according to the following (e.g., semantics and/or description).

```
Operation: replace1 outchan.CRd.i1, inchan.CRLu.i1, patlen.Lu.u64, patbits.Lu.u64,
  repllen.Lu.u64, replbits.Lu.u64 (was
nReplaceStatic/nExpandM)
Description: Given a bit channel on input (inchan), match a pattern sequence of bits
described by a length (patlen) and a little endian bitmask (e.g., bit 0 is the first bit position)
(patbits) and replace it with an output described by a length (repllen) and mask (replbits.) e.g.
replace1 out, in, 2, 0b01, 2, 0b10 will replace a 1 followed by a 0 on input, with a 0 followed
by a 1. Note that this operation may buffer up to patlen-1 bits at any point, so the algorithm
is to be prepared for that. The maximum length of the source pattern is still TBD. The
current expectation is the limit is 2 bits for both pattern and replacement.
Sample usage: This can be used to "edit" streams to translate one sequence to another. For
example, if you wanted to convert '10' (read left to right) in an incoming stream (say, the
transition from things that were iterations, to the end state) to '0' to effectively remove an
iteration, this could be expressed as: replace1 o, i, 2, 0b01, 1, 0b0. (Note that the bits are in
little endian order in the literals. Also, note that the assembler doesn't currently support
0b... literals, only 0x.)
Note that replace1 can be used to create "first" and "last" streams from an "iteration" (1 for
each iteration followed by 0):
  first => not1( replace1( iter, 2, 0b01, 1, 0b0, 1 ) )
  last => not1( replace1( iter, 2, 0b01, 1, 0b0, 0) )
```

In FIG. 78D, because the control value in the first slot of input queue 7819 is one, the control value of one is dequeued from the first slot of input queue 7817, the data value of X is dequeued from the first slot of input queue 7822, the value of zero is moved from the second slot to the first slot of input queue 7817, and there is no output sent to output queue 7832.

Figure 78E:
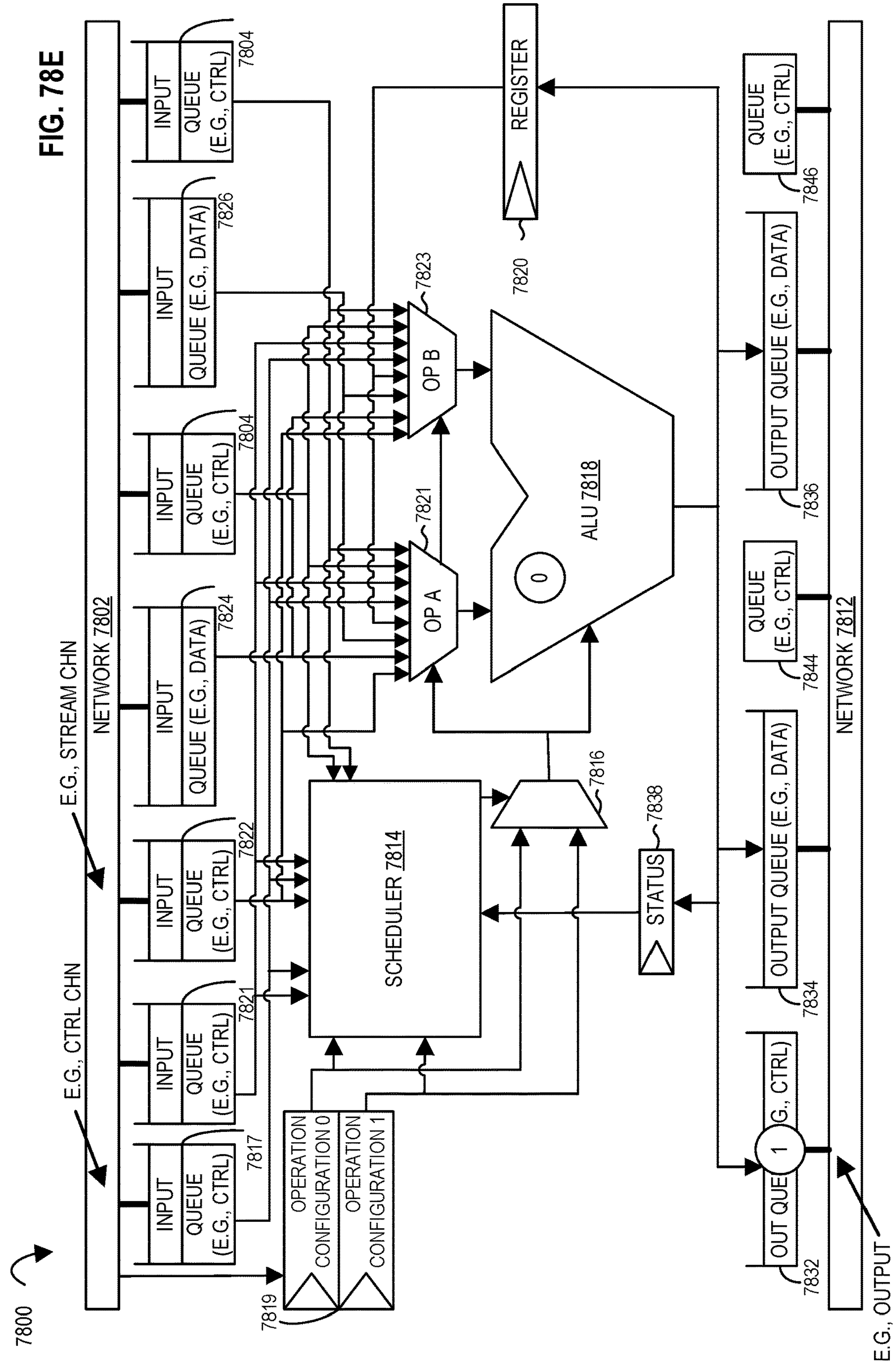

In FIG. 78E, because the control value in the first slot of input queue 7819 is zero, the control value of zero is dequeued from the first slot of input queue 7817, and there is an output (e.g., Boolean one) sent to output queue 7832 to indicate the end of the control stream.

In one embodiment of the FIGS. 78A-78E, the numbers in the circles for the control bits in queue 7819 indicates a one for each item in a single stream followed by a zero to indicate the end (e.g., termination) of that stream.

The input data that is queued may be sent from another component of a CSA, e.g., from a plurality of other PEs as discussed herein.

In certain embodiments, the data is read from the first slot of a queue, and when consumed (e.g., removed), any data from other slots of the queue are advanced such that data from the second slot is moved into the first slot, etc. The data value from the output queue 7832 may be consumed from the output queues, e.g., by a downstream PE or PEs.

In certain embodiments, PE 7800 is stalled from performing the switch operation until there is both (i) space available in the output queue that is to be used for storing resultant data, and (ii) the stream control value (e.g., and input data value) are available. In one embodiment, PE 7800 is not stalled if no output is to be produced.

In the depicted embodiment, PE 7800 includes the components of PE 5800 from FIG. 58, for example, with the components ending with the same two numbers having the same functionality. In one embodiment, scheduler 7814 schedules an operation or operations of processing element FIGS. 79A-79H illustrate a processing element 7900 performing a Replace1 operation according to embodiments of the disclosure. In the depicted embodiment, an operation configuration value for a Replace1 operation is stored (e.g., during a programming time period) into operation configuration register 7919. As one example, one or more input queues are to receive an input stream of values, another input (e.g., queue) is to receive a to-be-replaced pattern (e.g., the to-be-replaced bit pattern itself and optionally, the length of the pattern), and a replacement pattern (e.g., the replacement bit pattern itself and optionally, the length of the pattern). In certain embodiments, the input stream of values is received on one of input queues (e.g., having a single bit width) 7917, 7921, 7922, 7904, or 7906). In the depicted embodiment, the input stream of values is received on input queue 7904. In certain embodiments, the to-be-replaced pattern is received on one of (e.g., wider) input queue or queues 7924 or 7926 (for example, having a multiple bit width, e.g., 8, 16, 32, or 64). In certain embodiments, the replacement pattern is received on one (e.g., the other) of (e.g., wider) input queue or queues 7924 or 7926 (for example, having a multiple bit width, e.g., 8, 16, 32, or 64). In one embodiment, the pattern begins on the right end, in another embodiment, the pattern begins on the left end. In one embodiment, the pattern is part of the configuration value. Although pattern and replacement are the same length in this example, they can be of different lengths.

In FIGS. 79A-79H, the numbers in the circles for the bits in (e.g., control) input queue 7919 are the values themselves (e.g., a one or zero), the numbers in storage 7901 (e.g., which may be in ALU 7918) include the to-be-replaced bit pattern itself and then the (integer) length of that pattern, and the numbers in storage 7903 (e.g., which may be in ALU 7918) include the replacement bit pattern itself and then the (integer) length of that pattern. Note that state storage 7905 (e.g., emit state) and state storage 7907 is included in ALU 7918, but as with other state storage may be stored elsewhere (e.g., in register 7920 and/or status register 7938).

In certain embodiments, "emit state" value in storage 7905 tracks the state of the "replace" state machine. In one embodiment, that state machine has the following three states: (i) ACCUMULATE (state value of 0 in FIGS. 79A-79H) attempting to gather a match and on a match with bit pattern [Matched count], the matched count is incremented, dequeues the input, and if matched count+1 is equal to the length of the bit pattern, the state transitions to REPLACE state, the first bit of the replacement bit pattern may be enqueued to output at this time, on a mismatch (e.g., if [matched count] is non-zero, transition to UNWIND state without dequeueing the input. Bits[Matched count] may be enqueued at this time, if mismatch and matched count is zero, input is copied to output; (ii) REPLACE (state value of 1 in FIGS. 79A-79H) a replace match has occurred and the replacement bit pattern will be streamed out (e.g., where [Matched count] indexes the bits of the replacement bit pattern); and (iii) UNWIND (state value of 3) when a partial match has occurred, and the accumulated partial match will be streamed out (e.g., [matched count] indexes the bits of the replacement bit pattern). In the depicted embodiment, matched count value in 7907 tracks the number of values that have matched the pattern, e.g., it counts up during ACCUMULATE state as bit matches are seen and it counts down during REPLACE and UNWIND states, e.g., as bits are output.

Figure 79A:
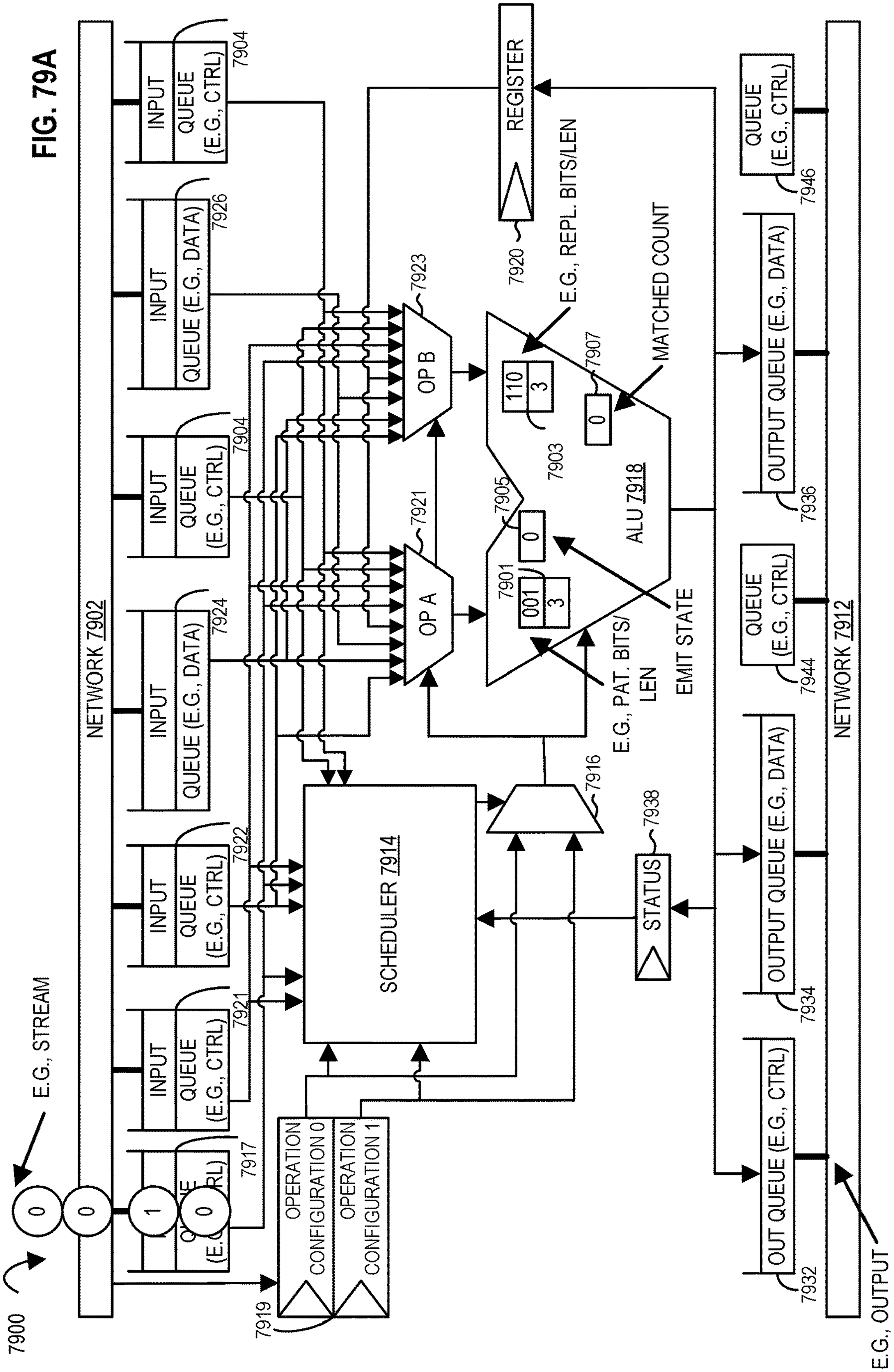
FIGS. 79A-79H illustrate a processing element performing a Replace1 operation according to embodiments of the disclosure.

In FIG. 79A, the programmed Replace1 has received in storage 7901 the to-be-replaced bit pattern of (0, 0, 1) (e.g., starting from the right side) and the length of three bits for that pattern, and in storage 7903 the replacement bit pattern of (1, 1, 0) (e.g., starting from the right side) and the length of three bits for that pattern. The first value of zero has been received in the first slot of input queue 7917, and the second value of one has been received in the second slot of input queue 7919. In another embodiment, each of the numbers (or a proper subset thereof) may include its own storage.

Figure 79B:
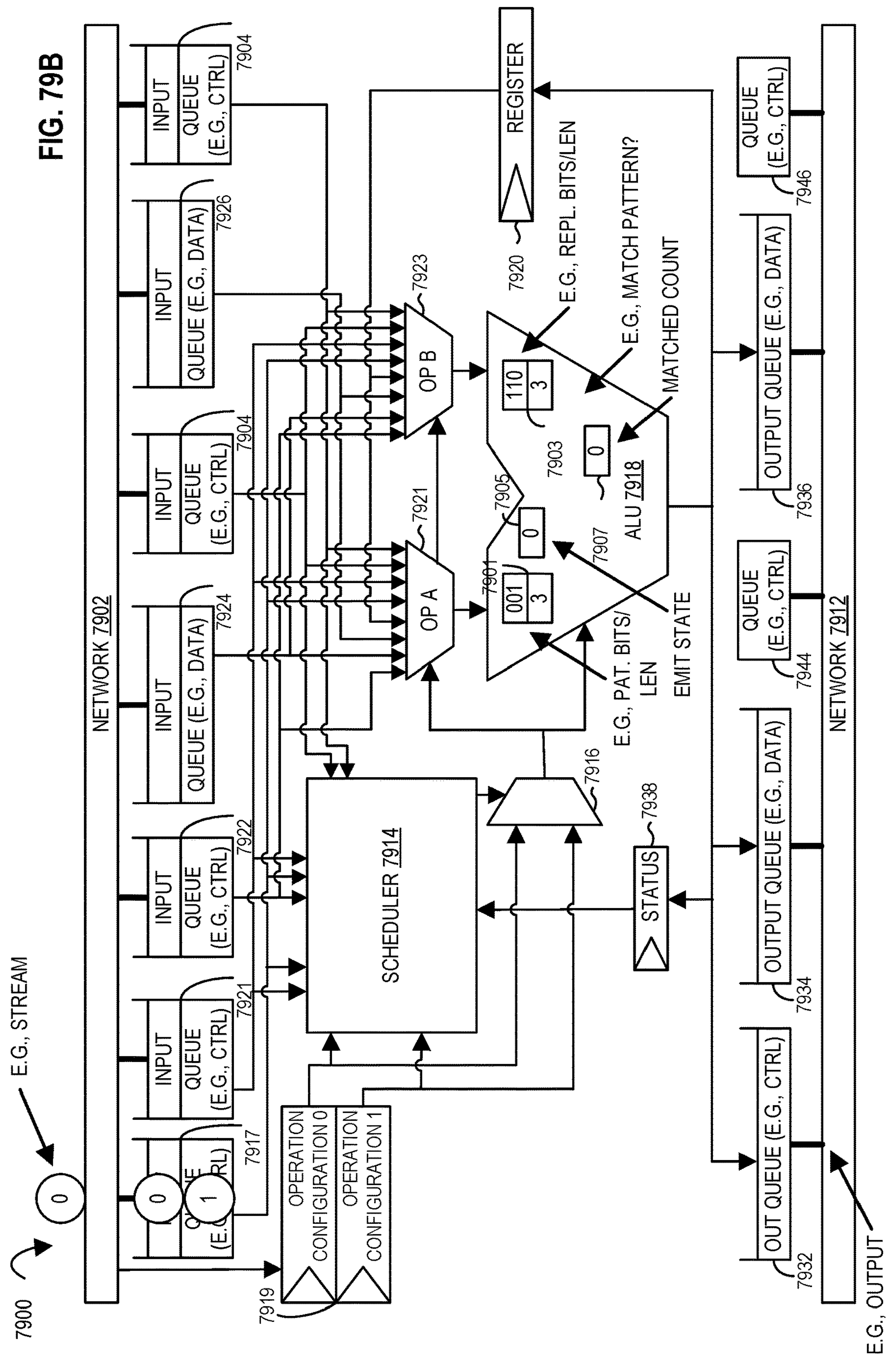

In FIG. 79B, the first value of zero has been dequeued (e.g., removed) from the first slot of input queue 7917, the second value of one has been moved into the first slot from the second slot of input queue 7917, and the third value of zero has been received in the second slot of input queue 7919. PE 7900 compares the input data from the input queue to the to-be-replaced pattern of (0, 0, 1) (e.g., starting from the right side) to determine if the replacement pattern should instead be output from the PE instead of the to-be-replaced pattern. As the first bit in the to-be-replaced pattern is a 1, and the received value from the first slot of input queue 7919 is a zero, then the PE 7900 determines the pattern does not match.

Figure 79C:
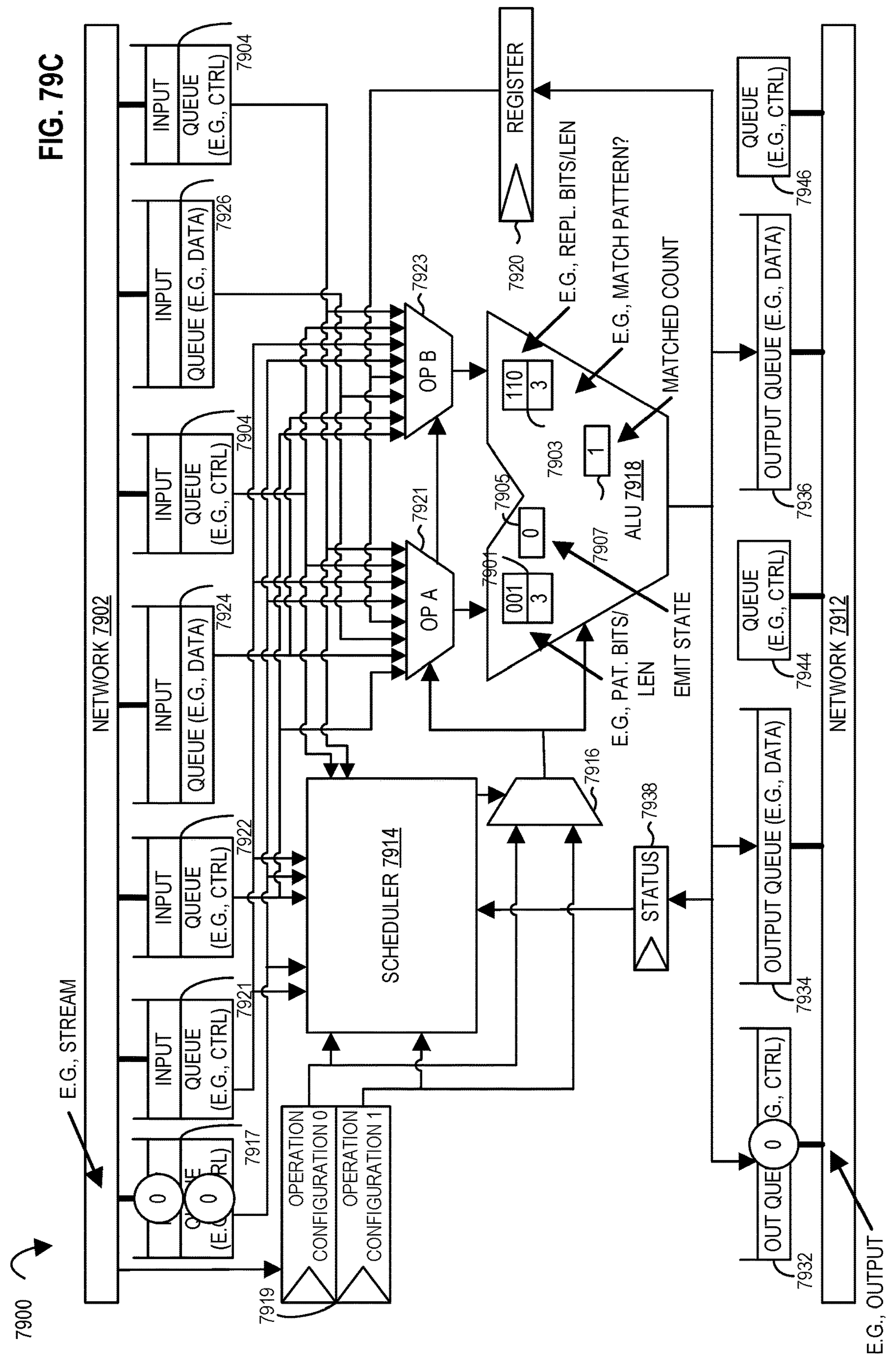

In FIG. 79C, as the first bit of the to-be-replaced pattern did not match in the previous comparison, the zero value is now stored in output queue 7932 instead of being replaced in the output queue 7932 by the replacement pattern. The second value of one has been dequeued (e.g., removed) from the first slot of input queue 7917, the third value of zero has been moved into the first slot from the second slot of input queue 7917, and a fourth value of zero has been received in the second slot of input queue 7919. As the first bit in the to-be-replaced pattern is a 1, and the received value from the first slot of input queue 7919 is a one, then the PE 7900 determines the first bit of the to-be-replaced pattern is matched.

Figure 79D:
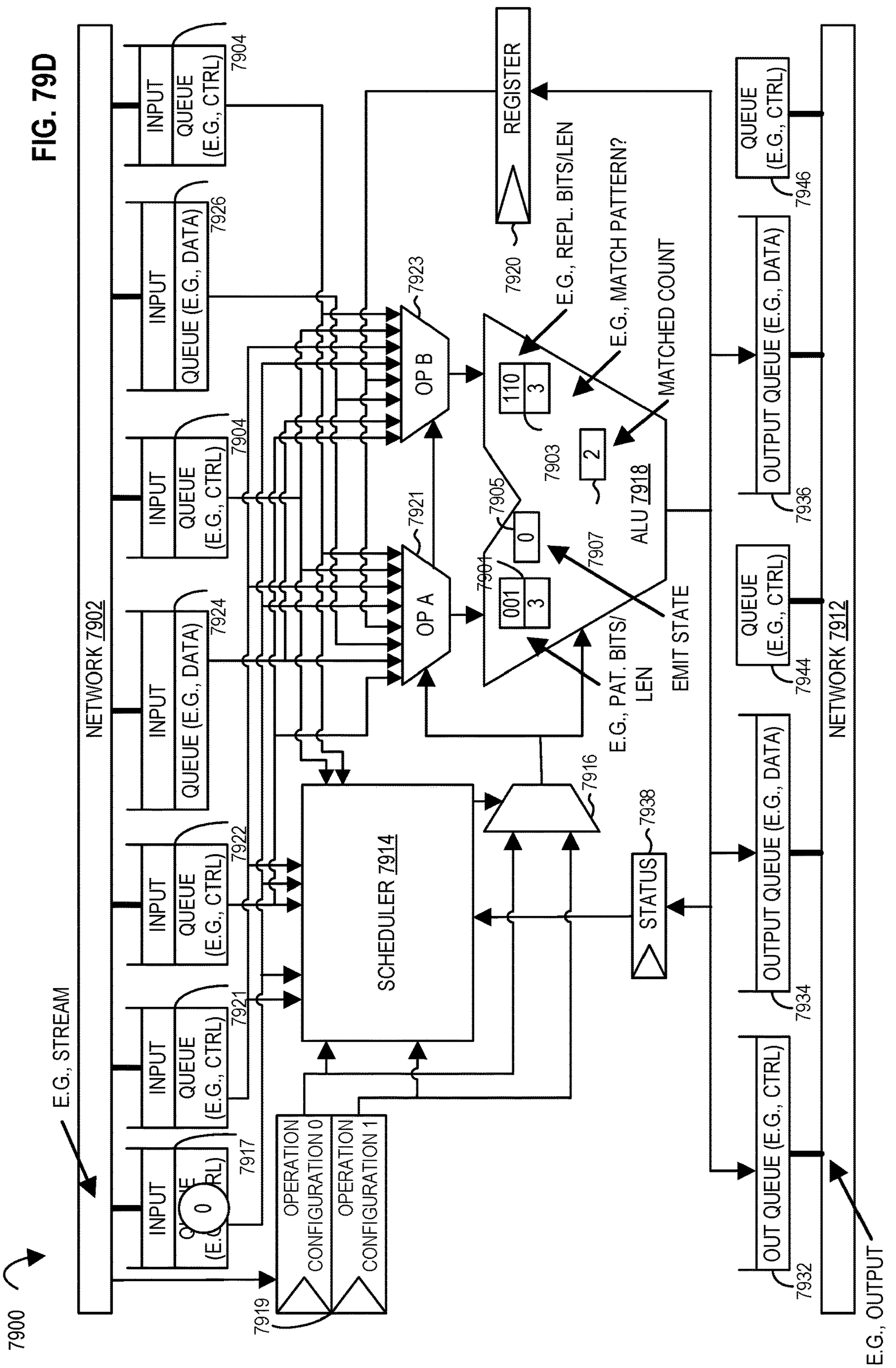

In FIG. 79D, as the first bit of the to-be-replaced pattern did match the input value in the previous comparison, the first value is not sent to the output queue 7932. In certain embodiments, the PE (e.g., ALU) includes storage to store the received input values as depicted in these figures. The third value of zero here has been dequeued (e.g., removed) from the first slot of input queue 7917, and the fourth value of zero has been moved into the first slot from the second slot of input queue 7919. As the second bit in the to-be-replaced pattern is a 0, and the received value from the first slot of input queue 7919 is a zero, then the PE 7900 determines the second bit of the to-be-replaced pattern is matched.

Figure 79E:
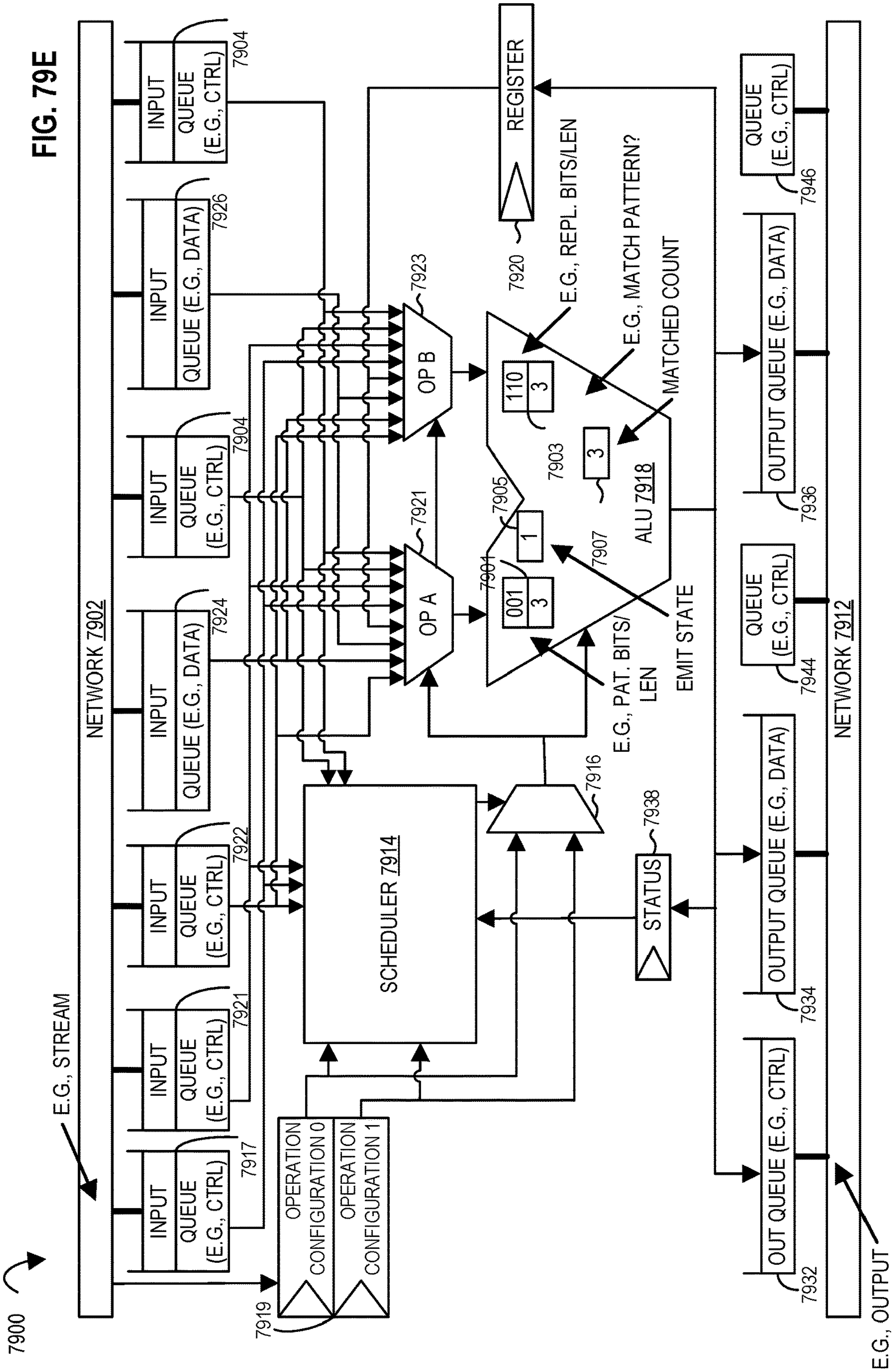

In FIG. 79E, as the first bit and second bit of the to-be-replaced pattern did match the input values in the previous comparisons, the second value is not sent to the output queue 7932. In certain embodiments, the PE (e.g., ALU) includes storage to store the received input values as depicted in these figures. The fourth value of zero here has been dequeued (e.g., removed) from the first slot of input queue 7919. As the third bit in the to-be-replaced pattern is a 0, and the received value from the first slot of input queue 7919 is a zero, then the PE 7900 determines the third bit of the to-be-replaced pattern is matched, and thus the to-be-replaced pattern is present in the input stream on input queue 7919.

As the to-be-replaced pattern did match the input values in the previous comparisons, the replacement pattern of a 0, followed by a 1, and followed by another 1 will be sent to output queue 7932. In one embodiment, had the to-be-replaced pattern not matched the input values in the previous comparisons (e.g., 0, 1, 0), the accumulated bits would have been copied to the output rather than replaced.

Figure 79F:
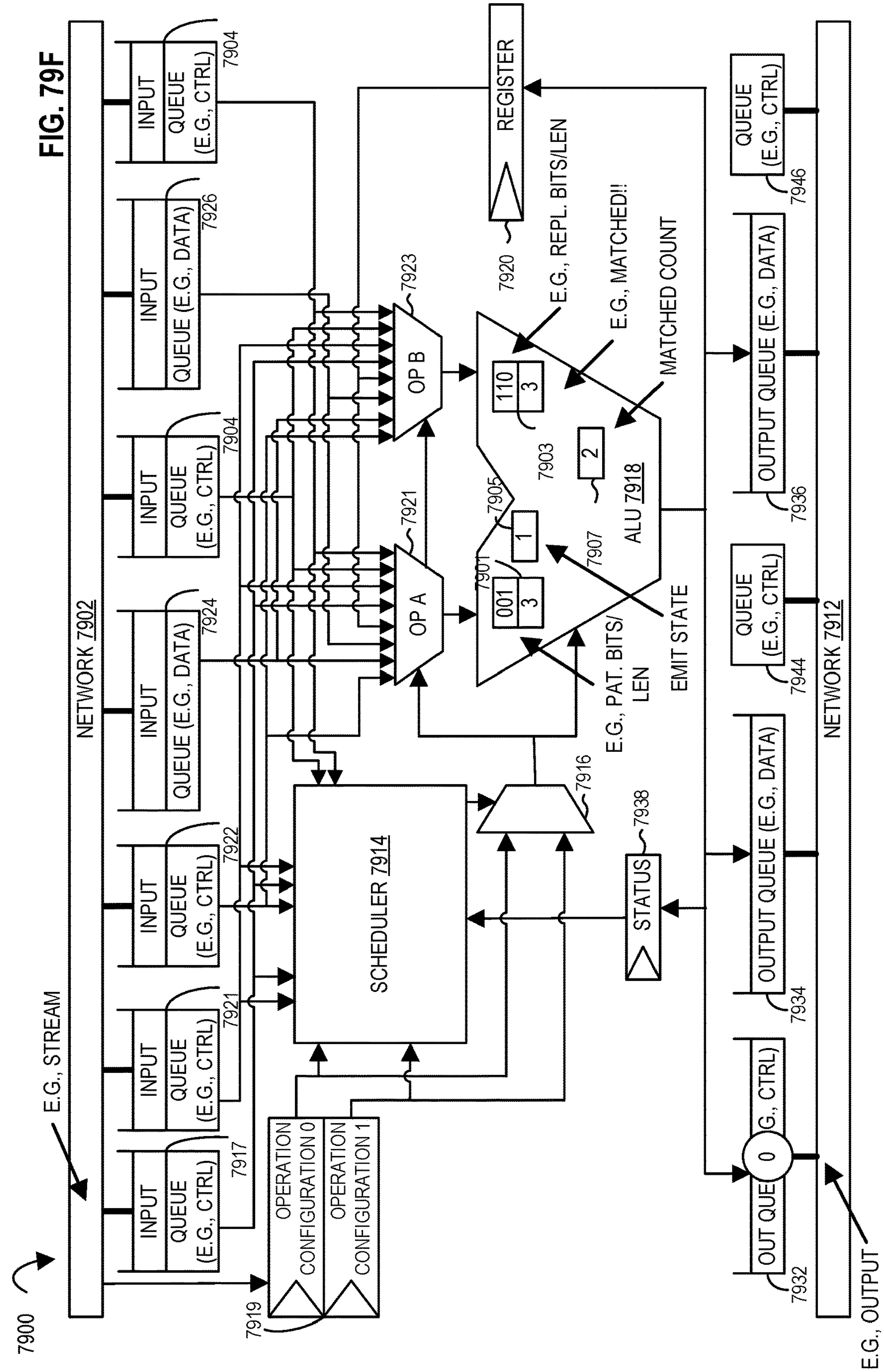

In FIG. 79F, PE 7900 outputs the first bit (0) of the replacement pattern to output queue 7932.

Figure 79G:
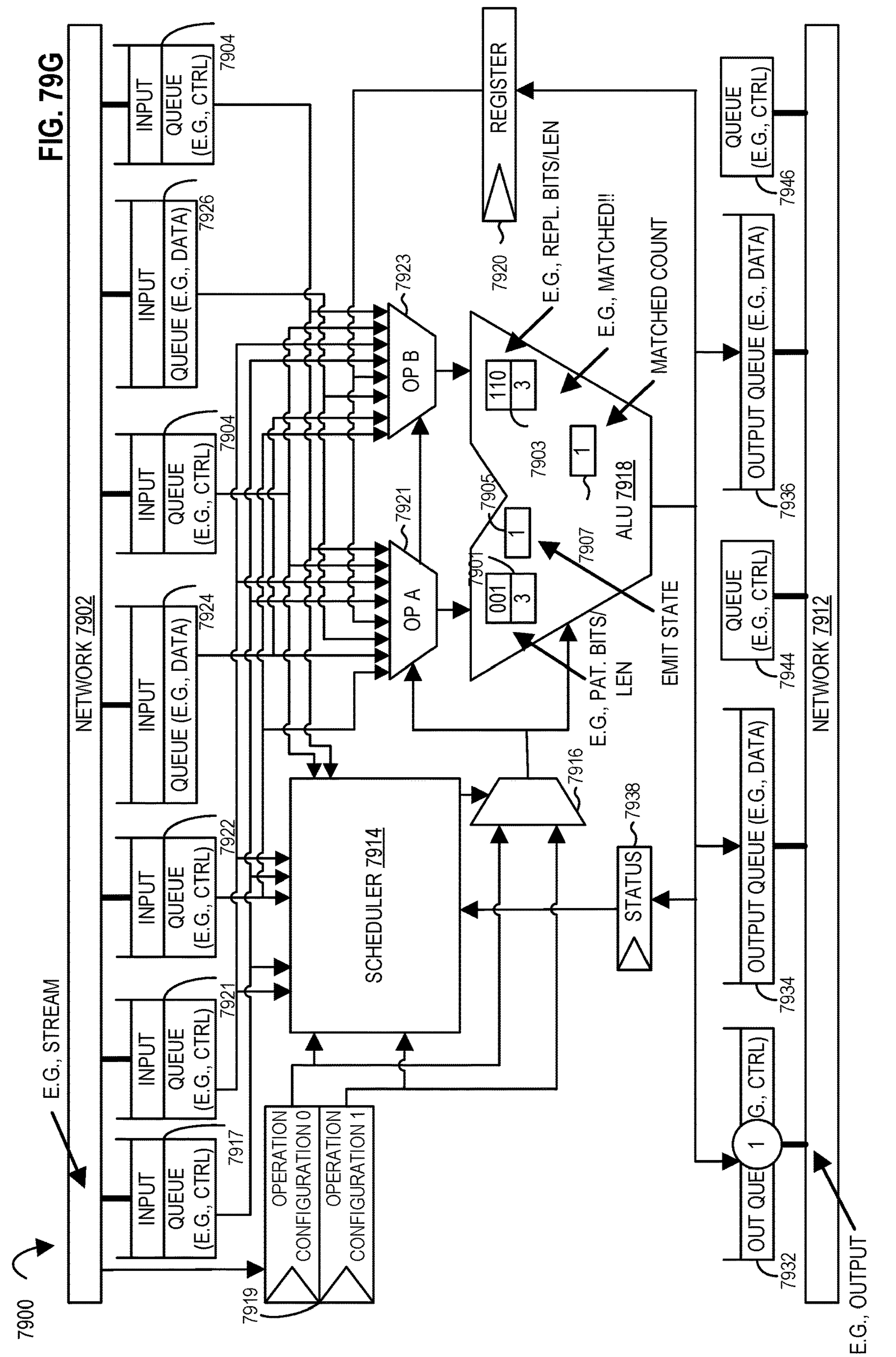
Figure 79H:
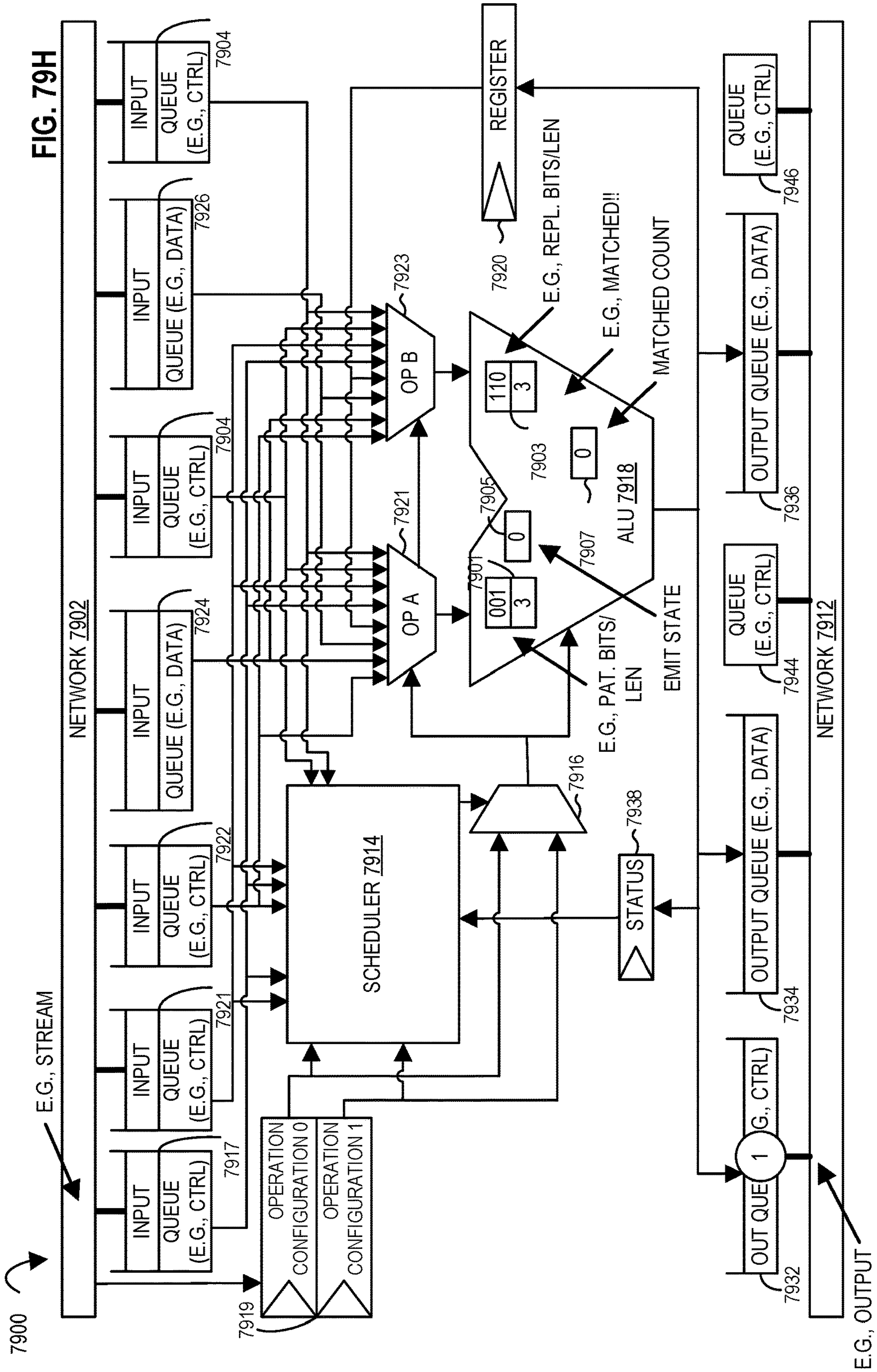

In FIG. 79G, the first bit of the replacement pattern has been consumed (e.g., by a downstream PE) from the output queue 7932, and as there is storage space available in the output queue 7932, PE 7900 outputs the second bit (1) of the replacement pattern to output queue 7932.

In FIG. 79G, the second bit of the replacement pattern has been consumed (e.g., by a downstream PE) from the output queue 7932, and as there is storage space available in the output queue 7932, PE 7900 outputs the third bit (1) of the replacement pattern to output queue 7932.

In certain embodiments, PE 7900 is stalled from performing the Replace1 operation until there is both (i) space available in the output queue that is to be used for storing resultant data, and (ii) an input value in input queue 7904.

In the depicted embodiment, PE 7900 includes the components of PE 5800 from FIG. 58, for example, with the components ending with the same two numbers having the same functionality. In one embodiment, scheduler 7914 schedules an operation or operations of processing element 7900 for execution according to the configuration value, e.g., and when input data and control input arrives. See, for example, the discussion of FIGS. 33-57.

Replicate1

In one embodiment, a CSA architecture includes a configuration value that, when stored into the configuration storage (e.g., register), causes the CSA (e.g., a PE thereof) to perform a Replicate1 operation according to the following (e.g., semantics and/or description).

Operation: replicate1 outchan.CRd.i1, inchan.CRLu.i1, match.CRLu.i1, count.CRLu.i1, initpos.CRLu.i1 (was nexpand)
Description: Given a single bit wide inchan, if the input bit matches match, replace it in the output stream with count copies of the same match bit. e.g. nexpand, , 0, 3, 0 will replace every 0 in the input bit stream with 3 successive 0s in the output bit stream. An initpos value of 0 means matching starts with the first bit. If the initpos is non-zero, it reflects the number of positions in the generation that remain to be done before matching resumes, that is the number of match bits that will be produced before matching resumes, e.g. replicate1 , , 0, 3, 2 (initpos value of 2) will output 2 0s before starting to process the incoming bitstream. Note that unlike some operations, this is a one-time initialization, match, count and initpos are all literals.
Sample usage: If you are doing something like a stencil, and would like to have multiple related streams with different offsets, you can use this op to have the 0 representing the end of stream expanded into multiple 0s. The initial position allows for multiple related streams to each be offset by 1. (e.g. for a 5 point stencil, you might have an 5 replicate1 operations all with count 5, but with initial offsets 0/1/2/3/4.)

FIGS. 80A-80G illustrate a processing element 8000 performing a Replicate1 operation according to embodiments of the disclosure. In the depicted embodiment, an operation configuration value for a Replicate1 operation is stored (e.g., during a programming time period) into operation configuration register 8019. As one example, one or more input queues are to receive an input stream of values, and another input or inputs (e.g., queue or queues) is to receive the value to be matched (match) (e.g., the bit to be matched against the input stream bit), and the count (e.g., replicate the matched bit "count" number of times). In one embodiment, the match and the count are provided as a field or fields of the operation configuration value. In the depicted embodiment, the initial bit position (initpos) value serves as a state machine counter, for example, (i) when initpos is non-zero, values with a match value are emitted and input values are not examined, and (ii) when initpos is zero, input values are examined and on a match of the input value to the match value, initpos is set to the count value, and on a non-match it remains 0 (e.g., the input value is emitted unconditionally).

In certain embodiments, the input stream of values is received on one of input queues (e.g., having a single bit width) 8017, 8021, 8022, 8004, or 8006). In the depicted embodiment, the input stream of values is received on input queue 8004. In certain embodiments, one or more of the match value, and the count value are received on one of (e.g., wider) input queue or queues 8024 or 8026 (for example, having a multiple bit width, e.g., 8, 16, 32, or 64).

In FIGS. 80A-80G, the numbers in the circles for the bits in (e.g., control) input queue 8019 are the values themselves (e.g., a one or zero), the numbers in storage 8001 (e.g., which may be in ALU 8018) include the initial bit position, and the numbers in storage 8003 (e.g., which may be in ALU 8018) include the count value and the match value. In another embodiment, each of the numbers (or a proper subset thereof) may include its own storage.

Figure 80A:
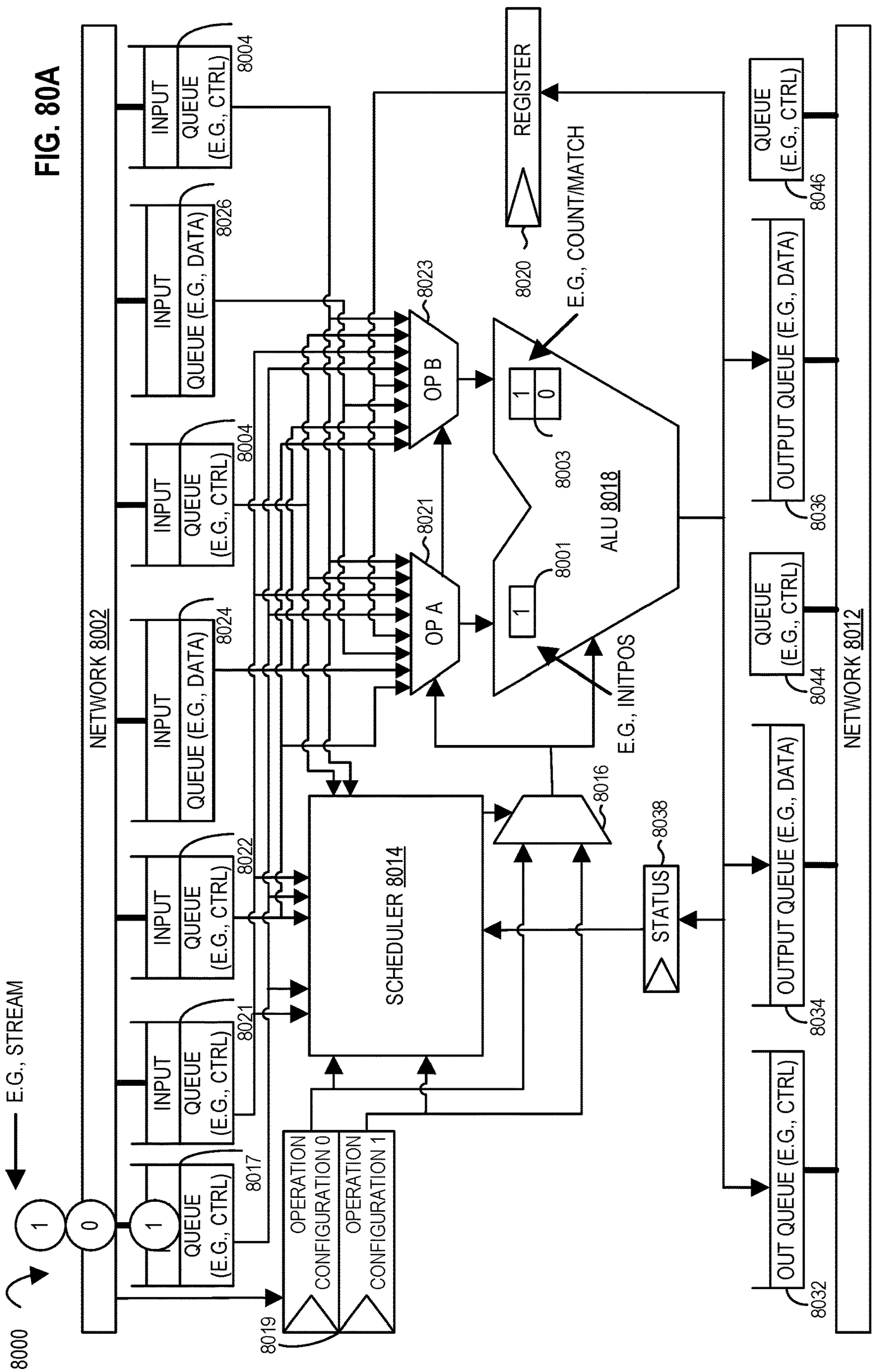
FIGS. 80A-80G illustrate a processing element performing a Replicate1 operation according to embodiments of the disclosure.

In FIG. 80A, the programmed Replicate1 has set in storage 8001 the initial bit position of 1 (e.g., starting from an index of zero for the first element, this means that replication is possible only on the second element (e.g., bit position 1)) and in storage 8003 a count value of one (e.g., to replicate the matched bit two times, even though the count value is indicated as one), and a match value of zero (e.g., a Boolean zero is to be matched). The first value of one has been received in the first slot of input queue 8017, and a second value of zero has been received in the second slot of input queue 8019.

Figure 80B:
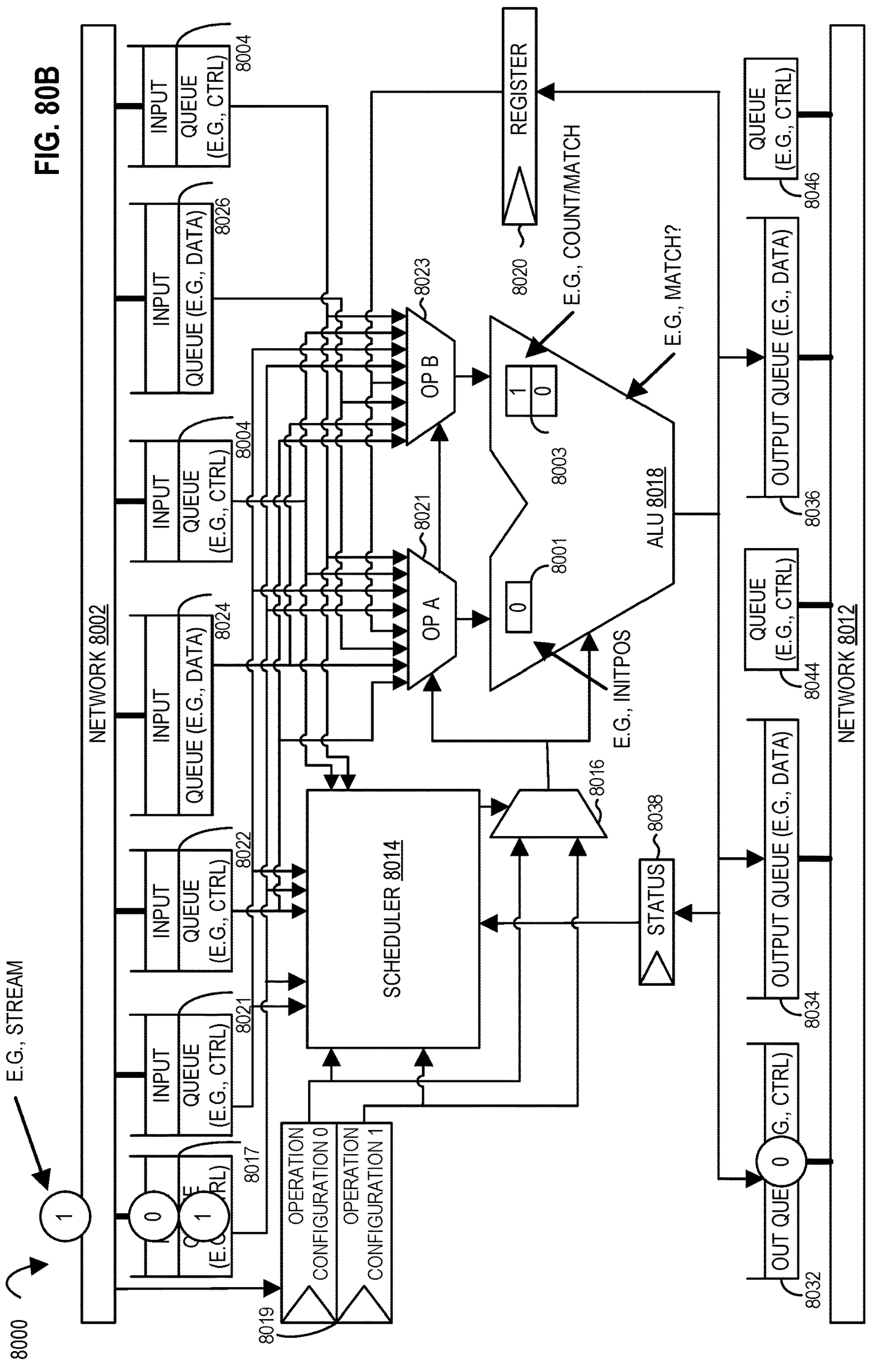

In FIG. 80B, the first value of one is queued (e.g., stored) in the first slot of input queue 8017, and the second value of zero is queued (e.g., stored) in the second slot of input queue 8017. PE 8000 reads that the initial bit position (initpos) is non-zero (1), PE 8000 outputs a zero value (e.g., a copy of the match value) to output queue 8032, and decrements the initpos by one (to zero here).

Figure 80C:
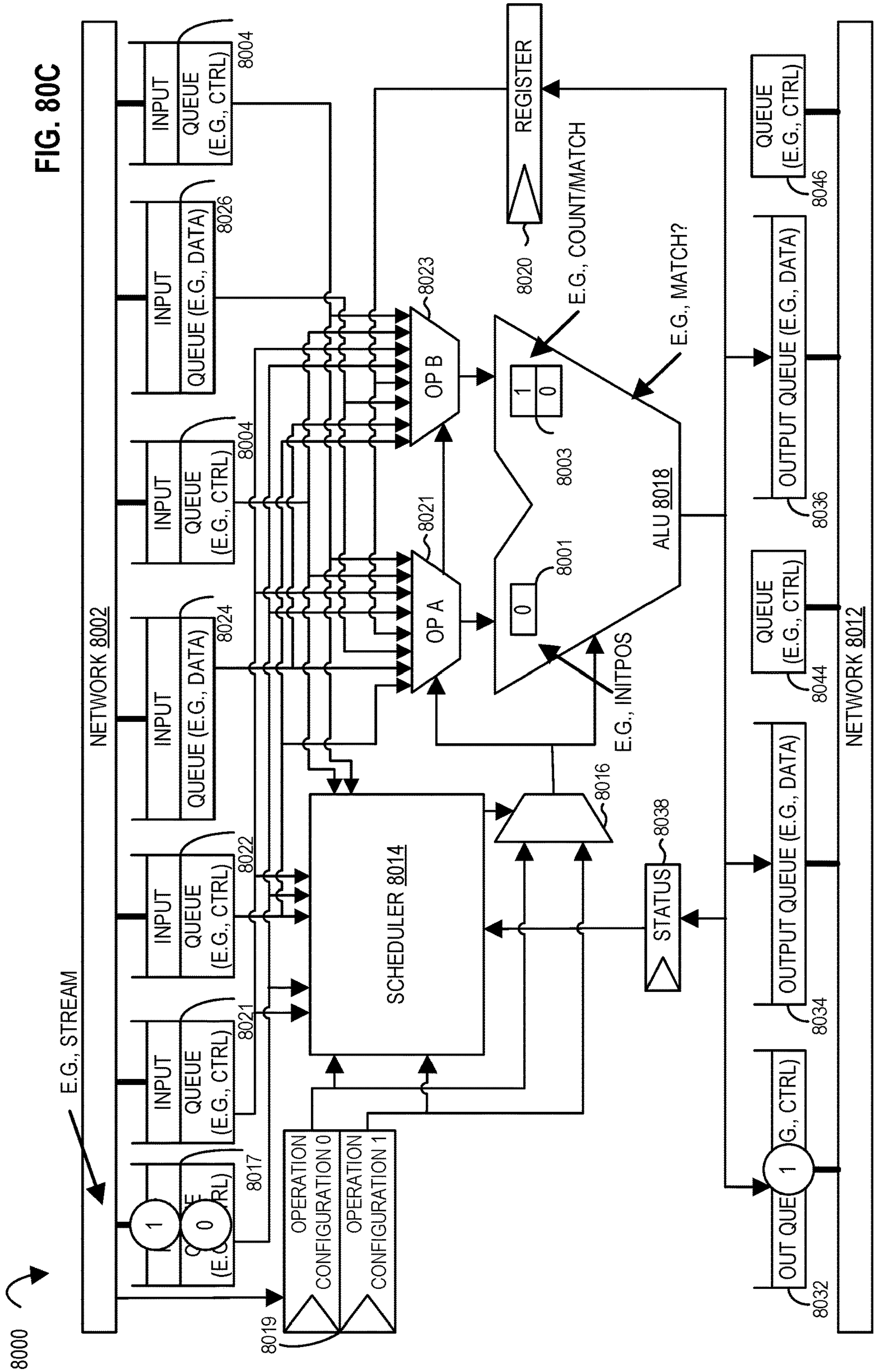

In FIG. 80C, as initpos is now zero, a process (e.g., by checking the values accordingly) of replication according to Replicate 1 is now begun, and as the value of one in the first slot of input queue 8017 does not match the match value of zero, PE 8000 outputs the one value to output queue 8032, the first value of one has been dequeued (e.g., removed) from the first slot of input queue 8017, the second value of zero has been moved into the first slot from the second slot of input queue 8017, and a third value of one has been received in the second slot of input queue 8019.

Here, the input value is a one, and thus does not match the match value of zero, so without a match, no replication occurs.

As noted throughout, the output values may be consumed between points in time indicated by the Figures, e.g., by a downstream PE. In one embodiment, each Figure illustrates a separate cycle. In another embodiment, each figure illustrates a distinct moment in time, but not necessarily an entire cycle passing between two figures.

Figure 80D:
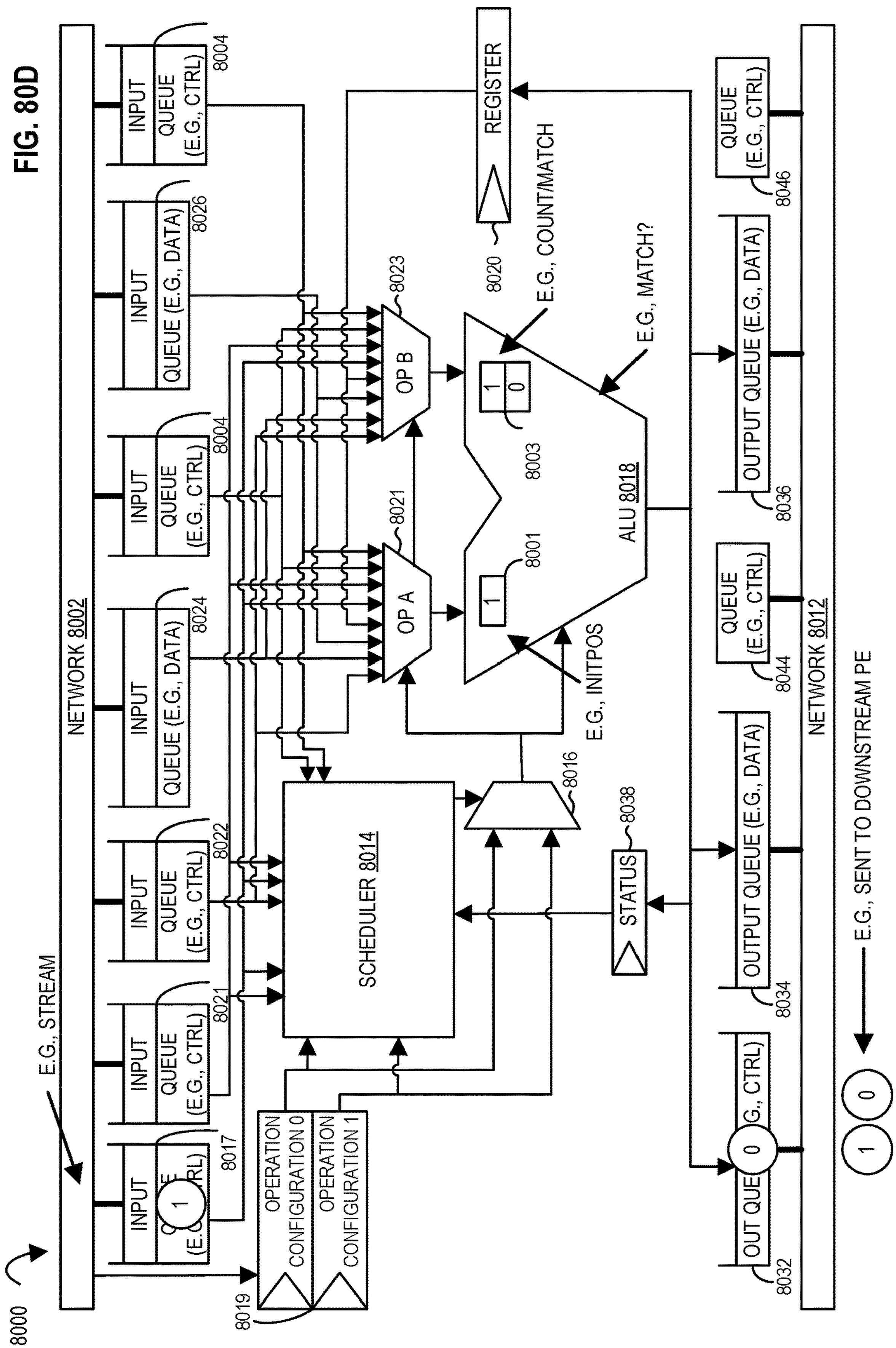

In FIG. 80D, as initpos was zero (e.g., is not reset until a match is found), PE 8000 compares the value of zero in the first slot of input queue 8017 and determines a match with match value of zero, so PE 8000 is to perform a replication of that value a "count value" number of times. Here, PE 8000 outputs a first zero value to output queue 8032, initpos is set to one (e.g., a match is found), the value of zero has been dequeued (e.g., removed) from the first slot of input queue 8017, and the second value of one has been moved into the first slot from the second slot of input queue 8017. Here, the input value is a zero, and thus does match the match value of zero, so with a match, replication is to occur.

Figure 80E:
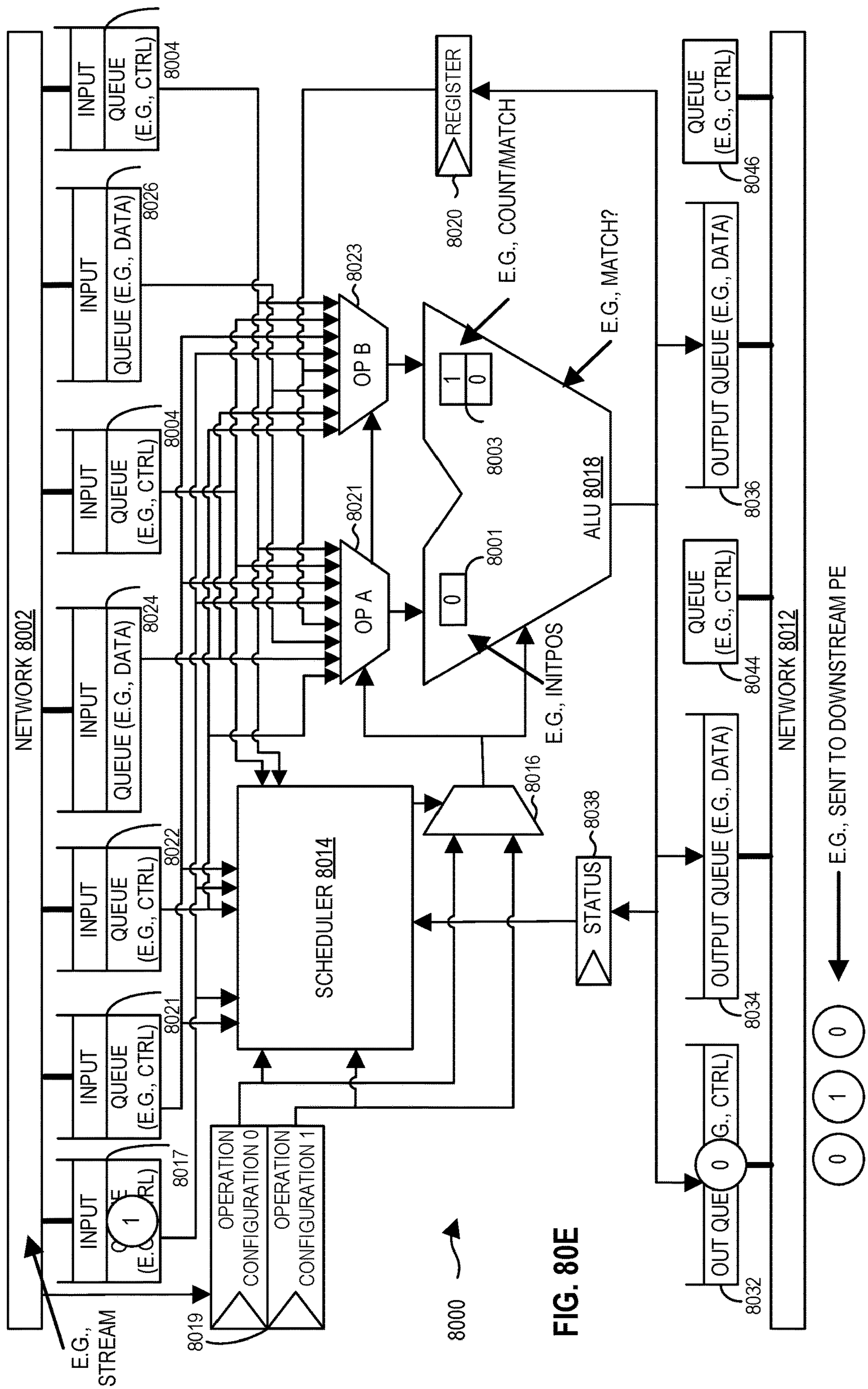
Figure 80F:
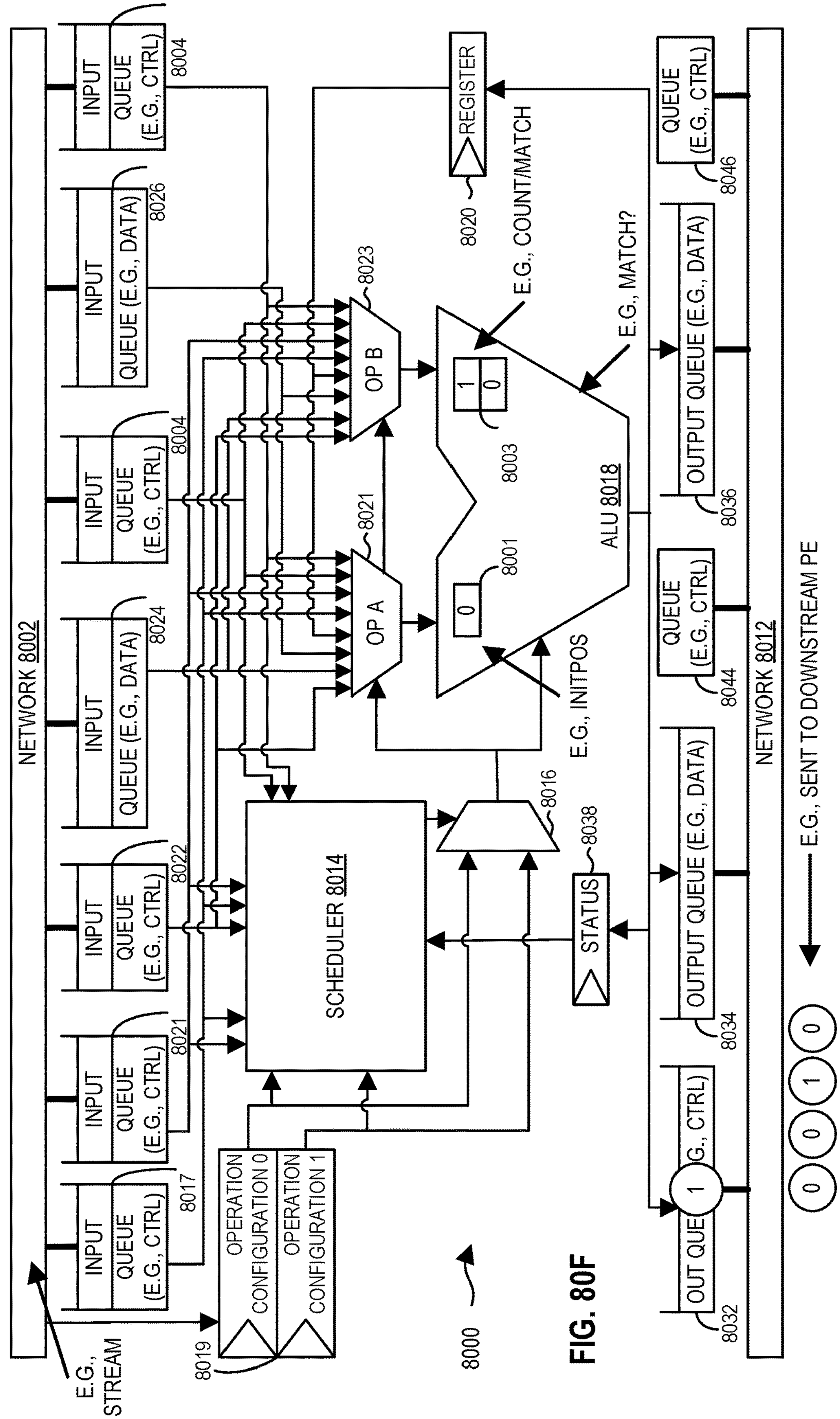

In FIG. 80E, as replication was triggered for the previous input value of zero, and there is room in the output queue 8032 (e.g., the second bit of the output stream has been consumed (e.g., by a downstream PE) from the output queue 8032), PE 8000 outputs a third bit (0) of the output stream (e.g., as the second bit of the replication pattern of two zeros here) to output queue 8032, and the initpos is set to zero indicating the a replication of the matched zero from the input has been output. The value of one is in the first slot of input queue 8019.

Figure 80G:
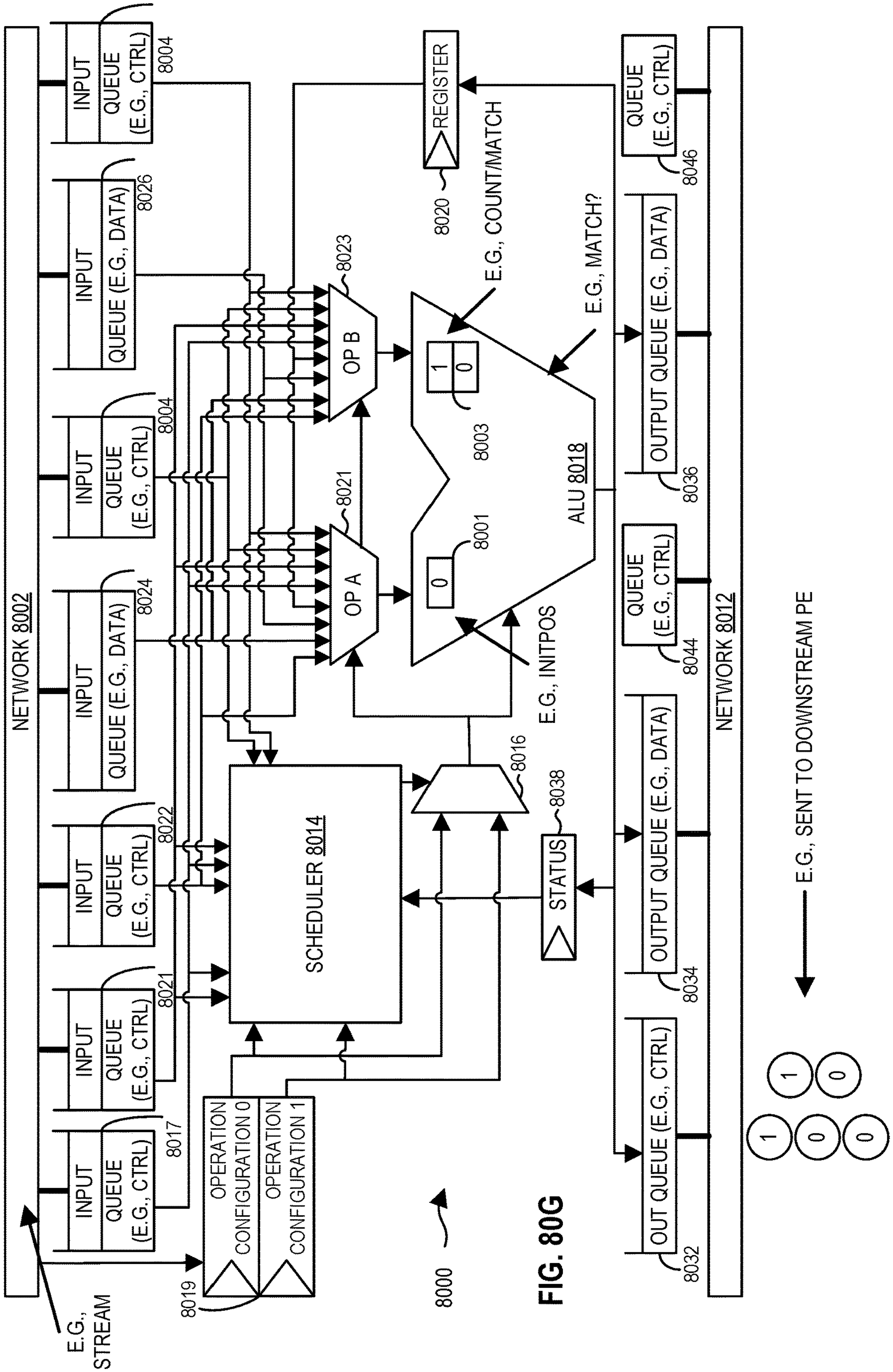

In FIG. 80F, as initpos is again zero, a process (e.g., by checking the values accordingly) of replication according to Replicate 1 is again begun, and as this second value of one in the first slot of input queue 8017 does not match the match value of zero, PE 8000 outputs that one value to output queue 8032, and the second value of one has been dequeued (e.g., removed) from the first slot of input queue 8017. Here, the input value is a one, and thus does not match the match value of zero, so without a match, no replication occurs.

e.g., In FIG. 80G, the second one value in the output queue 8032 (e.g., the fifth bit of the output stream) has been consumed (e.g., by a downstream PE) from the output queue 8032), PE 8000 outputs the fourth bit (1) of input stream to output queue 8032 (i.e., as the fifth bit (index 4) of the output stream).

In certain embodiments, PE 8000 is stalled from performing the Replicate1 operation until there is both (i) space available in the output queue that is to be used for storing resultant data, and (ii) an input value in input queue 8004.

In the depicted embodiment, PE 8000 includes the components of PE 5800 from FIG. 58, for example, with the components ending with the same two numbers having the same functionality. In one embodiment, scheduler 8014 schedules an operation or operations of processing element 8000 for execution according to the configuration value, e.g., and when input data and control input arrives. See, for example, the discussion of FIGS. 33-57.

Dataflow Operations

NetUnpack

In one embodiment, a CSA architecture includes a configuration value that, when stored into the configuration storage (e.g., register), causes the CSA (e.g., a PE thereof) to perform a NetUnpack operation according to the following (e.g., semantics and/or description).

| |
|---|
| Operation: netunpack{0-64}_{0-32} och0.Cd.iKN, och1.Cd.1N, ..., ochN.Cd.1N, ich.CRLu.iKN |
| Semantics: {ochK-1, ..., och1, och0} = ich |
| Description: Unpacks a single K*N bit word into K output words of N bits. Different packing ratios may be supplies. For example, unpack_64_16 places breaks a 64 bit word into four 16 bit words, while unpack_64_32 unpacks a single 64 bit word into two 32 bit words. |

In addition to point-to-point communications, certain networks herein also support multicast communications, e.g., sending data from a single, transmitting PE to a plurality of receiving PEs. Communication channels may be formed by statically configuring the network to from virtual circuits (e.g., LICs) between PEs.

Figure 81A:
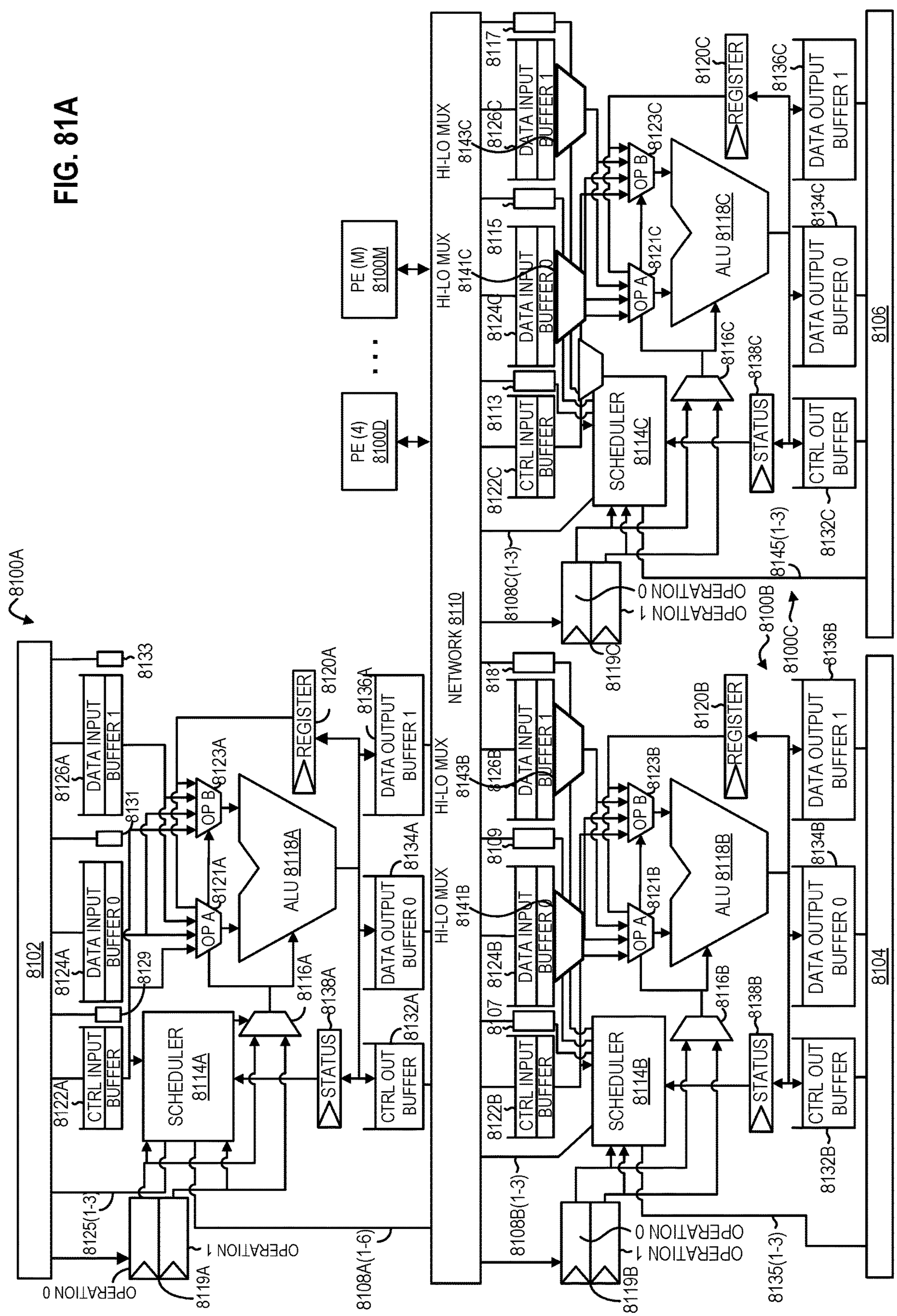
FIG. 81A illustrates a first processing element (PE) coupled to a second processing element (PE) and a third processing element (PE) by a network according to embodiments of the disclosure.

FIG. 81A illustrates a first processing element (PE) 8100A coupled to a second processing element (PE) 8100B and a third processing element (PE) 8100C by a network 8110 according to embodiments of the disclosure. In one embodiment, network 8110 is a circuit switched network, e.g., configured to perform a multicast to send data from first PE 8100A to both second PE 8100B and third PE 8100C. Further, second PE 8100B includes a first unpacking (e.g., high-low) multiplexer 8141B and a second unpacking (e.g., high-low) multiplexer 8143B, and third PE 8100C includes a first unpacking (e.g., high-low) multiplexer 8141C and a second unpacking (e.g., high-low) multiplexer 8143C.

Thus, each receiving PE may select a high portion or a low portion of the value in its input queue. In one embodiment, the selection of the high portion (e.g., upper half), the lower portion (e.g., lower half), or the entirety of a value is selected by setting the configuration value in that PE to a value to select one of those three options.

In one embodiment, a circuit switched network 8110 includes (i) a data path to send data from first PE 8100A to both second PE 8100B and third PE 8100C, e.g., for operations to be performed on that data by second PE 8100B and third PE 8100C, and (ii) a flow control path to send control data that controls (or is used to control) the sending of that data from first PE 8100A to both second PE 8100B and third PE 8100C. Data path may send a data (e.g., valid) value when data is in an output buffer (e.g., when data is in control output buffer 8132A, first data output buffer 8134A, or second data output buffer 8136A of first PE 8100A). In one embodiment, each output buffer includes its own data path, e.g., for its own data value from producer PE to consumer PE. Components in PE are examples, for example, a PE may include only a single (e.g., data) input buffer and/or a single (e.g., data) output buffer. Flow control path may send control data that controls (or is used to control) the sending of corresponding data from first PE 8100A (e.g., control output buffer 8132A, first data output buffer 8134A, or second data output buffer 8136A thereof) to both second PE 8100B and third PE 8100C. Flow control data may include a backpressure value from each consumer PE (or aggregated from all consumer PEs, e.g., with an AND logic gate). Flow control data may include a backpressure value, for example, indicating the buffer of the second PE 8100B (e.g., control input buffer 8122B, first data input buffer 8124B, or second data input buffer 8126B) and/or the buffer of the third PE 8100B (e.g., control input buffer 8122C, first data input buffer 8124C, or second data input buffer 8126C) where the data (e.g., from control output buffer 8132A, first data output buffer 8134A, or second data output buffer 8136A of first PE 8100A) is to-be-stored is (e.g., in the current cycle) full or has an empty slot (e.g., empty in the current cycle or next cycle) (e.g., transmission attempt). Flow control data may include a speculation value and/or success value. Network 8110 may include a speculation path (e.g., to transport a speculation value) and/or success path (e.g., to transport a success value). In one embodiment, a success path follows (e.g., is parallel to) the data path, e.g., is sent from the producer PE to the consumer PEs. In one embodiment, a speculation path follows (e.g., is parallel to) the backpressure path, e.g., is sent from a consumer PE to the producer PE. In one embodiment, each consumer PE has its own flow control path, e.g., in a circuit switched network 8110, to its producer PE. In one embodiment, each consumer PEs flow control path is combined into an aggregated flow control path for its producer PE.

Turning to the depicted PEs, processing elements 8100A-C include operation configuration registers 8119A-C that may be loaded during configuration (e.g., mapping) and specify the particular operation or operations (for example, and indicate whether to enable non-blocking (e.g., reduced critical path) multicast mode or not (e.g., enable multicast mode that blocks transmission from producer PE until all consumer PEs are ready) that processing (e.g., compute) element is to perform. Register 8120A-C activity may be controlled by that operation (an output of multiplexer 8116A-C, e.g., controlled by the scheduler 8114A-C). Scheduler 8114A-C may schedule an operation or operations of processing element 8100A-C, respectively, for example, when a dataflow token arrives (e.g., input data and/or control input). Control input buffer 8122A, first data input buffer

8124A, and second data input buffer 8126A are connected to local network 8102 for first PE 8100A. In one embodiment, control output buffer 8132A is connected to network 8110 for first PE 8100A, control input buffer 8122B is connected to local network 8110 for second PE 8100B, and control input buffer 8122C is connected to local network 8110 for third PE 8100C (e.g., and each local network may include a data path as in FIG. 10A and a flow control path as in FIG. 10B) and is loaded with a value when it arrives (e.g., the network has a data bit(s) and valid bit(s)). In one embodiment, first data output buffer 8134A is connected to network 8110 for first PE 8100A, first data input buffer 8124B is connected to local network 8110 for second PE 8100B, and first data input buffer 8124C is connected to local network 8110 for third PE 8100C (e.g., and each local network may include a data path as in FIG. 10A and a flow control path as in FIG. 10B) and is loaded with a value when it arrives (e.g., the network has a data bit(s) and valid bit(s)). In one embodiment, second data output buffer 8136A is connected to network 8110 for first PE 8100A, second data input buffer 8126B is connected to local network 8110 for second PE 8100B, and second data input buffer 8126C is connected to local network 8110 for third PE 8100C (e.g., and each local network may include a data path as in FIG. 10A and a flow control path as in FIG. 10B) and is loaded with a value when it arrives (e.g., the network has a data bit(s) and valid bit(s)). Control output buffer 8132A-C, data output buffer 8134A-C, and/or data output buffer 8136A-C may receive an output of processing element 8100A-C (respectively), e.g., as controlled by the operation (an output of multiplexer 8116A-C). Status register 8138A-C may be loaded whenever the ALU 8118A-C executes (e.g., also controlled by output of multiplexer 8116A-C). Data in control input buffer 8122A-C and control output buffer 8132A-C may be a single bit. Multiplexer 8121A-C (e.g., operand A) and multiplexer 8123A-C (e.g., operand B) may source inputs.

For example, suppose the operation of first processing (e.g., compute) element 8100A is (or includes) what is called call a pick in FIG. 3B. The processing element 8100A then is to select data from either data input buffer 8124A or data input buffer 8126A, e.g., to go to data output buffer 8134A (e.g., default) or data output buffer 8136A. The control bit in 8122A may thus indicate a 0 if selecting from data input buffer 8124A or a 1 if selecting from data input buffer 8126A.

For example, suppose the operation of first processing (e.g., compute) element 8100A is (or includes) what is called call a switch in FIG. 3B. The processing element 8100A is to output data to data output buffer 8134A or data output buffer 8136A, e.g., from data input buffer 8124A (e.g., default) or data input buffer 8126A. The control bit in 8122A may thus indicate a 0 if outputting to data output buffer 8134A or a 1 if outputting to data output buffer 8136A. The output data may be the result of an operation by the ALU in certain embodiments.

Multiple networks (e.g., interconnects) may be connected to a processing element, e.g., networks 8102, 8104, 8106, and 8110. The connections may be switches, e.g., as discussed in reference to FIGS. 10A and 10B. In one embodiment, PEs and a circuit switched network 8110 are configured (e.g., control settings are selected) such that circuit switched network 8110 includes (i) a data path to send data from first PE 8100A to both second PE 8100B and third PE 8100C, e.g., for operations to be performed on that data by second PE 8100B and third PE 8100C, and (ii) a flow control path to send control data that controls (or is used to control) the sending of that data from first PE 8100A to both second PE 8100B and third PE 8100C. First PE 8100A includes a scheduler 8114A. A scheduler or other PE and/or network circuitry may include control circuitry to control a multicast operation, e.g., according to the example state machines discussed below. Flow control data may include a backpressure value, a speculation value, and/or a success value.

In one embodiment, the backpressure value and the speculation value (e.g., and the success value) allow the PEs and network (e.g., cumulatively the system) to handle the distributed coordination case, e.g., where all consumer PEs (e.g., receivers) must receive the multicast data item before it may be dequeued (e.g., discarded) by the producer PE (e.g., transmitter). Certain embodiments herein allow the target receivers to speculatively receive data, e.g., even if it is not known that all receivers will receive (e.g., store) the data (e.g., in that cycle). Thus, in certain embodiments the data itself is not speculative and it will eventually be sent. Here speculation may generally refer to the producer PE (e.g., transmitter) assuming that (e.g., at least some of) the consumer PEs (e.g., receivers) might receive the transmitted data (e.g., in that cycle). For example, in contrast to waiting for the backpressure value from all multicast consumer PEs to indicate they have storage available for that data. In one embodiment, if any receivers are unready, then the backpressure (e.g., ready) value will be pulled to a value (e.g., binary low) indicating there is no storage available in the consumer PE, for example, by the flow control function, e.g., and the producer PE (e.g., transmitter) would also pull its data flow (e.g., transmit valid) value to a value (e.g., binary low) so that no data would be transmitted.

In a reduced multicast critical path embodiment, the producer PE (e.g., transmitter) may drive its dataflow (e.g., valid) signal to a value (e.g., binary high) to indicate it has data to-be-transmitted. The speculation value(s) and/or a success value may resolve the case in which not all consumer PEs (e.g., receivers) were ready to receive data (e.g., have storage available for that data) (e.g., in that cycle). In one embodiment, the success signal (e.g., a single bit) is driven to a value that indicates success (e.g., binary high) by the producer PE (e.g., transmitter) when the producer PE (e.g., transmitter) was able to successfully complete a transmission in the previous cycle for a dataflow token (e.g., the dataflow token is stored in all of the multicast consumer PEs), e.g., as noted by the success value (e.g., success bit) being set as discussed herein. In one embodiment, the producer PE (e.g., transmitter) determines that it was able to complete a transmission of a dataflow token in the previous cycle when the producer PE (e.g., transmitter) observed for all of the multicast receiver PEs that either a speculation value was set to the value (e.g., binary high) to indicate the dataflow token was stored in the buffer (e.g., as indicated by a reception value (e.g., bit)) or the backpressure value (e.g., ready value) was set to the value (e.g., binary high) to indicate that storage is to be available in the buffer of the consumer PE (e.g., in the next cycle (e.g., transmission attempt)) for the dataflow token. In certain embodiments, when a producer PE (e.g., transmitter) determines that the success value is already at a value (e.g., binary high) that indicates the producer PE was able to successfully complete a transmission in the previous cycle to the multicast consumer PEs, then the producer PE (e.g., transmitter) ignores the speculation value(s) (e.g., a single bit), e.g., since it is known to refer to a completed transaction. In one embodiment, in all cycles where success is driven high, the producer PE (e.g., transmitter) also dequeues its data, e.g., dequeued from its output buffer (e.g., removed from control output buffer 8132A, first data output buffer 8134A, or second data output buffer 8136A of first PE 8100A). In certain embodiments, the success value being set in storage of a producer PE (to indicate success) causes a success value to be sent (e.g., in the next cycle after the success value was set or in the same cycle the success value was set) to the consumer PEs to clear their reception values (e.g., bits) (e.g., in the same cycle the success value is sent). In certain embodiments, the success value is set following any cycle in which a multicast transmission is completed and cleared otherwise, e.g., and success may happen in back-to-back cycles. In one embodiment, the reception bit(s) are cleared in the cycle following the dequeue of the dataflow token from the output buffer.

In one embodiment, the speculation value (e.g., a single bit) is driven to a value by a consumer PE (e.g., receiver) that indicates if that consumer PE (e.g., receiver) has accepted the data sent by the producer PE (e.g., transmitter), e.g., as noted by the reception value (e.g., reception bit) being set (e.g., in that cycle) as discussed herein or if the receiver was ready to receive anyway (for example, the backpressure value indicates that storage is available or is to be available on the next cycle, e.g., that PE is consuming a dataflow token that is to be cleared from the buffer at the end of the current cycle). In one embodiment, the backpressure value (e.g., ready value) and the reception value are logically OR'd (e.g., returns the Boolean value true (e.g., binary high, e.g., 1) if either or both input operands are true and returns false (e.g., binary low, e.g., 0) otherwise) together to form the speculation value. In one embodiment, the reception value (e.g., value) is cleared when (e.g., following any cycle in which) the success value (e.g., value) is observed, e.g., indicating the producer PE was able to successfully complete a transmission in the previous cycle to the multicast consumer PEs. Certain embodiments herein permit speculatively transmitted data to proceed through the pipeline. In one embodiment, once a dataflow token (e.g., value) has been obtained it may be used, e.g., it is not stalled. In one embodiment, each consumer PE (e.g., receiver) is to drive its speculation value until the cycle after it observes the producer PE (e.g., transmitter) driving its success value to indicate success. This may improve the performance of some dataflow graphs. In one embodiment, having both backpressure values (e.g., ready) and speculation values enables the transmittal of data in a fully pipelined fashion for multicast. Backpressure (e.g., ready) value may be used in cycles in which the speculation value is unusable due to a previous transmission having completed in a previous cycle. In one embodiment, PEs are provisioned with at least two input buffer slots in each input buffer to allow for full pipelining to be obtained.

In certain embodiments, distributed agreement of the consumers (e.g., PEs) allows for a reduced multicast critical path, for example, where success is checked in the next cycle after a transmission attempt, e.g., instead of a producer (e.g., PE) waiting for all the backpressure to be clear (e.g., ready) values from consumers. In one embodiment, the producer sends the data (e.g., at the beginning of a first cycle), then the consumers check if they received that data (e.g., simultaneously, at the end of the first cycle, or the beginning of a second cycle), e.g., if the data was stored in the target buffer of that consumer. If all the transmissions were successful, in one embodiment (e.g., at the clock edge), the producer is to set the success bit and then drive the success value to the consumers (e.g., in the next cycle). If not, then data may be sent for another cycle until all the consumers pass the check that the data was received. In one embodiment, a first value (e.g., from a first wire between a consumer and a producer) indicates whether data is ready (e.g., in its output buffer) and a second value (e.g., from a second wire between the consumer to the producer) indicates that data is ready, but it is a retransmission (e.g., not new data). The second value (e.g., from second wire) may thus keep from having two of the same data in a consumer, e.g., to avoid having two or more copies in an input buffer of a consumer PE for the same instance of an output value from a producer PE that was transmitted multiple times. Certain embodiments herein add a state element at each consumer, e.g., a reception bit. Flow control may indicate full or empty (e.g., backpressure) and indicate if a consumer took the data in a previous cycle. Producer may use knowledge of (i) if the consumer took the data, and (ii) whether the consumer may take more data, to control its output of data. Consumer PEs may send a speculation value back to a producer. Consumer PE may indicate that its target buffer is full, but producer PE may utilize the embodiments herein to determine if that target buffer is full for a consumer PE, and that consumer PE took the data (versus not taking the data and being full from a previous transmission for a different instance of an output value from the producer PE). In certain embodiments, one or more of the following aggregated values are utilized: (1) whether all the consumer PEs are full or empty, and (2) whether a consumer PE (e.g., all multicast consumer PEs) took data in the prior cycle e.g., so the backpressure value indicates no storage is available because it took the current data in that cycle or because there was and/or is no room for the data).

In one embodiment, first PE 8100A includes first storage 8101 for a success value (e.g., bit) for control output buffer 8132A, second storage 8103 for a success value (e.g., bit) for first data output buffer 8134A, and third storage 8105 for a success value (e.g., bit) for second data output buffer 8136A. Depicted scheduler 8114A is coupled to first storage 8101 to set or clear a success value (e.g., bit) therein for control output buffer 8132A, coupled to second storage 8103 to set or clear a success value (e.g., bit) therein for first data output buffer 8134A, and coupled to third storage 8105 to set or clear a success value (e.g., bit) therein for second data output buffer 8136A. In one embodiment, the scheduler 8114A sets the success value based on flow control data from the second PE 8100B and flow control data from the third PE 8100C. Some or all of the flow control data may be aggregated into a single value, e.g., sent to the first (e.g., as producer) PE 8100A. First (e.g., as producer) PE 8100A includes a (e.g., input) port 8108A(1-3) coupled to network 8110, e.g., to receive a backpressure value from second (e.g., as consumer) PE 8100B and/or third (e.g., as consumer) PE 8100C. In one circuit switched configuration, (e.g., input) port 8108A(1-3) (e.g., having a plurality of parallel inputs (1), (2), and (3)) is to receive a respective backpressure value from each one of control input buffer 8122B, first data input buffer 8124B, and second data input buffer 8126B and/or control input buffer 8122C, first data input buffer 8124C, and second data input buffer 8126C. In one embodiment, (e.g., input) port 8108A(1-3) is to receive an aggregated (e.g., single) respective backpressure value of each of (i) a backpressure value from control input buffer 8122B logically AND'd (e.g., it returns the Boolean value true (e.g., binary high, e.g., binary 1) if both input operands are true and returns false (e.g., binary 0) otherwise) with a backpressure value from control input buffer 8122C (e.g., on input 8108A (1)), (ii) a backpressure value from first data input buffer 8124B logically AND'd with a backpressure value from first data input buffer 8124C (e.g., on input 8108A(2)), and (iii) a backpressure value from second data input buffer 8126B logically AND'd with a backpressure value from second data input buffer 8126C (e.g., on input 8108A(3)). In one embodiment, an input or output marked as a (1), (2), or (3) is its own respective wire or other coupling.

First (e.g., as producer) PE 8100A includes a (e.g., input) port 8112A(1-3) coupled to network 8110, e.g., to receive a speculation value from second (e.g., as consumer) PE 8100B and/or third (e.g., as consumer) PE 8100C. In one circuit switched configuration, (e.g., input) port 8112A(1-3) (e.g., having a plurality of parallel inputs(1), (2), and (3)) is to receive a respective speculation value for each one of control input buffer 8122B, first data input buffer 8124B, and second data input buffer 8126B and/or control input buffer 8122C, first data input buffer 8124C, and second data input buffer 8126C. In one embodiment, (e.g., input) port 8112A (1-3) is to receive an aggregated (e.g., single) speculation value for each of (i) speculation value for control input buffer 8122B logically AND'd with speculation value for control input buffer 8122C (e.g., on input 8108A(1)), (ii) speculation value for first data input buffer 8124B logically AND'd with speculation value for first data input buffer 8124C (e.g., on input 8108A(2)), and (iii) speculation value for second data input buffer 8126B logically AND'd with speculation value for second data input buffer 8126C (e.g., on input 8108A(3)).

In one circuit switched configuration, a multicast data path is formed from (i) control output buffer 8132A to control input buffer 8122B and control input buffer 8122C, (ii) first data output buffer 8134A to first data input buffer 8124B and first data input buffer 8124C, (iii) second data output buffer 8136A to second data input buffer 8126B and second data input buffer 8126C, or any combination thereof. A data path may be used to send a data token from the producer PE to the consumer PEs. In the depicted embodiment, second PE 8100B includes first storage 8107 for a reception value (e.g., bit) for control input buffer 8122B, second storage 8109 for a reception value (e.g., bit) for first data input buffer 8124B, and third storage 8111 for a reception value (e.g., bit) for second data input buffer 8126B, e.g., set by scheduler 8114B. In the depicted embodiment, second (e.g., as consumer) PE 8100B includes an (e.g., output) port 8108B(1-3) coupled to network 8110, e.g., to send a backpressure value from second (e.g., as consumer) PE 8100B to first (e.g., as producer) PE 8100A. In one circuit switched configuration, (e.g., output) port 8108B (1-3) is to send a respective backpressure value for each one of control input buffer 8122B (e.g., on output 8108B(1)), first data input buffer 8124B (e.g., on output 8108B(2)), and second data input buffer 8126B (e.g., on output 8108B(3)), e.g., by scheduler 8114B. Second (e.g., as consumer) PE 8100B includes a (e.g., input) port 8112B(1-3) coupled to network 8110, e.g., to receive a success value from first (e.g., as producer) PE 8100A. In one circuit switched configuration, (e.g., input) port 8112B(1-3) (e.g., having a plurality of parallel inputs (1), (2), and (3))) is to receive a respective success value for each one of control input buffer 8122B (e.g., on input 8112B(1)), first data input buffer 8124B (e.g., on input 8112B(2)), and second data input buffer 8126B (e.g., on input 8112B(3)).

In the depicted embodiment, third PE 8100C includes first storage 8113 for a reception value (e.g., bit) for control input buffer 8122C, second storage 8115 for a reception value (e.g., bit) for first data input buffer 8124C, and third storage 8117 for a reception value (e.g., bit) for second data input buffer 8126C, e.g., set by scheduler 8114C. Third (e.g., as consumer) PE 8100C includes an (e.g., output) port 8108C (1-3) coupled to network 8110, e.g., to send a backpressure value from third (e.g., as consumer) PE 8100C to first (e.g., as producer) PE 8100A. In one circuit switched configuration, (e.g., output) port 8108C(1-3) is to send a respective backpressure value for each one of control input buffer 8122C (e.g., on output 8108C(1)), first data input buffer 8124C (e.g., on output 8108C(2)), and second data input buffer 8126C (e.g., on output 8108C(3)), e.g., by scheduler 8114C. Second (e.g., as consumer) PE 8100B includes a (e.g., input) port 8112C(1-3) coupled to network 8110, e.g., to receive a success value from first (e.g., as producer) PE 8100A. In one circuit switched configuration, (e.g., input) port 8112C(1-3) (e.g., having a plurality of parallel inputs (1), (2), and (3)) is to receive a respective success value for each one of control input buffer 8122C (e.g., on input 8112C(1)), first data input buffer 8124C (e.g., on input 8112C(2)), and second data input buffer 8126C (e.g., on input 8112C(3)).

Figure 81B:
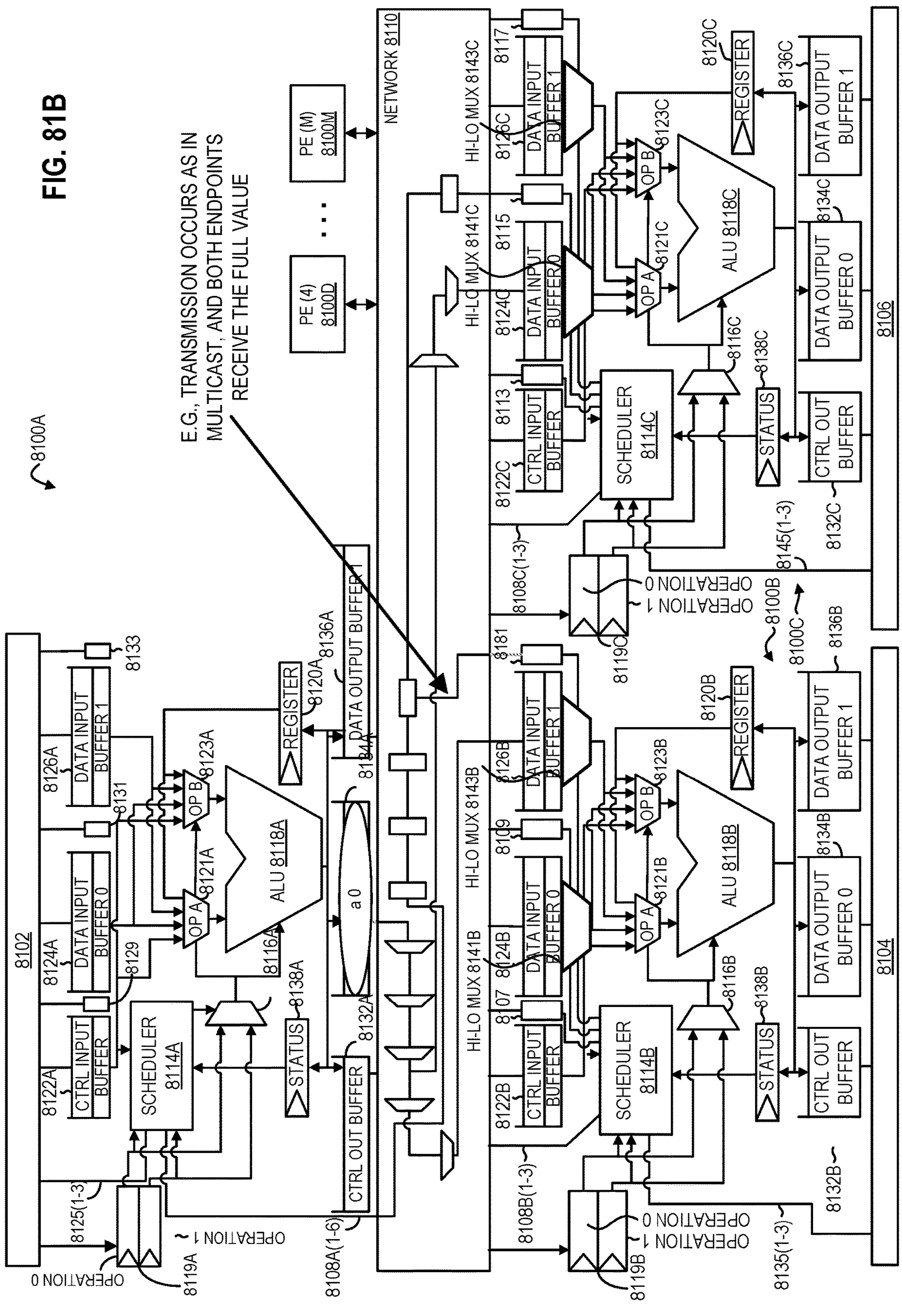
FIG. 81B-81D illustrates the circuit switched network (e.g., switches and logic gates thereof) of FIG. 81A configured to provide a reduced multicast critical path for the control buffers according to embodiments of the disclosure.

As noted herein, speculation value may be formed by logically OR'ing the reception bit (for example, where a binary low value indicates the buffer did not take an input since it was last cleared and a binary high value indicates the buffer did take an input since it was last cleared, e.g., by the success value) and a backpressure bit (e.g., where a binary low value indicates there is no backpressure and a binary high value indicates there is backpressure). A port may include a plurality of inputs and/or outputs. A processing element may include a single port into network 8110, or any plurality of ports. Although FIGS. 81B-11D illustrate three example configurations, all three or any combination thereof may be simultaneously used and present (e.g., in network 8110). In one embodiment, switches (e.g., multiplexers) are configured (e.g., via their control lines) to form the three example configurations in FIGS. 81B-11D. In one embodiment, non-configurable static lines are used to form the three example configurations as illustrated in FIGS. 81B-11D.

First PE 8100A may include first storage 8129 for a reception value (e.g., bit) for control input buffer 8122A, second storage 8131 for a reception value (e.g., bit) for first data input buffer 8124A, and third storage 8133 for a reception value (e.g., bit) for second data input buffer 8126A, e.g., set by scheduler 8114A. First (e.g., as consumer) PE 8100A may include an (e.g., output) port 8125 (1-3) coupled to network 8102, e.g., to send a backpressure value from first (e.g., as consumer) PE 8100A to an upstream (e.g., as producer) PE. In one circuit switched configuration, (e.g., output) port 8125(1-3) is to send a respective backpressure value for each one of control input buffer 8122A (e.g., on output 8125(1)), first data input buffer 8124A (e.g., on output 8125(2)), and second data input buffer 8126A (e.g., on output 8125(3)), e.g., by scheduler 8114A. First (e.g., as consumer) PE 8100A includes a (e.g., input) port 8127(1-3) coupled to network 8102, e.g., to receive a success value from an upstream (e.g., as producer) PE. In one circuit switched configuration, (e.g., input) port 8127 (1-3) (e.g., having a plurality of parallel inputs (1), (2), and (3))) is to receive a respective success value for each one of control input buffer 8122A (e.g., on input 8127(1)), first data input buffer 8124A (e.g., on input 8127(2)), and second data input buffer 8126A (e.g., on input 8127(3)).

Second (e.g., as producer) PE 8100B may include a (e.g., input) port 8135(1-3) coupled to network 8104 (e.g., which may be the same network as network 8106), e.g., to receive a backpressure value from a downstream (e.g., as consumer) PE or PEs. In one circuit switched configuration, (e.g., input) port 8135(1-3) (e.g., having a plurality of parallel inputs (1), (2), and (3)) is to receive a respective backpressure value from each one of control input buffer, first data input buffer, and second data input buffer of a first downstream PE and/or control input buffer, first data input buffer, and second data input buffer of a second downstream PE. In one embodiment, (e.g., input) port 8135(1-3) is to receive an aggregated (e.g., single) respective backpressure value of each of (i) a backpressure value from control input buffer for first downstream PE logically AND'd (e.g., it returns the Boolean value true (e.g., binary high, e.g., binary 1) if both input operands are true and returns false (e.g., binary 0) otherwise) with a backpressure value from control input buffer for second downstream PE (e.g., on input 8135(1)), (ii) a backpressure value from first data input buffer for first downstream PE logically AND'd with a backpressure value from first data input buffer for first downstream PE (e.g., on input 8135(2)), and (iii) a backpressure value from second data input buffer for first downstream PE logically AND'd with a backpressure value from second data input buffer for first downstream PE (e.g., on input 8135(3)). In one embodiment, an input or output marked as a (1), (2), or (3) is its own respective wire or other coupling. In one embodiment, each PE includes the same circuitry and/or components.

Second PE 8100B includes first storage 8139 for a success value (e.g., bit) for control output buffer 8132B, second storage 8141 for a success value (e.g., bit) for first data output buffer 8134B, and third storage 8143 for a success value (e.g., bit) for second data output buffer 8136B. Depicted scheduler 8114B is coupled to first storage 8139 to set or clear a success value (e.g., bit) therein for control output buffer 8132B, coupled to second storage 8141 to set or clear a success value (e.g., bit) therein for first data output buffer 8134B, and coupled to third storage 8143 to set or clear a success value (e.g., bit) therein for second data output buffer 8136B. In one embodiment, the setting of the success value in storage 8139 causes a success value to be sent on a path from storage 8139 through network 8104 to (e.g., input) port of (e.g., as consumer) a first downstream PE and to (e.g., input) port of (e.g., as consumer) a second downstream PE. In one embodiment, receipt of success value from second PE 8100B (e.g., from storage 8139 thereof) by first downstream PE or second downstream PE is to cause the clearing of their reception bit in storage for that input buffer. In one embodiment, the setting of the success value in storage 8141 causes a success value to be sent on a path from storage 8141 through network 8104 to (e.g., input) port of (e.g., as consumer) a first downstream PE and to (e.g., input) port of (e.g., as consumer) a second downstream PE. In one embodiment, receipt of success value from second PE 8100B (e.g., from storage 8141 thereof) by first downstream PE or second downstream PE is to cause the clearing of their reception bit in storage for that input buffer. In one embodiment, receipt of success value from second PE 8100B (e.g., from storage 8143 thereof) by first downstream PE or second downstream PE is to cause the clearing of their reception bit in storage for that input buffer. In one embodiment, the setting of the success value in storage 8143 causes a success value to be sent on a path from storage 8143 through network 8104 to (e.g., input) port of (e.g., as consumer) a first downstream PE and to (e.g., input) port of (e.g., as consumer) a second downstream PE. In one embodiment, receipt of success value from second PE 8100B (e.g., from storage 8143 thereof) by first downstream PE or second downstream PE is to cause the clearing of their reception bit in storage for that input buffer.

Second (e.g., as producer) PE 8100B may include a (e.g., input) port 8137(1-3) coupled to network 8104, e.g., to receive a speculation value from a first downstream (e.g., as consumer) PE and/or second downstream (e.g., as consumer) PE. In one circuit switched configuration, (e.g., input) port 8137(1-3) (e.g., having a plurality of parallel inputs(1), (2), and (3)) is to receive a respective speculation value for each one of control input buffer for first downstream PE, first data input buffer for first downstream PE, and second data input buffer for first downstream PE and/or control input buffer for second downstream PE, first data input buffer for second downstream PE, and second data input buffer for second downstream PE. In one embodiment, (e.g., input) port 8137(1-3) is to receive an aggregated (e.g., single) speculation value for each of (i) speculation value for control input buffer for first downstream PE logically AND'd with speculation value for control input buffer for second downstream PE (e.g., on input 8137(1)), (ii) speculation value for first data input buffer for first downstream PE logically AND'd with speculation value for first data input buffer for second downstream PE (e.g., on input 8137(2)), and (iii) speculation value for second data input buffer for first downstream PE logically AND'd with speculation value for second data input buffer for second downstream PE (e.g., on input 8137(3)).

Second (e.g., as producer) PE 8100B may include a (e.g., input) port 8135(1-3) coupled to network 8104 (e.g., which may be the same network as network 8106), e.g., to receive a backpressure value from a downstream (e.g., as consumer) PE or PEs. In one circuit switched configuration, (e.g., input) port 8135(1-3) (e.g., having a plurality of parallel inputs (1), (2), and (3)) is to receive a respective backpressure value from each one of control input buffer, first data input buffer, and second data input buffer of a first downstream PE and/or control input buffer, first data input buffer, and second data input buffer of a second downstream PE. In one embodiment, (e.g., input) port 8135(1-3) is to receive an aggregated (e.g., single) respective backpressure value of each of (i) a backpressure value from control input buffer for first downstream PE logically AND'd (e.g., it returns the Boolean value true (e.g., binary high, e.g., binary 1) if both input operands are true and returns false (e.g., binary 0) otherwise) with a backpressure value from control input buffer for second downstream PE (e.g., on input 8135(1)), (ii) a backpressure value from first data input buffer for first downstream PE logically AND'd with a backpressure value from first data input buffer for first downstream PE (e.g., on input 8135(2)), and (iii) a backpressure value from second data input buffer for first downstream PE logically AND'd with a backpressure value from second data input buffer for first downstream PE (e.g., on input 8135(3)). In one embodiment, an input or output marked as a (1), (2), or (3) is its own respective wire or other coupling. In one embodiment, each PE includes the same circuitry and/or components.

Second (e.g., as producer) PE 8100B may include a (e.g., input) port 8137(1-3) coupled to network 8104, e.g., to receive a speculation value from a first downstream (e.g., as consumer) PE and/or second downstream (e.g., as consumer) PE. In one circuit switched configuration, (e.g., input) port 8137(1-3) (e.g., having a plurality of parallel inputs(1), (2), and (3)) is to receive a respective speculation value for each one of control input buffer for first downstream PE, first data input buffer for first downstream PE, and second data input buffer for first downstream PE and/or control input buffer for second downstream PE, first data input buffer for second downstream PE, and second data input buffer for second downstream PE. In one embodiment, (e.g., input) port 8137(1-3) is to receive an aggregated (e.g., single) speculation value for each of (i) speculation value for control input buffer for first downstream PE logically AND'd with speculation value for control input buffer for second downstream PE (e.g., on input 8137(1)), (ii) speculation value for first data input buffer for first downstream PE logically AND'd with speculation value for first data input buffer for second downstream PE (e.g., on input 8137(2)), and (iii) speculation value for second data input buffer for first downstream PE logically AND'd with speculation value for second data input buffer for second downstream PE (e.g., on input 8137(3)).

Third (e.g., as producer) PE 8100C may include a (e.g., input) port 8145(1-3) coupled to network 8106 (e.g., which may be the same network as network 8104), e.g., to receive a backpressure value from a downstream (e.g., as consumer) PE or PEs. In one circuit switched configuration, (e.g., input) port 8145(1-3) (e.g., having a plurality of parallel inputs (1), (2), and (3)) is to receive a respective backpressure value from each one of control input buffer, first data input buffer, and second data input buffer of a first downstream PE and/or control input buffer, first data input buffer, and second data input buffer of a second downstream PE. In one embodiment, (e.g., input) port 8145(1-3) is to receive an aggregated (e.g., single) respective backpressure value of each of (i) a backpressure value from control input buffer for first downstream PE logically AND'd (e.g., it returns the Boolean value true (e.g., binary high, e.g., binary 1) if both input operands are true and returns false (e.g., binary 0) otherwise) with a backpressure value from control input buffer for second downstream PE (e.g., on input 8145(1)), (ii) a backpressure value from first data input buffer for first downstream PE logically AND'd with a backpressure value from first data input buffer for first downstream PE (e.g., on input 8145(2)), and (iii) a backpressure value from second data input buffer for first downstream PE logically AND'd with a backpressure value from second data input buffer for first downstream PE (e.g., on input 8145(3)). In one embodiment, an input or output marked as a (1), (2), or (3) is its own respective wire or other coupling. In one embodiment, each PE includes the same circuitry and/or components.

Third (e.g., as producer) PE 8100C may include a (e.g., input) port 8147(1-3) coupled to network 8106, e.g., to receive a speculation value from a first downstream (e.g., as consumer) PE and/or second downstream (e.g., as consumer) PE. In one circuit switched configuration, (e.g., input) port 8147(1-3) (e.g., having a plurality of parallel inputs(1), (2), and (3)) is to receive a respective speculation value for each one of control input buffer for first downstream PE, first data input buffer for first downstream PE, and second data input buffer for first downstream PE and/or control input buffer for second downstream PE, first data input buffer for second downstream PE, and second data input buffer for second downstream PE. In one embodiment, (e.g., input) port 8147(1-3) is to receive an aggregated (e.g., single) speculation value for each of (i) speculation value for control input buffer for first downstream PE logically AND'd with speculation value for control input buffer for second downstream PE (e.g., on input 8147(1)), (ii) speculation value for first data input buffer for first downstream PE logically AND'd with speculation value for first data input buffer for second downstream PE (e.g., on input 8147(2)), and (iii) speculation value for second data input buffer for first downstream PE logically AND'd with speculation value for second data input buffer for second downstream PE (e.g., on input 8147(3)).

Third PE 8100C includes first storage 8149 for a success value (e.g., bit) for control output buffer 8132C, second storage 815 for a success value (e.g., bit) for first data output buffer 8134C, and third storage 8153 for a success value (e.g., bit) for second data output buffer 8136C. Depicted scheduler 8114C is coupled to first storage 8149 to set or clear a success value (e.g., bit) therein for control output buffer 8132C, coupled to second storage 8151 to set or clear a success value (e.g., bit) therein for first data output buffer 8134C, and coupled to third storage 8153 to set or clear a success value (e.g., bit) therein for second data output buffer 8136C. In one embodiment, the setting of the success value in storage 8149 causes a success value to be sent on a path from storage 8149 through network 8104 to (e.g., input) port of (e.g., as consumer) a first downstream PE and to (e.g., input) port of (e.g., as consumer) a second downstream PE. In one embodiment, receipt of success value from third PE 8100C (e.g., from storage 8149 thereof) by first downstream PE or second downstream PE is to cause the clearing of their reception bit in storage for that input buffer. In one embodiment, the setting of the success value in storage 8151 causes a success value to be sent on a path from storage 8151 through network 8104 to (e.g., input) port of (e.g., as consumer) a first downstream PE and to (e.g., input) port of (e.g., as consumer) a second downstream PE. In one embodiment, receipt of success value from third PE 8100C (e.g., from storage 8151 thereof) by first downstream PE or second downstream PE is to cause the clearing of their reception bit in storage for that input buffer. In one embodiment, receipt of success value from third PE 8100C (e.g., from storage 8153 thereof) by first downstream PE or second downstream PE is to cause the clearing of their reception bit in storage for that input buffer. In one embodiment, the setting of the success value in storage 8153 causes a success value to be sent on a path from storage 8153 through network 8104 to (e.g., input) port of (e.g., as consumer) a first downstream PE and to (e.g., input) port of (e.g., as consumer) a second downstream PE. In one embodiment, receipt of success value from third PE 8100C (e.g., from storage 8143 thereof) by first downstream PE or second downstream PE is to cause the clearing of their reception bit in storage for that input buffer.

A processing element may include two sub-networks (or two channels on the network), e.g., one for a data path and one for a flow control path. A processing element (e.g., PE 8100A, PE 8100B, and PE 8100C) may function and/or include the components as in any of the disclosure herein. A processing element may be stalled from execution until its operands (e.g., in its input buffer(s)) are received and/or until there is room in the output buffer(s) of the processing element for the data that is to be produced by the execution of the operation on those operands. Next, three reduced multicast critical path embodiments are discussed.

As a first example, FIG. 81B illustrates the circuit switched network 8110 (e.g., switches and logic gates thereof) of FIG. 81A configured to provide a reduced multicast critical path for the control buffers according to embodiments of the disclosure. In the depicted embodiment, output queue 8134A stores a first value (labeled as "a0") that is to be sent to both the second PE 8100B and the third PE 8100C. In the depicted embodiment, a multicast transmission occurs and both second PE 8100B and the third PE 8100C are to receive a copy of the first value (labeled as "a0").

Scheduler 8114A is coupled to first storage 8101 to set or clear a success value (e.g., bit) for control output buffer 8132A. In one embodiment, the scheduler 8114A sets the success value based on flow control data from the second PE 8100B and flow control data the second PE 8100C. Some or all of the flow control data may be aggregated into a single value, e.g., sent to the first (e.g., as producer) PE 8100A. First (e.g., as producer) PE 8100A includes a (e.g., input)

port 8108A(1) coupled to network 8110, e.g., to receive a backpressure value from second (e.g., as consumer) PE 8100B and/or third (e.g., as consumer) PE 8100C. In one circuit switched configuration, (e.g., input) port 8108A(1) is to receive a respective backpressure value from each one of control input buffer 8122B and control input buffer 8122C. In the depicted embodiment, (e.g., input) port 8108A(1) is to receive an aggregated (e.g., single) respective backpressure value of a backpressure value from control input buffer 8122B logically AND'd (e.g., it returns the Boolean value true (e.g., binary high, e.g., binary 1) if both input operands are true and returns false (e.g., binary low, e.g., binary 0) otherwise) with a backpressure value from control input buffer 8122C by AND logic gate 8152.

First (e.g., as producer) PE 8100A includes a (e.g., input) port 8112A(1) coupled to network 8110, e.g., to receive a speculation value from second (e.g., as consumer) PE 8100B and/or third (e.g., as consumer) PE 8100C. In one circuit switched configuration, (e.g., input) port 8112A(1) is to receive a respective speculation value for each one of control input buffer 8122B and control input buffer 8122C. In the depicted embodiment, (e.g., input) port 8112A(1) is to receive an aggregated (e.g., single) speculation value for speculation value for control input buffer 8122B logically AND'd with speculation value for control input buffer 8122C by AND logic gate 8150. In the depicted embodiment, the speculation value for control input buffer 8122B is formed by OR'ing the reception bit for the speculative path (e.g., reception bit from storage 8107) (e.g., where a binary low value indicates the buffer did not store an input since it was last cleared) and a backpressure bit from backpressure path (e.g., from port 8108B(1)) (e.g., where a binary low value indicates there is no backpressure) by OR logic gate 8154. In the depicted embodiment, the speculation value for control input buffer 8122C is formed by OR'ing the reception bit for the speculative path (e.g., reception bit from storage 8113) (e.g., where a binary low value indicates the buffer did not store an input since it was last cleared) and a backpressure bit from backpressure path (e.g., from port 8108C(1)) (e.g., where a binary low value indicates there is no backpressure) by OR logic gate 8156. In one embodiment, a PE (e.g., scheduler thereof) is to set (e.g., to binary high) a reception value (e.g., reception bit) to indicate a value was stored in that buffer (e.g., second PE 8100B setting a reception bit in storage 8107 to indicate a dataflow token was stored (e.g., since the reception bit was last cleared) in the control input buffer 8122B and/or third PE 8100C setting a reception bit in storage 8113 to indicate a dataflow token was stored (e.g., since the reception bit was last cleared) in the control input buffer 8122C). In certain embodiments herein, logic gate functionality is achieved by using NAND/NOR circuit designs.

In one circuit switched configuration, a multicast data path is formed from control output buffer 8132A to control input buffer 8122B and control input buffer 8122C. A data path may be used to send a data token from the producer PE to the consumer PEs. In the depicted embodiment, second PE 8100B includes first storage 8107 for a reception value (e.g., bit) for control input buffer 8122B. Second (e.g., as consumer) PE 8100B includes an (e.g., output) port 8108B (1) coupled to network 8110, e.g., to send a backpressure value from second (e.g., as consumer) PE 8100B to first (e.g., as producer) PE 8100A. In one circuit switched configuration, (e.g., output) port 8108B(1) is to send a respective backpressure value for control input buffer 8122B. Second (e.g., as consumer) PE 8100B includes a (e.g., input) port 8112B(1) coupled to network 8110, e.g., to receive a success value from first (e.g., as producer) PE 8100A. In one circuit switched configuration, (e.g., input) port 8112B(1) is to receive a respective success value for control input buffer 8122B.

In the depicted embodiment, third PE 8100C includes first storage 8113 for a reception value (e.g., bit) for control input buffer 8122C. Third (e.g., as consumer) PE 8100C includes an (e.g., output) port 8108C(1) coupled to network 8110, e.g., to send a backpressure value from third (e.g., as consumer) PE 8100C to first (e.g., as producer) PE 8100A. In one circuit switched configuration, (e.g., output) port 8108C(1) is to send a respective backpressure value for control input buffer 8122C. Second (e.g., as consumer) PE 8100B includes a (e.g., input) port 8112C(1) coupled to network 8110, e.g., to receive a success value from first (e.g., as producer) PE 8100A. In one circuit switched configuration, (e.g., input) port 8112C(1) is to receive a respective success value for control input buffer 8122C.

In one embodiment, a data token is received in control output buffer 8132A which causes the reduced multicast critical path of the first example to begin operation. In one embodiment, the data token's reception therein causes the producer PE 8100A (e.g., transmitter) to drive its dataflow (e.g., valid) value (e.g., on the path from control output buffer 8132A to control input buffer 8122B (e.g., through network 8110) and the path from control output buffer 8132A to control input buffer 8122C (e.g., through network 8110)) to a value (e.g., binary high) to indicate it has data to-be-transmitted. In one embodiment, the dataflow value (e.g., valid) is the transmittal of the dataflow token (e.g., payload data) itself. In one embodiment, a first path is included from producer PE to (e.g., each) consumer PE through network 8110 for the dataflow token and a second path is included from producer PE to (e.g., each) consumer PE through network 8110 for a dataflow value to indicate if that dataflow token (e.g., in storage coupled to the first path) is valid or invalid. The speculation value(s) and/or a success value may resolve the case in which not all consumer PEs (e.g., receivers) were ready to receive the dataflow token (e.g., have storage available for that dataflow token).

In the first transmission attempt for this dataflow token, if the backpressure value (e.g., ready value) on the path from port 8108B(1) of second PE 8100B to port 8108A(1) of first PE 8100A and the backpressure value (e.g., ready value) on the path from port 8108C(1) of third PE 8100C to port 8108A(1) of first PE 8100A both indicate (e.g., as the output from AND logic gate 8152) there is no backpressure (e.g., there is storage available in each of control input buffer 8122B and control input buffer 8122C), then the first PE (e.g., scheduler 8114A) determines that this transmission attempt will be successful, for example, and the dataflow token is to be dequeued (e.g., in the next cycle) from the control output buffer 8132A of the first PE 8100A and/or the success value (e.g., success bit) in first storage 8101 is set (e.g., in the next cycle) to indicate a successful transmission. In the first transmission attempt for this data token, if the backpressure value (e.g., ready value) on the path from port 8108B(1) of second PE 8100B to port 8108A(1) of first PE 8100A or the backpressure value (e.g., ready value) on the path from port 8108C(1) of third PE 8100C to port 8108A(1) of first PE 8100A indicate (e.g., as the output from AND logic gate 8152) there is backpressure (e.g., there is not storage available in both (e.g., all) of control input buffer 8122B and control input buffer 8122C, respectively), then one or more retransmissions of that dataflow token will occur until the speculation value from each of second (e.g., as consumer) PE 8100B and third (e.g., as consumer) PE

8100C indicates speculation is true, for example, until the speculation value is driven to a value by each of second (e.g., as consumer) PE 8100B and third (e.g., as consumer) PE 8100C that indicates that consumer PE (e.g., receiver) has either (i) accepted the data sent by the producer PE 8100A, e.g., as noted by the reception value (e.g., reception bit) being set (e.g., in a previous cycle) (e.g., in storage 8107 or storage 8113, respectively) or (ii) that the consumer is ready (e.g., by the next cycle) to receive the dataflow token (e.g., the backpressure value indicates that storage is currently available). For example, where the speculation value for control input buffer 8122B is formed by OR'ing the reception bit for the speculative path (e.g., reception bit from storage 8107) (e.g., where a binary low value indicates the buffer did not store an input since it was last cleared) and a backpressure bit from backpressure path (e.g., from port 8108B(1)) (e.g., where a binary low value indicates there is no backpressure) by OR logic gate 8154. In one embodiment, once the speculation values (e.g., from speculation paths) indicate the dataflow token is to be stored (e.g., in the next cycle) in control input buffer 8122B and control input buffer 8122C, the success value (e.g., a single bit) is driven by the producer PE 8100A to a value that the producer PE was able to successfully complete a transmission in the previous cycle (e.g., the value is stored in all of the multicast consumer PEs), e.g., as noted by the success value (e.g., success bit) (e.g., binary high, e.g., binary 1) being set in storage 8101. In one embodiment, the setting of the success value in storage 8101 causes a success value to be sent on a path from storage 8101 through network 8110 to (e.g., input) port 8112B(1) of (e.g., as consumer) second PE 8100B and to (e.g., input) port 8112C(1) of (e.g., as consumer) third PE 8100C. In one embodiment, receipt of success value from first PE 8100A (e.g., from storage 8101 thereof) by second PE 8100B is to cause the clearing of the reception bit in storage 8107, e.g., by scheduler 8114B. In one embodiment, receipt of success value from first PE 8100A (e.g., from storage 8101 thereof) by third PE 8100C is to cause the clearing of the reception bit in storage 8113, e.g., by scheduler 8114C.

Figure 81C:
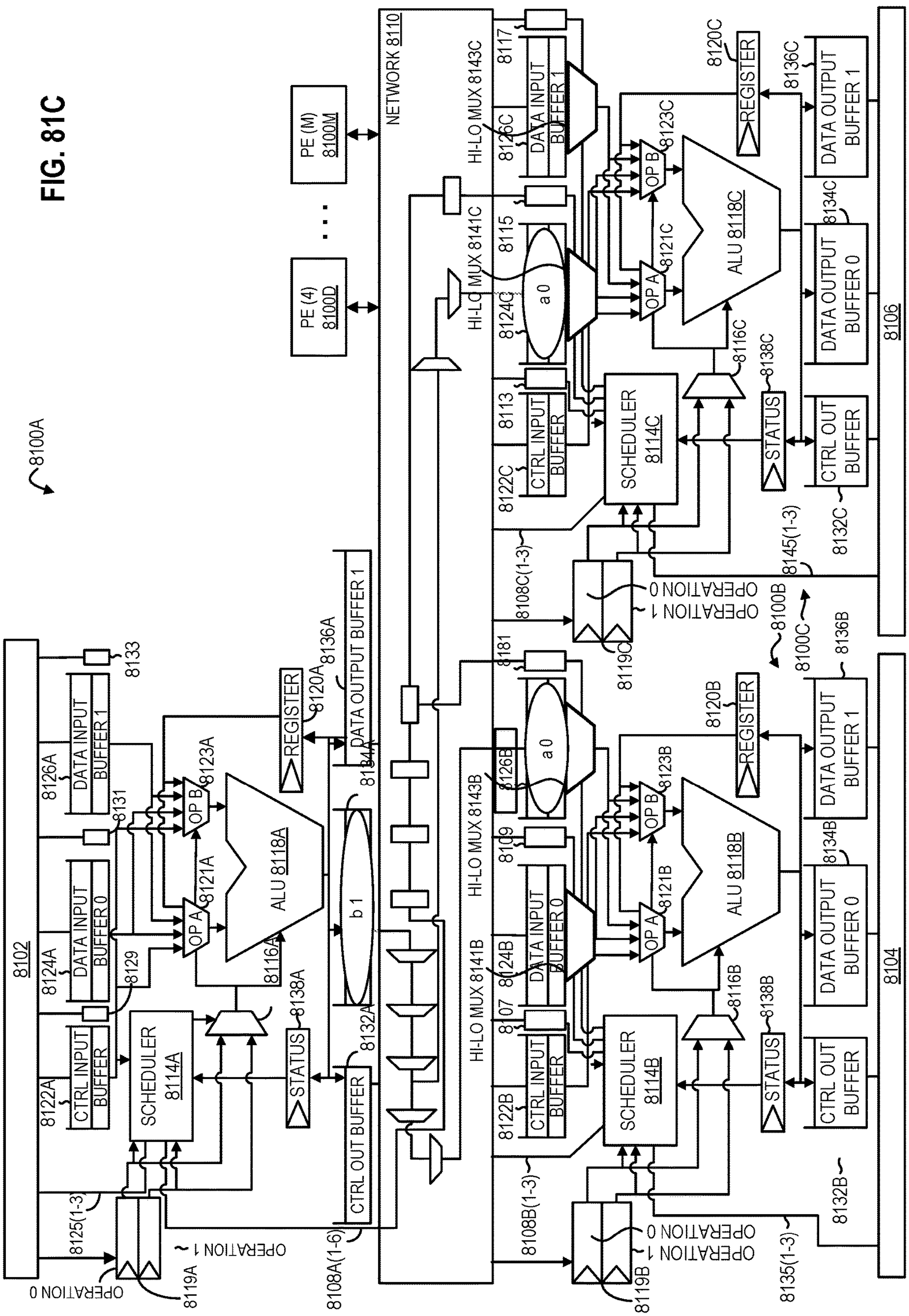

In FIG. 81C, the multicast transmission has occurred and second PE 8100B received a copy of the first value (labeled as "a0") in input buffer 8126B, and the third PE 8100C received a copy of the first value (labeled as "a0") in input buffer 8126C. Also, a second value (labeled as "b1") that is to be sent to both the second PE 8100B and the third PE 8100C has been stored into output buffer 8134A of first PE 8100A.

Figure 81D:
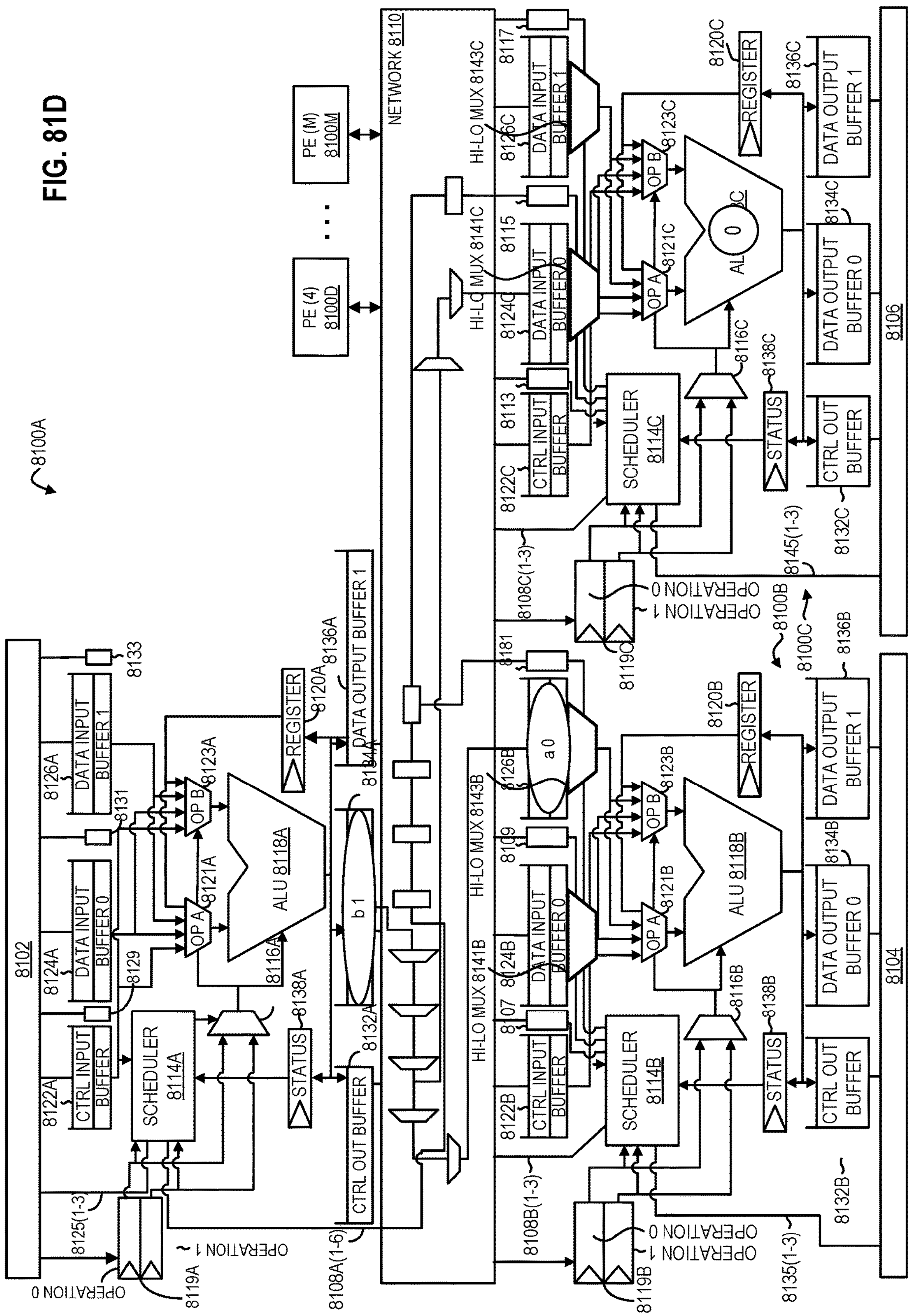

In FIG. 81D, the third PE 8100C included a configuration value to source the lower half of the input value from input buffer 8126C, so the input value of "a0" is dequeued from input buffer 8126C, the lower half of the input value (labeled as "0") is passed into the ALU 8118C, and the upper half of the input value (labeled as "a") is discarded. Similarly, second PE 8100C may be configured so that each of the unpacking multiplexers may be used to select a proper subset (e.g., an upper half or lower half) of the input value to pass into the PE's operation circuitry (e.g., ALU). In one embodiment, the control values to control the unpacking multiplexers in a PE are sent from the scheduler of that PE, e.g., according to the configuration value stored in the configuration storage (e.g., register). Although selecting half of the input value for passthrough is discussed above, other granularities are possible, for example, a fourth of the input value or rotate the input value (e.g., select middle bits or bytes). In certain embodiments, multiple subsets of an input value are output (e.g., in series) into the PE's circuitry before dequeuing the input value.

In the depicted embodiment, PEs 8100A, 8100B, or 8100C include the components of PE 5800 from FIG. 58, for example, with the components ending with the same two numbers having the same functionality. In one embodiment, schedulers 8114A, 8114B, and/or 8114C schedule an operation or operations of processing element 8000 for execution according to the configuration values, e.g., and when input data and control input arrives. See, for example, the discussion of FIGS. 33-57.

In certain embodiments, a single line on a figure may illustrate one wire, or a plurality of wires. Note that a two wire protocol is discussed above, however, network may use a four wire protocol. In one embodiment, network 8110 uses the reduced multicast critical path discussed below (e.g., and adding the high-low muxes, etc.) Certain embodiments of a reduced multicast critical path utilize a speculation path (e.g., to transport a speculation value). Additionally or alternatively, certain embodiments of a reduced multicast critical path utilize a success path (e.g., to transport a success value). In one embodiment, a success path follows (e.g., is parallel to) the data path, e.g., is sent from the producer PE to the consumer PEs. In one embodiment, a speculation path follows (e.g., is parallel to) the flow control (e.g., backpressure) path, e.g., is sent from the consumer PEs to the producer PE. In one embodiment, the speculation value reflects the behavior in the current and previous cycle of the PEs and network(s) transmitting the data. In one embodiment, the success value reflects the behavior in the previous cycle of the PEs and network(s) transmitting the data. A cycle may be defined by a (e.g., rising or falling) clock edge. In one embodiment, a new cycle begins with (e.g., and includes) the rising clock edge. In one embodiment, a value is locked in from its asserted value on a (e.g., rising) clock edge. In one embodiment, a value is set in a first cycle, and an action caused by that value being set is begun in the second (e.g., next) cycle. Certain embodiments herein include storage (e.g., a register) in a PE and/or network to store a reception value, e.g., in storage in each consumer PE. Certain embodiments herein include storage (e.g., a register) in a PE and/or network to store a success value (e.g., from a success path), e.g., storage in the producer PE. In one embodiment, the storage is a one bit register in each PE, for example, for each set of buffers.

Figure 82A:
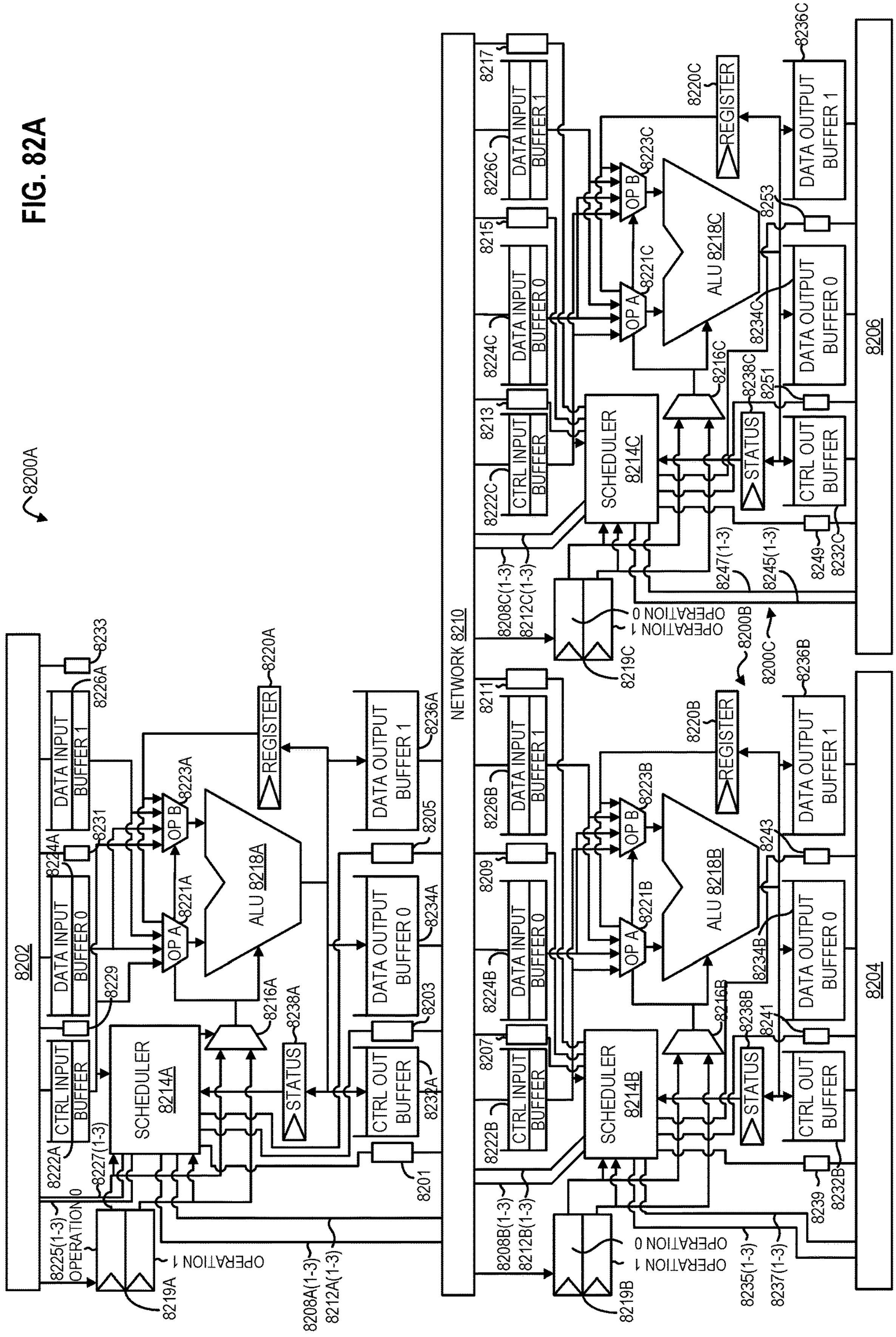
FIG. 82A illustrates a first processing element (PE) coupled to a second processing element (PE) and a third processing element (PE) by a network according to embodiments of the disclosure.

FIG. 82A illustrates a first processing element (PE) 8200A coupled to a second processing element (PE) 8200B and a third processing element (PE) 8200C by a network 8210 according to embodiments of the disclosure. In one embodiment, network 8210 is a circuit switched network, e.g., configured to perform a multicast to send data from first PE 8200A to both second PE 8200B and third PE 8200C.

In one embodiment, a circuit switched network 8210 includes (i) a data path to send data from first PE 8200A to both second PE 8200B and third PE 8200C, e.g., for operations to be performed on that data by second PE 8200B and third PE 8200C, and (ii) a flow control path to send control data that controls (or is used to control) the sending of that data from first PE 8200A to both second PE 8200B and third PE 8200C. Data path may send a data (e.g., valid) value when data is in an output buffer (e.g., when data is in control output buffer 8232A, first data output buffer 8234A, or second data output buffer 8236A of first PE 8200A). In one embodiment, each output buffer includes its own data path, e.g., for its own data value from producer PE to consumer PE. Components in PE are examples, for example, a PE may include only a single (e.g., data) input buffer and/or a single (e.g., data) output buffer. Flow control path may send control data that controls (or is used to control) the sending of corresponding data from first PE 8200A (e.g., control output buffer 8232A, first data output buffer 8234A, or second data output buffer 8236A thereof) to both second PE 8200B and third PE 8200C. Flow control data may include a backpressure value from each consumer PE (or aggregated from all consumer PEs, e.g., with an AND logic gate). Flow control data may include a backpressure value, for example, indicating the buffer of the second PE 8200B (e.g., control input buffer 8222B, first data input buffer 8224B, or second data input buffer 8226B) and/or the buffer of the third PE 8200B (e.g., control input buffer 8222C, first data input buffer 8224C, or second data input buffer 8226C) where the data (e.g., from control output buffer 8232A, first data output buffer 8234A, or second data output buffer 8236A of first PE 8200A) is to-be-stored is (e.g., in the current cycle) full or has an empty slot (e.g., empty in the current cycle or next cycle) (e.g., transmission attempt). Flow control data may include a speculation value and/or success value. Network 8210 may include a speculation path (e.g., to transport a speculation value) and/or success path (e.g., to transport a success value). In one embodiment, a success path follows (e.g., is parallel to) the data path, e.g., is sent from the producer PE to the consumer PEs. In one embodiment, a speculation path follows (e.g., is parallel to) the backpressure path, e.g., is sent from a consumer PE to the producer PE. In one embodiment, each consumer PE has its own flow control path, e.g., in a circuit switched network 8210, to its producer PE. In one embodiment, each consumer PEs flow control path is combined into an aggregated flow control path for its producer PE.

Turning to the depicted PEs, processing elements 8200A-C include operation configuration registers 8219A-C that may be loaded during configuration (e.g., mapping) and specify the particular operation or operations (for example, and indicate whether to enable non-blocking (e.g., reduced critical path) multicast mode or not (e.g., enable multicast mode that blocks transmission from producer PE until all consumer PEs are ready) that processing (e.g., compute) element is to perform. Register 8220A-C activity may be controlled by that operation (an output of multiplexer 8216A-C, e.g., controlled by the scheduler 8214A-C). Scheduler 8214A-C may schedule an operation or operations of processing element 8200A-C, respectively, for example, when a dataflow token arrives (e.g., input data and/or control input). Control input buffer 8222A, first data input buffer 8224A, and second data input buffer 8226A are connected to local network 8202 for first PE 8200A. In one embodiment, control output buffer 8232A is connected to network 8210 for first PE 8200A, control input buffer 8222B is connected to local network 8210 for second PE 8200B, and control input buffer 8222C is connected to local network 8210 for third PE 8200C (e.g., and each local network may include a data path as in FIG. 10A and a flow control path as in FIG. 10B) and is loaded with a value when it arrives (e.g., the network has a data bit(s) and valid bit(s)). In one embodiment, first data output buffer 8234A is connected to network 8210 for first PE 8200A, first data input buffer 8224B is connected to local network 8210 for second PE 8200B, and first data input buffer 8224C is connected to local network 8210 for third PE 8200C (e.g., and each local network may include a data path as in FIG. 10A and a flow control path as in FIG. 10B) and is loaded with a value when it arrives (e.g., the network has a data bit(s) and valid bit(s)). In one embodiment, second data output buffer 8236A is connected to network 8210 for first PE 8200A, second data input buffer 8226B is connected to local network 8210 for second PE 8200B, and second data input buffer 8226C is connected to local network 8210 for third PE 8200C (e.g., and each local network may include a data path as in FIG. 10A and a flow control path as in FIG. 10B) and is loaded with a value when it arrives (e.g., the network has a data bit(s) and valid bit(s)). Control output buffer 8232A-C, data output buffer 8234A-C, and/or data output buffer 8236A-C may receive an output of processing element 8200A-C (respectively), e.g., as controlled by the operation (an output of multiplexer 8216A-C). Status register 8238A-C may be loaded whenever the ALU 8218A-C executes (e.g., also controlled by output of multiplexer 8216A-C). Data in control input buffer 8222A-C and control output buffer 8232A-C may be a single bit. Multiplexer 8221A-C(e.g., operand A) and multiplexer 8223A-C(e.g., operand B) may source inputs.

For example, suppose the operation of first processing (e.g., compute) element 8200A is (or includes) what is called call a pick in FIG. 3B. The processing element 8200A then is to select data from either data input buffer 8224A or data input buffer 8226A, e.g., to go to data output buffer 8234A (e.g., default) or data output buffer 8236A. The control bit in 8222A may thus indicate a 0 if selecting from data input buffer 8224A or a 1 if selecting from data input buffer 8226A.

For example, suppose the operation of first processing (e.g., compute) element 8200A is (or includes) what is called call a switch in FIG. 3B. The processing element 8200A is to output data to data output buffer 8234A or data output buffer 8236A, e.g., from data input buffer 8224A (e.g., default) or data input buffer 8226A. The control bit in 8222A may thus indicate a 0 if outputting to data output buffer 8234A or a 1 if outputting to data output buffer 8236A. The output data may be the result of an operation by the ALU in certain embodiments.

Multiple networks (e.g., interconnects) may be connected to a processing element, e.g., networks 8202, 8204, 8206, and 8210. The connections may be switches, e.g., as discussed in reference to FIGS. 10A and 10B. In one embodiment, PEs and a circuit switched network 8210 are configured (e.g., control settings are selected) such that circuit switched network 8210 includes (i) a data path to send data from first PE 8200A to both second PE 8200B and third PE 8200C, e.g., for operations to be performed on that data by second PE 8200B and third PE 8200C, and (ii) a flow control path to send control data that controls (or is used to control) the sending of that data from first PE 8200A to both second PE 8200B and third PE 8200C. First PE 8200A includes a scheduler 8214A. A scheduler or other PE and/or network circuitry may include control circuitry to control a multicast operation, e.g., according to the example state machines discussed below. Flow control data may include a backpressure value, a speculation value, and/or a success value.

In one embodiment, the backpressure value and the speculation value (e.g., and the success value) allow the PEs and network (e.g., cumulatively the system) to handle the distributed coordination case, e.g., where all consumer PEs (e.g., receivers) must receive the multicast data item before it may be dequeued (e.g., discarded) by the producer PE (e.g., transmitter). Certain embodiments herein allow the target receivers to speculatively receive data, e.g., even if it is not known that all receivers will receive (e.g., store) the data (e.g., in that cycle). Thus, in certain embodiments the data itself is not speculative and it will eventually be sent. Here speculation may generally refer to the producer PE (e.g., transmitter) assuming that (e.g., at least some of) the consumer PEs (e.g., receivers) might receive the transmitted data (e.g., in that cycle). For example, in contrast to waiting for the backpressure value from all multicast consumer PEs to indicate they have storage available for that data. In one embodiment, if any receivers are unready, then the backpressure (e.g., ready) value will be pulled to a value (e.g., binary low) indicating there is no storage available in the consumer PE, for example, by the flow control function, e.g., and the producer PE (e.g., transmitter) would also pull its data flow (e.g., transmit valid) value to a value (e.g., binary low) so that no data would be transmitted.

In a reduced multicast critical path embodiment, the producer PE (e.g., transmitter) may drive its dataflow (e.g., valid) signal to a value (e.g., binary high) to indicate it has data to-be-transmitted. The speculation value(s) and/or a success value may resolve the case in which not all consumer PEs (e.g., receivers) were ready to receive data (e.g., have storage available for that data) (e.g., in that cycle). In one embodiment, the success signal (e.g., a single bit) is driven to a value that indicates success (e.g., binary high) by the producer PE (e.g., transmitter) when the producer PE (e.g., transmitter) was able to successfully complete a transmission in the previous cycle for a dataflow token (e.g., the dataflow token is stored in all of the multicast consumer PEs), e.g., as noted by the success value (e.g., success bit) being set as discussed herein. In one embodiment, the producer PE (e.g., transmitter) determines that it was able to complete a transmission of a dataflow token in the previous cycle when the producer PE (e.g., transmitter) observed for all of the multicast receiver PEs that either a speculation value was set to the value (e.g., binary high) to indicate the dataflow token was stored in the buffer (e.g., as indicated by a reception value (e.g., bit)) or the backpressure value (e.g., ready value) was set to the value (e.g., binary high) to indicate that storage is to be available in the buffer of the consumer PE (e.g., in the next cycle (e.g., transmission attempt)) for the dataflow token. In certain embodiments, when a producer PE (e.g., transmitter) determines that the success value is already at a value (e.g., binary high) that indicates the producer PE was able to successfully complete a transmission in the previous cycle to the multicast consumer PEs, then the producer PE (e.g., transmitter) ignores the speculation value(s) (e.g., a single bit), e.g., since it is known to refer to a completed transaction. In one embodiment, in all cycles where success is driven high, the producer PE (e.g., transmitter) also dequeues its data, e.g., dequeued from its output buffer (e.g., removed from control output buffer 8232A, first data output buffer 8234A, or second data output buffer 8236A of first PE 8200A). In certain embodiments, the success value being set in storage of a producer PE (to indicate success) causes a success value to be sent (e.g., in the next cycle after the success value was set or in the same cycle the success value was set) to the consumer PEs to clear their reception values (e.g., bits) (e.g., in the same cycle the success value is sent). In certain embodiments, the success value is set following any cycle in which a multicast transmission is completed and cleared otherwise, e.g., and success may happen in back-to-back cycles. In one embodiment, the reception bit(s) are cleared in the cycle following the dequeue of the dataflow token from the output buffer.

In one embodiment, the speculation value (e.g., a single bit) is driven to a value by a consumer PE (e.g., receiver) that indicates if that consumer PE (e.g., receiver) has accepted the data sent by the producer PE (e.g., transmitter), e.g., as noted by the reception value (e.g., reception bit) being set (e.g., in that cycle) as discussed herein or if the receiver was ready to receive anyway (for example, the backpressure value indicates that storage is available or is to be available on the next cycle, e.g., that PE is consuming a dataflow token that is to be cleared from the buffer at the end of the current cycle). In one embodiment, the backpressure value (e.g., ready value) and the reception value are logically OR'd (e.g., returns the Boolean value true (e.g., binary high, e.g., 1) if either or both input operands are true and returns false (e.g., binary low, e.g., 0) otherwise) together to form the speculation value. In one embodiment, the reception value (e.g., value) is cleared when (e.g., following any cycle in which) the success value (e.g., value) is observed, e.g., indicating the producer PE was able to successfully complete a transmission in the previous cycle to the multicast consumer PEs. Certain embodiments herein permit speculatively transmitted data to proceed through the pipeline. In one embodiment, once a dataflow token (e.g., value) has been obtained it may be used, e.g., it is not stalled. In one embodiment, each consumer PE (e.g., receiver) is to drive its speculation value until the cycle after it observes the producer PE (e.g., transmitter) driving its success value to indicate success. This may improve the performance of some dataflow graphs. In one embodiment, having both backpressure values (e.g., ready) and speculation values enables the transmittal of data in a fully pipelined fashion for multicast. Backpressure (e.g., ready) value may be used in cycles in which the speculation value is unusable due to a previous transmission having completed in a previous cycle. In one embodiment, PEs are provisioned with at least two input buffer slots in each input buffer to allow for full pipelining to be obtained.

In certain embodiments, distributed agreement of the consumers (e.g., PEs) allows for a reduced multicast critical path, for example, where success is checked in the next cycle after a transmission attempt, e.g., instead of a producer (e.g., PE) waiting for all the backpressure to be clear (e.g., ready) values from consumers. In one embodiment, the producer sends the data (e.g., at the beginning of a first cycle), then the consumers check if they received that data (e.g., simultaneously, at the end of the first cycle, or the beginning of a second cycle), e.g., if the data was stored in the target buffer of that consumer. If all the transmissions were successful, in one embodiment (e.g., at the clock edge), the producer is to set the success bit and then drive the success value to the consumers (e.g., in the next cycle). If not, then data may be sent for another cycle until all the consumers pass the check that the data was received. In one embodiment, a first value (e.g., from a first wire between a consumer and a producer) indicates whether data is ready (e.g., in its output buffer) and a second value (e.g., from a second wire between the consumer to the producer) indicates that data is ready, but it is a retransmission (e.g., not new data). The second value (e.g., from second wire) may thus keep from having two of the same data in a consumer, e.g., to avoid having two or more copies in an input buffer of a consumer PE for the same instance of an output value from a producer PE that was transmitted multiple times. Certain embodiments herein add a state element at each consumer, e.g., a reception bit. Flow control may indicate full or empty (e.g., backpressure) and indicate if a consumer took the data in a previous cycle. Producer may use knowledge of (i) if the consumer took the data, and (ii) whether the consumer may take more data, to control its output of data. Consumer PEs may send a speculation value back to a producer. Consumer PE may indicate that its target buffer is full, but producer PE may utilize the embodiments herein to determine if that target buffer is full for a consumer PE, and that consumer PE took the data (versus not taking the data and being full from a previous transmission for a different instance of an output value from the producer PE). In certain embodiments, one or more of the following aggregated values are utilized: (1) whether all the consumer PEs are full or empty, and (2) whether a consumer PE (e.g., all multicast consumer PEs) took data in the prior cycle e.g., so the backpressure value indicates no storage is available because it took the current data in that cycle or because there was and/or is no room for the data).

In one embodiment, first PE 8200A includes first storage 8201 for a success value (e.g., bit) for control output buffer 8232A, second storage 8203 for a success value (e.g., bit) for first data output buffer 8234A, and third storage 8205 for a success value (e.g., bit) for second data output buffer 8236A. Depicted scheduler 8214A is coupled to first storage 8201 to set or clear a success value (e.g., bit) therein for control output buffer 8232A, coupled to second storage 8203 to set or clear a success value (e.g., bit) therein for first data output buffer 8234A, and coupled to third storage 8205 to set or clear a success value (e.g., bit) therein for second data output buffer 8236A. In one embodiment, the scheduler 8214A sets the success value based on flow control data from the second PE 8200B and flow control data from the third PE 8200C. Some or all of the flow control data may be aggregated into a single value, e.g., sent to the first (e.g., as producer) PE 8200A. First (e.g., as producer) PE 8200A includes a (e.g., input) port 8208A(1-3) coupled to network 8210, e.g., to receive a backpressure value from second (e.g., as consumer) PE 8200B and/or third (e.g., as consumer) PE 8200C. In one circuit switched configuration, (e.g., input) port 8208A(1-3) (e.g., having a plurality of parallel inputs (1), (2), and (3)) is to receive a respective backpressure value from each one of control input buffer 8222B, first data input buffer 8224B, and second data input buffer 8226B and/or control input buffer 8222C, first data input buffer 8224C, and second data input buffer 8226C. In one embodiment, (e.g., input) port 8208A(1-3) is to receive an aggregated (e.g., single) respective backpressure value of each of (i) a backpressure value from control input buffer 8222B logically AND'd (e.g., it returns the Boolean value true (e.g., binary high, e.g., binary 1) if both input operands are true and returns false (e.g., binary 0) otherwise) with a backpressure value from control input buffer 8222C (e.g., on input 8208A (1)), (ii) a backpressure value from first data input buffer 8224B logically AND'd with a backpressure value from first data input buffer 8224C (e.g., on input 8208A(2)), and (iii) a backpressure value from second data input buffer 8226B logically AND'd with a backpressure value from second data input buffer 8226C (e.g., on input 8208A(3)). In one embodiment, an input or output marked as a (1), (2), or (3) is its own respective wire or other coupling.

First (e.g., as producer) PE 8200A includes a (e.g., input) port 8212A(1-3) coupled to network 8210, e.g., to receive a speculation value from second (e.g., as consumer) PE 8200B and/or third (e.g., as consumer) PE 8200C. In one circuit switched configuration, (e.g., input) port 8212A(1-3) (e.g., having a plurality of parallel inputs(1), (2), and (3)) is to receive a respective speculation value for each one of control input buffer 8222B, first data input buffer 8224B, and second data input buffer 8226B and/or control input buffer 8222C, first data input buffer 8224C, and second data input buffer 8226C. In one embodiment, (e.g., input) port 8212A (1-3) is to receive an aggregated (e.g., single) speculation value for each of (i) speculation value for control input buffer 8222B logically AND'd with speculation value for control input buffer 8222C (e.g., on input 8208A(1)), (ii) speculation value for first data input buffer 8224B logically AND'd with speculation value for first data input buffer 8224C (e.g., on input 8208A(2)), and (iii) speculation value for second data input buffer 8226B logically AND'd with speculation value for second data input buffer 8226C (e.g., on input 8208A(3)).

In one circuit switched configuration, a multicast data path is formed from (i) control output buffer 8232A to control input buffer 8222B and control input buffer 8222C, (ii) first data output buffer 8234A to first data input buffer 8224B and first data input buffer 8224C, (iii) second data output buffer 8236A to second data input buffer 8226B and second data input buffer 8226C, or any combination thereof. A data path may be used to send a data token from the producer PE to the consumer PEs. In the depicted embodiment, second PE 8200B includes first storage 8207 for a reception value (e.g., bit) for control input buffer 8222B, second storage 8209 for a reception value (e.g., bit) for first data input buffer 8224B, and third storage 8211 for a reception value (e.g., bit) for second data input buffer 8226B, e.g., set by scheduler 8214B. In the depicted embodiment, second (e.g., as consumer) PE 8200B includes an (e.g., output) port 8208B(1-3) coupled to network 8210, e.g., to send a backpressure value from second (e.g., as consumer) PE 8200B to first (e.g., as producer) PE 8200A. In one circuit switched configuration, (e.g., output) port 8208B(1-3) is to send a respective backpressure value for each one of control input buffer 8222B (e.g., on output 8208B(1)), first data input buffer 8224B (e.g., on output 8208B(2)), and second data input buffer 8226B (e.g., on output 8208B(3)), e.g., by scheduler 8214B. Second (e.g., as consumer) PE 8200B includes a (e.g., input) port 8212B(1-3) coupled to network 8210, e.g., to receive a success value from first (e.g., as producer) PE 8200A. In one circuit switched configuration, (e.g., input) port 8212B(1-3) (e.g., having a plurality of parallel inputs (1), (2), and (3))) is to receive a respective success value for each one of control input buffer 8222B (e.g., on input 8212B(1)), first data input buffer 8224B (e.g., on input 8212B(2)), and second data input buffer 8226B (e.g., on input 8212B(3)).

In the depicted embodiment, third PE 8200C includes first storage 8213 for a reception value (e.g., bit) for control input buffer 8222C, second storage 8215 for a reception value (e.g., bit) for first data input buffer 8224C, and third storage 8217 for a reception value (e.g., bit) for second data input buffer 8226C, e.g., set by scheduler 8214C. Third (e.g., as consumer) PE 8200C includes an (e.g., output) port 8208C (1-3) coupled to network 8210, e.g., to send a backpressure value from third (e.g., as consumer) PE 8200C to first (e.g., as producer) PE 8200A. In one circuit switched configuration, (e.g., output) port 8208C(1-3) is to send a respective backpressure value for each one of control input buffer 8222C (e.g., on output 8208C(1)), first data input buffer 8224C (e.g., on output 8208C(2)), and second data input buffer 8226C (e.g., on output 8208C(3)), e.g., by scheduler 8214C. Second (e.g., as consumer) PE 8200B includes a (e.g., input) port 8212C(1-3) coupled to network 8210, e.g., to receive a success value from first (e.g., as producer) PE 8200A. In one circuit switched configuration, (e.g., input) port 8212C(1-3) (e.g., having a plurality of parallel inputs (1), (2), and (3)) is to receive a respective success value for each one of control input buffer 8222C (e.g., on input 8212C(1)), first data input buffer 8224C (e.g., on input 8212C(2)), and second data input buffer 8226C (e.g., on input 8212C(3)).

Figure 82B:
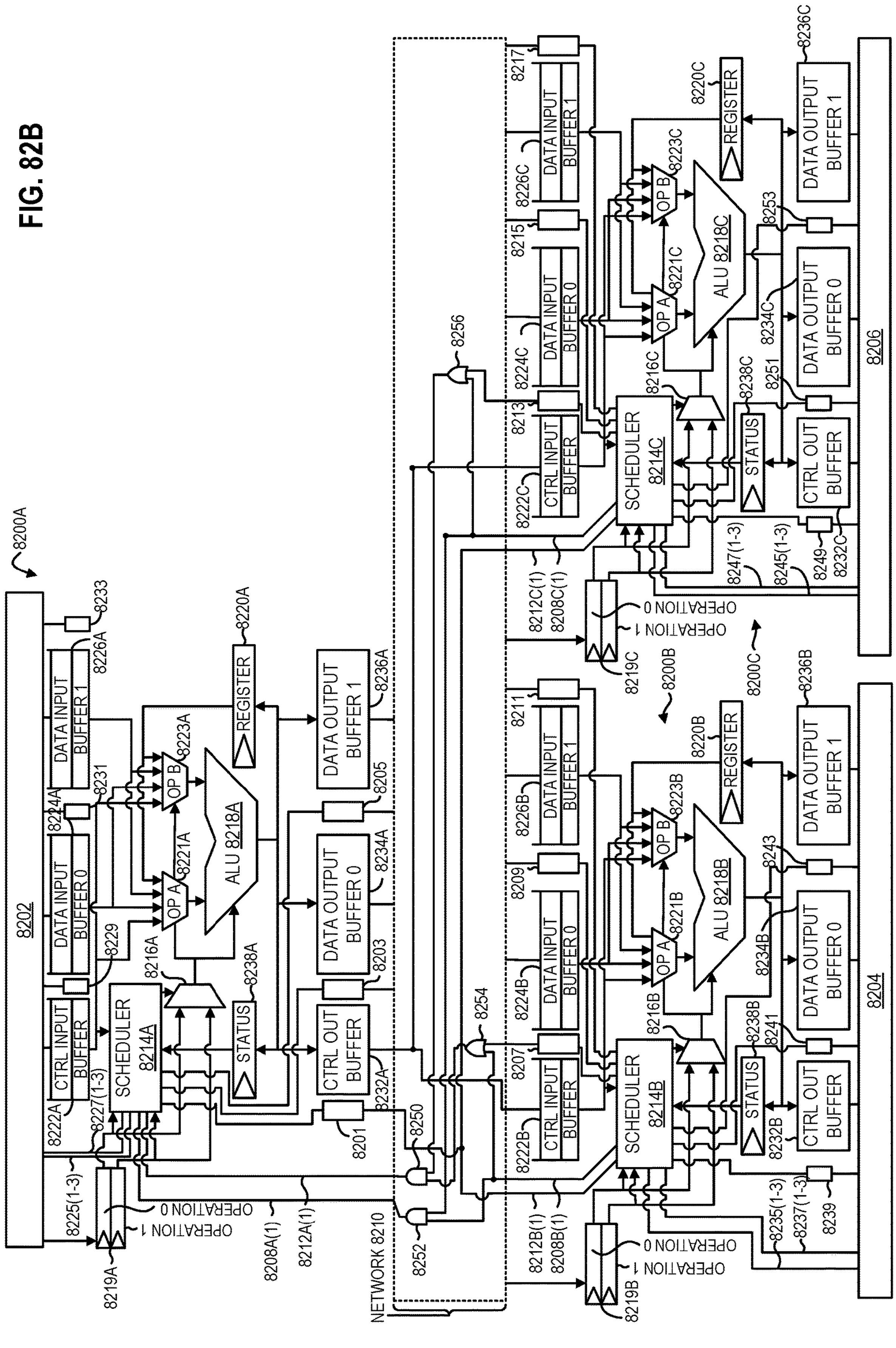
FIG. 82B illustrates the circuit switched network (e.g., switches and logic gates thereof) of Figure configured to provide a reduced multicast critical path for the control buffers according to embodiments of the disclosure.

As noted herein, speculation value may be formed by logically OR'ing the reception bit (for example, where a binary low value indicates the buffer did not take an input since it was last cleared and a binary high value indicates the buffer did take an input since it was last cleared, e.g., by the success value) and a backpressure bit (e.g., where a binary low value indicates there is no backpressure and a binary high value indicates there is backpressure). A port may include a plurality of inputs and/or outputs. A processing element may include a single port into network 8210, or any plurality of ports. Although FIGS. 82B-11D illustrate three example configurations, all three or any combination thereof may be simultaneously used and present (e.g., in network 8210). In one embodiment, switches (e.g., multiplexers) are configured (e.g., via their control lines) to form the three example configurations in FIGS. 82B-11D. In one embodiment, non-configurable static lines are used to form the three example configurations as illustrated in FIGS. 82B-11D.

First PE 8200A may include first storage 8229 for a reception value (e.g., bit) for control input buffer 8222A, second storage 8231 for a reception value (e.g., bit) for first data input buffer 8224A, and third storage 8233 for a reception value (e.g., bit) for second data input buffer 8226A, e.g., set by scheduler 8214A. First (e.g., as consumer) PE 8200A may include an (e.g., output) port 8225 (1-3) coupled to network 8202, e.g., to send a backpressure value from first (e.g., as consumer) PE 8200A to an upstream (e.g., as producer) PE. In one circuit switched configuration, (e.g., output) port 8225(1-3) is to send a respective backpressure value for each one of control input buffer 8222A (e.g., on output 8225(1)), first data input buffer 8224A (e.g., on output 8225(2)), and second data input buffer 8226A (e.g., on output 8225(3)), e.g., by scheduler 8214A. First (e.g., as consumer) PE 8200A includes a (e.g., input) port 8227(1-3) coupled to network 8202, e.g., to receive a success value from an upstream (e.g., as producer) PE. In one circuit switched configuration, (e.g., input) port 8227 (1-3) (e.g., having a plurality of parallel inputs (1), (2), and (3))) is to receive a respective success value for each one of control input buffer 8222A (e.g., on input 8227(1)), first data input buffer 8224A (e.g., on input 8227(2)), and second data input buffer 8226A (e.g., on input 8227(3)).

Second (e.g., as producer) PE 8200B may include a (e.g., input) port 8235(1-3) coupled to network 8204 (e.g., which may be the same network as network 8206), e.g., to receive a backpressure value from a downstream (e.g., as consumer) PE or PEs. In one circuit switched configuration, (e.g., input) port 8235(1-3) (e.g., having a plurality of parallel inputs (1), (2), and (3)) is to receive a respective backpressure value from each one of control input buffer, first data input buffer, and second data input buffer of a first downstream PE and/or control input buffer, first data input buffer, and second data input buffer of a second downstream PE. In one embodiment, (e.g., input) port 8235(1-3) is to receive an aggregated (e.g., single) respective backpressure value of each of (i) a backpressure value from control input buffer for first downstream PE logically AND'd (e.g., it returns the Boolean value true (e.g., binary high, e.g., binary 1) if both input operands are true and returns false (e.g., binary 0) otherwise) with a backpressure value from control input buffer for second downstream PE (e.g., on input 8235(1)), (ii) a backpressure value from first data input buffer for first downstream PE logically AND'd with a backpressure value from first data input buffer for first downstream PE (e.g., on input 8235(2)), and (iii) a backpressure value from second data input buffer for first downstream PE logically AND'd with a backpressure value from second data input buffer for first downstream PE (e.g., on input 8235(3)). In one embodiment, an input or output marked as a (1), (2), or (3) is its own respective wire or other coupling. In one embodiment, each PE includes the same circuitry and/or components.

Second PE 8200B includes first storage 8239 for a success value (e.g., bit) for control output buffer 8232B, second storage 8241 for a success value (e.g., bit) for first data output buffer 8234B, and third storage 8243 for a success value (e.g., bit) for second data output buffer 8236B. Depicted scheduler 8214B is coupled to first storage 8239 to set or clear a success value (e.g., bit) therein for control output buffer 8232B, coupled to second storage 8241 to set or clear a success value (e.g., bit) therein for first data output buffer 8234B, and coupled to third storage 8243 to set or clear a success value (e.g., bit) therein for second data output buffer 8236B. In one embodiment, the setting of the success value in storage 8239 causes a success value to be sent on a path from storage 8239 through network 8204 to (e.g., input) port of (e.g., as consumer) a first downstream PE and to (e.g., input) port of (e.g., as consumer) a second downstream PE. In one embodiment, receipt of success value from second PE 8200B (e.g., from storage 8239 thereof) by first downstream PE or second downstream PE is to cause the clearing of their reception bit in storage for that input buffer. In one embodiment, the setting of the success value in storage 8241 causes a success value to be sent on a path from storage 8241 through network 8204 to (e.g., input) port of (e.g., as consumer) a first downstream PE and to (e.g., input) port of (e.g., as consumer) a second downstream PE. In one embodiment, receipt of success value from second PE 8200B (e.g., from storage 8241 thereof) by first downstream PE or second downstream PE is to cause the clearing of their reception bit in storage for that input buffer. In one embodiment, receipt of success value from second PE 8200B (e.g., from storage 8243 thereof) by first downstream PE or second downstream PE is to cause the clearing of their reception bit in storage for that input buffer. In one embodiment, the setting of the success value in storage 8243 causes a success value to be sent on a path from storage 8243 through network 8204 to (e.g., input) port of (e.g., as consumer) a first downstream PE and to (e.g., input) port of (e.g., as consumer) a second downstream PE. In one embodiment, receipt of success value from second PE 8200B (e.g., from storage 8243 thereof) by first downstream PE or second downstream PE is to cause the clearing of their reception bit in storage for that input buffer.

Second (e.g., as producer) PE 8200B may include a (e.g., input) port 8237(1-3) coupled to network 8204, e.g., to receive a speculation value from a first downstream (e.g., as consumer) PE and/or second downstream (e.g., as consumer) PE. In one circuit switched configuration, (e.g., input) port 8237(1-3) (e.g., having a plurality of parallel inputs(1), (2), and (3)) is to receive a respective speculation value for each one of control input buffer for first downstream PE, first data input buffer for first downstream PE, and second data input buffer for first downstream PE and/or control input buffer for second downstream PE, first data input buffer for second downstream PE, and second data input buffer for second downstream PE. In one embodiment, (e.g., input) port 8237(1-3) is to receive an aggregated (e.g., single) speculation value for each of (i) speculation value for control input buffer for first downstream PE logically AND'd with speculation value for control input buffer for second downstream PE (e.g., on input 8237(1)), (ii) speculation value for first data input buffer for first downstream PE logically AND'd with speculation value for first data input buffer for second downstream PE (e.g., on input

8237(2)), and (iii) speculation value for second data input buffer for first downstream PE logically AND'd with speculation value for second data input buffer for second downstream PE (e.g., on input 8237(3)).

Second (e.g., as producer) PE 8200B may include a (e.g., input) port 8235(1-3) coupled to network 8204 (e.g., which may be the same network as network 8206), e.g., to receive a backpressure value from a downstream (e.g., as consumer) PE or PEs. In one circuit switched configuration, (e.g., input) port 8235(1-3) (e.g., having a plurality of parallel inputs (1), (2), and (3)) is to receive a respective backpressure value from each one of control input buffer, first data input buffer, and second data input buffer of a first downstream PE and/or control input buffer, first data input buffer, and second data input buffer of a second downstream PE. In one embodiment, (e.g., input) port 8235(1-3) is to receive an aggregated (e.g., single) respective backpressure value of each of (i) a backpressure value from control input buffer for first downstream PE logically AND'd (e.g., it returns the Boolean value true (e.g., binary high, e.g., binary 1) if both input operands are true and returns false (e.g., binary 0) otherwise) with a backpressure value from control input buffer for second downstream PE (e.g., on input 8235(1)), (ii) a backpressure value from first data input buffer for first downstream PE logically AND'd with a backpressure value from first data input buffer for first downstream PE (e.g., on input 8235(2)), and (iii) a backpressure value from second data input buffer for first downstream PE logically AND'd with a backpressure value from second data input buffer for first downstream PE (e.g., on input 8235(3)). In one embodiment, an input or output marked as a (1), (2), or (3) is its own respective wire or other coupling. In one embodiment, each PE includes the same circuitry and/or components.

Second (e.g., as producer) PE 8200B may include a (e.g., input) port 8237(1-3) coupled to network 8204, e.g., to receive a speculation value from a first downstream (e.g., as consumer) PE and/or second downstream (e.g., as consumer) PE. In one circuit switched configuration, (e.g., input) port 8237(1-3) (e.g., having a plurality of parallel inputs(1), (2), and (3)) is to receive a respective speculation value for each one of control input buffer for first downstream PE, first data input buffer for first downstream PE, and second data input buffer for first downstream PE and/or control input buffer for second downstream PE, first data input buffer for second downstream PE, and second data input buffer for second downstream PE. In one embodiment, (e.g., input) port 8237(1-3) is to receive an aggregated (e.g., single) speculation value for each of (i) speculation value for control input buffer for first downstream PE logically AND'd with speculation value for control input buffer for second downstream PE (e.g., on input 8237(1)), (ii) speculation value for first data input buffer for first downstream PE logically AND'd with speculation value for first data input buffer for second downstream PE (e.g., on input 8237(2)), and (iii) speculation value for second data input buffer for first downstream PE logically AND'd with speculation value for second data input buffer for second downstream PE (e.g., on input 8237(3)).

Third (e.g., as producer) PE 8200C may include a (e.g., input) port 8245(1-3) coupled to network 8206 (e.g., which may be the same network as network 8204), e.g., to receive a backpressure value from a downstream (e.g., as consumer) PE or PEs. In one circuit switched configuration, (e.g., input) port 8245(1-3) (e.g., having a plurality of parallel inputs (1), (2), and (3)) is to receive a respective backpressure value from each one of control input buffer, first data input buffer, and second data input buffer of a first downstream PE and/or control input buffer, first data input buffer, and second data input buffer of a second downstream PE. In one embodiment, (e.g., input) port 8245(1-3) is to receive an aggregated (e.g., single) respective backpressure value of each of (i) a backpressure value from control input buffer for first downstream PE logically AND'd (e.g., it returns the Boolean value true (e.g., binary high, e.g., binary 1) if both input operands are true and returns false (e.g., binary 0) otherwise) with a backpressure value from control input buffer for second downstream PE (e.g., on input 8245(1)), (ii) a backpressure value from first data input buffer for first downstream PE logically AND'd with a backpressure value from first data input buffer for first downstream PE (e.g., on input 8245(2)), and (iii) a backpressure value from second data input buffer for first downstream PE logically AND'd with a backpressure value from second data input buffer for first downstream PE (e.g., on input 8245(3)). In one embodiment, an input or output marked as a (1), (2), or (3) is its own respective wire or other coupling. In one embodiment, each PE includes the same circuitry and/or components.

Third (e.g., as producer) PE 8200C may include a (e.g., input) port 8247(1-3) coupled to network 8206, e.g., to receive a speculation value from a first downstream (e.g., as consumer) PE and/or second downstream (e.g., as consumer) PE. In one circuit switched configuration, (e.g., input) port 8247(1-3) (e.g., having a plurality of parallel inputs(1), (2), and (3)) is to receive a respective speculation value for each one of control input buffer for first downstream PE, first data input buffer for first downstream PE, and second data input buffer for first downstream PE and/or control input buffer for second downstream PE, first data input buffer for second downstream PE, and second data input buffer for second downstream PE. In one embodiment, (e.g., input) port 8247(1-3) is to receive an aggregated (e.g., single) speculation value for each of (i) speculation value for control input buffer for first downstream PE logically AND'd with speculation value for control input buffer for second downstream PE (e.g., on input 8247(1)), (ii) speculation value for first data input buffer for first downstream PE logically AND'd with speculation value for first data input buffer for second downstream PE (e.g., on input 8247(2)), and (iii) speculation value for second data input buffer for first downstream PE logically AND'd with speculation value for second data input buffer for second downstream PE (e.g., on input 8247(3)).

Third PE 8200C includes first storage 8249 for a success value (e.g., bit) for control output buffer 8232C, second storage 825 for a success value (e.g., bit) for first data output buffer 8234C, and third storage 8253 for a success value (e.g., bit) for second data output buffer 8236C. Depicted scheduler 8214C is coupled to first storage 8249 to set or clear a success value (e.g., bit) therein for control output buffer 8232C, coupled to second storage 8251 to set or clear a success value (e.g., bit) therein for first data output buffer 8234C, and coupled to third storage 8253 to set or clear a success value (e.g., bit) therein for second data output buffer 8236C. In one embodiment, the setting of the success value in storage 8249 causes a success value to be sent on a path from storage 8249 through network 8204 to (e.g., input) port of (e.g., as consumer) a first downstream PE and to (e.g., input) port of (e.g., as consumer) a second downstream PE. In one embodiment, receipt of success value from third PE 8200C (e.g., from storage 8249 thereof) by first downstream PE or second downstream PE is to cause the clearing of their reception bit in storage for that input buffer. In one embodiment, the setting of the success value in storage 8251 causes a success value to be sent on a path from storage 8251 through network 8204 to (e.g., input) port of (e.g., as consumer) a first downstream PE and to (e.g., input) port of (e.g., as consumer) a second downstream PE. In one embodiment, receipt of success value from third PE 8200C (e.g., from storage 8251 thereof) by first downstream PE or second downstream PE is to cause the clearing of their reception bit in storage for that input buffer. In one embodiment, receipt of success value from third PE 8200C (e.g., from storage 8253 thereof) by first downstream PE or second downstream PE is to cause the clearing of their reception bit in storage for that input buffer. In one embodiment, the setting of the success value in storage 8253 causes a success value to be sent on a path from storage 8253 through network 8204 to (e.g., input) port of (e.g., as consumer) a first downstream PE and to (e.g., input) port of (e.g., as consumer) a second downstream PE. In one embodiment, receipt of success value from third PE 8200C (e.g., from storage 8243 thereof) by first downstream PE or second downstream PE is to cause the clearing of their reception bit in storage for that input buffer.

A processing element may include two sub-networks (or two channels on the network), e.g., one for a data path and one for a flow control path. A processing element (e.g., PE 8200A, PE 8200B, and PE 8200C) may function and/or include the components as in any of the disclosure herein. A processing element may be stalled from execution until its operands (e.g., in its input buffer(s)) are received and/or until there is room in the output buffer(s) of the processing element for the data that is to be produced by the execution of the operation on those operands. Next, three reduced multicast critical path embodiments are discussed.

As a first example, FIG. 82B illustrates the circuit switched network 8210 (e.g., switches and logic gates thereof) of FIG. 82A configured to provide a reduced multicast critical path for the control buffers according to embodiments of the disclosure. Scheduler 8214A is coupled to first storage 8201 to set or clear a success value (e.g., bit) for control output buffer 8232A. In one embodiment, the scheduler 8214A sets the success value based on flow control data from the second PE 8200B and flow control data the second PE 8200C. Some or all of the flow control data may be aggregated into a single value, e.g., sent to the first (e.g., as producer) PE 8200A. First (e.g., as producer) PE 8200A includes a (e.g., input) port 8208A(1) coupled to network 8210, e.g., to receive a backpressure value from second (e.g., as consumer) PE 8200B and/or third (e.g., as consumer) PE 8200C. In one circuit switched configuration, (e.g., input) port 8208A(1) is to receive a respective backpressure value from each one of control input buffer 8222B and control input buffer 8222C. In the depicted embodiment, (e.g., input) port 8208A(1) is to receive an aggregated (e.g., single) respective backpressure value of a backpressure value from control input buffer 8222B logically AND'd (e.g., it returns the Boolean value true (e.g., binary high, e.g., binary 1) if both input operands are true and returns false (e.g., binary low, e.g., binary 0) otherwise) with a backpressure value from control input buffer 8222C by AND logic gate 8252.

First (e.g., as producer) PE 8200A includes a (e.g., input) port 8212A(1) coupled to network 8210, e.g., to receive a speculation value from second (e.g., as consumer) PE 8200B and/or third (e.g., as consumer) PE 8200C. In one circuit switched configuration, (e.g., input) port 8212A(1) is to receive a respective speculation value for each one of control input buffer 8222B and control input buffer 8222C. In the depicted embodiment, (e.g., input) port 8212A(1) is to receive an aggregated (e.g., single) speculation value for speculation value for control input buffer 8222B logically AND'd with speculation value for control input buffer 8222C by AND logic gate 8250. In the depicted embodiment, the speculation value for control input buffer 8222B is formed by OR'ing the reception bit for the speculative path (e.g., reception bit from storage 8207) (e.g., where a binary low value indicates the buffer did not store an input since it was last cleared) and a backpressure bit from backpressure path (e.g., from port 8208B(1)) (e.g., where a binary low value indicates there is no backpressure) by OR logic gate 8254. In the depicted embodiment, the speculation value for control input buffer 8222C is formed by OR'ing the reception bit for the speculative path (e.g., reception bit from storage 8213) (e.g., where a binary low value indicates the buffer did not store an input since it was last cleared) and a backpressure bit from backpressure path (e.g., from port 8208C(1)) (e.g., where a binary low value indicates there is no backpressure) by OR logic gate 8256. In one embodiment, a PE (e.g., scheduler thereof) is to set (e.g., to binary high) a reception value (e.g., reception bit) to indicate a value was stored in that buffer (e.g., second PE 8200B setting a reception bit in storage 8207 to indicate a dataflow token was stored (e.g., since the reception bit was last cleared) in the control input buffer 8222B and/or third PE 8200C setting a reception bit in storage 8213 to indicate a dataflow token was stored (e.g., since the reception bit was last cleared) in the control input buffer 8222C). In certain embodiments herein, logic gate functionality is achieved by using NAND/NOR circuit designs.

In one circuit switched configuration, a multicast data path is formed from control output buffer 8232A to control input buffer 8222B and control input buffer 8222C. A data path may be used to send a data token from the producer PE to the consumer PEs. In the depicted embodiment, second PE 8200B includes first storage 8207 for a reception value (e.g., bit) for control input buffer 8222B. Second (e.g., as consumer) PE 8200B includes an (e.g., output) port 8208B (1) coupled to network 8210, e.g., to send a backpressure value from second (e.g., as consumer) PE 8200B to first (e.g., as producer) PE 8200A. In one circuit switched configuration, (e.g., output) port 8208B(1) is to send a respective backpressure value for control input buffer 8222B. Second (e.g., as consumer) PE 8200B includes a (e.g., input) port 8212B(1) coupled to network 8210, e.g., to receive a success value from first (e.g., as producer) PE 8200A. In one circuit switched configuration, (e.g., input) port 8212B(1) is to receive a respective success value for control input buffer 8222B.

In the depicted embodiment, third PE 8200C includes first storage 8213 for a reception value (e.g., bit) for control input buffer 8222C. Third (e.g., as consumer) PE 8200C includes an (e.g., output) port 8208C(1) coupled to network 8210, e.g., to send a backpressure value from third (e.g., as consumer) PE 8200C to first (e.g., as producer) PE 8200A. In one circuit switched configuration, (e.g., output) port 8208C(1) is to send a respective backpressure value for control input buffer 8222C. Second (e.g., as consumer) PE 8200B includes a (e.g., input) port 8212C(1) coupled to network 8210, e.g., to receive a success value from first (e.g., as producer) PE 8200A. In one circuit switched configuration, (e.g., input) port 8212C(1) is to receive a respective success value for control input buffer 8222C.

In one embodiment, a data token is received in control output buffer 8232A which causes the reduced multicast critical path of the first example to begin operation, e.g., as discussed below in reference to FIGS. 82A-11L. In one embodiment, the data token's reception therein causes the producer PE 8200A (e.g., transmitter) to drive its dataflow (e.g., valid) value (e.g., on the path from control output buffer 8232A to control input buffer 8222B (e.g., through network 8210) and the path from control output buffer 8232A to control input buffer 8222C (e.g., through network 8210)) to a value (e.g., binary high) to indicate it has data to-be-transmitted. In one embodiment, the dataflow value (e.g., valid) is the transmittal of the dataflow token (e.g., payload data) itself. In one embodiment, a first path is included from producer PE to (e.g., each) consumer PE through network 8210 for the dataflow token and a second path is included from producer PE to (e.g., each) consumer PE through network 8210 for a dataflow value to indicate if that dataflow token (e.g., in storage coupled to the first path) is valid or invalid. The speculation value(s) and/or a success value may resolve the case in which not all consumer PEs (e.g., receivers) were ready to receive the dataflow token (e.g., have storage available for that dataflow token).

In the first transmission attempt for this dataflow token, if the backpressure value (e.g., ready value) on the path from port 8208B(1) of second PE 8200B to port 8208A(1) of first PE 8200A and the backpressure value (e.g., ready value) on the path from port 8208C(1) of third PE 8200C to port 8208A(1) of first PE 8200A both indicate (e.g., as the output from AND logic gate 8252) there is no backpressure (e.g., there is storage available in each of control input buffer 8222B and control input buffer 8222C), then the first PE (e.g., scheduler 8214A) determines that this transmission attempt will be successful, for example, and the dataflow token is to be dequeued (e.g., in the next cycle) from the control output buffer 8232A of the first PE 8200A and/or the success value (e.g., success bit) in first storage 8201 is set (e.g., in the next cycle) to indicate a successful transmission.

storage 8207) (e.g., where a binary low value indicates the buffer did not store an input since it was last cleared) and a backpressure bit from backpressure path (e.g., from port 8208B(1)) (e.g., where a binary low value indicates there is no backpressure) by OR logic gate 8254. In one embodiment, once the speculation values (e.g., from speculation paths) indicate the dataflow token is to be stored (e.g., in the next cycle) in control input buffer 8222B and control input buffer 8222C, the success value (e.g., a single bit) is driven by the producer PE 8200A to a value that the producer PE was able to successfully complete a transmission in the previous cycle (e.g., the value is stored in all of the multicast consumer PEs), e.g., as noted by the success value (e.g., success bit) (e.g., binary high, e.g., binary 1) being set in storage 8201. In one embodiment, the setting of the success value in storage 8201 causes a success value to be sent on a path from storage 8201 through network 8210 to (e.g., input) port 8212B(1) of (e.g., as consumer) second PE 8200B and to (e.g., input) port 8212C(1) of (e.g., as consumer) third PE 8200C. In one embodiment, receipt of success value from first PE 8200A (e.g., from storage 8201 thereof) by second PE 8200B is to cause the clearing of the reception bit in storage 8207, e.g., by scheduler 8214B. In one embodiment, receipt of success value from first PE 8200A (e.g., from storage 8201 thereof) by third PE 8200C is to cause the clearing of the reception bit in storage 8213, e.g., by scheduler 8214C.

NetPack

In one embodiment, a CSA architecture includes a configuration value that, when stored into the configuration storage (e.g., register), causes the CSA (e.g., a PE thereof) to perform a NetPack operation according to the following (e.g., semantics and/or description).

Operation: netpack{0-32}_{0-64} och.Cd.iKN, ich0.CRLu.iN, ich1.CRLu.iN, ..., ichK-1.CRLu.iN
Semantics: och = {ichK-1, ..., ich1, ich0}
Description: Packs K words of N bits into a single output word of K*N bits. Different packing ratios may be supplied. For example, pack_16_64 places four 16 bit words into one 64 bit word, while pack_32_64 packs two 32 bit words into a single 64 bit word.

In the first transmission attempt for this data token, if the backpressure value (e.g., ready value) on the path from port 8208B(1) of second PE 8200B to port 8208A(1) of first PE 8200A or the backpressure value (e.g., ready value) on the path from port 8208C(l) of third PE 8200C to port 8208A(1) of first PE 8200A indicate (e.g., as the output from AND logic gate 8252) there is backpressure (e.g., there is not storage available in both (e.g., all) of control input buffer 8222B and control input buffer 8222C, respectively), then one or more retransmissions of that dataflow token will occur until the speculation value from each of second (e.g., as consumer) PE 8200B and third (e.g., as consumer) PE 8200C indicates speculation is true, for example, until the speculation value is driven to a value by each of second (e.g., as consumer) PE 8200B and third (e.g., as consumer) PE 8200C that indicates that consumer PE (e.g., receiver) has either (i) accepted the data sent by the producer PE 8200A, e.g., as noted by the reception value (e.g., reception bit) being set (e.g., in a previous cycle) (e.g., in storage 8207 or storage 8213, respectively) or (ii) that the consumer is ready (e.g., by the next cycle) to receive the dataflow token (e.g., the backpressure value indicates that storage is currently available). For example, where the speculation value for control input buffer 8222B is formed by OR'ing the reception bit for the speculative path (e.g., reception bit from Coarse-grained reconfigurable arrays (e.g., a CSA) may support multiple data widths, yet some structures may operate at a finer or coarser granularity. For example, it may be more efficient from an area perspective to build a larger (e.g., 64 bit wide) communications networks or memory interfaces, but also to support smaller (e.g., 32 bit and smaller) data types. Due to properties of the PE interconnection in a circuit-switched network in a CSA, is possible to implement some data manipulations in parallel with network transit.

In certain embodiments, NetPack creates a single value from two smaller values sent from each of a plurality of transmitting PEs to the single receiving PE.

In certain embodiments, each local network endpoint is a mux, and the network includes AND logic gates and OR logic gates (or other logic gates) to combine signals from PEs, and NetPack utilizes the network to pack several data elements into one packed data value.

Unlike an embodiment of a pick operation, both transmitting PEs are to view the flow control line and both are to dequeue values for a NetPack operation. Unlike an embodiment of an All operation, the receiver PE is to input data from all (e.g., both) transmitting PEs, e.g., and this data is be latched in the cycle that it is ready. In certain embodiments, one transmitting PE may have a value to transmit, but the other transmitting PE does not, so stalling may be utilized, for example, by using the "opComplete" values from the receiver and state bit to prevent too many dequeues (e.g., state bit is to indicate (remember) the dequeue and prevent additional dequeues). In certain embodiments, the receiver PE is to observe flow control of both transmitter PEs to determine completion of the pack operation and set the pack complete indication (e.g., register) accordingly. In certain embodiments, the enqueue indication is modified to allow for the enqueue of multiple data elements into different portions of the receiver input queue. In one embodiment, the transmitter FIFO status state machine is augmented with bit tracking whether it has dequeued (e.g., queue status not updated if already updated) and the bit is cleared on 'complete' indication.

Figure 83:
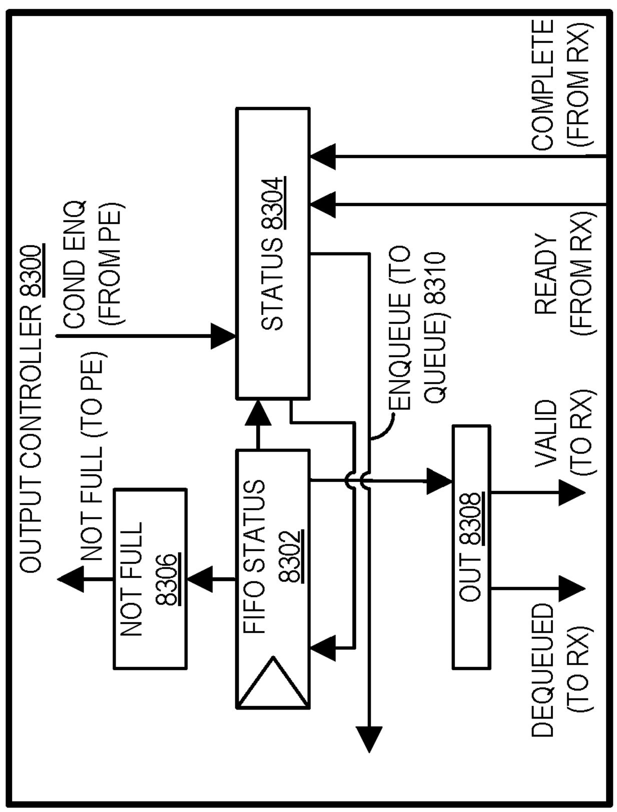
FIG. 83 illustrates output controller circuitry of output controller and/or output controller of processing element in FIG. 33 according to embodiments of the disclosure.

FIG. 83 illustrates output controller circuitry 8300 of output controller 3305 and/or output controller 3307 of processing element 3300 in FIG. 33 according to embodiments of the disclosure. In certain embodiments, this is the output controller for a transmitter PE for a NetPack operation. In one embodiment, each output queue (e.g., buffer) includes its own instance of output controller circuitry 8300, for example, 2, 3, 4, 5, 6, 7, 8, or more (e.g., any integer) of instances of output controller circuitry 8300. Depicted output controller circuitry 8300 includes a queue status register 8302 to store a value representing the current status of that queue (e.g., the queue status register 8302 storing any combination of a head value (e.g., pointer) that represents the head (beginning) of the data stored in the queue, a tail value (e.g., pointer) that represents the tail (ending) of the data stored in the queue, and a count value that represents the number of (e.g., valid) values stored in the queue). For example, a count value may be an integer (e.g., two) where the queue is storing the number of values indicated by the integer (e.g., storing two values in the queue). The capacity of data (e.g., storage slots for data, e.g., for data elements) in a queue may be preselected (e.g., during programming), for example, depending on the total bit capacity of the queue and the number of bits in each element. Queue status register 8302 may be updated with the initial values, e.g., during configuration time. Count value may be set at zero during initialization.

Depicted output controller circuitry 8300 includes a Status determiner 8304, a Not Full determiner 8306, and an Out determiner 8308. A determiner may be implemented in software or hardware. A hardware determiner may be a circuit implementation, for example, a logic circuit programmed to produce an output based on the inputs into the state machine(s) discussed below. Depicted (e.g., new) Status determiner 8304 includes a port coupled to queue status register 8302 to read and/or write to output queue status register 8302.

Depicted Status determiner 8304 includes a first input to receive a Ready value from a receiving component (e.g., a downstream PE) that indicates if (e.g., when) there is space (e.g., in an input queue thereof) for new data to be sent to the PE and a second input to receive a Complete value from the receiving component (e.g., a downstream PE) that indicates if (e.g., when) the NetPack operation is complete. In certain embodiments, the Ready value from the receiving component is sent by an input controller that includes input controller circuitry 3400 in FIG. 34. The Ready value may be referred to as a backpressure token, e.g., a backpressure token from a receiving PE sent to a transmitting PE. Depicted Status determiner 8304 includes a second input to receive a value or values from queue status register 8302 that represents that current status of the output queue that output controller circuitry 8300 is controlling. Optionally, Status determiner 8304 includes a third input to receive a value (from within the PE that includes output controller circuitry 3400) that indicates if (when) there is a conditional enqueue, e.g., from operation circuitry 3325 and/or operation circuitry 3327 in FIG. 33.

As discussed further below, the depicted Status determiner 8304 includes a first output to send a value on path 8310 that will cause output data (sent to the output queue that output controller circuitry 8300 is controlling) to be enqueued into the output queue or not enqueued into the output queue. Depicted Status determiner 8304 includes a second output to send an updated value to be stored in queue status register 8302, e.g., where the updated value represents the updated status (e.g., head value, tail value, count value, or any combination thereof) of the output queue that output controller circuitry 8300 is controlling.

Output controller circuitry 8300 includes a Not Full determiner 8306 that determines a Not Full (e.g., Ready) value and outputs the Not Full value, e.g., within the PE that includes output controller circuitry 8300, to indicate if (e.g., when) there is storage space available for output data in the output queue being controlled by output controller circuitry 8300. In one embodiment, for an output queue of a PE, a Not Full value that indicates there is no storage space available in that output queue is to cause a stall of execution of the PE (e.g., stall execution that is to cause a resultant to be stored into the storage space) until storage space is available (e.g., and when there is available data in the input queue(s) being sourced from in that PE).

Output controller circuitry 8300 includes an Out (e.g., logic) determiner 8308 that determines an output storage (queue) status value and outputs (e.g., on path 3345 or path 3347 in FIG. 33) an output storage (queue) status value that indicates a 'valid' value (e.g., by asserting a "not empty" indication value or an "empty" indication value) when the output queue being controlled contains (e.g., new) output data (e.g., dataflow token or tokens), for example, so that output data may be sent to the receiving PE and a dequeued status value that indicates to the receiver PE when the transmitter PE has dequeued a value from its output queue during the current pack operation. In certain embodiments, the output storage (queue) status value (e.g., being a value that indicates the output queue of the sending PE is not empty) is one of the two control values (with the other being that input storage of the receiving PE coupled to the output storage is not full) that is to stall transmittal of that data from the sending PE to the receiving PE until both of the control values indicate the components (e.g., PEs) may proceed to transmit that (e.g., payload) data (e.g., with a Ready value for the input queue(s) that is to receive data from the transmitting PE and a Valid or a Dequeue value for the input queue(s) in the receiving PE that is to store the data). An example of determining the Ready value for an input queue is discussed above in reference to FIG. 34. In certain embodiments, output controller circuitry includes any one or more of the inputs and any one or more of the outputs discussed herein.

For example, assume that the operation that is to be performed is to send (e.g., sink) data into both output storage 3334 and output storage 3336 in FIG. 33. Two instances of output controller circuitry 8300 may be included to cause a respective output value(s) to be enqueued into output storage 3334 and output storage 3336 in FIG. 33. In this example, each output controller circuitry instance may send a Not Full value within the PE containing output storage 3334 and output storage 3336 (e.g., to operation circuitry) to cause the PE to operate on its input values (e.g., when the input storage to source the operation input(s) is also not empty).

In comparison to FIG. 44, Status determiner 8304 includes a "complete" indication from receiver PE, and Out determiner 8308 includes a "dequeued" indication compared to the Not Empty determiner in FIG. 44.

FIGS. 84-86 indicate the state machines for the output controller of a transmitter PE for a NetPack operation according to embodiments of the disclosure.

State machine in FIG. 84 produces a value indicating that the status 8302 of the output controller should be updated to reflect the dequeue of a value in the output queue. In certain embodiments, the status determiner 8304 operates according to this state machine.

The && symbol indicates a logical AND operation. The || symbol indicates a logical OR operation. The ! symbol indicates a logical NOT operation.

State machine in FIG. 85 produces a "DEQ_DONE" value for storage in the output controller status 8302 indicating whether a dequeue has occurred in this output controller during the present pack operation execution. For example, the stored value is set to one value to indicate that a dequeue has occurred when a dequeue occurs, and set to a different value when the receiver indicates the pack operation has completed by setting a value in "complete" and no dequeue simultaneously occurs.

State machine in FIG. 86 shows the state machine used in the Out determiner 8308 in output controller 83. In one embodiment, two values are calculated: "valid" indicates that this output controller has data available in its output queue (e.g. 9734B, 9734A) and "dequeued" indicating that the output controller has data available in its output queue (e.g. 9734B, 9734A) or that data has already been dequeued during this operation as noted by the "DEQ_DONE" value stored in status storage 8302.

FIGS. 87-93 indicate the state machines for an input controller of a receiver PE for a NetPack operation according to embodiments of the disclosure. Although two transmitters are shown (e.g. 9600A, 9600B), it should be understood that more transmitters may participate in the NetPack operation (e.g. if packing more than two values into a single data value). FIGS. 87-93 sometimes refer to a 'cfg' value. In one embodiment, this is a field in the PE configuration (e.g. 9719C) which when set to a first value, indicates that the input queue (e.g. 9826C) associated with the field is a receiver in a NetPack operation, and when set to a second value, the 'cfg' field indicates that the input queue (e.g. 9826C) is to follow a different communications protocol.

FIG. 87 shows a Ready determiner (e.g. 9609) for the 'ready' value of a receiver (e.g. 9700C). In one embodiment, a first value for 'ready' indicates that the receiver (e.g. 9700C) can receive more data from transmitters (e.g. 9700A, 9700B), and a second value for ready indicates that the receiver cannot receive any more data (e.g. because its input queue storage is full) and the transmitter is to stall until the receiver has room in its storage.

FIG. 89 calculates a value indicating that a pack result is available in the input queue (e.g. 9826C) for use in operations indicated by the configuration (e.g. 9819C) of a receiving processing element (9700C).

FIG. 90 shows a "Merge Control" determiner (e.g. 9602) that calculates whether particular subcomponents of a NetPack operation have been transmitted by transmitter PEs (e.g. 9700A, 9700B). In one embodiment, this value is calculated per transmitter based on the value stored in the "En12ready" storage for that particular transmitter. In one embodiment, the values associated (e.g. the values from the network which are to be used to calculate merge control values) with the transmitters involved in the NetPack are indicated in the switch decode storage (e.g. 9605), which is used to select among the network inputs to the PE.

FIG. 91 describes an "En12ready" determiner (e.g. a subcomponent of 9607) which calculates values to be stored into "En12ready" storage (e.g. 9705C and 9707, part of QueueStatus 9606). In one embodiment, the "En12ready" storage is provisioned for each transmitter that may participate in the NetPack operation (e.g. two in FIG. 98A). In certain embodiments, the "En12ready" value indicates whether the input queue has already enqueued a value from a particular transmitter PE (e.g. 9700A, 9700B) during this NetPack operation, e.g., En12ready is set to a first value indicating that a value has been enqueued from a particular transmitter during the current NetPack operation, and En12ready is set to a second value indicating that a value has not yet been enqueued in the current NetPack operation if the "OpComplete" value is indicated and no enqueue (e.g. 9603) is indicated.

FIG. 92 is a determiner for enqueueing into an input queue (e.g. 9603) a value from a transmitter. In one embodiment, this determiner is a subcomponent of the Queue Status determiner (e.g. 9607). In certain embodiments, the enqueue value is determined for each transmitter that may participate in the NetPack operation (e.g. two in FIG. 98A), e.g., the Enqueue is set to a value indicating that an enqueue will occur when storage is available in the input queue, the transmitter indicated by the value stored in the switch decode storage (9605) assert that it has available data, and the En12ready storage indicates that data from the indicated transmitter has not yet been enqueued for this execution of NetPack. Enqueue causes a partial write of one element of the data storage of the input queue (e.g. 9826C) corresponding to the transmitter supplying the queue data.

The state machine in FIG. 88 calculates operation completion in the current cycle of "opWillComplete". The "opWillComplete" state machine is a subcomponent of the queue state determiner (e.g. 9607) of the input queue (e.g. the tail pointer and data count) associated with enqueuer operations are updated only when MC determiner indicates that a NetPack operation will complete in this cycle.

FIG. 3.6A] is a tail pointer determiner. The tail pointer status storage is updated when "opWillComplete" is asserted to the value decided by the tail pointer determiner.

FIG. 93 is a determiner for the OpComplete (e.g. 9608) value (OPCOMPLETE(COMBINED) in FIG. 36.A>) sent to the transmitters indicating that a NetPack operation completed in the prior cycle. In one embodiment, OpComplete is asserted when "En12ready" storage (e.g. 9705C and 9707) are set to indicate that all transmitters transmitted a value during the prior NetPack operation.

FIG. 94 illustrates a tail determiner state machine 9400 according to embodiments of the disclosure. In certain embodiments, tail determiner 3604 in FIG. 36 operates according to state machine 9400. In one embodiment, tail determiner 3604 in FIG. 36 includes logic circuitry that is programmed to perform according to state machine 9400. State machine 9400 includes inputs for an input queue of the input queue's: current tail value (e.g., from queue status register 3402 in FIG. 34 or queue status register 3502 in FIG. 35), capacity (e.g., a fixed number), ready value (e.g., output from Not Full determiner 3406 in FIG. 34), and valid value (for example, from a transmitting component (e.g., an upstream PE) as discussed in reference to FIG. 34 or FIG. 43). State machine 9400 outputs an updated tail value based on those inputs. The && symbol indicates a logical AND operation. The <= symbol indicates assignment of a new value, e.g., tail<=tail+1 assigns the value of the previous tail value plus one as the updated tail value. In FIG. 35, an (e.g., updated) tail value is used as a control input to multiplexer 3506 to help select a tail slot of the input queue 3504 to store new input data into.

FIG. 95 illustrates a count determiner state machine 9500 according to embodiments of the disclosure. In certain embodiments, count determiner 3606 in FIG. 36 operates according to state machine 9500. In one embodiment, count determiner 3606 in FIG. 36 includes logic circuitry that is programmed to perform according to state machine 9500. State machine 9500 includes inputs for an input queue of the input queue's: current count value (e.g., from queue status register 3402 in FIG. 34 or queue status register 3502 in FIG. 35), ready value (e.g., output from Not Full determiner 3406 in FIG. 34), valid value (for example, from a transmitting component (e.g., an upstream PE) as discussed in reference to FIG. 34 or FIG. 43), conditional dequeue value (e.g., output from conditional dequeue multiplexers 3329 and 3331 in FIG. 33), and not empty value (e.g., from Not Empty determiner 3408 in FIG. 34). State machine 9500 outputs an updated count value based on those inputs. The && symbol indicates a logical AND operation. The + symbol indicates an addition operation. The − symbol indicates a subtraction operation. The <= symbol indicates assignment of a new value, e.g., to the count field of queue status register 3402 in FIG. 34 or queue status register 3502 in FIG. 35. Note that the asterisk symbol indicates the conversion of a Boolean value of true to an integer 1 and a Boolean value of false to an integer 0.

Figure 96:
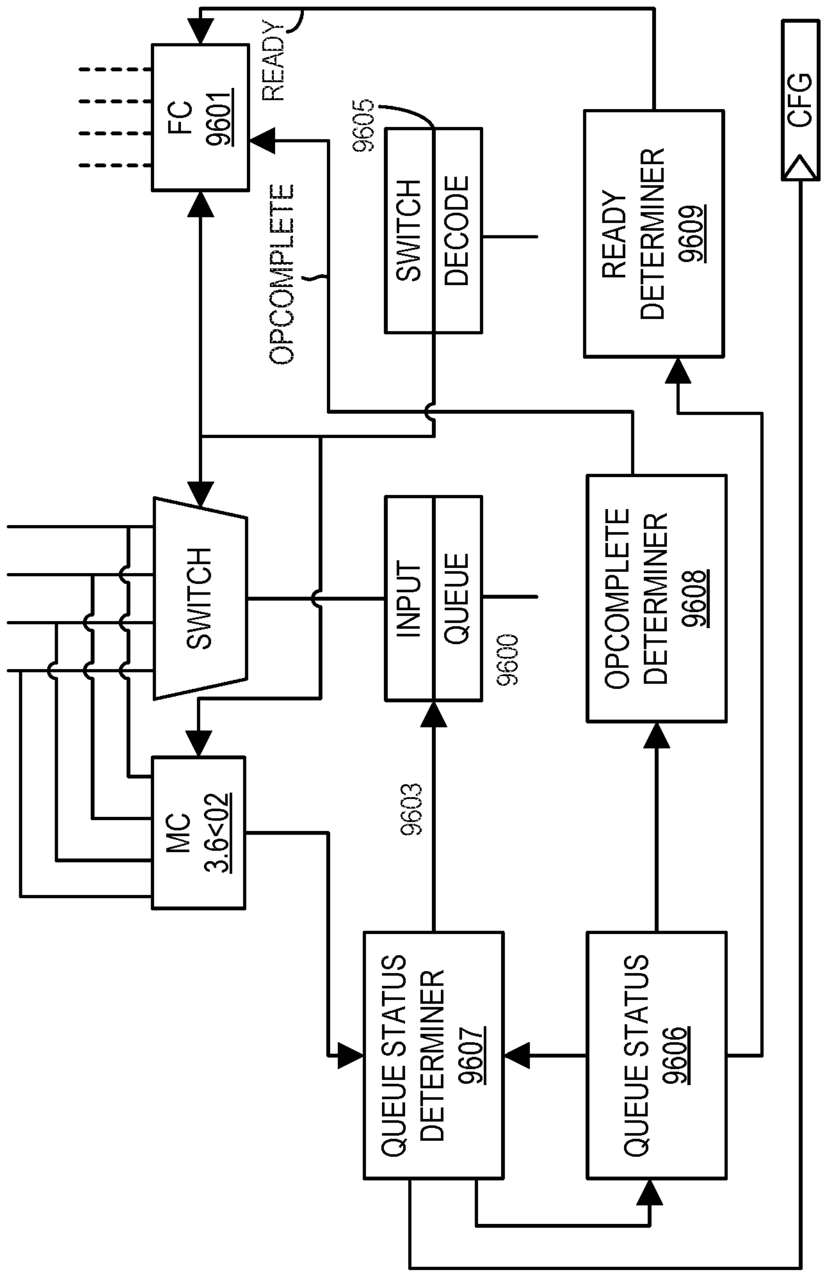
FIG. 96 illustrates a multiplexer decoder circuit according to embodiments of the disclosure.

FIG. 96 illustrates a multiplexer decoder circuit 9600 according to embodiments of the disclosure. In certain embodiments, input buffers (e.g., queues) (e.g. 9826C) are viewed as partitioned, denoted by [i] above, with partitions corresponding to the number of elements that are to be used to create the packed data resultant, and this results in independent enqueuer signals for the input queue partitions. In certain embodiments, state bits are used per packed element to note if enqueue has occurred, e.g., where "En12ready" (e.g. 9705C and 9707, part of storage 9606) prevents subsequent enqueue of data from next frame, "Op complete" (e.g. 9608) is derived from conjunction of En12ready, and merge control (MC), (e.g. 9602), is used to calculate completion to produce a value indicating whether operation partition completes. In certain embodiments, the flow control values indicating "op completion" are fanned to both NetPack transmitter PEs (e.g., where configuration bits are selected among multiple reception modes) (9700A, 9700B). In certain embodiments, the flow control values indicating "ready" are fanned to both NetPack transmitter PEs (e.g., where configuration bits are selected among multiple reception modes) (9700A, 9700B).

Figure 97:
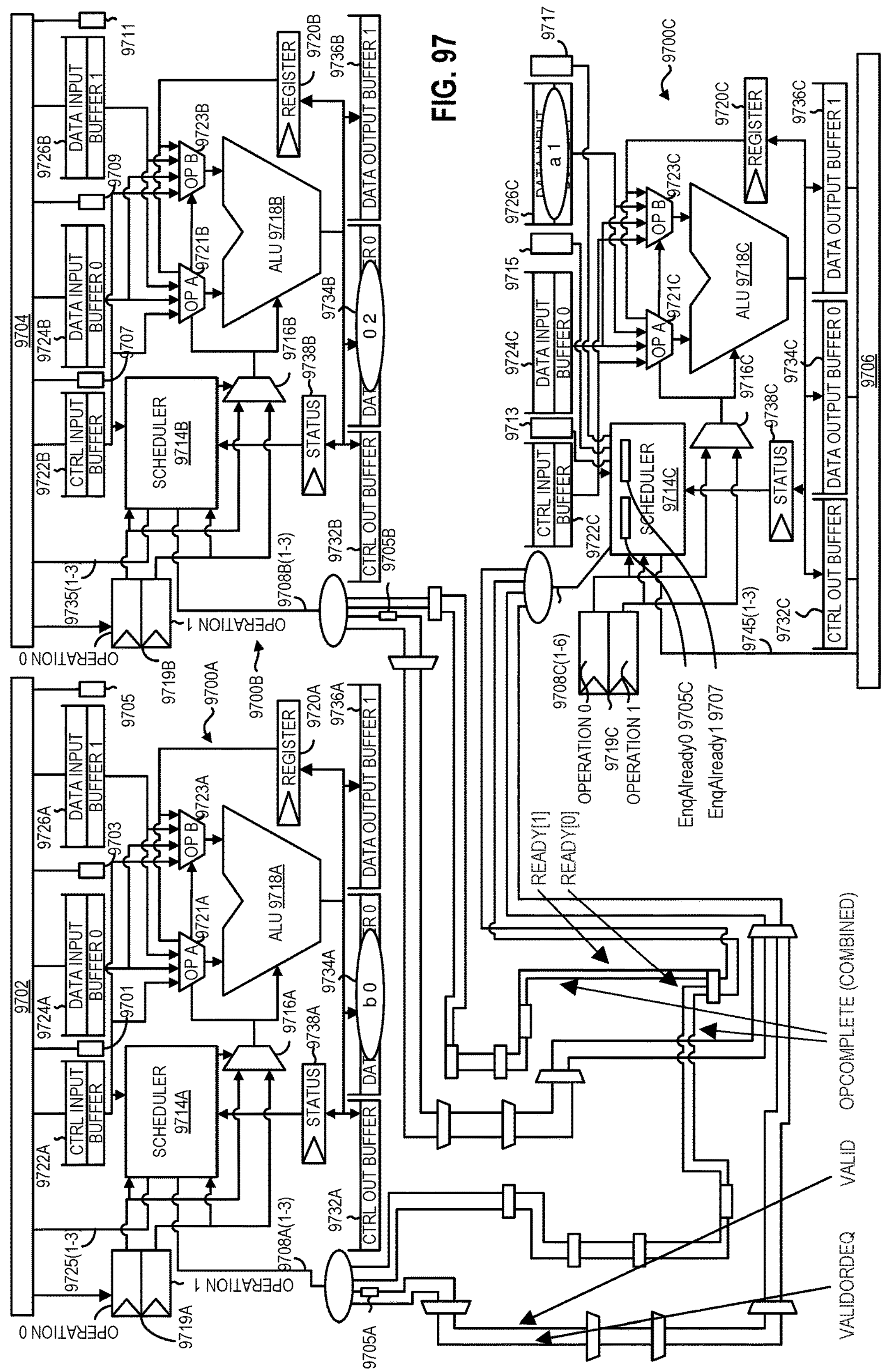
FIG. 97 illustrates a first processing element (PE) and a second processing element (PE) coupled to a third processing element (PE) by a network according to embodiments of the disclosure.

FIG. 97 illustrates a first processing element (PE) 9700A and a second processing element (PE) 9700B coupled to a third processing element (PE) 9700C by a network 9710 according to embodiments of the disclosure. In one embodiment, network 9710 is a circuit switched network, e.g., configured to send a first value from first PE 9700A and second value from second PE 9700B to third PE 9700C.

In one embodiment, a circuit switched network 9710 includes (i) a data path to send data from first PE 9700A to third PE 9700C and a data path from second PE 9700B to third PE 9700C, and (ii) a flow control path to send control values that controls (or is used to control) the sending of that data from first PE 9700A and second PE 9700B to third PE 9700C. Data path may send a data (e.g., valid) value when data is in an output queue (e.g., buffer) (e.g., when data is in control output buffer 9732A, first data output buffer 9734A, or second data output queue (e.g., buffer) 9736A of first PE 9700A and when data is in control output buffer 9732B, first data output buffer 9734B, or second data output queue (e.g., buffer) 9736B of second PE 9700B). In one embodiment, each output buffer includes its own data path, e.g., for its own data value from producer PE to consumer PE. Components in PE are examples, for example, a PE may include only a single (e.g., data) input buffer and/or a single (e.g., data) output buffer. Flow control path may send control data that controls (or is used to control) the sending of corresponding data from first PE 9700A and second PE 9700B to third PE 9700C. Flow control data may include a backpressure value from each consumer PE (or aggregated from all consumer PEs, e.g., with an AND logic gate). Flow control data may include a backpressure value, for example, indicating a buffer of the third PE 9700C that is to receive an input value is full.

Turning to the depicted PEs, processing elements 9700A-C include operation configuration registers 9719A-C that may be loaded during configuration (e.g., mapping) and specify the particular operation or operations (for example, to indicate whether to enable NetPack mode or not). In one embodiment, all the operation configuration registers for transmitter PEs and the receiver PE are loaded with the operation configuration value for NetAll0 (e.g., a first configuration value for a PE to be in receiver NetAll mode and a second configuration value for a PE to be in transmitter NetAll mode).

Multiple networks (e.g., interconnects) may be connected to a processing element, e.g., networks 9702, 9704, 9706, and 9710. The connections may be switches, e.g., as discussed in reference to FIGS. 10A and 10B. In one embodiment, PEs and a circuit switched network 9710 are configured (e.g., control settings are selected) such that circuit switched network 9710 provides the paths for NetAll0.

Depicted network 9710 includes a dataflow path and a flow control (e.g., backpressure) path with the paths as indicated. First processing element (PE) 9700A includes storage (e.g., a register) 9705A to store a dequeue completed (done) value for its output queue(s), second processing element (PE) 9700B includes storage (e.g., a register) 9705B to store a to store a dequeue completed (done) value for its output queue(s), and third processing element (PE) 7000C includes storage (e.g., a register) 7005C to store an operation complete ready (e.g., en12ready[0]) value when third PE 9700C has received the first value from the first PE 9700A and storage (e.g., a register) 7007C to store an operation complete ready (e.g., en12ready[1]) value when third PE 9700C has received the second value from the second PE 9700A.

FIG. 98A-F illustrate first processing element (PE) 9700A and second processing element (PE) 9700B coupled to a third processing element (PE) 9700C by a network 9710 and performing a NetPack operations according to embodiments of the disclosure. FIG. 98A-F show an embodiment according to a two wire protocol, but it should be understood that a four-wire protocol as described herein, or other protocols, may also be used.

Figure 98A:
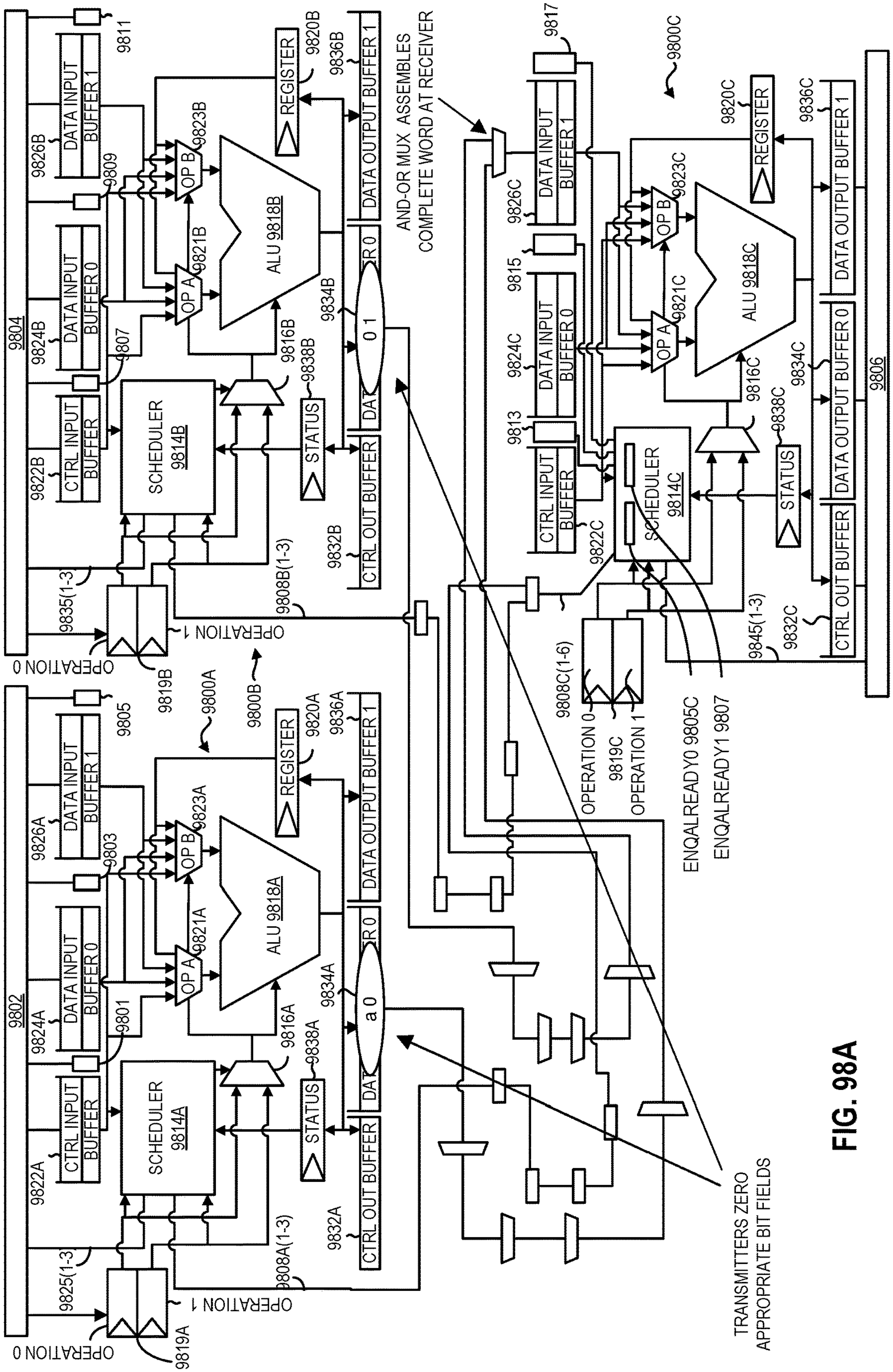
FIG. 98A-F illustrate first processing element (PE) and second processing element (PE) coupled to a third processing element (PE) by a network and performing a NetPack operations according to embodiments of the disclosure.

In FIG. 98A, first processing element (PE) 9700A includes a first value (e.g., indicated by the circled a0) in its output buffer and second processing element (PE) 9700B includes a second value (e.g., indicated by the circled 01) in its output buffer, and a valid indication is sent from both of the first processing element (PE) 9700A and second processing element (PE) 9700B to the third processing element (PE) 9700C. Processing elements (e.g. 9700A for the lower half, and 9700B for the upper half) have been configured to zero out appropriate portions of the transmitted data words. These data words will be combined in the network multiplexors to form a data word of full (e.g. the combination of the lower and upper halves) width at the third processing element.

Figure 98B:
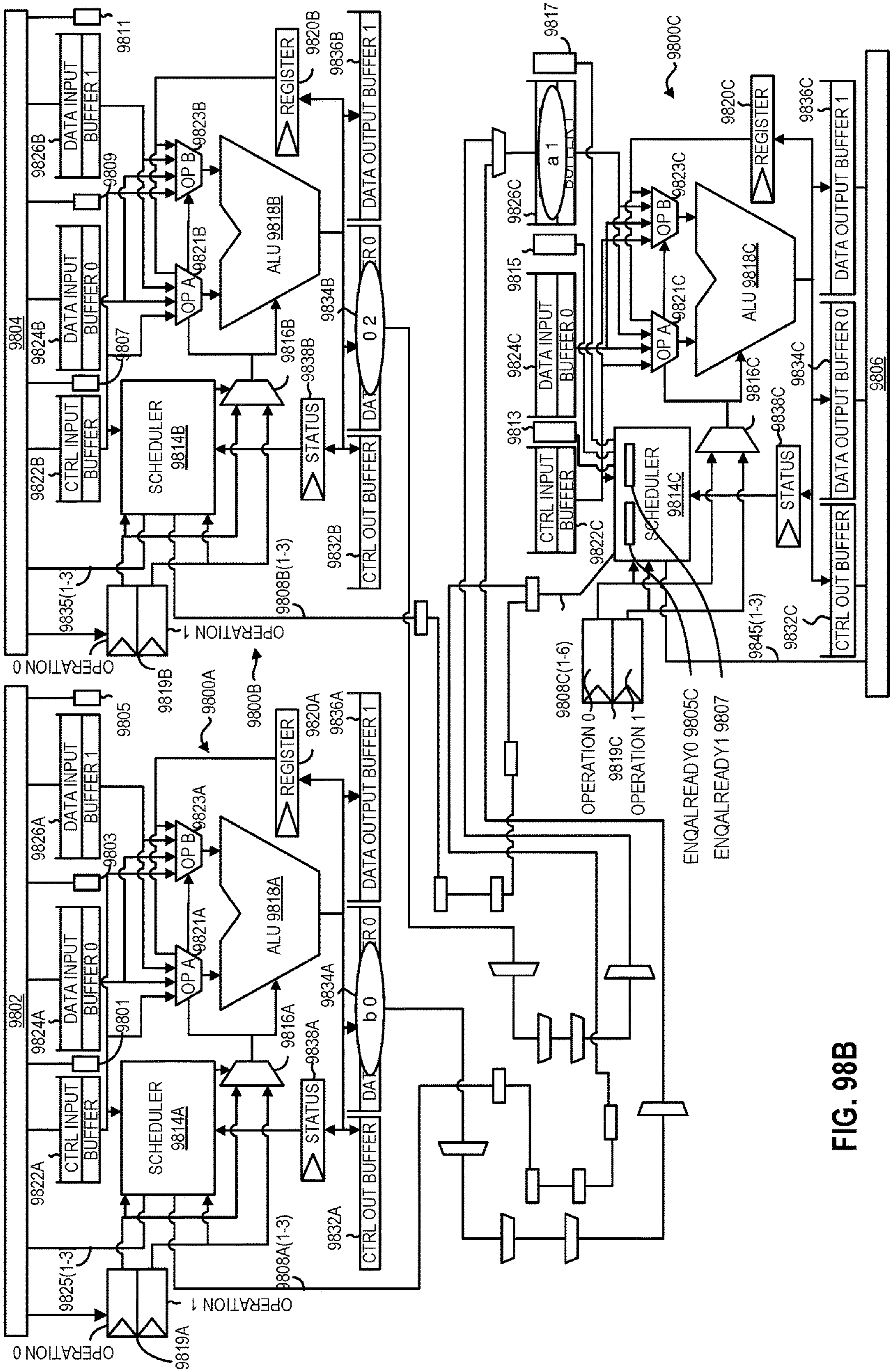

In FIG. 98B, first processing element (PE) 9700A has sent (e.g., a first half) of the first value (e.g., indicated by the circled a portion) from its output buffer and second processing element (PE) 9700B has sent (e.g., a second half) of the second value (e.g., indicated by the circled 1) from its output buffer to the input buffer of third processing element (PE) 9700C to create the packed data (indicated by a circled a1). Values a0 and 01 have been dequeued, and first processing element (PE) 9700A includes a third value (e.g., indicated by the circled b0) in its output buffer and second processing element (PE) 9700B includes a fourth value (e.g., indicated by the circled 02) in its output buffer, and a valid indication is sent from both of the first processing element (PE) 9700A and second processing element (PE) 9700B to the third processing element (PE) 9700C again.

Figure 98C:
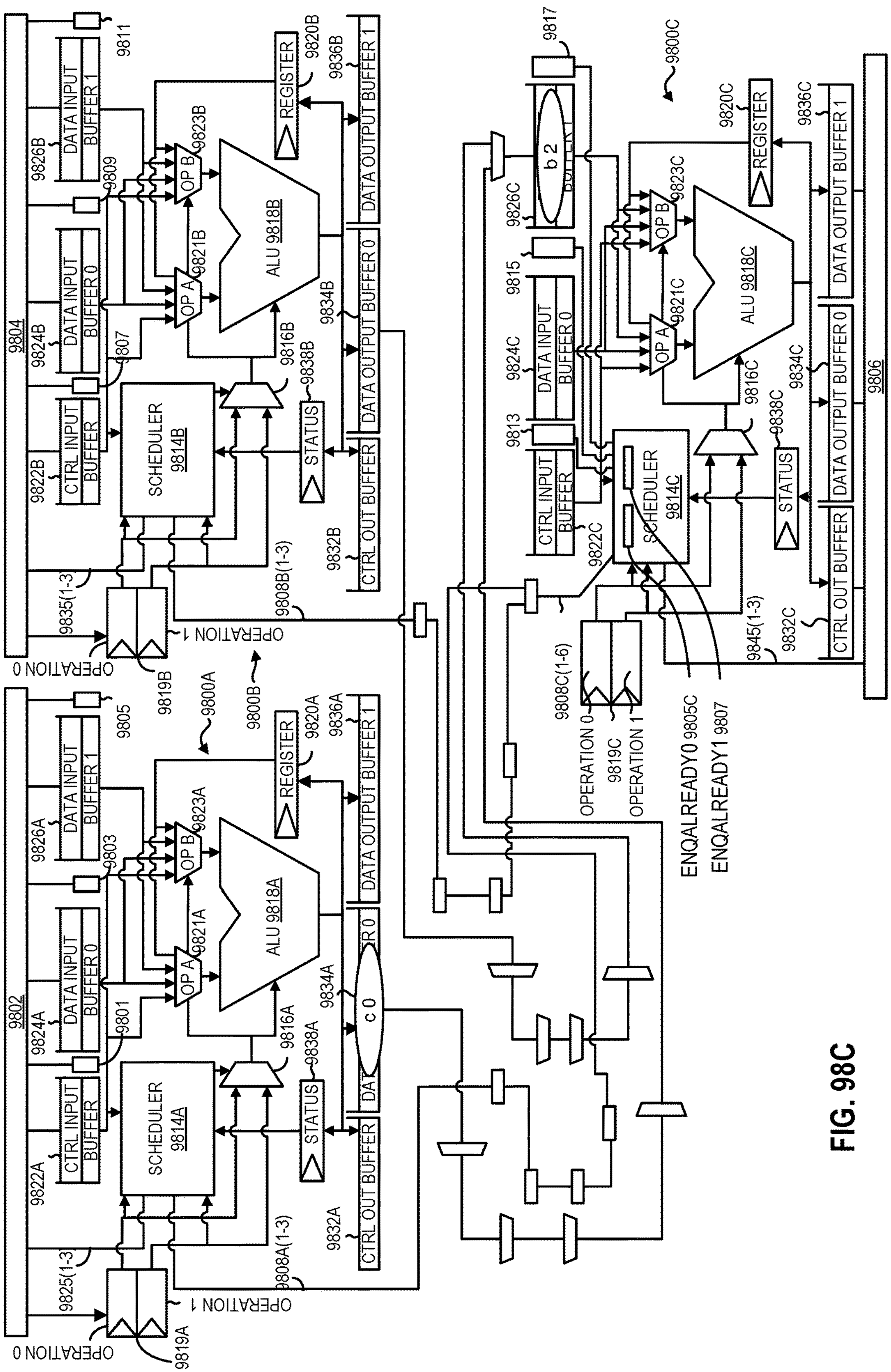

In FIG. 98C, first processing element (PE) 9700A has sent (e.g., a first half) of the third value (e.g., indicated by the circled b portion) from its output buffer and second processing element (PE) 9700B has sent (e.g., a second half) of the fourth value (e.g., indicated by the circled 2) from its output buffer to the input buffer of third processing element (PE) 9700C (indicated by a circled b2). Values b0 and 02 have been dequeued, and first processing element (PE) 9700A includes a fifth value (e.g., indicated by the circled c0) in its output buffer but second processing element (PE) 9700B has not received another value.

Figure 98D:
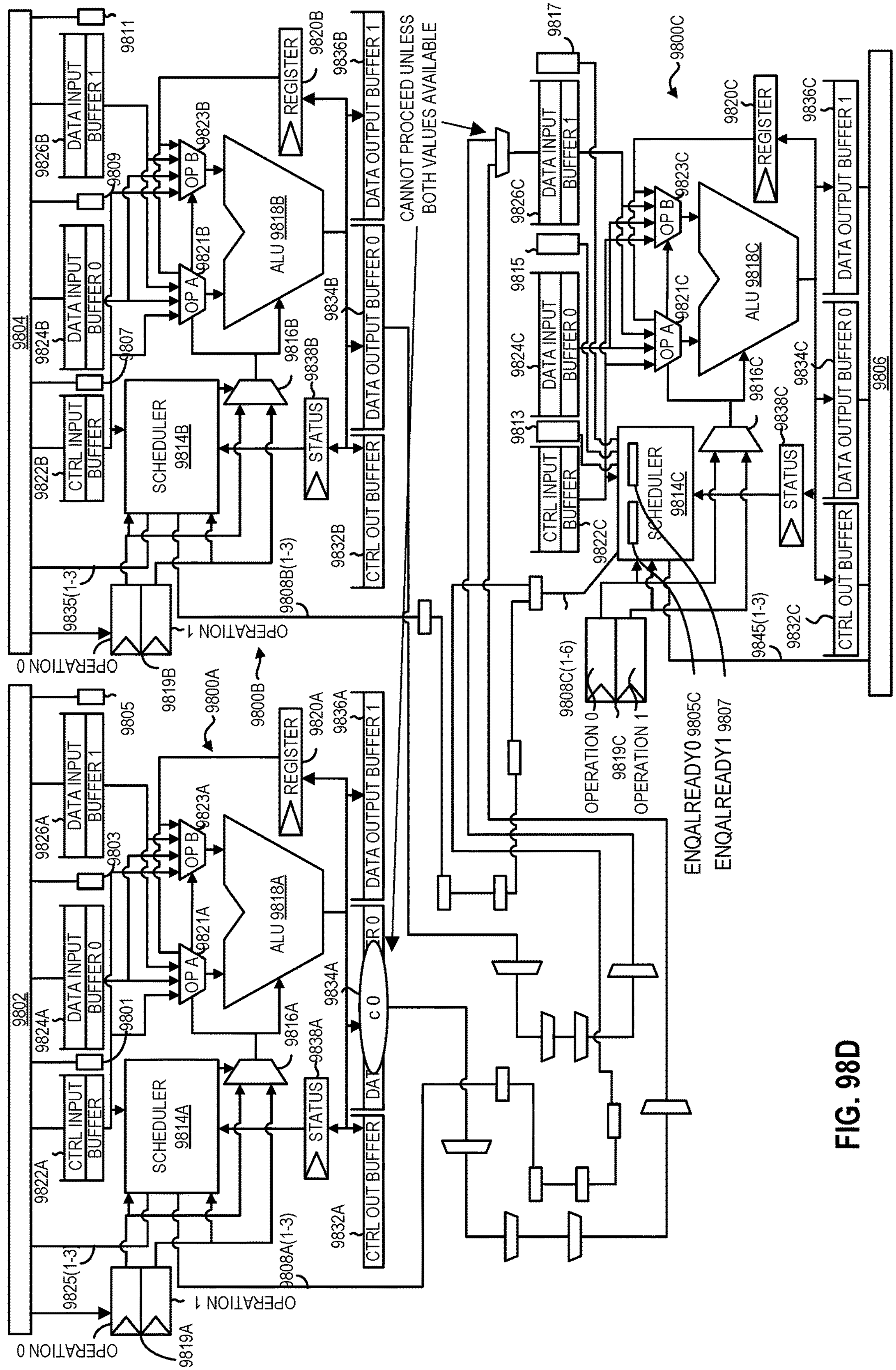

In FIG. 98D, first processing element (PE) 9700A still includes the fifth value (e.g., indicated by the circled c0) in its output buffer but second processing element (PE) 9700B has not received another value. The value b2 has been consumed from the output buffer of the third processing element (PE) 9700C.

Figure 98E:
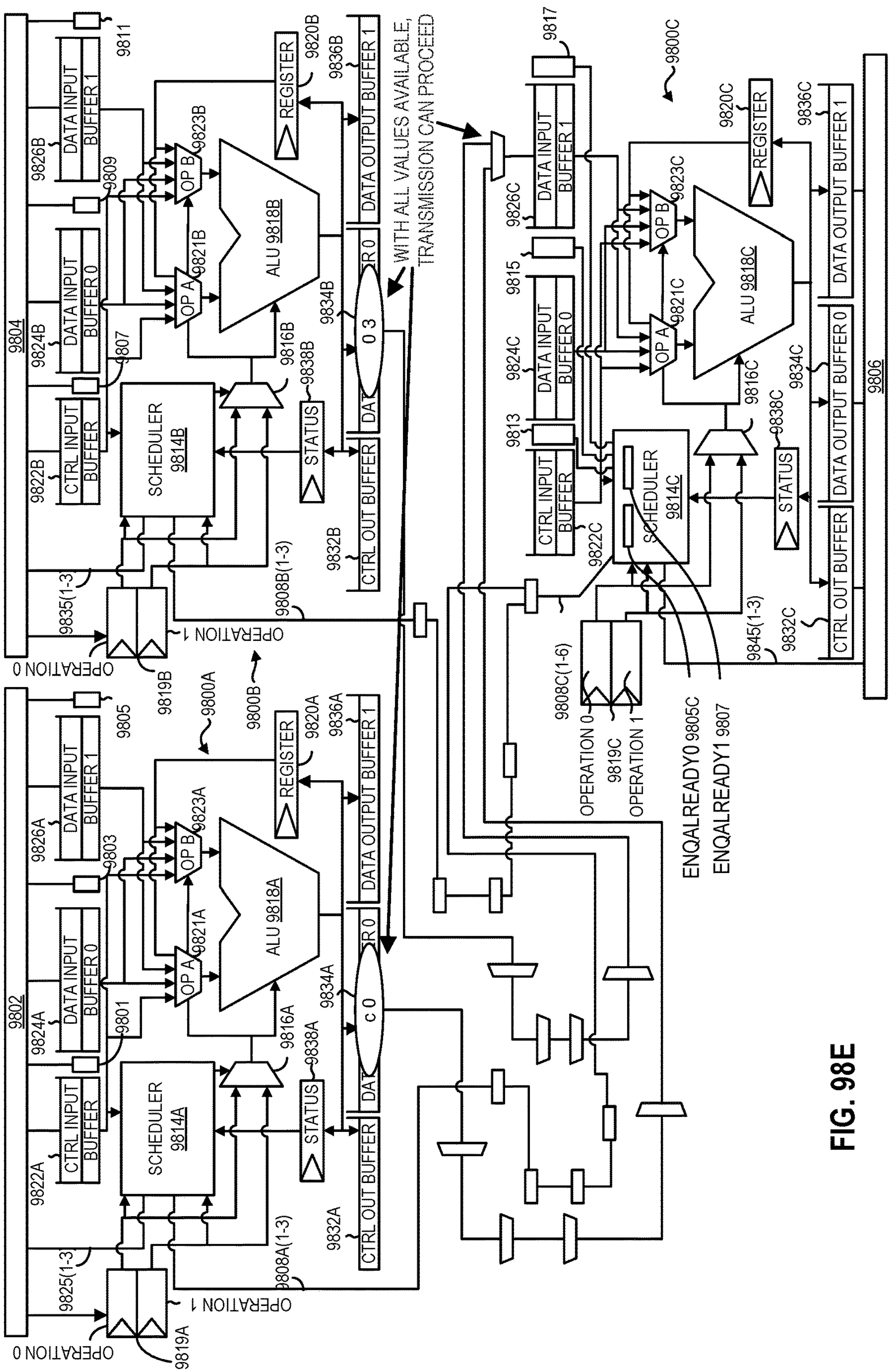

In FIG. 98E, first processing element (PE) 9700A still includes the fifth value (e.g., indicated by the circled c0) in its output buffer, and second processing element (PE) 9700B has received a sixth value (e.g., indicated by the circled 03) in its output buffer, and a valid indication is sent from both of the first processing element (PE) 9700A and second processing element (PE) 9700B to the third processing element (PE) 9700C again.

Figure 98F:
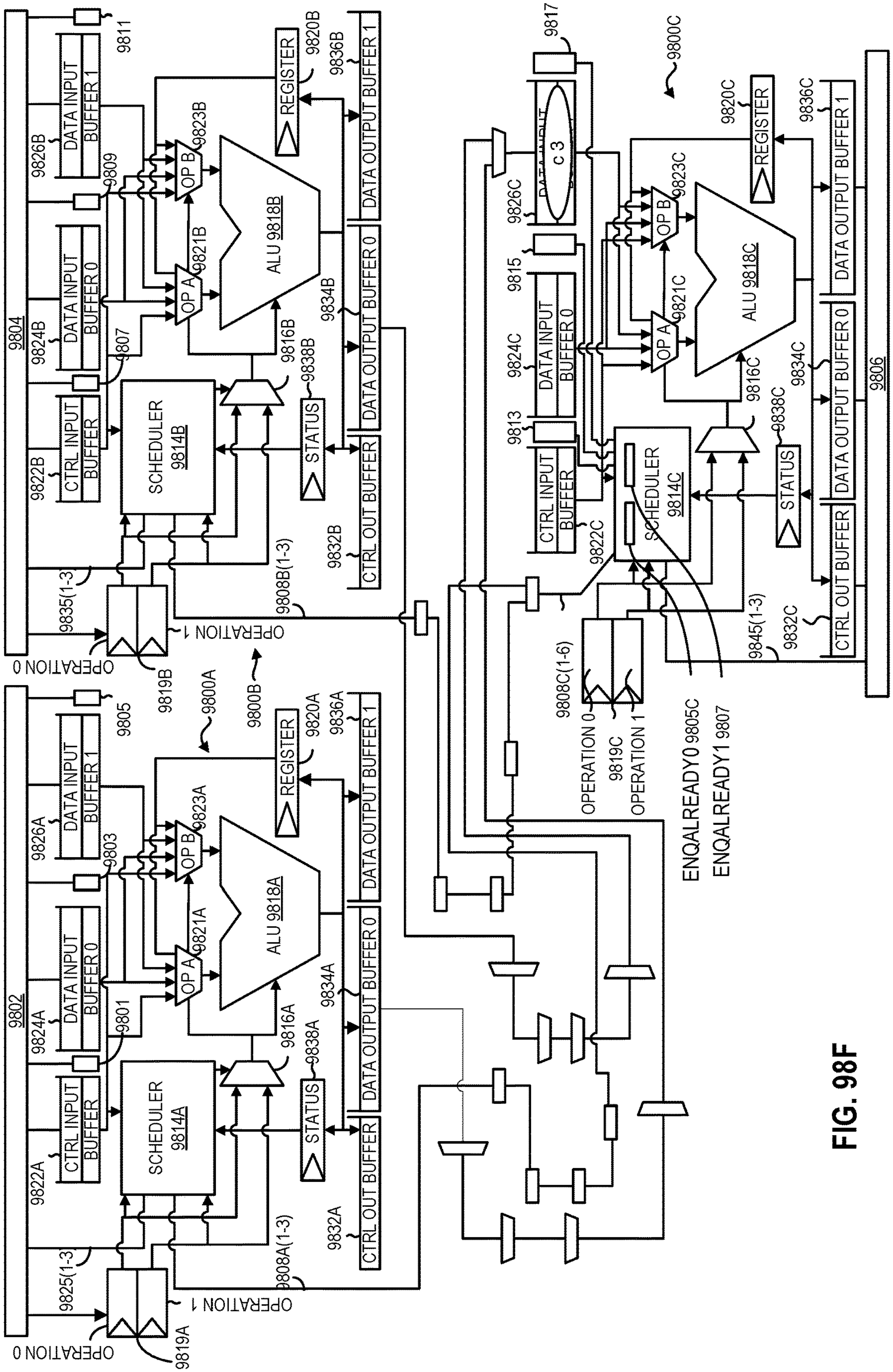

In FIG. 98F, first processing element (PE) 9700A has sent (e.g., a first half) of the fifth value (e.g., indicated by the circled c portion) from its output buffer and second processing element (PE) 9700B has sent (e.g., a second half) of the sixth value (e.g., indicated by the circled 3) from its output buffer to the input buffer of third processing element (PE) 9700C to create the packed data (indicated by a circled c3).

In one embodiment, all transmitters are required to send a value simultaneously, so the control fan-in into the receiver PE from the transmitter PEs allows the receiver to accept data only when all transmitters have data in their output queues (e.g., and are all sending a Valid indication).

Repeato

In one embodiment, a CSA architecture includes a configuration value that, when stored into the configuration storage (e.g., register), causes the CSA (e.g., a PE thereof) to perform a Repeato operation according to the following (e.g., semantics and/or description).

```
Operation: repeato{10-64} och.Cd.iN, cch.CRLu.iI, v.CRLu.iN
Semantics: do { och = *v; } while (cch.in); v
   where * is non-destructive read of input
NOTE: the initial write to och is done as soon as v is available, and is not gated on cch.
Description: This generates copies of v to och for the number of times cch is true (e.g., one),
plus one. When cch is false, v is consumed. e.g. a control sequence of 1,1,1,0 for a data
value n would generate 4 copies of n for repeato, rather than the 3 copies of n that repeat
would produce.
```

FIGS. 99A-99G illustrate a processing element 9900 performing a Repeato operation according to embodiments of the disclosure. In the depicted embodiment, an operation configuration value for a Repeato operation is stored (e.g., during a programming time period) into operation configuration register 9919. PE 9900 includes state storage 9901 (e.g., a single bit register) to track whether a data value (e.g., data token) is to be transmitted on receipt of a zero control token.

In certain embodiments, the Repeato operation causes PE 9900 to produce a Boolean value (e.g., zero) internally in state storage 9901 when a data value is output into an output queue, but no associated control value (e.g., one or zero) has been received in input queue of the PE. In one embodiment, when the state bit in state storage 9901 is set to zero, no new data value it output unless an associated control value of one is received.

In FIGS. 99B-99G, the numbers in the circles for the bits in (e.g., control) input queue 9922 indicate a one for each time a data value is to be output but not dequeued from the input queue 9924, and a zero for when that data value is to be output and dequeued from the input queue 9924 (e.g., according to the “repeato” operation in the above discussion), and the numbers in the circles for the bits in input queue 9924 and output queue 9934 are instances of a value and not the values themselves (e.g., circled two may represent that the value is a 64 bit value).

Figure 99A:
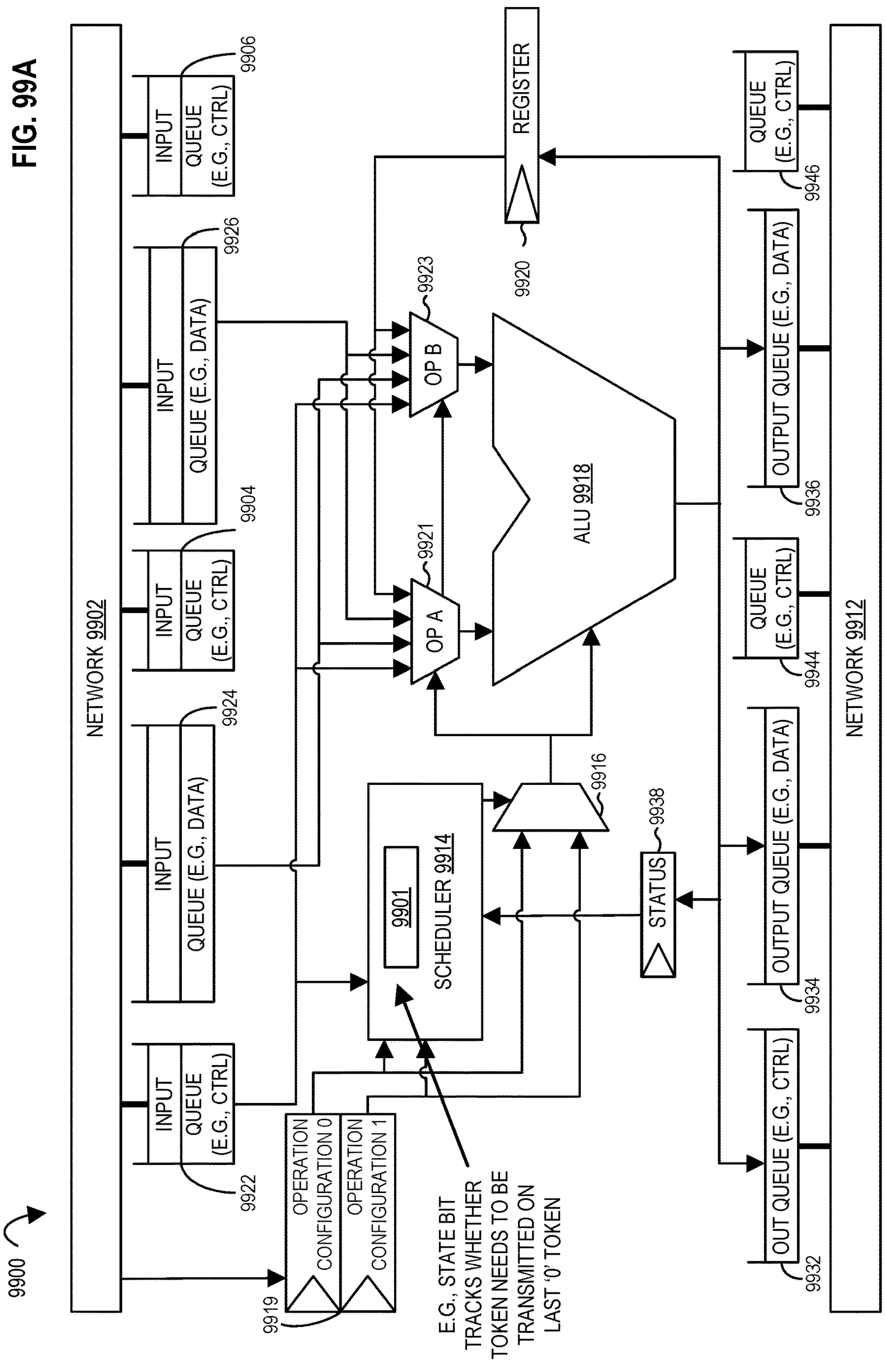
FIGS. 99A-99G illustrate a processing element performing a Repeato operation according to embodiments of the disclosure.
Figure 99B:
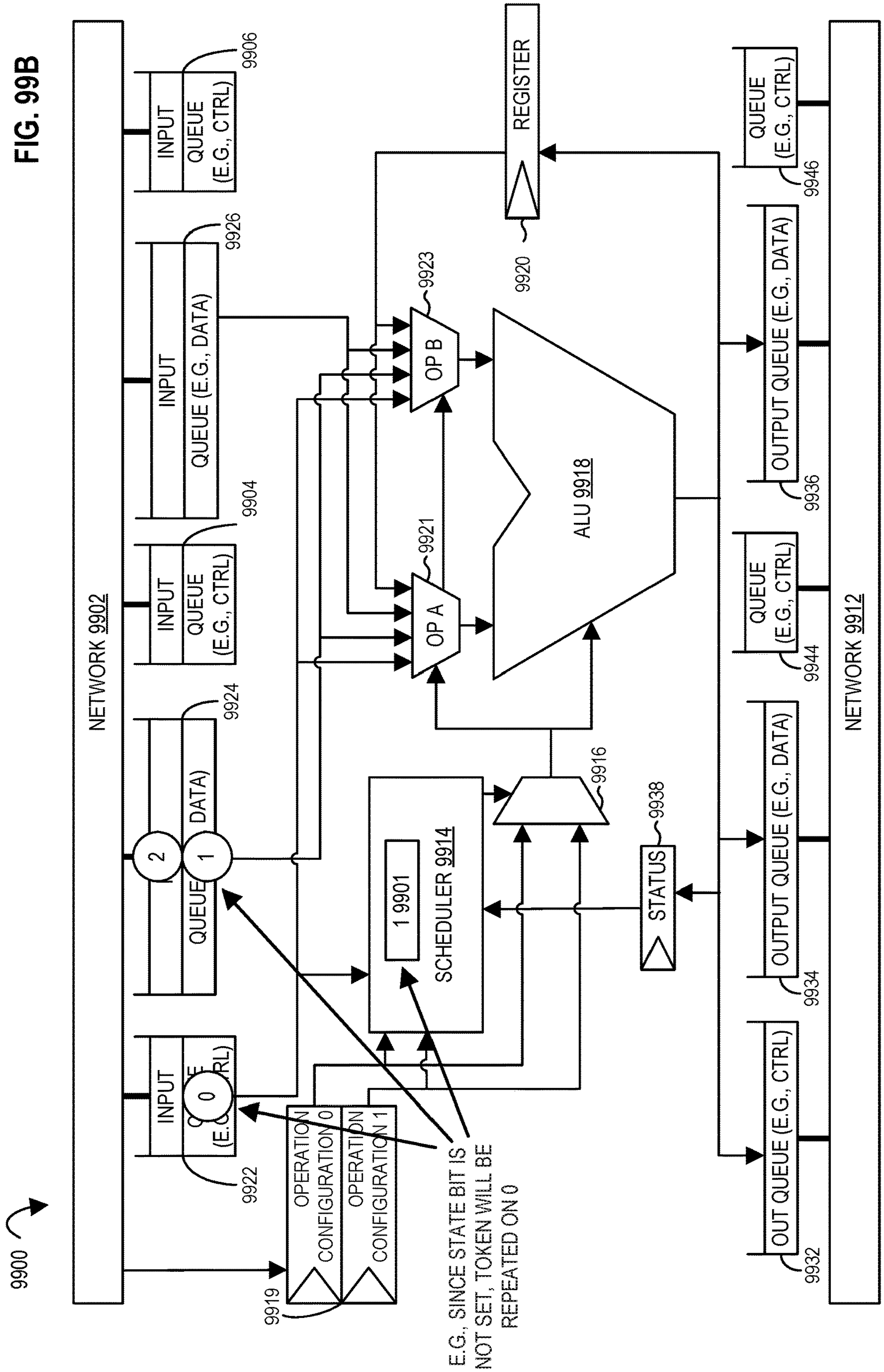

In FIG. 99B, data value (labeled as circled 1) is stored in the first slot of (e.g., wider) input queue 9924, data value (labeled as circled 2) is stored in the second slot of (e.g., wider) input queue 9924, state bit in state storage 9901 is set to one (e.g., by default), and a control value of zero is in a first slot of input queue 9922 to indicate the corresponding data value (labeled as circled 1) in (e.g., wider) input queue 9924 is to be output into output queue 9934 and dequeued from the (e.g., control) input queue 9922. In the depicted embodiment, the state bit in state storage 9901 was initialized to one previously and remains set at one.

Figure 99C:
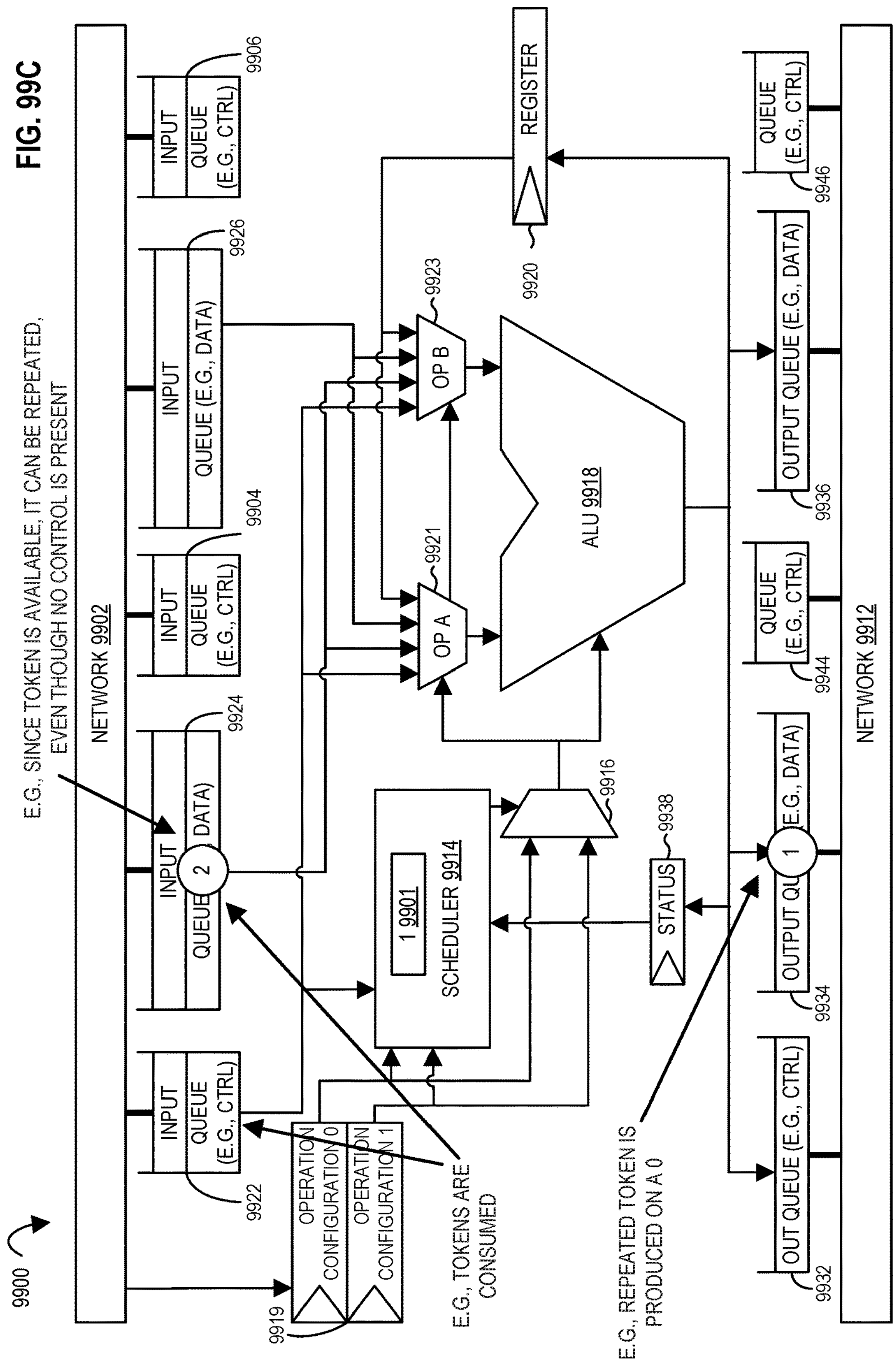

In FIG. 99C, the control value of zero is dequeued (e.g., cleared) from the first slot of input queue 9922, the data value for circled one is dequeued (e.g., cleared) from the first slot of input queue 9924 because the control value was zero (e.g., and the state bit in state storage 9901 was not set to zero to indicate a repeat for zero (repeato)), and the data value (labeled as circled 2) is moved into the first slot from the second slot of (e.g., wider) input queue 9924. Even though there is no associated control value for the data value (labeled as circled 2) in (e.g., wider) input queue 9924, the data value (labeled as circled 2) is to be output into output queue 9934 but not dequeued from the input queue 9924 until the (e.g., zero) control value is received.

Figure 99D:
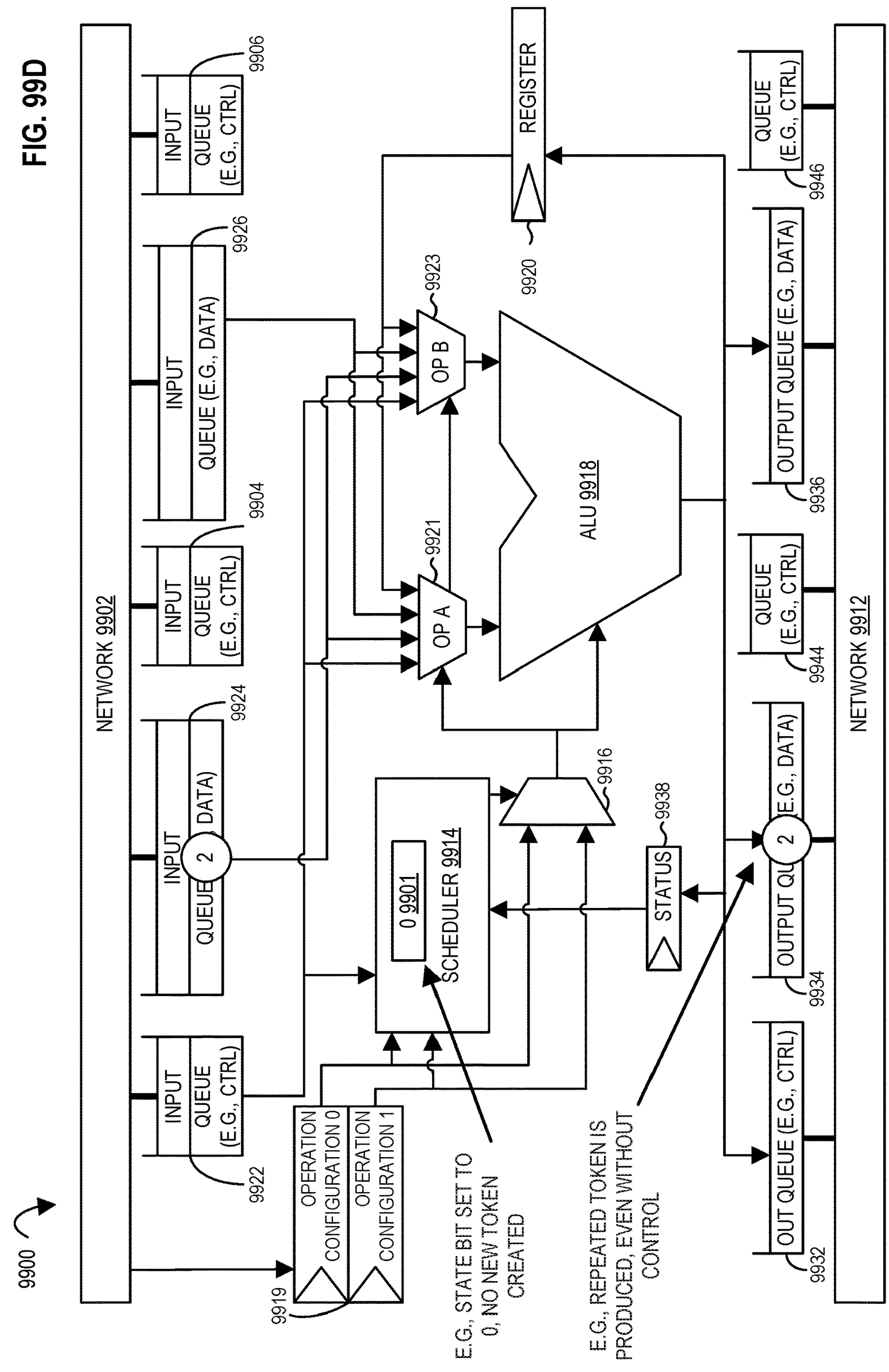

In FIG. 99D, no control value has been received in input queue 9922, the data value for circled two is not dequeued (e.g., not cleared) from the first slot of input queue 9924 because no control value was received, a first instance of data value (labeled as circled 2) is stored into (e.g., wider) output queue 9934, and the state bit in state storage 9901 is set to zero to indicate a first output of the data value (labeled as circled 2) was stored into output queue 9934 but no associated control value has been received. The data value from the output queue 9934 has been consumed, e.g., by a downstream PE or PEs.

Figure 99E:
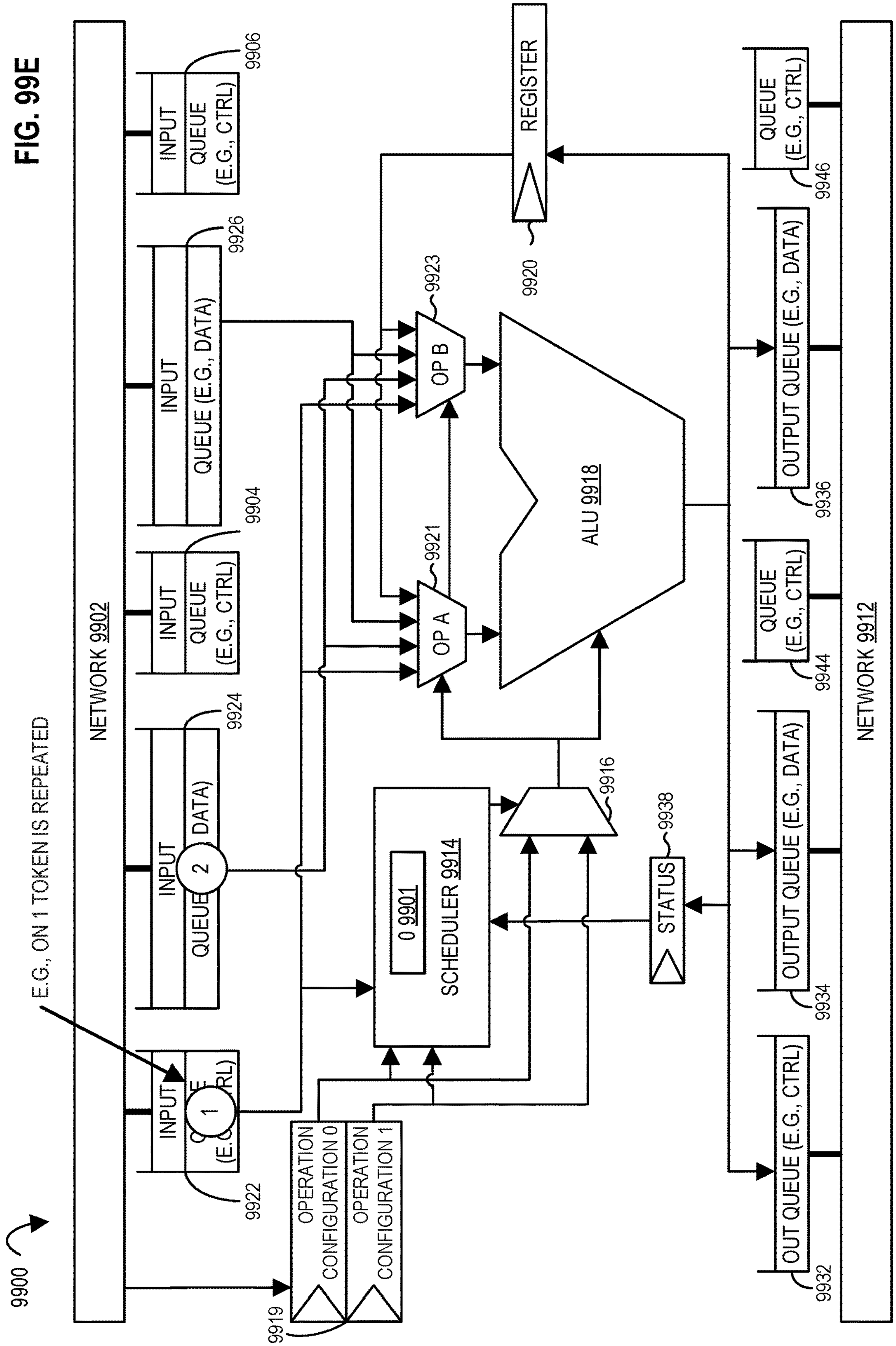

In FIG. 99E, a control value (e.g., Boolean one) has been received in input queue 9922, the data value for circled two is not dequeued (e.g., not cleared) from the first slot of input queue 9924, the state bit in state storage 9901 remains set to zero, and the data value from the output queue 9934 has been consumed, e.g., by a downstream PE or PEs.

Figure 99F:
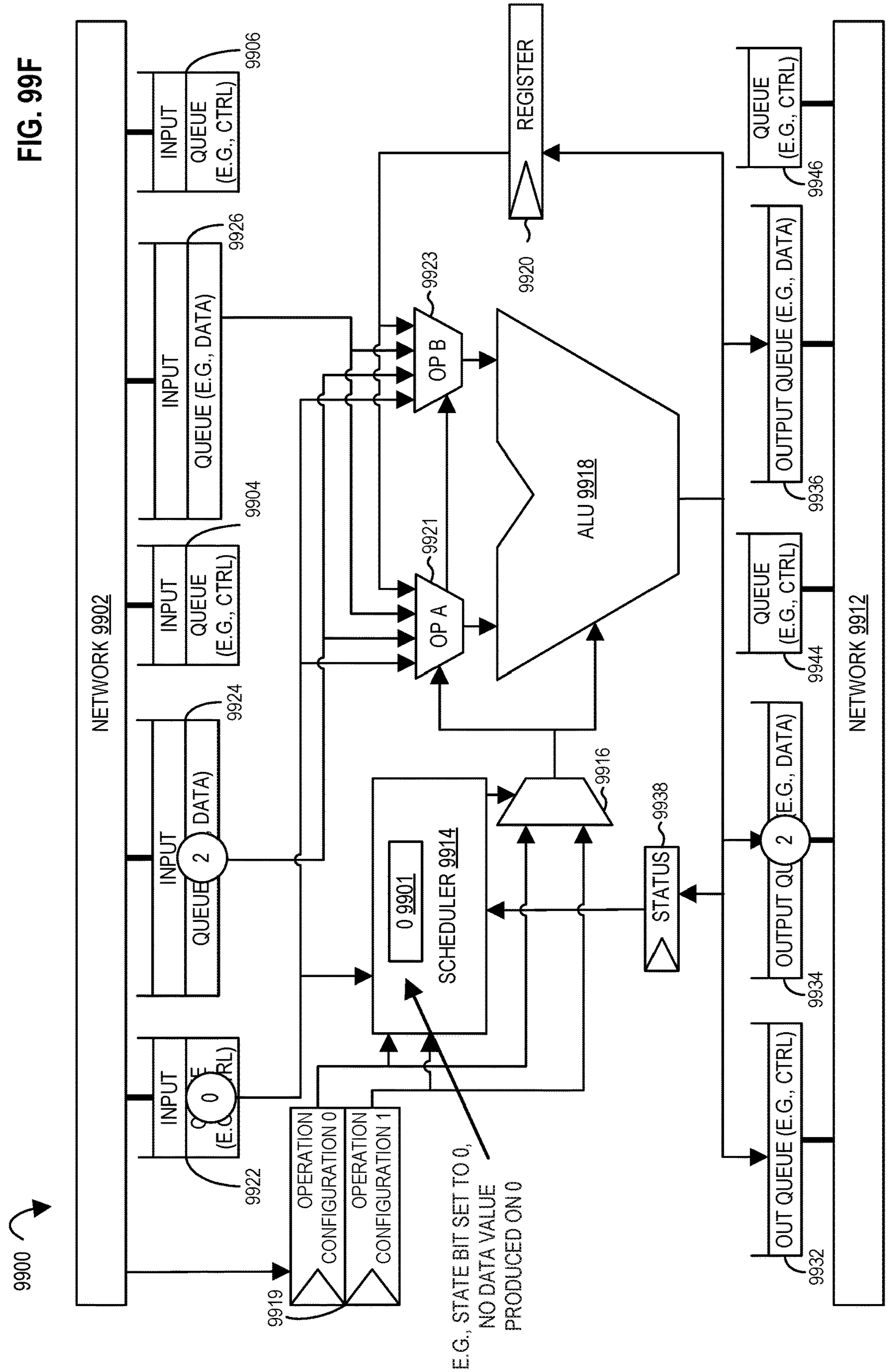
Figure 99G:
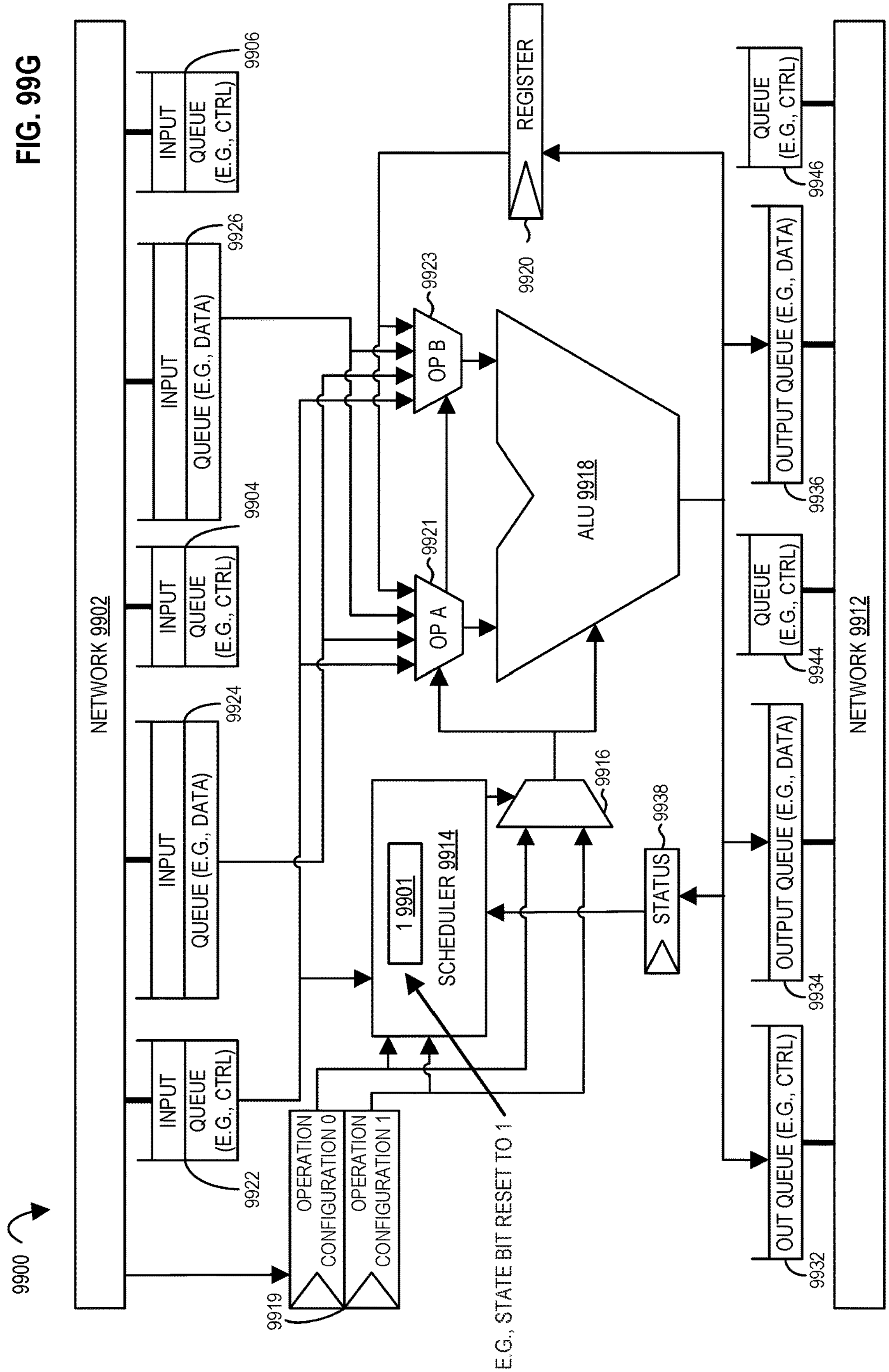

In FIG. 99F, because the control value of one (e.g., indicating to the PE to repeat output of the input value) was received in input queue 9922, a second instance of data value (labeled as circled 2) is stored into (e.g., wider) output queue 9934, the data value for circled two is not dequeued (e.g., not cleared) from the first slot of input queue 9924 because no zero control value has been encountered yet (although the zero control value has been received in input queue 9922), and the state bit in state storage 9901 remains set to zero to indicate a second output of the data value (labeled as circled 2) was stored into output queue 9934 but no zero control value has been received.

repeato output is complete. The data value from the output queue 9934 has been consumed, e.g., by a downstream PE or PEs.

In certain embodiments, Repeato produces copies on an input, consumes input data values (e.g., tokens) when a control value (e.g., token) is a zero, and produces an output value for each instance of the control input (including all the 1s followed by an ending 0). In certain embodiments, since at least one copy is always produced, a value is sent speculatively, e.g., if that speculative value is sent, no value will be sent on 0.

In certain embodiments, PE 9900 is stalled from performing the Repeato operation until there is both (i) space available in the output queue that is to be used for storing resultant data, in the case that repeato would need to produce output data, for example if a control value 1 is present on the control input, and (ii) an input control value in input queue 9922, except in the case that the first output data value has not yet been produced.

In the depicted embodiment, PE 9900 includes the components of PE 5800 from FIG. 58, for example, with the components ending with the same two numbers having the same functionality. In one embodiment, scheduler 9914 schedules an operation or operations of processing element 9900 for execution according to the configuration value, e.g., and when input data and control input arrives. See, for example, the discussion of FIGS. 33-57.

Strideo

In one embodiment, a CSA architecture includes a configuration value that, when stored into the configuration storage (e.g., register), causes the CSA (e.g., a PE thereof) to perform a Strideo operation according to the following (e.g., semantics and/or description).

```
Operation: strideo{8-64} value.Cd.iN, stream.CLu.i1, base.CLu.iN, stride.CLu.iN
Semantics:
    tmp = base;
    do {
            value = tmp;          // value generated for each stream, including terminating 0
            tmp += *stride;       // non-destructive read of stride
    } while (stream);
    stride                        // consume stride
Description: Strided sequence generation given on base/stride, with one trip semantics.
    -   value - a Nb operand receiving each successive value, and nothing for termination
    -   stream - a 1b operand that receives a control stream of 1s, followed by a
        terminating 0
    -   base - the initial value - either LIC or literal
    -   stride - a value for the increment - either LIC or literal. Note that for memory
        addresses, this will include the size of the memory reference (e.g. stride for a
        dense 64 bit stream will be 8...)
This provides the ability to have a stride based on a stream, as with stride, but with one trip
semantics. Note that when the strides match, there would typically just be an add to bias a
previous value. This is normally used when there are multiple inductive values in a loop
striding by different amounts.
NOTE: the initial write to value is done as soon as base is available, and is not gated on
stream/stride.
```

In FIG. 99F, because the control values for the input stream for the data value (labeled as circled 2) was (1, 0) and thus indicating two outputs of the data value (labeled as circled 2) (e.g., a first instance of the data value labeled as circled 2 was output for the first control value of 1, and a second instance of the data value labeled as circled 2 was output for the ending control value of 0), the outputs are complete. Thus, the PE 9900 has dequeued the control value of zero from input queue 9922, dequeued the data value (labeled as circled 2) from the input queue 9924, and reset the state bit in state storage 9901 to one to indicate that the FIGS. 100A-100G illustrate a processing element 10000 performing a Strideo operation according to embodiments of the disclosure. In the depicted embodiment, an operation configuration value for a Strideo operation is stored (e.g., during a programming time period) into operation configuration register 10019. PE 10000 includes state storage 10001 (e.g., a single bit register) to track whether a data value (e.g., data token) is to be transmitted on receipt of a zero control token.

In certain embodiments, the Strideo operation causes PE 10000 to produce a Boolean value (e.g., zero) internally in state storage 10001 when the (e.g., strided or base) data value is output into an output queue. In one embodiment, when the state bit in state storage 10001 is set to zero, no new data value it output unless an associated control value of one is received.

In FIGS. 100B-100G, the numbers in the circles for the bits in (e.g., control) input queue 10022 indicate a one for each time a (e.g., strided) data value is to be output but not dequeue data values from the input queue (e.g., 10024 or 10026), and a zero for when that (e.g., strided) data value is to be output and the data value(s) are dequeued from the (e.g., control) input queue(s) (e.g., according to the "Strideo" operation in the above discussion), and the numbers in the circles for the bits in input queue 10024 and output queue 10034 are the values themselves (e.g., circled two representing an integer two).

Figure 100A:
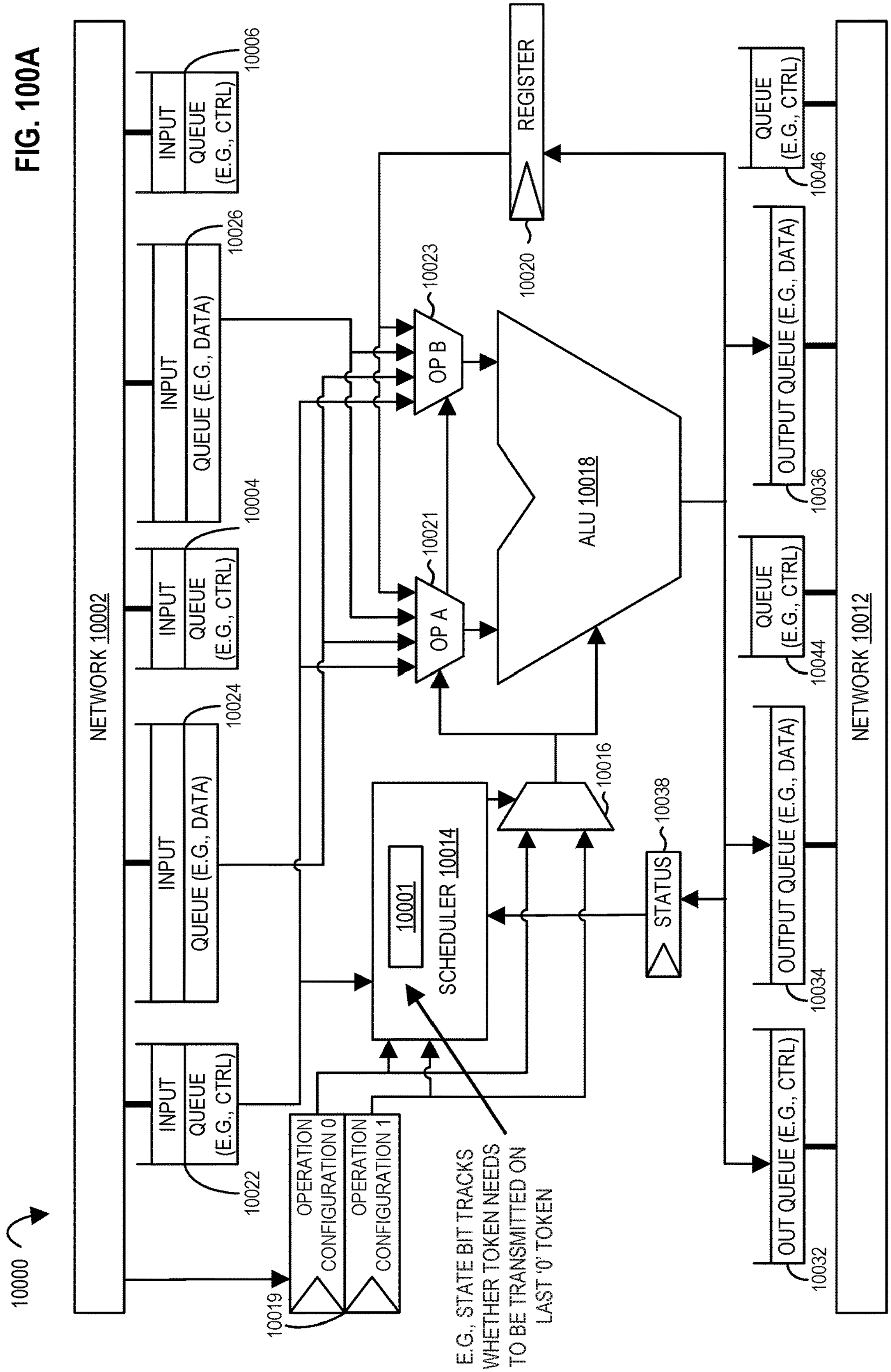
FIGS. 100A-100G illustrate a processing element performing a Strideo operation according to embodiments of the disclosure.
Figure 100B:
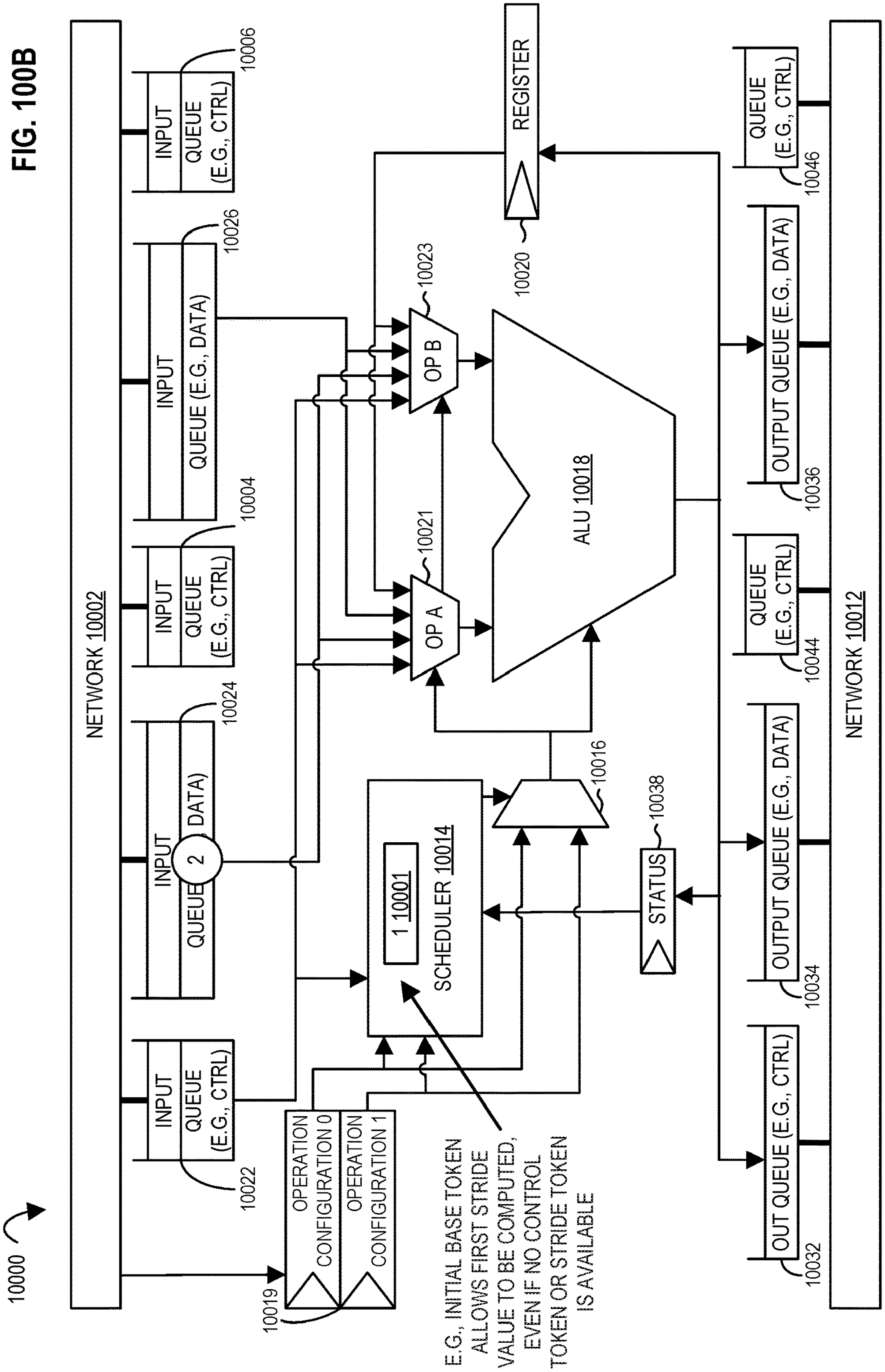

In FIG. 100B, "base" data value of two is stored in the first slot of (e.g., wider) input queue 10024, and the state bit in state storage 10001 is set to one (e.g., by default), note the value of 1 adjacent to the reference number 10001. In the depicted embodiment, the state bit in state storage 10001 was initialized to one previously and remains set at one. In this embodiment, receipt of the initial base value of 2 allows the first stride value to be computed even if no control values or "stride" data values are available.

Figure 100C:
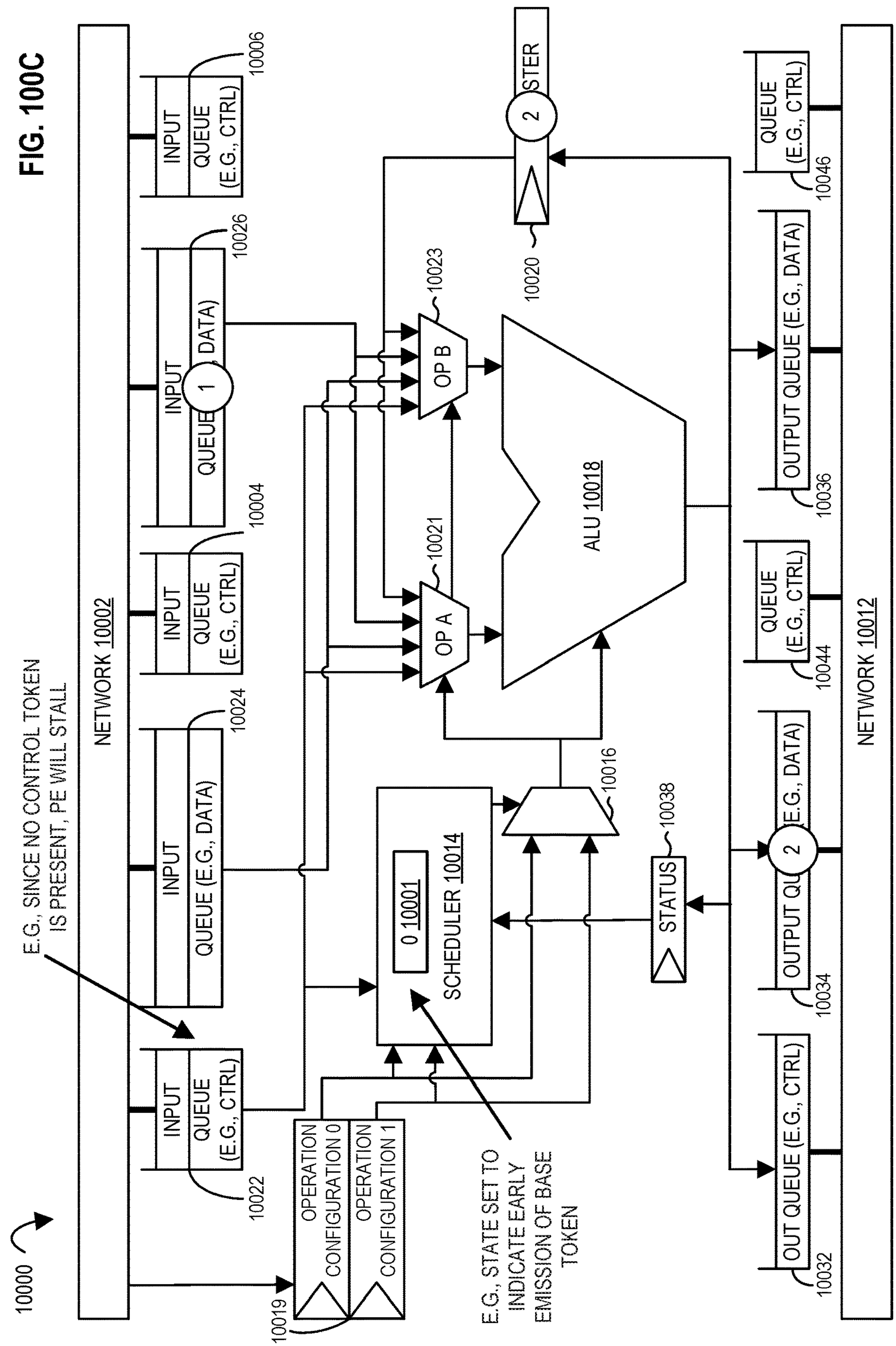

In FIG. 100C, the base data value of two is stored into the output queue 10034 and into the register 10020, the base data value of two is dequeued from the first slot of (e.g., wider) input queue 10024, the "stride" data value of one has been stored in the first slot of (e.g., wider) input queue 10026 (e.g., by an upstream PE), and the state bit in state storage 10001 is set to zero to indicate early emission of the base token (two).

Figure 100D:
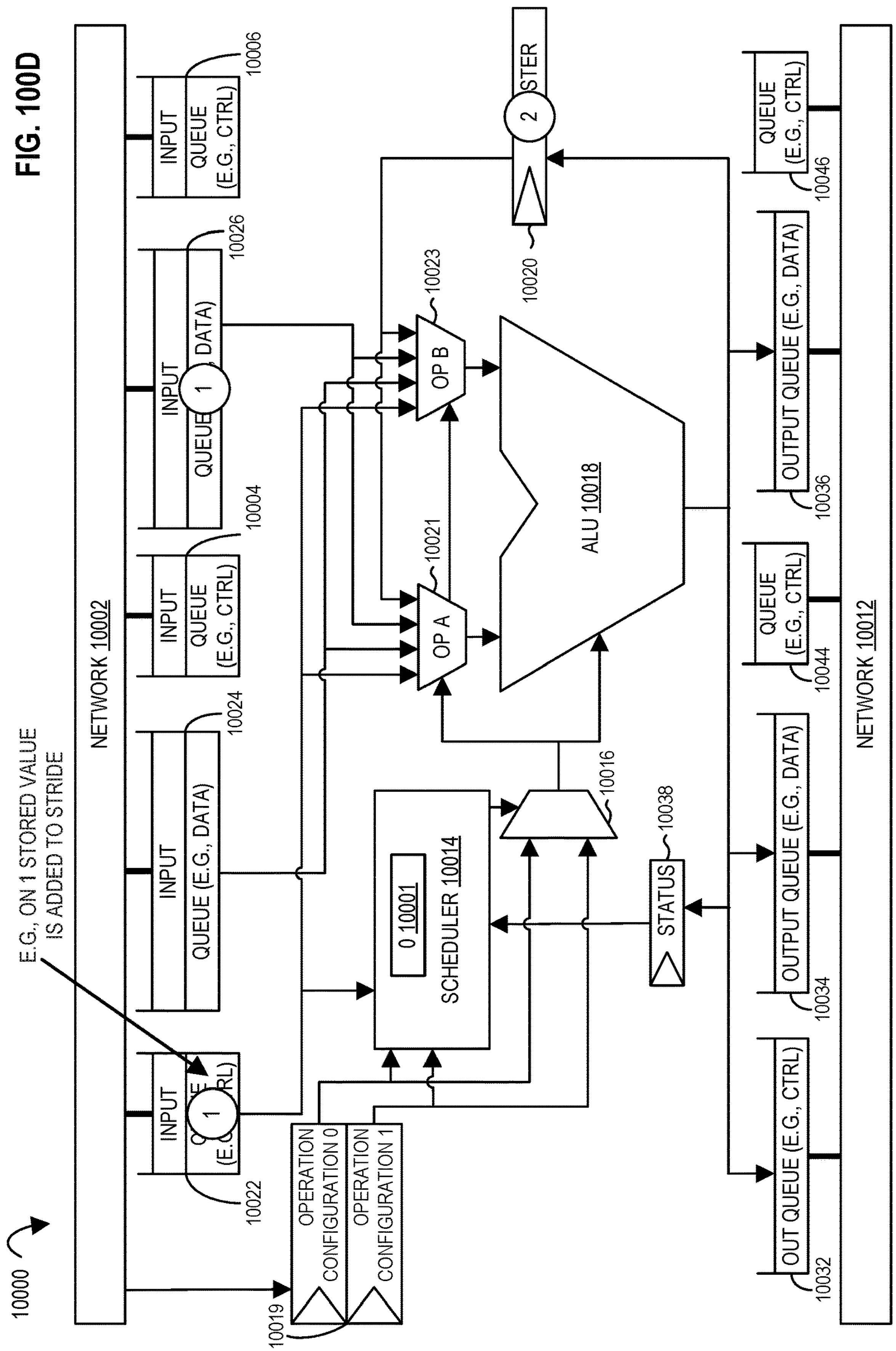

In FIG. 100D, a control value of one is stored into the first slot of input queue 10022 (e.g., sent from an upstream PE) to indicate that the stride value is to be added to the base value and that resultant is to be output, and the state bit in state storage 10001 remains set to zero.

Figure 100E:
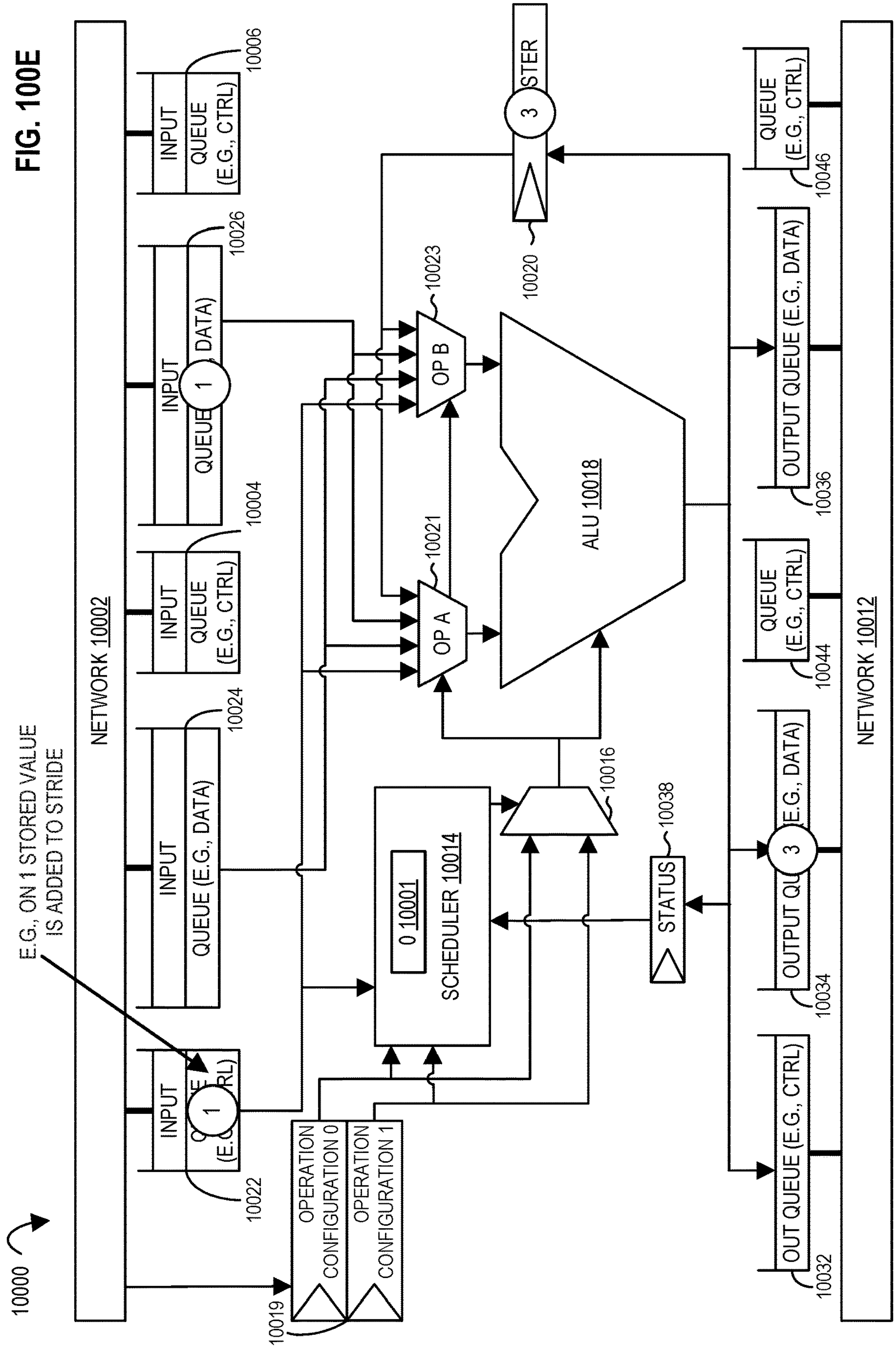

In FIG. 100E, the resultant 3 from the stride operation is stored into the output queue 10034 and into the register 10020, the stride data value of one remains stored in the first slot of (e.g., wider) input queue 10026 (although in another embodiment, it may be dequeued and stored within PE 10000), the control value of one is dequeued (e.g., cleared) from the first slot of input queue 10022 for the output of that resultant 3 to output queue 10034, another control value of one is queued (e.g., stored) into the first slot of input queue 10022 to indicate that another stride value (one) is to be added to the updated value (3) in register 10020 and that resultant (4) is to be output, and the state bit in state storage 10001 remains set to zero.

Figure 100F:
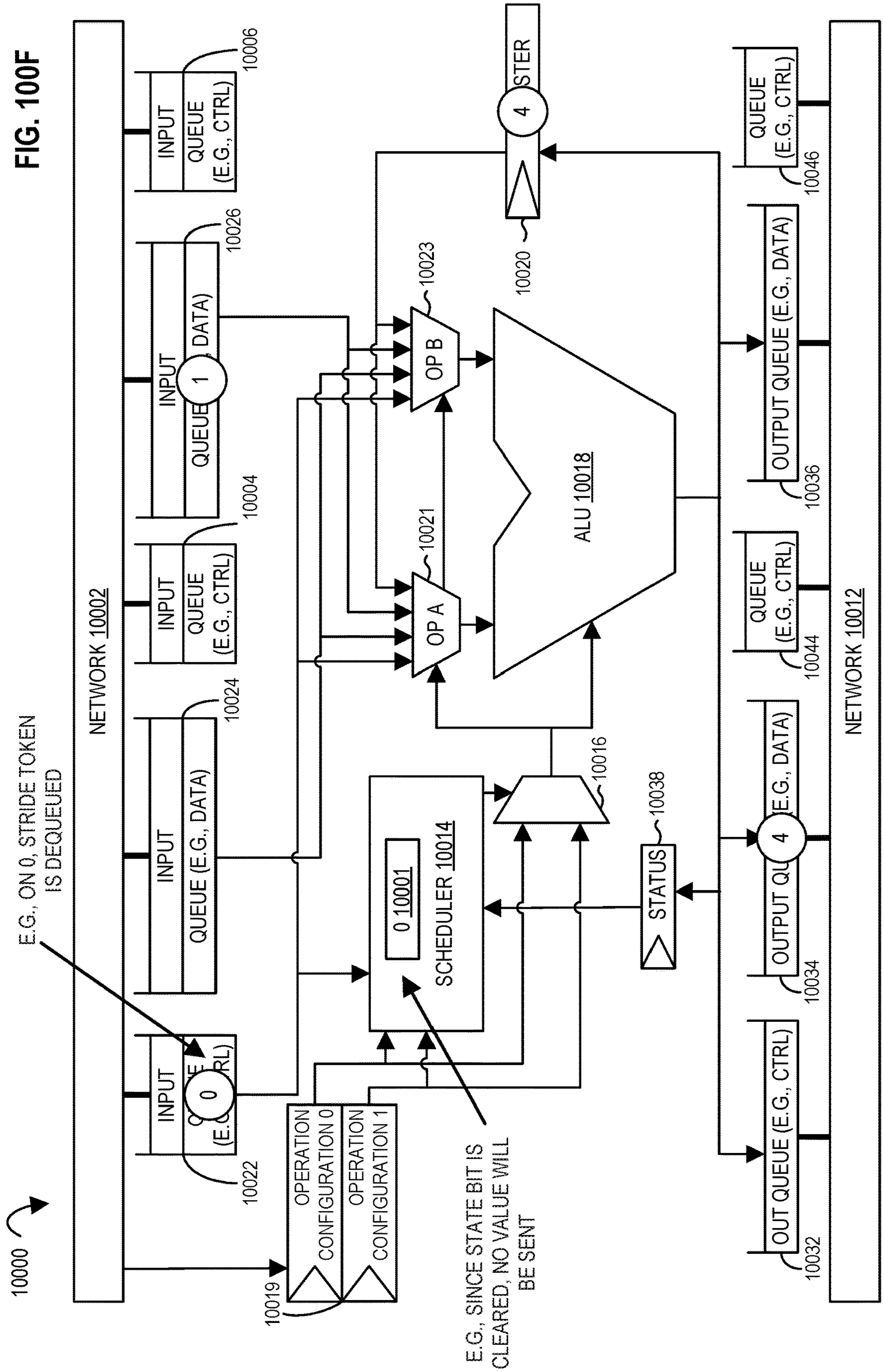

In FIG. 100F, the resultant 4 from the stride operation is stored into the output queue 10034 and into the register 10020, the stride data value of one remains stored in the first slot of (e.g., wider) input queue 10026 (although in another embodiment, it may be dequeued and stored within PE 10000), the control value of one is dequeued (e.g., cleared) from the first slot of input queue 10022 for the output of that resultant 3 to output queue 10034, a control value of zero is queued (e.g., stored) into the first slot of input queue 10022 to indicate the end of the stride operations, and the state bit in state storage 10001 remains set to zero.

Figure 100G:
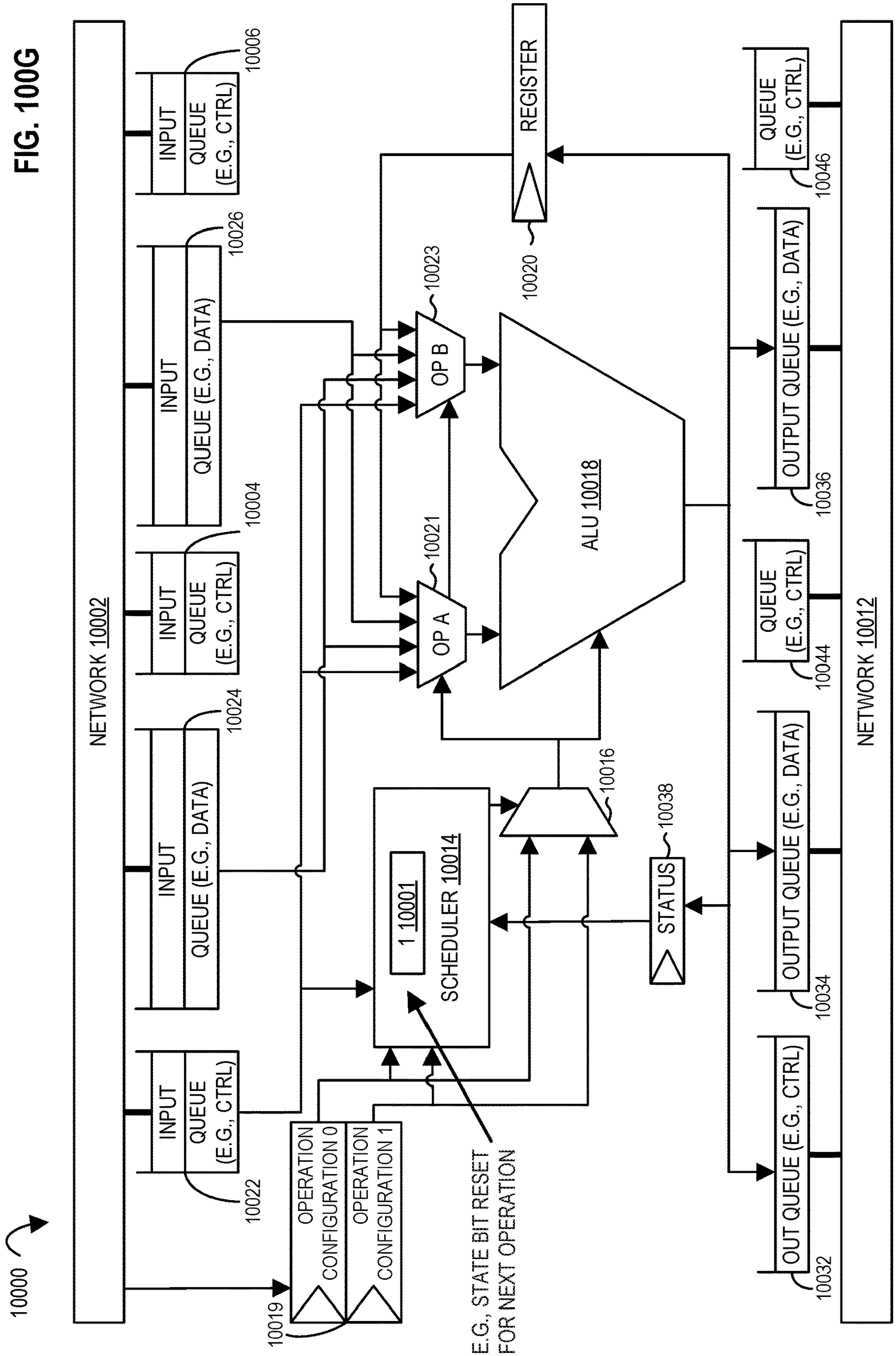

In FIG. 100G, the stride data value of one is dequeued from the first slot of (e.g., wider) input queue 10026 (although in another embodiment, it may be dequeued and stored within PE 10000), the control value of zero is dequeued (e.g., cleared) from the first slot of input queue 10022 for the output of that resultant 4 to output queue 10034, and the state bit in state storage 10001 is reset to one for the next operation. In one embodiment, the value in register 10020 is also dequeued.

The input data that is queued may be sent from another component of a CSA, e.g., from a plurality of other PEs as discussed herein. In certain embodiments, the data is read from the first slot of a queue, and when consumed (e.g., removed), any data from other slots of the queue are advanced such that data from the second slot is moved into the first slot, etc. For all of the embodiments herein, the data value from the output queues may be consumed from the output queues, e.g., by a downstream PE or PEs.

In certain embodiments, Strideo produces a set of data values (e.g., strided from a base value), where a zero for a control value indicates the stride should be consumed and the updated stride value is discarded. In certain embodiments, since at least one copy is always produced, a data value (e.g., base value) is sent speculatively, e.g., if sent, the state bit is marked (e.g., to a zero) to indicate the data value has been sent.

In certain embodiments, PE 10000 is stalled from performing the Strideo operation until there is both (i) space available in the output queue that is to be used for storing resultant data in the case that strideo would need to produce an output value, for example if a control value 1 is present on the control input, and (ii) an input control value in input queue 10022 after emission of the first output to an output queue.

In the depicted embodiment, PE 10000 includes the components of PE 5800 from FIG. 58, for example, with the components ending with the same two numbers having the same functionality. In one embodiment, scheduler 10014 schedules an operation or operations of processing element 10000 for execution according to the configuration value, e.g., and when input data and control input arrives. See, for example, the discussion of FIGS. 33-57.

Nestrepeat

In one embodiment, a CSA architecture includes a configuration value that, when stored into the configuration storage (e.g., register), causes the CSA (e.g., a PE thereof) to perform a Nestrepeat operation according to the following (e.g., semantics and/or description).

Operation: nestrepeat1 out.CRd.i1, outer.CRLu.i1, inner.CRLu.i1 (was r')
Description: Single bit repeat for 1s, with pass-through of 0s. This operation is useful for composing iteration streams in nested loops. The outer loop control has a 1 for each copy of the inner loop to be executed, while the inner loop control is an iteration sequence from an inner loop control. The output is 1 for each iteration of the inner loop across all of the outer loop iterations, followed by a 0. e.g., this effectively collapses the loop control streams.

| outer | inner | out |
|---|---|---|
| 0 | — | 0 |
| 1 | 0 | — |
| 1 nodeq | 1 | 1 |

-continued

```
Sample usage: If an outer was a total of 2 iterations (110) and the 2 successive inner loops
were 3 iterations (1110, 1110 for individual control streams), the merged stream would be
1111110, reflecting the 6 total iterations of the inner loops over the duration of the outer
loop.
        seqlts64 ,outeri,,,0,2,1              # 2 trip outer loop
        pick1 %ign,innerincr,outeri,1          # gate the incr for inner loop to trigger
                                               #    for each outer loop
        seqlss64 ,inneri,,,0,3,innerincr       # inner loop, triggered for each iteration
                                               # of outer loop
        nestrepeat1 alliters,outeri,inneri       # generate alliters stream - 1 for each
                                               # nested loop iter
```

FIGS. 101A-101G illustrate a processing element 10100 performing a Nestrepeat operation according to embodiments of the disclosure. In the depicted embodiment, an operation configuration value for a Nestrepeat operation is stored (e.g., during a programming time period) into operation configuration register 10119. As one example, input queue (e.g., having a single bit width) 10104 is provided to receive a stream control value (e.g., token) from a first stream for an inner loop and input queue (e.g., having a single bit width) 10106 is provided to receive a stream control value (e.g., token) from a second stream for an outer loop including multiple iterations of the inner loop, e.g., nestrepeat 1 in the above discussion.

In FIGS. 101B-101G, the numbers in the circles for the control bits in queues 10104 and 10106 indicate a one for each item in a single stream and a zero for the end (e.g., termination) of that stream.

Figure 101A:
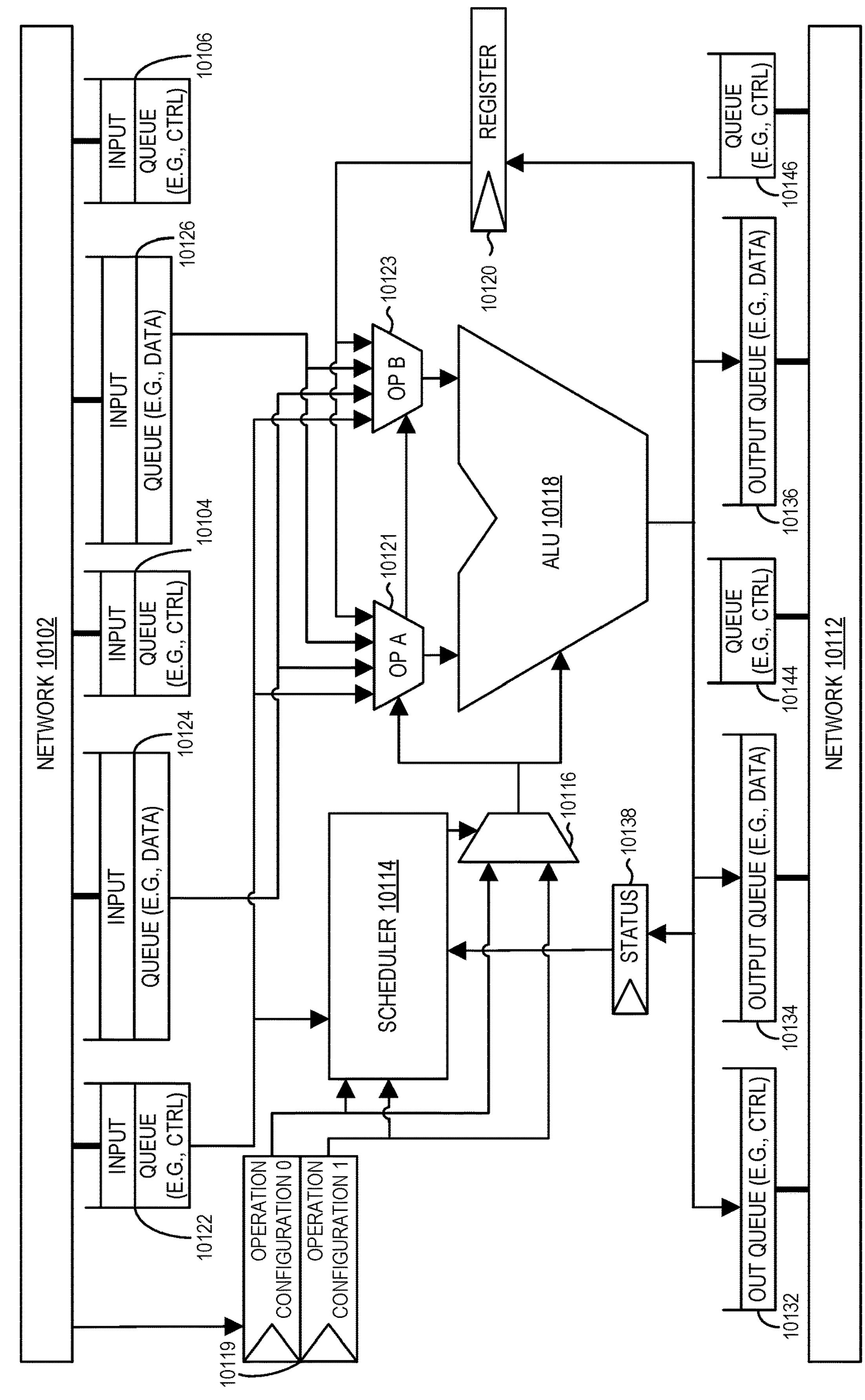
Figure 101B:
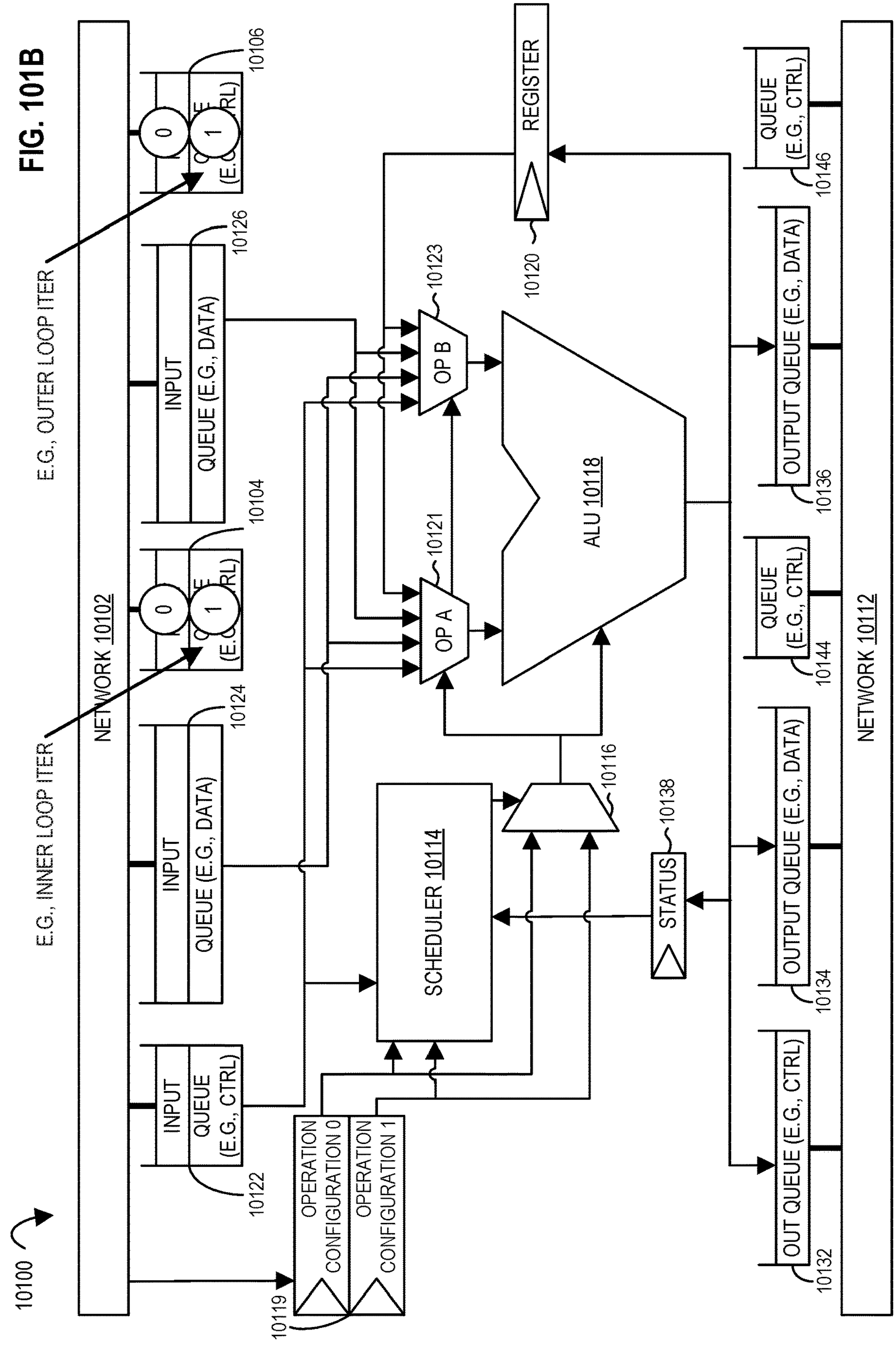

In FIG. 101B, a control value of (e.g., Boolean) one is in a first slot of (e.g., control) input queue 10104 (for example, to indicate a beginning of an inner loop), a control value of (e.g., Boolean) zero is in a second slot of (e.g., control) input queue 10104 (for example, to indicate an end of the inner loop), a control value of (e.g., Boolean) one is in a first slot of (e.g., control) input queue 10106 (for example, to indicate a beginning of an outer loop), and a control value of (e.g., Boolean) zero is in a second slot of (e.g., control) input queue 10106 (for example, to indicate an end of the outer loop).

In FIG. 101C, the control value of (e.g., Boolean) one is stored in the output queue 10132, and the control value of (e.g., Boolean) one is dequeued from the first slot of (e.g., control) input queue 10104, and the control value of (e.g., Boolean) zero is moved from the first slot to the second slot of (e.g., control) input queue 10104.

Figure 101D:
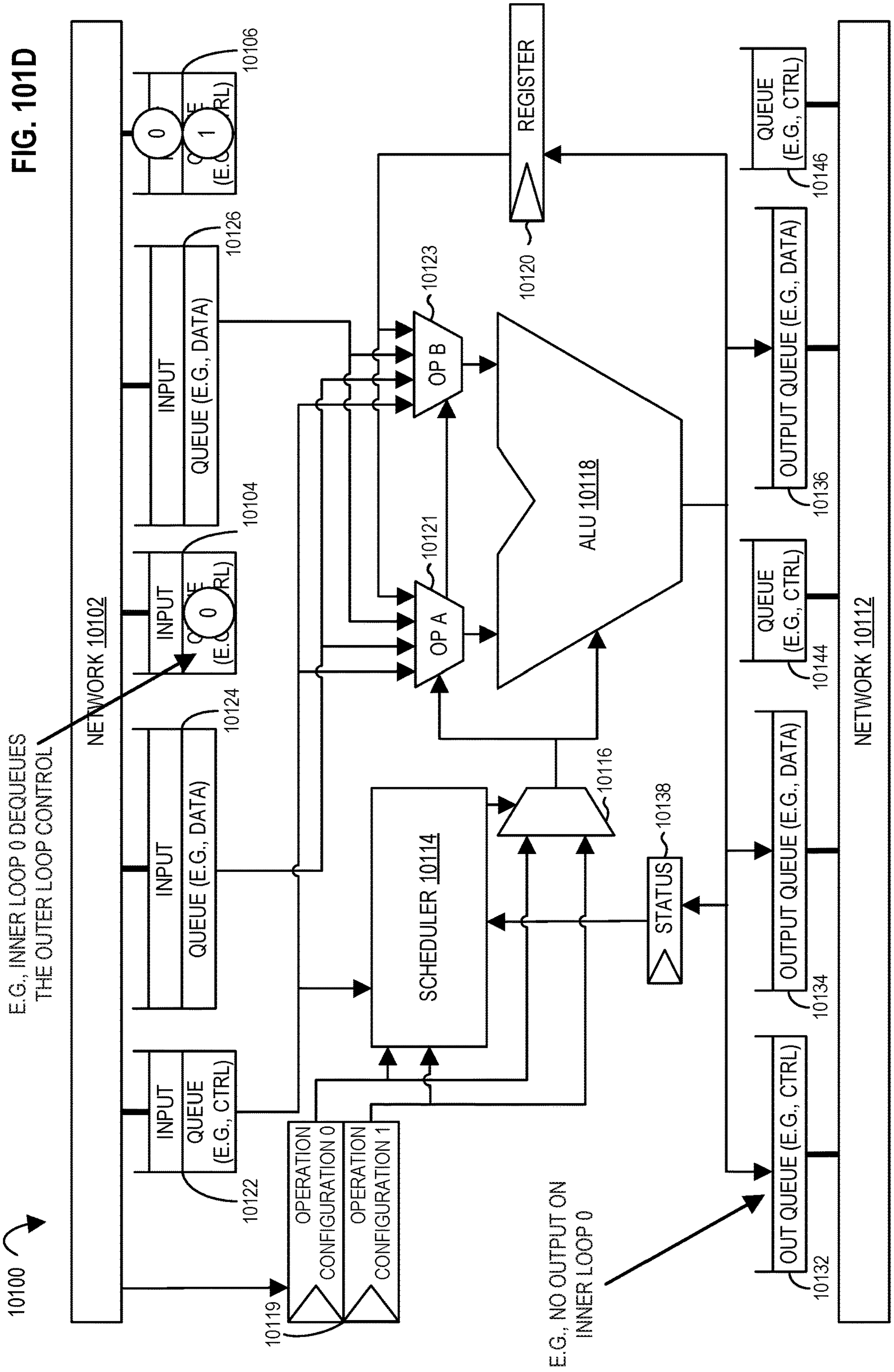

In FIG. 101D, the control value of (e.g., Boolean) zero is in a first slot of (e.g., control) input queue 10104 (for example, to indicate an end of the inner loop), and thus no output is stored in the output queue 10132. The previous control value of one has been consumed from the output queue 10132 (e.g., by a downstream PE).

Figure 101E:
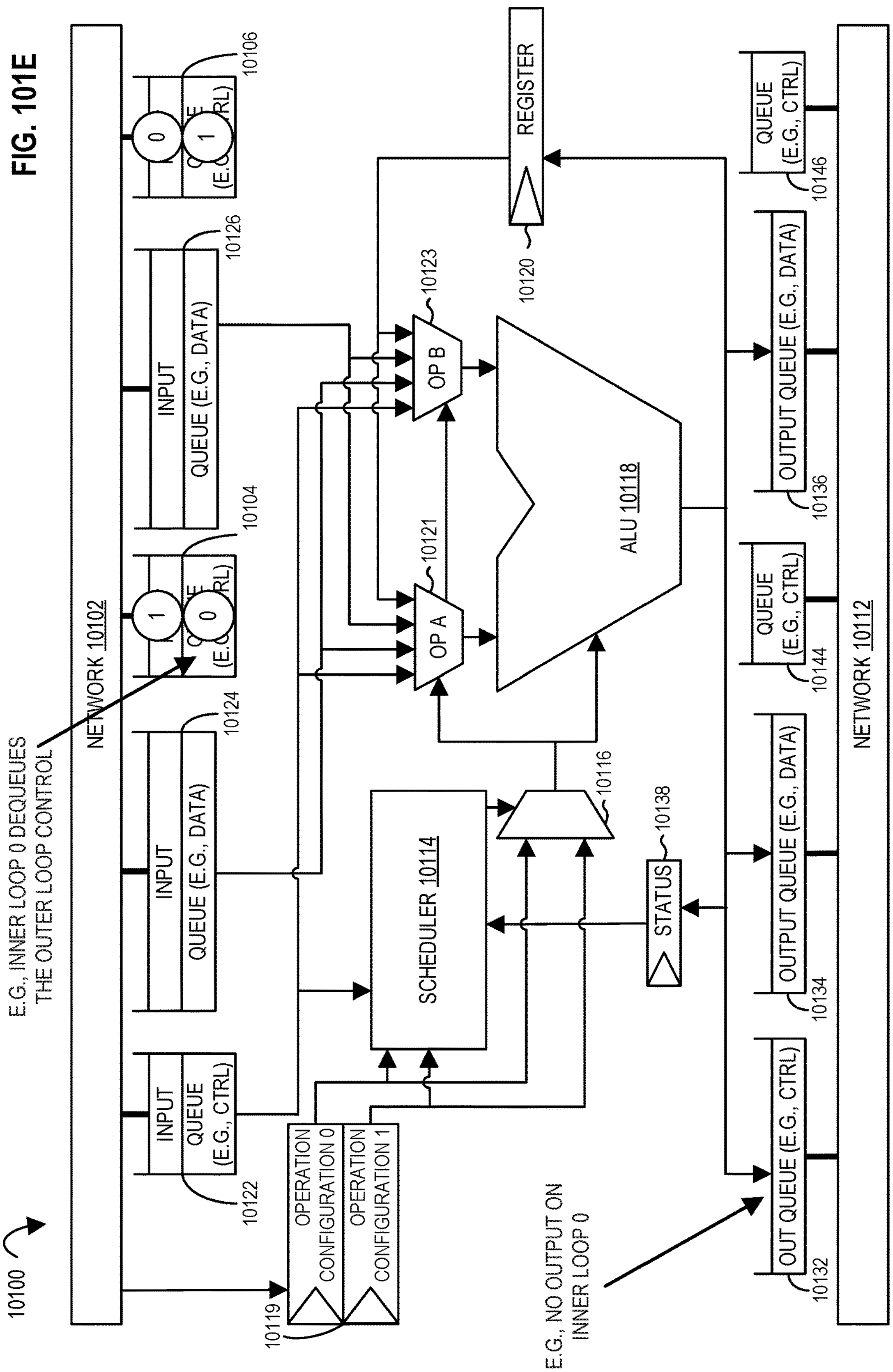

In FIG. 101E, a control value of (e.g., Boolean) one is stored in the second slot of (e.g., control) input queue 10104 for the next loop.

Figure 101F:
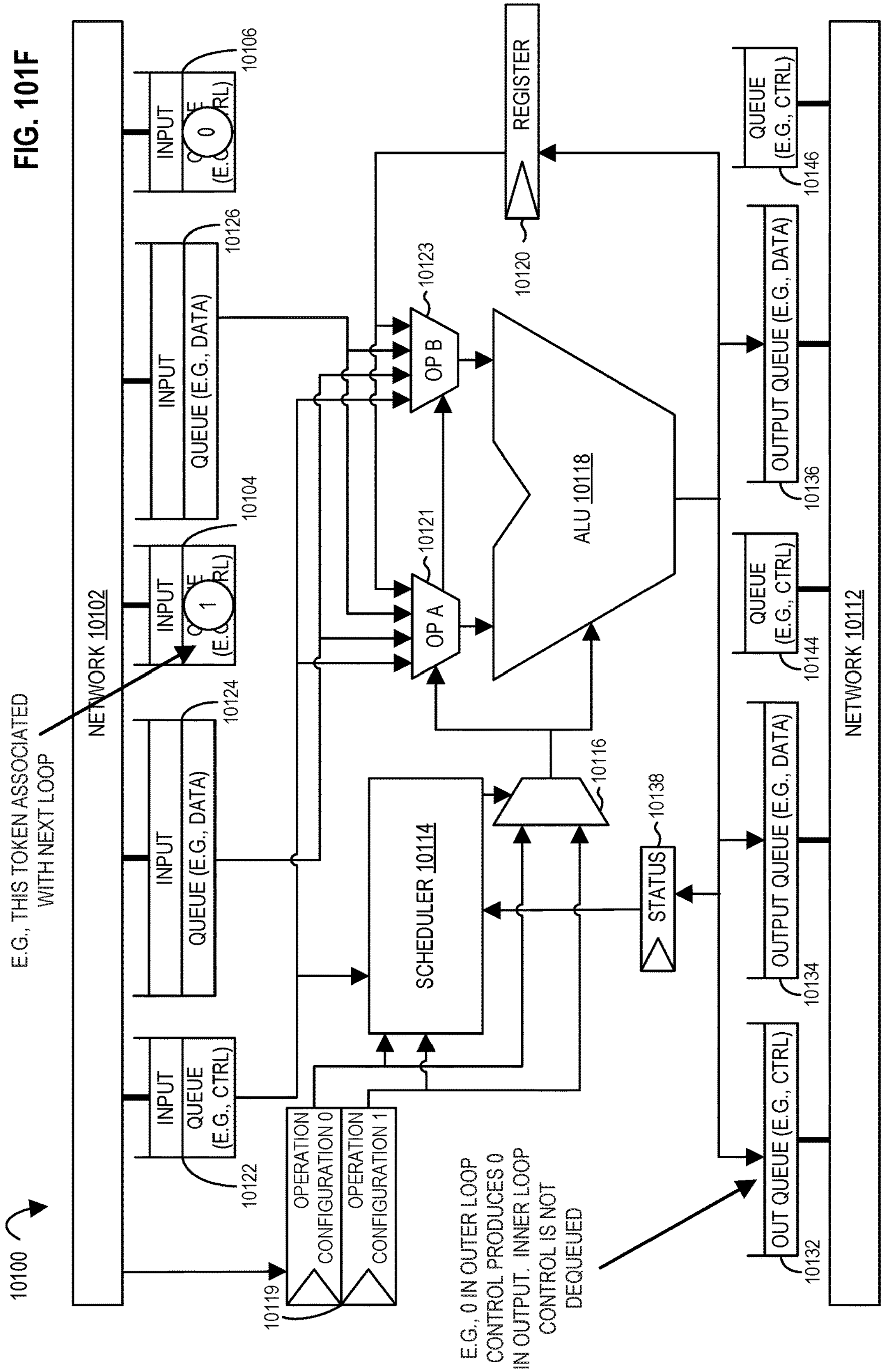

In FIG. 101F, generation of the inner loop control values are complete, so the control value of (e.g., Boolean) zero in the first slot of (e.g., control) input queue 10104 is dequeued, the control value of (e.g., Boolean) one is moved into the first slot from the second slot of (e.g., control) input queue 10104, the control value of (e.g., Boolean) one is dequeued from the first slot of (e.g., control) input queue 10106 because the control value(s) for the first iteration of the inner loop have been sent to the output queue, and the control value of (e.g., Boolean) zero is moved into the first slot from the second slot of (e.g., control) input queue 10106.

Figure 101G:
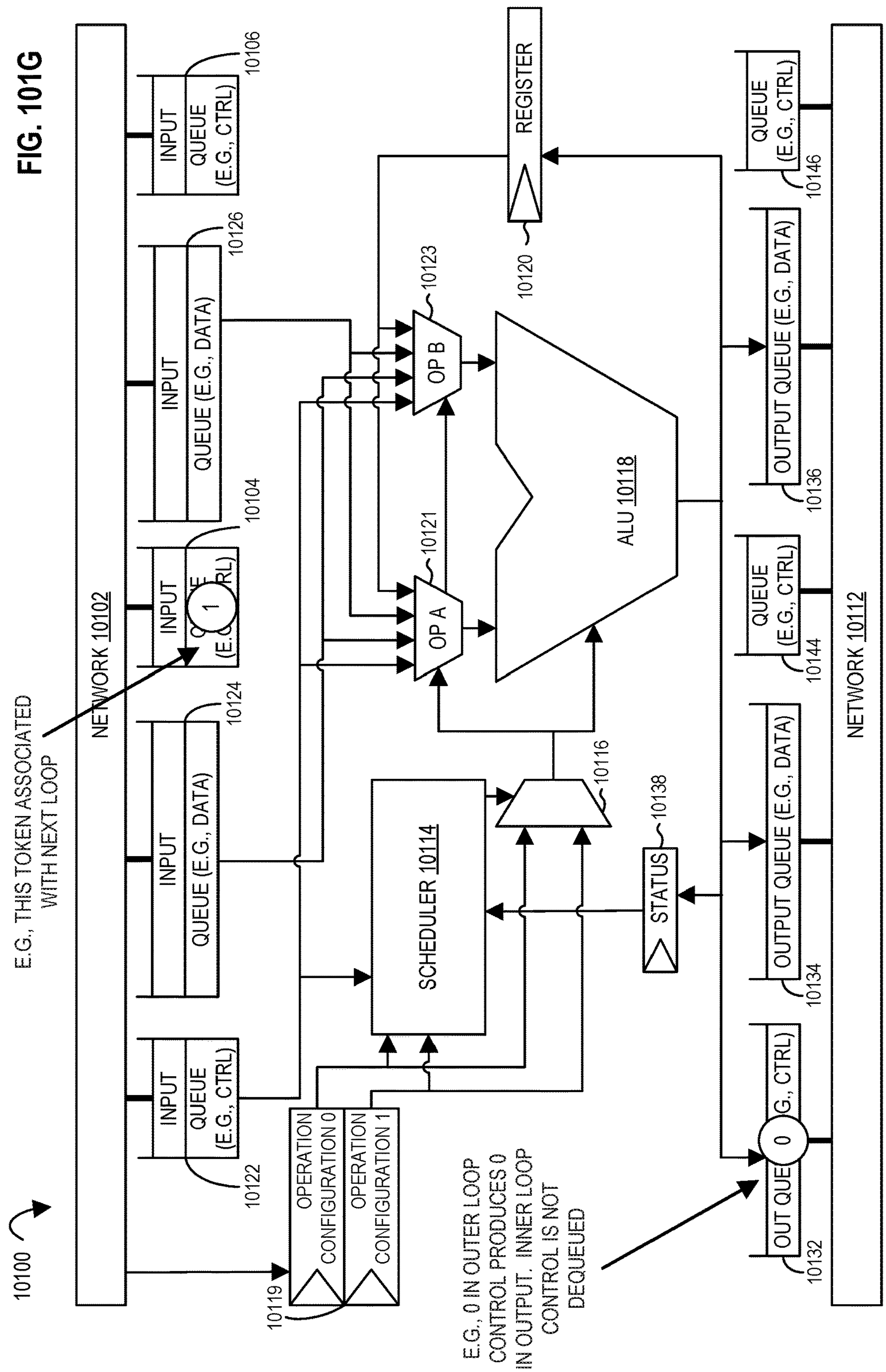

In FIG. 101G, the control value of (e.g., Boolean) zero in the first slot of (e.g., control) input queue 10106 indicates that the outer loop is complete, and thus the control value of (e.g., Boolean) zero in the first slot of (e.g., control) input queue 10106 is dequeued, and the control value of (e.g., Boolean) zero is stored in the output queue 10132 to indicate the end of the outer loop.

The input data that is queued may be sent from another component of a CSA, e.g., from a plurality of other PEs as discussed herein. In certain embodiments, the data is read from the first slot of a queue, and when consumed (e.g., removed), any data from other slots of the queue are advanced such that data from the second slot is moved into the first slot, etc.

In certain embodiments, PE 10100 is stalled from performing the Nestrepeat operation until there is both (i) space available in the output queue that is to be used for storing resultant data, and (ii) the inner loop control values and outer loop control values (e.g., selection control bit) are available.

In certain embodiments, PE 10100 constructs control patterns for nested loops by taking control (e.g., iteration) values from two control input streams (e.g., for the inner loop and outer loop, respectively). In certain embodiments, the Nestrepeat operation produces an output that is used to control inner loop repeats using a single repeat, e.g., according to the outer, inner, and output (out) table in the above description of Nestrepeat.

In the depicted embodiment, PE 10100 includes the components of PE 5800 from FIG. 58, for example, with the components ending with the same two numbers having the same functionality. In one embodiment, scheduler 10114 schedules an operation or operations of processing element 10100 for execution according to the configuration value, e.g., and when input data and control input arrives. See, for example, the discussion of FIGS. 33-57.

Predfilter

In one embodiment, a CSA architecture includes a configuration value that, when stored into the configuration storage (e.g., register), causes the CSA (e.g., a PE thereof) to perform a Predfilter operation according to the following (e.g., semantics and/or description).

Operation: predfilter ctlout.CRd.i1, ctl.CRLu.i1, pred.CRLu.i1 (was e')
Description: Given an iteration control stream (e.g., 1 per iteration followed by 0), filter that stream by a predicate to remove iterations that are predicated off.

-continued

| | ctl | pred | ctlout |
|---|---|---|---|
| | 0 | — | 0 |
| | 1 | 0 | — |
| | 1 | 1 | 1 |

Sample usage:

```
# Given an iter control stream seqctl (1 for each iteration, followed
# by 0 for end of stream), and a predicate for each iteration (iterpred),
# filter out unused iterations from seqctl into new stream s
predfilter s, seqctl, iterpred
# Use the same operation to process store acknowledgements and filter
# out all remaining iterations. All that remains on output from the
# second filter is the end-of-stream indication.
not1 store_ack_compl, store_ack
predfilter outctl, s, store_ack_compl
```

FIGS. 102A-102E illustrate a processing element 10200 performing a Predfilter operation according to embodiments of the disclosure. In the depicted embodiment, an operation configuration value for a Predfilter operation is stored (e.g., during a programming time period) into operation configuration register 10219. As one example, input queue (e.g., having a single bit width) 10204 is provided to receive a stream control value(s) (e.g., token) for an iteration (iter) stream and input queue (e.g., having a single bit width) 10206 is provided to receive a stream control value(s) (e.g., token) for a predicate filter stream, e.g., Predfilter1 in the above discussion.

In FIGS. 102B-102E, the numbers in the circles for the control value (e.g., bits) in queue 10204 indicate a one for each item in a single stream and a zero for the end (e.g., termination) of that stream, and the numbers in the circles for the control bits in queue 10206 indicate a predicate filter value, for example, where a predicate value of one means to output the corresponding control value (e.g., bits) from the PE and consume (e.g., dequeue) both of the pair of the control value and the predicate value from their input queues, and a predicate value of zero means to not output the corresponding control value (e.g., bits) from the PE and consume (e.g., dequeue) both of the pair of the control value and the predicate value from their input queues.

Figure 102A:
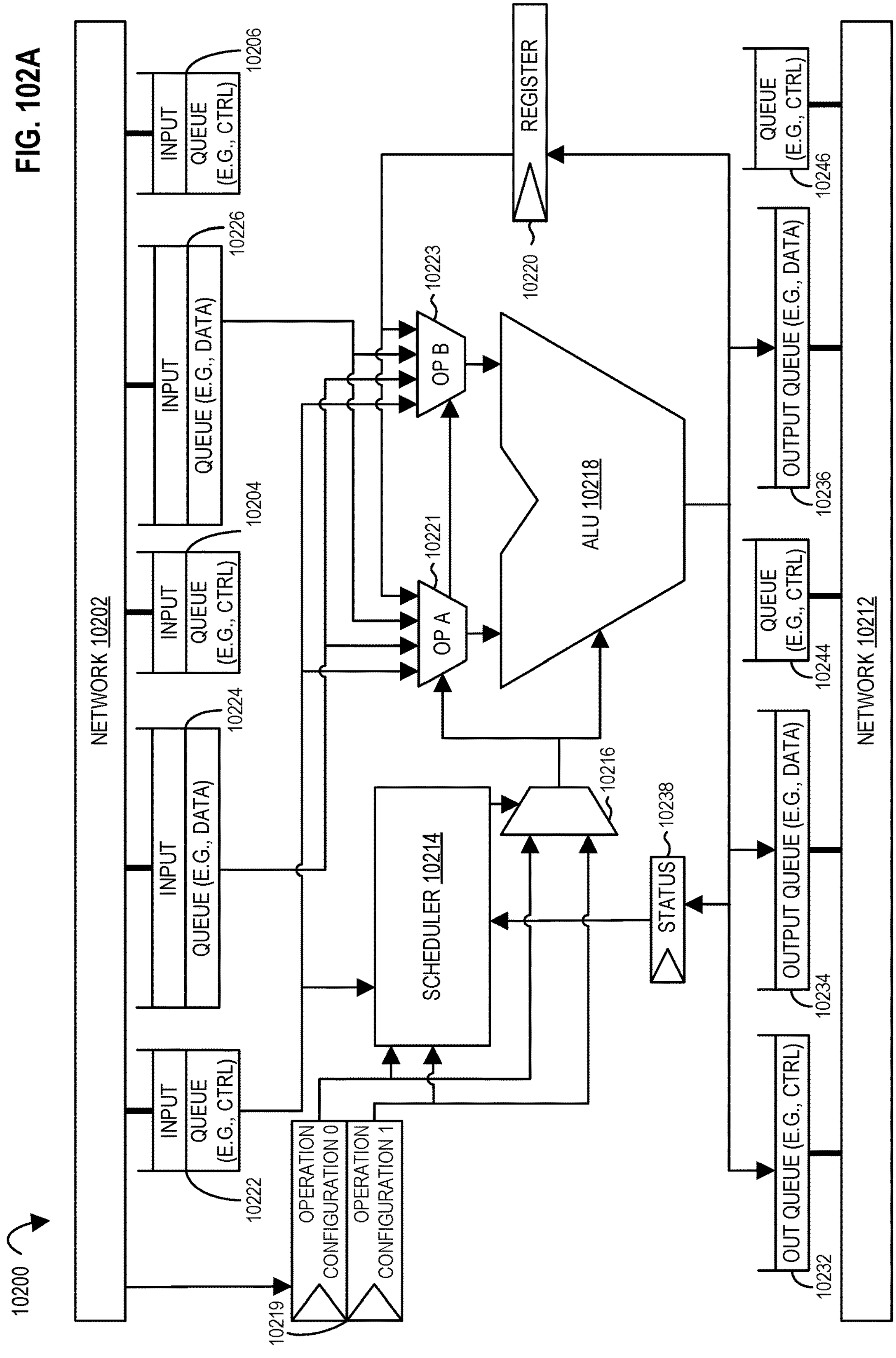
FIGS. 102A-102E illustrate a processing element performing a Predfilter operation according to embodiments of the disclosure.
Figure 102B:
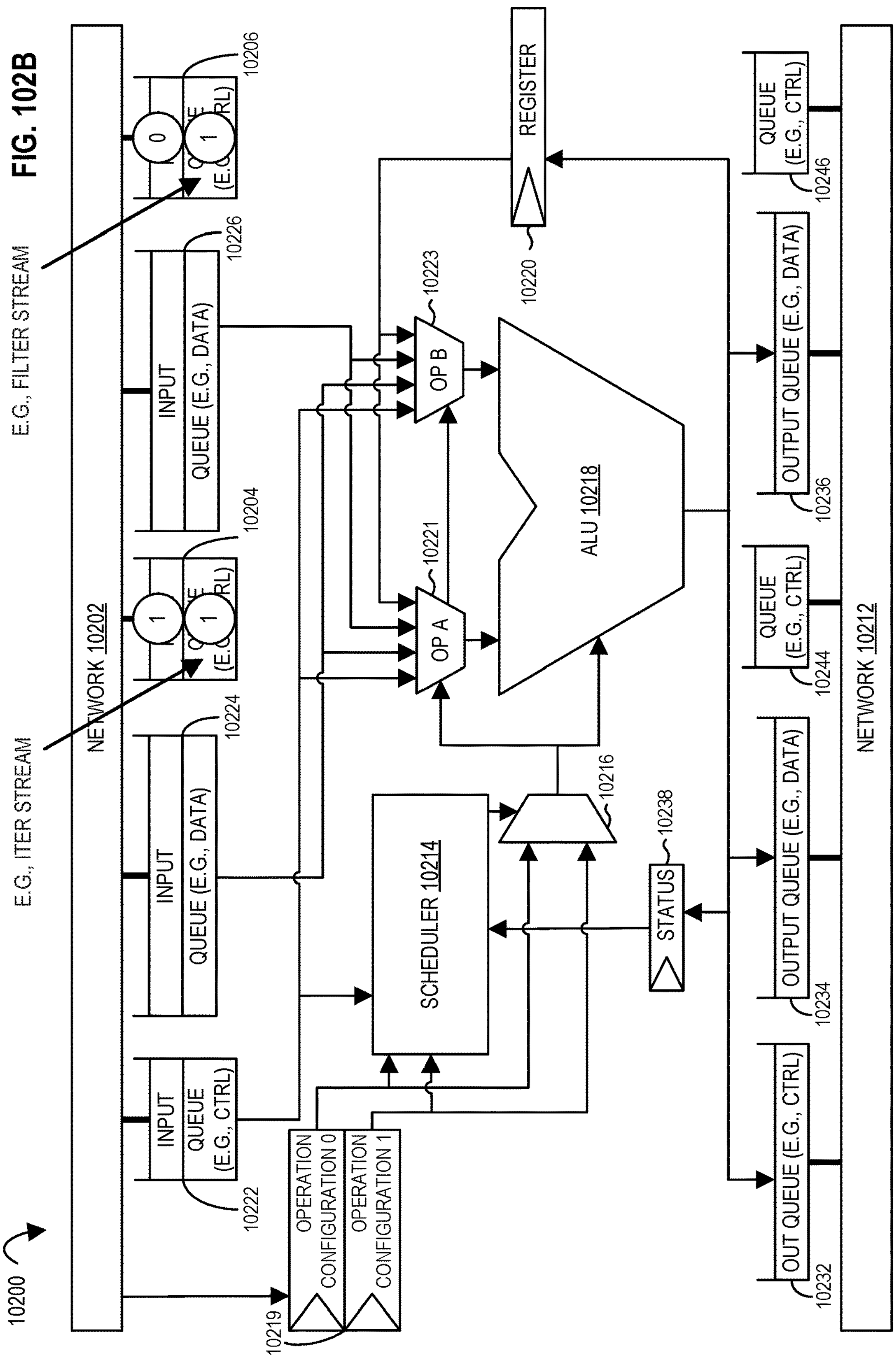

In FIG. 102B, a control value of (e.g., Boolean) one is in a first slot of (e.g., control) input queue 10204 (for example, to indicate a beginning of an iteration stream), a control value of (e.g., Boolean) one is in a second slot of (e.g., control) input queue 10204 (for example, to indicate a next element of the iteration stream), a predicate filter value of (e.g., Boolean) one is in a first slot of (e.g., predicate filter) input queue 10206 (for example, of a filter stream), and a predicate filter value of (e.g., Boolean) zero is in a second slot of (e.g., control) input queue 10206 (for example, of the filter stream).

Figure 102C:
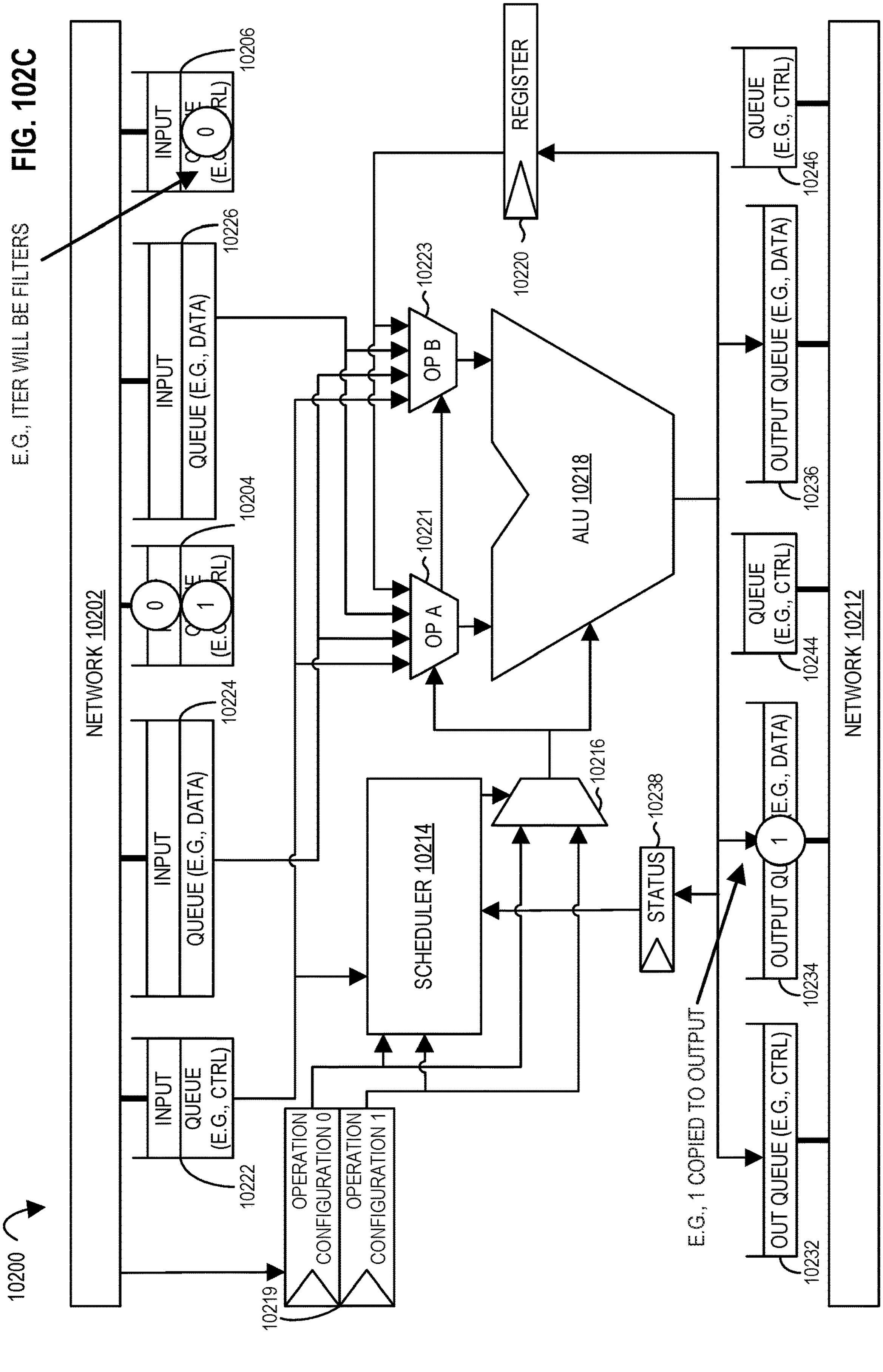

In FIG. 102C, because the predicate filter value of (e.g., Boolean) one was in a first slot of (e.g., predicate filter) input queue 10206 and the (e.g., stream) control value of (e.g., Boolean) one was in a first slot of (e.g., control) input queue 10204, PE 10200 stores the control value of (e.g., Boolean) one in the output queue 10232, the control value of (e.g., Boolean) one is dequeued from the first slot of (e.g., control) input queue 10204, the predicate filter value of (e.g., Boolean) one is dequeued from the first slot of the (e.g., predicate filter) input queue 10204, the control value of (e.g., Boolean) one is moved into the first slot from the second slot of (e.g., control) input queue 10204, the predicate control value of (e.g., Boolean) zero is moved into the first slot from the second slot of (e.g., predicate filter) input queue 10206, and a control value of (e.g., Boolean) zero is stored (e.g., by an upstream PE) in the second slot of (e.g., control) input queue 10204 (for example, to indicate an end of the iteration stream).

Figure 102D:
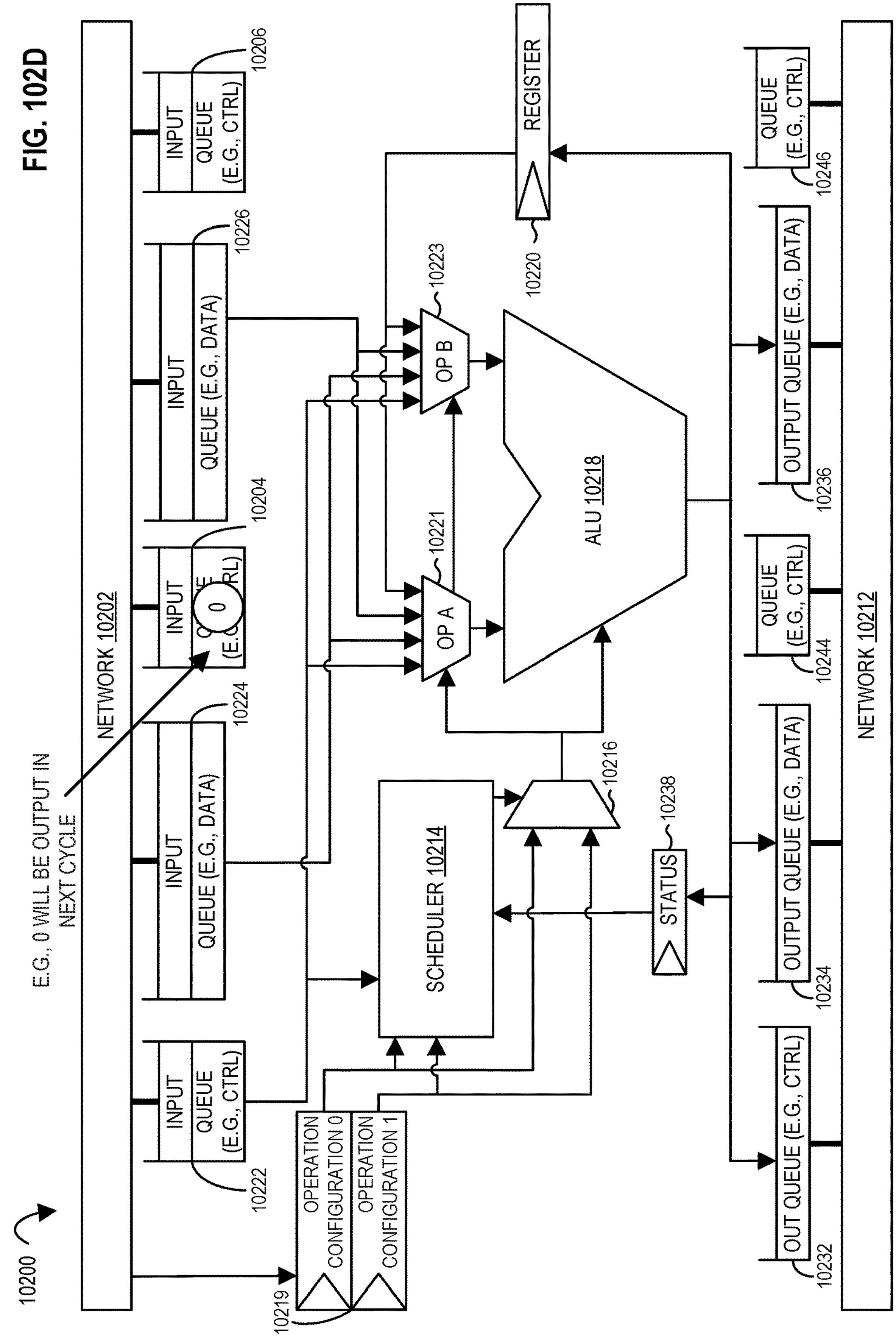

In FIG. 102D, because the predicate filter value of (e.g., Boolean) zero was in the first slot of (e.g., predicate filter) input queue 10206 even though the (e.g., stream) control value of (e.g., Boolean) one was in a first slot of (e.g., control) input queue 10204, PE 10200 does not store a control value in the output queue 10232, the control value of (e.g., Boolean) one is dequeued from the first slot of (e.g., control) input queue 10204, the predicate filter value of (e.g., Boolean) zero is dequeued from the first slot of the (e.g., predicate filter) input queue 10204, and the control value of (e.g., Boolean) zero is moved into the first slot from the second slot of (e.g., control) input queue 10204.

Figure 102E:
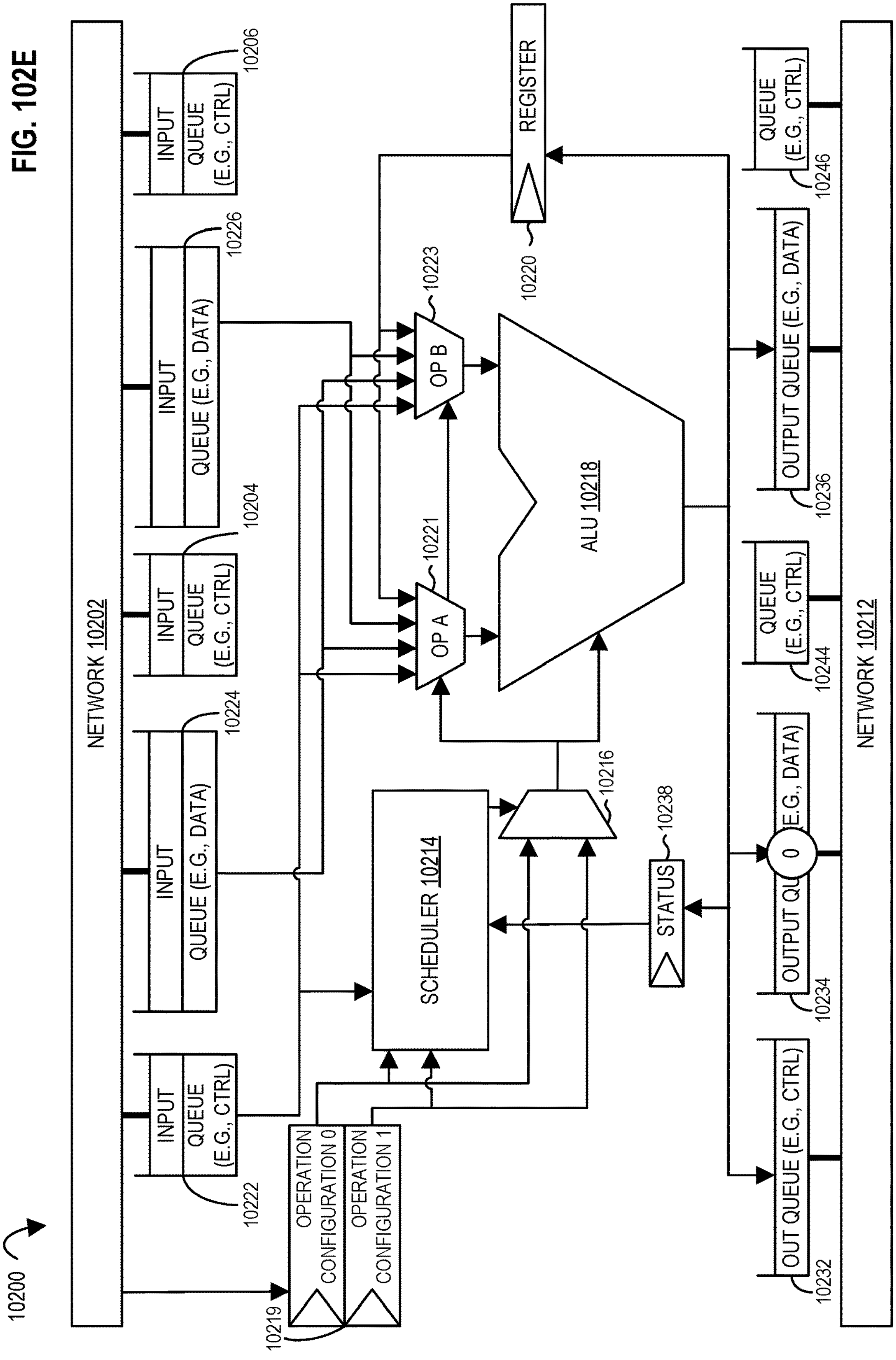

In FIG. 102E, the (e.g., stream) control value of (e.g., Boolean) zero was in the first slot of (e.g., control) input queue 10204, so the PE 10200 stores a (e.g., Boolean) control value of zero in the output queue 10232 to indicate the end of that stream.

The input data that is queued may be sent from another component of a CSA, e.g., from a plurality of other PEs as discussed herein. In certain embodiments, the data is read from the first slot of a queue, and when consumed (e.g., removed), any data from other slots of the queue are advanced such that data from the second slot is moved into the first slot, etc.

In certain embodiments, PE 10200 is stalled from performing the Predfilter operation until there is both (i) space available in the output queue that is to be used for storing resultant data, and (ii) a stream control value and a predicate stream value are available.

In certain embodiments, PE 10200, when given an iteration stream and a control stream, removes some iterations of the control stream based on the iteration stream. In certain embodiments, PE 10200 produces truncated control stream (with a 0) as an output, e.g., according to the control (ctl), predicate (pred), and output (ctlout) table in the above description of Predfilter.

In the depicted embodiment, PE 10200 includes the components of PE 5800 from FIG. 58, for example, with the components ending with the same two numbers having the same functionality. In one embodiment, scheduler 10214 schedules an operation or operations of processing element 10200 for execution according to the configuration value, e.g., and when input data and control input arrives. See, for example, the discussion of FIGS. 33-57.

Reduction (Red*)

In one embodiment, a CSA architecture includes a configuration value that, when stored into the configuration storage (e.g., register), causes the CSA (e.g., a PE thereof) to perform a reduction (Red*) operation according to the following (e.g., semantics and/or description), e.g., where the * indicates an arithmetic or logical operation such as, but not limited to, add, subtract, AND, OR, and XOR.

Operation: Reduction operations
red{and,or,xor}{8,16,32,64} result.Cd.iN, init.CRLu.iN, seq.CRLu.iN, seqctl.CRLu.i1
red{add,sub,mul}{8,16,32,64,f32,f64} result.Cd.iN, init.CRLu.iN, seq.CRLu.iN, seqctl.CRLu.iN
fmredaf{32,64} result.Cd.fN, init.CRLu.fN, seq1.CRLu.fN, seq2.CRLu.fN, seqctl.CRLu.f1
omitted: div, min, max
Description: The working value is initialized with $_{init}$. Each time $_{seqctl}$ is true, op is performed between the working value and a new $_{seq}$ value. When the $_{seqctl}$ is false, the working value is sent to $_{result}$.

FIGS. 103A-103D illustrate a processing element 10300 performing a Red* operation according to embodiments of the disclosure. In the depicted embodiment, an operation configuration value for a Red* operation is stored (e.g., during a programming time period) into operation configuration register 10319. In the depicted embodiment, the * is an add operation, but as discussed above, other operations may use reduction functionality.

In FIGS. 103A-103E, the numbers in the circles for the bits in (e.g., control) input queue 10322 indicate a predicate stream with a one for each time the operation is to occur and a zero when to end the operation (e.g., and dequeue the stored value in register 10320), and the numbers in the circles for the bits in input queue 10324, input queue 3.6DB26, and output queue 10334 are the values themselves (e.g., circled one representing an integer one).

Figure 103A:
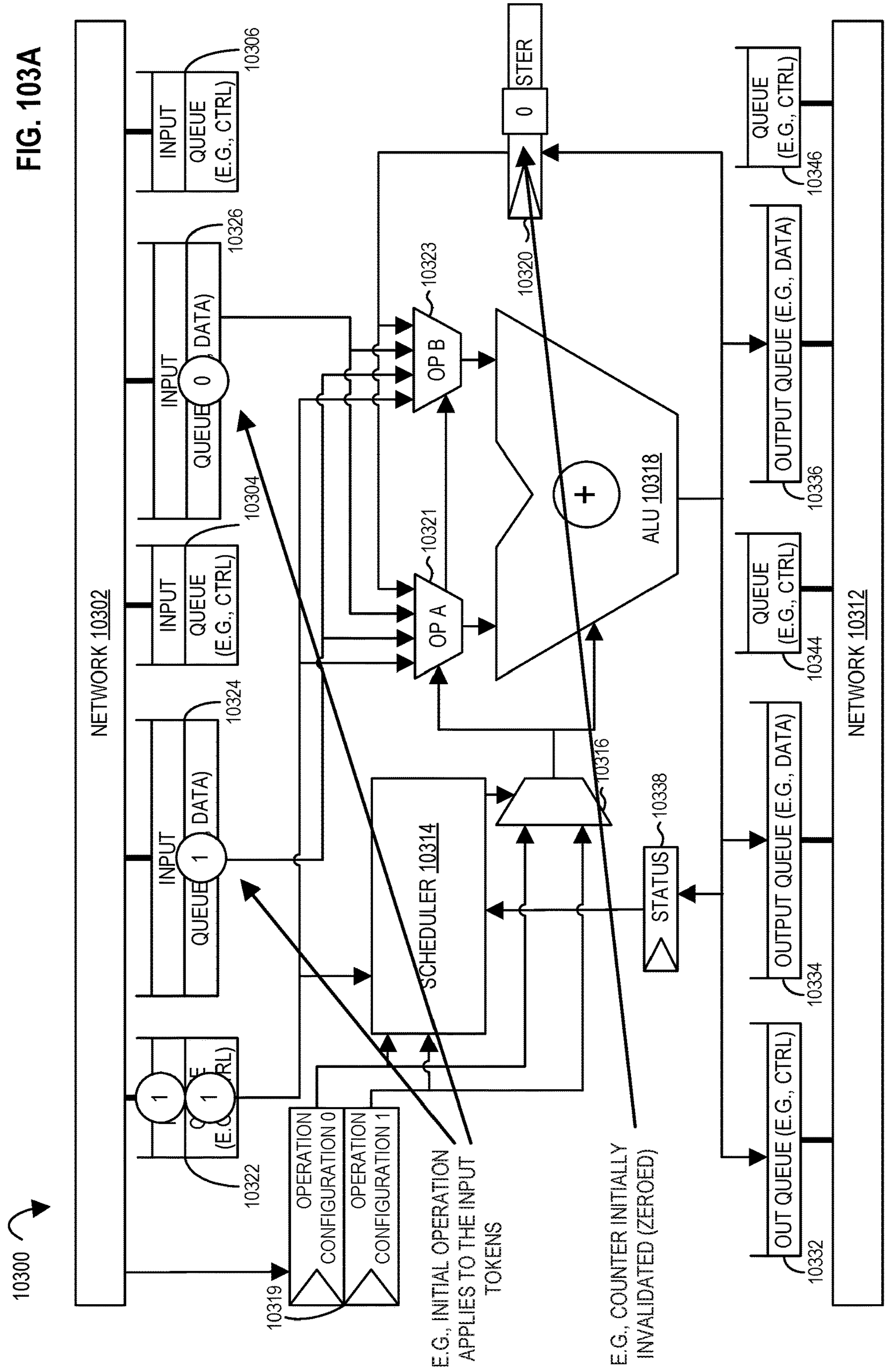
FIGS. 103A-103D illustrate a processing element performing a Red* operation according to embodiments of the disclosure.

In FIG. 103A, a (e.g., predicate) control value of (e.g., Boolean) one is in a first slot of (e.g., control) input queue 10204 (for example, to indicate a first iteration of a reduction operation), a (e.g., predicate) control value of (e.g., Boolean) one is in a second slot of (e.g., control) input queue 10204 (for example, to indicate a second iteration of a reduction operation), a first data value of one is in the first slot of input queue 6124, a second data value of zero is in the first slot of input queue 6126, and data value of zero is in register 6120.

Figure 103B:
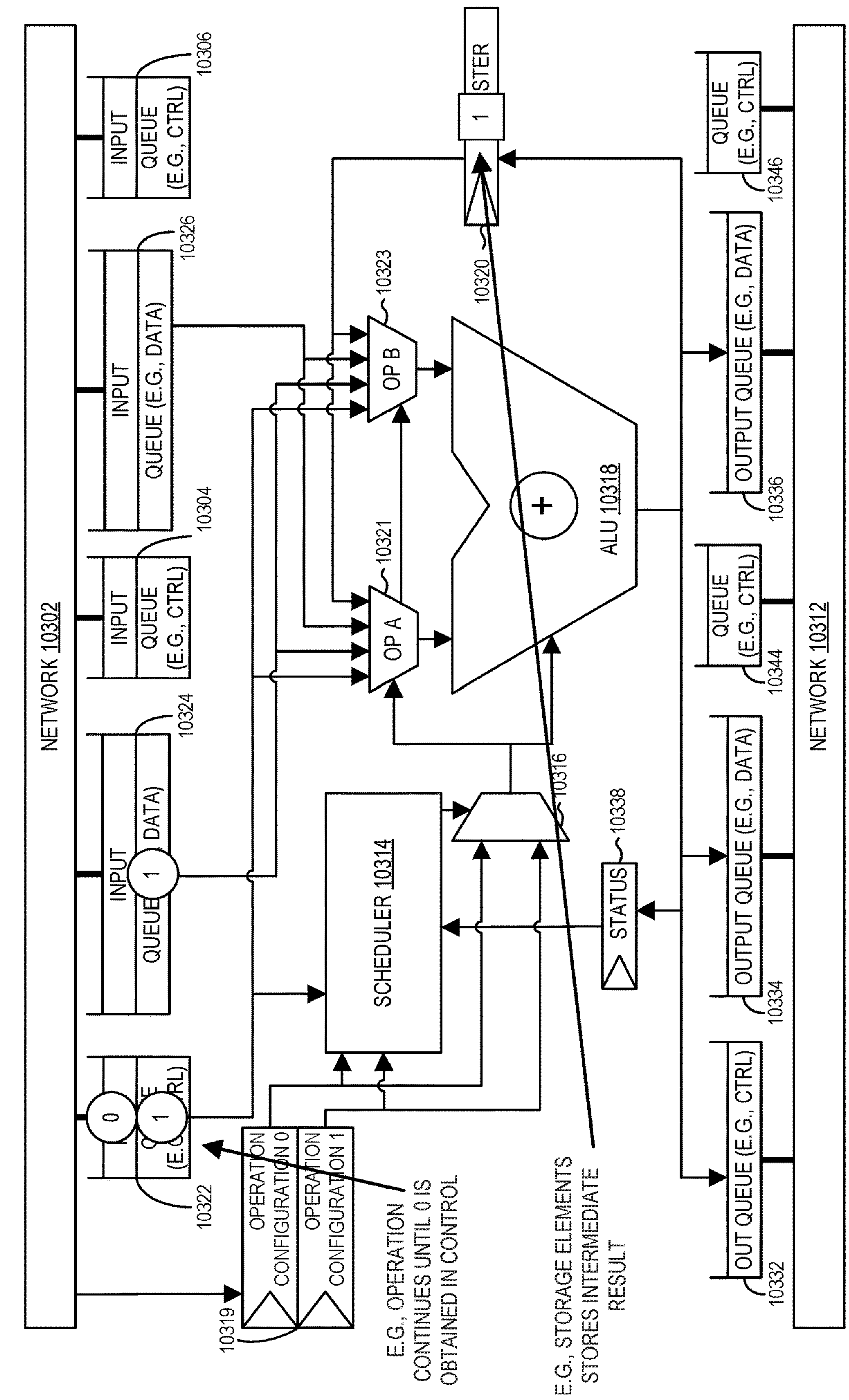

In FIG. 103B, the (e.g., predicate) control value of (e.g., Boolean) one in the first slot of (e.g., control) input queue 10204 causes a first iteration of the reduction operation (an ADD in this example) to occur, and the resultant of one plus zero is one, and that one value is stored into register 6120, the (e.g., predicate) control value of (e.g., Boolean) one is dequeued from the first slot of (e.g., control) input queue 10204, the (e.g., predicate) control value of (e.g., Boolean) one is moved into the first slot from the second slot of (e.g., control) input queue 10204 (for example, to indicate a second iteration of a reduction operation), a (e.g., predicate) control value of (e.g., Boolean) zero is stored (e.g., by an upstream PE) into the second slot of (e.g., control) input queue 10204 (for example, to indicate the end of the reduction operation), and the second data value of zero is dequeued from the first slot of input queue 6126.

Figure 103C:
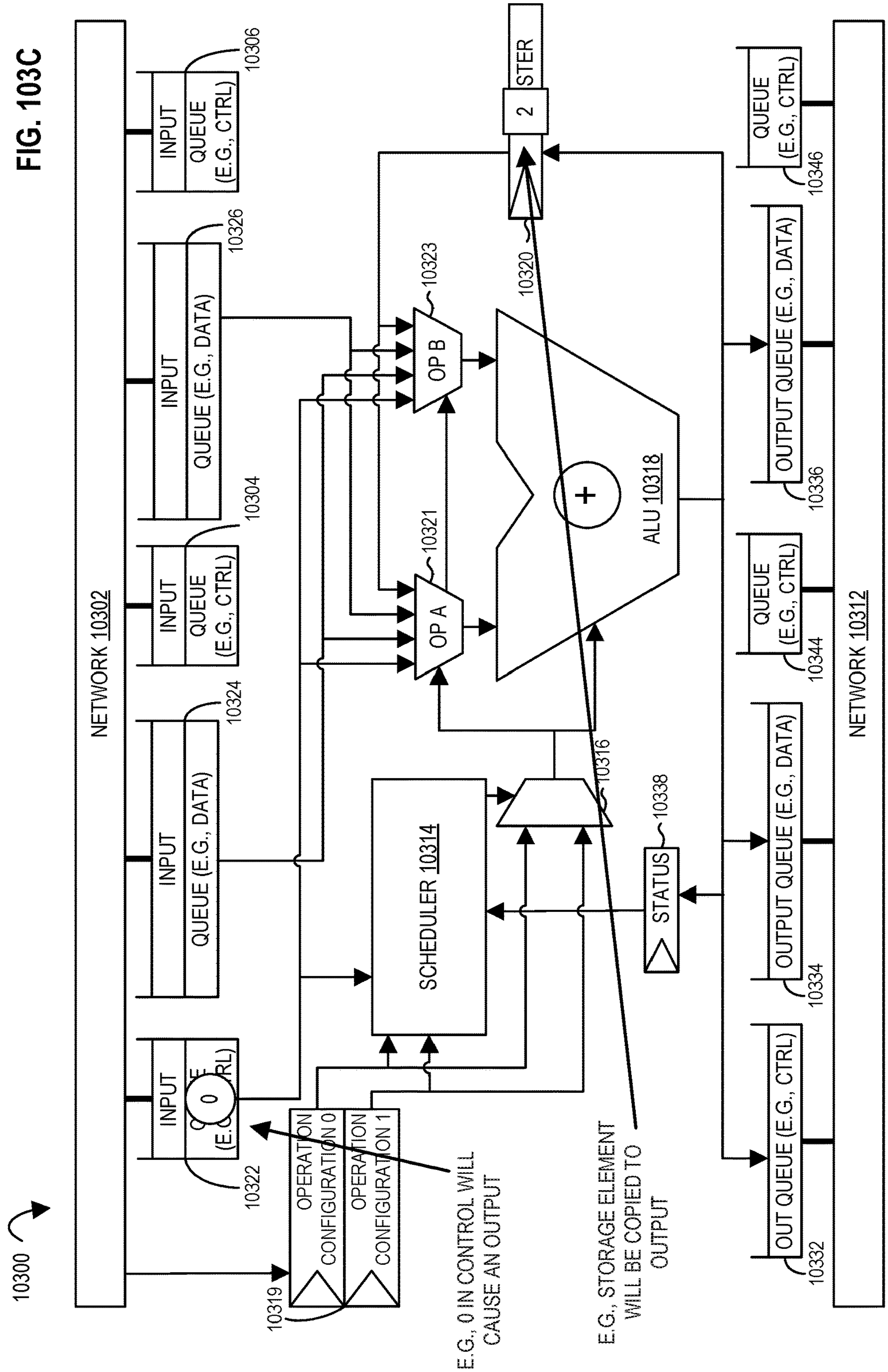

In FIG. 103C, the (e.g., predicate) control value of (e.g., Boolean) one in the first slot of (e.g., control) input queue 10204 causes a second iteration of the reduction operation (an ADD in this example) to occur, and the resultant of one (from the input queue 6124) plus one (from the register 6120) is two, that two value is then stored into register 6120, the (e.g., predicate) control value of (e.g., Boolean) one is dequeued from the first slot of (e.g., control) input queue 10204, and the (e.g., predicate) control value of (e.g., Boolean) zero is moved into the first slot from the second slot of (e.g., control) input queue 10204 (for example, to indicate the end of the reduction operation).

Figure 103D:
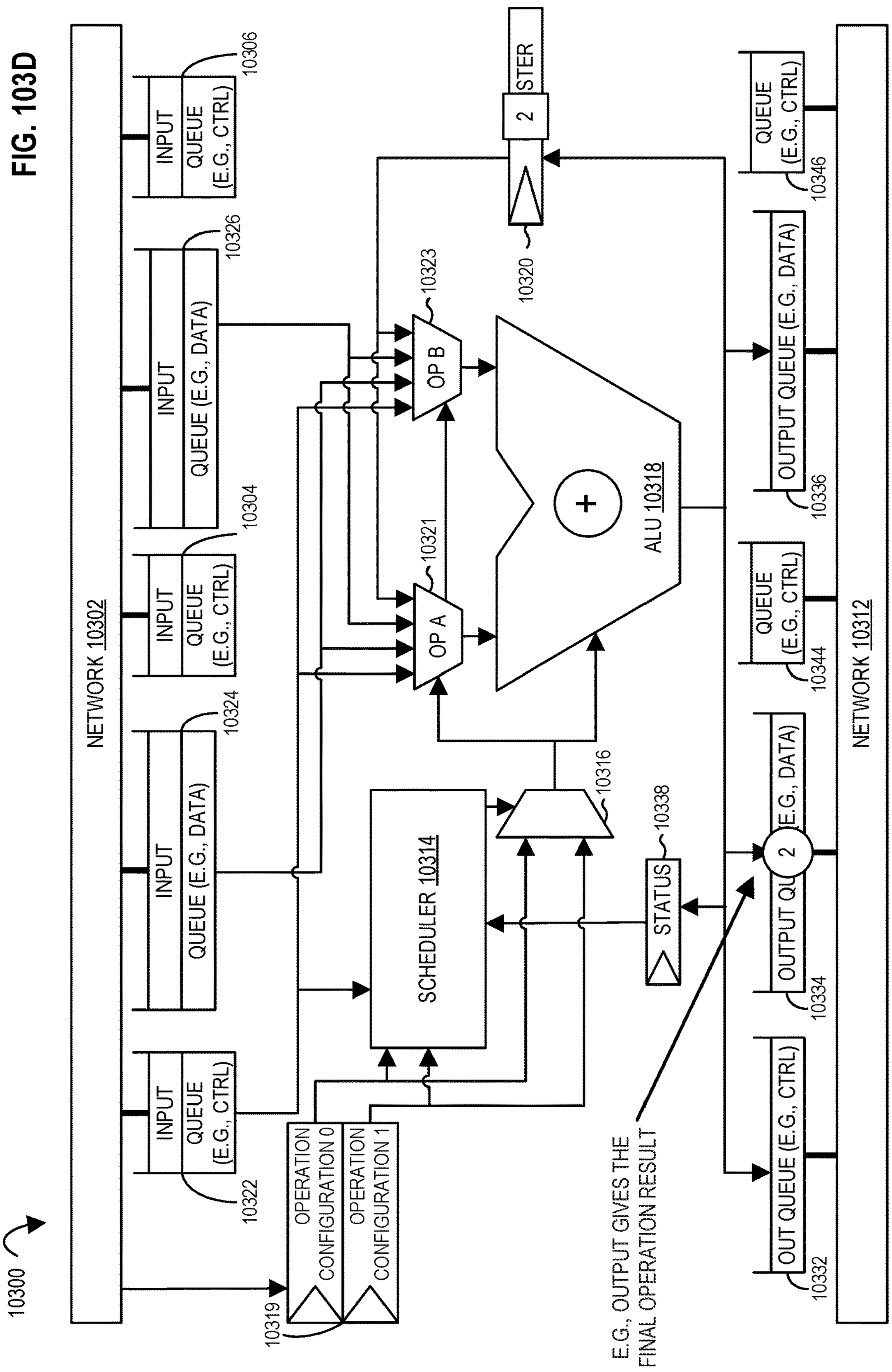

In FIG. 103D, the (e.g., predicate) control value of (e.g., Boolean) zero in the first slot of (e.g., control) input queue 10204 causes the end of the reduction operation (an ADD in this example) to occur and the data value of two from the register 6120 is stored into the output queue 6134, the (e.g., predicate) control value of (e.g., Boolean) zero is dequeued from the first slot of (e.g., control) input queue 10204, and the first data value of one is dequeued from the first slot of input queue 6124.

The input data that is queued may be sent from another component of a CSA, e.g., from a plurality of other PEs as discussed herein. In certain embodiments, the data is read from the first slot of a queue, and when consumed (e.g., removed), any data from other slots of the queue are advanced such that data from the second slot is moved into the first slot, etc. For all of the embodiments herein, the data value from the output queues may be consumed from the output queues, e.g., by a downstream PE or PEs.

In certain embodiments, Red* computes a reduction operation and carries a store value (e.g., in register 6120) and uses it as an operand. In certain embodiments, the predicate stream is used to control the operation (e.g., a summation in this example), and when the stream element is false (e.g., a Boolean zero), the stored value is output.

In certain embodiments, PE 10300 is stalled from performing the Red* operation until there is both (i) space available in the output queue that is to be used for storing resultant data, and (ii) an input control value is in input queue 10322 and a first set of input operands (e.g., elements) for the * operation are available.

In the depicted embodiment, PE 10300 includes the components of PE 5800 from FIG. 58, for example, with the components ending with the same two numbers having the same functionality. In one embodiment, scheduler 10314 schedules an operation or operations of processing element 10300 for execution according to the configuration value, e.g., and when input data and control input arrives. See, for example, the discussion of FIGS. 33-57.

Sequence Reduction (Sred*)

In one embodiment, a CSA architecture includes a configuration value that, when stored into the configuration storage (e.g., register), causes the CSA (e.g., a PE thereof) to perform a sequence reduction (Sred*) operation according to the following (e.g., semantics and/or description), e.g., where the * indicates an arithmetic or logical operation such as, but not limited to, add, subtract, AND, OR, and XOR.

Operation: Sequence reduction ops (provides a stream of the intermediate values)
sred{and,or,xor}{8,16,32,64} result.Cd.iN, each.Cd.iN, init.CRLu.iN, seq.CRLu.iN, seqctl.CRLu.i1
sred{add,sub,mul}{8,16,32,64,f32,f64} result.Cd.iN, each.Cd.iN, init.CRLu.iN, seq.CRLu.iN, seqctl.CRLu.i1
fmsredaf{32,64} result.Cd.fN, each.Cd.fN, init.CRLu.iN, seq1.CRLu.iN, seq2.CRLu.iN, seqctl.CRLu.iN
omitted: div, min, max
Description: The working value is initialized with init. Each time seqct1 is true, op is performed between the working value and in, and the working value is updated, and the value is also sent to each. When the seqctl1 is false, the working value is sent to result. Conceptually, the each output is like stride. Example for add, where successive rows represent time passing:

| result | each | init | seq | seqctl |
|---|---|---|---|---|
| | | 0 | | |
| | 3 | | 3 | 1 |
| | 8 | | 5 | 1 |
| | 20 | | 12 | 1 |
| 20 | | | | 0 |

Note the initial value by itself does not get copied to each, only the result of the reduction operation. (This is different than seq/stride, which output the initial value, then successive values.)

FIGS. 104A-104D illustrate a processing element 10400 performing a Sred* operation according to embodiments of the disclosure. In the depicted embodiment, an operation configuration value for a Sred* operation is stored (e.g., during a programming time period) into operation configuration register 10419. In the depicted embodiment, the * is an add operation, but as discussed above, other operations may use with reduction functionality.

In FIGS. 104A-104E, the numbers in the circles for the bits in (e.g., control) input queue 10422 indicate a predicate stream with a one for each time the operation is to occur and a zero when to end the operation (e.g., and dequeue the stored value in register 10420), and the numbers in the circles for the bits in input queue 10424, input queue 3.6DB26, and output queue 10434 are the values themselves (e.g., circled one representing an integer one).

Figure 104A:
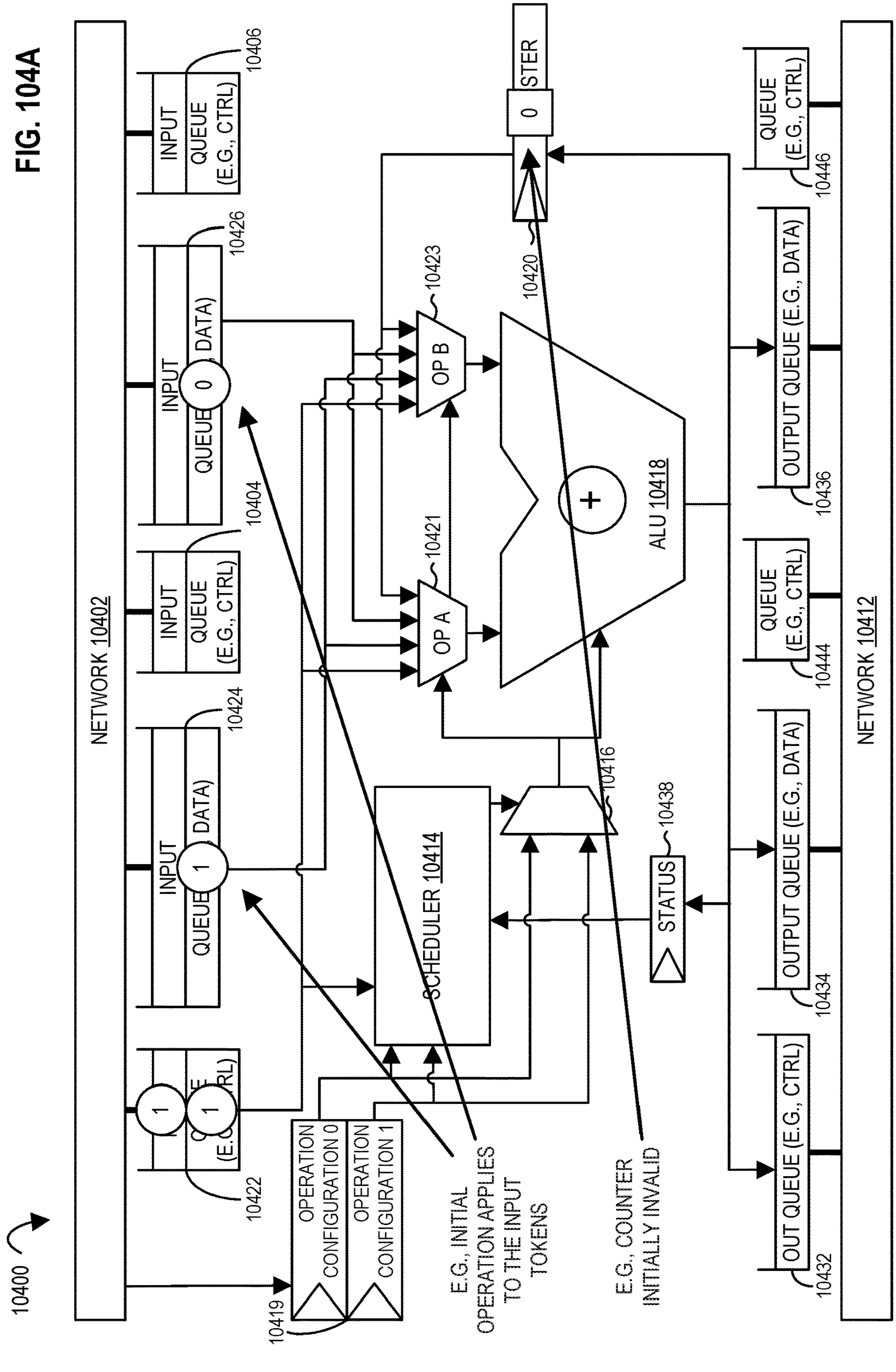
FIGS. 104A-104D illustrate a processing element performing a Sred* operation according to embodiments of the disclosure.

In FIG. 104A, a (e.g., predicate) control value of (e.g., Boolean) one is in a first slot of (e.g., control) input queue 10204 (for example, to indicate a first iteration of a reduction operation), a (e.g., predicate) control value of (e.g., Boolean) one is in a second slot of (e.g., control) input queue 10204 (for example, to indicate a second iteration of a reduction operation), a first data value of one is in the first slot of input queue 10424, a second data value of zero is in the first slot of input queue 10426, and data value of zero is in register 10420.

Figure 104B:
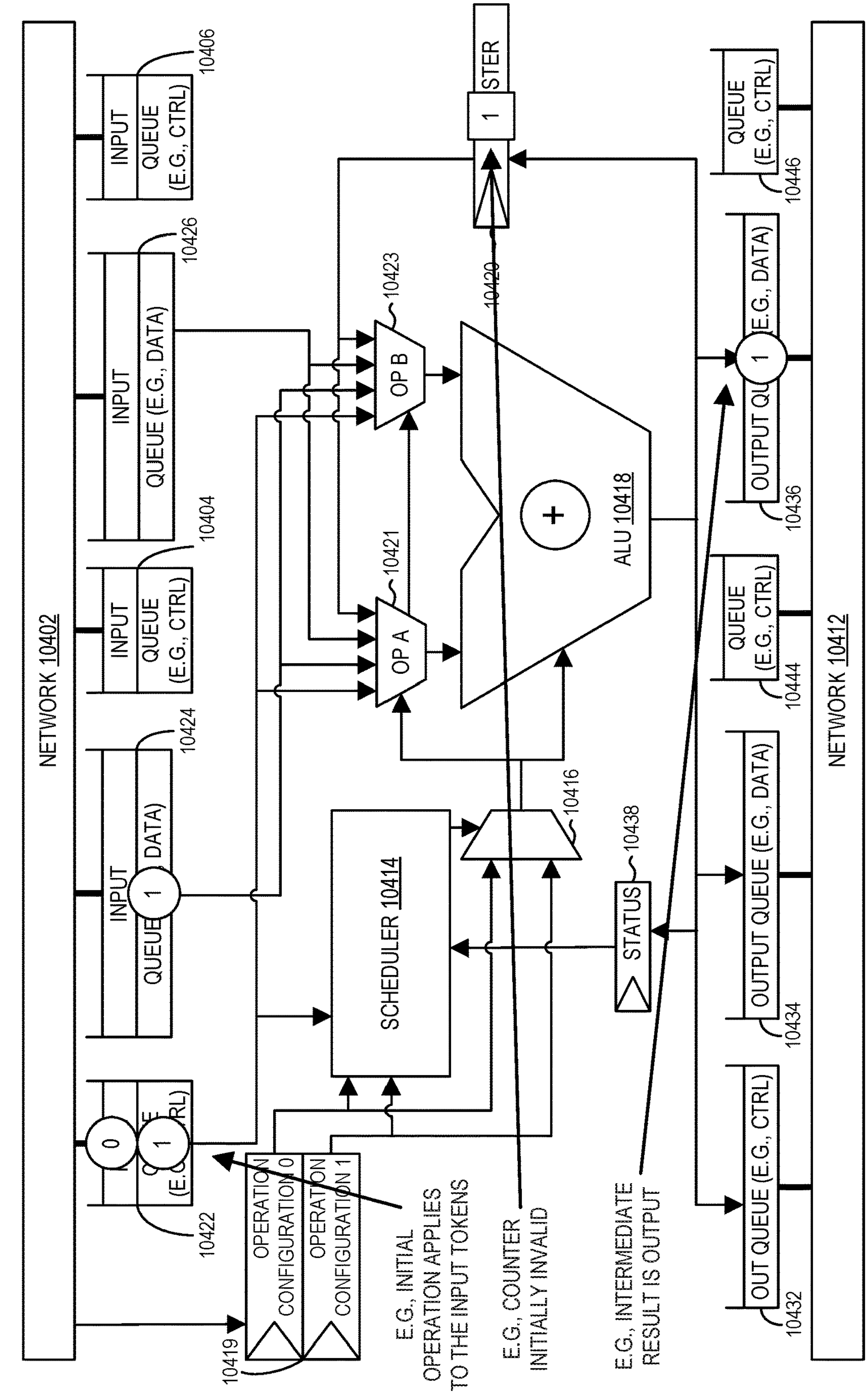

In FIG. 104B, the (e.g., predicate) control value of (e.g., Boolean) one in the first slot of (e.g., control) input queue 10204 causes a first iteration of the reduction operation (an ADD in this example) to occur, and the resultant of one plus zero is one, and that one value is stored into register 10420 and output into output buffer 10436, the (e.g., predicate) control value of (e.g., Boolean) one is dequeued from the first slot of (e.g., control) input queue 10204, the (e.g., predicate) control value of (e.g., Boolean) one is moved into the first slot from the second slot of (e.g., control) input queue 10204 (for example, to indicate a second iteration of a reduction operation), a (e.g., predicate) control value of (e.g., Boolean) zero is stored (e.g., by an upstream PE) into the second slot of (e.g., control) input queue 10204 (for example, to indicate the end of the reduction operation), and the second data value of zero is dequeued from the first slot of input queue 10426.

Figure 104C:
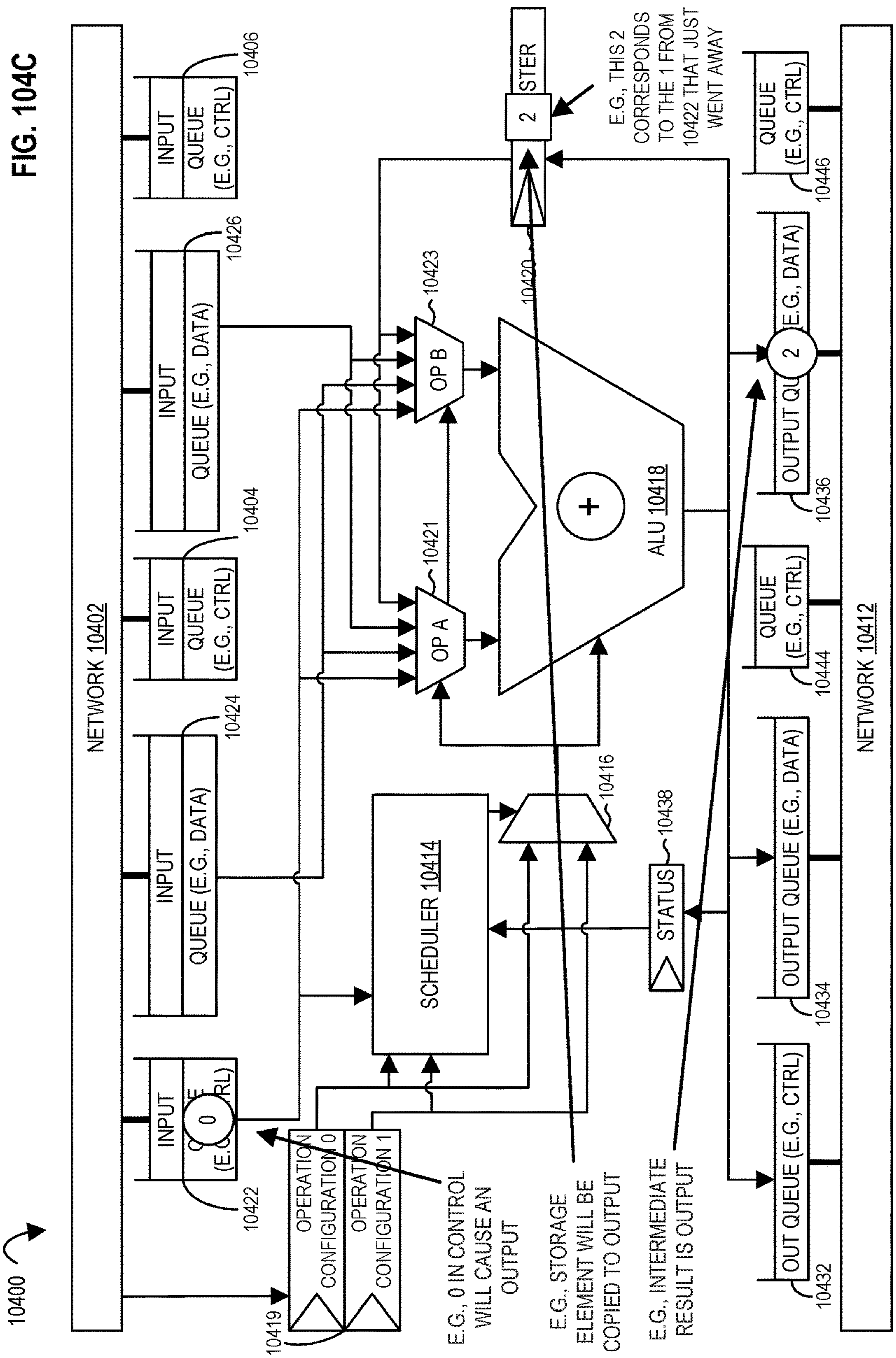

In FIG. 104C, the (e.g., predicate) control value of (e.g., Boolean) one in the first slot of (e.g., control) input queue 10204 causes a second iteration of the reduction operation (an ADD in this example) to occur, and the resultant of one (from the input queue 10424) plus one (from the register 10420) is two, that two value is then stored into register 10420 and output into output buffer 10436, the (e.g., predicate) control value of (e.g., Boolean) one is dequeued from the first slot of (e.g., control) input queue 10204, and the (e.g., predicate) control value of (e.g., Boolean) zero is moved into the first slot from the second slot of (e.g., control) input queue 10204 (for example, to indicate the end of the reduction operation).

Figure 104D:
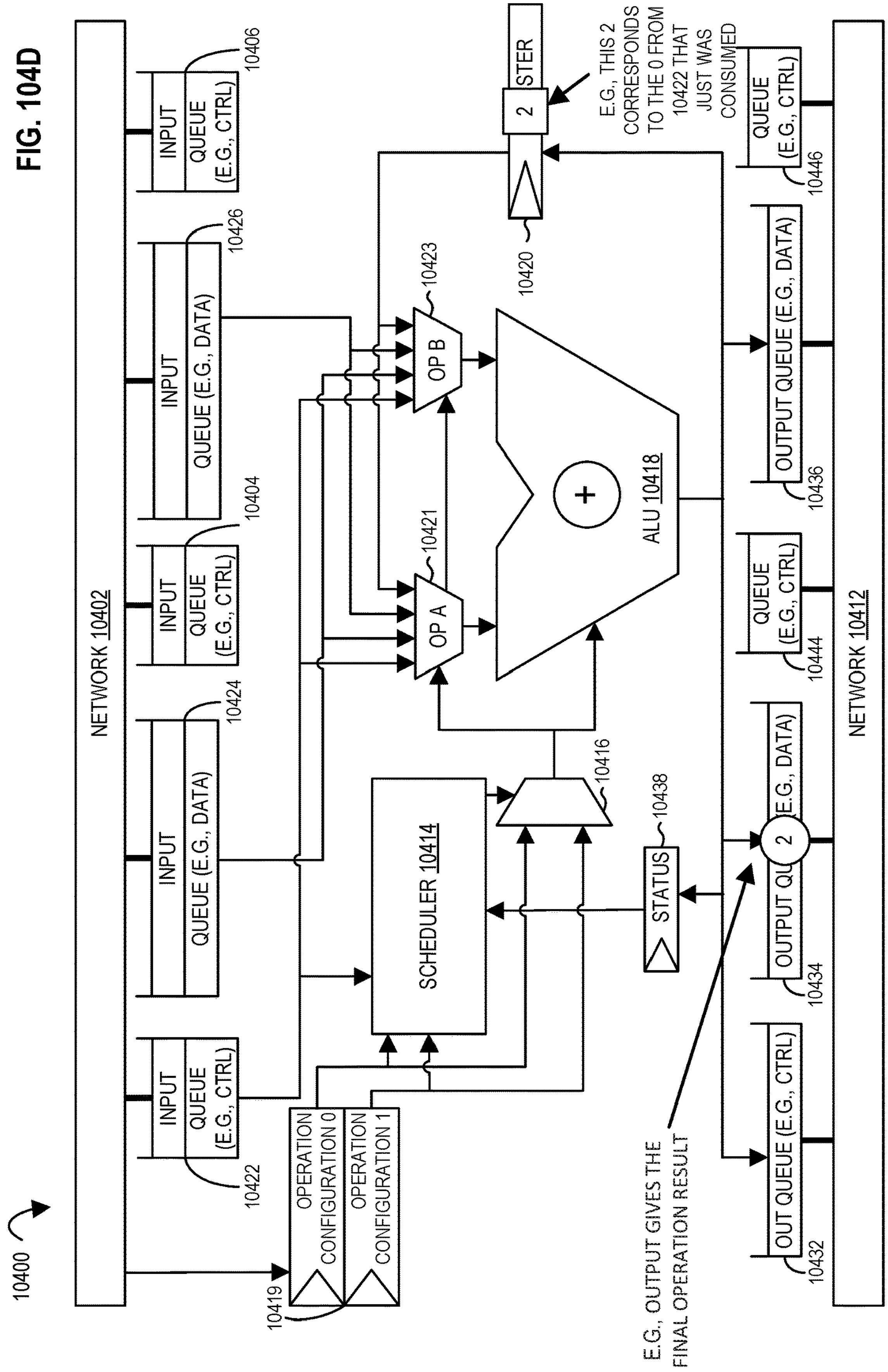

In FIG. 104D, the (e.g., predicate) control value of (e.g., Boolean) zero in the first slot of (e.g., control) input queue 10204 causes the end of the reduction operation (an ADD in this example) to occur and the data value of two from the register 10420 is stored into the output queue 10434, the (e.g., predicate) control value of (e.g., Boolean) zero is dequeued from the first slot of (e.g., control) input queue 10204, and the first data value of one is dequeued from the first slot of input queue 10424.

The input data that is queued may be sent from another component of a CSA, e.g., from a plurality of other PEs as discussed herein. In certain embodiments, the data is read from the first slot of a queue, and when consumed (e.g., removed), any data from other slots of the queue are advanced such that data from the second slot is moved into the first slot, etc. For all of the embodiments herein, the data value from the output queues may be consumed from the output queues, e.g., by a downstream PE or PEs.

In certain embodiments, Sred* computes a reduction operation, carries the store value (e.g., in register 10420) and uses it as an operand, but also produces an output for each intermediate result. The intermediate result may be sent to second output, but may also be combined in first output (e.g. in this example all values would be written to 10434). In certain embodiments, the predicate stream is used to control the operation (e.g., a summation in this example), and when the stream element is false (e.g., a Boolean zero), the stored value is output.

In certain embodiments, PE 10400 is stalled from performing the Sred* operation until there is both (i) space available in the output queue(s) that is to be used for storing resultant data, and (ii) an input control value is in input queue 10422 and a first set of input operands (e.g., elements) for the * operation are available.

In the depicted embodiment, PE 10400 includes the components of PE 5800 from FIG. 58, for example, with the components ending with the same two numbers having the same functionality. In one embodiment, scheduler 10414 schedules an operation or operations of processing element 10400 for execution according to the configuration value, e.g., and when input data and control input arrives. See, for example, the discussion of FIGS. 33-57.

Pack

In one embodiment, a CSA architecture includes a configuration value that, when stored into the configuration storage (e.g., register), causes the CSA (e.g., a PE thereof) to perform a Pack operation according to the following (e.g., semantics and/or description).

```
Operation:
pack8_64    res.CRd.i64,    v0.CRLu.i8,  v1.CRLu.i8,  v2.CRLu.i8,  v3.CRLu.i8,
                            v4.CRLu.i8,  v5.CRLu.i8,  v6.CRLu.i8,  v7.CRLu.i8
pack16_64   res.CRd.i64,    v0.CRLu.i16, v1.CRLu.i16, v2.CRLu.i16, v3.CRLu.i16
pack32_64   res.CRd.i64,    v0.CRLu.i32, v1.CRLu.i32
Semantics: pack successive small values into increasing positions in a large value
pack8_64:   res = (v0<<0) | (v<<8)
| (v2<<16) | (v3<<24) | (v4<<32) | (v5<<40) | (v6<<48) | (v7<<56)
pack16_64:  res = (v0<<0) | (v1<<16) | (v2<<32) | (v3<<48)
pack32_64:  res = (v0<<0) | (v1<<32)
```

FIGS. 105A-105F illustrate a processing element 10500 performing a Pack operation according to embodiments of the disclosure. In the depicted embodiment, an operation configuration value for a Pack operation is stored (e.g., during a programming time period) into operation configuration register 10519. As one example, a (e.g., data) first input queue is to receive an input stream of data values to be packed, and a (e.g., data) second input queue is to receive an input stream of data values to be packed. In the depicted embodiment, the first stream of data values is received (e.g., on an element by element basis) in (e.g., wider) input queue 10524 (for example, having a multiple bit width, e.g., 8, 16, 32, or 64), and the second stream of data values is received (e.g., on an element by element basis) in (e.g., wider) input queue 10526 (for example, having a multiple bit width, e.g., 8, 16, 32, or 64).

In FIGS. 105A-105F, the numbers in input queue 10524 and input queue 10526 are labels to indicate an instance of a data (e.g., 8 bit) value, and output queue includes an X as a label to indicate another instance of a data (e.g., 64 bit) value.

Figure 105A:
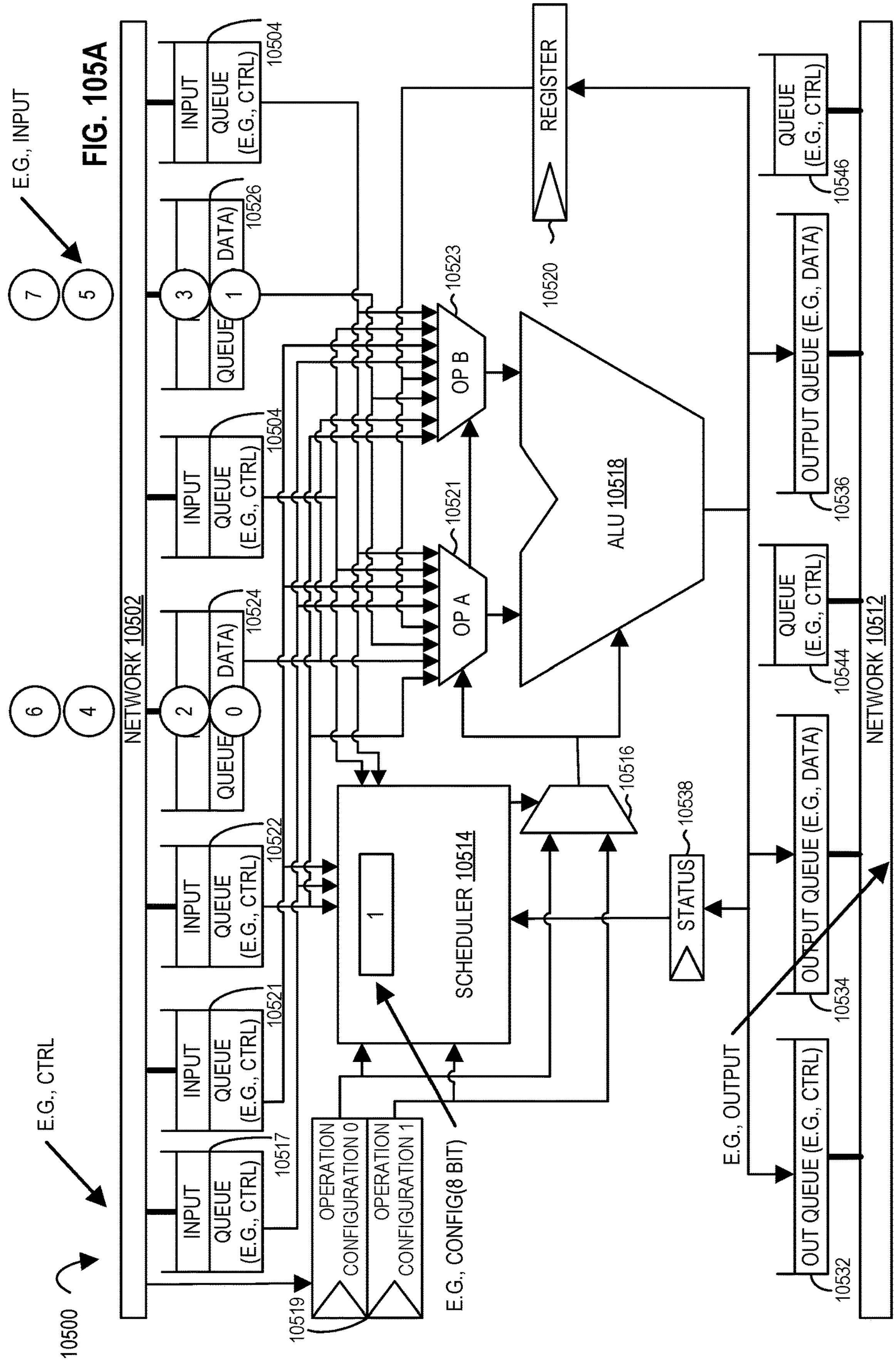
FIGS. 105A-105F illustrate a processing element performing a Pack operation according to embodiments of the disclosure.

In FIG. 105A, the programmed Pack PE has received a first data value (labeled as circled 0) in the first slot of input queue 10524, a second data value (labeled as circled 2) in the second slot of input queue 10524, a first data value (labeled as circled 1) in the first slot of input queue 10526, and a second data value (labeled as circled 3) in the second slot of input queue 10526. In one embodiment, the data values are sized such that the resultant packed data value fits into (e.g., a single slot of) output queue. In one embodiment, each input data value is eight bits, and the single, resultant packed data value is 64 bits.

Figure 105B:
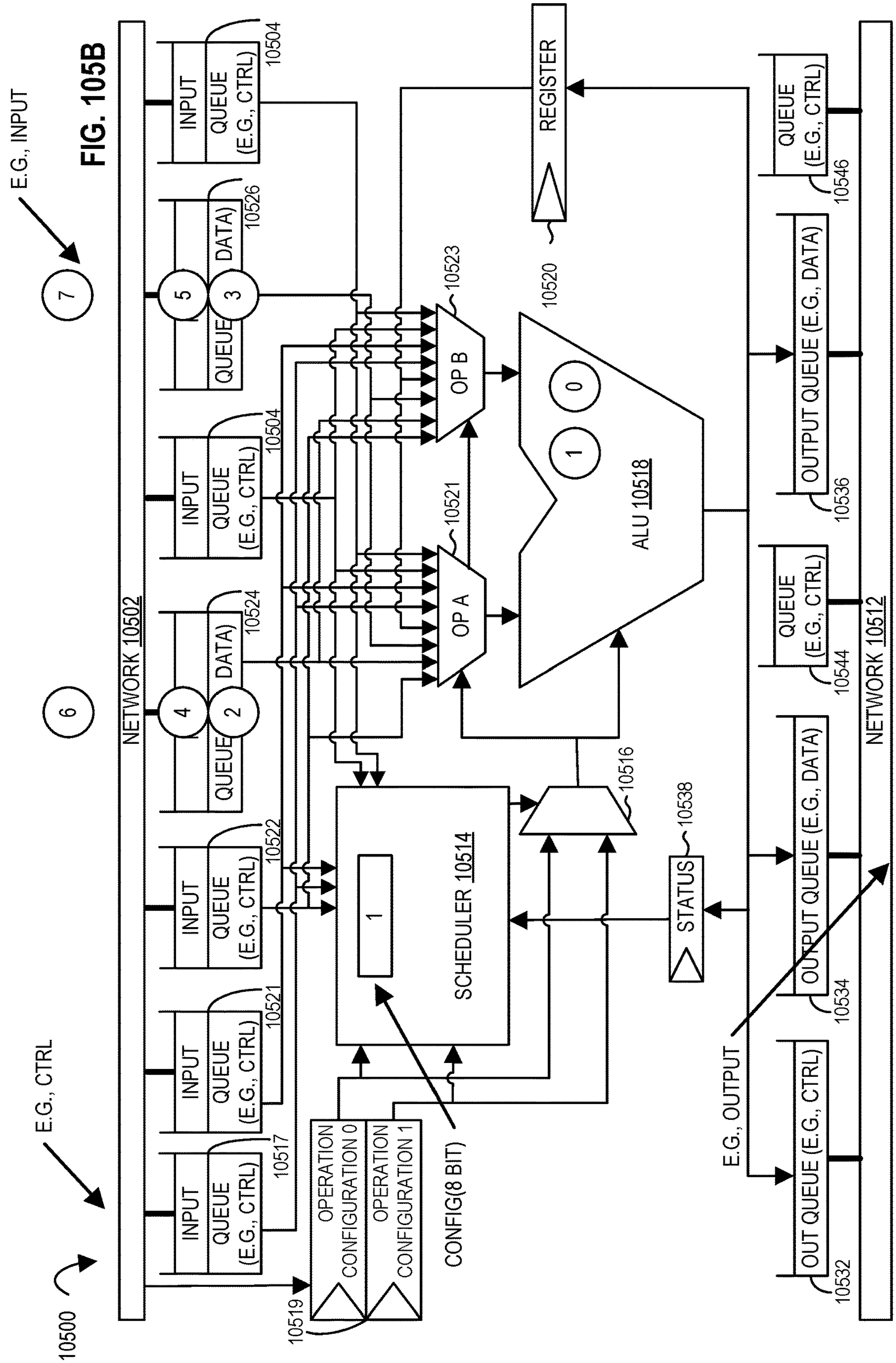

In FIG. 105B, a pack operation was performed by PE 10500 (e.g., by ALU 10518) by packing (e.g., into adjacent element positions of the resultant) the first data value (labeled as circled 0) from the first slot of input queue 10524 and the first data value (labeled as circled 1) in the first slot of input queue 10526 to form an intermediate packed data value, and dequeuing those first data values.

Also, PE 10500 moved the second data value (labeled as circled 2) from the first slot into the second slot of input queue 10524, and the second data value (labeled as circled 3) from the first slot into the second slot of input queue 10526. A third data value (labeled as circled 4) has been stored (e.g., by an upstream PE) into the second slot of input queue 10524, and a third data value (labeled as circled 5) has been stored (e.g., by an upstream PE) into the second slot of input queue 10526. In one embodiment, the intermediate packed data value is stored into register 10520.

Figure 105C:
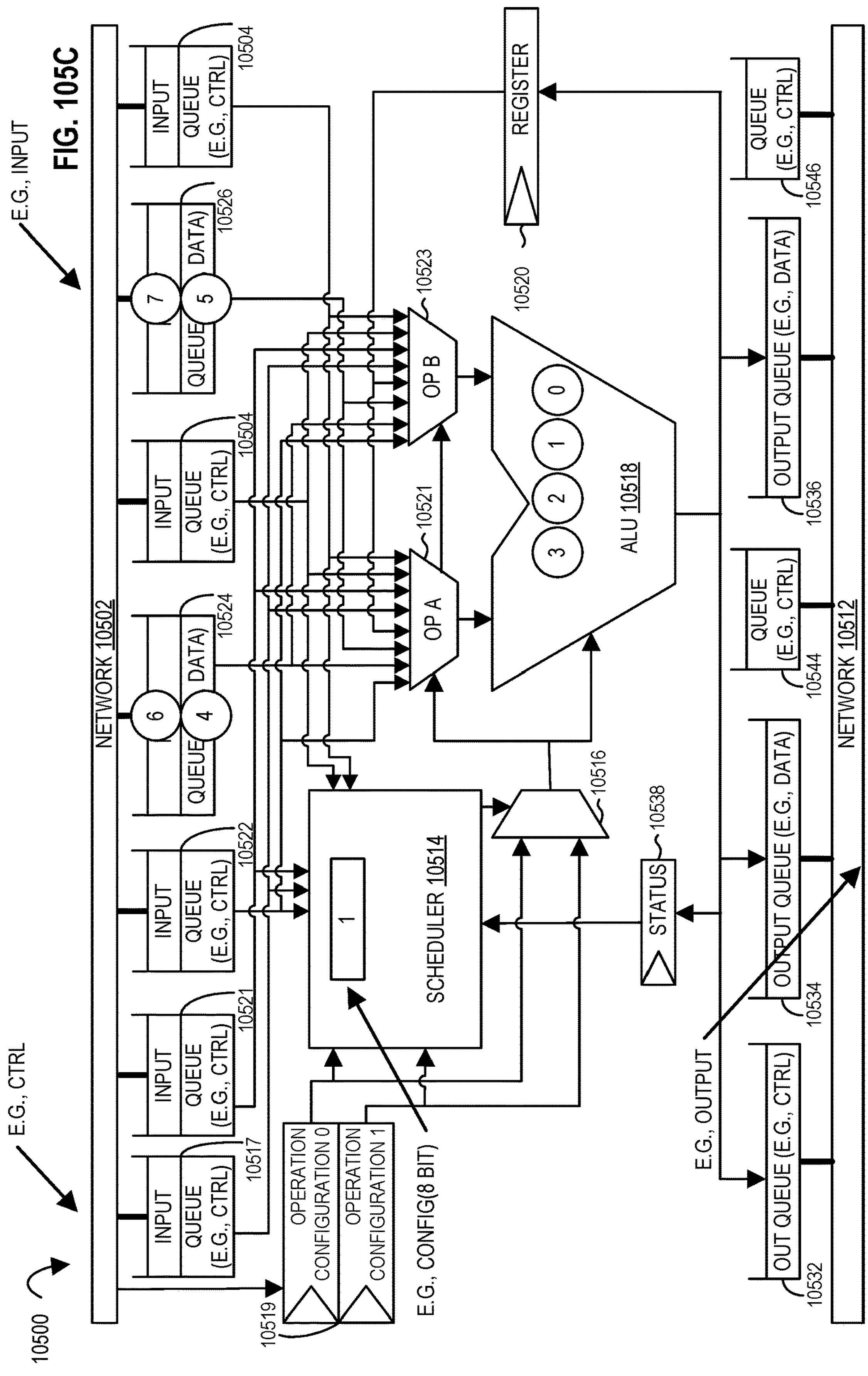

In FIG. 105C, a pack operation was continued by PE 10500 (e.g., by ALU 10518) by packing (e.g., into adjacent element positions of the resultant) the second data value (labeled as circled 2) from the first slot of input queue 10524 and the second data value (labeled as circled 3) in the first slot of input queue 10526 with the previously determined intermediate packed data value to form an updated, intermediate packed data value, and dequeuing those first data values.

Also, PE 10500 moved the third data value (labeled as circled 4) from the first slot into the second slot of input queue 10524, and the third data value (labeled as circled 5) from the first slot into the second slot of input queue 10526. A fourth data value (labeled as circled 6) has been stored (e.g., by an upstream PE) into the second slot of input queue 10524, and a fourth data value (labeled as circled 7) has been stored (e.g., by an upstream PE) into the second slot of input queue 10526. In one embodiment, the updated, intermediate packed data value is stored into register 10520.

Figure 105D:
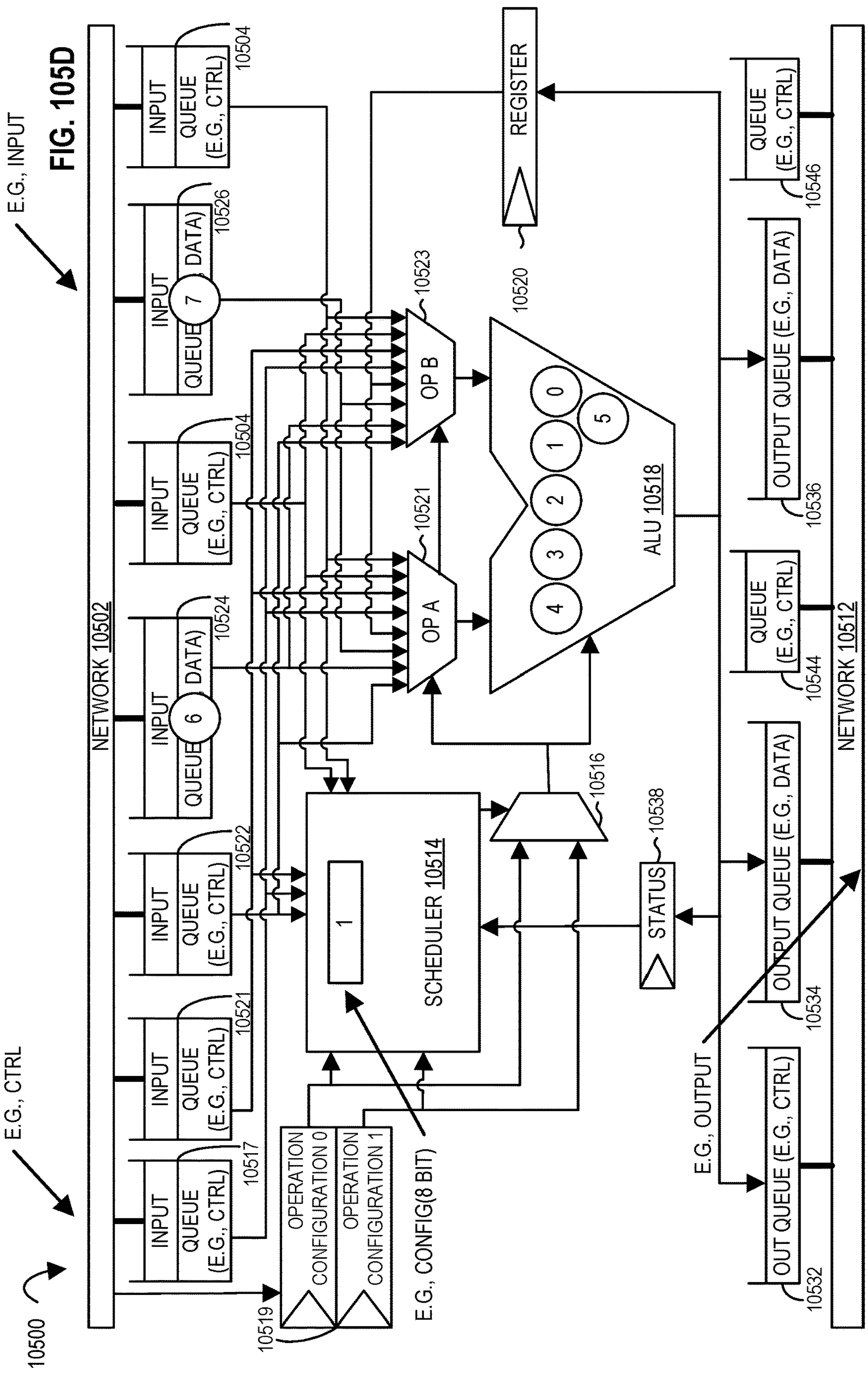

In FIG. 105D, a pack operation was continued by PE 10500 (e.g., by ALU 10518) by packing (e.g., into adjacent element positions of the resultant) the third data value (labeled as circled 4) from the first slot of input queue 10524 and the third data value (labeled as circled 5) in the first slot of input queue 10526 with the previously determined intermediate packed data value to form an updated, intermediate packed data value, and dequeuing those first data values.

Also, PE 10500 moved the fourth data value (labeled as circled 6) from the first slot into the second slot of input queue 10524, and the fourth data value (labeled as circled 7) from the first slot into the second slot of input queue 10526. In one embodiment, the updated, intermediate packed data value is stored into register 10520.

Figure 105E:
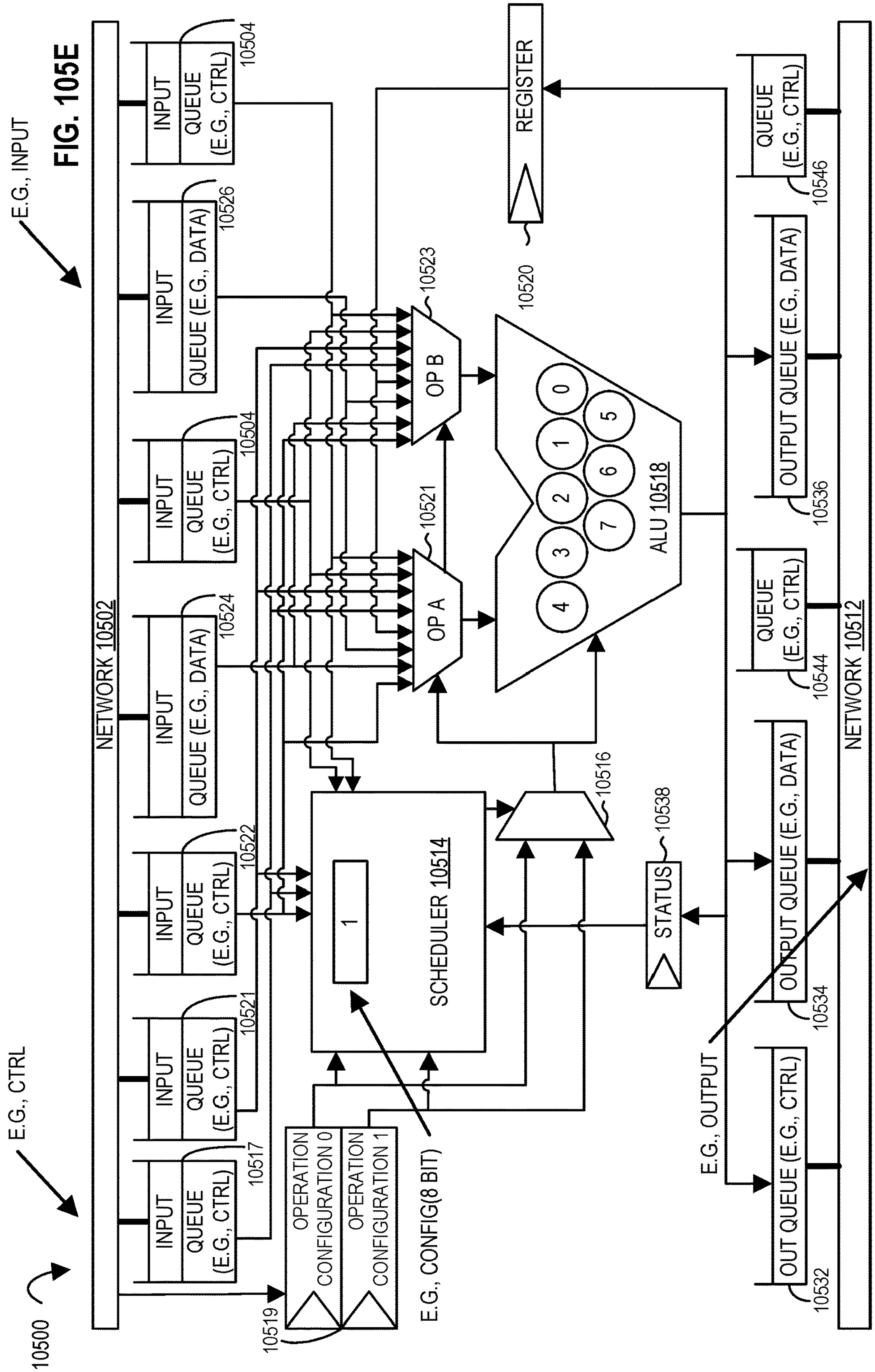
Figure 105F:
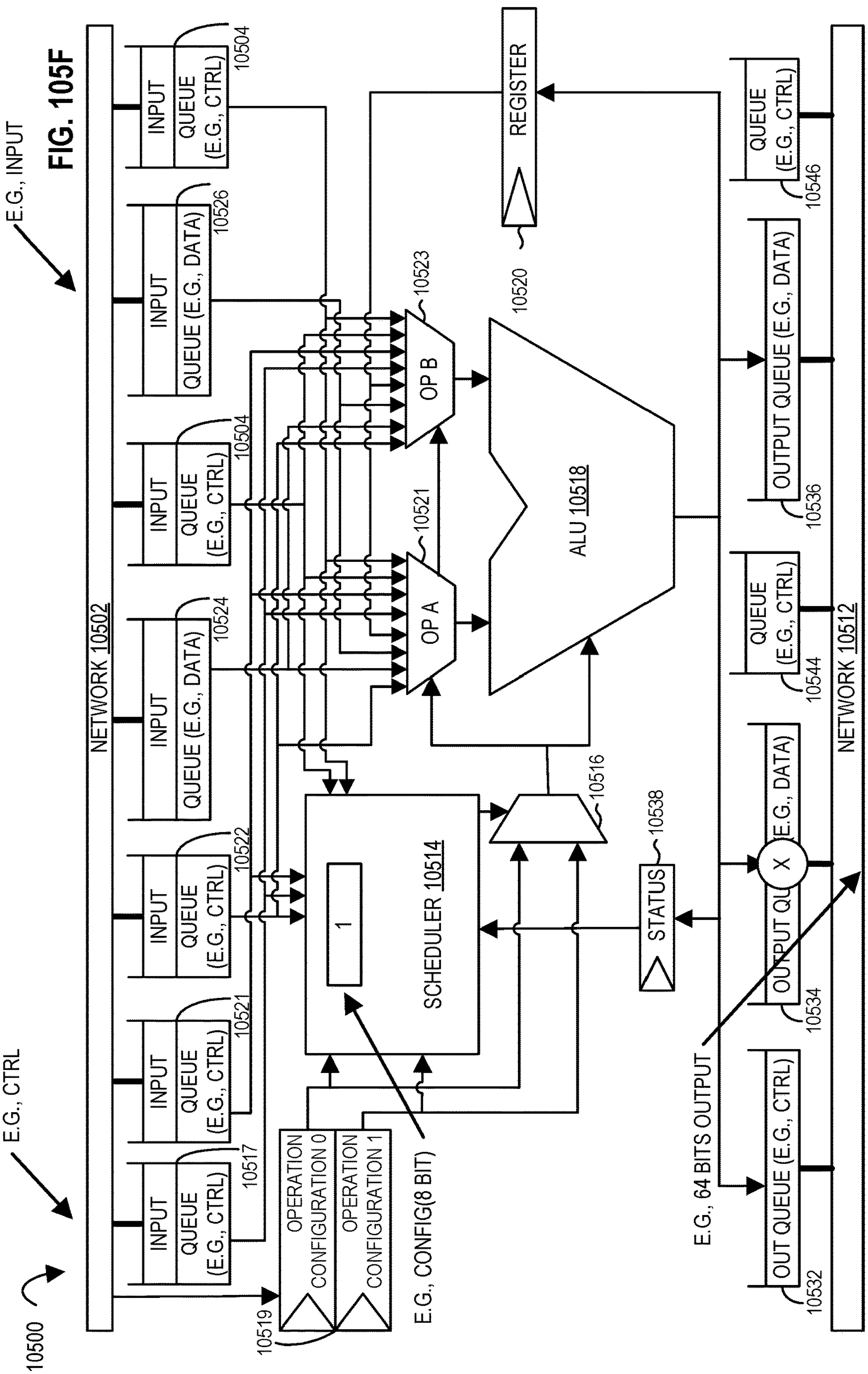

In FIG. 105E, a pack operation was continued by PE 10500 (e.g., by ALU 10518) by packing (e.g., into adjacent element positions of the resultant) the fourth data value (labeled as circled 6) from the first slot of input queue 10524 and the fourth data value (labeled as circled 7) in the first slot of input queue 10526 with the previously determined intermediate packed data value to form an updated, intermediate packed data value, and dequeuing those first data values. In one embodiment, the updated, intermediate packed data value is stored into register 10520.

In FIG. 105E, the pack operation is completed by outputting the updated, intermediate packed data value (as shown by the circled X) into output queue 10534.

In one embodiment, a pack operation sources data values from two (e.g., wide) input queues, and the components to be packed are streaming in serially. In another embodiment, a PE includes more than two input queues (e.g., eight input queues) to support the packing of all of the data elements into the resultant packed data value in parallel (e.g., in one cycle of that PE).

In certain embodiments, PE 10500 is stalled from performing the Pack operation until there is both (i) space available in the output queue that is to be used for storing resultant data, and (ii) a control input value in input queue (e.g., 10517) (for example, using a control stream to control (e.g., start and/or end) the packing operation), a data input value in input queue 10524, and a data input value in input queue 10526.

In the depicted embodiment, PE 10500 includes the components of PE 5800 from FIG. 58, for example, with the components ending with the same two numbers having the same functionality. In one embodiment, scheduler 10514 schedules an operation or operations of processing element 10500 for execution according to the configuration value, e.g., and when input data and control input arrives. See, for example, the discussion of FIGS. 33-57.

Unpack

In one embodiment, a CSA architecture includes a configuration value that, when stored into the configuration storage (e.g., register), causes the CSA (e.g., a PE thereof) to perform an Unpack operation according to the following (e.g., semantics and/or description).

```
Operation:
unpack64_8    v.CRLu.i64,  r0.CRd.i8,   r1.CRd.i8,   r2.CRd.i8,   r3.CRd.i8,
                           r4.CRd.i8,   r5.CRd.i8,   r6.CRd.i8,   r7.CRd.i8
unpack64_16   v.CRLu.i64,  r0.CRd.i16,  r1.CRd.i16,  r2.CRd.i16,  r3.CRd.i16
unpack64_32   v.CRLu.i64,  r0.CRd.i32,  r1.CRd.i32
Semantics: unpack values from a large value into smaller ones
unpack64_8:   r0=v&0xff; r1=(v>>8) &0xff; r2=(v>>16) &0xff; r3=(v>>24) &0xff;
              r4=(v>>32) &0xff; r5=(v>>40) &0xff; r6=(v>>48) &0xff; r7=(v>>56) &0xff
unpack64_16:  r0=v&0xffff; r1=(v>>16) &0xffff; r2=(v>>32) &0xffff; r3=(v>>48) &0xffff
unpack64_32:  r0=v&0xffffffff; r1=(v>>32) &0xffffffff
```

FIGS. 106A-106K illustrate a processing element 10600 performing an unpack operation according to embodiments of the disclosure. In the depicted embodiment, an operation configuration value for an Unpack operation is stored (e.g., during a programming time period) into operation configuration register 10619. As one example, a (e.g., data) first input queue is to receive an (e.g., single) packed data value to be unpacked, and a (e.g., data) second output queue is to receive an output stream of data values that are unpacked from the packed data value from the first input queue. In the depicted embodiment, the input packed data value to be unpacked is received (e.g., not as a stream) in input queue 10624, and the corresponding, unpacked data values are stored (e.g., on a packed data element by element basis) in output buffer 10634.

In FIGS. 106A-106K, the number in input buffer includes an X as a label to indicate an instance of a packed data (e.g., 64 bit) value, and the numbers for the unpacked data elements in the output buffer include a circled number as a label of the index into the packed data elements (e.g., where circled 0 is the first unpacked data element, where circled 1 is the second unpacked data element, etc.), and the unpacked data elements are smaller in bit width (e.g., 8 bits, 16 bits, or 32 bits each) than the input packed data value.

Figure 106A:
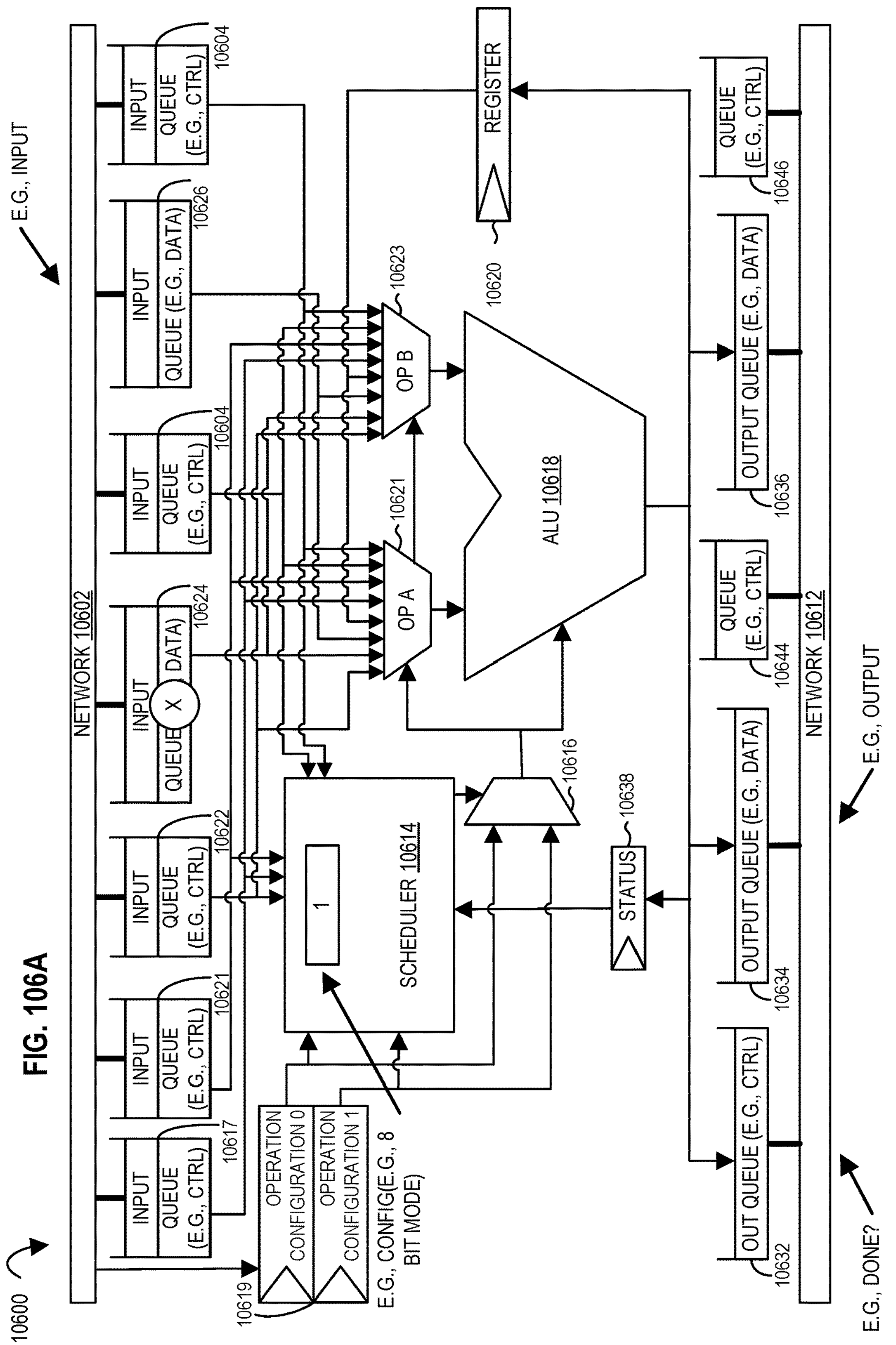
FIGS. 106A-106K illustrate a processing element performing an unpack operation according to embodiments of the disclosure.

In FIG. 106A, the programmed Unpack PE has received a packed data (e.g., 64 bit) value in input buffer 10624 that is to be unpacked (e.g., separated out into a plurality of non-overlapping elements from the packed data value).

Figure 106B:
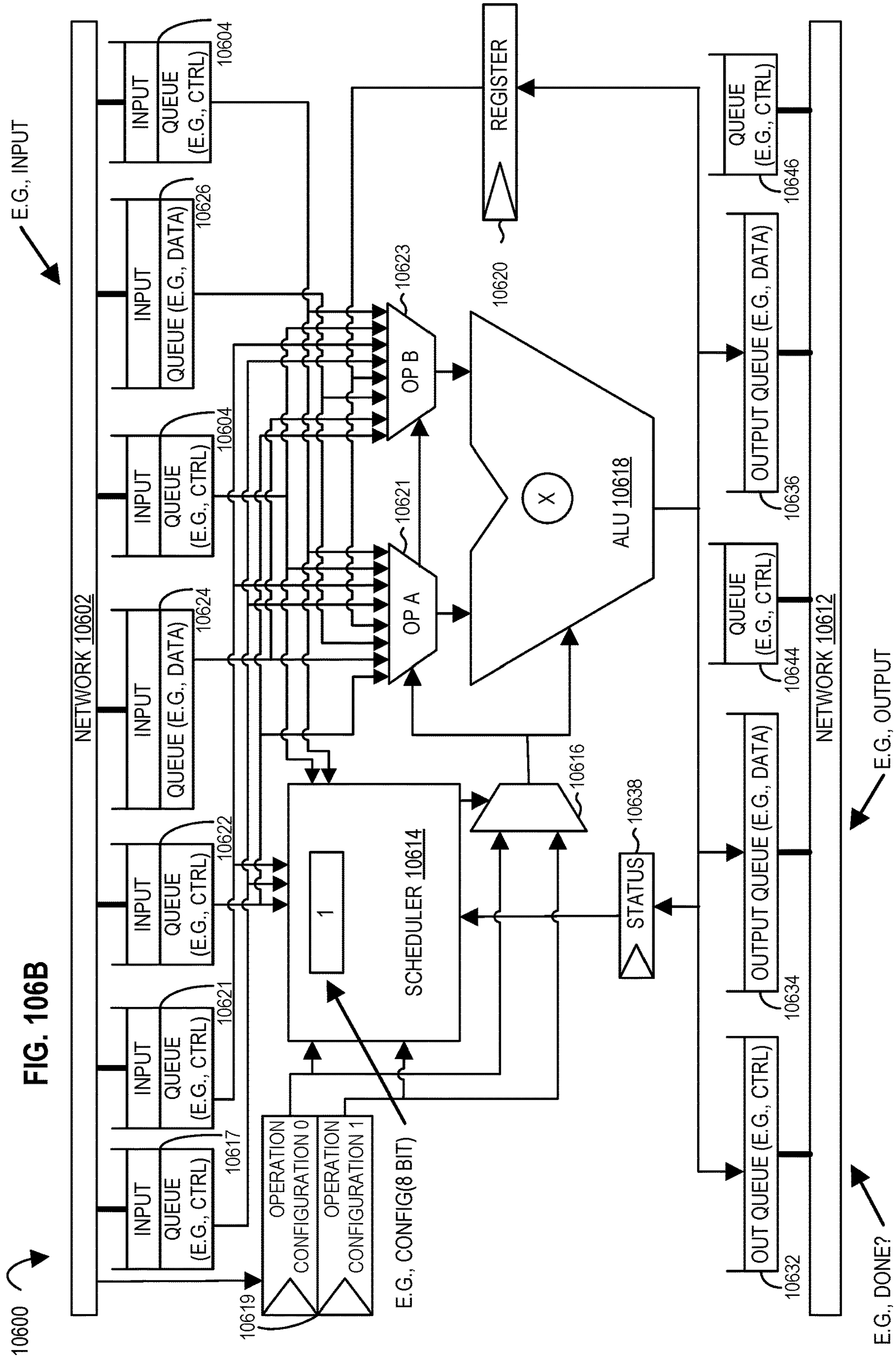

In FIG. 106B, the programmed Unpack PE has dequeued the packed data (e.g., 64 bit) value from the first slot of input buffer 10624 and begins the unpacking operation according to the configuration value (e.g., how many and what bit widths of elements are to be unpacked).

Figure 106C:
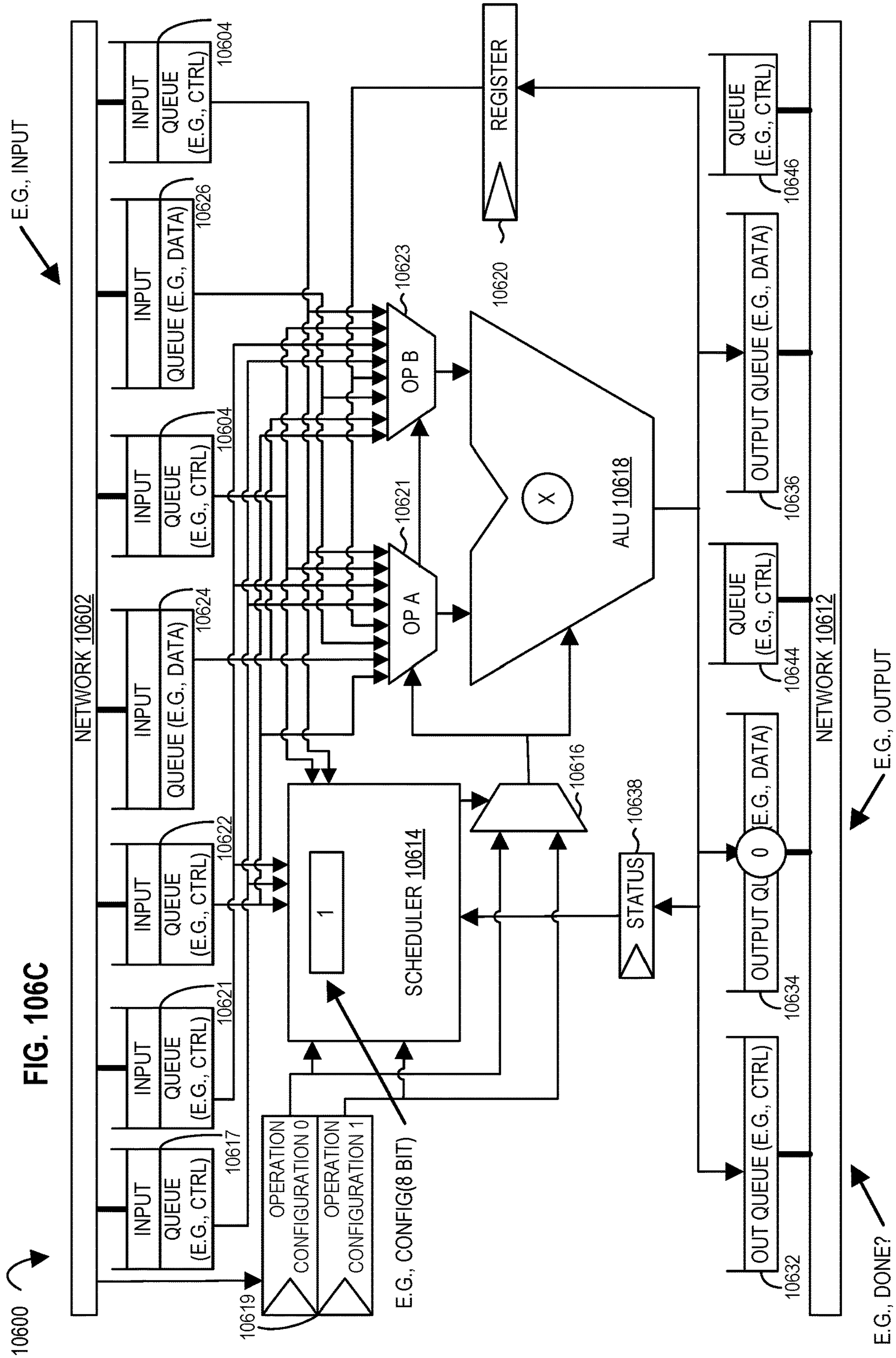

In FIG. 106C, a first unpacked data value (circled 0) from the packed data value (circled X) is output to the output buffer 10634.

Figure 106D:
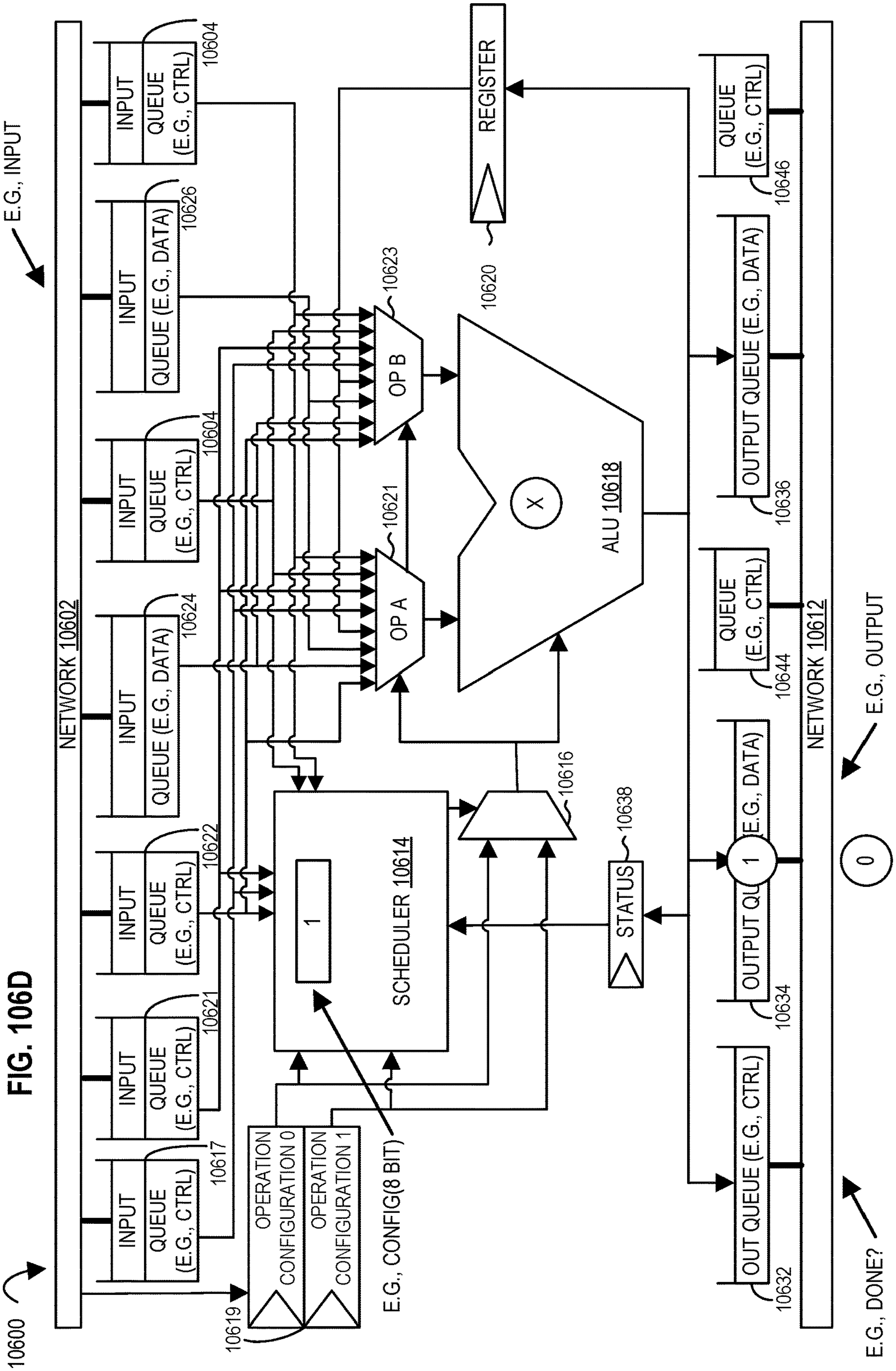

In FIG. 106D, a second unpacked data value (circled 1) from the packed data value (circled X) is output to the output buffer 10634. The previous unpacked data value in output queue 10634 has been consumed (e.g., by a downstream PE or PEs).

Figure 106E:
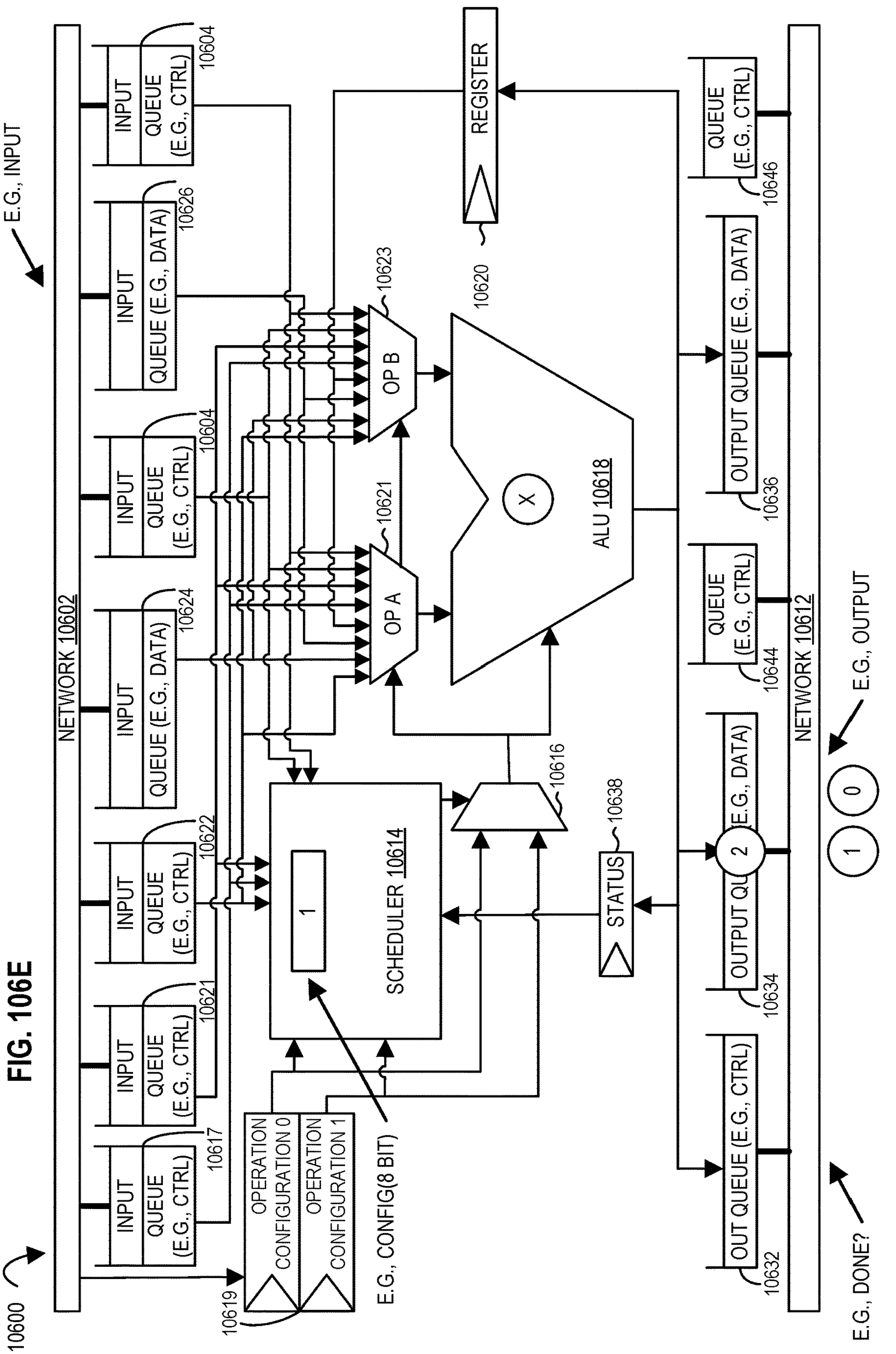

In FIG. 106E, a third unpacked data value (circled 2) from the packed data value (circled X) is output to the output buffer 10634. The previous unpacked data value in output queue 10634 have been consumed (e.g., by a downstream PE or PEs).

Figure 106F:
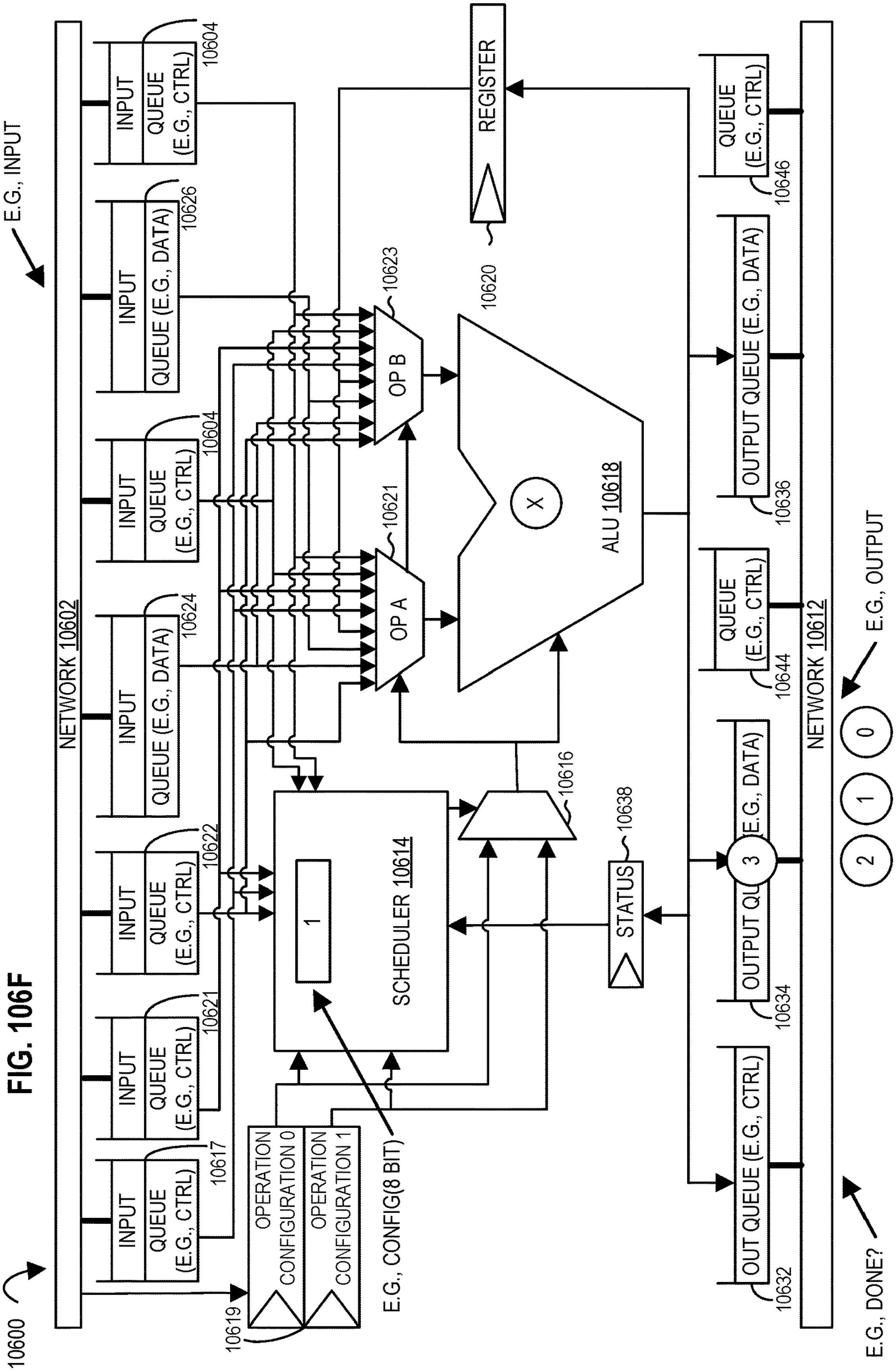

In FIG. 106F, a fourth unpacked data value (circled 3) from the packed data value (circled X) is output to the output buffer 10634. The previous unpacked data value in output queue 10634 has been consumed (e.g., by a downstream PE or PEs).

Figure 106G:
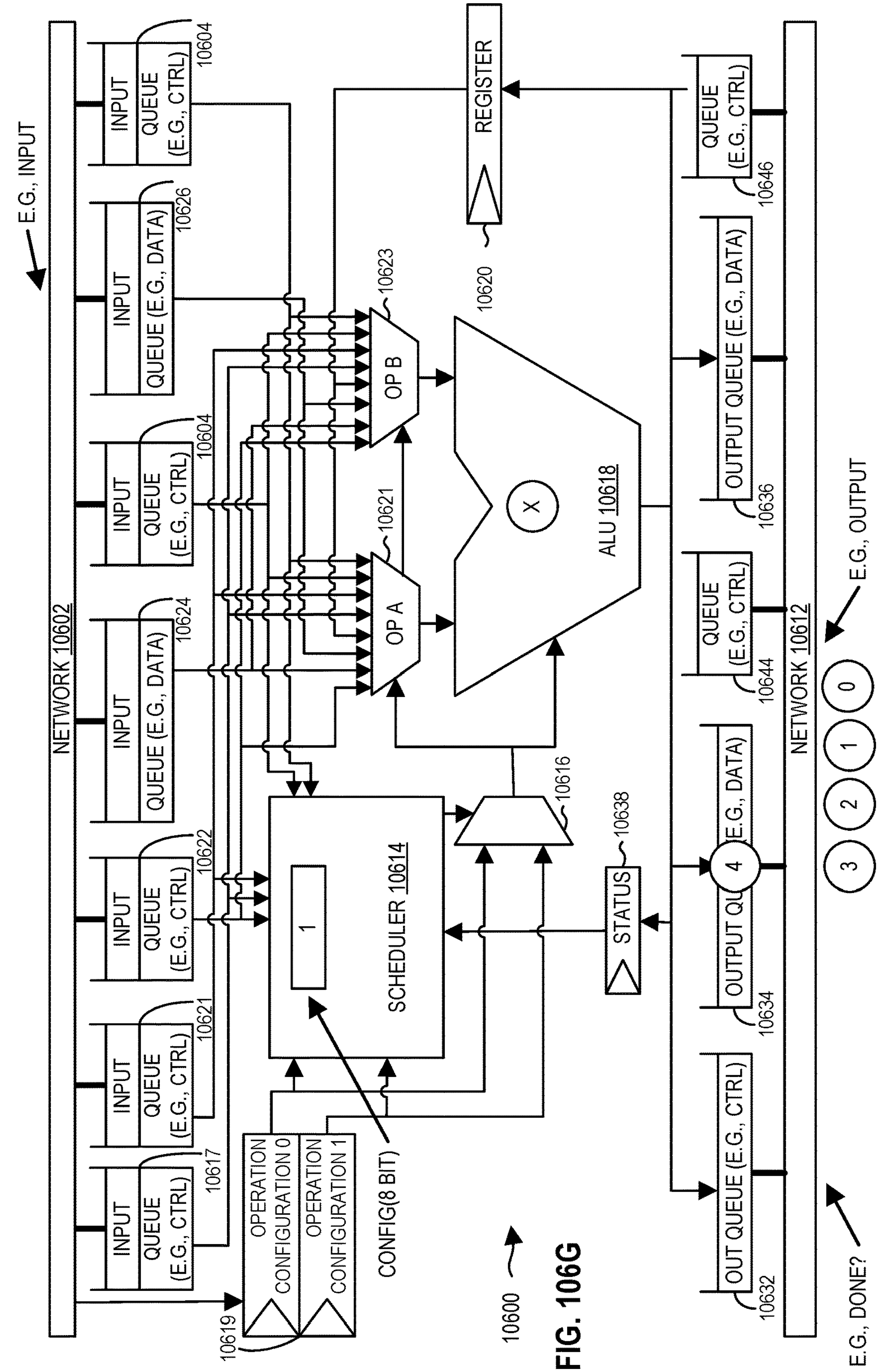

In FIG. 106G, a fifth unpacked data value (circled 4) from the packed data value (circled X) is output to the output buffer 10634. The previous unpacked data value in output queue 10634 has been consumed (e.g., by a downstream PE or PEs).

Figure 106H:
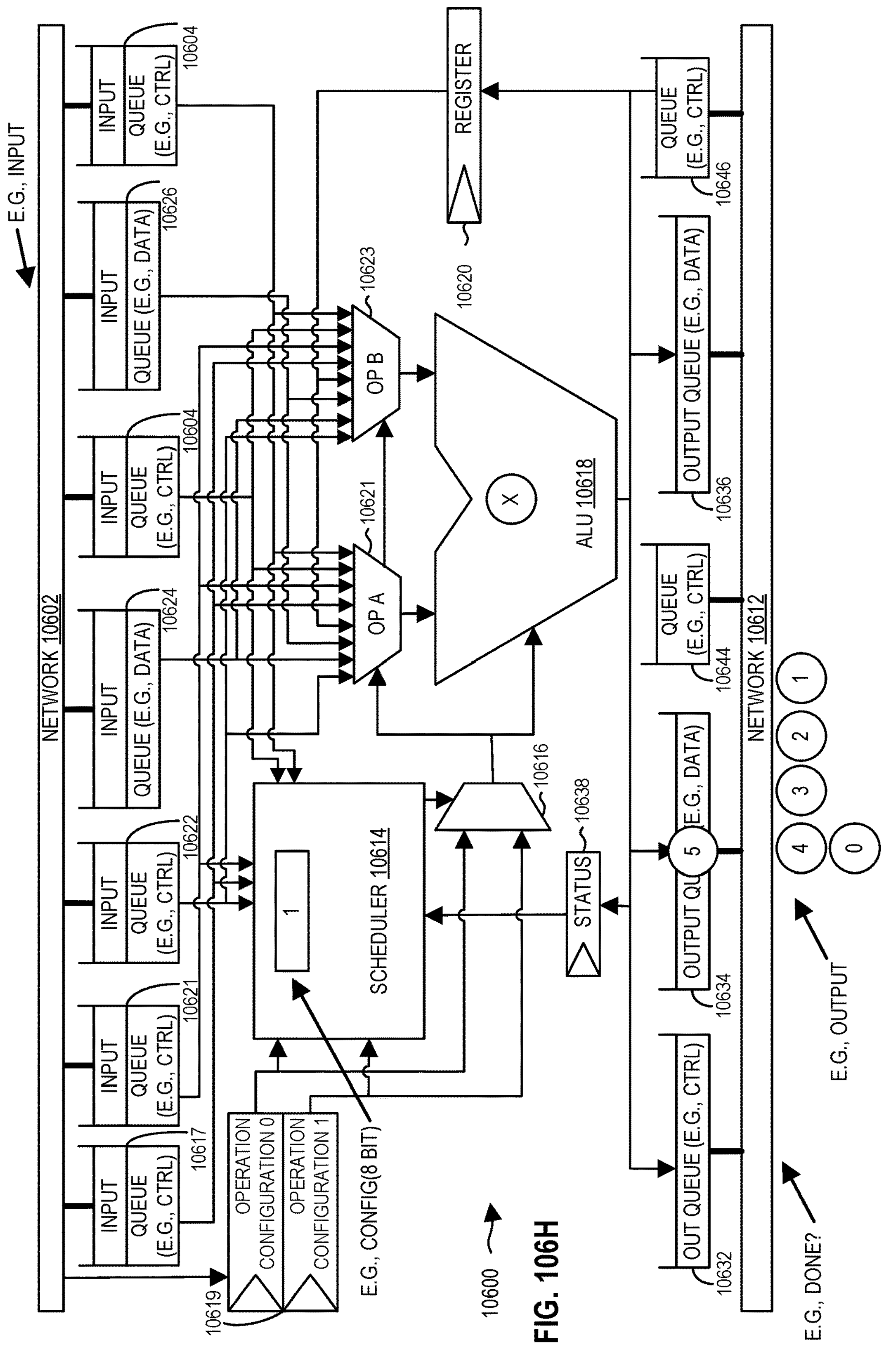

In FIG. 106H, a sixth unpacked data value (circled 5) from the packed data value (circled X) is output to the output buffer 10634. The previous unpacked data value in output queue 10634 has been consumed (e.g., by a downstream PE or PEs).

Figure 106I:
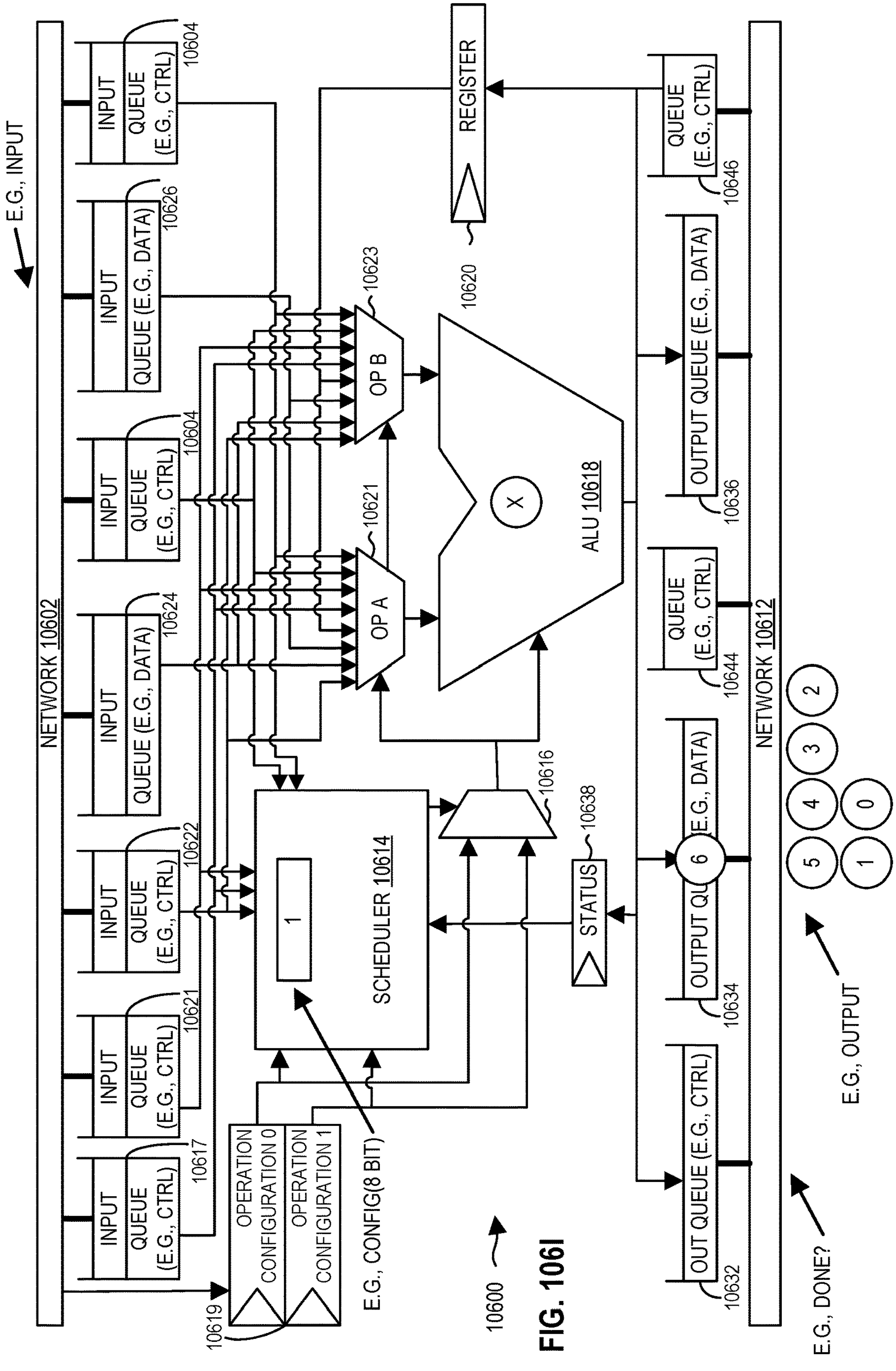

In FIG. 106I, a seventh unpacked data value (circled 6) from the packed data value (circled X) is output to the output buffer 10634. The previous unpacked data value in output queue 10634 has been consumed (e.g., by a downstream PE or PEs).

Figure 106J:
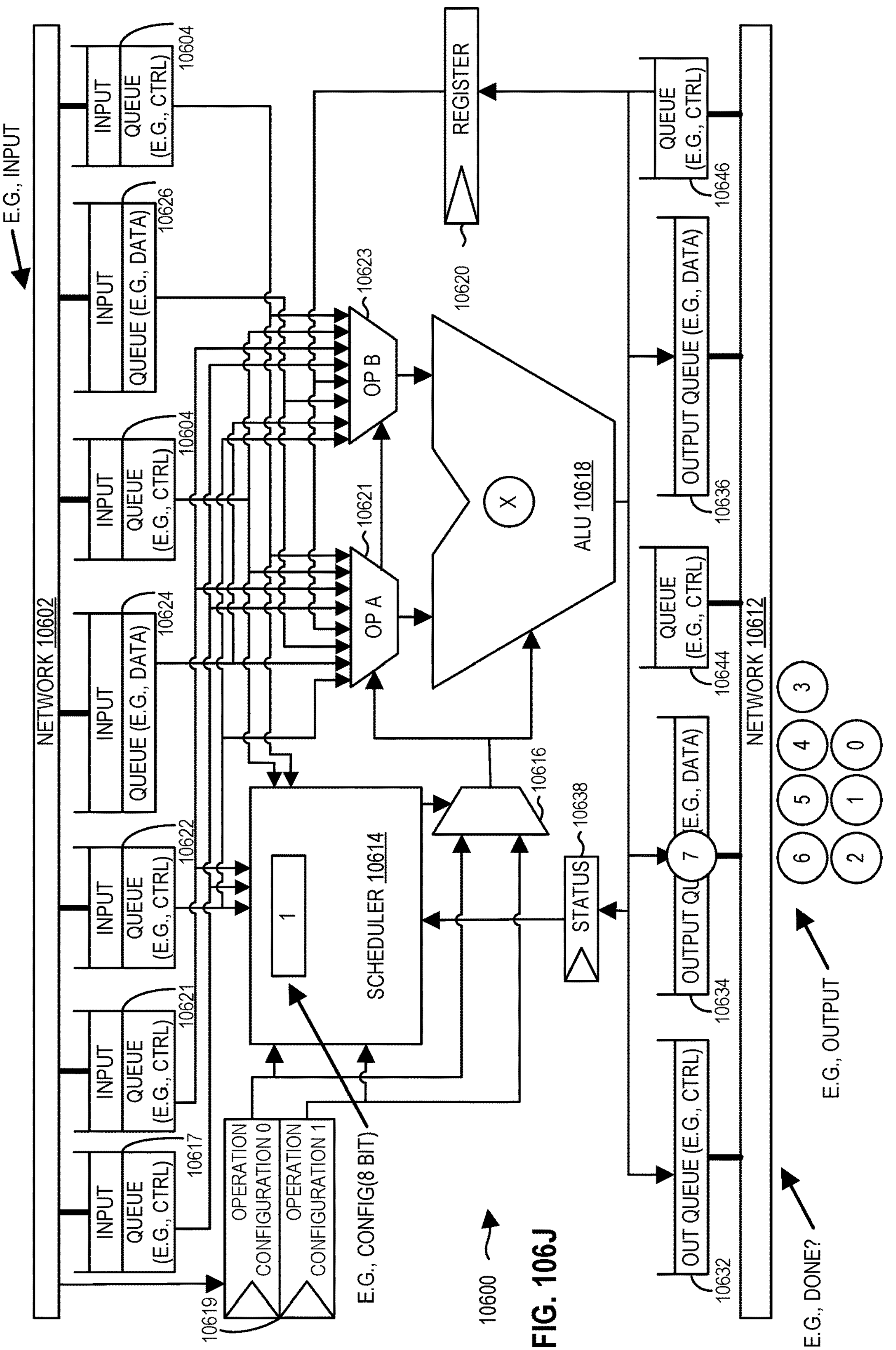

In FIG. 106J, an eighth unpacked data value (circled 7) from the packed data value (circled X) is output to the output buffer 10634. The previous unpacked data value in output queue 10634 has been consumed (e.g., by a downstream PE or PEs).

Figure 106K:
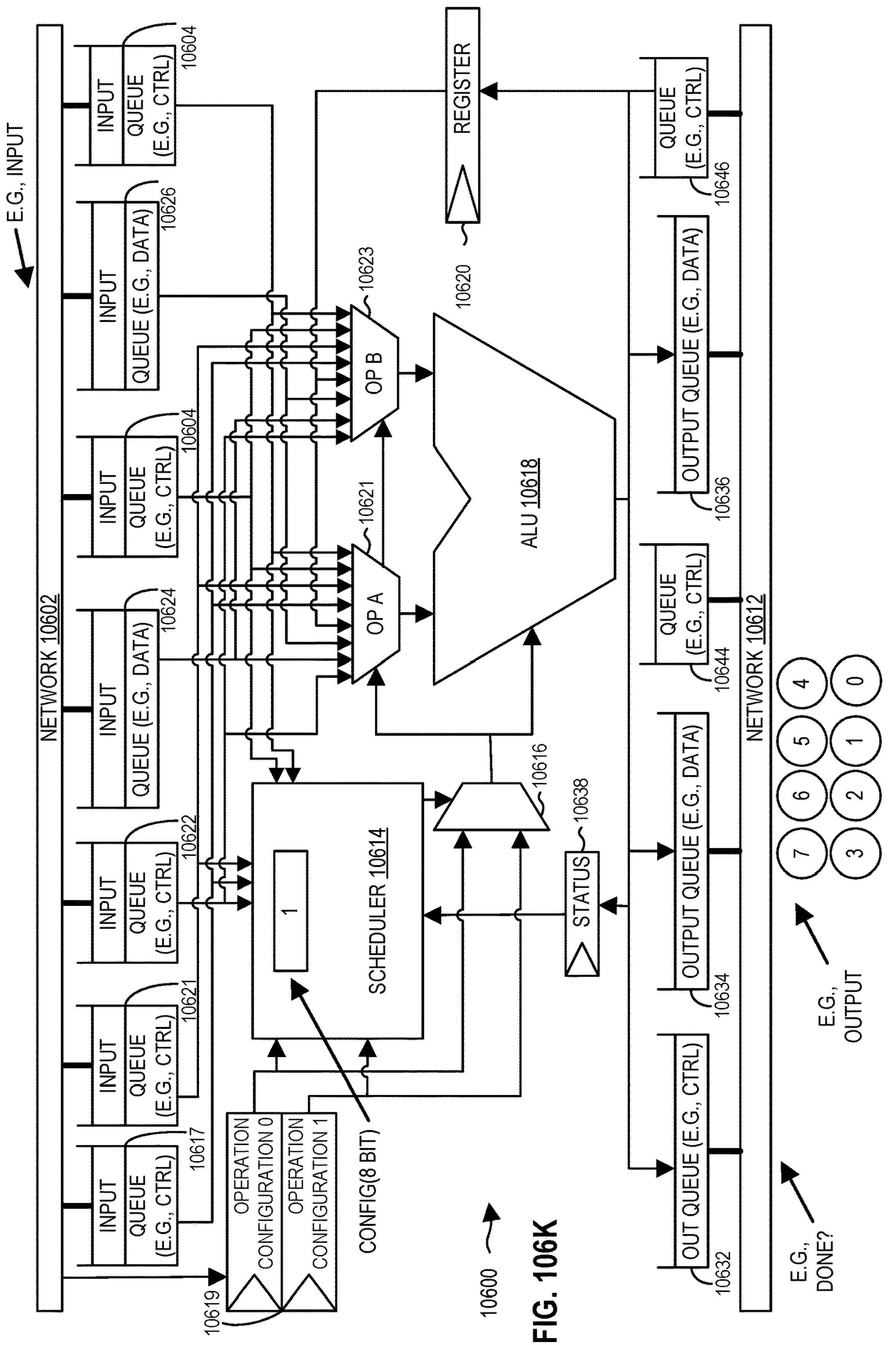

FIG. 106K, shows the completion of the operation, as the programming of this example configuration value for an unpack operation included eight unpacked data elements in a single packed data value.

In certain embodiments, PE 10600 is stalled from performing the Unpack operation until there is both (i) space available in any output queues that are to be used for storing resultant data, and (ii) a packed data value is available in an input queue.

In the depicted embodiment, PE 10600 includes the components of PE 5800 from FIG. 58, for example, with the components ending with the same two numbers having the same functionality. In one embodiment, scheduler 10614 schedules an operation or operations of processing element 10600 for execution according to the configuration value, e.g., and when input data arrives. See, for example, the discussion of FIGS. 33-57.

Gate

In one embodiment, a CSA architecture includes a configuration value that, when stored into the configuration storage (e.g., register), causes the CSA (e.g., a PE thereof) to perform a Gate operation according to the following (e.g., semantics and/or description).

In certain embodiments, PE 10700 is stalled from performing the Gate operation when there is an input data value and a gate control value until there is space available in the output queue that is to be used for storing resultant data.

In certain embodiments, PE 10700 configured to perform a gate operation is used to synchronize values.

In the depicted embodiment, PE 10700 includes the components of PE 5800 from FIG. 58, for example, with the components ending with the same two numbers having the same functionality. In one embodiment, scheduler 10714 schedules an operation or operations of processing element 10700 for execution according to the configuration value, e.g., and when input data and control input arrives. See, for example, the discussion of FIGS. 33-57.

---

Operation: gate{0-64}res.CRd.iN, gate.Cu.i0, val.CRLu.iN

Semantics: This operation "gates" a value based on the presence of a signal. When gate has arrived and val is present, val is copied to res.

gateN r, g, v is equivalent to pickN r, g, v, %ign # pick v when g arrives (since g is 0b, never reads %ign)

Note gate0 r, g, v is equivalent to all0 r, g, v

---

Figure 107A:
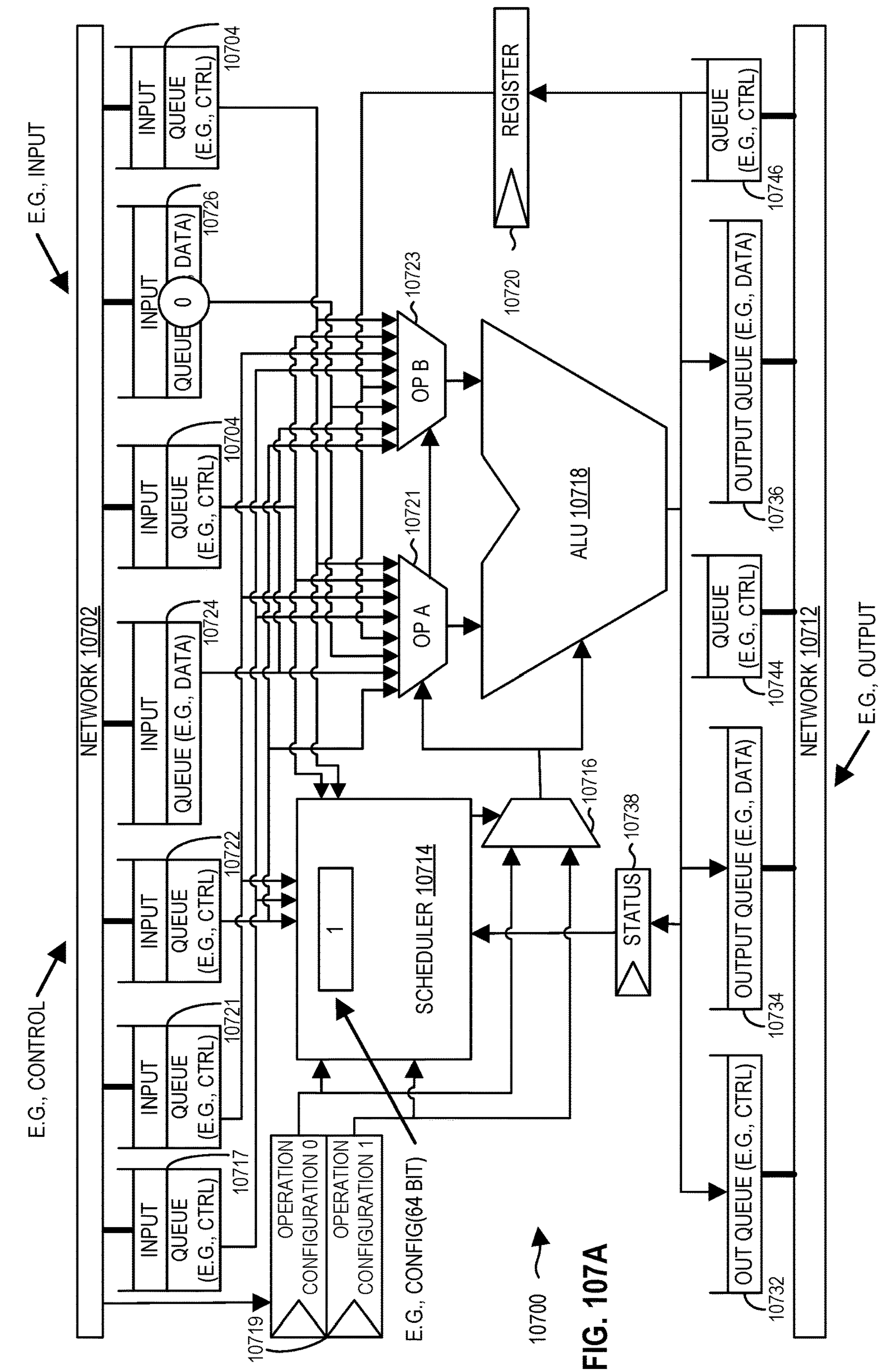
FIGS. 107A-107C illustrate a processing element performing a Gate operation according to embodiments of the disclosure.
Figure 107B:
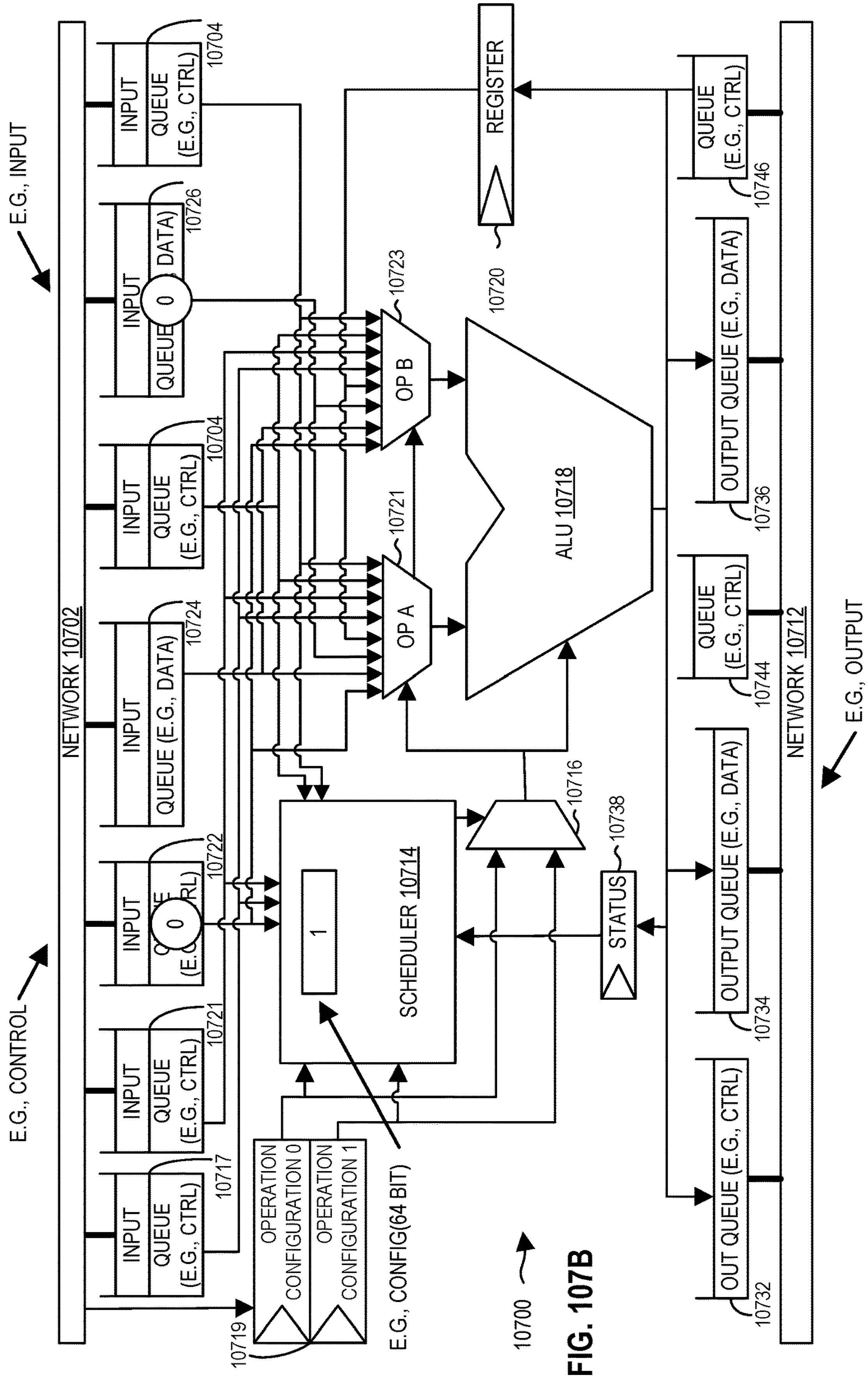
Figure 107C:
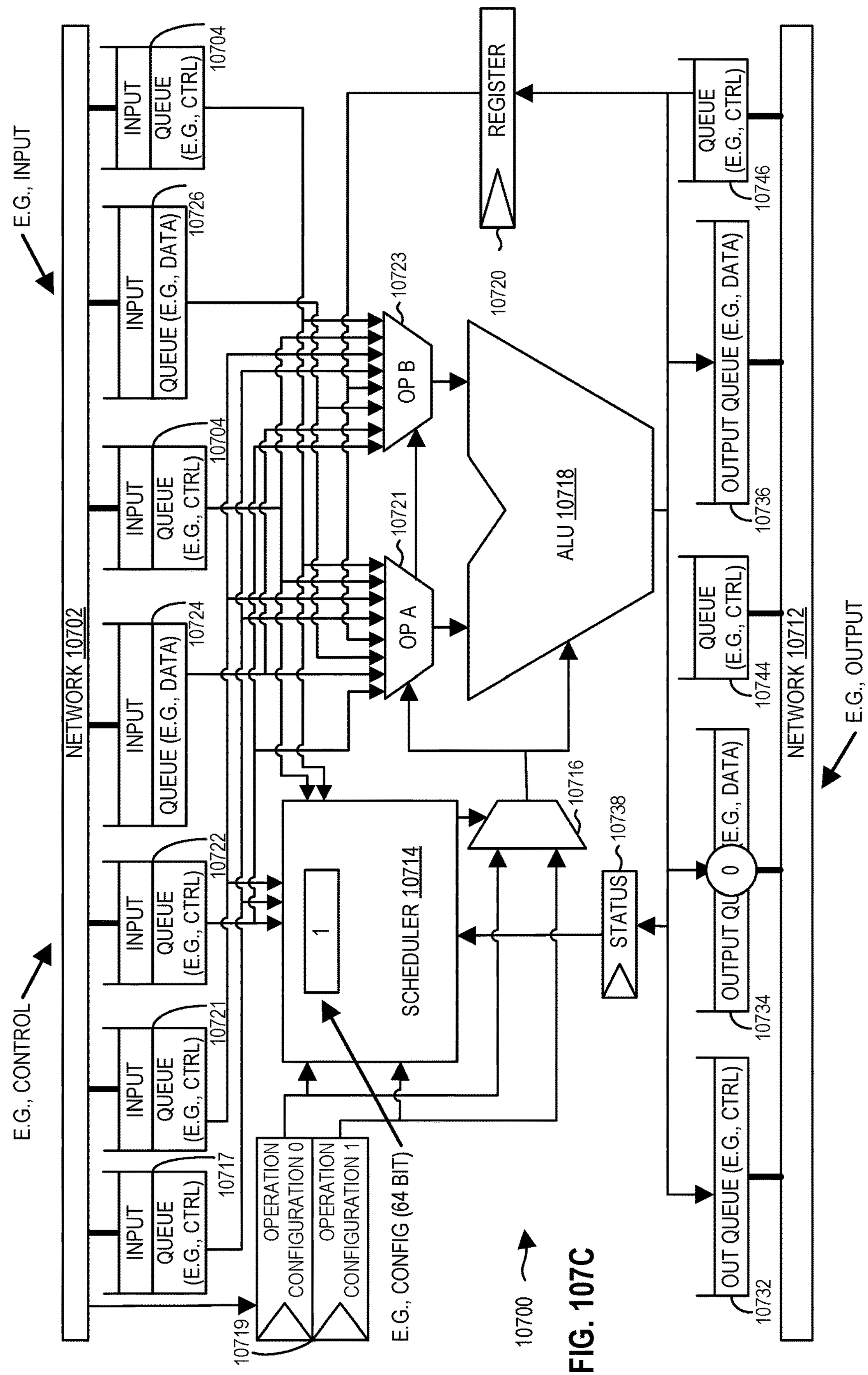

FIGS. 107A-107C illustrate a processing element 10700 performing a Gate operation according to embodiments of the disclosure. In the depicted embodiment, an operation configuration value for a Gate operation is stored (e.g., during a programming time period) into operation configuration register 10719. As one example, input queue (e.g., having a single bit width) 10722 is provided to receive a gate control value(s) (e.g., token) and input queue 10726 is to receive a data value that is to be gated (e.g., stalled from sending) until the gate control value is received. In certain embodiments, the value (e.g., one or zero) of the gate control value is ignored, and it is only the arrival of a gate control value that causes the output of the corresponding data value from PE 10700, e.g., according to "gate1" in the above discussion.

In FIGS. 107B-107C, the numbers in the circles for the gate control value (e.g., bits) in input queue 10722 indicate a value itself (e.g., a one or a zero), and the numbers for the data values in input queue 10726 and output queue 10734 are labels of an instance of data (and not the value of the data itself). For example, the data labeled circled 0 in the input queue 10726 is the same value as the data labeled circled 0 in the output queue 10734.

In FIG. 107A, a data value labeled circled 0 is stored into the first slot of input queue 10726 and the configuration value here indicates that value is not to be sent to the output queue 10734 until a gate control value is received in input queue 10722. In this figure, no gate control value is stored in input queue 10722, so the data value labeled circled 0 remains stored in the first slot of input queue 10726.

In FIG. 107B, the gate control value (of zero, but the value itself is ignored in this embodiment) is received in input queue 10722, e.g., received from an upstream PE.

In FIG. 107C, as the gate control value was received in input queue 10722 for the data value in the first slot of input queue 10726, PE 10700 stores the data value into the output queue 10734, and then dequeues both the data value labeled circled 0 from the input queue 10726 and the gate control value from input queue 10722

Storage (Buffer Box Element) Operations

In certain embodiments of a CSA architecture, local storage mechanisms are used to store temporary data, implement read-only-memory (ROM), and/or add buffering to certain portions (e.g., legs) of a dataflow graph executing on the CSA. A buffer box element is discussed below to provide storage. In one embodiment, the buffer box element uses the same communications protocols as a processing element, for example, such that one or more processing elements in a CSA are replaced by a corresponding buffer box element. One embodiment of a buffer box element supports multiple type of data storage mechanisms, e.g., those used by most dataflow graphs. In certain embodiments, a buffer box element is used for storage of certain data instead of sending/receiving that data in main memory (e.g., memory that is accessed via a RAF circuit as discussed herein). Accessing data from a (e.g., local) buffer box element is faster and more flexible (e.g., the buffer box element(s) may be placed within the CSA in any desired location).

In certain embodiments, a buffer box element is a configurable storage element of a CSA that implements multiple data storage types of modes. In certain embodiments, the buffer box element(s) allow a CSA to support data storage mechanisms within the mapped dataflow graphs in a flexible and reusable manner. In one embodiment, a buffer box element is a CSA compute circuit that includes a (e.g., small) shared memory that can act as a RAM, ROM, or buffer (first-in, first-out (FIFO) buffer) connected to the dataflow graph instantiated in the CSA array. In one embodiment, the primary purpose of the RAM mode is to serve as a small scratchpad memory, e.g., without being part of a CSA's main coherent memory space. In one embodiment, the primary purpose of the ROM mode is to supply constants, e.g., without being part of a CSA's main coherent memory space. A buffer box element uses less power and communication (e.g., network) bandwidth to access (e.g., store and/or load) data than main memory. In one embodiment, the primary purpose of the FIFO mode is to provide additional buffering in the dataflow graph (e.g., along the links thereof) to achieve optimal throughput.

Figure 108:
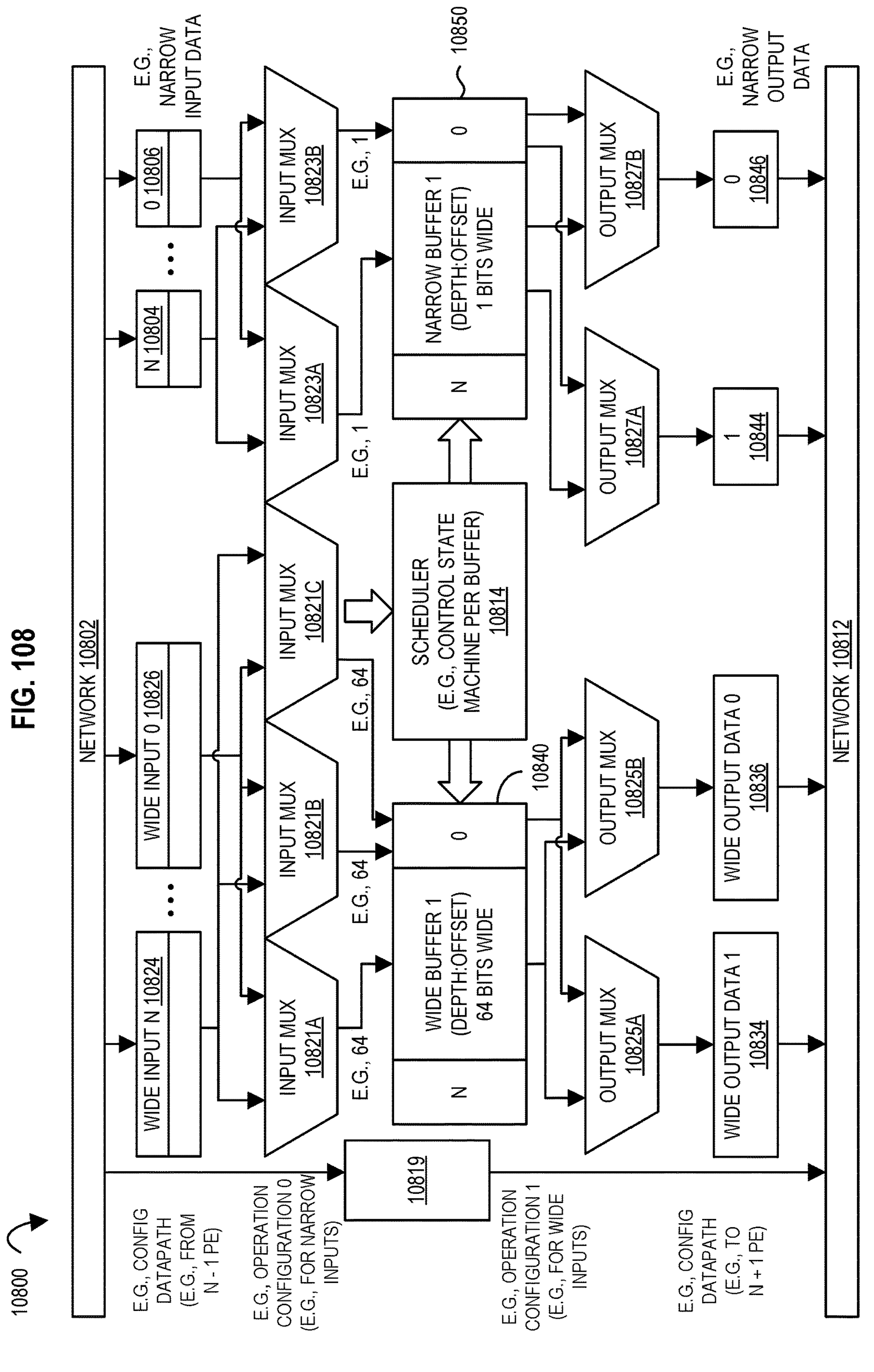
FIG. 108 illustrates a buffer box element according to embodiments of the disclosure.

FIG. 108 illustrates a buffer box element 10800 according to embodiments of the disclosure. In one embodiment, operation configuration register 10819 (e.g., having a control state machine for each buffer) is loaded during configuration (e.g., mapping) and specifies the particular mode (or modes) this buffer box (e.g., storage) element is to perform, e.g., any of the storage operations discussed herein. In the depicted embodiment, scheduler 10814 schedules (e.g., provides the control values) for a memory operation or operations of, e.g., when input data and control input arrives, similarly to how a processing element functions.

In the depicted embodiment, input queues 10804 and 10806 (e.g., narrower queues), and input queues 10824 and 10826 (e.g., wider queues) are coupled to local network(s) 10802 (e.g., and local network 10802 may include a data path network as in FIG. 7A and a flow control path network as in FIG. 7B) and is loaded with a value when it arrives (e.g., the network has a data bit(s) and valid bit(s)). Any of (e.g., narrower) output queue 10844, (e.g., narrower) output queue 10846, (e.g., wider) output queue 10834, and/or (e.g., wider) output queue 10836 receive an output of buffer box element 10800 in certain embodiments, e.g., as controlled by the configured operation (e.g., and mode). Scheduler 10814 is to send control values (e.g., according to the configuration value stored in register 10819) to multiplexers 10821A, 10821B, 10821C, 10823A, and/or 10823B to send the input data from input queues 10804, 10806, 10824, and/or 10826 to the desired location, e.g., to a certain element (0 to N, where N is any integer), of the wider (e.g., data width of each element) buffer 10840 and/or the narrower (e.g., data width of each element) buffer 10850. Scheduler 10814 is to send control values (e.g., according to the configuration value stored in register 10819) to demultiplexers 10825A, 10825B, 10825C, 10824A, and/or 10827B to send the data (e.g., from a certain element or elements (0 to N, where N is any integer)) stored in wider (e.g., data width of each element) buffer 10840 and/or the narrower (e.g., data width of each element) buffer 10850 to output queues 10844, 10846, 10834, and/or 10836. In one embodiment, one portion of operation configuration register stores a first configuration value for the narrower input queues and narrower output queues, and another portion of operation configuration register stores a second configuration value for the wider input queues and wider output queues. Although two of each type of input and output queues are depicted, any single or plurality of input queues and any single or plurality of output queues may be utilized in other embodiments. A single buffer may be used in one embodiment of a buffer box element. A plurality of one type or a plurality of both types (e.g., narrower and wider) of buffers may be utilized in certain embodiments. In certain embodiments, the narrower data is a single bit width and the wider data is a plurality of bits in width (e.g., 8, 16, 32, 64, etc. bits wide). In the depicted embodiment, output queues 10844, 10846, 10834, and 10836 are coupled to local network(s) 10812 (e.g., and local network 10812 may include a data path network as in FIG. 7A and a flow control path network as in FIG. 7B).

In certain embodiments, multiple networks (e.g., LICs thereof) are connected to a buffer box element, e.g., (input) network(s) 10802 and (output) network(s) 10812. The connections may be switches, e.g., as discussed in reference to FIGS. 7A and 7B. In one embodiment, each network includes two sub-networks (or two channels on the network), e.g., one for the data path network in FIG. 7A and one for the flow control (e.g., backpressure) path network in FIG. 7B. As one example, local network 10802 (e.g., set up as a control interconnect) is switched (e.g., connected) to input queue 10824. In this embodiment, a data path (e.g., network as in FIG. 7A) carries the input value (e.g., bit or bits) (e.g., token) and the flow control path (e.g., network) carries the backpressure value (e.g., backpressure or no-backpressure token) from input queue 10824, e.g., to indicate to the upstream producer (e.g., PE) that a new input value is not to be loaded into (e.g., sent to) input queue 10824 until the backpressure value indicates there is room in the input queue 10824 for the new input value (e.g., from an output queue of the upstream producer). In one embodiment, the new control input value may not enter input queue 10824 until both (i) the upstream producer receives the "space available" backpressure value from input queue 10824 and (ii) the new input value is sent from the upstream producer, e.g., and this may stall the operation of the buffer box element 10800 until that happens (and until space in the target, output queue(s) of buffer box element 3.A600 is available). In the depicted embodiment, input queues 10826, 10804, and 10806 function similarly.

In FIG. 108, the buffer box element thus fits into the standard PE interface for a CSA execution block. In certain embodiments, the inputs are "N" bits for wide and "X" bits for narrow which get steered to the memory ports based on the configuration mapping that was programmed (e.g., compiled) for the dataflow graph. In those embodiments, the outputs are then steered to the output ports using the same mechanism. In one embodiment, there is a control state machine in the scheduler which controls the reading and writing to the buffers based on the mode they are programmed to achieve.

Figure 109:
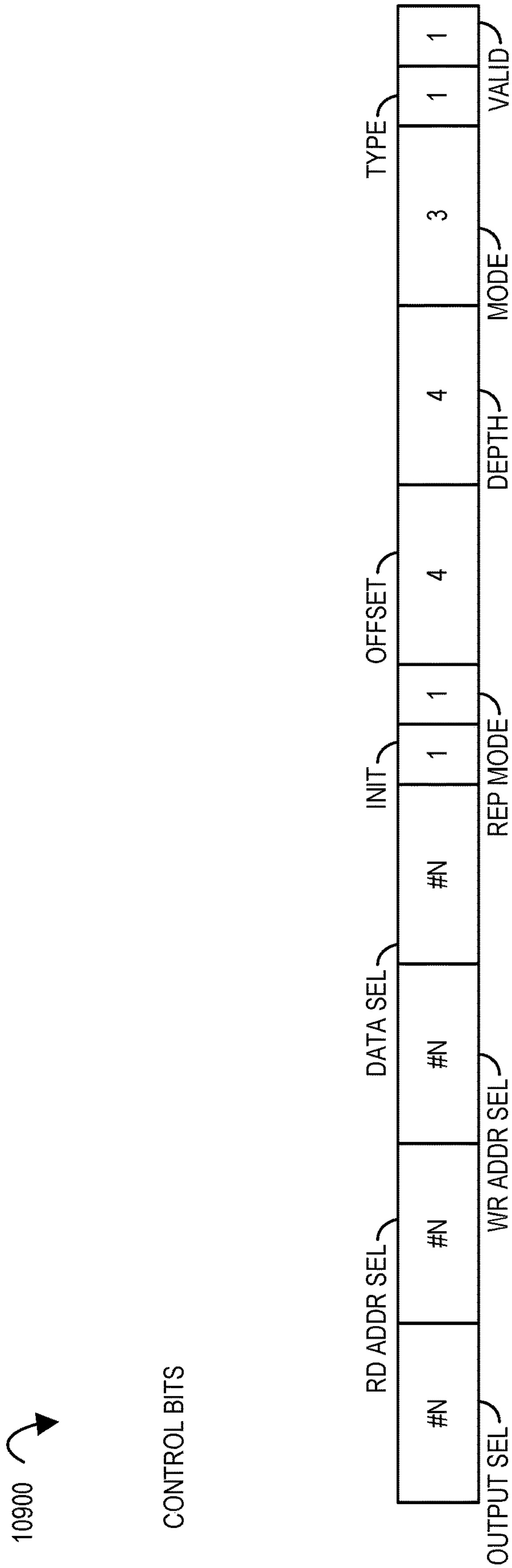
FIG. 109 illustrates an example format for the control bit fields for a buffer box element according to embodiments of the disclosure.

FIG. 109 illustrates an example format for the control bit fields 10900 for a buffer box element, and FIG. 110 illustrates example definitions for the control bit fields 10900 of FIG. 109. In one embodiment, one or more (e.g., all) of the control bit fields 10900 are included in a configuration value, for example, a configuration value stored in operation configuration register 10819 (e.g., during a configuration phase when the PEs are also configured) of buffer box element 10800. The mode field may be utilized to select one of a plurality of buffer box modes that a buffer box element is to operate in. For example, a buffer box element may be set to perform one of the following twelve modes based on a corresponding mode field value. In FIG. 109, an example of the number of bits in each field is indicated, with the #N indicating any single or plurality of numbers. After the discussion of the twelve modes below, the following sections discuss examples of particular modes in reference to figures.

Example Buffer Box Modes

In certain embodiments, a buffer box element or elements support a variety of operational modes within the dataflow paradigm. In order to have basic functionality, in one embodiment, the smallest realization of the buffer box element has two wide local network inputs, two wide local network outputs, one narrow (1-bit, control input (ctl_in)) local network input, and one narrow (1-bit, control output (ctl_out)) local network output.

1. FIFO Buffer Mode

As one embodiment, the FIFO Buffer mode (e.g., the default mode) being selected for a buffer box element causes the buffer (e.g., buffers 10840 and 10850 in FIG. 108) to be a first data in is the first data out (FIFO) storage connected between selected inputs and outputs of the buffer box element. In this mode, the buffer box element increases the throughput of dataflow graphs, for instance, by allowing for buffering of read addresses ahead of responses from the memory subsystem.

2. Preload Mode

As one embodiment, the FIFO Buffer preload mode being selected for a buffer box element allows a buffer (e.g., buffers 10840 and 10850 in FIG. 108) to be preloaded with data as part of the CSA configuration. In certain embodiments, preloaded buffers fill the function of preloaded channels in dataflow which are used in a variety of contexts to set up loop iterations. Unlike other approaches to preloaded channels that rely on loading values in the input registers of PEs, a preloaded buffer of a buffer box element stores more than three values (e.g., instead of just one or two) in certain embodiments.

3. Repeat Mode

As one embodiment, the repeat mode being selected for a buffer box element allows a buffer (e.g., buffers 10840 and 10850 in FIG. 108) to repeat a sequence of preloaded values to the consumers, e.g., even when the input(s) of the buffer box element is not connected. In certain embodiments, buffers preloaded with a (e.g., single) value in repeat mode take on the role of providing constant (e.g., literal) operands to dataflow operators configured in other PEs. In certain embodiments, buffers preloaded with multiple values take on a variety of roles in the dataflow instantiation of a variety of calculations, such as providing constants to filters, weights to accumulations, and patterns of control to picks and switches.

4. RAM Mode

As one embodiment, the random access memory (RAM) mode being selected for a buffer box element allows a buffer (e.g., buffers 10840 and 10850 in FIG. 108) to uses one (e.g., wide) input queue for the buffer address, a (e.g., wide or narrow) input queue for input data, and a (e.g., wide or narrow) output queue for output data. As with all modes in certain embodiments, a buffer box element's buffers are loaded with specified data as part of the CSA configuration (e.g., before data processing operations are initiated by the CSA).

5. ROM Mode

As one embodiment, the read only memory (ROM) mode being selected for a buffer box element allows a buffer (e.g., buffers 10840 and 10850 in FIG. 108) to function as in the RAM mode except with the write data in ports (e.g., input queues) being disconnected. In certain embodiments, the buffer(s) is preloaded during configuration of the buffer box element in ROM mode.

6. Fast-Clear RAM Mode

As one embodiment, the random access memory (RAM) mode being selected for a buffer box element uses a buffer (e.g., buffers 10840 and 10850 in FIG. 108) that is small enough for a separate occupancy bit to exist to for each location implemented to be cleared in an energy and cycle-efficient way, for example, as an array of registers. In this mode: (i) on writes, the bit corresponding to the written memory location of the buffer is set, and (ii) on reads, the bit for the read location of the buffer is returned on the control output (e.g., a narrow output queue) (ctl_out) channel along with the output data. When any value (e.g., token) arrives on the control input (e.g., a narrow input queue) (ctl_in) channel (regardless of its value), all the occupancy bits are cleared. Such functionality may be used in various ways, among them the two Clearing Ram examples below in 7 and 8.

7. Clearing RAM Between Configurations Mode

As one embodiment, the Fast-clear RAM mode (e.g., Clearing RAM between configurations mode) being selected for a buffer box element allows a buffer (e.g., buffers 10840 and 10850 in FIG. 108) to, optionally, instead of returning the occupancy bit on ctl_out, the buffer box element is configured to instead return 0 if the occupancy bit is 0 and the results of the memory read otherwise. This provides a way of zeroing out buffer memories in the course of CSA configuration without explicitly loading them with zero values. The advantage allows reduction of the amount of data in the CSA configuration while still avoiding leakage of any state information between separate CSA invocations; this reduction reduces the configuration overhead in time and energy for any particular CSA array which increases the amount of software the CSA can advantageously accelerate while maintaining design security.

8. Clearing RAM in the Course of a Calculation Mode

As one embodiment, the Fast-clear RAM mode (e.g., Clearing RAM in the course of a calculation mode) being selected for a buffer box element allows a buffer (e.g., buffers 10840 and 10850 in FIG. 108) to clear the RAM used as a scratchpad (e.g., as other memory) for a calculation by a PE. For example, when using the RAM as a scratchpad it is often useful to be able to bring it back cheaply to a known state under the control of the calculation. Having the fast-clear ability triggered off a single input channel saves not only the time needed to clear the RAM but also the substantial number of other CSA compute boxes (e.g., PEs and/or RAFs) needed to generate the addresses and data needed to clear the memory, as well as the multiplexing on the inputs with the normal read-write functionality of the memory.

9. Streaming-Unload RAM Mode

In one embodiment, the RAM mode (number 4 above) of a buffer box element uses two wide inputs (addr and data_in) (e.g., two wide input queues) and one wide output (data_out) (e.g., one wide output queue). As one embodiment, the Streaming-unload RAM mode being selected for a buffer box element allows a buffer (e.g., buffers 10840 and 10850 in FIG. 108) to use another wide output (e.g., wide output queue) of the buffer box element as a streaming unload port and operating as follows. In this embodiment, at startup time, the buffer box element operates as a RAM, but when any value (e.g., token) arrives on the ctl_in port (e.g., in the input queue(s)), the buffer box element switches to FIFO mode, sending each of its values in sequence out the unload port (e.g., to the output queue(s)) while blocking its input ports, and once its values have been sent out, the buffer box element reverts to RAM mode. This mode may be useful when the RAM is being used as a scratchpad, e.g., when serving as a bank of accumulators for a histogram. Being able to shift the contents out of the buffer with no other address machinery or connections to the inputs saves the need to instantiate this functionality using other compute boxes in the CSA fabric and reduces simplifies the routing interconnectivity required.

10. Completion Buffer Mode

As one embodiment, the completion buffer mode being selected for a buffer box element allows a buffer (e.g., buffers 10840 and 10850 in FIG. 108) to store values into the buffer in RAM mode, but read values in a FIFO mode. This may be used to calculate values out of order and use the values in order.

11. Fast-clear FIFO Buffer Mode

As one embodiment, the Fast-clear FIFO Buffer mode (e.g., the default mode) being selected for a buffer box element causes the buffer (e.g., buffers 10840 and 10850 in FIG. 108) to allow a fast-clear of the buffer by configuring the hardware to equate the FIFO's head and tail pointers whenever a control value (e.g., token) arrives on control input (ctl_in). This feature may be useful for discarding variable amounts of data under program control and may be used to simplify dataflow graph startup and cleanup.

12. Overflow Buffer

In certain embodiments, any of these modes is expanded upon by allowing overflow of values to go to memory (e.g., main memory) to increase the effective buffer size to be bigger than the physical buffer in the buffer box element. In one embodiment, the memory used for the overflow of the physical buffer is not forced to be coherent with system memory, thus still acting as a scratchpad implementation.

FIFO Mode

In one embodiment, a CSA architecture includes a configuration value that, when stored into the configuration storage (e.g., register), causes a buffer box element thereof to operate in a FIFO mode according to the following (e.g., semantics and/or description).

```
Operation: buffer{1,8,16,32,64} res.Cd.iN, op1.Cu.iN, len.Lu.u64
Semantics: Values from op1 feed into the buffer, and come out in order on res. The number
of values required to be in the structure is described by len., though the actual size allocated
can be larger. For the version 1 implementation, buffers may have up to 64 entries, and may
be "fractured" into two 32b entries. The effect is that buffers with len values <= 32 will only
need to consume half of a scratchpad. len is currently limited to 64.
Description: Specify a buffer operation moving inputs to outputs. This operation will
normally incur an additional cycle of latency beyond the transit times.
Comparison of some approaches:
    // No specification of lic depth. This means no buffering is required.
    // This allows operations to be fused in some cases (e.g. the pick and
    // add may be fused onto the same unit with no buffering between.)
    // In the fusion case, the pick and add execute in the same cycle.
    // If the operations are not fused, the lic will have the default output
    // and input buffers (e.g. 2+2 => 4 for the version 1 implementation.)
    .lic .i64 a
    pick64 a, ,
    add64 , a,
    // Explicitly declared lic depth of 2. For the initial implementation,
    // this can normally be satisfied with built-in buffers. In this case,
    // it would have the side effect of inhibiting fusion of the operations.
    // The pick64 might execute in cycle N, the value transit to the add in
    // cycle N+1, and the add64 might execute in cycle N+2.
    .lic@2 .i64 b
    pick64 b, ,
    add64 , b,
    // Explicitly declared lic depth of 30. For the initial implementation,
    // this will likely require use of a scratchpad. The late tools would
    // implicitly insert a buffer with length 32 to satisfy the program
    // description. In practice, this might mean the path from the pick64
    // to the add might be able to hold close to 40 in flight values.
    // The add64 would likely execute about 5 cycles after the pick64, if
    // they were each implemented on normal units. (pick64, transit, buffer
    // store, buffer load, transit, add64.)
    .lic@30 .i64 c
    pick64 c, ,
    add64 , c,
    // Explicit use a buffer. From a program perspective this is basically
    // the same as the previous, except the user explicitly specified that
    // a buffer should be used. This could potentially be more constraining
    // for the late tools, but allows the user to directly specify what is
    // intended.
    .lic .i64 d; .lic .i64 e
    pick64 d, ,
    buffer64 e, d, 32
    add64 , , e
```

FIGS. 111A-111F illustrate a buffer box element 11100 performing a storage operation while in FIFO Buffer mode according to embodiments of the disclosure, e.g., according to the "buffer" operation discussed above. In the depicted embodiment, an operation configuration value includes a mode field (set to FIFO Buffer mode) (e.g., mode field in FIGS. 109 and 110) stored (e.g., during a programming time period) into operation configuration register 11119. As one example, input queue (e.g., having a single bit width) 11106 is provided to receive a (e.g., control) value (e.g., token) and input queue 11126 is to receive a (e.g., data) value that is to be stored in a first in is the first out manner in the buffer(s) of the buffer box element 11100. In one embodiment, the values received in input queue (e.g., having a single bit width) 11106 (and 11104 if used) are stored in buffer 11150, and the values received in input queue (e.g., having a multiple bit width) 11126 (and 11124 if used) are stored in buffer 11140.

In FIGS. 111A-111F, the numbers in the circles are labels of an instance of data (and not the value of the data itself).

Figure 111A:
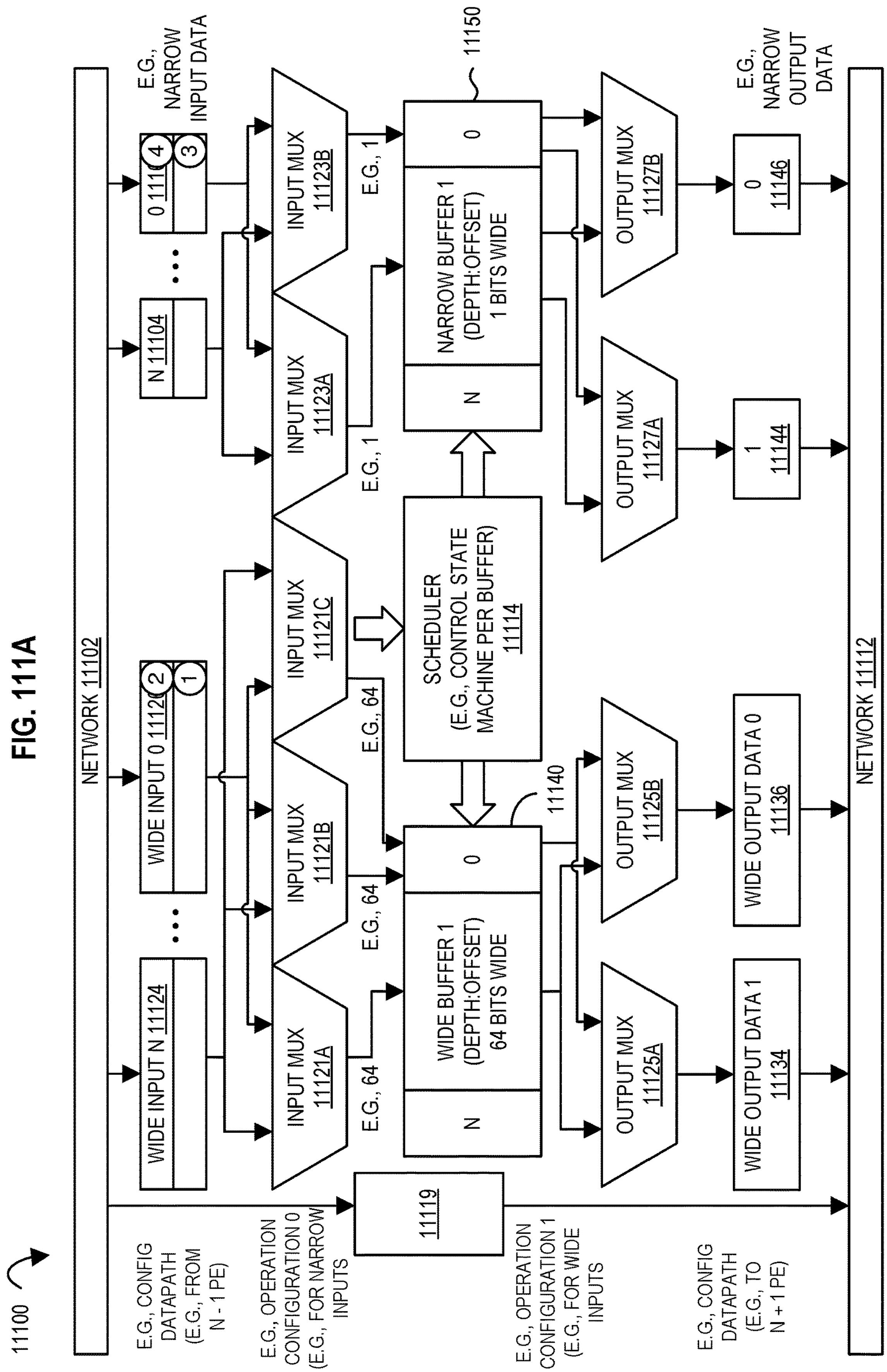
FIGS. 111A-111F illustrate a buffer box element performing a storage operation while in FIFO Buffer mode according to embodiments of the disclosure.

In FIG. 111A, a (e.g., data) value labeled circled 1 is stored into the first slot of input queue 11126, a (e.g., data) value labeled circled 2 is stored into the second slot of input queue 11126, a (e.g., configuration) value labeled circled 3 is stored into the first slot of input queue 3.6B026, and a (e.g., configuration) value labeled circled 4 is stored into the second slot of input queue 3.6B026. In certain embodiments, these values are sent from an upstream PE or PEs to be stored in the buffer box element.

Figure 111B:
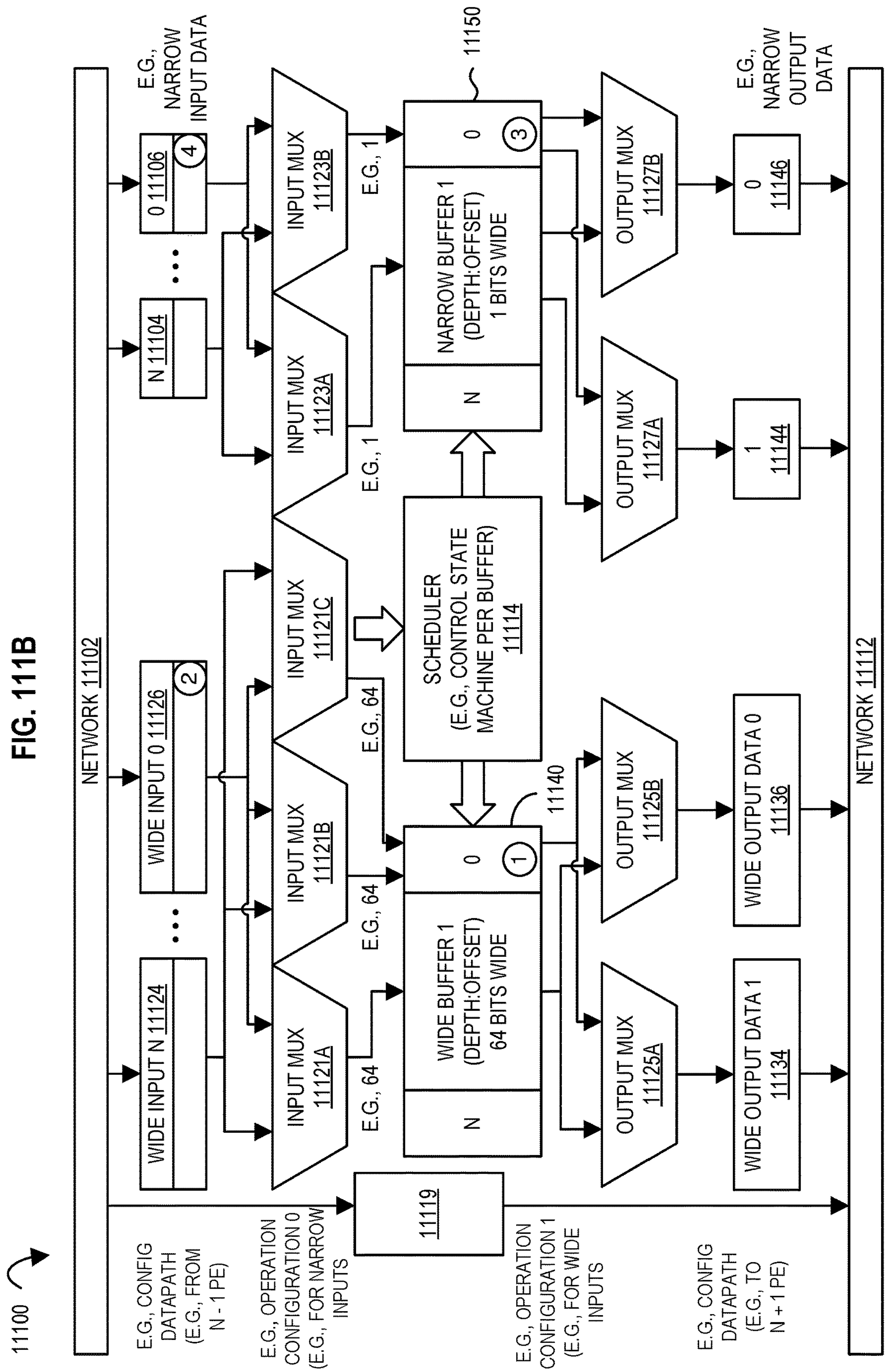

In FIG. 111B, buffer box element 11100 (e.g., scheduler 11114) has moved the (e.g., data) value labeled circled 1 into the (e.g., first storage location of) buffer storage 11140, dequeued (e.g., deleted) the (e.g., data) value labeled circled 1 from the first slot of input queue 11126, and moved the (e.g., data) value labeled circled 2 into the first slot from the second slot of input queue 11126. Also, buffer box element 11100 (e.g., scheduler 11114) has moved the (e.g., configuration) value labeled circled 3 into the (e.g., first storage location of) buffer storage 11150, dequeued (e.g., deleted) the (e.g., configuration) value labeled circled 3 from the first slot of input queue 11106, and moved the (e.g., configuration) value labeled circled 4 into the first slot from the second slot of input queue 11126.

Figure 111C:
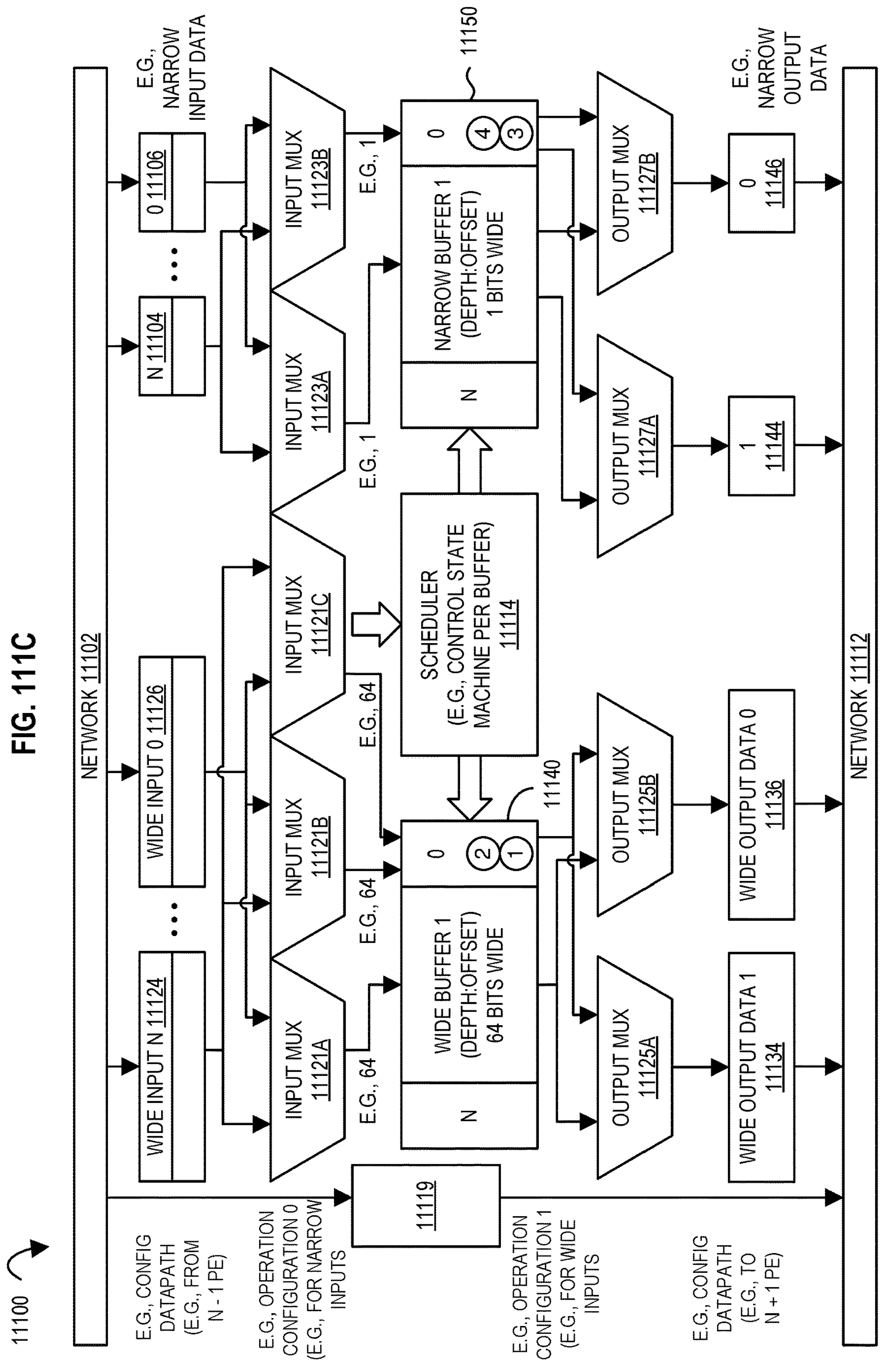

In FIG. 111C, buffer box element 11100 (e.g., scheduler 11114) has moved the (e.g., data) value labeled circled 2 into the (e.g., first storage location of) buffer storage 11140, and dequeued (e.g., deleted) the (e.g., data) value labeled circled 2 from the first slot of input queue 11126. Also, buffer box element 11100 (e.g., scheduler 11114) has moved the (e.g., configuration) value labeled circled 4 into the (e.g., first storage location of) buffer storage 11150, and dequeued (e.g., deleted) the (e.g., configuration) value labeled circled 4 from the first slot of input queue 11106.

Figure 111D:
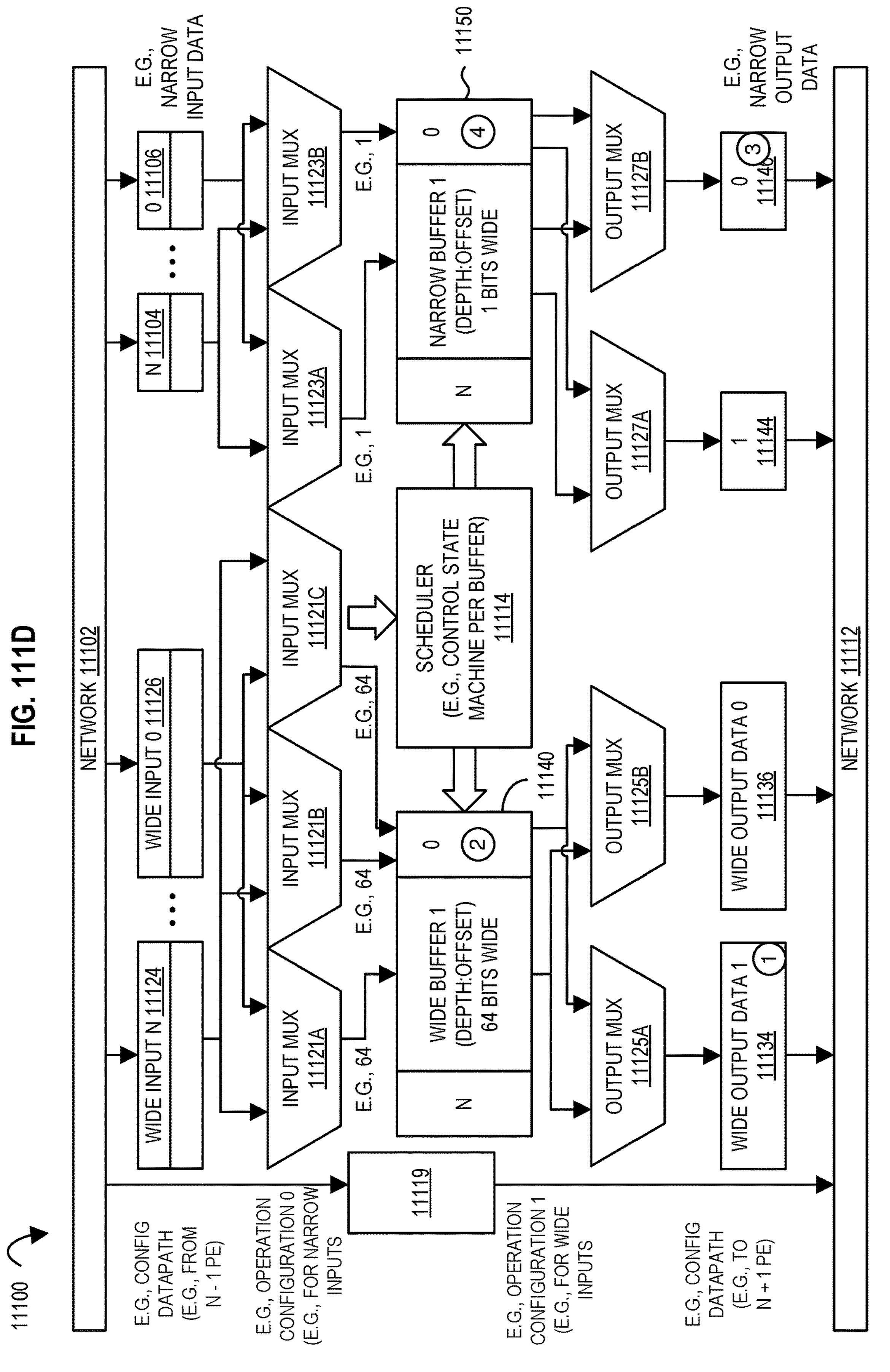

In FIG. 111D, buffer box element 11100 (e.g., scheduler 11114) has stored (e.g., moved) the (e.g., data) value labeled circled 1 from the (e.g., first storage location of) buffer storage 11140 into the (e.g., first slot of) output queue 11134, and removed the (e.g., data) value labeled circled 1 from the (e.g., first storage location of) buffer storage 11140. Also, buffer box element 11100 (e.g., scheduler 11114) has stored (e.g., moved) the (e.g., configuration) value labeled circled 3 from the (e.g., first storage location of) buffer storage 11150 into the (e.g., first slot of) output queue 11146, and removed the (e.g., configuration) value labeled circled 3 from the (e.g., first storage location of) buffer storage 11150. In certain embodiments, an output queue of buffer box element 11100 having space for a new value causes the buffer(s) to send and delete the sent value from the buffer(s).

Figure 111E:
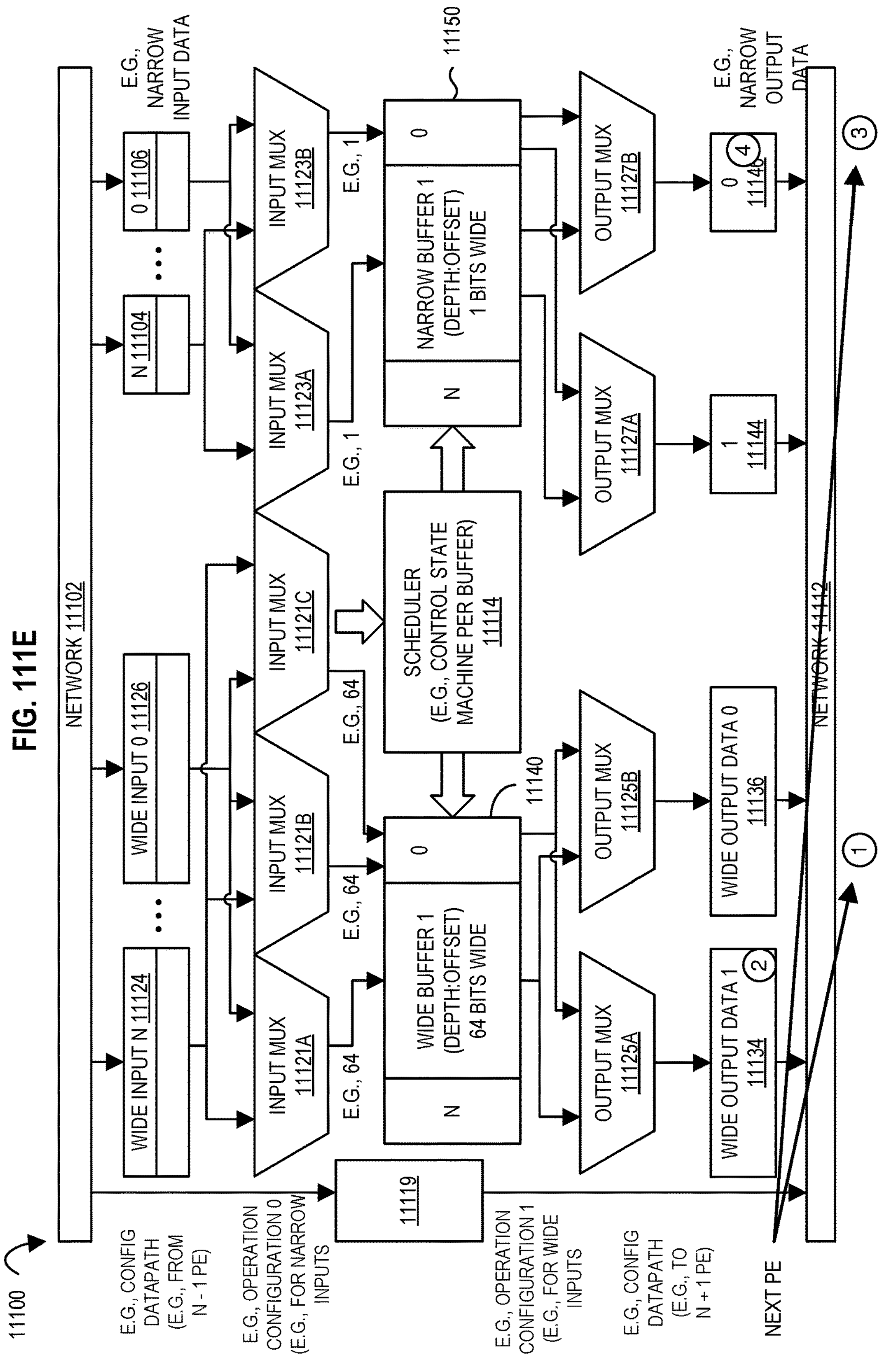

In FIG. 111E, a downstream component (e.g., PE or PEs) has consumed the (e.g., data) value labeled circled 1 from the (e.g., first slot of) output queue 11134, and consumed the (e.g., configuration) value labeled circled 3 from the (e.g., first slot of) output queue 11146, and there is now available space in the output queues. Thus, buffer box element 11100 (e.g., scheduler 11114) has stored (e.g., moved) the (e.g., data) value labeled circled 2 from the (e.g., first storage location (or second storage location if the removal of a data item from the buffer causes the remaining data to be moved into the next available storage location) of) buffer storage 11140 into the (e.g., first slot of) output buffer 11134, and removed the (e.g., data) value labeled circled 2 from the (e.g., first or second storage location of) buffer storage 11140. Also, buffer box element 11100 (e.g., scheduler 11114) has stored (e.g., moved) the (e.g., configuration) value labeled circled 4 from the (e.g., first or second storage location of) buffer storage 11150 into the (e.g., first slot of) output buffer 11146, and removed the (e.g., configuration) value labeled circled 4 from the (e.g., first or second storage location of) buffer storage 11150. In certain embodiments, an output queue of buffer box element 11100 having space for a new value causes the buffer(s) to send and delete the sent value from the buffer(s).

Figure 111F:
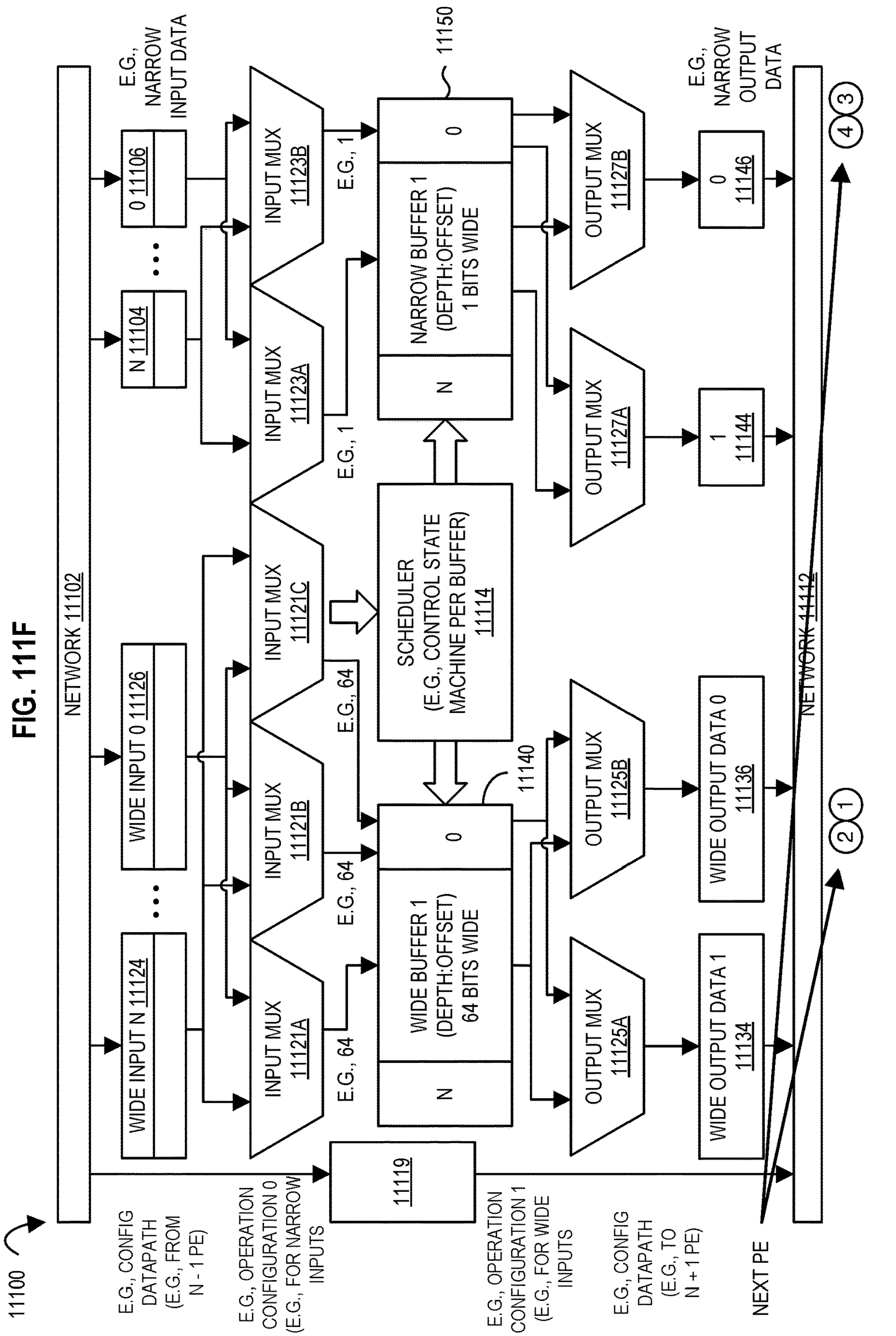

In FIG. 111F, a downstream component (e.g., PE or PEs) has consumed the (e.g., data) value labeled circled 2 from the (e.g., first slot of) output queue 11134, and consumed the (e.g., configuration) value labeled circled 4 from the (e.g., first slot of) output queue 11146.

In certain embodiments, buffer box element 11100 is stalled from sending data stored in its buffer storage until there is room in the target storage location (e.g., the output queue that is coupled to an input queue of a receiving PE or PEs).

In the depicted embodiment, buffer box element 11100 includes the components of buffer box element 10800 from FIG. 108, for example, with the components ending with the same two numbers having the same functionality. In one embodiment, scheduler 11114 schedules an operation or operations of buffer box element 11100 for performance according to the configuration value, e.g., and when input data and control input arrives.

FIFO Mode with Retention

In one embodiment, a CSA architecture includes a configuration value that, when stored into the configuration storage (e.g., register), causes a buffer box element thereof to operate in a FIFO mode with retention according to the following (e.g., semantics and/or description).

Figure 112:
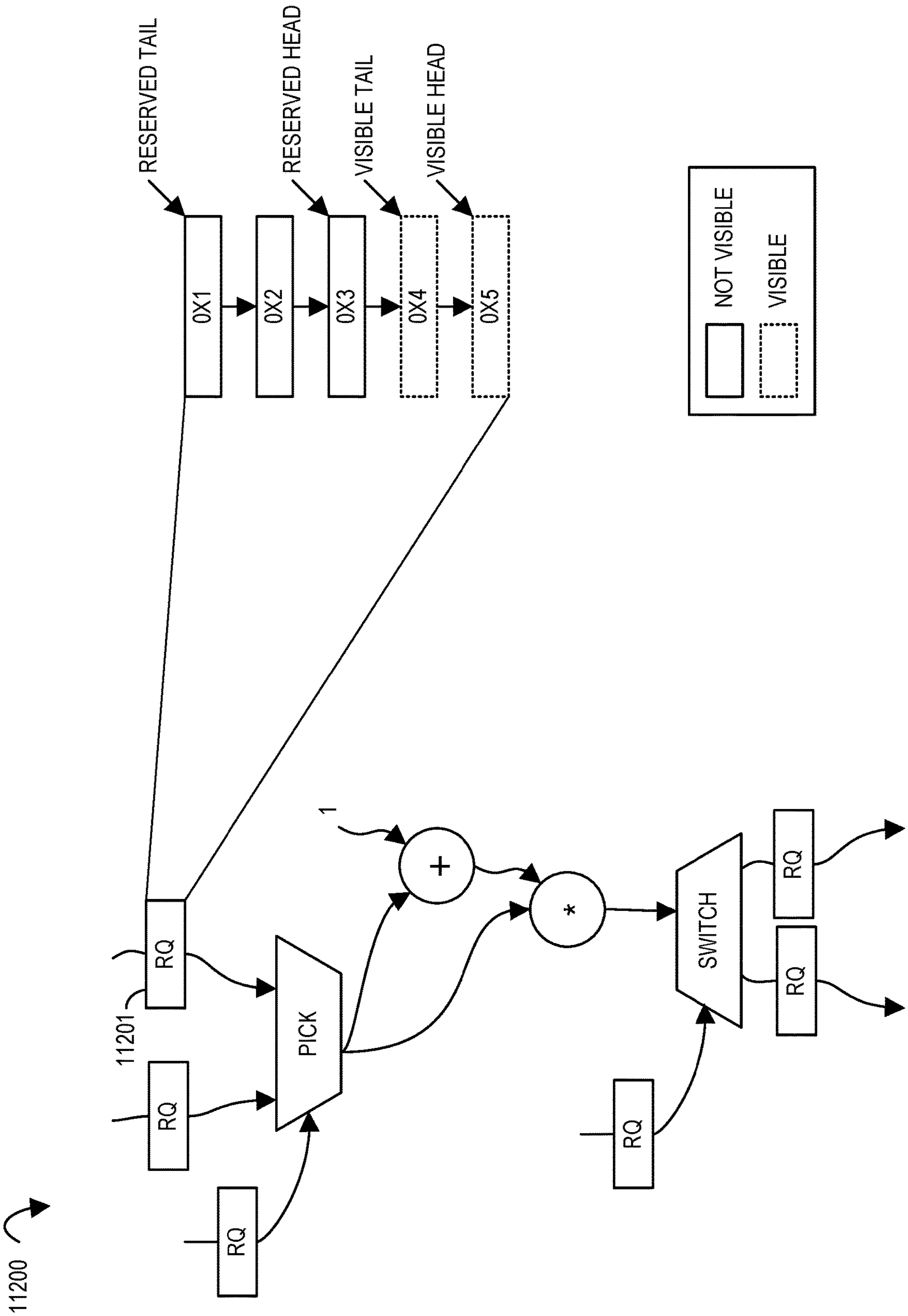
FIG. 112 illustrates a dataflow graph that includes a reservation queue (RQ) according to embodiments of the disclosure.

FIG. 112 illustrates a dataflow graph 11200 that includes a reservation queue (RQ) 11201 according to embodiments of the disclosure. In certain embodiments, certain of the items stored in the FIFO (e.g., in a buffer box element in FIFO mode with retention) are not deleted even after use, for example, the values (e.g., tokens) remain stored in the buffer even after the values are sent to the output queue(s).

Thus, "FIFO with retention" mode allows the specification (e.g., by a programmer or compiler) that a particular buffer box element (e.g., buffer thereof) will retain some predetermined number of prior values (e.g., dataflow tokens). In one embodiment, this is achieved by limiting the number of values that can be alive in the buffer at a given point in time. In certain embodiments, retained values are visible to software flows, e.g., and can be used to recover machine state in case of an error. In certain embodiments, a buffer box element (e.g., buffer thereof) includes a programmable threshold which guarantees the retention of a proper subset (e.g., a plurality of) values. In the case of error, these retained dataflow tokens are then used to reconstruct or replay erroneous values, e.g., allowing the CSA to self-recover in an automated fashion. Moreover, since buffer box elements are programmable, they can be disabled during executions of certain dataflow graphs, e.g., those which do not require a high level of reliability.

In FIG. 112, reservation queues are deployed on certain graph edges to ensure the recoverability of the dataflow graph in case of error. In certain embodiments, the reservation queue (RQ) or reservation queues are mapped such that they correspond to a buffer box element (e.g., buffer thereof) in the CSA. The buffer box element implementing the RQ is configured to store enough tokens to ensure that execution can be replayed in certain embodiments. For example, upon detection of an error, software will extract the RQ and the reserved values (e.g., tokens) are used to replay the execution. In one embodiment, RQs are inserted on operationally important LICs and may also be inserted opportunistically into existing graph storage, e.g., if extra buffering is not required. In certain embodiments, the placement of RQs is done by software based on an analysis of the graph, for example, where RQs are inserted to ensure that critical portions of the graph (e.g., control values thereof) are recoverable. In some embodiments, only one erroneous token is to be repaired and replaced and therefore the storage required to recover the error is not large there. Thus, instead of scanning configuration RAM, a CSA with a buffer box element (with retention) provides hardware support in the data plane, without leaving error detection and correction merely to software (e.g., with significant overhead). In certain embodiments, the reservation threshold can be set to zero to revert the buffer box element to FIFO mode (without retention).

Preload Mode

In one embodiment, a CSA architecture includes a configuration value that, when stored into the configuration storage (e.g., register), causes a buffer box element thereof to operate in a Preload mode according to the following (e.g., semantics and/or description).

Figure 114:
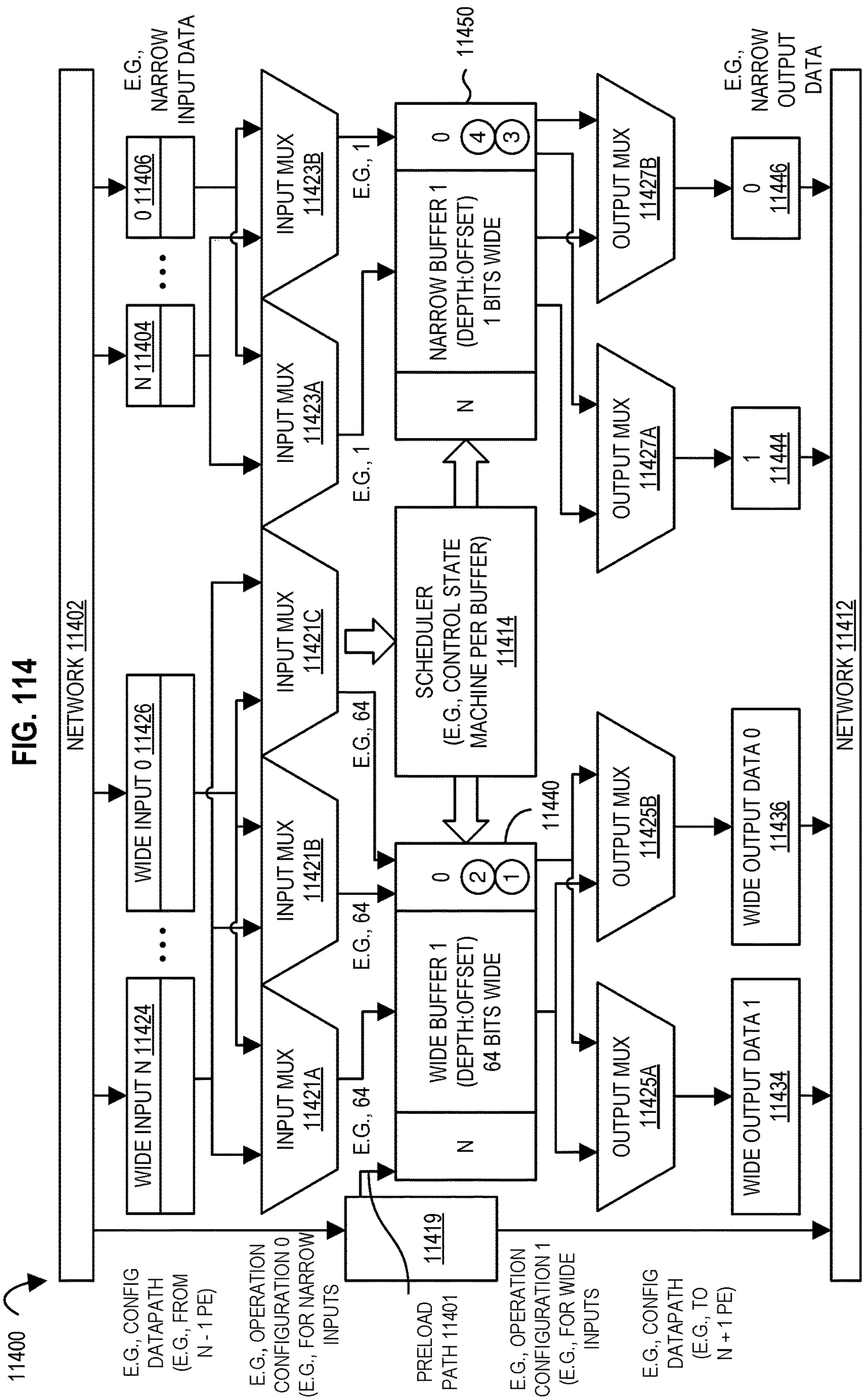
FIG. 114 illustrates a buffer box element performing a storage operation while in Preload mode according to embodiments of the disclosure.

FIG. 114 illustrates a buffer box element 11400 performing a storage operation while in Preload mode according to embodiments of the disclosure. In the depicted embodiment, an operation configuration (e.g., the Init field) includes data values (or cause the data values to be sent) into the buffer(s) of the buffer box element 11400. In one embodiment, the configuration register includes a preload path 11401 so that the data values are stored (e.g., before execution of a dataflow graph) into the buffer(s) of the buffer box element 11400 (path may also send any control signals to cause the buffer(s) to store those data values therein). In FIG. 114, the numbers in the circles are labels of an instance of data (and not the value of the data itself).

In the depicted embodiment, a preload has occurred that has stored the (e.g., data) value labeled circled 1 into the (e.g., first storage location of) buffer storage 11440, the (e.g., data) value labeled circled 2 into the (e.g., second storage location of) buffer storage 11440, the (e.g., configuration) value labeled circled 3 into the (e.g., first storage location of) buffer storage 11450, and the (e.g., configuration) value labeled circled 4 into the (e.g., second storage location of) buffer storage 11450.

In certain embodiments, during configuration, a bit is set indicating the next values received by buffer box element 11400 are to be preloaded into the buffer storage.

In the depicted embodiment, buffer box element 11400 includes the components of buffer box element 10800 from FIG. 108, for example, with the components ending with the same two numbers having the same functionality. In one embodiment, scheduler 11414 schedules an operation or operations of buffer box element 11400 for performance according to the configuration value, e.g., and when input data and control input arrives.

| |
|---|
| Operation: buffer(1-64) res.CRd.iN, value.CRLu.iN, size.Lu.i8, reserved.Lu.i8<br>Description: Copies value to res, essentially implementing a queue on the CSA storage element. Buffers at least :size tokens. Will retain at least reserved consumed tokens at a time. |

Figure 113:
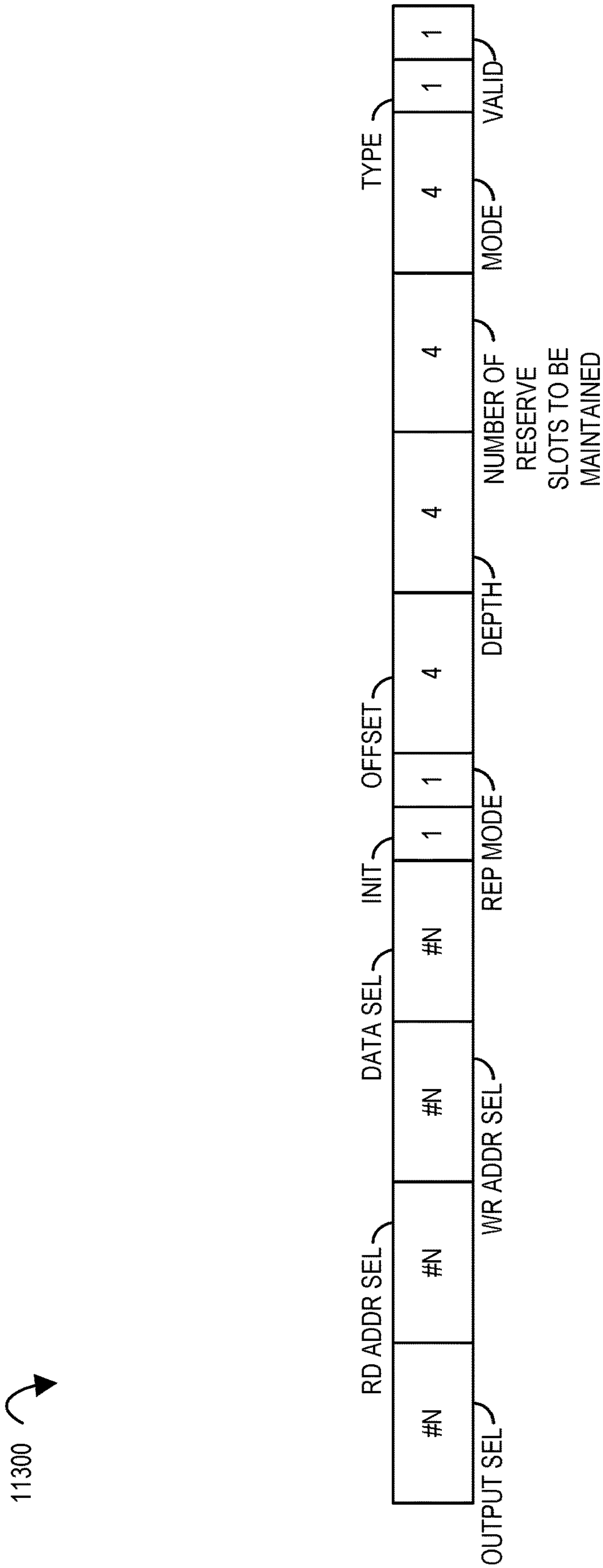
FIG. 113 illustrates an example format for the control bit fields for a buffer box element with reservation according to embodiments of the disclosure.

In contrast to FIG. 109, FIG. 113 illustrates an example format for the control bit fields 11300 for a buffer box element with reservation. The reservation threshold is set by storing a corresponding value in the field of the "number of reserve slots to be maintained" in control bit fields 11300, e.g., as an additional field compared to control bit fields 10900. In one embodiment, the microarchitecture of reserved queues involves adding a check during FIFO buffer mode to modify the conditions when data can be enqueued into the storage element. In particular: storageElementEnqueueable=emptySlots> reserved, where emptySlots is a measure of the emptiness of the buffer storage of the buffer box element. At runtime, as shown in FIG. 112, empty slots contain previously written values (e.g., dataflow tokens). In one embodiment where the storage is ordered, these slots correspond to the most recently consumed tokens. When there are too few empty slots, new values are prevented from entering into the buffer of the buffer box element. By preventing ingress into the buffer of the buffer box element, a set of at least reserved prior values is guaranteed to remain in the buffer of the buffer box element, e.g., according to the "buffer" operation discussed above.

Repeat (Using Buffer Box Element) Mode

In one embodiment, a CSA architecture includes a configuration value that, when stored into the configuration storage (e.g., register), causes a buffer box element thereof to operate in a repeat mode according to the following (e.g., semantics and/or description).

FIGS. 115A-115F illustrate a buffer box element 11500 performing a repeat operation while in Repeat mode according to embodiments of the disclosure, e.g., also according to the "buffer" operation discussed above. In the depicted embodiment, an operation configuration value includes a repeat (Rep_Mode) field set to cause a repeat (e.g., Rep_Mode field in FIGS. 109 and 110) (e.g., and a mode field set to FIFO Buffer mode) stored (e.g., during a programming time period) into operation configuration register 11519.

In FIGS. 115A-115F, the numbers in the circles are labels of an instance of data (and not the value of the data itself).

Figure 115A:
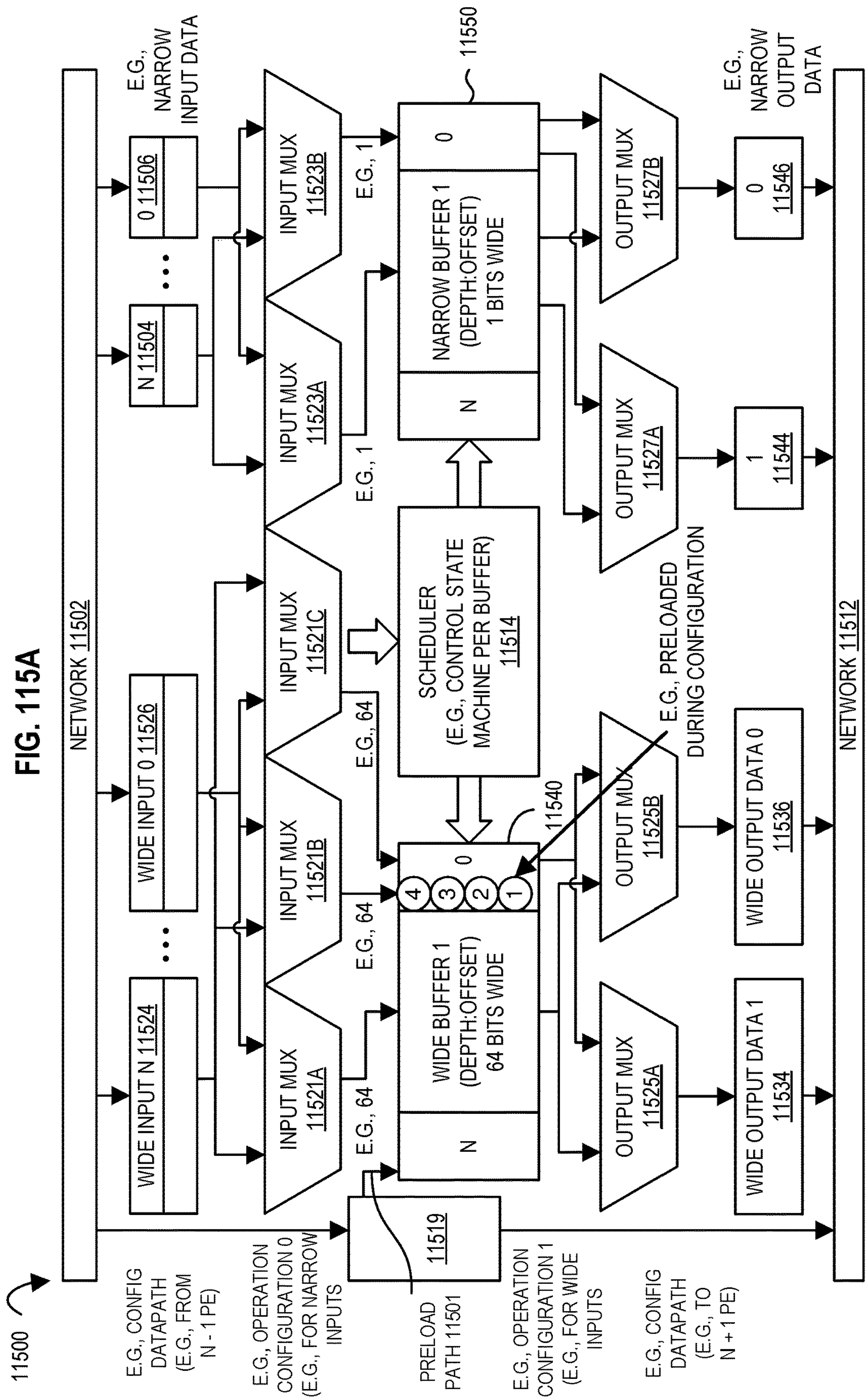
FIGS. 115A-115F illustrate a buffer box element performing a repeat operation while in Repeat mode according to embodiments of the disclosure.

In FIG. 115A, a (e.g., data) value labeled circled 1 is stored into the (e.g., first storage location of) buffer storage 11540, a (e.g., data) value labeled circled 2 is stored into the (e.g., second storage location of) buffer storage 11540, a (e.g., data) value labeled circled 3 is stored into the (e.g., third storage location of) buffer storage 11540, and a (e.g., data) value labeled circled 4 is stored into the (e.g., fourth storage location of) buffer storage 11540. In one embodiment those four values are preloaded into the buffer storage 11540, for example, according to the preload discussed above in reference to FIG. 114.

Figure 115B:
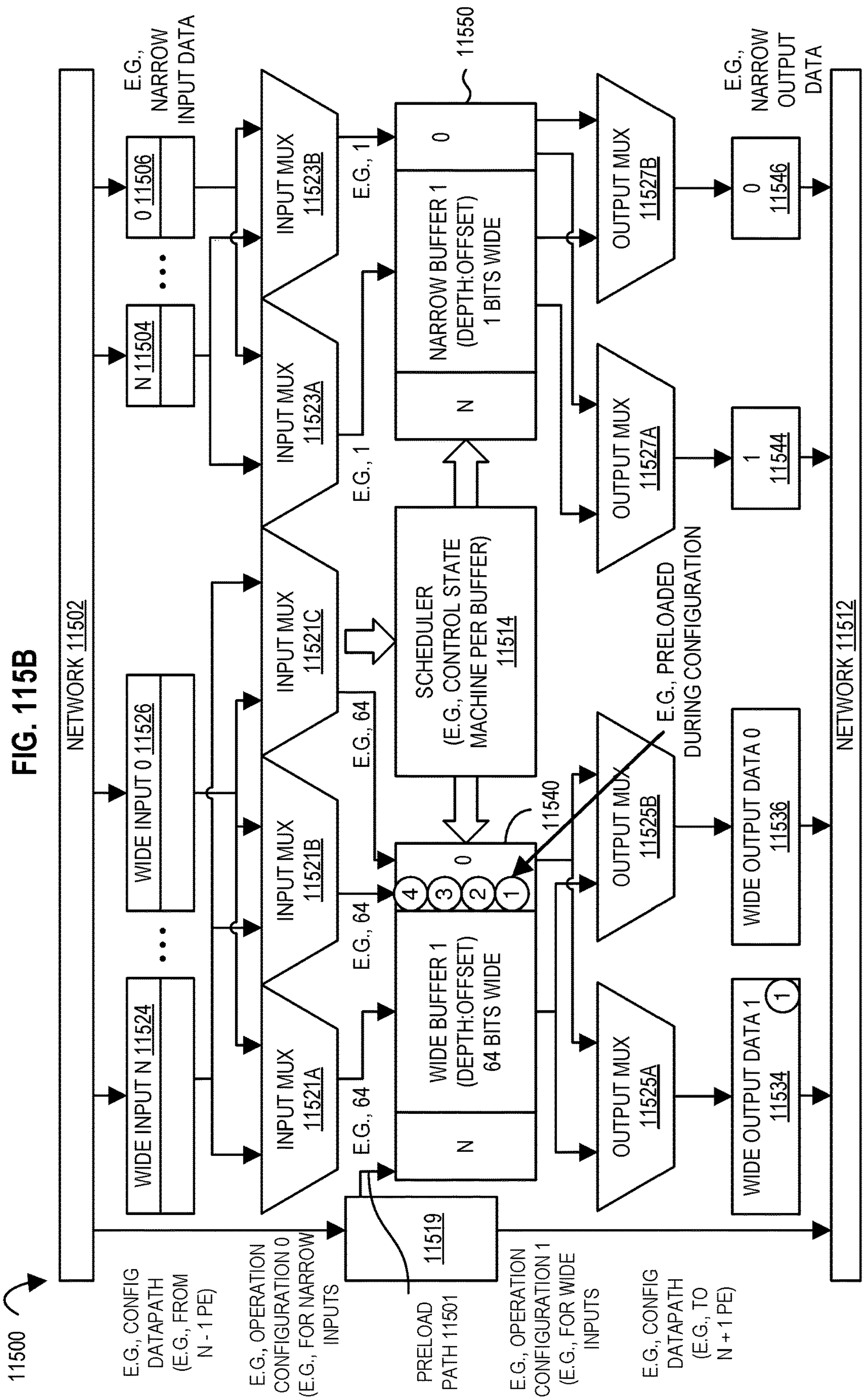

In FIG. 115B, buffer box element 11500 (e.g., scheduler 11514) has stored the (e.g., data) value labeled circled 1 from the (e.g., first storage location of) buffer storage 11540 into the (e.g., first slot of) output queue 11534, but not dequeued any of the four values from the buffer storage 11540 because the repeat mode is set to indicate a repeat.

Figure 115C:
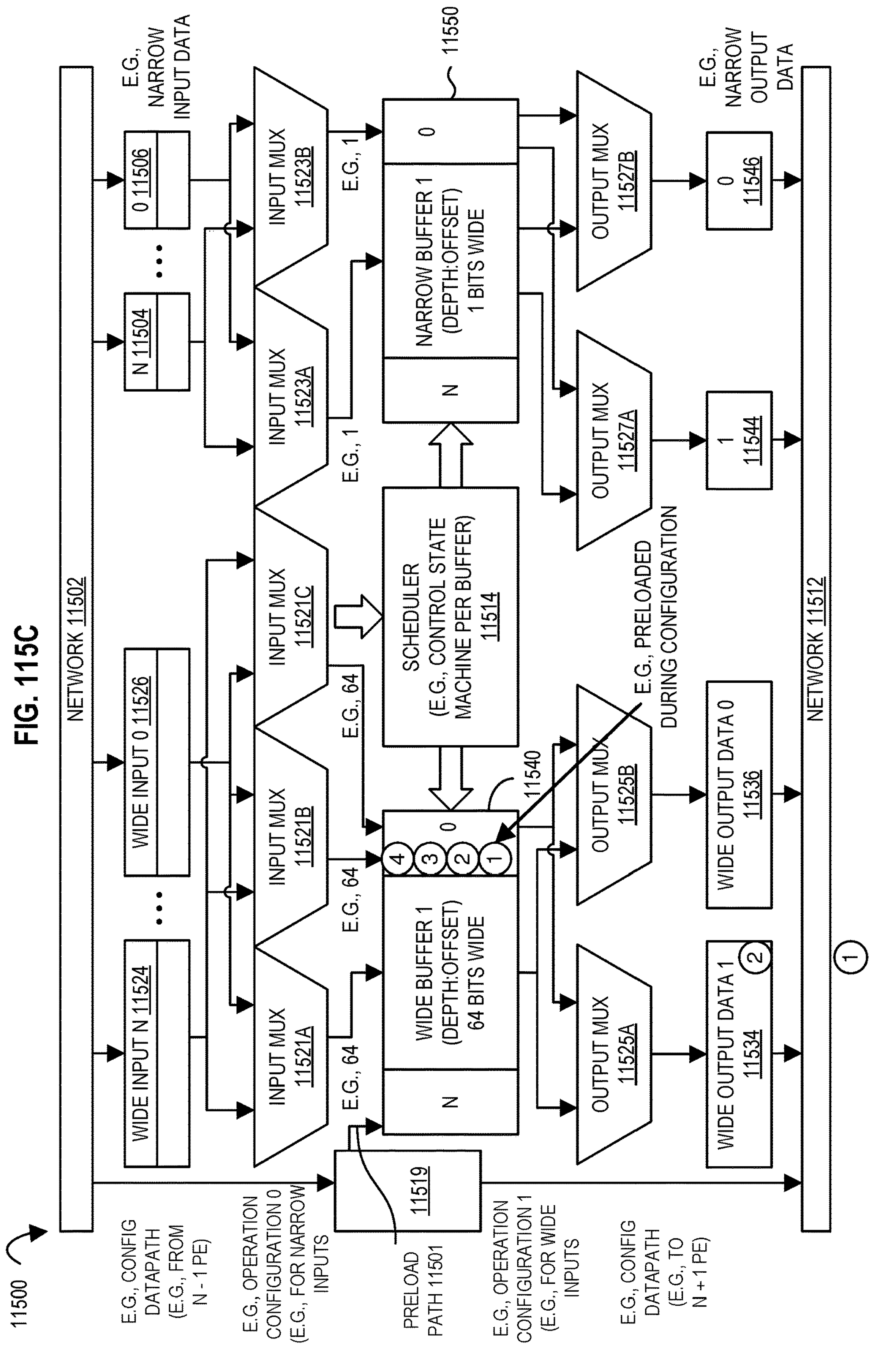

In FIG. 115C, the value labeled circled 1 has been consumed (e.g., moved into the input queue of a downstream PE) from output queue 11534, and as there is output space available, buffer box element 11500 (e.g., scheduler 11514) has stored the (e.g., data) value labeled circled 2 from the (e.g., second storage location of) buffer storage 11540 into the (e.g., first slot of) output queue 11534, but not dequeued any of the four values from the buffer storage 11540 because the repeat mode is set to indicate a repeat.

Figure 115D:
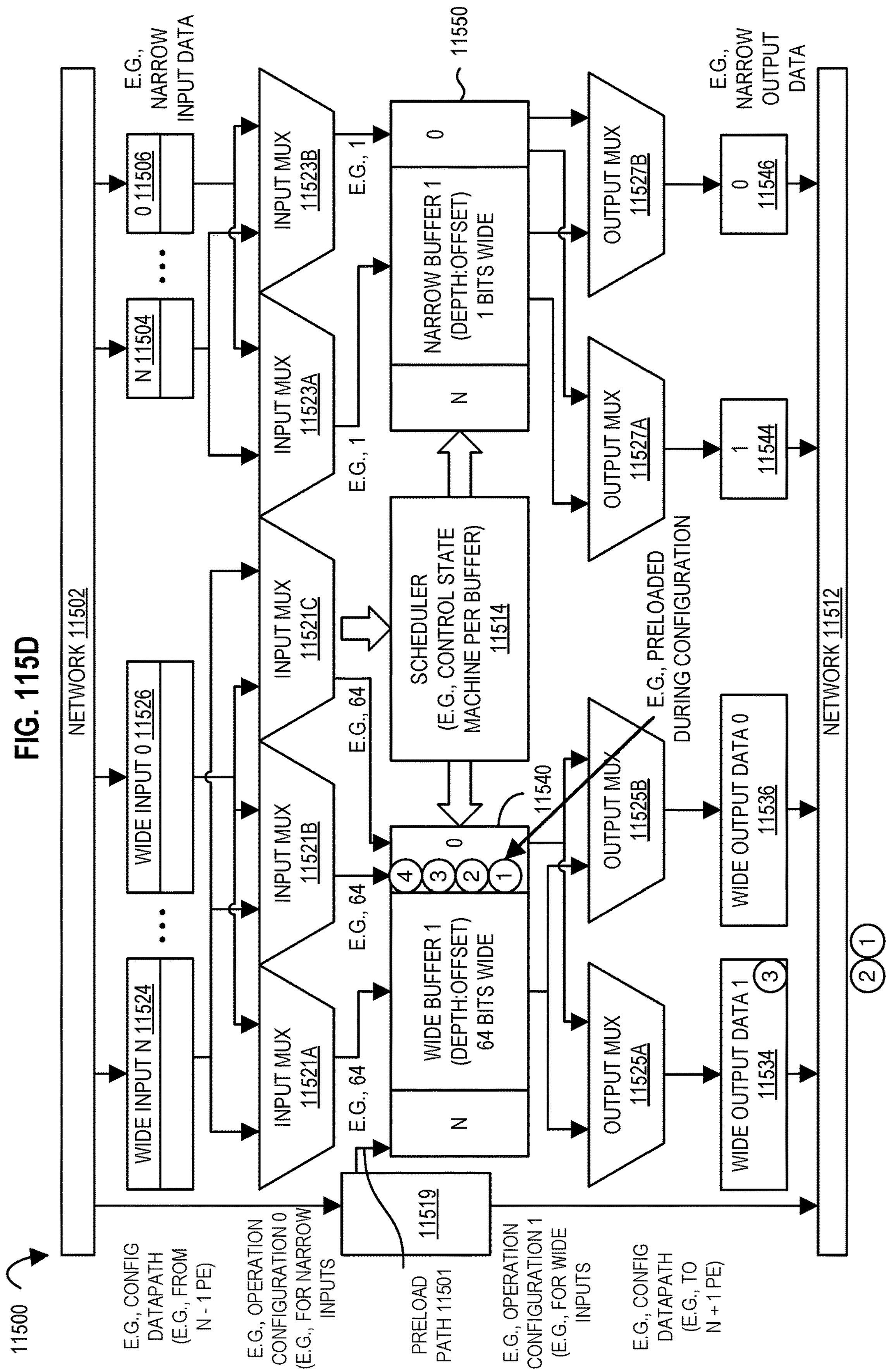

In FIG. 115D, the value labeled circled 2 has been consumed (e.g., moved into the input queue of a downstream PE) from output queue 11534, and as there is output space available, buffer box element 11500 (e.g., scheduler 11514) has stored the (e.g., data) value labeled circled 3 from the (e.g., third storage location of) buffer storage 11540 into the (e.g., first slot of) output queue 11534, but not dequeued any of the four values from the buffer storage 11540 because the repeat mode is set to indicate a repeat.

Figure 115E:
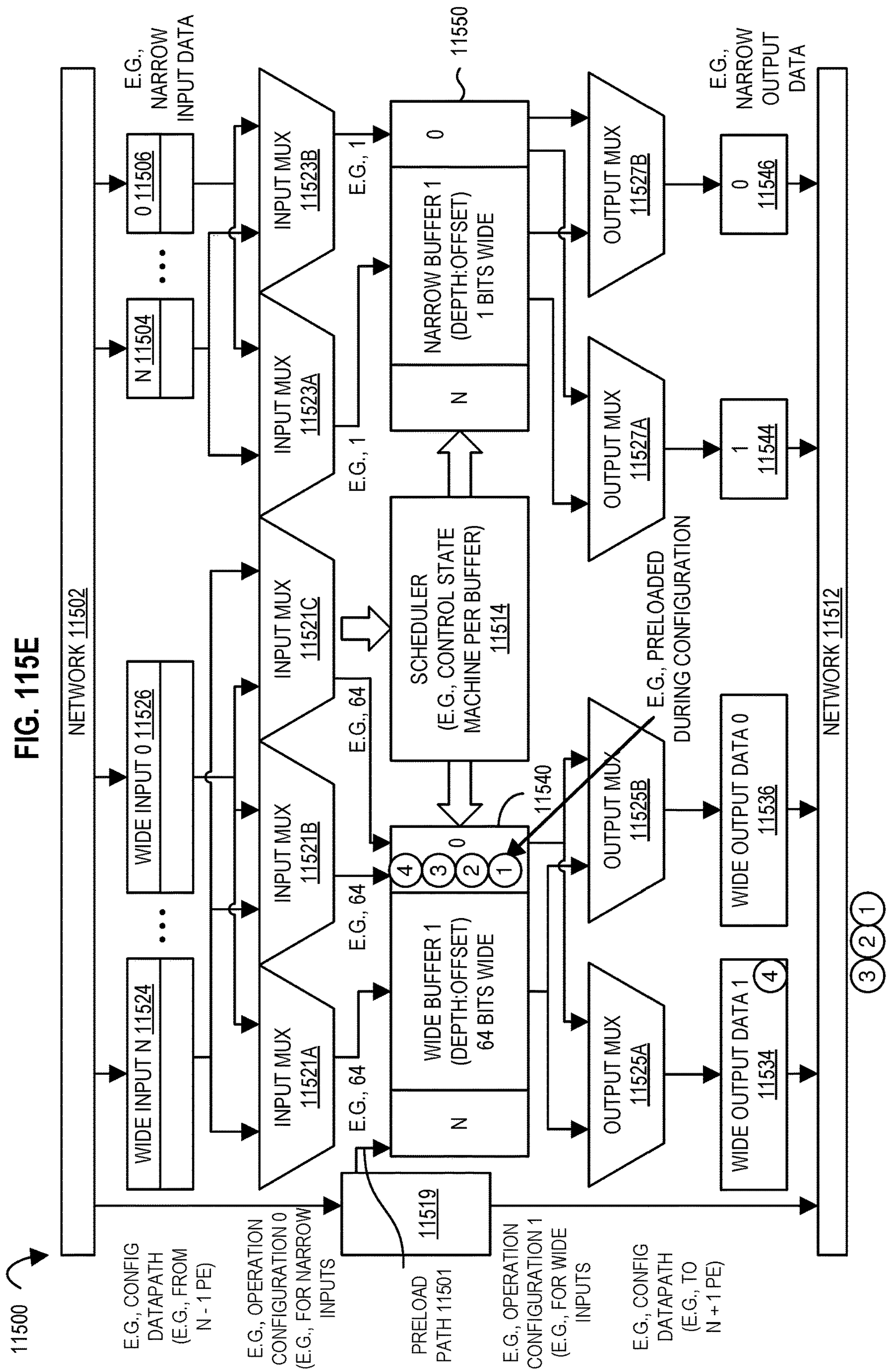
Figure 115F:
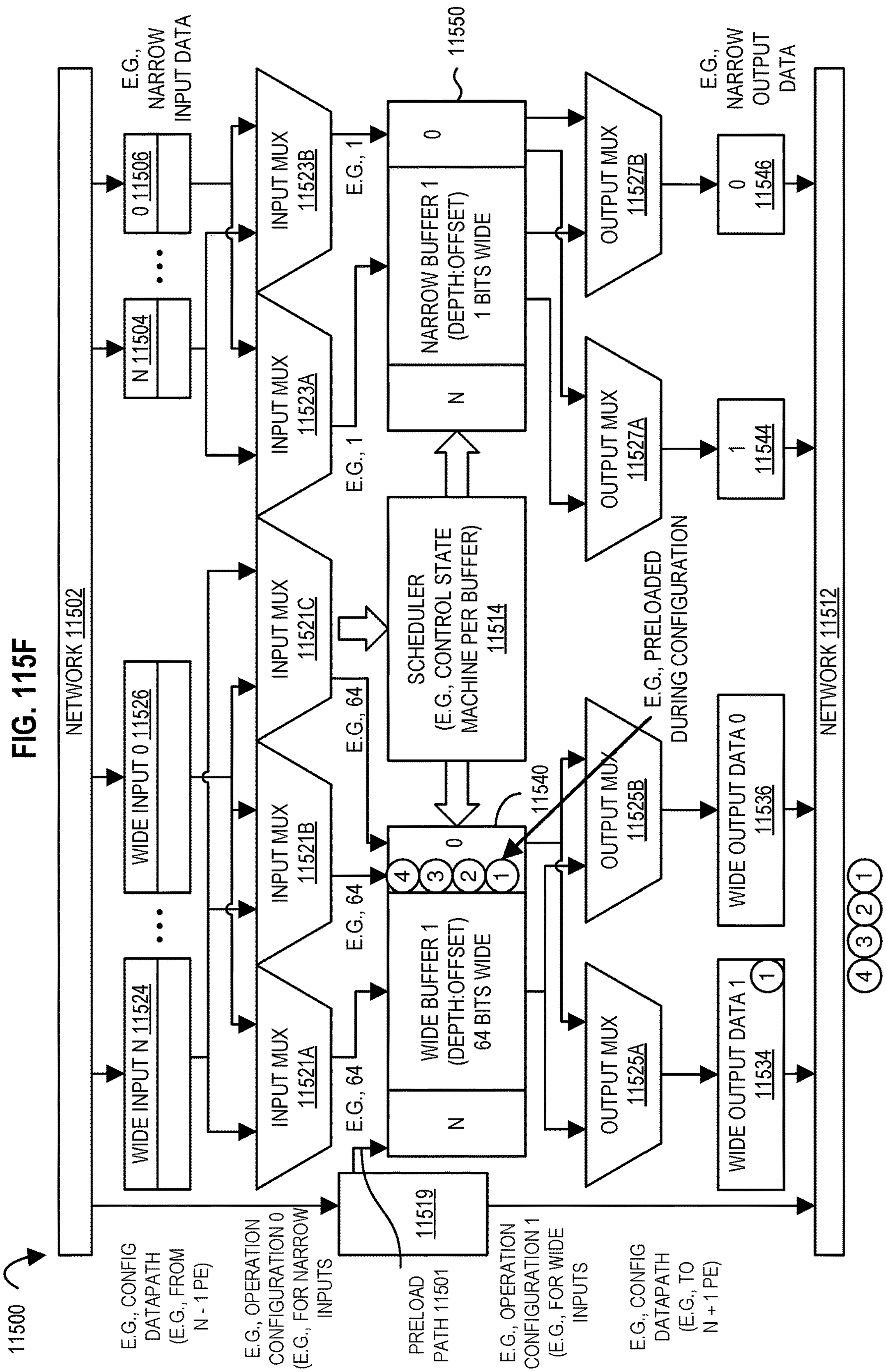

In FIG. 115E, the value labeled circled 3 has been consumed (e.g., moved into the input queue of a downstream PE) from output queue 11534, and as there is output space available, buffer box element 11500 (e.g., scheduler 11514) has stored the (e.g., data) value labeled circled 4 from the (e.g., fourth storage location of) buffer storage 11540 into the (e.g., first slot of) output queue 11534, but not dequeued any of the four values from the buffer storage 11540 because the repeat mode is set to indicate a repeat.

In FIG. 115E, the value labeled circled 4 has been consumed (e.g., moved into the input queue of a downstream PE) from output queue 11534, and as there is output space available, buffer box element 11500 (e.g., scheduler 11514) has again stored the (e.g., data) value labeled circled 1 from the (e.g., first storage location of) buffer storage 11540 into the (e.g., first slot of) output queue 11534, but not dequeued any of the four values from the buffer storage 11540 because the repeat mode is set to indicate a repeat. The buffer box element 11500 then repeats outputting those four values in that order, e.g., until the repeat mode field is cleared.

In certain embodiments, buffer box element 11500 is stalled from sending data stored in its buffer storage until there is room in the target storage location (e.g., the output queue that is coupled to an input queue of a receiving PE or PEs).

In the depicted embodiment, buffer box element 11500 includes the components of buffer box element 10800 from FIG. 108, for example, with the components ending with the same two numbers having the same functionality. In one embodiment, scheduler 11514 schedules an operation or operations of buffer box element 11500 for performance according to the configuration value, e.g., and when input data and control input arrives.

Repeat—Controlled Mode

In one embodiment, a CSA architecture includes a configuration value that, when stored into the configuration storage (e.g., register), causes a buffer box element thereof to operate in a Repeat—controlled mode according to the following (e.g., semantics and/or description).

FIGS. 116A-116G illustrate a buffer box element 11600 performing a controlled repeat operation while in Repeat-controlled mode according to embodiments of the disclosure, e.g., also according to the "buffer" operation discussed above. In the depicted embodiment, an operation configuration value includes a repeat-controlled field to cause a controlled repeat (e.g., in mode field) stored (e.g., during a programming time period) into operation configuration register 11619.

In FIGS. 116A-116G, the numbers in the circles in (e.g., control) input queue 11606 are the values (e.g., one or zero), and the other numbers in the circles are labels of an instance of data (and not the value of the data itself). In the depicted embodiment, the repeat-controlled operation mode functions as the repeat mode above except an input queue is used as a control input where a first value (e.g., one) is to cause the output of the repeat value(s) in their stored order, and a second value (e.g., zero) is to pause (e.g., stop) the output of the repeat value(s) in their stored order, e.g., with this controlled starting and stopping of the repeat being in addition to stalling the output of a value from the buffer storage when there is no room in its targeted output queue.

Figure 116A:
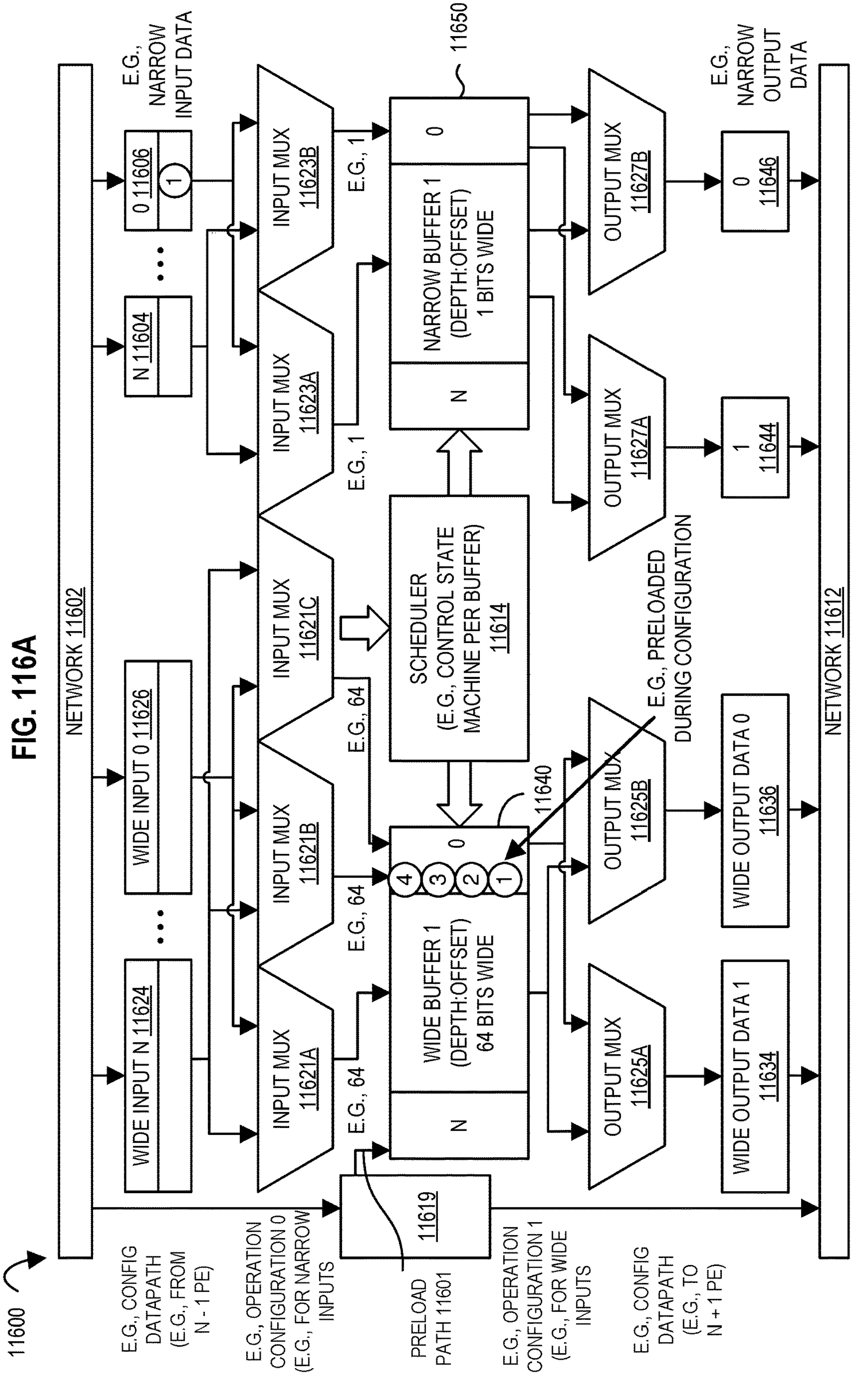

In FIG. 116A, a (e.g., data) value labeled circled 1 is stored into the (e.g., first storage location of) buffer storage 11640, a (e.g., data) value labeled circled 2 is stored into the (e.g., second storage location of) buffer storage 11640, a (e.g., data) value labeled circled 3 is stored into the (e.g., third storage location of) buffer storage 11640, and a (e.g., data) value labeled circled 4 is stored into the (e.g., fourth storage location of) buffer storage 11640. In one embodiment those four values are preloaded into the buffer storage 11640, for example, according to the preload discussed above in reference to FIG. 114.

In FIG. 116A, a (e.g., control) value of one is stored in input queue 11606, e.g., by an upstream PE.

Figure 116B:
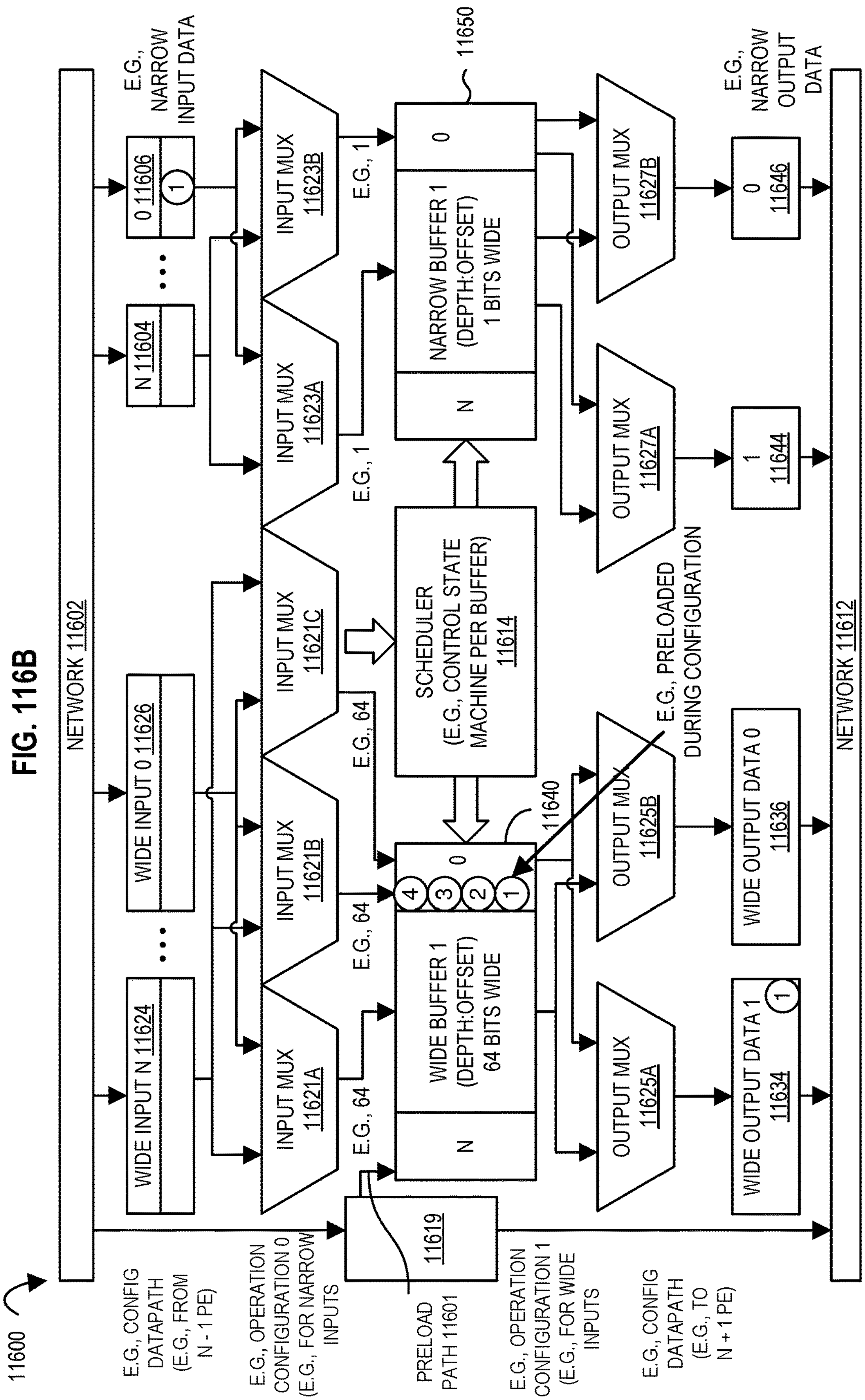

In FIG. 116B, because the control value in input queue 11606 was a one (and not a zero) and there is available storage space in the output queue 11634, buffer box element 11600 (e.g., scheduler 11614) has stored the (e.g., data) value labeled circled 1 from the (e.g., first storage location of) buffer storage 11640 into the (e.g., first slot of) output queue 11634, not dequeued any of the four values from the buffer storage 11640 because the repeat mode is set to indicate a repeat, and dequeued the control value of one from the input queue 11606. In FIG. 116B, another (e.g., control) value of one is stored in input queue 11606, e.g., by an upstream PE.

Figure 116C:
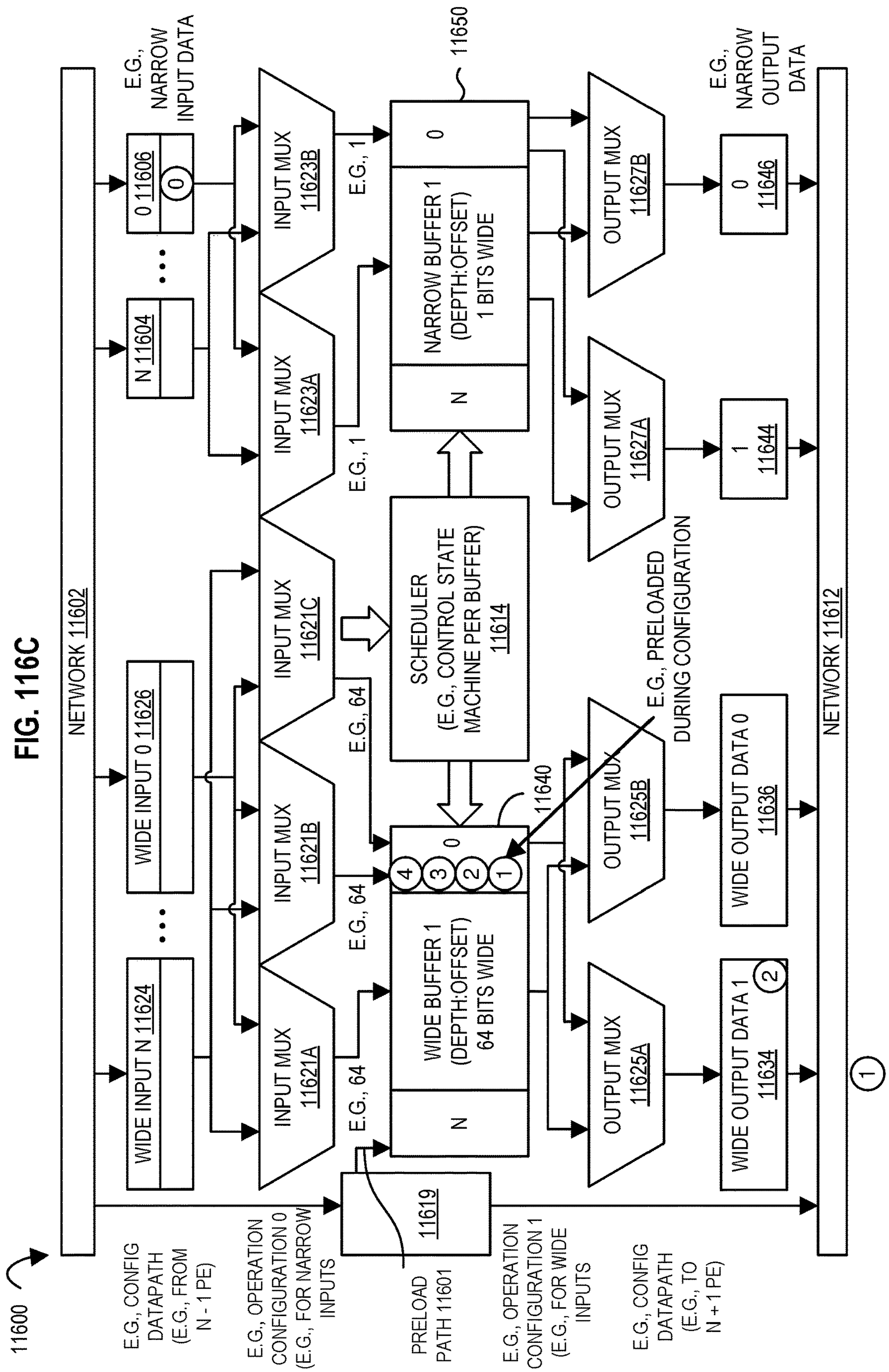

In FIG. 116C, the value labeled circled 1 has been consumed (e.g., moved into the input queue of a downstream PE) from output queue 11634, and because there is output space available and the control value in input queue 11606 was a one (and not a zero), buffer box element 11600 (e.g., scheduler 11614) has stored the (e.g., data) value labeled circled 2 from the (e.g., second storage location of) buffer storage 11640 into the (e.g., first slot of) output queue 11634, not dequeued any of the four values from the buffer storage 11640 because the repeat mode is set to indicate a repeat, and dequeued the control value of one from the input queue 11606. In FIG. 116C, a (e.g., control) value of zero is stored in input queue 11606, e.g., by an upstream PE.

In FIG. 116D, the value labeled circled 2 has been consumed (e.g., moved into the input queue of a downstream PE) from output queue 11634, and although there is output space available, the control value in input queue 11606 was a zero (and not a one), so buffer box element 11600 (e.g., scheduler 11614) has not stored the next (e.g., data) value labeled circled 3 from the (e.g., third storage location of) buffer storage 11640 into the (e.g., first slot of) output queue 11634, not dequeued any of the four values from the buffer storage 11640 because the repeat mode is set to indicate a repeat, and dequeued the control value of zero from the input queue 11606. In FIG. 116D, a (e.g., control) value of one is stored in input queue 11606, e.g., by an upstream PE.

Figure 116E:
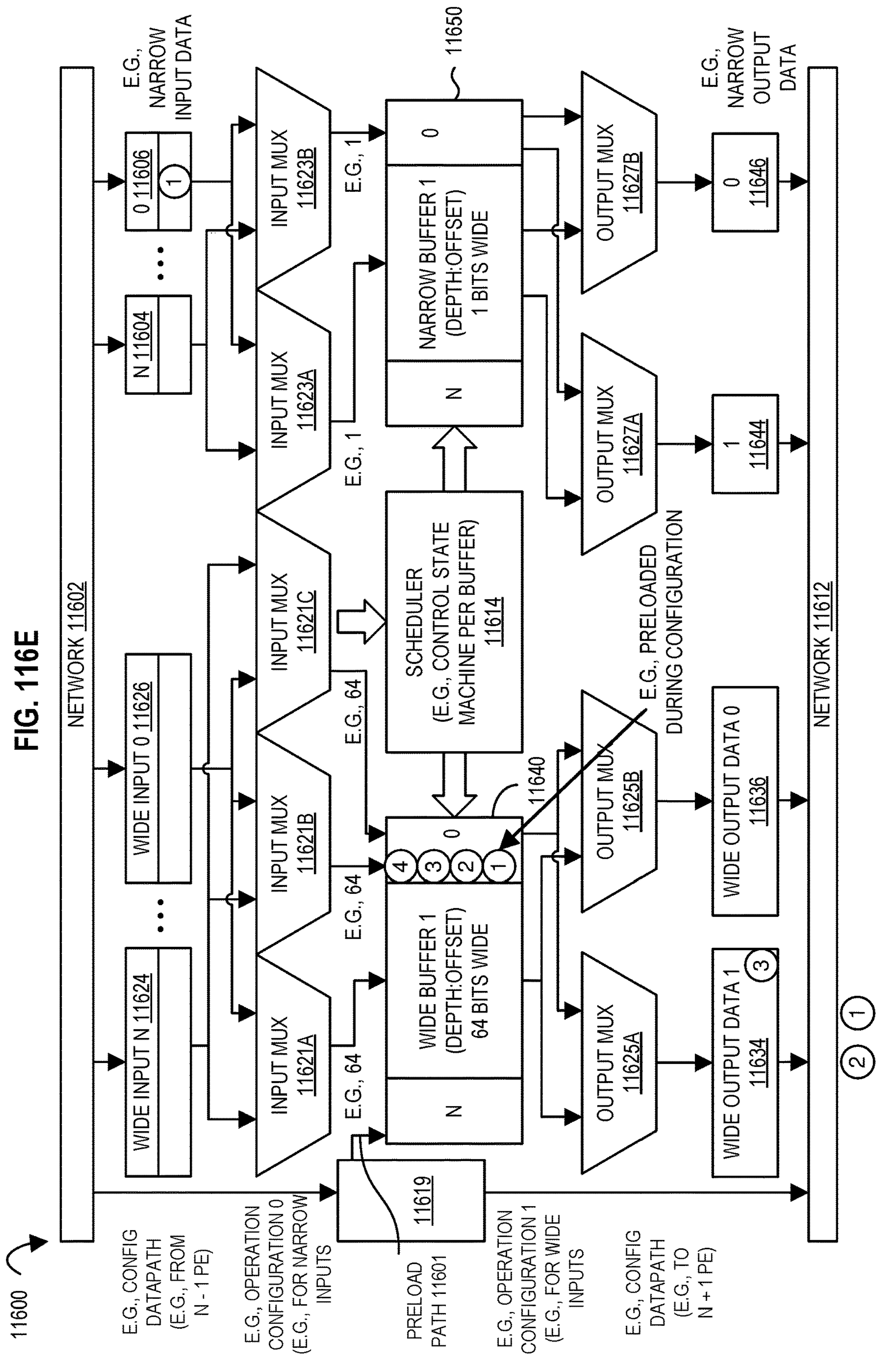

In FIG. 116E, because there is output space available and the control value in input queue 11606 was a one (and not a zero), buffer box element 11600 (e.g., scheduler 11614) has now stored the (e.g., data) value labeled circled 3 from the (e.g., third storage location of) buffer storage 11640 into the (e.g., first slot of) output queue 11634, not dequeued any of the four values from the buffer storage 11640 because the repeat mode is set to indicate a repeat, and dequeued the control value of one from the input queue 11606. In FIG. 116E, another (e.g., control) value of one is stored in input queue 11606, e.g., by an upstream PE.

Figure 116F:
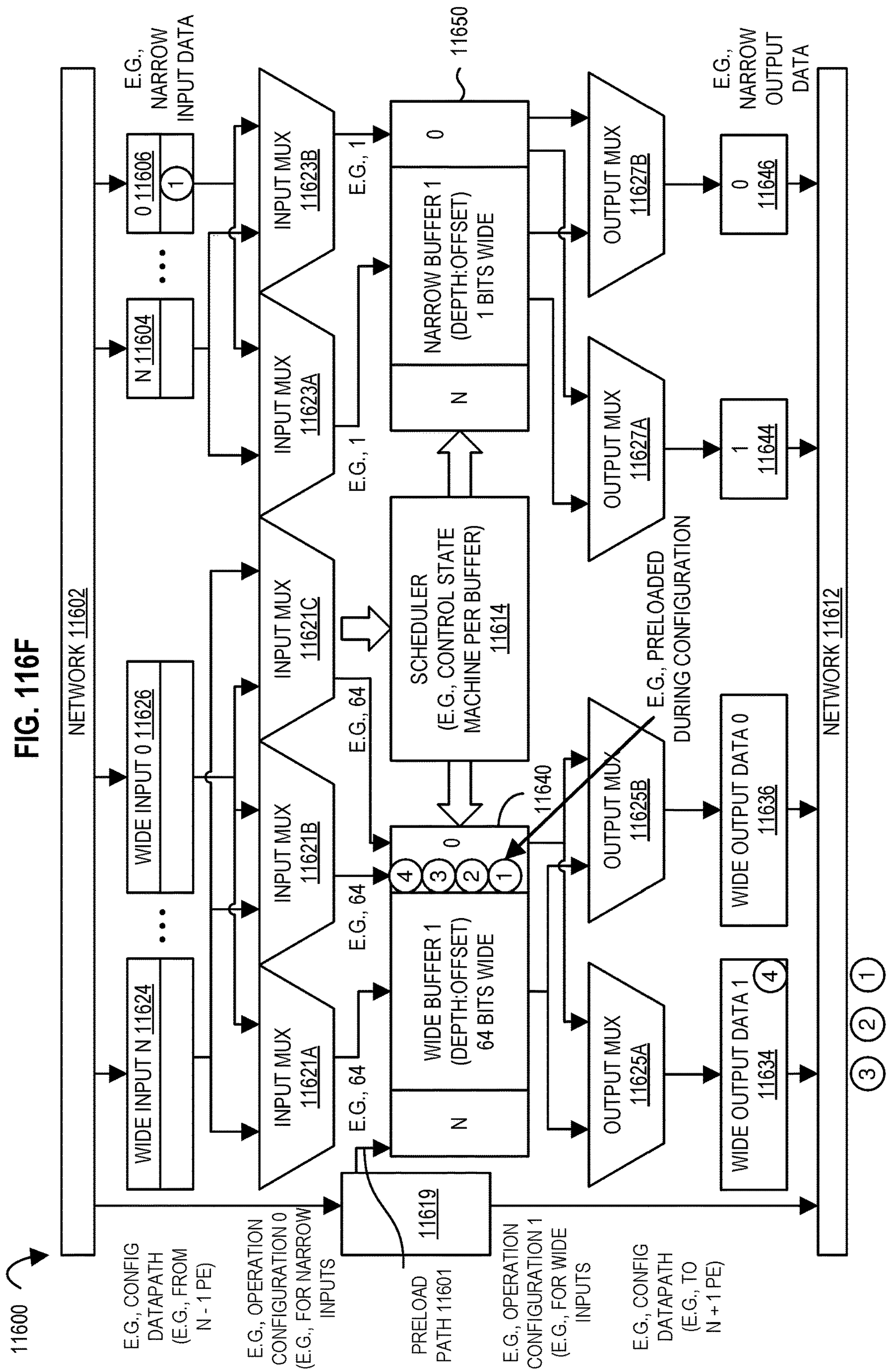

In FIG. 116F, the value labeled circled 3 has been consumed (e.g., moved into the input queue of a downstream PE) from output queue 11634, and because there is output space available and the control value in input queue 11606 was a one (and not a zero), buffer box element 11600 (e.g., scheduler 11614) has stored the (e.g., data) value labeled circled 4 from the (e.g., fourth storage location of) buffer storage 11640 into the (e.g., first slot of) output queue 11634, not dequeued any of the four values from the buffer storage 11640 because the repeat mode is set to indicate a repeat, and dequeued the control value of one from the input queue 11606. In FIG. 116C, another (e.g., control) value of one is stored in input queue 11606, e.g., by an upstream PE.

Figure 116G:
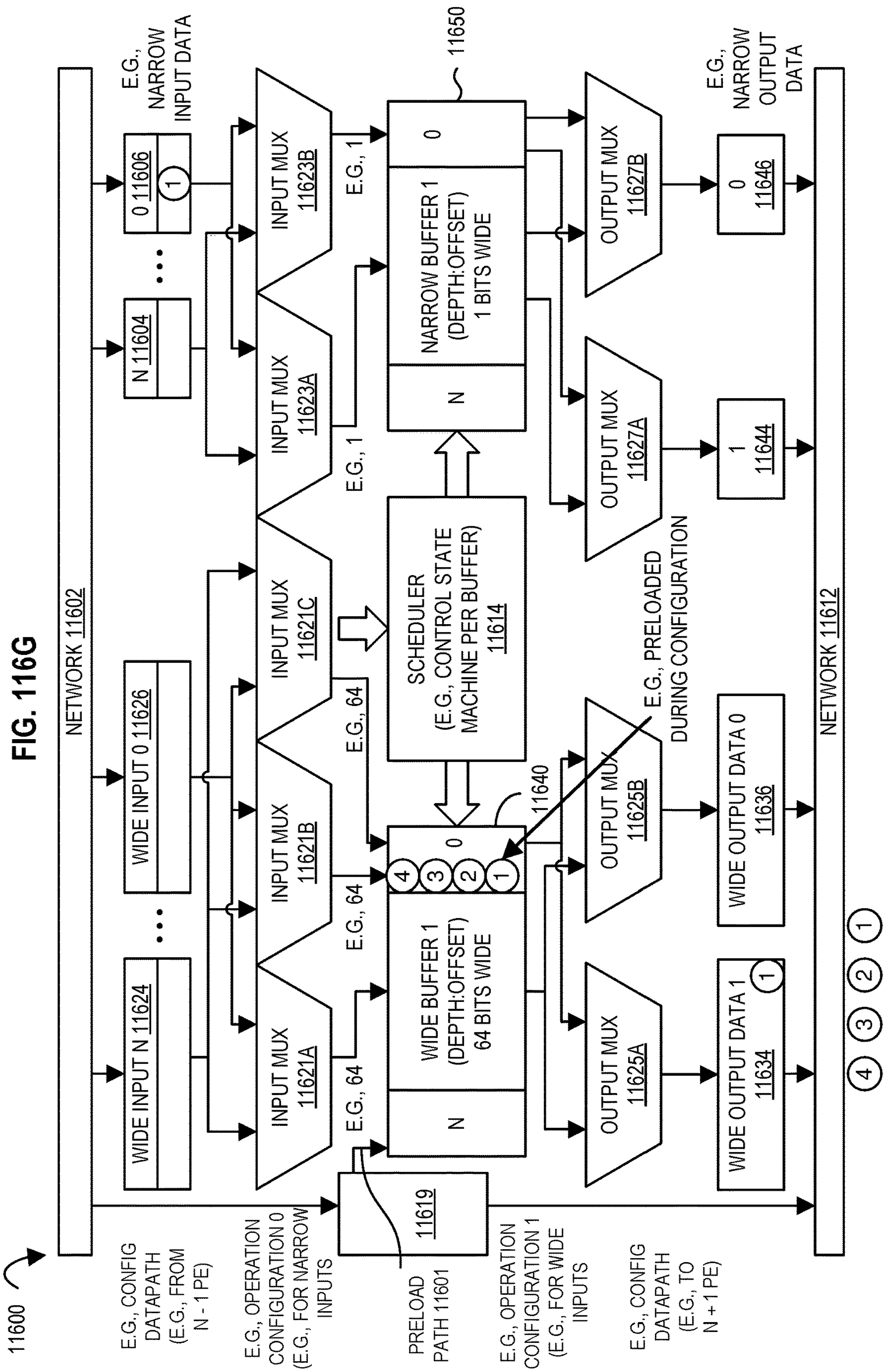

In FIG. 116G, the value labeled circled 4 has been consumed (e.g., moved into the input queue of a downstream PE) from output queue 11634, and because there is output space available and the control value in input queue 11606 was a one (and not a zero), buffer box element 11600 (e.g., scheduler 11614) has stored the (e.g., data) value labeled circled 1 from the (e.g., first storage location of) buffer storage 11640 into the (e.g., first slot of) output queue 11634 (because there are four values stored in the buffer storage to be repeated here), not dequeued any of the four values from the buffer storage 11640 because the repeat mode is set to indicate a repeat, and dequeued the control value of one from the input queue 11606. In FIG. 116F, another (e.g., control) value of one is stored in input queue 11606, e.g., by an upstream PE. The buffer box element 11600 then repeats outputting those four values in that order when the control value is set to one, e.g., until the repeat mode field is cleared.

In certain embodiments, buffer box element 11600 is stalled from sending data stored in its buffer storage until there is room in the target storage location (e.g., the output queue that is coupled to an input queue of a receiving PE or PEs) even when the control value is set to one.

In the depicted embodiment, buffer box element 11600 includes the components of buffer box element 10800 from FIG. 108, for example, with the components ending with the same two numbers having the same functionality. In one embodiment, scheduler 11614 schedules an operation or operations of buffer box element 11600 for performance according to the configuration value, e.g., and when input data and control input arrives.

RAM Mode

In one embodiment, a CSA architecture includes a configuration value that, when stored into the configuration storage (e.g., register), causes a buffer box element thereof to operate in a RAM mode according to the following (e.g., semantics and/or description).

FIGS. 117A-117G illustrate a buffer box element 11700 performing a storage operation while in RAM mode according to embodiments of the disclosure. In the depicted embodiment, an operation configuration value includes a mode field (set to RAM mode) (e.g., mode field in FIGS. 109 and 110) stored (e.g., during a programming time period) into operation configuration register 11719. As one example, a first input queue (e.g., having a multiple bit width) is provided (e.g., activated by connecting to the network) to receive an address (e.g., a virtual address) of a (e.g., system or main) memory coupled to a CSA, and a second input queue (e.g., having a single or multiple bit width) is provided (e.g., activated by connecting to the network) to receive the payload data (e.g., to be stored) for the address (e.g., the virtual address) of the (e.g., system or main) memory coupled to the CSA. Thus, in certain embodiments, buffer box element is used to store an address and data value pair instead of sending that to main memory (e.g., instead of using a RAF circuit). In the depicted embodiment, input queue (e.g., having a multiple bit width) 11724 is provided to receive a data value, input queue 11726 is to receive the memory address for the data value so that pair of values may be stored in the buffer storage of the buffer box element 11700, and input queue 11725 is to receive an address for an access request (e.g., load) for data stored in the buffer box element.

In FIGS. 117A-117G, the numbers in the circles are labels of an instance of a pair of a memory address and a data value (and not the values themselves).

Figure 117A:
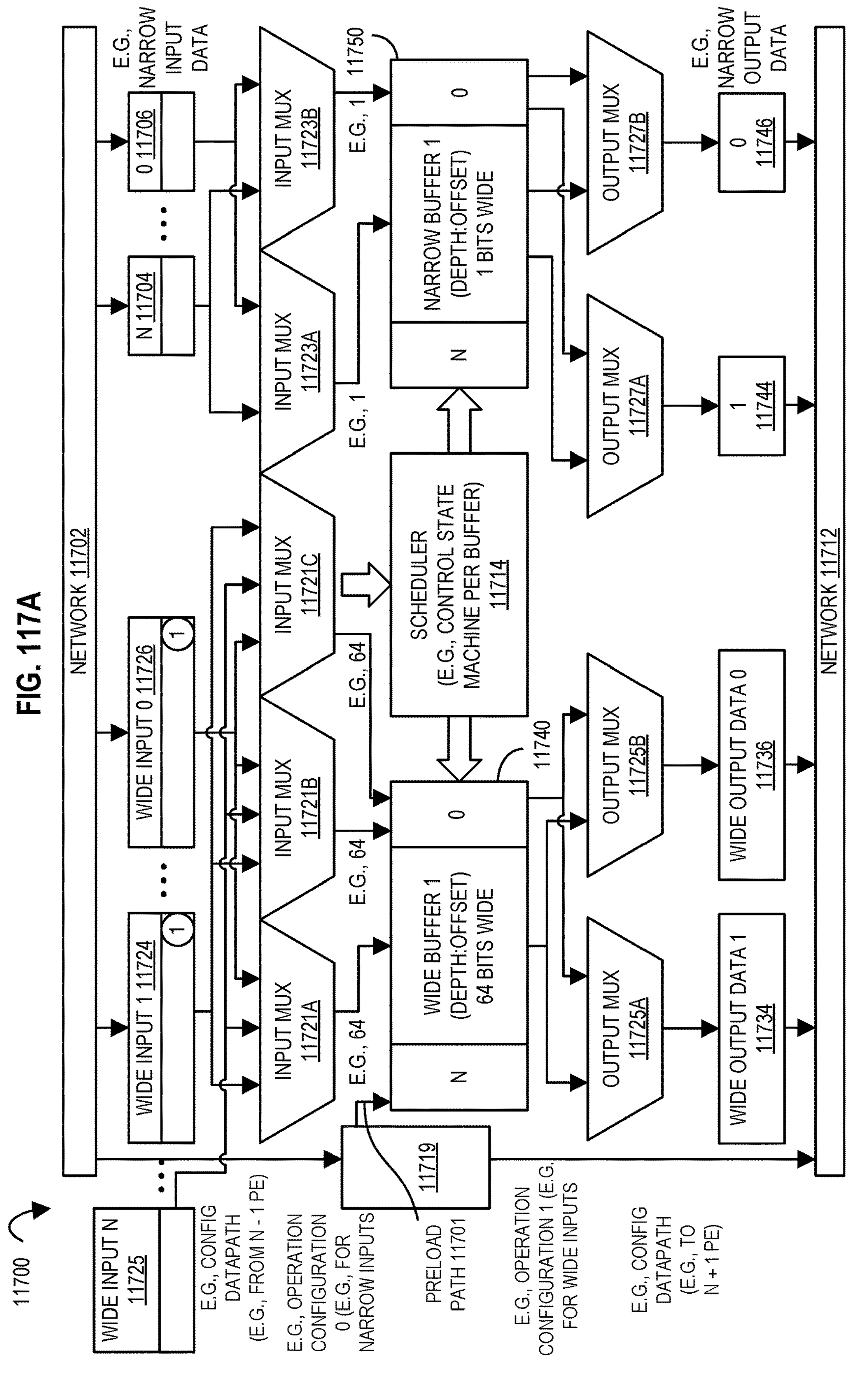
FIGS. 117A-117G illustrate a buffer box element performing a storage operation while in RAM mode according to embodiments of the disclosure.

In FIG. 117A, an address value labeled circled 1 is stored into the first slot of input queue 11726, and the corresponding data value (for the address value) labeled circled 1 is stored into the first slot of input queue 11724, e.g., by an upstream component that is requesting that store.

Figure 117B:
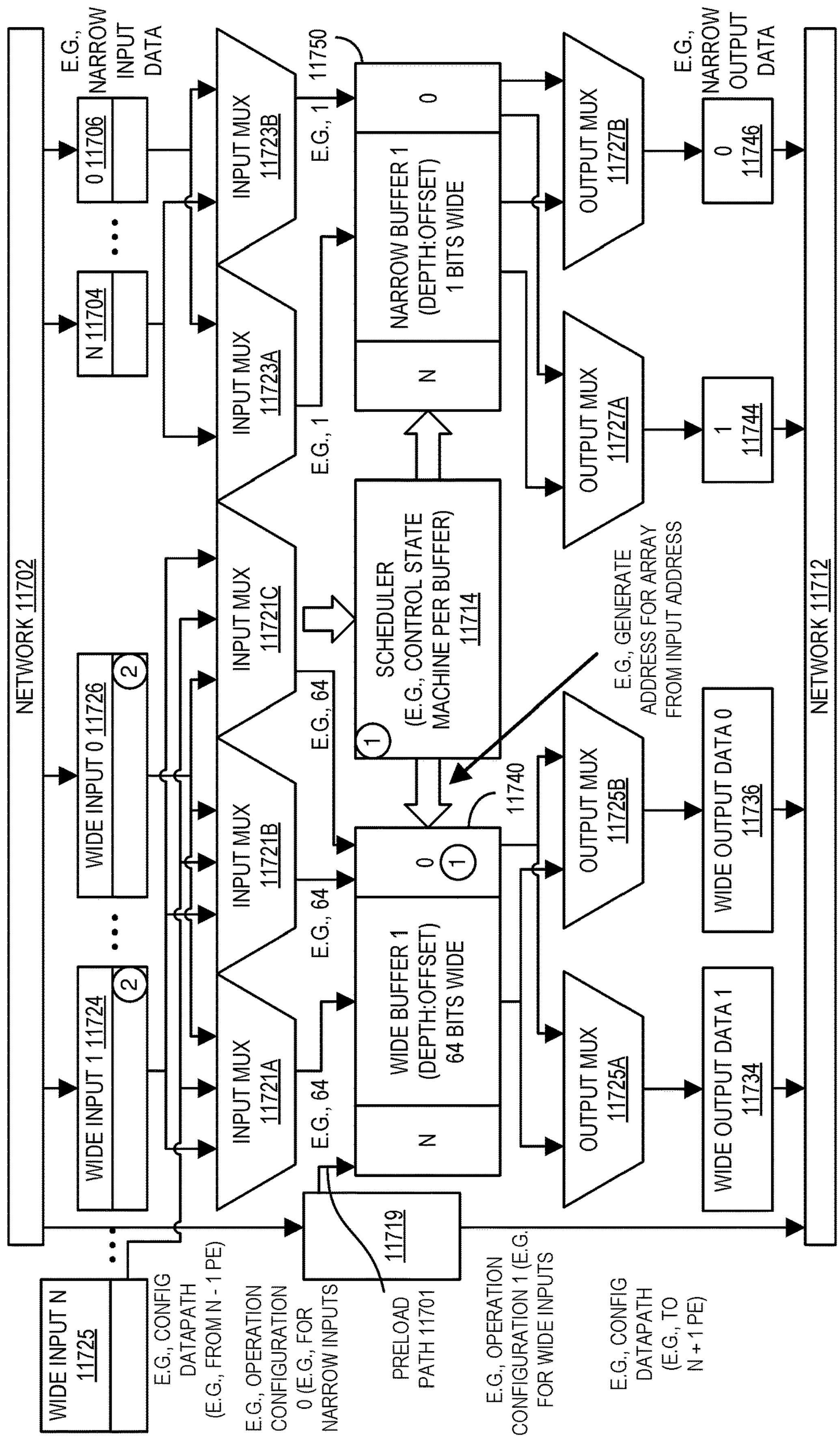

In FIG. 117B, scheduler 11714 generates an index into the buffer storage 11740 based on the address value labeled circled 1 (e.g., because that address value has not yet been input into the scheduler) and stores the data value labeled circled 1 at the location specified by the index, e.g., and keeps a table indicating the address to index mapping. In another embodiment, the scheduler stores both the memory address and the data value pair into buffer storage 11740 without generating an index.

Also, scheduler 11714 dequeues the address value labeled circled 1 from the input queue 11726, and the corresponding data value (for the address value) from the input queue 11724. An address value labeled circled 2 is stored into the first slot of input queue 11726, and the corresponding data value (for the address value) labeled circled 2 is stored into the first slot of input queue 11724, e.g., by an upstream component that is requesting that store.

Figure 117C:
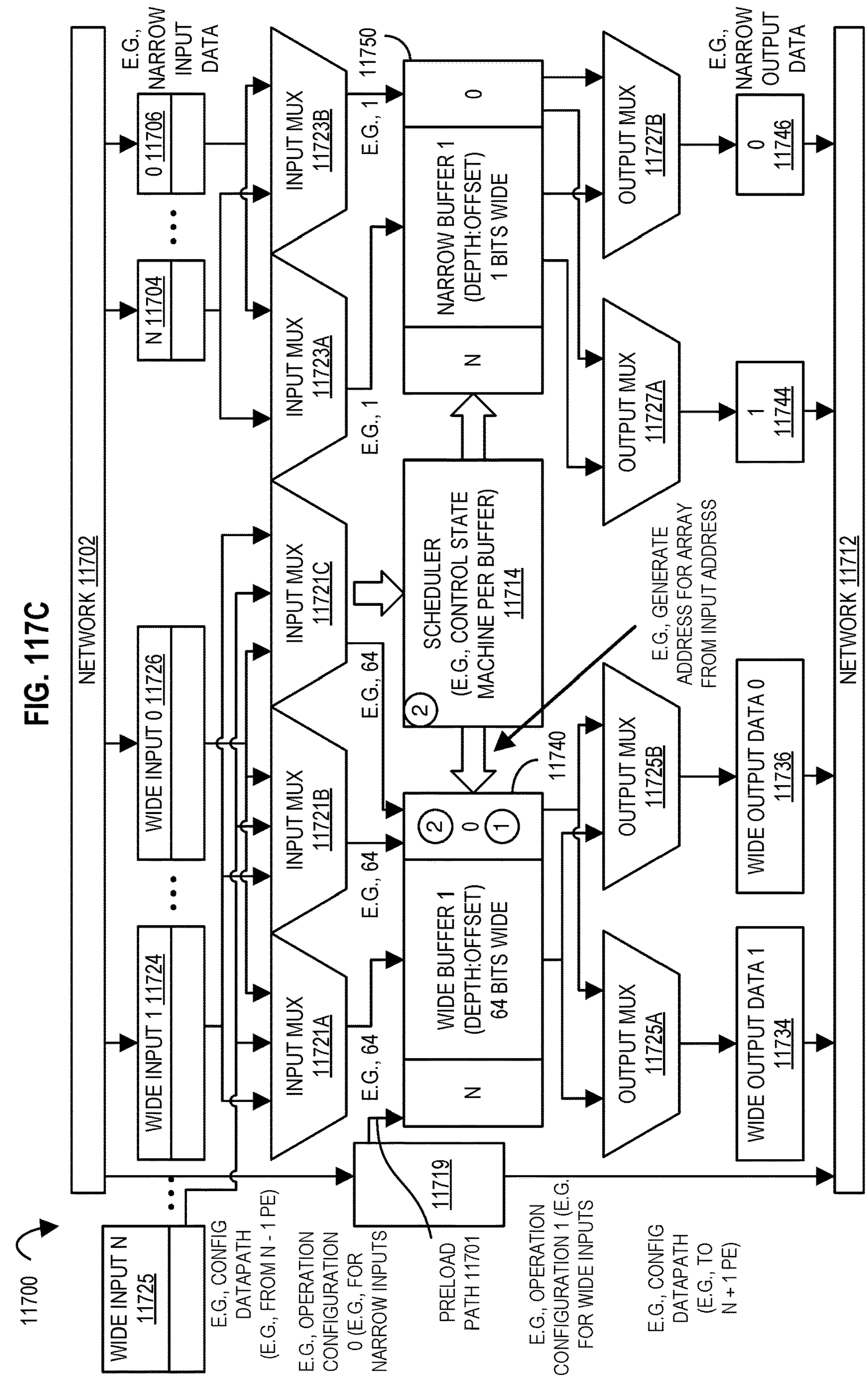

In FIG. 117C, scheduler 11714 generates an index into the buffer storage 11740 based on the address value labeled circled 2 (e.g., because that address value has not yet been input into the scheduler) and stores the data value labeled circled 2 at the location specified by the index, e.g., and keeps a table indicating the address to index mapping. In another embodiment, the scheduler stores both the memory address and the data value pair into buffer storage 11740 without generating an index.

Also, scheduler 11714 dequeues the address value labeled circled 2 from the input queue 11726, and the corresponding data value (for the address value) labeled circled 2 from the input queue 11724.

Figure 117D:
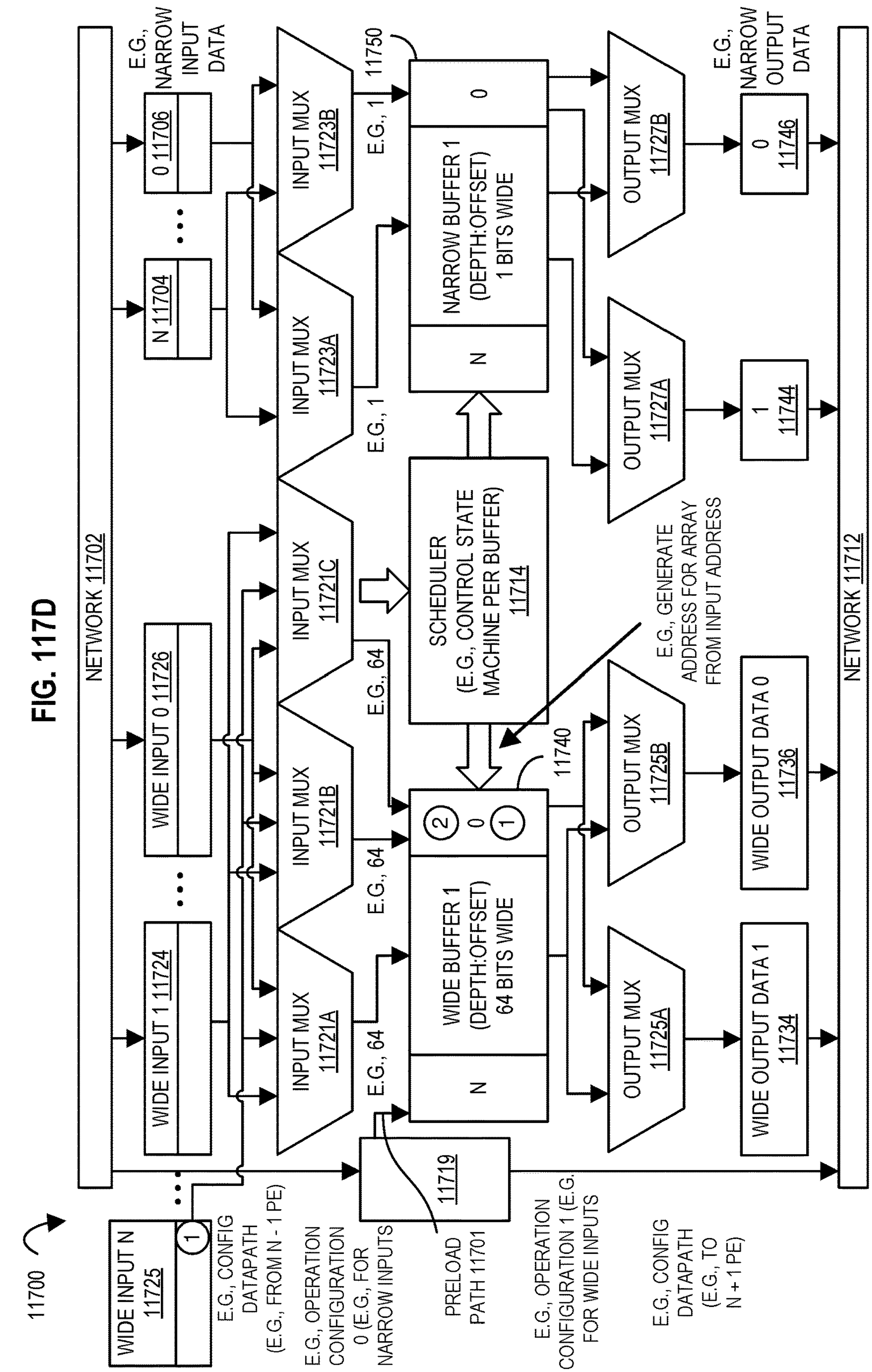

In FIG. 117D, an address value labeled circled 1 is stored into the first slot of input queue 11725, e.g., indicating a load request from a requesting PE for the corresponding data value labeled circled 1 so that the data value is sent to the requesting PE from the output queue 11734 of buffer box element 11700.

Figure 117E:
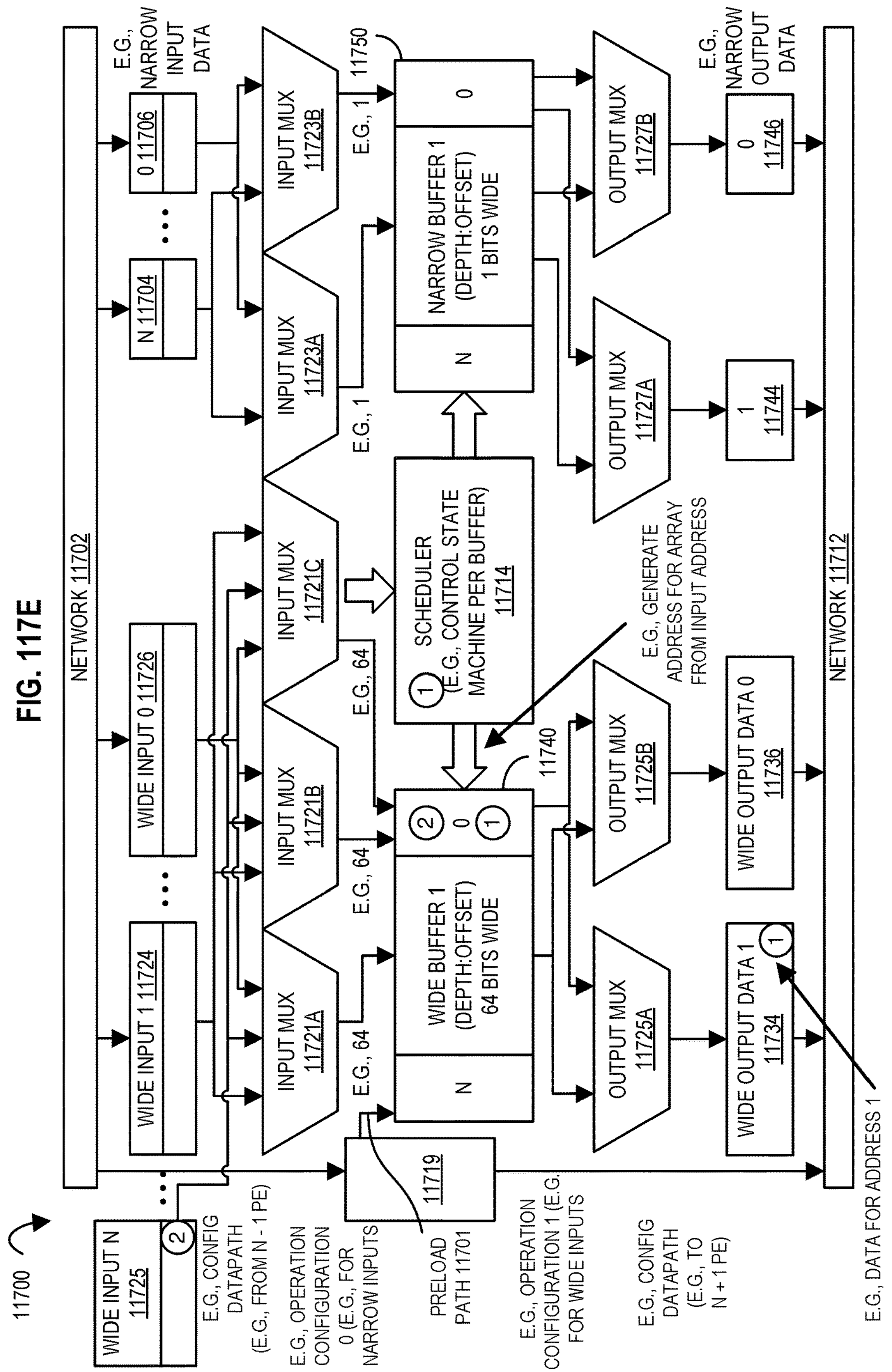

In FIG. 117E, scheduler 11714 reads the address value labeled circled 1 stored in the first slot of input queue 11725, and determines (e.g., via the table indicating the address to index mapping) that buffer storage 11740 contains a data value for that address value. Scheduler 11714 sends the data value labeled circled 1 to the output queue 11734 of buffer box element 11700. In one embodiment, the data values are not dequeued from the buffer storage 11740. In another embodiment, the sending of the data value to the output queue causes the data value to be dequeued from the buffer storage 11740. Scheduler 11714 dequeues the address value labeled circled 1 from the input queue 11725. In FIG. 117E, an address value labeled circled 2 is stored into the first slot of input queue 11725, e.g., indicating a load request from a requesting PE for the corresponding data value labeled circled 2 so that the data value is sent to the requesting PE from the output queue 11734 of buffer box element 11700.

Figure 117F:
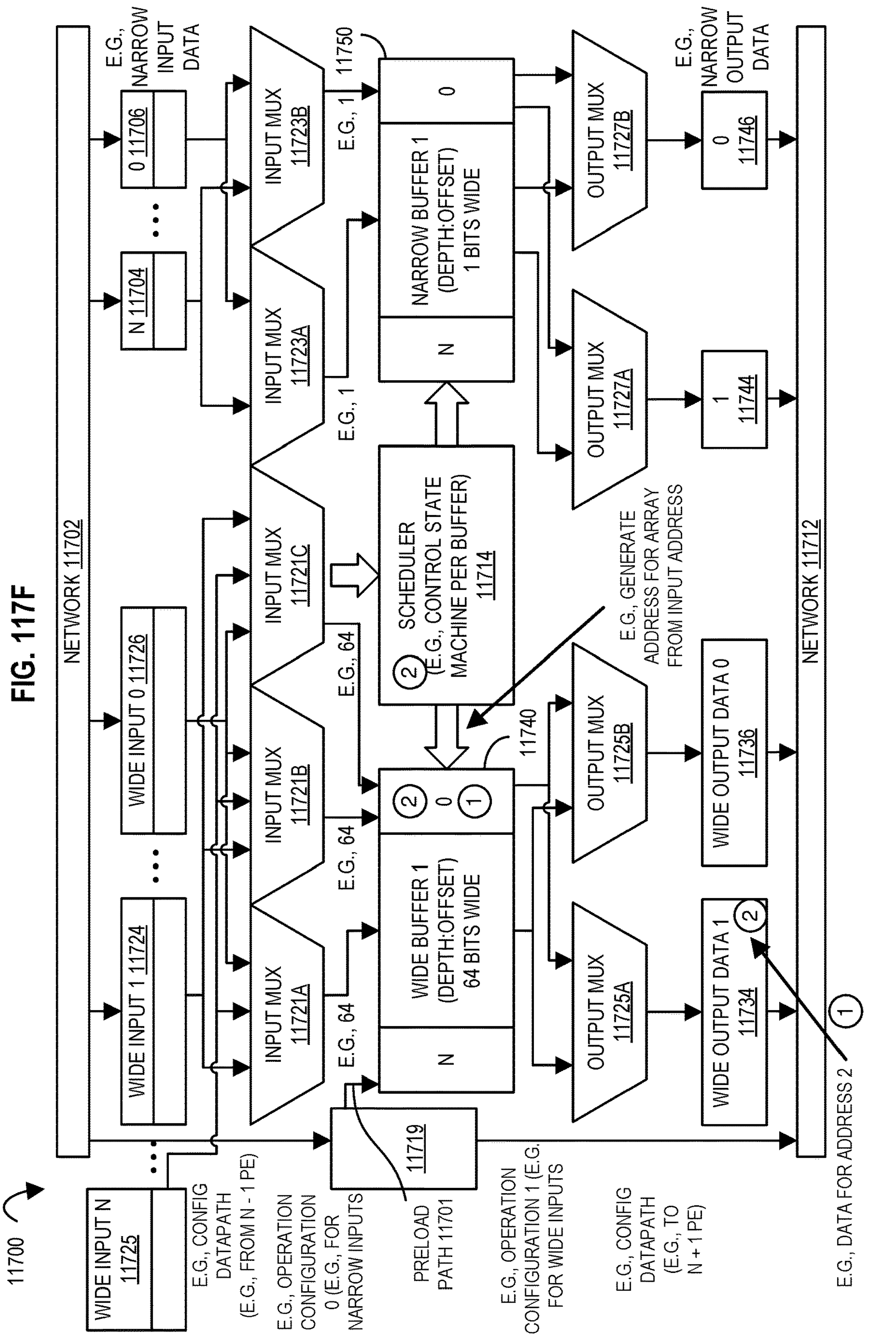

In FIG. 117F, the data value labeled circled 1 has been consumed (e.g., moved into the input queue of a downstream PE) from output queue 11734, and because there is output space available, scheduler 11714 reads the address value labeled circled 2 stored in the first slot of input queue 11725, and determines (e.g., via the table indicating the address to index mapping) that buffer storage 11740 contains a data value for that address value. Scheduler 11714 sends the data value labeled circled 2 to the output queue 11734 of buffer box element 11700. In one embodiment, the data values are not dequeued from the buffer storage 11740. In another embodiment, the sending of the data value to the output queue causes the data value to be dequeued from the buffer storage 11740. Scheduler 11714 dequeues the address value labeled circled 2 from the input queue 11725.

Figure 117G:
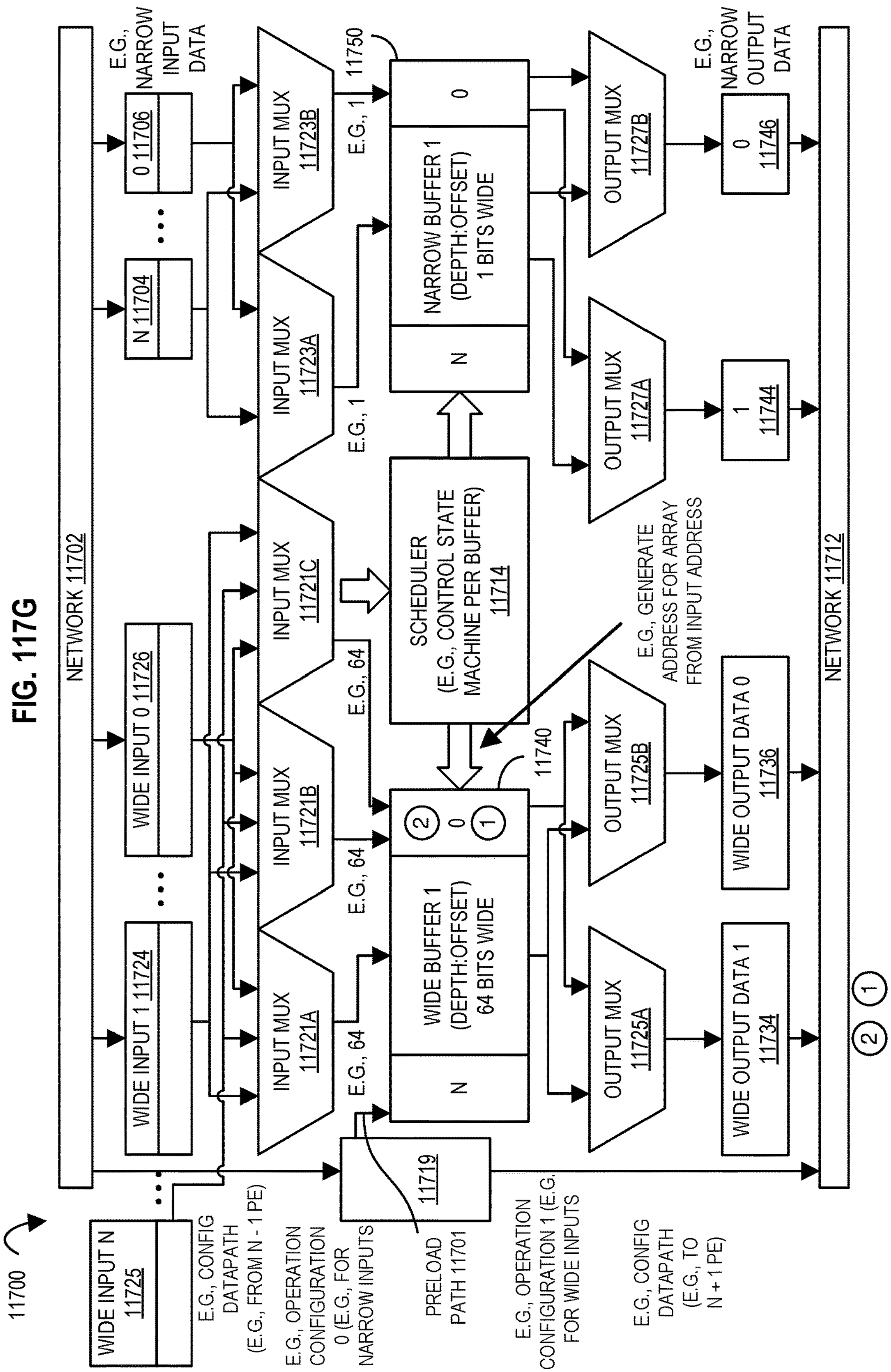

In FIG. 117G, the data value labeled circled 2 has been consumed (e.g., moved into the input queue of a downstream PE) from output queue 11734.

In certain embodiments, buffer box element 11700 is stalled from sending data stored in its buffer storage until there is room in the target storage location (e.g., the output queue that is coupled to an input queue of a receiving PE or PEs).

In the depicted embodiment, buffer box element 11700 includes the components of buffer box element 10800 from FIG. 108, for example, with the components ending with the same two numbers having the same functionality. In one embodiment, scheduler 11714 schedules an operation or operations of buffer box element 11700 for performance according to the configuration value, e.g., and when input data and control input arrives.

In certain embodiments, a CSA includes in network storage (e.g., as scratchpads). The in-network storage (e.g., a buffer box element) may be treated as part of the general memory (storage) access paradigm, which uses loads and stores, and which can be ordered by using ordering operands.

Each memory access operation instance can be configured to access a single disjoint address space. In one embodiment, there is not a provision for a unified address space that allows access to both standard memory and scratchpads transparently to a single operation. By default, in certain embodiments, memory operations (e.g., load and store) access the standard process address space. However, it is possible to declare storage that should be allocated to scratchpad, if available, and memory operations which can access that specific storage. In that embodiment, addresses that are outside the bounds of a given address space are an error and there is no assurance that addresses in different address spaces are disjoint (e.g. scratchpad addresses may simply be an index relative to the scratchpad, which might appear to be address 0 for each independent scratchpad). In certain embodiments, accesses use the scratchpad address as the base for a displacement or indexed memory access. However, this is not a requirement, to allow other kinds of pointer accesses. Unlike general memory, references to scratchpad storage are naturally aligned in certain embodiments.

Random Access Assembly Language Handling

In one embodiment to specify storage should be allocated to a scratchpad, it should be placed in a section that starts with the string ".csa.sp.", for example, where each individual scratchpad section specifies a separable allocation—a separate "address space".

Note: In C/C++, variables can be allocated to sections using attributes, e.g.:

```
int bar[32]; // standard global storage
// Allocate specifically to a scratchpad
int foo[32] __attribute__((section(".csa.sp.foo")));
int fooread(int i) {
    return foo[i]; // scratchpad access
}
```

Small scratchpads (e.g., less than or equal to 64×64 bit elements in size) may only allow a single static load and single static store operation. This may make them very difficult to use from high level code.

In assembly code, the .addrspace [{section}] directive can be used to specify the address space that applies to all following references which do not have an explicit base. If no section is specified, the address space that applies reverts to the standard address space. e.g.

```
        .section .csa.sp.foo    //  storage that could go into a scratchpad
sym:    .zero 128               //  Symbol sym is the origin of the section, 128
                                //  bytes
        ...
        .addrspace .csa.sp.foo  //  specify address space for following memrefs
        ld32x chan1, sym, i     //  load ith element of sym into chan1
        .addrspace              //  specify future memory refs are to the default
                                //  addrspace
        ld32x x, bar, z         //  in the normal address space
```

In certain embodiments, code does not make assumptions about whether a given section will actually be allocated to scratchpad, e.g., the runtime and toolchain (e.g., place and route, etc.) is to decide whether the address space (.addrspace) is to be implemented in a hardware buffer box element, e.g., or instead implemented in shared virtual memory. In particular, it is possible that for the above program, .csa.sp.foo will reside in memory, with a standard memory address. On the other hand, it may be allocated to scratchpad, in which case the effective address of sym might be 0, some small integer value, or some other bitpattern entirely.

Streaming-Unload RAM Mode

In one embodiment, a CSA architecture includes a configuration value that, when stored into the configuration storage (e.g., register), causes a buffer box element thereof to operate in a Streaming-unload RAM mode according to the following (e.g., semantics and/or description).

FIGS. 118A-118G illustrate a buffer box element 11800 performing a streaming unload operation while in Streaming-unload RAM mode according to embodiments of the disclosure, e.g., also according to the "RAM" mode discussed above. In the depicted embodiment, an operation configuration value includes a mode field (set to cause a Streaming-unload of a buffer box element in RAM mode) stored (e.g., during a programming time period) into operation configuration register 11819.

In FIGS. 118A-118G, the numbers in the circles in (e.g., control) input queue 11806 are the values (e.g., one or zero), and the other numbers in the circles are labels of an instance of data (and not the value of the data itself). In the depicted embodiment, the Streaming-unload RAM mode functions as the RAM mode above except that here for streaming-unload, when a first value (e.g., one) is received on an (e.g., control) input queue, the buffer box element unloads (e.g., dequeuing) the values stored in the buffer storage(s) to the output queue(s).

Figure 118A:
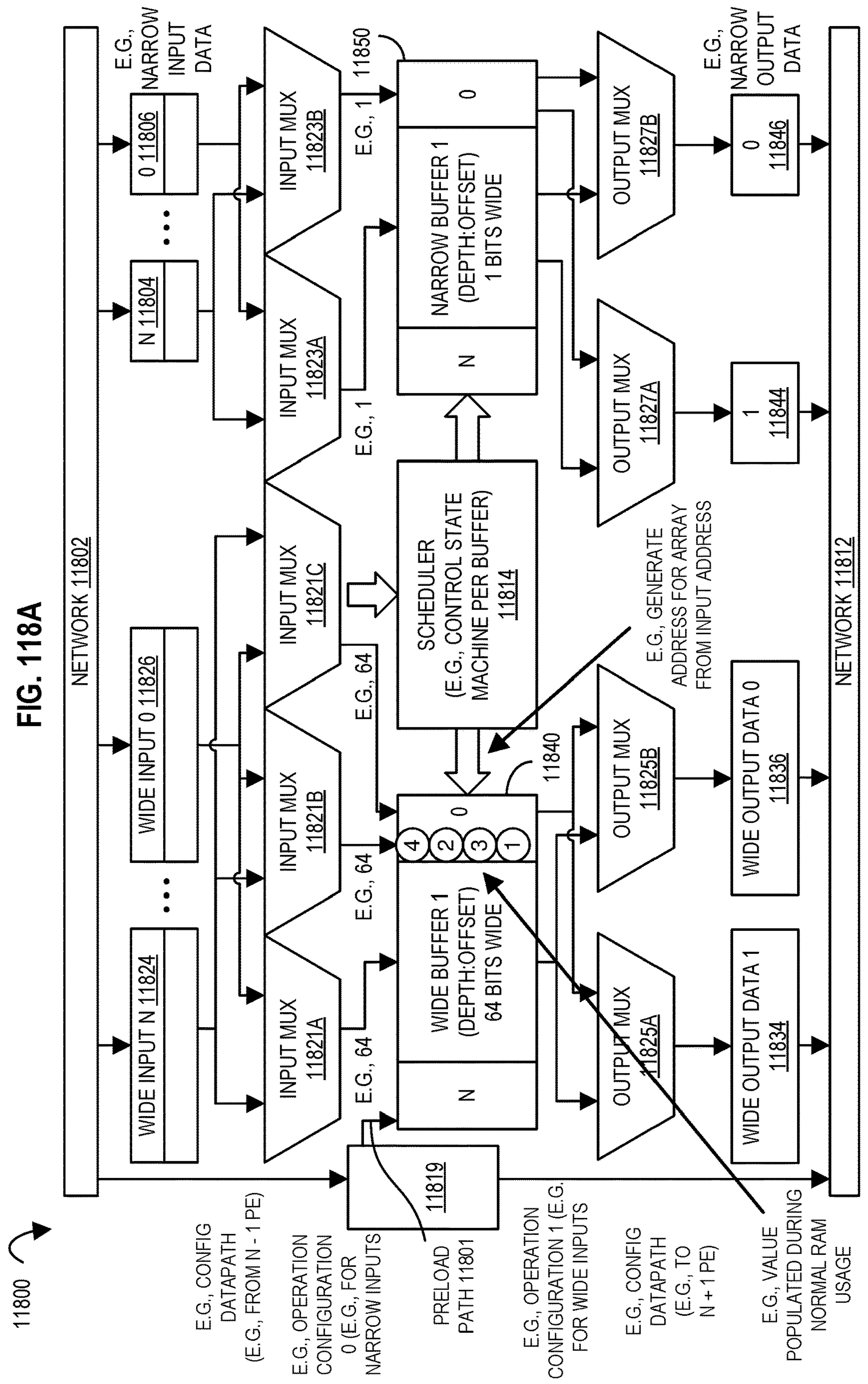

In FIG. 118A, a (e.g., data) value labeled circled 1 is stored into the (e.g., first storage location of) buffer storage 11840, a (e.g., data) value labeled circled 3 is stored into the (e.g., second storage location of) buffer storage 11840, a (e.g., data) value labeled circled 2 is stored into the (e.g., third storage location of) buffer storage 11840, and a (e.g., data) value labeled circled 4 is stored into the (e.g., fourth storage location of) buffer storage 11840, e.g., with those four values populated during a RAM usage without switching to the streaming unload function, for example, according to the RAM operations discussed above in reference to FIGS. 117A-117G.

Figure 118B:
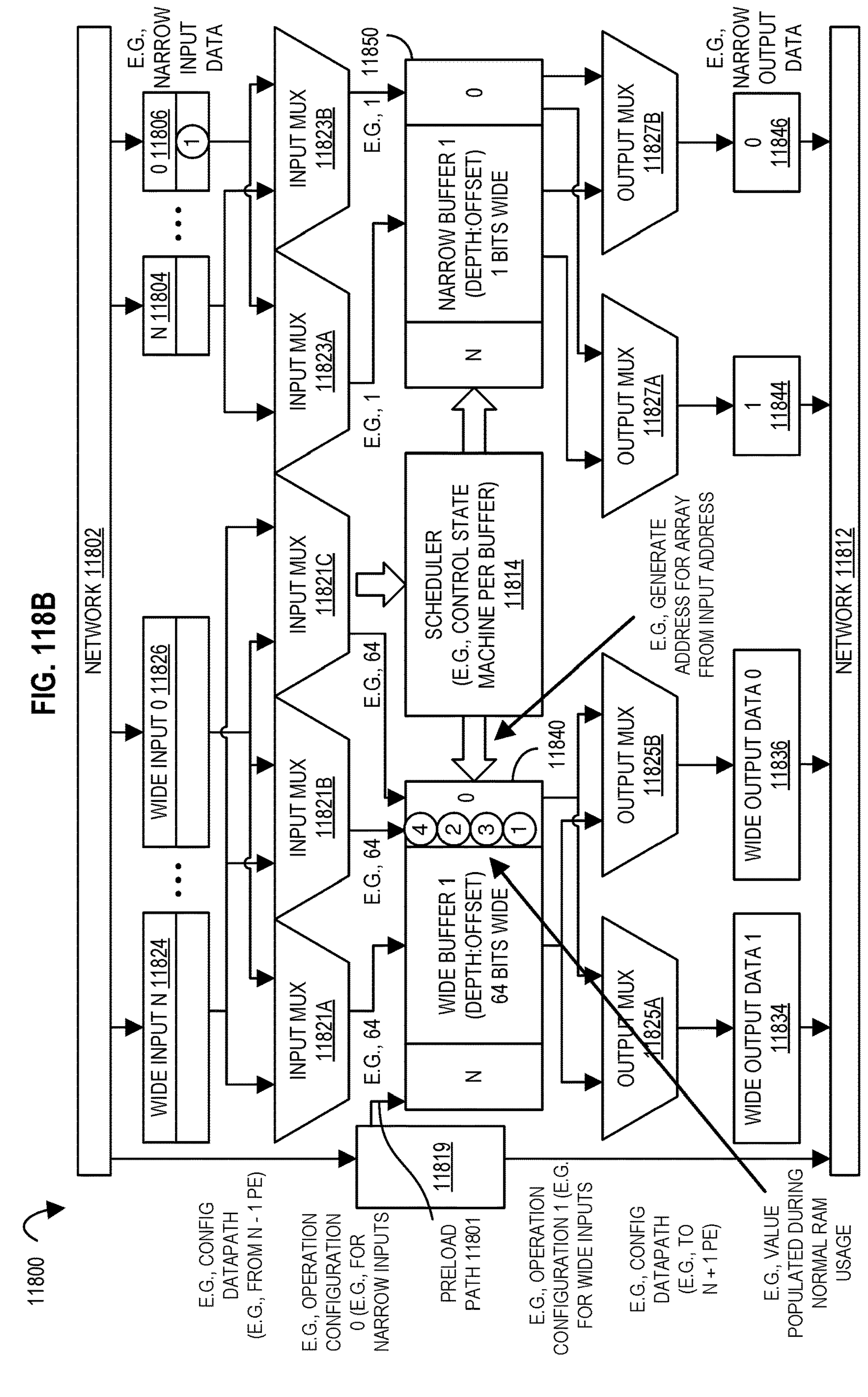

In FIG. 118B, a (e.g., control) value of one is stored in input queue 11806, e.g., by an upstream PE, that indicates a streaming unload (e.g., of all the values stored in a particular (or all) buffer storage) is to begin.

Figure 118C:
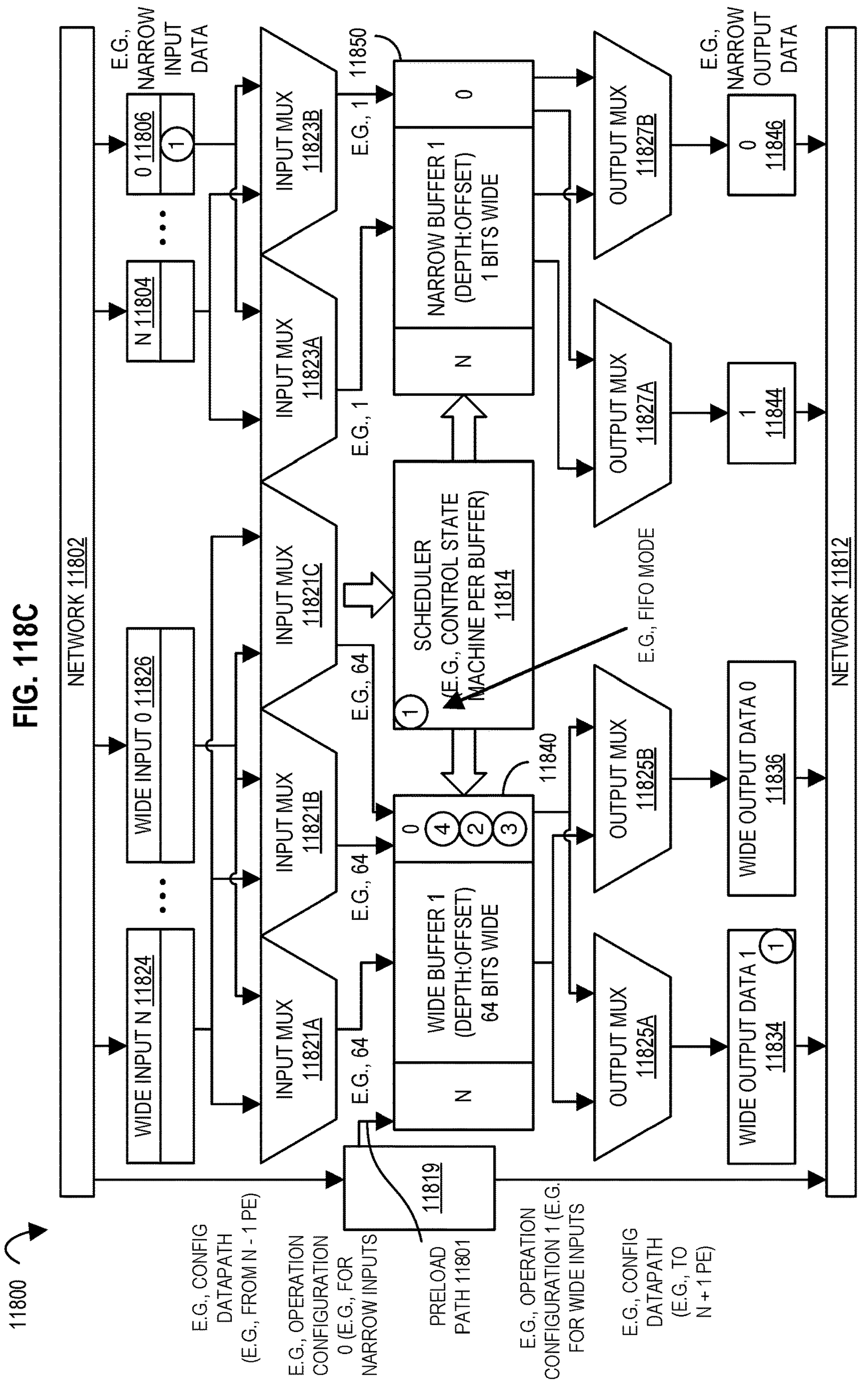

In FIG. 118C, because the control value in input queue 11806 is a one (e.g., and not a zero) and there is available storage space in the output queue 11834, buffer box element 11800 (e.g., scheduler 11814) has stored the (e.g., data) value labeled circled 1 from the (e.g., first storage location of) buffer storage 11840 into the (e.g., first slot of) output queue 11834, and dequeued the (e.g., data) value labeled circled 1 from the (e.g., first storage location of) buffer storage 11840.

In FIG. 118D, the value labeled circled 1 has been consumed (e.g., moved into the input queue of a downstream PE) from output queue 11834, and because there is output space available in output queue 11834 and the control value in input queue 11806 was a one (and not a zero), buffer box element 11800 (e.g., scheduler 11814) has stored the (e.g., data) value labeled circled 3 from the (e.g., second storage location of) buffer storage 11840 into the (e.g., first slot of) output queue 11834, and dequeued the (e.g., data) value labeled circled 3 from the (e.g., second storage location of) buffer storage 11840.

Figure 118E:
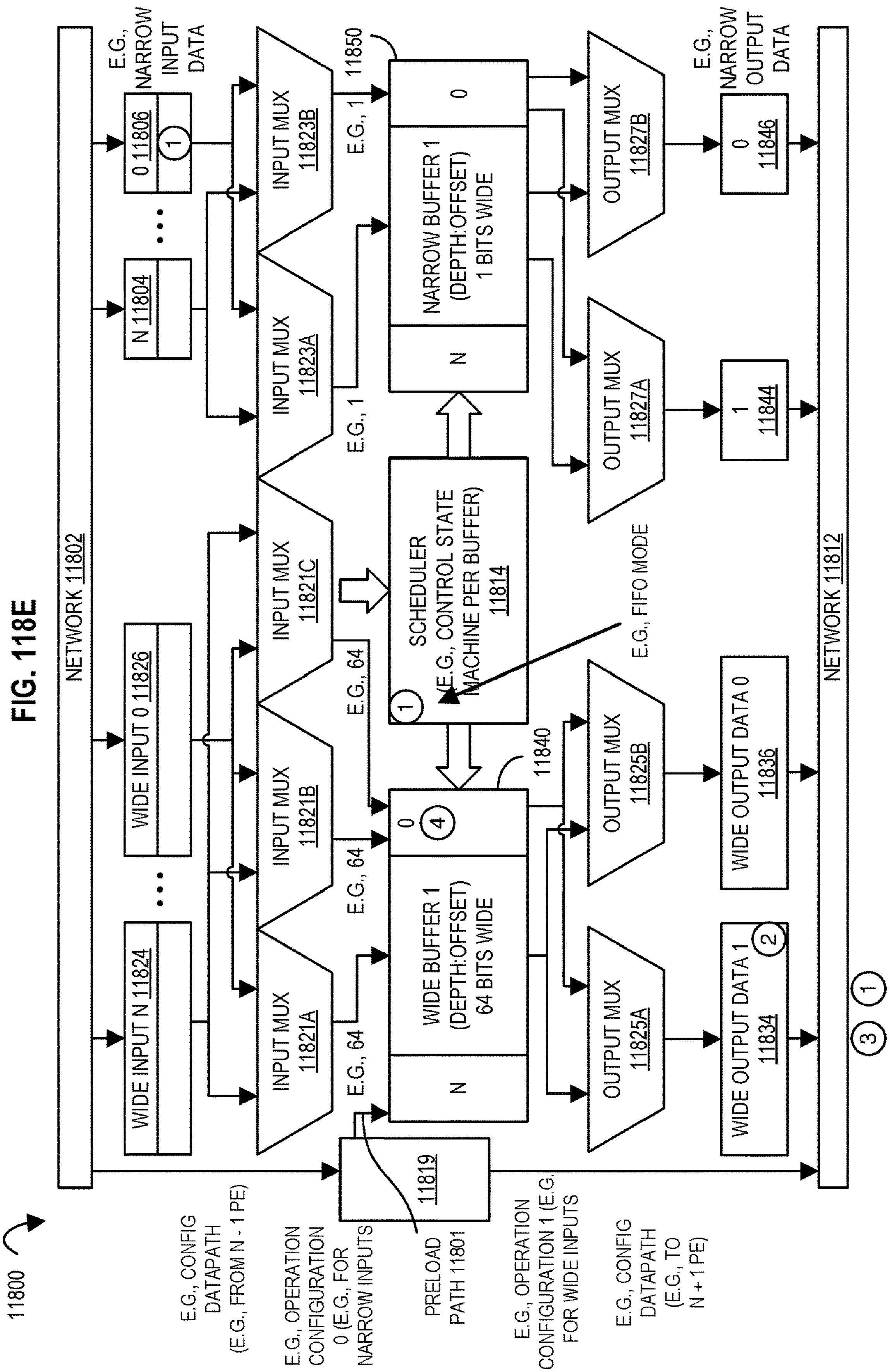

In FIG. 118E, the value labeled circled 3 has been consumed (e.g., moved into the input queue of a downstream PE) from output queue 11834, and because there is output space available in output queue 11834 and the control value in input queue 11806 was a one (and not a zero), buffer box element 11800 (e.g., scheduler 11814) has stored the (e.g., data) value labeled circled 2 from the (e.g., third storage location of) buffer storage 11840 into the (e.g., first slot of) output queue 11834, and dequeued the (e.g., data) value labeled circled 3 from the (e.g., second storage location of) buffer storage 11840.

Figure 118F:
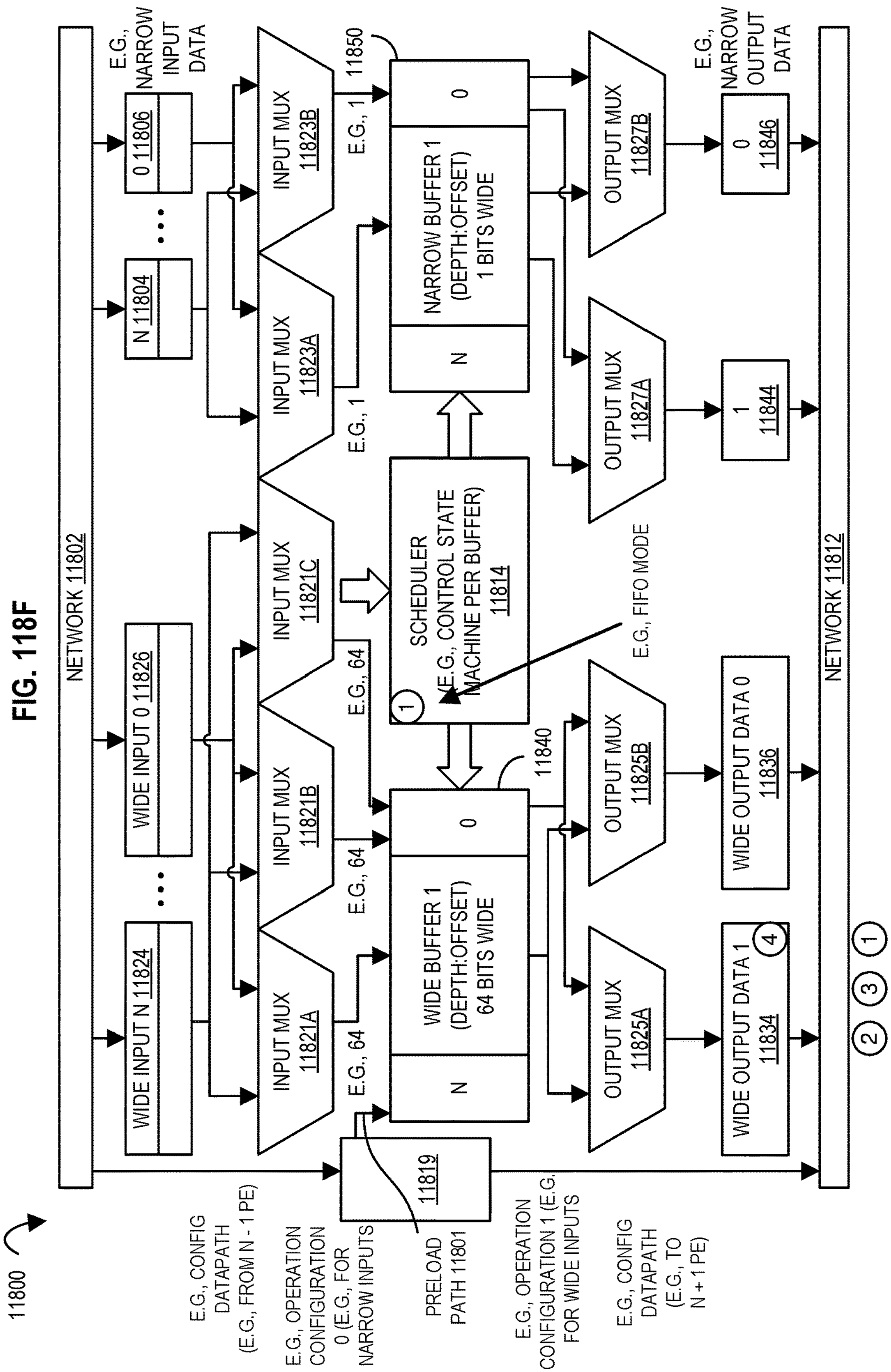

In FIG. 118F, the value labeled circled 2 has been consumed (e.g., moved into the input queue of a downstream PE) from output queue 11834, and because there is output space available in output queue 11834 and the control value in input queue 11806 was a one (and not a zero), buffer box element 11800 (e.g., scheduler 11814) has stored the (e.g., data) value labeled circled 4 from the (e.g., fourth storage location of) buffer storage 11840 into the (e.g., first slot of) output queue 11834, and dequeued the (e.g., data) value labeled circled 4 from the (e.g., second storage location of) buffer storage 11840. In the depicted embodiment, because buffer storage 11840 is now empty, the buffer box element 11800 (e.g., scheduler 11814) dequeues the (e.g., streaming-unload) control value from the input queue 11806. For example, when the control value is set (e.g., to one), the buffer box element switches functionality from a RAM to being outputs the data values stored therein in a FIFO manner.

Figure 118G:
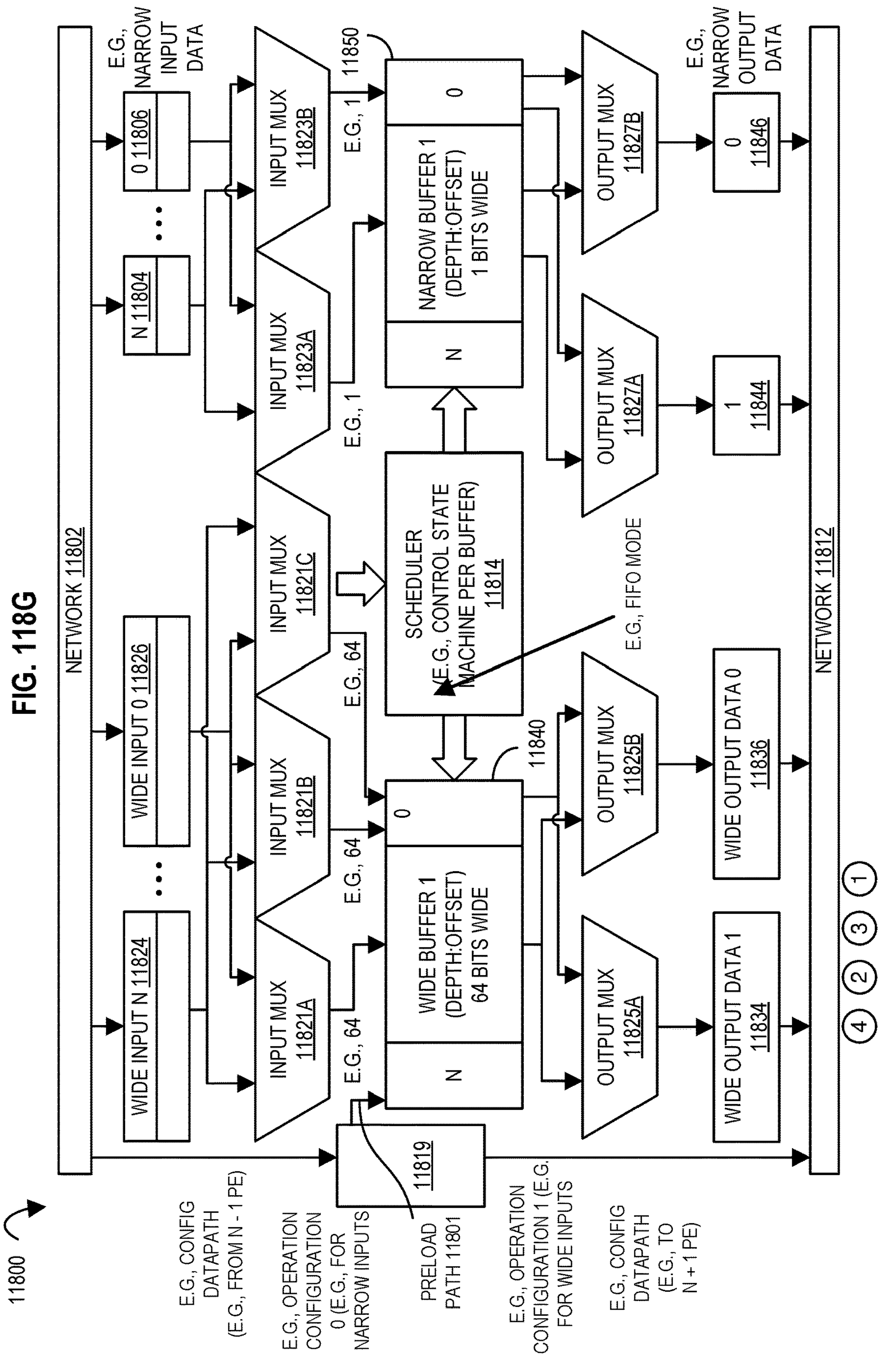

In FIG. 118G, the value labeled circled 4 has been consumed (e.g., moved into the input queue of a downstream PE) from output queue 11834.

In certain embodiments, buffer box element 11800 is stalled from sending data stored in its buffer storage until there is room in the target storage location (e.g., the output queue that is coupled to an input queue of a receiving PE or PEs) even when the control value is set to one.

In the depicted embodiment, buffer box element 11800 includes the components of buffer box element 10800 from FIG. 108, for example, with the components ending with the same two numbers having the same functionality. In one embodiment, scheduler 11814 schedules an operation or operations of buffer box element 11800 for performance according to the configuration value, e.g., and when input data and control input arrives.

ROM Mode

In one embodiment, a CSA architecture includes a configuration value that, when stored into the configuration storage (e.g., register), causes a buffer box element thereof to operate in a ROM mode according to the following (e.g., semantics and/or description).

FIGS. 119A-119E illustrate a buffer box element 11900 performing a storage operation while in ROM mode according to embodiments of the disclosure. In the depicted embodiment, an operation configuration value includes a mode field (set to ROM mode) (e.g., mode field in FIGS. 109 and 110) stored (e.g., during a programming time period) into operation configuration register 11919. In the depicted embodiment, input of address labeled circled 1 yields a data value labeled circled 1, then an input of the address labeled circled 3 yields a data value labeled circled 2 (e.g., the data label does not equal the address label here).

In FIGS. 119A-119E, the numbers in the circles are labels of an instance of a pair of a memory address and a data value (and not the values themselves).

Figure 119A:
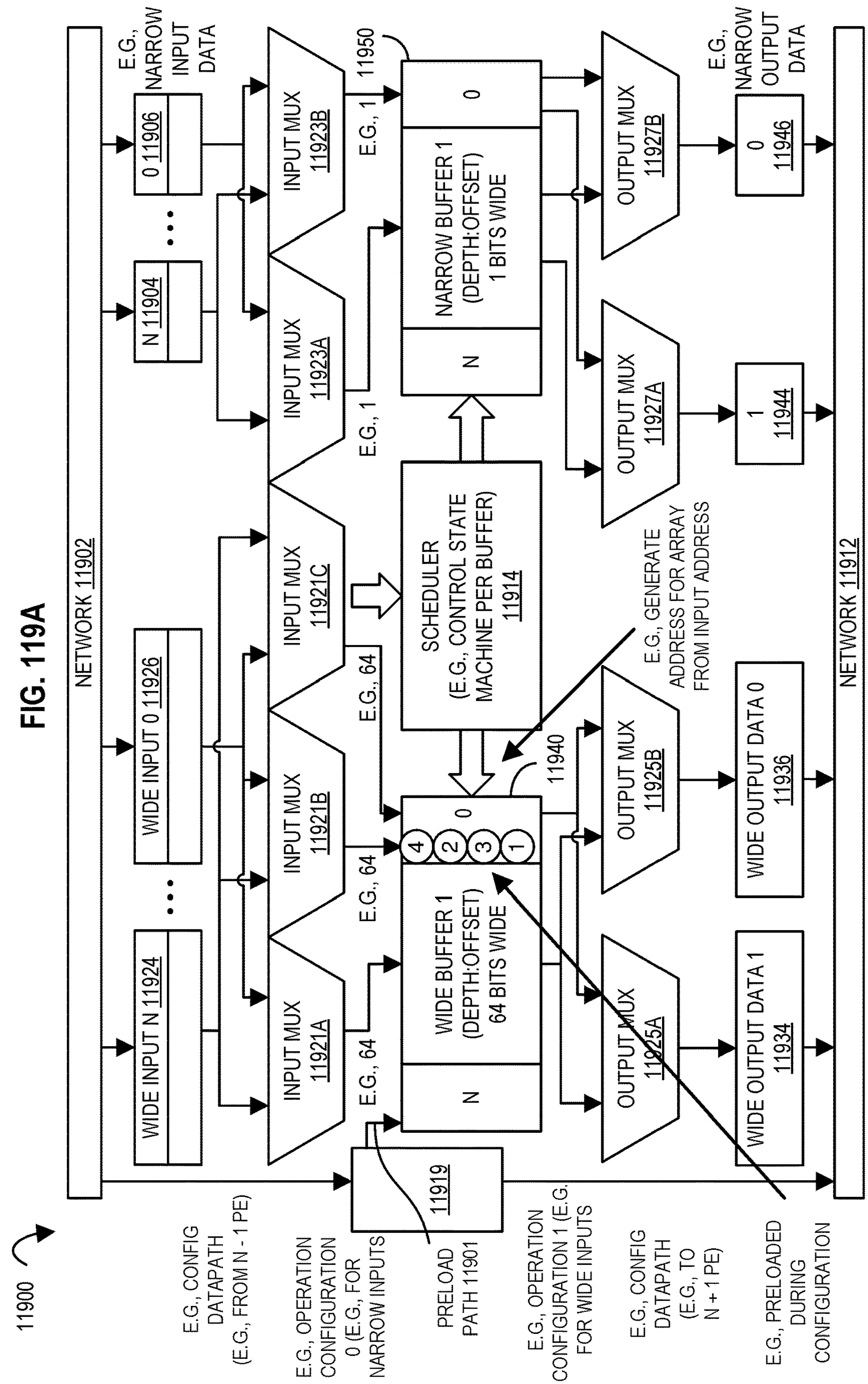
FIGS. 119A-119E illustrate a buffer box element performing a storage operation while in ROM mode according to embodiments of the disclosure.

In FIG. 119A, a (e.g., data) value labeled circled 1 is stored into the (e.g., first storage location of) buffer storage 11940, a (e.g., data) value labeled circled 2 is stored into the (e.g., second storage location of) buffer storage 11940, a (e.g., data) value labeled circled 3 is stored into the (e.g., third storage location of) buffer storage 11940, and a (e.g., data) value labeled circled 4 is stored into the (e.g., fourth storage location of) buffer storage 11940. In one embodiment those four values are preloaded into the buffer storage 11940, for example, according to the preload discussed above in reference to FIG. 114. Additionally, in certain embodiments, the index for the corresponding address for the data values is stored in a table of the buffer box element 11900 (e.g., in storage in scheduler 11914 thereof).

Figure 119B:
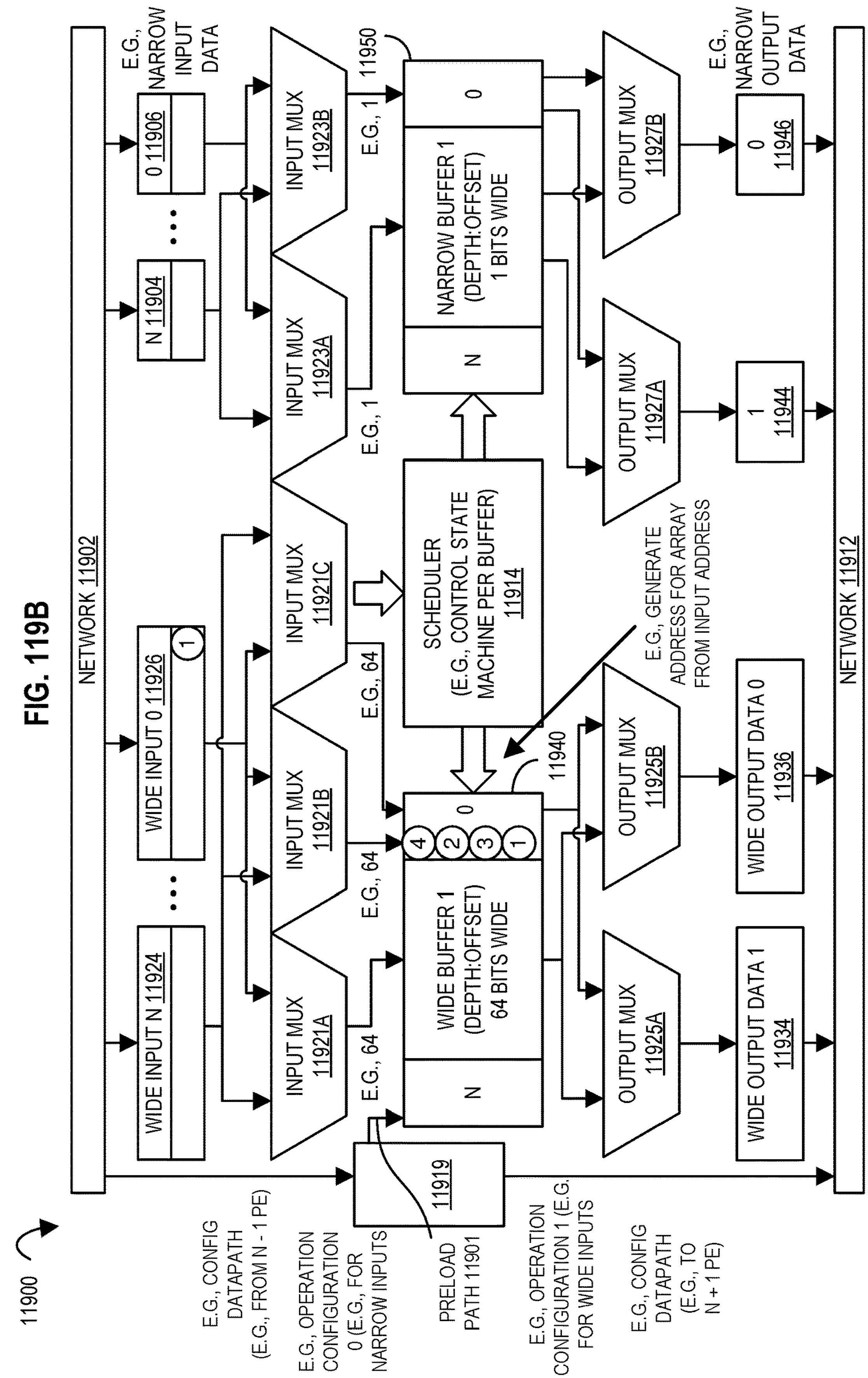

In FIG. 119B, an address value labeled circled 1 is stored into the first slot of input queue 11926, e.g., indicating a load request from a requesting PE for the corresponding data value labeled circled 1 so that the data value is sent to the requesting PE from the output queue 11934 of buffer box element 11900.

Figure 119C:
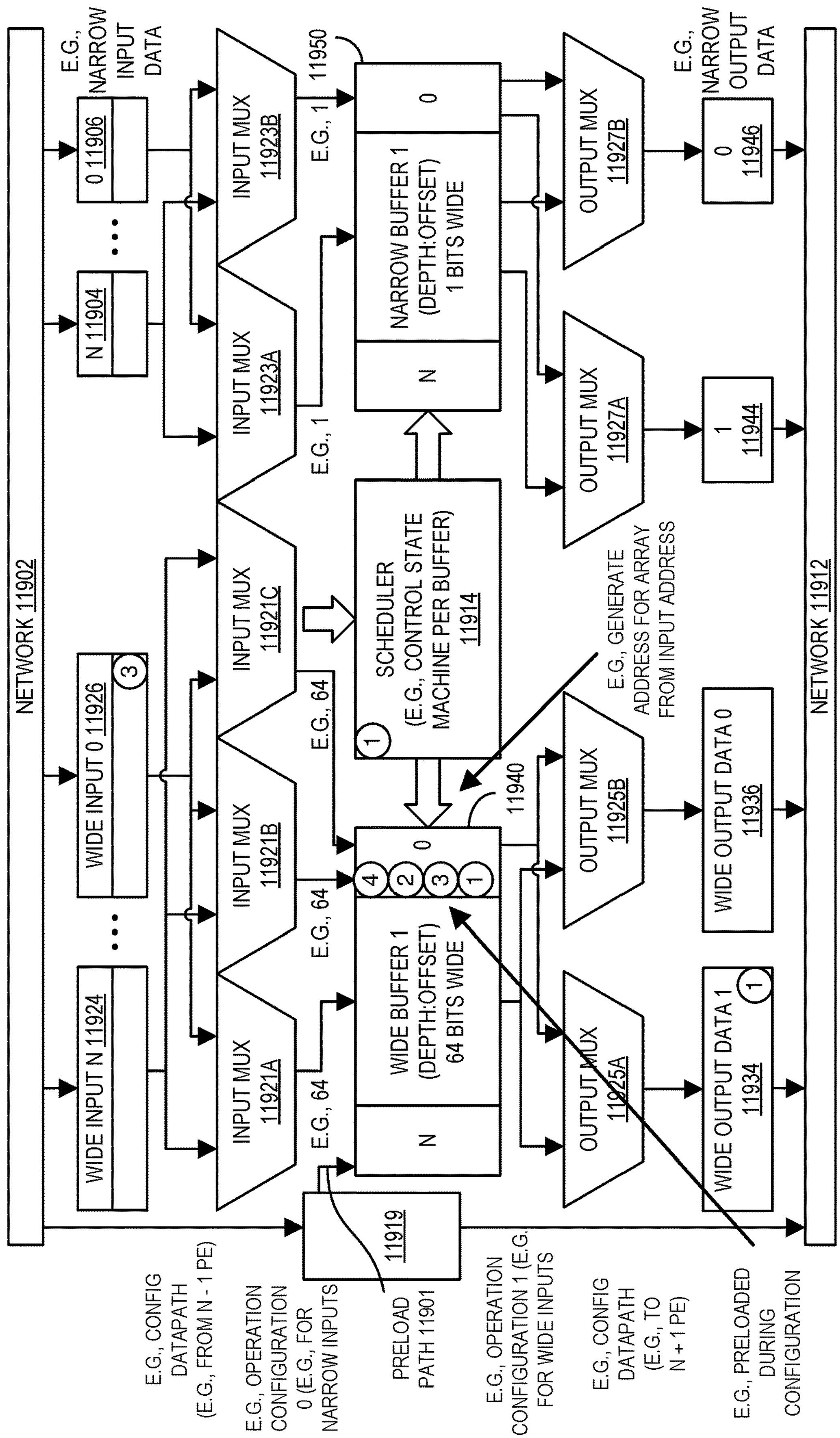

In FIG. 119C, scheduler 11914 reads the address value labeled circled 1 stored in the first slot of input queue 11926, and determines (e.g., via the table indicating the address to index mapping) that buffer storage 11940 contains a data value for that address value. Scheduler 11914 sends the data value labeled circled 1 to the output queue 11934 of buffer box element 11900. In the depicted embodiment, the data values are not then dequeued from the buffer storage 11940. Scheduler 11914 dequeues the address value labeled circled 1 from the input queue 11926. In FIG. 119C, an address value labeled circled 3 is stored into the first slot of input queue 11926, e.g., indicating a load request from a requesting PE for the corresponding data value labeled circled 3 so that the data value is sent to the requesting PE from the output queue 11934 of buffer box element 11900.

Figure 119D:
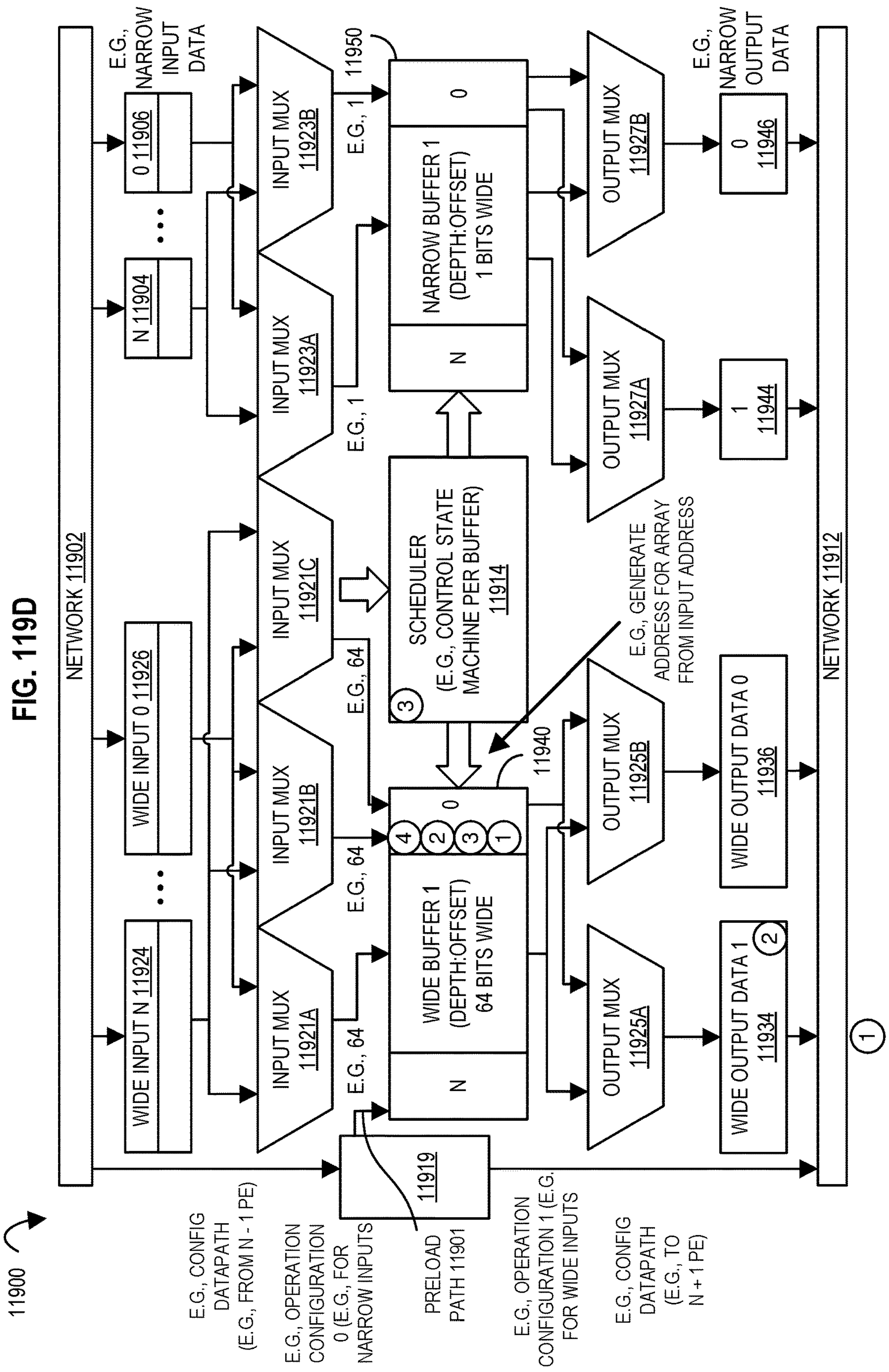

In FIG. 119D, the data value labeled circled 1 has been consumed (e.g., moved into the input queue of a downstream PE) from output queue 11934, and because there is output space available, scheduler 11914 reads the address value labeled circled 3 stored in the first slot of input queue 11926, and determines (e.g., via the table indicating the address to index mapping) that buffer storage 11940 contains a data value for that address value. Scheduler 11914 sends the data value labeled circled 3 to the output queue 11934 of buffer box element 11900. In the depicted embodiment, the data values are not then dequeued from the buffer storage 11940. In another embodiment, the sending of the data value to the output queue causes the data value to be dequeued from the buffer storage 11940. Scheduler 11914 dequeues the address value labeled circled 3 from the input queue 11926.

Figure 119E:
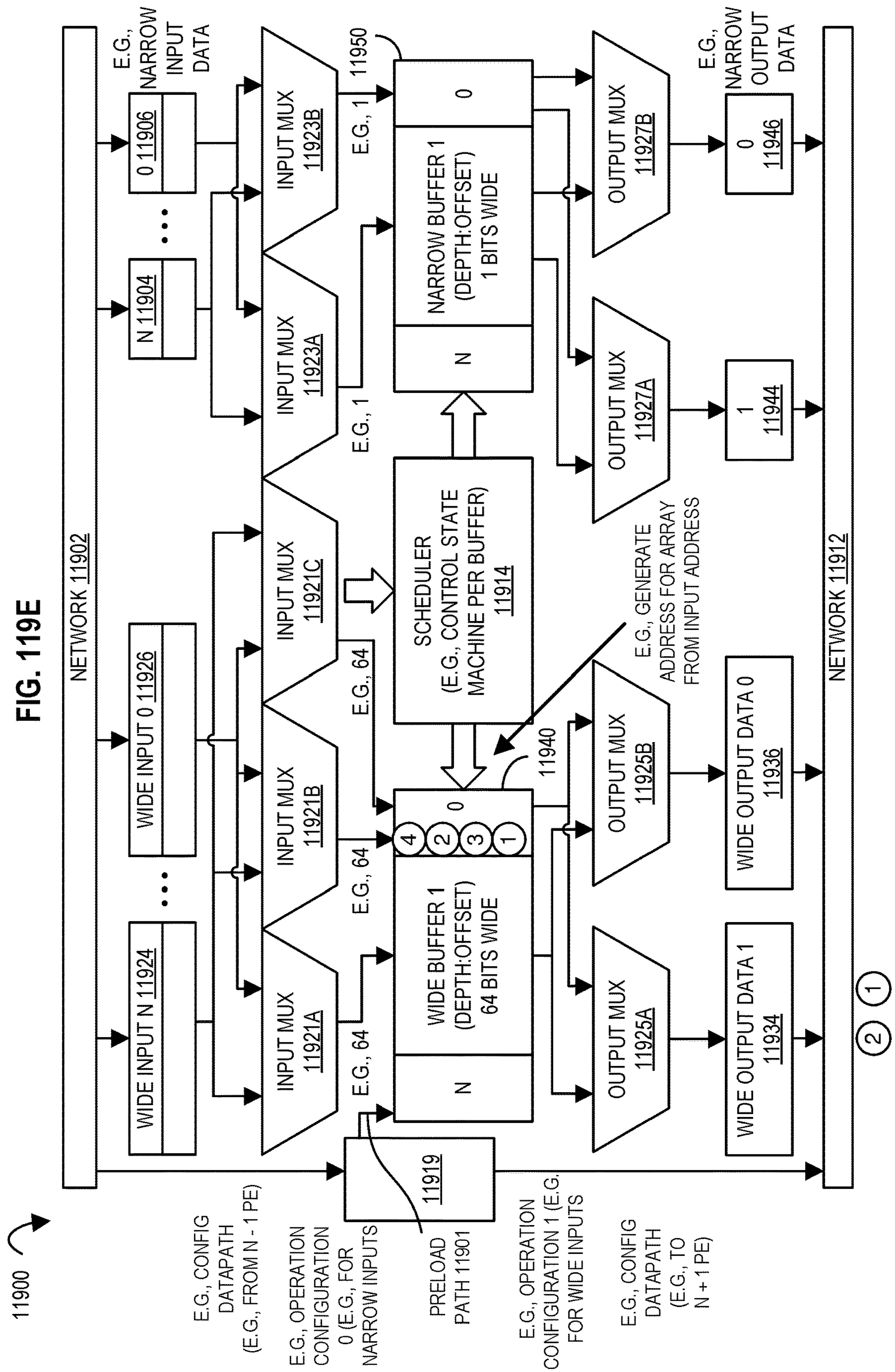

In FIG. 119E, the data value labeled circled 3 has been consumed (e.g., moved into the input queue of a downstream PE) from output queue 11934.

In certain embodiments, buffer box element 11900 is stalled from sending data stored in its buffer storage until there is room in the target storage location (e.g., the output queue that is coupled to an input queue of a receiving PE or PEs).

In the depicted embodiment, buffer box element 11900 includes the components of buffer box element 10800 from FIG. 108, for example, with the components ending with the same two numbers having the same functionality. In one embodiment, scheduler 11914 schedules an operation or operations of buffer box element 11900 for performance according to the configuration value, e.g., when input data and control input arrives.

Stack (e.g., Stack Mode)

In one embodiment, a CSA architecture includes a configuration value that, when stored into the configuration storage (e.g., register), causes a CSA (e.g., a PE thereof) to implement a stack according to the following (e.g., semantics and/or description).

Figure 120:
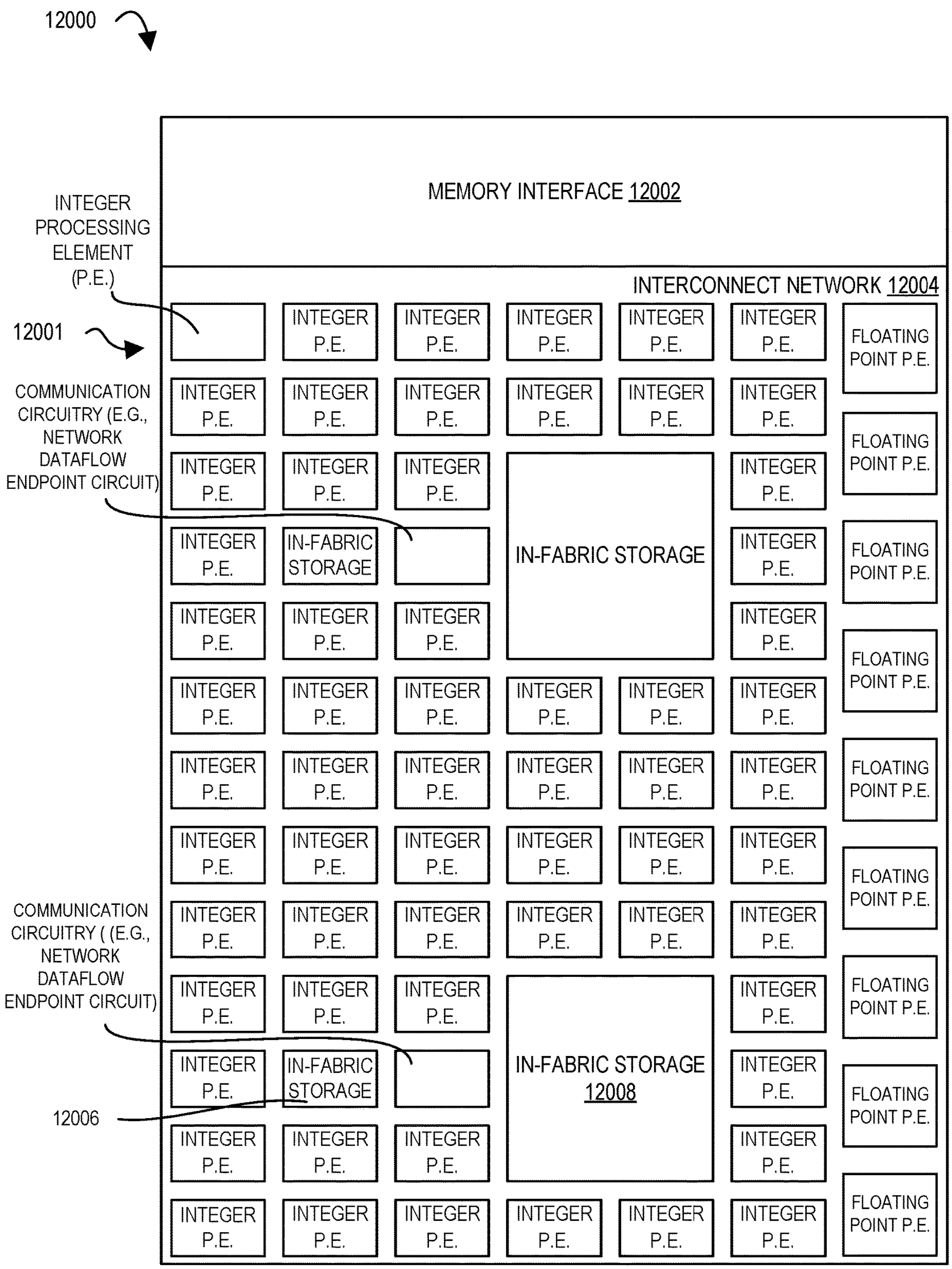

FIG. 120 illustrates an accelerator tile 12000 embodiment of a CSA. Accelerator tile 100 may be a portion of a larger tile. Accelerator tile 100 executes a dataflow graph or graphs, e.g., by using the processing elements (PEs) and other components as discussed herein. Additionally or alternatively to using memory interface 12002 to access separate memory (e.g., memory 202 in FIG. 2), in-fabric storage (e.g., a buffer box element) is used. A first type of in-fabric storage (e.g., 12008) may include more storage space than a second type of in-fabric storage (e.g., 12006). In certain embodiments, a PE uses the in-fabric storage as a stack to push and pop values from (e.g., without using memory interface 12002).

Operation: stack (0-64) valout.CRd.iN, outOrd.cRd.i0, valin.CRLu.iN, pop.CRLu.i0, addr.Lu.iN, size.Lu.iN, order.Lu.i0
Where T is any type.
Semantics:
Stack may be thought of as two operations: push and pop. Push stores data on the top of the stack, while pop removes and returns the top value of the stack. Push will block when the stack is full, and pop will block and
not accept new tokens when the stack is empty. In the case that memory arguments are supplied, push will not block, but instead spill the bottom of the stack out to memory. Similarly, pop may accept new operations if the in-memory stack is known to contain data.
Push: valin token is placed at the top of the stack. Optionally, an outOrd token is produced indicating that the update has completed.
Pop: a token is supplied to pop with the resulting top of the stack sent to valout.
Simultaneous push and pop are legal, with the order of this condition defined by the optional order input. If no order is specified, pop occurs first.

Description: stack implements a stack.
Consider stack with the following stream of arguments:

| | valin | pop | valout |
|---|---|---|---|
| Result stream: | (1) | | |
| | (2) | | |
| | (3) | | |
| | | ( ) | |
| | (4) | | (3) |
| | | ( ) | |
| | | ( ) | (4) |
| | | ( ) | (2) |
| | | | (1) |

A CSA component (e.g., a PE) supplies a value to be stored on the stack (e.g., pushed) for the "valin" in the above operation, and a (e.g., different or same) CSA component (e.g., a PE) loads a value from the stack (e.g., popped) as the "pop" in the above operation.

The stack itself may be implemented in a buffer box element.

Stack (Using Buffer Box Element) Mode

In one embodiment, a CSA architecture includes a configuration value that, when stored into the configuration storage (e.g., register), causes a buffer box element thereof to operate in a stack mode according to the following (e.g., semantics and/or description).

FIGS. 121A-121H illustrate a buffer box element 12100 performing a storage operation while in stack mode according to embodiments of the disclosure. In the depicted embodiment, an operation configuration value includes a mode field (set to stack mode) (e.g., mode field in FIGS. 109 and 110) stored (e.g., during a programming time period) into operation configuration register 12119. Optionally, the buffer storage in the buffer box element 12100 uses an external (e.g., system) memory 12101 to provide further storage space, for example, as discussed below in reference to overflow buffer mode.

In FIGS. 121A-121H, the numbers in the control input queue 12104 are values, and the other numbers in the circles are instances of values (and not the values themselves). As one example, a buffer box element may include one or more of the following: a first input queue (Valin) to receive the value to be pushed, and a second input queue (popctrl) to receive a control value to cause a value to be popped when a first value (e.g., a one) and not to be popped otherwise (e.g., when a second value (e.g., a zero)) and a first output queue (valout) to receive the value that is popped from the stack, and a second output queue (outord) to indicate that the push operation was successful. An optional ordering argument ("order" in the order operation discussed above) may be used to synchronize transactions involving the stack.

Figure 121A:
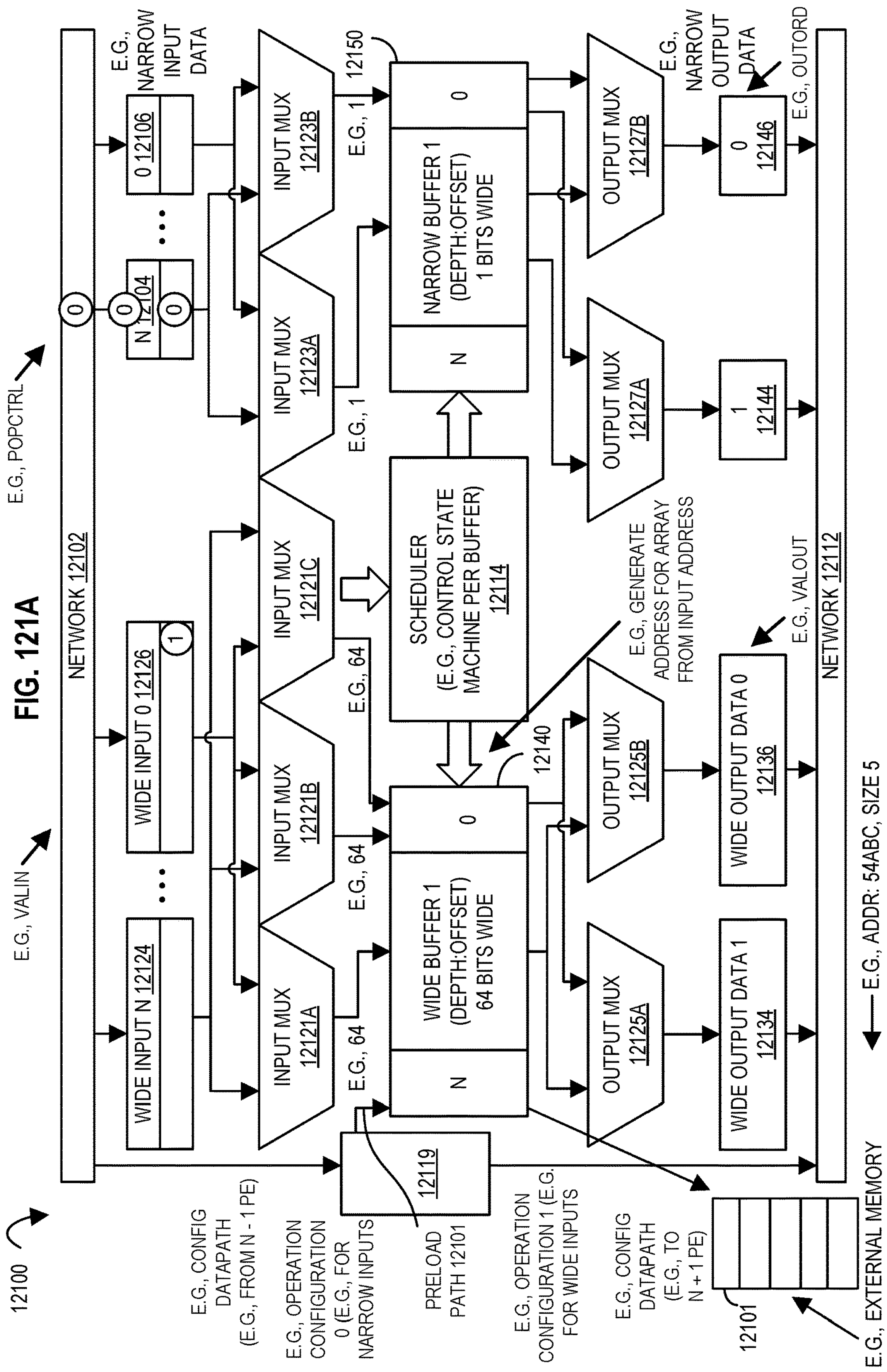

In FIG. 121A, a (e.g., data) value labeled circled 1 is stored into (e.g., a first slot of) input queue 12126, e.g., by a PE or other CSA component that is requesting that value be pushed to a stack, and a pop control value of zero is stored into (e.g., a first slot of) input queue 12104, e.g., by a PE or other CSA component that is configured to allow requests (e.g., via a LIC) for a value popped from the stack.

Figure 121B:
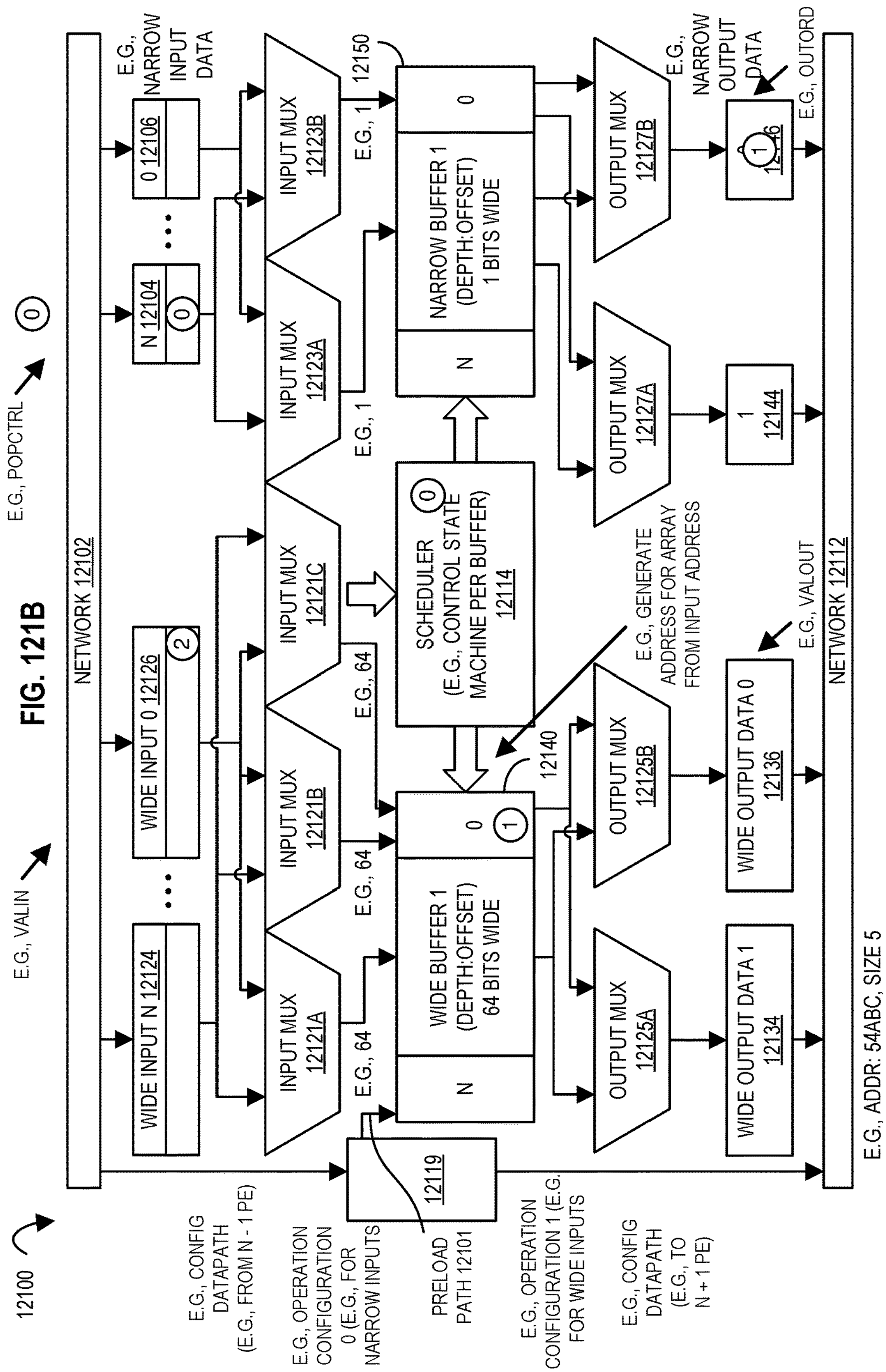

In FIG. 121B, buffer box element 12100 (e.g., scheduler 12114) pushes the (e.g., data) value labeled circled 1 into the (e.g., first storage location of) buffer storage 12140, dequeues the (e.g., data) value labeled circled 1 from the (e.g., first slot of) input queue 12126, and sends (e.g., emits) a control (e.g., acknowledgment) value (e.g., of one) to output queue 12146 to indicate that the push succeeded. Also, buffer box element 12100 (e.g., scheduler 12114) receives and dequeues a control value of zero from input queue 12104, and because the control value is zero, no value is to be popped (e.g., from buffer storage 12140). A (e.g., data) value labeled circled 2 is stored into (e.g., a first slot of) input queue 12126, e.g., by a PE or other CSA component that is requesting that value be pushed to a stack, and another pop control value of zero is stored into (e.g., a first slot of) input queue 12104, e.g., by a PE or other CSA component that is configured to allow requests (e.g., via a LIC) for a value popped from the stack.

Figure 121C:
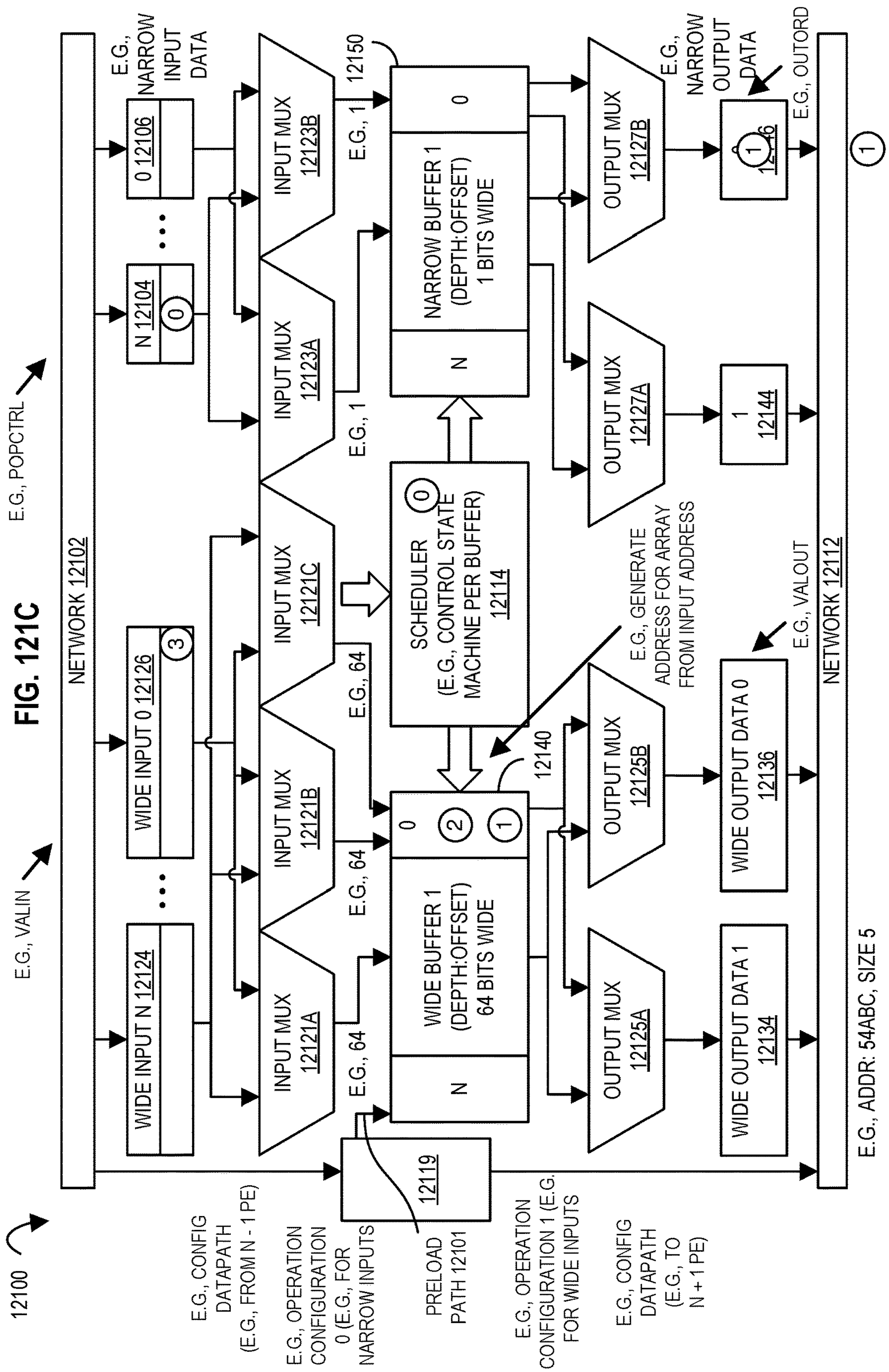

In FIG. 121C, the control (e.g., acknowledgment) value (e.g., of one) is dequeued from output queue 12146, and buffer box element 12100 (e.g., scheduler 12114) pushes the (e.g., data) value labeled circled 2 into the (e.g., second storage location of) buffer storage 12140, dequeues the (e.g., data) value labeled circled 2 from the (e.g., first slot of) input queue 12126, and sends (e.g., emits) a control (e.g., acknowledgment) value (e.g., of one) to output queue 12146 to indicate that the push succeeded. Also, buffer box element 12100 (e.g., scheduler 12114) receives and dequeues a control value of zero from input queue 12104, and because the control value is zero, no value is to be popped (e.g., from buffer storage 12140). A (e.g., data) value labeled circled 3 is stored into (e.g., a first slot of) input queue 12126, e.g., by a PE or other CSA component that is requesting that value be pushed to a stack, and another pop control value of zero is stored into (e.g., a first slot of) input queue 12106, e.g., by a PE or other CSA component that is configured to allow requests (e.g., via a LIC) for a value popped from the stack.

In FIG. 121D, the control (e.g., acknowledgment) value (e.g., of one) is dequeued from output queue 12146, and buffer box element 12100 (e.g., scheduler 12114) pushes the (e.g., data) value labeled circled 3 into the (e.g., third storage location of) buffer storage 12140, dequeues the (e.g., data) value labeled circled 3 from the (e.g., first slot of) input queue 12126, and sends (e.g., emits) a control (e.g., acknowledgment) value (e.g., of one) to output queue 12146 to indicate that the push succeeded. Also, buffer box element 12100 (e.g., scheduler 12114) receives and dequeues a control value of zero from input queue 12104, and because the control value is zero, no value is to be popped (e.g., from buffer storage 12140). Also, a pop control value of one is stored into (e.g., a first slot of) input queue 12104, e.g., by a PE or other CSA component that is configured to allow requests (e.g., via a LIC) for a value popped from the stack, so as the next operation, the buffer box element 12100 is to pull (e.g., and delete) the last value (circled 3) from the top of the stack and send it to an output queue of the buffer box element 12100.

Figure 121E:
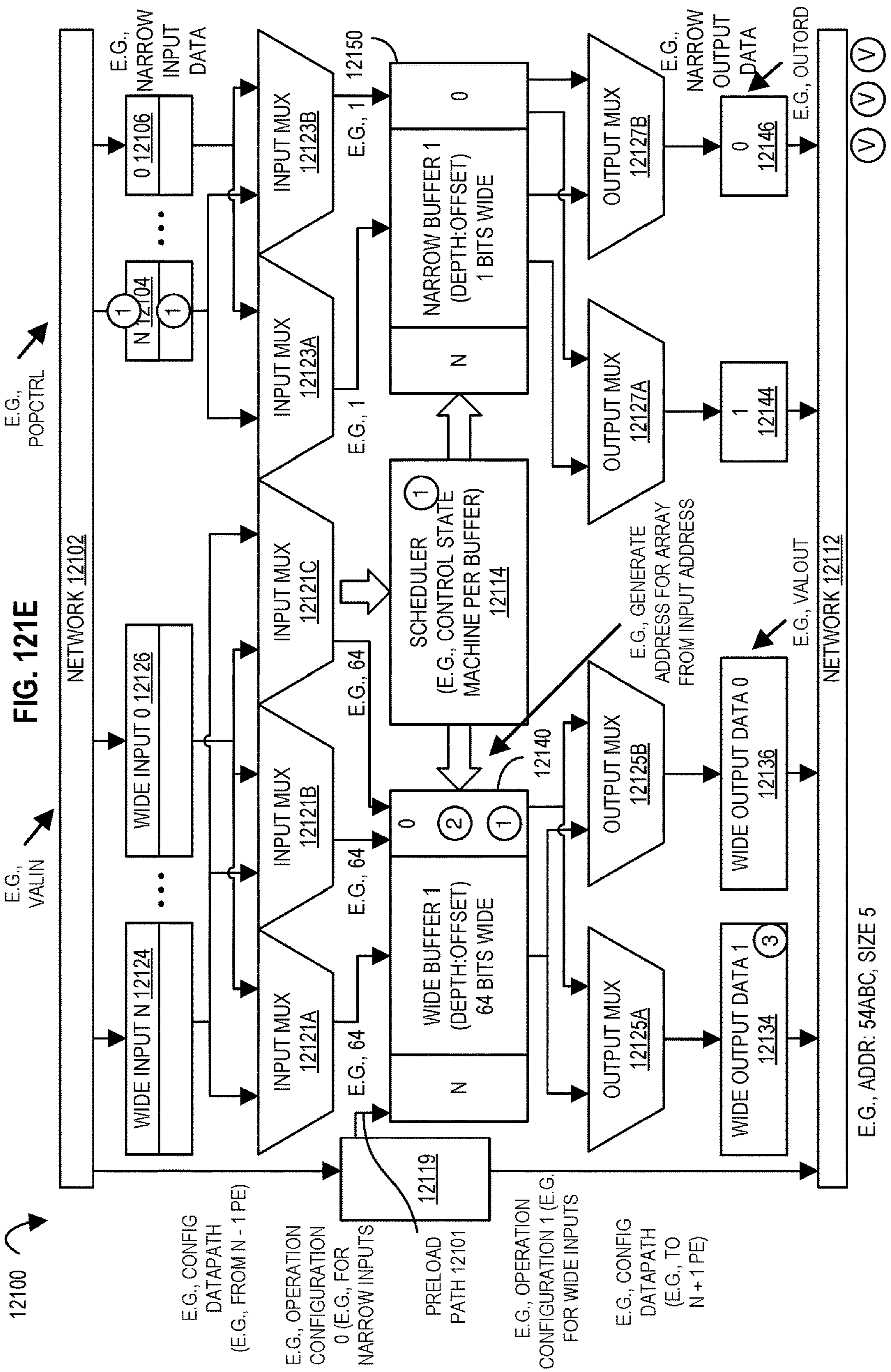

In FIG. 121E, a pop control value of one was stored into (e.g., a first slot of) input queue 12106, e.g., by a PE or other CSA component that is configured to allow requests (e.g., via a LIC) for a value popped from the stack, so the buffer box element 12100 performs a pop operation by storing the last value (circled 3) from the top of the stack (e.g., the third storage location of buffer storage 12140) into output queue 12134 of the buffer box element 12100, and deleting the value (circled 3) from the top of the stack (e.g., the third storage location of buffer storage 12140). Also, the buffer box element 12100 dequeues the pop control value of one from (e.g., the first slot of) input queue 12106. Another pop control value of one is stored into (e.g., a first slot of) input queue 12106, e.g., by a PE or other CSA component that is configured to allow requests (e.g., via a LIC) for a value popped from the stack.

Figure 121F:
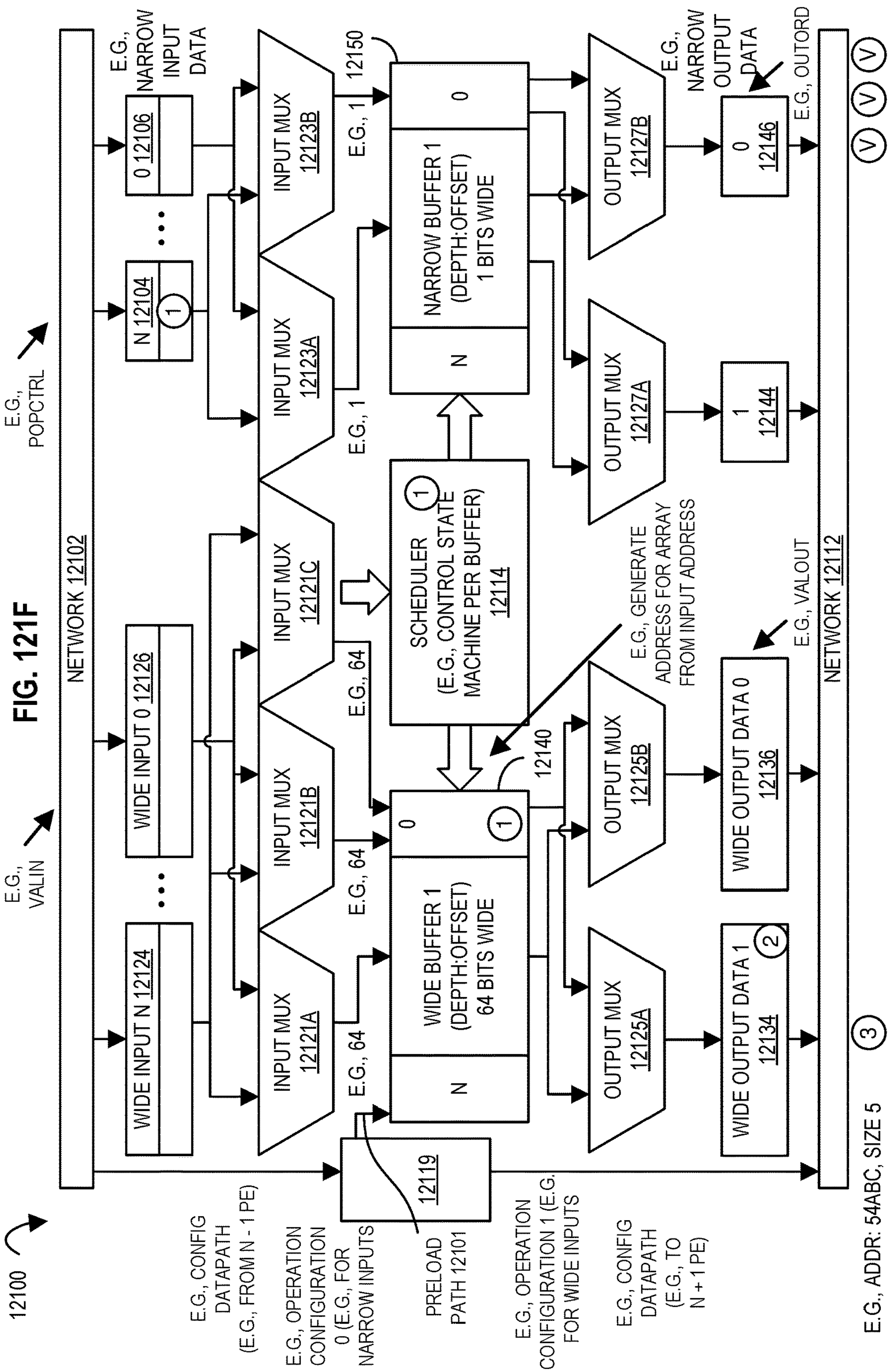

In FIG. 121F, a pop control value of one was stored into (e.g., a first slot of) input queue 12106, e.g., by a PE or other CSA component that is configured to allow requests (e.g., via a LIC) for a value popped from the stack, so the buffer box element 12100 performs a pop operation by storing the last value (circled 2) from the top of the stack (e.g., the second storage location of buffer storage 12140) into output queue 12134 of the buffer box element 12100, and deleting the value (circled 2) from the top of the stack (e.g., the second storage location of buffer storage 12140). Also, the buffer box element 12100 dequeues the pop control value of one from (e.g., the first slot of) input queue 121046. Another pop control value of one is stored into (e.g., a first slot of) input queue 121046, e.g., by a PE or other CSA component that is configured to allow requests (e.g., via a LIC) for a value popped from the stack.

Figure 121G:
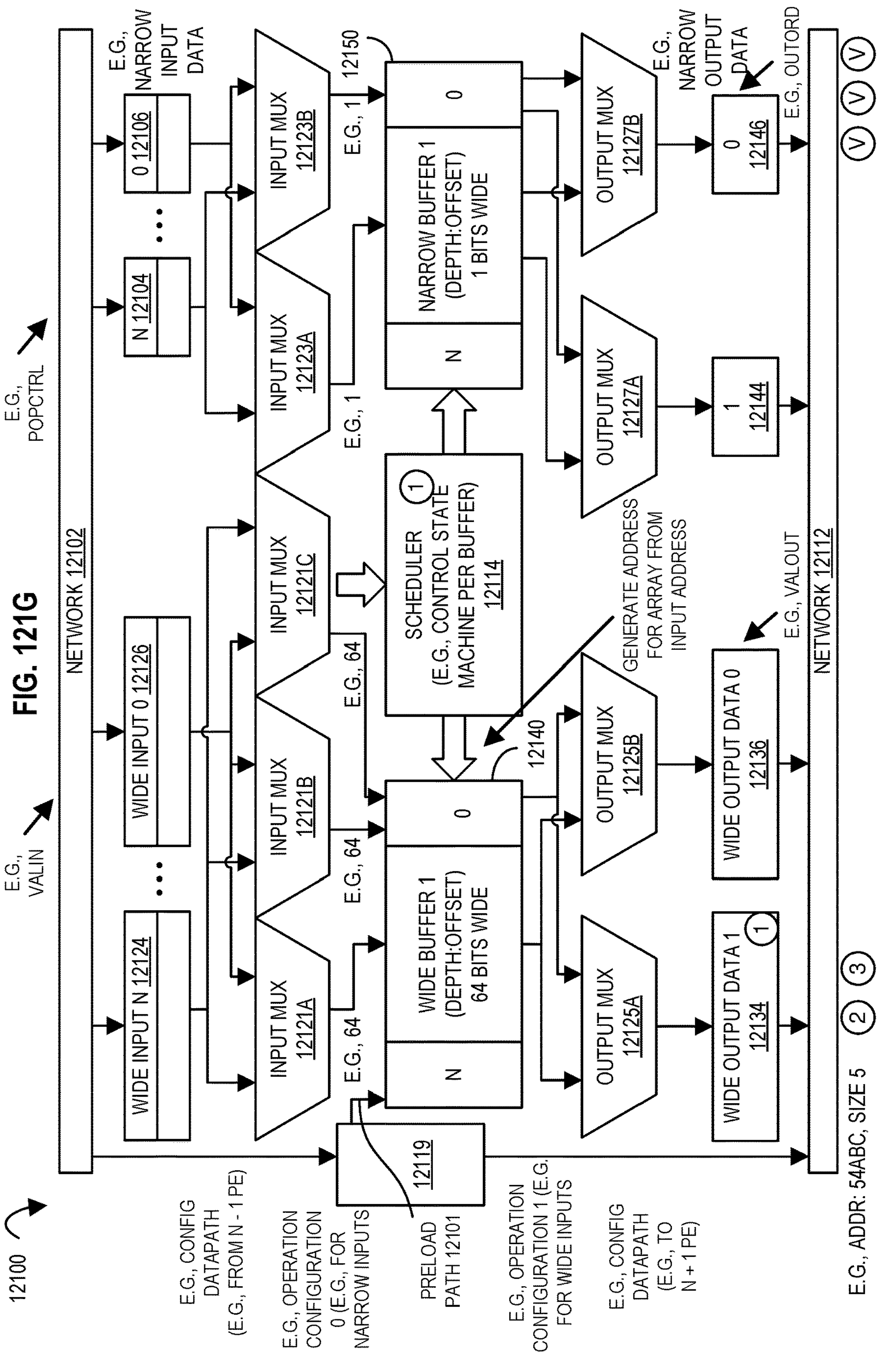
Figure 121H:
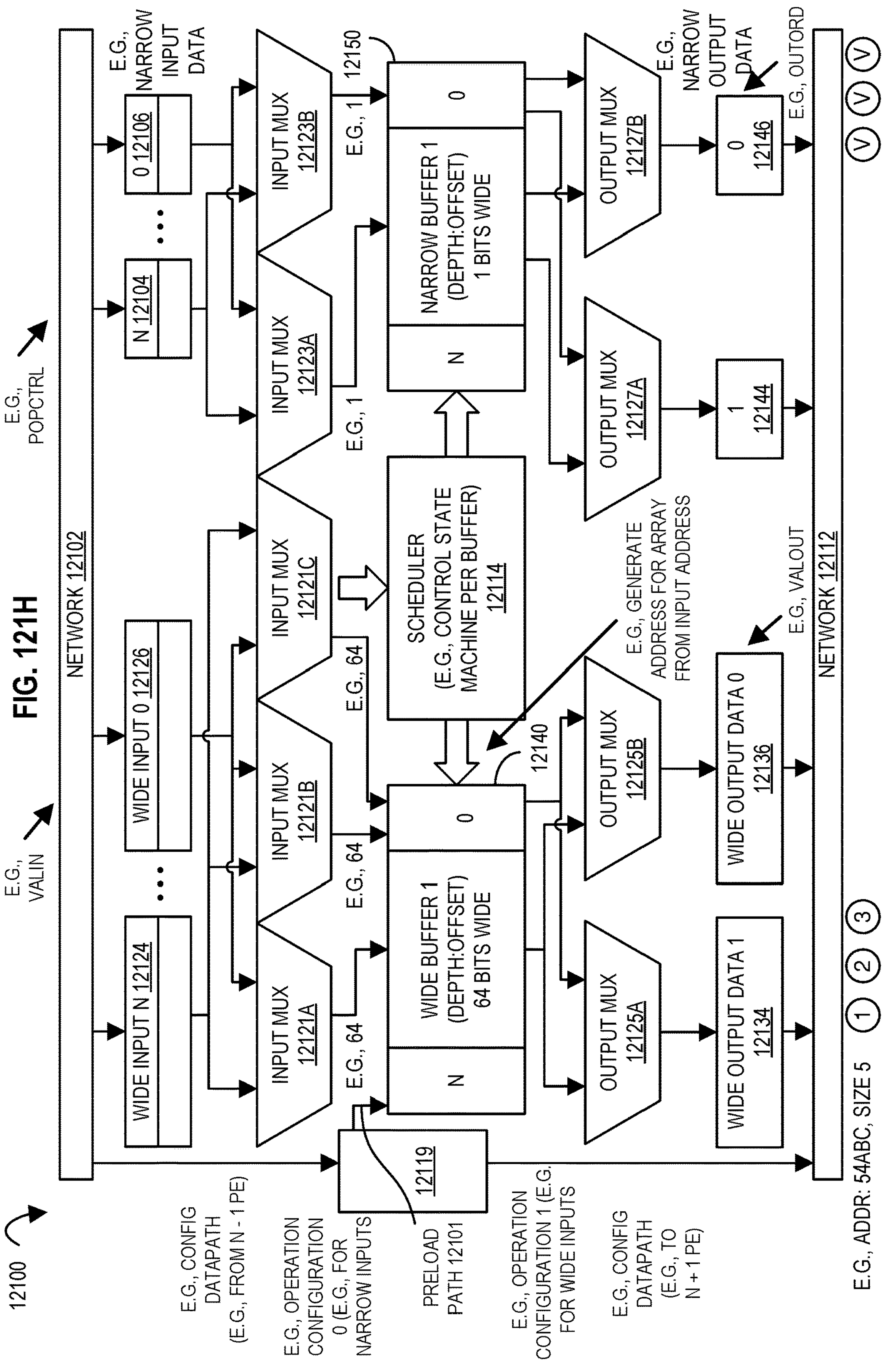

In FIG. 121G, a pop control value of one was stored into (e.g., a first slot of) input queue 12104, e.g., by a PE or other CSA component that is configured to allow requests (e.g., via a LIC) for a value popped from the stack, so the buffer box element 12100 performs a pop operation by storing the last value (circled 1) from the top of the stack (e.g., the first storage location of buffer storage 12140) into output queue 12134 of the buffer box element 12100, and deleting the value (circled 1) from the top of the stack (e.g., the first storage location of buffer storage 12140). Also, the buffer box element 12100 dequeues the pop control value of one from (e.g., the first slot of) input queue 12104.

In FIG. 121G, the data value labeled circled 1 has been consumed (e.g., moved into the input queue of a downstream PE) from output queue 12134.

In certain embodiments, buffer box element 12100 also uses buffer storage 12150 to push and/or pop values, e.g., as indicated by a configuration value.

In certain embodiments, buffer box element 12100 stalls the popping data stored in its buffer storage until there is room in the configured target storage location (e.g., the output queue of the buffer box element 12100 that is coupled to an input queue of a receiving PE or PEs).

In the depicted embodiment, buffer box element 12100 includes the components of buffer box element 10800 from FIG. 108, for example, with the components ending with the same two numbers having the same functionality. In one embodiment, scheduler 12114 schedules an operation or operations of buffer box element 12100 for performance according to the configuration value, e.g., and when input data and control input arrives.

Completion Buffer Mode

In one embodiment, a CSA architecture includes a configuration value that, when stored into the configuration storage (e.g., register), causes a buffer box element thereof to operate in a Completion Buffer mode according to the following (e.g., semantics and/or description).

Another mode of operation for in-fabric storage (e.g., buffer box element) is as a completion buffer, e.g., where values are inserted in a sliding window, and values can be retrieved in order.

The completion operation supports this functionality. Note that the example completion operation below can be viewed as these three operations bound together:

```
Operation: completion{1,8,16,32,64}availidx.Cd.u8, ldres.Cd.iN, stidx.Cu.u8,
stdata.Cu.iN,
    size.Lu.u8
Semantics:
This operation logically functions as 3 independent pieces from an issuing perspective:
  1.  availidx returns available indices in order, modulo the size, for use for in storing
      data. An index value cannot be returned if the index is still in use, and generating the
      next availidx value will stall until it is free. The index value is used as part of the
      stidx/stdata pair to store values, in an unspecified order, but within the window size.
  2.  Feeding an index value from availidx to stidx, and a corresponding value to stdata
      will cause a value to be entered into the internal state at the specified index. Since
      the output of index values is throttled to avoid rewriting, it should never be the case
      that a store is entering a value that is already defined. It is UNPREDICTABLE if a store
      to an index is done that was not provided by availidx.
  3.  The values stored will be returned via the ldres output using the ordering of the
      sequence values from availidx. (e.g., the value for index 0 will be returned first, then
      index 1, etc., regardless of the timing order of the values being stored.) If the next
      value to be return has not been stored yet, the output will wait for the value to be
      stored. The storage effectively has an empty/free indication, and when the value is
      returned via the ldres channel, the location is freed so the index can be reused.
The size of the structure is defined by the literal size, e.g., which is a power of 2 in the range
of 2...64.
```

FIGS. 122A-122G illustrate a buffer box element 12200 performing a storage operation while in completion buffer mode according to embodiments of the disclosure. In the depicted embodiment, an operation configuration value includes a mode field (set to completion buffer mode) (e.g., mode field in FIGS. 109 and 110) stored (e.g., during a programming time period) into operation configuration register 12219. As one example, a first input queue (e.g., having a multiple bit width) is provided (e.g., activated by connecting to the network) to receive an address (e.g., a virtual address) of a (e.g., system or main) memory coupled to a CSA, and a second input queue (e.g., having a single or multiple bit width) is provided (e.g., activated by connecting to the network) to receive the payload data (e.g., to be stored) for the address (e.g., the virtual address) of the (e.g., system or main) memory coupled to the CSA. Thus, in certain embodiments, a buffer box element is used to store a data value (e.g., an address and data value pair) instead of sending that to main memory (e.g., instead of using a RAF circuit). In the depicted embodiment, input queue (e.g., having a multiple bit width) 12224 is provided to receive a data value, input queue 12226 is to receive the memory address for the data value so that pair of values may be stored in the buffer storage of the buffer box element 12200, and output queue 12234 is to receive the output data value (e.g., on an element by element basis in address order). Thus, in certain embodiments, buffer box element 12200 in completion buffer mode is to function as a RAM for input values, but dequeue those value as they are valid in address (e.g., ascending) order. In certain embodiments, the address value (e.g., availidx value) comes out of queue 12236 and originates from the scheduler 12214, for example, whenever a value is sent from buffer 12240 to output queue 12234, its address is sent to output queue 12236, e.g., for future use in an input queue (e.g., input queue 12226).

In FIGS. 122A-122G, the numbers in the circles are labels of an instance of a pair of a memory address and a data value (and not the values themselves). In certain embodiments, an upstream component (e.g., PE) is to assign the addressed for data value, e.g., in ascending order. In one embodiment, the upstream component (e.g., PE) is to assign an entire first set of addresses that start at one (e.g., labeled 1) for a first data set that is to be output in address order before starting a second set of addresses that start at one (e.g., labeled 1) for a second data set that is to be output in address order. In one embodiment, the scheduler includes storage for a bit for each address that is to be stored therein that, when the bit is set, indicates if that address' corresponding data value has been stored in the buffer storage.

Figure 122A:
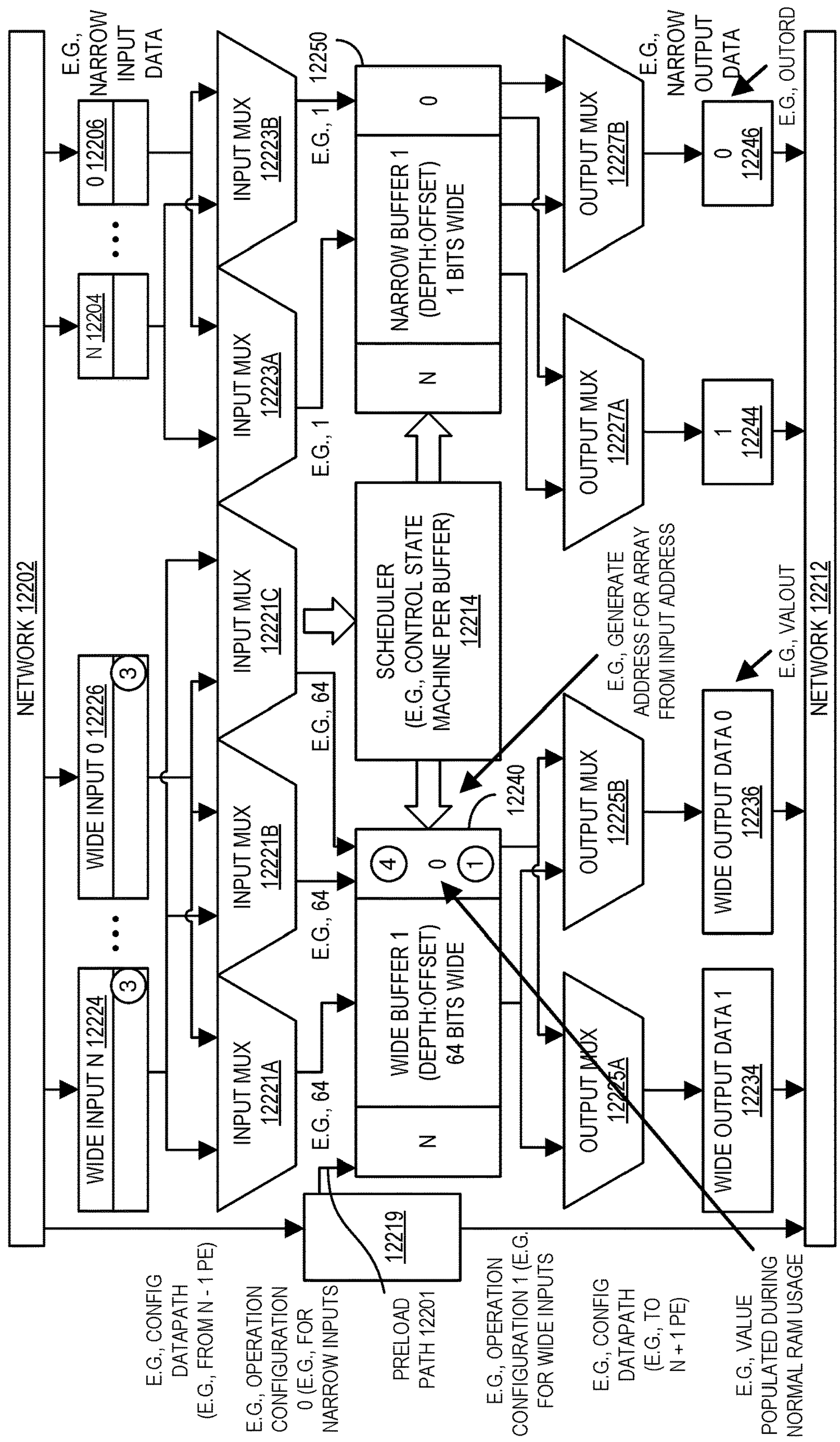

In FIG. 122A, an address value labeled circled 3 is stored into the first slot of input queue 12226, and the corresponding data value (for the address value) labeled circled 3 is stored into the first slot of input queue 12224, e.g., by an upstream component that is requesting that store.

In FIG. 122A, scheduler 12214 has generated an index into the buffer storage 12240 based on the address value labeled circled 1 (e.g., because that address value has not yet been input into the scheduler) and stored the data value labeled circled 1 at the location specified by the index, e.g., and keeps a table indicating the address to index mapping, and has generated an index into the buffer storage 12240 based on the address value labeled circled 4 (e.g., because that address value has not yet been input into the scheduler) and stored the data value labeled circled 4 at the location specified by the index, e.g., and keeps a table indicating the address to index mapping. In another embodiment, the scheduler stores both the memory address and the data value pair into buffer storage 12240 without generating an index.

Thus, in FIG. 122A, the data values for addresses 2 and 3 have not been stored yet into buffer box element 12200.

Figure 122B:
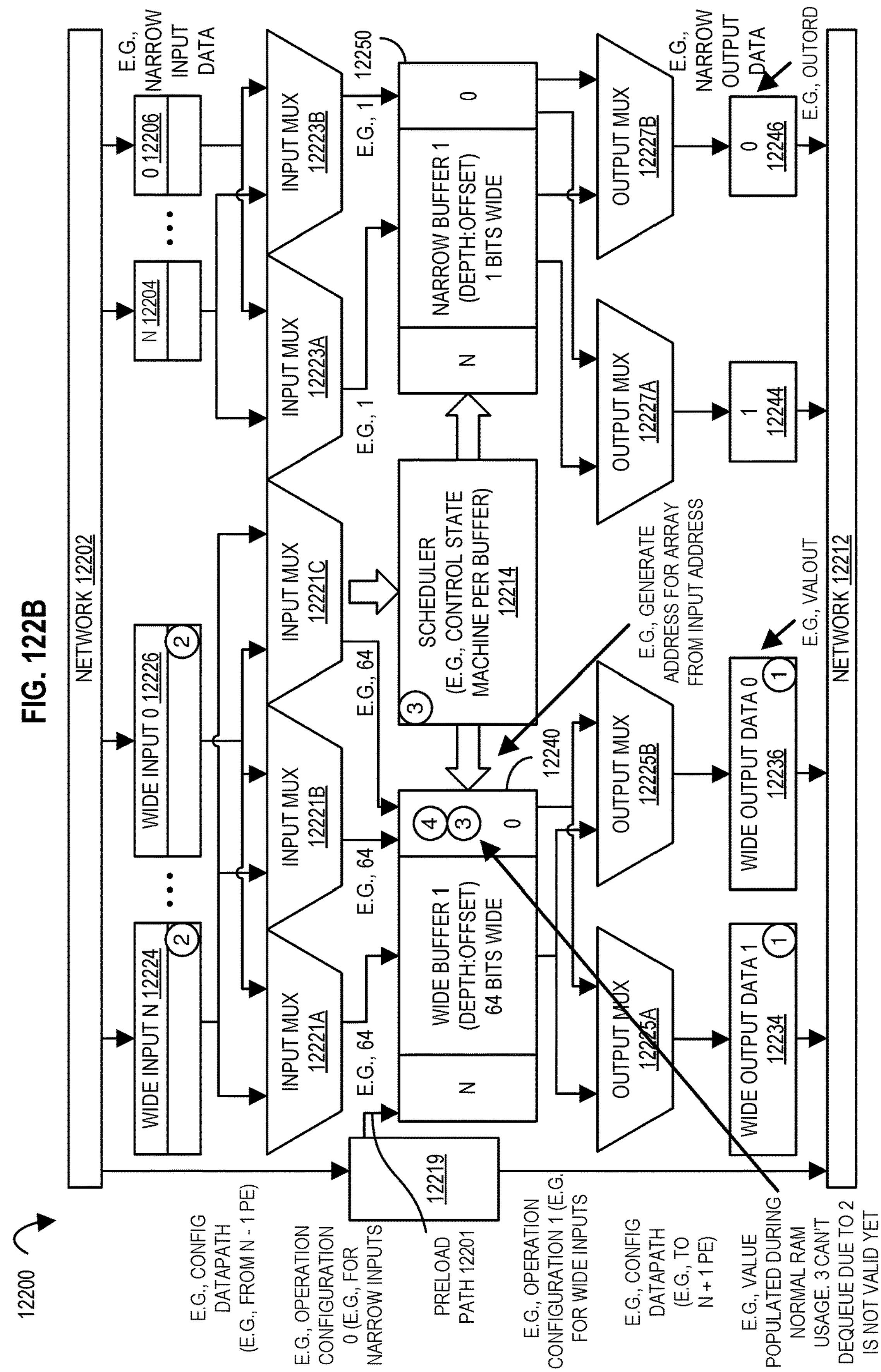

In FIG. 122B, scheduler 12214 generates an index into the buffer storage 12240 based on the address value labeled circled 3 (e.g., because that address value has not yet been input into the scheduler) and stores the data value labeled circled 3 at the location specified by the index, e.g., and keeps a table indicating the address to index mapping. In another embodiment, the scheduler stores both the memory address and the data value pair into buffer storage 12240 without generating an index.

Also in FIG. 122B, because the first (e.g., in ascending address order) data value (labeled circle 1) has been stored in the buffer storage, and even though the second and third data values have not been stored in the buffer storage, the scheduler 12214 stores the first data value (labeled circle 1) into output queue 12234 and the corresponding address for the first data value (also labeled circle 1) into output queue 12236, and the first data value (labeled circle 1) is deleted from buffer storage 12240. Scheduler 12214 dequeues the address value labeled circled 3 from the input queue 12226, and the corresponding data value (for the address value) labeled circled 3 from the input queue 12224. An address value labeled circled 2 is stored into the first slot of input queue 12226, and the corresponding data value (for the address value) labeled circled 2 is stored into the first slot of input queue 12224, e.g., by an upstream component that is requesting that store.

Figure 122C:
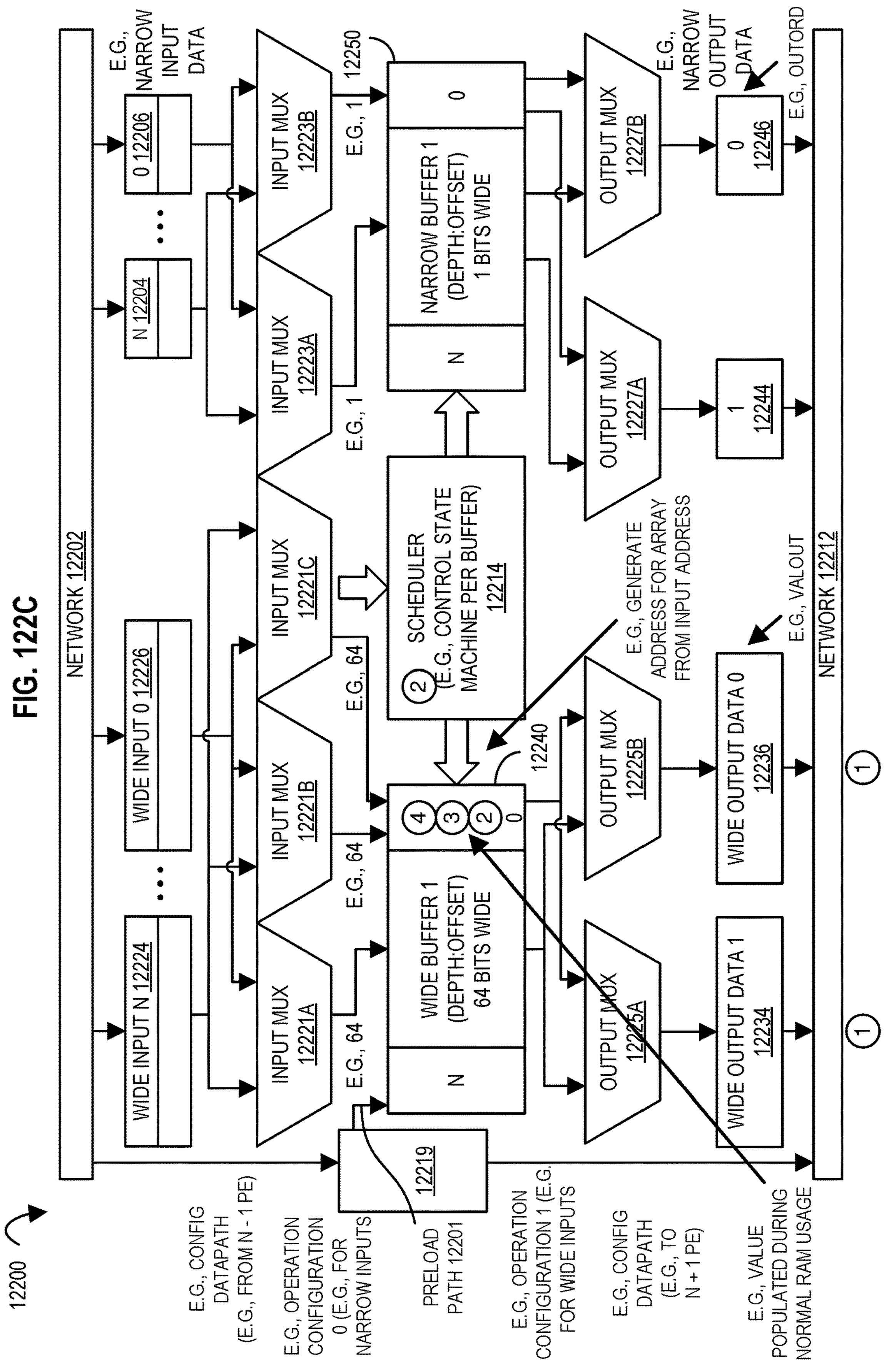

In FIG. 122C, scheduler 12214 generates an index into the buffer storage 12240 based on the address value labeled circled 2 (e.g., because that address value has not yet been input into the scheduler) and stores the data value labeled circled 2 at the location specified by the index, e.g., and keeps a table indicating the address to index mapping. In another embodiment, the scheduler stores both the memory address and the data value pair into buffer storage 12240 without generating an index.

Also in FIG. 122C, because the second (e.g., in ascending address order) data value (labeled circle 2) has not yet been stored in the buffer storage (e.g., and will not until the current operation is complete), the scheduler 12214 does not store any data value into output queue 12234. Scheduler 12214 dequeues the address value labeled circled 2 from the input queue 12226, and the corresponding data value (for the address value) labeled circled 2 from the input queue 12224. The data value labeled circled 1 has been consumed (e.g., moved into the input queue of a downstream PE) from output queue 12234 and the corresponding address (also labeled circled 1) for the first data value has been consumed (e.g., moved into the input queue of a downstream PE) from output queue 12236.

In FIG. 122D, because the second (e.g., in ascending address order) data value (labeled circle 2) has been stored in the buffer storage (e.g., upon cycling from FIG. 122C to FIG. 122D) and the first data value (labeled circle 1) has been stored into (and consumed from) output queue 12234 and the corresponding address (also labeled circled 1) for the first data value has been consumed (e.g., moved into the input queue of a downstream PE) from output queue 12236, the scheduler 12214 now stores the second (e.g., in address order) data value (labeled circle 2) into output queue 12234 and the corresponding address for the second data value (also labeled circle 2) into output queue 12236, and the second data value (labeled circle 2) is deleted from buffer storage 12240.

In FIG. 122E, because the third (e.g., in ascending address order) data value (labeled circle 3) has been stored in the buffer storage, and the first data value (labeled circle 1) has been stored into (and consumed from) output queue 12234, the corresponding first address for the first data value (also labeled circle 1) has been stored into (and consumed from) output queue 12236, the second data value (labeled circle 2) has been stored into (and consumed from) output queue 12234, and the corresponding second address for the second data value (also labeled circle 2) has been stored into (and consumed from) output queue 12236, the scheduler 12214 now stores the third (e.g., in address order) data value (labeled circle 3) into output queue 12234 and the corresponding address for the third data value (also labeled circle 3) into output queue 12236, and the third data value (labeled circle 3) is deleted from buffer storage 12240.

Figure 122F:
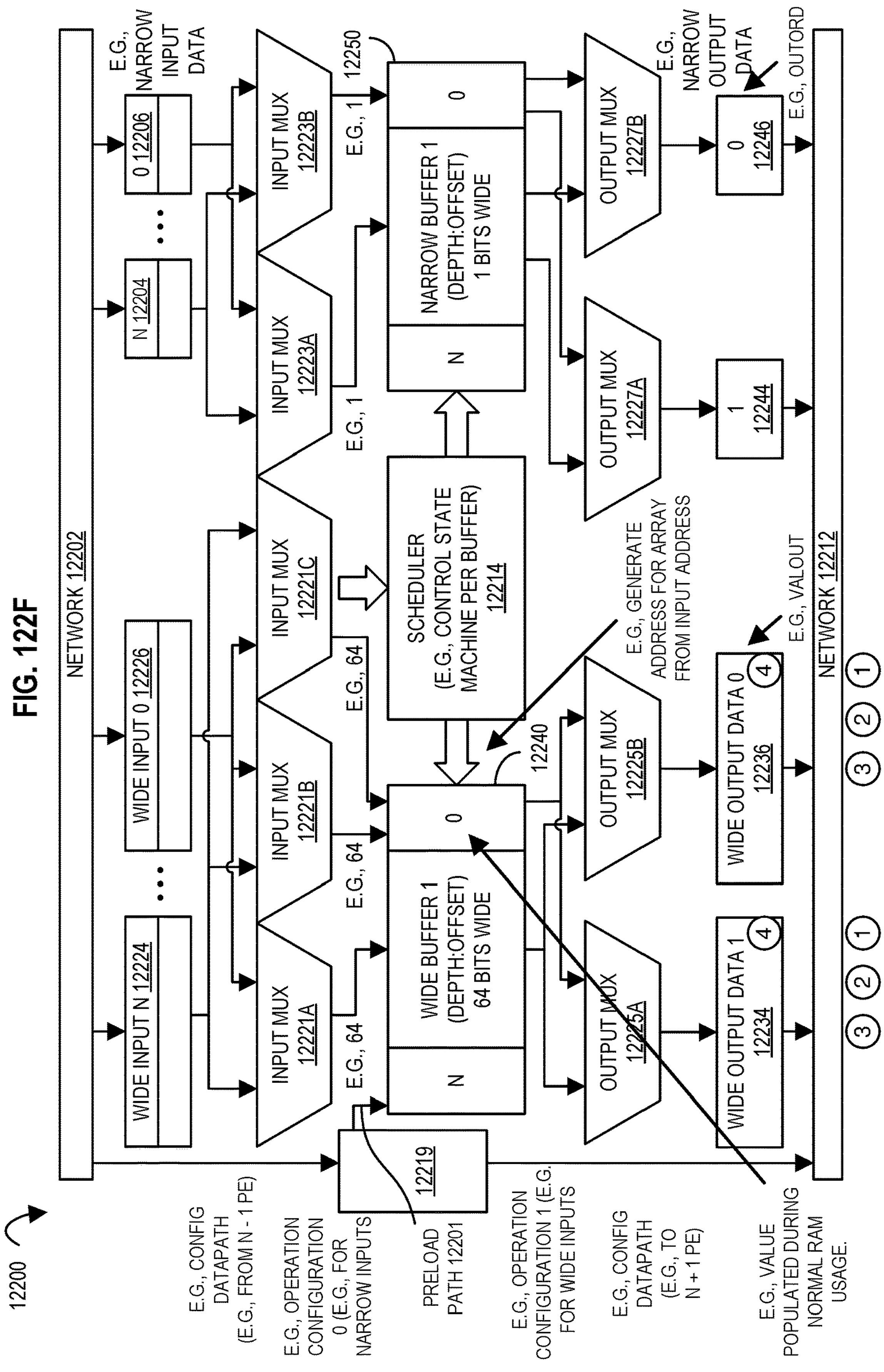

In FIG. 122F, because the fourth (e.g., in ascending address order) data value (labeled circle 4) has been stored in the buffer storage, and the first data value (labeled circle 1) has been stored into (and consumed from) output queue 12234, the corresponding first address for the first data value (also labeled circle 1) has been stored into (and consumed from) output queue 12236, the second data value (labeled circle 2) has been stored into (and consumed from) output queue 12234, the corresponding second address for the second data value (also labeled circle 2) has been stored into (and consumed from) output queue 12236, the third data value (labeled circle 3) has been stored into (and consumed from) output queue 12234, the corresponding third address for the third data value (also labeled circle 3) has been stored into (and consumed from) output queue 12236, the scheduler 12214 now stores the (e.g., final) fourth (e.g., in address order) data value (labeled circle 4) into output queue 12234 and the corresponding address for the fourth data value (also labeled circle 4) into output queue 12236, and the fourth data value (labeled circle 4) is deleted from buffer storage 12240.

Figure 122G:
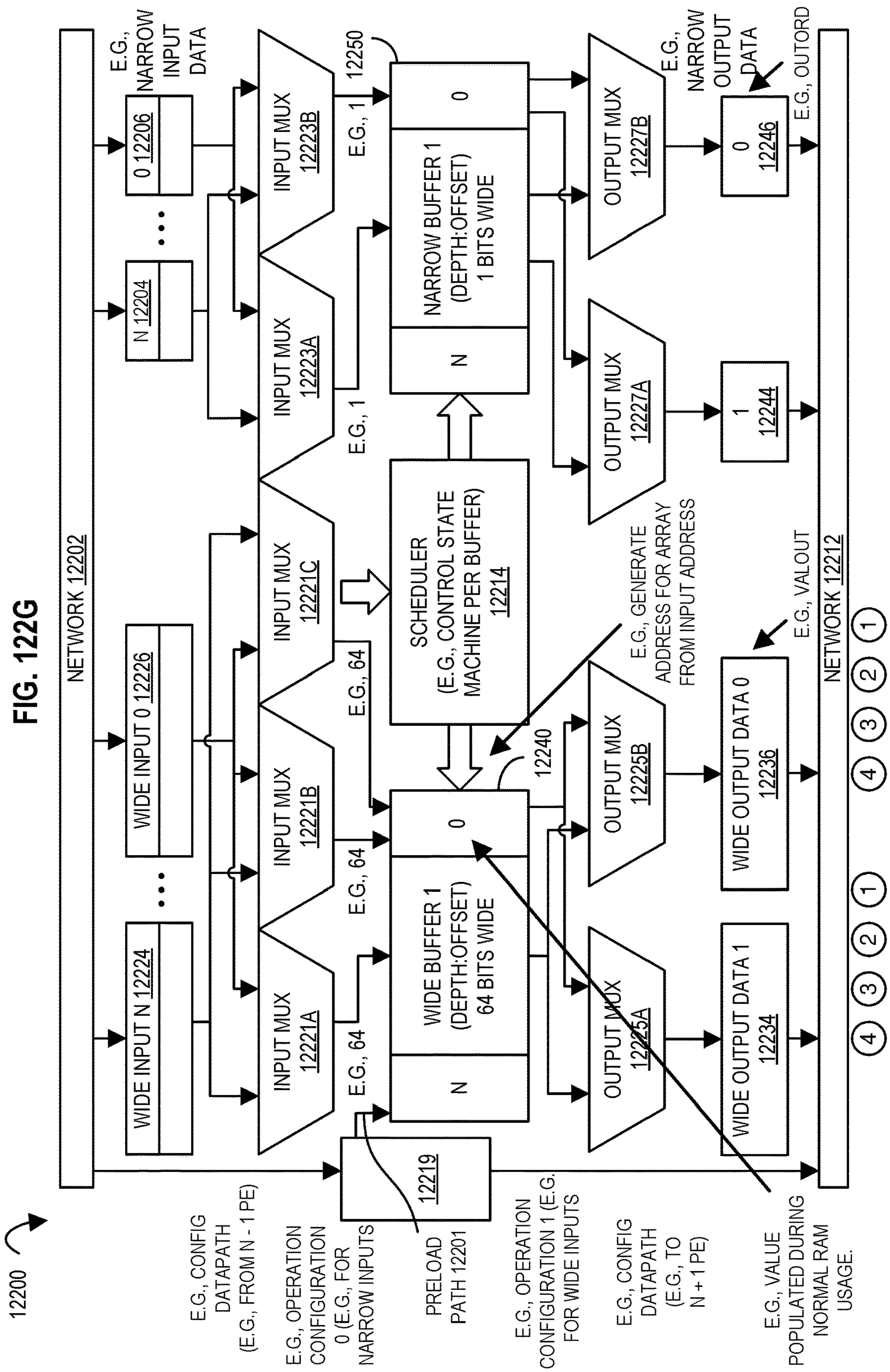

In FIG. 122G, the data value labeled circled 4 has been consumed (e.g., moved into the input queue of a downstream PE) from output queue 12234.

In certain embodiments, buffer box element 12200 is stalled from sending data stored in its buffer storage until there is room in the target storage location (e.g., the output queue that is coupled to an input queue of a receiving PE or PEs).

In the depicted embodiment, buffer box element 12200 includes the components of buffer box element 10800 from FIG. 108, for example, with the components ending with the same two numbers having the same functionality. In one embodiment, scheduler 12214 schedules an operation or operations of buffer box element 12200 for performance according to the configuration value, e.g., and when input data and control input arrives.

Overflow Buffer Mode

In one embodiment, a CSA architecture includes a configuration value that, when stored into the configuration storage (e.g., register), causes a buffer box element thereof to operate in an overflow buffer mode according to the following (e.g., semantics and/or description).

FIGS. 123A-123G illustrate a buffer box element 12300 performing a storage operation while in overflow buffer mode according to embodiments of the disclosure. In the depicted embodiment, an operation configuration value includes a mode field (set to overflow mode) (e.g., mode field in FIGS. 109 and 110) stored (e.g., during a programming time period) into operation configuration register 12319. Here, the buffer storage(s) in the buffer box element 12300 uses an external (e.g., system) memory 12301 to provide further storage space, for example, as discussed below in FIG. 124. As one example, the overflow mode is used along with the other buffer box modes discussed herein (e.g., other than fast clear mode and completion mode). In one embodiment, the external memory is accessed via a RAF circuit.

In FIGS. 123A-123G, the numbers in the circles are instances of values (and not the values themselves).

Figure 123A:
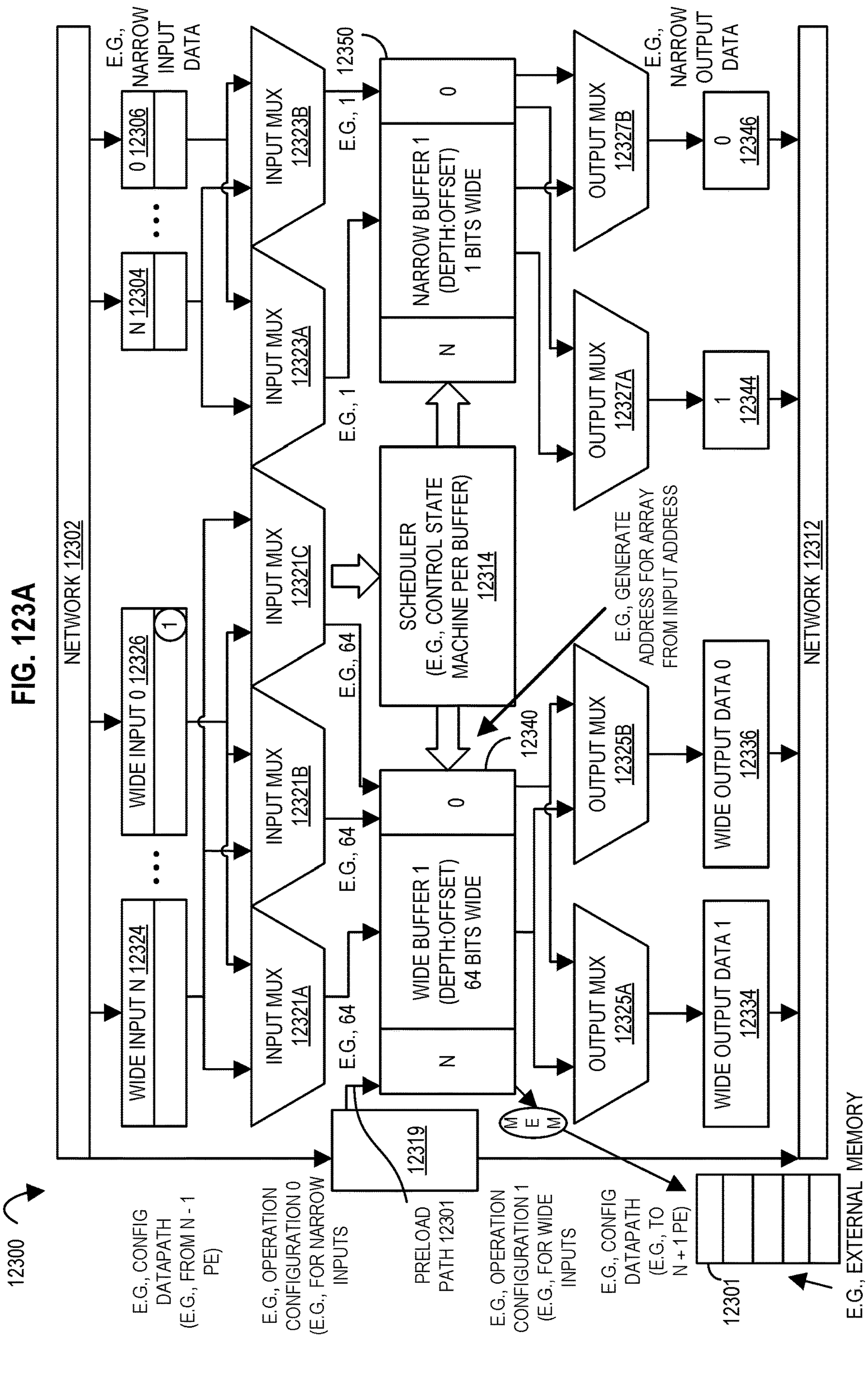

In FIG. 123A, a (e.g., data) value labeled circled 1 is stored into (e.g., a first slot of) input queue 12326, e.g., by a PE or other CSA component that is requesting that value be stored (e.g., buffer box element 12300 also being in a FIFO mode).

Figure 123B:
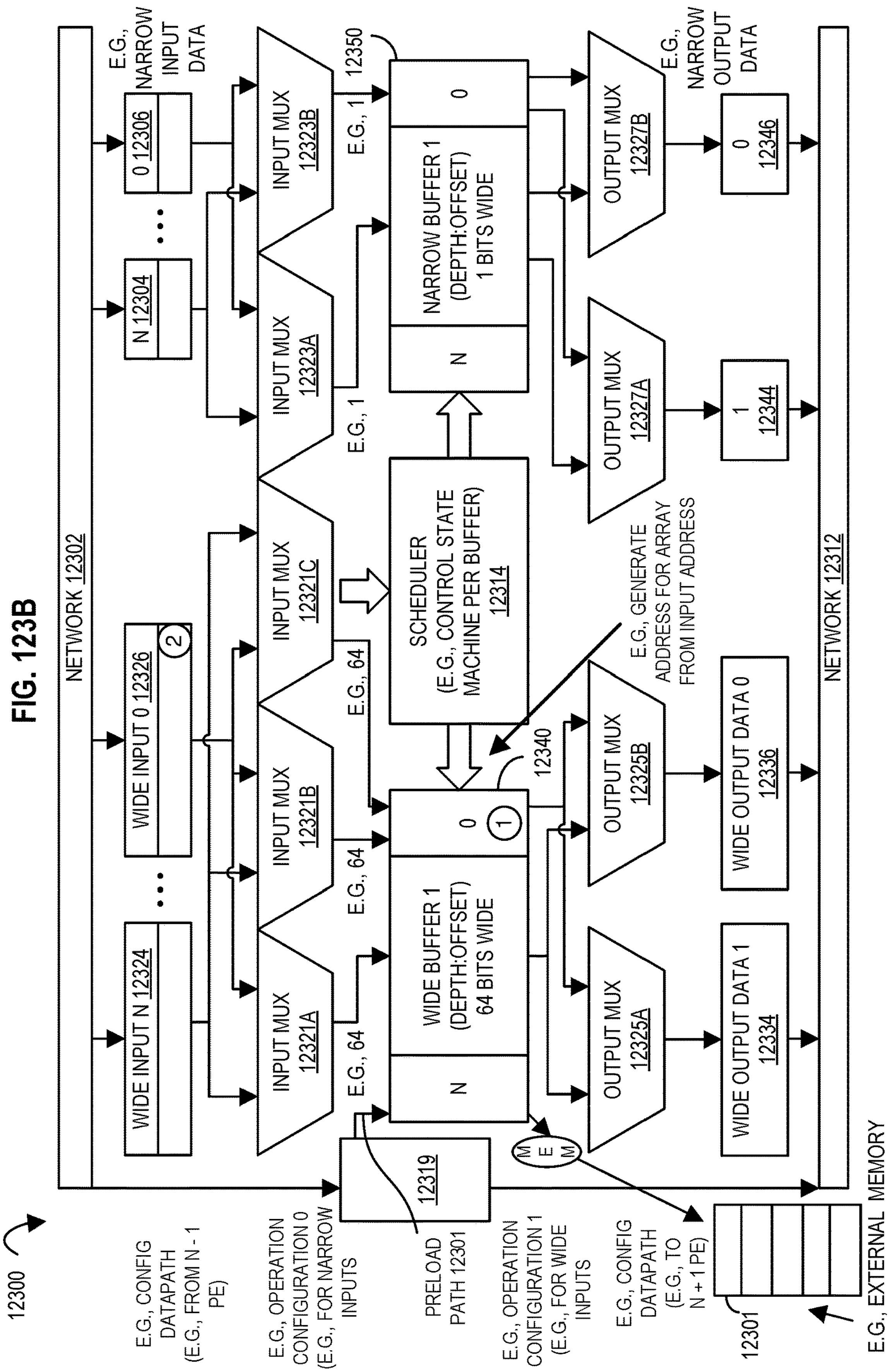

In FIG. 123B, buffer box element 12300 (e.g., scheduler 12314) stores the (e.g., data) value labeled circled 1 into the (e.g., first storage location of) buffer storage 12340, and dequeues the (e.g., data) value labeled circled 1 from the (e.g., first slot of) input queue 12326. A (e.g., data) value labeled circled 2 is stored into (e.g., a first slot of) input queue 12326, e.g., by a PE or other CSA component that is requesting that value be stored.

Figure 123C:
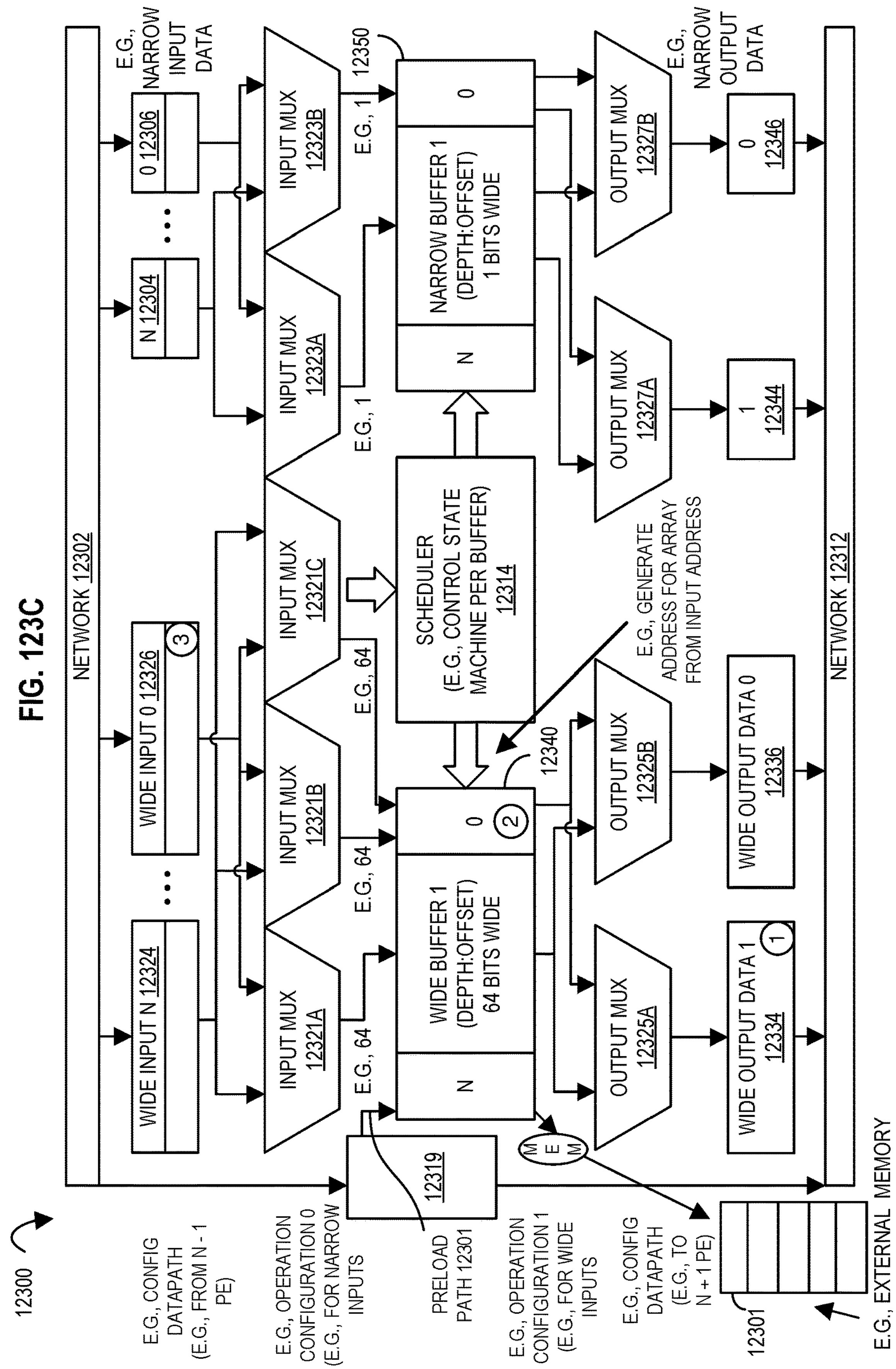

In FIG. 123C, buffer box element 12300 (e.g., scheduler 12314) stores the (e.g., data) value labeled circle 1 into the output queue 12334, deletes the (e.g., data) value labeled circled 1 from the (e.g., first storage location of) buffer storage 12340, stores the (e.g., data) value labeled circled 2 into the (e.g., second storage location of) buffer storage 12340, and dequeues the (e.g., data) value labeled circled 2 from the (e.g., first slot of) input queue 12326. A (e.g., data) value labeled circled 3 is stored into (e.g., a first slot of) input queue 12326, e.g., by a PE or other CSA component that is requesting that value be stored.

In FIG. 123D, the data value labeled circled 1 has been consumed (e.g., moved into the input queue of a downstream PE) from output queue 12234, and the buffer box element 12300 (e.g., scheduler 12314) stores the (e.g., data) value labeled circle 2 into the output queue 12334, deletes the (e.g., data) value labeled circled 2 from the (e.g., first storage location of) buffer storage 12340, and instead of storing the (e.g., data) value labeled circled 3 into the (e.g., third storage location of) buffer storage 12340, it stores the (e.g., data) value labeled circled 3 into the external memory 12301, and dequeues the (e.g., data) value labeled circled 3 from the (e.g., first slot of) input queue 12326. A (e.g., data) value labeled circled 4 is stored into (e.g., a first slot of) input queue 12326, e.g., by a PE or other CSA component that is requesting that value be stored. In one embodiment, the value labeled circle 3 is stored into the external memory 12301 instead of the buffer storage 12340 because the buffer storage does not have sufficient room for the value (e.g., the buffer storage 12340 is out of room or does not have enough empty space to store the value).

In FIG. 123E, the data value labeled circled 2 has been consumed (e.g., moved into the input queue of a downstream PE) from output queue 12234, and the buffer box element 12300 (e.g., scheduler 12314) stores the (e.g., data) value labeled circle 3 into the output queue 12334, deletes the (e.g., data) value labeled circled 3 from the external memory 12301, and instead of storing the (e.g., data) value labeled circled 4 into the (e.g., fourth storage location of) buffer storage 12340, it stores the (e.g., data) value labeled circled 4 into the external memory 12301, and dequeues the (e.g., data) value labeled circled 4 from the (e.g., first slot of) input queue 12326. In one embodiment, the value labeled circle 4 is stored into the external memory 12301 instead of the buffer storage 12340 because the buffer storage does not have sufficient room for the value (e.g., the buffer storage 12340 is out of room or does not have enough empty space to store the value).

Figure 123F:
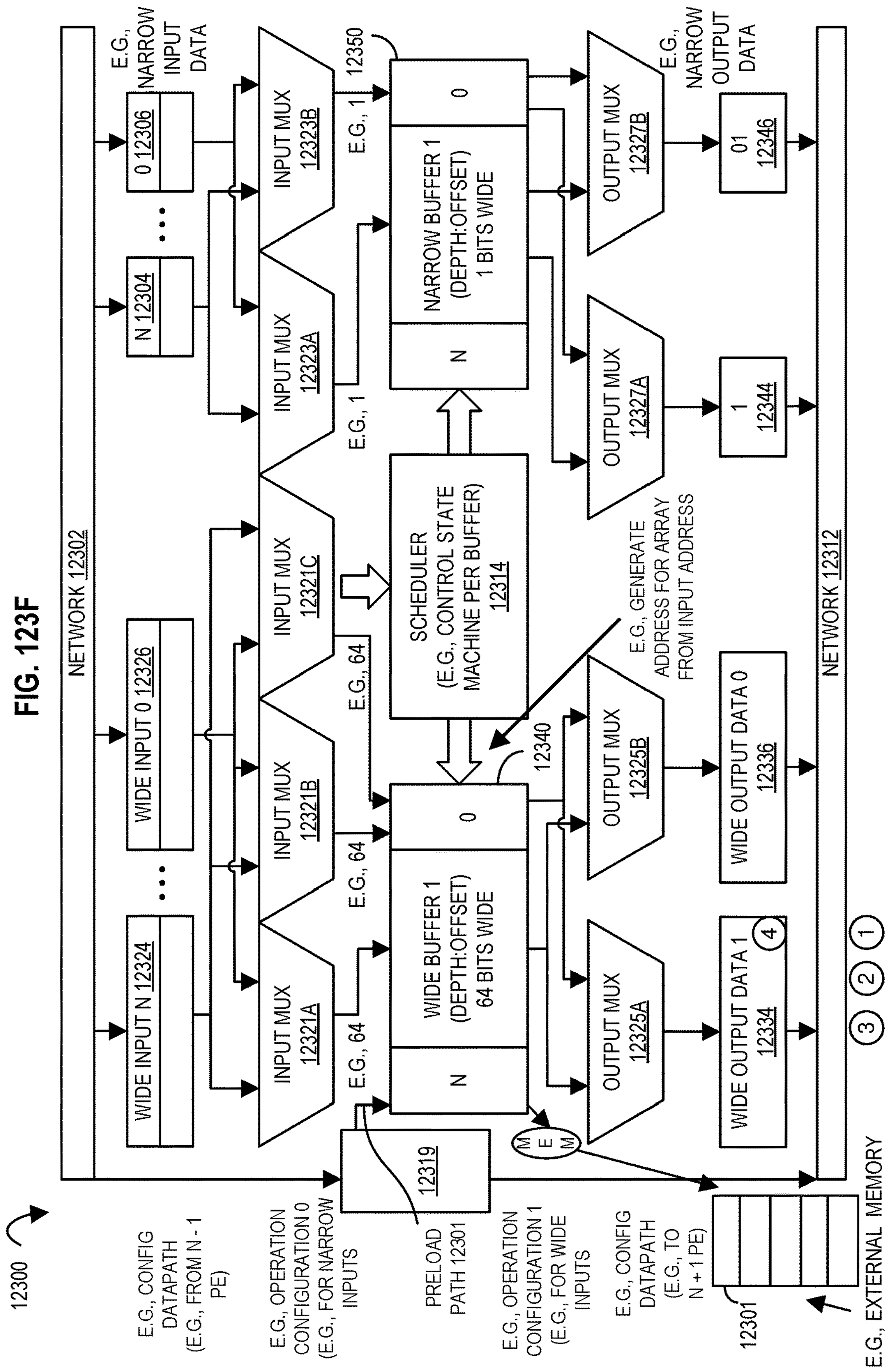
Figure 123G:
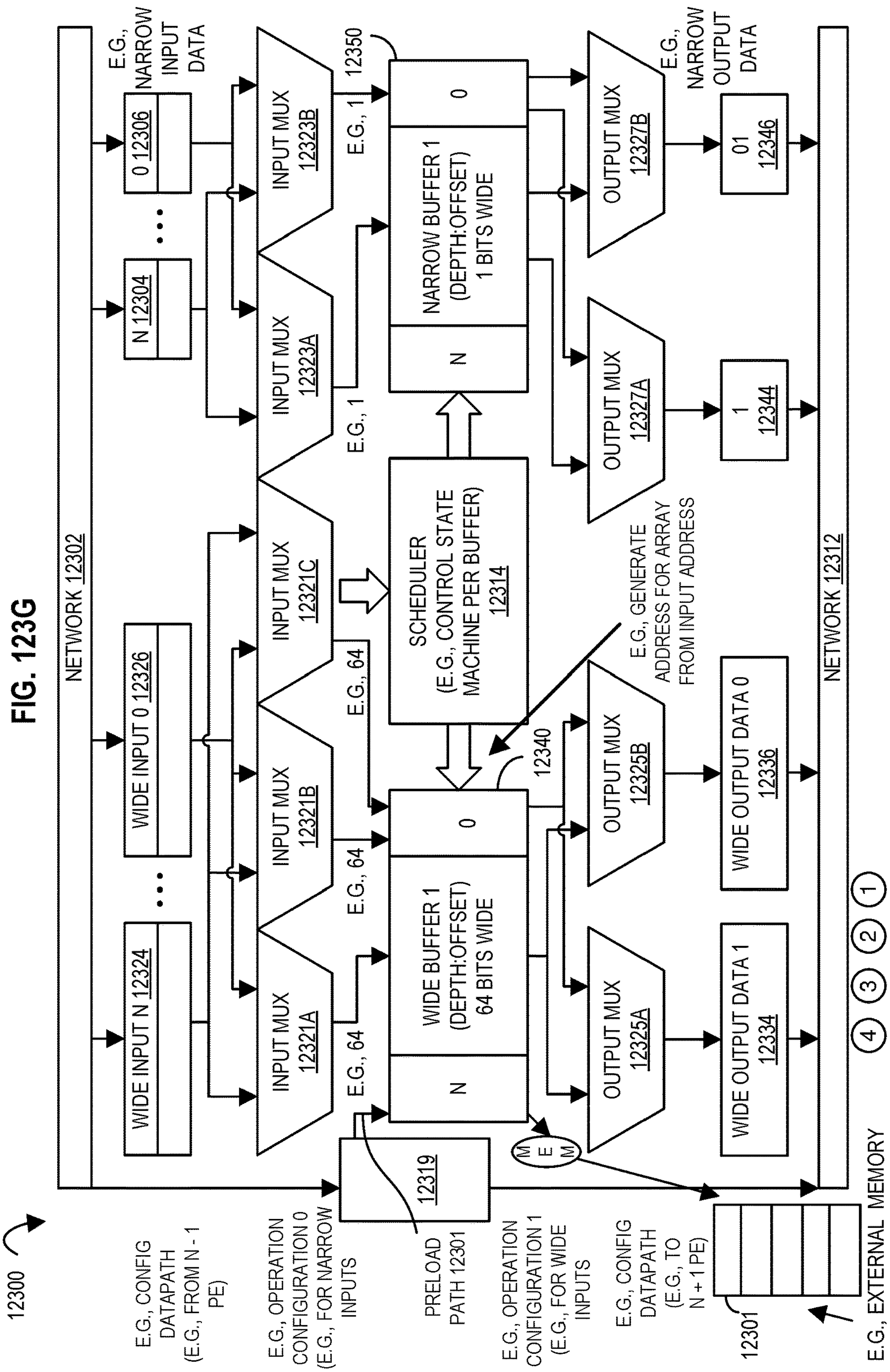

In FIG. 123F, the data value labeled circled 3 has been consumed (e.g., moved into the input queue of a downstream PE) from output queue 12234, and the buffer box element 12300 (e.g., scheduler 12314) stores the (e.g., data) value labeled circle 4 into the output queue 12334, and deletes the (e.g., data) value labeled circled 4 from the external memory 12301.

In FIG. 102G, the data value labeled circled 4 has been consumed (e.g., moved into the input queue of a downstream PE) from output queue 12234.

In certain embodiments, buffer box element 12300 uses external memory 12301 to extend the size of the storage available for buffering data.

In certain embodiments, buffer box element 12300 is not stalled from storing data until there is no room available in the external memory 12301.

In the depicted embodiment, buffer box element 12300 includes the components of buffer box element 10800 from FIG. 108, for example, with the components ending with the same two numbers having the same functionality. In one embodiment, scheduler 12314 schedules an operation or operations of buffer box element 12300 for performance according to the configuration value, e.g., and when input data and control input arrives.

Figure 124:
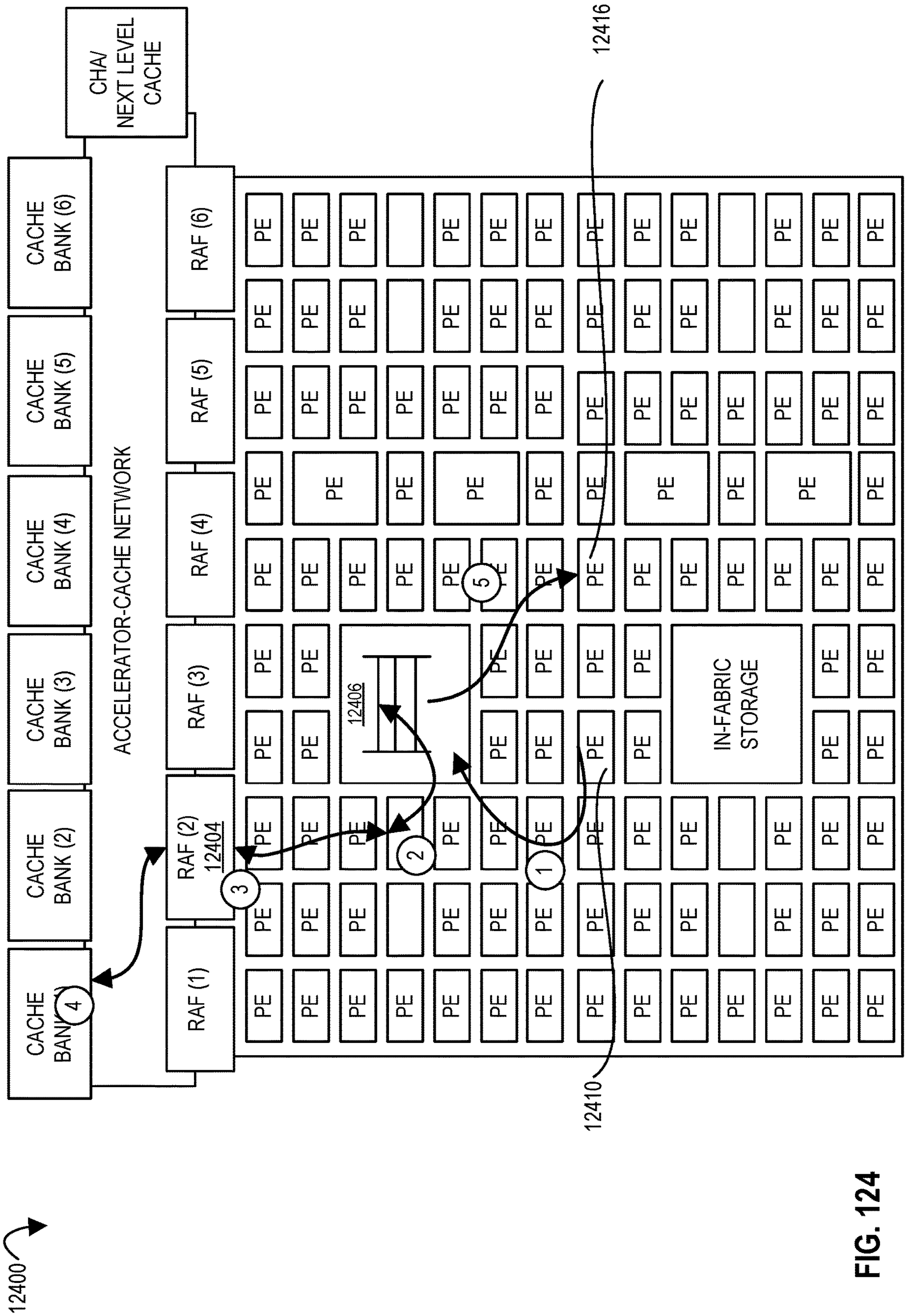

FIG. 124 illustrates a plurality of request address file (RAF) circuits (e.g., RAF circuit 12404) coupled between an accelerator tile 12408 and a plurality of cache banks (1)-(6) according to embodiments of the disclosure. In one embodiment, a plurality (e.g., each) of the RAF circuits is an instance of RAF circuit discussed herein. In one embodiment, plurality of request address file (RAF) circuits are coupled to plurality of cache banks through an accelerator-cache network 12414 (e.g., interconnect). In one embodiment, RAF circuit 12404 is a requestor (of a memory access) and receiver (of data from the memory access).

Depicted accelerator tile 12408 includes in-fabric storage 12406 (e.g., a buffer box element according to this disclosure) that uses the overflow mode discussed above. As one example, in-fabric storage 12406 is used as a stack (e.g., according to the stack operation) by a CSA component (e.g., PE 12410 and PE 12416). At the times indicated by a circled number, time 1 indicates a push of data from PE 12410 onto the stack implemented in in-fabric storage 12406. When the in-fabric storage uses the overflow mode (e.g., when the data to be pushed will not fit in the in-fabric storage or the new data being pushed would also push the oldest data out of the stack), (e.g., the oldest) data from the stack (e.g., data that is being pushed out of the stack from the new data value being pushed onto the stack) is sent by the in-fabric storage 12406 (e.g., as discussed above in reference to the buffer box element 12300) to external storage (depicted here as cache bank (1)).

As one example, the request to store the (e.g., oldest) data value from the stack (e.g., along with that data value) is sent at circled 2 to RAF circuit 12404, which receives (e.g., queues) the request (and data value) in the RAF circuit 12404 at circled 3.

In one embodiment, RAF circuit 12404 is to send a memory request (e.g., generated by in-fabric storage 12406) into accelerator-cache network 12414 (e.g., ACI as described herein), for example, to be serviced by one of the cache banks, and the corresponding data for a memory request of that data (e.g., payload data for a load request) is steered back to RAF circuit 12410 (and then in-fabric storage 12406), e.g., when the in-fabric storage has storage space for that value again.

In certain embodiments, accelerator-cache network 12414 is further coupled to cache home agent and/or next level cache 12412. In certain embodiments, accelerator-cache network 12414 is separate from any (for example, circuit switched or packet switched) network of an accelerator (e.g., accelerator tile), e.g., RAF is the interface between the accelerator (e.g., accelerator tile) and the cache. In one embodiment, a cache home agent is to connect to a memory (e.g., separate from the cache banks) to access data from that memory (e.g., memory 202 in FIG. 2), e.g., to move data between the cache banks and the (e.g., system) memory. In one embodiment, a next level cache is a (e.g., single) higher level cache, for example, such that the next level cache (e.g., higher level cache 12412) is checked for data that was not found (e.g., a miss) in a lower level cache (e.g., cache banks in FIG. 124). In one embodiment, this data is payload data. In another embodiment, this data is a physical address to virtual address mapping. In one embodiment, a CHA is to perform a search of (e.g., system) memory for a miss (e.g., a miss in the higher level cache 12412) and not perform a search for a hit (e.g., the data being requested is in the cache being searched).

At time circled 5, PE 12416 pops a (e.g., most recent) value from the stack implements in the in-fabric storage 12406. Note that time 5 is just an example, and data may be popped from the stack at any time. In one embodiment, PEBY16 is coupled to the in-fabric storage via a circuit switched network as discussed herein.

In one embodiment, a component of accelerator (e.g., an accelerator tile) 12408 (e.g., one of a distributed set of processing elements) sends a memory request (e.g., via a packet switched network and/or circuit switched network of the accelerator) to access a memory location (e.g., virtual address), for example, a memory location that is separate from the accelerator (e.g., accelerator tile). The request may be sent to a RAF circuit (e.g., RAF circuit 12404). Although the number of RAF circuits and cache banks are depicted as six, any one or plurality of RAF circuits and/or any one or plurality of cache banks may be utilized in certain embodiments herein. The number of RAF circuits may be the same or different than the number of cache banks. A RAF circuit may be coupled to any of the cache banks, e.g., via accelerator-cache network 12414. The depicted arrangement of components is on example and other arrangements are possible, for example, a next level cache and/or cache home agent (CHA) may be omitted in certain embodiments.

Fast Clear Mode

In one embodiment, a CSA architecture includes a configuration value that, when stored into the configuration storage (e.g., register), causes a buffer box element thereof to operate in a Fast Clear mode according to the following (e.g., semantics and/or description).

In certain embodiments, fast clear mode is used in addition to FIFO mode, RAM mode (e.g., clearing RAM in the course of a calculation), and ROM mode. As one example, a (e.g., control) input queue is set (e.g., with a LIC) such that a first value on the input queue is to clear certain (e.g., all) of the data in the buffer box element. For example, in FIFO mode, the head and tail pointer are reset to clear the data in one embodiment.

FIGS. 125A-125D illustrate a buffer box element 12500 performing a fast clearing operation while fast clearing mode is enabled according to embodiments of the disclosure. In the depicted embodiment, an operation configuration value includes a mode field (set to fast clearing mode) (e.g., mode field in FIGS. 109 and 110) stored (e.g., during a programming time period) into operation configuration register 12519.

In FIGS. 125A-125D, the number(s) in the circles in (e.g., control) input queue 12506 are the values (e.g., one or zero), and the other numbers in the circles are labels of an instance of data (and not the value of the data itself).

Figure 125A:
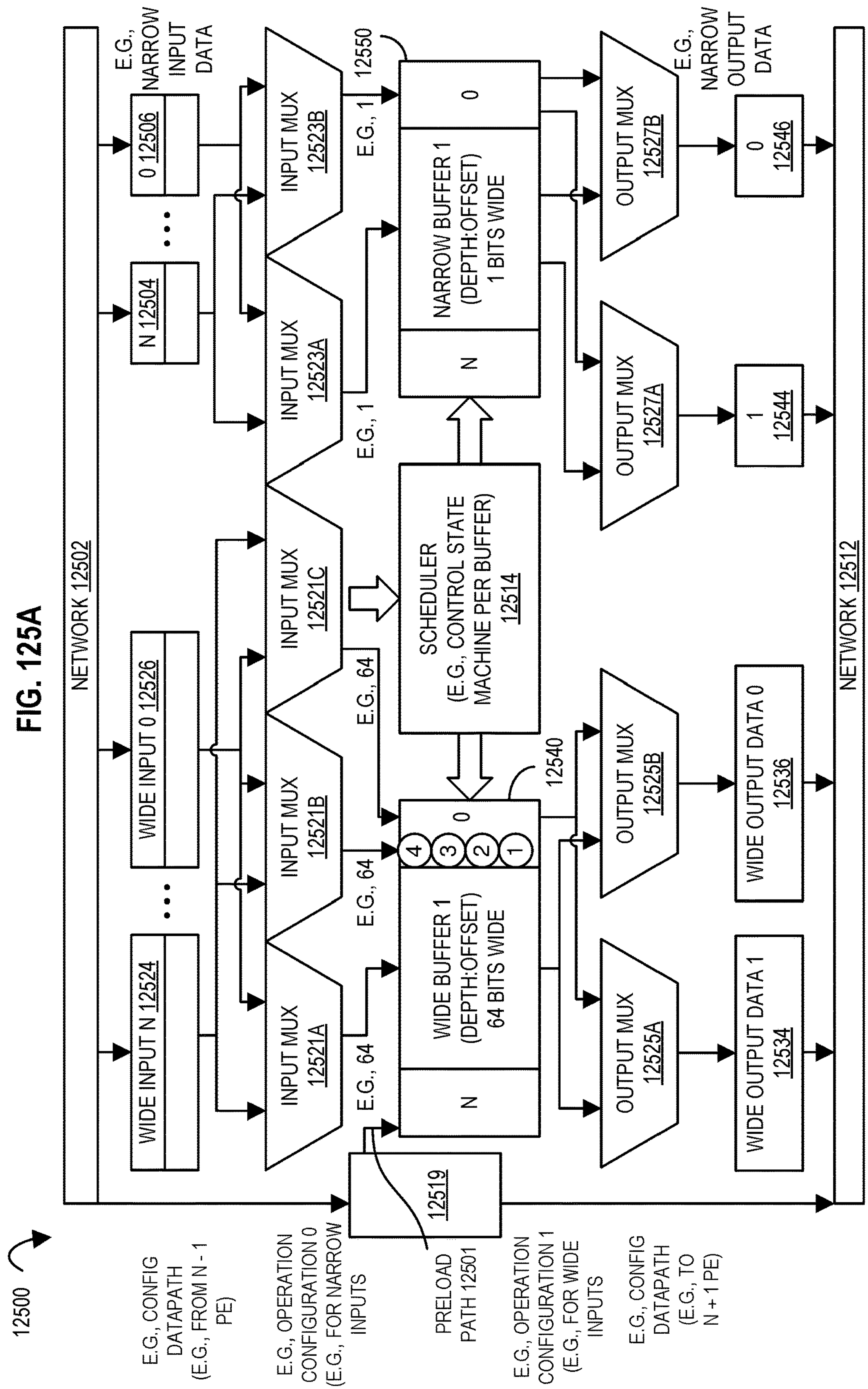

In FIG. 125A, a (e.g., data) value labeled circled 1 is stored into the (e.g., first storage location of) buffer storage 12540, a (e.g., data) value labeled circled 2 is stored into the (e.g., second storage location of) buffer storage 12540, a (e.g., data) value labeled circled 3 is stored into the (e.g., third storage location of) buffer storage 12540, and a (e.g., data) value labeled circled 4 is stored into the (e.g., fourth storage location of) buffer storage 12540. In one embodiment, those four values have been previously loaded into the buffer storage 12540, for example, according to the FIFO, RAM, or ROM discussions above.

Figure 125B:
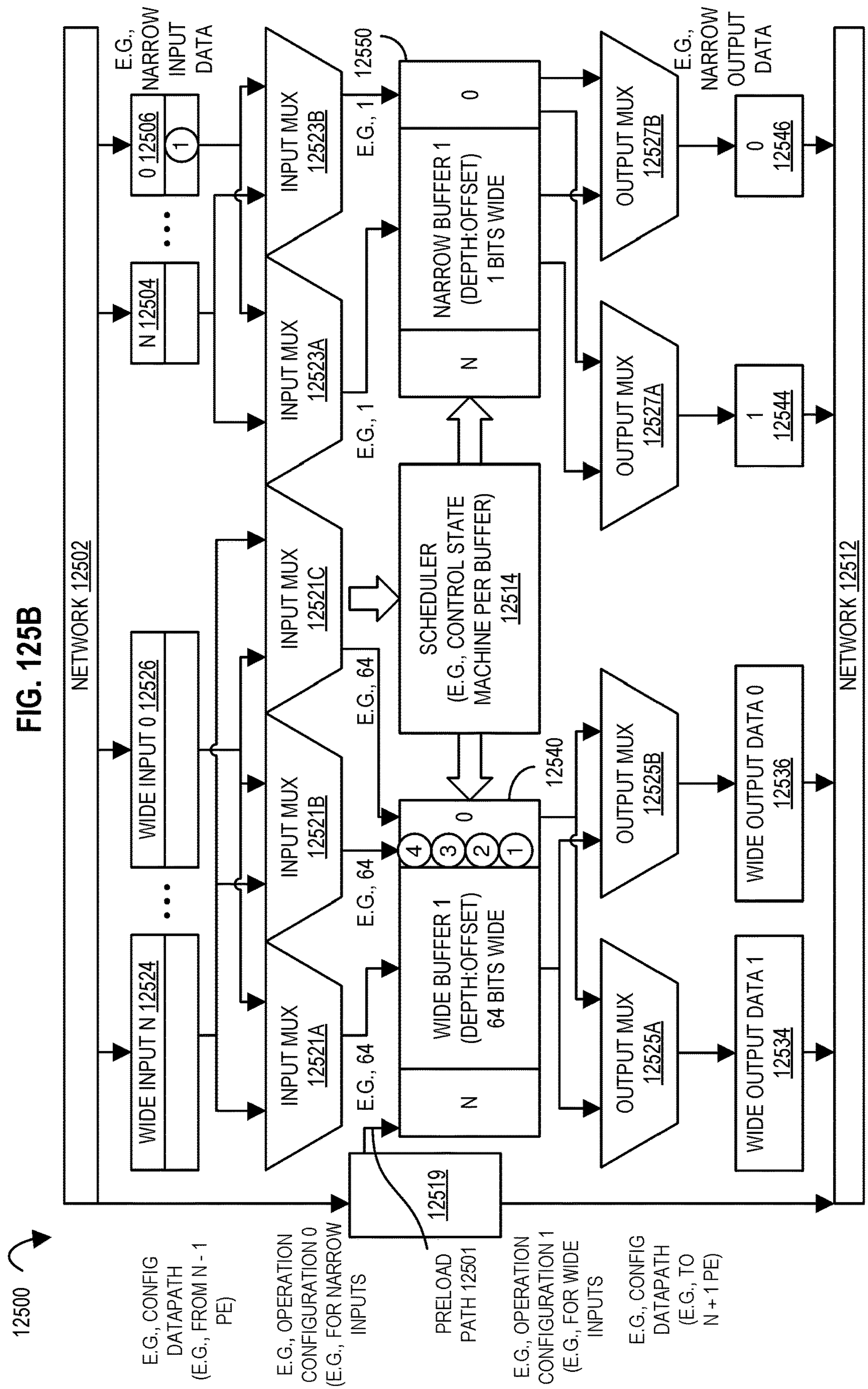

In FIG. 125B, a "fast clear" value (e.g., one) is stored in the (e.g., control) input queue 12506, e.g., from an upstream PE or other CSA component.

Figure 125C:
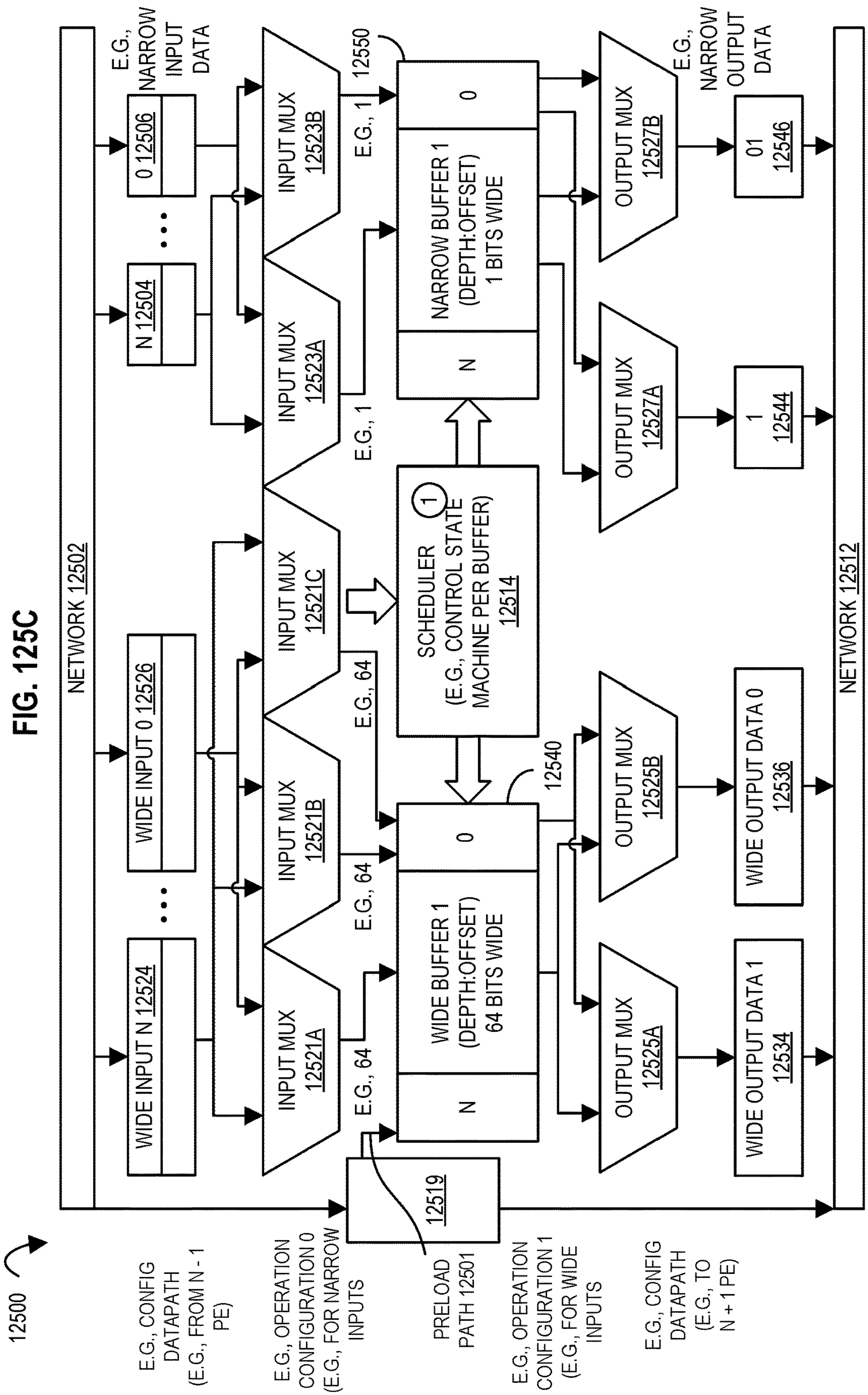

In FIG. 125C, buffer box element 12500 (e.g., scheduler 12514) reads the fast clear value (e.g., of one) from input queue 12506, dequeues it from input queue 12506, and clears (e.g., deletes) all of the values stored in buffer storage 12540. In one embodiment, a single input queue 12506 controls the clearing of all the buffer storage 12540 and buffer storage 12550. In another embodiment, a first input queue (e.g., 12506) controls the clearing of buffer storage 12540 and a second input queue (e.g., 12504) controls the clearing of buffer storage 12550.

Figure 125D:
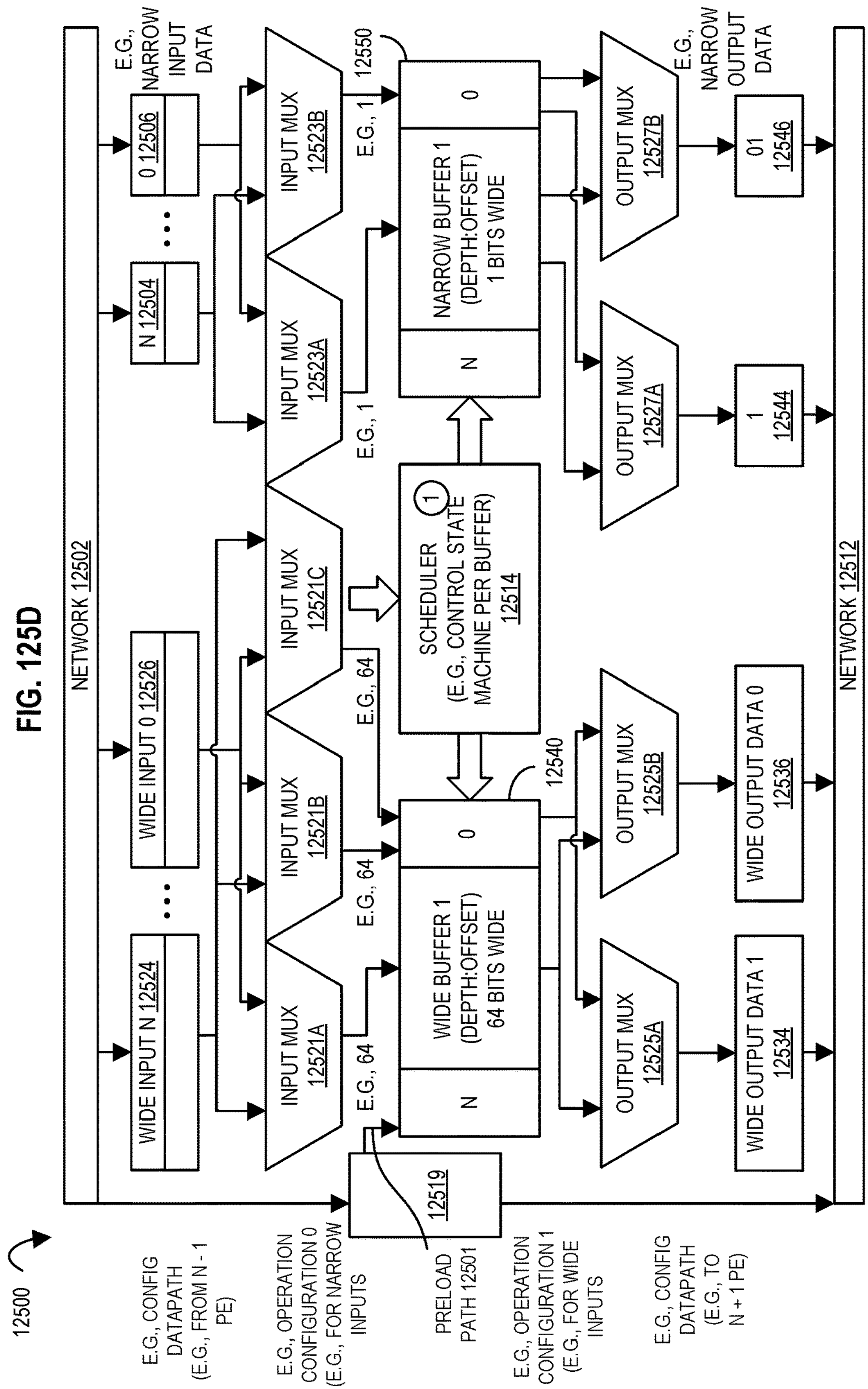

In FIG. 125D, the fast clear has completed, e.g., and the buffer box element 12500 returns to it previous function (e.g., FIFO, RAM, or ROM mode).

In the depicted embodiment, buffer box element 12500 includes the components of buffer box element 10800 from FIG. 108, for example, with the components ending with the same two numbers having the same functionality. In one embodiment, scheduler 12514 schedules an operation or operations of buffer box element 12500 for performance according to the configuration value, e.g., and when input data and control input arrives.

Fountain Operations

In one embodiment of a CSA, there are two aspects to a dataflow graph: (i) data compute nodes and (ii) nodes which do support work (e.g., control). In certain embodiments, it is desirable to keep the control logic and circuitry as small and not impactful to the overall performance of the graph as possible. In one embodiment, control in dataflow (e.g., spatial) graphs is a stream of single bit values, e.g., which are formed into sequences to control data flow through the graph. As one example, a CSA architecture includes a "fountain" operation used to generate streams of patterns used for control (e.g., for a loop operation) and/or used to generate data patterns for specific workload calculations with a single PE (e.g., not multiple PEs). In one embodiment, the number of PEs generating control values is less than one times, less than two times, or less than three times the number of PEs generating data values.

In one embodiment, a CSA architecture includes a configuration value that, when stored into the configuration storage (e.g., register), causes the CSA (e.g., a PE thereof) to operate as a fountain according to the following (e.g., semantics and/or description).

An operation that produces results continuously is generally referred to as a "fountain". There are some fountains, such as mov64 lic, 10, which would generate the value 10 constantly filling the output. The fountain operations below are designed to provide repeating sequences of values, not just a single literal. These may be useful in constructing patterns to feed various control structures.

These operations may be used with in-fabric CSA storage (e.g., buffer box elements) where the address feeding the fountains holding the pattern is in the in-fabric CSA storage (e.g., scratchpad), and not in memory (e.g., cache or system memory).

respective instance of head determiner 3700) is moved to the next entry in the order of (A, B, C, D) to output that pattern (e.g., within the PE or to an output queue of the PE).

This fountain functionality may be added in as microarchitecture onto all processing elements, e.g., allowing them to generate (e.g., small) "N" (e.g., 1 to 14 elements) of bit patterns as inputs into the processing element's operation circuitry (e.g., ALU). For example, where each processing element contains multiple input queues (FIFO queues) for each operand sent to the PE, storing literals (e.g., values which are preprogrammed into the PE during graph configuration) allows the PE to cycle through the entries creating a small pattern (e.g., the size of the number of total slots in the queues.

Figure 127:
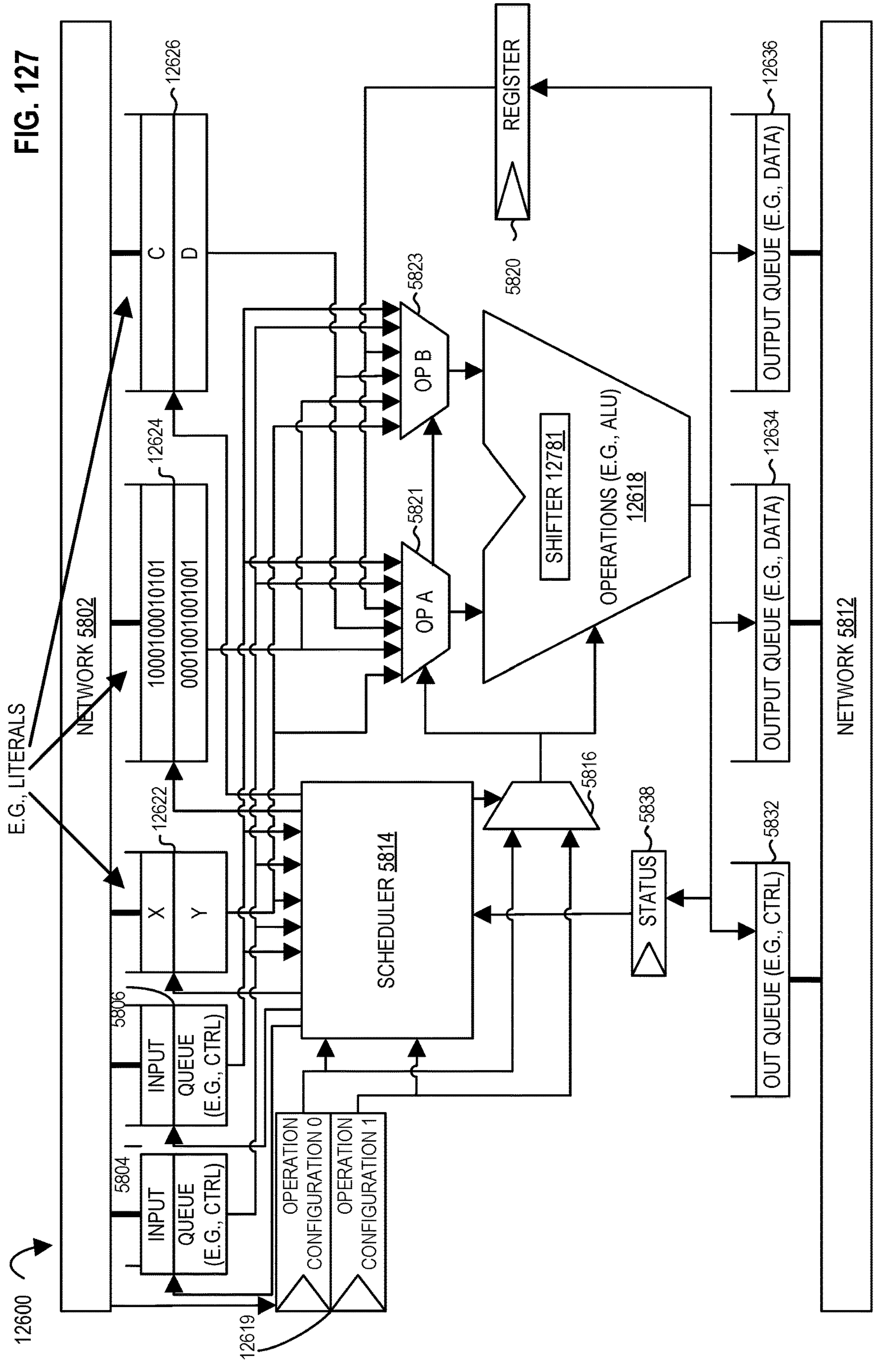

FIG. 127 illustrates a processing element (PE) 12700 that includes fountain functionality from a shifter circuit 12781 according to embodiments of the disclosure. In the depicted embodiment, a first literal value (as an example string of bits) is loaded into the first slot of input queue 12624, and

```
Operation: fountain{1,8,16,32,64} res.CRd.iN, addr.Lu.a64, len.Lu.u64, seq.CRLu.i1=1
Description: Given the sequence of values stored at the specified addr, of length len elements,
generate the values out successively to the output channel. The values are stored densely for
the type - e.g., for 1b, the values are in adjacent bits.
addr is intended to be a constant scratchpad address. For addressable types, this operation
is equivalent to:
    sldN chan, addr, len, 1, %ign, %ign
As with any operation, if the operands are all literals, the operation will re-trigger
continuously. Without a seq control, fountain will generate an infinitely repeating stream.
With a seq control, as long as the seq value is 1, operation will proceed as normal, emitting
one value for each seq value. When the seq value is a 0, no value will be emitted, and the
sequence will reset to the start.
Note that fountain may be implemented in different ways from a microarchitecture
perspective. In particular, fountain1 operations with lengths less than 64 may well be
reduced to just needing a single integer unit rather than a scratchpad.
Examples:
                    // sequence of 64b values
                    .section .csa.sp.1
pat1:               .quad 10,20,30,40
                    . text
                    fountain64 res, pat1, 4, c
                    // if c was 1,1,1,1,1,1,0,1,1..., the output would be:
                    // 10, 20, 30, 40, 10, 20, 10, 20...
                    // If c was instead the literal 1 (default), you would
                    // get an infinite repeat of 10, 20, 30, 40, ...
                    // sequence of 1b values
                    .section .csa.sp.2
pat2:               .quad 0b001111111100
                    . text
                    fountain1 res2, pat2, 12
```

Figure 126:
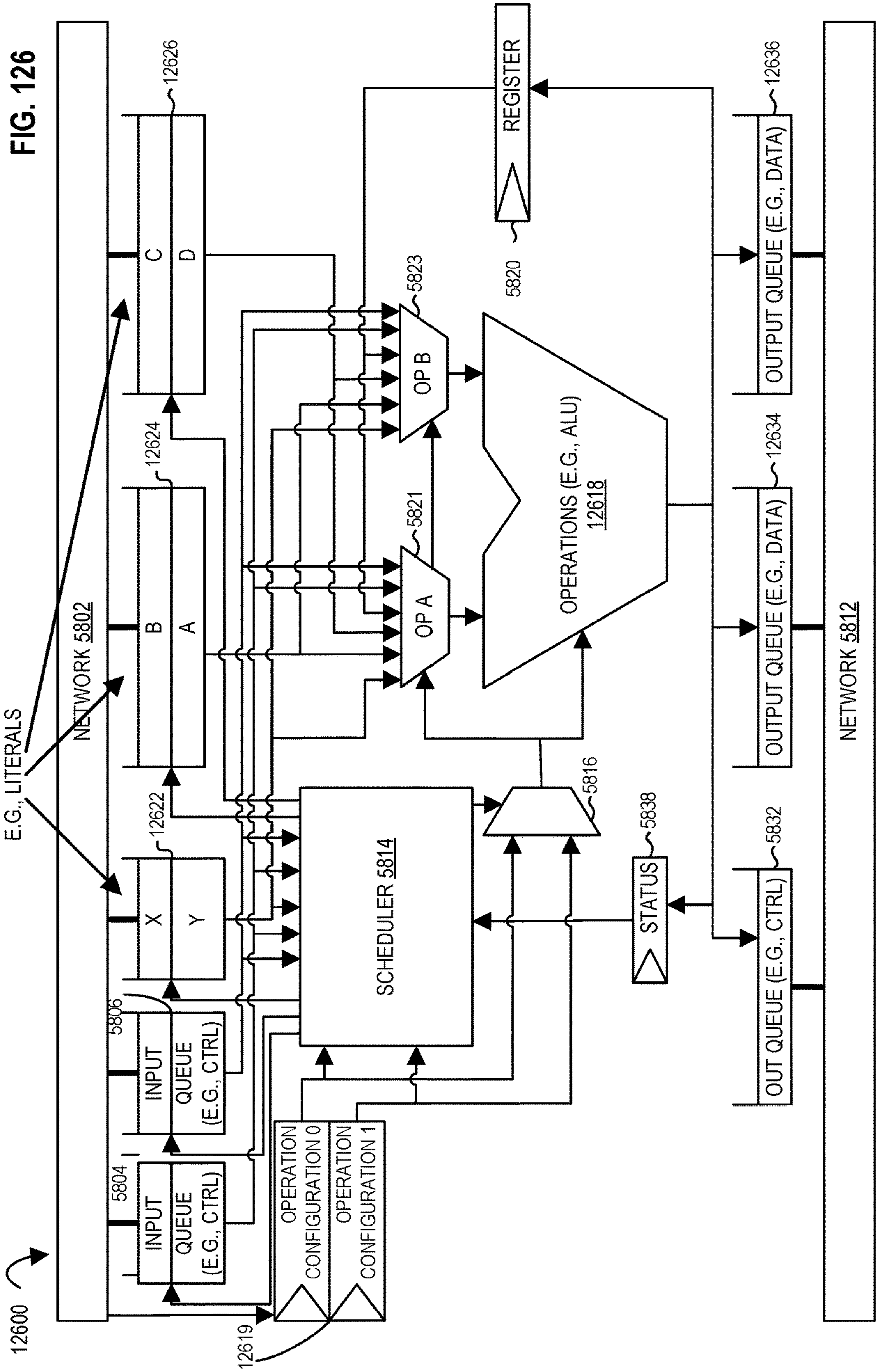

FIG. 126 illustrates a processing element (PE) 12600 that includes fountain functionality according to embodiments of the disclosure. In certain dataflow graphs, it is desirable that a small fountain (e.g., of 1 to 4 values) be provided, but those values may not be easily predetermined. As one solution, PE 12600 includes fountain functionality that, e.g., when a fountain enabling configuration value is loaded into configuration storage 12619, implements a fountain of values (e.g., 1 to 4 values). In one embodiment, literals are stored into the slots of one of more slots of one of more of input queues 12622, 12624, and/or 12626. For example, in the depicted embodiment, a first literal value (labeled A) is loaded into the first slot of input queue 12624, a second literal value (labeled B) is loaded into the second slot of input queue 12624, a third literal value (labeled C) is loaded into the first slot of input queue 12626, and a fourth literal value (labeled D) is loaded into the second slot of input queue 12624. When it is desired to produce a pattern of values (A, B, C, D) those values are not dequeued from the input queues, but instead the dequeue pointers (e.g., using a optionally, a second literal value (as an example string of bits) is loaded into the second slot of input queue 12624. PE 12700 is to use the shifter circuit (e.g., which is to shift one or both of the literal values) to generate a desired output pattern. As one example, PE 12700, as used in fountain mode, is to generate patterns up to the size of the input queues. As another example, PE 12700, as used in fountain mode, is to generate patterns the size of #PAT BITS=(input_queue_width)*(input_queue_depth).

In one embodiment, during normal operation the shifter in the PE will implement a normal shifter calculation when needed, but when the PE is configured to implement a fountain, the input queues (FIFOs) are preloaded during configuration with literal values defining the bit pattern to generate. In certain embodiments, an N bit counter (e.g., the size of the counter is based on the number of pattern bits to generate) is used to control the shift amount. In one embodiment, a first value out will be shifted by 0, then shifted by 1, etc., and the output will be pulled from the last bit shifted out. This fountain functionality using a shifter circuit allows the programmer to generate a complex pattern using a single PE (e.g., where if created by an equation might take 3-5 or more PEs).

In one embodiment, when the PE is configured to implement a fountain, a (e.g., preloaded before execution of a dataflow graph) literal value(s) is (are) shifted in a desired pattern to produce an output pattern from the literal value(s). In one embodiment, the output of the desired pattern is sent on a bit by bit basis to a (e.g., single bit) output queue (e.g., 12732). In certain embodiments, the (e.g., narrow) input queue receives a value that is used to select start, stop, reset, or do not use a current value (e.g., bit or bits) of the literal value.

In certain embodiments, a (e.g., narrow) input queue (e.g., 12722) receives a (e.g., single bit) value used as predicate to control the mode of the fountain. Example modes are:

a. a first value of a single bit (e.g., 1) starts the pattern and a second value of the single bit (e.g., 0) stops the pattern,
b. a first value of a single bit (e.g., 1) resets the pattern (e.g., restarts the pattern), or
c. a first value of a single bit (e.g., 1) drops a next (e.g., zero) bit of the pattern, and a second value of the single bit (e.g., 0) continues with next bit in the pattern.

Figure 128:
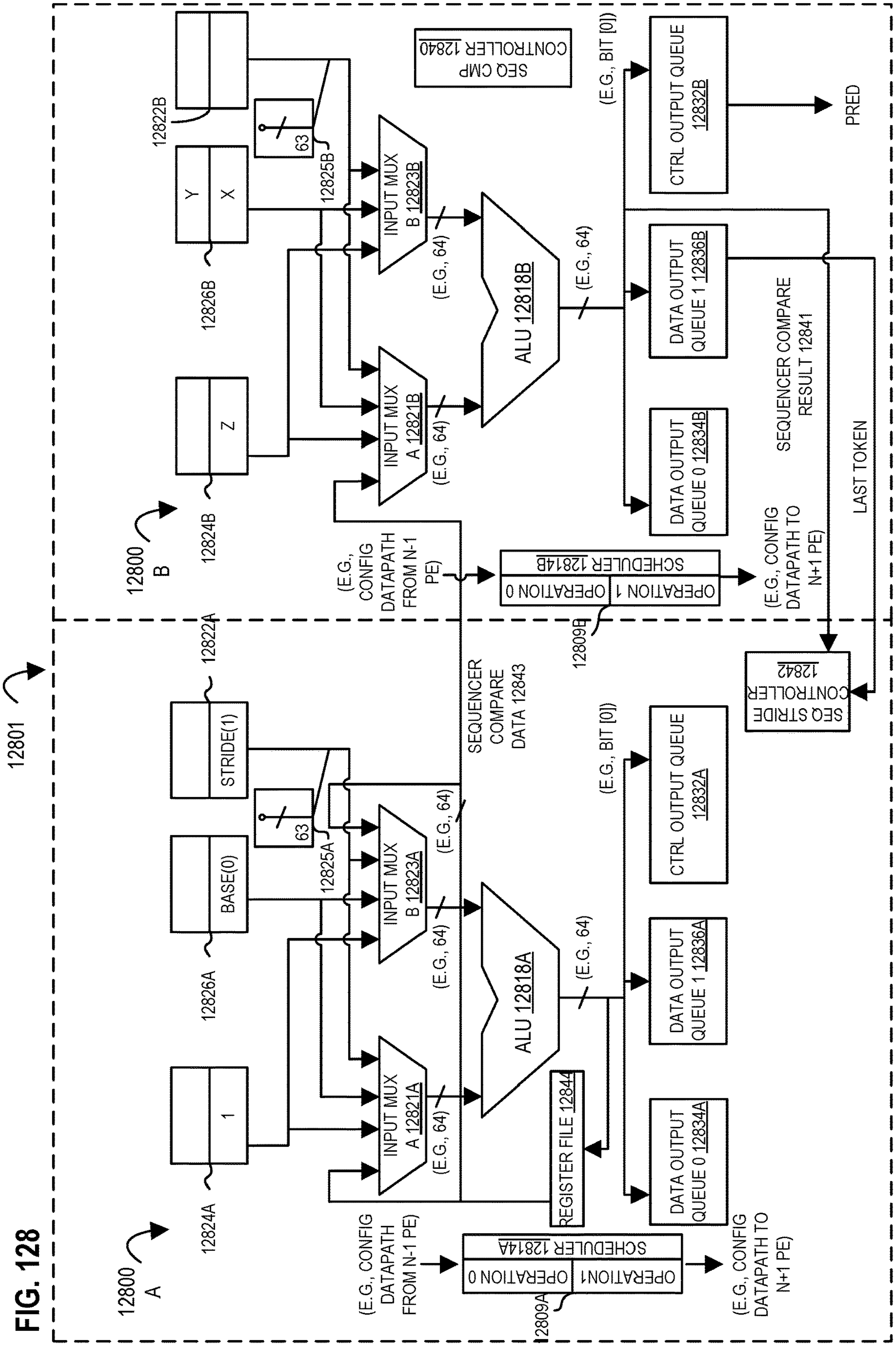

FIG. 128 illustrates fountain functionality for a sequencer dataflow operator 12801 implementation on processing elements (12800A, 12800B) according to embodiments of the disclosure. The below further discusses the baseline functionality of the sequencer dataflow operator 12801, but first the discussion is of the additional fountain functionality. Adding the fountain functionality to sequencer dataflow operator 12801 allows the generation of (e.g., commonly used) bit patterns for data graphs. The pattern generates #x[0 or 1] followed by #y[0 or 1] followed by #z[0 or 1].

In the fountain implementation mode, the sequencer dataflow operator 12801 is to load the base value and stride value as literals in input queue(s) of PE 12800A (e.g., shown with the base value stored in input buffer 12824A and the stride value stored in input buffer 12826A). In certain embodiments, this forces the counter 128 42 to start at 0 and count by 1 every time it starts. Literals (labeled X, Y, and Z) are loaded into the input queues of PE 12800B and specifying the length of X, Y, and Z. The input queues of "compare" PE 12800B are used to let the "sequence" PE 12800A know that it has completed in this embodiment. For example, when the sequencer PE 12800A starts, it counts from 0 with a stride of 1 to value X, and once value X is reached, a restart signal is sent to the SEQ Stride counter (e.g., in register 12844) to restart the counter, at the same time the sequence compare controller 12840 changes the pointer to point to the Y value. The counting process continues, starting at 0 and counting by 1 each time until the total reaches the value Y. The counter in 12800A is then reset again to zero, and counting continues until the total reaches the value Z. While counting up to X, a constant pattern value (e.g. 1) The bit values for X, Y, Z are determined as part of the command and are stored within the PE's control registers changing the output value generated for each section, in one embodiment. In another embodiment, this is expanded to N number of sub patterns consisting of some length of 0 and 1 values, by increasing the size and number of input queues for the compare values (e.g. in this example X, Y, and Z and 12824A, 12826A), as well as the state machine states in the controller. In one embodiment, a controller is to use dedicated restart line instead of the last_token narrow channel loop.

In one baseline (e.g., non-fountain) example, processing element 12800A of sequencer dataflow operator 12801 is to perform an add or subtract (e.g., to increment or decrement a counter for the number of iterations) and processing element 12820B is to perform a compare (e.g., to compare the current iteration to the number of iterations to either continue or stop the operation being performed by the sequencer dataflow operator 12801). The left part (e.g., left half) (e.g., processing element 12800A) of the sequencer dataflow operator 12801 has a (e.g., single) (e.g., 64 bit) register(s) 12844, for example, which is used to accumulate the stride data (e.g., stride data token) repeatedly into the base data (e.g., base data token). This may be referred to as the sequencer stride PE (seqstr). The right part (e.g., right half) (e.g., processing element 12800B) of the sequencer dataflow operator 12801 has a (e.g., single) (e.g., 64 bit) register(s) 12844, for example, which is used to do comparison operations. This may be referred to as the sequencer compare PE (seqcmp). The compare result may be passed back (e.g., on datapath 12841) from from sequencer compare PE (seqcmp) (e.g., processing element 12800B) to the sequencer stride PE (seqstr) (e.g., processing element 12800A), for example, so both PEs together decide when the sequence is done (e.g., the sequencer compare PE (seqcmp) (e.g., processing element 12800B) updates the sequencer stride PE (seqstr) (e.g., processing element 12800A) when the end (e.g., limit or bound) is reached).

In one embodiment, data passed into the sequencer dataflow operator 12801 includes a new strided length, e.g., where processing element 12800A is performing the add (or subtract) of the strided length to the total number of strides (e.g., iterations) thus far and processing element 12800B is performing the compare of that total number of strides (e.g., iterations) thus far to the total number of strides (e.g., iterations) to be performed.

Sequencer dataflow operator 12801 (e.g., processing element 12800B) may include a sequencer compare controller 12840. Sequencer compare controller 12840 may cause the processing element 12800B to perform the compare of that total number of strides (e.g., iterations) thus far (e.g., stored in register(s) 12844) to the total number of strides (e.g., iterations) to be performed (e.g., stored in register(s) 12844). Sequencer dataflow operator 12801 (e.g., processing element 12800A) may include a sequencer stride controller 12842. Sequencer stride controller 12842 may cause the processing element 12800A to performing the add (or subtract) of the strided length (e.g., increment for each iteration) (e.g., in one embodiment, the strided length is one unit (e.g., a numerical one)) to the total number of strides (e.g., iterations) thus far (e.g., "res" in FIG. 3A). For each iteration of the operation (e.g., for-loop), sequencer dataflow operator 12801 may output the appropriate control signals (e.g., to a pick operator (e.g., implemented on its own PE and/or switch operator (e.g., implemented on its own PE)) (for example, the control signals depicted inside the circles in FIG. 8 (steps 1-8) to cause each iteration of the total number of iterations to be performed.

Another possible implementation of a sequencer dataflow operator is to use a single integer PE that contains two ALUs (e.g., one is used for accumulation and the other is used for comparison). The two ALUs may be pipelined (e.g., with additional pipeline hazard control circuitry) to maximize circuit frequency and/or the two ALUs may be put in series in a single clock cycle, e.g., to simplify the controller. In one embodiment, data passed into the sequencer dataflow operator 12801 includes a new strided length, e.g., where processing element 12800A is performing the add (or subtract) of the strided length to the total number of strides (e.g., iterations) thus far and processing element 12800B is performing the compare of that total number of strides (e.g., iterations) thus far to the total number of strides (e.g., iterations) to be performed.

Additionally or alternatively to forming a sequencer dataflow operator, each of processing elements 12800A and 12800B may perform as an integer PE.

In one embodiment, operation configuration register 2109A is loaded during configuration (e.g., mapping) and specifies the particular operation (or operations) this processing (e.g., compute) element is to perform. Scheduler 2114A (e.g., operations selector) may schedule an operation or operations of processing element 2100A, for example, when input data and control input arrives. Input and outputs (e.g., via queue(s)) may be sent via a network, e.g., any network discussed herein. Control input queue 2122A may be connected to local network (e.g., and local network may include a data path network as in FIG. 7A and a flow control path network as in FIG. 7B) and is loaded with a value when it arrives (e.g., the network has a data bit(s) and valid bit(s)). Control input queue 12822A may be coupled to zero generator 12825A, e.g., to add leading or trailing zeros to the value from control input queue 12822A to form a desired width of data item (e.g., 64 bits). Control output queue 12832A, data output queue 12834A, and/or data output queue 12836A may receive an output of processing element 12800A, e.g., as controlled by the operation (an output of scheduler 12814A). In one embodiment, operation configuration register 12809A is loaded during configuration (e.g., mapping) and specifies the particular operation (or operations) this processing (e.g., compute) element is to perform (e.g., and if adjacent PE 12800B is to be used for a joint operation, e.g., a sequence operation). Data in control input queue 12822A and control output queue 12832A may be a single bit. Mux 12821A (e.g., operand A) and mux 12823A (e.g., operand B) may source inputs.

For example, suppose the operation of this processing (e.g., compute) element is (or includes) what is called call a pick in FIG. 3B. The processing element 12800A then is to select data from either data input queue 12824A or data input queue 12826A, e.g., to go to data output queue 12834A (e.g., default) or data output queue 12836A. The control bit in 12822A may thus indicate a 0 if selecting from data input queue 12824A or a 1 if selecting from data input queue 12826A.

For example, suppose the operation of this processing (e.g., compute) element is (or includes) what is called a switch in FIG. 3B. The processing element 12800A is to output data to data output queue 12834A or data output queue 12836A, e.g., from data input queue 12824A (e.g., default) or data input queue 12826A. The control bit in 12822A may thus indicate a 0 if outputting to data output queue 12834A or a 1 if outputting to data output queue 12836A.

Multiple networks (e.g., interconnects) may be connected to a processing element, e.g., (input) networks (e.g., networks 902, 904, 906 and (output) networks 908, 910, 912 in FIG. 9). The connections may be switches, e.g., as discussed in reference to FIGS. 7A and 7B. In one embodiment, each network includes two sub-networks (or two channels on the network), e.g., one for the data path network in FIG. 7A and one for the flow control (e.g., backpressure) path network in FIG. 7B. As one example, local network may be (e.g., set up as a control interconnect) switched (e.g., connected) to couple to control input queue 12822A. In this embodiment, a data path (e.g., network as in FIG. 7A) may carry the control input value (e.g., bit or bits) (e.g., a control token) and the flow control path (e.g., network) may carry the backpressure signal (e.g., backpressure or no-backpressure token) from control input queue 12822A, e.g., to indicate to the upstream producer (e.g., PE) that a new control input value is not to be loaded into (e.g., sent to) control input queue 12822A until the backpressure signal indicates there is room in the control input queue 12822A for the new control input value (e.g., from a control output queue of the upstream producer). In one embodiment, the new control input value may not enter control input queue 12822A until both (i) the upstream producer receives the "space available" backpressure signal from "control input" queue 12822A and (ii) the new control input value is sent from the upstream producer, e.g., and this may stall the processing element 12800A until that happens (and space in the target, output queue(s) is available).

Data input queue 12824A and data input queue 12826A may perform similarly, e.g., local network (e.g., set up as a data (as opposed to control) interconnect) may be switched (e.g., connected) to couple to data input queue 12824A. In this embodiment, a data path (e.g., network as in FIG. 7A) may carry the data input value (e.g., bit or bits) (e.g., a dataflow token) and the flow control path (e.g., network) may carry the backpressure signal (e.g., backpressure or no-backpressure token) from data input queue 12824A, e.g., to indicate to the upstream producer (e.g., PE) that a new data input value is not to be loaded into (e.g., sent to) data input queue 12824A until the backpressure signal indicates there is room in the data input queue 12824A for the new data input value (e.g., from a data output queue of the upstream producer). In one embodiment, the new data input value may not enter data input queue 12824A until both (i) the upstream producer receives the "space available" backpressure signal from "data input" queue 12824A and (ii) the new data input value is sent from the upstream producer, e.g., and this may stall the processing element 12800A until that happens (and space in the target, output queue(s) is available). A control output value and/or data output value may be stalled in their respective output queues (e.g., 12832A, 12834A, 12836A) until a backpressure signal indicates there is available space in the input queue for the downstream processing element(s).

A processing element 12800A may be stalled from execution until its operands (e.g., a control input value and its corresponding data input value or values) are received and/or until there is room in the output queue(s) of the processing element 12800A for the data that is to be produced by the execution of the operation on those operands.

In one embodiment, operation configuration register 12809B is loaded during configuration (e.g., mapping) and specifies the particular operation (or operations) this processing (e.g., compute) element is to perform. Scheduler 12814B (e.g., operations selector) may schedule an operation or operations of processing element 12800A, for example, when input data and control input arrives. Input and outputs (e.g., via queue(s)) may be sent via a network, e.g., any network discussed herein. Control input queue 12822B may be connected to local network (e.g., and local network may include a data path network as in FIG. 7A and a flow control path network as in FIG. 7B) and is loaded with a value when it arrives (e.g., the network has a data bit(s) and valid bit(s)). Control input queue 12822B may be coupled to zero generator 12825B, e.g., to add leading or trailing zeros to the value from control input queue 12822B to form a desired width of data item (e.g., 64 bits). Control output queue 12832B, data output queue 12834B, and/or data output queue 12836B may receive an output of processing element 12800B, e.g., as controlled by the operation (an output of scheduler 12814B). In one embodiment, operation configuration register 12809B is loaded during configuration (e.g., mapping) and specifies the particular operation (or operations) this processing (e.g., compute) element is to perform (e.g., and if adjacent PE 12800A is to be used for a joint operation, e.g., a sequence operation). In one embodiment, operation configuration register 12809A and operation configuration register 12809B are loaded with a configuration value, e.g., that includes fountain functionality. Data in control input queue 12822B and control output queue 12832B may be a single bit. Mux 12821B (e.g., operand A) and mux 12823B (e.g., operand B) may source inputs.

For example, suppose the operation of this processing (e.g., compute) element is (or includes) what is called call a pick in FIG. 3B. The processing element 12800B then is to select data from either data input queue 12824B or data input queue 12826B, e.g., to go to data output queue 12834B (e.g., default) or data output queue 12836B. The control bit in 12822B may thus indicate a 0 if selecting from data input queue 12824B or a 1 if selecting from data input queue 12826B.

For example, suppose the operation of this processing (e.g., compute) element is (or includes) what is called call a switch in FIG. 3B. The processing element 12800B is to output data to data output queue 12834B or data output queue 12836B, e.g., from data input queue 12824B (e.g., default) or data input queue 12826B. The control bit in 12822B may thus indicate a 0 if outputting to data output queue 12834B or a 1 if outputting to data output queue 12836B.

Multiple networks (e.g., interconnects) may be connected to a processing element, e.g., (input) networks (e.g., networks 902, 904, 906 and (output) networks 908, 910, 912 in FIG. 9). The connections may be switches, e.g., as discussed in reference to FIGS. 7A and 7B. In one embodiment, each network includes two sub-networks (or two channels on the network), e.g., one for the data path network in FIG. 7A and one for the flow control (e.g., backpressure) path network in FIG. 7B. As one example, local network may be (e.g., set up as a control interconnect) switched (e.g., connected) to couple to control input queue 12822B. In this embodiment, a data path (e.g., network as in FIG. 7A) may carry the control input value (e.g., bit or bits) (e.g., a control token) and the flow control path (e.g., network) may carry the backpressure signal (e.g., backpressure or no-backpressure token) from control input queue 12822B, e.g., to indicate to the upstream producer (e.g., PE) that a new control input value is not to be loaded into (e.g., sent to) control input queue 12822B until the backpressure signal indicates there is room in the control input queue 12822B for the new control input value (e.g., from a control output queue of the upstream producer). In one embodiment, the new control input value may not enter control input queue 12822B until both (i) the upstream producer receives the "space available" backpressure signal from "control input" queue 12822B and (ii) the new control input value is sent from the upstream producer, e.g., and this may stall the processing element 12800B until that happens (and space in the target, output queue(s) is available).

Data input queue 12824B and data input queue 12826B may perform similarly, e.g., local network (e.g., set up as a data (as opposed to control) interconnect) may be switched (e.g., connected) to couple to data input queue 12824B. In this embodiment, a data path (e.g., network as in FIG. 7A) may carry the data input value (e.g., bit or bits) (e.g., a dataflow token) and the flow control path (e.g., network) may carry the backpressure signal (e.g., backpressure or no-backpressure token) from data input queue 12824B, e.g., to indicate to the upstream producer (e.g., PE) that a new data input value is not to be loaded into (e.g., sent to) data input queue 12824B until the backpressure signal indicates there is room in the data input queue 12824B for the new data input value (e.g., from a data output queue of the upstream producer). In one embodiment, the new data input value may not enter data input queue 12824B until both (i) the upstream producer receives the "space available" backpressure signal from "data input" queue 12824B and (ii) the new data input value is sent from the upstream producer, e.g., and this may stall the processing element 12800B until that happens (and space in the target, output queue(s) is available). A control output value and/or data output value may be stalled in their respective output queues (e.g., 12832B, 12834B, 12836B) until a backpressure signal indicates there is available space in the input queue for the downstream processing element(s).

A processing element 12800B may be stalled from execution until its operands (e.g., a control input value and its corresponding data input value or values) are received and/or until there is room in the output queue(s) of the processing element 12800B for the data that is to be produced by the execution of the operation on those operands.

In certain embodiments, a processing element (PE) has one or a plurality of (e.g., two or three) operations that it may perform, e.g., the PE may be configured based on the input of the operation (e.g., operation value) into a PE.

Although certain embodiments herein illustrate an output queue with a single slot, other embodiments utilize an output queue with a plurality of slots, for example, such that stalling based on the output queue occurs when all of the plurality of the slots are used (e.g., are full).

Figure 129:
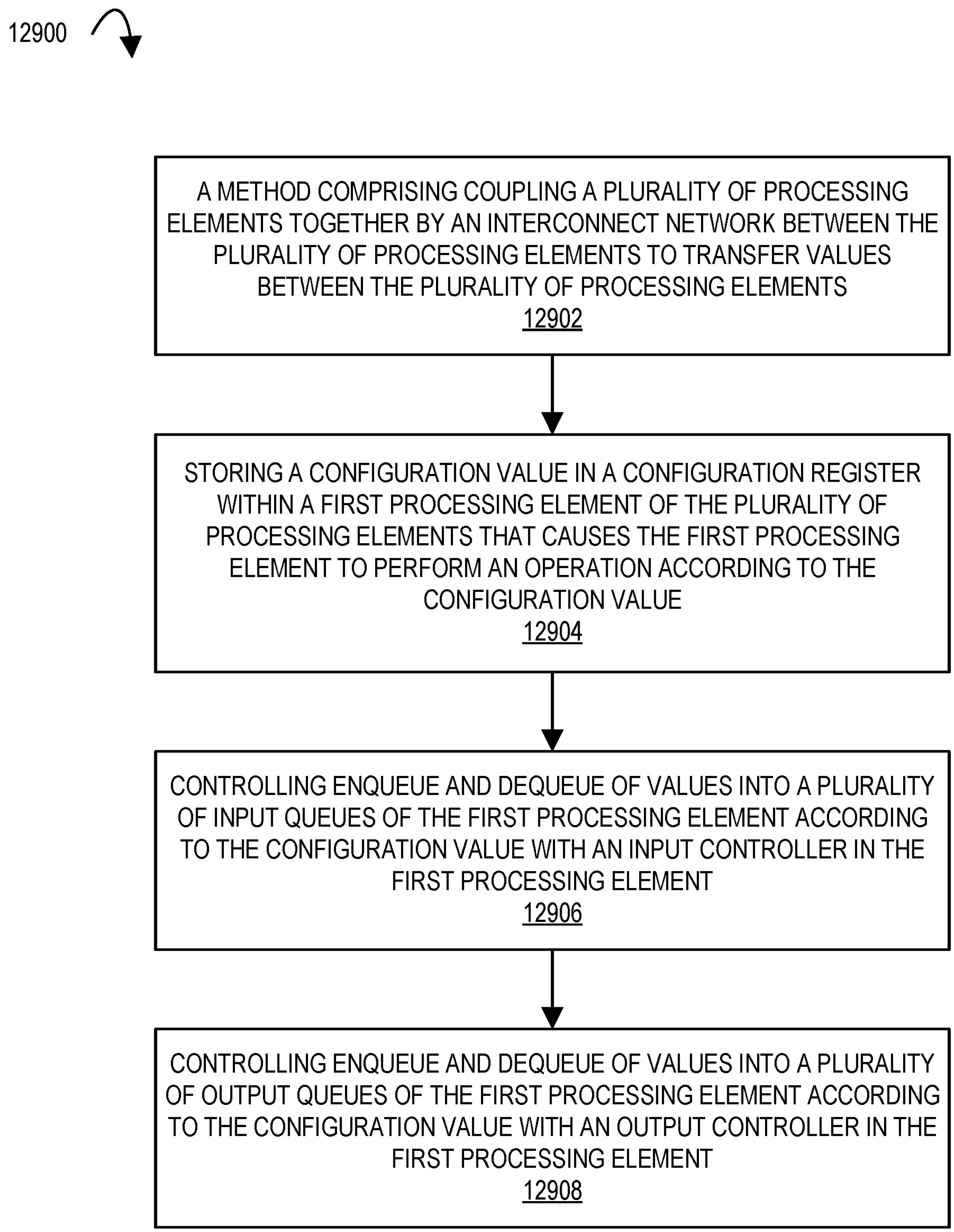

FIG. 129 illustrates a flow diagram 12900 according to embodiments of the disclosure. Depicted flow 12900 includes coupling a plurality of processing elements together by an interconnect network between the plurality of processing elements to transfer values between the plurality of processing elements 12902; storing a configuration value in a configuration register within a first processing element of the plurality of processing elements that causes the first processing element to perform an operation according to the configuration value 12904; controlling enqueue and dequeue of values into a plurality of input queues of the first processing element according to the configuration value with an input controller in the first processing element 12906; and controlling enqueue and dequeue of values into a plurality of output queues of the first processing element according to the configuration value with an output controller in the first processing element 12908.

Other Operations

Other operations (e.g., logical operation and/or arithmetic operation) of a CSA architecture may be part of a set of operations. In certain embodiments, one or more of the following is loaded (e.g., by a corresponding configuration value) in a CSA component (e.g., PE) to cause the following semantics and/or description to be performed:

| Integer Operation | Semantics | Description |
|---|---|---|
| mov{0-64} res.CRd.iN, op1.CRLu.iN | res = op1 | move data-uninterpreted |
| not{1-64} res.CRd.iN, op1.CRLu.iN | res = ~op1 | logical bitwise not |
| neg{8-64} res.CRd.iN, op1.CRLu.iN | res = ~op1 | two's complement negation |
| ctlz18-64} res.CRd.u8, op1.CRLu.uN | res = ctlz(op1) | count leading zeros of input operand written as binary integer. Returns integer ranging from 0 up to N where N is size of operation |
| cttz{8-64} res.CRd.u8, op1.CRLu.uN | res = cttz(op1) | count trailing zeros of input written as binary integer. Returns integer ranging from 0 up to N where N is size of operation |
| ctpop{8-64} res.CRd.u8, op1.CRLu.uN | res = ctpop(op1) | count number of '1' bits in input operand written as binary integer. Returns integer ranging from 0 up to N where N is size of operation |
| parity{8-64} res.CRd.ul, op1.CRLu.uN | res = parity(op1) | parity-result 0 if there are an even number of '1' bits in input operand written as binary integer, and result 1 if an odd number of '1' bits. |
| and{1-64} res.CRd.iN, op1.CRLu.iN, op2.CRLu.iN | res = op1 & op2 | bitwise and |
| or{1-64} res.CRd.iN, op1.CRLu.iN, op2.CRLu.iN | res = op1 \| op2 | bitwise or |
| xor{1-64} res.CRd.iN, op1.CRLu.iN, op2.CRLu.iN | res = op1 ^ op2 | exclusive or |
| add{8-64} res.CRd.iN, op1.CRLu.iN, op2.CRLu.iN | res = op1 + op2 | two's complement add |
| sub{8-64} res.CRd.iN, op1.CRLu.iN, op2.CRLu.iN | res = op1 − op2 | two's complement subtract |
| adc{8-64} res.CRd.iN, resc.CRd.iN, op2.CRLu.iN, op3.CRLu.iN, c.CRLu.iN | tmp = op3 + c; res = op2 + tmp; resc = (op3 > tmp) \| (op2 > result); | add with carry |
| sbb{8-64} res.CRd.iN, resc.CRd.iN, op2.CRLu.iN, op3.CRLu.iN, c.CRLu.iN | tmp = op2 − op3; res = tmp − c; resc = (op2 < tmp) \| (tmp < res) | subtract with borrow |
| sex{8-64}res.CRd.uN, op1.CRLu.uN, op2.CRLu.uN | int t = (−op2)&(N-1); res = (op1<<t)>>t | sign extend from position |
| s11{8-64} res.CRd.iN, op1.CRLu.iN, op2.CRLu.iN | res = op1<<(op2&(N-1)) | shift left logical |
| sr1{8-64} res.CRd.uN, op1.CRLu.uN, op2.CRLu.uN | res = op1>>(op2&(N-1)) | shift right logical. The (op2 & (N-1)) MSB of the output are set to 0. |
| sra{8-64} res.CRd.sN, op1.CRLu.sN, op2.CRLu.sN | res = op1>>(op2&(N-1)) | shift right arithmetic in two's complement signed context. The (Op2 & (N-1)) MSB of the output are set to the value of the MSB of the input. |
| sladd{8-64} res.CRd.sN, op1.CRLu.sN, op2.CRLu.sN, op3.CRLu.iN | res = (op1<<(op2&(N-1))) + op3 | shift left and add |
| mul{8-64} res.CRd,uN, op1.CRLu.uN, op2.CRLu.uN | res = op1 * op2 | multiply. The result contains the N least significant bits of the product. |
| xmul{s \| u} {8-32} res.CRd.x2N, op1.CRLu.xN, op2.CRLu.xN | res = op1 * op2 | Full product multiply. The result contains all 2N bits of the product. |
| divs{8-64} res.CRd.sN, op1.CRLu.sN, op2.CRLu.sN | res = op1 / op2 | signed division |
| divu{8-64} res.CRd,uN, op1.CRLu.uN, op2.CRLu.uN | res = op1 / op2 | unsigned division |

Operation: cmp{lt,le,eq,gt,ge,ne}[s,u]N res.CRd.i1, op1.CRLu.(i,s,u)N, op2.CRLu.(i,s,u)N
Semantics: res = {comparison}(op1, op2)
Description: Comparison relation on the appropriate type and signedness, yielding a 1 bit result. e.g. cmpleu16 is for a 16b unsigned less than or equal to comparison
The specific opcodes are:
cmplts8 cmplts16 cmplts32 cmplts64
cmpltu8 cmpltu16 cmpltu32 cmpltu64
cmples8 cmples16 cmples32 cmples64
cmpleu8 cmpleu16 cmpleu32 cmpleu64
cmpeq8 cmpeq16 cmpeq32 cmpeq64
cmpgts8 cmpgts16 cmpgts32 cmpgts64
cmpgtu8 cmpgtu16 cmpgtu32 cmpgtu64

-continued cmpges8 cmpges16 cmpges32 cmpges64
cmpgeu8 cmpgeu16 cmpgeu32 cmpgeu64
cmpne8 cmpne16 cmpne32 cmpne64

---

Operation: copy{0-64} o0.CRd.iN, o1.CRd.iN, o2.CRd.iN, o3.CRd.in, src.CRLu.iN
Semantics: o0 = src; o1 = src; o2 = src; o3 = src
Description: Create a copy of src in each output channel

---

Operation: mcast{0-64} in.CRLu.iN, outm.CRu.iN... // Up to 13 outputs currently
Semantics:
out[*] = in // all outputs get the value of in
Description: All outputs get the value of the input - e.g., a copy operation. The exact timing of this operator is implementation specific, and like with all Virtual ISA, may be transformed in various ways by the late tool chain. It is expected that long-term this will subsume copy. (If it weren't such an undertaking to change everywhere, this would be called "copy"...)
Alternative names for this operator that would keep the word copy might include: rcopy (for either "revised copy" or "reversed operand copy") or ncopy ("new copy" or "n-output copy") or mcopy ("multi-copy".) Given how much we talk about copies, one of these might be a better choice than mcast.
For the specific case of V1, the expected implementation model is less rigid than might be expected by a naïve description. In particular, in is read, and with 0 cycle latency may be presented to all outputs. The operation is effectively stateful, and each output may accept the value as soon as it is able. (This does not mean that the consuming operation must be able to read it , only that the channel can accept it.) A particular instance of mcast completes on the cycle when the last outputs can accept the value. e.g. if there is an mcast with 3 outputs. It is possible it will start issuing cycle N when in is available. One output might be able to accept the value in cycle N, another in cycle N+1, and another in cycle N+3. The mcast retires in cycle N+3, and can process the next input if it is available in cycle N+4.
This is obviously very implementation-specific, but the key is there is no requirement that all recipient channels must be available for the op to issue. In theory, other multi-output ops would be valid to implement this way, but in practice, most don't issue until all outputs are simultaneously writable.

---

Operation: switch{0-64} o0.CRd.iN, o1.CRd.iN, idx.CRLu.i1, src.CRLu.iN
Semantics: o[idx] = src (non-index o not accessed)
Description: Send src to the output specified by idx. Only the selected channel is written, and only the selected channel needs to be available for writing for the operation to execute.

---

Operation: switchany{0-64} o0.CRd.iN, o1.CRd.iN, idx.CRd.i1, src.CRLu.iN, mode.Lu.i1=0
Semantics: idx = {some o[*] available} ; o[idx] = src (others not accessed)
Description: Send src a single output based on availability, and generate idx for the selected output. Only the selected channel is written. This can be used to feed workers from a single stream (a more "push" model rather than pull.) If the mode operand has the value 0 (default), this performs a prioritized switch, selecting o0 preferentially over o1 if both can accept new values. If the mode operand has value 1, this will send the value to the last operand not selected, if it has space available.

Operation: merge{0-64} dst.CRd.iN, idx.CRLu.i1, i0.CRLu.iN, i1.CRLu.iN
Semantics: read all inputs (i0 and i1); dst = i[idx];
Description: Consume all input values, sending forward the selected one based on index.

---

Operation: pick{0-64} dst.CRd.iN, idx.CRLu.i1, i0.CRLu.iN, i1.CRLu.iN
Semantics: dst = i[idx] (read only the selected index others not accessed)
Description: Pick an input value based on a selector. Identical to merge except only the selector
and selected value are consumed, and others are not

---

Operation: pickany{0-64} dst.CRd.iN, idx.CRd.i1, i0.CRLu.iN, i1.CRLu.iN, mode.Lu.i1=0
Semantics: idx = {some i[*] available}; dst = i[idx] (others not acc)
Description: Pick any from a set of available values, reporting the selected one (unordered merge -
e.g. a building block for reorderable reductions, etc.) If the mode operand has the value 0 (default),
this performs a prioritized pick, selecting i0 preferentially over i1 if both are available. If the mode
operand has value 1, this will pick the last operand not selected, if available.

---

Operation: any0 idx.CRd.i64, i0.CRLu.i0, i1.CRLu.i0=N, i2.CRLu.i0=N, i3.CRLu.i0=N, ord.Lu.i1=0
Semantics: available (i[*]) for any arbitrary index; index is returned.
Description: Return an index of one in a set of values. Only the selected index is consumed. The assembler defaults unused operands to %na so the operation can be straightforwardly be used with
fewer operands. If the ord parameter is 0, the first available index is chosen. If the ord parameter is
1, the search is round robin, starting with the index following the last selected. (e.g. if i1 was the
last returned available, the search order for the next available with ord=0 will be i0, i1, i2, i3,
while for ord=1 it will be i2, i3, i0, i1.)

---

Operation: all0 o.CRd.i0, i0.CRLu.i0, i1.CRLu.i0=I, i2.CRLu.i0=I, i3.CRLu.i0=I
Semantics: available (i[*])
Description: Wait for all inputs - 1st part of a barrier (pair with copy to fan back out) The assembler
defaults unused operands to %ign so the operation can be straightforwardly be used with fewer operands.

---

Operation: filter{0-64} res.CRd.iN, filter.CRu.i1, val.CRLu.iN
Semantics: This operation filters a set of values based on corresponding predicates. If filter operand is true (operand value = 1), val is copied to res.
If filter operand is false (operand value = 0), val is consumed, but res is not written.

```
filterN r, g, v
```

is equivalent to

```
switchN %ign, r, f, v # send v to %ign or r based on f
```

---

| Floating point operation | Semantics | Description |
|---|---|---|
| negf{32,64} res.CRd.fN, op1.CRLu.fN | res = −op1 | floating point negation |
| absf{32,64} res.CRd.fN, op1.CRLu.fN | res = abs (op1) | floating point absolute value |

-continued

| Floating point operation | Semantics | Description |
|---|---|---|
| addf{32,64} res.CRd.fN, op1.CRLu.fN, op2.CRLu.fN, rndmode.Lu.u64=R | res = op1 + op2 | floating point add |
| subf{32,64} res.CRd.fN, op1.CRLu.fN, op2.CRLu.fN, rndmode.Lu.u64=R | res = op1 − op2 | floating point subtract |
| mulf{32,64} res.CRd.fN, op1.CRLu.fN, op2.CRLu.fN, rndmode.Lu.u64=R | res = op1 * op2 | floating point multiply |
| fmaf{32,64} res.CRd.fN, op1.CRLu.fN, op2.CRLu.fN, op3.CRLu.fN, rndmode.Lu.u64=R | res = op1 * op2 + op3 | Fused multiply add with no intermediate rounding |
| fmsf{32,64} res.CRd.fN, op1.CRLu.fN, op2.CRLu.fN, op3.CRLu.fN, rndmode.Lu.u64=R | res = op1 * op2 − op3 | Fused multiply sub with no intermediate rounding |
| fmrsf{32,64} res.CRd.fN, op1.CRLu.fN, op2.CRLu.fN, op3.CRLu.fN, rndmode.Lu.u64=R | res = op3 − op1 * op2 | Fused multiply sub reversed with no intermediate rounding |
| rcp14f{32,64} res.CRd.f32, divisor.CRLu.fN | res = 1/divisor (only 14b) | Approximate reciprocal for the divisor. Only 14 bits are significant. |
| rsqrt14f{32,64} res.CRd.f32, val.CRLu.f3 | res = sqrt(val) (only 14b) | Approximate sqrt for val. Only 14 bits are significant. |
| Operations below will likely not be implemented directly, but as some form of expansion | | |
| divf{32,64} res.CRd.fN, op1.CRLu.fN, op2.CRLu.fN, rndmode.Lu.u64=R | res = op1/op2 | division (expected to be handled via expansion) |

Floating Point Comparison

Floating point comparisons are like their integer counterparts in that they generate 1 bit results in this embodiment.

| |
|---|
| Operation: cmp{lt,le,eq,gt,ge,ne,o,un}f{32,64} res.CRd.i1l, op1.CRLu.fN, op2.CRLu.fN, order.Lu.i1, signal.Lu.i1 |
| Semantics: res = {comparison}(op1, op2) |
| If order bit 0 is 0, the comparison is UNORDERED. If 1, ORDERED. |
| If signal bit 1 is 0, the comparison is NONSIGNALING. If 1, SIGNALING. |
| Description: Comparison relation on the appropriate type, yielding a 1 bit result, e.g. cmplef32 is for a floating 32b less than or equal to comparison. o is an ordered comparison, .uo is an unordered comparison. |

The specific opcodes are:

| Floating point comparison | Semantics | Description |
|---|---|---|
| cmpltf32 | res = op1 < op2 | Less than |
| cmpltf64 | | |
| cmplef32 | res = op1 <= op2 | Less than or equal to |
| cmplef64 | | |
| cmpeqf32 | res = op1 == op2 | Equal |
| cmpeqf64 | | |
| cmpgtf32 | res = op1 > op2 | Greater than |
| cmpgtf64 | | |
| cmpgef32 | res = op1 >= op2 | Greater than or equal to |
| cmpgef64 | | |
| cmpnef32 | res = op1 != op2 | Not equal |
| cmpnef64 | | |
| cmpof32<br>cmpof64 | res = !(std::isnan(op1) \|\| std::isnan(op2)) | Neither is NaN |
| cmpuof32<br>cmpuof64 | res = (std::isnan(op1) \|\| std::isnan(op2)) | Either is NaN |

Floating Point Conversion

Generally there are conversions between f32, f64, u32 and u64. If f16 were added, the expectation is that would need to be converted through f32 to get to integer types.

| Floating point conversions | Semantics | Description |
|---|---|---|
| cvts32f32 res.CRd.s32, op1.CRLu.f32, rndmode.Lu.u64=R | res = (s32_t)op1 | Convert to s32 from f32 |
| cvts32f64 res.CRd.s32, op1.CRLu.f64, rndmode.Lu.u64=R | res = (s32_t)op1 | Convert to s32 from f64 |
| cvtu32f32 res.CRd.u32, op1.CRLu.f32, rndmode.Lu.u64=R | res = (u32_t)op1 | Convert to u32 from f32 |

-continued

| Floating point conversions | Semantics | Description |
|---|---|---|
| cvtu32f64 res.CRd.u32, op1.CRLu.f64, rndmode.Lu.u64=R | res = (u32_t)op1 | Convert to u32 from f64 |
| cvts64f32 res.CRd.s64, op1.CRLu.f32, rndmode.Lu.u64=R | res = (s64_t)op1 | Convert to s64 from f32 |
| cvts64f64 res.CRd.s64, op1.CRLu.f64, rndmode.Lu.u64=R | res = (s64_t)op1 | Convert to s64 from f64 |
| cvtu64f32 res.CRd.u64, op1.CRLu.f32, rndmode.Lu.u64=R | res = (u64_t)op1 | Convert to u64 from f32 |
| cvtu64f64 res.CRd.u64, op1.CRLu.f64, rndmode.Lu.u64=R | res = (u64_t)op1 | Convert to u64 from f64 |
| cvtf32s32 res.CRd.f32, op1.CRLu.s32, rndmode.Lu.u64=R | res = (f32_t)op1 | Convert to f32 from s32 |
| cvtf32u32 res.CRd.f32, op1.CRLu.u32, rndmode.Lu.u64=R | res = (f32_t)op1 | Convert to f32 from u32 |
| cvtf32s64 res.CRd.f32, op1.CRLu.s64, rndmode.Lu.u64=R | res = (f32_t)op1 | Convert to f32 from s64 |
| cvtf32u64 res.CRd.f32, op1.CRLu.u64, rndmode.Lu.u64=R | res = (f32_t)op1 | Convert to f32 from u64 |
| cvtf32f64 res.CRd.f32, op1.CRLu.f64, rndmode.Lu.u64=R | res = (f32_t)op1 | Convert to f32 from f64 |
| cvtf64u32 res.CRd.f64, op1.CRLu.u32, rndmode.Lu.u64=R | res = (f64_t)op1 | Convert to f64 from u32 |
| cvtf64s32 res.CRd.f64, op1.CRLu.s32, rndmode.Lu.u64=R | res = (f64_t)op1 | Convert to f64 from s32 |
| cvtf64s64 res.CRd.f64, op1.CRLu.s64, rndmode.Lu.u64=R | res = (f64_t)op1 | Convert to f64 from s64 |

-continued

| Floating point conversions | Semantics | Description |
|---|---|---|
| cvtf64u64 res.CRd.f64, op1.CRLu.u64, rndmode.Lu.u64=R | res = (f64_t)op1 | Convert to f64 from u64 |
| cvtf64f32 res.CRd.f64, op1.CRLu.f32, rndmode.Lu.u64=R | res = (f64_t)op1 | Convert to s32 from f32 |

| Floating Point (FP) Arithmetic Operations | Semantics | Description |
|---|---|---|
| sqrtf{32,64} res.CRd.fN, op1.CRLu.fN | res = sqrt(op1) | square root |
| exp2f{32,64} res.CRd.fN, op1.CRLu.fN | res = exp2(op1) | exp2 |
| expf{32,64} res.CRd.fN, op1.CRLu.fN | res = exp(op1) | exp |
| log2f{32,64} res.CRd.fN, op1.CRLu.fN | res = log2(op1) | log2 |
| logf{32,64} res.CRd.fN, op1.CRLu.fN | res = log(op1) | log |
| sinf{32,64} res.CRd.fN, op1.CRLu.fN | res = sin(op1) | sin |
| cosf{32,64} res.CRd.fN, op1.CRLu.fN | res = cos(op1) | cos |
| tanf{32,64} res.CRd.fN, op1.CRLu.fN | res = tan(op1) | tan |
| atanf{32,64} res.CRd.fN, op1.CRLu.fN | res = atan(op1) | atan |
| atan2f{32,64} res.CRd.fN, op1.CRLu.fN, op2.CRLu.fN | res = atan2(op1,op2) | atan2 |
| powf{32,64} res.CRd.fN, op1.CRLu.fN, op2.CRLu.fN | res = pow(op1,op2) | pow |
| ceilf{32,64} res.CRd.fN, op1.CRLu.fN | res = cell(op1) | cell |
| floorf{32,64} res.CRd.fN, op1.CRLu.fN | res = floor(op1) | floor |
| roundf{32,64} res.CRd.fN, op1.CRLu.fN | res = round(op1) | round |
| truncf{32,64} res.CRd.fN, op1.CRLu.fN | res = trunc(op1) | trunc |
| modf{32,64} resi.CRd.fN, resf.CRd.fn, opl.CRLu.fN | resi,resf = mod(op1) | floating mod |

| Operation | Description |
|---|---|
| ld{8-64} res.CRd.iN, base.CRLu.a64, outord.CRd.i0=I, inord.CRu.i0=I, memlvl.Lu.i64=T, xoutord.CRd.i0=I | Load, address indirect. N bits of storage are read at address base and returned as res. |
| ld{8-64}d res.CRd.iN, base.CRLu.a64, disp.CRLu.164, outord.CRd.i0=I, inord.CRu.i0=I, memlvl.Lu.i64=T, xoutord.CRd.i0=I | Load with displacement. N bits of storage are read at address base+disp and returned as res. |
| ld{8-64}x res.CRd.iN, base.CRLu.a64, index.CRLu.164, outord.CRd.i0=I, inord.CRu.i0=I, memlvl.Lu.i64=T, xoutord.CRd.i0=I | Load with scaled index. N bits of storage are read at address base+index* (N/8) and returned as res. |
| st{8-64} base.CRLu.a64, val.CRu.iN, outord.CRd.i0=I, inord.CRu.i0=I, memlvl.Lu.i64=T, xoutord.CRd.i0=I | Store, address indirect. val is stored to address base |
| st{8-64}d base.CRLu.a64, disp.CRLu.164, val.CRu.iN, outord.CRd.i0=I, inord.CRu.i0=I, memlvl.Lu.i64=T, xoutord.CRd.i0=I | Store with displacement. val is stored to address base+disp |
| st{8-64}x base.CRLu.a64, index.CRLu.i64, val.CRu.iN, outord.CRd.i0=I, inord.CRu.i0=I, memlvl.Lu.i64=T, xoutord.CRd.i0=I | Store with scaled index. val is stored to address base+index* (N/8) |

Operation: sld{8-64} data.CRd.iN, addr.CRLu.a64, len.CRLu.u64, stride.CRLu.i64=1, outord.CRd.i0=I, inord.CRu.i0=I, memlvl.Lu.i64=T, xoutord.CRd.i0=I Semantics:
```
inord; tmp = addr;
for (i=0; i<len; i++) {
   data = *tmp;
   tmp += stride*(N/8); }
outord = 0; // local visibility
xoutord = 0; // external visibility
```

Description: Perform a series of loads of a sequence, based on the starting address, length and stride. e.g.

sld64 res, addr, 12, 2, . . .

Will load 12, 64b values, from addr, addr+16, addr+32, . . . addr+176

-continued

The outord value is defined once after all component loads have completed sufficiently to not be affected by other operations.
Note: The order component memory accesses for this load are UNPREDICTABLE. All that is guaranteed is that all component loads occur after the input constraint is satisfied, and before the outord is written. What is guaranteed is all values will be returned in order on the data channel. Normally, this should not be an issue, but if some other actor is modifying memory while the load is occurring, there is no defined behavior in terms of what values are seen. (e.g. if some other actor stored x to a[i], and y to a[i+1], it would be possible for the load to return x for a[i], but an older value for a[i+1].) Basically, the load "owns" the memory for the duration of the access, and concurrent writes yield UNPREDICTABLE results.

---

Operation: sst{8-64} addr.CRLu.a64, len.CRLu.u64, stride.CRLu.i64, data.CRLu.iN, outord.CRd.i0=I, inord.CRu.i0=I, memlvl.Lu.i64=T, xoutord.CRd.i0=I Semantics:

```
inord; tmp = addr;
for (i=0; i<len; i++) {
   *tmp = data;
   tmp += stride*(N/8); }
outord = 0; // local visibility
xoutord = 0; // external visibility
```

Description: Perform a series of stores of a sequence, based on the starting address, length and stride. e.g.

sst64 addr, 12, 2, data, . . .

Will store 12, 64b values, to addr, addr+16, addr+32, addr+48 . . . addr+176, from data
The outord value is defined once after all component stores have completed sufficiently to not be affected by other operations.
Note: The order of component memory updates for this store are UNDEFINED. All that is guaranteed is that all component stores occur after the input constraint is satisfied, and before the outord is triggered. A concrete example:

sst8 addr, 0, addr, len, 1 zeros a region of memory. The stores in that region can happen in any order. e.g. a valid implementation would be to write the bytes in random order until they were all zeroed. The only guarantee is that the memory will be all zeroed by the time the operation completes.
Note that a valid if naïve implementation of memcpy (dest, src, n) would be:

sld8 data, addr, n, 1, %ign, ctlin  # when ctl input is present, load triggers
sst8 addr, data, n, 1, ctlout, %ign It will likely be more efficient to have a version that checked for 64b multiple size, and used sld64/sst64 for that case, so it would do 64b/cycle instead of 8b. And of course, a really optimized version would do 16, 64b aligned chunks simultaneously.

---

Operation: sld{8-64}x2 data0.CRd.iN, data1.CRd.iN, addr.CRLu.a64, len.CRLu.u64, stride.CRLu.i64, outord.Cd.i0=I, inord.Cu.i0=I, memlvl.Lu.i64=T, xoutord.Cd.i0=I Semantics:

```
// for data list of length k
inord; tmp = addr;
// load up to k values each "iteration".
for (i=0; i<len; ) } {
   data0 = *tmp; i++; if (i>=len) break;
   tmp += N/8*stride;
   data1 = *tmp; i++; if (i>=len) break;
   tmp += N/8*stride;
}
outord = 0; // local visibility
xoutord = 0; // external visibility
```

Description: Perform a load of a sequence, up to the number in the output list at a time, based on the starting address, length and stride. e.g.

sld64x8 res0, res1, addr, 13, 2, . . .

Will load 13, 64b values, from addr, addr+16, addr+32, . . . addr+176 with the first 6 returns having values both on res0 and res1, and the last one only on res0.
outord value is defined once after all component loads have completed sufficiently to not be affected by other operations.
Note that as with other strided operations, the Version 1 implementation may only benefit if the stride is a literal value of 1.
Note: The order component memory accesses for this load are UNPREDICTABLE. All that is guaranteed is that all component loads occur after the input constraint is satisfied, and before the outord is written. What is guaranteed is all values will be returned in order on the data channels. Normally, this should not be an issue, but if some other actor is modifying memory while the load is occurring, there is no defined behavior in terms of what values are seen. (e.g. if some -continued other actor stored x to a[i], and y to a[i+1], it would be possible for the load to return x for a[i], but an older value for a[i+1].) Basically, the load "owns" the memory for the duration of the access, and concurrent writes yield UNPREDICTABLE results.

---

Operation: sld{8-64}x8 data0.CRd.iN, . . . data7.CRd.iN, addr.CRLu.a64, len.CRLu.u64, stride.CRLu.i64, outord.Cd.i0=I, inord.Cu.i0=I, memlvl.Lu.i64=T, xoutord.Cd.i0=I Semantics:
```
// for data list of length k
inord; tmp = addr;
// load up to k values each "iteration".
for (i=0; i<len; ) } {
    data0 = *tmp; i++; if (i>=len) break;
    tmp += N/8*stride;
    data1 = *tmp; i++; if (i>=len) break;
    tmp += N/8*stride;
    . . .
    data{k-1} = *tmp; i++; if (i>=len) break;
    tmp += N/8*stride;
}
outord = 0; // local visibility
xoutord = 0; // external visibility
```

Description: Perform a load of a sequence, up to the number in the output list at a time, based on the starting address, length and stride. e.g.

sld64x8 res0, res1, %na, %na, %na, %na, %na, %na, addr, 13, 2, . . .

Will load 13, 64b values, from addr, addr+16, addr+32, . . . addr+176, with the first 6 returns having values both on res0 and res1, and the last one only on res0.

sld64x8 res0, res1, res2, res3, %na, %na, %na, %na, addr, 13, 2, . . .

Will also load 13 values, but with 3 values on each channel, then one only on res0.

outord value is defined once after all component loads have completed sufficiently to not be affected by other operations.

One example usage of this is to load a full cache line at a time - e.g. 8, 64b values. Note that while this is expected to be no worse than scalar operations, different implementations may get different benefits.

Note that as with other strided operations, the Version 1 implementation may only benefit if the stride is a literal value of 1.

Note: The order component memory accesses for this load are UNPREDICTABLE. All that is guaranteed is that all component loads occur after the input constraint is satisfied, and before the outord is written. What is guaranteed is all values will be returned in order on the data channels. Normally, this should not be an issue, but if some other actor is modifying memory while the load is occurring, there is no defined behavior in terms of what values are seen. (e.g. if some other actor stored x to a[i], and y to a[i+1], it would be possible for the load to return x for a[i], but an older value for a[i+1].) Basically, the load "owns" the memory for the duration of the access, and concurrent writes yield UNPREDICTABLE results.

---

Operation:sst{8-64}x8 addr.CRLu.a64, len.CRLu.u64, stride.CRLu.i64, data0.CRd.iN, . . . data7.CRd.iN, outord.Cd.i0=I, inord.Cu.i0=I, memlvl.Lu.i64=T, xoutord.Cd.i0=I Semantics:
```
// for data list of length k
inord; tmp = addr;
// store up to k values each "iteration".
for (i=0; i<len; ) } {
    *tmp = data0; i++; if (i>=len) break;
    tmp += N/8*stride;
    *tmp = data1; i++; if (i>=len) break;
    tmp += N/8*stride;
    . . .
    *tmp = data{k-1}; i++; if (i>=len) break;
    tmp += N/8*stride;
}
outord = 0; // local visibility
xoutord = 0; // external visibility
```

Description: Perform a store of a sequence, up to the number in the output list at a time, based on the starting address, length and stride. e.g.

sst64x8 addr, 13, 2, res0, res1, %na, %na, %na, %na, %na, %na, . . .

Will store 13, 64b values, to addr, addr+16, addr+32, . . . addr+176, with the first 6 iterations storing values from both on res0 and res1, and the last one only from res0.

smld64 addr, 13, , res0, res1, res2, res3, %na, %na, %na, %na, . . .

-continued

```
Will also store 13 values, but with 3 sets of 4, then one only for res 0.
The outord value is defined once after all component stores have completed sufficiently to not be
affected by other operations.
One example usage of this is to store a full cache line at a time - e.g. 8 64b values. Note that while
this is expected to be no worse than scalar operations, different implementations may get different
benefits.
Note that as with other strided operations, the Version 1 implementation may only benefit if the
stride is a literal value of 1.
Note: The order component memory accesses for this load are UNPREDICTABLE. All that is
guaranteed is that all component loads occur after the input constraint is satisfied, and before the
outord is written. What is guaranteed is all values will be returned in order on the data
channels. Normally, this should not be an issue, but if some other actor is modifying memory while
the load is occurring, there is no defined behavior in terms of what values are seen. (e.g. if some
other actor stored x to a[i], and y to a[i+1], it would be possible for the load to return x for a[i], but an
older value for a[i+1].) Basically, the load "owns" the memory for the duration of the access, and
concurrent writes yield UNPREDICTABLE results.
```

Prefetching

While certain embodiments of the CSA are designed to allow a large number of memory operations in flight with sufficient buffering, there are some circumstances in which prefetching may be beneficial.

```
Operation: prefetch[w] addr.CRLu.i64, ctlout.CRd.i0, ctlin.CRLu.i0=I, memlvl.Lu.i64=T
Description: Fetches the line of data from memory that contains the byte specified by addr to
a location in the cache hierarchy specified by memlvl, which reflects the level of temporal
behavior expected. e.g.
  - MEMLEVEL_T0 - prefetch data into closest level of the cache hierarchy
  - MEMLEVEL_T1 - prefetch into CSA cache only. Note: For Version 1, T0 and T1 are the
    same
  - MEMLEVEL_T2 - prefetch into LLC only
  - MEMLEVEL_NTA -prefetch data into non-temporal cache
If the w form is used, it specifies the intent to write the data.
The prefetch operation is merely a hint and does not affect program behavior. If executed,
this operation may move data closer in the memory hierarchy in anticipation of future use.
The implementation of prefetch locality hints is implementation-dependent, and can be
overloaded or ignored by a processor implementation. The amount of data prefetched is
also implementation-dependent.
Because this is a hint rather than an architectural operation, prefetch is not ordered with
respect to fence operations, locked memory references, etc. The ctlin operand can be used
to approximately throttle a prefetch. An implementation is free to speculatively prefetch
independently of prefetch operations.
```

Local Memory Reference Ordering

One major difference from Von Neumann architectures is memory ops are not ordered relative to other memory ops unless they are on the sequential unit. For operations that access state (load, store, atomics, send/recv, etc.) on dataflow units, there are 3 additional operands, an input ordering channel, a local output ordering channel, and an external output ordering channel. An operation cannot proceed until all inputs, including the ordering channel, are available. After a memory operation is done, the local output ordering channel is defined as soon as the reference is known to be ordered relative to local references—e.g., in the same graph. The external ordering channel is not defined until the effects are known to be ordered relative to any external observer. Memory ordering channels are defined to be 0 bit—e.g., no data, only presence/absence. The most common consuming operations are those that take 0 bit inputs—e.g. onend, all, any, etc.

To give a flavor of memory reference ordering, consider a store, two loads that depend on it, and a store that must follow, because a compiler cannot determine address relationships in a way that allows disambiguation. On the sequential unit, this would just be:

```
.unit sxu
st a0, . . .
1d ,a1
```

-continued

```
1d ,a2
1d ,a3
st a4, . . .
```

In order to place these on dataflow units while preserving semantic ordering, we use channels to fan out from the store to the loads, and fan in from the loads to the store.

```
.unit   // no params - all operations get independent units
st a0,..., s0o, -          // store 0 output order operand s0o
copy0 s0o0,s0o1,s0o2,%ign,s0o // copy for fan-out of control
ld ,a1,l1o,s0o0           // all loads depend on the preceding store
ld ,a2,l2o,s0o1
ld ,a3,l3o,s0o2
all0 lx0,l1o,l2o,l3o // wait for all loads
st a4,..., lx0             // store waits for union of loads being read
```

The order operands are designed to allow compilers to express as much—or preferably, as little—ordering as is required by the program specification. The more relaxed the semantic ordering requirements, the less constrained the graph will be.

Operation: fence xctlout.CRd.i0, ctlin.CRLu.i0
Description: All memory access operations feeding into ctlin must logically precede the fence, while all memory access operations that depend on it must follow. Since this may be in a system that has components that use Total Store Order, effectively all stores preceding the fence must be complete before any that follow. (Note: This does not prohibit them from being executed at logically the same time - e.g. stores both before and after a fence could be part of a single visible "transaction", but in no case, can an external observer that is correctly synchronized see the store following the fence while not seeing stores the preceded the fence. Likewise, if there are loads that feed and depend on a fence, it is not possible for the load dependent on the fence to see a value that is logically older in the system's TSO than a load that the fence depended on.)
For example, for the following producer/consumer, the consumer must only see either two old values, or two new values, or an old for the first and a new for the second. It cannot see a new value for the first and an old value for the second:

```
    // Producer CSA
    st64d a, 0, v0, ctla0, ...          // store v0 to addr a
    fence ctla1, ctla0                  // fence separates stores
    st64d a 64, v1, , ctla1             // store v1 to addr a+64
    // A different consumer CSA
    ld64d v0r, a, 0, ctlb0,             //
    fence ctlb1, ctlb0                  // fence separates loads
    ld64d v1r, a, 64, , ctlb1           //
```

Note: Unlike other memory references, the main control out value is for external, rather than local, visibility.

---

Operation: atmcmpxchg{8-64} outord.CRd.i0, res.CRd.iN, addr.CRLu.a64, cmp.CRLu.iN, repl.CRLu.iN,
inord.CRu.i0, memlvl.Lu.i64=T, xoutord.CRd.i0=I
Semantics:

```
    atomic {
        tmp = *addr;                    // retrieve original value
        if (tmp == cmp) {
            *addr = val;                // and store new value, atomically
        }
    }
    res = tmp;                          // return the original value
```

Description: Atomically compare the value of a memory location specified by addr with a cmp value, and if equal, replace it with repl. res is the previous contents of the memory location, returned regardless of success or failure. Other code must compare the cmp and res values explicitly for equality to produce a success/failure status result to determine the need for a retry, for example.

---

Operation: atmxchg{8-64} outord.CRd.i0, res.CRd.iN, addr.CRLu.a64, val.CRLu.iN, inord.CRu.i0,
memlvl.Lu.i64=T, xoutord.CRd.i0=I
Semantics:

```
    atomic {
        tmp = *addr;            // retrieve original value
        *addr = val;            // and store new value, atomically
    }
    res = tmp;                  // return the original value
```

Description: Atomically exchange a specified input val with a value in memory at the specified addr, and return the previous contents of the memory location.

---

Operation:

```
    atmand{8-64}      outord.CRd.i0, res.CRd.iN, addr.CRLu.a64, val.CRLu.iN,
inord.CRu.i0,
                          memlvl.Lu.i64=T, xoutord.CRd.i0=I
    atmor{8-64}       outord.CRd.i0, res.CRd.iN, addr.CRLu.a64, val.CRLu.iN,
inord.CRu.i0,
                          memlvl.Lu.i64=T, xoutord.CRd.i0=I
    atmxor{8-64}      outord.CRd.i0, res.CRd.iN, addr.CRLu.a64, val.CRLu.iN,
inord.CRu.i0,
                          memlvl.Lu.i64=T, xoutord.CRd.i0=I
    atmadd{8-64}      outord.CRd.i0, res.CRd.iN, addr.CRLu.a64, val.CRLu.iN,
inord.CRu.i0,
```

-continued memlvl.Lu.i64=T, xoutord.CRd.i0=I atmsub{8-64} outord.CRd.i0, res.CRd.iN, addr.CRLu.a64, val.CRLu.iN, inord.CRu.i0, memlvl.Lu.i64=T, xoutord.CRd.i0=I atmmin{8-64} outord.CRd.i0, res.CRd.iN, addr.CRLu.a64, val.CRLu.iN, inord.CRu.i0, memlvl.Lu.i64=T, xoutord.CRd.i0=I atmmax{8-64} outord.CRd.i0, res.CRd.iN, addr.CRLu.a64, val.CRLu.iN, inord.CRu.i0, memlvl.Lu.i64=T, xoutord.CRd.i0=I Semantics:

```
atomic {
    tmp = *addr;              // retrieve original value
    *addr = tmp OP val;       // store newly computed value
}
res = tmp;                    // return the original value
```

Description: Atomically perform the particular operation on a specified input val with a value in memory at the specified addr, and return the previous contents of the memory location, res is the value of the memory location prior to executing the atomic operation.
Note: The operation may be lighter weight implementation if the result is %ign, stating that the old value is not required.

---

Operation: seq[ot]rel{8-64} value.Cd.xN, pred.Cd.i1, first.Cd.i1, last.Cd.i1, base.CLu.xN, bound.CLu.xN, stride.CLu.xN where rel may be {lts,ltu,les,leu,gts,gtu,ges,geu,ne}

Description: Bounded sequence (signed less than comparison of base and exceeded).

- value - a Nb LIC receiving each successive value, and nothing for termination
- pred - a single bit operand (must be a LIC) receiving 1 for each successive value, and 0 at termination
- first - a single bit operand (must be a LIC) receiving a 1 for the first iteration, and 0 for all others. For a 0-trip loop, there is no output
- last - a single bit operand (must be a LIC) receiving a 1 for the last iteration, and 0 for all others. For a 0-trip loop, there is no output
- base - the initial value - either LIC or literal
- bound - a value that is beyond the last value the loop should take on - either LIC or literal
- stride - a value for the increment - either LIC or literal. Note that for memory addresses, this will include the size of the memory reference (e.g. stride for a dense 64 bit stream will be 8 . . . )

e.g.

seqlts32 c0, c1, c2, c3, 0, 10, 1 is the rough equivalent of:

for (i=0; i<10; i++) { } and generates {value, pred, first, last} of {0,1,1,0}, {1,1,0,0}, {2,1,0,0} . . . {8,1,0,0}, {9,1,0,1}, {—,0,—,—}, respectively. (Note the absence of output on channels other than pred when the bound is exceeded.)

The seqot* (one trip) variants are identical to the base versions, except that the comparison result is forced to be true for the first value, which forces at least one value to come out. They are the logical equivalent of:

i=0; do { . . . ; i++; } while (i<10);

NOTE: The seqot* variants MUST produce the initial result as soon as base is provided, bound and stride must only gate the $2^{nd}$ and successive outputs.

---

Operation: stride{8-64} value.Cd.iN, stream.CLu.i1, base.CLu.iN, stride.CLu.iN

Description: Strided sequence generation given on base/stride

- value - Nb operand receiving each successive value, and nothing for termination
- stream - a 1b operand that receives a control stream of is, followed by a terminating 0
- base - the initial value - either LIC or literal
- stride - a value for the increment - either LIC or literal. Note that for memory addresses, this will include the size of the memory reference (e.g. stride for a dense 64 bit stream will be 8 . . . )

This provides the ability to have a stride based on a stream. Note that when the strides match, there would typically just be an add to bias a previous value. This is normally used when there are multiple inductive values in a loop striding by different amounts.

Operation: repeat {0-64} och.Cd.iN, cch.CRLu.i1, v.CRLu.iN
Semantics: while (cch.in) { och=*v; }; v
  where * is non-destructive read of input
Description: This generates copies of v to och for the number of times cch is true. When cch is false, v is consumed.

Operation: repeatc{1} res.CRd.iN, count.CRLu.u64, v.CRLu.aN
Semantics: tmp = count; while (tmp--) { och=*v; }; v
  where * is non-destructive read of v
Description: Given a count, generate that number of copies of v to res. While this operation is conceptually similar to repeat, it is more expensive.

piles this IR into a CSA assembly, e.g., adding appropriate buffering on latency-insensitive channels for performance. It then places and routes the CSA assembly on the hardware fabric, and configures the PEs and network for execution. In one embodiment, the toolchain supports the CSA-specific compilation as a just-in-time (JIT), incorporating potential runtime feedback from actual executions. One of the key design characteristics of the framework is compilation of (LLVM) IR for the CSA, rather than using a higher-level language as input. While a program written in a high-level programming language designed specifically for the CSA might achieve maximal performance and/or energy efficiency, the adoption of new high-level languages or programming frameworks may be slow and limited in practice because of the difficulty of converting existing code bases.

Operation:
  vmsumTto64 out.CRd.i64, vec.CRLu.T, scale.CRLu.T, In.CRu.i64=0
  vsmsumTto64 out.CRd.i64, vec.CRLu.T, scale.CRLu.base(T), In.CRu.i64=0
These are the opcodes, where the first type is the type of "vec", and the second is the type of "scale". If they are the same base type, only the first is specified. For vectors, the elements fill a 64b value (e.g. for 8 bit types, there are 8 elements, and for 16b types, 4 elements.)

| Vector/vector form (v*) | Vector/scalar form (vs*) |
|---|---|
| vmsums8to64 | vsmsums8to64 |
| vmsums8u8to64 | vsmsums8u8to64 |
| vmsumu8s8to64 | vsmsumu8s8to64 |
| vmsumu8to64 | vsmsumu8to64 |
| vmsums16to64 | vsmsums16to64 |
| vmsums16u16to64 | vsmsums16u16to64 |
| vmsumu16s16to64 | vsmsumu16s16to64 |
| vmsumu16to64 | vsmsumu16to64 |

Semantics:
```
out = n;
for (1 in ElementCount(T))
   out += vec[i]*scale[i] // for vs form, scale rather than scale[i]
```
Description: Multiply a small vector of values by scale factors, and sum into a single integer 64b result e.g., vmsums8to64 out, vec, scale, in takes the value of in, accumulates the products of the 8, signed 8b values in vec with the corresponding signed 8b values in scale, and produces the value in out. The v prefix form treats both input operands as short vectors. The vs prefix form treats the first operand as a vector and the second operand as a scalar.

Other operations may include, but are not limited to add, subtract, multiply, divide, move (to move data from a PE to memory (e.g., cache), logical NOT, logical AND, logical OR, logical XOR, comparison (e.g., less than, greater than, less than or equal, and greater than or equal), copy, etc.

4. Compilation

The ability to compile programs written in high-level languages onto a CSA may be essential for industry adoption. This section gives a high-level overview of compilation strategies for embodiments of a CSA. First is a proposal for a CSA software framework that illustrates the desired properties of an ideal production-quality toolchain. Next, a prototype compiler framework is discussed. A "control-to-dataflow conversion" is then discussed, e.g., to converts ordinary sequential control-flow code into CSA dataflow assembly code.

4.1 Example Production Framework

Figure 130:
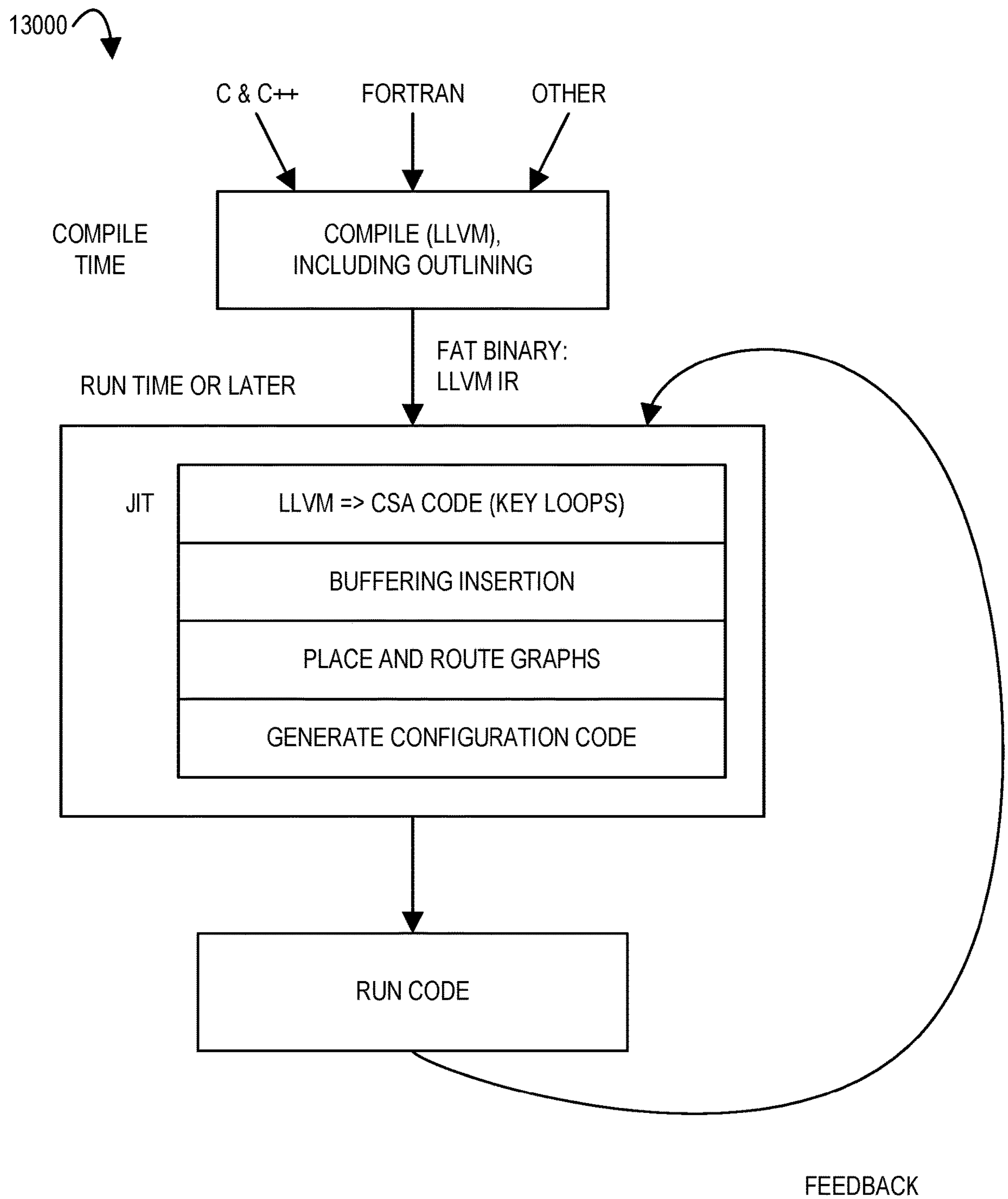

FIG. 130 illustrates a compilation toolchain 13000 for an accelerator according to embodiments of the disclosure. This toolchain compiles high-level languages (such as C, C++, and Fortran) into a combination of host code (LLVM) intermediate representation (IR) for the specific regions to be accelerated. The CSA-specific portion of this compilation toolchain takes LLVM IR as its input, optimizes and compiles this IR into a CSA assembly, e.g., adding appropriate buffering on latency-insensitive channels for performance.

Using (LLVM) IR as input enables a wide range of existing programs to potentially execute on a CSA, e.g., without the need to create a new language or significantly modify the front-end of new languages that want to run on the CSA.

4.2 Prototype Compiler

Figure 131:
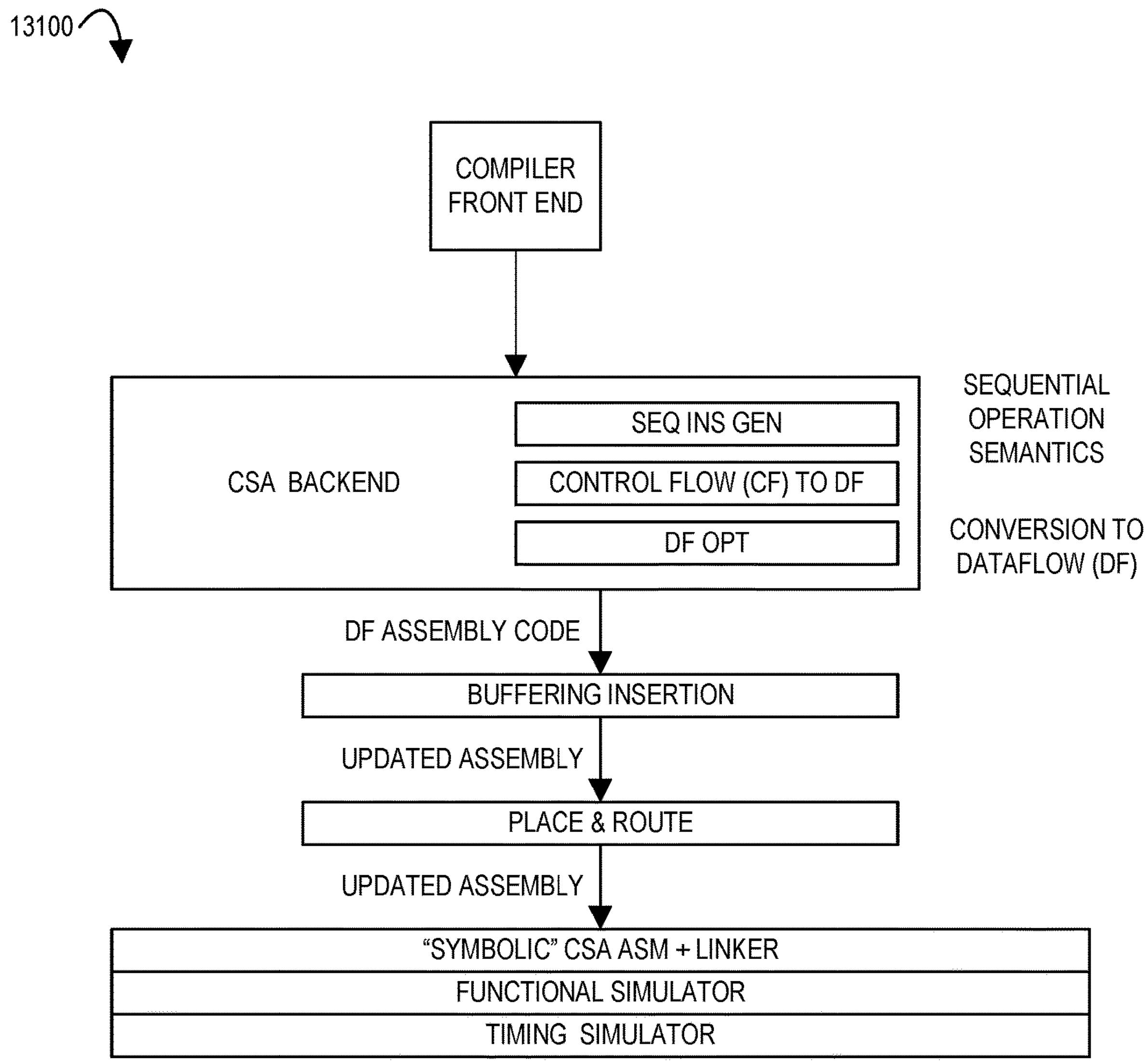

FIG. 131 illustrates a compiler 13100 for an accelerator according to embodiments of the disclosure. Compiler 13100 initially focuses on ahead-of-time compilation of C and C++ through the (e.g., Clang) front-end. To compile (LLVM) IR, the compiler implements a CSA back-end target within LLVM with three main stages. First, the CSA back-end lowers LLVM IR into a target-specific machine operations for the sequential unit, which implements most CSA operations combined with a traditional RISC-like control-flow architecture (e.g., with branches and a program counter). The sequential unit in the toolchain may serve as a useful aid for both compiler and application developers, since it enables an incremental transformation of a program from control flow (CF) to dataflow (DF), e.g., converting one section of code at a time from control-flow to dataflow and validating program correctness. The sequential unit may also provide a model for handling code that does not fit in the spatial array. Next, the compiler converts these control-flow operations into dataflow operators (e.g., code) for the CSA. This phase is described later in Section 4.3. Then, the CSA back-end may run its own optimization passes on the dataflow operations. Finally, the compiler may dump the operations in a CSA assembly format. This assembly format is taken as input to late-stage tools which place and route the dataflow operations on the actual CSA hardware.

4.3 Control to Dataflow Conversion

A key portion of the compiler may be implemented in the control-to-dataflow conversion pass, or dataflow conversion pass for short. This pass takes in a function represented in control flow form, e.g., a control-flow graph (CFG) with sequential machine operations operating on virtual registers, and converts it into a dataflow function that is conceptually a graph of dataflow operations (e.g., not instructions) connected by latency-insensitive channels (LICs). This section gives a high-level description of this pass, describing how it conceptually deals with memory operations, branches, and loops in certain embodiments.

Straight-Line Code

FIG. 132A illustrates sequential assembly code 13202 according to embodiments of the disclosure. FIG. 132B illustrates dataflow assembly code 13204 for the sequential assembly code 13202 of FIG. 132A according to embodiments of the disclosure. FIG. 132C illustrates a dataflow graph 13206 for the dataflow assembly code 13204 of FIG. 132B for an accelerator according to embodiments of the disclosure.

First, consider the simple case of converting straight-line sequential code to dataflow. The dataflow conversion pass may convert a basic block of sequential code, such as the code shown in FIG. 132A into CSA assembly code, shown in FIG. 132B. Conceptually, the CSA assembly in FIG. 132B represents the dataflow graph shown in FIG. 132C. In this example, each sequential operation is translated into a matching CSA assembly. The .lic statements (e.g., for data) declare latency-insensitive channels which correspond to the virtual registers in the sequential code (e.g., Rdata). In practice, the input to the dataflow conversion pass may be in numbered virtual registers. For clarity, however, this section uses descriptive register names. Note that load and store operations are supported in the CSA architecture in this embodiment, allowing for many more programs to run than an architecture supporting only pure dataflow. Since the sequential code input to the compiler is in SSA (singlestatic assignment) form, for a simple basic block, the control-to-dataflow pass may convert each virtual register definition into the production of a single value on a latency-insensitive channel. The SSA form allows multiple uses of a single definition of a virtual register, such as in Rdata2). To support this model, the CSA assembly code supports multiple uses of the same LIC (e.g., data2), with the simulator implicitly creating the necessary copies of the LICs. One key difference between sequential code and dataflow code is in the treatment of memory operations. The code in FIG. 132A is conceptually serial, which means that the load32 (ld32) of addr3 should appear to happen after the st32 of addr, in case that addr and addr3 addresses overlap.

Branches

To convert programs with multiple basic blocks and conditionals to dataflow, the compiler generates special dataflow operators to replace the branches. More specifically, the compiler uses switch operators to steer outgoing data at the end of a basic block in the original CFG, and pick operators to select values from the appropriate incoming channel at the beginning of a basic block. As a concrete example, consider the code and corresponding dataflow graph in FIGS. 133A-133C, which conditionally computes a value of y based on several inputs: a i, x, and n. After computing the branch condition test, the dataflow code uses a switch operator (e.g., see FIGS. 3B-3C) steers the value in channel x to channel xF if test is 0, or channel xT if test is 1. Similarly, a pick operator (e.g., see FIGS. 3B-3C) is used to send channel yF to y if test is 0, or send channel yT to y if test is 1. In this example, it turns out that even though the value of a is only used in the true branch of the conditional, the CSA is to include a switch operator which steers it to channel aT when test is 1, and consumes (eats) the value when test is 0. This latter case is expressed by setting the false output of the switch to % ign. It may not be correct to simply connect channel a directly to the true path, because in the cases where execution actually takes the false path, this value of "a" will be left over in the graph, leading to incorrect value of a for the next execution of the function. This example highlights the property of control equivalence, a key property in embodiments of correct dataflow conversion.

Control Equivalence: Consider a single-entry-single-exit control flow graph G with two basic blocks A and B. A and B are control-equivalent if all complete control flow paths through G visit A and B the same number of times.

LIC Replacement: In a control flow graph G, suppose an operation in basic block A defines a virtual register x, and an operation in basic block B that uses x. Then a correct control-to-dataflow transformation can replace x with a latency-insensitive channel only if A and B are control equivalent. The control-equivalence relation partitions the basic blocks of a CFG into strong control-dependence regions. FIG. 133A illustrates C source code 13302 according to embodiments of the disclosure. FIG. 133B illustrates dataflow assembly code 13304 for the C source code 13302 of FIG. 133A according to embodiments of the disclosure. FIG. 133C illustrates a dataflow graph 13306 for the dataflow assembly code 13304 of FIG. 133B for an accelerator according to embodiments of the disclosure. In the example in FIGS. 133A-133C, the basic block before and after the conditionals are control-equivalent to each other, but the basic blocks in the true and false paths are each in their own control dependence region. One correct algorithm for converting a CFG to dataflow is to have the compiler insert (1) switches to compensate for the mismatch in execution frequency for any values that flow between basic blocks which are not control equivalent, and (2) picks at the beginning of basic blocks to choose correctly from any incoming values to a basic block. Generating the appropriate control signals for these picks and switches may be the key part of dataflow conversion.

Loops

Another important class of CFGs in dataflow conversion are CFGs for single-entry-single-exit loops, a common form of loop generated in (LLVM) IR. These loops may be almost acyclic, except for a single back edge from the end of the loop back to a loop header block. The dataflow conversion pass may use same high-level strategy to convert loops as for branches, e.g., it inserts switches at the end of the loop to direct values out of the loop (either out the loop exit or around the back-edge to the beginning of the loop), and inserts picks at the beginning of the loop to choose between initial values entering the loop and values coming through the back edge. FIG. 134A illustrates C source code 13402 according to embodiments of the disclosure. FIG. 134B illustrates dataflow assembly code 13404 for the C source code 13402 of FIG. 134A according to embodiments of the disclosure. FIG. 134C illustrates a dataflow graph 13406 for the dataflow assembly code 13404 of FIG. 134B for an accelerator according to embodiments of the disclosure. FIGS. 134A-134C shows C and CSA assembly code for an example do-while loop that adds up values of a loop induction variable i, as well as the corresponding dataflow graph. For each variable that conceptually cycles around the loop (i and sum), this graph has a corresponding pick/switch pair that controls the flow of these values. Note that this example also uses a pick/switch pair to cycle the value of n around the loop, even though n is loop-invariant. This repetition of n enables conversion of n's virtual register into a LIC, since it matches the execution frequencies between a conceptual definition of n outside the loop and the one or more uses of n inside the loop. In general, for a correct dataflow conversion, registers that are live-in into a loop are to be repeated once for each iteration inside the loop body when the register is converted into a LIC. Similarly, registers that are updated inside a loop and are live-out from the loop are to be consumed, e.g., with a single final value sent out of the loop. Loops introduce a wrinkle into the dataflow conversion process, namely that the control for a pick at the top of the loop and the switch for the bottom of the loop are offset. For example, if the loop in FIG. 133A executes three iterations and exits, the control to picker should be 0, 1, 1, while the control to switcher should be 1, 1, 0. This control is implemented by starting the picker channel with an initial extra 0 when the function begins on cycle 0 (which is specified in the assembly by the directives .value 0 and .avail 0), and then copying the output switcher into picker. Note that the last 0 in switcher restores a final 0 into picker, ensuring that the final state of the dataflow graph matches its initial state.

FIG. 135A illustrates a flow diagram 13500 according to embodiments of the disclosure. Depicted flow 13500 includes decoding an instruction with a decoder of a core of a processor into a decoded instruction 13502; executing the decoded instruction with an execution unit of the core of the processor to perform a first operation 13504; receiving an input of a dataflow graph comprising a plurality of nodes 13506; overlaying the dataflow graph into a plurality of processing elements of the processor and an interconnect network between the plurality of processing elements of the processor with each node represented as a dataflow operator in the plurality of processing elements 13508; and performing a second operation of the dataflow graph with the interconnect network and the plurality of processing elements by a respective, incoming operand set arriving at each of the dataflow operators of the plurality of processing elements 13510.

FIG. 135B illustrates a flow diagram 13501 according to embodiments of the disclosure. Depicted flow 13501 includes receiving an input of a dataflow graph comprising a plurality of nodes 13503; and overlaying the dataflow graph into a plurality of processing elements of a processor, a data path network between the plurality of processing elements, and a flow control path network between the plurality of processing elements with each node represented as a dataflow operator in the plurality of processing elements 13505.

In one embodiment, the core writes a command into a memory queue and a CSA (e.g., the plurality of processing elements) monitors the memory queue and begins executing when the command is read. In one embodiment, the core executes a first part of a program and a CSA (e.g., the plurality of processing elements) executes a second part of the program. In one embodiment, the core does other work while the CSA is executing its operations.

5. CSA Advantages

In certain embodiments, the CSA architecture and microarchitecture provides profound energy, performance, and usability advantages over roadmap processor architectures and FPGAs. In this section, these architectures are compared to embodiments of the CSA and highlights the superiority of CSA in accelerating parallel dataflow graphs relative to each.

5.1 Processors

FIG. 136 illustrates a throughput versus energy per operation graph 13600 according to embodiments of the disclosure. As shown in FIG. 136, small cores are generally more energy efficient than large cores, and, in some workloads, this advantage may be translated to absolute performance through higher core counts. The CSA microarchitecture follows these observations to their conclusion and removes (e.g., most) energy-hungry control structures associated with von Neumann architectures, including most (or all) of the instruction-side microarchitecture. By removing these overheads and implementing simple, single operation PEs, embodiments of a CSA obtains a dense, efficient spatial array. Unlike small cores, which are usually quite serial, a CSA may gang its PEs together, e.g., via the circuit switched local network, to form explicitly parallel aggregate dataflow graphs. The result is performance in not only parallel applications, but also serial applications as well. Unlike cores, which may pay dearly for performance in terms area and energy, a CSA is already parallel in its native execution model. In certain embodiments, a CSA neither requires speculation to increase performance nor does it need to repeatedly re-extract parallelism from a sequential program representation, thereby avoiding two of the main energy taxes in von Neumann architectures. Most structures in embodiments of a CSA are distributed, small, and energy efficient, as opposed to the centralized, bulky, energy hungry structures found in cores. Consider the case of registers in the CSA: each PE may have a few (e.g., 10 or less) storage registers. Taken individually, these registers may be more efficient that traditional register files. In aggregate, these registers may provide the effect of a large, in-fabric register file. As a result, embodiments of a CSA avoids most of stack spills and fills incurred by classical architectures, while using much less energy per state access. Of course, applications may still access memory. In embodiments of a CSA, memory access request and response are architecturally decoupled, enabling workloads to sustain many more outstanding memory accesses per unit of area and energy. This property yields substantially higher performance for cache-bound workloads and reduces the area and energy needed to saturate main memory in memory-bound workloads. Embodiments of a CSA expose new forms of energy efficiency which are unique to non-von Neumann architectures. One consequence of executing a single operation (e.g., and not decoding and executing an instruction) at a (e.g., most) PEs is reduced operand entropy. In the case of an increment operation, each execution may result in a handful of circuit-level toggles and little energy consumption, a case examined in detail in Section 5.2. In contrast, von Neumann architectures are multiplexed, resulting in large numbers of bit transitions. The asynchronous style of embodiments of a CSA also enables microarchitectural optimizations, such as the floating point optimizations described in Section 2.6 that are difficult to realize in tightly scheduled core pipelines. Because PEs may be relatively simple and their behavior in a particular dataflow graph be statically known, clock gating and power gating techniques may be applied more effectively than in coarser architectures. The graph-execution style, small size, and malleability of embodiments of CSA PEs and the network together enable the expression many kinds of parallelism: operation, data, pipeline, vector, memory, thread, and task parallelism may all be implemented. For example, in embodiments of a CSA, one application may use arithmetic units to provide a high degree of address bandwidth, while another application may use those same units for computation. In many cases, multiple kinds of parallelism may be combined to achieve even more performance. Many key HPC operations may be both replicated and pipelined, resulting in orders-of-magnitude performance gains. In contrast, von Neumann-style cores typically optimize for one style of parallelism, carefully chosen by the architects, resulting in a failure to capture all important application kernels. Just as embodiments of a CSA expose and facilitates many forms of parallelism, it does not mandate a particular form of parallelism, or, worse, a particular subroutine be present in an application in order to benefit from the CSA. Many applications, including single-stream applications, may obtain both performance and energy benefits from embodiments of a CSA, e.g., even when compiled without modification. This reverses the long trend of requiring significant programmer effort to obtain a substantial performance gain in single-stream applications. Indeed, in some applications, embodiments of a CSA obtain more performance from functionally equivalent, but less "modern" codes than from their convoluted, contemporary cousins which have been tortured to target vector operations.

5.2 Comparison of CSA Embodiments and FPGAs

The choice of dataflow operators as the fundamental architecture of embodiments of a CSA differentiates those CSAs from a FPGA, and particularly the CSA is as superior accelerator for HPC dataflow graphs arising from traditional programming languages. Dataflow operators are fundamentally asynchronous. This enables embodiments of a CSA not only to have great freedom of implementation in the microarchitecture, but it also enables them to simply and succinctly accommodate abstract architectural concepts. For example, embodiments of a CSA naturally accommodate many memory microarchitectures, which are essentially asynchronous, with a simple load-store interface. One need only examine an FPGA DRAM controller to appreciate the difference in complexity. Embodiments of a CSA also leverage asynchrony to provide faster and more-fully-featured runtime services like configuration and extraction, which are believed to be four to six orders of magnitude faster than an FPGA. By narrowing the architectural interface, embodiments of a CSA provide control over most timing paths at the microarchitectural level. This allows embodiments of a CSA to operate at a much higher frequency than the more general control mechanism offered in a FPGA. Similarly, clock and reset, which may be architecturally fundamental to FPGAs, are microarchitectural in the CSA, e.g., obviating the need to support them as programmable entities. Dataflow operators may be, for the most part, coarse-grained. By only dealing in coarse operators, embodiments of a CSA improve both the density of the fabric and its energy consumption: CSA executes operations directly rather than emulating them with look-up tables. A second consequence of coarseness is a simplification of the place and route problem. CSA dataflow graphs are many orders of magnitude smaller than FPGA net-lists and place and route time are commensurately reduced in embodiments of a CSA. The significant differences between embodiments of a CSA and a FPGA make the CSA superior as an accelerator, e.g., for dataflow graphs arising from traditional programming languages.

6. Evaluation

The CSA is a novel computer architecture with the potential to provide enormous performance and energy advantages relative to roadmap processors. Consider the case of computing a single strided address for walking across an array. This case may be important in HPC applications, e.g., which spend significant integer effort in computing address offsets. In address computation, and especially strided address computation, one argument is constant and the other varies only slightly per computation. Thus, only a handful of bits per cycle toggle in the majority of cases. Indeed, it may be shown, using a derivation similar to the bound on floating point carry bits described in Section 2.6, that less than two bits of input toggle per computation in average for a stride calculation, reducing energy by 50% over a random toggle distribution. Were a time-multiplexed approach used, much of this energy savings may be lost. In one embodiment, the CSA achieves approximately 3× energy efficiency over a core while delivering an 8× performance gain. The parallelism gains achieved by embodiments of a CSA may result in reduced program run times, yielding a proportionate, substantial reduction in leakage energy. At the PE level, embodiments of a CSA are extremely energy efficient. A second important question for the CSA is whether the CSA consumes a reasonable amount of energy at the tile level. Since embodiments of a CSA are capable of exercising every floating point PE in the fabric at every cycle, it serves as a reasonable upper bound for energy and power consumption, e.g., such that most of the energy goes into floating point multiply and add.

7. Further CSA Details

This section discusses further details for configuration and exception handling.

7.1 Microarchitecture for Configuring a CSA

This section discloses examples of how to configure a CSA (e.g., fabric), how to achieve this configuration quickly, and how to minimize the resource overhead of configuration. Configuring the fabric quickly may be of preeminent importance in accelerating small portions of a larger algorithm, and consequently in broadening the applicability of a CSA. The section further discloses features that allow embodiments of a CSA to be programmed with configurations of different length.

Embodiments of a CSA (e.g., fabric) may differ from traditional cores in that they make use of a configuration step in which (e.g., large) parts of the fabric are loaded with program configuration in advance of program execution. An advantage of static configuration may be that very little energy is spent at runtime on the configuration, e.g., as opposed to sequential cores which spend energy fetching configuration information (an instruction) nearly every cycle. The previous disadvantage of configuration is that it was a coarse-grained step with a potentially large latency, which places an under-bound on the size of program that can be accelerated in the fabric due to the cost of context switching. This disclosure describes a scalable microarchitecture for rapidly configuring a spatial array in a distributed fashion, e.g., that avoids the previous disadvantages.

As discussed above, a CSA may include light-weight processing elements connected by an inter-PE network. Programs, viewed as control-dataflow graphs, are then mapped onto the architecture by configuring the configurable fabric elements (CFEs), for example PEs and the interconnect (fabric) networks. Generally, PEs may be configured as dataflow operators and once all input operands arrive at the PE, some operation occurs, and the results are forwarded to another PE or PEs for consumption or output. PEs may communicate over dedicated virtual circuits which are formed by statically configuring the circuit switched communications network. These virtual circuits may be flow controlled and fully back-pressured, e.g., such that PEs will stall if either the source has no data or destination is full. At runtime, data may flow through the PEs implementing the mapped algorithm. For example, data may be streamed in from memory, through the fabric, and then back out to memory. Such a spatial architecture may achieve remarkable performance efficiency relative to traditional multicore processors: compute, in the form of PEs, may be simpler and more numerous than larger cores and communications may be direct, as opposed to an extension of the memory system.

Embodiments of a CSA may not utilize (e.g., software controlled) packet switching, e.g., packet switching that requires significant software assistance to realize, which slows configuration. Embodiments of a CSA include out-of-band signaling in the network (e.g., of only 2-3 bits, depending on the feature set supported) and a fixed configuration topology to avoid the need for significant software support.

One key difference between embodiments of a CSA and the approach used in FPGAs is that a CSA approach may use a wide data word, is distributed, and includes mechanisms to fetch program data directly from memory. Embodiments of a CSA may not utilize JTAG-style single bit communications in the interest of area efficiency, e.g., as that may require milliseconds to completely configure a large FPGA fabric.

Embodiments of a CSA include a distributed configuration protocol and microarchitecture to support this protocol. Initially, configuration state may reside in memory. Multiple (e.g., distributed) local configuration controllers (boxes) (LCCs) may stream portions of the overall program into their local region of the spatial fabric, e.g., using a combination of a small set of control signals and the fabric-provided network. State elements may be used at each CFE to form configuration chains, e.g., allowing individual CFEs to self-program without global addressing.

Embodiments of a CSA include specific hardware support for the formation of configuration chains, e.g., not software establishing these chains dynamically at the cost of increasing configuration time. Embodiments of a CSA are not purely packet switched and do include extra out-of-band control wires (e.g., control is not sent through the data path requiring extra cycles to strobe this information and reserialize this information). Embodiments of a CSA decreases configuration latency by fixing the configuration ordering and by providing explicit out-of-band control (e.g., by at least a factor of two), while not significantly increasing network complexity.

Embodiments of a CSA do not use a serial mechanism for configuration in which data is streamed bit by bit into the fabric using a JTAG-like protocol. Embodiments of a CSA utilize a coarse-grained fabric approach. In certain embodiments, adding a few control wires or state elements to a 64 or 32-bit-oriented CSA fabric has a lower cost relative to adding those same control mechanisms to a 4 or 6 bit fabric.

FIG. 137 illustrates an accelerator tile 13700 comprising an array of processing elements (PE) and a local configuration controller (13702, 13706) according to embodiments of the disclosure. Each PE, each network controller (e.g., network dataflow endpoint circuit), and each switch may be a configurable fabric elements (CFEs), e.g., which are configured (e.g., programmed) by embodiments of the CSA architecture.

Embodiments of a CSA include hardware that provides for efficient, distributed, low-latency configuration of a heterogeneous spatial fabric. This may be achieved according to four techniques. First, a hardware entity, the local configuration controller (LCC) is utilized, for example, as in FIGS. 137-139. An LCC may fetch a stream of configuration information from (e.g., virtual) memory. Second, a configuration data path may be included, e.g., that is as wide as the native width of the PE fabric and which may be overlaid on top of the PE fabric. Third, new control signals may be received into the PE fabric which orchestrate the configuration process. Fourth, state elements may be located (e.g., in a register) at each configurable endpoint which track the status of adjacent CFEs, allowing each CFE to unambiguously self-configure without extra control signals. These four microarchitectural features may allow a CSA to configure chains of its CFEs. To obtain low configuration latency, the configuration may be partitioned by building many LCCs and CFE chains. At configuration time, these may operate independently to load the fabric in parallel, e.g., dramatically reducing latency. As a result of these combinations, fabrics configured using embodiments of a CSA architecture, may be completely configured (e.g., in hundreds of nanoseconds). In the following, the detailed the operation of the various components of embodiments of a CSA configuration network are disclosed.

FIGS. 138A-138C illustrate a local configuration controller 13802 configuring a data path network according to embodiments of the disclosure. Depicted network includes a plurality of multiplexers (e.g., multiplexers 13806, 13808, 13810) that may be configured (e.g., via their respective control signals) to connect one or more data paths (e.g., from PEs) together. FIG. 138A illustrates the network 13800 (e.g., fabric) configured (e.g., set) for some previous operation or program. FIG. 138B illustrates the local configuration controller 13802 (e.g., including a network interface circuit 13804 to send and/or receive signals) strobing a configuration signal and the local network is set to a default configuration (e.g., as depicted) that allows the LCC to send configuration data to all configurable fabric elements (CFEs), e.g., muxes. FIG. 138C illustrates the LCC strobing configuration information across the network, configuring CFEs in a predetermined (e.g., silicon-defined) sequence. In one embodiment, when CFEs are configured they may begin operation immediately. In another embodiments, the CFEs wait to begin operation until the fabric has been completely configured (e.g., as signaled by configuration terminator (e.g., configuration terminator 14004 and configuration terminator 14008 in FIG. 140) for each local configuration controller). In one embodiment, the LCC obtains control over the network fabric by sending a special message, or driving a signal. It then strobes configuration data (e.g., over a period of many cycles) to the CFEs in the fabric. In these figures, the multiplexor networks are analogues of the "Switch" shown in certain Figures (e.g., FIG. 6).

Local Configuration Controller

FIG. 139 illustrates a (e.g., local) configuration controller 13902 according to embodiments of the disclosure. A local configuration controller (LCC) may be the hardware entity which is responsible for loading the local portions (e.g., in a subset of a tile or otherwise) of the fabric program, interpreting these program portions, and then loading these program portions into the fabric by driving the appropriate protocol on the various configuration wires. In this capacity, the LCC may be a special-purpose, sequential microcontroller.

LCC operation may begin when it receives a pointer to a code segment. Depending on the LCB microarchitecture, this pointer (e.g., stored in pointer register 13906) may come either over a network (e.g., from within the CSA (fabric) itself) or through a memory system access to the LCC. When it receives such a pointer, the LCC optionally drains relevant state from its portion of the fabric for context storage, and then proceeds to immediately reconfigure the portion of the fabric for which it is responsible. The program loaded by the LCC may be a combination of configuration data for the fabric and control commands for the LCC, e.g., which are lightly encoded. As the LCC streams in the program portion, it may interprets the program as a command stream and perform the appropriate encoded action to configure (e.g., load) the fabric.

Two different microarchitectures for the LCC are shown in FIG. 137, e.g., with one or both being utilized in a CSA. The first places the LCC 13702 at the memory interface. In this case, the LCC may make direct requests to the memory system to load data. In the second case the LCC 13706 is placed on a memory network, in which it may make requests to the memory only indirectly. In both cases, the logical operation of the LCB is unchanged. In one embodiment, an LCCs is informed of the program to load, for example, by a set of (e.g., OS-visible) control-status-registers which will be used to inform individual LCCs of new program pointers, etc.

Extra Out-of-Band Control Channels (e.g., Wires)

In certain embodiments, configuration relies on 2-8 extra, out-of-band control channels to improve configuration speed, as defined below. For example, configuration controller 13902 may include the following control channels, e.g., CFG_START control channel 13908, CFG_VALID control channel 13910, and CFG_DONE control channel 13912, with examples of each discussed in Table 3 below.

TABLE 3

| Control Channels | |
|---|---|
| CFG_START | Asserted at beginning of configuration. Sets configuration state at each CFE and sets the configuration bus. |
| CFG_VALID | Denotes validity of values on configuration bus. |
| CFG_DONE | Optional. Denotes completion of the configuration of a particlular CFE. This allows configuration to be short circuited in case a CFE does not require additional configuration |

Generally, the handling of configuration information may be left to the implementer of a particular CFE. For example, a selectable function CFE may have a provision for setting registers using an existing data path, while a fixed function CFE might simply set a configuration register.

Due to long wire delays when programming a large set of CFEs, the CFG_VALID signal may be treated as a clock/latch enable for CFE components. Since this signal is used as a clock, in one embodiment the duty cycle of the line is at most 50%. As a result, configuration throughput is approximately halved. Optionally, a second CFG_VALID signal may be added to enable continuous programming.

In one embodiment, only CFG_START is strictly communicated on an independent coupling (e.g., wire), for example, CFG_VALID and CFG_DONE may be overlaid on top of other network couplings.

Reuse of Network Resources

To reduce the overhead of configuration, certain embodiments of a CSA make use of existing network infrastructure to communicate configuration data. A LCC may make use of both a chip-level memory hierarchy and a fabric-level communications networks to move data from storage into the fabric. As a result, in certain embodiments of a CSA, the configuration infrastructure adds no more than 2% to the overall fabric area and power.

Reuse of network resources in certain embodiments of a CSA may cause a network to have some hardware support for a configuration mechanism. Circuit switched networks of embodiments of a CSA cause an LCC to set their multiplexors in a specific way for configuration when the 'CFG_START' signal is asserted. Packet switched networks do not require extension, although LCC endpoints (e.g., configuration terminators) use a specific address in the packet switched network. Network reuse is optional, and some embodiments may find dedicated configuration buses to be more convenient.

Per CFE State

Each CFE may maintain a bit denoting whether or not it has been configured (see, e.g., FIG. 31). This bit may be de-asserted when the configuration start signal is driven, and then asserted once the particular CFE has been configured. In one configuration protocol, CFEs are arranged to form chains with the CFE configuration state bit determining the topology of the chain. A CFE may read the configuration state bit of the immediately adjacent CFE. If this adjacent CFE is configured and the current CFE is not configured, the CFE may determine that any current configuration data is targeted at the current CFE. When the 'CFG_DONE' signal is asserted, the CFE may set its configuration bit, e.g., enabling upstream CFEs to configure. As a base case to the configuration process, a configuration terminator (e.g., configuration terminator 13704 for LCC 13702 or configuration terminator 13708 for LCC 13706 in FIG. 137) which asserts that it is configured may be included at the end of a chain.

Internal to the CFE, this bit may be used to drive flow control ready signals. For example, when the configuration bit is de-asserted, network control signals may automatically be clamped to a values that prevent data from flowing, while, within PEs, no operations or other actions will be scheduled.

Dealing with High-Delay Configuration Paths

One embodiment of an LCC may drive a signal over a long distance, e.g., through many multiplexors and with many loads. Thus, it may be difficult for a signal to arrive at a distant CFE within a short clock cycle. In certain embodiments, configuration signals are at some division (e.g., fraction of) of the main (e.g., CSA) clock frequency to ensure digital timing discipline at configuration. Clock division may be utilized in an out-of-band signaling protocol, and does not require any modification of the main clock tree.

Ensuring Consistent Fabric Behavior During Configuration

Since certain configuration schemes are distributed and have non-deterministic timing due to program and memory effects, different portions of the fabric may be configured at different times. As a result, certain embodiments of a CSA provide mechanisms to prevent inconsistent operation among configured and unconfigured CFEs. Generally, consistency is viewed as a property required of and maintained by CFEs themselves, e.g., using the internal CFE state. For example, when a CFE is in an unconfigured state, it may claim that its input buffers are full, and that its output is invalid. When configured, these values will be set to the true state of the buffers. As enough of the fabric comes out of configuration, these techniques may permit it to begin operation. This has the effect of further reducing context switching latency, e.g., if long-latency memory requests are issued early.

Variable-Width Configuration

Different CFEs may have different configuration word widths. For smaller CFE configuration words, implementers may balance delay by equitably assigning CFE configuration loads across the network wires. To balance loading on network wires, one option is to assign configuration bits to different portions of network wires to limit the net delay on any one wire. Wide data words may be handled by using serialization/deserialization techniques. These decisions may be taken on a per-fabric basis to optimize the behavior of a specific CSA (e.g., fabric). Network controller (e.g., one or more of network controller 13710 and network controller 13712 may communicate with each domain (e.g., subset) of the CSA (e.g., fabric), for example, to send configuration information to one or more LCCs. Network controller may be part of a communications network (e.g., separate from circuit switched network). Network controller may include a network dataflow endpoint circuit.

7.2 Microarchitecture for Low Latency Configuration of a CSA and for Timely Fetching of Configuration Data for a CSA Embodiments of a CSA may be an energy-efficient and high-performance means of accelerating user applications. When considering whether a program (e.g., a dataflow graph thereof) may be successfully accelerated by an accelerator, both the time to configure the accelerator and the time to run the program may be considered. If the run time is short, then the configuration time may play a large role in determining successful acceleration. Therefore, to maximize the domain of accelerable programs, in some embodiments the configuration time is made as short as possible. One or more configuration caches may be includes in a CSA, e.g., such that the high bandwidth, low-latency store enables rapid reconfiguration. Next is a description of several embodiments of a configuration cache.

In one embodiment, during configuration, the configuration hardware (e.g., LCC) optionally accesses the configuration cache to obtain new configuration information. The configuration cache may operate either as a traditional address based cache, or in an OS managed mode, in which configurations are stored in the local address space and addressed by reference to that address space. If configuration state is located in the cache, then no requests to the backing store are to be made in certain embodiments. In certain embodiments, this configuration cache is separate from any (e.g., lower level) shared cache in the memory hierarchy.

FIG. 140 illustrates an accelerator tile 14000 comprising an array of processing elements, a configuration cache (e.g., 14018 or 14020), and a local configuration controller (e.g., 14002 or 14006) according to embodiments of the disclosure. In one embodiment, configuration cache 14014 is co-located with local configuration controller 14002. In one embodiment, configuration cache 14018 is located in the configuration domain of local configuration controller 14006, e.g., with a first domain ending at configuration terminator 14004 and a second domain ending at configuration terminator 14008). A configuration cache may allow a local configuration controller may refer to the configuration cache during configuration, e.g., in the hope of obtaining configuration state with lower latency than a reference to memory. A configuration cache (storage) may either be dedicated or may be accessed as a configuration mode of an in-fabric storage element, e.g., local cache 14016.

Caching Modes

1. Demand Caching—In this mode, the configuration cache operates as a true cache. The configuration controller issues address-based requests, which are checked against tags in the cache. Misses are loaded into the cache and then may be re-referenced during future reprogramming.
2. In-Fabric Storage (Scratchpad) Caching—In this mode the configuration cache receives a reference to a configuration sequence in its own, small address space, rather than the larger address space of the host. This may improve memory density since the portion of cache used to store tags may instead be used to store configuration.

In certain embodiments, a configuration cache may have the configuration data pre-loaded into it, e.g., either by external direction or internal direction. This may allow reduction in the latency to load programs. Certain embodiments herein provide for an interface to a configuration cache which permits the loading of new configuration state into the cache, e.g., even if a configuration is running in the fabric already. The initiation of this load may occur from either an internal or external source. Embodiments of a pre-loading mechanism further reduce latency by removing the latency of cache loading from the configuration path.

Pre Fetching Modes

1. Explicit Prefetching— A configuration path is augmented with a new command, ConfigurationCachePrefetch. Instead of programming the fabric, this command simply cause a load of the relevant program configuration into a configuration cache, without programming the fabric. Since this mechanism piggybacks on the existing configuration infrastructure, it is exposed both within the fabric and externally, e.g., to cores and other entities accessing the memory space.
2. Implicit prefetching—A global configuration controller may maintain a prefetch predictor, and use this to initiate the explicit prefetching to a configuration cache, e.g., in an automated fashion.

7.3 Hardware for Rapid Reconfiguration of a CSA in Response to an Exception

Certain embodiments of a CSA (e.g., a spatial fabric) include large amounts of operation and configuration state, e.g., which is largely static during the operation of the CSA. Thus, the configuration state may be vulnerable to soft errors. Rapid and error-free recovery of these soft errors may be critical to the long-term reliability and performance of spatial systems.

Certain embodiments herein provide for a rapid configuration recovery loop, e.g., in which configuration errors are detected and portions of the fabric immediately reconfigured. Certain embodiments herein include a configuration controller, e.g., with reliability, availability, and serviceability (RAS) reprogramming features. Certain embodiments of CSA include circuitry for high-speed configuration, error reporting, and parity checking within the spatial fabric. Using a combination of these three features, and optionally, a configuration cache, a configuration/exception handling circuit may recover from soft errors in configuration. When detected, soft errors may be conveyed to a configuration cache which initiates an immediate reconfiguration of (e.g., that portion of) the fabric. Certain embodiments provide for a dedicated reconfiguration circuit, e.g., which is faster than any solution that would be indirectly implemented in the fabric. In certain embodiments, co-located exception and configuration circuit cooperates to reload the fabric on configuration error detection.

FIG. 141 illustrates an accelerator tile 14100 comprising an array of processing elements and a configuration and exception handling controller (14102, 14106) with a reconfiguration circuit (14118, 14122) according to embodiments of the disclosure. In one embodiment, when a PE detects a configuration error through its local RAS features, it sends a (e.g., configuration error or reconfiguration error) message by its exception generator to the configuration and exception handling controller (e.g., 14102 or 14106). On receipt of this message, the configuration and exception handling controller (e.g., 14102 or 14106) initiates the co-located reconfiguration circuit (e.g., 14118 or 14122, respectively) to reload configuration state. The configuration microarchitecture proceeds and reloads (e.g., only) configurations state, and in certain embodiments, only the configuration state for the PE reporting the RAS error. Upon completion of reconfiguration, the fabric may resume normal operation. To decrease latency, the configuration state used by the configuration and exception handling controller (e.g., 14102 or 14106) may be sourced from a configuration cache. As a base case to the configuration or reconfiguration process, a configuration terminator (e.g., configuration terminator 14104 for configuration and exception handling controller 14102 or configuration terminator 14108 for configuration and exception handling controller 14106) in FIG. 141) which asserts that it is configured (or reconfigures) may be included at the end of a chain.

FIG. 142 illustrates a reconfiguration circuit 14218 according to embodiments of the disclosure. Reconfiguration circuit 14218 includes a configuration state register 14220 to store the configuration state (or a pointer thereto).

7.4 Hardware for Fabric-Initiated Reconfiguration of a CSA

Some portions of an application targeting a CSA (e.g., spatial array) may be run infrequently or may be mutually exclusive with other parts of the program. To save area, to improve performance, and/or reduce power, it may be useful to time multiplex portions of the spatial fabric among several different parts of the program dataflow graph. Certain embodiments herein include an interface by which a CSA (e.g., via the spatial program) may request that part of the fabric be reprogrammed. This may enable the CSA to dynamically change itself according to dynamic control flow. Certain embodiments herein allow for fabric initiated reconfiguration (e.g., reprogramming). Certain embodiments herein provide for a set of interfaces for triggering configuration from within the fabric. In some embodiments, a PE issues a reconfiguration request based on some decision in the program dataflow graph. This request may travel a network to our new configuration interface, where it triggers reconfiguration. Once reconfiguration is completed, a message may optionally be returned notifying of the completion. Certain embodiments of a CSA thus provide for a program (e.g., dataflow graph) directed reconfiguration capability.

FIG. 143 illustrates an accelerator tile 14300 comprising an array of processing elements and a configuration and exception handling controller 14306 with a reconfiguration circuit 14318 according to embodiments of the disclosure. Here, a portion of the fabric issues a request for (re) configuration to a configuration domain, e.g., of configuration and exception handling controller 14306 and/or reconfiguration circuit 14318. The domain (re)configures itself, and when the request has been satisfied, the configuration and exception handling controller 14306 and/or reconfiguration circuit 14318 issues a response to the fabric, to notify the fabric that (re)configuration is complete. In one embodiment, configuration and exception handling controller 14306 and/or reconfiguration circuit 14318 disables communication during the time that (re)configuration is ongoing, so the program has no consistency issues during operation.

Configuration Modes

Configure-by-address—In this mode, the fabric makes a direct request to load configuration data from a particular address.

Configure-by-reference—In this mode the fabric makes a request to load a new configuration, e.g., by a pre-determined reference ID. This may simplify the determination of the code to load, since the location of the code has been abstracted.

Configuring Multiple Domains

A CSA may include a higher level configuration controller to support a multicast mechanism to cast (e.g., via network indicated by the dotted box) configuration requests to multiple (e.g., distributed or local) configuration controllers. This may enable a single configuration request to be replicated across larger portions of the fabric, e.g., triggering a broad reconfiguration.

6.5 Exception Aggregators

Certain embodiments of a CSA may also experience an exception (e.g., exceptional condition), for example, floating point underflow. When these conditions occur, a special handlers may be invoked to either correct the program or to terminate it. Certain embodiments herein provide for a system-level architecture for handling exceptions in spatial fabrics. Since certain spatial fabrics emphasize area efficiency, embodiments herein minimize total area while providing a general exception mechanism. Certain embodiments herein provides a low area means of signaling exceptional conditions occurring in within a CSA (e.g., a spatial array). Certain embodiments herein provide an interface and signaling protocol for conveying such exceptions, as well as a PE-level exception semantics. Certain embodiments herein are dedicated exception handling capabilities, e.g., and do not require explicit handling by the programmer.

One embodiments of a CSA exception architecture consists of four portions, e.g., shown in FIGS. 144-145. These portions may be arranged in a hierarchy, in which exceptions flow from the producer, and eventually up to the tile-level exception aggregator (e.g., handler), which may rendezvous with an exception servicer, e.g., of a core. The four portions may be:

1. PE Exception Generator
2. Local Exception Network
3. Mezzanine Exception Aggregator
4. Tile-Level Exception Aggregator FIG. 144 illustrates an accelerator tile 14400 comprising an array of processing elements and a mezzanine exception aggregator 14402 coupled to a tile-level exception aggregator 14404 according to embodiments of the disclosure. FIG. 145 illustrates a processing element 14500 with an exception generator 14544 according to embodiments of the disclosure.

PE Exception Generator

Processing element 14500 may include processing element 900 from FIG. 9, for example, with similar numbers being similar components, e.g., local network 902 and local network 14502. Additional network 14513 (e.g., channel) may be an exception network. A PE may implement an interface to an exception network (e.g., exception network 14513 (e.g., channel) on FIG. 145). For example, FIG. 145 shows the microarchitecture of such an interface, wherein the PE has an exception generator 14544 (e.g., initiate an exception finite state machine (FSM) 14540 to strobe an exception packet (e.g., BOXID 14542) out on to the exception network. BOXID 14542 may be a unique identifier for an exception producing entity (e.g., a PE or box) within a local exception network. When an exception is detected, exception generator 14544 senses the exception network and strobes out the BOXID when the network is found to be free. Exceptions may be caused by many conditions, for example, but not limited to, arithmetic error, failed ECC check on state, etc. however, it may also be that an exception dataflow operation is introduced, with the idea of support constructs like breakpoints.

The initiation of the exception may either occur explicitly, by the execution of a programmer supplied command, or implicitly when a hardened error condition (e.g., a floating point underflow) is detected. Upon an exception, the PE 14500 may enter a waiting state, in which it waits to be serviced by the eventual exception handler, e.g., external to the PE 14500. The contents of the exception packet depend on the implementation of the particular PE, as described below.

Local Exception Network

A (e.g., local) exception network steers exception packets from PE 14500 to the mezzanine exception network. Exception network (e.g., 14513) may be a serial, packet switched network consisting of a (e.g., single) control wire and one or more data wires, e.g., organized in a ring or tree topology, e.g., for a subset of PEs. Each PE may have a (e.g., ring) stop in the (e.g., local) exception network, e.g., where it can arbitrate to inject messages into the exception network.

PE endpoints needing to inject an exception packet may observe their local exception network egress point. If the control signal indicates busy, the PE is to wait to commence inject its packet. If the network is not busy, that is, the downstream stop has no packet to forward, then the PE will proceed commence injection.

Network packets may be of variable or fixed length. Each packet may begin with a fixed length header field identifying the source PE of the packet. This may be followed by a variable number of PE-specific field containing information, for example, including error codes, data values, or other useful status information.

Mezzanine Exception Aggregator

The mezzanine exception aggregator 14404 is responsible for assembling local exception network into larger packets and sending them to the tile-level exception aggregator 14402. The mezzanine exception aggregator 14404 may pre-pend the local exception packet with its own unique ID, e.g., ensuring that exception messages are unambiguous. The mezzanine exception aggregator 14404 may interface to a special exception-only virtual channel in the mezzanine network, e.g., ensuring the deadlock-freedom of exceptions.

The mezzanine exception aggregator 14404 may also be able to directly service certain classes of exception. For example, a configuration request from the fabric may be served out of the mezzanine network using caches local to the mezzanine network stop.

Tile-Level Exception Aggregator

The final stage of the exception system is the tile-level exception aggregator 14402. The tile-level exception aggregator 14402 is responsible for collecting exceptions from the various mezzanine-level exception aggregators (e.g., 14404) and forwarding them to the appropriate servicing hardware (e.g., core). As such, the tile-level exception aggregator 14402 may include some internal tables and controller to associate particular messages with handler routines. These tables may be indexed either directly or with a small state machine in order to steer particular exceptions.

Like the mezzanine exception aggregator, the tile-level exception aggregator may service some exception requests. For example, it may initiate the reprogramming of a large portion of the PE fabric in response to a specific exception.

6.6 Extraction Controllers

Certain embodiments of a CSA include an extraction controller(s) to extract data from the fabric. The below discusses embodiments of how to achieve this extraction quickly and how to minimize the resource overhead of data extraction. Data extraction may be utilized for such critical tasks as exception handling and context switching. Certain embodiments herein extract data from a heterogeneous spatial fabric by introducing features that allow extractable fabric elements (EFEs) (for example, PEs, network controllers, and/or switches) with variable and dynamically variable amounts of state to be extracted.

Embodiments of a CSA include a distributed data extraction protocol and microarchitecture to support this protocol. Certain embodiments of a CSA include multiple local extraction controllers (LECs) which stream program data out of their local region of the spatial fabric using a combination of a (e.g., small) set of control signals and the fabric-provided network. State elements may be used at each extractable fabric element (EFE) to form extraction chains, e.g., allowing individual EFEs to self-extract without global addressing.

Embodiments of a CSA do not use a local network to extract program data. Embodiments of a CSA include specific hardware support (e.g., an extraction controller) for the formation of extraction chains, for example, and do not rely on software to establish these chains dynamically, e.g., at the cost of increasing extraction time. Embodiments of a CSA are not purely packet switched and do include extra out-of-band control wires (e.g., control is not sent through the data path requiring extra cycles to strobe and reserialize this information). Embodiments of a CSA decrease extraction latency by fixing the extraction ordering and by providing explicit out-of-band control (e.g., by at least a factor of two), while not significantly increasing network complexity.

Embodiments of a CSA do not use a serial mechanism for data extraction, in which data is streamed bit by bit from the fabric using a JTAG-like protocol. Embodiments of a CSA utilize a coarse-grained fabric approach. In certain embodiments, adding a few control wires or state elements to a 64 or 32-bit-oriented CSA fabric has a lower cost relative to adding those same control mechanisms to a 4 or 6 bit fabric.

FIG. 146 illustrates an accelerator tile 14600 comprising an array of processing elements and a local extraction controller (14602, 14606) according to embodiments of the disclosure. Each PE, each network controller, and each switch may be an extractable fabric elements (EFEs), e.g., which are configured (e.g., programmed) by embodiments of the CSA architecture.

Embodiments of a CSA include hardware that provides for efficient, distributed, low-latency extraction from a heterogeneous spatial fabric. This may be achieved according to four techniques. First, a hardware entity, the local extraction controller (LEC) is utilized, for example, as in FIGS. 146-148. A LEC may accept commands from a host (for example, a processor core), e.g., extracting a stream of data from the spatial array, and writing this data back to virtual memory for inspection by the host. Second, a extraction data path may be included, e.g., that is as wide as the native width of the PE fabric and which may be overlaid on top of the PE fabric. Third, new control signals may be received into the PE fabric which orchestrate the extraction process. Fourth, state elements may be located (e.g., in a register) at each configurable endpoint which track the status of adjacent EFEs, allowing each EFE to unambiguously export its state without extra control signals. These four microarchitectural features may allow a CSA to extract data from chains of EFEs. To obtain low data extraction latency, certain embodiments may partition the extraction problem by including multiple (e.g., many) LECs and EFE chains in the fabric. At extraction time, these chains may operate independently to extract data from the fabric in parallel, e.g., dramatically reducing latency. As a result of these combinations, a CSA may perform a complete state dump (e.g., in hundreds of nanoseconds).

FIGS. 147A-147C illustrate a local extraction controller 14702 configuring a data path network according to embodiments of the disclosure. Depicted network includes a plurality of multiplexers (e.g., multiplexers 14706, 14708, 14710) that may be configured (e.g., via their respective control signals) to connect one or more data paths (e.g., from PEs) together. FIG. 147A illustrates the network 14700 (e.g., fabric) configured (e.g., set) for some previous operation or program. FIG. 147B illustrates the local extraction controller 14702 (e.g., including a network interface circuit 14704 to send and/or receive signals) strobing an extraction signal and all PEs controlled by the LEC enter into extraction mode. The last PE in the extraction chain (or an extraction terminator) may master the extraction channels (e.g., bus) and being sending data according to either (1) signals from the LEC or (2) internally produced signals (e.g., from a PE). Once completed, a PE may set its completion flag, e.g., enabling the next PE to extract its data. FIG. 147C illustrates the most distant PE has completed the extraction process and as a result it has set its extraction state bit or bits, e.g., which swing the muxes into the adjacent network to enable the next PE to begin the extraction process. The extracted PE may resume normal operation. In some embodiments, the PE may remain disabled until other action is taken. In these figures, the multiplexor networks are analogues of the "Switch" shown in certain Figures (e.g., FIG. 6).

The following sections describe the operation of the various components of embodiments of an extraction network.

Local Extraction Controller

FIG. 148 illustrates an extraction controller 14802 according to embodiments of the disclosure. A local extraction controller (LEC) may be the hardware entity which is responsible for accepting extraction commands, coordinating the extraction process with the EFEs, and/or storing extracted data, e.g., to virtual memory. In this capacity, the LEC may be a special-purpose, sequential microcontroller.

LEC operation may begin when it receives a pointer to a buffer (e.g., in virtual memory) where fabric state will be written, and, optionally, a command controlling how much of the fabric will be extracted. Depending on the LEC microarchitecture, this pointer (e.g., stored in pointer register 14804) may come either over a network or through a memory system access to the LEC. When it receives such a pointer (e.g., command), the LEC proceeds to extract state from the portion of the fabric for which it is responsible. The LEC may stream this extracted data out of the fabric into the buffer provided by the external caller.

Two different microarchitectures for the LEC are shown in FIG. 146. The first places the LEC 14602 at the memory interface. In this case, the LEC may make direct requests to the memory system to write extracted data. In the second case the LEC 14606 is placed on a memory network, in which it may make requests to the memory only indirectly. In both cases, the logical operation of the LEC may be unchanged. In one embodiment, LECs are informed of the desire to extract data from the fabric, for example, by a set of (e.g., OS-visible) control-status-registers which will be used to inform individual LECs of new commands.

Extra Out-of-Band Control Channels (e.g., Wires)

In certain embodiments, extraction relies on 2-8 extra, out-of-band signals to improve configuration speed, as defined below. Signals driven by the LEC may be labelled LEC. Signals driven by the EFE (e.g., PE) may be labelled EFE. Configuration controller 14802 may include the following control channels, e.g., LEC EXTRACT control channel 14906, LEC START control channel 14808, LEC_STROBE control channel 14810, and EFE COMPLETE control channel 14812, with examples of each discussed in Table 4 below.

TABLE 4

| Extraction Channels | |
|---|---|
| LEC_EXTRACT | Optional signal asserted by the LEC during extraction process. Lowering this signal causes normal operation to resume. |
| LEC_START | Signal denoting start of extraction, allowing setup of local EFE state |
| LEC_STROBE | Optional strobe signal for controlling extraction related state machines at EFEs. EFEs may generate this signal internally in some implementations. |
| EFE_COMPLETE | Optional signal strobed when EFE has completed dumping state. This helps LEC identify the completion of individual EFE dumps. |

Generally, the handling of extraction may be left to the implementer of a particular EFE. For example, selectable function EFE may have a provision for dumping registers using an existing data path, while a fixed function EFE might simply have a multiplexor.

Due to long wire delays when programming a large set of EFEs, the LEC_STROBE signal may be treated as a clock/latch enable for EFE components. Since this signal is used as a clock, in one embodiment the duty cycle of the line is at most 50%. As a result, extraction throughput is approximately halved. Optionally, a second LEC_STROBE signal may be added to enable continuous extraction.

In one embodiment, only LEC_START is strictly communicated on an independent coupling (e.g., wire), for example, other control channels may be overlayed on existing network (e.g., wires).

Reuse of Network Resources

To reduce the overhead of data extraction, certain embodiments of a CSA make use of existing network infrastructure to communicate extraction data. A LEC may make use of both a chip-level memory hierarchy and a fabric-level communications networks to move data from the fabric into storage. As a result, in certain embodiments of a CSA, the extraction infrastructure adds no more than 2% to the overall fabric area and power.

Reuse of network resources in certain embodiments of a CSA may cause a network to have some hardware support for an extraction protocol. Circuit switched networks require of certain embodiments of a CSA cause a LEC to set their multiplexors in a specific way for configuration when the 'LEC_START' signal is asserted. Packet switched networks may not require extension, although LEC endpoints (e.g., extraction terminators) use a specific address in the packet switched network. Network reuse is optional, and some embodiments may find dedicated configuration buses to be more convenient.

Per EFE State

Each EFE may maintain a bit denoting whether or not it has exported its state. This bit may de-asserted when the extraction start signal is driven, and then asserted once the particular EFE finished extraction. In one extraction protocol, EFEs are arranged to form chains with the EFE extraction state bit determining the topology of the chain. A EFE may read the extraction state bit of the immediately adjacent EFE. If this adjacent EFE has its extraction bit set and the current EFE does not, the EFE may determine that it owns the extraction bus. When an EFE dumps its last data value, it may drives the 'EFE_DONE' signal and sets its extraction bit, e.g., enabling upstream EFEs to configure for extraction. The network adjacent to the EFE may observe this signal and also adjust its state to handle the transition. As a base case to the extraction process, an extraction terminator (e.g., extraction terminator 14604 for LEC 14602 or extraction terminator 14608 for LEC 14606 in FIG. 137) which asserts that extraction is complete may be included at the end of a chain.

Internal to the EFE, this bit may be used to drive flow control ready signals. For example, when the extraction bit is de-asserted, network control signals may automatically be clamped to a values that prevent data from flowing, while, within PEs, no operations or actions will be scheduled.

Dealing with High-delay Paths

One embodiment of a LEC may drive a signal over a long distance, e.g., through many multiplexors and with many loads. Thus, it may be difficult for a signal to arrive at a distant EFE within a short clock cycle. In certain embodiments, extraction signals are at some division (e.g., fraction of) of the main (e.g., CSA) clock frequency to ensure digital timing discipline at extraction. Clock division may be utilized in an out-of-band signaling protocol, and does not require any modification of the main clock tree.

Ensuring Consistent Fabric Behavior During Extraction

Since certain extraction scheme are distributed and have non-deterministic timing due to program and memory effects, different members of the fabric may be under extraction at different times. While LEC_EXTRACT is driven, all network flow control signals may be driven logically low, e.g., thus freezing the operation of a particular segment of the fabric.

An extraction process may be non-destructive. Therefore a set of PEs may be considered operational once extraction has completed. An extension to an extraction protocol may allow PEs to optionally be disabled post extraction. Alternatively, beginning configuration during the extraction process will have similar effect in embodiments.

Single PE Extraction

In some cases, it may be expedient to extract a single PE. In this case, an optional address signal may be driven as part of the commencement of the extraction process. This may enable the PE targeted for extraction to be directly enabled. Once this PE has been extracted, the extraction process may cease with the lowering of the LEC_EXTRACT signal. In this way, a single PE may be selectively extracted, e.g., by the local extraction controller.

Handling Extraction Backpressure

In an embodiment where the LEC writes extracted data to memory (for example, for post-processing, e.g., in software), it may be subject to limited memory bandwidth. In the case that the LEC exhausts its buffering capacity, or expects that it will exhaust its buffering capacity, it may stops strobing the LEC_STROBE signal until the buffering issue has resolved.

Note that in certain figures (e.g., FIGS. 137, 140, 141, 143, 144, and 146) communications are shown schematically. In certain embodiments, those communications may occur over the (e.g., interconnect) network.

6.7 Flow Diagrams

FIG. 149 illustrates a flow diagram 14900 according to embodiments of the disclosure. Depicted flow 14900 includes decoding an instruction with a decoder of a core of a processor into a decoded instruction 14902; executing the decoded instruction with an execution unit of the core of the processor to perform a first operation 14904; receiving an input of a dataflow graph comprising a plurality of nodes 14906; overlaying the dataflow graph into an array of processing elements of the processor with each node represented as a dataflow operator in the array of processing elements 14908; and performing a second operation of the dataflow graph with the array of processing elements when an incoming operand set arrives at the array of processing elements 14910.

FIG. 150 illustrates a flow diagram 15000 according to embodiments of the disclosure. Depicted flow 15000 includes decoding an instruction with a decoder of a core of a processor into a decoded instruction 15002; executing the decoded instruction with an execution unit of the core of the processor to perform a first operation 15004; receiving an input of a dataflow graph comprising a plurality of nodes 15006; overlaying the dataflow graph into a plurality of processing elements of the processor and an interconnect network between the plurality of processing elements of the processor with each node represented as a dataflow operator in the plurality of processing elements 15008; and performing a second operation of the dataflow graph with the interconnect network and the plurality of processing elements when an incoming operand set arrives at the plurality of processing elements 15010.

6.8 Memory

FIG. 151A is a block diagram of a system 15100 that employs a memory ordering circuit 15105 interposed between a memory subsystem 15110 and acceleration hardware 15102, according to an embodiment of the present disclosure. The memory subsystem 15110 may include known memory components, including cache, memory, and one or more memory controller(s) associated with a processor-based architecture. The acceleration hardware 15102 may be coarse-grained spatial architecture made up of lightweight processing elements (or other types of processing components) connected by an inter-processing element (PE) network or another type of inter-component network.

In one embodiment, programs, viewed as control data flow graphs, are mapped onto the spatial architecture by configuring PEs and a communications network. Generally, PEs are configured as dataflow operators, similar to functional units in a processor: once the input operands arrive at the PE, some operation occurs, and results are forwarded to downstream PEs in a pipelined fashion. Dataflow operators (or other types of operators) may choose to consume incoming data on a per-operator basis. Simple operators, like those handling the unconditional evaluation of arithmetic expressions often consume all incoming data. It is sometimes useful, however, for operators to maintain state, for example, in accumulation.

The PEs communicate using dedicated virtual circuits, which are formed by statically configuring a circuit switched communications network. These virtual circuits are flow controlled and fully back pressured, such that PEs will stall if either the source has no data or the destination is full. At runtime, data flows through the PEs implementing a mapped algorithm according to a dataflow graph, also referred to as a subprogram herein. For example, data may be streamed in from memory, through the acceleration hardware 15102, and then back out to memory. Such an architecture can achieve remarkable performance efficiency relative to traditional multicore processors: compute, in the form of PEs, is simpler and more numerous than larger cores and communication is direct, as opposed to an extension of the memory subsystem 15110. Memory system parallelism, however, helps to support parallel PE computation. If memory accesses are serialized, high parallelism is likely unachievable. To facilitate parallelism of memory accesses, the disclosed memory ordering circuit 15105 includes memory ordering architecture and microarchitecture, as will be explained in detail. In one embodiment, the memory ordering circuit 15105 is a request address file circuit (or "RAF") or other memory request circuitry.

FIG. 151B is a block diagram of the system 15100 of FIG. 151A but which employs multiple memory ordering circuits 15105, according to an embodiment of the present disclosure. Each memory ordering circuit 15105 may function as an interface between the memory subsystem 15110 and a portion of the acceleration hardware 15102 (e.g., spatial array of processing elements or tile). The memory subsystem 15110 may include a plurality of cache slices 12 (e.g., cache slices 12A, 12B, 12C, and 12D in the embodiment of FIG. 151B), and a certain number of memory ordering circuits 15105 (four in this embodiment) may be used for each cache slice 12. A crossbar 15104 (e.g., RAF circuit) may connect the memory ordering circuits 15105 to banks of cache that make up each cache slice 12A, 12B, 12C, and 12D. For example, there may be eight banks of memory in each cache slice in one embodiment. The system 15100 may be instantiated on a single die, for example, as a system on a chip (SoC). In one embodiment, the SoC includes the acceleration hardware 15102. In an alternative embodiment, the acceleration hardware 15102 is an external programmable chip such as an FPGA or CGRA, and the memory ordering circuits 15105 interface with the acceleration hardware 15102 through an input/output hub or the like.

Each memory ordering circuit 15105 may accept read and write requests to the memory subsystem 15110. The requests from the acceleration hardware 15102 arrive at the memory ordering circuit 15105 in a separate channel for each node of the dataflow graph that initiates read or write accesses, also referred to as load or store accesses herein. Buffering is provided so that the processing of loads will return the requested data to the acceleration hardware 15102 in the order it was requested. In other words, iteration six data is returned before iteration seven data, and so forth. Furthermore, note that the request channel from a memory ordering circuit 15105 to a particular cache bank may be implemented as an ordered channel and any first request that leaves before a second request will arrive at the cache bank before the second request.

FIG. 152 is a block diagram 15200 illustrating general functioning of memory operations into and out of the acceleration hardware 15102, according to an embodiment of the present disclosure. The operations occurring out the top of the acceleration hardware 15102 are understood to be made to and from a memory of the memory subsystem 15110. Note that two load requests are made, followed by corresponding load responses. While the acceleration hardware 15102 performs processing on data from the load responses, a third load request and response occur, which trigger additional acceleration hardware processing. The results of the acceleration hardware processing for these three load operations are then passed into a store operation, and thus a final result is stored back to memory.

By considering this sequence of operations, it may be evident that spatial arrays more naturally map to channels. Furthermore, the acceleration hardware 15102 is latency-insensitive in terms of the request and response channels, and inherent parallel processing that may occur. The acceleration hardware may also decouple execution of a program from implementation of the memory subsystem 15110 (FIG. 151A), as interfacing with the memory occurs at discrete moments separate from multiple processing steps taken by the acceleration hardware 15102. For example, a load request to and a load response from memory are separate actions, and may be scheduled differently in different circumstances depending on dependency flow of memory operations. The use of spatial fabric, for example, for processing operations facilitates spatial separation and distribution of such a load request and a load response.

FIG. 153 is a block diagram 15300 illustrating a spatial dependency flow for a store operation 15301, according to an embodiment of the present disclosure. Reference to a store operation is exemplary, as the same flow may apply to a load operation (but without incoming data), or to other operators such as a fence. A fence is an ordering operation for memory subsystems that ensures that all prior memory operations of a type (such as all stores or all loads) have completed. The store operation 15301 may receive an address 15302 (of memory) and data 15304 received from the acceleration hardware 15102. The store operation 15301 may also receive an incoming dependency token 15308, and in response to the availability of these three items, the store operation 15301 may generate an outgoing dependency token 15312. The incoming dependency token, which may, for example, be an initial dependency token of a program, may be provided in a compiler-supplied configuration for the program, or may be provided by execution of memory-mapped input/output (I/O). Alternatively, if the program has already been running, the incoming dependency token 15308 may be received from the acceleration hardware 15102, e.g., in association with a preceding memory operation from which the store operation 15301 depends. The outgoing dependency token 15312 may be generated based on the address 15302 and data 15304 being required by a program-subsequent memory operation.

FIG. 154 is a detailed block diagram of the memory ordering circuit 15105 of FIG. 151A, according to an embodiment of the present disclosure. The memory ordering circuit 15105 may be coupled to an out-of-order memory subsystem 15110, which as discussed, may include cache 12 and memory 18, and associated out-of-order memory controller(s). The memory ordering circuit 15105 may include, or be coupled to, a communications network interface 20 that may be either an inter-tile or an intra-tile network interface, and may be a circuit switched network interface (as illustrated), and thus include circuit switched interconnects. Alternatively, or additionally, the communications network interface 20 may include packet-switched interconnects.

The memory ordering circuit 15105 may further include, but not be limited to, a memory interface 15410, an operations queue 15412, input queue(s) 15416, a completion queue 15420, an operation configuration data structure 15424, and an operations manager circuit 15430 that may further include a scheduler circuit 15432 and an execution circuit 15434. In one embodiment, the memory interface 15410 may be circuit switched, and in another embodiment, the memory interface 15410 may be packet-switched, or both may exist simultaneously. The operations queue 15412 may buffer memory operations (with corresponding arguments) that are being processed for request, and may, therefore, correspond to addresses and data coming into the input queues 15416.

More specifically, the input queues 15416 may be an aggregation of at least the following: a load address queue, a store address queue, a store data queue, and a dependency queue. When implementing the input queue 15416 as aggregated, the memory ordering circuit 15105 may provide for sharing of logical queues, with additional control logic to logically separate the queues, which are individual channels with the memory ordering circuit. This may maximize input queue usage, but may also require additional complexity and space for the logic circuitry to manage the logical separation of the aggregated queue. Alternatively, as will be discussed with reference to FIG. 155, the input queues 15416 may be implemented in a segregated fashion, with a separate hardware queue for each. Whether aggregated (FIG. 154) or disaggregated (FIG. 155), implementation for purposes of this disclosure is substantially the same, with the former using additional logic to logically separate the queues within a single, shared hardware queue.

When shared, the input queues 15416 and the completion queue 15420 may be implemented as ring buffers of a fixed size. A ring buffer is an efficient implementation of a circular queue that has a first-in-first-out (FIFO) data characteristic. These queues may, therefore, enforce a semantical order of a program for which the memory operations are being requested. In one embodiment, a ring buffer (such as for the store address queue) may have entries corresponding to entries flowing through an associated queue (such as the store data queue or the dependency queue) at the same rate. In this way, a store address may remain associated with corresponding store data.

More specifically, the load address queue may buffer an incoming address of the memory 18 from which to retrieve data. The store address queue may buffer an incoming address of the memory 18 to which to write data, which is buffered in the store data queue. The dependency queue may buffer dependency tokens in association with the addresses of the load address queue and the store address queue. Each queue, representing a separate channel, may be implemented with a fixed or dynamic number of entries. When fixed, the more entries that are available, the more efficient complicated loop processing may be made. But, having too many entries costs more area and energy to implement. In some cases, e.g., with the aggregated architecture, the disclosed input queue 15416 may share queue slots. Use of the slots in a queue may be statically allocated.

The completion queue 15420 may be a separate set of queues to buffer data received from memory in response to memory commands issued by load operations. The completion queue 15420 may be used to hold a load operation that has been scheduled but for which data has not yet been received (and thus has not yet completed). The completion queue 15420, may therefore, be used to reorder data and operation flow.

The operations manager circuit 15430, which will be explained in more detail with reference to FIGS. 155 through 22, may provide logic for scheduling and executing queued memory operations when taking into account dependency tokens used to provide correct ordering of the memory operations. The operation manager 15430 may access the operation configuration data structure 15424 to determine which queues are grouped together to form a given memory operation. For example, the operation configuration data structure 15424 may include that a specific dependency counter (or queue), input queue, output queue, and completion queue are all grouped together for a particular memory operation. As each successive memory operation may be assigned a different group of queues, access to varying queues may be interleaved across a sub-program of memory operations. Knowing all of these queues, the operations manager circuit 15430 may interface with the operations queue 15412, the input queue(s) 15416, the completion queue(s) 15420, and the memory subsystem 15110 to initially issue memory operations to the memory subsystem 15110 when successive memory operations become "executable," and to next complete the memory operation with some acknowledgement from the memory subsystem. This acknowledgement may be, for example, data in response to a load operation command or an acknowledgement of data being stored in the memory in response to a store operation command.

FIG. 155 is a flow diagram of a microarchitecture 15500 of the memory ordering circuit 15105 of FIG. 151A, according to an embodiment of the present disclosure. The memory subsystem 15110 may allow illegal execution of a program in which ordering of memory operations is wrong, due to the semantics of C language (and other object-oriented program languages). The microarchitecture 15500 may enforce the ordering of the memory operations (sequences of loads from and stores to memory) so that results of operations that the acceleration hardware 15102 executes are properly ordered. A number of local networks 50 are illustrated to represent a portion of the acceleration hardware 15102 coupled to the microarchitecture 15500.

From an architectural perspective, there are at least two goals: first, to run general sequential codes correctly, and second, to obtain high performance in the memory operations performed by the microarchitecture 15500. To ensure program correctness, the compiler expresses the dependency between the store operation and the load operation to an array, p, in some fashion, which are expressed via dependency tokens as will be explained. To improve performance, the microarchitecture 15500 finds and issues as many load commands of an array in parallel as is legal with respect to program order.

In one embodiment, the microarchitecture 15500 may include the operations queue 15412, the input queues 15416, the completion queues 15420, and the operations manager circuit 15430 discussed with reference to FIG. 154, above, where individual queues may be referred to as channels. The microarchitecture 15500 may further include a plurality of dependency token counters 15514 (e.g., one per input queue), a set of dependency queues 15518 (e.g., one each per input queue), an address multiplexer 15532, a store data multiplexer 15534, a completion queue index multiplexer 15536, and a load data multiplexer 15538. The operations manager circuit 15430, in one embodiment, may direct these various multiplexers in generating a memory command 15550 (to be sent to the memory subsystem 15110) and in receipt of responses of load commands back from the memory subsystem 15110, as will be explained.

The input queues 15416, as mentioned, may include a load address queue 15522, a store address queue 15524, and a store data queue 15526. (The small numbers 0, 1, 2 are channel labels and will be referred to later in FIG. 158 and FIG. 161A.) In various embodiments, these input queues may be multiplied to contain additional channels, to handle additional parallelization of memory operation processing. Each dependency queue 15518 may be associated with one of the input queues 15416. More specifically, the dependency queue 15518 labeled B0 may be associated with the load address queue 15522 and the dependency queue labeled B1 may be associated with the store address queue 15524. If additional channels of the input queues 15416 are provided, the dependency queues 15518 may include additional, corresponding channels.

In one embodiment, the completion queues 15420 may include a set of output buffers 15544 and 15546 for receipt of load data from the memory subsystem 15110 and a completion queue 15542 to buffer addresses and data for load operations according to an index maintained by the operations manager circuit 15430. The operations manager circuit 15430 can manage the index to ensure in-order execution of the load operations, and to identify data received into the output buffers 15544 and 15546 that may be moved to scheduled load operations in the completion queue 15542.

More specifically, because the memory subsystem 15110 is out of order, but the acceleration hardware 15102 completes operations in order, the microarchitecture 15500 may re-order memory operations with use of the completion queue 15542. Three different sub-operations may be performed in relation to the completion queue 15542, namely to allocate, enqueue, and dequeue. For allocation, the operations manager circuit 15430 may allocate an index into the completion queue 15542 in an in-order next slot of the completion queue. The operations manager circuit may provide this index to the memory subsystem 15110, which may then know the slot to which to write data for a load operation. To enqueue, the memory subsystem 15110 may write data as an entry to the indexed, in-order next slot in the completion queue 15542 like random access memory (RAM), setting a status bit of the entry to valid. To dequeue, the operations manager circuit 15430 may present the data stored in this in-order next slot to complete the load operation, setting the status bit of the entry to invalid. Invalid entries may then be available for a new allocation.

In one embodiment, the status signals 15448 may refer to statuses of the input queues 15416, the completion queues 15420, the dependency queues 15518, and the dependency token counters 15514. These statuses, for example, may include an input status, an output status, and a control status, which may refer to the presence or absence of a dependency token in association with an input or an output. The input status may include the presence or absence of addresses and the output status may include the presence or absence of store values and available completion buffer slots. The dependency token counters 15514 may be a compact representation of a queue and track a number of dependency tokens used for any given input queue. If the dependency token counters 15514 saturate, no additional dependency tokens may be generated for new memory operations. Accordingly, the memory ordering circuit 15105 may stall scheduling new memory operations until the dependency token counters 15514 becomes unsaturated.

With additional reference to FIG. 156, FIG. 156 is a block diagram of an executable determiner circuit 15600, according to an embodiment of the present disclosure. The memory ordering circuit 15105 may be set up with several different kinds of memory operations, for example a load and a store:

ldNo[d,x] result.outN, addr.in64, <u>order.in0,order.out0</u> stNo[d,x] addr.in64, data.inN, <u>order.in0,order.out0</u>

The executable determiner circuit 15600 may be integrated as a part of the scheduler circuit 15432 and which may perform a logical operation to determine whether a given memory operation is executable, and thus ready to be issued to memory. A memory operation may be executed when the queues corresponding to its memory arguments have data and an associated dependency token is present. These memory arguments may include, for example, an input queue identifier 15610 (indicative of a channel of the input queue 15416), an output queue identifier 15620 (indicative of a channel of the completion queues 15420), a dependency queue identifier 15630 (e.g., what dependency queue or counter should be referenced), and an operation type indicator 15640 (e.g., load operation or store operation). A field (e.g., of a memory request) may be included, e.g., in the above format, that stores a bit or bits to indicate to use the hazard checking hardware.

These memory arguments may be queued within the operations queue 15412, and used to schedule issuance of memory operations in association with incoming addresses and data from memory and the acceleration hardware 15102. (See FIG. 157.) Incoming status signals 15448 may be logically combined with these identifiers and then the results may be added (e.g., through an AND gate 15650) to output an executable signal, e.g., which is asserted when the memory operation is executable. The incoming status signals 15448 may include an input status 15612 for the input queue identifier 15610, an output status 15622 for the output queue identifier 15620, and a control status 15632 (related to dependency tokens) for the dependency queue identifier 15630.

For a load operation, and by way of example, the memory ordering circuit 15105 may issue a load command when the load operation has an address (input status) and room to buffer the load result in the completion queue 15542 (output status). Similarly, the memory ordering circuit 15105 may issue a store command for a store operation when the store operation has both an address and data value (input status). Accordingly, the status signals 15448 may communicate a level of emptiness (or fullness) of the queues to which the status signals pertain. The operation type may then dictate whether the logic results in an executable signal depending on what address and data should be available.

To implement dependency ordering, the scheduler circuit 15432 may extend memory operations to include dependency tokens as underlined above in the example load and store operations. The control status 15632 may indicate whether a dependency token is available within the dependency queue identified by the dependency queue identifier 15630, which could be one of the dependency queues 15518 (for an incoming memory operation) or a dependency token counter 15514 (for a completed memory operation). Under this formulation, a dependent memory operation requires an additional ordering token to execute and generates an additional ordering token upon completion of the memory operation, where completion means that data from the result of the memory operation has become available to program-subsequent memory operations.

In one embodiment, with further reference to FIG. 155, the operations manager circuit 15430 may direct the address multiplexer 15532 to select an address argument that is buffered within either the load address queue 15522 or the store address queue 15524, depending on whether a load operation or a store operation is currently being scheduled for execution. If it is a store operation, the operations manager circuit 15430 may also direct the store data multiplexer 15534 to select corresponding data from the store data queue 15526. The operations manager circuit 15430 may also direct the completion queue index multiplexer 15536 to retrieve a load operation entry, indexed according to queue status and/or program order, within the completion queues 15420, to complete a load operation. The operations manager circuit 15430 may also direct the load data multiplexer 15538 to select data received from the memory subsystem 15110 into the completion queues 15420 for a load operation that is awaiting completion. In this way, the operations manager circuit 15430 may direct selection of inputs that go into forming the memory command 15550, e.g., a load command or a store command, or that the execution circuit 15434 is waiting for to complete a memory operation.

FIG. 157 is a block diagram the execution circuit 15434 that may include a priority encoder 15706 and selection circuitry 15708 and which generates output control line(s) 15710, according to one embodiment of the present disclosure. In one embodiment, the execution circuit 15434 may access queued memory operations (in the operations queue 15412) that have been determined to be executable (FIG. 156). The execution circuit 15434 may also receive the schedules 15704A, 15704B, 15704C for multiple of the queued memory operations that have been queued and also indicated as ready to issue to memory. The priority encoder 15706 may thus receive an identity of the executable memory operations that have been scheduled and execute certain rules (or follow particular logic) to select the memory operation from those coming in that has priority to be executed first. The priority encoder 15706 may output a selector signal 15707 that identifies the scheduled memory operation that has a highest priority, and has thus been selected.

The priority encoder 15706, for example, may be a circuit (such as a state machine or a simpler converter) that compresses multiple binary inputs into a smaller number of outputs, including possibly just one output. The output of a priority encoder is the binary representation of the original number starting from zero of the most significant input bit. So, in one example, when memory operation 0 ("zero"), memory operation one ("1"), and memory operation two ("2") are executable and scheduled, corresponding to 15704A, 15704B, and 15704C, respectively. The priority encoder 15706 may be configured to output the selector signal 15707 to the selection circuitry 15708 indicating the memory operation zero as the memory operation that has highest priority. The selection circuitry 15708 may be a multiplexer in one embodiment, and be configured to output its selection (e.g., of memory operation zero) onto the control lines 15710, as a control signal, in response to the selector signal from the priority encoder 15706 (and indicative of selection of memory operation of highest priority). This control signal may go to the multiplexers 15532, 15534, 15536, and/or 15538, as discussed with reference to FIG. 155, to populate the memory command 15550 that is next to issue (be sent) to the memory subsystem 15110. The transmittal of the memory command may be understood to be issuance of a memory operation to the memory subsystem 15110.

FIG. 158 is a block diagram of an exemplary load operation 15800, both logical and in binary form, according to an embodiment of the present disclosure. Referring back to FIG. 156, the logical representation of the load operation 15800 may include channel zero ("0") (corresponding to the load address queue 15522) as the input queue identifier 15610 and completion channel one ("1") (corresponding to the output buffer 15544) as the output queue identifier 15620. The dependency queue identifier 15630 may include two identifiers, channel B0 (corresponding to the first of the dependency queues 15518) for incoming dependency tokens and counter C0 for outgoing dependency tokens. The operation type 15640 has an indication of "Load," which could be a numerical indicator as well, to indicate the memory operation is a load operation. Below the logical representation of the logical memory operation is a binary representation for exemplary purposes, e.g., where a load is indicated by "00." The load operation of FIG. 158 may be extended to include other configurations such as a store operation (FIG. 160A) or other type of memory operations, such as a fence.

An example of memory ordering by the memory ordering circuit 15105 will be illustrated with a simplified example for purposes of explanation with relation to FIGS. 159A-159B, 160A-160B, and 161A-161G. For this example, the following code includes an array, p, which is accessed by indices i and i+2:

```
for(i) {
    temp = p[i];
     p[i+2] = temp;
}
```

Assume, for this example, that array p contains 0,1,2,3, 4,5,6, and at the end of loop execution, array p will contain 0,1,0,1,0,1,0. This code may be transformed by unrolling the loop, as illustrated in FIGS. 159A and 159B. True address dependencies are annotated by arrows in FIG. 159A, which in each case, a load operation is dependent on a store operation to the same address. For example, for the first of such dependencies, a store (e.g., a write) to p[2] needs to occur before a load (e.g., a read) from p[2], and second of such dependencies, a store to p[3] needs to occur before a load from p[3], and so forth. As a compiler is to be pessimistic, the compiler annotates dependencies between two memory operations, load p[i] and store p[i+2]. Note that only sometimes do reads and writes conflict. The microarchitecture 15500 is designed to extract memory-level parallelism where memory operations may move forward at the same time when there are no conflicts to the same address. This is especially the case for load operations, which expose latency in code execution due to waiting for preceding dependent store operations to complete. In the example code in FIG. 159B, safe reorderings are noted by the arrows on the left of the unfolded code.

The way the microarchitecture may perform this reordering is discussed with reference to FIGS. 160A-160B and 161A-161G. Note that this approach is not as optimal as possible because the microarchitecture 15500 may not send a memory command to memory every cycle. However, with minimal hardware, the microarchitecture supports dependency flows by executing memory operations when operands (e.g., address and data, for a store, or address for a load) and dependency tokens are available.

FIG. 160A is a block diagram of exemplary memory arguments for a load operation 16002 and for a store operation 16004, according to an embodiment of the present disclosure. These, or similar, memory arguments were discussed with relation to FIG. 158 and will not be repeated here. Note, however, that the store operation 16004 has no indicator for the output queue identifier because no data is being output to the acceleration hardware 15102. Instead, the store address in channel 1 and the data in channel 2 of the input queues 15416, as identified in the input queue identifier memory argument, are to be scheduled for transmission to the memory subsystem 15110 in a memory command to complete the store operation 16004. Furthermore, the input channels and output channels of the dependency queues are both implemented with counters. Because the load operations and the store operations as displayed in FIGS. 159A and 159B are interdependent, the counters may be cycled between the load operations and the store operations within the flow of the code.

FIG. 160B is a block diagram illustrating flow of the load operations and store operations, such as the load operation 16002 and the store 16004 operation of FIG. 159A, through the microarchitecture 15500 of the memory ordering circuit of FIG. 155, according to an embodiment of the present disclosure. For simplicity of explanation, not all of the components are displayed, but reference may be made back to the additional components displayed in FIG. 155. Various ovals indicating "Load" for the load operation 16002 and "Store" for the store operation 16004 are overlaid on some of the components of the microarchitecture 15500 as indication of how various channels of the queues are being used as the memory operations are queued and ordered through the microarchitecture 15500.

FIGS. 161A, 161B, 161C, 161D, 161E, 161F, 161G, and 161H are block diagrams illustrating functional flow of load operations and store operations for the exemplary program of FIGS. 159A and 159B through queues of the microarchitecture of FIG. 160B, according to an embodiment of the present disclosure. Each figure may correspond to a next cycle of processing by the microarchitecture 15500. Values that are italicized are incoming values (into the queues) and values that are bolded are outgoing values (out of the queues). All other values with normal fonts are retained values already existing in the queues.

In FIG. 161A, the address p[0] is incoming into the load address queue 15522, and the address p[2] is incoming into the store address queue 15524, starting the control flow process. Note that counter C0, for dependency input for the load address queue, is "1" and counter Cl, for dependency output, is zero. In contrast, the "1" of C0 indicates a dependency out value for the store operation. This indicates an incoming dependency for the load operation of p[0] and an outgoing dependency for the store operation of p[2]. These values, however, are not yet active, but will become active, in this way, in FIG. 161B.

In FIG. 161B, address p[0] is bolded to indicate it is outgoing in this cycle. A new address p[1] is incoming into the load address queue and a new address p[3] is incoming into the store address queue. A zero ("0")-valued bit in the completion queue 15542 is also incoming, which indicates any data present for that indexed entry is invalid. As mentioned, the values for the counters C0 and Cl are now indicated as incoming, and are thus now active this cycle.

Figure 161C:
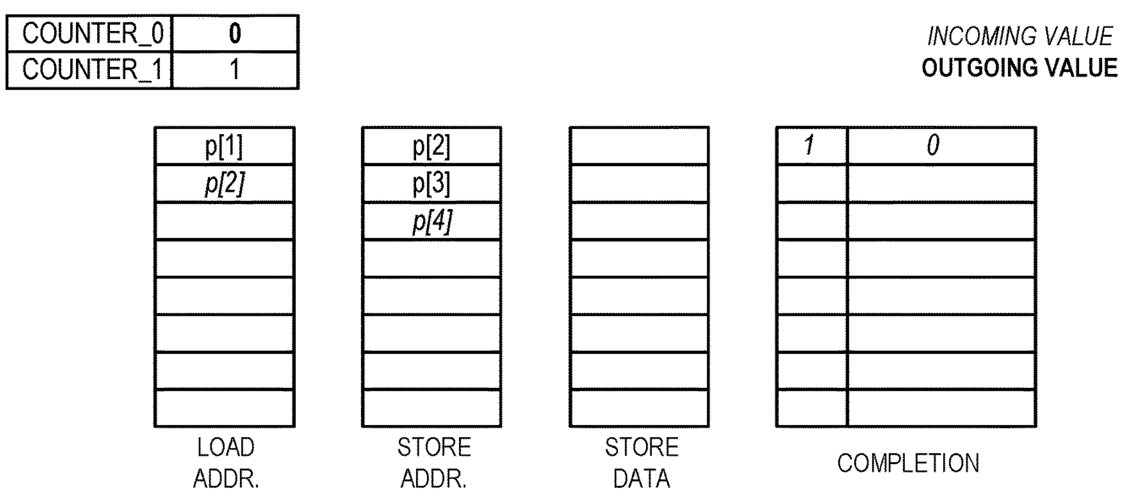

In FIG. 161C, the outgoing address p[0] has now left the load address queue and a new address p[2] is incoming into the load address queue. And, the data ("0") is incoming into the completion queue for address p[0]. The validity bit is set to "1" to indicate that the data in the completion queue is valid. Furthermore, a new address p[4] is incoming into the store address queue. The value for counter C0 is indicated as outgoing and the value for counter C1 is indicated as incoming. The value of "1" for C1 indicates an incoming dependency for store operation to address p[4].

Note that the address p[2] for the newest load operation is dependent on the value that first needs to be stored by the store operation for address p[2], which is at the top of the store address queue. Later, the indexed entry in the completion queue for the load operation from address p[2] may remain buffered until the data from the store operation to the address p[2] is completed (see FIGS. 161F-161H).

Figure 161D:
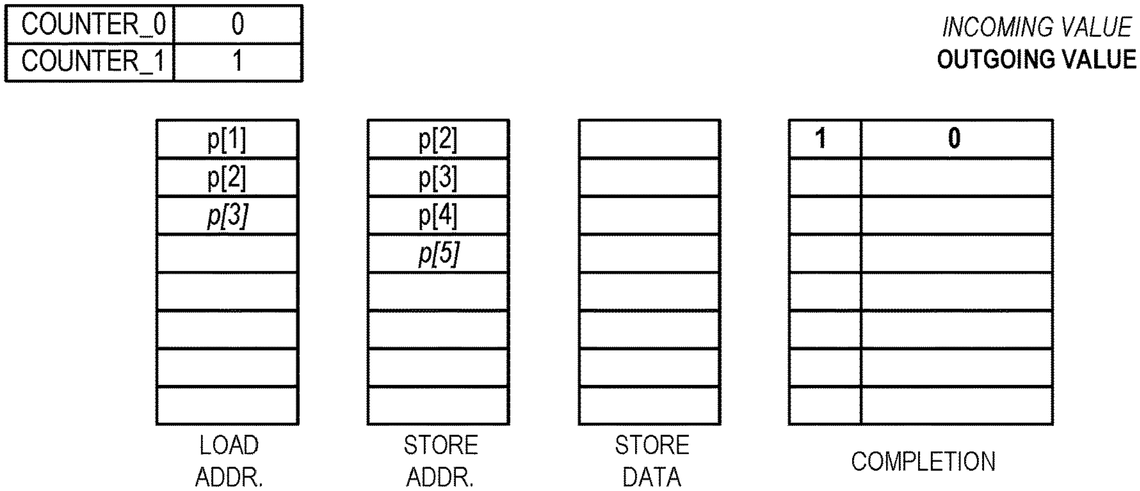

In FIG. 161D, the data ("0") is outgoing from the completion queue for address p[0], which is therefore being sent out to the acceleration hardware 15102. Furthermore, a new address p[3] is incoming into the load address queue and a new address p[5] is incoming into the store address queue. The values for the counters C0 and C1 remain unchanged.

Figure 161E:
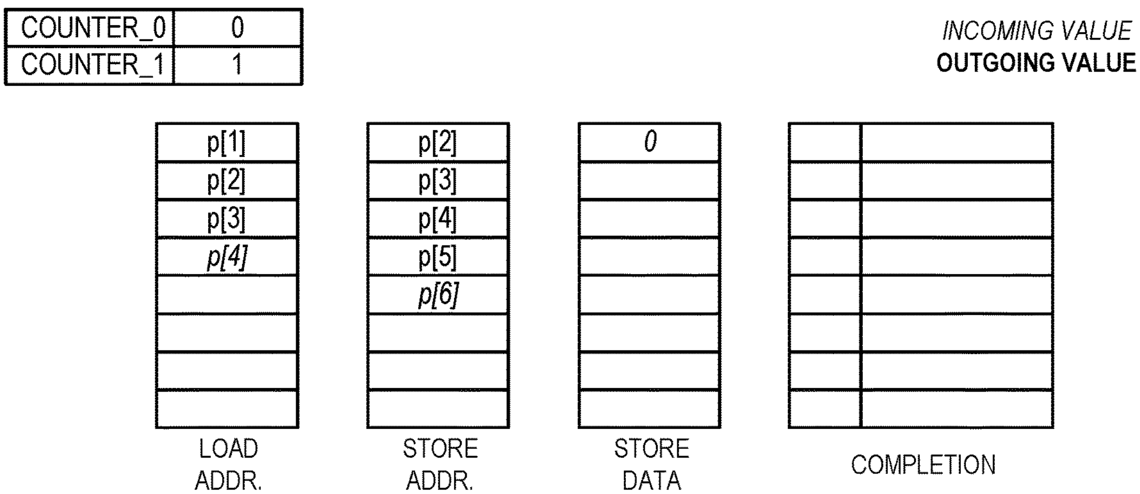

In FIG. 161E, the value ("0") for the address p[2] is incoming into the store data queue, while a new address p[4] comes into the load address queue and a new address p[6] comes into the store address queue. The counter values for C0 and C1 remain unchanged.

Figure 161F:
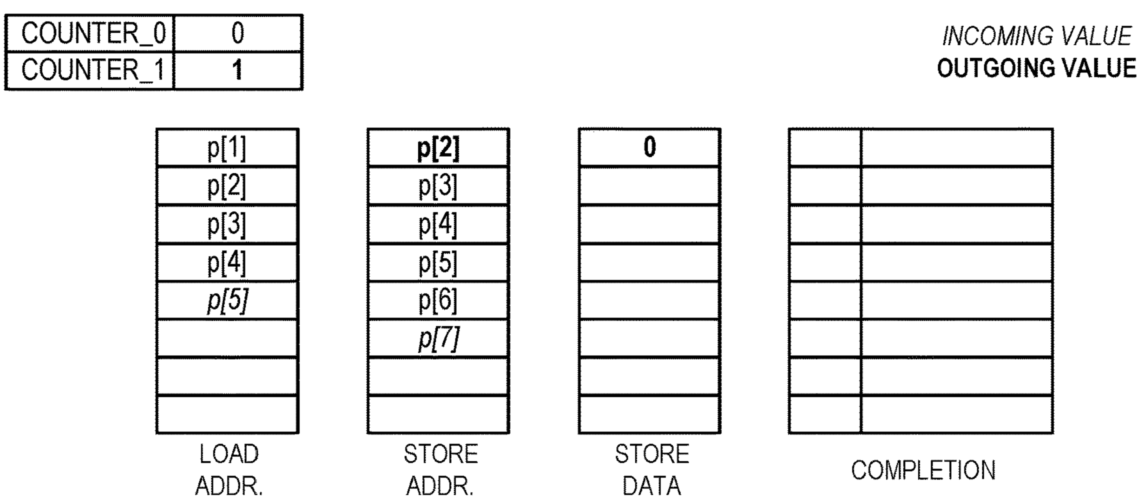

In FIG. 161F, the value ("0") for the address p[2] in the store data queue, and the address p[2] in the store address queue are both outgoing values. Likewise, the value for the counter C1 is indicated as outgoing, while the value ("0") for counter C0 remain unchanged. Furthermore, a new address p[5] is incoming into the load address queue and a new address p[7] is incoming into the store address queue.

Figure 161G:
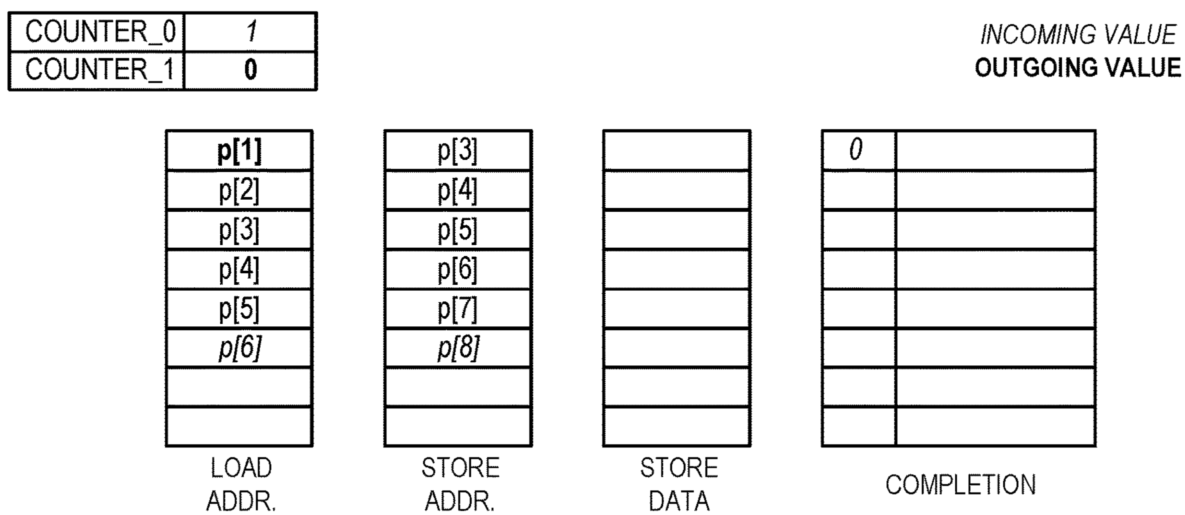

In FIG. 161G, the value ("0") is incoming to indicate the indexed value within the completion queue 15542 is invalid. The address p[1] is bolded to indicate it is outgoing from the load address queue while a new address p[6] is incoming into the load address queue. A new address p[8] is also incoming into the store address queue. The value of counter C0 is incoming as a "1," corresponding to an incoming dependency for the load operation of address p[6] and an outgoing dependency for the store operation of address p[8]. The value of counter C1 is now "0," and is indicated as outgoing.

Figure 161H:
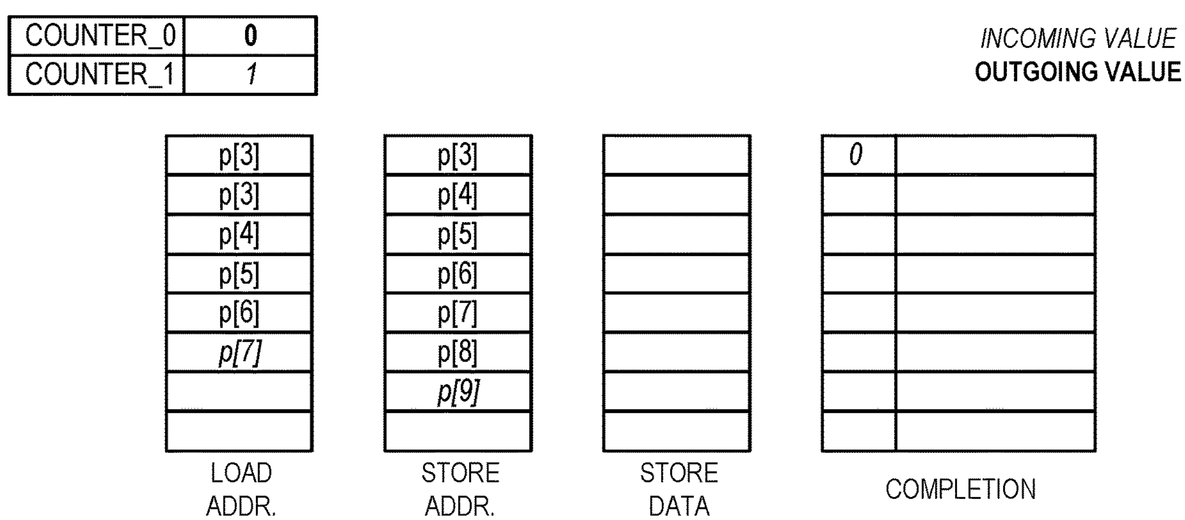

In FIG. 161H, a data value of "1" is incoming into the completion queue 15542 while the validity bit is also incoming as a "1," meaning that the buffered data is valid. This is the data needed to complete the load operation for p[2]. Recall that this data had to first be stored to address p[2], which happened in FIG. 161F. The value of "0" for counter C0 is outgoing, and a value of "1," for counter C1 is incoming. Furthermore, a new address p[7] is incoming into the load address queue and a new address p[9] is incoming into the store address queue.

In the present embodiment, the process of executing the code of FIGS. 159A and 159B may continue on with bouncing dependency tokens between "0" and "1" for the load operations and the store operations. This is due to the tight dependencies between p[i] and p[i+2]. Other code with less frequent dependencies may generate dependency tokens at a slower rate, and thus reset the counters C0 and C1 at a slower rate, causing the generation of tokens of higher values (corresponding to further semantically-separated memory operations).

FIG. 162 is a flow chart of a method 16200 for ordering memory operations between acceleration hardware and an out-of-order memory subsystem, according to an embodiment of the present disclosure. The method 16200 may be performed by a system that may include hardware (e.g., circuitry, dedicated logic, and/or programmable logic), software (e.g., operations executable on a computer system to perform hardware simulation), or a combination thereof. In an illustrative example, the method 16200 may be performed by the memory ordering circuit 15105 and various subcomponents of the memory ordering circuit 15105.

More specifically, referring to FIG. 162, the method 16200 may start with the memory ordering circuit queuing memory operations in an operations queue of the memory ordering circuit (16210). Memory operation and control arguments may make up the memory operations, as queued, where the memory operation and control arguments are mapped to certain queues within the memory ordering circuit as discussed previously. The memory ordering circuit may work to issue the memory operations to a memory in association with acceleration hardware, to ensure the memory operations complete in program order. The method 16200 may continue with the memory ordering circuit receiving, in set of input queues, from the acceleration hardware, an address of the memory associated with a second memory operation of the memory operations (16220). In one embodiment, a load address queue of the set of input queues is the channel to receive the address. In another embodiment, a store address queue of the set of input queues is the channel to receive the address. The method 16200 may continue with the memory ordering circuit receiving, from the acceleration hardware, a dependency token associated with the address, wherein the dependency token indicates a dependency on data generated by a first memory operation, of the memory operations, which precedes the second memory operation (16230). In one embodiment, a channel of a dependency queue is to receive the dependency token. The first memory operation may be either a load operation or a store operation.

The method 16200 may continue with the memory ordering circuit scheduling issuance of the second memory operation to the memory in response to receiving the dependency token and the address associated with the dependency token (16240). For example, when the load address queue receives the address for an address argument of a load operation and the dependency queue receives the dependency token for a control argument of the load operation, the memory ordering circuit may schedule issuance of the second memory operation as a load operation. The method 16200 may continue with the memory ordering circuit issuing the second memory operation (e.g., in a command) to the memory in response to completion of the first memory operation (16250). For example, if the first memory operation is a store, completion may be verified by acknowledgement that the data in a store data queue of the set of input queues has been written to the address in the memory. Similarly, if the first memory operation is a load operation, completion may be verified by receipt of data from the memory for the load operation.

8. SUMMARY

Supercomputing at the ExaFLOP scale may be a challenge in high-performance computing, a challenge which is not likely to be met by conventional von Neumann architectures. To achieve ExaFLOPs, embodiments of a CSA provide a heterogeneous spatial array that targets direct execution of (e.g., compiler-produced) dataflow graphs. In addition to laying out the architectural principles of embodiments of a CSA, the above also describes and evaluates embodiments of a CSA which showed performance and energy of larger than 10× over existing products. Compiler-generated code may have significant performance and energy gains over roadmap architectures. As a heterogeneous, parametric architecture, embodiments of a CSA may be readily adapted to all computing uses. For example, a mobile version of CSA might be tuned to 32-bits, while a machine-learning focused array might feature significant numbers of vectorized 8-bit multiplication units. The main advantages of embodiments of a CSA are high performance and extreme energy efficiency, characteristics relevant to all forms of computing ranging from supercomputing and datacenter to the internet-of-things.

In one embodiment, a processor includes a spatial array of processing elements; and a packet switched communications network to route data within the spatial array between processing elements according to a dataflow graph to perform a first dataflow operation of the dataflow graph, wherein the packet switched communications network further comprises a plurality of network dataflow endpoint circuits to perform a second dataflow operation of the dataflow graph. A network dataflow endpoint circuit of the plurality of network dataflow endpoint circuits may include a network ingress buffer to receive input data from the packet switched communications network; and a spatial array egress buffer to output resultant data to the spatial array of processing elements according to the second dataflow operation on the input data. The spatial array egress buffer may output the resultant data based on a scheduler within the network dataflow endpoint circuit monitoring the packet switched communications network. The spatial array egress buffer may output the resultant data based on the scheduler within the network dataflow endpoint circuit monitoring a selected channel of multiple network virtual channels of the packet switched communications network. A network dataflow endpoint circuit of the plurality of network dataflow endpoint circuits may include a spatial array ingress buffer to receive control data from the spatial array that causes a network ingress buffer of the network dataflow endpoint circuit that received input data from the packet switched communications network to output resultant data to the spatial array of processing elements according to the second dataflow operation on the input data and the control data. A network dataflow endpoint circuit of the plurality of network dataflow endpoint circuits may stall an output of resultant data of the second dataflow operation from a spatial array egress buffer of the network dataflow endpoint circuit when a backpressure signal from a downstream processing element of the spatial array of processing elements indicates that storage in the downstream processing element is not available for the output of the network dataflow endpoint circuit. A network dataflow endpoint circuit of the plurality of network dataflow endpoint circuits may send a backpressure signal to stall a source from sending input data on the packet switched communications network into a network ingress buffer of the network dataflow endpoint circuit when the network ingress buffer is not available. The spatial array of processing elements may include a plurality of processing elements; and an interconnect network between the plurality of processing elements to receive an input of the dataflow graph comprising a plurality of nodes, wherein the dataflow graph is to be overlaid into the interconnect network, the plurality of processing elements, and the plurality of network dataflow endpoint circuits with each node represented as a dataflow operator in either of the plurality of processing elements and the plurality of network dataflow endpoint circuits, and the plurality of processing elements and the plurality of network dataflow endpoint circuits are to perform an operation by an incoming operand set arriving at each of the dataflow operators of the plurality of processing elements and the plurality of network dataflow endpoint circuits. The spatial array of processing elements may include a circuit switched network to transport the data within the spatial array between processing elements according to the dataflow graph.

In another embodiment, a method includes providing a spatial array of processing elements; routing, with a packet switched communications network, data within the spatial array between processing elements according to a dataflow graph; performing a first dataflow operation of the dataflow graph with the processing elements; and performing a second dataflow operation of the dataflow graph with a plurality of network dataflow endpoint circuits of the packet switched communications network. The performing the second dataflow operation may include receiving input data from the packet switched communications network with a network ingress buffer of a network dataflow endpoint circuit of the plurality of network dataflow endpoint circuits; and outputting resultant data from a spatial array egress buffer of the network dataflow endpoint circuit to the spatial array of processing elements according to the second dataflow operation on the input data. The outputting may include outputting the resultant data based on a scheduler within the network dataflow endpoint circuit monitoring the packet switched communications network. The outputting may include outputting the resultant data based on the scheduler within the network dataflow endpoint circuit monitoring a selected channel of multiple network virtual channels of the packet switched communications network. The performing the second dataflow operation may include receiving control data, with a spatial array ingress buffer of a network dataflow endpoint circuit of the plurality of network dataflow endpoint circuits, from the spatial array; and configuring the network dataflow endpoint circuit to cause a network ingress buffer of the network dataflow endpoint circuit that received input data from the packet switched communications network to output resultant data to the spatial array of processing elements according to the second dataflow operation on the input data and the control data. The performing the second dataflow operation may include stalling an output of the second dataflow operation from a spatial array egress buffer of a network dataflow endpoint circuit of the plurality of network dataflow endpoint circuits when a backpressure signal from a downstream processing element of the spatial array of processing elements indicates that storage in the downstream processing element is not available for the output of the network dataflow endpoint circuit. The performing the second dataflow operation may include sending a backpressure signal from a network dataflow endpoint circuit of the plurality of network dataflow endpoint circuits to stall a source from sending input data on the packet switched communications network into a network ingress buffer of the network dataflow endpoint circuit when the network ingress buffer is not available. The routing, performing the first dataflow operation, and performing the second dataflow operation may include receiving an input of a dataflow graph comprising a plurality of nodes; overlaying the dataflow graph into the spatial array of processing elements and the plurality of network dataflow endpoint circuits with each node represented as a dataflow operator in either of the processing elements and the plurality of network dataflow endpoint circuits; and performing the first dataflow operation with the processing elements and performing the second dataflow operation with the plurality of network dataflow endpoint circuits when an incoming operand set arrives at each of the dataflow operators of the processing elements and the plurality of network dataflow endpoint circuits. The method may include transporting the data within the spatial array between processing elements according to the dataflow graph with a circuit switched network of the spatial array.

In yet another embodiment, a non-transitory machine readable medium that stores code that when executed by a machine causes the machine to perform a method including providing a spatial array of processing elements; routing, with a packet switched communications network, data within the spatial array between processing elements according to a dataflow graph; performing a first dataflow operation of the dataflow graph with the processing elements; and performing a second dataflow operation of the dataflow graph with a plurality of network dataflow endpoint circuits of the packet switched communications network. The performing the second dataflow operation may include receiving input data from the packet switched communications network with a network ingress buffer of a network dataflow endpoint circuit of the plurality of network dataflow endpoint circuits; and outputting resultant data from a spatial array egress buffer of the network dataflow endpoint circuit to the spatial array of processing elements according to the second dataflow operation on the input data. The outputting may include outputting the resultant data based on a scheduler within the network dataflow endpoint circuit monitoring the packet switched communications network. The outputting may include outputting the resultant data based on the scheduler within the network dataflow endpoint circuit monitoring a selected channel of multiple network virtual channels of the packet switched communications network. The performing the second dataflow operation may include receiving control data, with a spatial array ingress buffer of a network dataflow endpoint circuit of the plurality of network dataflow endpoint circuits, from the spatial array; and configuring the network dataflow endpoint circuit to cause a network ingress buffer of the network dataflow endpoint circuit that received input data from the packet switched communications network to output resultant data to the spatial array of processing elements according to the second dataflow operation on the input data and the control data. The performing the second dataflow operation may include stalling an output of the second dataflow operation from a spatial array egress buffer of a network dataflow endpoint circuit of the plurality of network dataflow endpoint circuits when a backpressure signal from a downstream processing element of the spatial array of processing elements indicates that storage in the downstream processing element is not available for the output of the network dataflow endpoint circuit. The performing the second dataflow operation may include sending a backpressure signal from a network dataflow endpoint circuit of the plurality of network dataflow endpoint circuits to stall a source from sending input data on the packet switched communications network into a network ingress buffer of the network dataflow endpoint circuit when the network ingress buffer is not available. The routing, performing the first dataflow operation, and performing the second dataflow operation may include receiving an input of a dataflow graph comprising a plurality of nodes; overlaying the dataflow graph into the spatial array of processing elements and the plurality of network dataflow endpoint circuits with each node represented as a dataflow operator in either of the processing elements and the plurality of network dataflow endpoint circuits; and performing the first dataflow operation with the processing elements and performing the second dataflow operation with the plurality of network dataflow endpoint circuits when an incoming operand set arrives at each of the dataflow operators of the processing elements and the plurality of network dataflow endpoint circuits. The method may include transporting the data within the spatial array between processing elements according to the dataflow graph with a circuit switched network of the spatial array.

In another embodiment, a processor includes a spatial array of processing elements; and a packet switched communications network to route data within the spatial array between processing elements according to a dataflow graph to perform a first dataflow operation of the dataflow graph, wherein the packet switched communications network further comprises means to perform a second dataflow operation of the dataflow graph.

In one embodiment, a processor includes a core with a decoder to decode an instruction into a decoded instruction and an execution unit to execute the decoded instruction to perform a first operation; a plurality of processing elements; and an interconnect network between the plurality of processing elements to receive an input of a dataflow graph comprising a plurality of nodes, wherein the dataflow graph is to be overlaid into the interconnect network and the plurality of processing elements with each node represented as a dataflow operator in the plurality of processing elements, and the plurality of processing elements are to perform a second operation by a respective, incoming operand set arriving at each of the dataflow operators of the plurality of processing elements. A processing element of the plurality of processing elements may stall execution when a backpressure signal from a downstream processing element indicates that storage in the downstream processing element is not available for an output of the processing element. The processor may include a flow control path network to carry the backpressure signal according to the dataflow graph. A dataflow token may cause an output from a dataflow operator receiving the dataflow token to be sent to an input buffer of a particular processing element of the plurality of processing elements. The second operation may include a memory access and the plurality of processing elements comprises a memory-accessing dataflow operator that is not to perform the memory access until receiving a memory dependency token from a logically previous dataflow operator. The plurality of processing elements may include a first type of processing element and a second, different type of processing element.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements by a respective, incoming operand set arriving at each of the dataflow operators of the plurality of processing elements. The method may include stalling execution by a processing element of the plurality of processing elements when a backpressure signal from a downstream processing element indicates that storage in the downstream processing element is not available for an output of the processing element. The method may include sending the backpressure signal on a flow control path network according to the dataflow graph. A dataflow token may cause an output from a dataflow operator receiving the dataflow token to be sent to an input buffer of a particular processing element of the plurality of processing elements. The method may include not performing a memory access until receiving a memory dependency token from a logically previous dataflow operator, wherein the second operation comprises the memory access and the plurality of processing elements comprises a memory-accessing dataflow operator. The method may include providing a first type of processing element and a second, different type of processing element of the plurality of processing elements.

In yet another embodiment, an apparatus includes a data path network between a plurality of processing elements; and a flow control path network between the plurality of processing elements, wherein the data path network and the flow control path network are to receive an input of a dataflow graph comprising a plurality of nodes, the dataflow graph is to be overlaid into the data path network, the flow control path network, and the plurality of processing elements with each node represented as a dataflow operator in the plurality of processing elements, and the plurality of processing elements are to perform a second operation by a respective, incoming operand set arriving at each of the dataflow operators of the plurality of processing elements. The flow control path network may carry backpressure signals to a plurality of dataflow operators according to the dataflow graph. A dataflow token sent on the data path network to a dataflow operator may cause an output from the dataflow operator to be sent to an input buffer of a particular processing element of the plurality of processing elements on the data path network. The data path network may be a static, circuit switched network to carry the respective, input operand set to each of the dataflow operators according to the dataflow graph. The flow control path network may transmit a backpressure signal according to the dataflow graph from a downstream processing element to indicate that storage in the downstream processing element is not available for an output of the processing element. At least one data path of the data path network and at least one'flow control path of the flow control path network may form a channelized circuit with backpressure control. The flow control path network may pipeline at least two of the plurality of processing elements in series.

In another embodiment, a method includes receiving an input of a dataflow graph comprising a plurality of nodes; and overlaying the dataflow graph into a plurality of processing elements of a processor, a data path network between the plurality of processing elements, and a flow control path network between the plurality of processing elements with each node represented as a dataflow operator in the plurality of processing elements. The method may include carrying backpressure signals with the flow control path network to a plurality of dataflow operators according to the dataflow graph. The method may include sending a dataflow token on the data path network to a dataflow operator to cause an output from the dataflow operator to be sent to an input buffer of a particular processing element of the plurality of processing elements on the data path network. The method may include setting a plurality of switches of the data path network and/or a plurality of switches of the flow control path network to carry the respective, input operand set to each of the dataflow operators according to the dataflow graph, wherein the data path network is a static, circuit switched network. The method may include transmitting a backpressure signal with the flow control path network according to the dataflow graph from a downstream processing element to indicate that storage in the downstream processing element is not available for an output of the processing element. The method may include forming a channelized circuit with backpressure control with at least one data path of the data path network and at least one flow control path of the flow control path network.

In yet another embodiment, a processor includes a core with a decoder to decode an instruction into a decoded instruction and an execution unit to execute the decoded instruction to perform a first operation; a plurality of processing elements; and a network means between the plurality of processing elements to receive an input of a dataflow graph comprising a plurality of nodes, wherein the dataflow graph is to be overlaid into the network means and the plurality of processing elements with each node represented as a dataflow operator in the plurality of processing elements, and the plurality of processing elements are to perform a second operation by a respective, incoming operand set arriving at each of the dataflow operators of the plurality of processing elements.

In another embodiment, an apparatus includes a data path means between a plurality of processing elements; and a flow control path means between the plurality of processing elements, wherein the data path means and the flow control path means are to receive an input of a dataflow graph comprising a plurality of nodes, the dataflow graph is to be overlaid into the data path means, the flow control path means, and the plurality of processing elements with each node represented as a dataflow operator in the plurality of processing elements, and the plurality of processing elements are to perform a second operation by a respective, incoming operand set arriving at each of the dataflow operators of the plurality of processing elements.

In one embodiment, a processor includes a core with a decoder to decode an instruction into a decoded instruction and an execution unit to execute the decoded instruction to perform a first operation; and an array of processing elements to receive an input of a dataflow graph comprising a plurality of nodes, wherein the dataflow graph is to be overlaid into the array of processing elements with each node represented as a dataflow operator in the array of processing elements, and the array of processing elements is to perform a second operation when an incoming operand set arrives at the array of processing elements. The array of processing element may not perform the second operation until the incoming operand set arrives at the array of processing elements and storage in the array of processing elements is available for output of the second operation. The array of processing elements may include a network (or channel(s)) to carry dataflow tokens and control tokens to a plurality of dataflow operators. The second operation may include a memory access and the array of processing elements may include a memory-accessing dataflow operator that is not to perform the memory access until receiving a memory dependency token from a logically previous dataflow operator. Each processing element may perform only one or two operations of the dataflow graph.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into an array of processing elements of the processor with each node represented as a dataflow operator in the array of processing elements; and performing a second operation of the dataflow graph with the array of processing elements when an incoming operand set arrives at the array of processing elements. The array of processing elements may not perform the second operation until the incoming operand set arrives at the array of processing elements and storage in the array of processing elements is available for output of the second operation. The array of processing elements may include a network carrying dataflow tokens and control tokens to a plurality of dataflow operators. The second operation may include a memory access and the array of processing elements comprises a memory-accessing dataflow operator that is not to perform the memory access until receiving a memory dependency token from a logically previous dataflow operator. Each processing element may performs only one or two operations of the dataflow graph.

In yet another embodiment, a non-transitory machine readable medium that stores code that when executed by a machine causes the machine to perform a method including decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into an array of processing elements of the processor with each node represented as a dataflow operator in the array of processing elements; and performing a second operation of the dataflow graph with the array of processing elements when an incoming operand set arrives at the array of processing elements. The array of processing element may not perform the second operation until the incoming operand set arrives at the array of processing elements and storage in the array of processing elements is available for output of the second operation. The array of processing elements may include a network carrying dataflow tokens and control tokens to a plurality of dataflow operators. The second operation may include a memory access and the array of processing elements comprises a memory-accessing dataflow operator that is not to perform the memory access until receiving a memory dependency token from a logically previous dataflow operator. Each processing element may performs only one or two operations of the dataflow graph.

In another embodiment, a processor includes a core with a decoder to decode an instruction into a decoded instruction and an execution unit to execute the decoded instruction to perform a first operation; and means to receive an input of a dataflow graph comprising a plurality of nodes, wherein the dataflow graph is to be overlaid into the means with each node represented as a dataflow operator in the means, and the means is to perform a second operation when an incoming operand set arrives at the means.

In one embodiment, a processor includes a core with a decoder to decode an instruction into a decoded instruction and an execution unit to execute the decoded instruction to perform a first operation; a plurality of processing elements; and an interconnect network between the plurality of processing elements to receive an input of a dataflow graph comprising a plurality of nodes, wherein the dataflow graph is to be overlaid into the interconnect network and the plurality of processing elements with each node represented as a dataflow operator in the plurality of processing elements, and the plurality of processing elements is to perform a second operation when an incoming operand set arrives at the plurality of processing elements. The processor may further comprise a plurality of configuration controllers, each configuration controller is coupled to a respective subset of the plurality of processing elements, and each configuration controller is to load configuration information from storage and cause coupling of the respective subset of the plurality of processing elements according to the configuration information. The processor may include a plurality of configuration caches, and each configuration controller is coupled to a respective configuration cache to fetch the configuration information for the respective subset of the plurality of processing elements. The first operation performed by the execution unit may prefetch configuration information into each of the plurality of configuration caches. Each of the plurality of configuration controllers may include a reconfiguration circuit to cause a reconfiguration for at least one processing element of the respective subset of the plurality of processing elements on receipt of a configuration error message from the at least one processing element. Each of the plurality of configuration controllers may a reconfiguration circuit to cause a reconfiguration for the respective subset of the plurality of processing elements on receipt of a reconfiguration request message, and disable communication with the respective subset of the plurality of processing elements until the reconfiguration is complete. The processor may include a plurality of exception aggregators, and each exception aggregator is coupled to a respective subset of the plurality of processing elements to collect exceptions from the respective subset of the plurality of processing elements and forward the exceptions to the core for servicing. The processor may include a plurality of extraction controllers, each extraction controller is coupled to a respective subset of the plurality of processing elements, and each extraction controller is to cause state data from the respective subset of the plurality of processing elements to be saved to memory.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements when an incoming operand set arrives at the plurality of processing elements. The method may include loading configuration information from storage for respective subsets of the plurality of processing elements and causing coupling for each respective subset of the plurality of processing elements according to the configuration information. The method may include fetching the configuration information for the respective subset of the plurality of processing elements from a respective configuration cache of a plurality of configuration caches. The first operation performed by the execution unit may be prefetching configuration information into each of the plurality of configuration caches. The method may include causing a reconfiguration for at least one processing element of the respective subset of the plurality of processing elements on receipt of a configuration error message from the at least one processing element. The method may include causing a reconfiguration for the respective subset of the plurality of processing elements on receipt of a reconfiguration request message; and disabling communication with the respective subset of the plurality of processing elements until the reconfiguration is complete. The method may include collecting exceptions from a respective subset of the plurality of processing elements; and forwarding the exceptions to the core for servicing. The method may include causing state data from a respective subset of the plurality of processing elements to be saved to memory.

In yet another embodiment, a non-transitory machine readable medium that stores code that when executed by a machine causes the machine to perform a method including decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements when an incoming operand set arrives at the plurality of processing elements. The method may include loading configuration information from storage for respective subsets of the plurality of processing elements and causing coupling for each respective subset of the plurality of processing elements according to the configuration information. The method may include fetching the configuration information for the respective subset of the plurality of processing elements from a respective configuration cache of a plurality of configuration caches. The first operation performed by the execution unit may be prefetching configuration information into each of the plurality of configuration caches. The method may include causing a reconfiguration for at least one processing element of the respective subset of the plurality of processing elements on receipt of a configuration error message from the at least one processing element. The method may include causing a reconfiguration for the respective subset of the plurality of processing elements on receipt of a reconfiguration request message; and disabling communication with the respective subset of the plurality of processing elements until the reconfiguration is complete. The method may include collecting exceptions from a respective subset of the plurality of processing elements; and forwarding the exceptions to the core for servicing. The method may include causing state data from a respective subset of the plurality of processing elements to be saved to memory.

In another embodiment, a processor includes a core with a decoder to decode an instruction into a decoded instruction and an execution unit to execute the decoded instruction to perform a first operation; a plurality of processing elements; and means between the plurality of processing elements to receive an input of a dataflow graph comprising a plurality of nodes, wherein the dataflow graph is to be overlaid into the m and the plurality of processing elements with each node represented as a dataflow operator in the plurality of processing elements, and the plurality of processing elements is to perform a second operation when an incoming operand set arrives at the plurality of processing elements.

In one embodiment, an apparatus (e.g., a processor) includes: a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform an operation by a respective, incoming operand set arriving at each of the dataflow operators; a plurality of request address file circuits coupled to the spatial array of processing elements and a cache memory, each request address file circuit of the plurality of request address file circuits to access data in the cache memory in response to a request for data access from the spatial array of processing elements; a plurality of translation lookaside buffers comprising a translation lookaside buffer in each of the plurality of request address file circuits to provide an output of a physical address for an input of a virtual address; and a translation lookaside buffer manager circuit comprising a higher level translation lookaside buffer than the plurality of translation lookaside buffers, the translation lookaside buffer manager circuit to perform a first page walk in the cache memory for a miss of an input of a virtual address into a first translation lookaside buffer and into the higher level translation lookaside buffer to determine a physical address mapped to the virtual address, store a mapping of the virtual address to the physical address from the first page walk in the higher level translation lookaside buffer to cause the higher level translation lookaside buffer to send the physical address to the first translation lookaside buffer in a first request address file circuit. The translation lookaside buffer manager circuit may simultaneously, with the first page walk, perform a second page walk in the cache memory, wherein the second page walk is for a miss of an input of a virtual address into a second translation lookaside buffer and into the higher level translation lookaside buffer to determine a physical address mapped to the virtual address, store a mapping of the virtual address to the physical address from the second page walk in the higher level translation lookaside buffer to cause the higher level translation lookaside buffer to send the physical address to the second translation lookaside buffer in a second request address file circuit. The receipt of the physical address in the first translation lookaside buffer may cause the first request address file circuit to perform a data access for the request for data access from the spatial array of processing elements on the physical address in the cache memory. The translation lookaside buffer manager circuit may insert an indicator in the higher level translation lookaside buffer for the miss of the input of the virtual address in the first translation lookaside buffer and the higher level translation lookaside buffer to prevent an additional page walk for the input of the virtual address during the first page walk. The translation lookaside buffer manager circuit may receive a shootdown message from a requesting entity for a mapping of a physical address to a virtual address, invalidate the mapping in the higher level translation lookaside buffer, and send shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The translation lookaside buffer manager circuit may receive a shootdown message from a requesting entity for a mapping of a physical address to a virtual address, invalidate the mapping in the higher level translation lookaside buffer, and send shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In another embodiment, a method includes overlaying an input of a dataflow graph comprising a plurality of nodes into a spatial array of processing elements comprising a communications network with each node represented as a dataflow operator in the spatial array of processing elements; coupling a plurality of request address file circuits to the spatial array of processing elements and a cache memory with each request address file circuit of the plurality of request address file circuits accessing data in the cache memory in response to a request for data access from the spatial array of processing elements; providing an output of a physical address for an input of a virtual address into a translation lookaside buffer of a plurality of translation lookaside buffers comprising a translation lookaside buffer in each of the plurality of request address file circuits; coupling a translation lookaside buffer manager circuit comprising a higher level translation lookaside buffer than the plurality of translation lookaside buffers to the plurality of request address file circuits and the cache memory; and performing a first page walk in the cache memory for a miss of an input of a virtual address into a first translation lookaside buffer and into the higher level translation lookaside buffer with the translation lookaside buffer manager circuit to determine a physical address mapped to the virtual address, store a mapping of the virtual address to the physical address from the first page walk in the higher level translation lookaside buffer to cause the higher level translation lookaside buffer to send the physical address to the first translation lookaside buffer in a first request address file circuit. The method may include simultaneously, with the first page walk, performing a second page walk in the cache memory with the translation lookaside buffer manager circuit, wherein the second page walk is for a miss of an input of a virtual address into a second translation lookaside buffer and into the higher level translation lookaside buffer to determine a physical address mapped to the virtual address, and storing a mapping of the virtual address to the physical address from the second page walk in the higher level translation lookaside buffer to cause the higher level translation lookaside buffer to send the physical address to the second translation lookaside buffer in a second request address file circuit. The method may include causing the first request address file circuit to perform a data access for the request for data access from the spatial array of processing elements on the physical address in the cache memory in response to receipt of the physical address in the first translation lookaside buffer. The method may include inserting, with the translation lookaside buffer manager circuit, an indicator in the higher level translation lookaside buffer for the miss of the input of the virtual address in the first translation lookaside buffer and the higher level translation lookaside buffer to prevent an additional page walk for the input of the virtual address during the first page walk. The method may include receiving, with the translation lookaside buffer manager circuit, a shootdown message from a requesting entity for a mapping of a physical address to a virtual address, invalidating the mapping in the higher level translation lookaside buffer, and sending shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The method may include receiving, with the translation lookaside buffer manager circuit, a shootdown message from a requesting entity for a mapping of a physical address to a virtual address, invalidate the mapping in the higher level translation lookaside buffer, and sending shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In another embodiment, an apparatus includes a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform an operation by a respective, incoming operand set arriving at each of the dataflow operators; a plurality of request address file circuits coupled to the spatial array of processing elements and a plurality of cache memory banks, each request address file circuit of the plurality of request address file circuits to access data in (e.g., each of) the plurality of cache memory banks in response to a request for data access from the spatial array of processing elements; a plurality of translation lookaside buffers comprising a translation lookaside buffer in each of the plurality of request address file circuits to provide an output of a physical address for an input of a virtual address; a plurality of higher level, than the plurality of translation lookaside buffers, translation lookaside buffers comprising a higher level translation lookaside buffer in each of the plurality of cache memory banks to provide an output of a physical address for an input of a virtual address; and a translation lookaside buffer manager circuit to perform a first page walk in the plurality of cache memory banks for a miss of an input of a virtual address into a first translation lookaside buffer and into a first higher level translation lookaside buffer to determine a physical address mapped to the virtual address, store a mapping of the virtual address to the physical address from the first page walk in the first higher level translation lookaside buffer to cause the first higher level translation lookaside buffer to send the physical address to the first translation lookaside buffer in a first request address file circuit. The translation lookaside buffer manager circuit may simultaneously, with the first page walk, perform a second page walk in the plurality of cache memory banks, wherein the second page walk is for a miss of an input of a virtual address into a second translation lookaside buffer and into a second higher level translation lookaside buffer to determine a physical address mapped to the virtual address, store a mapping of the virtual address to the physical address from the second page walk in the second higher level translation lookaside buffer to cause the second higher level translation lookaside buffer to send the physical address to the second translation lookaside buffer in a second request address file circuit. The receipt of the physical address in the first translation lookaside buffer may cause the first request address file circuit to perform a data access for the request for data access from the spatial array of processing elements on the physical address in the plurality of cache memory banks. The translation lookaside buffer manager circuit may insert an indicator in the first higher level translation lookaside buffer for the miss of the input of the virtual address in the first translation lookaside buffer and the first higher level translation lookaside buffer to prevent an additional page walk for the input of the virtual address during the first page walk. The translation lookaside buffer manager circuit may receive a shootdown message from a requesting entity for a mapping of a physical address to a virtual address, invalidate the mapping in a higher level translation lookaside buffer storing the mapping, and send shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The translation lookaside buffer manager circuit may receive a shootdown message from a requesting entity for a mapping of a physical address to a virtual address, invalidate the mapping in a higher level translation lookaside buffer storing the mapping, and send shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In yet another embodiment, a method includes: overlaying an input of a dataflow graph comprising a plurality of nodes into a spatial array of processing elements comprising a communications network with each node represented as a dataflow operator in the spatial array of processing elements; coupling a plurality of request address file circuits to the spatial array of processing elements and a plurality of cache memory banks with each request address file circuit of the plurality of request address file circuits accessing data in the plurality of cache memory banks in response to a request for data access from the spatial array of processing elements;

providing an output of a physical address for an input of a virtual address into a translation lookaside buffer of a plurality of translation lookaside buffers comprising a translation lookaside buffer in each of the plurality of request address file circuits; providing an output of a physical address for an input of a virtual address into a higher level, than the plurality of translation lookaside buffers, translation lookaside buffer of a plurality of higher level translation lookaside buffers comprising a higher level translation lookaside buffer in each of the plurality of cache memory banks; coupling a translation lookaside buffer manager circuit to the plurality of request address file circuits and the plurality of cache memory banks; and performing a first page walk in the plurality of cache memory banks for a miss of an input of a virtual address into a first translation lookaside buffer and into a first higher level translation lookaside buffer with the translation lookaside buffer manager circuit to determine a physical address mapped to the virtual address, store a mapping of the virtual address to the physical address from the first page walk in the first higher level translation lookaside buffer to cause the first higher level translation lookaside buffer to send the physical address to the first translation lookaside buffer in a first request address file circuit. The method may include simultaneously, with the first page walk, performing a second page walk in the plurality of cache memory banks with the translation lookaside buffer manager circuit, wherein the second page walk is for a miss of an input of a virtual address into a second translation lookaside buffer and into a second higher level translation lookaside buffer to determine a physical address mapped to the virtual address, and storing a mapping of the virtual address to the physical address from the second page walk in the second higher level translation lookaside buffer to cause the second higher level translation lookaside buffer to send the physical address to the second translation lookaside buffer in a second request address file circuit. The method may include causing the first request address file circuit to perform a data access for the request for data access from the spatial array of processing elements on the physical address in the plurality of cache memory banks in response to receipt of the physical address in the first translation lookaside buffer. The method may include inserting, with the translation lookaside buffer manager circuit, an indicator in the first higher level translation lookaside buffer for the miss of the input of the virtual address in the first translation lookaside buffer and the first higher level translation lookaside buffer to prevent an additional page walk for the input of the virtual address during the first page walk. The method may include receiving, with the translation lookaside buffer manager circuit, a shootdown message from a requesting entity for a mapping of a physical address to a virtual address, invalidating the mapping in a higher level translation lookaside buffer storing the mapping, and sending shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The method may include receiving, with the translation lookaside buffer manager circuit, a shootdown message from a requesting entity for a mapping of a physical address to a virtual address, invalidate the mapping in a higher level translation lookaside buffer storing the mapping, and sending shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In another embodiment, a system includes a core with a decoder to decode an instruction into a decoded instruction and an execution unit to execute the decoded instruction to perform a first operation; a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform a second operation by a respective, incoming operand set arriving at each of the dataflow operators; a plurality of request address file circuits coupled to the spatial array of processing elements and a cache memory, each request address file circuit of the plurality of request address file circuits to access data in the cache memory in response to a request for data access from the spatial array of processing elements; a plurality of translation lookaside buffers comprising a translation lookaside buffer in each of the plurality of request address file circuits to provide an output of a physical address for an input of a virtual address; and a translation lookaside buffer manager circuit comprising a higher level translation lookaside buffer than the plurality of translation lookaside buffers, the translation lookaside buffer manager circuit to perform a first page walk in the cache memory for a miss of an input of a virtual address into a first translation lookaside buffer and into the higher level translation lookaside buffer to determine a physical address mapped to the virtual address, store a mapping of the virtual address to the physical address from the first page walk in the higher level translation lookaside buffer to cause the higher level translation lookaside buffer to send the physical address to the first translation lookaside buffer in a first request address file circuit. The translation lookaside buffer manager circuit may simultaneously, with the first page walk, perform a second page walk in the cache memory, wherein the second page walk is for a miss of an input of a virtual address into a second translation lookaside buffer and into the higher level translation lookaside buffer to determine a physical address mapped to the virtual address, store a mapping of the virtual address to the physical address from the second page walk in the higher level translation lookaside buffer to cause the higher level translation lookaside buffer to send the physical address to the second translation lookaside buffer in a second request address file circuit. The receipt of the physical address in the first translation lookaside buffer may cause the first request address file circuit to perform a data access for the request for data access from the spatial array of processing elements on the physical address in the cache memory. The translation lookaside buffer manager circuit may insert an indicator in the higher level translation lookaside buffer for the miss of the input of the virtual address in the first translation lookaside buffer and the higher level translation lookaside buffer to prevent an additional page walk for the input of the virtual address during the first page walk. The translation lookaside buffer manager circuit may receive a shootdown message from a requesting entity for a mapping of a physical address to a virtual address, invalidate the mapping in the higher level translation lookaside buffer, and send shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The translation lookaside buffer manager circuit may receive a shootdown message from a requesting entity for a mapping of a physical address to a virtual address, invalidate the mapping in the higher level translation lookaside buffer, and send shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In yet another embodiment, a system includes a core with a decoder to decode an instruction into a decoded instruction and an execution unit to execute the decoded instruction to perform a first operation; a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform a second operation by a respective, incoming operand set arriving at each of the dataflow operators; a plurality of request address file circuits coupled to the spatial array of processing elements and a plurality of cache memory banks, each request address file circuit of the plurality of request address file circuits to access data in (e.g., each of) the plurality of cache memory banks in response to a request for data access from the spatial array of processing elements; a plurality of translation lookaside buffers comprising a translation lookaside buffer in each of the plurality of request address file circuits to provide an output of a physical address for an input of a virtual address; a plurality of higher level, than the plurality of translation lookaside buffers, translation lookaside buffers comprising a higher level translation lookaside buffer in each of the plurality of cache memory banks to provide an output of a physical address for an input of a virtual address; and a translation lookaside buffer manager circuit to perform a first page walk in the plurality of cache memory banks for a miss of an input of a virtual address into a first translation lookaside buffer and into a first higher level translation lookaside buffer to determine a physical address mapped to the virtual address, store a mapping of the virtual address to the physical address from the first page walk in the first higher level translation lookaside buffer to cause the first higher level translation lookaside buffer to send the physical address to the first translation lookaside buffer in a first request address file circuit. The translation lookaside buffer manager circuit may simultaneously, with the first page walk, perform a second page walk in the plurality of cache memory banks, wherein the second page walk is for a miss of an input of a virtual address into a second translation lookaside buffer and into a second higher level translation lookaside buffer to determine a physical address mapped to the virtual address, store a mapping of the virtual address to the physical address from the second page walk in the second higher level translation lookaside buffer to cause the second higher level translation lookaside buffer to send the physical address to the second translation lookaside buffer in a second request address file circuit. The receipt of the physical address in the first translation lookaside buffer may cause the first request address file circuit to perform a data access for the request for data access from the spatial array of processing elements on the physical address in the plurality of cache memory banks. The translation lookaside buffer manager circuit may insert an indicator in the first higher level translation lookaside buffer for the miss of the input of the virtual address in the first translation lookaside buffer and the first higher level translation lookaside buffer to prevent an additional page walk for the input of the virtual address during the first page walk. The translation lookaside buffer manager circuit may receive a shootdown message from a requesting entity for a mapping of a physical address to a virtual address, invalidate the mapping in a higher level translation lookaside buffer storing the mapping, and send shootdown messages to only those of the plurality of request address file circuits that include a copy of the mapping in a respective translation lookaside buffer, wherein each of those of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received. The translation lookaside buffer manager circuit may receive a shootdown message from a requesting entity for a mapping of a physical address to a virtual address, invalidate the mapping in a higher level translation lookaside buffer storing the mapping, and send shootdown messages to all of the plurality of request address file circuits, wherein each of the plurality of request address file circuits are to send an acknowledgement message to the translation lookaside buffer manager circuit, and the translation lookaside buffer manager circuit is to send a shootdown completion acknowledgment message to the requesting entity when all acknowledgement messages are received.

In another embodiment, an apparatus (e.g., a processor) includes: a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform an operation by a respective, incoming operand set arriving at each of the dataflow operators; a plurality of request address file circuits coupled to the spatial array of processing elements and a cache memory, each request address file circuit of the plurality of request address file circuits to access data in the cache memory in response to a request for data access from the spatial array of processing elements; a plurality of translation lookaside buffers comprising a translation lookaside buffer in each of the plurality of request address file circuits to provide an output of a physical address for an input of a virtual address; and a means comprising a higher level translation lookaside buffer than the plurality of translation lookaside buffers, the means to perform a first page walk in the cache memory for a miss of an input of a virtual address into a first translation lookaside buffer and into the higher level translation lookaside buffer to determine a physical address mapped to the virtual address, store a mapping of the virtual address to the physical address from the first page walk in the higher level translation lookaside buffer to cause the higher level translation lookaside buffer to send the physical address to the first translation lookaside buffer in a first request address file circuit.

In yet another embodiment, an apparatus includes a spatial array of processing elements comprising a communications network to receive an input of a dataflow graph comprising a plurality of nodes, wherein the dataflow graph is to be overlaid into the spatial array of processing elements with each node represented as a dataflow operator in the spatial array of processing elements, and the spatial array of processing elements is to perform an operation by a respective, incoming operand set arriving at each of the dataflow operators; a plurality of request address file circuits coupled to the spatial array of processing elements and a plurality of cache memory banks, each request address file circuit of the plurality of request address file circuits to access data in (e.g., each of) the plurality of cache memory banks in response to a request for data access from the spatial array of processing elements; a plurality of translation lookaside buffers comprising a translation lookaside buffer in each of the plurality of request address file circuits to provide an output of a physical address for an input of a virtual address; a plurality of higher level, than the plurality of translation lookaside buffers, translation lookaside buffers comprising a higher level translation lookaside buffer in each of the plurality of cache memory banks to provide an output of a physical address for an input of a virtual address; and a means to perform a first page walk in the plurality of cache memory banks for a miss of an input of a virtual address into a first translation lookaside buffer and into a first higher level translation lookaside buffer to determine a physical address mapped to the virtual address, store a mapping of the virtual address to the physical address from the first page walk in the first higher level translation lookaside buffer to cause the first higher level translation lookaside buffer to send the physical address to the first translation lookaside buffer in a first request address file circuit.

In one embodiment, an apparatus (e.g., hardware accelerator) includes a data path having a first branch and a second branch, and the data path comprising at least one processing element; a switch circuit (for example, switch PE, e.g., PE 9) comprising a switch control input to receive a first switch control value to couple an input of the switch circuit to the first branch and a second switch control value to couple the input of the switch circuit to the second branch; a pick circuit (for example, a pick PE, e.g., another instance of PE 9) comprising a pick control input to receive a first pick control value to couple an output of the pick circuit to the first branch and a second pick control value to couple the output of the pick circuit to a third branch of the data path; a predicate propagation processing element to (e.g., simultaneously) output a first edge predicate value and a second edge predicate value based on (e.g., both of) a switch control value from the switch control input of the switch circuit and a first block predicate value (e.g., from another PE); and a predicate merge processing element to (e.g., simultaneously) output a pick control value to the pick control input of the pick circuit and a second block predicate value based on both of a third edge predicate value and one of the first edge predicate value or the second edge predicate value. The second branch and the third branch may be a same branch of the data path. A second predicate propagation processing element may be coupled to the predicate propagation processing element to send the first block predicate value to the predicate propagation processing element based on at least a switch control value from a switch control input of a second switch circuit of the data path. The second predicate propagation processing element may be coupled to the predicate merge processing element to send the third edge predicate value to the predicate merge processing element based on at least the switch control value from the switch control input of the second switch circuit of the data path. A second predicate merge processing element may be coupled to the predicate merge processing element to send the third edge predicate value to the predicate merge processing element based on at least a pick control value from a pick control input of a second pick circuit of the data path. The predicate propagation processing element may output: a false value as the first edge predicate value and a false value as the second edge predicate value when the first block predicate value is a false value; a true value as the first edge predicate value and a false value as the second edge predicate value when the first block predicate value is a true value and the switch control value is a false value; and a false value as the first edge predicate value and a true value as the second edge predicate value when the first block predicate value is a true value and the switch control value is a true value. The predicate merge processing element may output: a false value as the second block predicate value and no value for the pick control value to the pick control input when the third edge predicate value is a false value and the one of the first edge predicate value or the second edge predicate value is a false value; a true value as the second block predicate value and a false value as the pick control value to the pick control input when the third edge predicate value is a true value and the one of the first edge predicate value or the second edge predicate value is a false value; and a true value as the second block predicate value and a true value as the pick control value to the pick control input when the third edge predicate value is a false value and the one of the first edge predicate value or the second edge predicate value is a true value. The predicate merge processing element may output: a false value as the second block predicate value and no value for the pick control value to the pick control input when the third edge predicate value is a false value and the one of the first edge predicate value or the second edge predicate value is a false value; a true value as the second block predicate value and a false value as the pick control value to the pick control input when the third edge predicate value is a true value and the one of the first edge predicate value or the second edge predicate value is a false value; and a true value as the second block predicate value and a true value as the pick control value to the pick control input when the third edge predicate value is a false value and the one of the first edge predicate value or the second edge predicate value is a true value. The predicate propagation processing element may stall sending of the one of the first edge predicate value or the second edge predicate value to the predicate merge processing element when a backpressure signal from the predicate merge processing element indicates that storage in the predicate merge processing element is not available for the one of the first edge predicate value or the second edge predicate value.

In another embodiment, a method includes receiving, on a switch control input of a switch circuit, a first switch control value to couple an input of the switch circuit to a first branch of a data path or a second switch control value to couple the input of the switch circuit to a second branch of the data path, the data path comprising at least one processing element; receiving, on a pick control input of a pick circuit, a first pick control value to couple an output of the pick circuit to the first branch and a second pick control value to couple the output of the pick circuit to a third branch of the data path; simultaneously outputting, by a predicate propagation processing element, a first edge predicate value and a second edge predicate value based on both of a switch control value from the switch control input of the switch circuit and a first block predicate value; and simultaneously outputting, by a predicate merge processing element, a pick control value to the pick control input of the pick circuit and a second block predicate value based on both of a third edge predicate value and one of the first edge predicate value or the second edge predicate value. The method may include a second predicate propagation processing element sending the first block predicate value to the predicate propagation processing element based on at least a switch control value from a switch control input of a second switch circuit of the data path. The method may include the second predicate propagation processing element sending the third edge predicate value to the predicate merge processing element based on at least the switch control value from the switch control input of the second switch circuit of the data path. The method may include a second predicate merge processing element sending the third edge predicate value to the predicate merge processing element based on at least a pick control value from a pick control input of a second pick circuit of the data path. The method may include the predicate propagation processing element outputting: a false value as the first edge predicate value and a false value as the second edge predicate value when the first block predicate value is a false value; a true value as the first edge predicate value and a false value as the second edge predicate value when the first block predicate value is a true value and the switch control value is a false value; and a false value as the first edge predicate value and a true value as the second edge predicate value when the first block predicate value is a true value and the switch control value is a true value. The method may include the predicate merge processing element outputting: a false value as the second block predicate value and no value for the pick control value to the pick control input when the third edge predicate value is a false value and the one of the first edge predicate value or the second edge predicate value is a false value; a true value as the second block predicate value and a false value as the pick control value to the pick control input when the third edge predicate value is a true value and the one of the first edge predicate value or the second edge predicate value is a false value; and a true value as the second block predicate value and a true value as the pick control value to the pick control input when the third edge predicate value is a false value and the one of the first edge predicate value or the second edge predicate value is a true value. The method may include the predicate merge processing element outputting: a false value as the second block predicate value and no value for the pick control value to the pick control input when the third edge predicate value is a false value and the one of the first edge predicate value or the second edge predicate value is a false value; a true value as the second block predicate value and a false value as the pick control value to the pick control input when the third edge predicate value is a true value and the one of the first edge predicate value or the second edge predicate value is a false value; and a true value as the second block predicate value and a true value as the pick control value to the pick control input when the third edge predicate value is a false value and the one of the first edge predicate value or the second edge predicate value is a true value. The method may include the predicate propagation processing element stalling sending of the one of the first edge predicate value or the second edge predicate value to the predicate merge processing element when a backpressure signal from the predicate merge processing element indicates that storage in the predicate merge processing element is not available for the one of the first edge predicate value or the second edge predicate value.

In yet another embodiment, a non-transitory machine readable medium that stores code that when executed by a machine causes the machine to perform a method comprising: receiving, on a switch control input of a switch circuit, a first switch control value to couple an input of the switch circuit to a first branch of a data path or a second switch control value to couple the input of the switch circuit to a second branch of the data path, the data path comprising at least one processing element; receiving, on a pick control input of a pick circuit, a first pick control value to couple an output of the pick circuit to the first branch and a second pick control value to couple the output of the pick circuit to a third branch of the data path; simultaneously outputting, by a predicate propagation processing element, a first edge predicate value and a second edge predicate value based on both of a switch control value from the switch control input of the switch circuit and a first block predicate value; and simultaneously outputting, by a predicate merge processing element, a pick control value to the pick control input of the pick circuit and a second block predicate value based on both of a third edge predicate value and one of the first edge predicate value or the second edge predicate value. The method may include a second predicate propagation processing element sending the first block predicate value to the predicate propagation processing element based on at least a switch control value from a switch control input of a second switch circuit of the data path. The method may include the second predicate propagation processing element sending the third edge predicate value to the predicate merge processing element based on at least the switch control value from the switch control input of the second switch circuit of the data path. The method may include a second predicate merge processing element sending the third edge predicate value to the predicate merge processing element based on at least a pick control value from a pick control input of a second pick circuit of the data path. The method may include the predicate propagation processing element outputting: a false value as the first edge predicate value and a false value as the second edge predicate value when the first block predicate value is a false value; a true value as the first edge predicate value and a false value as the second edge predicate value when the first block predicate value is a true value and the switch control value is a false value; and a false value as the first edge predicate value and a true value as the second edge predicate value when the first block predicate value is a true value and the switch control value is a true value. The method may include the predicate merge processing element outputting: a false value as the second block predicate value and no value for the pick control value to the pick control input when the third edge predicate value is a false value and the one of the first edge predicate value or the second edge predicate value is a false value; a true value as the second block predicate value and a false value as the pick control value to the pick control input when the third edge predicate value is a true value and the one of the first edge predicate value or the second edge predicate value is a false value; and a true value as the second block predicate value and a true value as the pick control value to the pick control input when the third edge predicate value is a false value and the one of the first edge predicate value or the second edge predicate value is a true value. The method may include the predicate merge processing element outputting: a false value as the second block predicate value and no value for the pick control value to the pick control input when the third edge predicate value is a false value and the one of the first edge predicate value or the second edge predicate value is a false value; a true value as the second block predicate value and a false value as the pick control value to the pick control input when the third edge predicate value is a true value and the one of the first edge predicate value or the second edge predicate value is a false value; and a true value as the second block predicate value and a true value as the pick control value to the pick control input when the third edge predicate value is a false value and the one of the first edge predicate value or the second edge predicate value is a true value. The method may include the predicate propagation processing element stalling sending of the one of the first edge predicate value or the second edge predicate value to the predicate merge processing element when a backpressure signal from the predicate merge processing element indicates that storage in the predicate merge processing element is not available for the one of the first edge predicate value or the second edge predicate value.

In another embodiment, an apparatus (e.g., hardware accelerator) includes a data path having a first branch and a second branch, and the data path comprising at least one processing element; a switch circuit (for example, switch PE, e.g., PE 9) comprising a switch control input to receive a first switch control value to couple an input of the switch circuit to the first branch and a second switch control value to couple the input of the switch circuit to the second branch; a pick circuit (for example, a pick PE, e.g., another instance of PE 9) comprising a pick control input to receive a first pick control value to couple an output of the pick circuit to the first branch and a second pick control value to couple the output of the pick circuit to a third branch of the data path; a first means to (e.g., simultaneously) output a first edge predicate value and a second edge predicate value based on (e.g., both of) a switch control value from the switch control input of the switch circuit and a first block predicate value (e.g., from another PE); and a second means to (e.g., simultaneously) output a pick control value to the pick control input of the pick circuit and a second block predicate value based on both of a third edge predicate value and one of the first edge predicate value or the second edge predicate value.

In one embodiment, an apparatus (e.g., an accelerator circuit) includes a plurality of processing elements; an interconnect network between the plurality of processing elements to transfer values between the plurality of processing elements; and a first processing element of the plurality of processing elements comprising: a configuration register within the first processing element to store a configuration value that causes the first processing element to perform an operation according to the configuration value, a plurality of input queues, an input controller to control enqueue and dequeue of values into the plurality of input queues according to the configuration value, a plurality of output queues, and an output controller to control enqueue and dequeue of values into the plurality of output queues according to the configuration value. Wherein, when at least one of the plurality of input queues stores a value, the input controller may send a not empty value to operation circuitry of the first processing element to indicate the first processing element may begin the operation on the value stored in the at least one of the plurality of input queues. When at least one of the plurality of output queues is not full, the output controller may send a not full value to operation circuitry of the first processing element to indicate the first processing element may begin the operation on a value stored in the at least one of the plurality of input queues. When at least one of the plurality of input queues stores a value, the input controller may send a not empty value to operation circuitry of the first processing element and when at least one of the plurality of output queues is not full, the output controller may send a not full value to operation circuitry of the first processing element, and the operation circuitry of the first processing element may begin the operation on the value stored in the at least one of the plurality of input queues after both the not empty value and the not full value are received. When at least one of the plurality of input queues is not full, the input controller may send a ready value to an upstream processing element of the plurality of processing elements. When at least one of a plurality of output queues of the upstream processing element stores a value, an output controller of the upstream processing element may send a valid value to the input controller of the first processing element, and the input controller of the first processing element may enqueue the value into the at least one of the plurality of input queues from the at least one of the plurality of output queues of the upstream processing element after both the ready value is asserted by the first processing element and the valid value is received from the upstream processing element. When at least one of the plurality of output queues stores a value, the output controller may send a valid value to a downstream processing element of the plurality of processing elements. When at least one of a plurality of input queues of the downstream processing element is not full, an input controller of the downstream processing element may send a ready value to the output controller of the first processing element, and the output controller of the first processing element may dequeue the value from the at least one of the plurality of output queues after both the valid value is asserted by the first processing element and the ready value is received from the downstream processing element.

In another embodiment, a method includes coupling a plurality of processing elements together by an interconnect network between the plurality of processing elements to transfer values between the plurality of processing elements; storing a configuration value in a configuration register within a first processing element of the plurality of processing elements that causes the first processing element to perform an operation according to the configuration value; controlling enqueue and dequeue of values into a plurality of input queues of the first processing element according to the configuration value with an input controller in the first processing element; and controlling enqueue and dequeue of values into a plurality of output queues of the first processing element according to the configuration value with an output controller in the first processing element. When at least one of the plurality of input queues stores a value, the input controller may send a not empty value to operation circuitry of the first processing element to indicate the first processing element may begin the operation on the value stored in the at least one of the plurality of input queues. When at least one of the plurality of output queues is not full, the output controller may send a not full value to operation circuitry of the first processing element to indicate the first processing element may begin the operation on a value stored in the at least one of the plurality of input queues. When at least one of the plurality of input queues stores a value, the input controller may send a not empty value to operation circuitry of the first processing element and when at least one of the plurality of output queues is not full, the output controller may send a not full value to operation circuitry of the first processing element, and the operation circuitry of the first processing element may begin the operation on the value stored in the at least one of the plurality of input queues after both the not empty value and the not full value are received. When at least one of the plurality of input queues is not full, the input controller may send a ready value to an upstream processing element of the plurality of processing elements. When at least one of a plurality of output queues of the upstream processing element stores a value, an output controller of the upstream processing element may send a valid value to the input controller of the first processing element, and the input controller of the first processing element may enqueue the value into the at least one of the plurality of input queues from the at least one of the plurality of output queues of the upstream processing element after both the ready value is asserted by the first processing element and the valid value is received from the upstream processing element. When at least one of the plurality of output queues stores a value, the output controller may send a valid value to a downstream processing element of the plurality of processing elements. When at least one of a plurality of input queues of the downstream processing element is not full, an input controller of the downstream processing element may send a ready value to the output controller of the first processing element, and the output controller of the first processing element may dequeue the value from the at least one of the plurality of output queues after both the valid value is asserted by the first processing element and the ready value is received from the downstream processing element.

In yet another embodiment, a processor includes a core with a decoder to decode an instruction into a decoded instruction and an execution unit to execute the decoded instruction to perform a first operation; a plurality of processing elements; an interconnect network between the plurality of processing elements to transfer values between the plurality of processing elements; and a first processing element of the plurality of processing elements comprising: a configuration register within the first processing element to store a configuration value that causes the first processing element to perform a second operation according to the configuration value, a plurality of input queues, an input controller to control enqueue and dequeue of values into the plurality of input queues according to the configuration value, a plurality of output queues, and an output controller to control enqueue and dequeue of values into the plurality of output queues according to the configuration value. Wherein, when at least one of the plurality of input queues stores a value, the input controller may send a not empty value to operation circuitry of the first processing element to indicate the first processing element may begin the second operation on the value stored in the at least one of the plurality of input queues. When at least one of the plurality of output queues is not full, the output controller may send a not full value to operation circuitry of the first processing element to indicate the first processing element may begin the second operation on a value stored in the at least one of the plurality of input queues. When at least one of the plurality of input queues stores a value, the input controller may send a not empty value to operation circuitry of the first processing element and when at least one of the plurality of output queues is not full, the output controller may send a not full value to operation circuitry of the first processing element, and the operation circuitry of the first processing element may begin the second operation on the value stored in the at least one of the plurality of input queues after both the not empty value and the not full value are received. When at least one of the plurality of input queues is not full, the input controller may send a ready value to an upstream processing element of the plurality of processing elements. When at least one of a plurality of output queues of the upstream processing element stores a value, an output controller of the upstream processing element may send a valid value to the input controller of the first processing element, and the input controller of the first processing element may enqueue the value into the at least one of the plurality of input queues from the at least one of the plurality of output queues of the upstream processing element after both the ready value is asserted by the first processing element and the valid value is received from the upstream processing element. When at least one of the plurality of output queues stores a value, the output controller may send a valid value to a downstream processing element of the plurality of processing elements. When at least one of a plurality of input queues of the downstream processing element is not full, an input controller of the downstream processing element may send a ready value to the output controller of the first processing element, and the output controller of the first processing element may dequeue the value from the at least one of the plurality of output queues after both the valid value is asserted by the first processing element and the ready value is received from the downstream processing element.

In another embodiment, an apparatus (e.g., an accelerator circuit) includes a plurality of processing elements; an interconnect network between the plurality of processing elements to transfer values between the plurality of processing elements; and a first processing element of the plurality of processing elements comprising: a configuration register within the first processing element to store a configuration value that causes the first processing element to perform an operation according to the configuration value, a plurality of input queues, a first means to control enqueue and dequeue of values into the plurality of input queues according to the configuration value, a plurality of output queues, and a second means to control enqueue and dequeue of values into the plurality of output queues according to the configuration value.

In yet another embodiment, an apparatus (e.g., an accelerator circuit) includes a plurality of processing elements; an interconnect network between the plurality of processing elements to transfer values between the plurality of processing elements; and a first processing element of the plurality of processing elements comprising: a configuration register within the first processing element to store a configuration value that causes the first processing element to perform an operation according to the configuration value, a plurality of input queues, a plurality of output queues, and means to control enqueue and dequeue of values into the plurality of input queues according to the configuration value and control enqueue and dequeue of values into the plurality of output queues according to the configuration value.

In another embodiment, an apparatus comprises a data storage device that stores code that when executed by a hardware processor causes the hardware processor to perform any method disclosed herein. An apparatus may be as described in the detailed description. A method may be as described in the detailed description.

In yet another embodiment, a non-transitory machine readable medium that stores code that when executed by a machine causes the machine to perform a method comprising any method disclosed herein.

An instruction set (e.g., for execution by a core) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask).

Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, June 2016; and see Intel® Architecture Instruction Set Extensions Programming Reference, February 2016).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

FIGS. 163A-163B are block diagrams illustrating a generic vector friendly instruction format and instruction templates thereof according to embodiments of the disclosure. FIG. 163A is a block diagram illustrating a generic vector friendly instruction format and class A instruction templates thereof according to embodiments of the disclosure; while FIG. 163B is a block diagram illustrating the generic vector friendly instruction format and class B instruction templates thereof according to embodiments of the disclosure. Specifically, a generic vector friendly instruction format 16300 for which are defined class A and class B instruction templates, both of which include no memory access 16305 instruction templates and memory access 16320 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 163A include: 1) within the no memory access 16305 instruction templates there is shown a no memory access, full round control type operation 16310 instruction template and a no memory access, data transform type operation 16315 instruction template; and 2) within the memory access 16320 instruction templates there is shown a memory access, temporal 16325 instruction template and a memory access, non-temporal 16330 instruction template. The class B instruction templates in FIG. 163B include: 1) within the no memory access 16305 instruction templates there is shown a no memory access, write mask control, partial round control type operation 16312 instruction template and a no memory access, write mask control, vsize type operation 16317 instruction template; and 2) within the memory access 16320 instruction templates there is shown a memory access, write mask control 16327 instruction template.

The generic vector friendly instruction format 16300 includes the following fields listed below in the order illustrated in FIGS. 163A-163B.

Format field 16340— a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 16342— its content distinguishes different base operations.

Register index field 16344— its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 16346— its content distinguishes occurrences of instructions in the generic vector instruction format that specify memory access from those that do not; that is, between no memory access 16305 instruction templates and memory access 16320 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 16350— its content distinguishes which one of a variety of different operations to be performed in addition to the base operation. This field is context specific. In one embodiment of the disclosure, this field is divided into a class field 16368, an alpha field 16352, and a beta field 16354. The augmentation operation field 16350 allows common groups of operations to be performed in a single instruction rather than 2, 3, or 4 instructions.

Scale field 16360— its content allows for the scaling of the index field's content for memory address generation (e.g., for address generation that uses $2^{scale}$*index+base).

Displacement Field 16362A— its content is used as part of memory address generation (e.g., for address generation that uses $2^{scale}$*index+base+displacement).

Displacement Factor Field 16362B (note that the juxtaposition of displacement field 16362A directly over displacement factor field 16362B indicates one or the other is used)—its content is used as part of address generation; it specifies a displacement factor that is to be scaled by the size of a memory access (N)— where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 16374 (described later herein) and the data manipulation field 16354C. The displacement field 16362A and the displacement factor field 16362B are optional in the sense that they are not used for the no memory access 16305 instruction templates and/or different embodiments may implement only one or none of the two.

Data element width field 16364— its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 16370— its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 16370 allows for partial vector operations, including loads, stores, arithmetic, logical, etc. While embodiments of the disclosure are described in which the write mask field's 16370 content selects one of a number of write mask registers that contains the write mask to be used (and thus the write mask field's 16370 content indirectly identifies that masking to be performed), alternative embodiments instead or additional allow the mask write field's 16370 content to directly specify the masking to be performed.

Immediate field 16372— its content allows for the specification of an immediate. This field is optional in the sense that is it not present in an implementation of the generic vector friendly format that does not support immediate and it is not present in instructions that do not use an immediate.

Class field 16368— its content distinguishes between different classes of instructions. With reference to FIGS. 163A-B, the contents of this field select between class A and class B instructions. In FIGS. 163A-B, rounded corner squares are used to indicate a specific value is present in a field (e.g., class A 16368A and class B 16368B for the class field 16368 respectively in FIGS. 163A-B).

Instruction Templates of Class A

In the case of the non-memory access 16305 instruction templates of class A, the alpha field 16352 is interpreted as an RS field 16352A, whose content distinguishes which one of the different augmentation operation types are to be performed (e.g., round 16352A.1 and data transform 16352A.2 are respectively specified for the no memory access, round type operation 16310 and the no memory access, data transform type operation 16315 instruction templates), while the beta field 16354 distinguishes which of the operations of the specified type is to be performed. In the no memory access 16305 instruction templates, the scale field 16360, the displacement field 16362A, and the displacement scale filed 16362B are not present. No-Memory Access Instruction Templates—Full Round Control Type Operation In the no memory access full round control type operation 16310 instruction template, the beta field 16354 is interpreted as a round control field 16354A, whose content(s) provide static rounding. While in the described embodiments of the disclosure the round control field 16354A includes a suppress all floating point exceptions (SAE) field 16356 and a round operation control field 16358, alternative embodiments may support may encode both these concepts into the same field or only have one or the other of these concepts/fields (e.g., may have only the round operation control field 16358).

SAE field 16356— its content distinguishes whether or not to disable the exception event reporting; when the SAE field's 16356 content indicates suppression is enabled, a given instruction does not report any kind of floating-point exception flag and does not raise any floating point exception handler.

Round operation control field 16358— its content distinguishes which one of a group of rounding operations to perform (e.g., Round-up, Round-down, Round-towards-zero and Round-to-nearest). Thus, the round operation control field 16358 allows for the changing of the rounding mode on a per instruction basis. In one embodiment of the disclosure where a processor includes a control register for specifying rounding modes, the round operation control field's 16350 content overrides that register value.

No Memory Access Instruction Templates—Data Transform Type Operation

In the no memory access data transform type operation 16315 instruction template, the beta field 16354 is interpreted as a data transform field 16354B, whose content distinguishes which one of a number of data transforms is to be performed (e.g., no data transform, swizzle, broadcast).

In the case of a memory access 16320 instruction template of class A, the alpha field 16352 is interpreted as an eviction hint field 16352B, whose content distinguishes which one of the eviction hints is to be used (in FIG. 163A, temporal 16352B.1 and non-temporal 16352B.2 are respectively specified for the memory access, temporal 16325 instruction template and the memory access, non-temporal 16330 instruction template), while the beta field 16354 is interpreted as a data manipulation field 16354C, whose content distinguishes which one of a number of data manipulation operations (also known as primitives) is to be performed (e.g., no manipulation; broadcast; up conversion of a source; and down conversion of a destination). The memory access 16320 instruction templates include the scale field 16360, and optionally the displacement field 16362A or the displacement scale field 16362B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 16352 is interpreted as a write mask control (Z) field 16352C, whose content distinguishes whether the write masking controlled by the write mask field 16370 should be a merging or a zeroing.

In the case of the non-memory access 16305 instruction templates of class B, part of the beta field 16354 is interpreted as an RL field 16357A, whose content distinguishes which one of the different augmentation operation types are to be performed (e.g., round 16357A.1 and vector length (VSIZE) 16357A.2 are respectively specified for the no memory access, write mask control, partial round control type operation 16312 instruction template and the no memory access, write mask control, VSIZE type operation 16317 instruction template), while the rest of the beta field 16354 distinguishes which of the operations of the specified type is to be performed. In the no memory access 16305 instruction templates, the scale field 16360, the displacement field 16362A, and the displacement scale filed 16362B are not present.

In the no memory access, write mask control, partial round control type operation 16310 instruction template, the rest of the beta field 16354 is interpreted as a round operation field 16359A and exception event reporting is disabled (a given instruction does not report any kind of floating-point exception flag and does not raise any floating point exception handler).

Round operation control field 16359A— just as round operation control field 16358, its content distinguishes which one of a group of rounding operations to perform (e.g., Round-up, Round-down, Round-towards-zero and Round-to-nearest). Thus, the round operation control field 16359A allows for the changing of the rounding mode on a per instruction basis. In one embodiment of the disclosure where a processor includes a control register for specifying rounding modes, the round operation control field's 16350 content overrides that register value.

In the no memory access, write mask control, VSIZE type operation 16317 instruction template, the rest of the beta field 16354 is interpreted as a vector length field 16359B, whose content distinguishes which one of a number of data vector lengths is to be performed on (e.g., 128, 256, or 512 byte).

In the case of a memory access 16320 instruction template of class B, part of the beta field 16354 is interpreted as a broadcast field 16357B, whose content distinguishes whether or not the broadcast type data manipulation operation is to be performed, while the rest of the beta field 16354 is interpreted the vector length field 16359B. The memory access 16320 instruction templates include the scale field 16360, and optionally the displacement field 16362A or the displacement scale field 16362B.

With regard to the generic vector friendly instruction format 16300, a full opcode field 16374 is shown including the format field 16340, the base operation field 16342, and the data element width field 16364. While one embodiment is shown where the full opcode field 16374 includes all of these fields, the full opcode field 16374 includes less than all of these fields in embodiments that do not support all of them. The full opcode field 16374 provides the operation code (opcode).

The augmentation operation field 16350, the data element width field 16364, and the write mask field 16370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 164 is a block diagram illustrating an exemplary specific vector friendly instruction format according to embodiments of the disclosure. FIG. 164 shows a specific vector friendly instruction format 16400 that is specific in the sense that it specifies the location, size, interpretation, and order of the fields, as well as values for some of those fields. The specific vector friendly instruction format 16400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 163 into which the fields from FIG. 164 map are illustrated.

It should be understood that, although embodiments of the disclosure are described with reference to the specific vector friendly instruction format 16400 in the context of the generic vector friendly instruction format 16300 for illustrative purposes, the disclosure is not limited to the specific vector friendly instruction format 16400 except where claimed. For example, the generic vector friendly instruction format 16300 contemplates a variety of possible sizes for the various fields, while the specific vector friendly instruction format 16400 is shown as having fields of specific sizes. By way of specific example, while the data element width field 16364 is illustrated as a one bit field in the specific vector friendly instruction format 16400, the disclosure is not so limited (that is, the generic vector friendly instruction format 16300 contemplates other sizes of the data element width field 16364).

The generic vector friendly instruction format 16300 includes the following fields listed below in the order illustrated in FIG. 164A.

EVEX Prefix (Bytes 0-3) 16402—is encoded in a four-byte form.

Format Field 16340 (EVEX Byte 0, bits [7:0])—the first byte (EVEX Byte 0) is the format field 16340 and it contains 0×62 (the unique value used for distinguishing the vector friendly instruction format in one embodiment of the disclosure).

The second-fourth bytes (EVEX Bytes 1-3) include a number of bit fields providing specific capability.

REX field 16405 (EVEX Byte 1, bits [7-5])— consists of a EVEX.R bit field (EVEX Byte 1, bit [7]—R), EVEX.X bit field (EVEX byte 1, bit [6]—X), and 16357BEX byte 1, bit[5]—B). The EVEX.R, EVEX.X, and EVEX.B bit fields provide the same functionality as the corresponding VEX bit fields, and are encoded using is complement form, e.g., ZMM0 is encoded as 1111B, ZMM15 is encoded as 0000B.

Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 16310— this is the first part of the REX' field 16310 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 16415 (EVEX byte 1, bits [3:0]—mmmm)—its content encodes an implied leading opcode byte (0F, 0F 38, or 0F 3).

Data element width field 16364 (EVEX byte 2, bit [7]—W)—is represented by the notation EVEX.W. EVEX.W is used to define the granularity (size) of the datatype (either 32-bit data elements or 64-bit data elements).

EVEX.vvvv 16420 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 16420 encodes the 4 low-order bits of the first source register specifier stored in inverted (1 s complement) form. Depending on the instruction, an extra different EVEX bit field is used to extend the specifier size to 32 registers.

EVEX.U 16368 Class field (EVEX byte 2, bit [2]—U)—If EVEX.U=0, it indicates class A or EVEX.U0; if EVEX.U=1, it indicates class B or EVEX.U1.

Prefix encoding field 16425 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 16352 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 16354 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 16310— this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 16370 (EVEX byte 3, bits [2:0]—kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 16430 (Byte 4) is also known as the opcode byte. Part of the opcode is specified in this field.

MOD R/M Field 16440 (Byte 5) includes MOD field 16442, Reg field 16444, and R/M field 16446. As previously described, the MOD field's 16442 content distinguishes between memory access and non-memory access operations. The role of Reg field 16444 can be summarized to two situations: encoding either the destination register operand or a source register operand, or be treated as an opcode extension and not used to encode any instruction operand. The role of R/M field 16446 may include the following: encoding the instruction operand that references a memory address, or encoding either the destination register operand or a source register operand.

Scale, Index, Base (SIB) Byte (Byte 6)—As previously described, the scale field's 5450 content is used for memory address generation. SIB.xxx 16454 and SIB.bbb 16456—the contents of these fields have been previously referred to with regard to the register indexes Xxxx and Bbbb.

Displacement field 16362A (Bytes 7-10)— when MOD field 16442 contains 10, bytes 7-10 are the displacement field 16362A, and it works the same as the legacy 32-bit displacement (disp32) and works at byte granularity.

Displacement factor field 16362B (Byte 7)— when MOD field 16442 contains 01, byte 7 is the displacement factor field 16362B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 16362B is a reinterpretation of disp8; when using displacement factor field 16362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 16362B substitutes the legacy x86 instruction set 8-bit displacement. Thus, the displacement factor field 16362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 16372 operates as previously described.

Full Opcode Field

FIG. 164B is a block diagram illustrating the fields of the specific vector friendly instruction format 16400 that make up the full opcode field 16374 according to one embodiment of the disclosure. Specifically, the full opcode field 16374 includes the format field 16340, the base operation field 16342, and the data element width (W) field 16364. The base operation field 16342 includes the prefix encoding field 16425, the opcode map field 16415, and the real opcode field 16430.

Register Index Field

FIG. 164C is a block diagram illustrating the fields of the specific vector friendly instruction format 16400 that make up the register index field 16344 according to one embodiment of the disclosure. Specifically, the register index field 16344 includes the REX field 16405, the REX' field 16410, the MODR/M.reg field 16444, the MODR/M.r/m field 16446, the VVVV field 16420, xxx field 16454, and the bbb field 16456.

Augmentation Operation Field

FIG. 164D is a block diagram illustrating the fields of the specific vector friendly instruction format 16400 that make up the augmentation operation field 16350 according to one embodiment of the disclosure. When the class (U) field 16368 contains 0, it signifies EVEX.U0 (class A 16368A); when it contains 1, it signifies EVEX.U1 (class B 16368B). When U=0 and the MOD field 16442 contains 11 (signifying a no memory access operation), the alpha field 16352 (EVEX byte 3, bit [7]—EH) is interpreted as the rs field 16352A. When the rs field 16352A contains a 1 (round 16352A.1), the beta field 16354 (EVEX byte 3, bits [6:4]—SSS) is interpreted as the round control field 16354A. The round control field 16354A includes a one bit SAE field 16356 and a two bit round operation field 16358. When the rs field 16352A contains a 0 (data transform 16352A.2), the beta field 16354 (EVEX byte 3, bits [6:4]—SSS) is interpreted as a three bit data transform field 16354B. When U=0 and the MOD field 16442 contains 00, 01, or 10 (signifying a memory access operation), the alpha field 16352 (EVEX byte 3, bit [7]—EH) is interpreted as the eviction hint (EH) field 16352B and the beta field 16354 (EVEX byte 3, bits [6:4]—SSS) is interpreted as a three bit data manipulation field 16354C.

When U=1, the alpha field 16352 (EVEX byte 3, bit [7]—EH) is interpreted as the write mask control (Z) field 16352C. When U=1 and the MOD field 16442 contains 11 (signifying a no memory access operation), part of the beta field 16354 (EVEX byte 3, bit [4]-$S_0$) is interpreted as the RL field 16357A; when it contains a 1 (round 16357A.1) the rest of the beta field 16354 (EVEX byte 3, bit [6-5]—$S_{2-1}$) is interpreted as the round operation field 16359A, while when the RL field 16357A contains a 0 (VSIZE 16357.A2) the rest of the beta field 16354 (EVEX byte 3, bit [6-5]—$S_{21}$) is interpreted as the vector length field 16359B (EVEX byte 3, bit [6-5]—$L_{1-0}$). When U=1 and the MOD field 16442 contains 00, 01, or 10 (signifying a memory access operation), the beta field 16354 (EVEX byte 3, bits [6:4]—SSS) is interpreted as the vector length field 16359B (EVEX byte 3, bit [6-5]—$L_{1-0}$) and the broadcast field 16357B (EVEX byte 3, bit [4]—B).

Exemplary Register Architecture

FIG. 165 is a block diagram of a register architecture 16500 according to one embodiment of the disclosure. In the embodiment illustrated, there are 32 vector registers 16510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 16400 operates on these overlaid register file as illustrated in the below tables.

| Adjustable Vector Length | Class | Operations | Registers |
|---|---|---|---|
| Instruction Templates that do not include the vector length field 16359B | A (FIG. 163A; U = 0) | 5410, 16315, 16325, 16330 | zmm registers (the vector length is 64 byte) |
| | B (FIG. 163B; U = 1) | 5412 | zmm registers (the vector length is 64 byte) |
| Instruction templates that do include the vector length field 16359B | B (FIG. 163B; U = 1) | 5417, 16327 | zmm, ymm, or xmm registers (the vector length is 64 byte, 32 byte, or 16 byte) depending on the vector length field 16359B |

In other words, the vector length field 16359B selects between a maximum length and one or more other shorter lengths, where each such shorter length is half the length of the preceding length; and instructions templates without the vector length field 16359B operate on the maximum vector length. Further, in one embodiment, the class B instruction templates of the specific vector friendly instruction format 16400 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 16515—in the embodiment illustrated, there are 8 write mask registers (k0 through k7), each 64 bits in size. In an alternate embodiment, the write mask registers 16515 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 16525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 16545, on which is aliased the MMX packed integer flat register file 16550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 166A is a block diagram illustrating both an exemplary in-order pipeline and an exemplary register renaming, out-of-order issue/execution pipeline according to embodiments of the disclosure. FIG. 166B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 166A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 166A, a processor pipeline 16600 includes a fetch stage 16602, a length decode stage 16604, a decode stage 16606, an allocation stage 16608, a renaming stage 16610, a scheduling (also known as a dispatch or issue) stage 16612, a register read/memory read stage 16614, an execute stage 16616, a write back/memory write stage 16618, an exception handling stage 16622, and a commit stage 16624.

FIG. 166B shows processor core 16690 including a front end unit 16630 coupled to an execution engine unit 16650, and both are coupled to a memory unit 16670. The core 16690 may be a reduced instruction set computing (RISC) core, a complex instruction set computing (CISC) core, a very long instruction word (VLIW) core, or a hybrid or alternative core type. As yet another option, the core 16690 may be a special-purpose core, such as, for example, a network or communication core, compression engine, coprocessor core, general purpose computing graphics processing unit (GPGPU) core, graphics core, or the like.

The front end unit 16630 includes a branch prediction unit 16632 coupled to an instruction cache unit 16634, which is coupled to an instruction translation lookaside buffer (TLB) 16636, which is coupled to an instruction fetch unit 16638, which is coupled to a decode unit 16640. The decode unit 16640 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 16640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 16690 includes a microcode ROM or other medium that stores microcode for certain macro-instructions (e.g., in decode unit 16640 or otherwise within the front end unit 16630). The decode unit 16640 is coupled to a rename/allocator unit 16652 in the execution engine unit 16650.

The execution engine unit 16650 includes the rename/allocator unit 16652 coupled to a retirement unit 16654 and a set of one or more scheduler unit(s) 16656. The scheduler unit(s) 16656 represents any number of different schedulers, including reservations stations, central instruction window, etc. The scheduler unit(s) 16656 is coupled to the physical register file(s) unit(s) 16658. Each of the physical register file(s) units 16658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 16658 comprises a vector registers unit, a write mask registers unit, and a scalar registers unit. These register units may provide architectural vector registers, vector mask registers, and general purpose registers. The physical register file(s) unit(s) 16658 is overlapped by the retirement unit 16654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 16654 and the physical register file(s) unit(s) 16658 are coupled to the execution cluster(s) 16660. The execution cluster(s) 16660 includes a set of one or more execution units 16662 and a set of one or more memory access units 16664. The execution units 16662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 16656, physical register file(s) unit(s) 16658, and execution cluster(s) 16660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 16664). It should also be understood that where separate pipelines are used, one or more of these pipelines may be out-of-order issue/execution and the rest in-order.

The set of memory access units 16664 is coupled to the memory unit 16670, which includes a data TLB unit 16672 coupled to a data cache unit 16674 coupled to a level 2 (L2) cache unit 16676. In one exemplary embodiment, the memory access units 16664 may include a load unit, a store address unit, and a store data unit, each of which is coupled to the data TLB unit 16672 in the memory unit 16670. The instruction cache unit 16634 is further coupled to a level 2 (L2) cache unit 16676 in the memory unit 16670. The L2 cache unit 16676 is coupled to one or more other levels of cache and eventually to a main memory.

By way of example, the exemplary register renaming, out-of-order issue/execution core architecture may implement the pipeline 16600 as follows: 1) the instruction fetch 16638 performs the fetch and length decoding stages 16602 and 16604; 2) the decode unit 16640 performs the decode stage 16606; 3) the rename/allocator unit 16652 performs the allocation stage 16608 and renaming stage 16610; 4) the scheduler unit(s) 16656 performs the schedule stage 16612; 5) the physical register file(s) unit(s) 16658 and the memory unit 16670 perform the register read/memory read stage 16614; the execution cluster 16660 perform the execute stage 16616; 6) the memory unit 16670 and the physical register file(s) unit(s) 16658 perform the write back/memory write stage 16618; 7) various units may be involved in the exception handling stage 16622; and 8) the retirement unit 16654 and the physical register file(s) unit(s) 16658 perform the commit stage 16624.

The core 16690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 16690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 16634/16674 and a shared L2 cache unit 16676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 167A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 167A is a block diagram of a single processor core, along with its connection to the on-die interconnect network 16702 and with its local subset of the Level 2 (L2) cache 16704, according to embodiments of the disclosure. In one embodiment, an instruction decode unit 16700 supports the x86 instruction set with a packed data instruction set extension. An L1 cache 16706 allows low-latency accesses to cache memory into the scalar and vector units. While in one embodiment (to simplify the design), a scalar unit 16708 and a vector unit 16710 use separate register sets (respectively, scalar registers 16712 and vector registers 16714) and data transferred between them is written to memory and then read back in from a level 1 (L1) cache 16706, alternative embodiments of the disclosure may use a different approach (e.g., use a single register set or include a communication path that allow data to be transferred between the two register files without being written and read back).

The local subset of the L2 cache 16704 is part of a global L2 cache that is divided into separate local subsets, one per processor core. Each processor core has a direct access path to its own local subset of the L2 cache 16704. Data read by a processor core is stored in its L2 cache subset 16704 and can be accessed quickly, in parallel with other processor cores accessing their own local L2 cache subsets. Data written by a processor core is stored in its own L2 cache subset 16704 and is flushed from other subsets, if necessary. The ring network ensures coherency for shared data. The ring network is bi-directional to allow agents such as processor cores, hf caches and other logic blocks to communicate with each other within the chip. Each ring data-path is 1012-bits wide per direction.

FIG. 167B is an expanded view of part of the processor core in FIG. 167A according to embodiments of the disclosure. FIG. 167B includes an L1 data cache 16706A part of the L1 cache 16704, as well as more detail regarding the vector unit 16710 and the vector registers 16714. Specifically, the vector unit 16710 is a 16-wide vector processing unit (VPU) (see the 16-wide ALU 16728), which executes one or more of integer, single-precision float, and double-precision float instructions. The VPU supports swizzling the register inputs with swizzle unit 16720, numeric conversion with numeric convert units 16722A-B, and replication with replication unit 16724 on the memory input. Write mask registers 16726 allow predicating resulting vector writes.

FIG. 168 is a block diagram of a processor 16800 that may have more than one core, may have an integrated memory controller, and may have integrated graphics according to embodiments of the disclosure. The solid lined boxes in FIG. 168 illustrate a processor 16800 with a single core 16802A, a system agent 16810, a set of one or more bus controller units 16816, while the optional addition of the dashed lined boxes illustrates an alternative processor 16800 with multiple cores 16802A-N, a set of one or more integrated memory controller unit(s) 16814 in the system agent unit 16810, and special purpose logic 16808.

Thus, different implementations of the processor 16800 may include: 1) a CPU with the special purpose logic 16808 being integrated graphics and/or scientific (throughput) logic (which may include one or more cores), and the cores 16802A-N being one or more general purpose cores (e.g., general purpose in-order cores, general purpose out-of-order cores, a combination of the two); 2) a coprocessor with the cores 16802A-N being a large number of special purpose cores intended primarily for graphics and/or scientific (throughput); and 3) a coprocessor with the cores 16802A-N being a large number of general purpose in-order cores. Thus, the processor 16800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 16800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 16806, and external memory (not shown) coupled to the set of integrated memory controller units 16814. The set of shared cache units 16806 may include one or more mid-level caches, such as level 2 (L2), level 3 (L3), level 4 (L4), or other levels of cache, a last level cache (LLC), and/or combinations thereof. While in one embodiment a ring based interconnect unit 16812 interconnects the integrated graphics logic 16808, the set of shared cache units 16806, and the system agent unit 16810/integrated memory controller unit(s) 16814, alternative embodiments may use any number of well-known techniques for interconnecting such units. In one embodiment, coherency is maintained between one or more cache units 16806 and cores 16802-A-N.

In some embodiments, one or more of the cores 16802A-N are capable of multi-threading. The system agent 16810 includes those components coordinating and operating cores 16802A-N. The system agent unit 16810 may include for example a power control unit (PCU) and a display unit. The PCU may be or include logic and components needed for regulating the power state of the cores 16802A-N and the integrated graphics logic 16808. The display unit is for driving one or more externally connected displays.

The cores 16802A-N may be homogenous or heterogeneous in terms of architecture instruction set; that is, two or more of the cores 16802A-N may be capable of execution the same instruction set, while others may be capable of executing only a subset of that instruction set or a different instruction set.

Exemplary Computer Architectures

FIGS. 169-172 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 169, shown is a block diagram of a system 16900 in accordance with one embodiment of the present disclosure. The system 16900 may include one or more processors 16910, 16915, which are coupled to a controller hub 16920. In one embodiment the controller hub 16920 includes a graphics memory controller hub (GMCH) 16990 and an Input/Output Hub (IOH) 16950 (which may be on separate chips); the GMCH 16990 includes memory and graphics controllers to which are coupled memory 16940 and a coprocessor 16945; the IOH 16950 is couples input/output (I/O) devices 16960 to the GMCH 16990. Alternatively, one or both of the memory and graphics controllers are integrated within the processor (as described herein), the memory 16940 and the coprocessor 16945 are coupled directly to the processor 16910, and the controller hub 16920 in a single chip with the IOH 16950. Memory 16940 may include a compiler moudle 16940A, for example, to store code that when executed causes a processor to perform any method of this disclosure.

The optional nature of additional processors 16915 is denoted in FIG. 169 with broken lines. Each processor 16910, 16915 may include one or more of the processing cores described herein and may be some version of the processor 16800.

The memory 16940 may be, for example, dynamic random access memory (DRAM), phase change memory (PCM), or a combination of the two. For at least one embodiment, the controller hub 16920 communicates with the processor(s) 16910, 16915 via a multi-drop bus, such as a frontside bus (FSB), point-to-point interface such as QuickPath Interconnect (QPI), or similar connection 16995.

In one embodiment, the coprocessor 16945 is a special-purpose processor, such as, for example, a high-throughput MIC processor, a network or communication processor, compression engine, graphics processor, GPGPU, embedded processor, or the like. In one embodiment, controller hub 16920 may include an integrated graphics accelerator.

There can be a variety of differences between the physical resources 16910, 16915 in terms of a spectrum of metrics of merit including architectural, microarchitectural, thermal, power consumption characteristics, and the like.

In one embodiment, the processor 16910 executes instructions that control data processing operations of a general type. Embedded within the instructions may be coprocessor instructions. The processor 16910 recognizes these coprocessor instructions as being of a type that should be executed by the attached coprocessor 16945. Accordingly, the processor 16910 issues these coprocessor instructions (or control signals representing coprocessor instructions) on a coprocessor bus or other interconnect, to coprocessor 16945. Coprocessor(s) 16945 accept and execute the received coprocessor instructions.

Referring now to FIG. 170, shown is a block diagram of a first more specific exemplary system 17000 in accordance with an embodiment of the present disclosure. As shown in FIG. 170, multiprocessor system 17000 is a point-to-point interconnect system, and includes a first processor 17070 and a second processor 17080 coupled via a point-to-point interconnect 17050. Each of processors 17070 and 17080 may be some version of the processor 16800. In one embodiment of the disclosure, processors 17070 and 17080 are respectively processors 16910 and 16915, while coprocessor 17038 is coprocessor 16945. In another embodiment, processors 17070 and 17080 are respectively processor 16910 coprocessor 16945.

Processors 17070 and 17080 are shown including integrated memory controller (IMC) units 17072 and 17082, respectively. Processor 17070 also includes as part of its bus controller units point-to-point (P-P) interfaces 17076 and 17078; similarly, second processor 17080 includes P-P interfaces 17086 and 17088. Processors 17070, 17080 may exchange information via a point-to-point (P-P) interface 17050 using P-P interface circuits 17078, 17088. As shown in FIG. 170, IMCs 17072 and 17082 couple the processors to respective memories, namely a memory 17032 and a memory 17034, which may be portions of main memory locally attached to the respective processors.

Processors 17070, 17080 may each exchange information with a chipset 17090 via individual P-P interfaces 17052, 17054 using point to point interface circuits 17076, 17094, 17086, 17098. Chipset 17090 may optionally exchange information with the coprocessor 17038 via a high-performance interface 17039. In one embodiment, the coprocessor 17038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 17090 may be coupled to a first bus 17016 via an interface 17096. In one embodiment, first bus 17016 may be a Peripheral Component Interconnect (PCI) bus, or a bus such as a PCI Express bus or another third generation I/O interconnect bus, although the scope of the present disclosure is not so limited.

As shown in FIG. 170, various I/O devices 17014 may be coupled to first bus 17016, along with a bus bridge 17018 which couples first bus 17016 to a second bus 17020. In one embodiment, one or more additional processor(s) 17015, such as coprocessors, high-throughput MIC processors, GPGPU's, accelerators (such as, e.g., graphics accelerators or digital signal processing (DSP) units), field programmable gate arrays, or any other processor, are coupled to first bus 17016. In one embodiment, second bus 17020 may be a low pin count (LPC) bus. Various devices may be coupled to a second bus 17020 including, for example, a keyboard and/or mouse 17022, communication devices 17027 and a storage unit 17028 such as a disk drive or other mass storage device which may include instructions/code and data 17030, in one embodiment. Further, an audio I/O 17024 may be coupled to the second bus 17020. Note that other architectures are possible. For example, instead of the point-to-point architecture of FIG. 170, a system may implement a multi-drop bus or other such architecture.

Referring now to FIG. 171, shown is a block diagram of a second more specific exemplary system 17100 in accordance with an embodiment of the present disclosure. Like elements in FIGS. 170 and 171 bear like reference numerals, and certain aspects of FIG. 170 have been omitted from FIG. 171 in order to avoid obscuring other aspects of FIG. 171.

FIG. 171 illustrates that the processors 17070, 17080 may include integrated memory and I/O control logic ("CL") 17072 and 17082, respectively. Thus, the CL 17072, 17082 include integrated memory controller units and include I/O control logic. FIG. 171 illustrates that not only are the memories 17032, 17034 coupled to the CL 17072, 17082, but also that I/O devices 17114 are also coupled to the control logic 17072, 17082. Legacy I/O devices 17115 are coupled to the chipset 17090.

Referring now to FIG. 172, shown is a block diagram of a SoC 17200 in accordance with an embodiment of the present disclosure. Similar elements in FIG. 168 bear like reference numerals. Also, dashed lined boxes are optional features on more advanced SoCs. In FIG. 172, an interconnect unit(s) 17202 is coupled to: an application processor 17210 which includes a set of one or more cores 202A-N and shared cache unit(s) 16806; a system agent unit 16810; a bus controller unit(s) 16816; an integrated memory controller unit(s) 16814; a set or one or more coprocessors 17220 which may include integrated graphics logic, an image processor, an audio processor, and a video processor; an static random access memory (SRAM) unit 17230; a direct memory access (DMA) unit 17232; and a display unit 17240 for coupling to one or more external displays. In one embodiment, the coprocessor(s) 17220 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 17030 illustrated in FIG. 170, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 173 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 173 shows a program in a high level language 17302 may be compiled using an x86 compiler 17304 to generate x86 binary code 17306 that may be natively executed by a processor with at least one x86 instruction set core 17316. The processor with at least one x86 instruction set core 17316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 17304 represents a compiler that is operable to generate x86 binary code 17306 (e.g., object code) that can, with or without additional linkage processing, be executed on the processor with at least one x86 instruction set core 17316. Similarly, FIG. 173 shows the program in the high level language 17302 may be compiled using an alternative instruction set compiler 17308 to generate alternative instruction set binary code 17310 that may be natively executed by a processor without at least one x86 instruction set core 17314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 17312 is used to convert the x86 binary code 17306 into code that may be natively executed by the processor without an x86 instruction set core 17314. This converted code is not likely to be the same as the alternative instruction set binary code 17310 because an instruction converter capable of this is difficult to make; however, the converted code will accomplish the general operation and be made up of instructions from the alternative instruction set. Thus, the instruction converter 17312 represents software, firmware, hardware, or a combination thereof that, through emulation, simulation or any other process, allows a processor or other electronic device that does not have an x86 instruction set processor or core to execute the x86 binary code 17306.

What is claimed is:

1. An apparatus comprising:

a plurality of processing elements;

an interconnect network between the plurality of processing elements to transfer values between the plurality of processing elements; and a first processing element of the plurality of processing elements comprising:

a configuration register within the first processing element to store a configuration value that statically configures the first processing element to perform an operation according to the configuration value a plurality of times without reconfiguration, wherein the configuration value is to indicate a first input operand that is selectable between a channel formed in the interconnect network between the plurality of processing elements, a register, and a literal, a second input operand that is selectable between a channel formed in the interconnect network between the plurality of processing elements, a register, and a literal, and a destination operand that is selectable between a channel formed in the interconnect network between the plurality of processing elements and a register, a plurality of input queues, an input controller to control enqueue and dequeue of values into the plurality of input queues according to the configuration value, a plurality of output queues, and an output controller to control enqueue and dequeue of values into the plurality of output queues according to the configuration value.

2. The apparatus of claim 1, wherein, when at least one of the plurality of input queues stores a value, the input controller is to send a not empty value to operation circuitry of the first processing element to indicate the first processing element is to begin the operation on the value stored in the at least one of the plurality of input queues.

3. The apparatus of claim 1, wherein, when at least one of the plurality of output queues is not full, the output controller is to send a not full value to operation circuitry of the first processing element to indicate the first processing element is to begin the operation on a value stored in the at least one of the plurality of input queues.

4. The apparatus of claim 1, wherein, when at least one of the plurality of input queues stores a value, the input controller is to send a not empty value to operation circuitry of the first processing element and when at least one of the plurality of output queues is not full, the output controller is to send a not full value to operation circuitry of the first processing element, and the operation circuitry of the first processing element is to begin the operation on the value stored in the at least one of the plurality of input queues after both the not empty value and the not full value are received.

5. The apparatus of claim 1, wherein, when at least one of the plurality of input queues is not full, the input controller is to send a ready value to an upstream processing element of the plurality of processing elements.

6. The apparatus of claim 5, wherein, when at least one of a plurality of output queues of the upstream processing element stores a value, an output controller of the upstream processing element is to send a valid value to the input controller of the first processing element, and the input controller of the first processing element is to enqueue the value into the at least one of the plurality of input queues from the at least one of the plurality of output queues of the upstream processing element after both the ready value is asserted by the first processing element and the valid value is received from the upstream processing element.

7. The apparatus of claim 1, wherein, when at least one of the plurality of output queues stores a value, the output controller is to send a valid value to a downstream processing element of the plurality of processing elements.

8. The apparatus of claim 7, wherein, when at least one of a plurality of input queues of the downstream processing element is not full, an input controller of the downstream processing element is to send a ready value to the output controller of the first processing element, and the output controller of the first processing element is to dequeue the value from the at least one of the plurality of output queues after both the valid value is asserted by the first processing element and the ready value is received from the downstream processing element.

9. A method comprising:

coupling a plurality of processing elements together by an interconnect network between the plurality of processing elements to transfer values between the plurality of processing elements;

storing a configuration value in a configuration register within a first processing element of the plurality of processing elements that statically configures the first processing element to perform an operation according to the configuration value a plurality of times without reconfiguration, wherein the configuration value indicates a first input operand that is selectable between a channel formed in the interconnect network between the plurality of processing elements, a register, and a literal, a second input operand that is selectable between a channel formed in the interconnect network between the plurality of processing elements, a register, and a literal, and a destination operand that is selectable between a channel formed in the interconnect network between the plurality of processing elements and a register;

controlling enqueue and dequeue of values into a plurality of input queues of the first processing element according to the configuration value with an input controller in the first processing element; and controlling enqueue and dequeue of values into a plurality of output queues of the first processing element according to the configuration value with an output controller in the first processing element.

10. The method of claim 9, wherein, when at least one of the plurality of input queues stores a value, the input controller sends a not empty value to operation circuitry of the first processing element to indicate the first processing element is to begin the operation on the value stored in the at least one of the plurality of input queues.

11. The method of claim 9, wherein, when at least one of the plurality of output queues is not full, the output controller sends a not full value to operation circuitry of the first processing element to indicate the first processing element is to begin the operation on a value stored in the at least one of the plurality of input queues.

12. The method of claim 9, wherein, when at least one of the plurality of input queues stores a value, the input controller sends a not empty value to operation circuitry of the first processing element and when at least one of the plurality of output queues is not full, the output controller sends a not full value to operation circuitry of the first processing element, and the operation circuitry of the first processing element begins the operation on the value stored in the at least one of the plurality of input queues after both the not empty value and the not full value are received.

13. The method of claim 9, wherein, when at least one of the plurality of input queues is not full, the input controller sends a ready value to an upstream processing element of the plurality of processing elements.

14. The method of claim 13, wherein, when at least one of a plurality of output queues of the upstream processing element stores a value, an output controller of the upstream processing element sends a valid value to the input controller of the first processing element, and the input controller of the first processing element enqueues the value into the at least one of the plurality of input queues from the at least one of the plurality of output queues of the upstream processing element after both the ready value is asserted by the first processing element and the valid value is received from the upstream processing element.

15. The method of claim 9, wherein, when at least one of the plurality of output queues stores a value, the output controller sends a valid value to a downstream processing element of the plurality of processing elements.

16. The method of claim 15, wherein, when at least one of a plurality of input queues of the downstream processing element is not full, an input controller of the downstream processing element sends a ready value to the output controller of the first processing element, and the output controller of the first processing element dequeues the value from the at least one of the plurality of output queues after both the valid value is asserted by the first processing element and the ready value is received from the downstream processing element.

17. A processor comprising:

a core with a decoder to decode an instruction into a decoded instruction and an execution unit to execute the decoded instruction to perform a first operation;

a plurality of processing elements;

an interconnect network between the plurality of processing elements to transfer values between the plurality of processing elements; and a first processing element of the plurality of processing elements comprising:

a configuration register within the first processing element to store a configuration value that statically configures the first processing element to perform a second operation according to the configuration value a plurality of times without reconfiguration, wherein the configuration value indicates a first input operand that is selectable between a channel formed in the interconnect network between the plurality of processing elements, a register, and a literal, a second input operand that is selectable between a channel formed in the interconnect network between the plurality of processing elements, a register, and a literal, and a destination operand that is selectable between a channel formed in the interconnect network between the plurality of processing elements and a register, a plurality of input queues, an input controller to control enqueue and dequeue of values into the plurality of input queues according to the configuration value, a plurality of output queues, and an output controller to control enqueue and dequeue of values into the plurality of output queues according to the configuration value.

18. The processor of claim 17, wherein, when at least one of the plurality of input queues stores a value, the input controller is to send a not empty value to operation circuitry of the first processing element to indicate the first processing element is to begin the second operation on the value stored in the at least one of the plurality of input queues.

19. The processor of claim 17, wherein, when at least one of the plurality of output queues is not full, the output controller is to send a not full value to operation circuitry of the first processing element to indicate the first processing element is to begin the second operation on a value stored in the at least one of the plurality of input queues.

20. The processor of claim 17, wherein, when at least one of the plurality of input queues stores a value, the input controller is to send a not empty value to operation circuitry of the first processing element and when at least one of the plurality of output queues is not full, the output controller is to send a not full value to operation circuitry of the first processing element, and the operation circuitry of the first processing element is to begin the second operation on the value stored in the at least one of the plurality of input queues after both the not empty value and the not full value are received.

21. The processor of claim 17, wherein, when at least one of the plurality of input queues is not full, the input controller is to send a ready value to an upstream processing element of the plurality of processing elements.

22. The processor of claim 21, wherein, when at least one of a plurality of output queues of the upstream processing element stores a value, an output controller of the upstream processing element is to send a valid value to the input controller of the first processing element, and the input controller of the first processing element is to enqueue the value into the at least one of the plurality of input queues from the at least one of the plurality of output queues of the upstream processing element after both the ready value is asserted by the first processing element and the valid value is received from the upstream processing element.

23. The processor of claim 17, wherein, when at least one of the plurality of output queues stores a value, the output controller is to send a valid value to a downstream processing element of the plurality of processing elements.

24. The processor of claim 23, wherein, when at least one of a plurality of input queues of the downstream processing element is not full, an input controller of the downstream processing element is to send a ready value to the output controller of the first processing element, and the output controller of the first processing element is to dequeue the value from the at least one of the plurality of output queues after both the valid value is asserted by the first processing element and the ready value is received from the downstream processing element.

* * * * *